US011218854B2

(12) United States Patent
Raleigh et al.

(10) Patent No.: US 11,218,854 B2
(45) Date of Patent: Jan. 4, 2022

(54) SERVICE PLAN DESIGN, USER INTERFACES, APPLICATION PROGRAMMING INTERFACES, AND DEVICE MANAGEMENT

(71) Applicant: Headwater Research LLC, Tyler, TX (US)

(72) Inventors: Gregory G Raleigh, Woodside, CA (US); Jose Tellado, Mountain View, CA (US); Jeffrey Green, Sunnyvale, CA (US); James Lavine, Corte Madera, CA (US); Russell Bertrand Carter, III, San Jose, CA (US); Justin James, Poway, CA (US); Laurent An Minh Nguyen, Los Altos, CA (US)

(73) Assignee: Headwater Research LLC, Tyler, TX (US)

(*) Notice: Subject to any disclaimer, the term of this patent is extended or adjusted under 35 U.S.C. 154(b) by 251 days.

(21) Appl. No.: 16/654,295

(22) Filed: Oct. 16, 2019

(65) Prior Publication Data

US 2020/0045519 A1 Feb. 6, 2020

Related U.S. Application Data

(63) Continuation of application No. 15/958,430, filed on Apr. 20, 2018, now Pat. No. 10,462,627, which is a (Continued)

(51) Int. Cl.

*H04W 4/50* (2018.01)
*G06F 3/0482* (2013.01)

(Continued)

(52) U.S. Cl.

CPC ............ *H04W 4/50* (2018.02); *G06F 3/0482* (2013.01); *G06Q 30/02* (2013.01); *G06T 1/0007* (2013.01);

(Continued)

(58) Field of Classification Search

CPC ....... G06F 3/0482; G06T 1/0007; G06T 1/00; H04M 15/80; H04M 15/00; H04M 15/765;

(Continued)

(56) References Cited

U.S. PATENT DOCUMENTS 5,131,020 A 7/1992 Liebesny et al.
5,283,904 A 2/1994 Carson et al.

(Continued)

FOREIGN PATENT DOCUMENTS

CA 2688553 A1 12/2008
CN 1310401 A 8/2001

(Continued)

OTHER PUBLICATIONS

"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.

(Continued)

*Primary Examiner* — Andrew Joseph Rudy
(74) *Attorney, Agent, or Firm* — James E. Harris

(57) ABSTRACT

Disclosed herein are methods, systems, and apparatuses to enable subscribers of mobile wireless communication devices to view, research, select and customize service plans; to create and manage device groups, share and set permission controls for service plans among devices in device groups; to manage communication services through graphical user interfaces; to sponsor and promote service plans; and to design, manage, and control communication services through application programming interfaces.

1 Claim, 306 Drawing Sheets

Related U.S. Application Data continuation of application No. 15/415,022, filed on Jan. 25, 2017, now Pat. No. 9,955,332, which is a continuation of application No. 13/748,152, filed on Jan. 23, 2013, now Pat. No. 9,557,889, and a continuation-in-part of application No. 13/441,821, filed on Apr. 6, 2012, now Pat. No. 9,755,842, and a continuation-in-part of application No. 13/374,959, filed on Jan. 24, 2012, now Pat. No. 8,606,911, and a continuation-in-part of application No. 13/134,028, filed on May 25, 2011, now Pat. No. 8,589,541, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,980, filed on Jan. 28, 2010, now Pat. No. 8,340,634, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/248,028, filed on Sep. 28, 2011, now Pat. No. 8,924,469, and a continuation-in-part of application No. 13/247,998, filed on Sep. 28, 2011, now Pat. No. 8,725,123, and a continuation-in-part of application No. 13/248,025, filed on Sep. 28, 2011, now Pat. No. 8,924,543, and a continuation-in-part of application No. 13/253,013, filed on Oct. 4, 2011, now Pat. No. 8,745,191, and a continuation-in-part of application No. 13/309,556, filed on Dec. 1, 2011, now Pat. No. 8,893,009, and a continuation-in-part of application No. 13/309,463, filed on Dec. 1, 2011, now Pat. No. 8,793,758, and a continuation-in-part of application No. 12/695,021, filed on Jan. 27, 2010, now Pat. No. 8,346,225, and a continuation-in-part of application No. 13/134,005, filed on May 25, 2011, now Pat. No. 8,635,335, and a continuation-in-part of application No. 12/380,780, filed on Mar. 2, 2009, now Pat. No. 8,839,388, said application No. 13/134,005 is a continuation-in-part of application No. 12/380,780, filed on Mar. 2, 2009, now Pat. No. 8,839,388, and a continuation-in-part of application No. 12/380,778, filed on Mar. 2, 2009, now Pat. No. 8,321,526.

(60) Provisional application No. 61/589,830, filed on Jan. 23, 2012, provisional application No. 61/610,876, filed on Mar. 14, 2012, provisional application No. 61/658,339, filed on Jun. 11, 2012, provisional application No. 61/667,927, filed on Jul. 3, 2012, provisional application No. 61/674,331, filed on Jul. 21, 2012, provisional application No. 61/724,267, filed on Nov. 8, 2012, provisional application No. 61/724,837, filed on Nov. 9, 2012, provisional application No. 61/724,974, filed on Nov. 10, 2012, provisional application No. 61/732,249, filed on Nov. 30, 2012, provisional application No. 61/734,288, filed on Dec. 6, 2012, provisional application No. 61/745,548, filed on Dec. 22, 2012, provisional application No. 61/610,910, filed on Mar. 14, 2012, provisional application No. 61/435,564, filed on Jan. 24, 2011, provisional application No. 61/472,606, filed on Apr. 6, 2011, provisional application No. 61/550,906, filed on Oct. 24, 2011, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/264,120, filed on Nov. 24, 2009, provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/252,151, filed on Oct. 15, 2009, provisional application No. 61/252,153, filed on Oct. 15, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.
*H04M 15/00* (2006.01)
*G06T 1/00* (2006.01)
*G06Q 30/02* (2012.01)
*H04W 4/24* (2018.01)

(52) U.S. Cl.
CPC ......... *H04M 15/00* (2013.01); *H04M 15/765* (2013.01); *H04M 15/80* (2013.01); *H04W 4/24* (2013.01)

(58) Field of Classification Search
CPC ............... H04M 15/803; H04M 15/41; H04M 2215/52; H04M 2215/2026; H04M 2215/74; H04M 2215/7442; H04M 2215/0164; H04M 2215/0172; H04M 15/53; H04M 15/50; H04W 4/24; H04W 4/50; H04W 4/90; H04W 8/02; G06Q 30/02; H04L 12/14
USPC ..................................................... 705/16, 30
See application file for complete search history.

(56) References Cited

U.S. PATENT DOCUMENTS 5,325,532 A 6/1994 Crosswy et al.
5,572,528 A 11/1996 Shuen
5,577,100 A 11/1996 McGregor et al.
5,594,777 A 1/1997 Makkonen et al.
5,617,539 A 4/1997 Ludwig et al.
5,630,159 A 5/1997 Zancho
5,633,484 A 5/1997 Zancho et al.
5,633,868 A 5/1997 Baldwin et al.
5,754,953 A 5/1998 Briancon et al.
5,774,532 A 6/1998 Gottlieb et al.
5,794,142 A 8/1998 Vanttila et al.
5,814,798 A 9/1998 Zancho
5,889,477 A 3/1999 Fastenrath
5,892,900 A 4/1999 Ginter et al.
5,903,845 A 5/1999 Buhrmann et al.
5,915,008 A 6/1999 Dulman
5,915,226 A 6/1999 Martineau
5,933,778 A 8/1999 Buhrmann et al.
5,940,472 A 8/1999 Newman et al.
5,974,439 A 10/1999 Bollella
5,983,270 A 11/1999 Abraham et al.
6,035,281 A 3/2000 Crosskey et al.
6,038,452 A 3/2000 Strawczynski et al.
6,038,540 A 3/2000 Krist et al.
6,047,268 A 4/2000 Bartoli et al.
6,058,434 A 5/2000 Wilt et al.
6,061,571 A 5/2000 Tamura
6,064,878 A 5/2000 Denker et al.
6,078,953 A 6/2000 Vaid et al.
6,081,591 A 6/2000 Skoog
6,098,878 A 8/2000 Dent et al.
6,104,700 A 8/2000 Haddock et al.
6,115,823 A 9/2000 Velasco et al.
6,119,933 A 9/2000 Wong et al.
6,125,391 A 9/2000 Meltzer et al.
6,141,565 A 10/2000 Feuerstein et al.
6,141,686 A 10/2000 Jackowski et al.
6,148,336 A 11/2000 Thomas et al.
6,154,738 A 11/2000 Call
6,157,636 A 12/2000 Voit et al.
6,185,576 B1 2/2001 Mcintosh
6,198,915 B1 3/2001 McGregor et al.
6,219,786 B1 4/2001 Cunningham et al.
6,226,277 B1 5/2001 Chuah
6,246,870 B1 6/2001 Dent et al.
6,263,055 B1 7/2001 Garland et al.
6,292,828 B1 9/2001 Williams
6,317,584 B1 11/2001 Abu-Amara et al.
6,370,139 B2 4/2002 Redmond
6,381,316 B2 4/2002 Joyce et al.
6,393,014 B1 5/2002 Daly et al.
6,397,259 B1 5/2002 Lincke et al.
6,401,113 B2 6/2002 Lazaridis et al.
6,418,147 B1 7/2002 Wiedeman
6,438,575 B1 8/2002 Khan et al.
6,445,777 B1 9/2002 Clark
6,449,479 B1 9/2002 Sanchez
6,466,984 B1 10/2002 Naveh et al.
6,477,670 B1 11/2002 Ahmadvand
6,502,131 B1 12/2002 Vaid et al.
6,505,114 B2 1/2003 Luciani
6,510,152 B1 1/2003 Gerszberg et al.
6,522,629 B1 2/2003 Anderson, Sr.
6,532,235 B1 3/2003 Benson et al.
6,532,579 B2 3/2003 Sato et al.
6,535,855 B1 3/2003 Cahill et al.
6,535,949 B1 3/2003 Parker
6,539,082 B1 3/2003 Lowe et al.
6,542,500 B1 4/2003 Gerszberg et al.
6,542,992 B1 4/2003 Peirce et al.
6,546,016 B1 4/2003 Gerszberg et al.
6,563,806 B1 5/2003 Yano et al.
6,570,974 B1 5/2003 Gerszberg et al.
6,574,321 B1 6/2003 Cox et al.
6,574,465 B2 6/2003 Marsh et al.
6,578,076 B1 6/2003 Putzolu
6,581,092 B1 6/2003 Motoyama
6,591,098 B1 7/2003 Shieh et al.
6,598,034 B1 7/2003 Kloth
6,601,040 B1 7/2003 Kolls
6,603,969 B1 8/2003 Vuoristo et al.
6,603,975 B1 8/2003 Inouchi et al.
6,606,744 B1 8/2003 Mikurak
6,628,934 B2 9/2003 Rosenberg et al.
6,631,122 B1 10/2003 Arunachalam et al.
6,636,721 B2 10/2003 Threadgill et al.
6,639,975 B1 10/2003 O'Neal et al.
6,640,097 B2 10/2003 Corrigan et al.
6,640,334 B1 10/2003 Rasmussen
6,650,887 B2 11/2003 McGregor et al.
6,651,101 B1 11/2003 Gai et al.
6,654,786 B1 11/2003 Fox et al.
6,654,814 B1 11/2003 Britton et al.
6,658,254 B1 12/2003 Purdy et al.
6,662,014 B1 12/2003 Walsh
6,678,516 B2 1/2004 Nordman et al.
6,683,853 B1 1/2004 Kannas et al.
6,684,244 B1 1/2004 Goldman et al.
6,690,918 B2 2/2004 Evans et al.
6,697,821 B2 2/2004 Ziff et al.
6,725,031 B2 4/2004 Watler et al.
6,725,256 B1 4/2004 Albal et al.
6,732,176 B1 5/2004 Stewart et al.
6,735,206 B1 5/2004 Oki et al.
6,748,195 B1 6/2004 Phillips
6,748,437 B1 6/2004 Mankude et al.
6,751,296 B1 6/2004 Albal et al.
6,754,470 B2 6/2004 Hendrickson et al.
6,757,717 B1 6/2004 Goldstein
6,760,417 B1 7/2004 Wallenius
6,763,000 B1 7/2004 Walsh
6,763,226 B1 7/2004 McZeal, Jr.
6,765,864 B1 7/2004 Natarajan et al.
6,765,925 B1 7/2004 Sawyer et al.
6,782,412 B2 8/2004 Brophy et al.
6,785,889 B1 8/2004 Williams
6,792,461 B1 9/2004 Hericourt
6,829,596 B1 12/2004 Frazee
6,829,696 B1 12/2004 Balmer et al.
6,839,340 B1 1/2005 Voit et al.
6,842,628 B1 1/2005 Arnold et al.
6,873,988 B2 3/2005 Herrmann et al.
6,876,653 B2 4/2005 Ambe et al.
6,879,825 B1 4/2005 Daly
6,882,718 B1 4/2005 Smith
6,885,997 B1 4/2005 Roberts
6,901,440 B1 5/2005 Bimm et al.
6,920,455 B1 7/2005 Weschler
6,922,562 B2 7/2005 Ward et al.
6,928,280 B1 8/2005 Xanthos et al.
6,934,249 B1 8/2005 Bertin et al.
6,934,751 B2 8/2005 Jayapalan et al.
6,947,723 B1 9/2005 Gumani et al.
6,947,985 B2 9/2005 Hegli et al.
6,952,428 B1 10/2005 Necka et al.
6,957,067 B1 10/2005 Iyer et al.
6,959,202 B2 10/2005 Heinonen et al.
6,959,393 B2 10/2005 Hollis et al.
6,965,667 B2 11/2005 Trabandt et al.
6,965,872 B1 11/2005 Grdina
6,967,958 B2 11/2005 Ono et al.
6,970,692 B2 11/2005 Tysor
6,970,927 B1 11/2005 Stewart et al.
6,982,733 B1 1/2006 McNally et al.
6,983,370 B2 1/2006 Eaton et al.
6,996,062 B1 2/2006 Freed et al.
6,996,076 B1 2/2006 Forbes et al.
6,996,393 B2 2/2006 Pyhalammi et al.
6,998,985 B2 2/2006 Reisman et al.
7,002,920 B1 2/2006 Ayyagari et al.
7,007,295 B1 2/2006 Rose et al.
7,013,469 B2 3/2006 Smith et al.
7,017,189 B1 3/2006 DeMello et al.
7,020,781 B1 3/2006 Saw et al.

(56) References Cited

U.S. PATENT DOCUMENTS 7,024,200 B2 4/2006 McKenna et al.
7,024,460 B2 4/2006 Koopmas et al.
7,027,055 B2 4/2006 Anderson et al.
7,027,408 B2 4/2006 Nabkel et al.
7,031,733 B2 4/2006 Alminana et al.
7,032,072 B1 4/2006 Quinn et al.
7,039,027 B2 5/2006 Bridgelall
7,039,037 B2 5/2006 Wang et al.
7,039,403 B2 5/2006 Wong
7,039,713 B1 5/2006 Van Gunter et al.
7,042,988 B2 5/2006 Juitt et al.
7,043,225 B1 5/2006 Patel et al.
7,043,226 B2 5/2006 Yamauchi
7,043,268 B2 5/2006 Yukie et al.
7,047,276 B2 5/2006 Liu et al.
7,058,022 B1 6/2006 Carolan et al.
7,058,968 B2 6/2006 Rowland et al.
7,068,600 B2 6/2006 Cain
7,069,248 B2 6/2006 Huber
7,082,422 B1 7/2006 Zirngibl et al.
7,084,775 B1 8/2006 Smith
7,092,696 B1 8/2006 Hosain et al.
7,095,754 B2 8/2006 Benveniste
7,102,620 B2 9/2006 Harries et al.
7,110,753 B2 9/2006 Campen
7,113,780 B2 9/2006 Mckenna et al.
7,113,997 B2 9/2006 Jayapalan et al.
7,120,133 B1 10/2006 Joo et al.
7,133,386 B2 11/2006 Holur et al.
7,133,695 B2 11/2006 Beyda
7,136,361 B2 11/2006 Benveniste
7,139,569 B2 11/2006 Kato
7,142,876 B2 11/2006 Trossen et al.
7,149,229 B1 12/2006 Leung
7,149,521 B2 12/2006 Sundar et al.
7,151,764 B1 12/2006 Heinonen et al.
7,158,792 B1 1/2007 Cook et al.
7,162,237 B1 1/2007 Silver et al.
7,165,040 B2 1/2007 Ehrman et al.
7,167,078 B2 1/2007 Pourchot
7,174,156 B1 2/2007 Mangal
7,174,174 B2 2/2007 Boris et al.
7,177,919 B1 2/2007 Truong et al.
7,180,855 B1 2/2007 Lin
7,181,017 B1 2/2007 Nagel et al.
7,191,248 B2 3/2007 Chattopadhyay et al.
7,197,321 B2 3/2007 Erskine et al.
7,200,112 B2 4/2007 Sundar et al.
7,200,551 B1 4/2007 Senez
7,203,169 B1 4/2007 Okholm et al.
7,203,721 B1 4/2007 Ben-Efraim et al.
7,203,752 B2 4/2007 Rice et al.
7,212,491 B2 5/2007 Koga
7,219,123 B1 5/2007 Fiechter et al.
7,222,190 B2 5/2007 Klinker et al.
7,222,304 B2 5/2007 Beaton et al.
7,224,968 B2 5/2007 Dobson et al.
7,228,354 B2 6/2007 Chambliss et al.
7,236,780 B2 6/2007 Benco
7,242,668 B2 7/2007 Kan et al.
7,242,920 B2 7/2007 Morris
7,245,901 B2 7/2007 McGregor et al.
7,248,570 B2 7/2007 Bahl et al.
7,251,218 B2 7/2007 Jorgensen
7,260,382 B1 8/2007 Lamb et al.
7,266,371 B1 9/2007 Amin et al.
7,269,157 B2 9/2007 Klinker et al.
7,271,765 B2 9/2007 Stilp et al.
7,272,660 B1 9/2007 Powers et al.
7,280,816 B2 10/2007 Fratti et al.
7,280,818 B2 10/2007 Clayton
7,283,561 B1 10/2007 Picher-Dempsey
7,283,963 B1 10/2007 Fitzpatrick et al.
7,286,834 B2 10/2007 Walter
7,286,848 B2 10/2007 Vireday et al.
7,289,489 B1 10/2007 Kung et al.
7,290,283 B2 10/2007 Copeland, III
7,310,424 B2 12/2007 Gehring et al.
7,313,237 B2 12/2007 Bahl et al.
7,315,892 B2 1/2008 Freimuth et al.
7,317,699 B2 1/2008 Godfrey et al.
7,318,111 B2 1/2008 Zhao
7,320,029 B2 1/2008 Rinne et al.
7,320,781 B2 1/2008 Lambert et al.
7,322,044 B2 1/2008 Hrastar
7,324,447 B1 1/2008 Morford
7,325,037 B2 1/2008 Lawson
7,336,960 B2 2/2008 Zavalkovsky et al.
7,340,772 B2 3/2008 Panasyuk et al.
7,346,410 B2 3/2008 Uchiyama
7,349,695 B2 3/2008 Oommen et al.
7,349,698 B2 3/2008 Gallagher et al.
7,353,533 B2 4/2008 Wright et al.
7,356,011 B1 4/2008 Waters et al.
7,356,337 B2 4/2008 Florence
7,366,497 B2 4/2008 Nagata
7,366,654 B2 4/2008 Moore
7,369,848 B2 5/2008 Jiang
7,369,856 B2 5/2008 Ovadia
7,373,136 B2 5/2008 Watler et al.
7,373,179 B2 5/2008 Stine et al.
7,379,731 B2 5/2008 Natsuno et al.
7,388,950 B2 6/2008 Elsey et al.
7,389,412 B2 6/2008 Sharma et al.
7,391,724 B2 6/2008 Alakoski et al.
7,395,244 B1 7/2008 Kingsford
7,401,338 B1 7/2008 Bowen et al.
7,403,763 B2 7/2008 Maes
7,409,447 B1 8/2008 Assadzadeh
7,409,569 B2 8/2008 Illowsky et al.
7,411,930 B2 8/2008 Montojo et al.
7,418,253 B2 8/2008 Kavanah
7,418,257 B2 8/2008 Kim
7,421,004 B2 9/2008 Feher
7,423,971 B1 9/2008 Mohaban et al.
7,428,750 B1 9/2008 Dunn et al.
7,433,362 B2 10/2008 Mallya et al.
7,436,816 B2 10/2008 Mehta et al.
7,440,433 B2 10/2008 Rink et al.
7,444,669 B1 10/2008 Bahl et al.
7,450,591 B2 11/2008 Korling et al.
7,450,927 B1 11/2008 Creswell et al.
7,454,191 B2 11/2008 Dawson et al.
7,457,265 B2 11/2008 Julka et al.
7,457,870 B1 11/2008 Lownsbrough et al.
7,460,837 B2 12/2008 Diener
7,466,652 B2 12/2008 Lau et al.
7,467,160 B2 12/2008 McIntyre
7,472,189 B2 12/2008 Mallya et al.
7,478,420 B2 1/2009 Wright et al.
7,486,185 B2 2/2009 Culpepper et al.
7,486,658 B2 2/2009 Kumar
7,493,659 B1 2/2009 Wu et al.
7,496,652 B2 2/2009 Pezzutti
7,499,438 B2 3/2009 Hinman et al.
7,499,537 B2 3/2009 Elsey et al.
7,502,672 B1 3/2009 Kolls
7,505,756 B2 3/2009 Bahl
7,505,795 B1 3/2009 Lim et al.
7,508,794 B2 3/2009 Feather et al.
7,508,799 B2 3/2009 Sumner et al.
7,512,128 B2 3/2009 DiMambro et al.
7,512,131 B2 3/2009 Svensson et al.
7,515,608 B2 4/2009 Yuan et al.
7,515,926 B2 4/2009 Bu et al.
7,516,219 B2 4/2009 Moghaddam et al.
7,522,549 B2 4/2009 Karaoguz et al.
7,522,576 B2 4/2009 Du et al.
7,526,541 B2 4/2009 Roese et al.
7,529,204 B2 5/2009 Bourlas et al.
7,535,880 B1 5/2009 Hinman et al.
7,536,695 B2 5/2009 Alam et al.
7,539,132 B2 5/2009 Werner et al.
7,539,862 B2 5/2009 Edgett et al.

(56) References Cited

U.S. PATENT DOCUMENTS

| | | | |
|---|---|---|---|
| 7,540,408 | B2 | 6/2009 | Levine et al. |
| 7,545,782 | B2 | 6/2009 | Rayment et al. |
| 7,546,460 | B2 | 6/2009 | Maes |
| 7,546,629 | B2 | 6/2009 | Albert et al. |
| 7,548,875 | B2 | 6/2009 | Mikkelsen et al. |
| 7,548,976 | B2 | 6/2009 | Bahl et al. |
| 7,551,921 | B2 | 6/2009 | Petermann |
| 7,551,922 | B2 | 6/2009 | Roskowski et al. |
| 7,554,983 | B1 | 6/2009 | Muppala |
| 7,555,757 | B2 | 6/2009 | Smith et al. |
| 7,561,899 | B2 | 7/2009 | Lee |
| 7,562,213 | B1 | 7/2009 | Timms |
| 7,564,799 | B2 | 7/2009 | Holland et al. |
| 7,565,141 | B2 | 7/2009 | Macaluso |
| 7,574,509 | B2 | 8/2009 | Nixon et al. |
| 7,574,731 | B2 | 8/2009 | Fascenda |
| 7,577,431 | B2 | 8/2009 | Jiang |
| 7,580,356 | B1 | 8/2009 | Mishra et al. |
| 7,580,857 | B2 | 8/2009 | VanFleet et al. |
| 7,583,964 | B2 | 9/2009 | Wong |
| 7,584,298 | B2 | 9/2009 | Klinker et al. |
| 7,585,217 | B2 | 9/2009 | Lutnick et al. |
| 7,586,871 | B2 | 9/2009 | Hamilton et al. |
| 7,593,417 | B2 | 9/2009 | Wang et al. |
| 7,593,730 | B2 | 9/2009 | Khandelwal et al. |
| 7,596,373 | B2 | 9/2009 | Mcgregor et al. |
| 7,599,288 | B2 | 10/2009 | Cole et al. |
| 7,599,714 | B2 | 10/2009 | Kuzminskiy |
| 7,602,746 | B2 | 10/2009 | Calhoun et al. |
| 7,606,918 | B2 | 10/2009 | Holzman et al. |
| 7,607,041 | B2 | 10/2009 | Kraemer et al. |
| 7,609,650 | B2 | 10/2009 | Roskowski et al. |
| 7,609,700 | B1 | 10/2009 | Ying et al. |
| 7,610,047 | B2 | 10/2009 | Hicks, III et al. |
| 7,610,057 | B2 | 10/2009 | Bahl et al. |
| 7,610,328 | B2 | 10/2009 | Haase et al. |
| 7,610,396 | B2 | 10/2009 | Taglienti et al. |
| 7,614,051 | B2 | 11/2009 | Glaum et al. |
| 7,616,962 | B2 | 11/2009 | Oswal et al. |
| 7,617,516 | B2 | 11/2009 | Huslak et al. |
| 7,620,041 | B2 | 11/2009 | Dunn et al. |
| 7,620,065 | B2 | 11/2009 | Falardeau |
| 7,620,162 | B2 | 11/2009 | Aaron et al. |
| 7,620,383 | B2 | 11/2009 | Taglienti et al. |
| 7,627,314 | B2 | 12/2009 | Carlson et al. |
| 7,627,600 | B2 | 12/2009 | Citron et al. |
| 7,627,767 | B2 | 12/2009 | Sherman et al. |
| 7,627,872 | B2 | 12/2009 | Hebeler et al. |
| 7,633,438 | B2 | 12/2009 | Tysowski |
| 7,634,388 | B2 | 12/2009 | Archer et al. |
| 7,636,574 | B2 | 12/2009 | Poosala |
| 7,636,626 | B2 | 12/2009 | Oesterling et al. |
| 7,643,411 | B2 | 1/2010 | Andreasen et al. |
| 7,644,151 | B2 | 1/2010 | Jerrim et al. |
| 7,644,267 | B2 | 1/2010 | Ylikoski et al. |
| 7,644,414 | B2 | 1/2010 | Smith et al. |
| 7,647,047 | B2 | 1/2010 | Moghaddam et al. |
| 7,650,137 | B2 | 1/2010 | Jobs et al. |
| 7,653,394 | B2 | 1/2010 | McMillin |
| 7,656,271 | B2 | 2/2010 | Ehrman et al. |
| 7,657,920 | B2 | 2/2010 | Arseneau et al. |
| 7,660,419 | B1 | 2/2010 | Ho |
| 7,661,124 | B2 | 2/2010 | Ramanathan et al. |
| 7,664,494 | B2 | 2/2010 | Jiang |
| 7,668,176 | B2 | 2/2010 | Chuah |
| 7,668,612 | B1 | 2/2010 | Okkonen |
| 7,668,903 | B2 | 2/2010 | Edwards et al. |
| 7,668,966 | B2 | 2/2010 | Klinker et al. |
| 7,676,673 | B2 | 3/2010 | Weller et al. |
| 7,680,086 | B2 | 3/2010 | Eglin |
| 7,681,226 | B2 | 3/2010 | Kraemer et al. |
| 7,684,370 | B2 | 3/2010 | Kezys |
| 7,685,131 | B2 | 3/2010 | Batra et al. |
| 7,685,254 | B2 | 3/2010 | Pandya |
| 7,685,530 | B2 | 3/2010 | Sherrard et al. |
| 7,688,792 | B2 | 3/2010 | Babbar et al. |
| 7,693,107 | B2 | 4/2010 | De Froment |
| 7,693,720 | B2 | 4/2010 | Kennewick et al. |
| 7,697,540 | B2 | 4/2010 | Haddad et al. |
| 7,710,932 | B2 | 5/2010 | Muthuswamy et al. |
| 7,711,848 | B2 | 5/2010 | Maes |
| 7,719,966 | B2 | 5/2010 | Luft et al. |
| 7,720,206 | B2 | 5/2010 | Devolites et al. |
| 7,720,464 | B2 | 5/2010 | Batta |
| 7,720,505 | B2 | 5/2010 | Gopi et al. |
| 7,720,960 | B2 | 5/2010 | Pruss et al. |
| 7,721,296 | B2 | 5/2010 | Ricagni |
| 7,724,716 | B2 | 5/2010 | Fadell |
| 7,725,570 | B1 | 5/2010 | Lewis |
| 7,729,326 | B2 | 6/2010 | Sekhar |
| 7,730,123 | B1 | 6/2010 | Erickson et al. |
| 7,734,784 | B1 | 6/2010 | Araujo et al. |
| 7,742,406 | B1 | 6/2010 | Muppala |
| 7,746,854 | B2 | 6/2010 | Ambe et al. |
| 7,747,240 | B1 | 6/2010 | Briscoe et al. |
| 7,747,699 | B2 | 6/2010 | Prueitt et al. |
| 7,747,730 | B1 | 6/2010 | Harlow |
| 7,752,330 | B2 | 7/2010 | Olsen et al. |
| 7,756,056 | B2 | 7/2010 | Kim et al. |
| 7,756,534 | B2 | 7/2010 | Anupam et al. |
| 7,756,757 | B1 | 7/2010 | Oakes, III |
| 7,760,137 | B2 | 7/2010 | Martucci et al. |
| 7,760,711 | B1 | 7/2010 | Kung et al. |
| 7,760,861 | B1 | 7/2010 | Croak et al. |
| 7,765,294 | B2 | 7/2010 | Edwards et al. |
| 7,769,397 | B2 | 8/2010 | Funato et al. |
| 7,770,785 | B2 | 8/2010 | Jha et al. |
| 7,774,323 | B2 | 8/2010 | Helfman |
| 7,774,412 | B1 | 8/2010 | Schnepel |
| 7,774,456 | B1 | 8/2010 | Lownsbrough et al. |
| 7,778,176 | B2 | 8/2010 | Morford |
| 7,778,643 | B2 | 8/2010 | Laroia et al. |
| 7,788,700 | B1 | 8/2010 | Feezel et al. |
| 7,792,257 | B1 | 9/2010 | Vanier et al. |
| 7,792,538 | B2 | 9/2010 | Kozisek |
| 7,792,708 | B2 | 9/2010 | Alva |
| 7,797,019 | B2 | 9/2010 | Friedmann |
| 7,797,060 | B2 | 9/2010 | Grgic et al. |
| 7,797,204 | B2 | 9/2010 | Balent |
| 7,797,401 | B2 | 9/2010 | Stewart et al. |
| 7,801,523 | B1 | 9/2010 | Kenderov |
| 7,801,783 | B2 | 9/2010 | Kende et al. |
| 7,801,985 | B1 | 9/2010 | Pitkow et al. |
| 7,802,724 | B1 | 9/2010 | Nohr |
| 7,805,140 | B2 | 9/2010 | Friday et al. |
| 7,805,522 | B2 | 9/2010 | Schlüter et al. |
| 7,805,606 | B2 | 9/2010 | Birger et al. |
| 7,809,351 | B1 | 10/2010 | Panda et al. |
| 7,809,372 | B2 | 10/2010 | Rajaniemi |
| 7,813,746 | B2 | 10/2010 | Rajkotia |
| 7,817,615 | B1 | 10/2010 | Breau et al. |
| 7,817,983 | B2 | 10/2010 | Cassett et al. |
| 7,822,837 | B1 | 10/2010 | Urban et al. |
| 7,822,849 | B2 | 10/2010 | Titus |
| 7,826,427 | B2 | 11/2010 | Sood et al. |
| 7,826,607 | B1 | 11/2010 | De Carvalho Resende et al. |
| 7,835,275 | B1 | 11/2010 | Swan et al. |
| 7,843,831 | B2 | 11/2010 | Morrill et al. |
| 7,843,843 | B1 | 11/2010 | Papp, III et al. |
| 7,844,034 | B1 | 11/2010 | Oh et al. |
| 7,844,728 | B2 | 11/2010 | Anderson et al. |
| 7,848,768 | B2 | 12/2010 | Omori et al. |
| 7,849,161 | B2 | 12/2010 | Koch et al. |
| 7,849,170 | B1 | 12/2010 | Hargens et al. |
| 7,849,477 | B2 | 12/2010 | Cristofalo et al. |
| 7,853,255 | B2 | 12/2010 | Karaoguz et al. |
| 7,853,656 | B2 | 12/2010 | Yach et al. |
| 7,856,226 | B2 | 12/2010 | Wong et al. |
| 7,860,088 | B2 | 12/2010 | Lioy |
| 7,865,182 | B2 | 1/2011 | Macaluso |
| 7,865,187 | B2 | 1/2011 | Ramer et al. |
| 7,868,778 | B2 | 1/2011 | Kenwright |
| 7,873,001 | B2 | 1/2011 | Silver |
| 7,873,344 | B2 | 1/2011 | Bowser et al. |

(56) References Cited

U.S. PATENT DOCUMENTS 7,873,346 B2 1/2011 Petersson et al.
7,873,540 B2 1/2011 Arumugam
7,873,705 B2 1/2011 Kalish
7,873,985 B2 1/2011 Baum
7,877,090 B2 1/2011 Maes
7,881,199 B2 2/2011 Krstulich
7,881,697 B2 2/2011 Baker et al.
7,882,029 B2 2/2011 White
7,882,247 B2 2/2011 Sturniolo et al.
7,882,560 B2 2/2011 Kraemer et al.
7,886,047 B1 2/2011 Potluri
7,889,384 B2 2/2011 Armentrout et al.
7,890,084 B1 2/2011 Dudziak et al.
7,890,111 B2 2/2011 Bugenhagen
7,894,431 B2 2/2011 Goring et al.
7,899,039 B2 3/2011 Andreasen et al.
7,899,438 B2 3/2011 Baker et al.
7,903,553 B2 3/2011 Liu
7,907,970 B2 3/2011 Park et al.
7,911,975 B2 3/2011 Droz et al.
7,912,025 B2 3/2011 Pattenden et al.
7,912,056 B1 3/2011 Brassem
7,920,529 B1 4/2011 Mahler et al.
7,921,463 B2 4/2011 Sood et al.
7,925,740 B2 4/2011 Nath et al.
7,925,778 B1 4/2011 Wijnands et al.
7,929,959 B2 4/2011 DeAtley et al.
7,929,960 B2 4/2011 Martin et al.
7,929,973 B2 4/2011 Zavalkovsky et al.
7,930,327 B2 4/2011 Craft et al.
7,930,446 B2 4/2011 Kesselman et al.
7,930,553 B2 4/2011 Satarasinghe et al.
7,933,274 B2 4/2011 Verma et al.
7,936,736 B2 5/2011 Proctor, Jr. et al.
7,937,069 B2 5/2011 Rassam
7,937,450 B2 5/2011 Janik
7,940,685 B1 5/2011 Breslau et al.
7,940,751 B2 5/2011 Hansen
7,941,184 B2 5/2011 Prendergast et al.
7,944,948 B2 5/2011 Chow et al.
7,945,238 B2 5/2011 Baker et al.
7,945,240 B1 5/2011 Klock et al.
7,945,945 B2 5/2011 Graham et al.
7,948,952 B2 5/2011 Hurtta et al.
7,948,953 B2 5/2011 Melkote et al.
7,948,968 B2 5/2011 Voit et al.
7,949,529 B2 5/2011 Weider et al.
7,953,808 B2 5/2011 Sharp et al.
7,953,877 B2 5/2011 Vemula et al.
7,957,020 B2 6/2011 Mine et al.
7,957,381 B2 6/2011 Clermidy et al.
7,957,511 B2 6/2011 Drudis et al.
7,958,029 B1 6/2011 Bobich et al.
7,962,622 B2 6/2011 Friend et al.
7,965,983 B1 6/2011 Swan et al.
7,966,405 B2 6/2011 Sundaresan et al.
7,969,950 B2 * 6/2011 Iyer .................... H04L 63/1416
370/338
7,970,350 B2 6/2011 Sheynman
7,970,426 B2 6/2011 Poe et al.
7,974,624 B2 7/2011 Gallagher et al.
7,975,184 B2 7/2011 Goff et al.
7,978,627 B2 7/2011 Taylor et al.
7,978,686 B2 7/2011 Goyal et al.
7,979,069 B2 7/2011 Hupp et al.
7,979,889 B2 7/2011 Gladstone et al.
7,979,896 B2 7/2011 McMurtry et al.
7,984,130 B2 7/2011 Bogineni et al.
7,984,511 B2 7/2011 Kocher et al.
7,986,935 B1 7/2011 D'Souza et al.
7,987,496 B2 7/2011 Bryce et al.
7,987,510 B2 7/2011 Kocher et al.
7,990,049 B2 8/2011 Shioya
8,000,276 B2 8/2011 Scherzer et al.
8,000,318 B2 8/2011 Wiley et al.
8,005,009 B2 8/2011 McKee et al.
8,005,459 B2 8/2011 Balsillie
8,005,726 B1 8/2011 Bao
8,005,913 B1 8/2011 Carlander
8,005,988 B2 8/2011 Maes
8,010,080 B1 8/2011 Thenthiruperai et al.
8,010,081 B1 8/2011 Roskowski
8,010,082 B2 8/2011 Sutaria et al.
8,010,990 B2 8/2011 Ferguson et al.
8,015,133 B1 9/2011 Wu et al.
8,015,234 B2 9/2011 Lum et al.
8,015,249 B2 9/2011 Nayak et al.
8,019,687 B2 9/2011 Wang et al.
8,019,820 B2 9/2011 Son et al.
8,019,846 B2 9/2011 Roelens et al.
8,019,868 B2 9/2011 Rao et al.
8,019,886 B2 9/2011 Harrang et al.
8,023,425 B2 9/2011 Raleigh
8,024,397 B1 9/2011 Erickson et al.
8,024,424 B2 9/2011 Freimuth et al.
8,027,339 B2 9/2011 Short et al.
8,031,601 B2 10/2011 Feroz et al.
8,032,168 B2 10/2011 Ikaheimo
8,032,409 B1 10/2011 Mikurak
8,032,899 B2 10/2011 Archer et al.
8,036,387 B2 10/2011 Kudelski et al.
8,036,600 B2 10/2011 Garrett et al.
8,044,792 B2 10/2011 Orr et al.
8,045,973 B2 10/2011 Chambers
8,046,449 B2 10/2011 Yoshiuchi
8,050,275 B1 11/2011 Iyer
8,050,690 B2 11/2011 Neeraj
8,050,705 B2 11/2011 Sicher et al.
8,059,530 B1 11/2011 Cole
8,060,017 B2 11/2011 Schlicht et al.
8,060,463 B1 11/2011 Spiegel
8,064,418 B2 11/2011 Maki
8,064,896 B2 11/2011 Bell et al.
8,065,365 B2 11/2011 Saxena et al.
8,068,824 B2 11/2011 Shan et al.
8,068,829 B2 11/2011 Lemond et al.
8,073,427 B2 12/2011 Koch et al.
8,073,721 B1 12/2011 Lewis
8,078,140 B2 12/2011 Baker et al.
8,078,163 B2 12/2011 Lemond et al.
8,081,612 B2 12/2011 Want et al.
8,085,808 B2 12/2011 Brusca et al.
8,086,398 B2 12/2011 Sanchez et al.
8,086,497 B1 12/2011 Oakes, III
8,086,791 B2 12/2011 Caulkins
8,090,359 B2 1/2012 Proctor, Jr. et al.
8,090,361 B2 1/2012 Hagan
8,090,616 B2 1/2012 Proctor, Jr. et al.
8,091,087 B2 1/2012 Ali et al.
8,094,551 B2 1/2012 Huber et al.
8,095,112 B2 1/2012 Chow et al.
8,095,124 B2 1/2012 Balia
8,095,175 B2 1/2012 Todd et al.
8,095,640 B2 1/2012 Guingo et al.
8,095,666 B2 1/2012 Schmidt et al.
8,098,579 B2 1/2012 Ray et al.
8,099,077 B2 1/2012 Chowdhury et al.
8,099,517 B2 1/2012 Jia et al.
8,102,814 B2 1/2012 Rahman et al.
8,103,285 B2 1/2012 Kalhan
8,104,080 B2 1/2012 Burns et al.
8,107,953 B2 1/2012 Zimmerman et al.
8,108,520 B2 1/2012 Ruutu et al.
8,108,680 B2 1/2012 Murray
8,112,435 B2 2/2012 Epstein et al.
8,116,223 B2 2/2012 Tian et al.
8,116,749 B2 2/2012 Proctor, Jr. et al.
8,116,781 B2 2/2012 Chen et al.
8,122,128 B2 2/2012 Burke, II et al.
8,122,249 B2 2/2012 Falk et al.
8,125,897 B2 2/2012 Ray et al.
8,126,123 B2 2/2012 Cai et al.
8,126,396 B2 2/2012 Bennett
8,126,476 B2 2/2012 Vardi et al.

(56) References Cited

U.S. PATENT DOCUMENTS

| | | | |
|---|---|---|---|
| 8,126,722 | B2 | 2/2012 | Robb et al. |
| 8,130,793 | B2 | 3/2012 | Edwards et al. |
| 8,131,256 | B2 | 3/2012 | Martti et al. |
| 8,131,281 | B1 | 3/2012 | Hildner et al. |
| 8,131,840 | B1 | 3/2012 | Denker |
| 8,131,858 | B2 | 3/2012 | Agulnik et al. |
| 8,132,256 | B2 | 3/2012 | Bari |
| 8,134,954 | B2 | 3/2012 | Godfrey et al. |
| 8,135,388 | B1 | 3/2012 | Gailloux et al. |
| 8,135,392 | B2 | 3/2012 | Marcelling et al. |
| 8,135,657 | B2 | 3/2012 | Kapoor et al. |
| 8,140,690 | B2 | 3/2012 | Ly et al. |
| 8,144,591 | B2 | 3/2012 | Ghai et al. |
| 8,145,194 | B2 | 3/2012 | Yoshikawa et al. |
| 8,146,142 | B2 | 3/2012 | Lortz et al. |
| 8,149,748 | B2 | 4/2012 | Bata et al. |
| 8,149,823 | B2 | 4/2012 | Turcan et al. |
| 8,150,394 | B2 | 4/2012 | Bianconi et al. |
| 8,150,431 | B2 | 4/2012 | Wolovitz et al. |
| 8,151,205 | B2 | 4/2012 | Follmann et al. |
| 8,155,155 | B1 | 4/2012 | Chow et al. |
| 8,155,620 | B2 | 4/2012 | Wang et al. |
| 8,155,666 | B2 | 4/2012 | Alizadeh-Shabdiz |
| 8,155,670 | B2 | 4/2012 | Fullam et al. |
| 8,156,206 | B2 | 4/2012 | Kiley et al. |
| 8,159,520 | B1 | 4/2012 | Dhanoa et al. |
| 8,160,015 | B2 | 4/2012 | Rashid et al. |
| 8,160,056 | B2 | 4/2012 | Van der Merwe et al. |
| 8,160,598 | B2 | 4/2012 | Savoor |
| 8,165,576 | B2 | 4/2012 | Raju et al. |
| 8,166,040 | B2 | 4/2012 | Brindisi et al. |
| 8,166,554 | B2 | 4/2012 | John |
| 8,170,553 | B2 | 5/2012 | Bennett |
| 8,174,378 | B2 | 5/2012 | Richman et al. |
| 8,174,970 | B2 | 5/2012 | Adamczyk et al. |
| 8,175,574 | B1 | 5/2012 | Panda et al. |
| 8,180,333 | B1 | 5/2012 | Wells et al. |
| 8,180,881 | B2 | 5/2012 | Seo et al. |
| 8,180,886 | B2 | 5/2012 | Overcash et al. |
| 8,184,530 | B1 | 5/2012 | Swan et al. |
| 8,184,590 | B2 | 5/2012 | Rosenblatt |
| 8,185,088 | B2 | 5/2012 | Klein et al. |
| 8,185,093 | B2 | 5/2012 | Jheng et al. |
| 8,185,127 | B1 | 5/2012 | Cai et al. |
| 8,185,152 | B1 | 5/2012 | Goldner |
| 8,185,158 | B2 | 5/2012 | Tamura et al. |
| 8,190,087 | B2 | 5/2012 | Fisher et al. |
| 8,190,122 | B1 | 5/2012 | Alexander et al. |
| 8,190,675 | B2 | 5/2012 | Tribbett |
| 8,191,106 | B2 | 5/2012 | Choyi et al. |
| 8,191,116 | B1 | 5/2012 | Gazzard |
| 8,191,124 | B2 | 5/2012 | Wynn et al. |
| 8,194,549 | B2 | 6/2012 | Huber et al. |
| 8,194,553 | B2 | 6/2012 | Liang et al. |
| 8,194,572 | B2 | 6/2012 | Horvath et al. |
| 8,194,581 | B1 | 6/2012 | Schroeder et al. |
| 8,195,093 | B2 | 6/2012 | Garrett et al. |
| 8,195,153 | B1 | 6/2012 | Frencel et al. |
| 8,195,163 | B2 | 6/2012 | Gisby et al. |
| 8,195,661 | B2 | 6/2012 | Kalavade |
| 8,196,199 | B2 | 6/2012 | Hrastar et al. |
| 8,200,163 | B2 | 6/2012 | Hoffman |
| 8,200,200 | B1 | 6/2012 | Belser et al. |
| 8,200,509 | B2 | 6/2012 | Kenedy et al. |
| 8,200,775 | B2 | 6/2012 | Moore |
| 8,200,818 | B2 | 6/2012 | Freund et al. |
| 8,204,190 | B2 | 6/2012 | Bang et al. |
| 8,204,505 | B2 | 6/2012 | Jin et al. |
| 8,204,794 | B1 | 6/2012 | Peng et al. |
| 8,208,788 | B2 | 6/2012 | Ando et al. |
| 8,208,919 | B2 | 6/2012 | Kotecha |
| 8,213,296 | B2 | 7/2012 | Shannon et al. |
| 8,213,363 | B2 | 7/2012 | Ying et al. |
| 8,214,536 | B2 | 7/2012 | Zhao |
| 8,214,890 | B2 | 7/2012 | Kirovski et al. |
| 8,219,134 | B2 | 7/2012 | Maharajh et al. |
| 8,223,655 | B2 | 7/2012 | Heinz et al. |
| 8,223,741 | B1 | 7/2012 | Bartlett et al. |
| 8,224,382 | B2 | 7/2012 | Bultman |
| 8,224,773 | B2 | 7/2012 | Spiegel |
| 8,228,818 | B2 | 7/2012 | Chase et al. |
| 8,229,394 | B2 | 7/2012 | Karlberg |
| 8,229,914 | B2 | 7/2012 | Ramer et al. |
| 8,230,061 | B2 | 7/2012 | Hassan et al. |
| 8,233,433 | B2 | 7/2012 | Kalhan |
| 8,233,883 | B2 | 7/2012 | De Froment |
| 8,233,895 | B2 | 7/2012 | Tysowski |
| 8,234,583 | B2 | 7/2012 | Sloo et al. |
| 8,238,287 | B1 | 8/2012 | Gopi et al. |
| 8,239,520 | B2 | 8/2012 | Grah |
| 8,242,959 | B2 | 8/2012 | Mia et al. |
| 8,244,241 | B2 | 8/2012 | Montemurro |
| 8,249,601 | B2 | 8/2012 | Emberson et al. |
| 8,254,880 | B2 | 8/2012 | Aaltonen et al. |
| 8,254,915 | B2 | 8/2012 | Kozisek |
| 8,255,515 | B1 | 8/2012 | Melman et al. |
| 8,255,534 | B2 | 8/2012 | Assadzadeh |
| 8,255,689 | B2 | 8/2012 | Kim et al. |
| 8,259,692 | B2 | 9/2012 | Bajko |
| 8,264,965 | B2 | 9/2012 | Dolganow et al. |
| 8,265,004 | B2 | 9/2012 | Toutonghi |
| 8,266,249 | B2 | 9/2012 | Hu |
| 8,266,681 | B2 | 9/2012 | Deshpande et al. |
| 8,270,955 | B2 | 9/2012 | Ramer et al. |
| 8,270,972 | B2 | 9/2012 | Otting et al. |
| 8,271,025 | B2 | 9/2012 | Brisebois et al. |
| 8,271,045 | B2 | 9/2012 | Parolkar et al. |
| 8,271,049 | B2 | 9/2012 | Silver et al. |
| 8,271,992 | B2 | 9/2012 | Chatley et al. |
| 8,275,415 | B2 | 9/2012 | Huslak |
| 8,275,830 | B2 | 9/2012 | Raleigh |
| 8,279,067 | B2 | 10/2012 | Berger et al. |
| 8,279,864 | B2 | 10/2012 | Wood |
| 8,280,351 | B1 | 10/2012 | Ahmed et al. |
| 8,280,354 | B2 | 10/2012 | Smith et al. |
| 8,284,740 | B2 | 10/2012 | O'Connor |
| 8,285,249 | B2 | 10/2012 | Baker et al. |
| 8,285,992 | B2 | 10/2012 | Mathur et al. |
| 8,291,238 | B2 | 10/2012 | Ginter et al. |
| 8,291,439 | B2 | 10/2012 | Jethi et al. |
| 8,296,404 | B2 | 10/2012 | McDysan et al. |
| 8,300,575 | B2 | 10/2012 | Willars |
| 8,301,513 | B1 | 10/2012 | Peng et al. |
| 8,306,518 | B1 | 11/2012 | Gailloux |
| 8,306,741 | B2 | 11/2012 | Tu |
| 8,307,067 | B2 | 11/2012 | Ryan |
| 8,307,095 | B2 | 11/2012 | Clark et al. |
| 8,310,943 | B2 | 11/2012 | Mehta et al. |
| 8,315,198 | B2 | 11/2012 | Corneille et al. |
| 8,315,593 | B2 | 11/2012 | Gallant et al. |
| 8,315,594 | B1 | 11/2012 | Mauser et al. |
| 8,315,718 | B2 | 11/2012 | Caffrey et al. |
| 8,315,999 | B2 | 11/2012 | Chatley et al. |
| 8,320,244 | B2 | 11/2012 | Muqattash et al. |
| 8,320,902 | B2 | 11/2012 | Moring et al. |
| 8,320,949 | B2 | 11/2012 | Matta |
| 8,325,638 | B2 | 12/2012 | Jin et al. |
| 8,325,906 | B2 | 12/2012 | Fullarton et al. |
| 8,326,319 | B2 | 12/2012 | Davis |
| 8,326,359 | B2 | 12/2012 | Kauffman |
| 8,326,828 | B2 | 12/2012 | Zhou et al. |
| 8,331,223 | B2 | 12/2012 | Hill et al. |
| 8,331,293 | B2 | 12/2012 | Sood |
| 8,332,375 | B2 | 12/2012 | Chatley et al. |
| 8,332,517 | B2 | 12/2012 | Russell |
| 8,335,161 | B2 | 12/2012 | Foottit et al. |
| 8,339,991 | B2 | 12/2012 | Biswas et al. |
| 8,340,625 | B1 | 12/2012 | Johnson et al. |
| 8,340,628 | B2 | 12/2012 | Taylor et al. |
| 8,340,678 | B1 | 12/2012 | Pandey |
| 8,340,718 | B2 | 12/2012 | Colonna et al. |
| 8,346,210 | B2 | 1/2013 | Balsan et al. |
| 8,346,923 | B2 | 1/2013 | Rowles et al. |
| 8,347,104 | B2 | 1/2013 | Pathiyal |

(56) References Cited

U.S. PATENT DOCUMENTS 8,347,362 B2 1/2013 Cai et al.
8,347,378 B2 1/2013 Merkin et al.
8,350,700 B2 1/2013 Fast et al.
8,351,592 B2 1/2013 Freeny, Jr. et al.
8,351,898 B2 1/2013 Raleigh
8,352,360 B2 1/2013 De Judicibus et al.
8,352,630 B2 1/2013 Hart
8,352,980 B2 1/2013 Howcroft
8,353,001 B2 1/2013 Herrod
8,355,570 B2 1/2013 Karsanbhai et al.
8,355,696 B1 1/2013 Olding et al.
8,356,336 B2 1/2013 Johnston et al.
8,358,638 B2 1/2013 Scherzer et al.
8,358,975 B2 1/2013 Bahl et al.
8,363,658 B1 1/2013 Delker et al.
8,363,799 B2 1/2013 Gruchala et al.
8,364,089 B2 1/2013 Phillips
8,364,806 B2 1/2013 Short et al.
8,369,274 B2 2/2013 Sawai
8,370,477 B2 2/2013 Short et al.
8,370,483 B2 2/2013 Choong et al.
8,374,090 B2 2/2013 Morrill et al.
8,374,592 B2 2/2013 Proctor, Jr. et al.
8,375,128 B2 2/2013 Tofighbakhsh et al.
8,375,136 B2 2/2013 Roman et al.
8,379,847 B2 2/2013 Bell et al.
8,380,247 B2 2/2013 Engstrom
8,385,199 B1 2/2013 Coward et al.
8,385,896 B2 2/2013 Proctor, Jr. et al.
8,385,964 B2 2/2013 Haney
8,385,975 B2 2/2013 Forutanpour et al.
8,386,386 B1 2/2013 Zhu
8,391,262 B2 3/2013 Maki et al.
8,391,834 B2 3/2013 Raleigh
8,392,982 B2 3/2013 Harris et al.
8,396,458 B2 3/2013 Raleigh
8,396,929 B2 3/2013 Helfman et al.
8,401,968 B1 3/2013 Schattauer et al.
8,402,165 B2 3/2013 Deu-Ngoc et al.
8,402,540 B2 3/2013 Kapoor et al.
8,406,427 B2 3/2013 Chand et al.
8,406,736 B2 3/2013 Das et al.
8,407,472 B2 3/2013 Hao et al.
8,407,763 B2 3/2013 Weller et al.
8,411,587 B2 4/2013 Curtis et al.
8,411,691 B2 4/2013 Aggarwal
8,412,798 B1 4/2013 Wang
8,413,245 B2 4/2013 Kraemer et al.
8,418,168 B2 4/2013 Tyhurst et al.
8,422,988 B1 4/2013 Keshav
8,423,016 B2 4/2013 Buckley et al.
8,429,403 B2 4/2013 Moret et al.
8,429,409 B1 4/2013 Wall et al.
8,437,734 B2 5/2013 Ray et al.
8,441,955 B2 5/2013 Wilkinson et al.
8,442,015 B2 5/2013 Behzad et al.
8,446,831 B2 5/2013 Kwan et al.
8,447,324 B2 5/2013 Shuman et al.
8,447,607 B2 5/2013 Weider et al.
8,447,980 B2 5/2013 Godfrey et al.
8,448,015 B2 5/2013 Gerhart
8,452,858 B2 5/2013 Wu et al.
8,461,958 B2 6/2013 Saenz et al.
8,463,194 B2 6/2013 Erlenback et al.
8,463,232 B2 6/2013 Tuli et al.
8,468,337 B2 6/2013 Gaur et al.
8,472,371 B1 6/2013 Bari et al.
8,477,778 B2 7/2013 Lehmann, Jr. et al.
8,483,057 B2 7/2013 Cuervo
8,483,135 B2 7/2013 Cai et al.
8,483,694 B2 7/2013 Lewis et al.
8,484,327 B2 7/2013 Werner et al.
8,484,568 B2 7/2013 Rados et al.
8,488,597 B2 7/2013 Nie et al.
8,489,110 B2 7/2013 Frank et al.
8,489,720 B1 7/2013 Morford et al.
8,494,559 B1 7/2013 Malmi
8,495,181 B2 7/2013 Venkatraman et al.
8,495,227 B2 7/2013 Kaminsky et al.
8,495,360 B2 7/2013 Falk et al.
8,495,700 B2 7/2013 Shahbazi
8,495,743 B2 7/2013 Kraemer et al.
8,499,087 B2 7/2013 Hu
RE44,412 E 8/2013 Naqvi et al.
8,500,533 B2 8/2013 Lutnick et al.
8,503,358 B2 8/2013 Hanson et al.
8,503,455 B2 8/2013 Heikens
8,504,032 B2 8/2013 Lott et al.
8,504,574 B2 8/2013 Dvorak et al.
8,504,687 B2 8/2013 Maffione et al.
8,504,690 B2 8/2013 Shah et al.
8,504,729 B2 8/2013 Pezzutti
8,505,073 B2 8/2013 Taglienti et al.
8,509,082 B2 8/2013 Heinz et al.
8,514,927 B2 8/2013 Sundararajan et al.
8,516,552 B2 8/2013 Raleigh
8,520,589 B2 8/2013 Bhatt et al.
8,520,595 B2 8/2013 Yadav et al.
8,521,110 B2 8/2013 Rofougaran
8,521,775 B1 8/2013 Poh et al.
8,522,039 B2 8/2013 Hyndman et al.
8,522,249 B2 8/2013 Beaule
8,522,337 B2 8/2013 Adusumilli et al.
8,523,547 B2 9/2013 Pekrul
8,526,329 B2 9/2013 Mahany et al.
8,526,350 B2 9/2013 Xue et al.
8,527,013 B2 9/2013 Guba et al.
8,527,410 B2 9/2013 Markki et al.
8,527,662 B2 9/2013 Biswas et al.
8,528,068 B1 9/2013 Weglein et al.
8,531,954 B2 9/2013 McNaughton et al.
8,531,995 B2 9/2013 Khan et al.
8,532,610 B2 9/2013 Manning Cassett et al.
8,533,775 B2 9/2013 Alcorn et al.
8,535,160 B2 9/2013 Lutnick et al.
8,538,394 B2 9/2013 Zimmerman et al.
8,538,402 B2 9/2013 Vidal et al.
8,538,421 B2 9/2013 Brisebois et al.
8,538,458 B2 9/2013 Haney
8,539,544 B2 9/2013 Garimella et al.
8,539,561 B2 9/2013 Gupta et al.
8,543,265 B2 9/2013 Ekhaguere et al.
8,543,814 B2 9/2013 Laitinen et al.
8,544,105 B2 9/2013 Mclean et al.
8,548,427 B2 10/2013 Chow et al.
8,548,428 B2 10/2013 Raleigh
8,549,173 B1 10/2013 Wu et al.
8,554,876 B2 10/2013 Winsor
8,559,369 B2 10/2013 Barkan
8,561,138 B2 10/2013 Rothman et al.
8,565,746 B2 10/2013 Hoffman
8,566,236 B2 10/2013 Busch
8,571,474 B2 10/2013 Chavez et al.
8,571,501 B2 10/2013 Miller et al.
8,571,598 B2 10/2013 Valavi
8,571,993 B2 10/2013 Kocher et al.
8,572,117 B2 10/2013 Rappaport
8,572,256 B2 10/2013 Babbar
8,583,499 B2 11/2013 De Judicibus et al.
8,588,240 B2 11/2013 Ramankutty et al.
8,589,541 B2 11/2013 Raleigh et al.
8,589,955 B2 11/2013 Roundtree et al.
8,594,665 B2 11/2013 Anschutz
8,595,186 B1 11/2013 Mandyam et al.
8,600,850 B2 12/2013 Zabawskyj et al.
8,600,895 B2 12/2013 Felsher
8,601,125 B2 12/2013 Huang et al.
8,605,691 B2 12/2013 Soomro et al.
8,615,507 B2 12/2013 Varadarajulu et al.
8,619,735 B2 12/2013 Montemurro et al.
8,620,257 B2 12/2013 Qiu et al.
8,621,056 B2 12/2013 Coussemaeker et al.
8,626,115 B2 1/2014 Raleigh et al.
8,630,314 B2 1/2014 York

(56) References Cited

U.S. PATENT DOCUMENTS 8,630,925 B2 1/2014 Bystrom et al.
8,631,428 B2 1/2014 Scott et al.
8,634,425 B2 1/2014 Gorti et al.
8,635,164 B2 1/2014 Rosenhaft et al.
8,639,215 B2 1/2014 McGregor et al.
8,644,702 B1 2/2014 Kalajan
8,644,813 B1 2/2014 Gailloux et al.
8,645,518 B2 2/2014 David
8,655,357 B1 2/2014 Gazzard et al.
8,656,472 B2 2/2014 McMurtry et al.
8,660,853 B2 2/2014 Robb et al.
8,666,395 B2 3/2014 Silver
8,667,542 B1 3/2014 Bertz et al.
8,670,334 B2 3/2014 Keohane et al.
8,670,752 B2 3/2014 Fan et al.
8,675,852 B2 3/2014 Maes
8,676,682 B2 3/2014 Kalliola
8,676,925 B1 3/2014 Liu et al.
8,693,323 B1 4/2014 McDysan
8,694,772 B2 4/2014 Kao et al.
8,700,729 B2 4/2014 Dua
8,701,015 B2 4/2014 Bonnat
8,705,361 B2 4/2014 Venkataraman et al.
8,706,863 B2 4/2014 Fadell
8,712,631 B2 4/2014 Tietjen et al.
8,713,535 B2 4/2014 Malhotra et al.
8,713,641 B1 4/2014 Pagan et al.
8,719,397 B2 5/2014 Levi et al.
8,719,423 B2 5/2014 Wyld
8,725,899 B2 5/2014 Short et al.
8,730,842 B2 5/2014 Collins et al.
8,731,519 B2 5/2014 Flynn et al.
8,732,808 B2 5/2014 Sewall et al.
8,739,035 B2 5/2014 Trethewey
8,744,339 B2 6/2014 Halfmann et al.
8,761,711 B2 6/2014 Grignani et al.
8,780,857 B2 7/2014 Balasubramanian et al.
8,787,249 B2 7/2014 Giaretta et al.
8,792,857 B2 7/2014 Cai et al.
8,793,304 B2 7/2014 Lu et al.
8,798,610 B2 8/2014 Prakash et al.
8,799,227 B2 8/2014 Ferguson et al.
8,799,440 B2 8/2014 Zhou et al.
8,804,517 B2 8/2014 Oerton
8,804,695 B2 8/2014 Branam
8,811,338 B2 8/2014 Jin et al.
8,811,991 B2 8/2014 Jain et al.
8,812,525 B1 8/2014 Taylor, III
8,818,394 B2 8/2014 Bienas et al.
8,819,253 B2 8/2014 Simeloff et al.
8,825,109 B2 9/2014 Montemurro et al.
8,826,411 B2 9/2014 Moen et al.
8,831,561 B2 9/2014 Sutaria et al.
8,837,322 B2 9/2014 Venkataramanan et al.
8,838,686 B2 9/2014 Getchius
8,838,752 B2 9/2014 Lor et al.
8,843,849 B2 9/2014 Neil et al.
8,845,415 B2 9/2014 Lutnick et al.
8,849,297 B2 9/2014 Balasubramanian
8,855,620 B2 10/2014 Sievers et al.
8,862,751 B2 10/2014 Faccin et al.
8,863,111 B2 10/2014 Selitser et al.
8,868,725 B2 10/2014 Samba
8,868,727 B2 10/2014 Yumerefendi et al.
8,875,042 B2 10/2014 LeJeune et al.
8,880,047 B2 11/2014 Konicek et al.
8,891,483 B2 11/2014 Connelly et al.
8,898,748 B2 11/2014 Burks et al.
8,908,516 B2 12/2014 Tzamaloukas et al.
8,929,374 B2 1/2015 Tönsing et al.
8,930,238 B2 1/2015 Coffman et al.
8,930,551 B2 1/2015 Pandya et al.
8,943,551 B2 1/2015 Ganapathy et al.
8,948,726 B2 2/2015 Smith et al.
8,949,382 B2 2/2015 Cornett et al.
8,949,597 B1 2/2015 Reeves et al.
8,955,038 B2 2/2015 Nicodemus et al.
8,966,018 B2 2/2015 Bugwadia et al.
8,971,841 B2 3/2015 Menezes et al.
8,971,912 B2 3/2015 Chou et al.
8,972,537 B2 3/2015 Bastian et al.
8,977,284 B2 3/2015 Reed
8,977,856 B2 3/2015 Malek et al.
8,983,860 B1 3/2015 Beda, III et al.
8,995,952 B1 3/2015 Baker et al.
9,002,322 B2 4/2015 Cotterill
9,002,342 B2 4/2015 Tenhunen et al.
9,014,973 B2 4/2015 Ruckart
9,015,331 B2 4/2015 Lai et al.
9,021,069 B2 4/2015 Ducrou et al.
9,026,100 B2 5/2015 Castro et al.
9,030,934 B2 5/2015 Shah et al.
9,032,427 B2 5/2015 Gallant et al.
9,042,923 B1 5/2015 Mirho
9,043,462 B2 5/2015 Badiee et al.
9,047,651 B2 6/2015 Roumeliotis et al.
9,049,010 B2 6/2015 Jueneman et al.
9,064,275 B1 6/2015 Lu et al.
9,105,031 B2 8/2015 Shen et al.
9,111,088 B2 8/2015 Ghai et al.
9,135,037 B1 9/2015 Petrescu-Prahova et al.
9,137,286 B1 9/2015 Yuan
9,137,389 B2 9/2015 Neal et al.
9,172,553 B2 10/2015 Dawes et al.
9,173,090 B2 10/2015 Tuchman et al.
9,176,913 B2 11/2015 Millet et al.
9,177,455 B2 11/2015 Remer
9,191,394 B2 11/2015 Novak et al.
9,265,003 B2 2/2016 Zhao et al.
9,277,433 B2 3/2016 Raleigh et al.
9,282,460 B2 3/2016 Souissi
9,286,469 B2 3/2016 Kraemer et al.
9,286,604 B2 3/2016 Aabye et al.
9,298,723 B1 3/2016 Vincent
9,313,708 B2 4/2016 Nam et al.
9,325,737 B2 4/2016 Gutowski et al.
9,326,173 B2 4/2016 Luft
9,344,557 B2 5/2016 Gruchala et al.
9,361,451 B2 6/2016 Oberheide et al.
9,363,285 B2 6/2016 Kitamura
9,367,680 B2 6/2016 Mahaffey et al.
9,369,959 B2 6/2016 Ruutu et al.
9,386,045 B2 7/2016 Kgil et al.
9,402,254 B2 7/2016 Kneckt et al.
9,413,546 B2 8/2016 Meier et al.
9,418,381 B2 8/2016 Ahuja et al.
9,438,642 B2 9/2016 Alberth, Jr. et al.
9,454,598 B2 9/2016 Hwang et al.
9,459,767 B2 10/2016 Cockcroft et al.
9,479,917 B1 10/2016 Gota et al.
9,501,803 B2 11/2016 Bilac et al.
9,560,108 B2 1/2017 Salkintzis
9,589,117 B2 3/2017 Ali et al.
9,609,459 B2 3/2017 Raleigh
9,634,850 B2 4/2017 Taft et al.
9,648,022 B2 5/2017 Peterka et al.
9,681,003 B1 6/2017 Kim et al.
9,712,476 B2 7/2017 Boynton et al.
10,002,332 B2 6/2018 Spong
10,057,775 B2 8/2018 Raleigh et al.
10,171,988 B2 1/2019 Raleigh et al.
10,171,990 B2 1/2019 Raleigh et al.
10,248,996 B2 4/2019 Raleigh
10,264,138 B2 4/2019 Raleigh et al.
10,285,025 B1 5/2019 Baker et al.
10,462,627 B2 10/2019 Raleigh et al.
10,492,102 B2 11/2019 Raleigh et al.
10,582,375 B2 3/2020 Raleigh
2001/0048738 A1 12/2001 Baniak et al.
2001/0053694 A1 12/2001 Igarashi et al.
2002/0013844 A1 1/2002 Garrett et al.
2002/0022472 A1 2/2002 Watler et al.
2002/0022483 A1 2/2002 Thompson et al.
2002/0049074 A1 4/2002 Eisinger et al.

(56) References Cited

U.S. PATENT DOCUMENTS

2002/0085516 A1 7/2002 Bridgelall
2002/0099848 A1 7/2002 Lee
2002/0116338 A1 8/2002 Gonthier et al.
2002/0120370 A1 8/2002 Parupudi et al.
2002/0120540 A1 8/2002 Kende et al.
2002/0131404 A1 9/2002 Mehta et al.
2002/0138599 A1 9/2002 Dilman et al.
2002/0138601 A1 9/2002 Piponius et al.
2002/0154751 A1 10/2002 Thompson et al.
2002/0161601 A1 10/2002 Nauer et al.
2002/0164983 A1 11/2002 Raviv et al.
2002/0176377 A1 11/2002 Hamilton
2002/0188732 A1 12/2002 Buckman et al.
2002/0191573 A1 12/2002 Whitehill et al.
2002/0199001 A1 12/2002 Wenocur et al.
2003/0004937 A1 1/2003 Salmenkaita et al.
2003/0005112 A1 1/2003 Krautkremer
2003/0013434 A1 1/2003 Rosenberg et al.
2003/0018524 A1 1/2003 Fishman et al.
2003/0028623 A1 2/2003 Hennessey et al.
2003/0046396 A1 3/2003 Richter et al.
2003/0050070 A1 3/2003 Mashinsky et al.
2003/0050837 A1 3/2003 Kim
2003/0084321 A1 5/2003 Tarquini et al.
2003/0088671 A1 5/2003 Klinker et al.
2003/0133408 A1 7/2003 Cheng et al.
2003/0134650 A1 7/2003 Sundar et al.
2003/0159030 A1 8/2003 Evans
2003/0161265 A1 8/2003 Cao et al.
2003/0171112 A1 9/2003 Lupper et al.
2003/0182420 A1 9/2003 Jones et al.
2003/0182435 A1 9/2003 Redlich et al.
2003/0184793 A1 10/2003 Pineau
2003/0188006 A1 10/2003 Bard
2003/0188117 A1 10/2003 Yoshino et al.
2003/0220984 A1 11/2003 Jones et al.
2003/0224781 A1 12/2003 Milford et al.
2003/0229900 A1 12/2003 Reisman
2003/0233332 A1 12/2003 Keeler et al.
2003/0236745 A1 12/2003 Hartsell et al.
2004/0019539 A1 1/2004 Raman et al.
2004/0019564 A1 1/2004 Goldthwaite et al.
2004/0021697 A1 2/2004 Beaton et al.
2004/0024756 A1 2/2004 Rickard
2004/0030705 A1 2/2004 Bowman-Amuah
2004/0039792 A1 2/2004 Nakanishi
2004/0044623 A1 3/2004 Wake et al.
2004/0047358 A1 3/2004 Chen et al.
2004/0054779 A1 3/2004 Takeshima et al.
2004/0073672 A1 4/2004 Fascenda
2004/0082346 A1 4/2004 Skytt et al.
2004/0098715 A1 5/2004 Aghera et al.
2004/0102182 A1 5/2004 Reith et al.
2004/0103193 A1 5/2004 Pandya et al.
2004/0107360 A1 6/2004 Herrmann et al.
2004/0114553 A1 6/2004 Jiang et al.
2004/0116140 A1 6/2004 Babbar et al.
2004/0127200 A1 7/2004 Shaw et al.
2004/0127208 A1 7/2004 Nair et al.
2004/0127256 A1 7/2004 Goldthwaite et al.
2004/0132427 A1 7/2004 Lee et al.
2004/0133668 A1 7/2004 Nicholas, III
2004/0137890 A1 7/2004 Kalke
2004/0165596 A1 8/2004 Garcia et al.
2004/0167958 A1 8/2004 Stewart et al.
2004/0168052 A1 8/2004 Clisham et al.
2004/0170191 A1 9/2004 Guo et al.
2004/0176104 A1 9/2004 Arcens
2004/0198331 A1 10/2004 Coward et al.
2004/0203755 A1 10/2004 Brunet et al.
2004/0203833 A1 10/2004 Rathunde et al.
2004/0225561 A1 11/2004 Hertzberg et al.
2004/0225898 A1 11/2004 Frost et al.
2004/0236547 A1 11/2004 Rappaport et al.
2004/0243680 A1 12/2004 Mayer
2004/0243992 A1 12/2004 Gustafson et al.
2004/0249918 A1 12/2004 Sunshine
2004/0255145 A1 12/2004 Chow
2004/0259534 A1 12/2004 Chaudhari et al.
2004/0260766 A1 12/2004 Barros et al.
2004/0267872 A1 12/2004 Serdy et al.
2005/0007993 A1 1/2005 Chambers et al.
2005/0009499 A1 1/2005 Koster
2005/0021995 A1 1/2005 Lal et al.
2005/0041617 A1 2/2005 Huotari et al.
2005/0048950 A1 3/2005 Morper
2005/0055291 A1 3/2005 Bevente et al.
2005/0055309 A1 3/2005 Williams et al.
2005/0055595 A1 3/2005 Frazer et al.
2005/0060266 A1 3/2005 Demello et al.
2005/0060525 A1 3/2005 Schwartz et al.
2005/0075115 A1 4/2005 Corneille et al.
2005/0079863 A1 4/2005 Macaluso
2005/0091505 A1 4/2005 Riley et al.
2005/0096024 A1 5/2005 Bicker et al.
2005/0097516 A1 5/2005 Donnelly et al.
2005/0107091 A1 5/2005 Vannithamby et al.
2005/0108075 A1 5/2005 Douglis et al.
2005/0111463 A1 5/2005 Leung et al.
2005/0128967 A1 6/2005 Scobbie
2005/0135264 A1 6/2005 Popoff et al.
2005/0163320 A1 7/2005 Brown et al.
2005/0166043 A1 7/2005 Zhang et al.
2005/0183143 A1 8/2005 Anderholm et al.
2005/0186948 A1 8/2005 Gallagher et al.
2005/0198377 A1 9/2005 Ferguson et al.
2005/0216421 A1 9/2005 Barry et al.
2005/0226178 A1 10/2005 Forand et al.
2005/0228985 A1 10/2005 Ylikoski et al.
2005/0238046 A1 10/2005 Hassan et al.
2005/0239447 A1 10/2005 Holzman et al.
2005/0245241 A1 11/2005 Durand et al.
2005/0246282 A1 11/2005 Naslund et al.
2005/0250508 A1 11/2005 Guo et al.
2005/0250536 A1 11/2005 Deng et al.
2005/0254435 A1 11/2005 Moakley et al.
2005/0266825 A1 12/2005 Clayton
2005/0266880 A1 12/2005 Gupta
2006/0014519 A1 1/2006 Marsh et al.
2006/0019632 A1 1/2006 Cunningham et al.
2006/0020787 A1 1/2006 Choyi et al.
2006/0026679 A1 2/2006 Zakas
2006/0030306 A1 2/2006 Kuhn
2006/0034256 A1 2/2006 Addagatla et al.
2006/0035631 A1 2/2006 White et al.
2006/0040642 A1 2/2006 Boris et al.
2006/0045245 A1 3/2006 Aaron et al.
2006/0048223 A1 3/2006 Lee et al.
2006/0068796 A1 3/2006 Millen et al.
2006/0072451 A1 4/2006 Ross
2006/0072550 A1 4/2006 Davis et al.
2006/0072646 A1 4/2006 Feher
2006/0075506 A1 4/2006 Sanda et al.
2006/0085543 A1 4/2006 Hrastar et al.
2006/0095517 A1 5/2006 O'Connor et al.
2006/0098627 A1 5/2006 Karaoguz et al.
2006/0099970 A1 5/2006 Morgan et al.
2006/0101507 A1 5/2006 Camenisch
2006/0112016 A1 5/2006 Ishibashi
2006/0114821 A1 6/2006 Willey et al.
2006/0114832 A1 6/2006 Hamilton et al.
2006/0126562 A1 6/2006 Liu
2006/0135144 A1 6/2006 Jothipragasam
2006/0136882 A1 6/2006 Noonan et al.
2006/0143066 A1 6/2006 Calabria
2006/0143098 A1 6/2006 Lazaridis
2006/0156398 A1 7/2006 Ross et al.
2006/0160536 A1 7/2006 Chou
2006/0165060 A1 7/2006 Dua
2006/0168128 A1 7/2006 Sistla et al.
2006/0173959 A1 8/2006 Mckelvie et al.
2006/0174035 A1 8/2006 Tufail
2006/0178917 A1 8/2006 Merriam et al.
2006/0178918 A1 8/2006 Mikurak

(56) References Cited

U.S. PATENT DOCUMENTS

2006/0182137 A1 8/2006 Zhou et al.
2006/0183462 A1 8/2006 Kolehmainen
2006/0190314 A1 8/2006 Hernandez
2006/0190987 A1 8/2006 Ohta et al.
2006/0193280 A1 8/2006 Lee et al.
2006/0199608 A1 9/2006 Dunn et al.
2006/0200663 A1 9/2006 Thornton
2006/0206709 A1 9/2006 Labrou et al.
2006/0206904 A1 9/2006 Watkins et al.
2006/0218395 A1 9/2006 Maes
2006/0233108 A1 10/2006 Krishnan
2006/0233166 A1 10/2006 Bou-Diab et al.
2006/0236095 A1 10/2006 Smith et al.
2006/0242685 A1 10/2006 Heard et al.
2006/0258341 A1 11/2006 Miller et al.
2006/0277590 A1 12/2006 Limont et al.
2006/0291419 A1 12/2006 McConnell et al.
2006/0291477 A1 12/2006 Croak et al.
2007/0005795 A1 1/2007 Gonzalez
2007/0019670 A1 1/2007 Falardeau
2007/0022289 A1 1/2007 Alt et al.
2007/0025301 A1 2/2007 Petersson et al.
2007/0033194 A1 2/2007 Srinivas et al.
2007/0033197 A1 2/2007 Scherzer et al.
2007/0036312 A1 2/2007 Cai et al.
2007/0055694 A1 3/2007 Ruge et al.
2007/0060200 A1 3/2007 Boris et al.
2007/0061243 A1 3/2007 Ramer et al.
2007/0061800 A1 3/2007 Cheng et al.
2007/0061878 A1 3/2007 Hagiu et al.
2007/0073899 A1 3/2007 Judge et al.
2007/0076616 A1 4/2007 Ngo et al.
2007/0093243 A1 4/2007 Kapadekar et al.
2007/0100981 A1 5/2007 Adamczyk et al.
2007/0101426 A1 5/2007 Lee et al.
2007/0104126 A1 5/2007 Calhoun et al.
2007/0109983 A1 5/2007 Shankar et al.
2007/0111740 A1 5/2007 Wandel
2007/0130283 A1 6/2007 Klein et al.
2007/0130315 A1 6/2007 Friend et al.
2007/0140113 A1 6/2007 Gemelos
2007/0140145 A1 6/2007 Kumar et al.
2007/0140275 A1 6/2007 Bowman et al.
2007/0143824 A1 6/2007 Shahbazi
2007/0147317 A1 6/2007 Smith et al.
2007/0147324 A1 6/2007 McGary
2007/0155365 A1 7/2007 Kim et al.
2007/0165630 A1 7/2007 Rasanen et al.
2007/0168499 A1 7/2007 Chu
2007/0171856 A1 7/2007 Bruce et al.
2007/0174490 A1 7/2007 Choi et al.
2007/0191006 A1 8/2007 Carpenter
2007/0192460 A1 8/2007 Choi et al.
2007/0198656 A1 8/2007 Mazzaferri et al.
2007/0201502 A1 8/2007 Abramson
2007/0213054 A1 9/2007 Han
2007/0220251 A1 9/2007 Rosenberg et al.
2007/0226225 A1 9/2007 Yiu et al.
2007/0226775 A1 9/2007 Andreasen et al.
2007/0234402 A1 10/2007 Khosravi et al.
2007/0243862 A1 10/2007 Coskun et al.
2007/0248100 A1 10/2007 Zuberi et al.
2007/0254646 A1 11/2007 Sokondar
2007/0254675 A1 11/2007 Zorlu Ozer et al.
2007/0255769 A1 11/2007 Agrawal et al.
2007/0255797 A1 11/2007 Dunn et al.
2007/0255848 A1 11/2007 Sewall et al.
2007/0257767 A1 11/2007 Beeson
2007/0259656 A1 11/2007 Jeong
2007/0259673 A1 11/2007 Willars et al.
2007/0263558 A1 11/2007 Salomone
2007/0265003 A1 11/2007 Kezys et al.
2007/0266422 A1 11/2007 Germano et al.
2007/0274327 A1 11/2007 Kaarela et al.
2007/0280453 A1 12/2007 Kelley
2007/0282896 A1 12/2007 Wydroug et al.
2007/0293191 A1 12/2007 Mir et al.
2007/0294395 A1 12/2007 Strub et al.
2007/0294410 A1 12/2007 Pandya et al.
2007/0297378 A1 12/2007 Poyhonen et al.
2007/0298764 A1 12/2007 Clayton
2007/0299965 A1 12/2007 Nieh et al.
2007/0300252 A1 12/2007 Acharya et al.
2008/0005285 A1 1/2008 Robinson et al.
2008/0005561 A1 1/2008 Brown et al.
2008/0010379 A1 1/2008 Zhao
2008/0010452 A1 1/2008 Holtzman et al.
2008/0018494 A1 1/2008 Waite et al.
2008/0022354 A1 1/2008 Grewal et al.
2008/0025230 A1 1/2008 Patel et al.
2008/0032715 A1 2/2008 Jia et al.
2008/0034063 A1 2/2008 Yee
2008/0034419 A1 2/2008 Mullick et al.
2008/0039102 A1 2/2008 Sewall et al.
2008/0049630 A1 2/2008 Kozisek et al.
2008/0050715 A1 2/2008 Golczewski et al.
2008/0051076 A1 2/2008 O'Shaughnessy et al.
2008/0052387 A1 2/2008 Heinz et al.
2008/0056273 A1 3/2008 Pelletier et al.
2008/0059474 A1 3/2008 Lim
2008/0059743 A1 3/2008 Bychkov et al.
2008/0060066 A1 3/2008 Wynn et al.
2008/0062900 A1 3/2008 Rao
2008/0064367 A1 3/2008 Nath et al.
2008/0066149 A1 3/2008 Lim
2008/0066150 A1 3/2008 Lim
2008/0066181 A1 3/2008 Haveson et al.
2008/0070550 A1 3/2008 Hose
2008/0077705 A1 3/2008 Li et al.
2008/0080457 A1 4/2008 Cole
2008/0081606 A1 4/2008 Cole
2008/0082643 A1 4/2008 Storrie et al.
2008/0083013 A1 4/2008 Soliman et al.
2008/0085707 A1 4/2008 Fadell
2008/0089295 A1 4/2008 Keeler et al.
2008/0089303 A1 4/2008 Wirtanen et al.
2008/0095339 A1 4/2008 Elliott et al.
2008/0096559 A1 4/2008 Phillips et al.
2008/0098062 A1 4/2008 Balia
2008/0101291 A1 5/2008 Jiang et al.
2008/0109679 A1 5/2008 Wright et al.
2008/0120129 A1 5/2008 Seubert et al.
2008/0120174 A1* 5/2008 Li ..................... G06Q 30/0601
705/14.26
2008/0120668 A1 5/2008 Yau
2008/0120688 A1 5/2008 Qiu et al.
2008/0125079 A1 5/2008 O'Neil et al.
2008/0126287 A1 5/2008 Cox et al.
2008/0127304 A1 5/2008 Ginter et al.
2008/0130534 A1 6/2008 Tomioka
2008/0130656 A1 6/2008 Kim et al.
2008/0132201 A1 6/2008 Karlberg
2008/0132268 A1 6/2008 Choi-Grogan et al.
2008/0134330 A1 6/2008 Kapoor et al.
2008/0139210 A1 6/2008 Gisby et al.
2008/0147454 A1 6/2008 Walker et al.
2008/0160958 A1 7/2008 Abichandani et al.
2008/0162637 A1 7/2008 Adamczyk et al.
2008/0162704 A1 7/2008 Poplett et al.
2008/0164304 A1 7/2008 Narasimhan et al.
2008/0166993 A1 7/2008 Gautier et al.
2008/0167027 A1 7/2008 Gautier et al.
2008/0167033 A1 7/2008 Beckers
2008/0168275 A1 7/2008 DeAtley et al.
2008/0168523 A1 7/2008 Ansari et al.
2008/0177998 A1 7/2008 Apsangi et al.
2008/0178300 A1 7/2008 Brown et al.
2008/0183812 A1 7/2008 Paul et al.
2008/0184127 A1 7/2008 Rafey et al.
2008/0189760 A1 8/2008 Rosenberg et al.
2008/0201266 A1 8/2008 Chua et al.
2008/0207167 A1 8/2008 Bugenhagen
2008/0212470 A1 9/2008 Castaneda et al.
2008/0212751 A1 9/2008 Chung

(56) References Cited

U.S. PATENT DOCUMENTS

| | | | |
|---|---|---|---|
| 2008/0219268 | A1 | 9/2008 | Dennison |
| 2008/0221951 | A1 | 9/2008 | Stanforth et al. |
| 2008/0222692 | A1 | 9/2008 | Andersson et al. |
| 2008/0225748 | A1 | 9/2008 | Khemani et al. |
| 2008/0229385 | A1 | 9/2008 | Feder et al. |
| 2008/0229388 | A1 | 9/2008 | Maes |
| 2008/0235511 | A1 | 9/2008 | O'Brien et al. |
| 2008/0240373 | A1 | 10/2008 | Wilhelm |
| 2008/0250053 | A1 | 10/2008 | Aaltonen et al. |
| 2008/0256593 | A1 | 10/2008 | Vinberg et al. |
| 2008/0259924 | A1 | 10/2008 | Gooch et al. |
| 2008/0262798 | A1 | 10/2008 | Kim et al. |
| 2008/0263348 | A1 | 10/2008 | Zaltsman et al. |
| 2008/0268813 | A1 | 10/2008 | Maes |
| 2008/0270212 | A1 | 10/2008 | Blight et al. |
| 2008/0279216 | A1 | 11/2008 | Sharif-Ahmadi et al. |
| 2008/0282319 | A1 | 11/2008 | Fontijn et al. |
| 2008/0293395 | A1 | 11/2008 | Mathews et al. |
| 2008/0298230 | A1 | 12/2008 | Luft et al. |
| 2008/0305793 | A1 | 12/2008 | Gallagher et al. |
| 2008/0311885 | A1 | 12/2008 | Dawson et al. |
| 2008/0313315 | A1 | 12/2008 | Karaoguz et al. |
| 2008/0313730 | A1 | 12/2008 | Iftimie et al. |
| 2008/0316923 | A1 | 12/2008 | Fedders et al. |
| 2008/0318547 | A1 | 12/2008 | Ballou et al. |
| 2008/0318550 | A1 | 12/2008 | DeAtley |
| 2008/0319879 | A1 | 12/2008 | Carroll et al. |
| 2008/0320497 | A1 | 12/2008 | Tarkoma et al. |
| 2009/0005000 | A1 | 1/2009 | Baker et al. |
| 2009/0005005 | A1 | 1/2009 | Forstall et al. |
| 2009/0006116 | A1 | 1/2009 | Baker et al. |
| 2009/0006200 | A1 | 1/2009 | Baker et al. |
| 2009/0006229 | A1 | 1/2009 | Sweeney et al. |
| 2009/0013157 | A1 | 1/2009 | Beaule |
| 2009/0016310 | A1 | 1/2009 | Rasal |
| 2009/0036111 | A1 | 2/2009 | Danford et al. |
| 2009/0042536 | A1 | 2/2009 | Bernard et al. |
| 2009/0044185 | A1 | 2/2009 | Krivopaltsev |
| 2009/0046707 | A1 | 2/2009 | Smires et al. |
| 2009/0046723 | A1 | 2/2009 | Rahman et al. |
| 2009/0047989 | A1 | 2/2009 | Harmon et al. |
| 2009/0048913 | A1 | 2/2009 | Shenfield et al. |
| 2009/0049156 | A1 | 2/2009 | Aronsson et al. |
| 2009/0049518 | A1 | 2/2009 | Roman et al. |
| 2009/0054030 | A1 | 2/2009 | Golds |
| 2009/0065571 | A1 | 3/2009 | Jain |
| 2009/0067372 | A1 | 3/2009 | Shah et al. |
| 2009/0068984 | A1 | 3/2009 | Burnett |
| 2009/0070379 | A1 | 3/2009 | Rappaport |
| 2009/0077622 | A1 | 3/2009 | Baum et al. |
| 2009/0079699 | A1 | 3/2009 | Sun |
| 2009/0113514 | A1 | 4/2009 | Hu |
| 2009/0125619 | A1 | 5/2009 | Antani |
| 2009/0132860 | A1 | 5/2009 | Liu et al. |
| 2009/0149154 | A1 | 6/2009 | Bhasin et al. |
| 2009/0157792 | A1 | 6/2009 | Fiatal |
| 2009/0163173 | A1 | 6/2009 | Williams |
| 2009/0170554 | A1 | 7/2009 | Want et al. |
| 2009/0172077 | A1 | 7/2009 | Roxburgh et al. |
| 2009/0180391 | A1 | 7/2009 | Petersen et al. |
| 2009/0181662 | A1 | 7/2009 | Fleischman et al. |
| 2009/0197585 | A1 | 8/2009 | Aaron |
| 2009/0197612 | A1 | 8/2009 | Kiiskinen |
| 2009/0203352 | A1 | 8/2009 | Fordon et al. |
| 2009/0217065 | A1 | 8/2009 | Araujo, Jr. |
| 2009/0217364 | A1 | 8/2009 | Salmela et al. |
| 2009/0219170 | A1 | 9/2009 | Clark et al. |
| 2009/0248883 | A1 | 10/2009 | Suryanarayana et al. |
| 2009/0254857 | A1 | 10/2009 | Romine et al. |
| 2009/0257379 | A1 | 10/2009 | Robinson et al. |
| 2009/0271514 | A1 | 10/2009 | Thomas et al. |
| 2009/0282127 | A1 | 11/2009 | Leblanc et al. |
| 2009/0286507 | A1 | 11/2009 | O'Neil et al. |
| 2009/0287921 | A1 | 11/2009 | Zhu et al. |
| 2009/0288140 | A1 | 11/2009 | Huber et al. |
| 2009/0291665 | A1 | 11/2009 | Gaskarth et al. |
| 2009/0299857 | A1 | 12/2009 | Brubaker |
| 2009/0307696 | A1 | 12/2009 | Vals et al. |
| 2009/0307746 | A1 | 12/2009 | Di et al. |
| 2009/0315735 | A1 | 12/2009 | Bhavani et al. |
| 2009/0320110 | A1 | 12/2009 | Nicolson et al. |
| 2010/0017506 | A1 | 1/2010 | Fadell |
| 2010/0020822 | A1 | 1/2010 | Zerillo et al. |
| 2010/0027469 | A1 | 2/2010 | Gurajala et al. |
| 2010/0027525 | A1 | 2/2010 | Zhu |
| 2010/0027559 | A1 | 2/2010 | Lin et al. |
| 2010/0030890 | A1 | 2/2010 | Dutta et al. |
| 2010/0041364 | A1 | 2/2010 | Lott et al. |
| 2010/0041365 | A1 | 2/2010 | Lott et al. |
| 2010/0042675 | A1 | 2/2010 | Fujii |
| 2010/0043068 | A1 | 2/2010 | Varadhan et al. |
| 2010/0069074 | A1 | 3/2010 | Kodialam et al. |
| 2010/0071053 | A1 | 3/2010 | Ansari et al. |
| 2010/0075666 | A1 | 3/2010 | Garner |
| 2010/0077035 | A1 | 3/2010 | Li et al. |
| 2010/0080202 | A1 | 4/2010 | Hanson |
| 2010/0082431 | A1 | 4/2010 | Ramer et al. |
| 2010/0088387 | A1 | 4/2010 | Calamera |
| 2010/0103820 | A1 | 4/2010 | Fuller et al. |
| 2010/0113020 | A1 | 5/2010 | Subramanian et al. |
| 2010/0121744 | A1 | 5/2010 | Belz et al. |
| 2010/0131584 | A1 | 5/2010 | Johnson |
| 2010/0142478 | A1 | 6/2010 | Forssell et al. |
| 2010/0144310 | A1 | 6/2010 | Bedingfield |
| 2010/0151866 | A1 | 6/2010 | Karpov et al. |
| 2010/0153781 | A1 | 6/2010 | Hanna |
| 2010/0167696 | A1 | 7/2010 | Smith et al. |
| 2010/0188975 | A1 | 7/2010 | Raleigh |
| 2010/0188990 | A1 | 7/2010 | Raleigh |
| 2010/0188992 | A1 | 7/2010 | Raleigh |
| 2010/0188994 | A1 | 7/2010 | Raleigh |
| 2010/0190469 | A1 | 7/2010 | Vanderveen et al. |
| 2010/0191576 | A1 | 7/2010 | Raleigh |
| 2010/0191612 | A1 | 7/2010 | Raleigh |
| 2010/0191846 | A1 | 7/2010 | Raleigh |
| 2010/0192170 | A1 | 7/2010 | Raleigh |
| 2010/0192212 | A1 | 7/2010 | Raleigh |
| 2010/0195503 | A1 | 8/2010 | Raleigh |
| 2010/0197268 | A1 | 8/2010 | Raleigh |
| 2010/0198698 | A1 | 8/2010 | Raleigh et al. |
| 2010/0198939 | A1 | 8/2010 | Raleigh |
| 2010/0227632 | A1 | 9/2010 | Bell et al. |
| 2010/0235329 | A1 | 9/2010 | Koren et al. |
| 2010/0241544 | A1 | 9/2010 | Benson et al. |
| 2010/0248719 | A1 | 9/2010 | Scholaert |
| 2010/0284327 | A1 | 11/2010 | Miklos |
| 2010/0284388 | A1 | 11/2010 | Fantini et al. |
| 2010/0287599 | A1 | 11/2010 | He et al. |
| 2010/0311402 | A1 | 12/2010 | Srinivasan et al. |
| 2010/0318652 | A1 | 12/2010 | Samba |
| 2010/0325420 | A1 | 12/2010 | Kanekar |
| 2011/0004917 | A1 | 1/2011 | Saisa et al. |
| 2011/0013569 | A1 | 1/2011 | Scherzer et al. |
| 2011/0019574 | A1 | 1/2011 | Malomsoky et al. |
| 2011/0081881 | A1 | 4/2011 | Baker et al. |
| 2011/0082790 | A1 | 4/2011 | Baker et al. |
| 2011/0110309 | A1 | 5/2011 | Bennett |
| 2011/0126141 | A1 | 5/2011 | King et al. |
| 2011/0145920 | A1 | 6/2011 | Mahaffey et al. |
| 2011/0159818 | A1 | 6/2011 | Scherzer et al. |
| 2011/0173678 | A1 | 7/2011 | Kaippallimalil et al. |
| 2011/0177811 | A1 | 7/2011 | Heckman et al. |
| 2011/0182220 | A1 | 7/2011 | Black et al. |
| 2011/0185202 | A1 | 7/2011 | Black et al. |
| 2011/0195700 | A1 | 8/2011 | Kukuchka et al. |
| 2011/0238545 | A1 | 9/2011 | Fanaian et al. |
| 2011/0241624 | A1 | 10/2011 | Park et al. |
| 2011/0244837 | A1 | 10/2011 | Murata et al. |
| 2011/0249668 | A1 | 10/2011 | Milligan et al. |
| 2011/0252430 | A1 | 10/2011 | Chapman et al. |
| 2011/0264923 | A1 | 10/2011 | Kocher et al. |
| 2011/0277019 | A1 | 11/2011 | Pritchard, Jr. |
| 2011/0294502 | A1 | 12/2011 | Oerton |

(56) References Cited

U.S. PATENT DOCUMENTS

| | | | | |
|---|---|---|---|---|
| 2012/0011017 | A1* | 1/2012 | Wolcott | G06Q 30/0633 705/26.1 |
| 2012/0020296 | A1 | 1/2012 | Scherzer et al. | |
| 2012/0029718 | A1 | 2/2012 | Davis | |
| 2012/0101952 | A1 | 4/2012 | Raleigh et al. | |
| 2012/0108225 | A1 | 5/2012 | Luna et al. | |
| 2012/0144025 | A1 | 6/2012 | Melander et al. | |
| 2012/0155296 | A1 | 6/2012 | Kashanian | |
| 2012/0166364 | A1 | 6/2012 | Ahmad et al. | |
| 2012/0166604 | A1 | 6/2012 | Fortier et al. | |
| 2012/0196644 | A1 | 8/2012 | Scherzer et al. | |
| 2012/0238287 | A1 | 9/2012 | Scherzer | |
| 2012/0330792 | A1 | 12/2012 | Kashanian | |
| 2013/0024914 | A1 | 1/2013 | Ahmed et al. | |
| 2013/0029653 | A1 | 1/2013 | Baker et al. | |
| 2013/0030960 | A1 | 1/2013 | Kashanian | |
| 2013/0058274 | A1 | 3/2013 | Scherzer et al. | |
| 2013/0065555 | A1 | 3/2013 | Baker et al. | |
| 2013/0072177 | A1 | 3/2013 | Ross et al. | |
| 2013/0084835 | A1 | 4/2013 | Scherzer et al. | |
| 2013/0095787 | A1 | 4/2013 | Kashanian | |
| 2013/0103376 | A1 | 4/2013 | Gaddam et al. | |
| 2013/0111572 | A1 | 5/2013 | Gaddam et al. | |
| 2013/0117140 | A1 | 5/2013 | Kashanian | |
| 2013/0117382 | A1 | 5/2013 | Gaddam et al. | |
| 2013/0144789 | A1 | 6/2013 | Aaltonen et al. | |
| 2013/0149994 | A1 | 6/2013 | Gaddam et al. | |
| 2013/0183937 | A1 | 7/2013 | Neal et al. | |
| 2013/0225151 | A1 | 8/2013 | King et al. | |
| 2013/0275583 | A1 | 10/2013 | Roach et al. | |
| 2013/0326356 | A9 | 12/2013 | Zheng et al. | |
| 2014/0066101 | A1 | 3/2014 | Lyman et al. | |
| 2014/0073291 | A1 | 3/2014 | Hildner et al. | |
| 2014/0080458 | A1 | 3/2014 | Bonner et al. | |
| 2014/0241342 | A1 | 8/2014 | Constantinof | |
| 2015/0181628 | A1 | 6/2015 | Haverinen et al. | |

FOREIGN PATENT DOCUMENTS

| | | | |
|---|---|---|---|
| CN | 1345154 | A | 4/2002 |
| CN | 1508734 | A | 6/2004 |
| CN | 1538730 | A | 10/2004 |
| CN | 1567818 | A | 1/2005 |
| CN | 101035308 | A | 3/2006 |
| CN | 1801829 | A | 7/2006 |
| CN | 1802839 | A | 7/2006 |
| CN | 1889777 | A | 7/2006 |
| CN | 101155343 | B | 9/2006 |
| CN | 1867024 | A | 11/2006 |
| CN | 1878160 | A | 12/2006 |
| CN | 1937511 | A | 3/2007 |
| CN | 101123553 | A | 9/2007 |
| CN | 101080055 | A | 11/2007 |
| CN | 101115248 | A | 1/2008 |
| CN | 101127988 | A | 2/2008 |
| CN | 101183958 | A | 5/2008 |
| CN | 101335666 | A | 12/2008 |
| CN | 101341764 | A | 1/2009 |
| CN | 101815275 | A | 8/2010 |
| EP | 1098490 | A2 | 5/2001 |
| EP | 1289326 | A1 | 3/2003 |
| EP | 1463238 | | 9/2004 |
| EP | 1503548 | A1 | 2/2005 |
| EP | 1545114 | A1 | 6/2005 |
| EP | 1739518 | | 1/2007 |
| EP | 1772988 | | 4/2007 |
| EP | 1850575 | A1 | 10/2007 |
| EP | 1887732 | A1 | 2/2008 |
| EP | 1942698 | A1 | 7/2008 |
| EP | 1978772 | | 10/2008 |
| EP | 2007065 | A1 | 12/2008 |
| EP | 2026514 | A1 | 2/2009 |
| EP | 2466831 | A1 | 6/2012 |
| JP | 3148713 | B2 | 3/2001 |
| JP | 2005339247 | A | 12/2005 |
| JP | 2006041989 | | 2/2006 |
| JP | 2006155263 | A | 6/2006 |
| JP | 2006197137 | | 7/2006 |
| JP | 2006344007 | A | 12/2006 |
| JP | 2007318354 | A | 12/2007 |
| JP | 2008301121 | A | 12/2008 |
| JP | 2009111919 | | 5/2009 |
| JP | 2009212707 | A | 9/2009 |
| JP | 2009218773 | | 9/2009 |
| JP | 2009232107 | A | 10/2009 |
| KR | 20040053858 | A | 6/2004 |
| WO | 1998058505 | | 12/1998 |
| WO | 1999027723 | | 6/1999 |
| WO | 1999065185 | A3 | 5/2001 |
| WO | 0208863 | | 1/2002 |
| WO | 2002045315 | A2 | 6/2002 |
| WO | 2002067616 | A1 | 8/2002 |
| WO | 2002093877 | A1 | 11/2002 |
| WO | 2003014891 | | 2/2003 |
| WO | 2003017063 | A2 | 2/2003 |
| WO | 2003017065 | A2 | 2/2003 |
| WO | 2003058880 | A1 | 7/2003 |
| WO | 2004028070 | A1 | 4/2004 |
| WO | 2004064306 | A2 | 7/2004 |
| WO | 2004095753 | A3 | 1/2005 |
| WO | 2005008995 | | 1/2005 |
| WO | 2005053335 | A1 | 6/2005 |
| WO | 2005083934 | A1 | 9/2005 |
| WO | 2006004467 | A1 | 1/2006 |
| WO | 2006004784 | A1 | 1/2006 |
| WO | 2006012610 | A2 | 2/2006 |
| WO | 2006050758 | A1 | 5/2006 |
| WO | 2006077481 | A1 | 7/2006 |
| WO | 2006093961 | A1 | 9/2006 |
| WO | 2006120558 | | 11/2006 |
| WO | 2006130960 | A1 | 12/2006 |
| WO | 2007001833 | A2 | 1/2007 |
| WO | 2007014630 | A1 | 2/2007 |
| WO | 2007018363 | A1 | 2/2007 |
| WO | 2007053848 | A1 | 5/2007 |
| WO | 2007068288 | | 6/2007 |
| WO | 2007097786 | A | 8/2007 |
| WO | 2007107701 | A2 | 9/2007 |
| WO | 2007120310 | | 10/2007 |
| WO | 2007124279 | | 11/2007 |
| WO | 2007126352 | | 11/2007 |
| WO | 2007129180 | A2 | 11/2007 |
| WO | 2007133844 | A | 11/2007 |
| WO | 2004077797 | A3 | 2/2008 |
| WO | 2008017837 | A1 | 2/2008 |
| WO | 2008051379 | A2 | 5/2008 |
| WO | 2008066419 | A1 | 6/2008 |
| WO | 2008080139 | A1 | 7/2008 |
| WO | 2008080430 | A1 | 7/2008 |
| WO | 2008099802 | A1 | 8/2008 |
| WO | 2009008817 | A1 | 1/2009 |
| WO | 2006073837 | A3 | 4/2009 |
| WO | 2007069245 | A3 | 4/2009 |
| WO | 2009091295 | A1 | 7/2009 |
| WO | 2010088413 | A1 | 8/2010 |
| WO | 2010128391 | A2 | 11/2010 |
| WO | 2010128391 | A3 | 1/2011 |
| WO | 2011002450 | A1 | 1/2011 |
| WO | 2011149532 | A1 | 12/2011 |
| WO | 2012047275 | A | 4/2012 |

OTHER PUBLICATIONS

"Ads and movies on the run," the Gold Coast Bulletin, Southport, Qld, Jan. 29, 2008.

"ASA/PIX: Allow Split Tunneling for VPN Clients on the ASA Configuration Example," Document ID 70917, Jan. 10, 2008.

"Communication Concepts for Mobile Agent Systems," by Joachim Baumann et al.; Inst. of Parallel and Distributed High-Performance Systems, Univ. of Stuttgart, Germany, pp. 123-135, 1997.

"End to End QoS Solution for Real-time Multimedia Application;" Computer Engineering and Applications, 2007, 43 (4): 155-159, by

(56) References Cited

OTHER PUBLICATIONS

Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"Prevent iCloud Documents & Data from using your data plan," Oct. 26, 2011; CNET webarchive, by Jason Cipriani.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offlload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, "Open Secure Wireless," May 5, 2010.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description 20100428 obtained from https://www.freewarelovers.com/android/apps/droid-wall.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer—Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer—Institute for Secure Information Technology SIT; Germany WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.

(56) References Cited

OTHER PUBLICATIONS

Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life—Battery Life, That Is," May 27, 2009.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Wi-Fi Alliance Hotspot 2.0 Technical Task Group, "Wi-Fi Certified Passpoint™ (Release 1) Deployment Guidelines—Version 1.0—Oct. 2012".
Wi-Fi Alliance Technical Committee Hotspot 2.0 Technical Task Group, "Hotspot 2.0 (Release 1) Technical Specification—Version 1.0.0"; 2012.
Windows7 Power Management, published Apr. 2009.
Wireless Broadband Alliance, "WISPr 2.0, Apr. 8, 2010"; Doc. Ref. No.: WBA/RM/WISPr, Version 01.00.
Zhu et al., "A Survey of Quality of Service in IEEE 802.11 Networks," IEEE Wireless Communications, Aug. 2004.

* cited by examiner

Service
Controller
Access
Control

10412

10414

10415

10416

10470

10471

10505

10605

10600

10607

10609

10620

10625

10645

10650

10660

10670

10720

10730

10760

10770

10990

10980

1015

1140

1120

1180

1170

1190

1340

1350

1700

Filter | Policy Event Notification | Promotional Notification | LCPE Notification

| | | | | | | |
|---|---|---|---|---|---|---|
| 80% Cycle Application Plans | 80% Cycle Application Plans | x <hours or minutes> remaining – *English (UK)* | ${plan} – *English (UK)* | x <hours or mins> remaining of your (app name) plan – *English (UK)* | You have now x <hours or minutes> remaining of your (app name) access plan. – *English (UK)* | *English (UK)*<br>• "View Catalogue" → catalog<br>• "Dismiss" → no_action, Default |
| 80% Usage General Access | 80% Usage General Access | 80% Used – *English (UK)* | ${plan} – *English (UK)* | 20% of your plan remaining – *English (UK)* | You have now 20% remaining of your mobile Internet access plan. – *English (UK)* | *English (UK)*<br>• "Dismiss" → no_action, Default<br>• "View Catalogue" → catalog |
| Marketing Interceptor | Marketing Interceptor | Select a plan – *English (UK)* | Purchase access for ${app} – *English (UK)* | Select Plan to access ${app} – *English (UK)* | – *English (UK)* | *English (UK)*<br>• "Dismiss" → no_action<br>• "View Catalogue" → catalog, Default |
| Plan Expiration | Plan Expiration | Plan expired – *English (UK)* | ${plan} – *English (UK)* | Your plan has expired – *English (UK)* | Your mobile Internet access (or app name) plan has now expired. – *English (UK)* | *English (UK)*<br>• "Dismiss" → |

Figure 259:
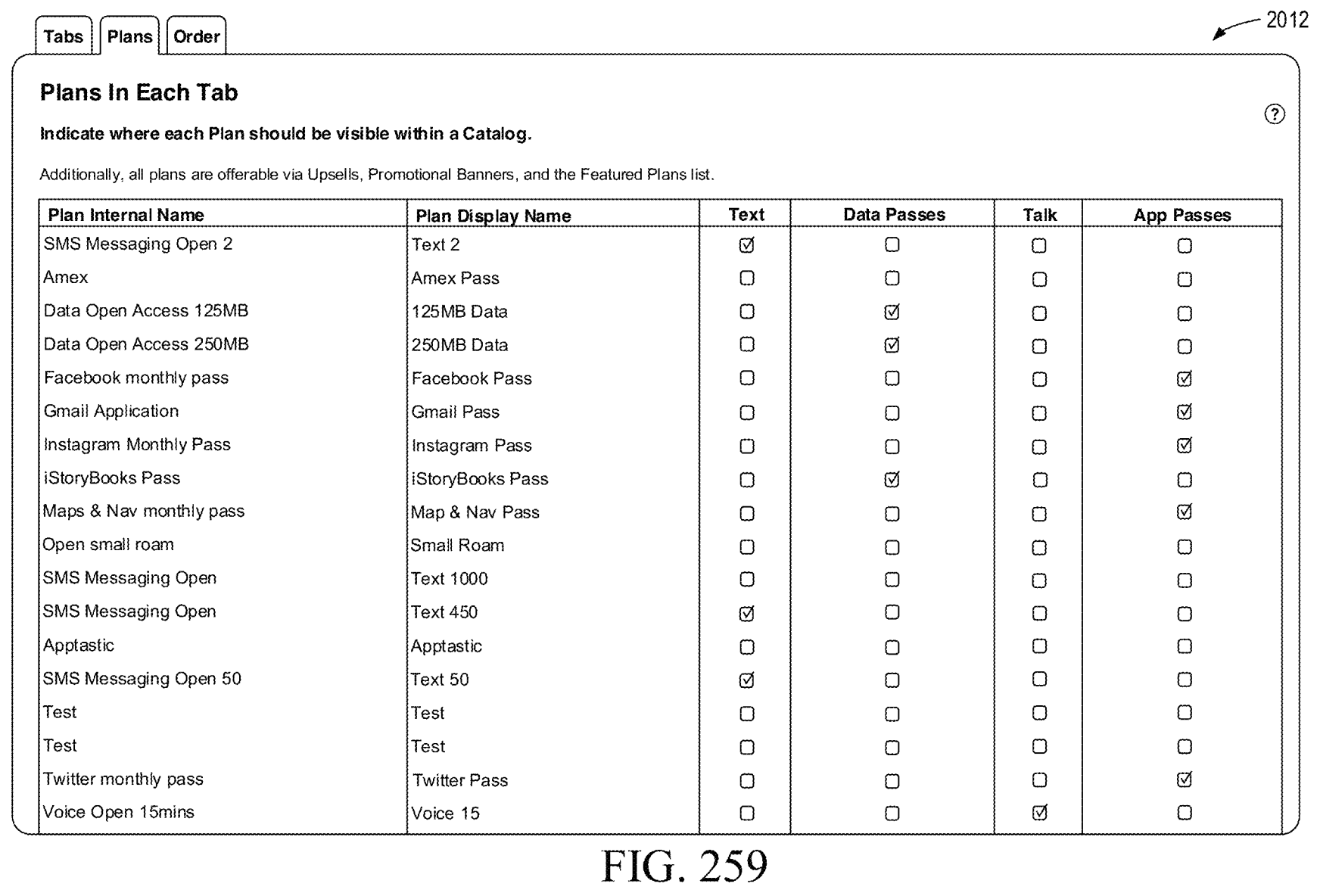

Tabs | Plans | Order

Plans In Each Tab

?

Indicate where each Plan should be visible within a Catalog.

Additionally, all plans are offerable via Upsells, Promotional Banners, and the Featured Plans list.

| Plan Internal Name | Plan Display Name | Text | Data Passes | Talk | App Passes |
|---|---|---|---|---|---|
| SMS Messaging Open 2 | Text 2 | ☑ | ☐ | ☐ | ☐ |
| Amex | Amex Pass | ☐ | ☐ | ☐ | ☐ |
| Data Open Access 125MB | 125MB Data | ☐ | ☑ | ☐ | ☐ |
| Data Open Access 250MB | 250MB Data | ☐ | ☑ | ☐ | ☐ |
| Facebook monthly pass | Facebook Pass | ☐ | ☐ | ☐ | ☑ |
| Gmail Application | Gmail Pass | ☐ | ☐ | ☐ | ☑ |
| Instagram Monthly Pass | Instagram Pass | ☐ | ☐ | ☐ | ☑ |
| iStoryBooks Pass | iStoryBooks Pass | ☐ | ☑ | ☐ | ☐ |
| Maps & Nav monthly pass | Map & Nav Pass | ☐ | ☐ | ☐ | ☑ |
| Open small roam | Small Roam | ☐ | ☐ | ☐ | ☐ |
| SMS Messaging Open | Text 1000 | ☐ | ☐ | ☐ | ☐ |
| SMS Messaging Open | Text 450 | ☑ | ☐ | ☐ | ☐ |
| Apptastic | Apptastic | ☐ | ☐ | ☐ | ☐ |
| SMS Messaging Open 50 | Text 50 | ☑ | ☐ | ☐ | ☐ |
| Test | Test | ☐ | ☐ | ☐ | ☐ |
| Test | Test | ☐ | ☐ | ☐ | ☐ |
| Twitter monthly pass | Twitter Pass | ☐ | ☐ | ☐ | ☑ |
| Voice Open 15mins | Voice 15 | ☐ | ☐ | ☑ | ☐ |

Filter | Policy Event Notification | Promotional Notification | LCPE Notification

Promotion Templates

New

| Name ▲ | Description | Title | Subtitle | Short Text | Long Text | Buttons |
|---|---|---|---|---|---|---|
| x80% of Fair Usage - Time | 80% of Fair Usage - Time | Usage Notification – *English (US)* | For ${plan} – *English (US)* | Usage Notification – *English (US)* | Hope you are enjoying your plan. You have used 80% of your ${plan} plan allowance and are approaching your fair use data limit. – *English (US)* | *English (US)*<br>• "Cancel" → NO_ACTION, Default<br>*English (UK)*<br>*Italian*<br>*Spanish* |
| x80% of Plan Usage - Data | 80% of Plan Usage - Data | Usage Notification – *English (US)* | For ${plan} – *English (US)* | Usage Notification – *English (US)* | Hope you are enjoying your plan. You have used 80% of your ${plan} plan allowance. – *English (US)* | *English (US)*<br>• "Cancel" → NO_ACTION, Default<br>*English (UK)*<br>*Italian*<br>*Spanish* |
| xCap Match - Usage in other plans | Cap Match - Usage in other plans | Usage Notification – *English (US)* | Your plan has run out – *English (US)* | Usage Notification – *English (US)* | You have used up all of your allowance for ${capPlan} plan. Further usage will count against your ${plan} plan. – *English (US)* | *English (US)*<br>• "Cancel" → NO_ACTION, Default<br>*English (UK)*<br>*Italian*<br>*Spanish* |
| xCap No Match - One Time | Cap No Match - One Time | Your plan has run out – *English (US)* | Buy more now – *English (US)* | Your plan has run out – *English (US)* | You have used up all of your ${plan} plan, please buy another plan from the list below or tap on Store. – *English (US)* | *English (US)*<br>• "Cancel" → NO_ACTION<br>• "Go to Store" → VIEW_ONE_TIME_PLANS, Default<br>*English (UK)*<br>*Italian*<br>*Spanish* |
| xCap No Match - Recurring | Cap No Match - Recurring | Your plan has run out – *English (US)* | Buy more now – *English (US)* | Your plan has run out – *English (US)* | You have used up all of your ${plan} plan, please buy another plan from the list below or tap on Store. – *English (US)* | *English (US)*<br>• "Cancel" → NO_ACTION<br>• "Go to Store" → VIEW_RECURRING_PLANS, |

FIG. 282

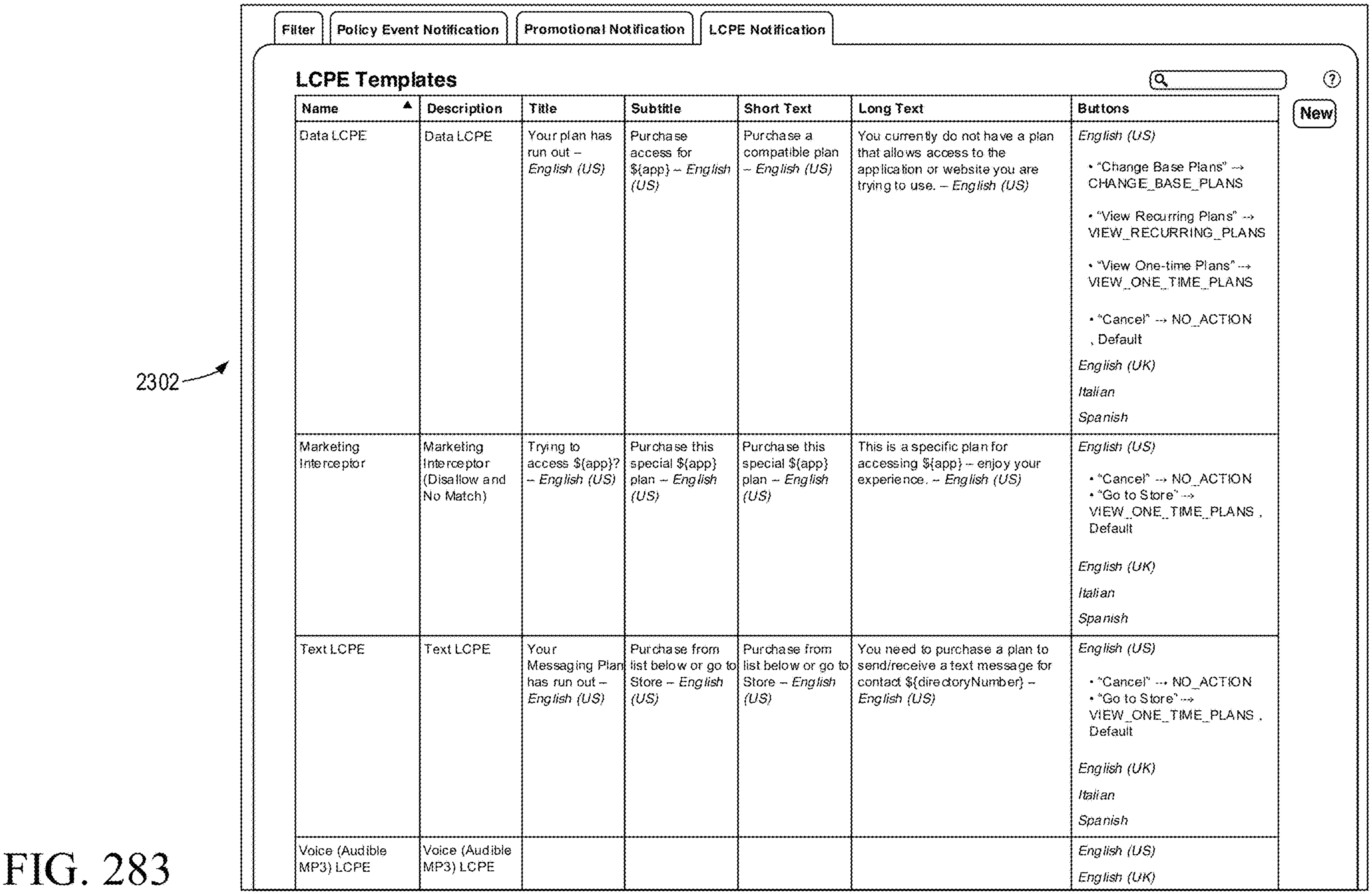

| Name | Description | Title | Subtitle | Short Text | Long Text | Buttons |
|---|---|---|---|---|---|---|
| Data LCPE | Data LCPE | Your plan has run out – *English (US)* | Purchase access for ${app} – *English (US)* | Purchase a compatible plan – *English (US)* | You currently do not have a plan that allows access to the application or website you are trying to use. – *English (US)* | *English (US)*<br>• "Change Base Plans" → CHANGE_BASE_PLANS<br>• "View Recurring Plans" → VIEW_RECURRING_PLANS<br>• "View One-time Plans" → VIEW_ONE_TIME_PLANS<br>• "Cancel" → NO_ACTION , Default<br>*English (UK)*<br>*Italian*<br>*Spanish* |
| Marketing Interceptor | Marketing Interceptor (Disallow and No Match) | Trying to access ${app}? – *English (US)* | Purchase this special ${app} plan – *English (US)* | Purchase this special ${app} plan – *English (US)* | This is a specific plan for accessing ${app} – enjoy your experience. – *English (US)* | *English (US)*<br>• "Cancel" → NO_ACTION<br>• "Go to Store" → VIEW_ONE_TIME_PLANS , Default<br>*English (UK)*<br>*Italian*<br>*Spanish* |
| Text LCPE | Text LCPE | Your Messaging Plan has run out – *English (US)* | Purchase from list below or go to Store – *English (US)* | Purchase from list below or go to Store – *English (US)* | You need to purchase a plan to send/receive a text message for contact ${directoryNumber} – *English (US)* | *English (US)*<br>• "Cancel" → NO_ACTION<br>• "Go to Store" → VIEW_ONE_TIME_PLANS , Default<br>*English (UK)*<br>*Italian*<br>*Spanish* |
| Voice (Audible MP3) LCPE | Voice (Audible MP3) LCPE | | | | | *English (US)*<br>*English (UK)* |

Subscribers

| ID | Phone Number | Nickname |
|---|---|---|
| 234106556078494 | 6505551000 | John Nexus |
| 234159098003344 | 6505551001 | Mary |
| 234159106251118 | 6505551002 | Main |
| 310120001045032 | 6505551003 | Test Galaxy Nexus |
| 310120001045842 | 6505551004 | Demo 1 |
| 310260487755746 | 6505551005 | Bill |
| 310260587852855 | 6505551006 | Demo 2 |
| 3101206502186458 | 6505551007 | Lab Test 1 |
| 3101206502745999 | 6505551008 | Marketing Loaner |
| 3101206502746005 | 6505551009 | Jeff Nexus 4G |
| 3101206502746013 | 6505551010 | Lab Text 2 |
| 3101206502746023 | 6505551011 | John Nexus 4G |

| **Example Service Processor Heartbeat Parameter Embodiment** | **Description** | **Frequency** |
|---|---|---|
| Access control integrity report | Contains the latest results of the Access Control Integrity agents Service Processor system checks and reports any error events. | Not necessary to report in every heartbeat if there are no errors. Can report only on error, set a minimum frequency, or respond to Service Controller polling. |
| Service monitor report | Reports filtered summary of Service Monitor Agent measurements. Summary reduces control traffic and filters out unauthorized private information. | Every heartbeat. Some embodiments link this to amount of data usage in the data path to keep overhead low. Report immediately upon polling from Service Controller. |
| Billing event report | Reports any billing activity since the last heartbeat. Billing events may include service usage events, transaction events, bill by account records, bill by account offset reports, or any other event that results in a billing event report. | Send upon billing event. Report immediately upon polling from Service Controller. |
| Service Processor settings report | Reports service policy settings for all Service Processor agents. | Not necessary to send every heartbeat. Some embodiments link this to amount of data usage to reduce overhead. Can report every N heartbeats. Report immediately upon polling from Service Controller. |
| Customer resource management report | Reports filtered summary of Service Monitor Agent measurements or filtered summary of other device or user activity such as service preferences, advertisement behavior, and location. Summary reduces control traffic and filters out unauthorized private information. | Not necessary to send every heartbeat. Some embodiments link this to amount of data usage to reduce overhead. Can report every N heartbeats. Report immediately upon polling from Service Controller. |
| Responses to Service Processor agent queries | Sends agent responses to challenge-response queries from the Service Controller. | Report immediately upon polling from Service Controller. |

FIG. 340A

| Example Service Processor Heartbeat Parameter Embodiment | Description | Frequency |
|---|---|---|
| Location tracking service update | Reports filtered summary of location tracking information. Summary reduces control traffic and filters out unauthorized private information. | Not necessary to send every heartbeat. Some embodiments call for a minimum time based transmission frequency. |
| Service usage based transmission frequency | Lowers overhead by buffering and reserving heartbeat communications from agents and serveres until a certain amount of data has been transmitted or received in the network, or a certain amount of service has been consumed. When the parameters are chosen properly, this can result in the network control plane traffic overhead being a small percentage of data path traffic or result in the control plane traffic cost being a small percentage of the service usage cost. | Ranges depending on settings. For example, if there are five agent messages that typically need to be communicated, and each message is less than 100 bytes, and Service Processor heartbeat framing plus network overhead would result in a packet size of less than 1,000 bytes, and the heartbeat packet is transmitted when 10,000,000 bytes have been communicated over the data path, then the overhead loss due to one heartbeat packet in each direction is less than 0.02% |
| Constant frequency transmissions | Since the device may be offline for long periods of time where the Service Control Processor needs to verify service control integrity, in some embodiments it can be advantageous to transmit heartbeat packets at a minimum rate regardless of data traffic activity. This is accomplished by setting a timer that sends queued heartbeat packets on a regular schedule. | Ranges depending on settings and applications. |
| Service Controller polled transmissions | In some embodiments, the Service Controller may poll the Service Processor for a heartbeat transmission at which time the Service Processor will frame and transmit all queued heartbeat messages. | Ranges depending on applications. In some embodiments, this is used as an on demand function, while in others it is used as a way to set heartbeat transmission timing functions in the Service Controller. |
| Service Processor polled transmissions | In some embodiments, the Service Processor polls the Service Controller for a heartbeat transmission at which time the Service Controller will frame and transmit all queued heartbeat messages. | Ranges depending on applications. In some embodiments, this is used as an on demand function, while in others it is used as a way to set heartbeat transmission timing functions in the Service Processor. |

FIG. 340B

| Example Service Processor Heartbeat Parameter Embodiment | Description | Frequency |
|---|---|---|
| Agent self-check reports | Agent reports results of various agent self-diagnosis procedures to ensure that the agent is properly configured, operating properly, properly implementing service control policy, or has not been tampered with. [provide examples which are extensions of typical software security self diagnosis reporting] | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Environment reports | One or more agents scan the storage or execution environment for one or more of the agents to identify potential threats to the integrity of the service implementation or agent integrity and makes a report. In one example embodiment, a scan is done to determine if unauthorized software or hardware is executing in a secure agent environment. In another embodiment, a scan is done to determine the software that has been loaded into a portion of the device operating environment, memory, or storage, and the software list is referenced against a known threat list. In another example embodiment, the list of entities that accessed one or more agents is scanned to determine if an unauthorized access to an agent has occurred. In another embodiment, a scan is performed to determine if unauthorized access to secure execution environment, memory, or storage has occurred. In another example embodiment, the network access pattern for the device is logged and analyzed to determine if there is an access pattern that is known to be associated with a threat to service or agent control integrity. In another example embodiment, the internal device software, memory, or peripheral access pattern is logged and analyzed to determine if there is an access pattern that is known to be associated with a threat to service or agent control integrity. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |

FIG. 340C

| Example Service Processor Heartbeat Parameter Embodiment | Description | Frequency |
|---|---|---|
| User notification response reports | Billing agent, UI agent, or other agent logs user notification events and the response of the user to the notification event. In some embodiments, these events may be cross-referenced to the notification policy that should be in force on the device and the device service usage to ensure that the proper notification sequences are being adhered to. In other embodiments, the user notification responses are logged and used to document user choices to notification events, billing event decisions, service control decisions, or service cost control decisions. In some embodiments, the user may be asked to provide a password, biometric signature, hardware key, or other mechanism to positively identify that the user is in possession of the device or to verify that the service is operating properly or is implemented properly. In some embodiments, the user may be asked to acknowledge a service overage notification and/or to also provide a password, biometric signature, hardware key, or other mechanism to verify the service overage acknowledgement. | In some embodiments, a report is made during every heartbeat transmission. In other embodiments, the report is generated by a request from the Service Controller. In other embodiments, the report is generated by timing determined by the device, for example, when there has been a user notification sequence action with the user. In some embodiments, the report is generated when there is a verification error of some kind that is identified. |
| User warning response reports | Billing agent, UI agent, or another agent logs user warning events and the response of the user to warning event. In some embodiments, the user response is used to determine if the user is in positive control of the device. In some embodiments, the response is used to confirm that the user acknowledges a billing overage or other service cost event. In some embodiments, the user may be asked to provide a password, biometric signature, hardware key, or other mechanism to positively identify that the user is in possession of the device or to verify that the service is operating properly or is implemented properly. | In some embodiments, a report is made during every heartbeat transmission. In other embodiments, the report is generated by a request from the Service Controller. In other embodiments, the report is generated by timing determined by the device, for example, when there has been a warning sequence action with the user. In some embodiments, the report is generated when there is a verification error of some kind that is identified. |

FIG. 340D

| Example Service Processor Heartbeat Parameter Embodiment | Description | Frequency |
| --- | --- | --- |
| Agent communication log reports | Reports entities that established or attempted to establish communication with the agents. In one embodiment, reports a list of entities and the number of times the entity communicated or attempted to communicate with the agent. In other embodiments, reports an error flag when unauthorized entities attempt to establish communication with an agent. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Service usage synchronization data | IPDR or other data that is used to synchronize the device service usage counters. In some embodiments, the data is time-stamped so that the service usage at the point in time may be reconciled between the local device usage count and the network-based usage count, and then the local device usage count since the point in time may be used to estimate the present real-time usage count. In some embodiments, the service usage data from the device is used by the network as the actual service usage or billing data base for the device. In other embodiments, a bill by account function is included in the service usage synchronization data so that the service usage may be billed to different accounts other than a single or main user account. | Service usage synchronization is continuous with each heartbeat in some embodiments. In other embodiments, service usage synchronization is based on a push from the Service Controller or other network function that sends the IPDR information to the device. In other embodiments, the device requests a synchronization data transmission. |
| Service cost synchronization data | Information to reconcile a service cost estimate on the local device with a service cost count from a network-based function. Similar to the service usage count, in some embodiments the service cost information is time-stamped so that service cost at a point in time may be reconciled between the device and the network-based function, and then a local measure of service cost may be used to estimate the present real-time service cost. In some embodiments, the local service cost is determined by taking recorded billing events and looking up the cumulative cost of one or more billing events using a service usage to cost look up database stored locally on the device or available from a network function. In some embodiments, service cost estimation is done entirely in the network and the result is pushed out to the device UI. In other embodiments, service cost estimation is done in the device based on local usage estimates and a local usage to cost lookup table. | Service usage synchronization is continuous with each heartbeat in some embodiments. In other embodiments, service usage synchronization is based on a push from the Service Controller or other network function that sends the IPDR information to the device. In other embodiments, the device requests a synchronization data transmission. |

FIG. 340E

| Example Service Processor Heartbeat Parameter Embodiment | Description | Frequency |
|---|---|---|
| Available network information and roaming information | Device receives available network or available roaming service provider information from a network function. The available network or roaming service information may include the potential network service or roaming service a device or user may choose to select, or the network service or roaming service the user has already selected. In some embodiments, this information includes service cost information to aid the device or the user in determining the potential or actual costs of service usage while using the available network or roaming network. In some embodiments, the service cost information is used to help the user in selecting the available network provider or roaming service provider. In some embodiments, the available network cost information or roaming cost information is combined with a measure of expected or possible service usage to estimate how much a typical usage scenario may cost. In some embodiments, the available network information or roaming information is used to help the user estimate the present available network or roaming service charges for services used to date. In some embodiments, service usage is recorded and sent to a network function that estimates the current service cost. In other embodiments, the service cost is estimated locally on the device based on a service usage estimate and a service usage to cost look up function. In other embodiments, the service cost is derived by querying the available network or roaming network billing system. | In some embodiments, available network information or roaming information is requested by the device. In other embodiments, the information is periodically updated by the Service Controller or other network function that contains the information. |

FIG. 340F

| Example Service Processor Heartbeat Parameter Embodiment | Description | Frequency |
|---|---|---|
| System messages and responses | In some embodiments, the heartbeat function may be used as a secure control channel to display a system message or screen that is generated by a network function or server to the end user and possibly report user inputs to the UI message or screen. | System messages are generated by the Service Controller and transmitted as needed in some embodiments. In other embodiments, some system messages are generated in response to user input or requests. In other embodiments, system messages are generated on a regular time table or in accordance with a certain amount of service usage. |
| UI screen messages and responses | In some embodiments, the heartbeat function may be used as a secure control channel to display a user interface message or screen that is generated by a network function or server to the end user and possibly report user inputs to the UI message or screen. Examples include service usage UI, service choice UI, upgrade UI, transaction UI, marketing UI, billing UI, user identity confirmation UI, user service warning UI, user potential service tamper response request UI, etc. | UI screen messages are generated by the Service Controller and transmitted as needed in some embodiments. In other embodiments, some user UI messages are generated in response to user input or requests. In other embodiments, UI messages are generated on a regular time table or in accordance with a certain amount of service usage. |
| Local agent check-in history | Logs and reports agent check-ins or self-reports that are made to a local agent integrity verification function. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Software install report | Logs and reports one or more aspects of software installs that have occurred on the device. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. In some embodiments, the report is generated when new software is installed. |

FIG. 340G

| Example Service Processor Heartbeat Parameter Embodiment | Description | Frequency |
| --- | --- | --- |
| Test billing event | In some embodiments, the Service Controller or other network function may send or cause a test billing event wherein the device triggers a local billing sequence for the purpose of verifying that the billing sequence is properly logged, conducted, and reported. The billing sequence can be related to a service usage event or sequence, a transaction event or sequence, or any other event or sequence that should result in a billing event. | In some embodiments, the test billing event timing is determined by the Service Controller or other network function. In others it is generated by the device or on a regular schedule. |
| Test service event | In some embodiments, the Service Controller or other network function may send or cause a service usage event wherein the device triggers a local service usage event or sequence for the purpose of verifying that the service usage event or sequence in properly logged and reported. | In some embodiments, the test service usage event timing is determined by the Service Controller or other network function. In others it is generated by the device or on a regular schedule. |

FIG. 340H

| Service Policy Implementation Verification Technique Embodiments | Example Error Trigger Criteria Embodiments | Example Error Response Embodiments |
|---|---|---|
| Verify service usage measure in network is consistent with expected service behavior. | Network service usage measure is in conflict with expected service usage. Examples: traffic usage outside limits, address access outside limits, data rate outside limits, traffic shaping rules not being followed. | In some embodiments, the severity of the error and/or the persistence of the error and/or the existence of the other errors are used to determine the appropriate response or action. In some embodiments, reset service policies and see if errors persist. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device-based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service inspection process, or usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify service usage measure at device is consistent with expected service behavior. | Device service usage measure is in conflict with expected service usage. Examples: traffic usage too high, address access outside limits, email accessed against policy. | Same as above. |

FIG. 341A

| **Service Policy Implementation Verification Technique Embodiments** | **Example Error Trigger Criteria Embodiments** | **Example Error Response Embodiments** |
|---|---|---|
| Verify service usage measure at device is consistent with expected service behavior. | Device service usage measure is in conflict with expected service usage. Examples: traffic usage too high, address access outside limits, email accessed against policy. | Same as above. |
| Verify service usage measure in network is consistent with service usage measure at device. | Device service usage measure varies significantly from network service usage measure. | Same as above. |
| Verify service usage measure at one point in device is consistent with service usage measure at a second point in device. | Service usage measure at one point in device stack that is inconsistent with another point indicates error or potential parasitic usage. | Same as above. In some embodiments, the differences in service measures on the device may be used to evaluate the nature of the service usage policy implementation problem. |
| Verify that service policies in effect are as intended. | Service policy setting queries result in settings that are different than intended. | In some embodiments, reset service policies and see if error persists. If this does not clear the error, or if this is not the error correction method employed, then perform one or more of the following actions: In some embodiments, perform agent query/response to determine agent integrity. In some embodiments, run dynamic agent load, in some cases with different encryption, sequencing, or obfuscation for the new agent code to refresh one or more agents. In some embodiments, a user query or warning is sent to the UI to notify the user, confirm that the device is in the user's possession, or involve the user in the process of determining the source or error or to assist in verifying the device-based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In *(cont. on FIG. 341C)* |

FIG. 341B

| Service Policy Implementation Verification Technique Embodiments | Example Error Trigger Criteria Embodiments | Example Error Response Embodiments |
|---|---|---|
| | | some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify presence of Service Processor agents | Agent does not respond to agent communication or query-response | In some embodiments, run dynamic agent load, in some cases with different encryption, sequencing or obfuscation for the new agent code to refresh one or more agents. If this does not clear the error, or if this is not the error correction method employed, then perform one or more of the following actions:<br>In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify configuration of Service Processor agents | Agent configuration audit or configuration self check fails. | In some embodiments, run dynamic agent load, in some cases with different encryption, sequencing *(cont. on FIG. 341D)* |

FIG. 341C

| Service Policy Implementation Verification Technique Embodiments | Example Error Trigger Criteria Embodiments | Example Error Response Embodiments |
|---|---|---|
| | | or obfuscation for the new agent code to refresh one or more agents. If this does not clear the error, or if this is not the error correction method employed, then perform one or more of the following actions:<br>In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments , the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify billing events are reported or are reported properly | Billing Agent query reveals logged billing events that have not been reported. | In some embodiments, perform a billing event test to determine if the billing event reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>*(cont. on FIG. 341E)* |

FIG. 341D

| Service Policy Implementation Verification Technique Embodiments | Example Error Trigger Criteria Embodiments | Example Error Response Embodiments |
| --- | --- | --- |
| | | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify network reported service usage measure are consistent with reported device billing data. | Billing agent is not properly reporting billing events for service usage, transactions, bill by account, or other billing event functions. | In some embodiments, perform a service usage test to determine if the service usage reporting sequence is operating properly. In some embodiments, run dynamic agent load, in some cases with different encryption, sequencing or obfuscation for the new agent code to refresh one or more agents.<br>If this does not clear the error, or if these are not the error correction methods employed , then perform one or more of the following actions:<br>In some embodiments the severity of the error and/or the persistence of the error and/or the existence of other errors are used to determine the appropriate response or action. In some embodiments, reset service policies and see if error persists. In some embodiments, perform agent<br>*(cont. on FIG. 341F)* |

FIG. 341E

| Service Policy Implementation Verification Technique Embodiments | Example Error Trigger Criteria Embodiments | Example Error Response Embodiments |
| --- | --- | --- |
| | | settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system , such as email or text messaging, as an alternative to or in addition to a message sent to the device. In some embodiments, an error message is sent to a human interface in the network for further error analysis. |
| Verify network reported service usage measure are consistent with reported device billing data. | Billing agent reports are inconsistent with service usage reports. | In some embodiments, perform a billing event test to determine if the billing event reporting sequence is operating properly. In some embodiments, run dynamic agent load, in some cases with different encryption, sequencing or obfuscation for the new agent code to refresh one or more agents. In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the *(cont. on FIG. 341G)* |

FIG. 341F

| Service Policy Implementation Verification Technique Embodiments | Example Error Trigger Criteria Embodiments | Example Error Response Embodiments |
| --- | --- | --- |
| | | device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Send test billing event through device and verify it is reported. | Test billing event is not properly reported by the device. | In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device *(cont. on FIG. 341H)* |

FIG. 341G

| Service Policy Implementation Verification Technique Embodiments | Example Error Trigger Criteria Embodiments | Example Error Response Embodiments |
|---|---|---|
| | | is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify device reports billing events reported from transaction servers. | Transaction server receipts do not correspond with billing events from device. | In some embodiments, perform checks to determine if transaction server receipts are valid. In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended , possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 341H

| Service Policy Implementation Verification Technique Embodiments | Example Error Trigger Criteria Embodiments | Example Error Response Embodiments |
|---|---|---|
| Verify activation tracking system presence, configuration or operation | Activation tracking service is not present, is not providing scheduled network activity reporting, or is exhibiting erroneous reports. | In some embodiments the response is to place the device ID. on a list of devices suspected of having activation tracking functions that have been tampered with for the purpose of central provider billing reconciliation. In some embodiments, install a new copy of the activation tracking service agent software either from a locally stored device copy or a network download. In some embodiments where authorization exists to manage device software and some aspects of service tracking, run further checks on device service integrity such as agent query-response. In some embodiments where authorization exists to manage a device access service connection, send error message to device UI, suspend device or place device on quarantine route. In some embodiments send error message to human interface for troubleshooting. |
| Verify device standing or service plan standing | No service plan on record or device not authorized | In some embodiments, if device is not yet activated with a service plan, provide UI with activation sequence. In some embodiments, if device is not authorized for service on one of the networks controlled by the Service Controller, send the UI an error message instructing the user how to proceed. In some embodiments, configure the Service Processor for the ambient service intended for that device. In some embodiments, download the appropriate Service Processor agent software that is appropriate for that device. |
| Verify proper operation of Service Processor agents | Check input to output relationship on Policy Implementation agent, Firewall agent. Check billing event reports to verify events are being recorded. Check application and traffic inspection tagging system correctly tagging traffic. Verify Service Processor heartbeat reports proper agent integrity self-checks, cross-checks and query/ response sequences with Service Controller. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service *(cont. on FIG. 341J)* |

FIG. 341I

| Service Policy Implementation Verification Technique Embodiments | Example Error Trigger Criteria Embodiments | Example Error Response Embodiments |
|---|---|---|
| | | behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Service Processor heartbeat response reports | One or more of the heartbeat reports indicate an error in operation, configuration, or tamper and error prevention system. Heartbeat function not functioning properly but device is still indicating service usage on the network. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession , or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments , perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such *(cont. on FIG. 341K)* |

FIG. 341J

| Service Policy Implementation Verification Technique Embodiments | Example Error Trigger Criteria Embodiments | Example Error Response Embodiments |
|---|---|---|
| | | as email or text messaging, as an alternative to or in addition to a message sent to the device. In some embodiments, an error message is sent to a human interface in the network for further error analysis. |
| Test service event | Service usage reporting system does not properly report test service usage event | In some embodiments, run dynamic agent load, in some cases with different encryption, sequencing or obfuscation for the new agent code to refresh one or more agents. If this does not clear the error, or if this is not the error correction method employed, then perform one or more of the following actions: In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing test event to determine if the device is properly reporting billing events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Load a fresh version of Service Processor software and perform integrity reports | After fresh load of Access Control Integrity Agent, agent discovers one or more of the other agents are corrupted | Run dynamic agent load, in some cases with different encryption, sequencing or obfuscation for the new agent code to refresh other agents and see if problem persists. If this does not clear the error, or if this is not the error correction method employed, then perform one or more of the following actions: *(cont. on FIG. 341L)* |

FIG. 341K

| Service Policy Implementation Verification Technique Embodiments | Example Error Trigger Criteria Embodiments | Example Error Response Embodiments |
| --- | --- | --- |
| | | In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify Service Processor code configuration with agent self diagnosis checks | One or more of the agents indicates an error after running a self-check | Run dynamic agent load, in some cases with different encryption, sequencing or obfuscation for the new agent code to refresh other agents and see if problem persists. If this does not clear the error, or if this is not the error correction method employed, then perform one or more of the following actions: In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service *(cont. on FIG. 341M)* |

FIG. 341L

| Service Policy Implementation Verification Technique Embodiments | Example Error Trigger Criteria Embodiments | Example Error Response Embodiments |
| --- | --- | --- |
| | | usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify that device uses service only after being authorized | Device gains access to the network and does not check in with the Access Control Integrity Server and service measures indicate device is on the network. | In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments , an error message is sent to a human interface in the network for further error analysis. |

FIG. 341M

| Service Policy Implementation Verification Technique Embodiments | Example Error Trigger Criteria Embodiments | Example Error Response Embodiments |
|---|---|---|
| Verify user standing | User does not respond with proper response to UI query such as request for ID. , password or biometric input. This process may be part of handling a suspected error. | In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments , an error message is sent to a human interface in the network for further error analysis. In some embodiments, the user may be asked to acknowledge a service overage notification and/or to also provide a password, biometric signature, hardware key or other mechanism to verify the service overage acknowledgment. |
| Agent communications log | Unauthorized communications with one or more agents is detected | In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 341N

| Service Policy Implementation Tamper or Error Protection Techniques | Example Error Trigger Critera | Example Error Responses |
|---|---|---|
| Detect or block device networking activity that is potentially harmful for the operation of Service Processor. | Network activity is observed in service monitor reports that fit known patterns that indicated harmful software may be present on device. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Detect or block unauthorized Service Processor software from being loaded. | Access Control Integrity Agent discovers software that is on a known malicious list. | Same as above. |
| Detect or block unauthorized access of protected Service Processor software or hardware memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code . In some embodiments send message to UI and either suspend device, place on SPAN, place on watch list, place on further action list or place on quarantine network. In some embodiments send error message to human interface for troubleshooting. |
| Detect or block unauthorized communication with Service Processor software or hardware. | Unauthorized communication is detected. | Same as above. |
| Secure loader with signed SW installed into protected memory | Unauthorized access is detected, memory contents are corrupted or unresponsive. | Same as above. |
| Secure encrypted communication between Service Processor agents. | Secure communication link is in error or unauthorized access is detected. | Identify the entity that has gained access to the Service Processor if possible and eradicate. In some embodiments repair any compromised agents with dynamic agent load, in some cases with different encryption, sequencing or obfuscation for the new agent code. In some embodiments, run dynamic agent load, in some cases with different encryption, sequencing or obfuscation for the new agent code to refresh agents with communication links that are in error or entire Service Processor. In some embodiments send message to UI and either suspend device, place on SPAN, place on watch list, place on further action list or place on quarantine network. In some embodiments send error message to human interface for troubleshooting. |

FIG. 342A

| Service Policy Implementation Tamper or Error Protection Techniques | Example Error Trigger Critera | Example Error Responses |
|---|---|---|
| Secure encrypted communication between Service Processor and Service Controller. | Service Processor communication is lost. | Send error message to device UI (if possible), suspend device, place on SPAN, place on watch list, place on further action list or place device on quarantine route. In some embodiments send error message to human interface for troubleshooting. |
| Execution of Service Processor software within secure memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Storage of service processor software in secure memory | Secure memory violation or Service Processor stored in non-secure memory | Same as above. |
| Detection or removal of software thought to be harmful to Service Processor operation. | Unauthorized software is detected. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Recording and reporting of software loading signatures, software activity signatures or network activity signatures for later identification of threat sequences. | Unauthorized software or malicious network activity is detected | Same as above. |

FIG. 342B

| Service Policy Implementation Tamper or Error Protection Techniques | Example Error Trigger Critera | Example Error Responses |
|---|---|---|
| Implement critical Service Processor software as a self-refreshing program that resists corruption by running self-audit and reinstall processes such as placing audit function in inaccessible memory or OS functions or bios. | Re-installation function alerts that re-installation has been required. Continued re-installations or failure to re-install alert increases severity of warnings. | Identify the entity that has gained access to the Service Processor if possible and eradicate. In some embodiments send message to UI and either suspend device, place on SPAN, place on watch list, place on further action list or place on quarantine network. In some embodiments send error message to human interface for troubleshooting. |
| Encrypted agent code | Code check, agent query-response, agent self check or other agent configuration check discovers error in code encryption | In some embodiments repair any compromised agents with dynamic agent load, in some cases with different encryption , sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Obfuscated agent code | Code check, agent query-response, agent self check or other agent configuration check discovers error in code obfuscation | Same as above. |
| Unique agent identification numbers and signatures | Agent is discovered to have an incorrect ID or fails signature | Same as above. |
| Secure agent communication bus | Agent communication bus monitoring discovers unauthorized communication or other unauthorized access to one or more agents is discovered | Same as above. |

FIG. 342C

| Service Policy Implementation Tamper or Error Protection Techniques | Example Error Trigger Critera | Example Error Responses |
|---|---|---|
| Agent level message encryption | Agent is found to be communicating without the required level of agent communication encryption | Same as above. |
| Service control link message level encryption | Unauthorized communication traffic is discovered on service control link | In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Service control link transport layer encryption | Unauthorized communication traffic is discovered on service control link | Same as above. |
| Agent communication access permissions | Unauthorized communication is discovered with one or more agents | Same as above. |
| Agent communication log | Unauthorized communication is discovered with one or more agents | Same as above. |
| Encrypted agent code for downloads | Agent download is found to have incorrect or absent encryption or signature | Same as above. |
| Secure downloader memory | Unauthorized access to or storage in secure downloader memory is discovered | Same as above. |

FIG. 342D

Service Provider Selection Process (2/2)

Service Provider Activation Process (1/2)

Service Provider Activation Process (2/2)

Service Selection Process (1/2)

Service Selection Process (2/2)

Service Provider Selection Process

Service Provider Activation Process

Service Selection Process

SERVICE PLAN DESIGN, USER INTERFACES, APPLICATION PROGRAMMING INTERFACES, AND DEVICE MANAGEMENT

BACKGROUND

In recent years, mobile wireless communication devices have become popular, and many individuals, families, and organizations use or own multiple mobile wireless communication devices. As would be appreciated by a person having ordinary skill in the art, there are many kinds of mobile wireless communication devices, including, for example, smart phones, tablets, laptops, mobile phones, personal digital assistants, and many others. These mobile wireless communication devices are capable of sending and receiving wireless radio frequency signals over one or more wireless communication networks, such as cellular (e.g., 2G, 2.5G, 3G, 4G, LTE, LTE advanced, etc.) networks, local-area (e.g., Wi-Fi) networks, or other wireless communication networks.

As the computing power of mobile end-user devices (e.g., smart phones, tablets, etc.) has increased, mobile devices have become capable of sending and receiving increasing amounts of data. In addition to e-mail and text messages, many of today's mobile devices can support a variety of applications that send large quantities of information to and from end users. For example, in addition to sending e-mail and text messages, many of today's mobile devices can deliver news, weather, sports, maps, social networking information, music, videos, high-resolution photographs, documents, presentations, and other kinds of information. Furthermore, users can take advantage of applications that provide transactional services, e.g., shopping for content (books, music, videos, etc.) or applications.

The ability of mobile devices to send and receive such a wide variety and large quantity of data has stressed wireless access network bandwidth capabilities. As a result, network operators are either eliminating service plans with unlimited data usage, or they are increasing the price of unlimited service plans so that such plans are not attractive to most consumers. Consequently, many users of mobile end-user devices subscribe to service plans that include only a limited amount of data per fixed time period (e.g., per month). Because today's mobile end-user devices can access (e.g., send or receive) large amounts of information, there is a potential for a user of a mobile device to exceed his or her data plan allowance without realizing it. It is well known that such "overages" in data usage can be very expensive because the billing rate for data usage exceeding the contracted service plan amount is often significantly higher than the billing rate under the service plan. At the same time subscribers face an increasing potential for overage conditions and thus may be reticent to take advantage of wireless access network data services, network operators face declining revenues and are motivated to increase data adoption by their subscribers.

Today, users of mobile devices (e.g., cellular phones, smart phones, etc.) subscribe to a service plan in order to take advantage of various services including voice, messaging, and data services offered by wireless service providers (e.g., carriers). This application discloses novel approaches that allow users to purchase services on an as-needed, a la carte basis, thus enabling users to have customized service plans and service plan combinations. This application also discloses novel ways to present information associated with voice, messaging, and data service plans through user interfaces of mobile devices.

The increased computing power of mobile devices has led to an explosion in the number of applications that are available for mobile devices. Hundreds of thousands of applications are available for Android-based devices and for Apple-based devices, and the number of available applications continues to grow at a rapid pace. Many of these applications are available for subscribers to download or purchase through an electronic "app store" or "marketplace." A subscriber may find applications of interest to him or her by typing in a search word or phrase in a field in a search field offered by the app store or marketplace, or he or she may find an application by browsing a list offered by the app store or marketplace (e.g., popular applications). Often, however, subscriber visits to the app store are "hit and miss" unless a subscriber happens to know the name of a desired application or happens to type in a search word or phrase that results in the application being presented.

For application developers, getting subscribers to see, download, purchase, or use their applications is critical to the application developers' success because their revenues depend on purchases, downloads, and/or use of their applications. Yet because of the sheer number of applications available through marketplaces and app stores, and because of how subscribers may behave when browsing through the marketplace or app store, application developers have little control over whether a subscriber even finds their applications. This application discloses methods to improve the presentation and discovery of services, service plans, applications and content for users of mobile wireless communication devices.

SUMMARY

Disclosed herein are methods, systems, and apparatuses to enable subscribers of mobile wireless communication devices to view, research, select and customize service plans for one or more mobile wireless communication devices. Also disclosed herein are methods, systems, and apparatuses that allow subscribers to create and manage a group of two or more devices (herein referred to as a device group) without service provider involvement. After a subscriber has established a master service account, the subscriber can create a device group by associating additional mobile wireless communication devices with the established master service account that is already associated with a master mobile wireless communication device. Also disclosed are methods, systems, and apparatuses to enable subscribers to share service plans among multiple devices in the device group. Also disclosed are methods, systems, and apparatuses to enable subscribers to fully or partially assign a service plan from one mobile wireless communication device to another mobile wireless communication device in the device group. Also disclosed are methods, systems, and apparatuses to allow subscribers to monitor or manage the mobile wireless communication devices in a device group from one or more master devices in the device group. Managing includes adding, deleting, or modifying devices or properties of devices, service plans, service accounts, etc.

Disclosed herein are methods, systems, and apparatuses to design the content and presentation of service plan offers targeted to specific users and groups of users of mobile wireless communication devices. Disclosed herein are methods, systems, and apparatuses to notify users of service plans for mobile wireless communication devices and of modifications to service plans to support particular service usage. Disclosed herein are methods, systems, and apparatuses to manage sharing, assigning, and restricting use of service plans by devices within a device group. Disclosed herein are methods, systems, and apparatuses to manage sponsorship of service plans through a device management system. Disclosed herein are methods, systems, and apparatuses to manage interfaces between systems of multiple service providers and a common network management system. Disclosed herein are methods, systems, and apparatuses to display information and receive inputs to manage communication services, including service plans, device groups, and service plan customization through graphical user interfaces of mobile wireless communication devices.

Disclosed herein are methods and apparatuses for managing service user discovery and service launch object placement on a mobile device. Disclosed is a method comprising obtaining information to assist in identifying a portion of a user interface of a wireless device, the wireless device communicatively coupled to the network system over a wireless access network, determining a differentiating attribute of the identified portion of the user interface, obtaining one or more service launch objects for placement in the identified portion of the user interface, and sending configuration information to the wireless device over the wireless access network, the configuration information at least configured to assist the wireless device in placing the one or more service launch objects in the identified portion of the user interface.

Disclosed herein are methods and apparatus to facilitate promoting particular applications or services and to enable sponsorship of applications or services. Using these methods and apparatus allows network operators to encourage subscriber use of data services while simultaneously alleviating subscriber fears of overage conditions. In addition, the methods and apparatus disclosed herein allow application developers to promote or sponsor use of their applications or particular services, thus increasing their potential for success.

Disclosed herein are methods, systems, and apparatuses to design and manage communication services using application programming interfaces (APIs) for mobile wireless communication devices and for network elements communicatively connected to the mobile wireless communication devices. In some embodiments, API functionality is provided on a mobile wireless communication device, on one or more network elements, and/or partly on both mobile devices and network elements. Disclosed herein are methods, systems, and apparatuses to enable subscribers of mobile wireless communication devices to view, research, select and customize service plans for one or more mobile wireless communication devices using one or more APIs. Also disclosed herein are methods, systems, and apparatuses that allow subscribers to create and manage a group of two or more devices (herein referred to as a device group) and to share or assign service plans with difference devices in the device group using one or more APIs. Also disclosed herein are methods, systems, and apparatuses to allow subscribers to monitor and manage mobile wireless communication devices in a device group using one or more APIs. Managing includes adding, deleting, or modifying devices or properties of devices, service plans, service accounts, etc. Also disclosed herein are methods, systems, and apparatuses to enable subscribers, service providers, and third parties to manage communication services for mobile wireless communication devices in a uniform consistent manner across different devices and/or different service providers using one or more APIs. Also disclosed herein are methods, systems and apparatuses that provide for communication of control messages for device authorization, device activation, service plan selection and customization, service plan provisioning, service usage monitoring, service notifications, service control, service accounting/charging/billing, and service plan design using one or more APIs.

BRIEF DESCRIPTION OF THE DRAWINGS

FIG. 124 illustrates a representative screen providing a summary of a changes to a base service plan selected by the user of the mobile wireless communication device in accordance with some embodiments.

FIG. 125 illustrates a representative notification message presented through the user interface of the mobile wireless communication device when the user attempts to access a voice service that is not available in accordance with some embodiments.

FIG. 126 illustrates a representative notification message presented through the user interface of the mobile wireless communication device when the user receives an incoming voice call for which a service plan is not presently available in accordance with some embodiments.

FIG. 127 illustrates a representative notification message presented through the user interface of the mobile wireless communication device when the user is connected to an active voice connection and a current voice service plan is about to expire, in accordance with some embodiments.

FIG. 128 illustrates a representative notification message presented through the user interface of the mobile wireless communication device when an active voice connection is disconnected as a result of an expired service plan, in accordance with some embodiments.

FIG. 129 illustrates a representative notification message presented through the user interface of the mobile wireless communication device when the user attempts to use a text messaging service that is not accessible in accordance with some embodiments.

FIG. 130 illustrates a representative notification message presented through the user interface of the mobile wireless communication device when the user attempts to use a data access service that is not available in accordance with some embodiments.

FIG. 131 illustrates a representative notification message presented through the user interface of the mobile wireless communication device when the user attempts to access a service associated with a Facebook application that is not available in accordance with some embodiments.

FIG. 132 illustrates a representative screen providing a summary of a set of featured service plans available to the user for subscription in accordance with some embodiments.

FIG. 133 illustrates a representative screen providing a set of supplemental service plans for data access available to the user for subscription in accordance with some embodiments.

FIG. 134 illustrates a representative screen providing information on a specific service plan selected from the representative catalog of "Data Add-On" service plans shown in FIG. 133 in accordance with some embodiments.

FIG. 135 illustrates a representative screen providing a set of data service plans available to the user for subscription in accordance with some embodiments.

Figure 136:
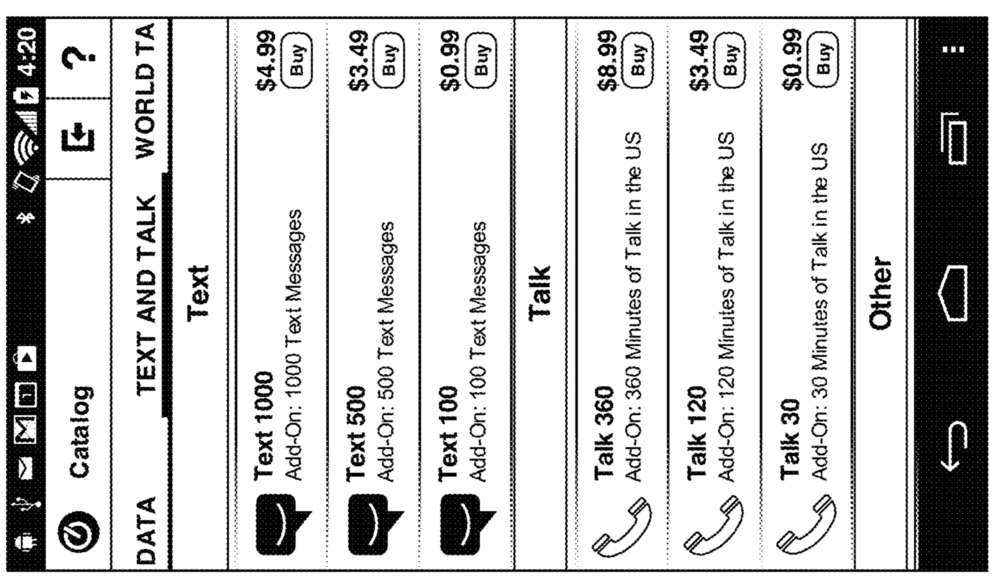

FIG. 136 illustrates a representative screen providing a set of text messaging service plans and voice service plans available to which the user for subscription in accordance with some embodiments.

Figure 137:
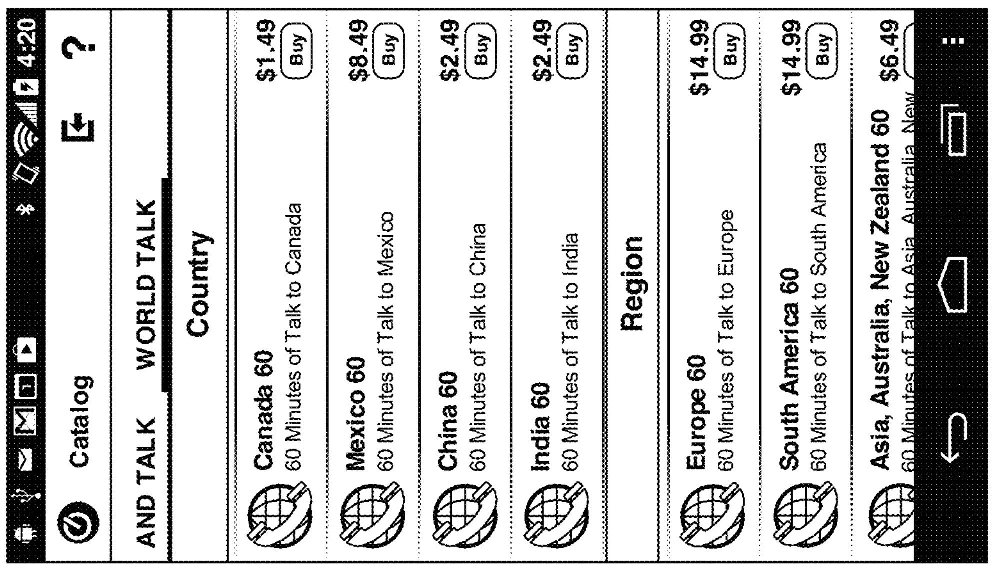

FIG. 137 illustrates a representative screen providing a set of international voice service plans available to the user for subscription in accordance with some embodiments.

Figure 138:
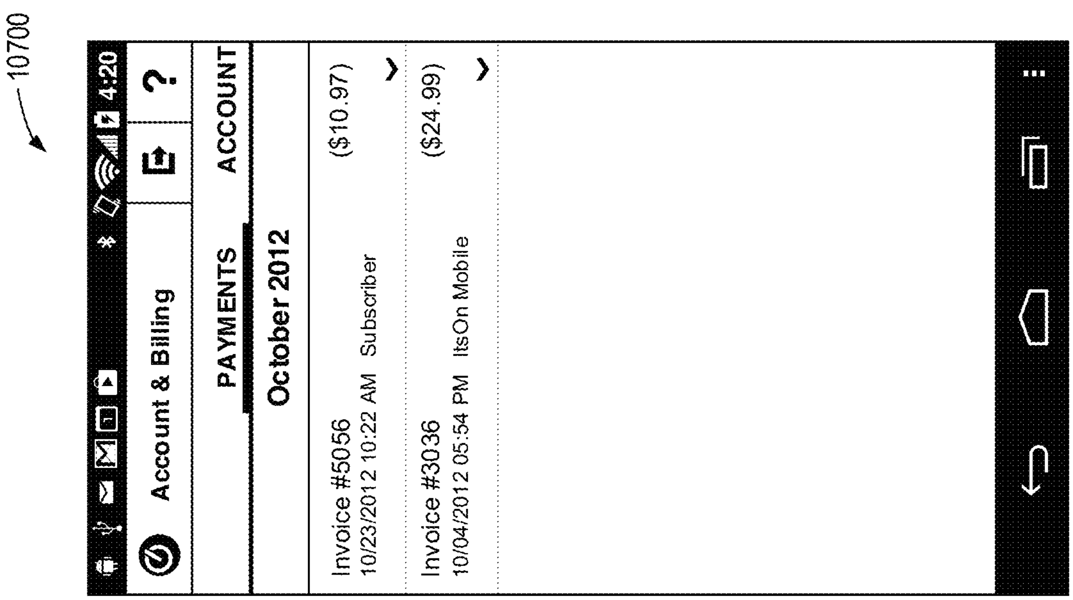

FIG. 138 illustrates a representative screen summarizing invoices associated with service plans, users, and mobile wireless communication devices in accordance with some embodiments.

Figure 139:
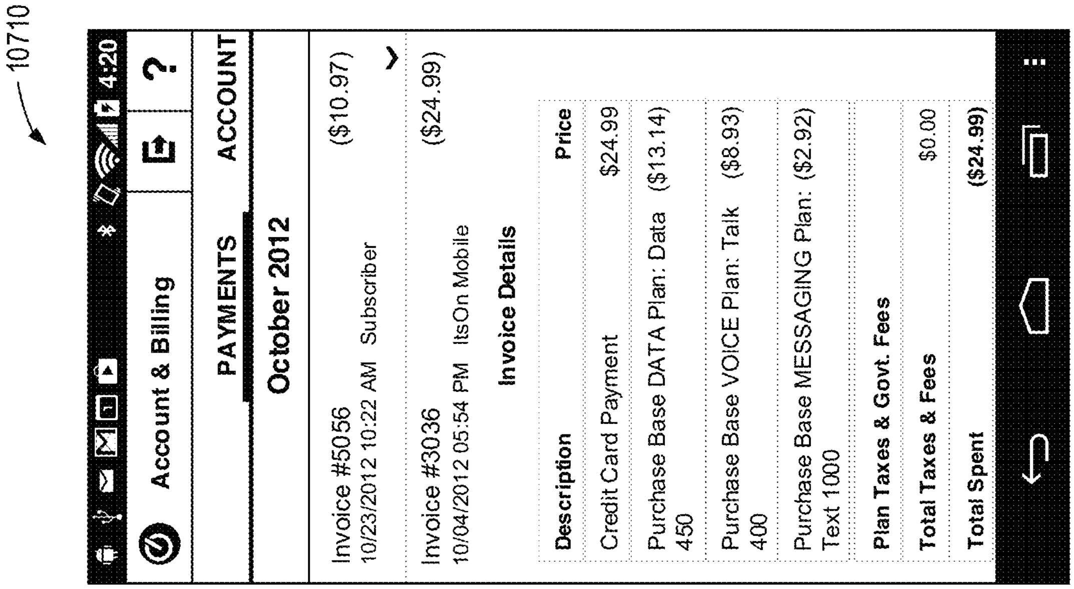

FIG. 139 illustrates a representative screen presenting additional detailed information for an invoice of FIG. 138 in accordance with some embodiments.

Figure 140:
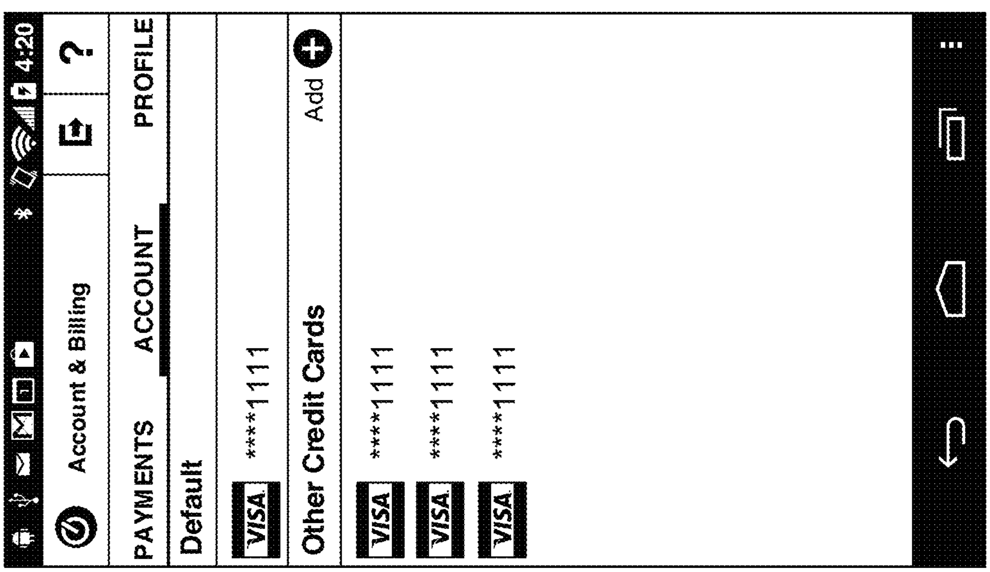

FIG. 140 illustrates a representative screen summarizing account payment means associated with service plans, users, and mobile wireless communication devices in accordance with some embodiments.

Figure 141:
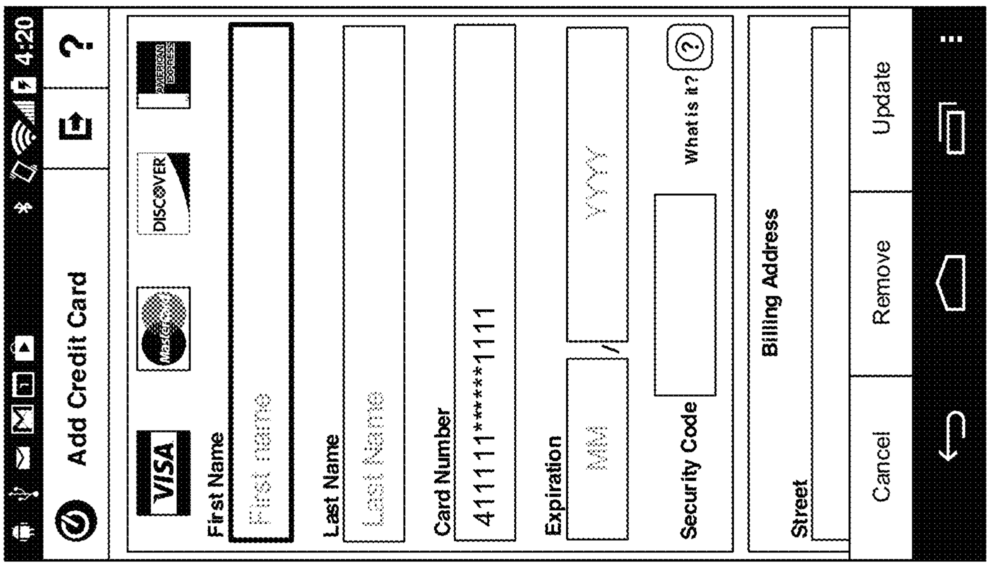

FIG. 141 illustrates a representative screen that details a particular payment means in accordance with some embodiments.

Figure 142:
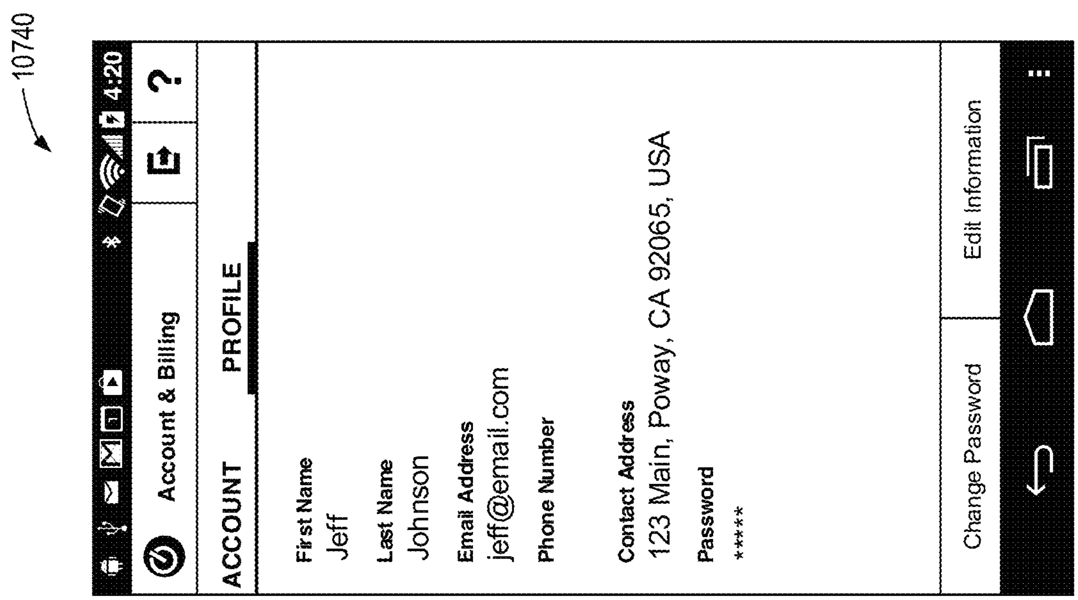

FIG. 142 illustrates a representative screen providing information about an account profile for a user of the mobile wireless communication device in accordance with some embodiments.

Figure 143:
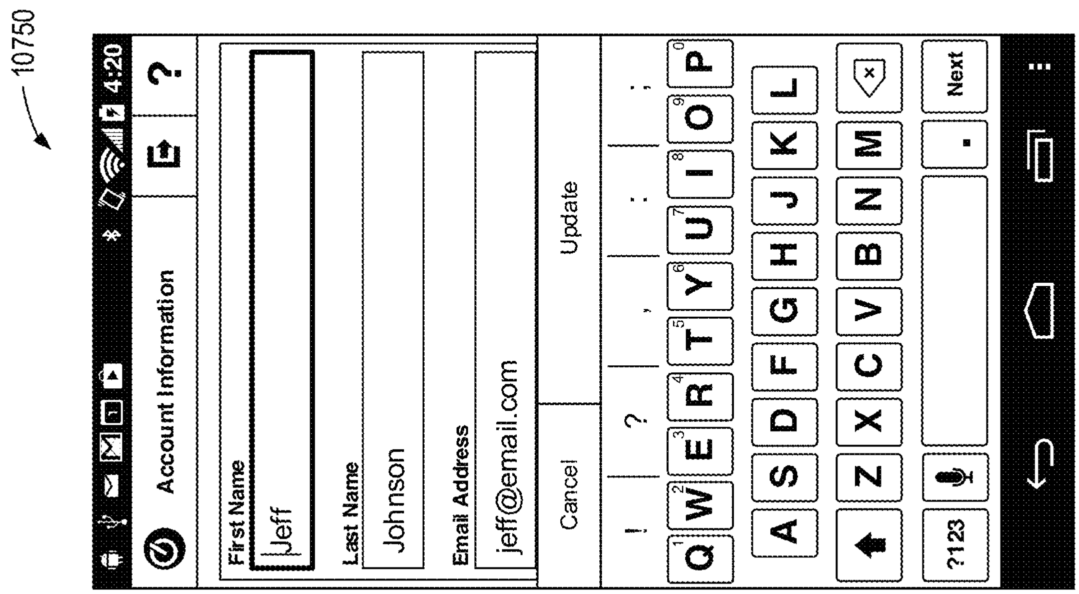

FIG. 143 illustrates a representative screen providing an alphanumeric interface to input and update account profile information in accordance with some embodiments.

Figure 144:
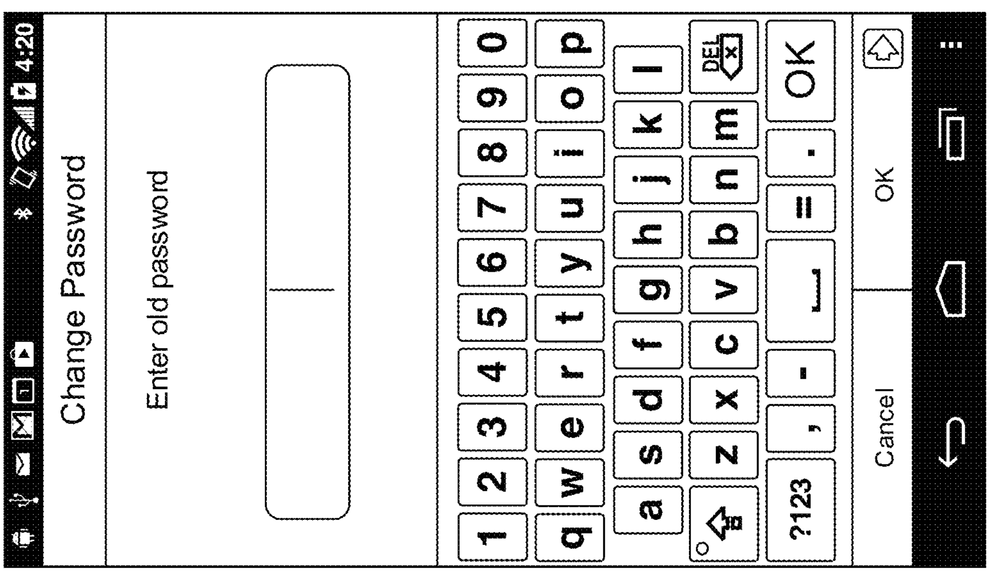

FIG. 144 illustrates a representative screen providing an alphanumeric interface to update a password associated with an account in accordance with some embodiments.

Figure 145:
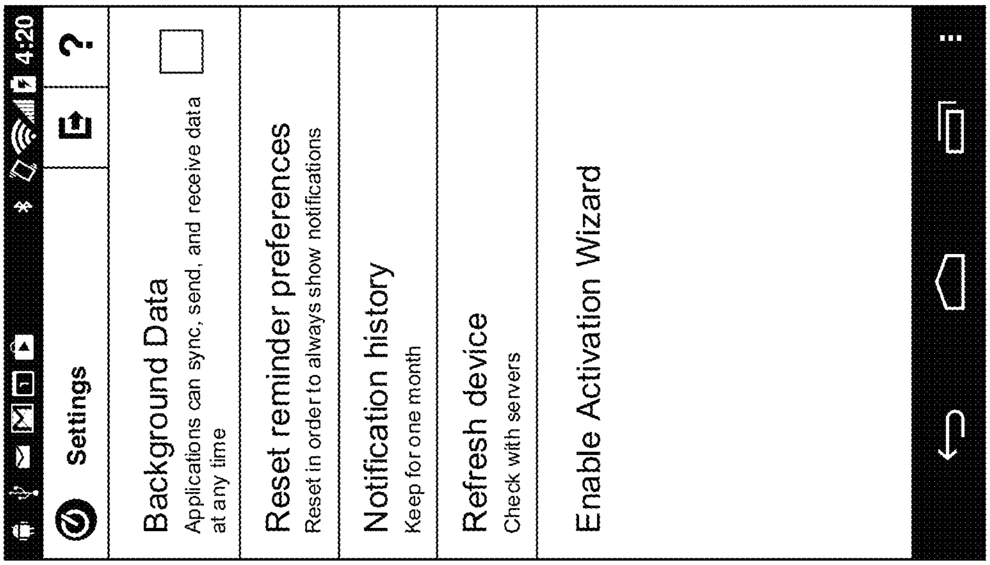

FIG. 145 illustrates a representative screen providing information on settings and administrative functions for the mobile wireless communication device in accordance with some embodiments.

Figure 146:
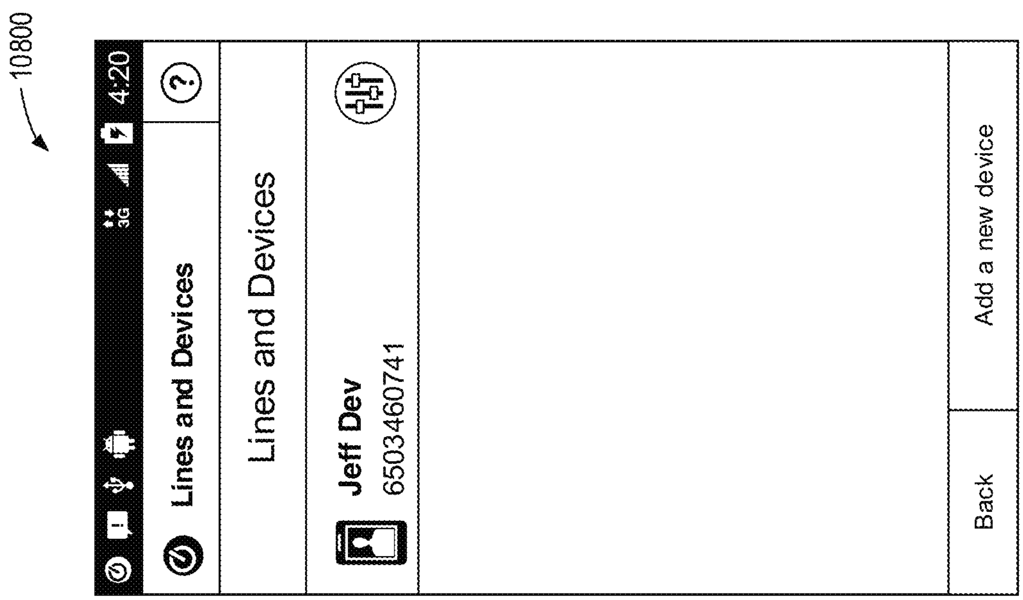
Figure 147:
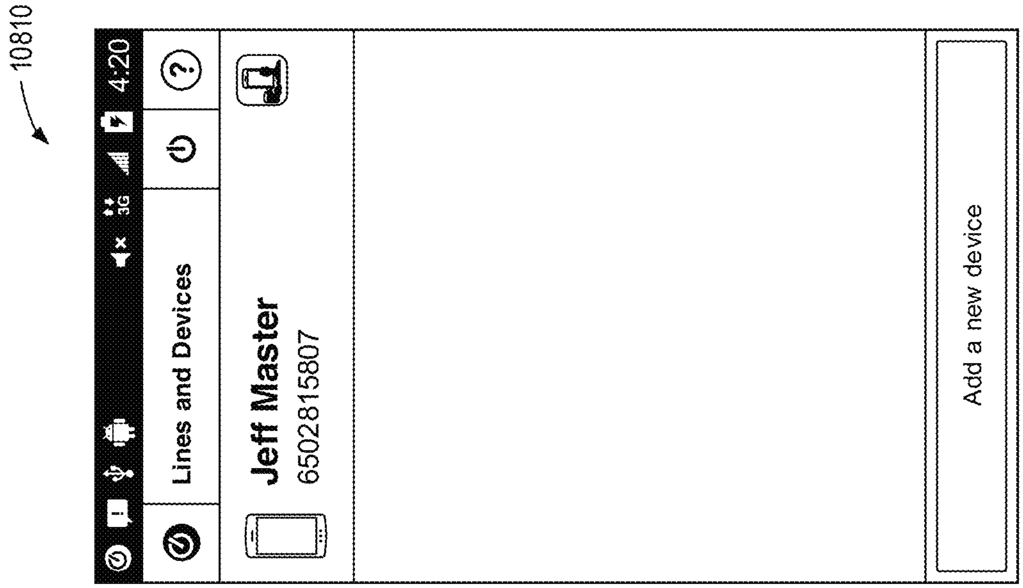

FIGS. 146 and 147 illustrate representative screens summarizing information for mobile wireless communication devices, including users, service accounts and associated lines in accordance with some embodiments.

Figure 148:
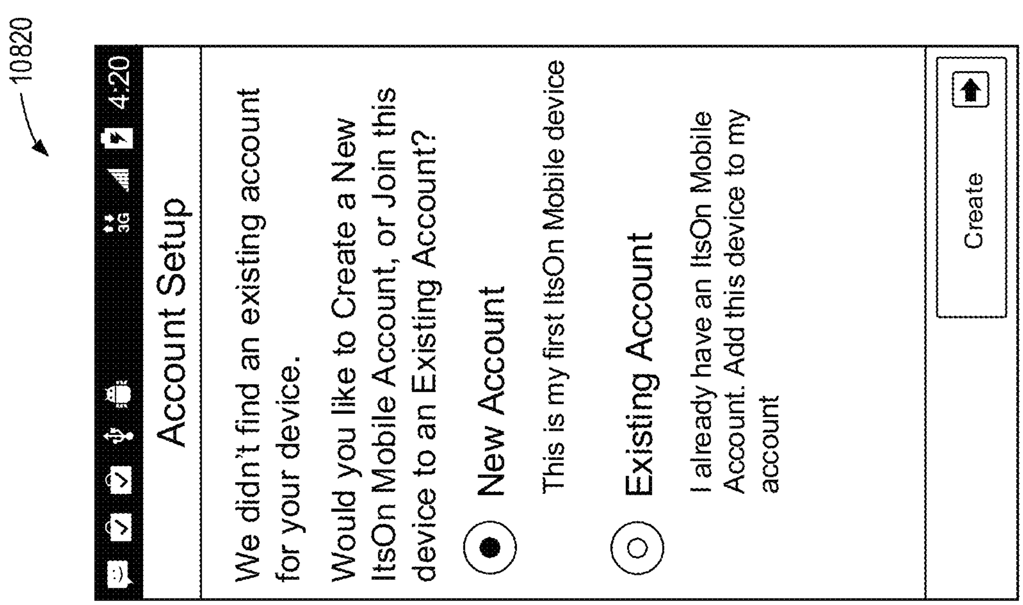

FIG. 148 illustrates a representative screen for the mobile wireless communication device not yet associated with a master service account in accordance with some embodiments.

Figure 149:
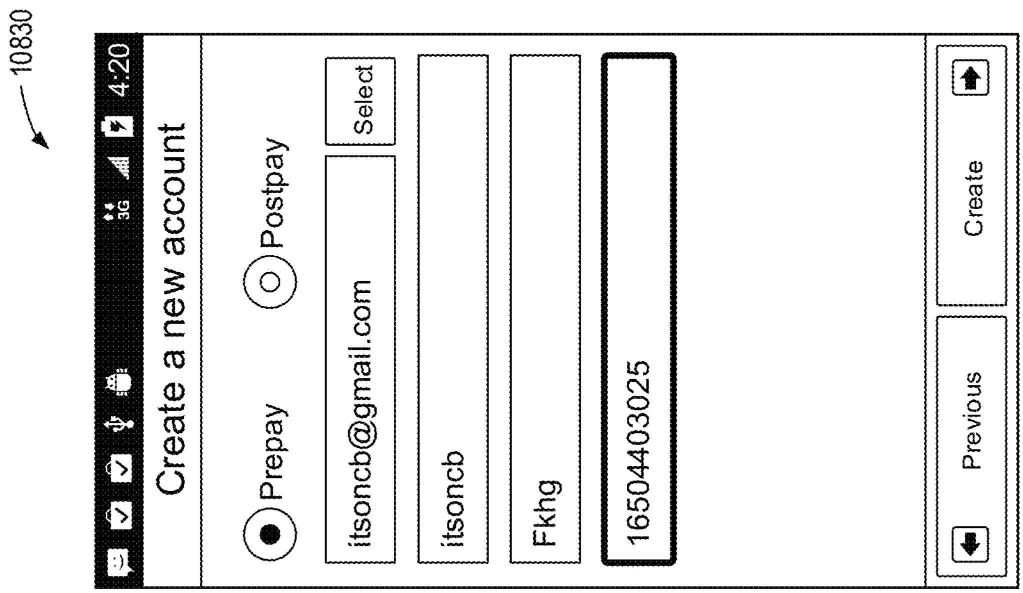

FIG. 149 illustrates a representative screen providing a choice between a prepay account and a post-pay account in accordance with some embodiments.

Figure 150:
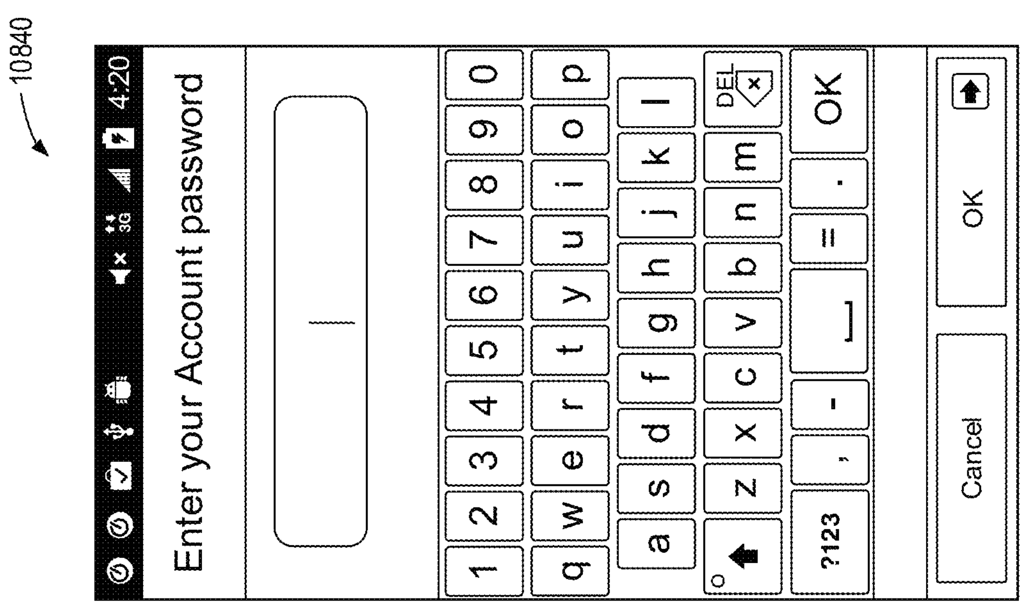

FIG. 150 illustrates a representative screen prompting for a password associated with a master service account in accordance with some embodiments.

Figure 151:
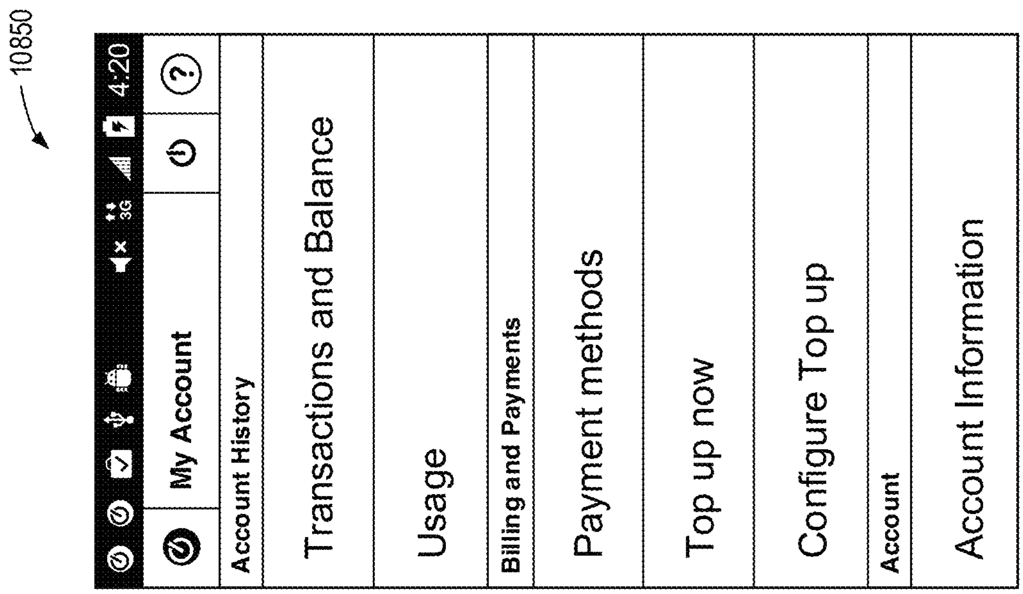

FIG. 151 illustrates a representative screen providing access to account information in accordance with some embodiments.

Figure 152:
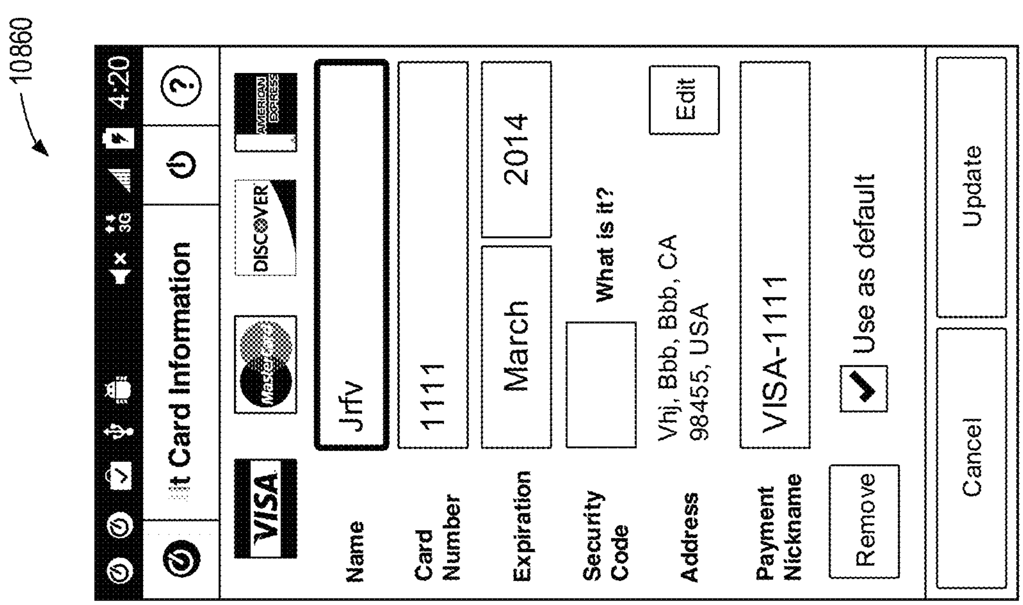

FIG. 152 illustrates a representative screen for entering payment information associated with an account in accordance with some embodiments.

Figure 153:
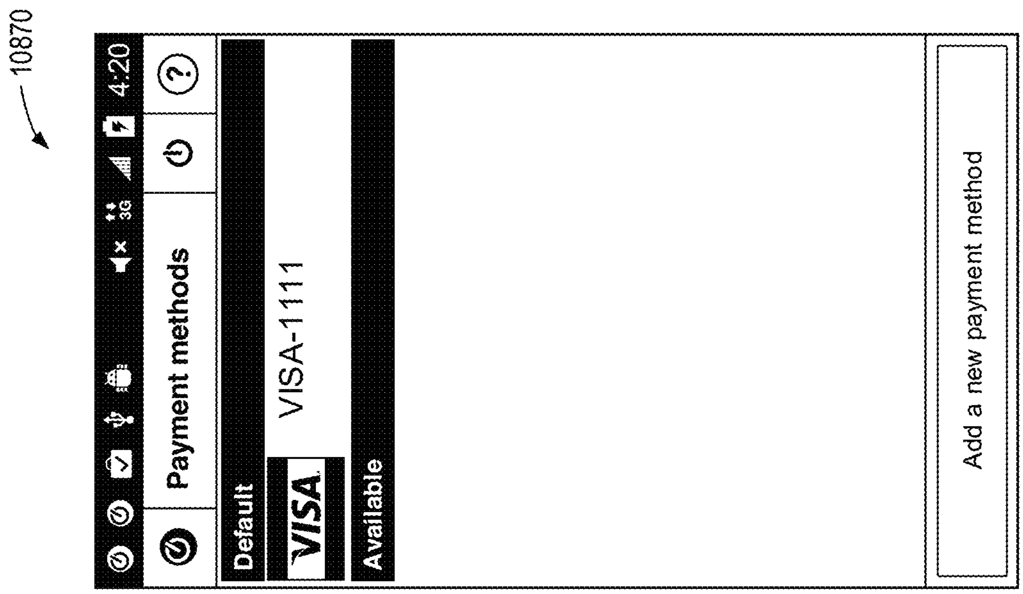

FIG. 153 illustrates a representative screen summarizing payment information associated with an account in accordance with some embodiments.

Figure 154:
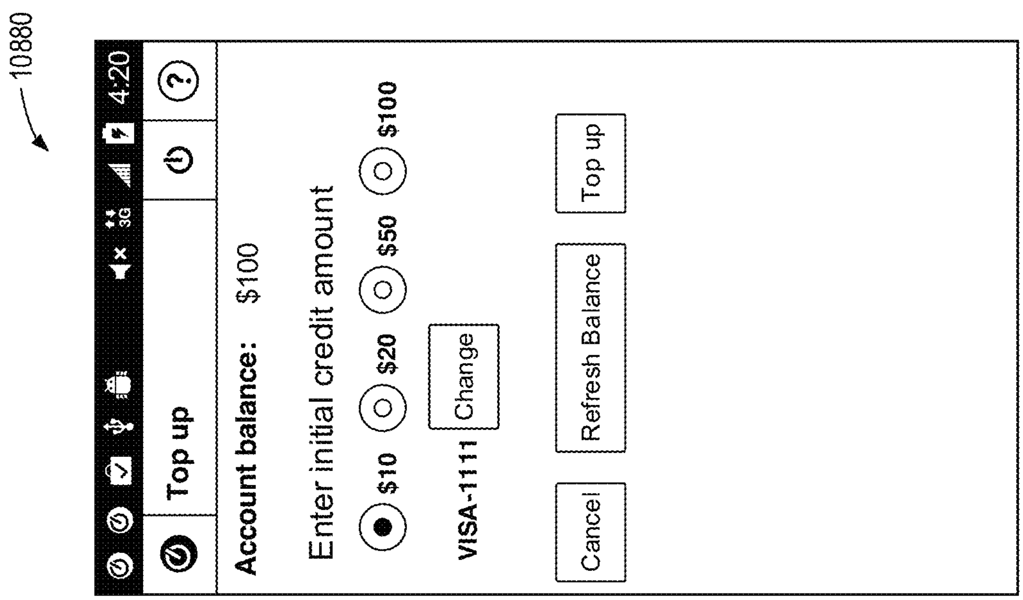

FIG. 154 illustrates a representative screen providing options for replenishing an account balance in accordance with some embodiments.

Figure 155:
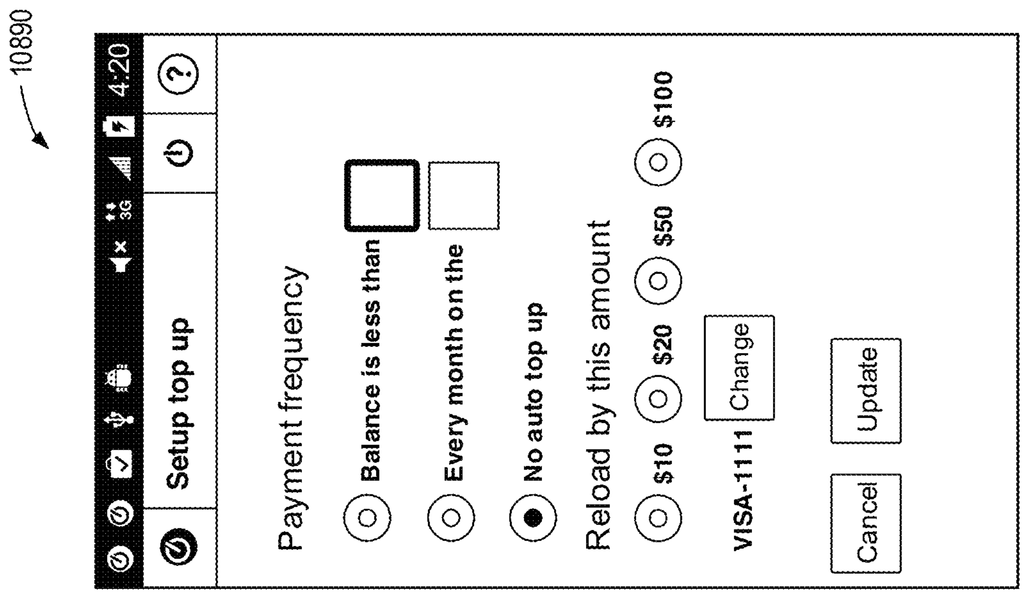

FIG. 155 illustrates a representative screen providing options for establishing account replenishment in accordance with some embodiments.

Figure 156:
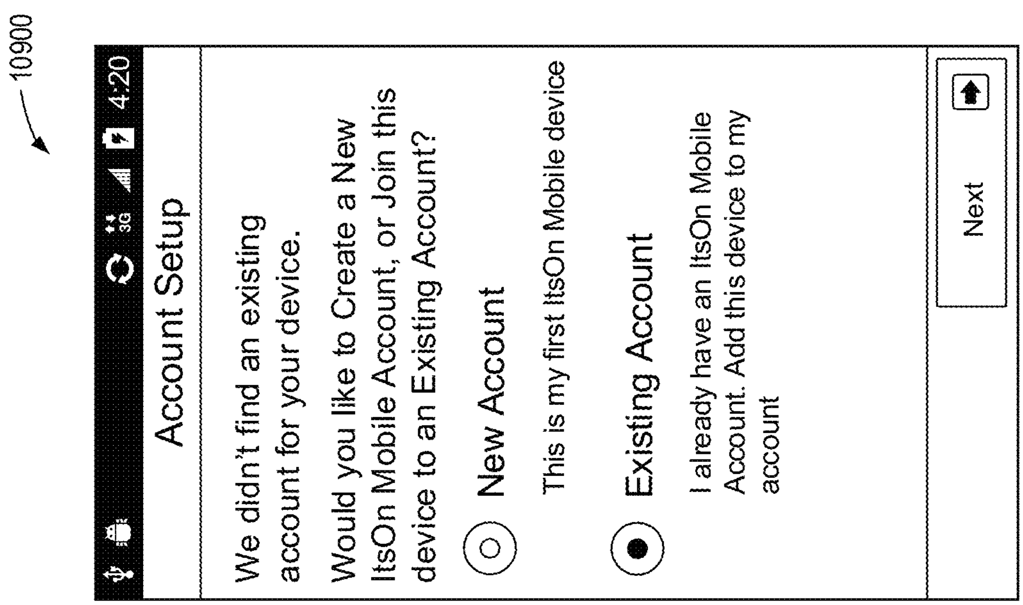

FIG. 156 illustrates a representative screen displayed for an unassociated child device in accordance with some embodiments.

Figure 157:
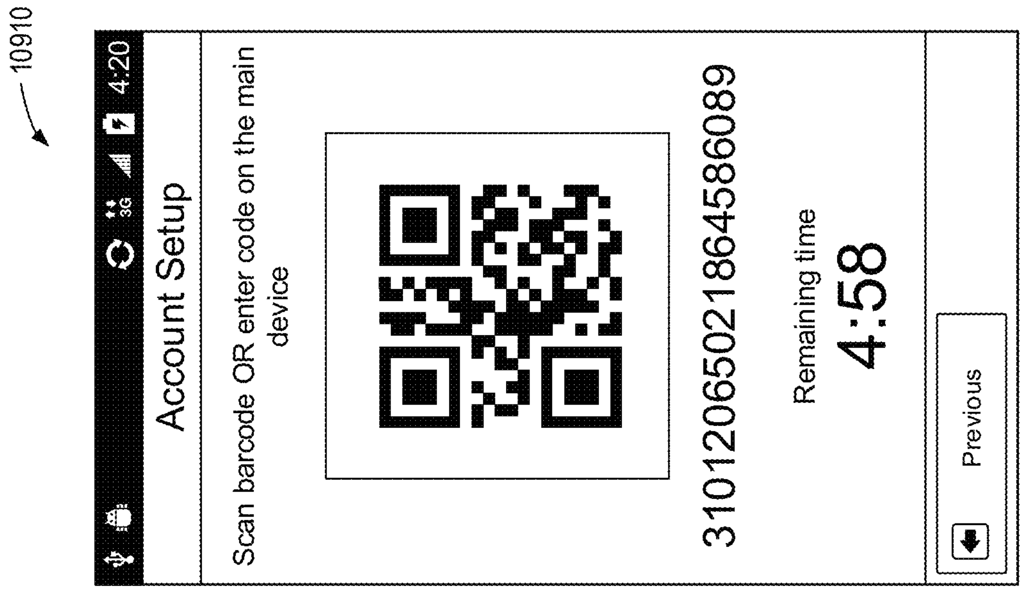

FIG. 157 illustrates a representative screen displaying information for associating the child device in accordance with some embodiments.

Figure 158:
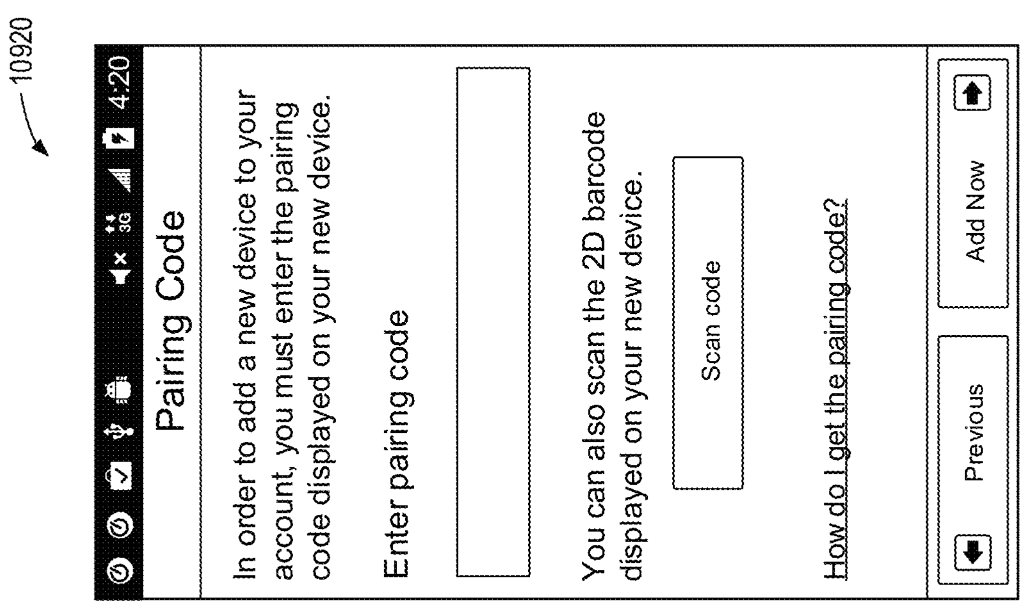

FIG. 158 illustrates a representative screen providing for entering information to associate the child device in accordance with some embodiments.

Figure 159:
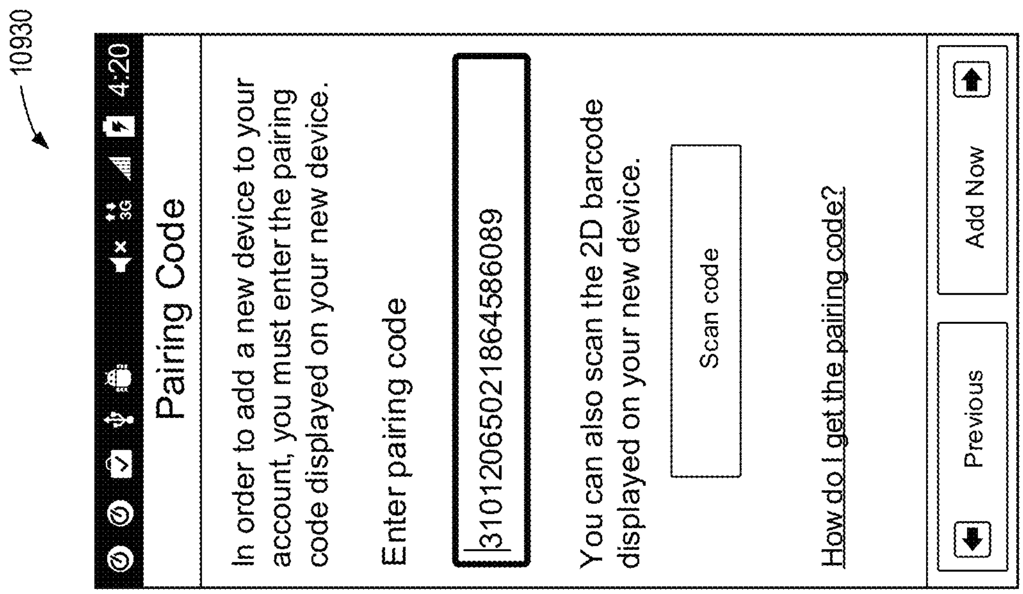

FIG. 159 illustrates a representative screen displaying information entered to associate the child device in accordance with some embodiments.

Figure 160:
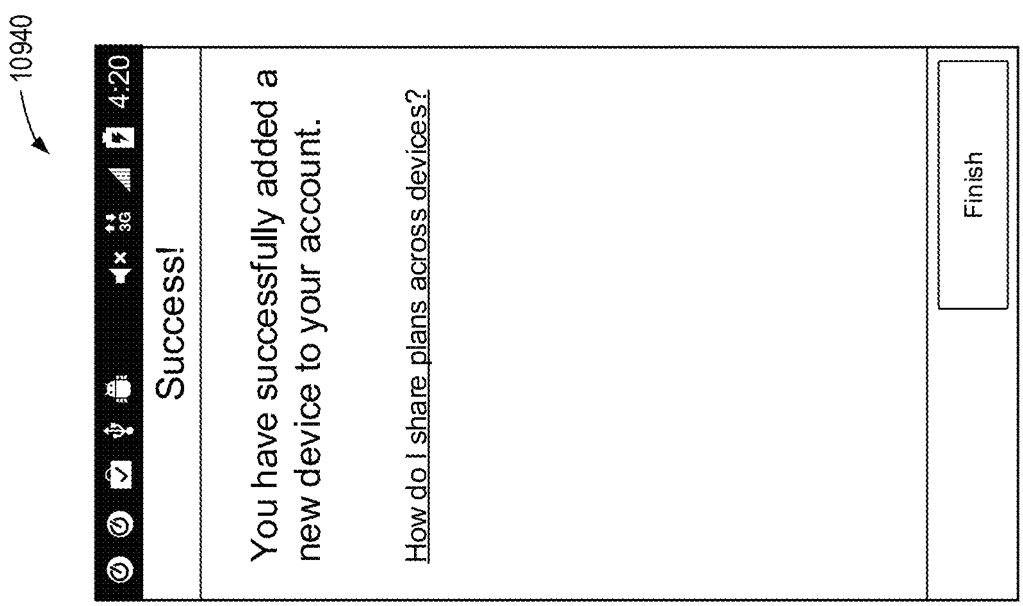
Figure 161:
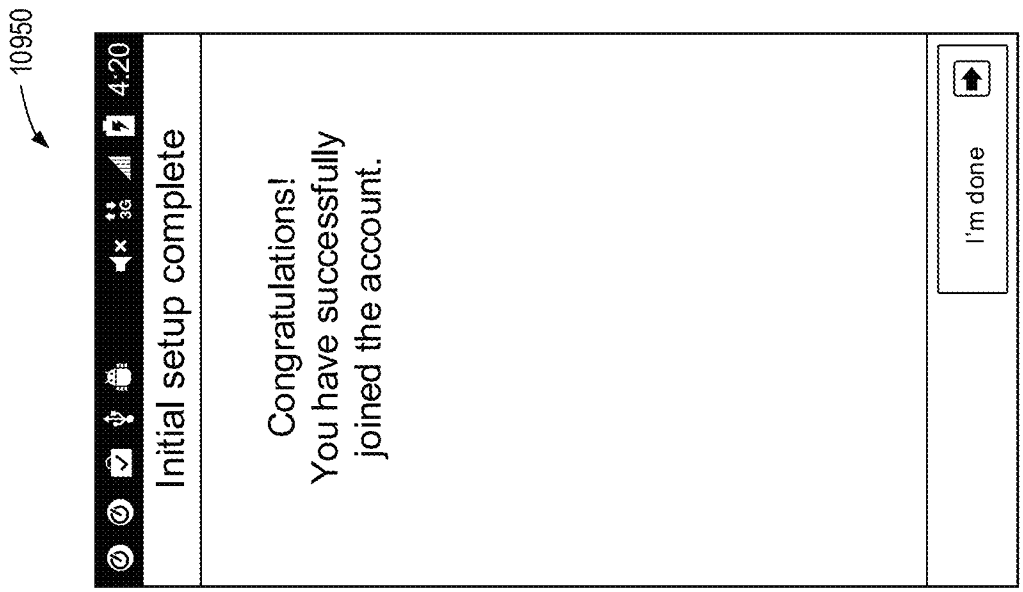

FIGS. 160 and 161 illustrate representative screens displaying information following successful association of the child device in accordance with some embodiments.

Figure 162:
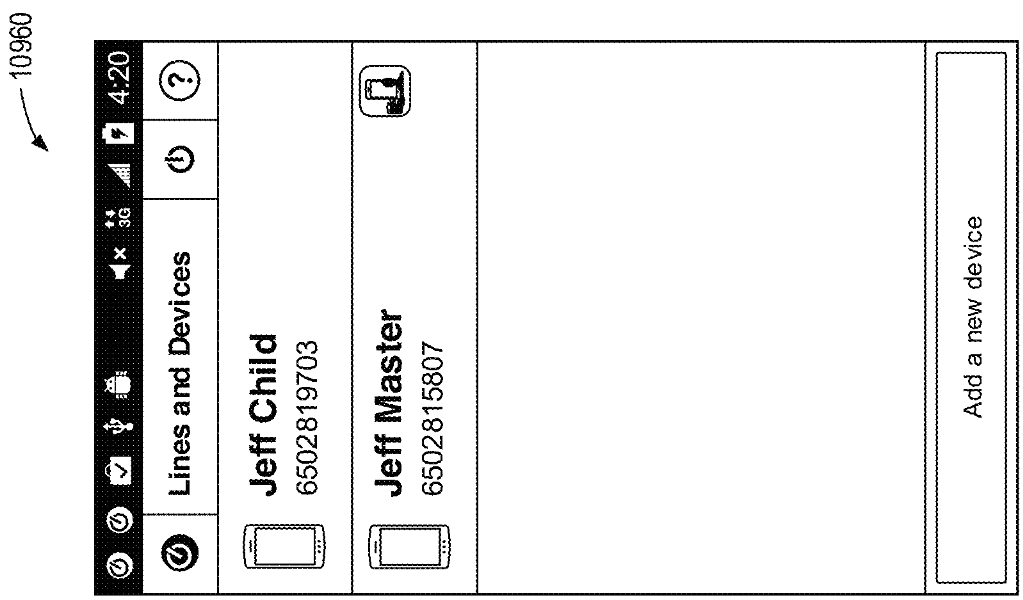

FIG. 162 illustrates a representative screen displaying devices associated with a master service account in accordance with some embodiments.

Figure 163:
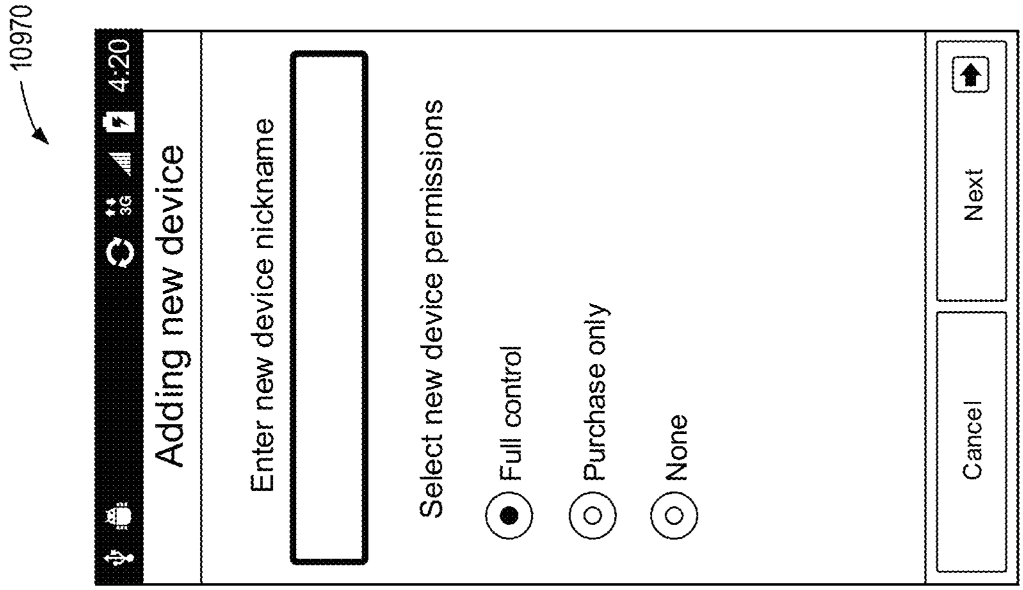

FIG. 163 illustrates a representative screen for selecting device permissions in accordance with some embodiments.

Figure 164:
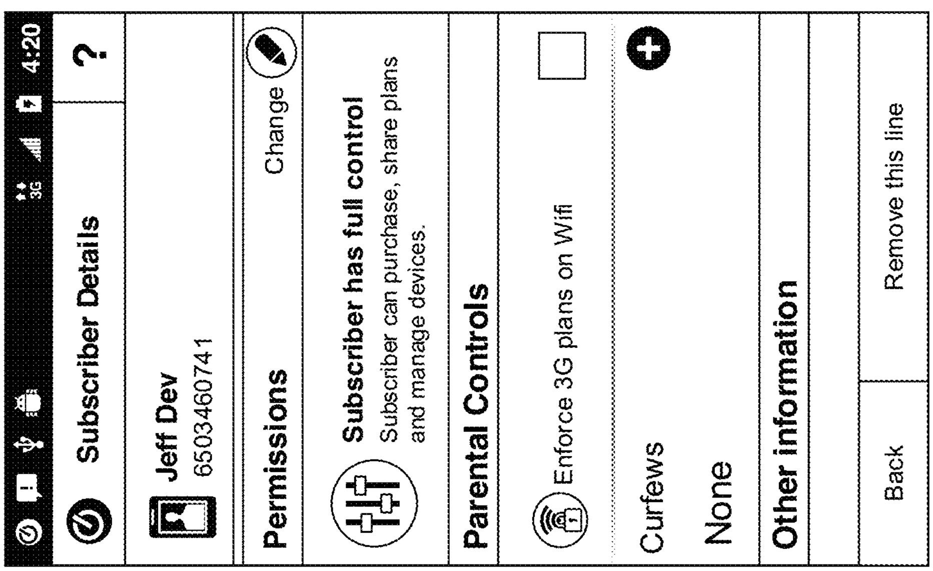

FIG. 164 illustrates a representative screen presenting subscriber information details in accordance with some embodiments.

Figure 165:
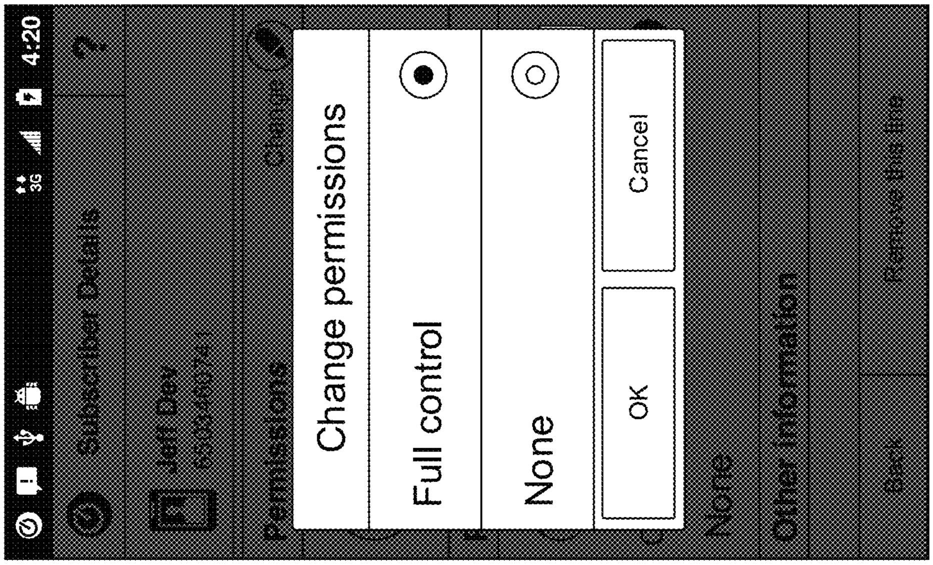

FIG. 165 illustrates a representative notification message overlay providing for input of permissions control in accordance with some embodiments.

Figure 166:
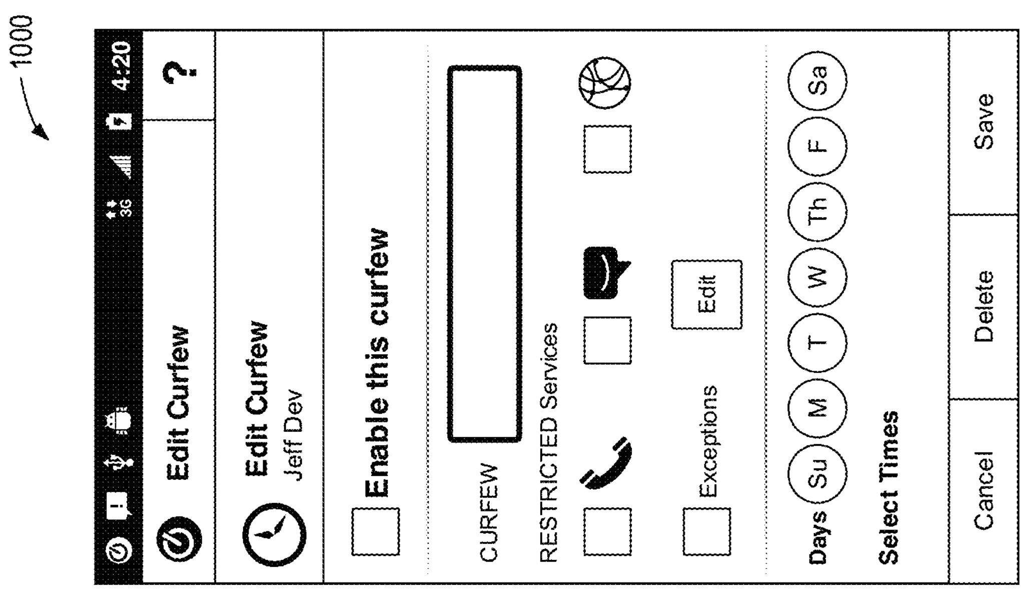

FIG. 166 illustrates a representative screen providing for inputs to establish parameters for a “curfew” on services available to a mobile wireless communication device in accordance with some embodiments.

Figure 167:
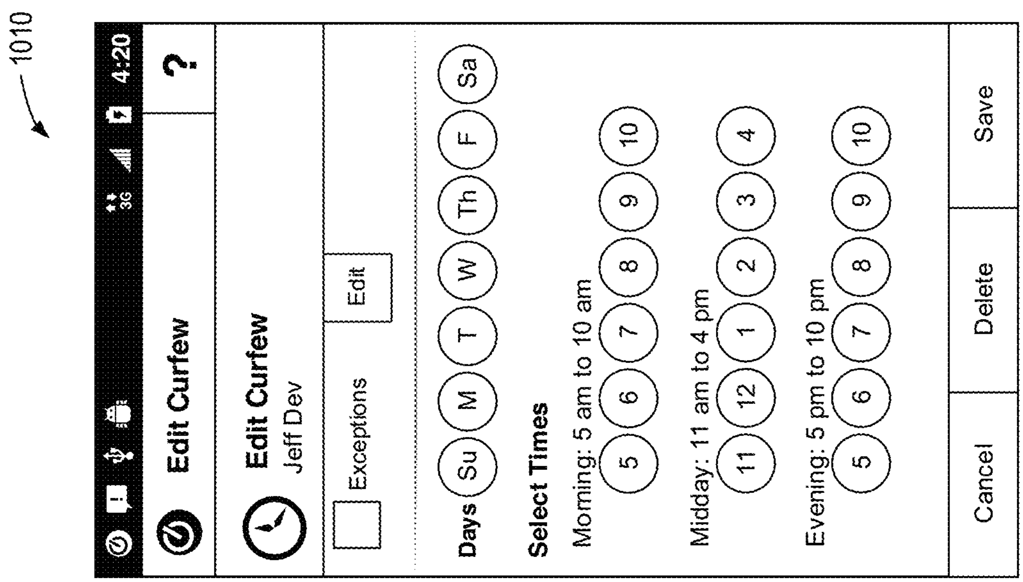

FIG. 167 illustrates a representative screen providing for inputs to establish time parameters for a “curfew” on services available to a mobile wireless communication device in accordance with some embodiments.

Figure 168:
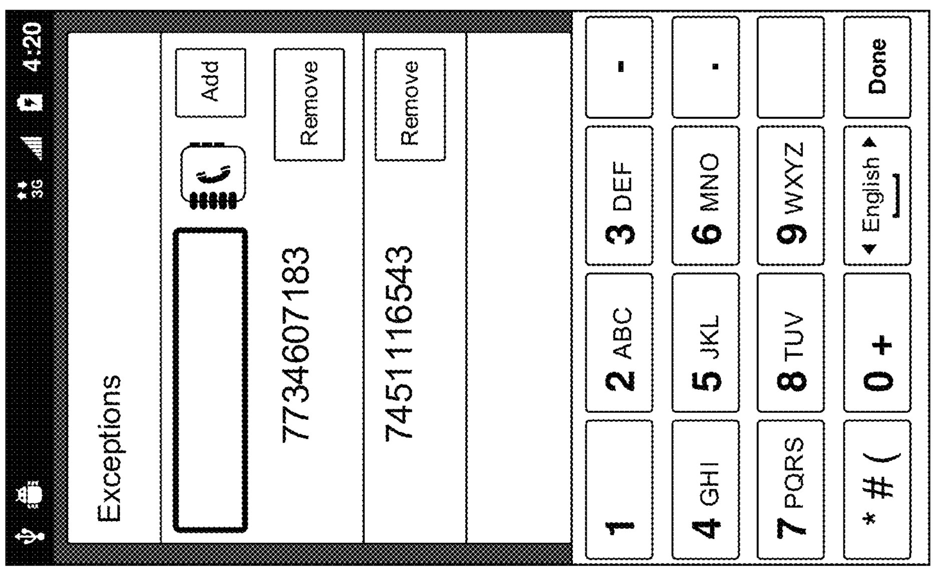

FIG. 168 illustrates a representative screen providing for the user of the mobile wireless communication device to set exceptions to curfews in accordance with some embodiments.

Figure 169:
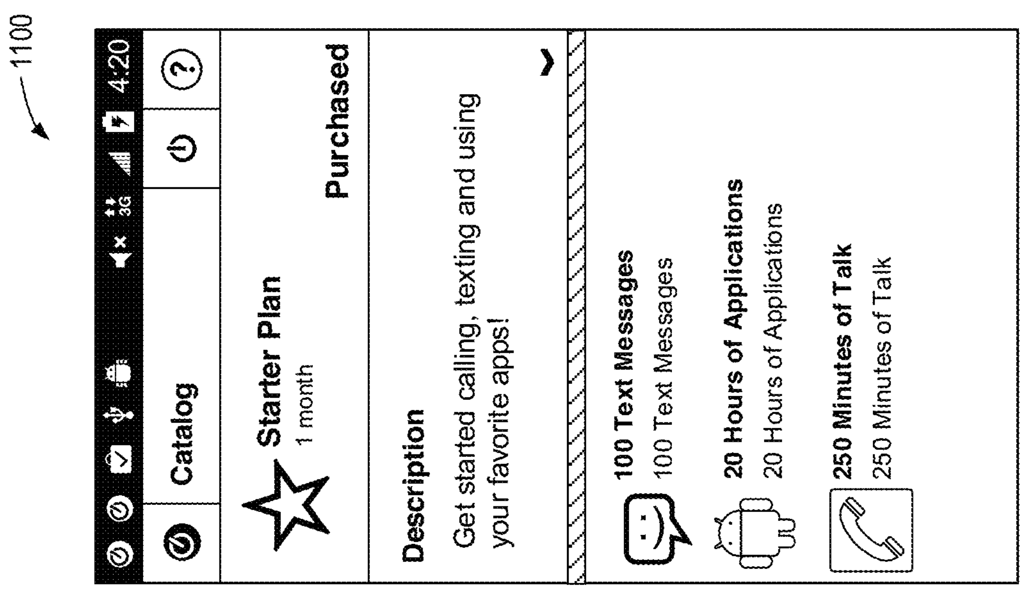

FIG. 169 illustrates a representative screen presenting an example of a service plan subscribed to by the user of the mobile wireless communication device in accordance with some embodiments.

Figure 170:
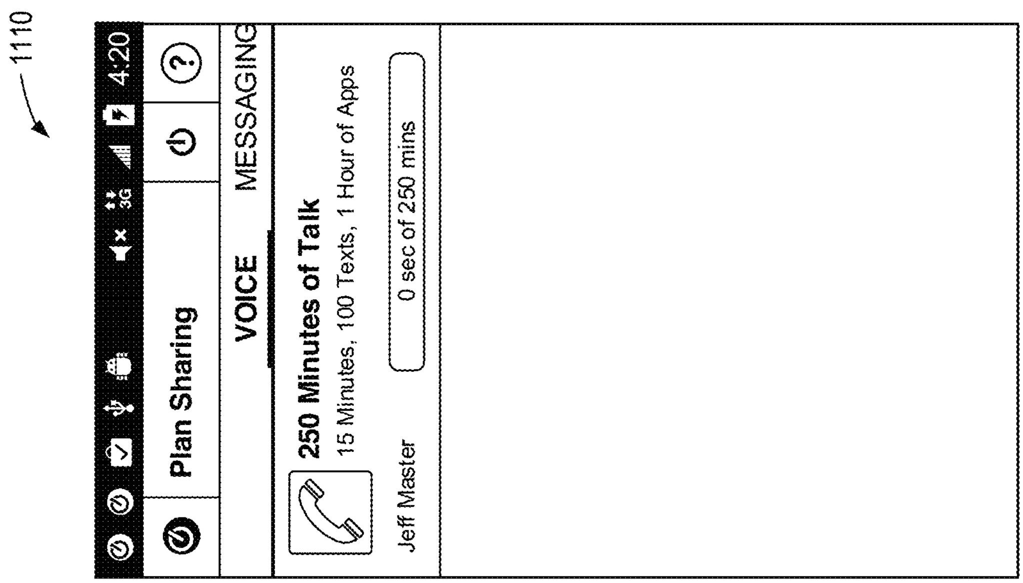

FIG. 170 illustrates a representative screen for plan sharing properties of voice service plans of the mobile wireless communication device in accordance with some embodiments.

Figure 171:
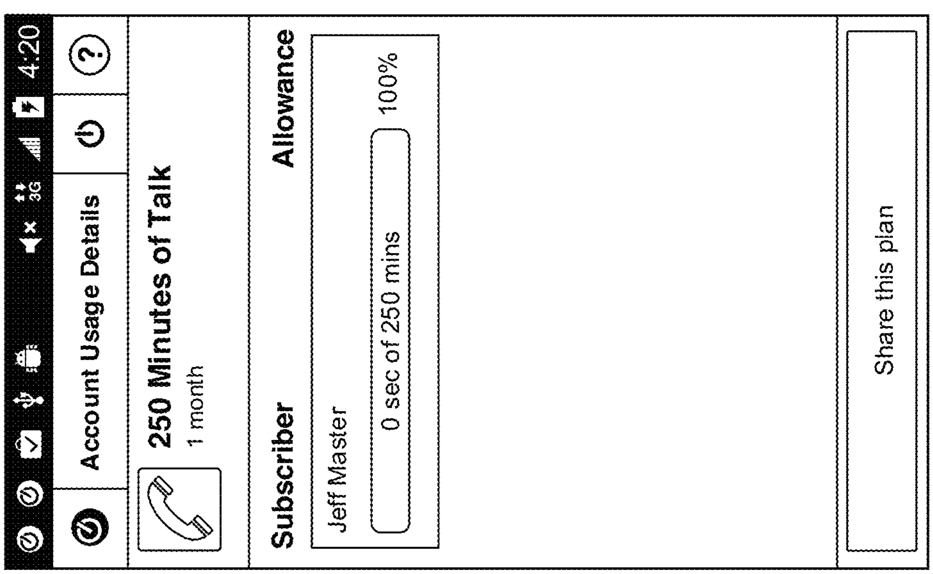

FIG. 171 illustrates a representative screen providing account usage details for a specific voice service plan of the mobile wireless communication device in accordance with some embodiments.

Figure 172:
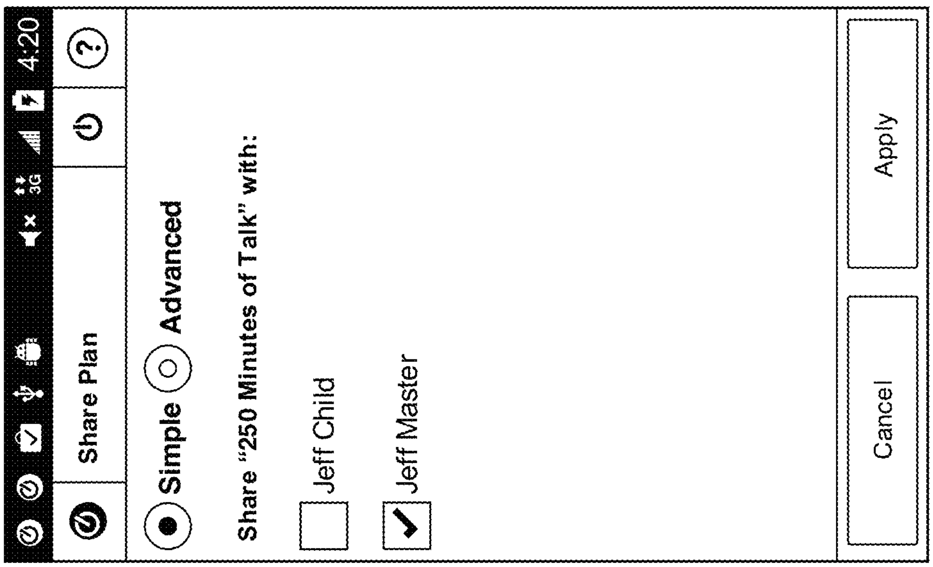

FIG. 172 illustrates a representative screen presenting an example of plan sharing options available to the user of the mobile wireless communication device in accordance with some embodiments.

Figure 173:
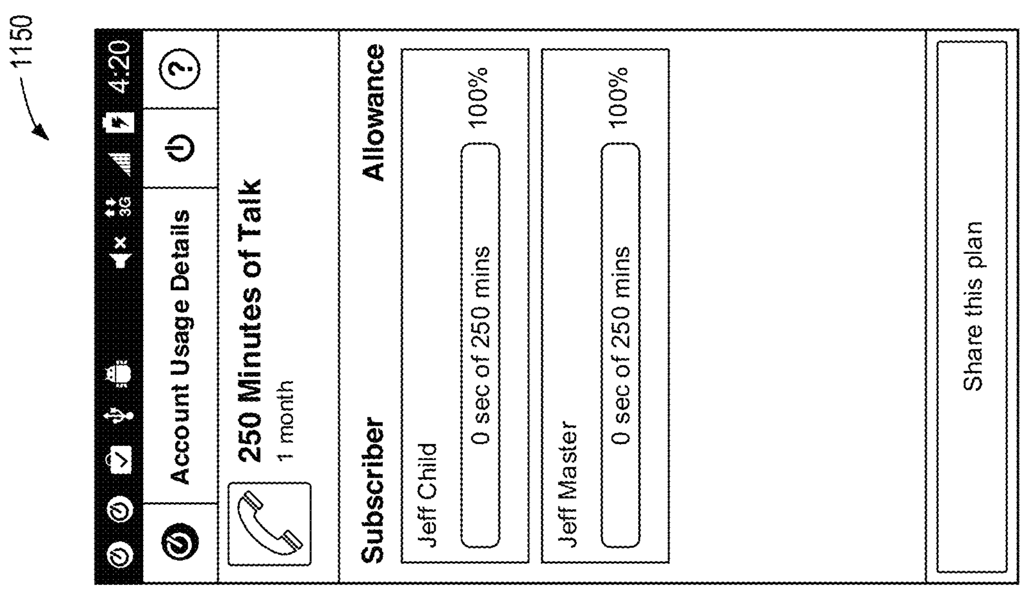

FIG. 173 illustrates a representative screen displaying complete sharing of a voice service plan by two mobile wireless communication devices in accordance with some embodiments.

Figure 174:
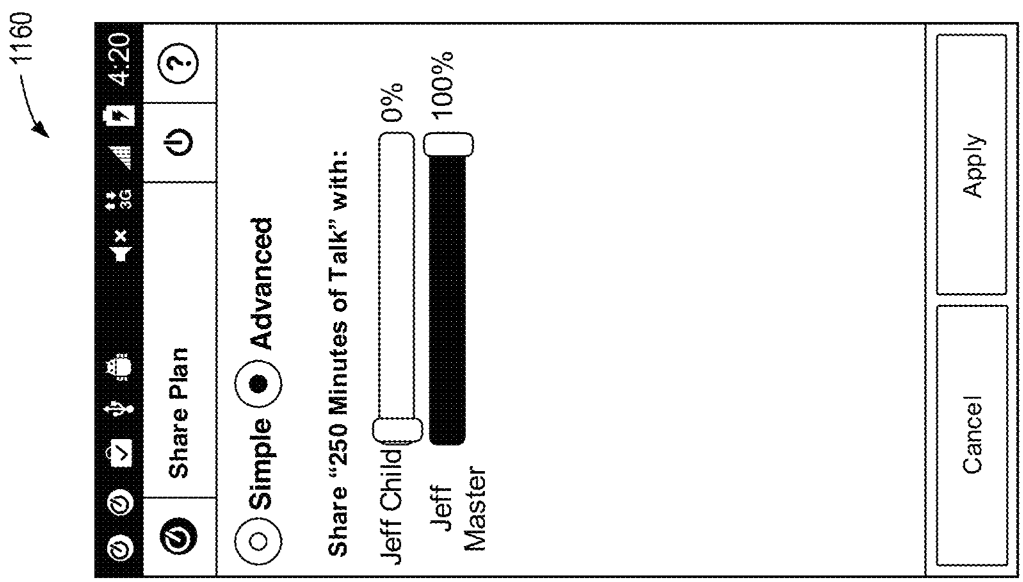

FIG. 174 illustrates a representative screen displaying a voice service plan allocated entirely to one of two mobile wireless communication devices in accordance with some embodiments.

Figure 175:
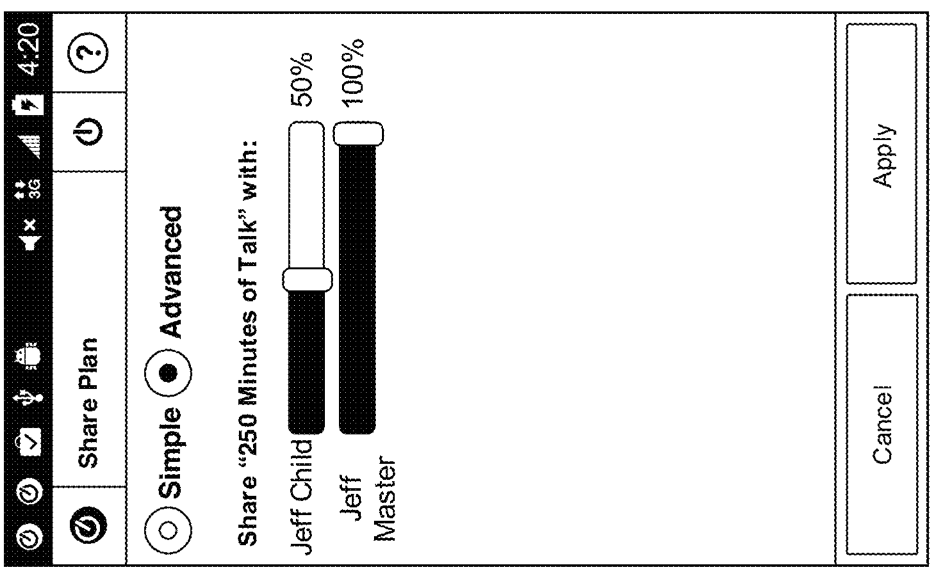

FIG. 175 illustrates a representative screen displaying a voice service allocated differently to each of two mobile wireless communication devices in accordance with some embodiments.

Figure 176:
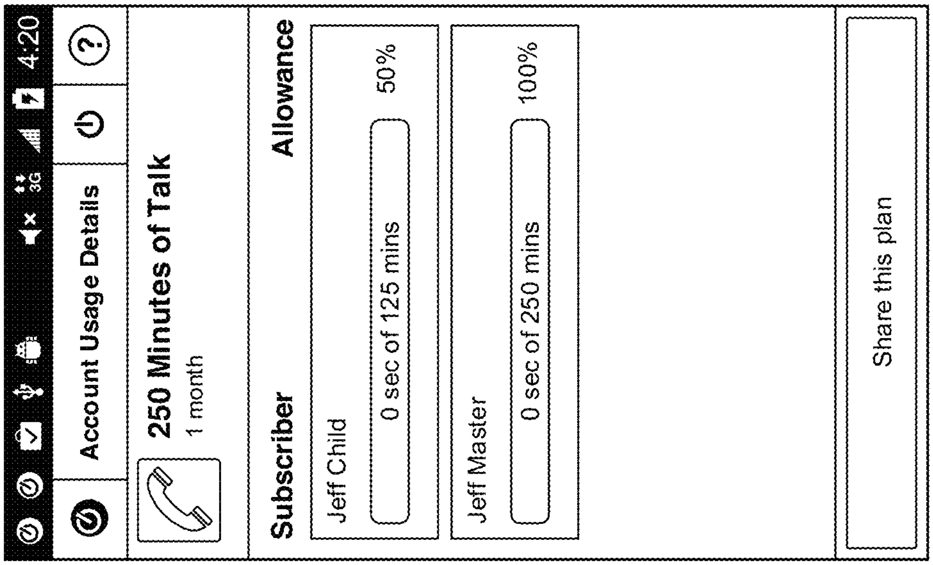

FIG. 176 illustrates a representative screen displaying account usage details for a voice service plan shared by two mobile wireless communication devices in accordance with some embodiments.

Figure 177:
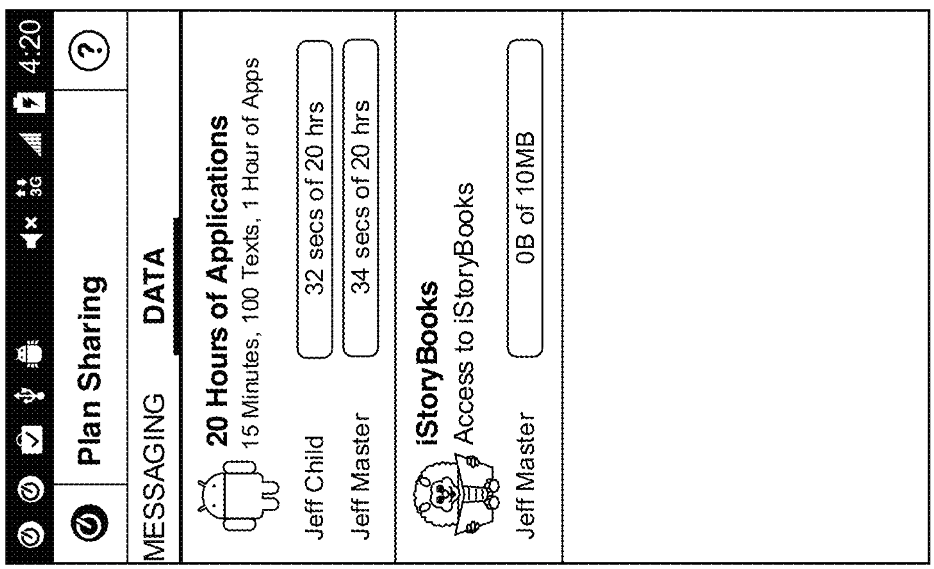

FIG. 177 illustrates a representative screen displaying service plan sharing for a set of data service plans for two mobile wireless communication devices in accordance with some embodiments.

Figure 179:
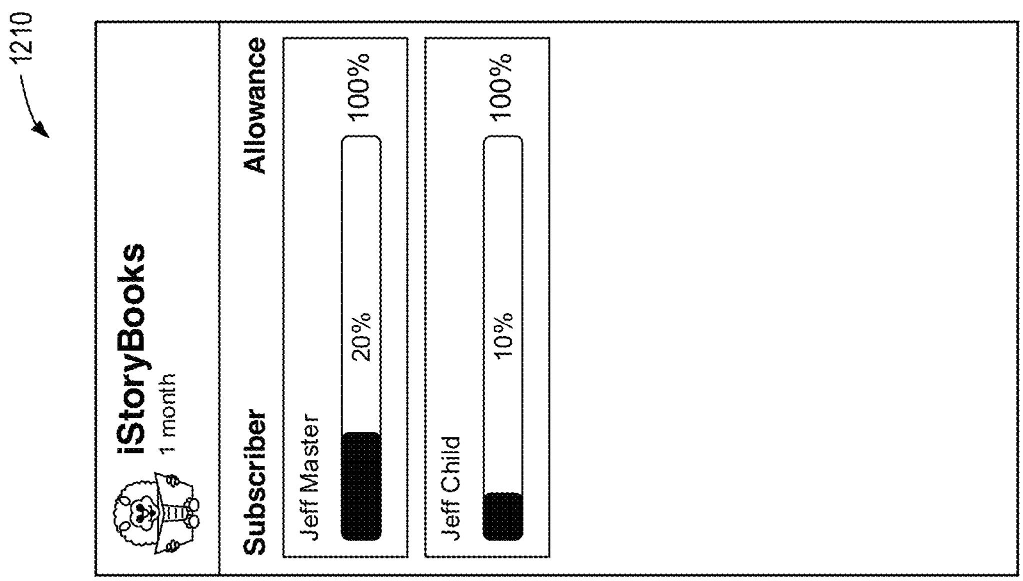
Figure 178:
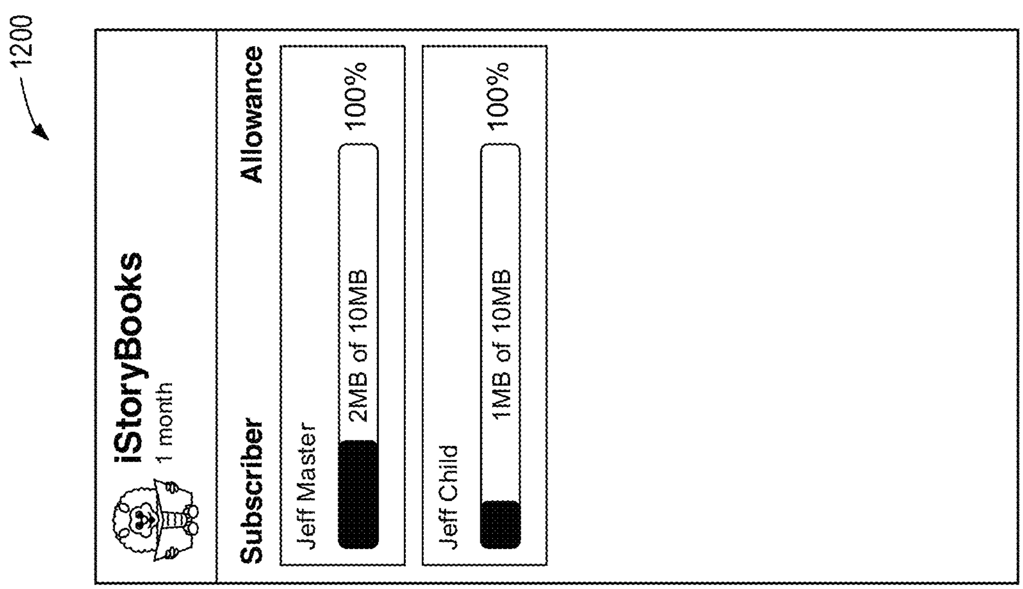

FIGS. 178 and 179 illustrate representative screens displaying service plan sharing of a specific service plan across two mobile wireless communication devices in accordance with some embodiments.

Figure 180:
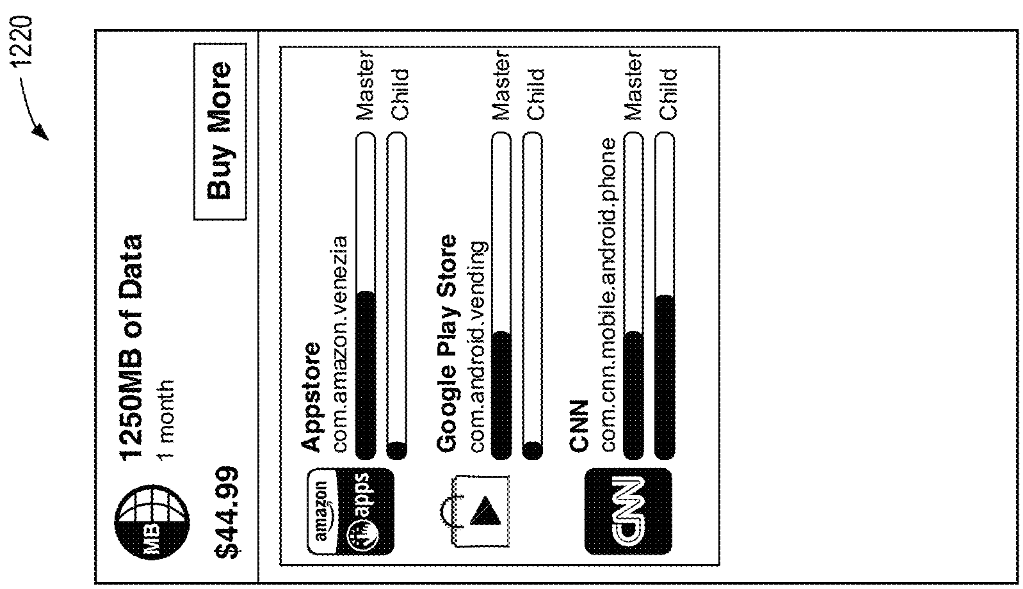

FIG. 180 illustrates a representative screen displaying service usage details arranged by application for a shared service plan in accordance with some embodiments.

Figure 181:
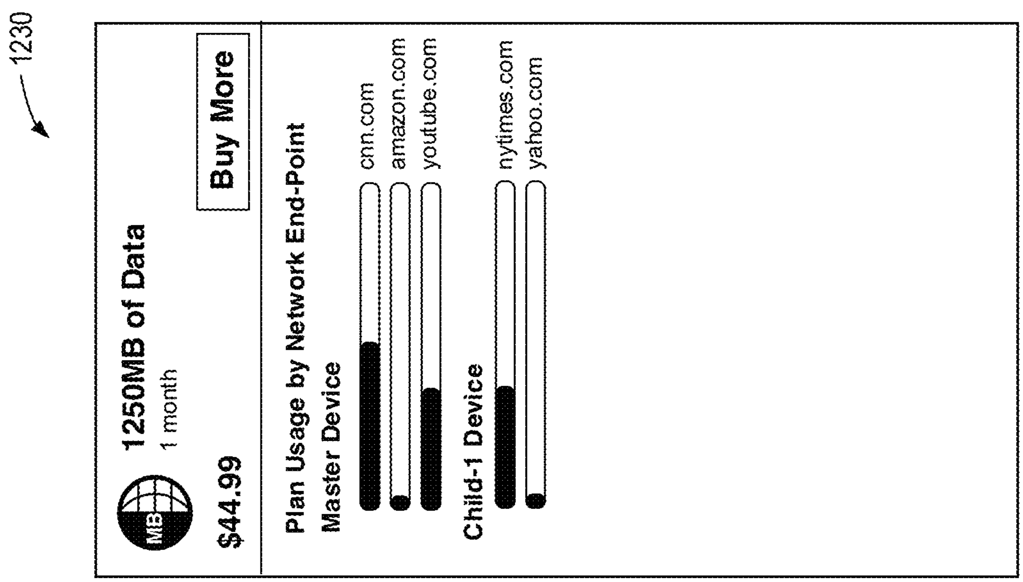

FIG. 181 illustrates a representative screen displaying service usage details arranged by network end-point for a shared service plan in accordance with some embodiments.

Figure 182:
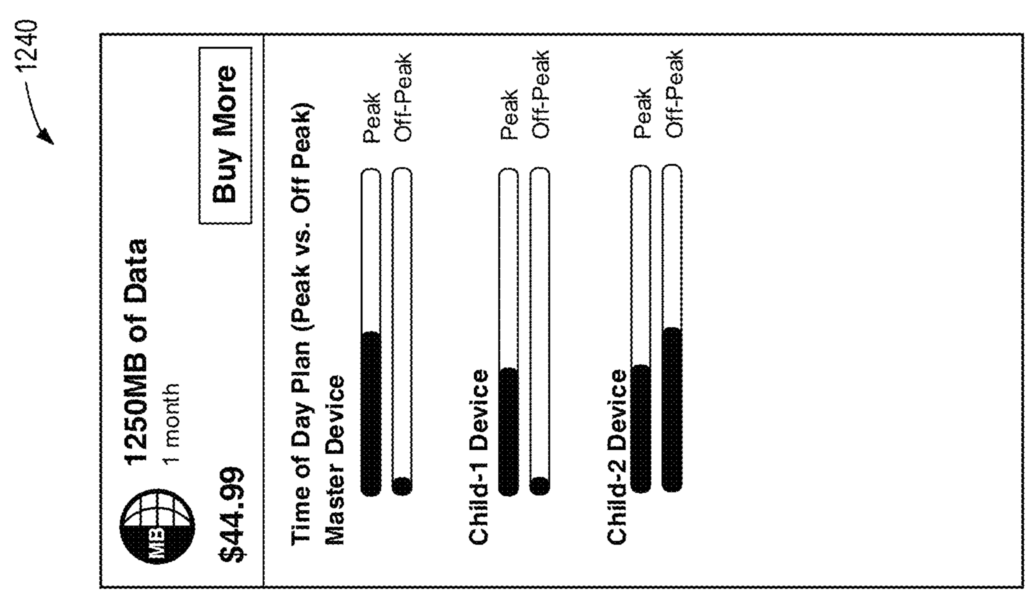

FIG. 182 illustrates a representative screen displaying service usage details arranged by time of day categories for a shared service plan in accordance with some embodiments.

Figure 183:
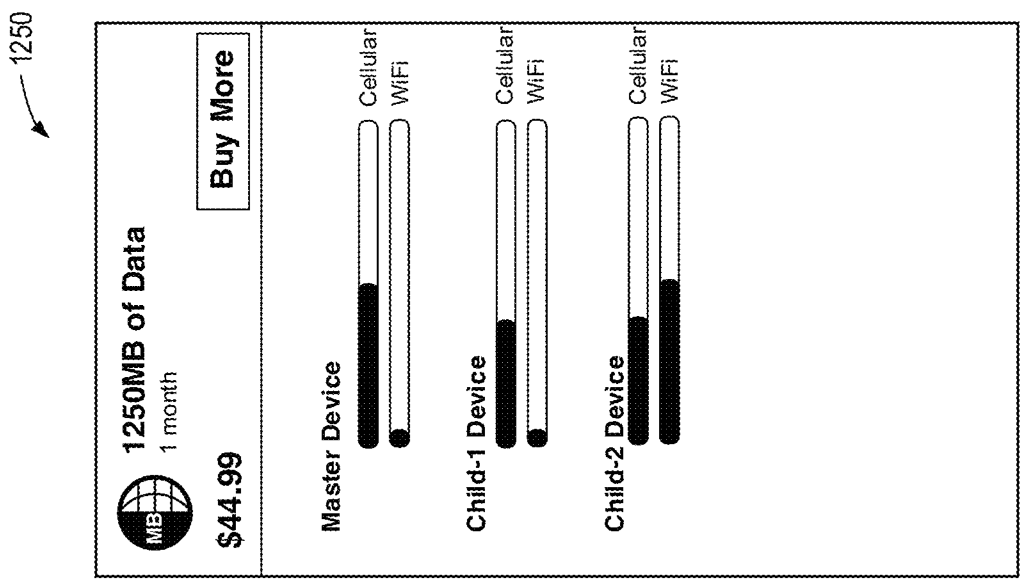

FIG. 183 illustrates a representative screen displaying service usage details arranged by network type for a shared service plan in accordance with some embodiments.

Figure 184:
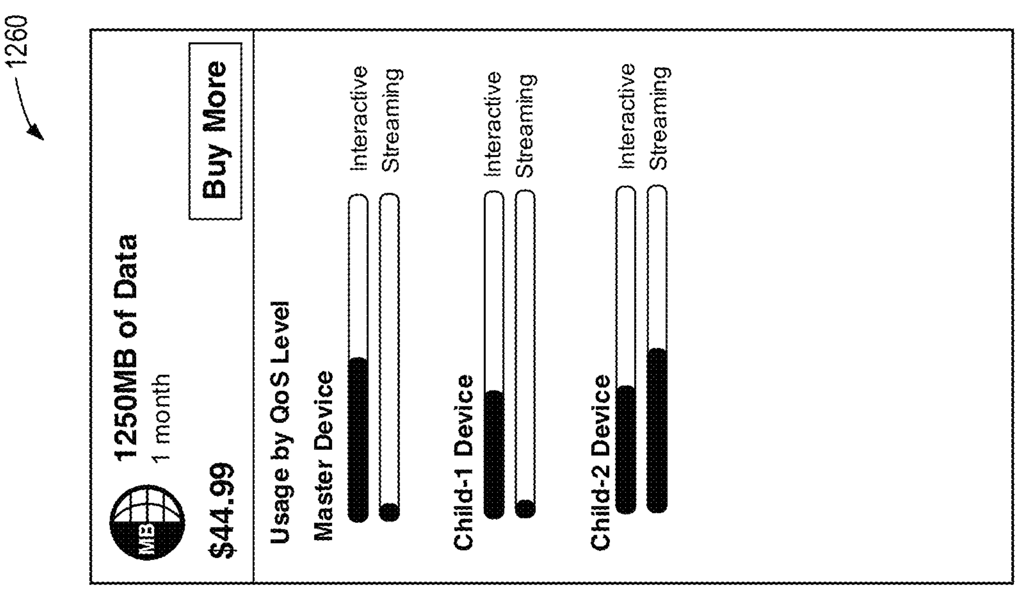

FIG. 184 illustrates a representative screen displaying service usage details arranged by a quality of service (QoS) level for a shared service plan in accordance with some embodiments.

Figure 185:
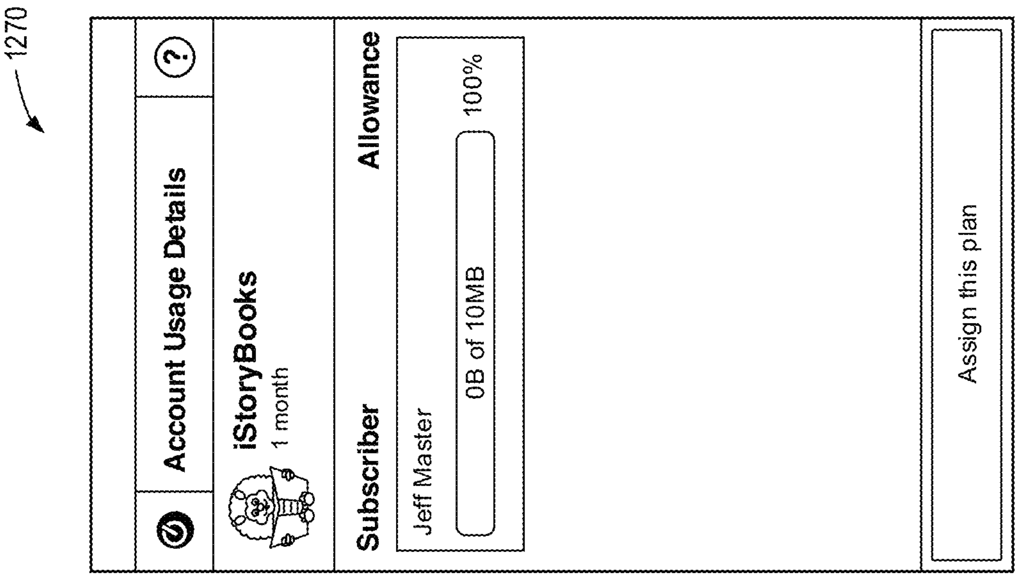

FIG. 185 illustrates a representative screen displaying an option to assign a service plan to a mobile wireless communication device in accordance with some embodiments.

Figure 186:
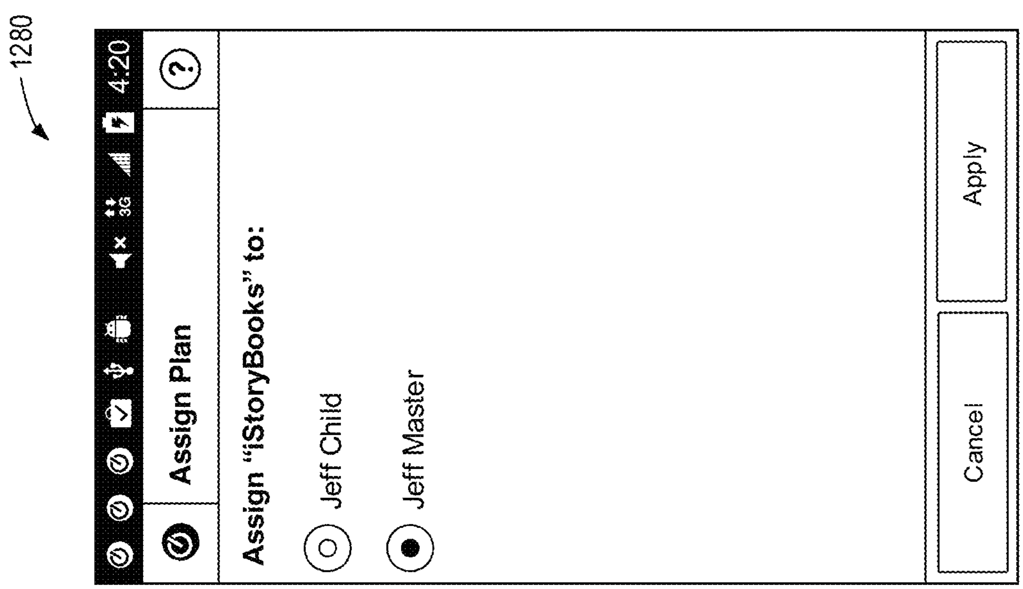

FIG. 186 illustrates a representative screen displaying selection options for assigning a service plan to one of two mobile wireless communication devices in accordance with some embodiments.

Figure 187:
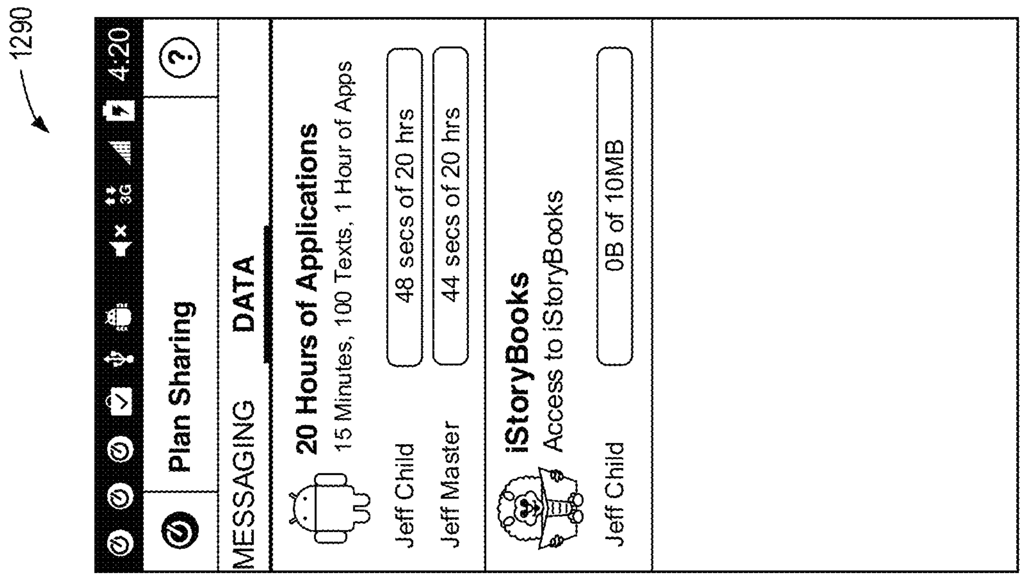

FIG. 187 illustrates a representative screen displaying plan sharing properties of multiple service plans across multiple mobile wireless communication devices in accordance with some embodiments.

Figure 188:
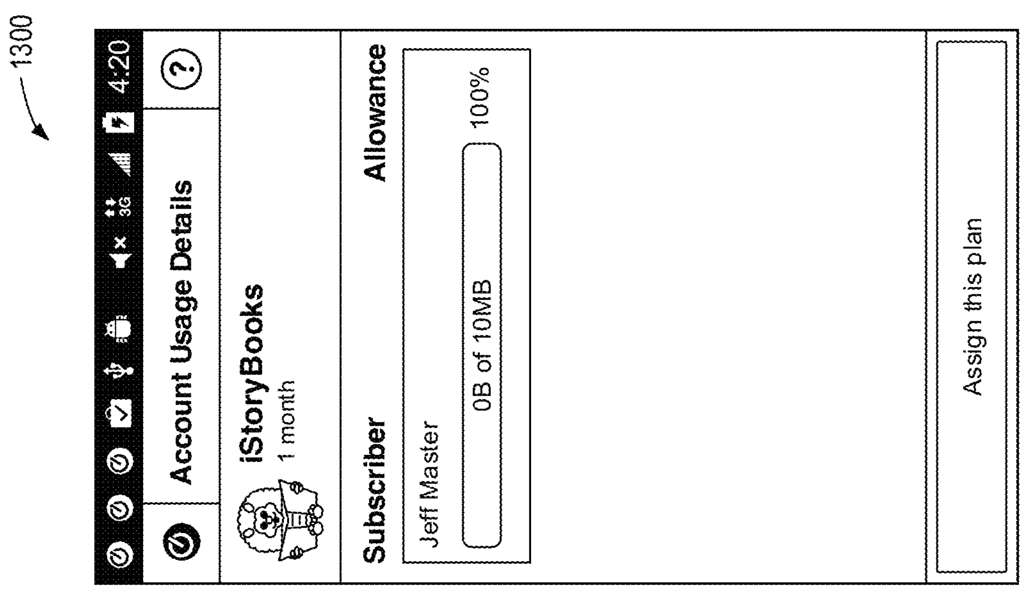

FIG. 188 illustrates a representative screen displaying an option to assign an already assigned service plan in accordance with some embodiments.

Figure 189:
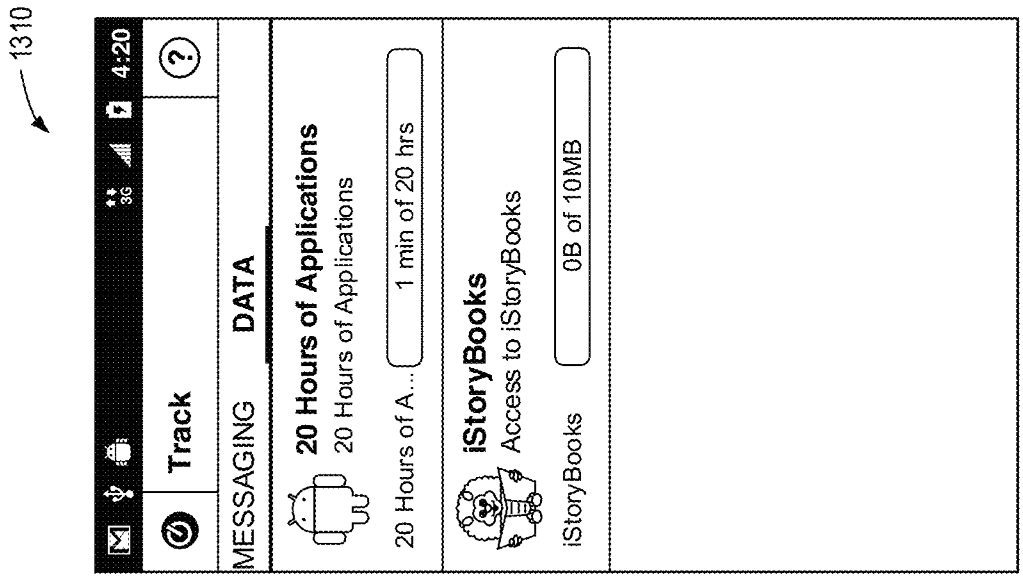

FIG. 189 illustrates a representative screen displaying tracking of service usage of a child device in accordance with some embodiments.

Figure 190:
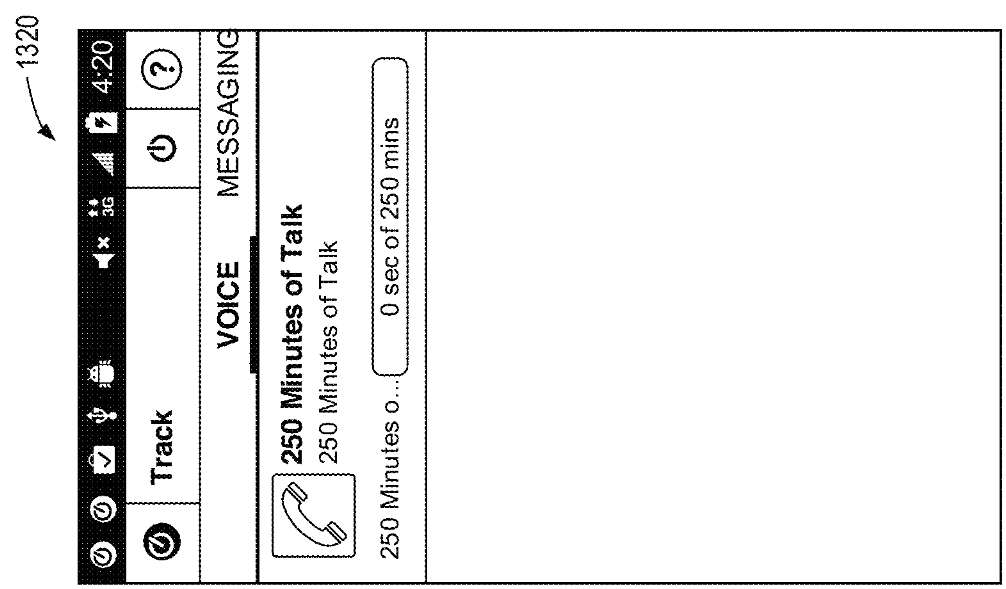
Figure 191:
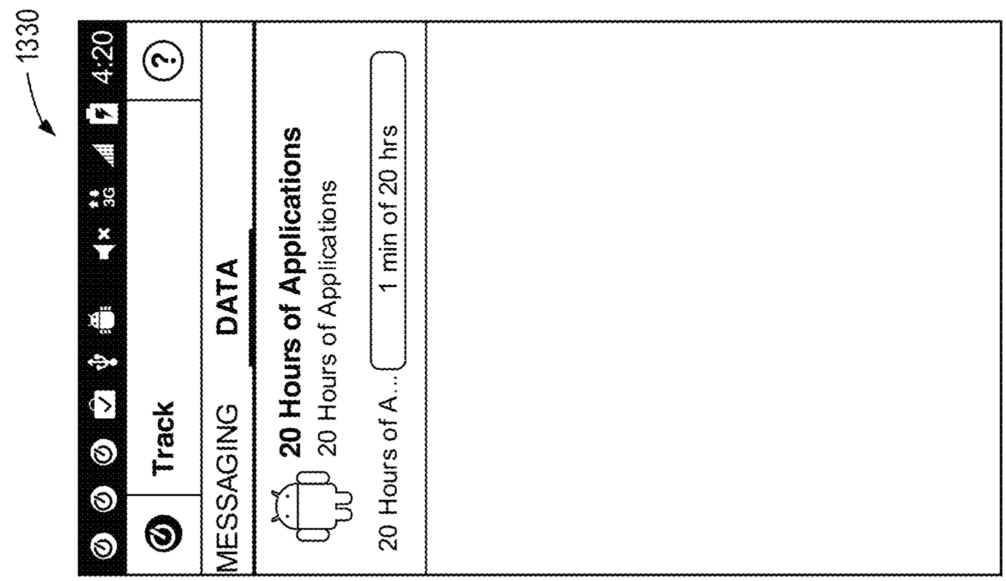

FIGS. 190 and 191 illustrate representative screens displaying service usage for different service plan categories in accordance with some embodiments.

Figure 192:
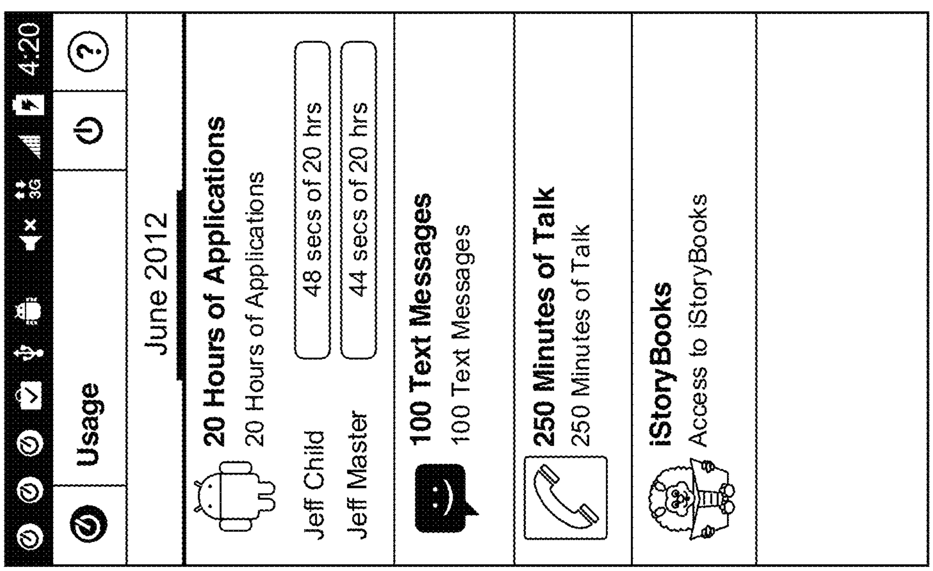

FIG. 192 illustrates a representative screen displaying service usage for multiple service plans and multiple mobile wireless communication devices during a particular time period in accordance with some embodiments.

Figure 193:
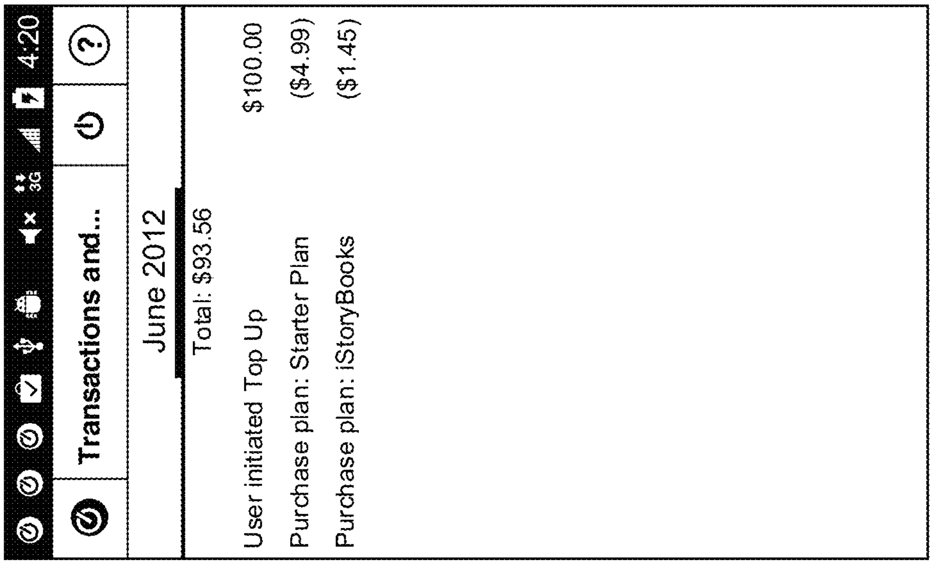

FIG. 193 illustrates a representative screen displaying service plan transactions and balances in accordance with some embodiments.

Figure 194:
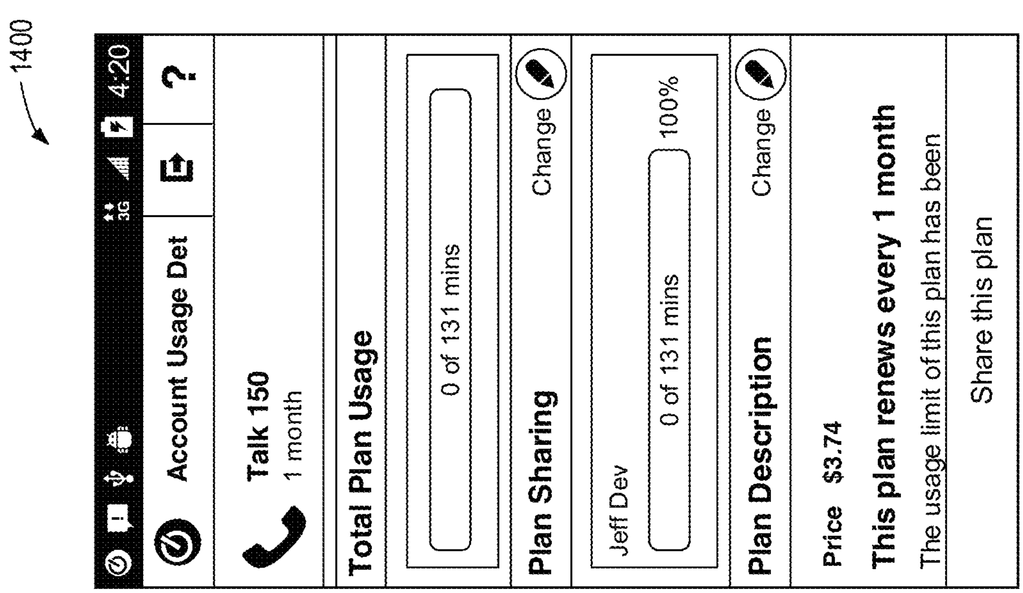

FIG. 194 illustrates a representative screen displaying account usage details for and an option to share a particular service plan in accordance with some embodiments.

Figure 195:
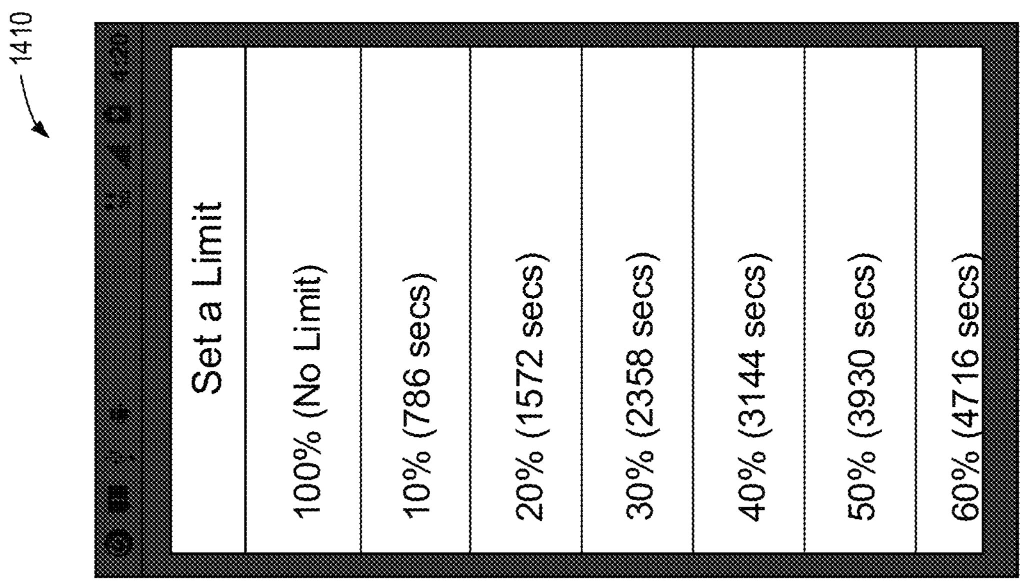

FIG. 195 illustrates a representative screen providing options to specify a percentage of service usage of a service plan to share with another mobile wireless communication device in accordance with some embodiments.

Figure 196:
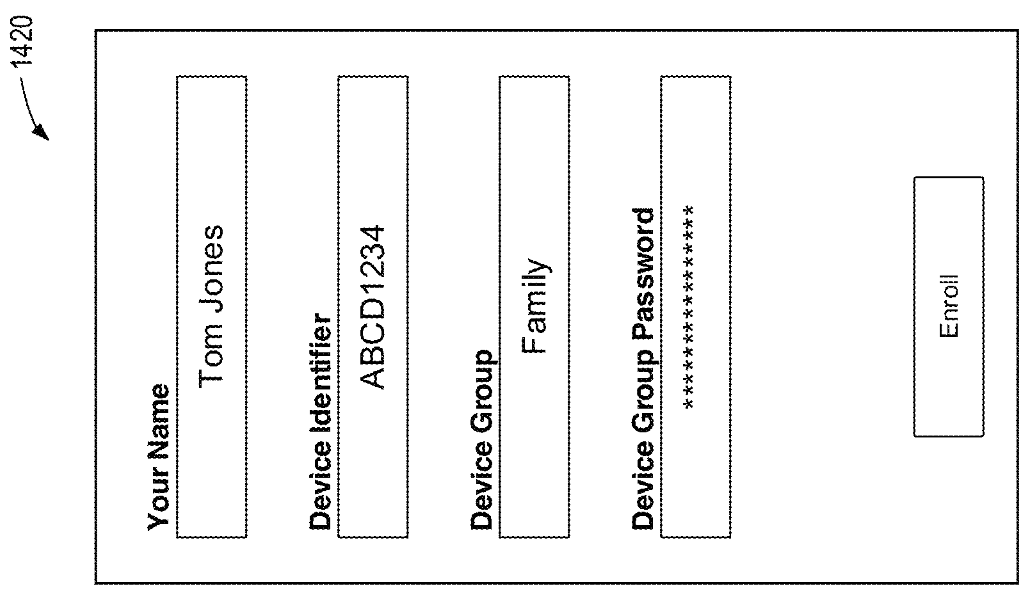

FIG. 196 illustrates a representative screen providing inputs for enrolling a mobile wireless communication device with a master service account in accordance with some embodiments.

Figure 197:
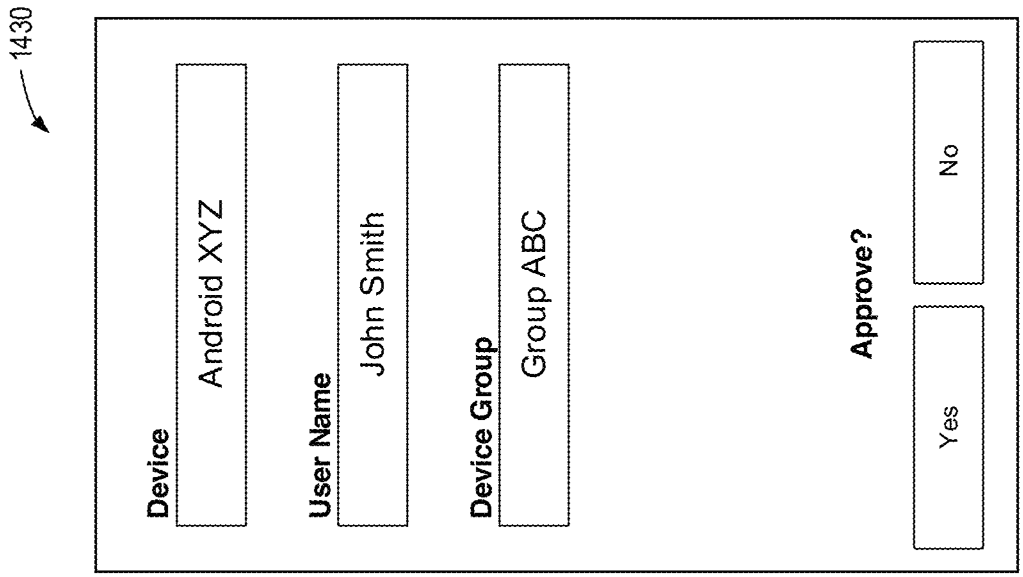

FIG. 197 illustrates a representative screen providing information about another mobile wireless communication device requesting enrollment with a master service account in accordance with some embodiments.

Figure 198:
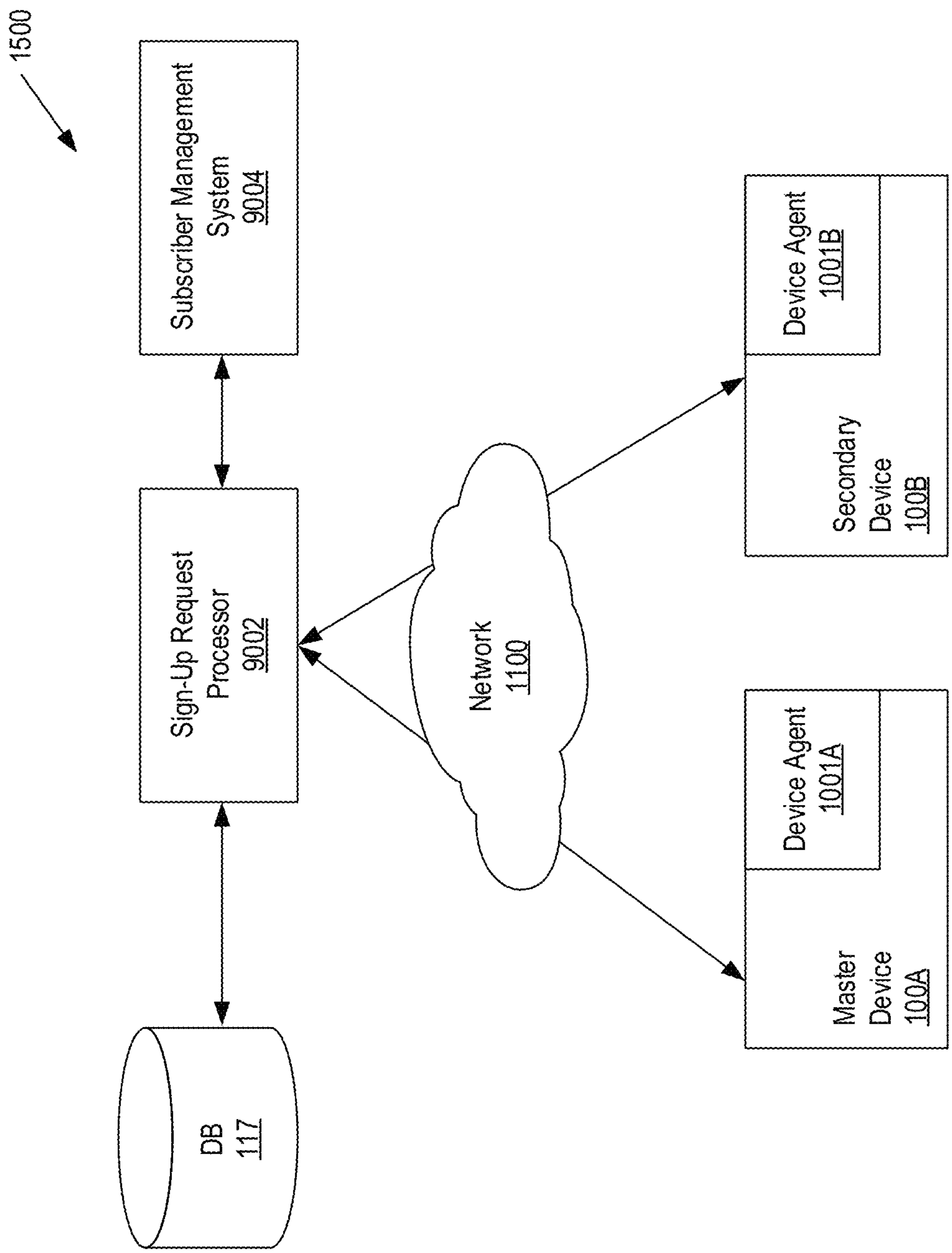

FIG. 198 illustrates a representative system configuration providing for a master-subscriber-initiated or a secondary-subscriber-initiated on-device multi-device service sign-up procedure in accordance with some embodiments.

Figure 199:
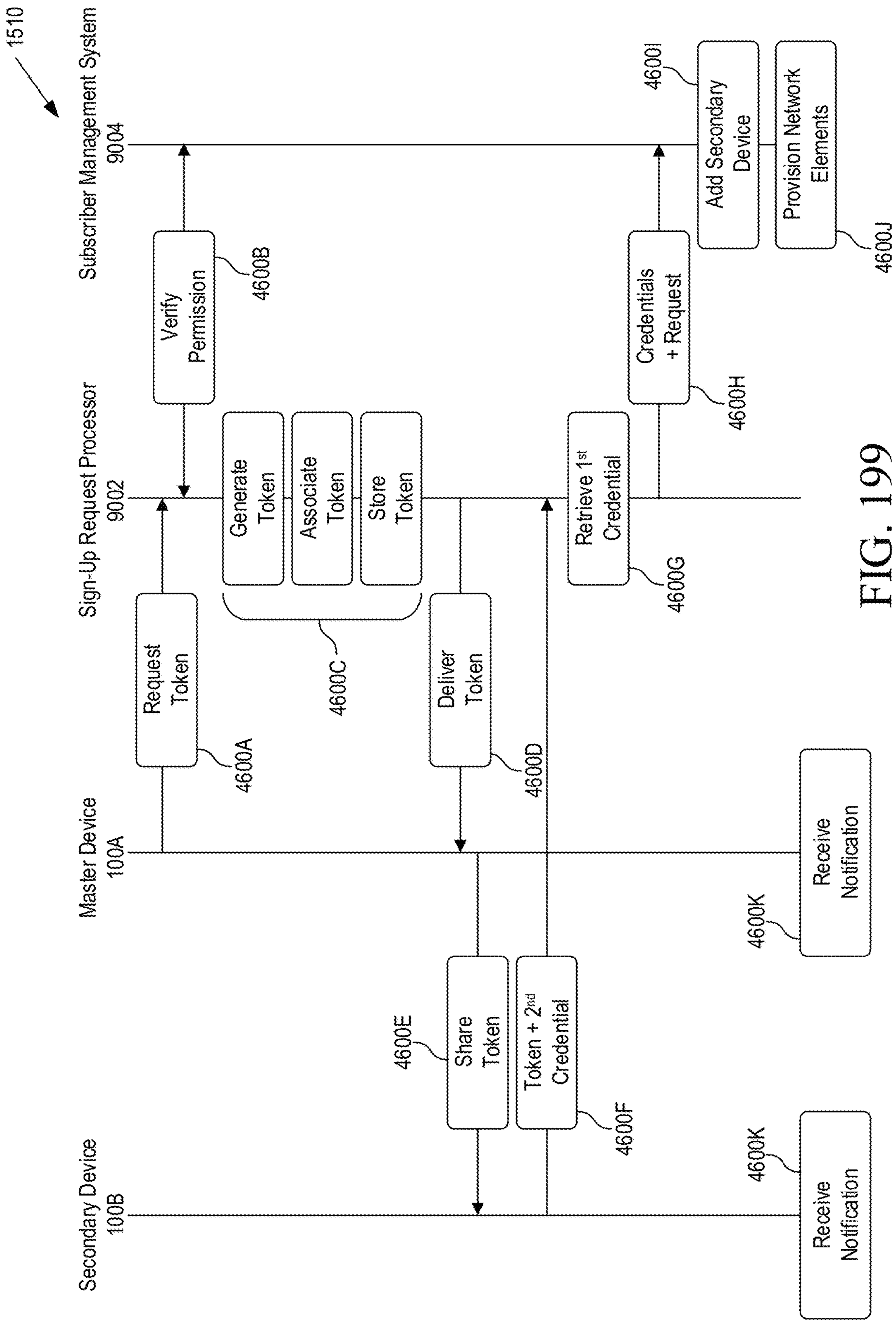

FIG. 199 illustrates a representative flow chart illustrating exchange and processing of messages by the system configuration of FIG. 198 to add a secondary device to a master service account, device group, or multi-device service plan initiated by a master device subscriber in accordance with some embodiments.

Figure 200:
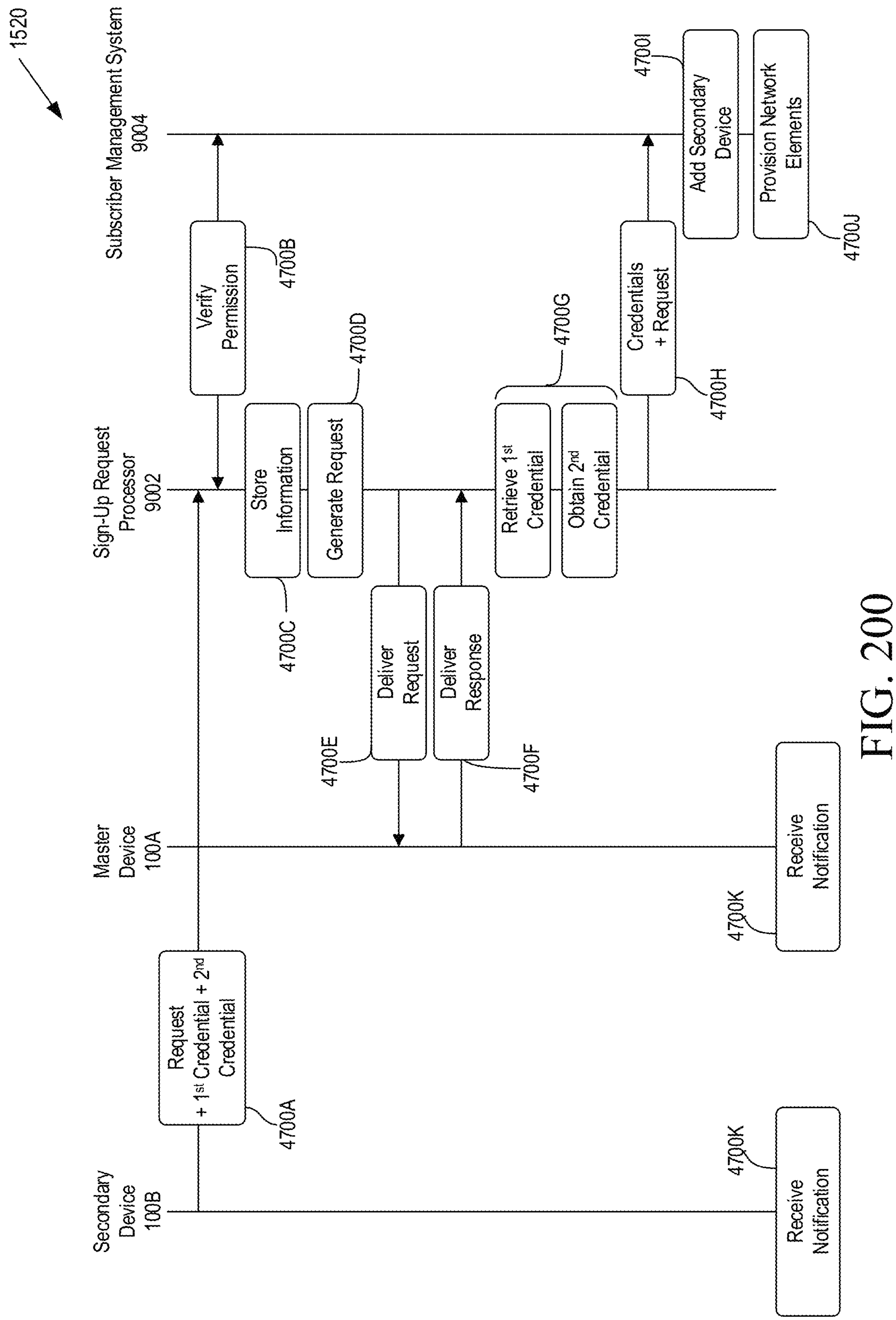

FIG. 200 illustrates a representative flow chart illustrating exchange and processing of messages by the system configuration of FIG. 198 to add a secondary device to a master service account, device group, or multi-device service plan initiated by a secondary device subscriber in accordance with some embodiments.

Figure 201:
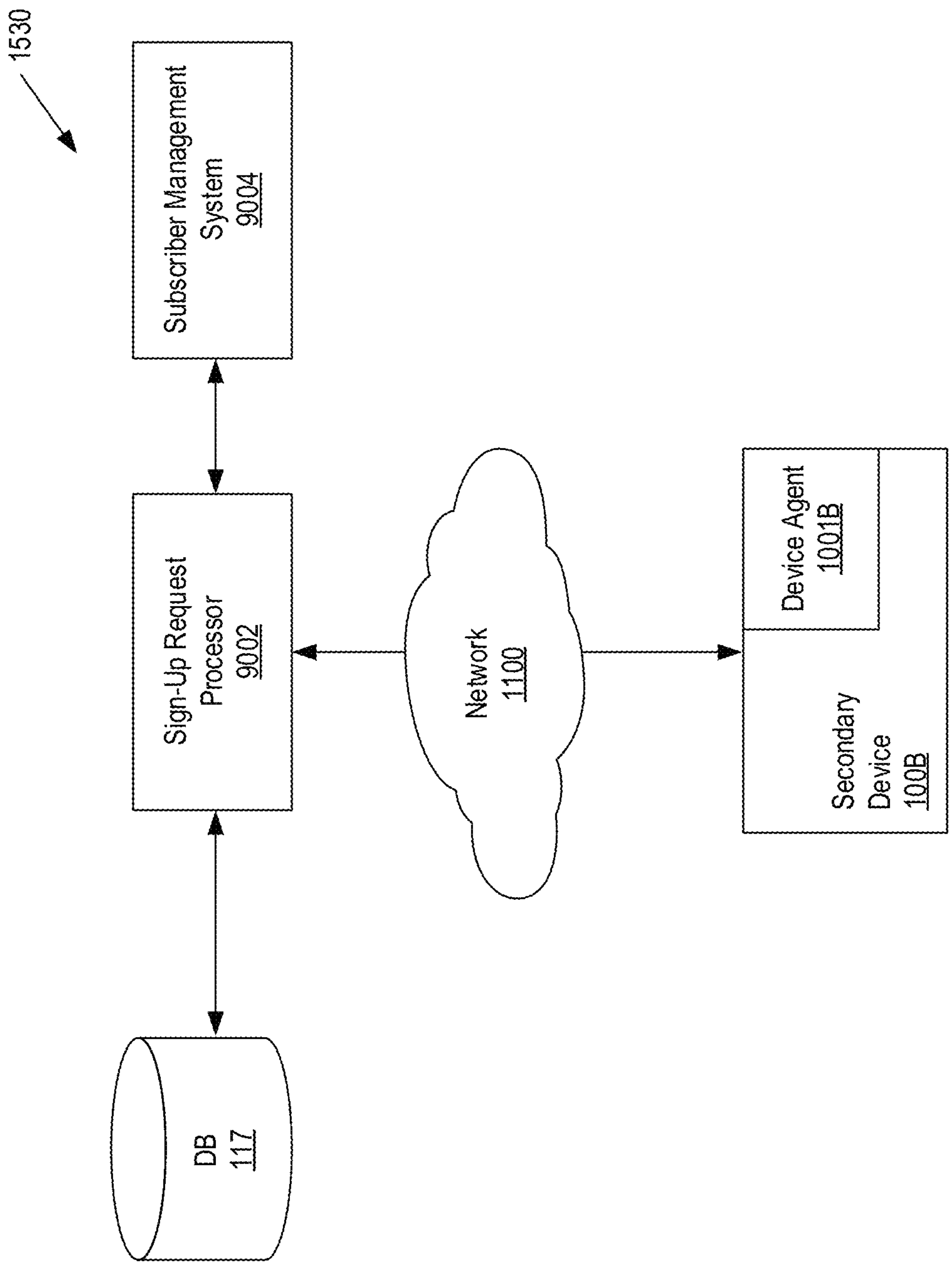

FIG. 201 illustrates a representative system configuration providing for adding a secondary device to a master service account, device group, or multi-device service plan without the use or involvement of a master device in accordance with some embodiments.

Figure 202:
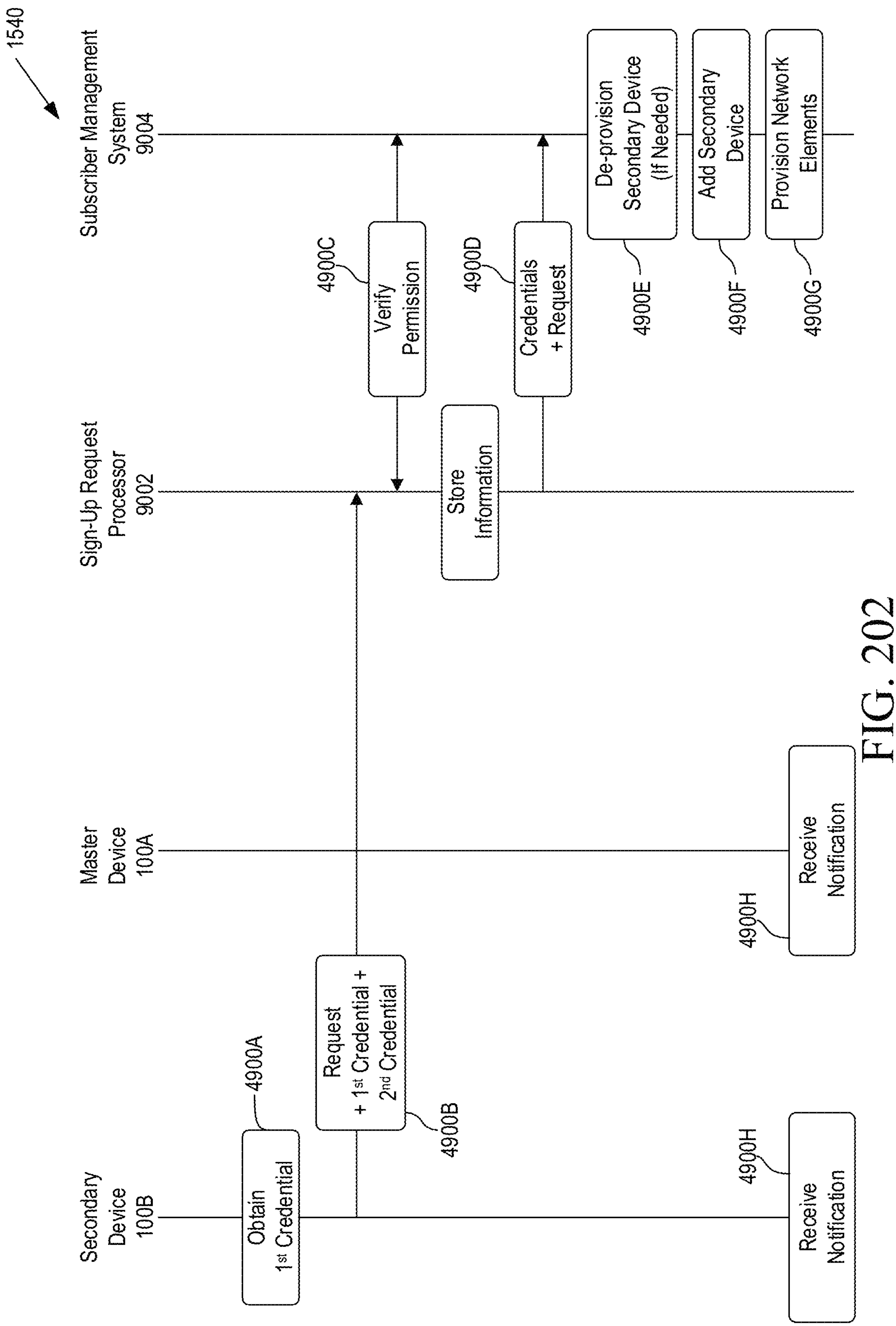

FIG. 202 illustrates a representative flow chart illustrating exchange and processing of messages by the system configuration of FIG. 201 to add a secondary device to a master service account, device group, or multi-device service plan initiated by a secondary device subscriber in accordance with some embodiments.

Figure 203:
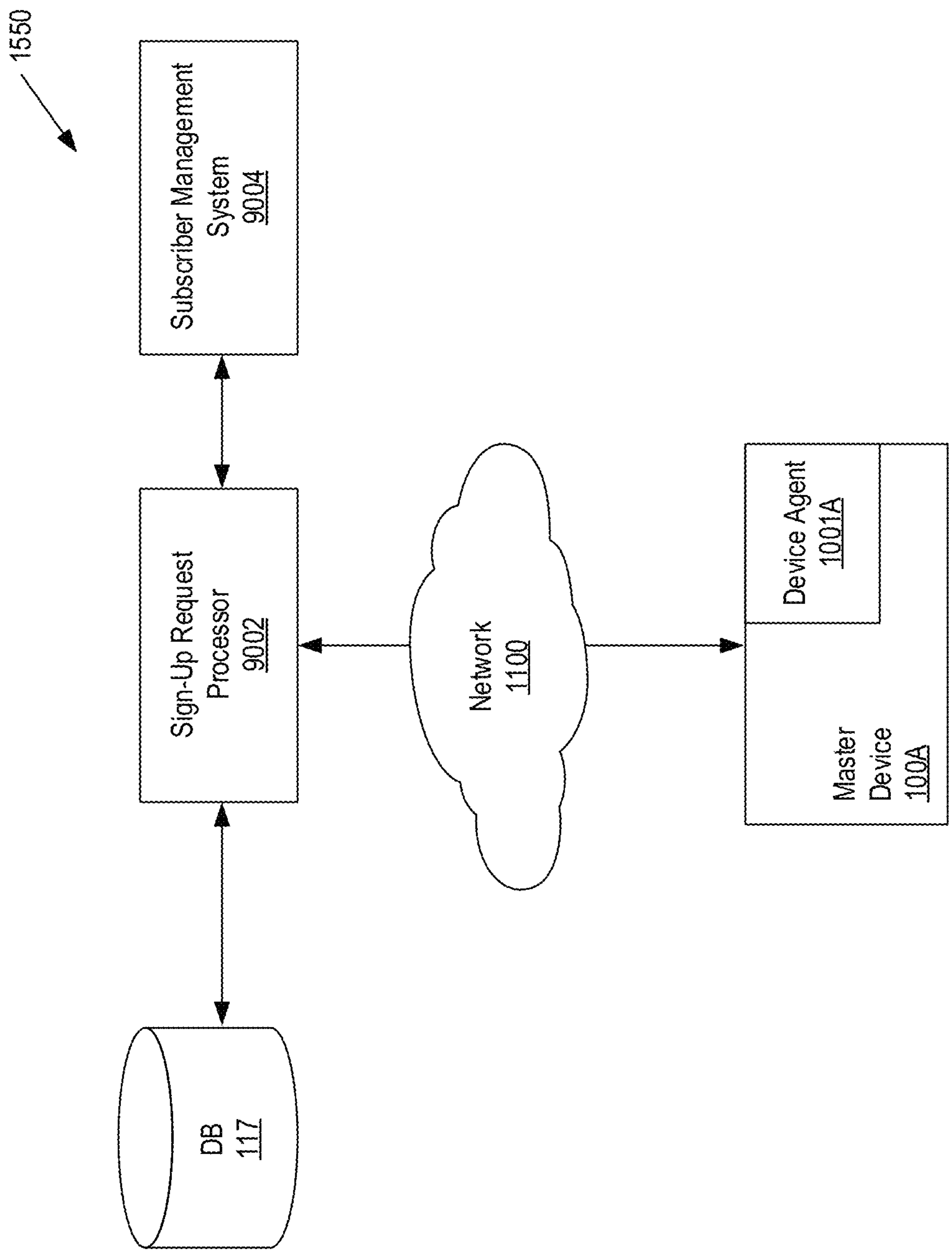

FIG. 203 illustrates a representative system configuration providing for adding a secondary device to a master service account, device group, or multi-device service plan entirely from a master device in accordance with some embodiments.

Figure 204:
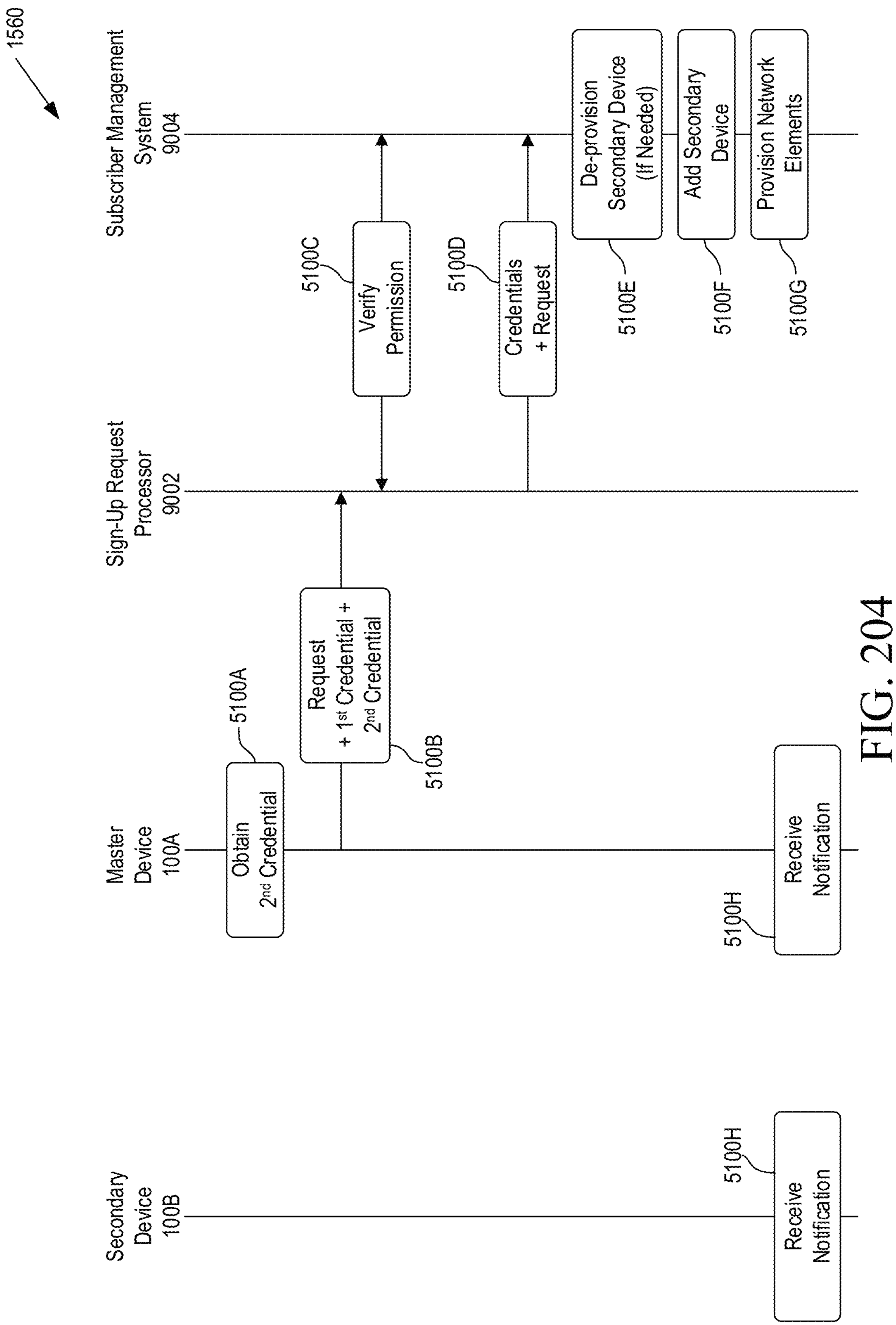

FIG. 204 illustrates a representative flow chart illustrating exchange and processing of messages by the system configuration of FIG. 203 to add a secondary device to a master service account, device group, or multi-device service plan initiated by the master device in accordance with some embodiments.

Figure 205:
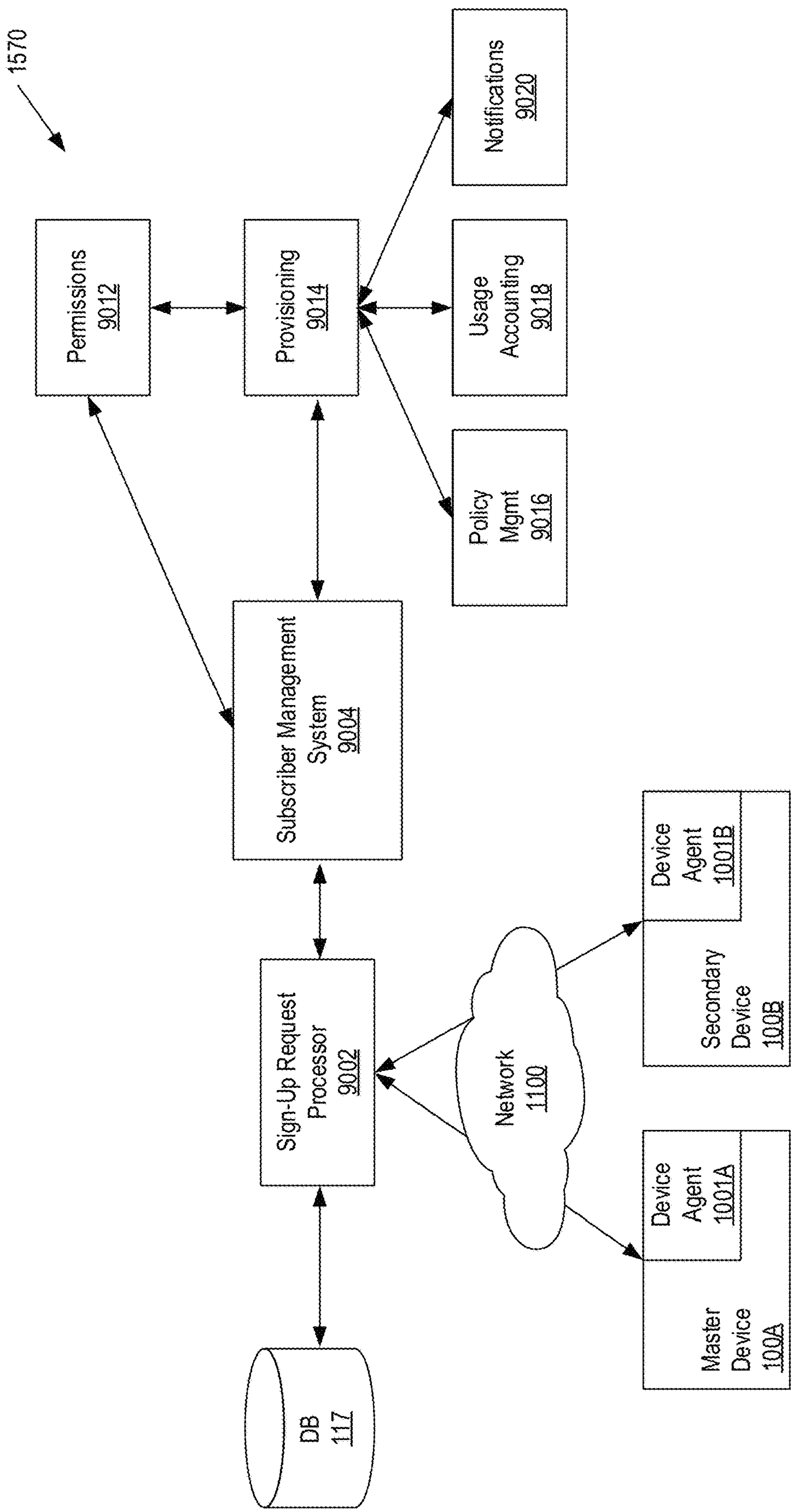

FIG. 205 illustrates a representative system configuration for service plan management for multiple mobile wireless communication devices in accordance with some embodiments.

Figure 206:
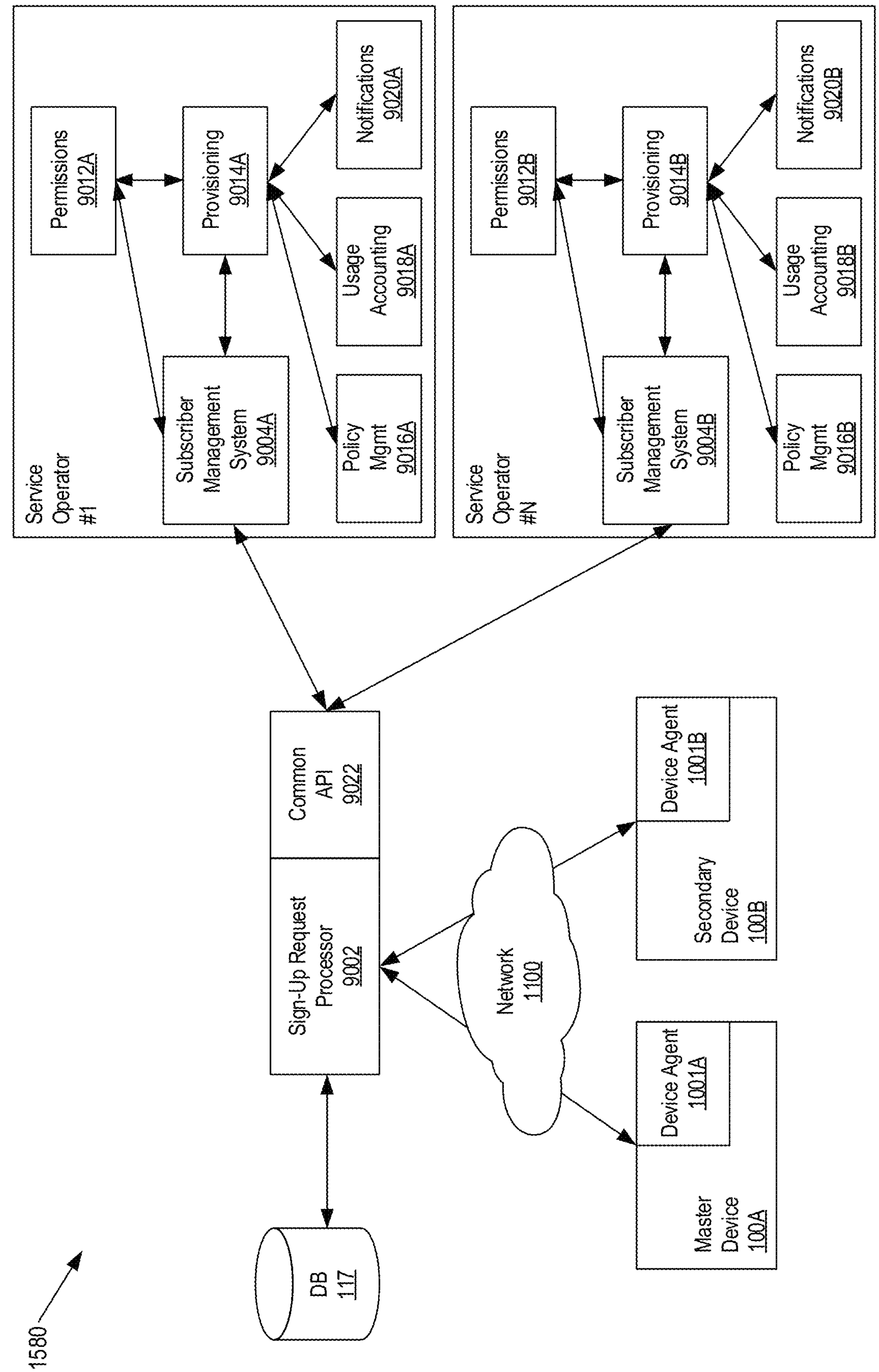

FIG. 206 illustrates a representative system configuration for service plan management for multiple mobile wireless communication devices and multiple service operators through a common application programming interface (API) in accordance with some embodiments.

Figure 207:
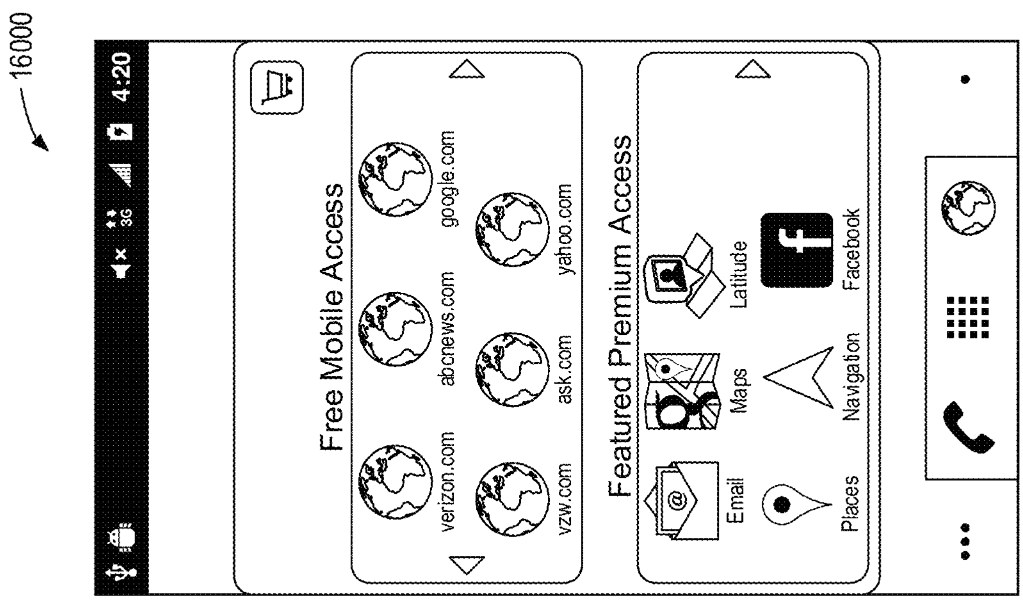

FIG. 207 illustrates a two-partition user interface service launch partition shown on a secondary device screen in accordance with some embodiments.

Figure 208:
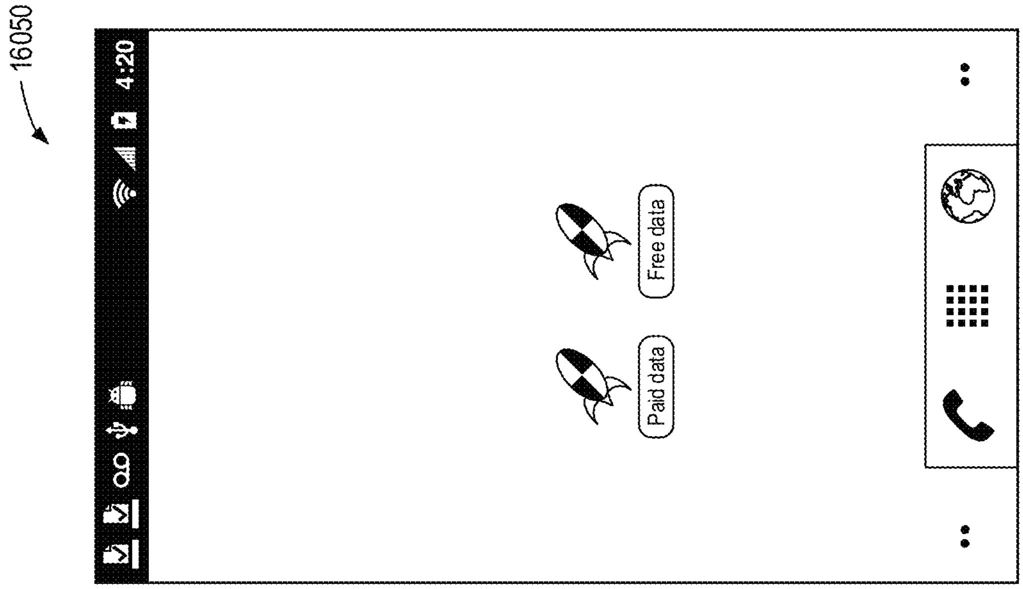

FIG. 208 illustrates service launch objects shown on a device main screen in accordance with some embodiments.

Figure 209:
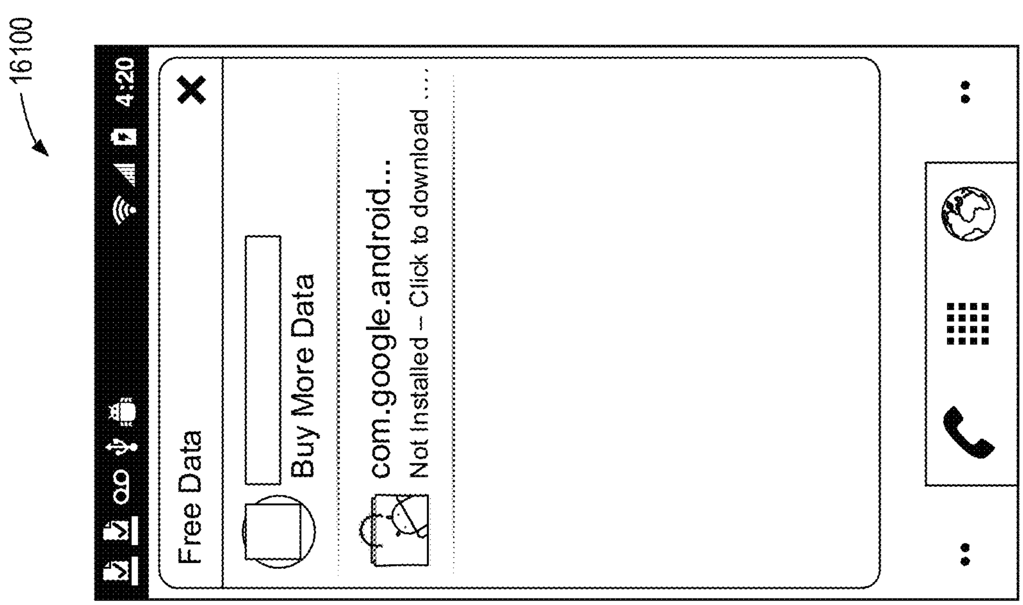

FIG. 209 illustrates an expanded screen view of a free data services single partition user interface service launch partition for the "Free Data" launch object illustrated in FIG. 208 in accordance with some embodiments.

Figure 210:
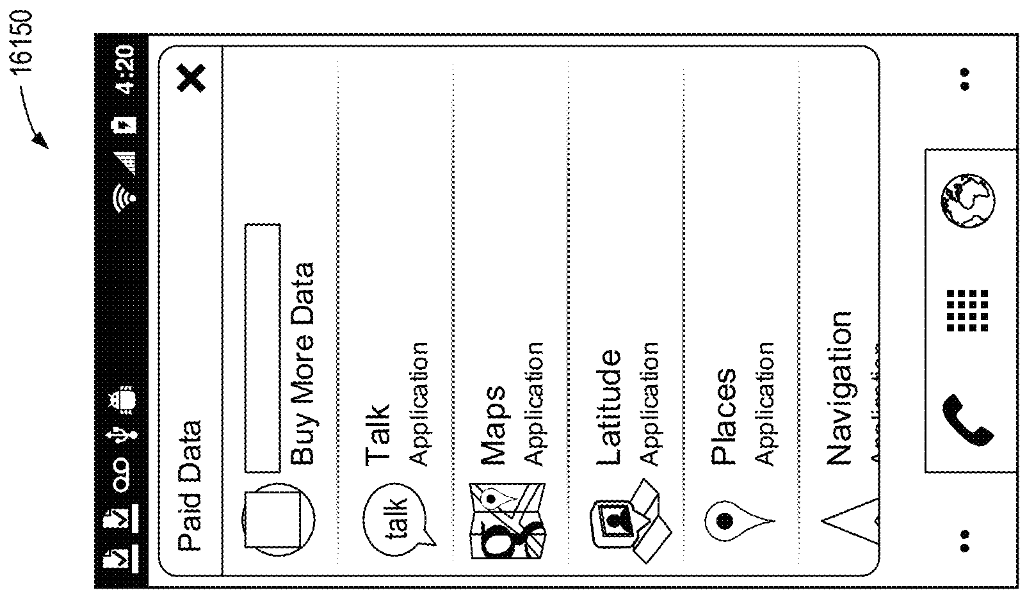

FIG. 210 illustrates an expanded screen view of a paid data services single partition user interface service launch partition for the "Paid Data" launch object illustrated in FIG. 208 in accordance with some embodiments.

Figure 211:
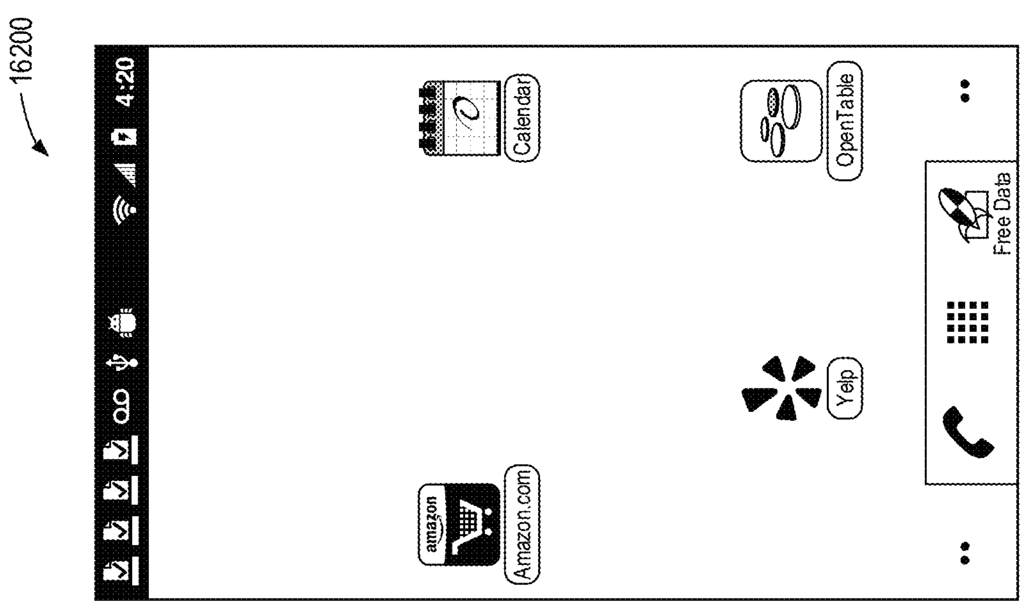

FIG. 211 illustrates a screen displaying a service launch object shown in a permanent launch user interface area in accordance with some embodiments.

Figure 212:
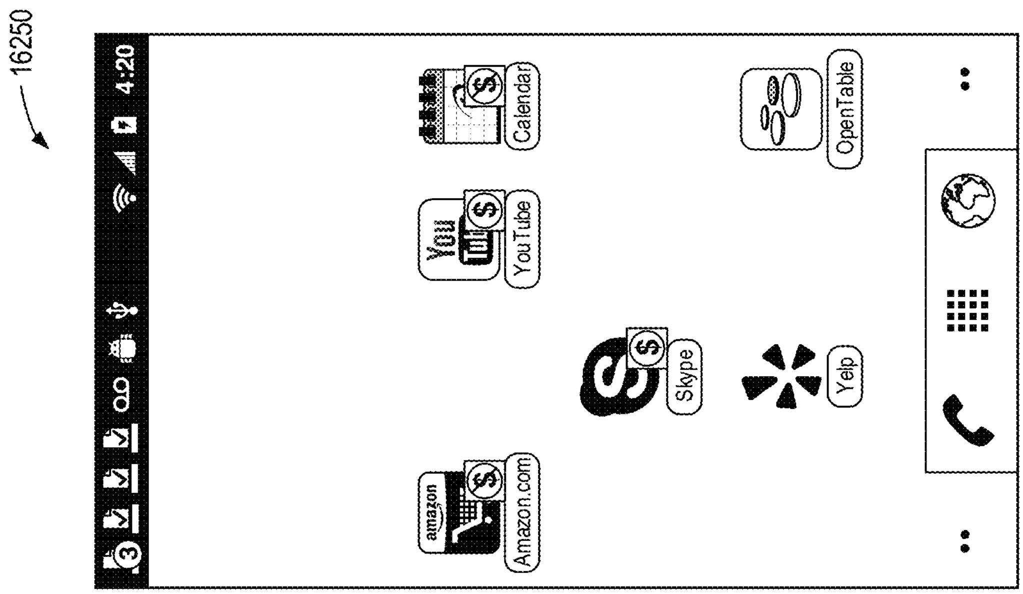

FIG. 212 illustrates a screen displaying a service launch object icon appearance modification (in this example, to indicate paid access vs. sponsored access services) in accordance with some embodiments.

Figure 213:
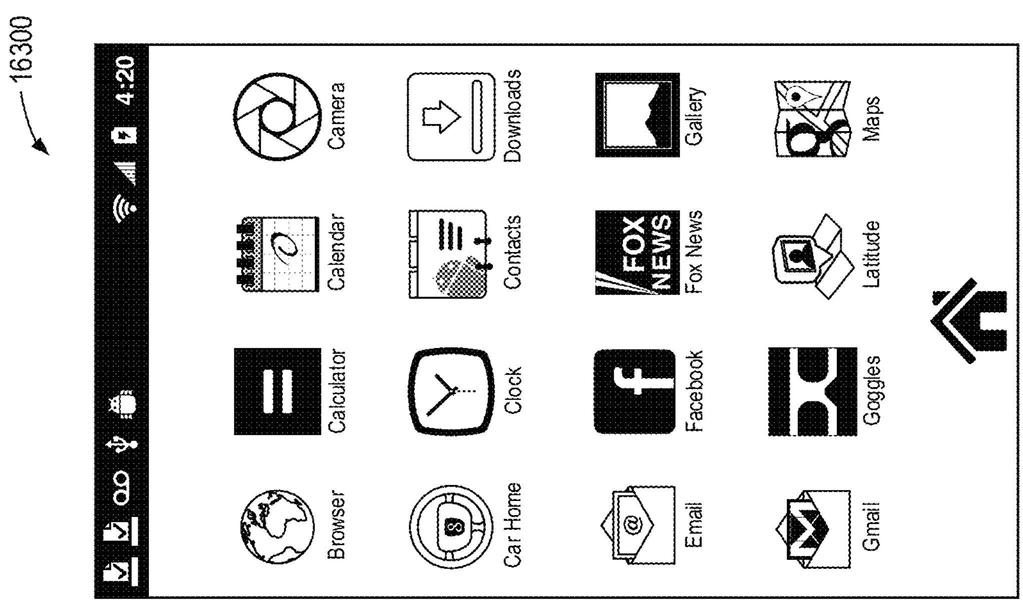

FIG. 213 illustrates a screen displaying a service launch object in an application stable in accordance with some embodiments.

Figure 214:
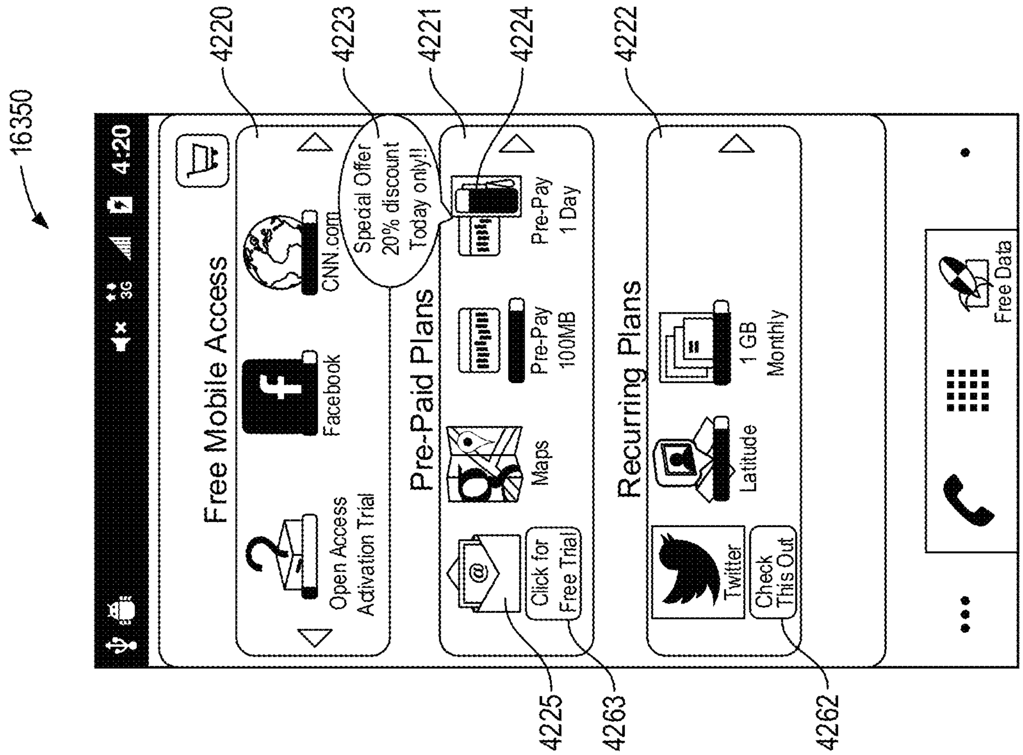

FIG. 214 illustrates a screen displaying various proximity messages in accordance with some embodiments.

Figure 215:
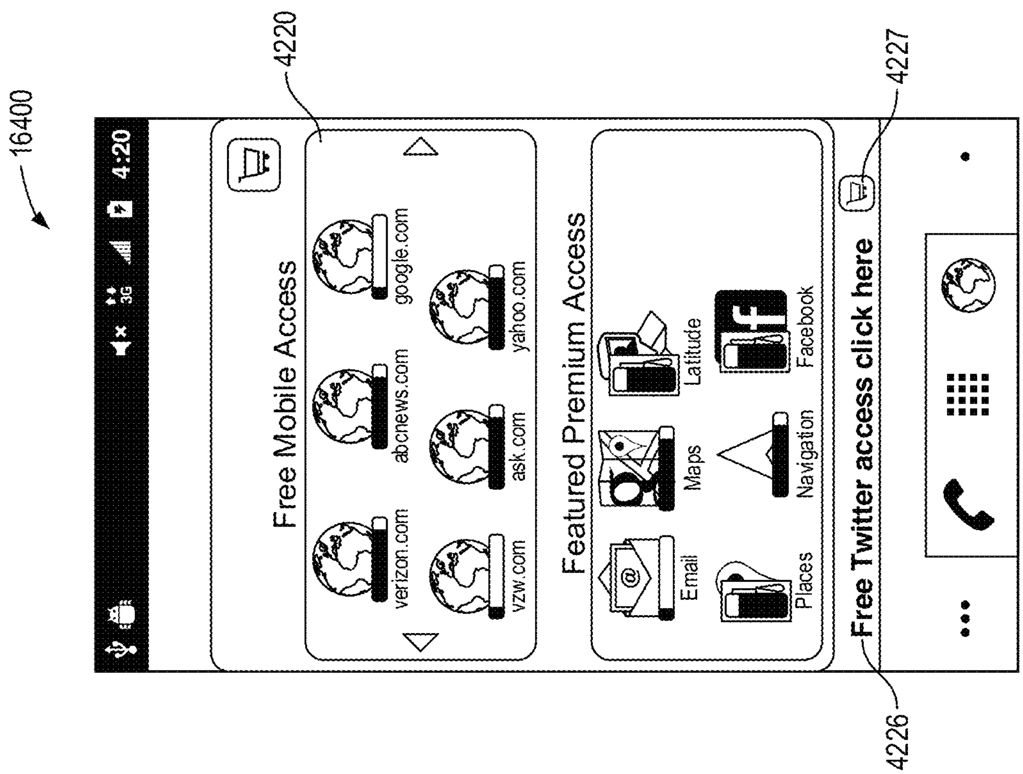

FIG. 215 illustrates a screen displaying a two-partition user interface service launch partition with a service object notification message in accordance with some embodiments.

Figure 216:
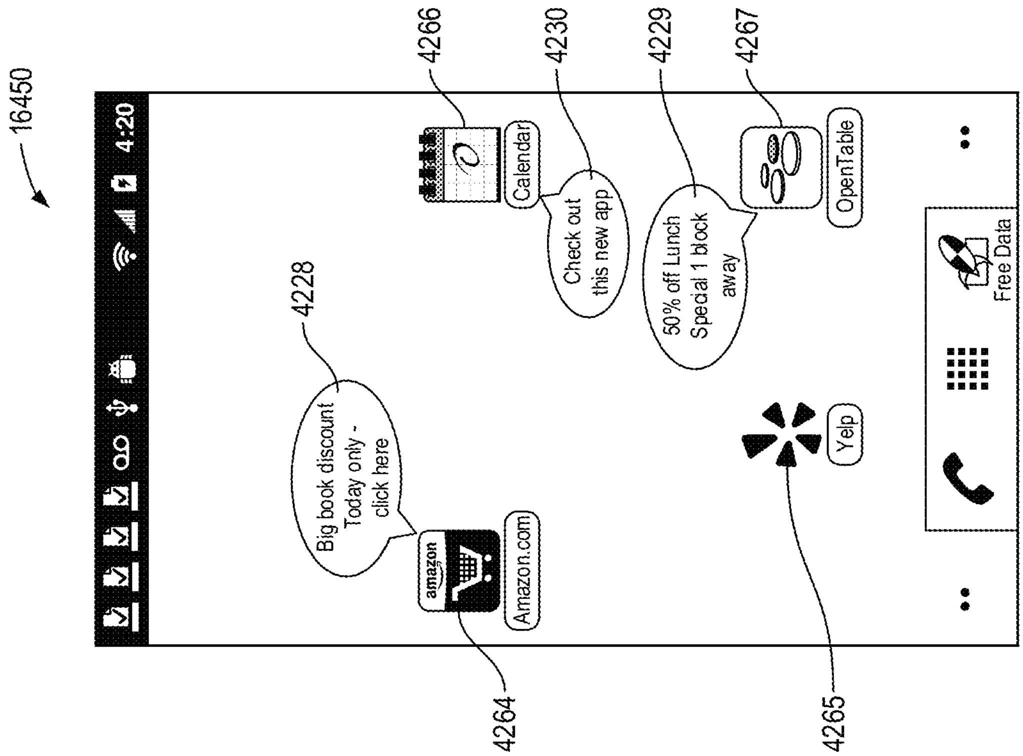

FIG. 216 illustrates a screen displaying service and application marketing messages on service launch object icons located in a main device screen and a permanent launch bar in accordance with some embodiments.

Figure 217:
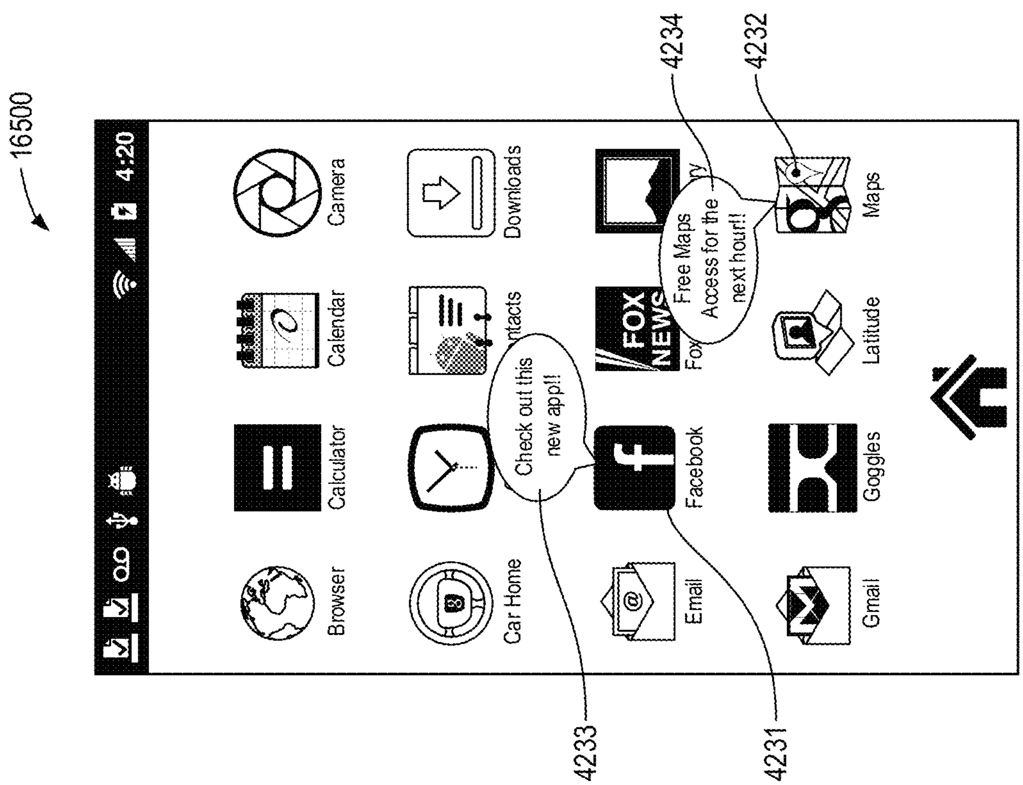

FIG. 217 illustrates a screen displaying service and application marketing messages on service launch object icons located in an application stable in accordance with some embodiments.

Figure 218:
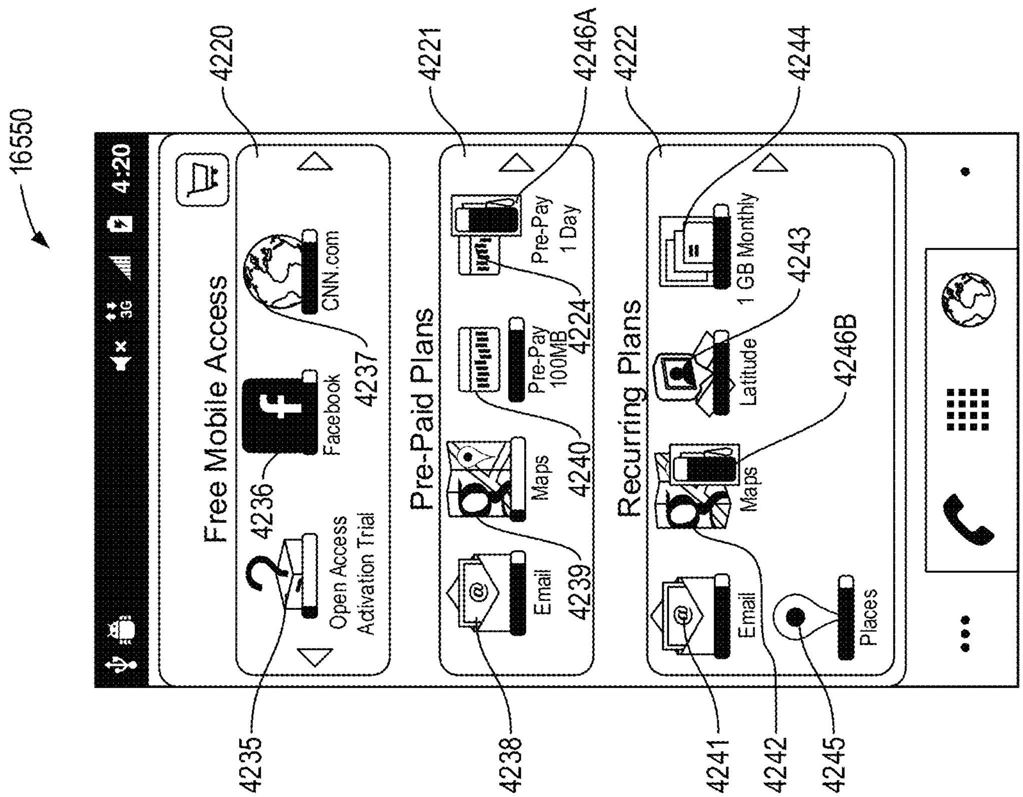

FIG. 218 illustrates a screen displaying a usage indication and purchase feature on service launch objects in accordance with some embodiments.

Figure 219:
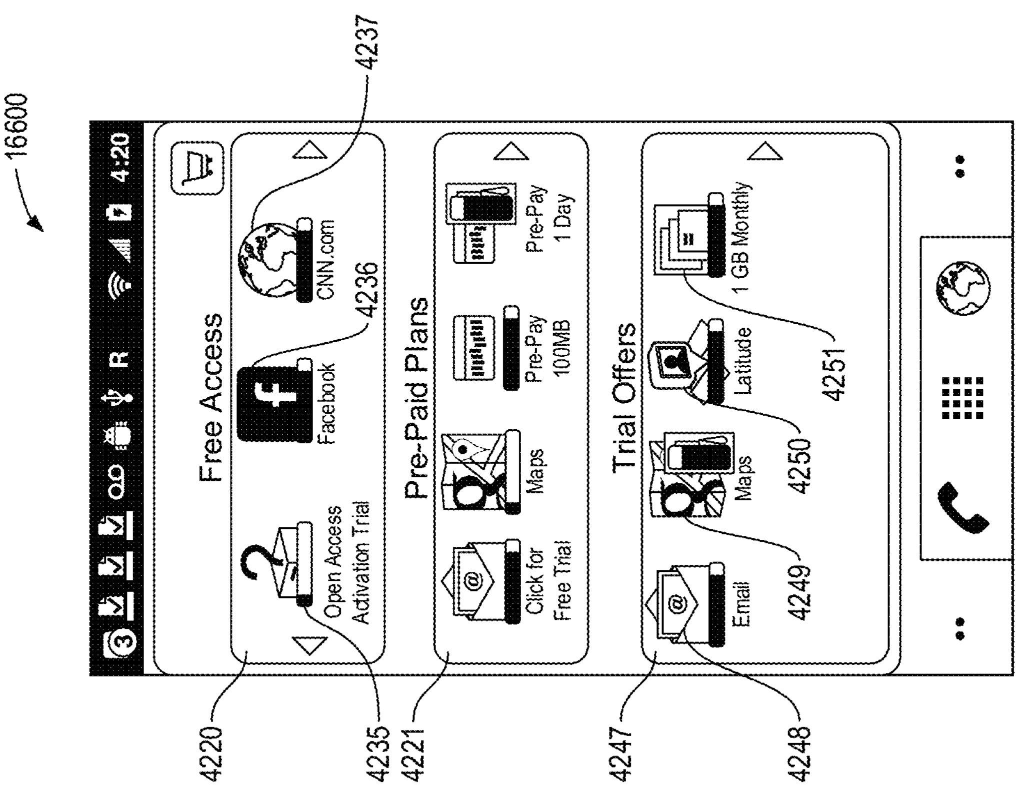

FIG. 219 illustrates a screen displaying a three-partition user interface service launch partition that includes sponsored or free services, paid services, and trial offer services in accordance with some embodiments.

Figure 220:
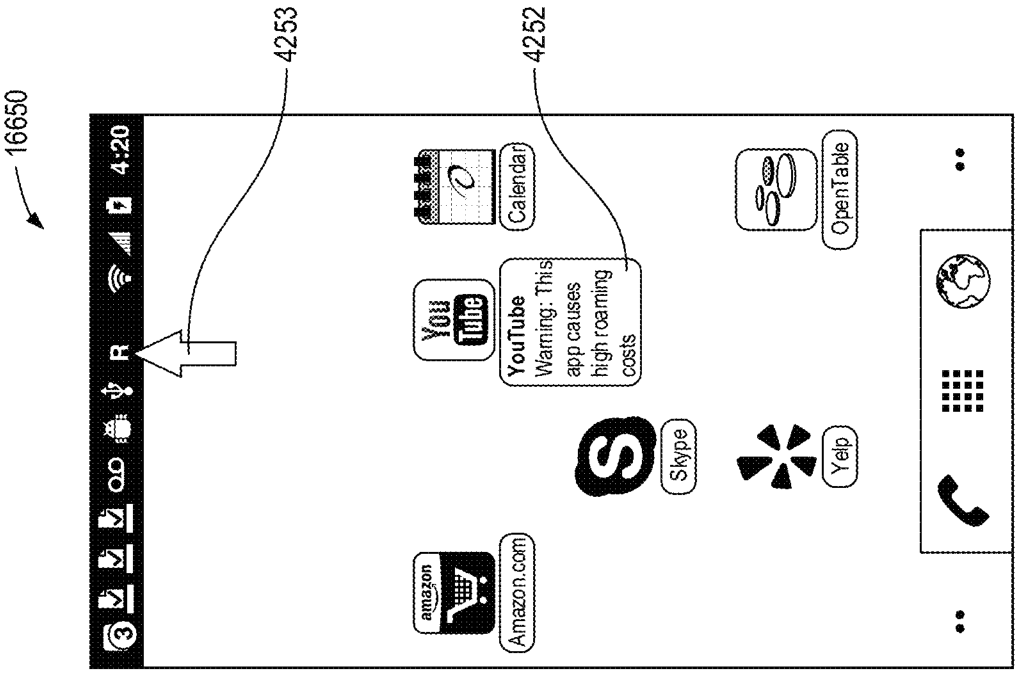

FIG. 220 illustrates a screen displaying a service launch object notification message with a service launch object specific warning on service cost in a present network state (in this case, a roaming usage warning for a high data usage application and a highlight UI icon to emphasize roaming state) according to embodiments.

Figure 221:
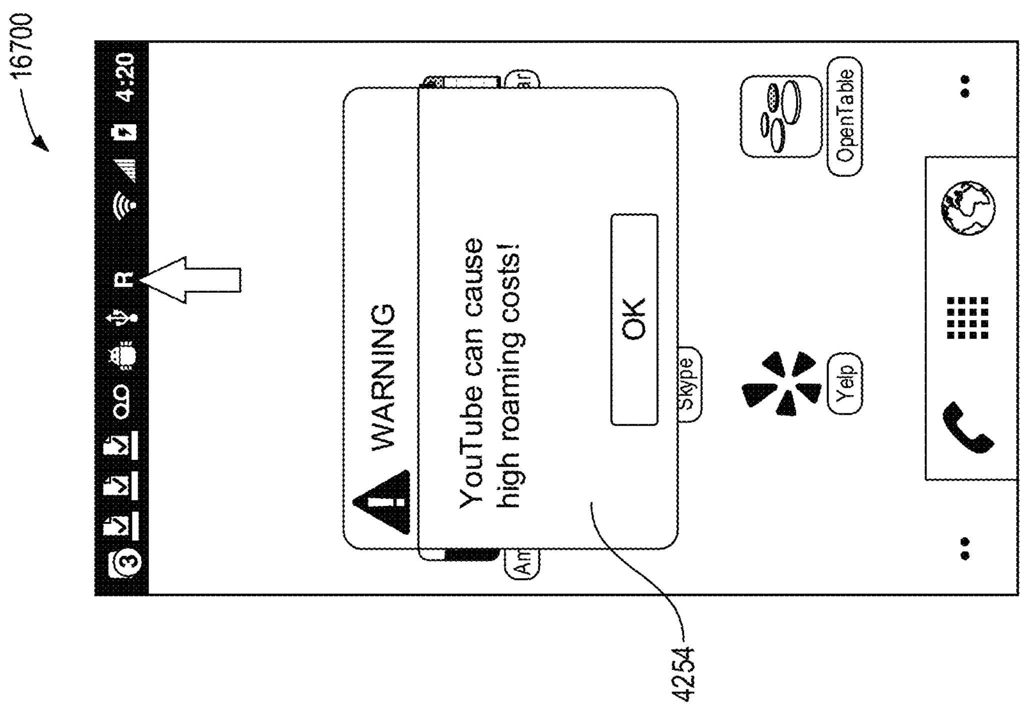

FIG. 221 illustrates a screen displaying a service launch object secondary notification message displayed after a user chooses to launch the service or application (in this case, a secondary roaming usage warning for a high data usage service or application) according to embodiments.

Figure 222:
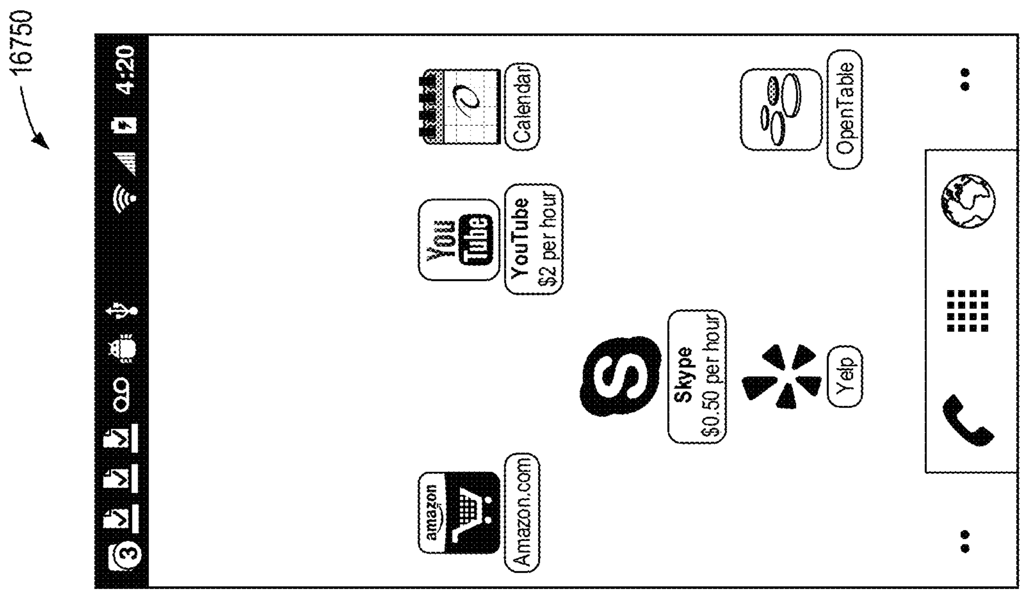

FIG. 222 illustrates a screen displaying a service launch object notification message with access service pricing according to embodiments.

Figure 223:
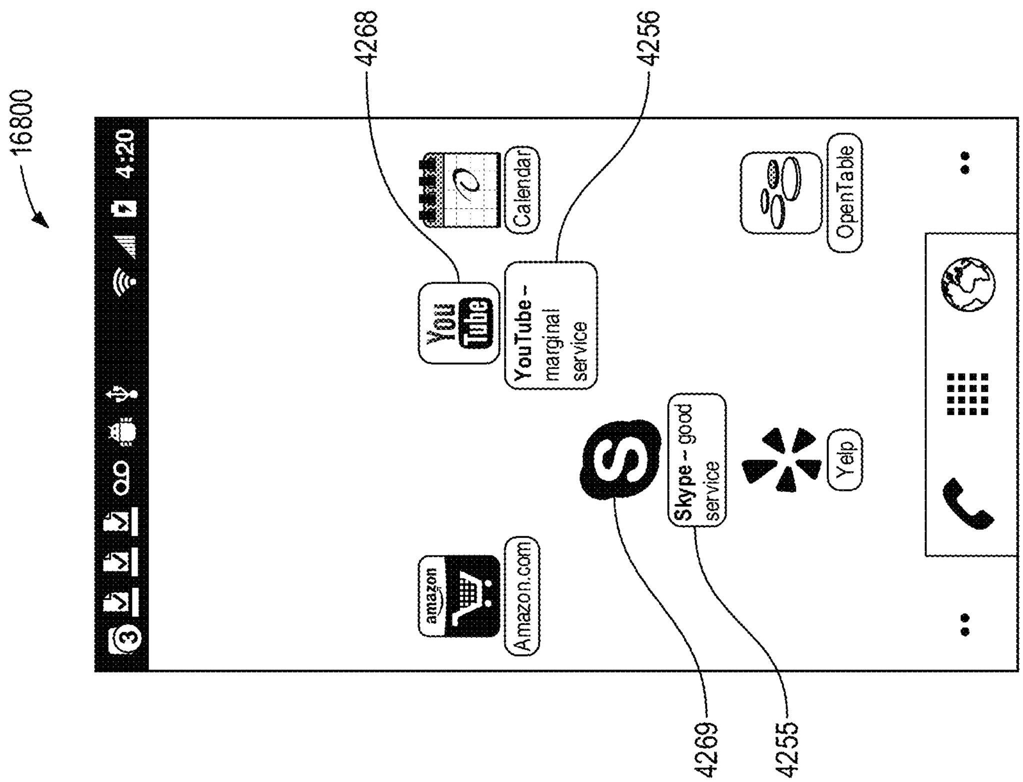

FIG. 223 illustrates a screen displaying service launch object notification messages showing good quality-of-service (QoS) for a voice service and marginal QoS for a video service according to embodiments.

Figure 224:
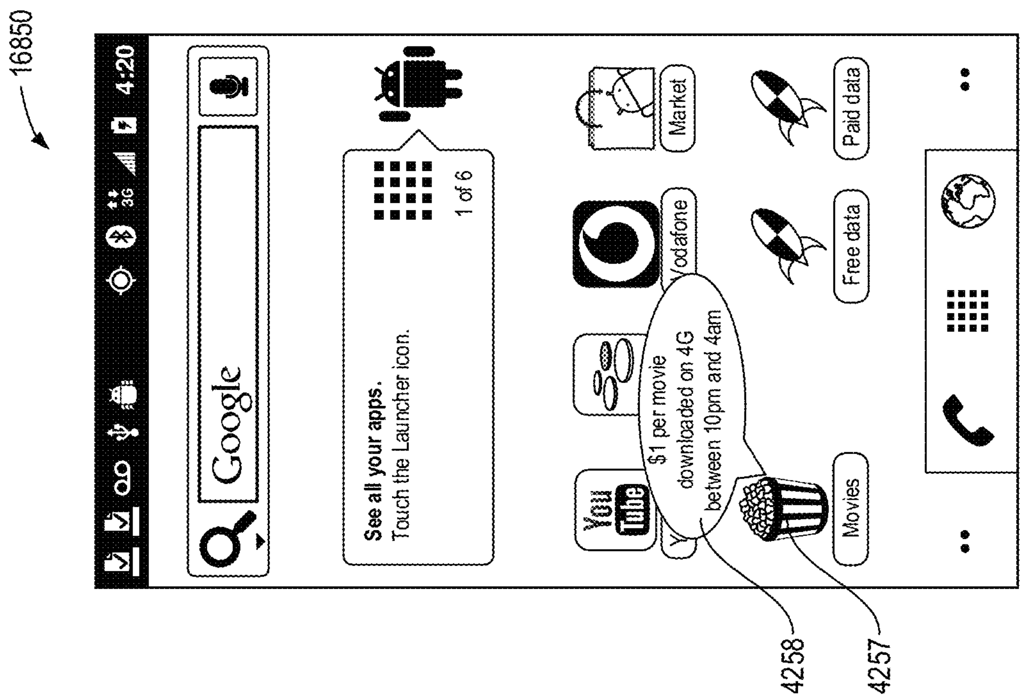

FIG. 224 illustrates a screen displaying a service launch object notification message with special pricing offer message (in this example a time of day based special pricing message) according to embodiments.

Figure 225:
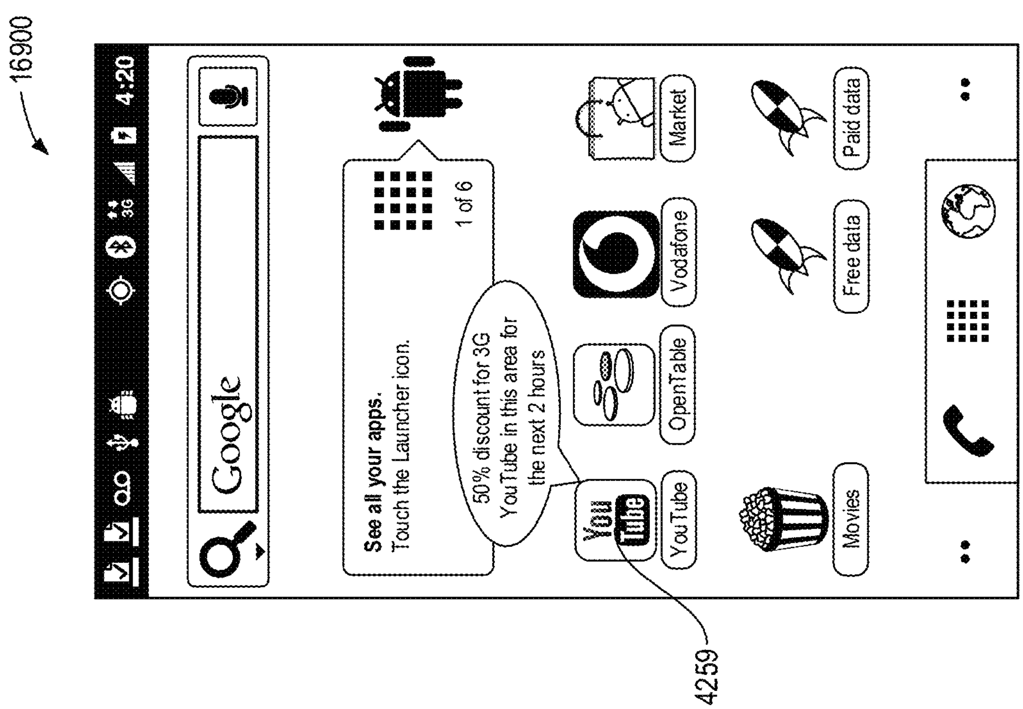

FIG. 225 illustrates a screen displaying a service launch object notification message with geography and time based limited offer message (in this case 50% off YouTube in the current geographic area for the next two hours) according to embodiments.

Figure 226:
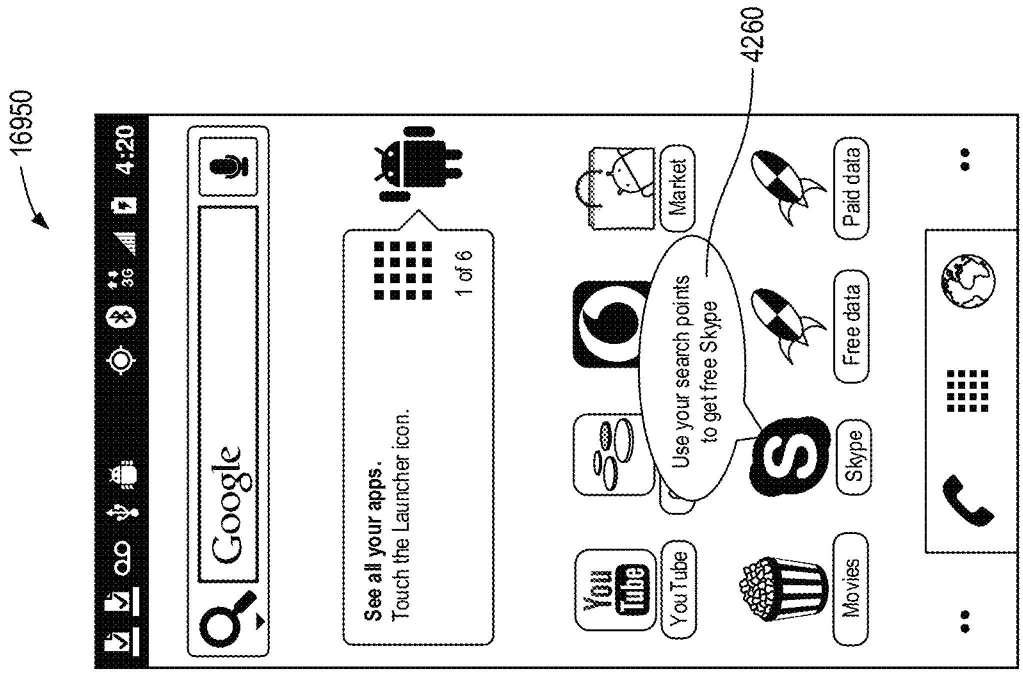

FIG. 226 illustrates a screen displaying a service launch object notification message with special offer to trade service usage points for discounted access services (in this case free Skype in exchange for usage points on browser search where search provider generates ad revenue when user uses the service) according to embodiments.

FIG. 227 illustrates a user interface (UI) location management console UI template for a network manager to define a policy event notification to notify users in accordance with some embodiments.

Figure 228:
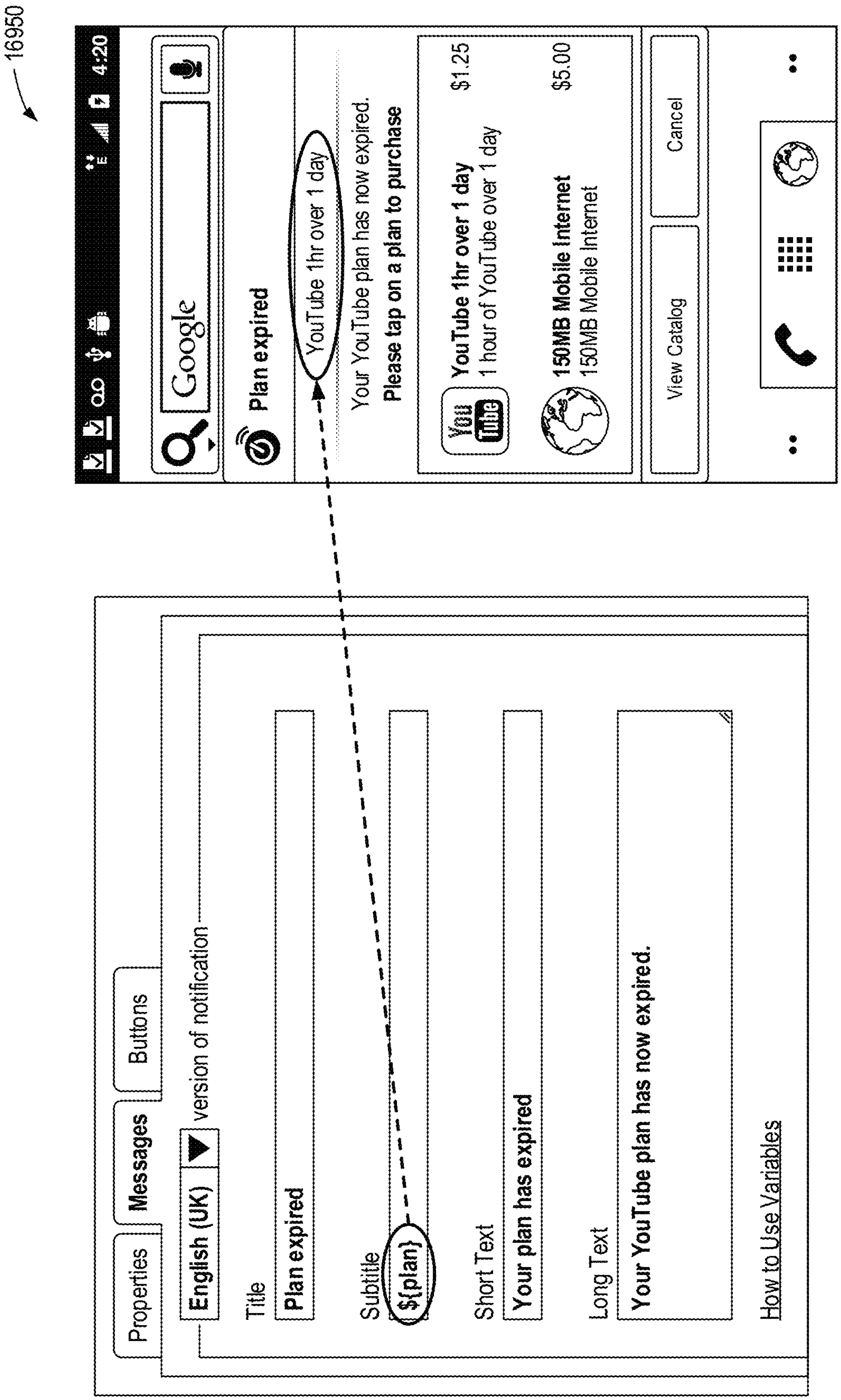

FIG. 228 illustrates a set of screens displaying use of a variable to automatically customize the notification for the associated event in accordance with some embodiments.

Figure 229:
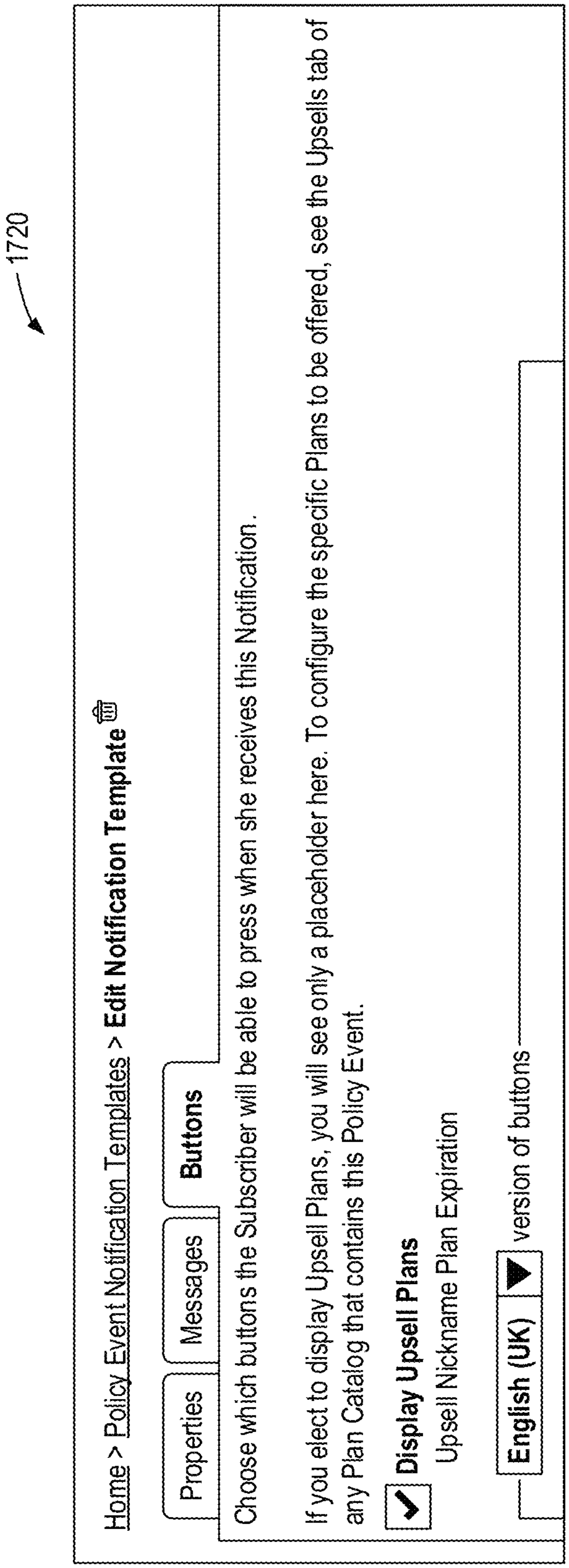

FIG. 229 illustrates a network manager UI environment for displaying upsell plans in accordance with some embodiments.

Figure 230:
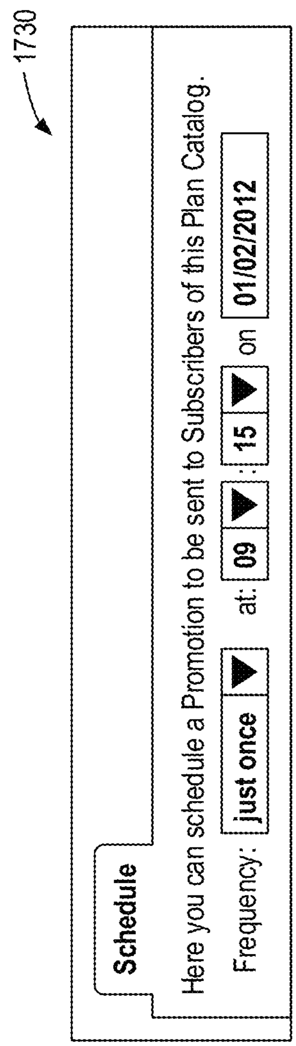

FIG. 230 illustrates a network manager UI environment for displaying promotional notification plan in accordance with some embodiments.

Figure 231:
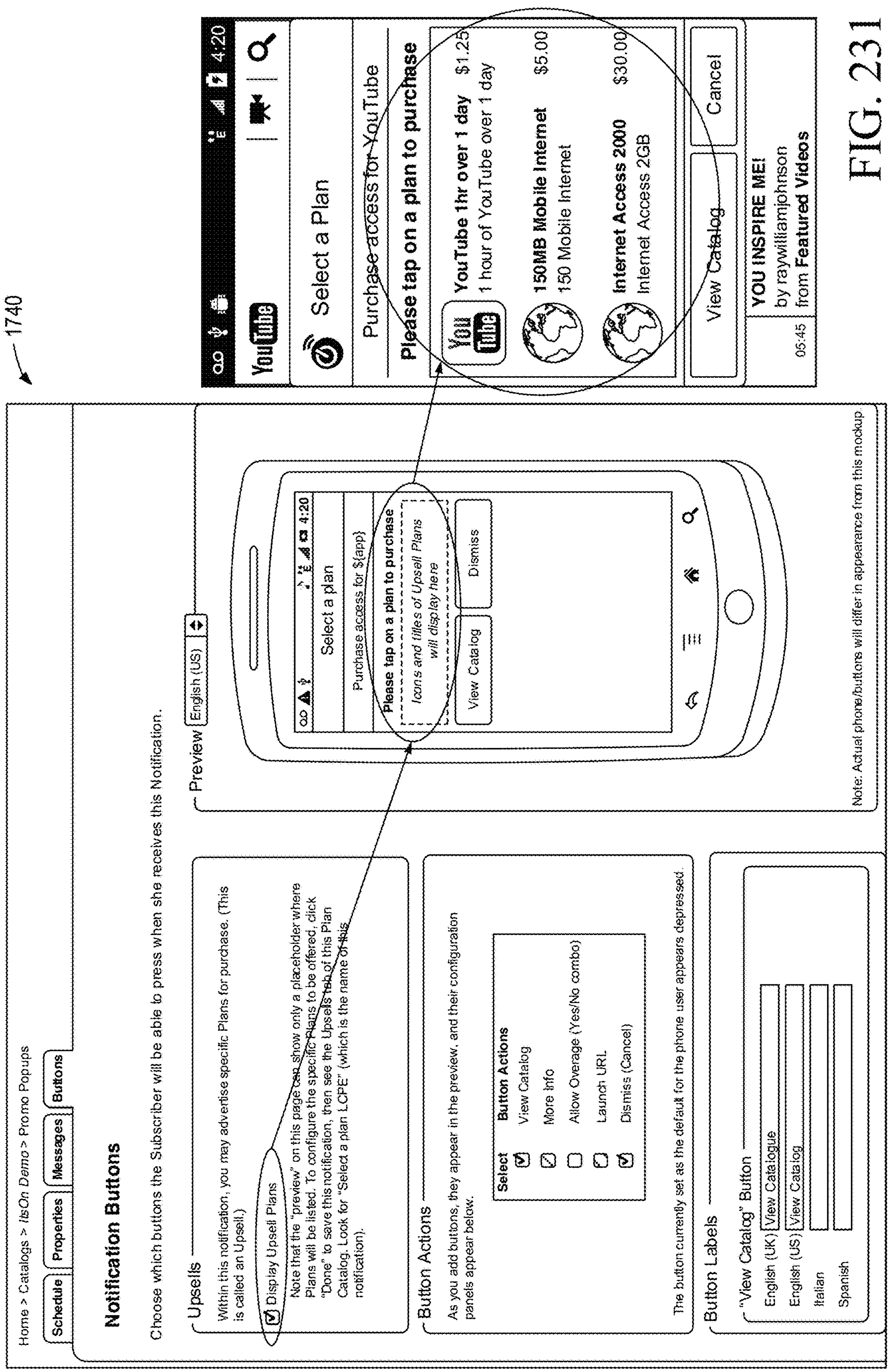

FIG. 231 illustrates a network manager UI environment for displaying notification templates (and associated device views) for defining a lack of capable plan (which may be combined with a offer for a upsell plan) for a desired service or application in accordance with some embodiments.

Figure 232:
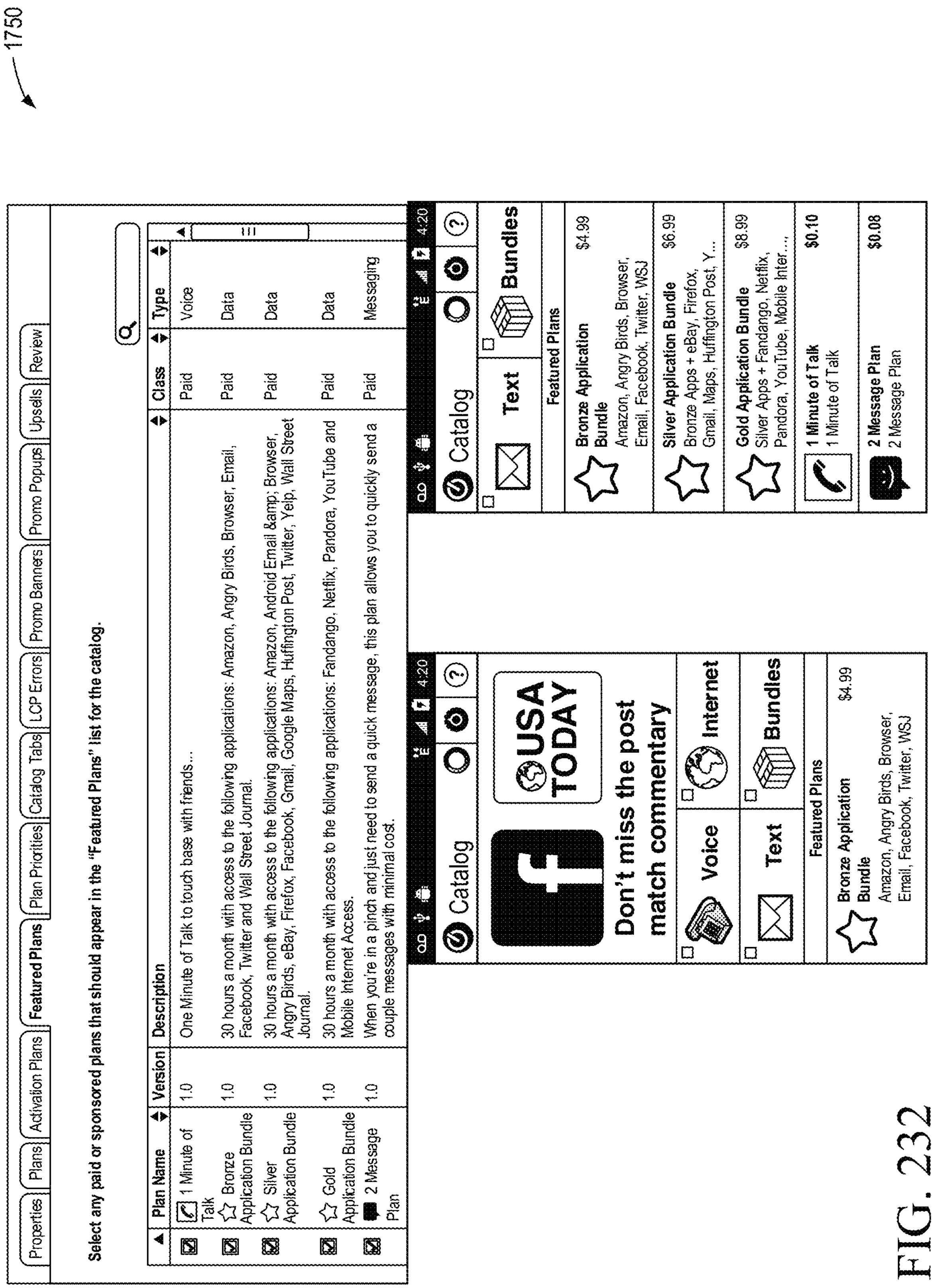

FIG. 232 illustrates a network manager UI environment for displaying notification templates (and associated device views) for defining a featured service or application in accordance with some embodiments.

Figure 233:
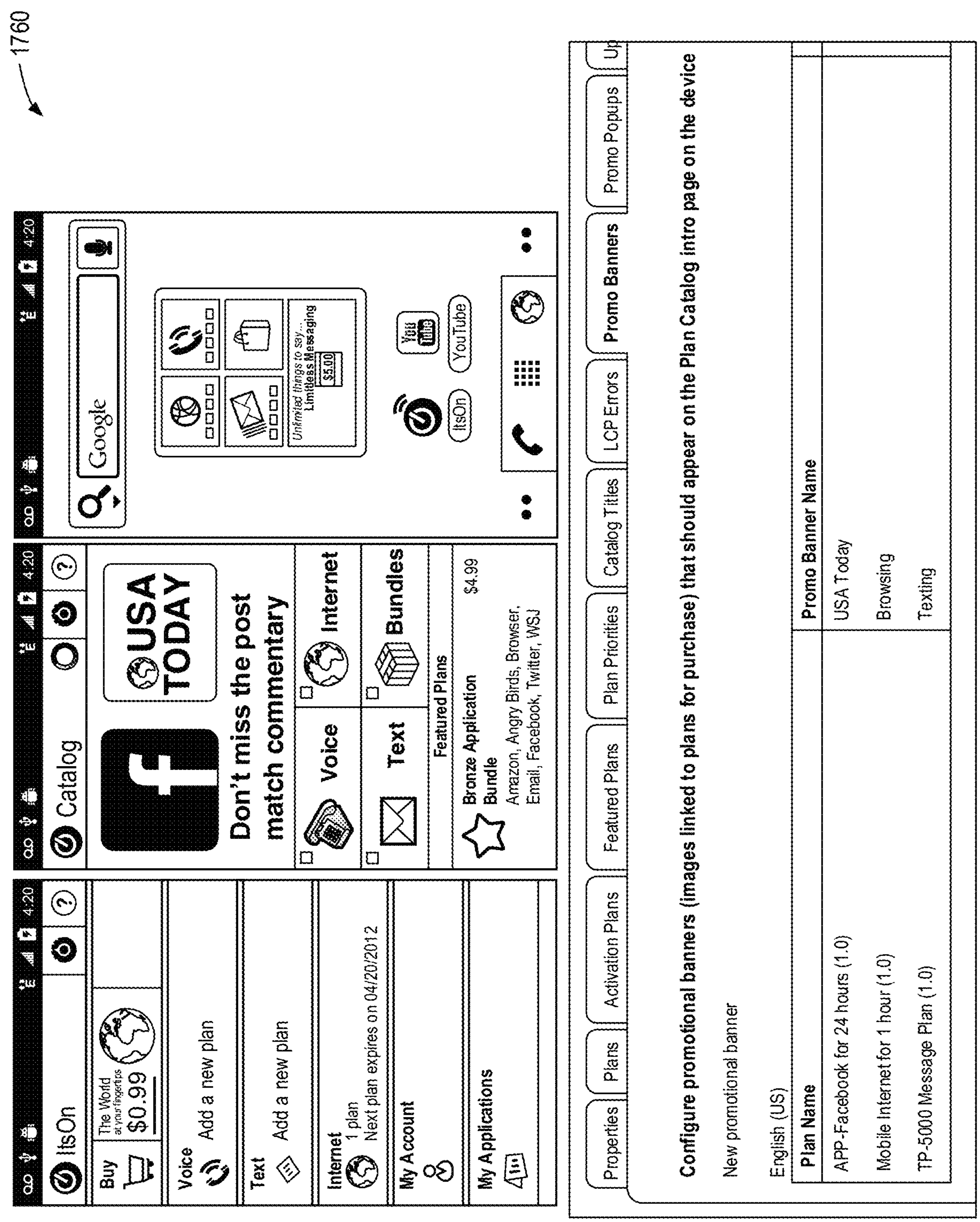

FIG. 233 illustrates another network manager UI environment for displaying notification templates (and associated device views) for defining a featured service or application in accordance with some embodiments.

Figure 234:
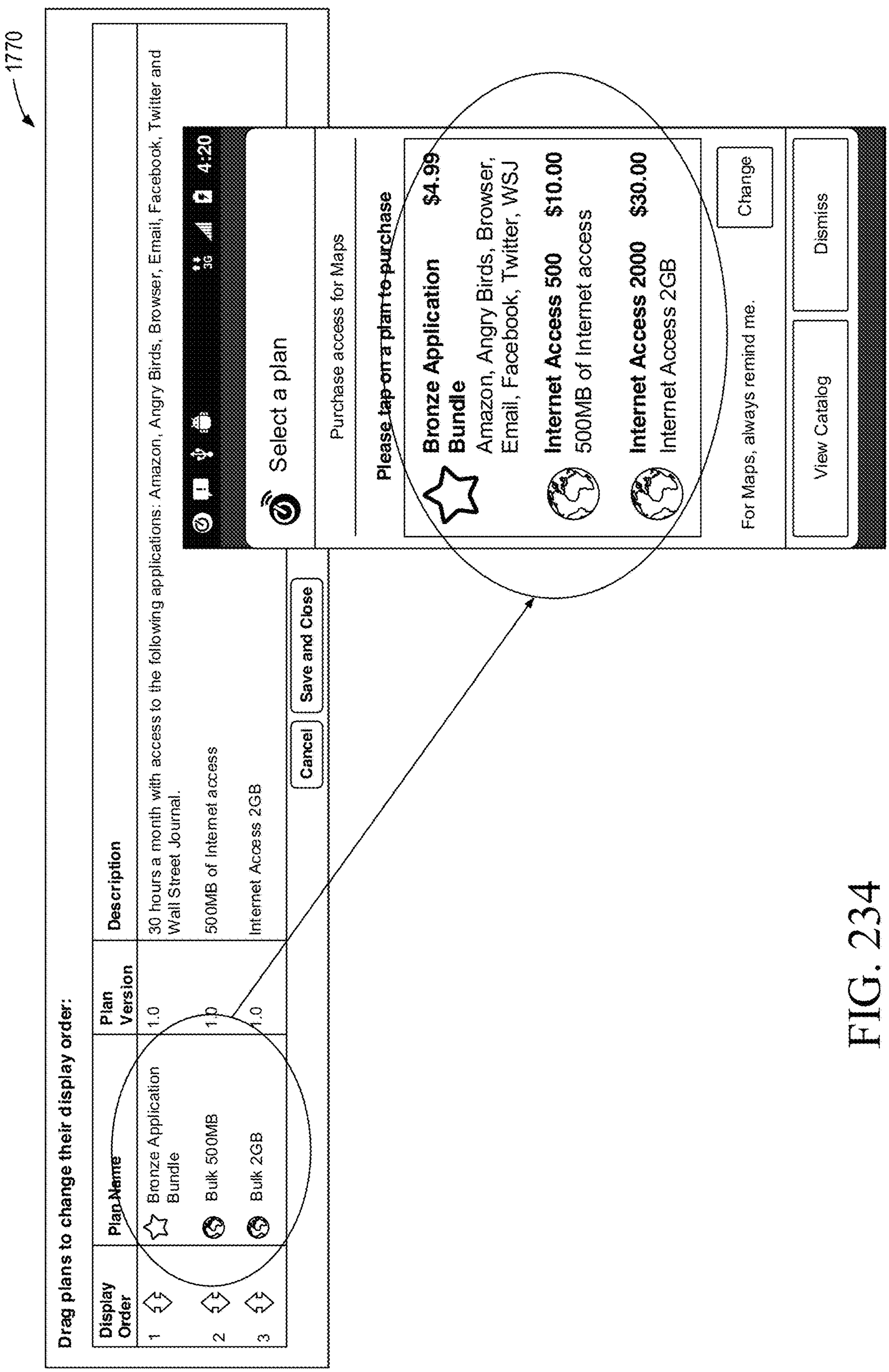

FIG. 234 illustrates a network manager UI environment for displaying notification templates (and associated device views) to drag service or application up or down for presentation order (for example, priority, discovery level, etc.) in a device in accordance with some embodiments.

Figure 235:
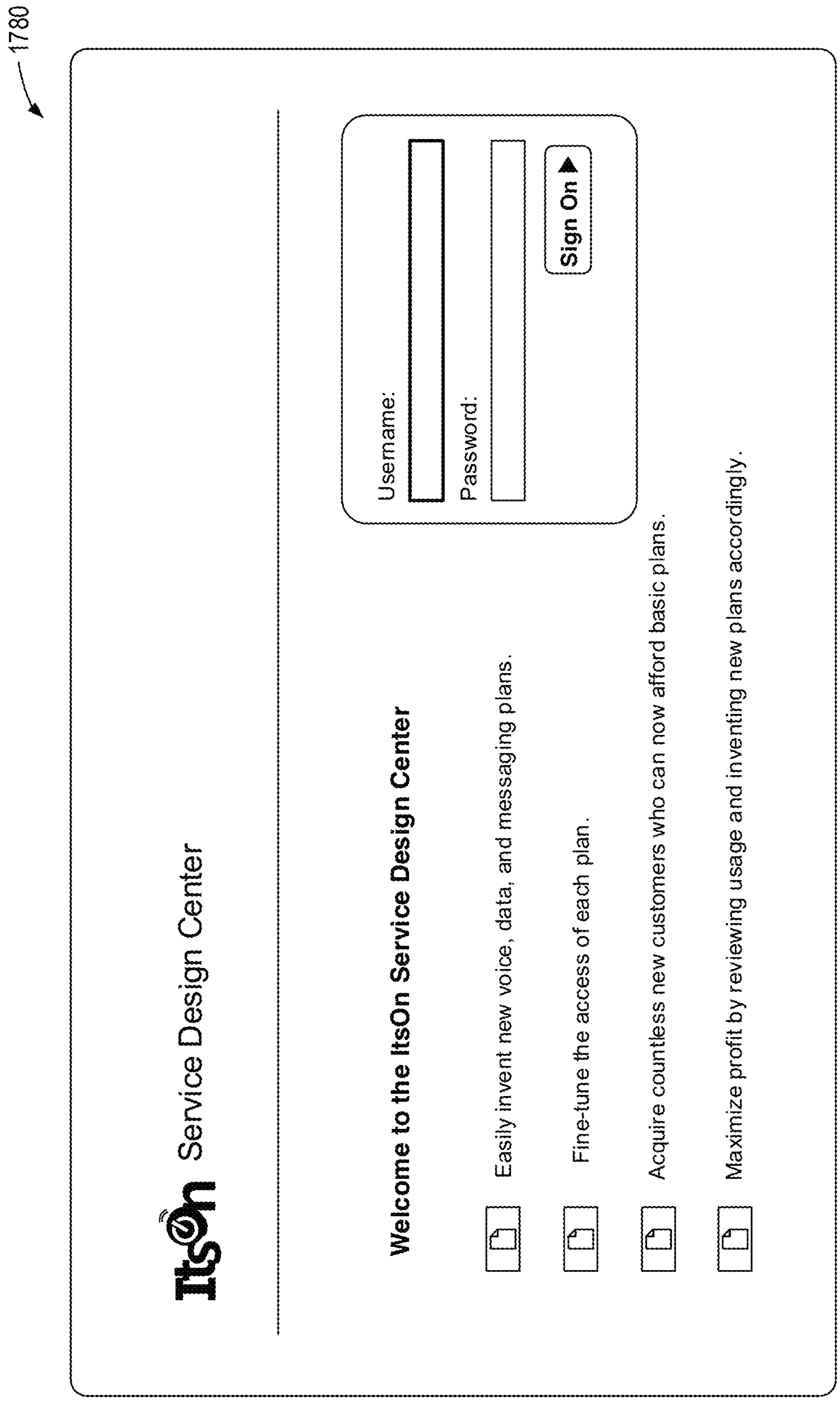

FIG. 235 illustrates a representative screen displaying information and login for a service design center.

Figure 236:
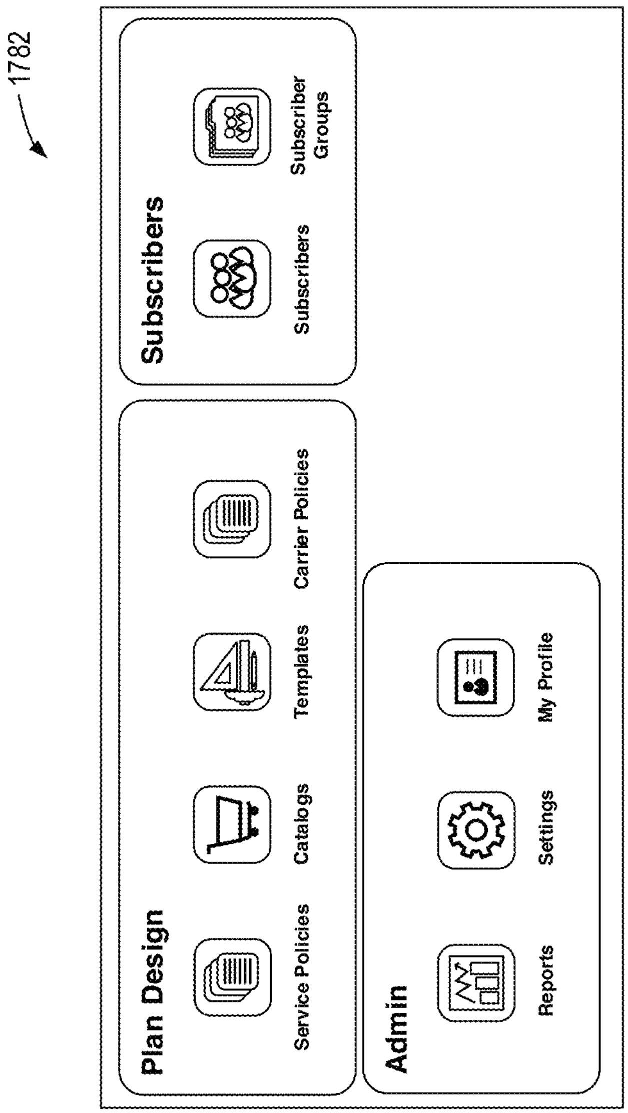

FIG. 236 illustrates a representative set of icons that can be presented through a service design center (SDC) interface for management of subscribers and service plans.

Figure 237:
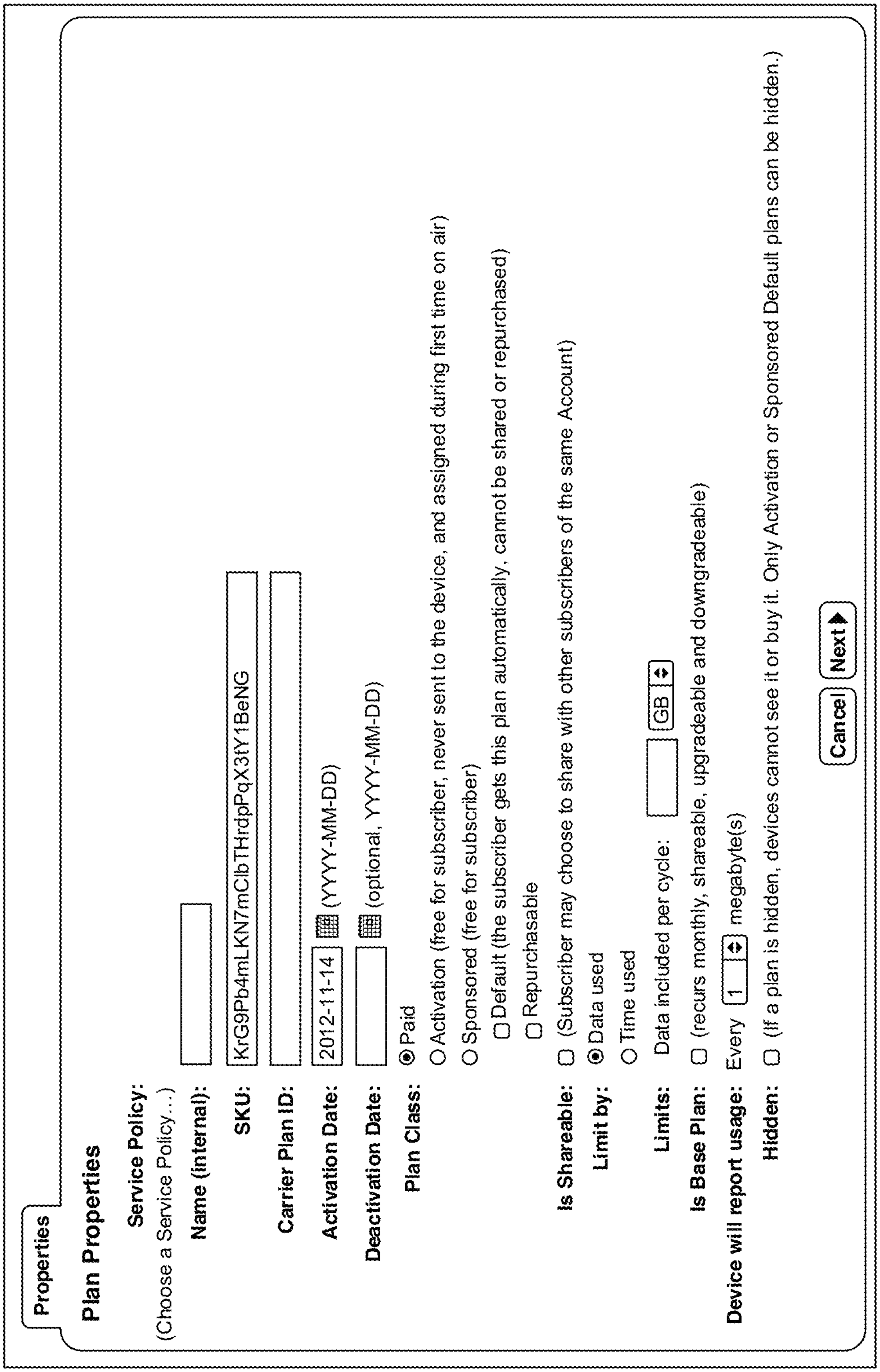

FIG. 237 illustrates a representative screen displaying a set of modifiable service plan properties.

Figure 238:
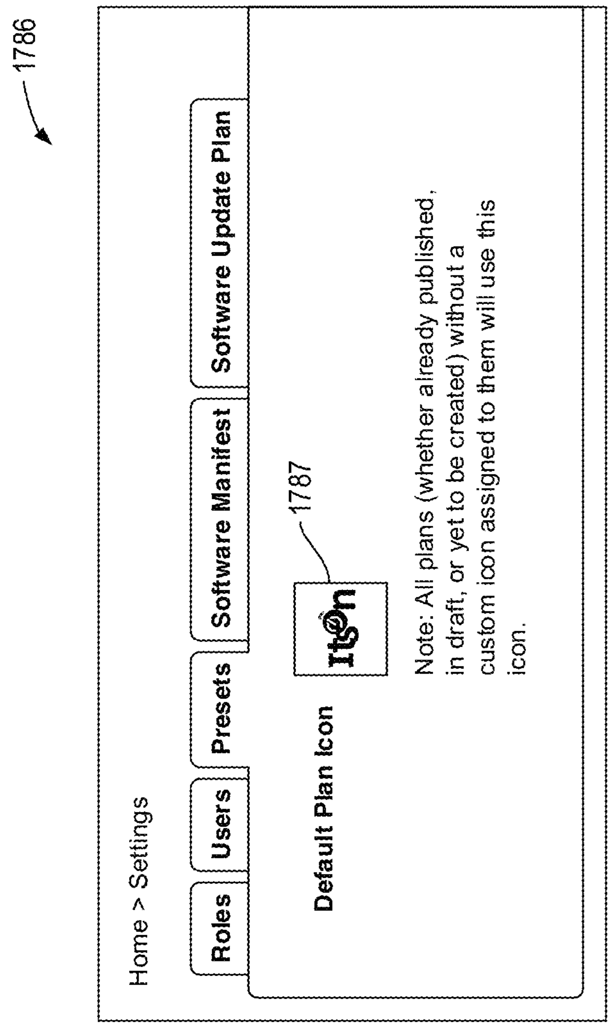

FIG. 238 illustrates a representative screen indicating a default icon to associate with a service plan.

Figure 239:
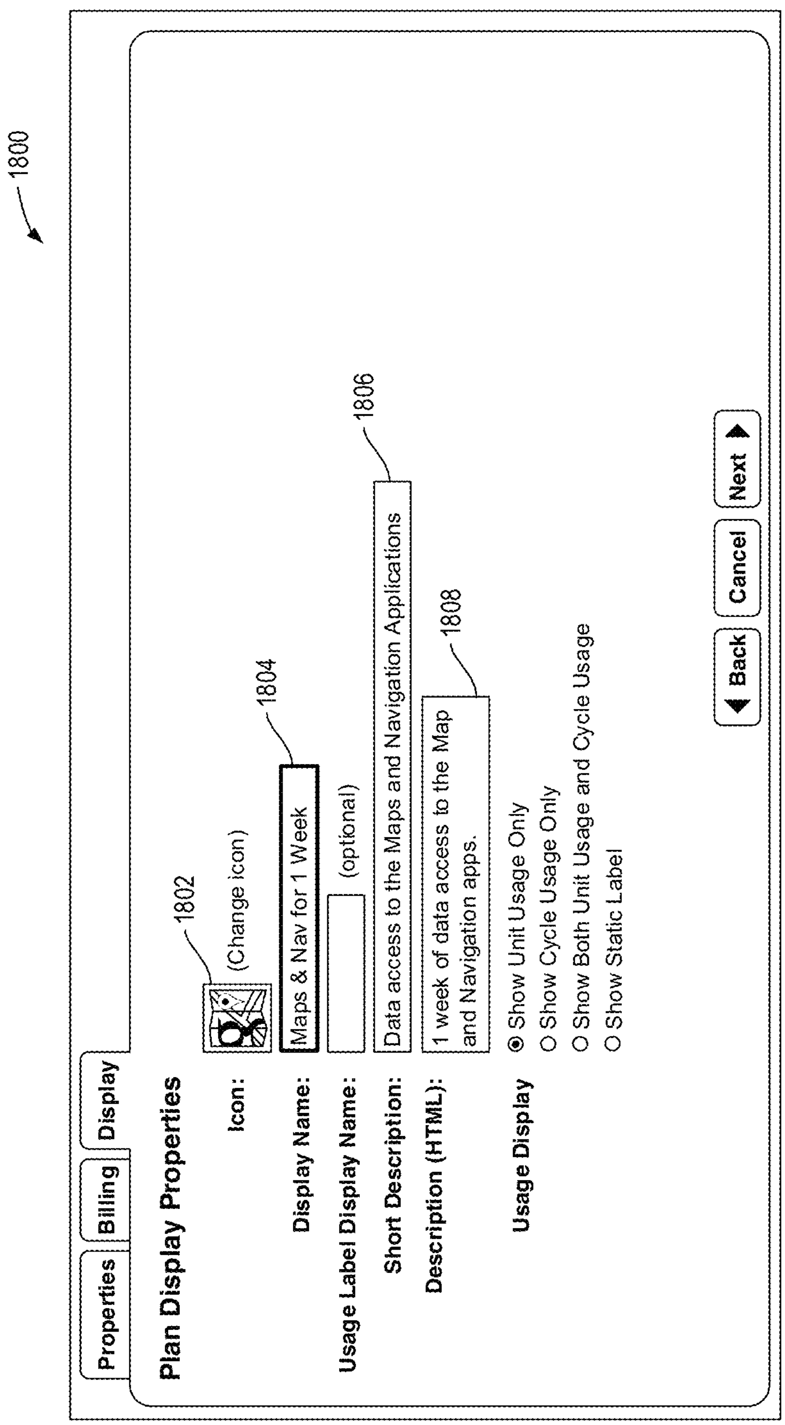

FIG. 239 illustrates a representative screen to determine a set of service plan display properties in accordance with some embodiments.

Figure 240:
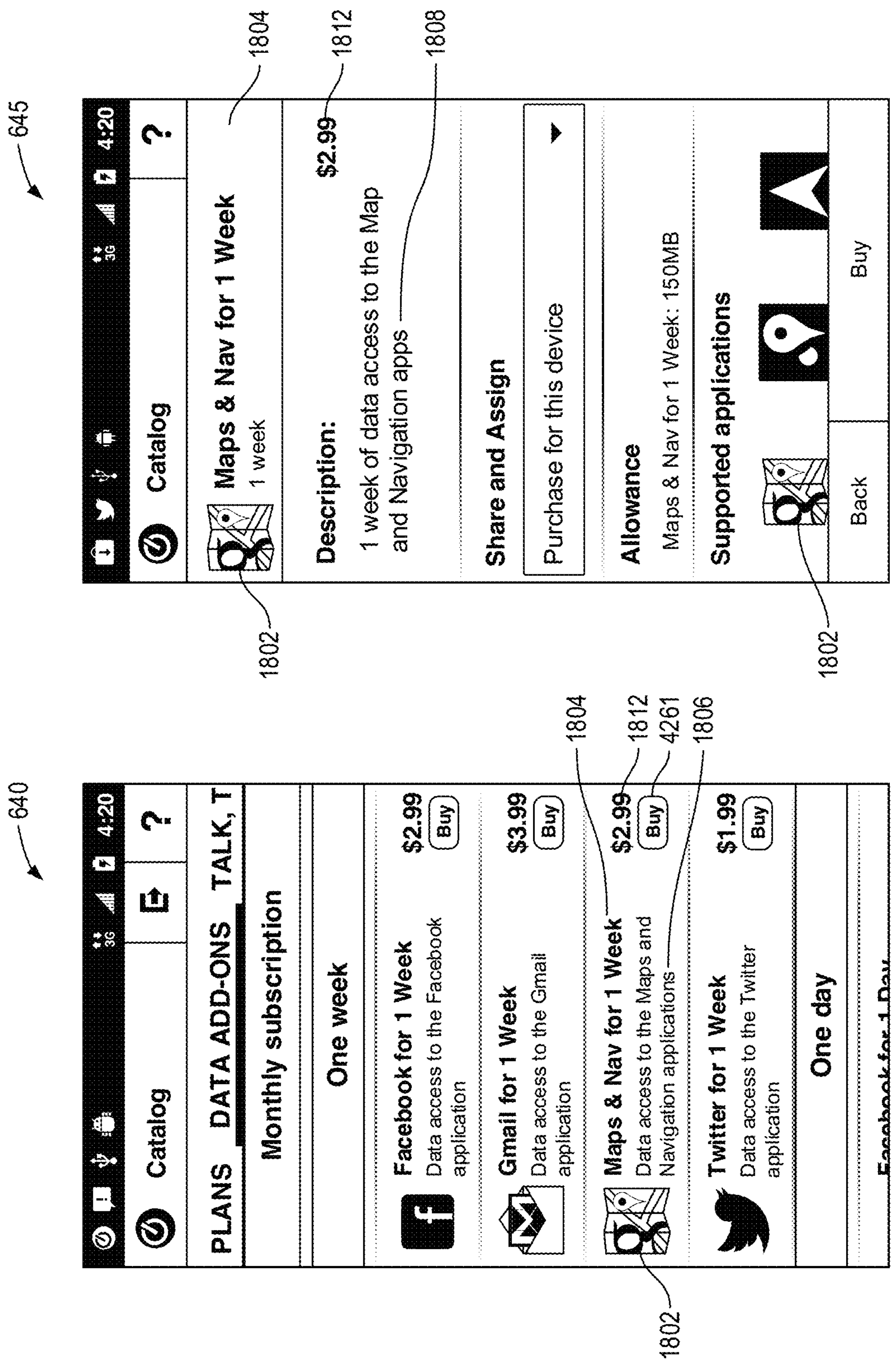

FIG. 240 illustrates representative screens that provide information for a catalog of service plans and for a particular service plan in accordance with some embodiments.

Figure 241:
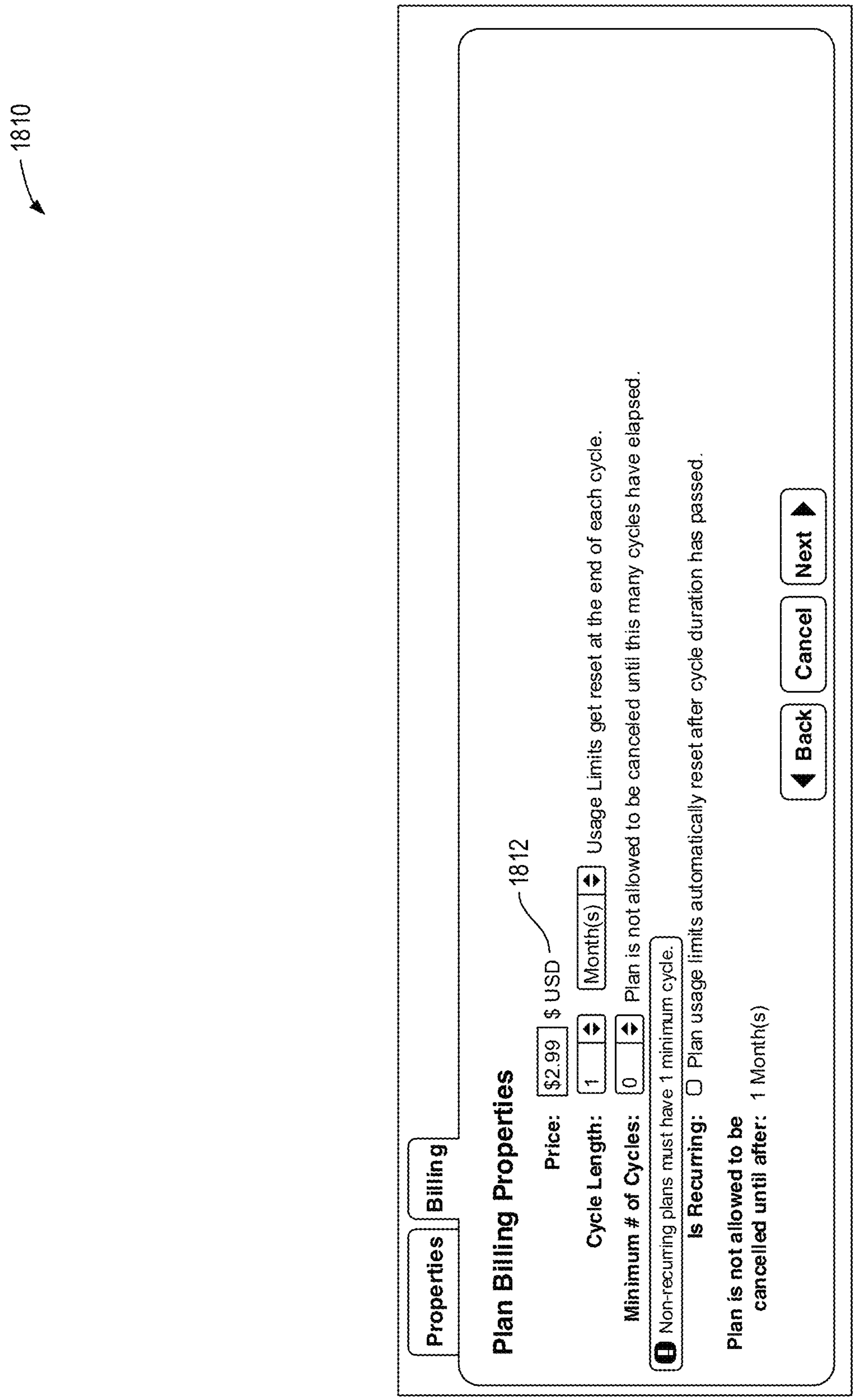

FIG. 241 illustrates a representative screen to determine a set of service plan billing properties in accordance with some embodiments.

Figure 242:
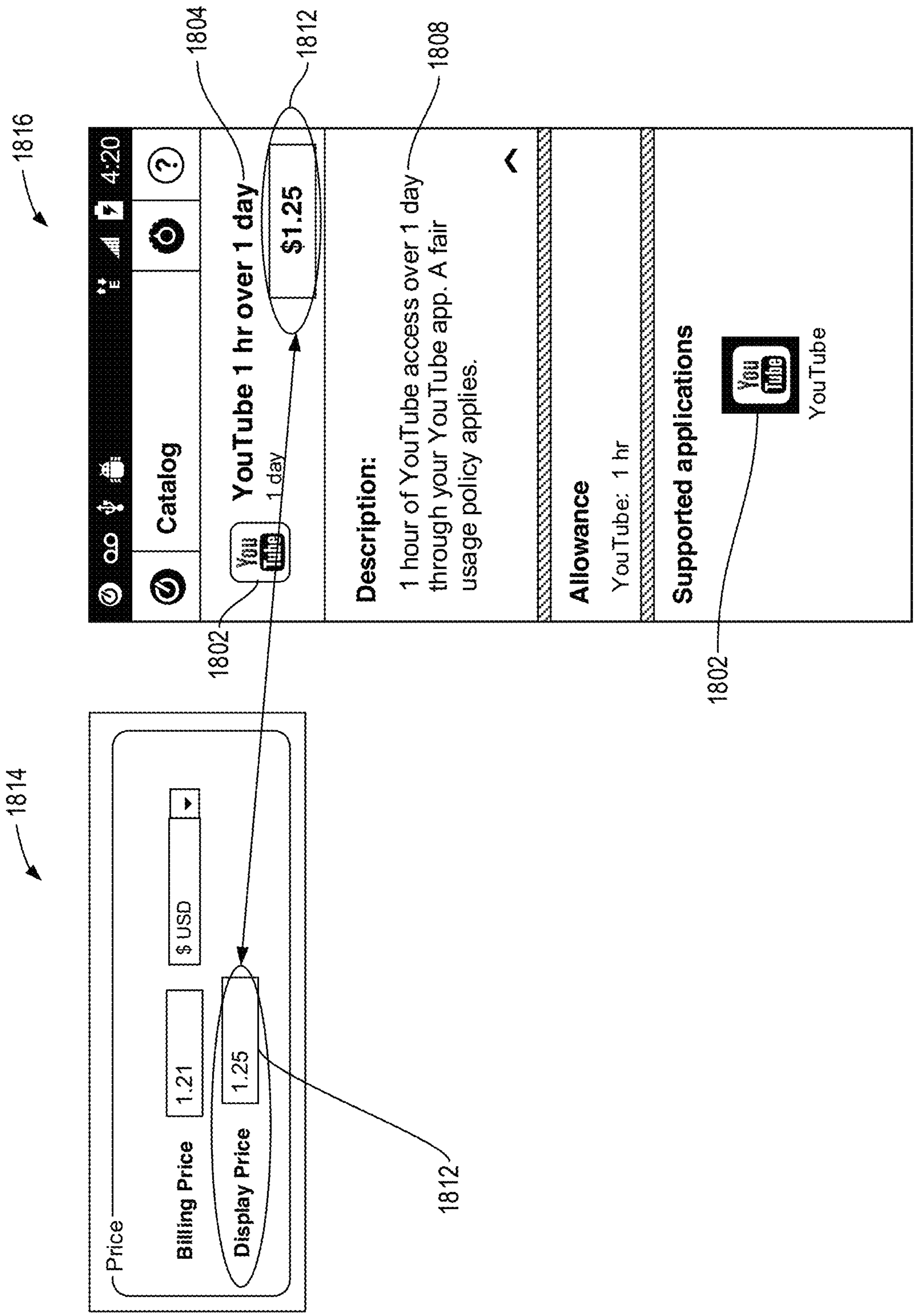

FIG. 242 illustrates a representative screen to enter a service plan billing price and a service plan display price in accordance with some embodiments.

Figure 243:
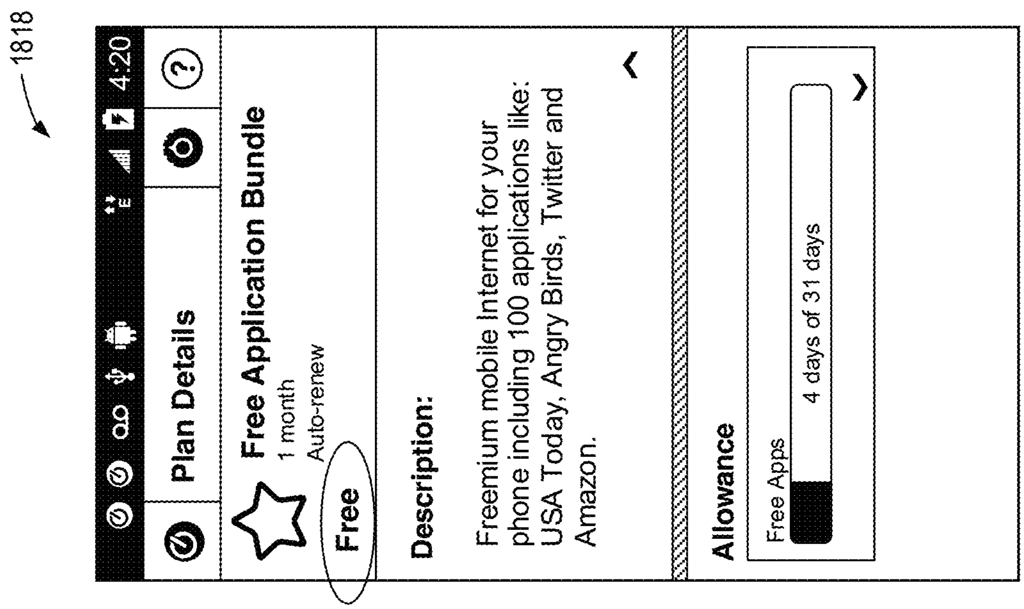

FIG. 243 illustrates a representative screen with detailed information for a free service plan in accordance with some embodiments.

Figure 244:
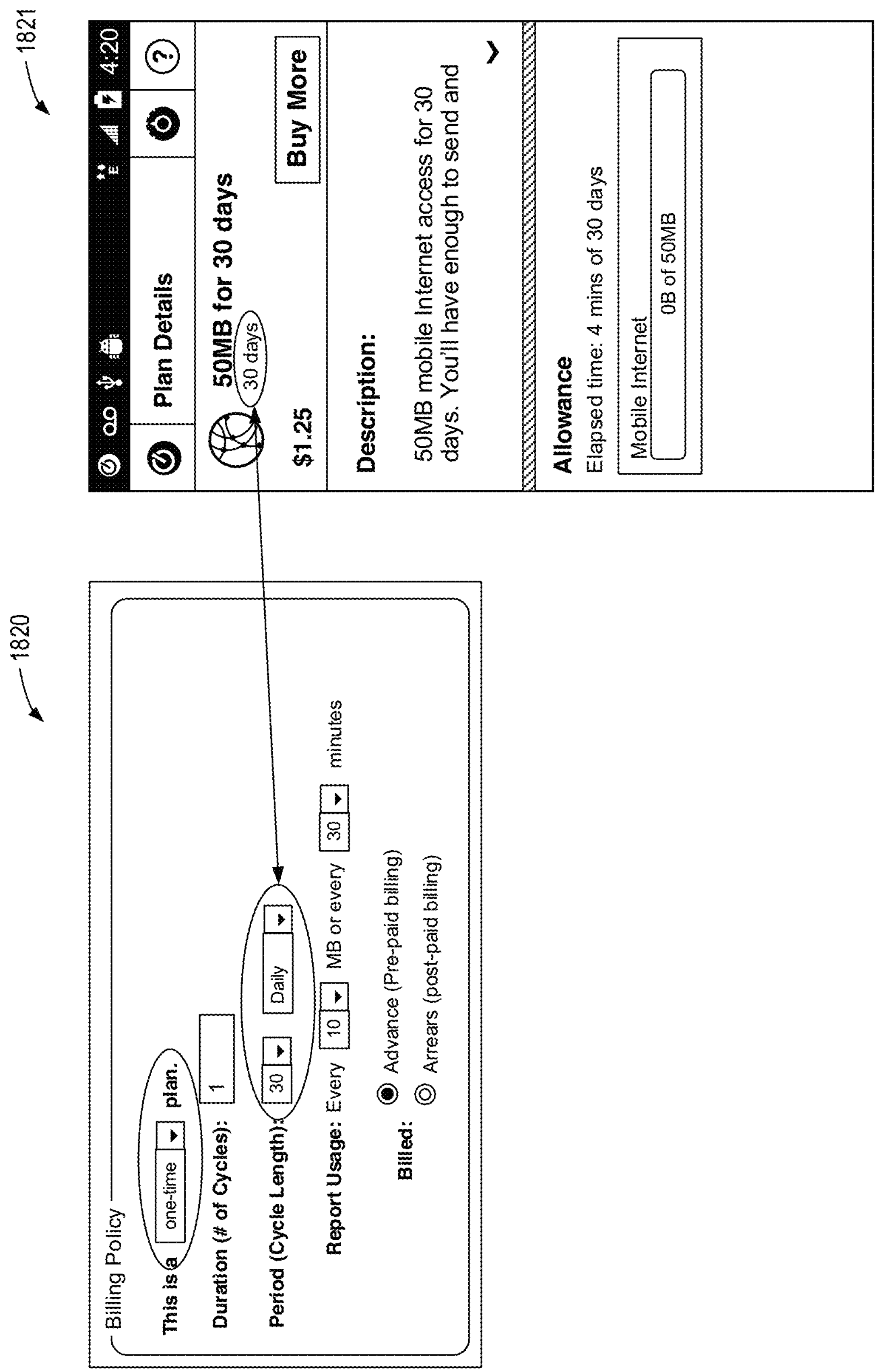
Figure 245:
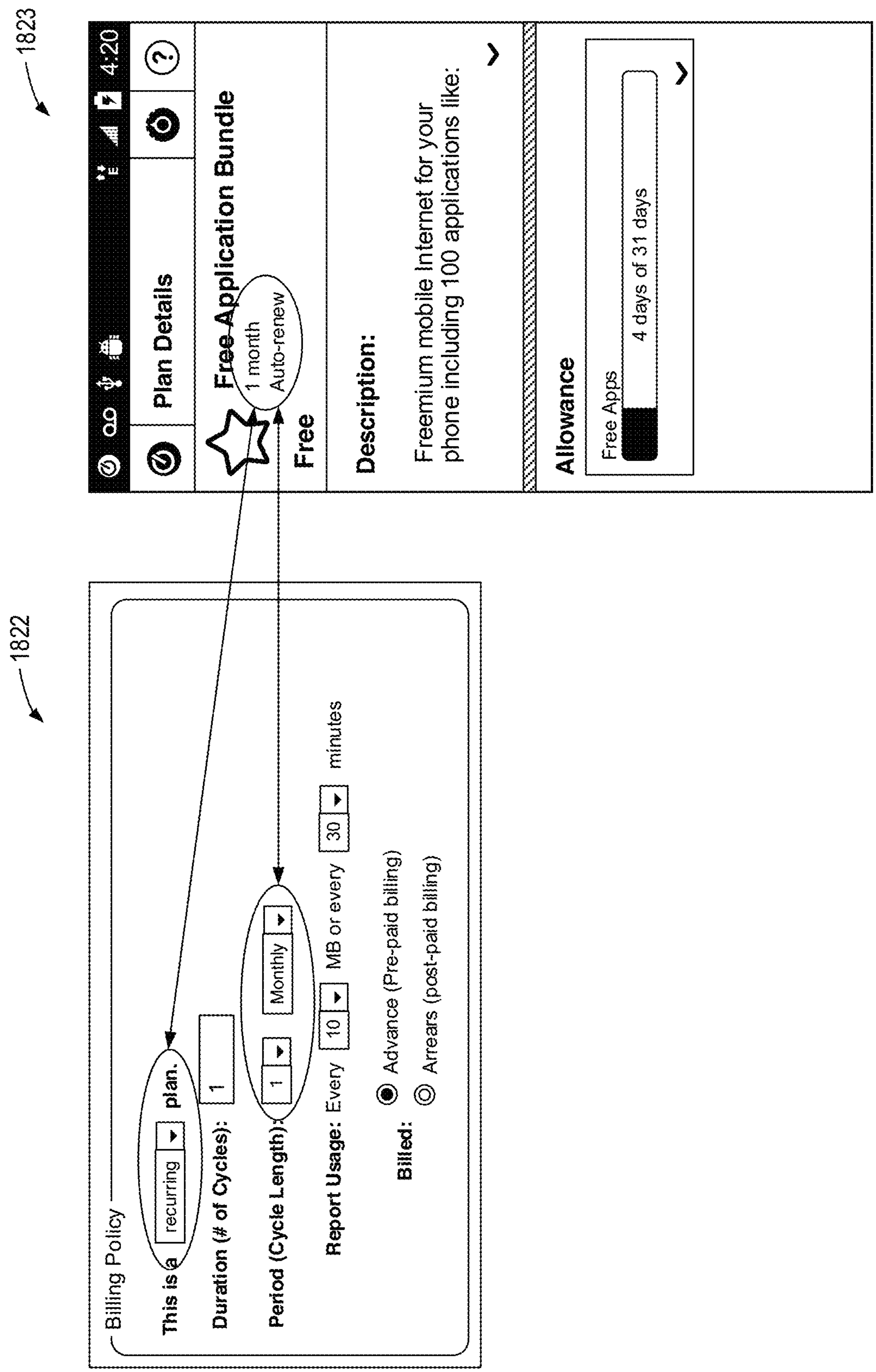

FIGS. 244 and 245 illustrate representative screens to enter a time period for a service plan in accordance with some embodiments.

Figure 246:
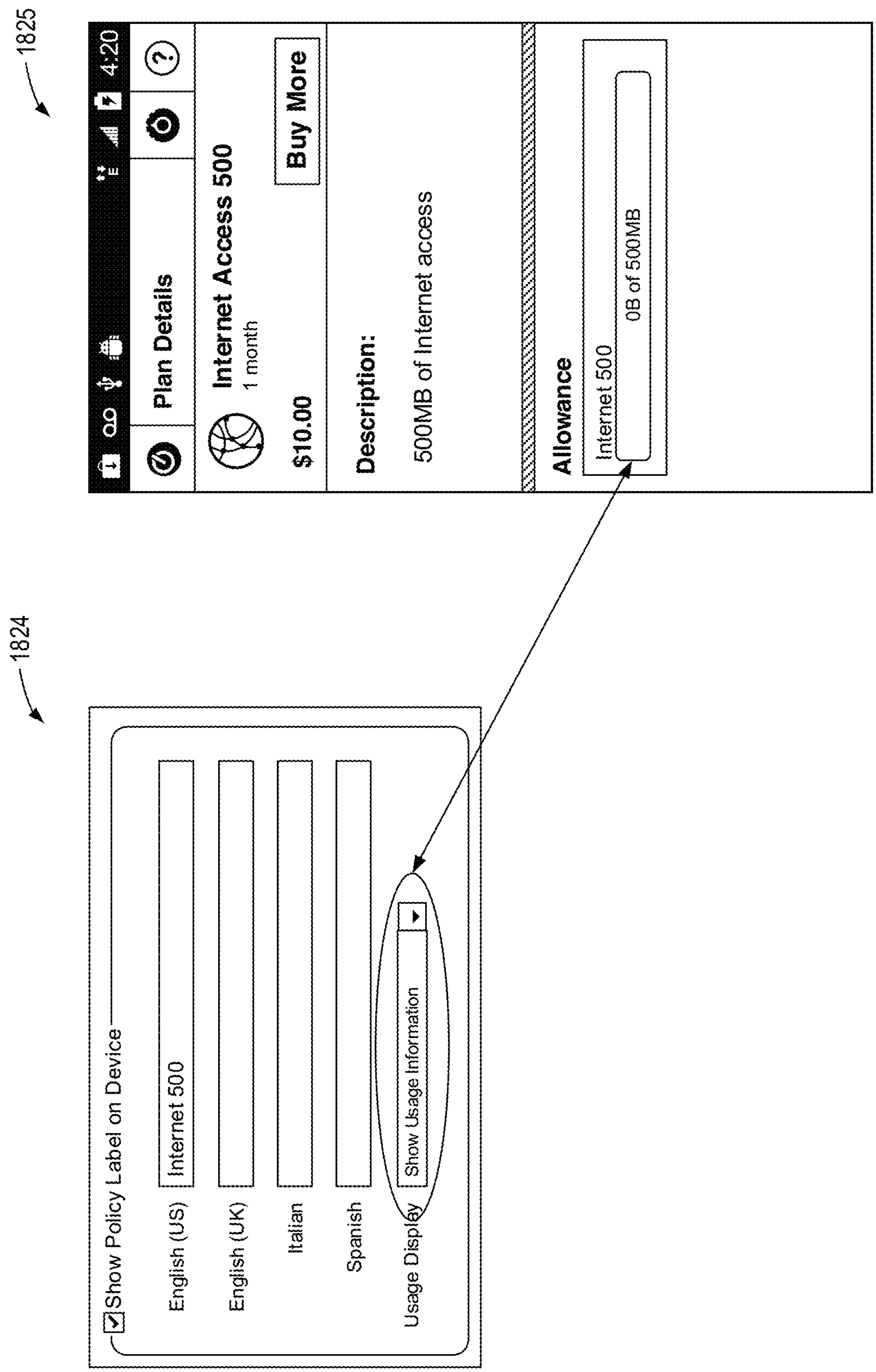

FIG. 246 illustrates a representative screen to enter display properties of service usage information for a service plan in accordance with some embodiments.

Figure 247:
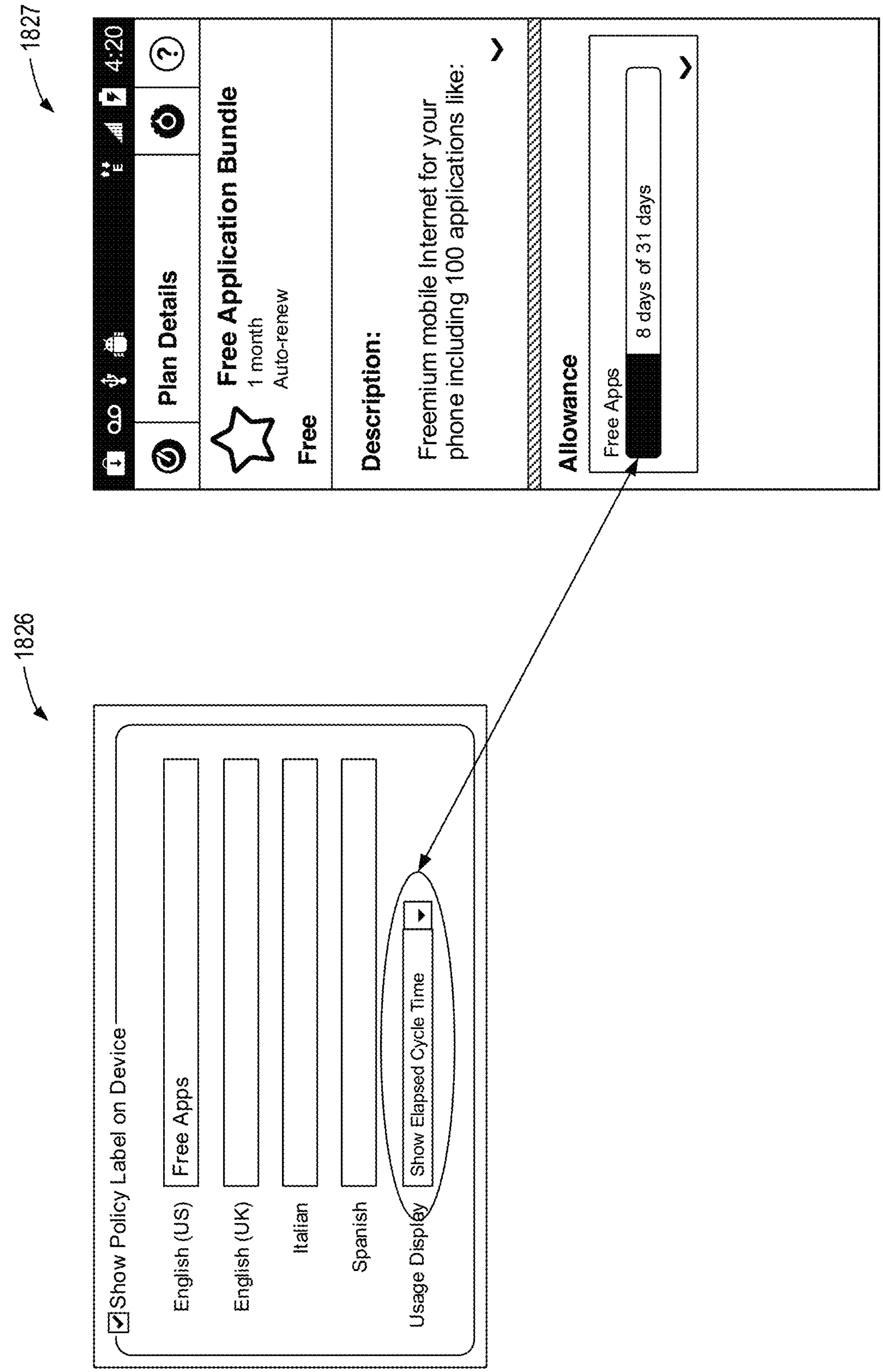

FIG. 247 illustrates a representative screen to select to display an amount of elapsed time for a service plan in accordance with some embodiments.

Figure 248:
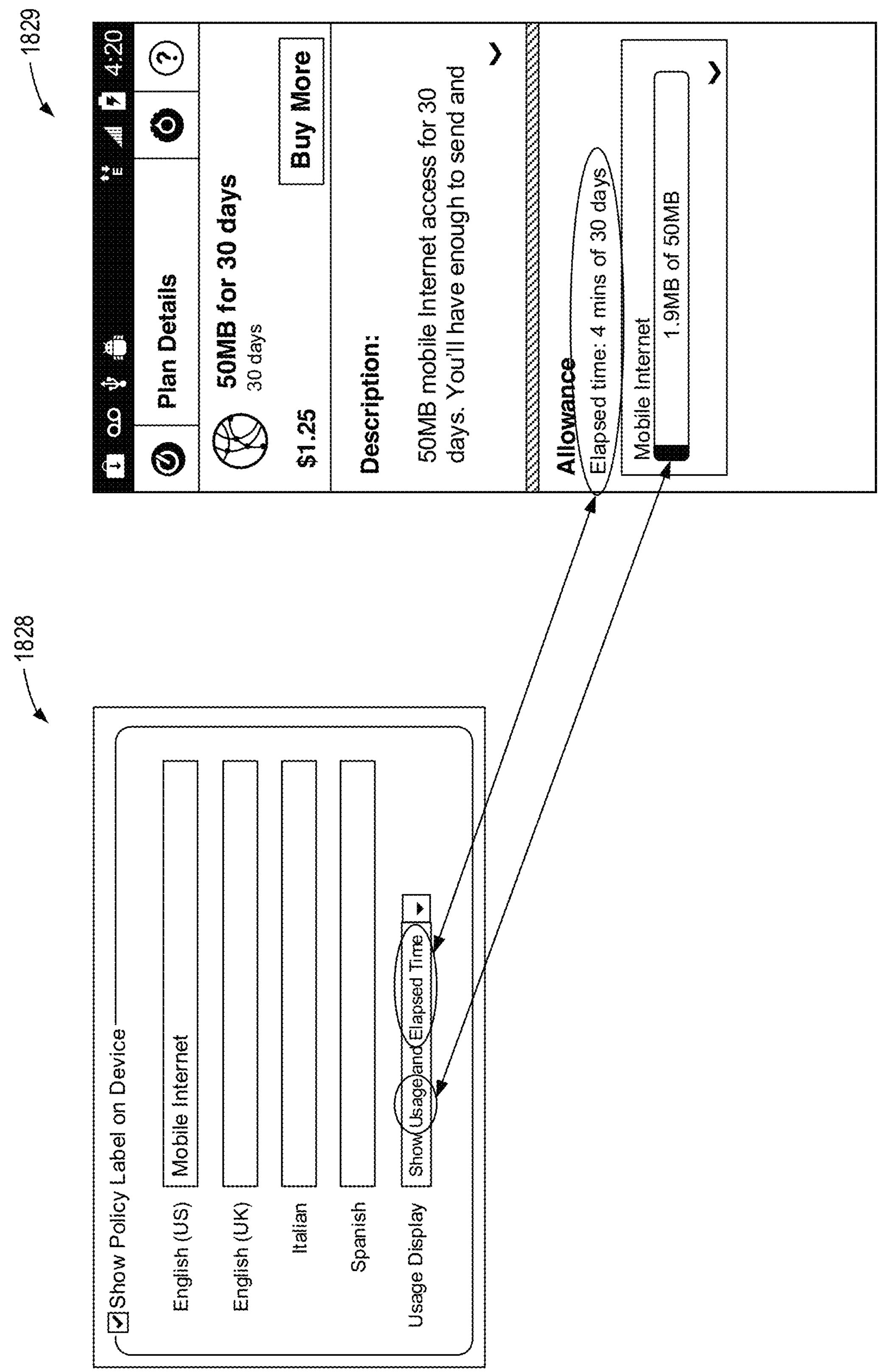

FIG. 248 illustrates a representative screen to select to display both an amount of elapsed time and a service usage amount for a service plan in accordance with some embodiments.

Figure 249:
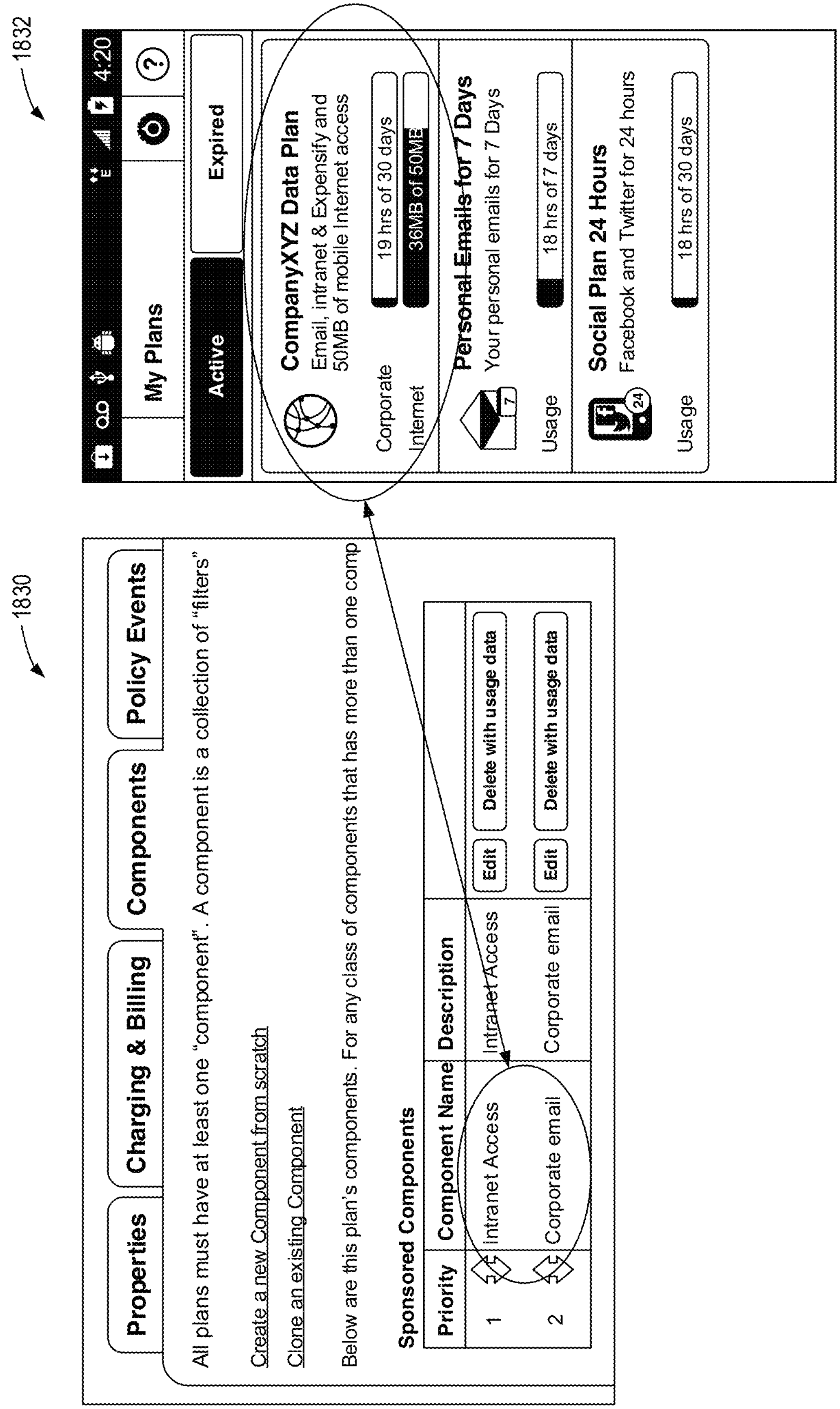

FIG. 249 illustrates a representative screen to determine constituent service plans for a customized service plan in accordance with some embodiments.

Figure 250:
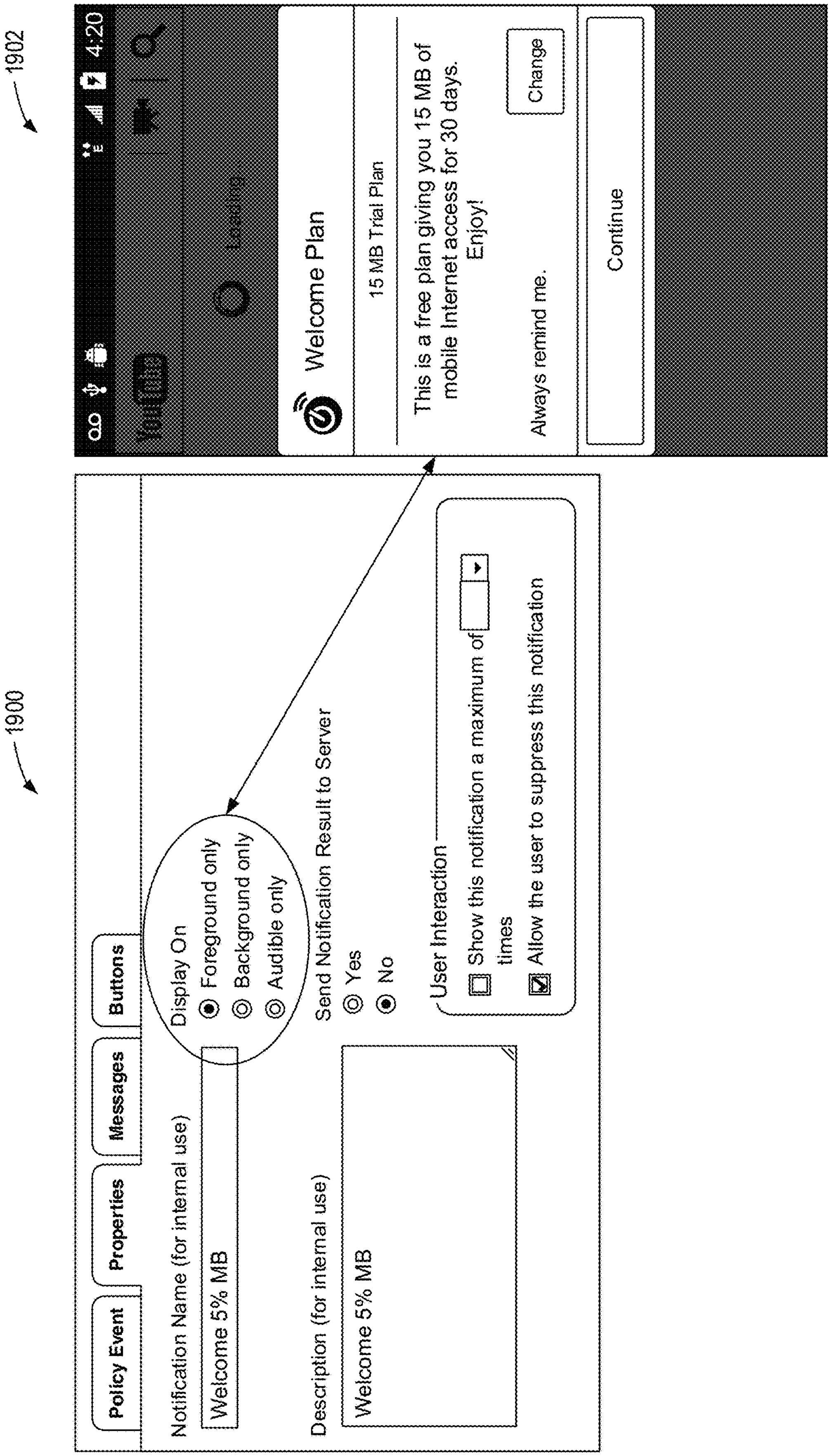

FIG. 250 illustrates a representative screen to determine display properties for a notification message in accordance with some embodiments.

Figure 251:
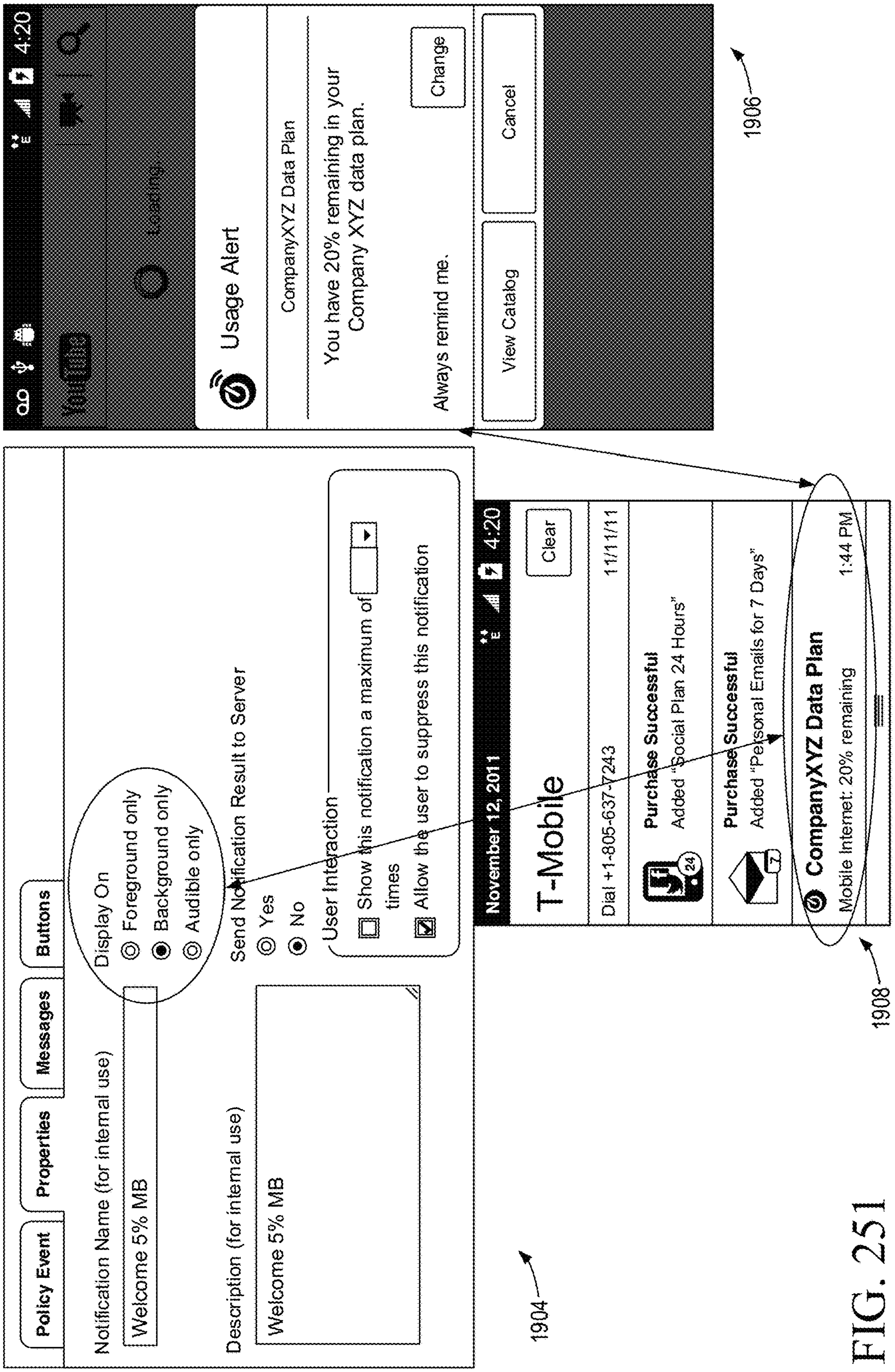

FIG. 251 illustrates a representative screen to display a notification message for a service plan as a background message in accordance with some embodiments.

Figure 252:
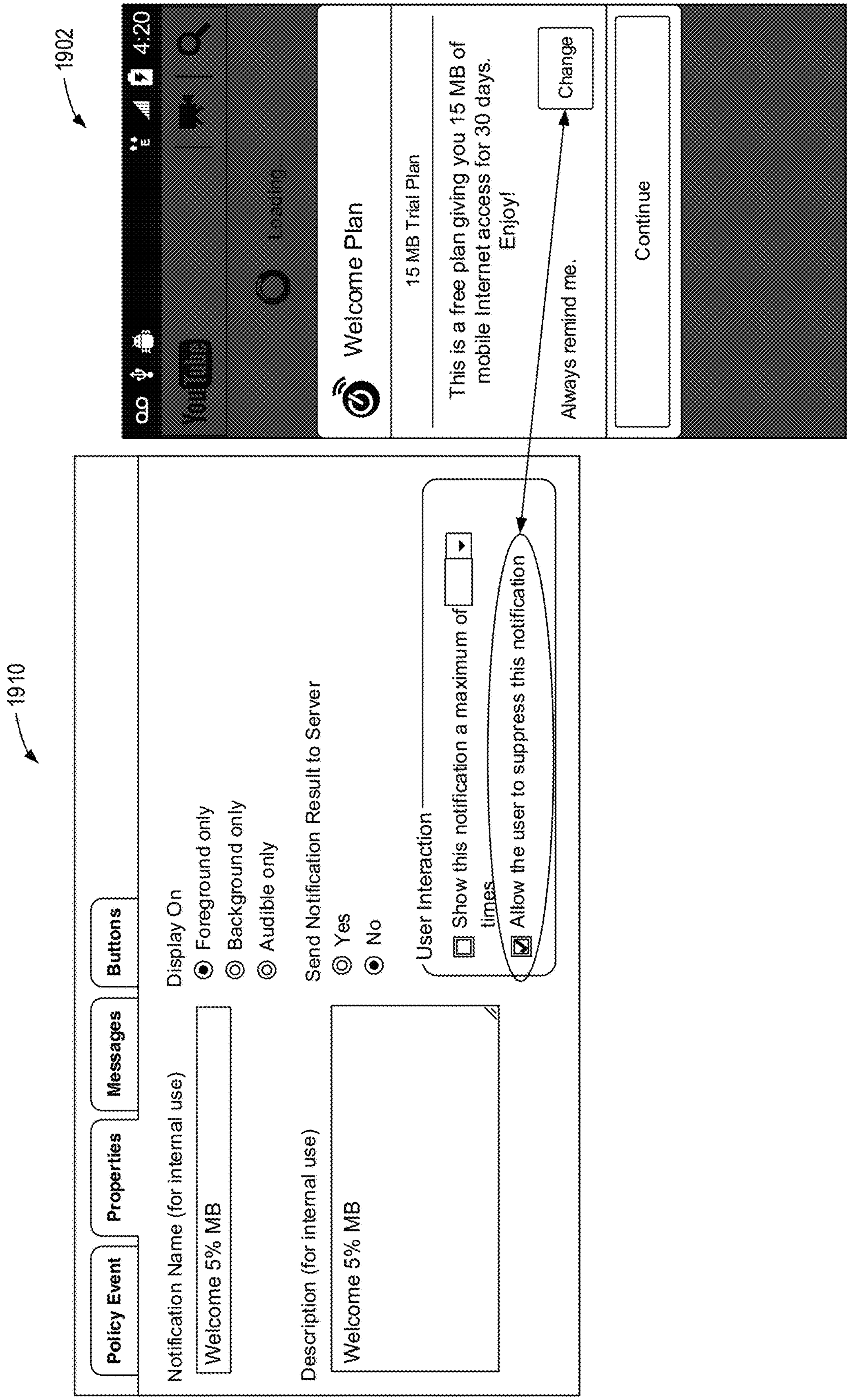

FIG. 252 illustrates a representative screen to suppress display of notification messages for a service plan in accordance with some embodiments.

Figure 253:
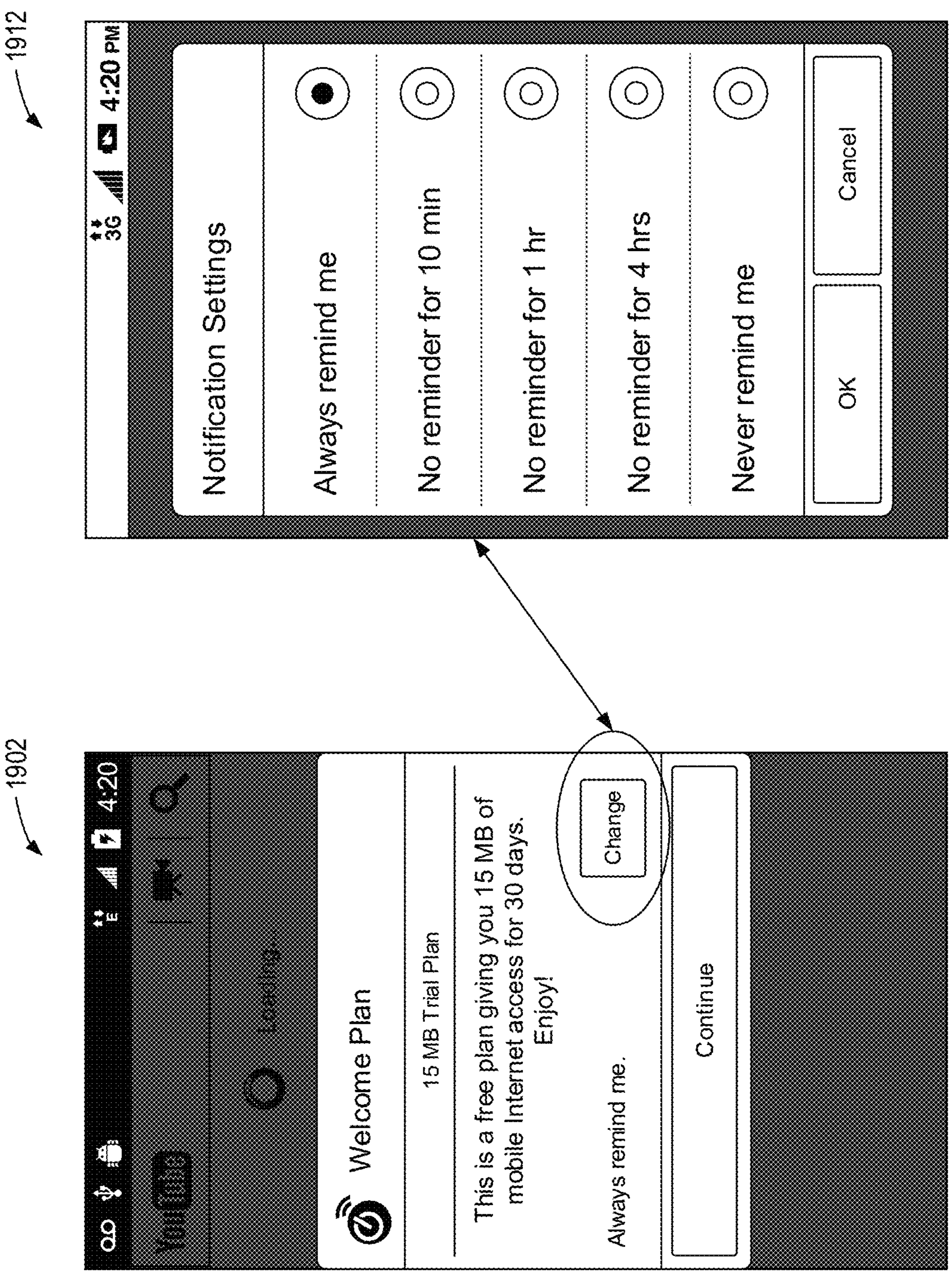

FIG. 253 illustrates a representative screen to input notification settings for a notification message associated with a service plan in accordance with some embodiments.

Figure 254:
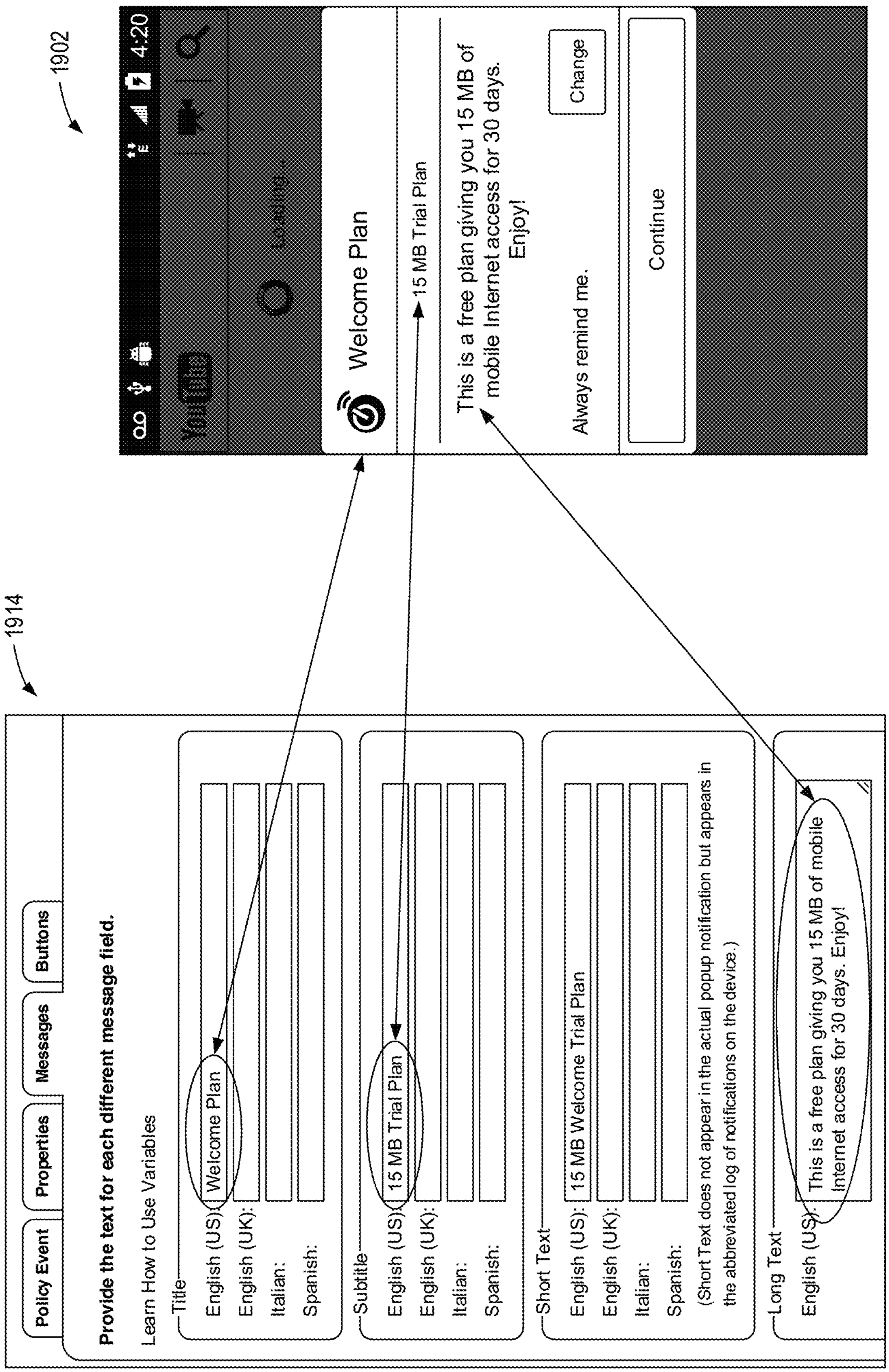

FIG. 254 illustrates a representative screen to determine contents of a notification message for a service plan in accordance with some embodiments.

Figure 255:
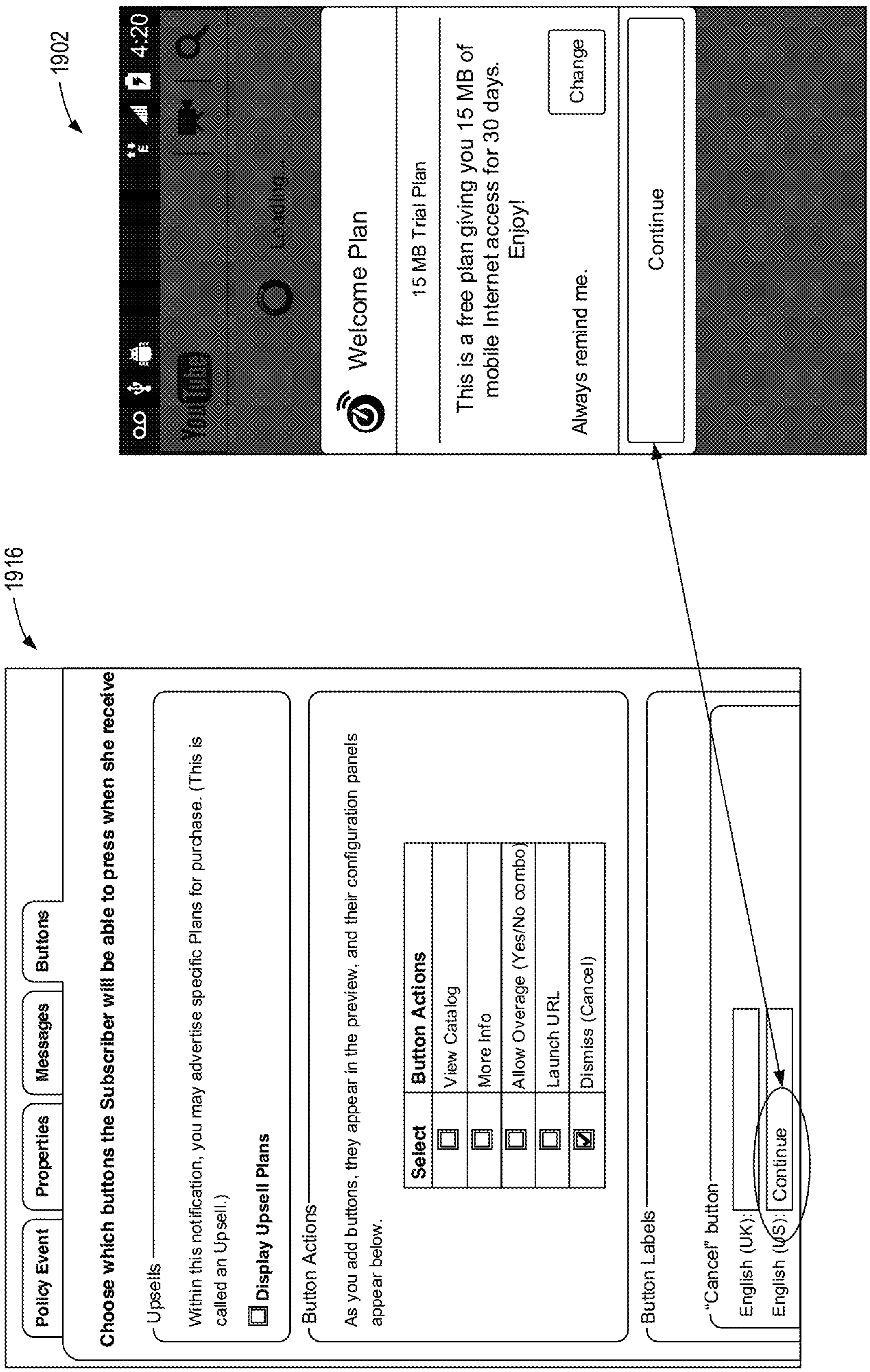

FIG. 255 illustrates a representative screen to determine a set of buttons to display in a notification message for a service plan in accordance with some embodiments.

Figure 256:
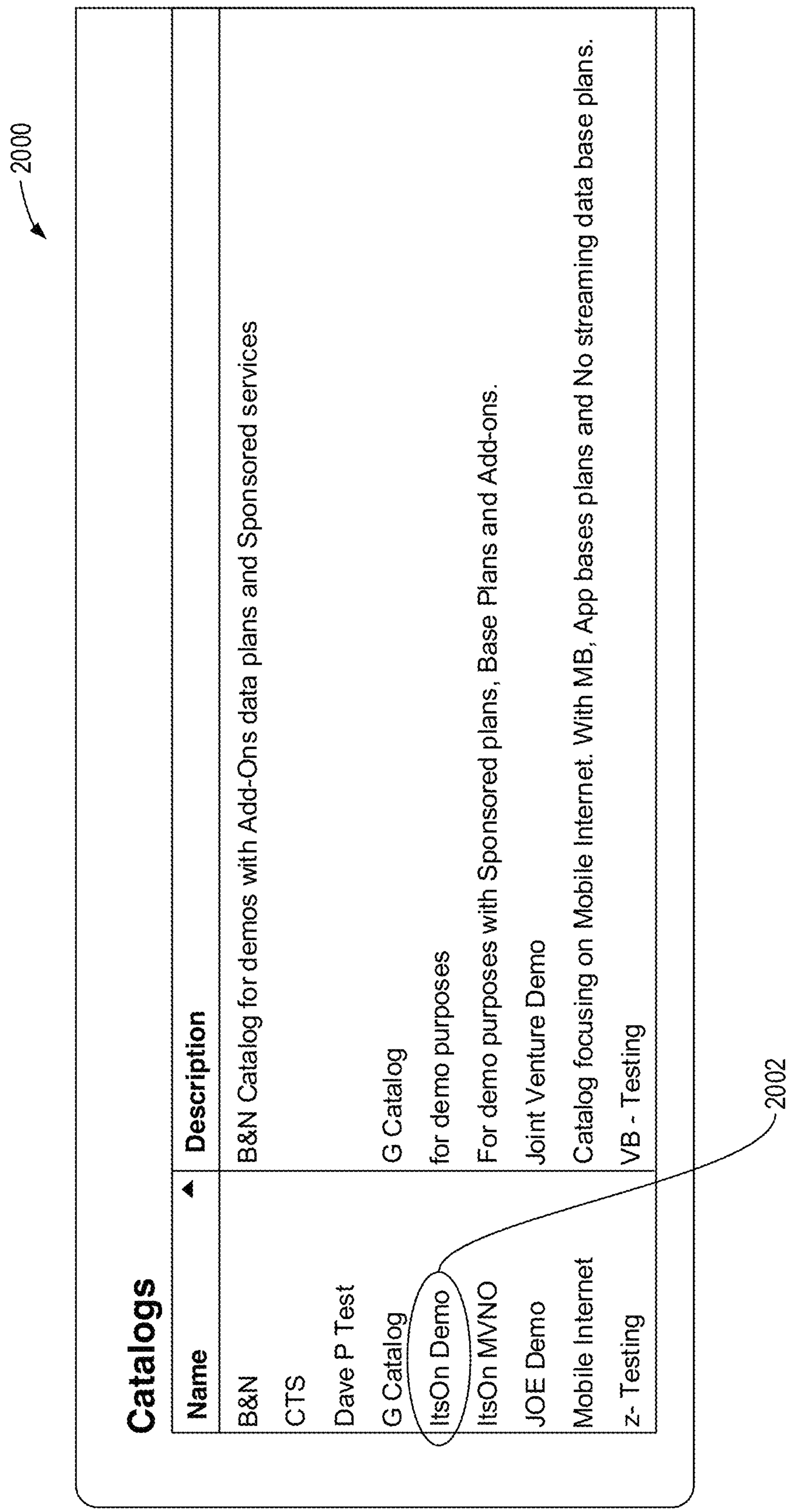

FIG. 256 illustrates a representative screen to view a set of service plan catalogs in accordance with some embodiments.

Figure 257:
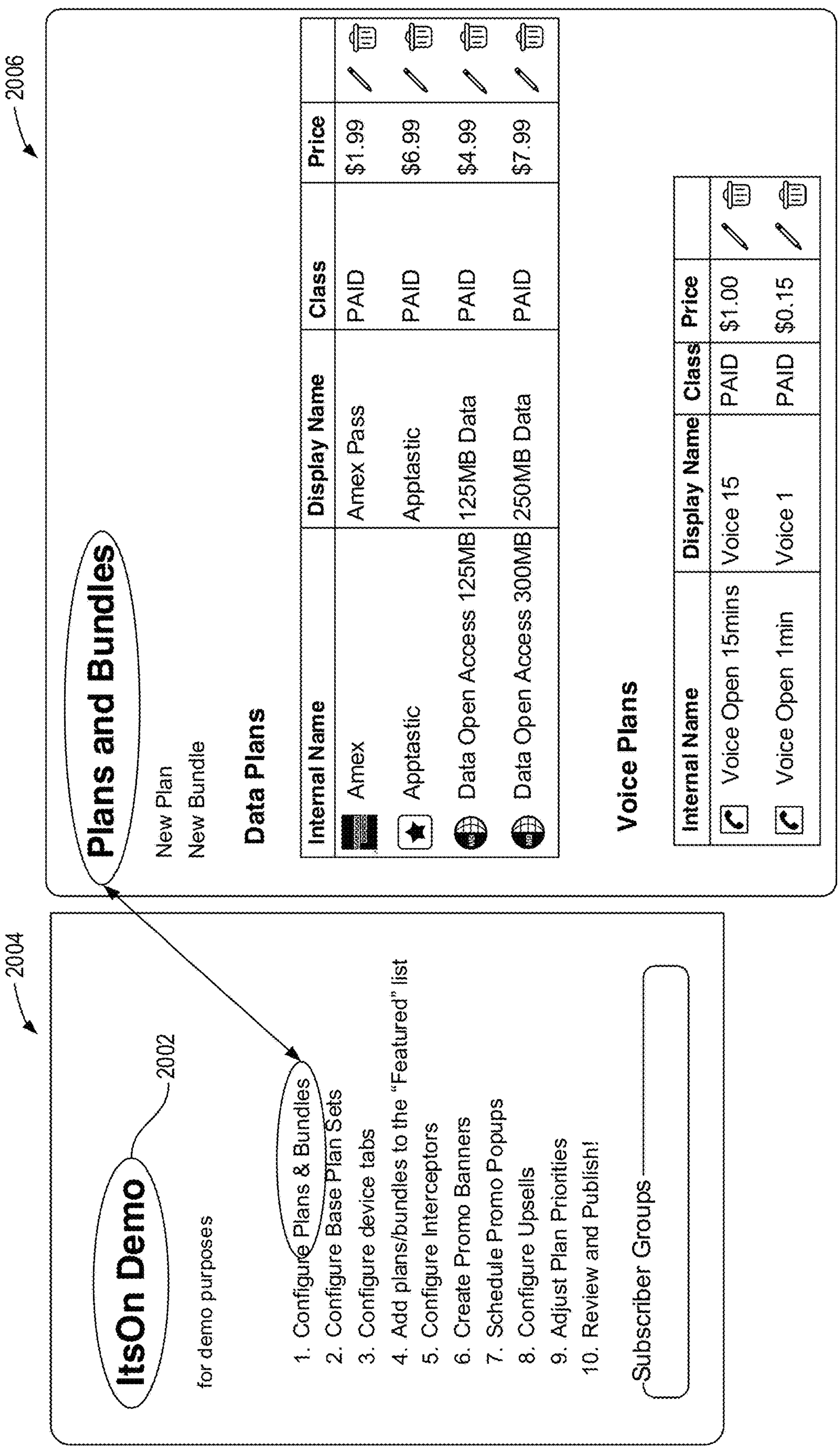

FIG. 257 illustrates a representative screen to configure a service plan catalog in accordance with some embodiments.

Figure 258:
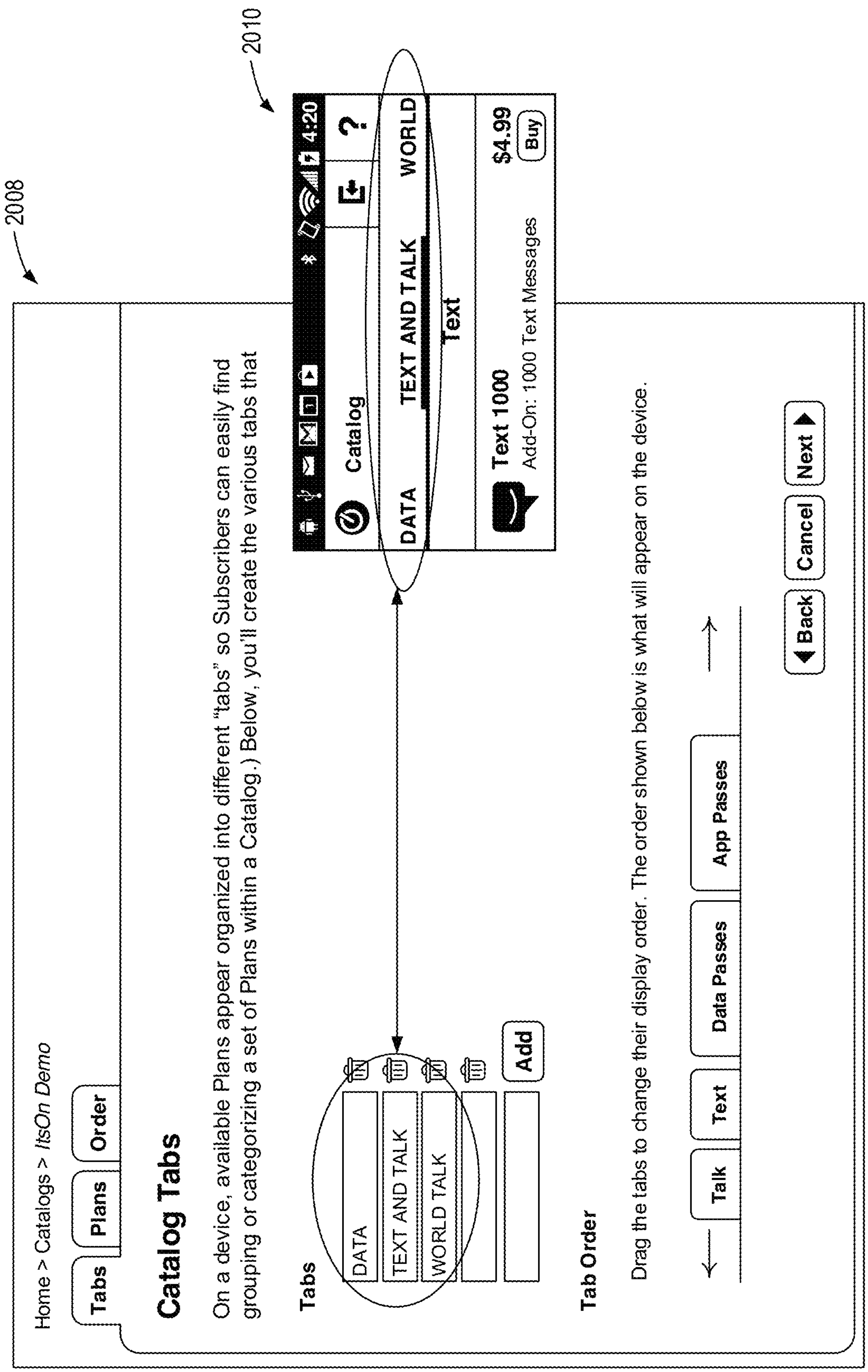

FIG. 258 illustrates a representative screen to determine a set of tabs to categorize different service plans of a service plan catalog in accordance with some embodiments.

FIG. 259 illustrates a representative screen to set under which tab name to display a service plan in accordance with some embodiments.

Figure 260:
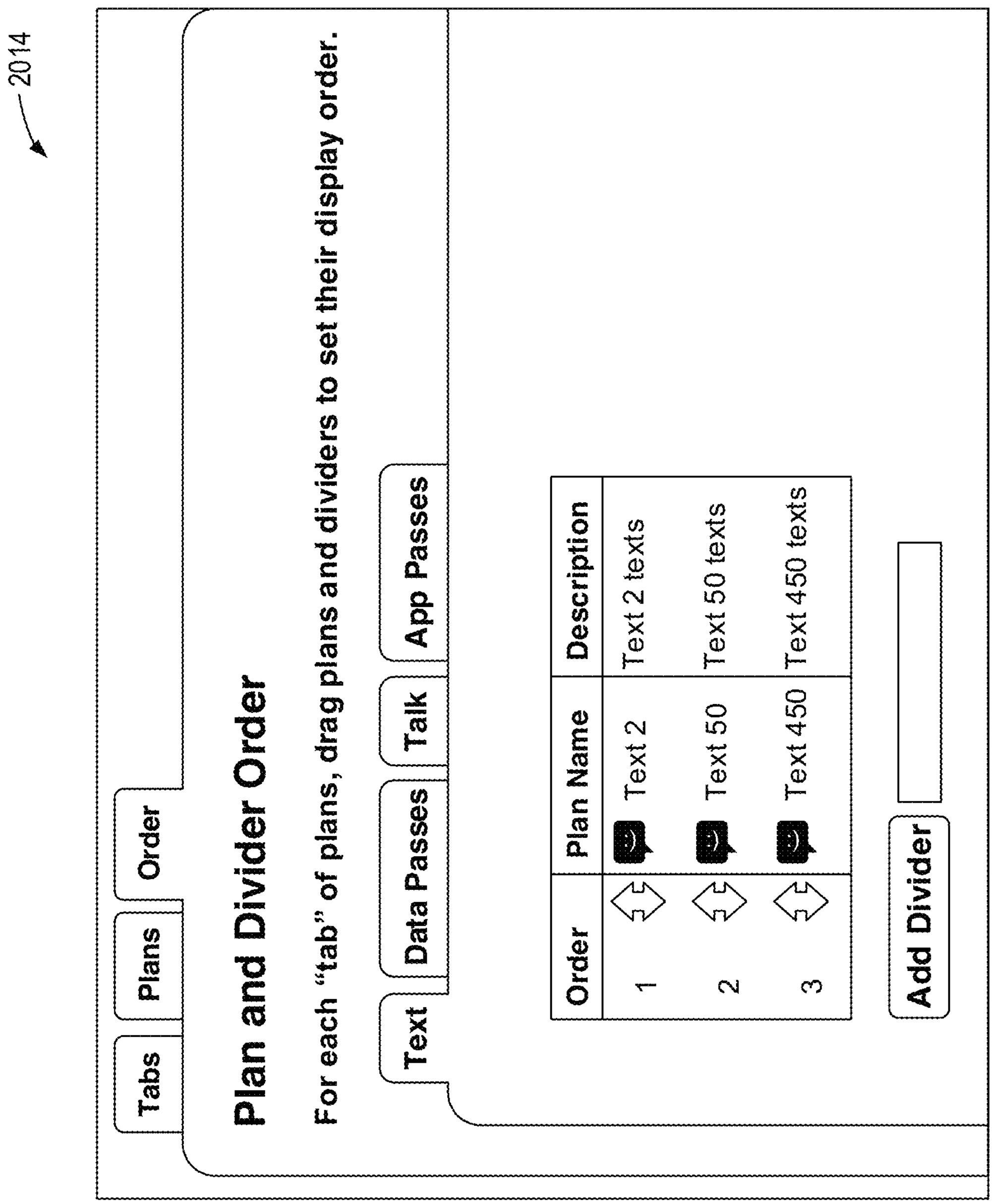

FIG. 260 illustrates a representative screen to determine an order for displaying service plans under a tab name in accordance with some embodiments.

Figure 261:
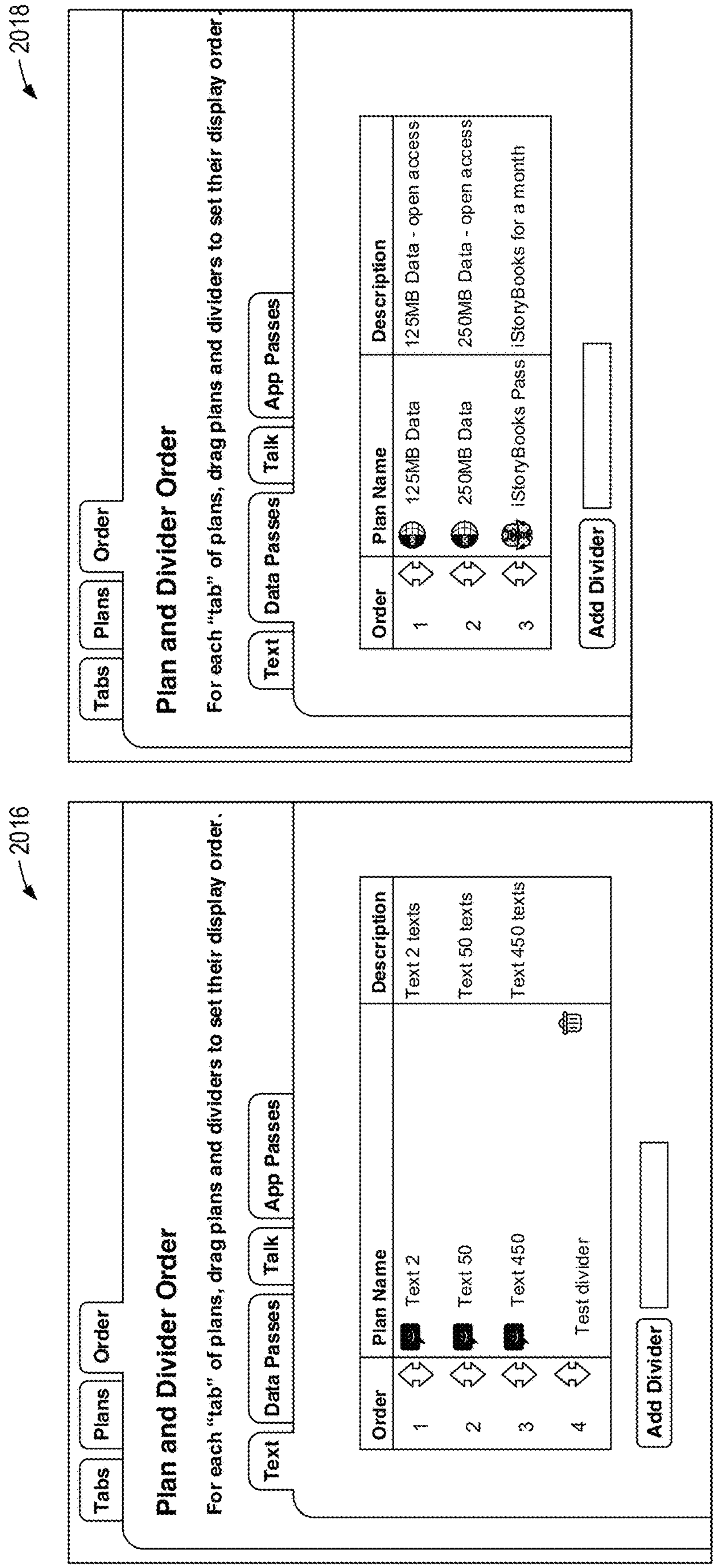
Figure 262:
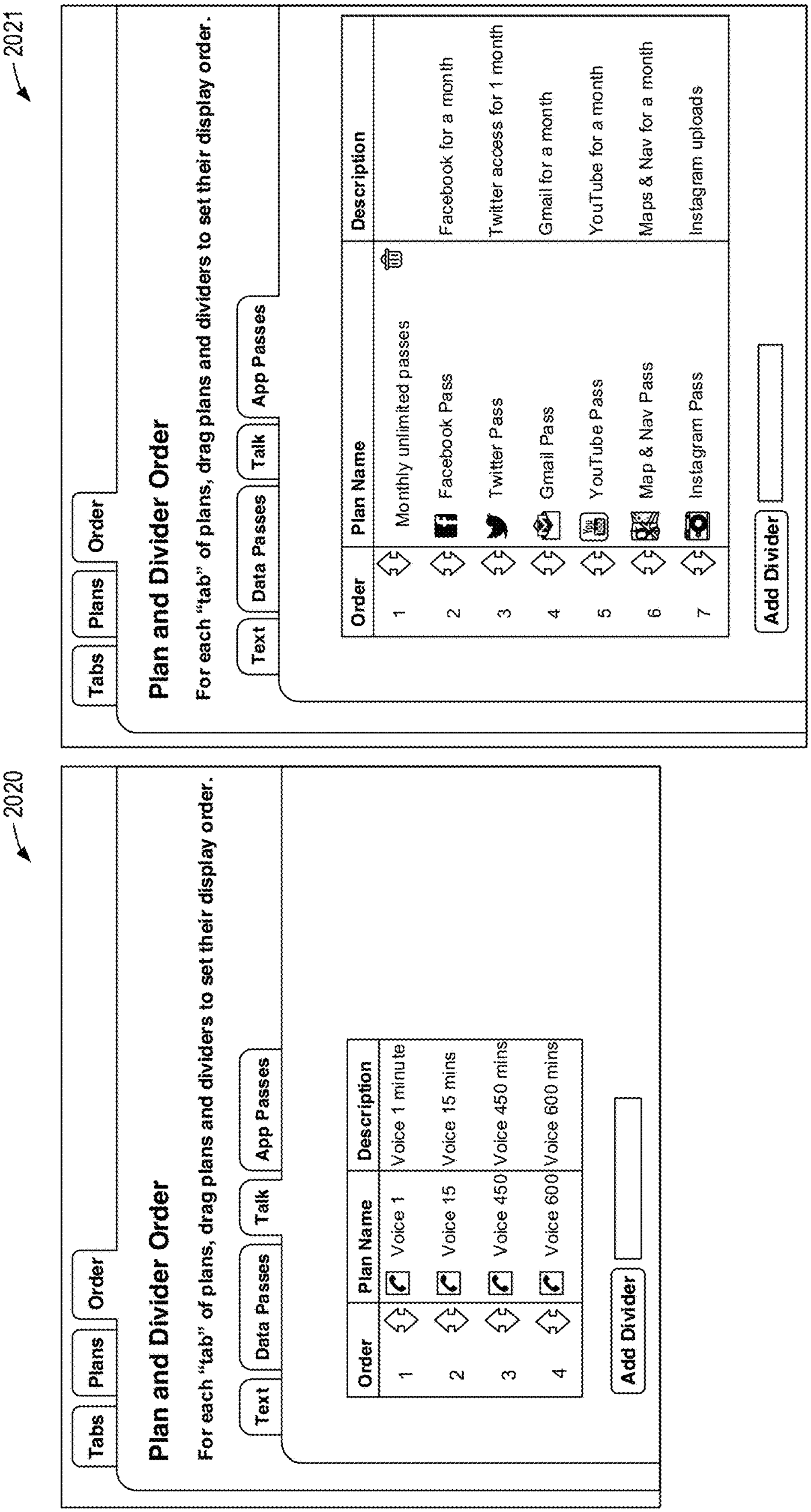

FIGS. 261 and 262 illustrate representative screens to determine an order for grouping and displaying service plans under specific tabs in accordance with some embodiments.

Figure 263:
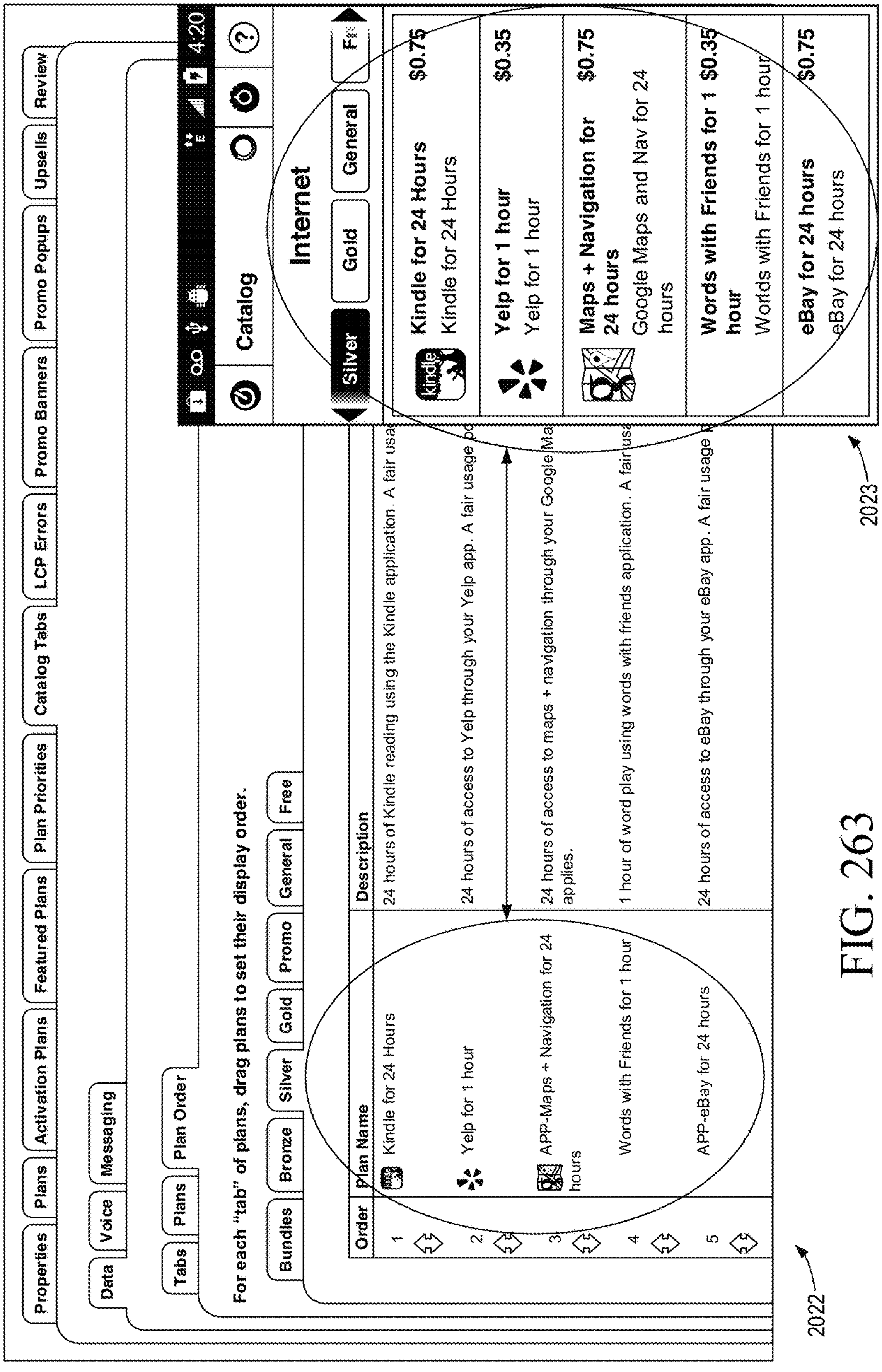

FIG. 263 illustrates a representative ordered display of service plans in a service plan catalog tab on a user interface of a mobile wireless communication device in accordance with some embodiments.

Figure 264:
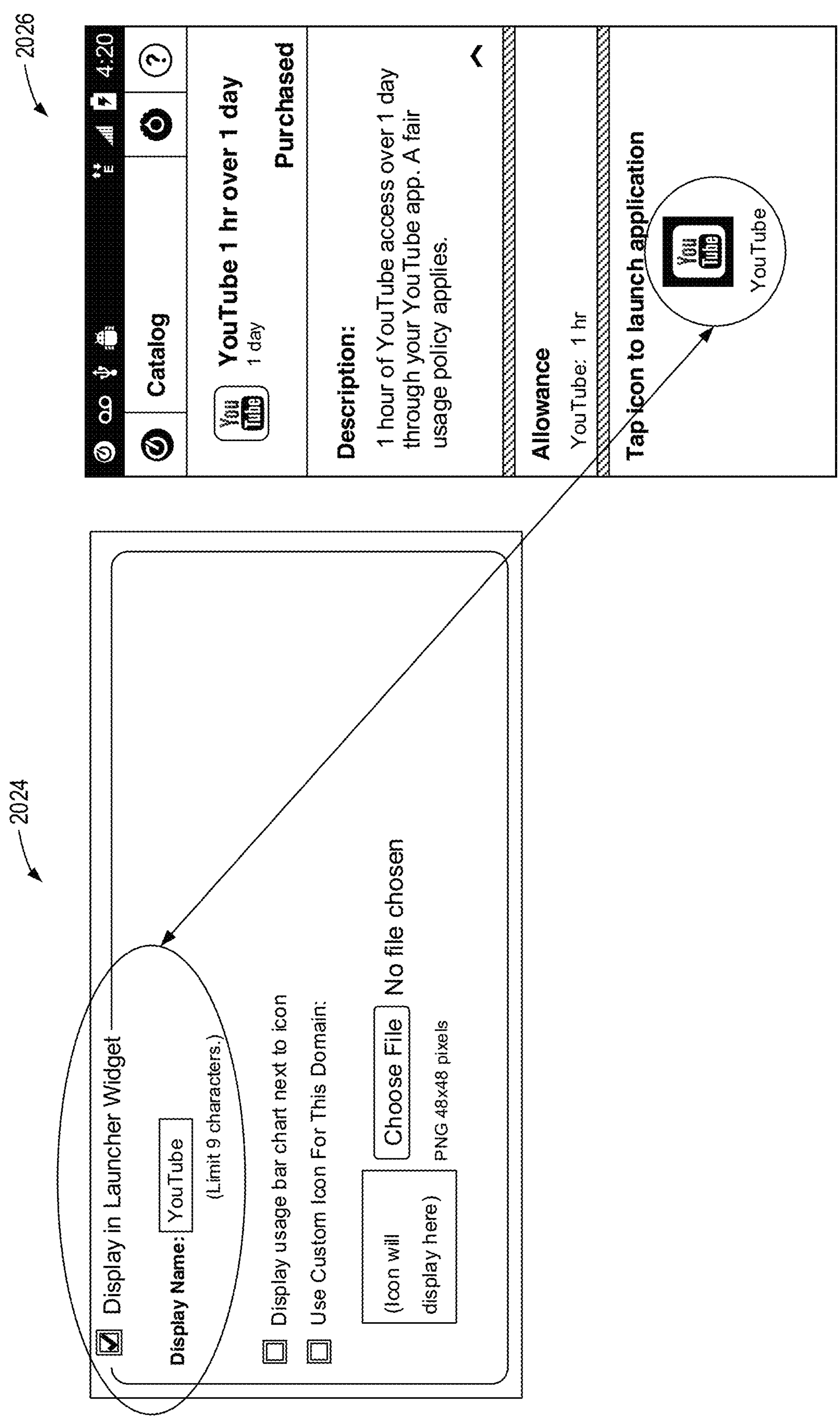

FIG. 264 illustrates a representative screen to display an application associated with a service plan on a user interface of a mobile wireless communication device in accordance with some embodiments.

Figure 265:
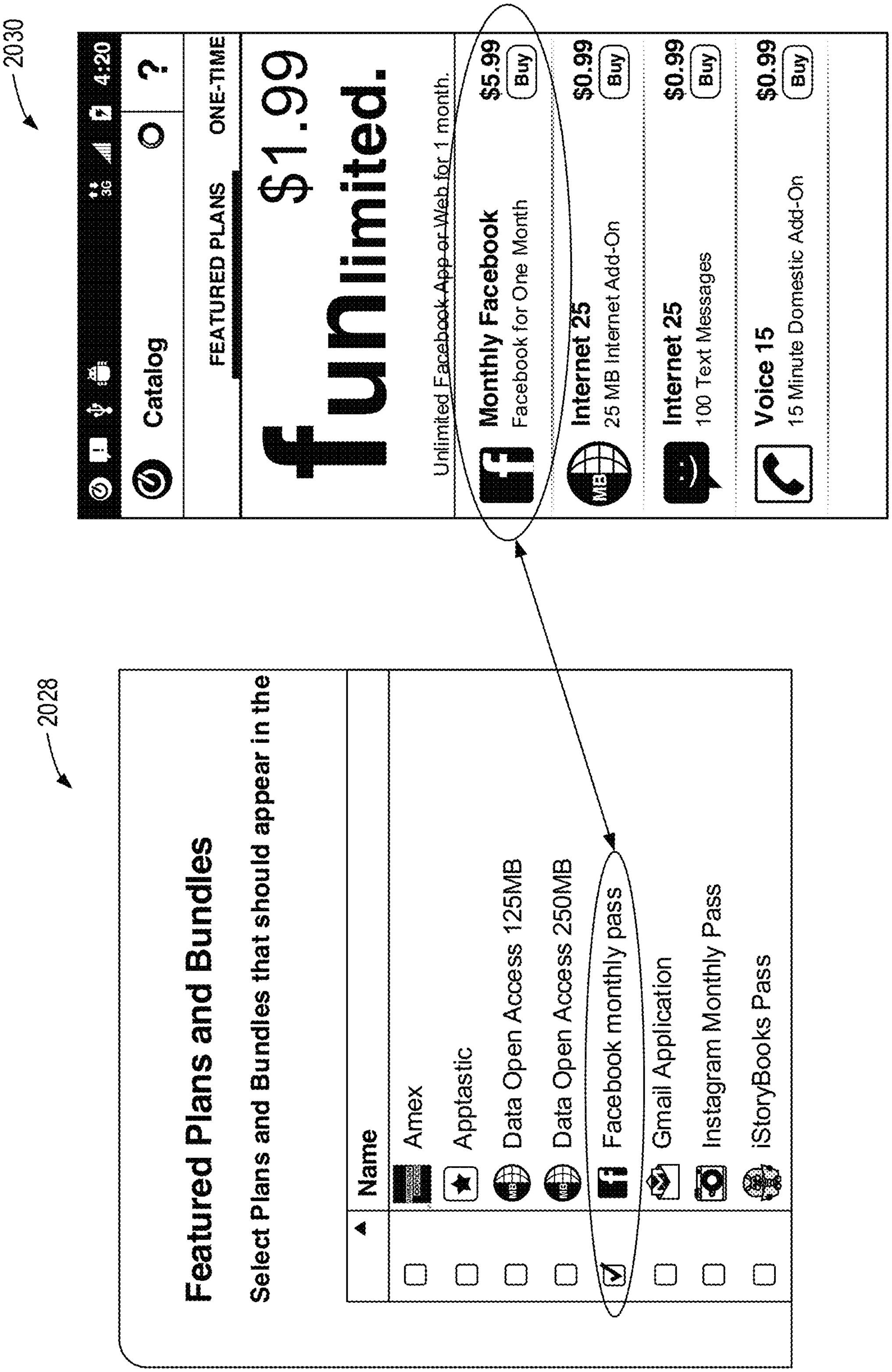

FIG. 265 illustrates a representative screen to select service plans to display in a listing of "Featured" service plans on a user interface of a mobile wireless communication device in accordance with some embodiments.

Figure 266:
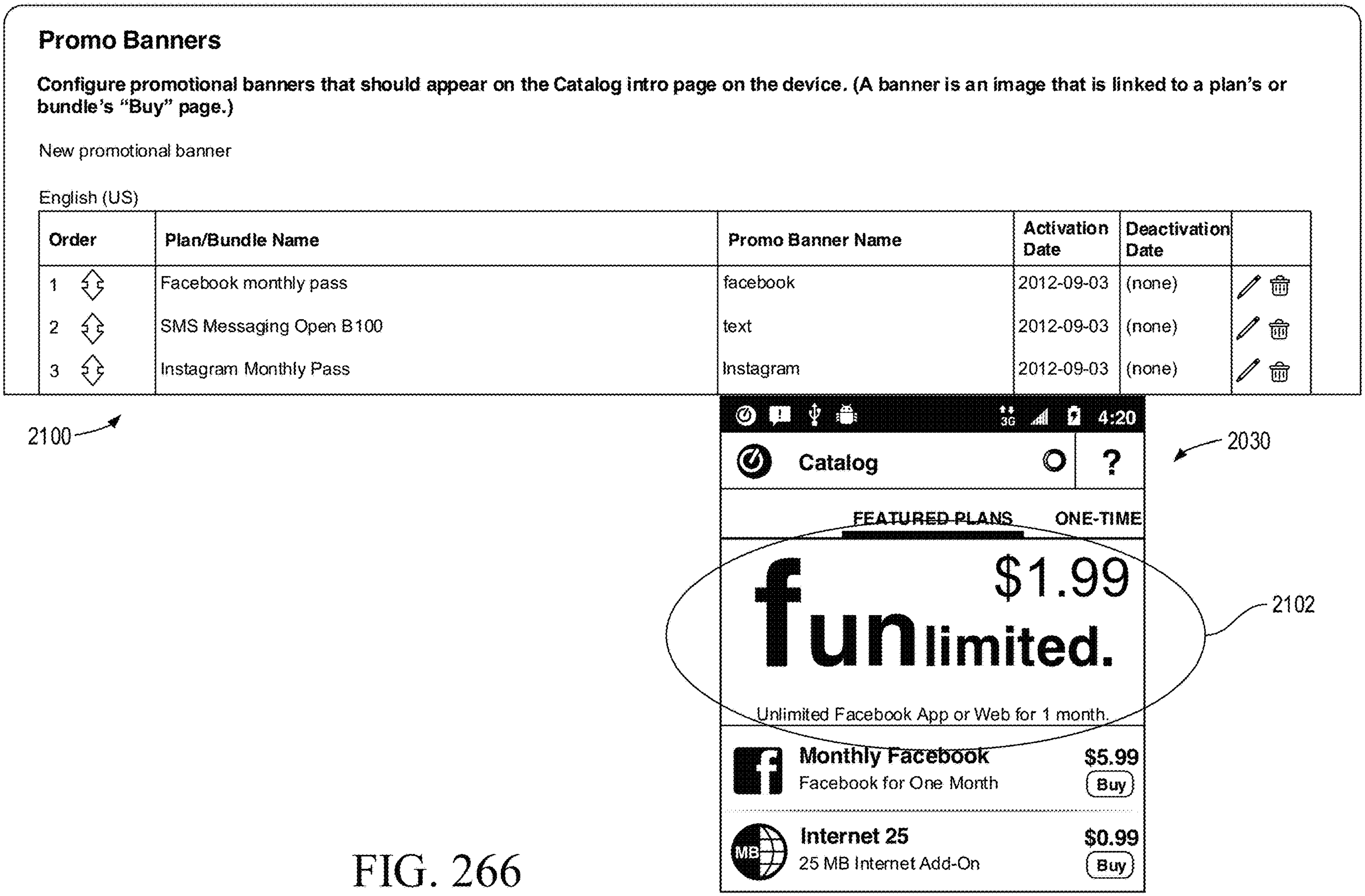

FIG. 266 illustrates a representative screen to configure a promotional banner that displays of a user interface of a mobile wireless communication device in accordance with some embodiments.

Figure 267:
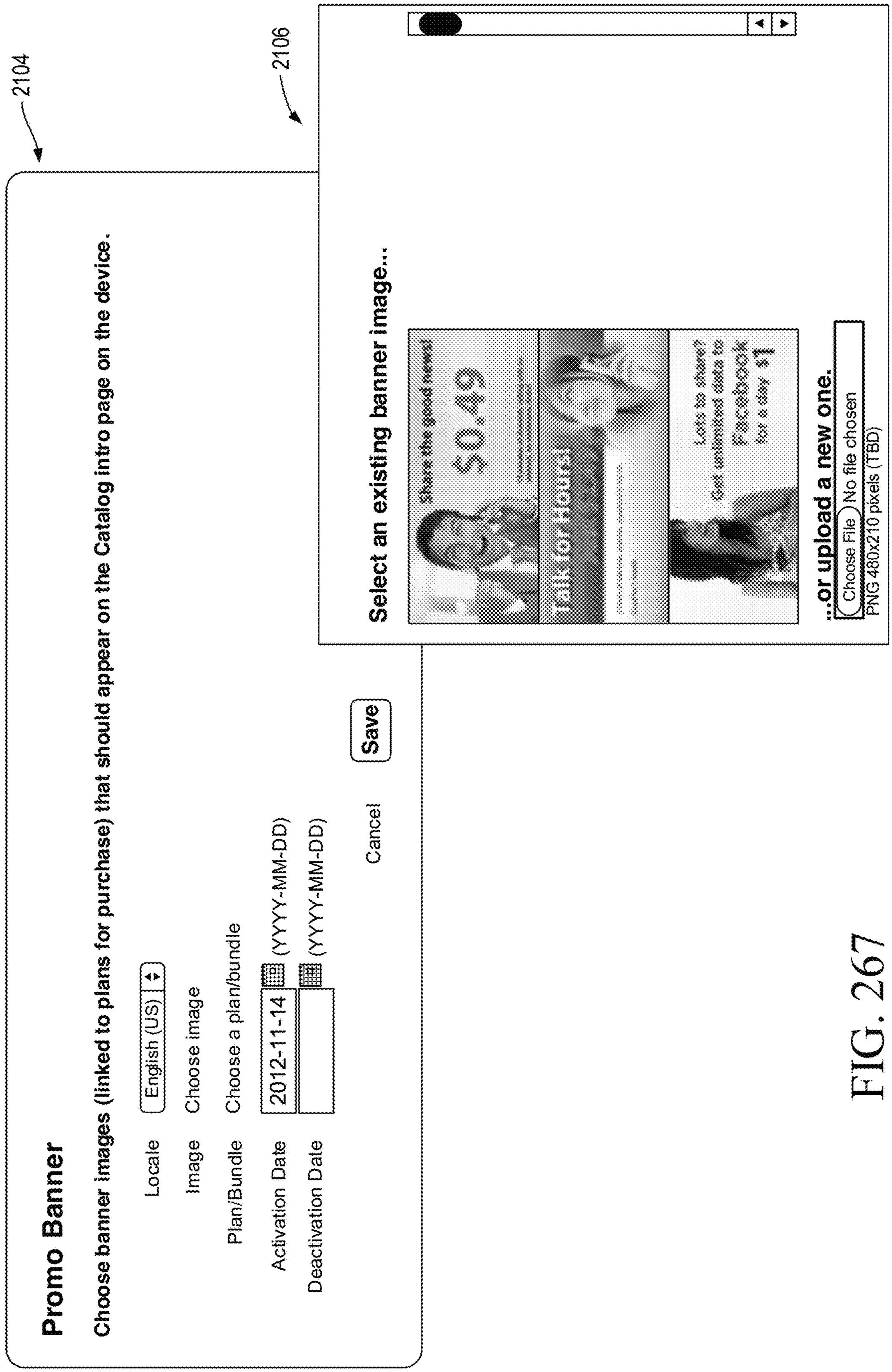

FIG. 267 illustrates a representative screen to determine a set of properties for a promotional banner that displays on a user interface of a mobile wireless communication device in accordance with some embodiments.

Figure 268:
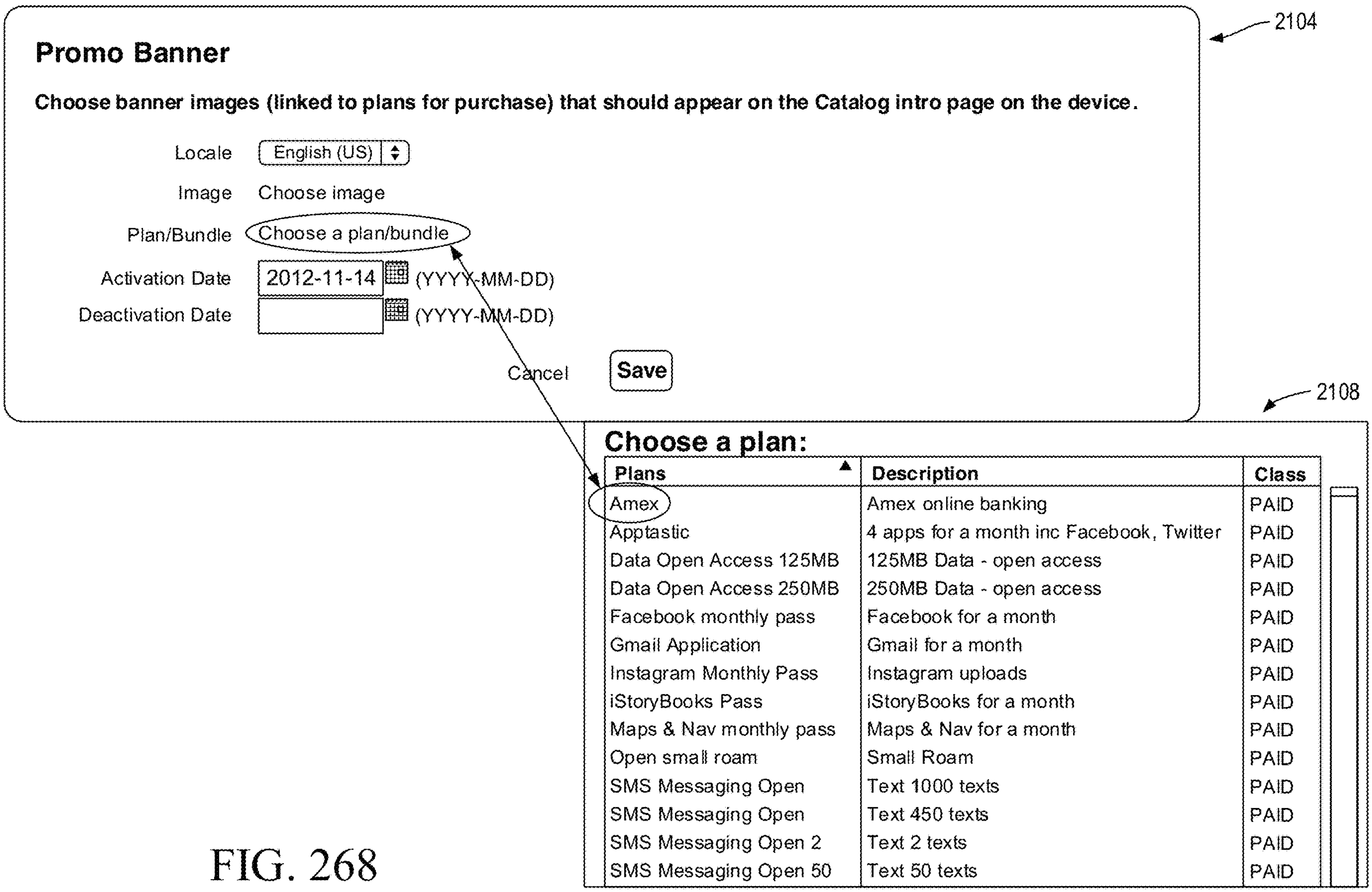

FIG. 268 illustrates a representative screen to select a service plan or for a promotional banner that displays on a user interface of a mobile wireless communication device in accordance with some embodiments.

Figure 269:
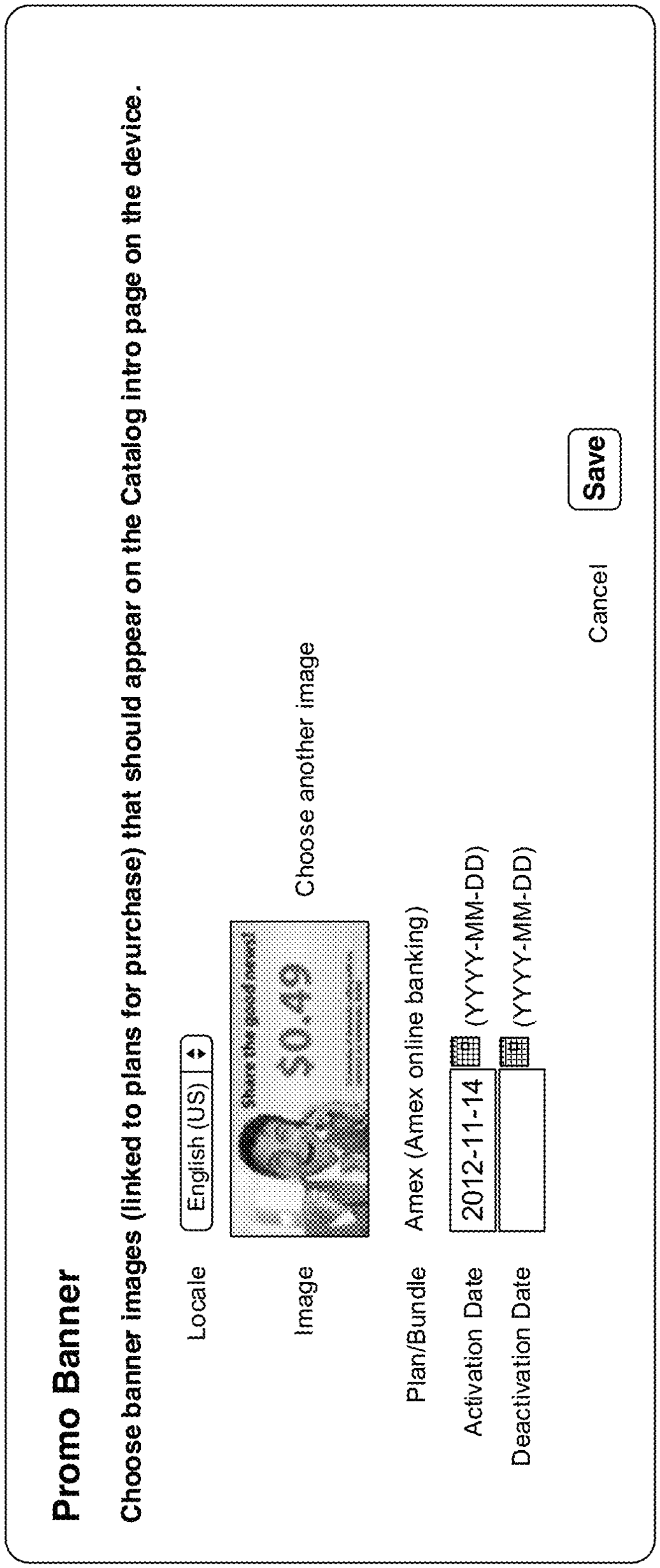

FIG. 269 illustrates a representative screen to configure properties of a promotional banner that displays on a user interface of a mobile wireless communication device in accordance with some embodiments.

Figure 270:
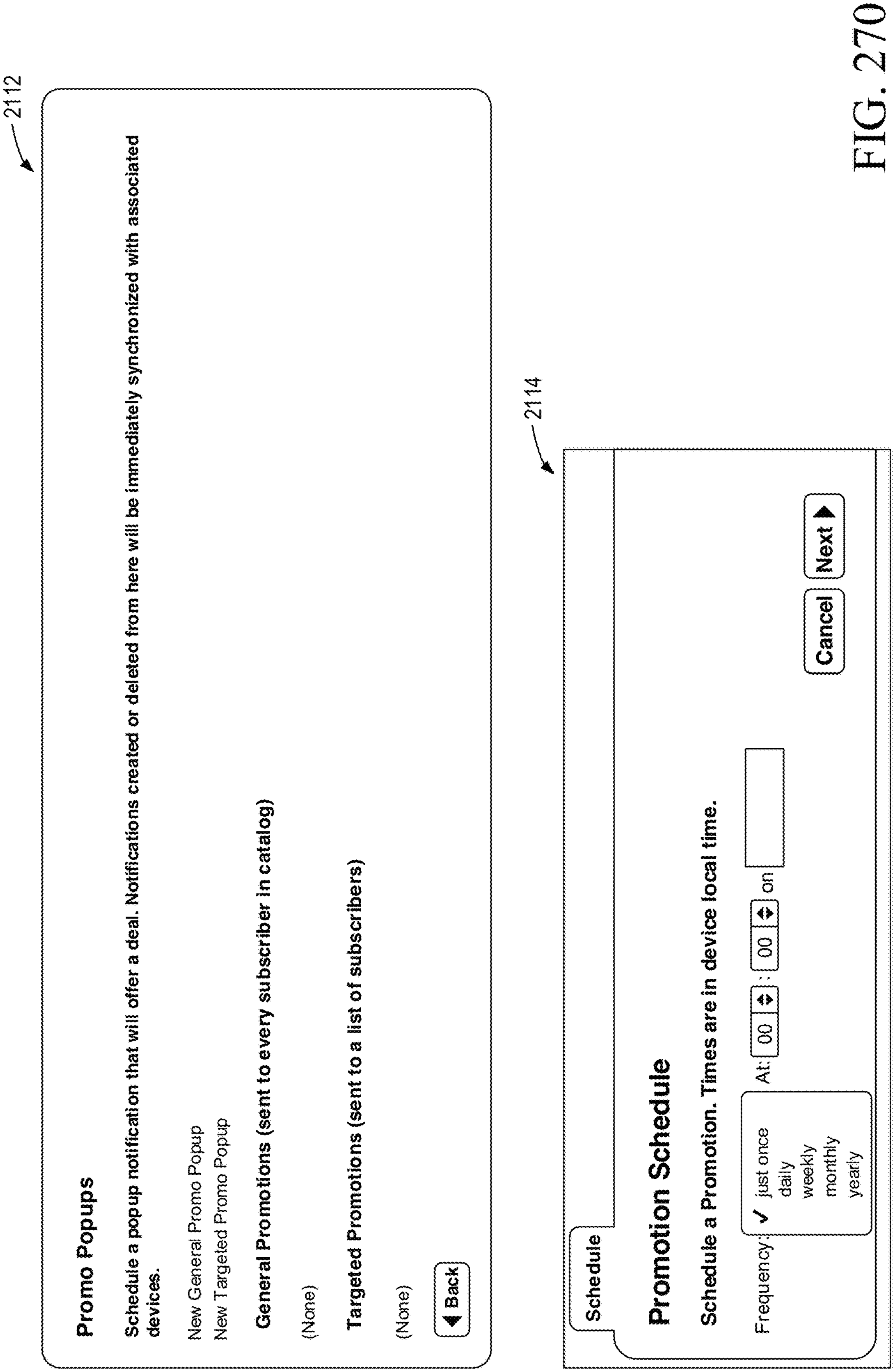

FIG. 270 illustrates representative screens to schedule display of a promotional notification message a user interface of a mobile wireless communication device in accordance with some embodiments.

Figure 271:
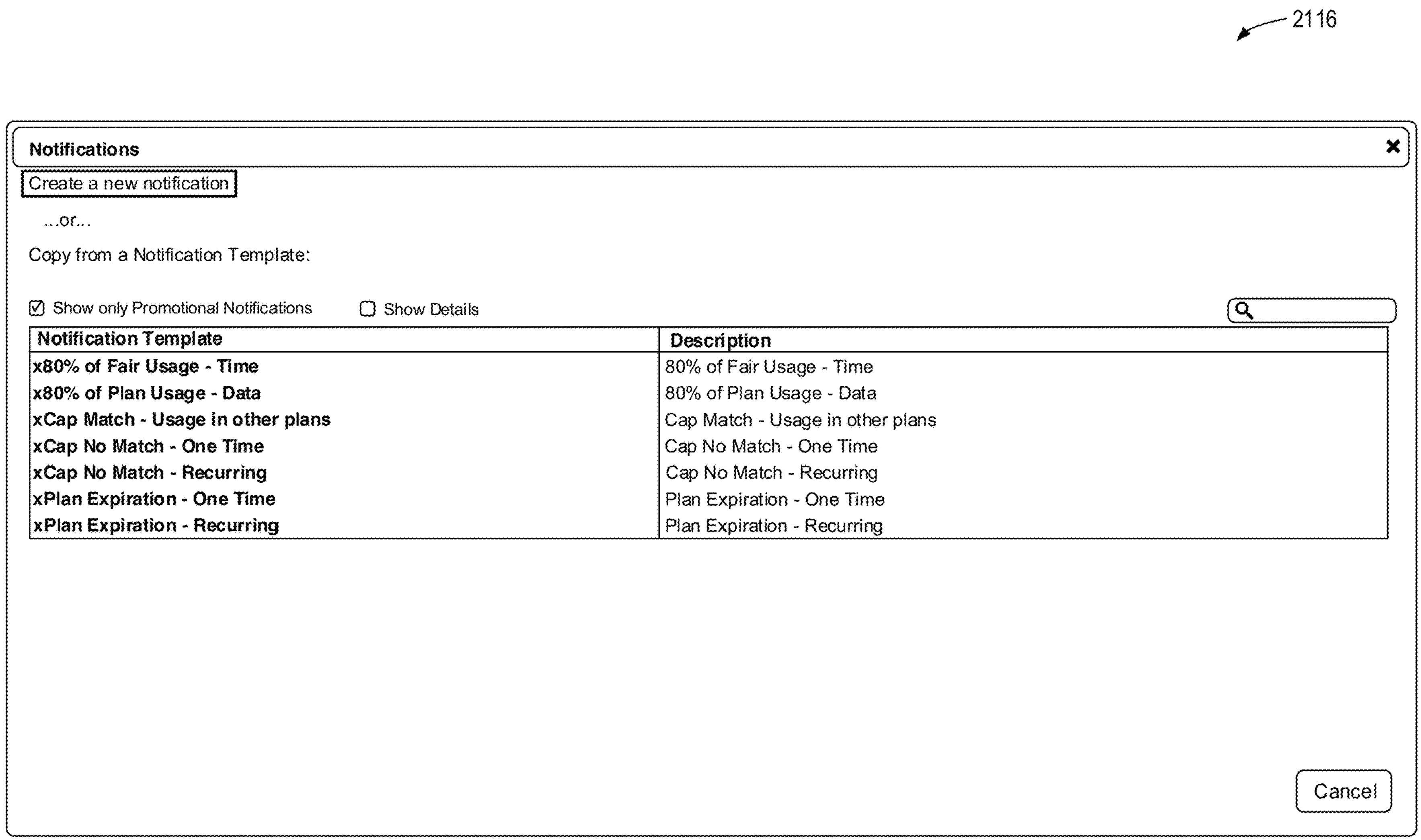
Figure 272:
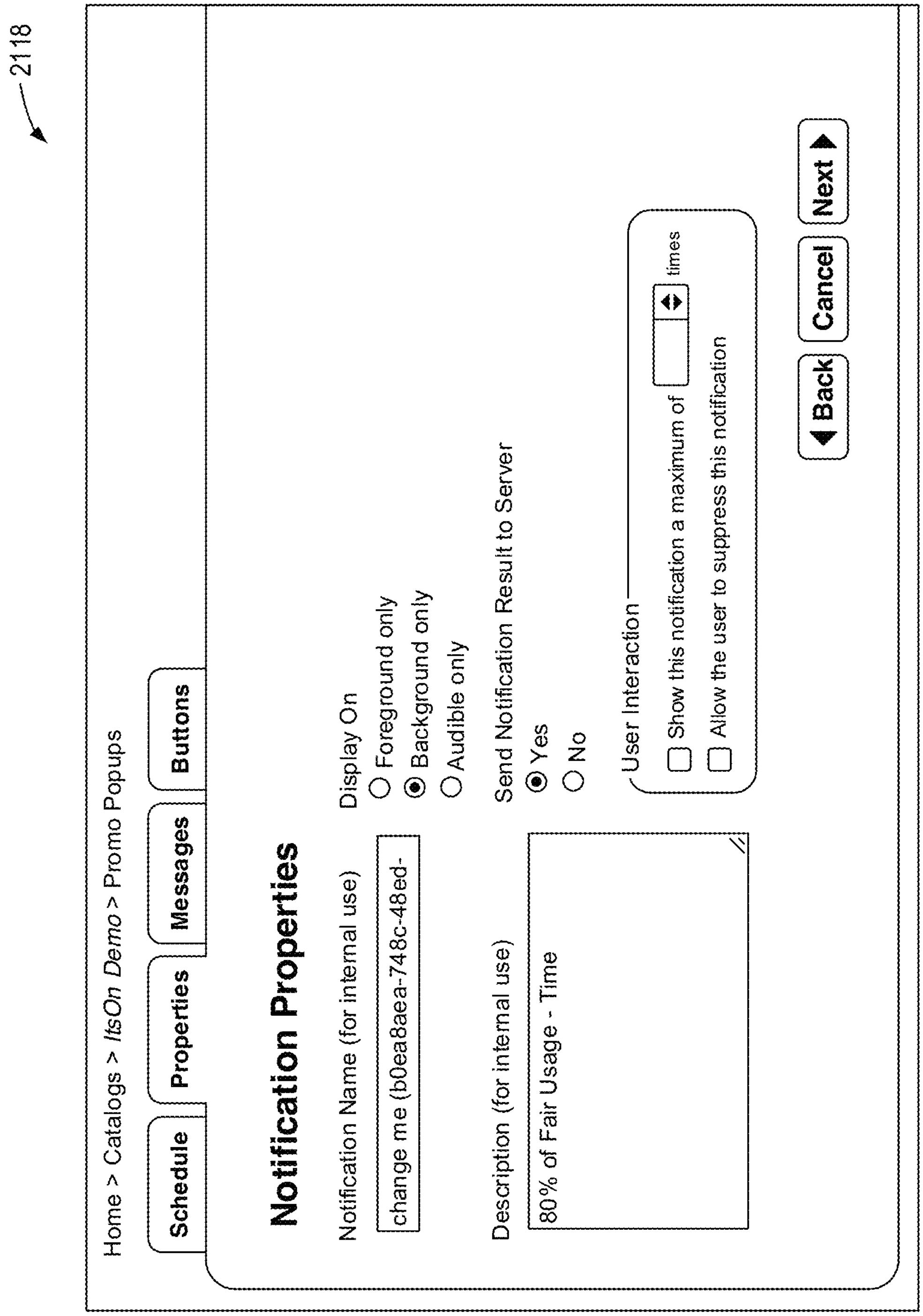
Figure 273:
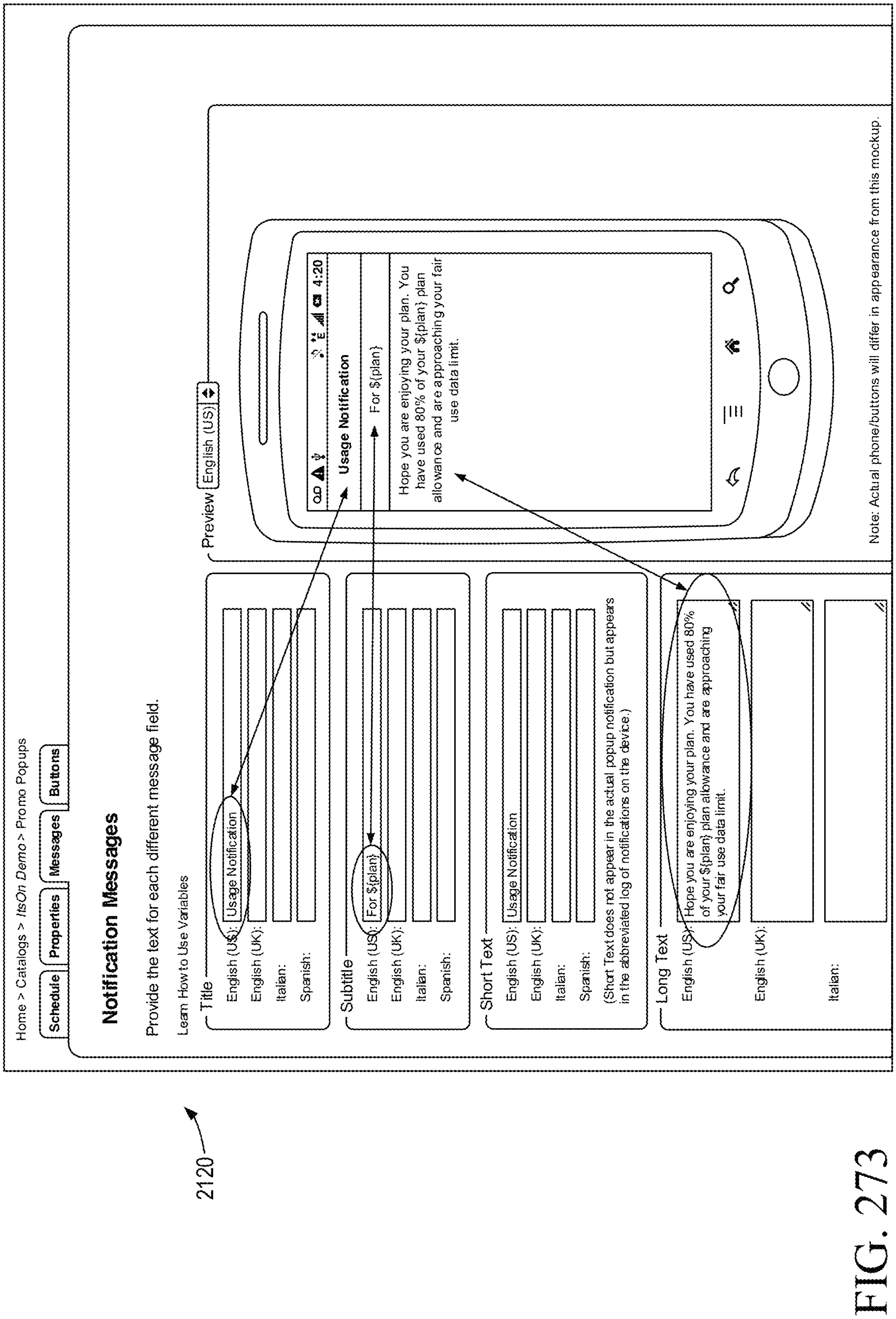

FIGS. 271, 272 and 273 illustrate representative screens to determine contents and properties for a promotional notification message to displays on a user interface of a mobile wireless communication device in accordance with some embodiments.

Figure 274:
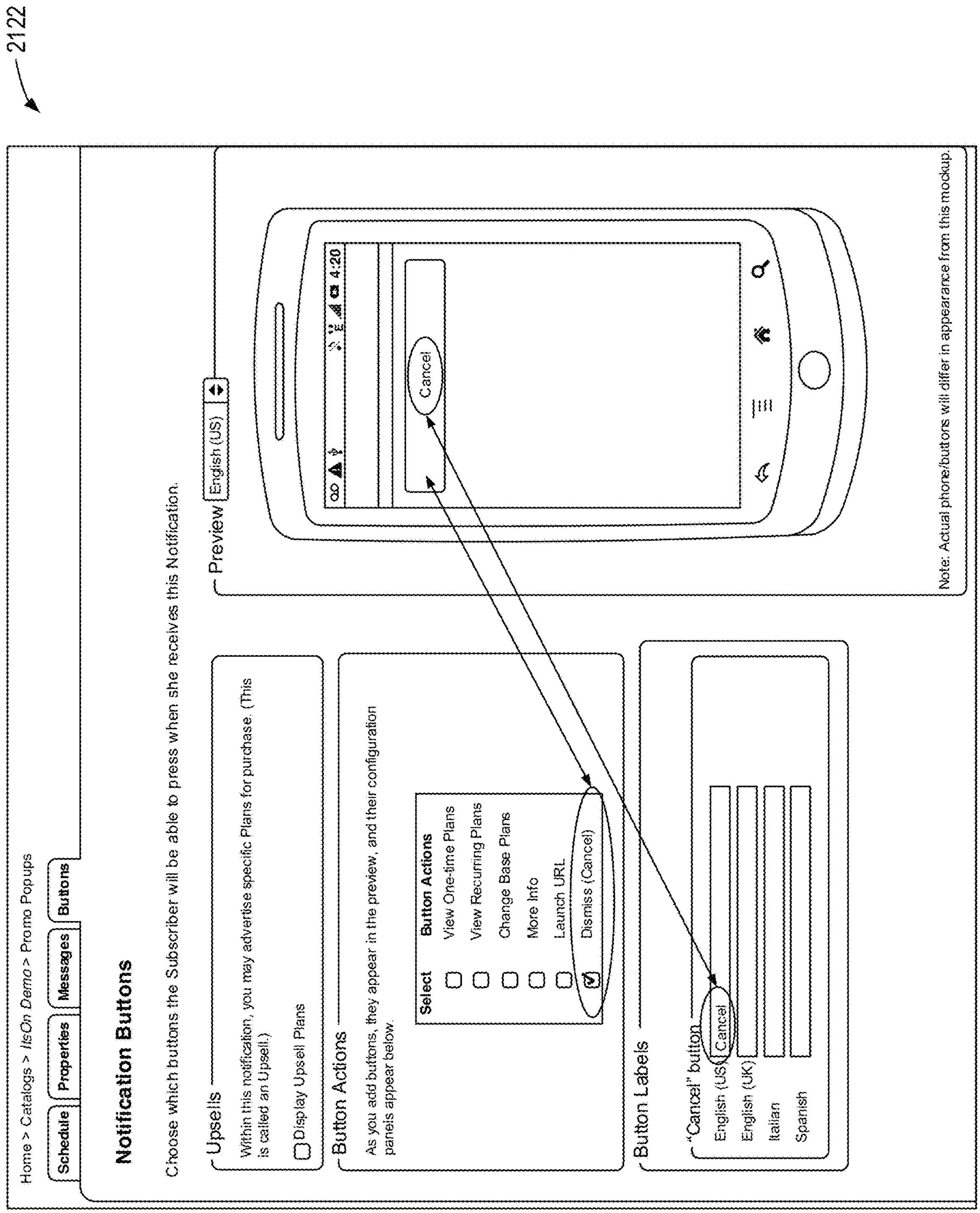

FIG. 274 illustrates a representative screen to select buttons to display as part of a promotional notification message through the user interface of a mobile wireless communication device in accordance with some embodiments.

Figure 275:
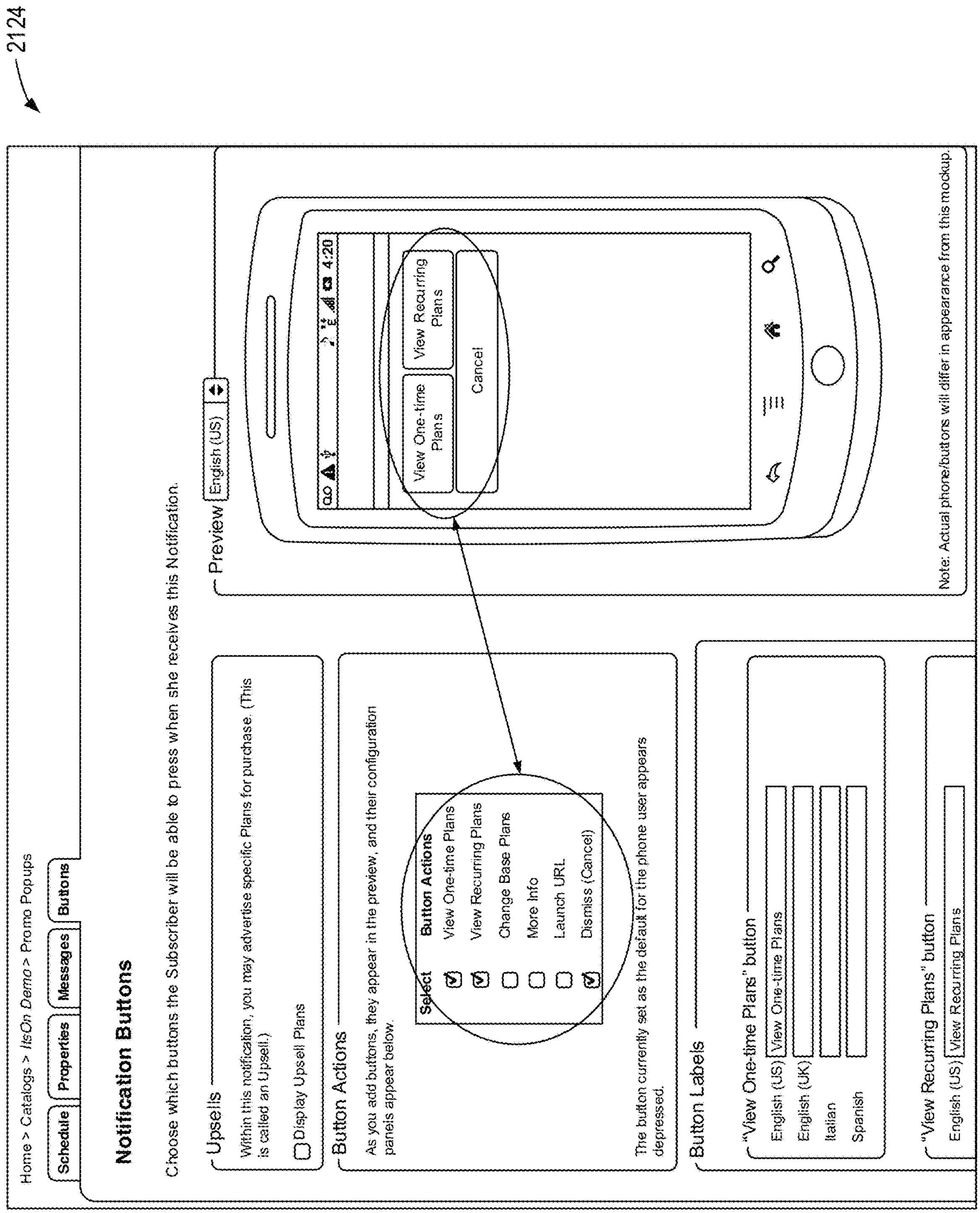

FIG. 275 illustrates a representative screen illustrating actionable buttons that display with a representative notification message through the user interface of a mobile wireless communication device in accordance with some embodiments.

Figure 276:
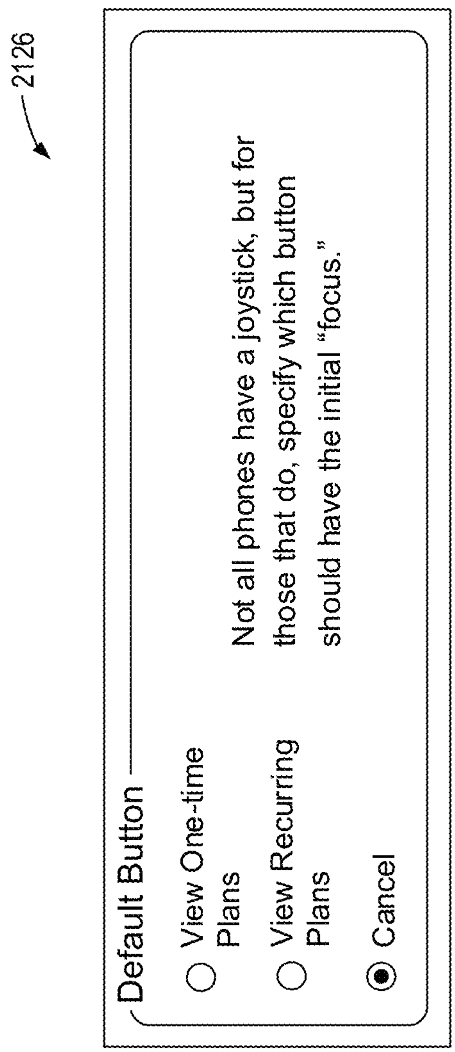

FIG. 276 illustrates a representative screen to set a default button property associated with a promotional notification message in accordance with some embodiments.

Figure 277:
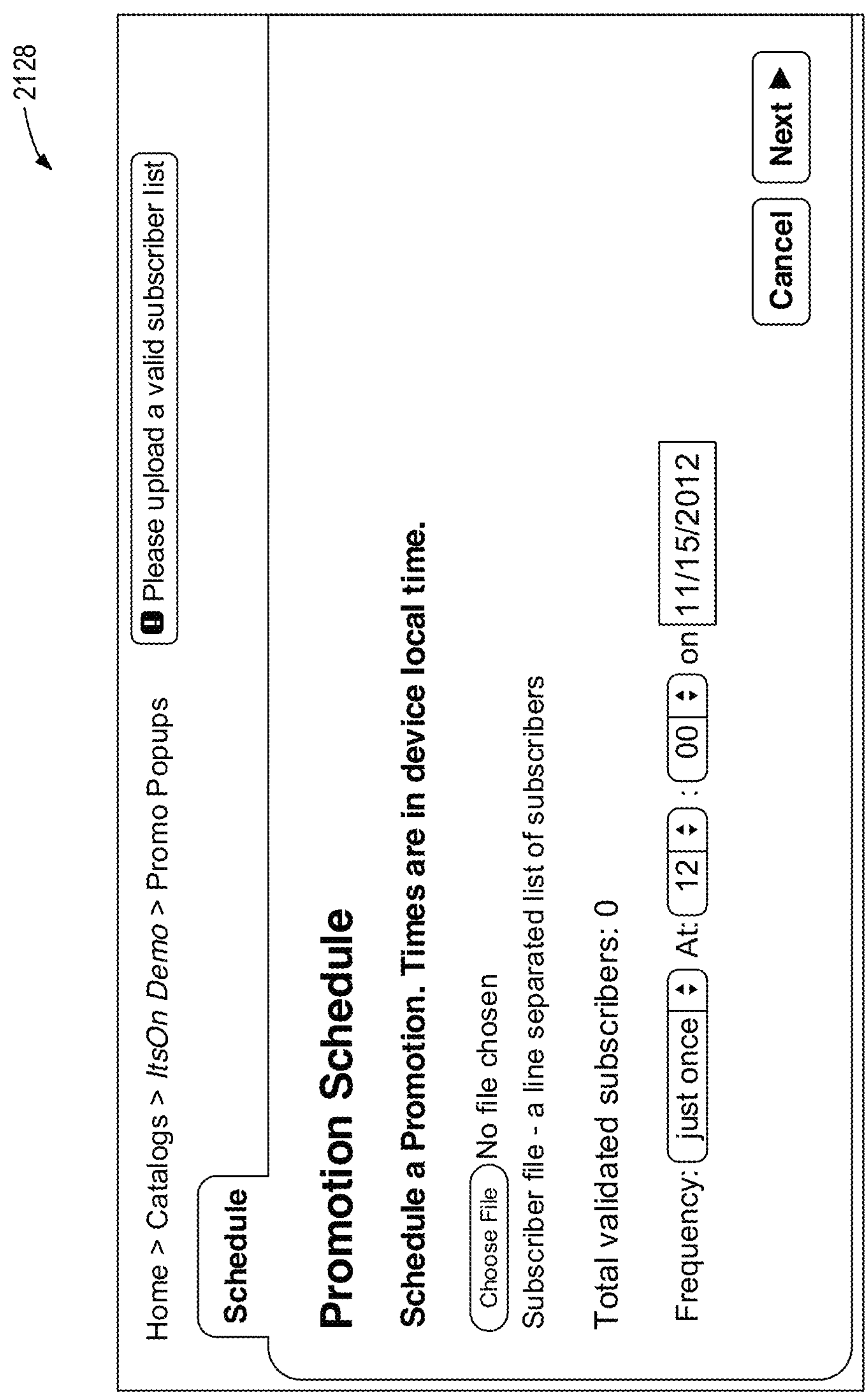

FIG. 277 illustrates a representative screen to associate a set of subscribers with a promotional notification message in accordance with some embodiments.

Figure 278:
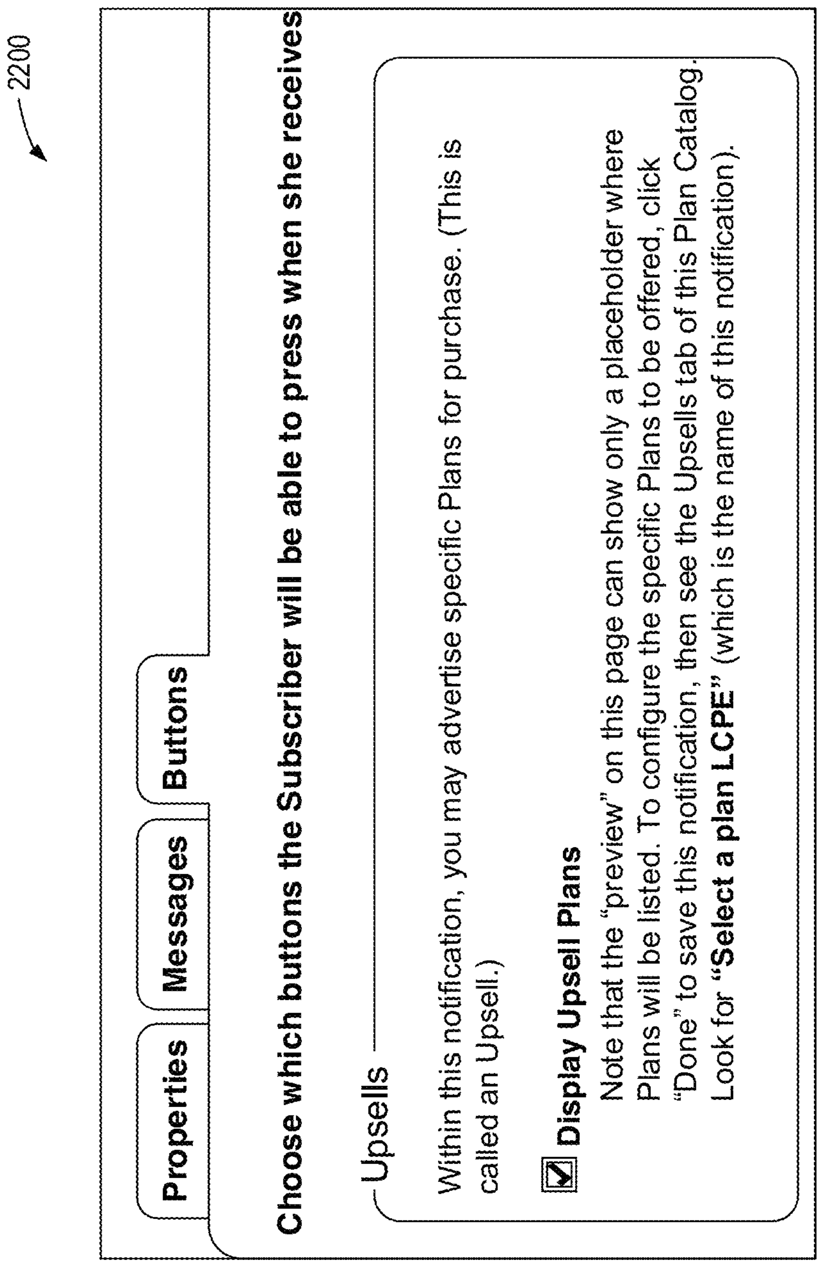

FIG. 278 illustrates a representative screen to display "Upsell" service plans with a notification message in accordance with some embodiments.

Figure 279:
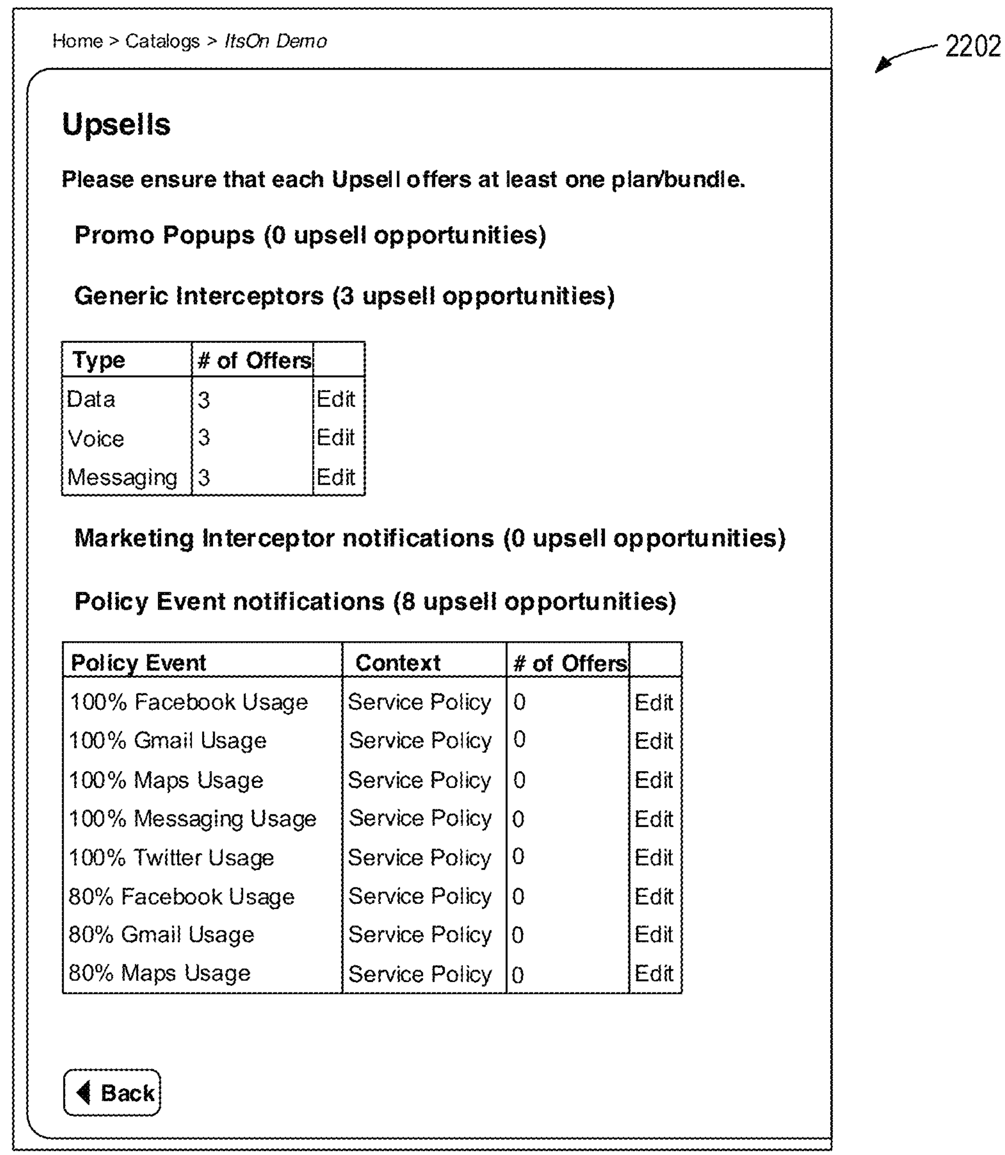

FIG. 279 illustrates a representative screen summarizing a set of "Upsells" associated with a service plan catalog in accordance with some embodiments.

Figure 280:
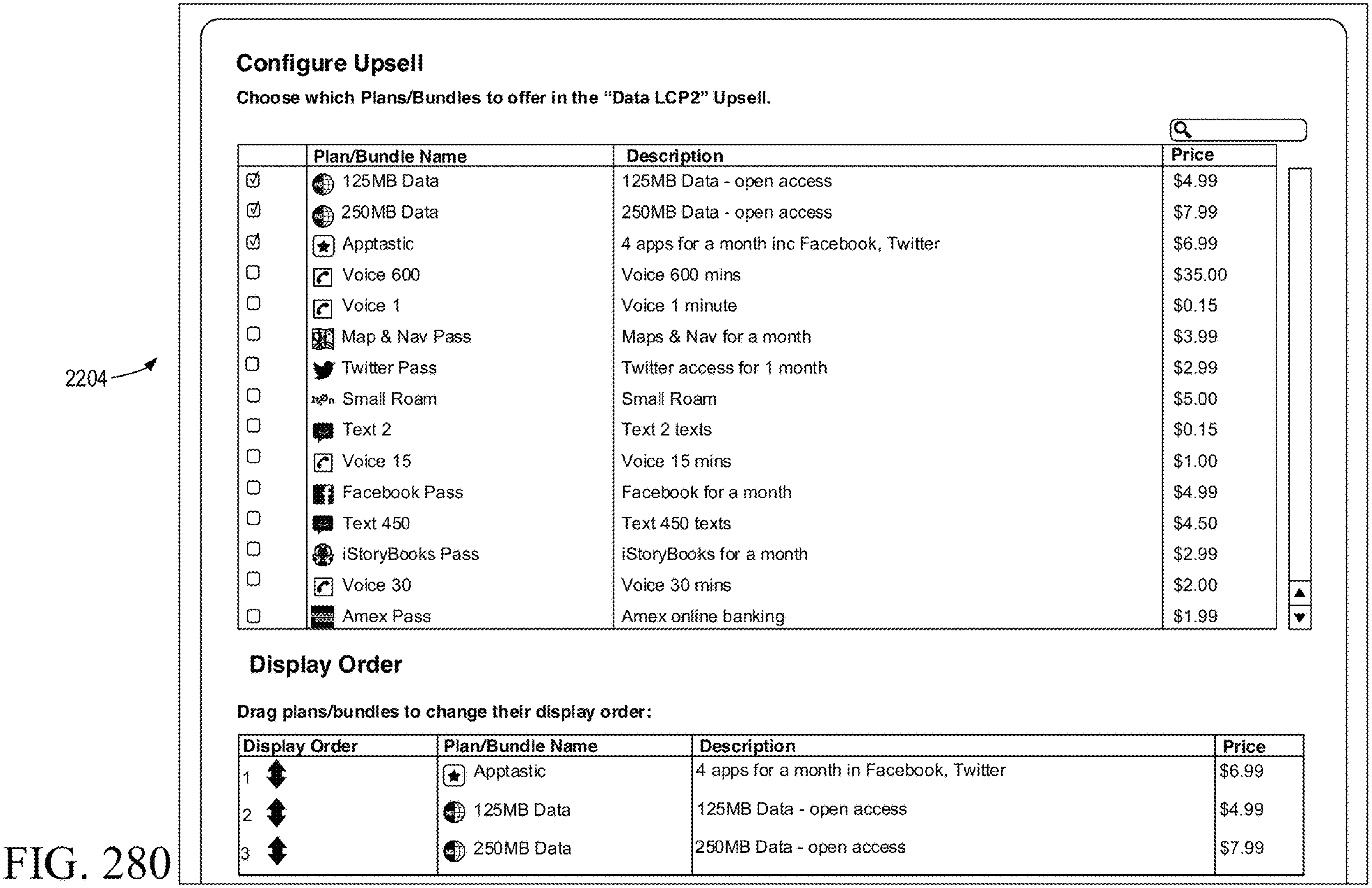

FIG. 280 illustrates a representative screen to select a set of service plans to associate with a notification message as upsell opportunities in accordance with some embodiments.

Figure 281:
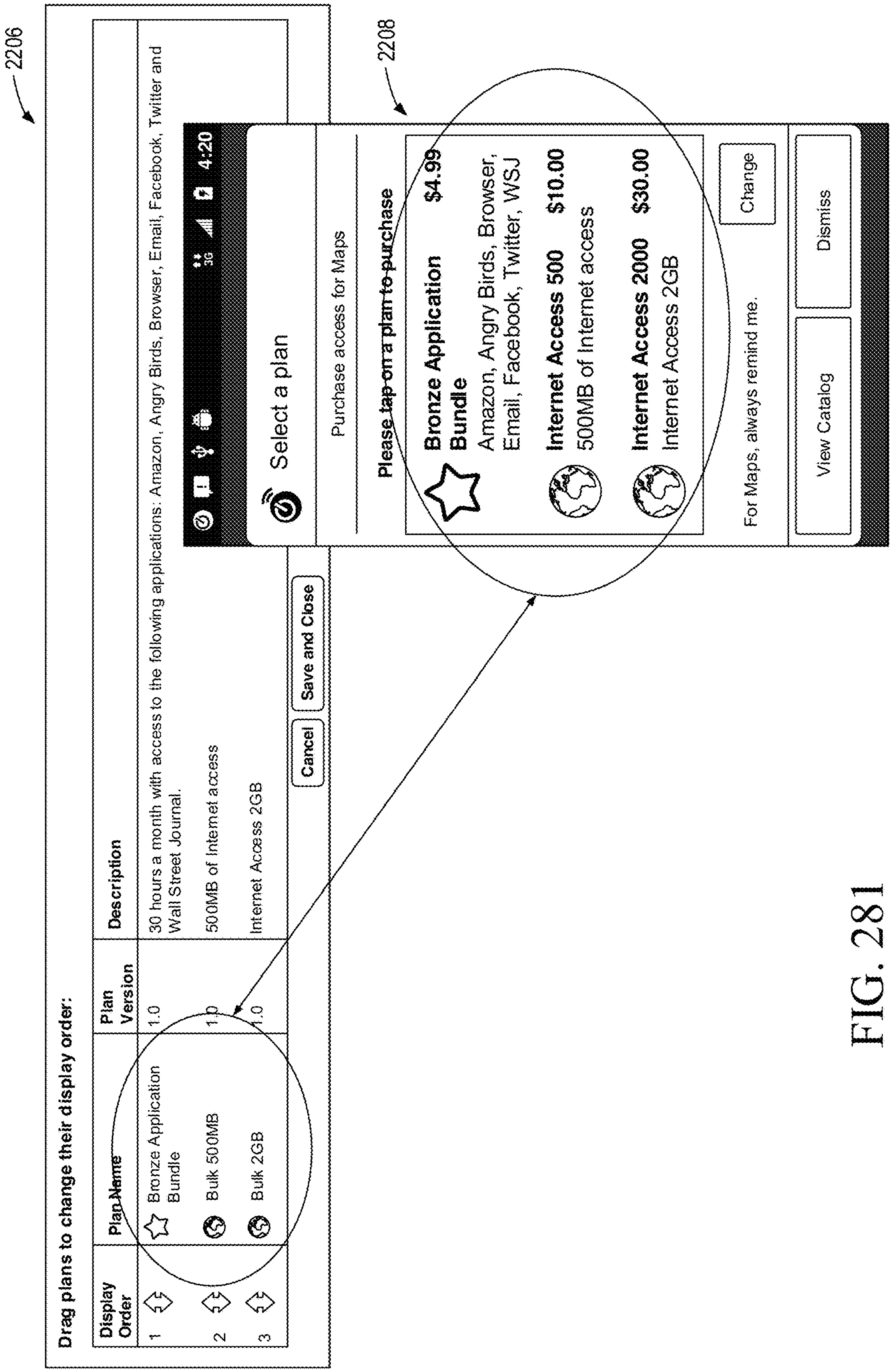

FIG. 281 illustrates a representative screen that illustrates a display ordering for a set of "Upsell" service plans associated with a notification message in accordance with some embodiments.

FIG. 282 illustrates a representative screen summarizing a set of promotional notification templates to configure promotional notification messages in accordance with some embodiments.

FIG. 283 illustrates a representative screen summarizing a set of notification templates to configure "Lacks Capable Plan Error" (LCPE) notification messages in accordance with some embodiments.

FIG. 284 illustrates a representative screen listing of a set of subscribers including select information for each subscriber in accordance with some embodiments.

Figure 285:
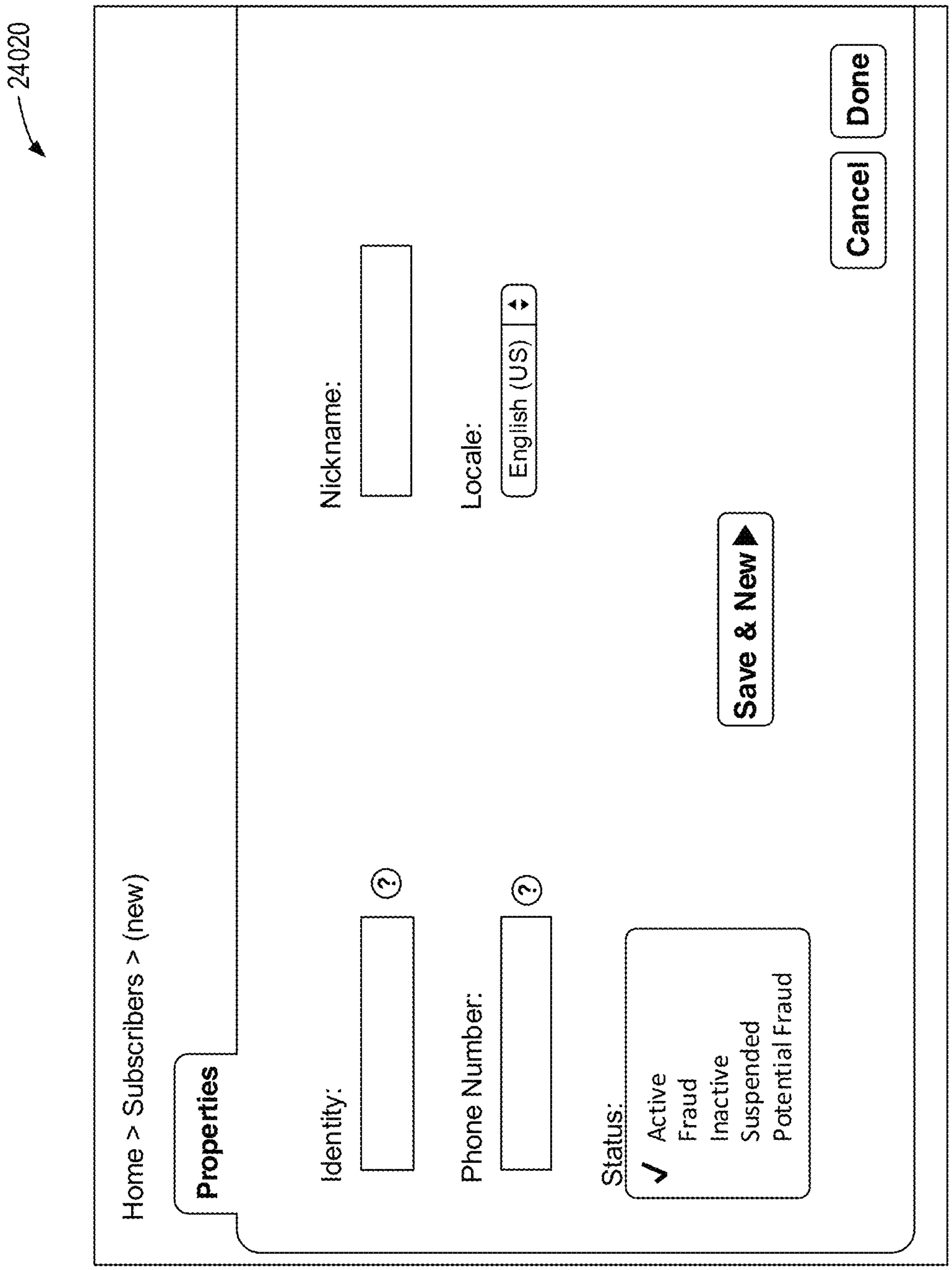

FIG. 285 illustrates a representative screen to create a new subscriber and enter detailed information for the new subscriber in accordance with some embodiments.

Figure 286:
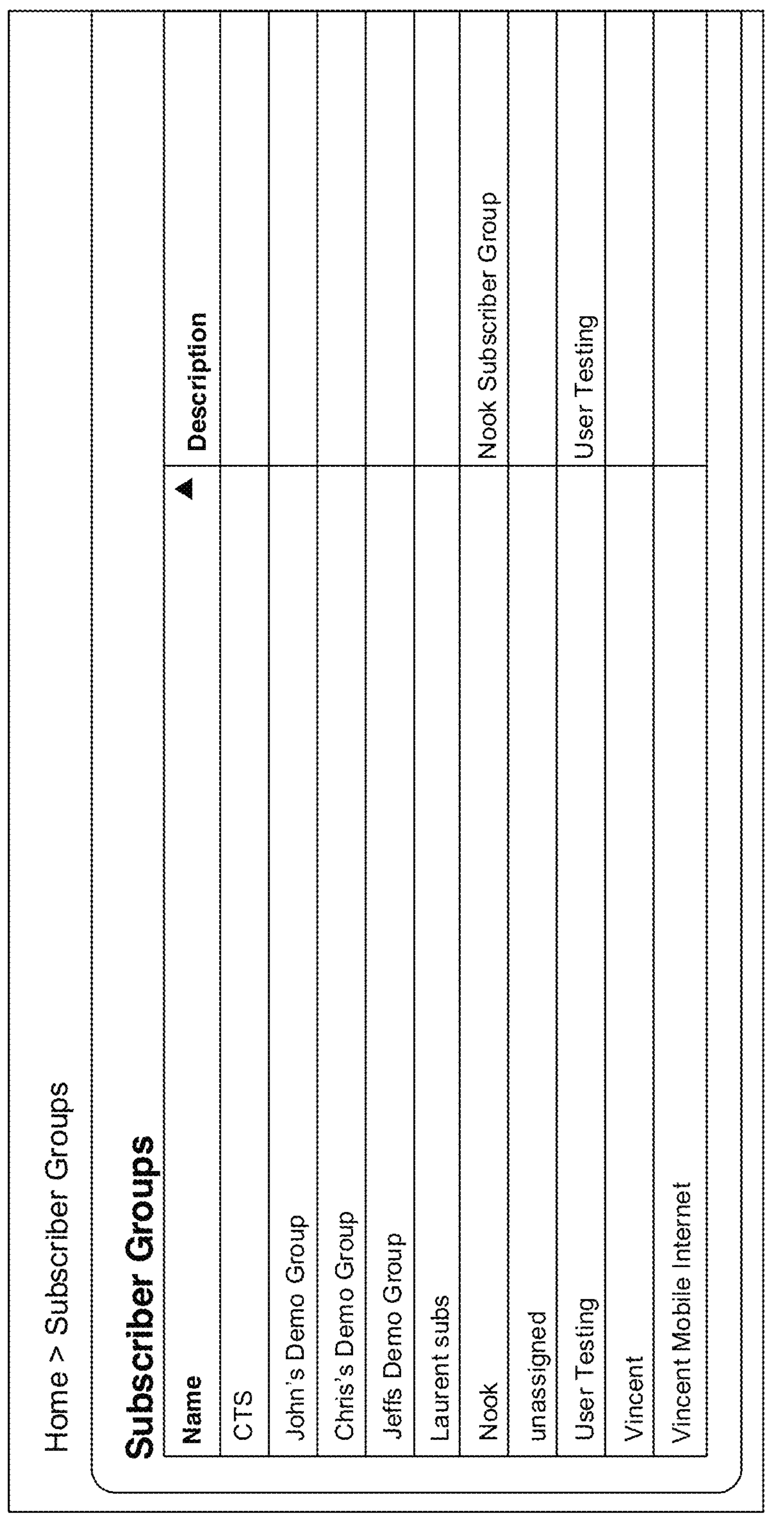

FIG. 286 illustrates a representative screen of information on subscriber groups in accordance with some embodiments.

FIGS. 287, 288, 289, and 290 illustrate several screens of tabs to define properties, subscribers, and associated service plan catalogs of a subscriber group in accordance with some embodiments.

Figure 291:
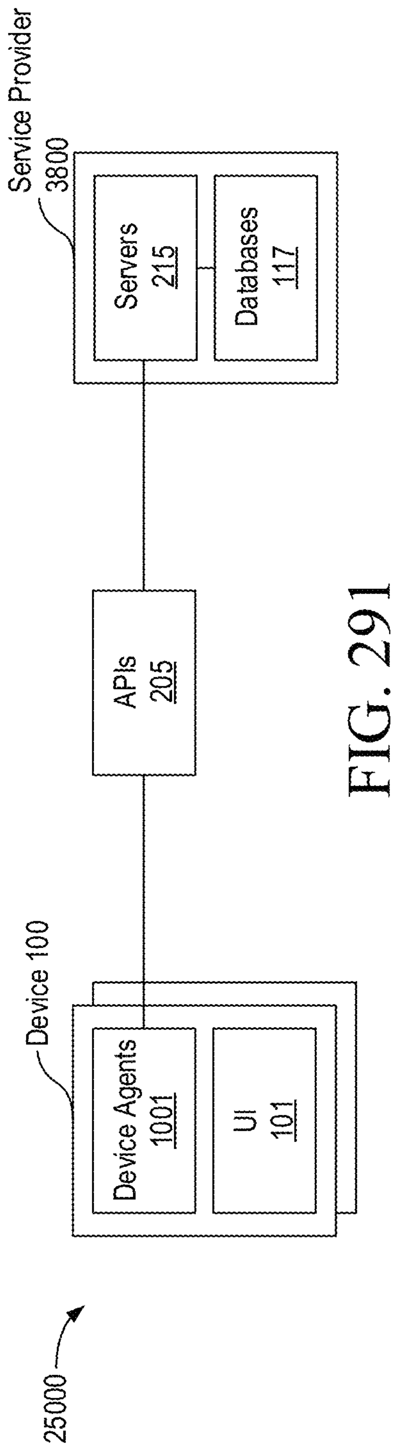

FIG. 291 illustrates a system in which one or more devices communicate through a set of APIs with a service provider in accordance with some embodiments.

Figure 292:
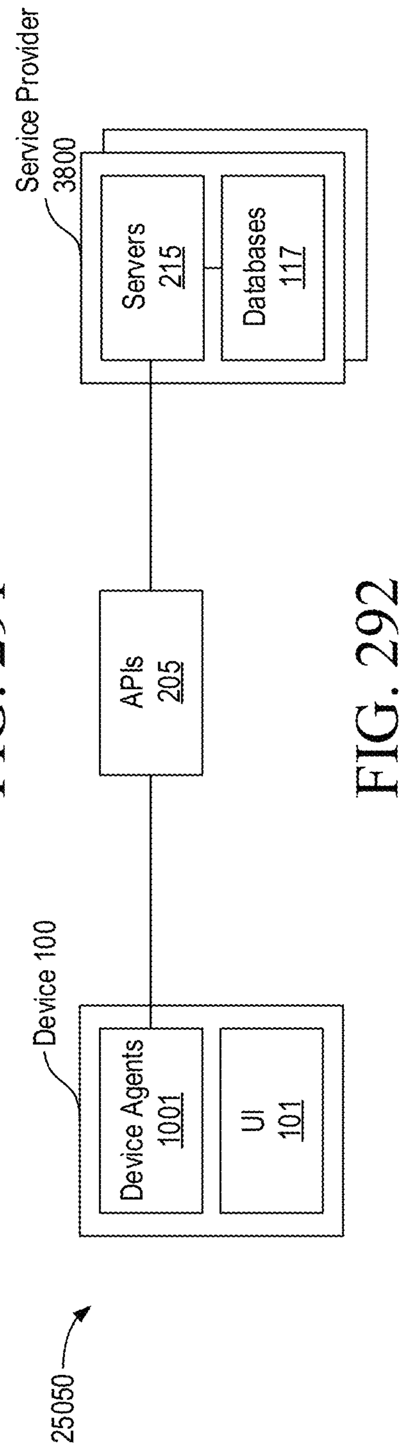

FIG. 292 illustrates a system in which one or more service providers communicate with a device through a set of device APIs in accordance with some embodiments.

Figure 293:
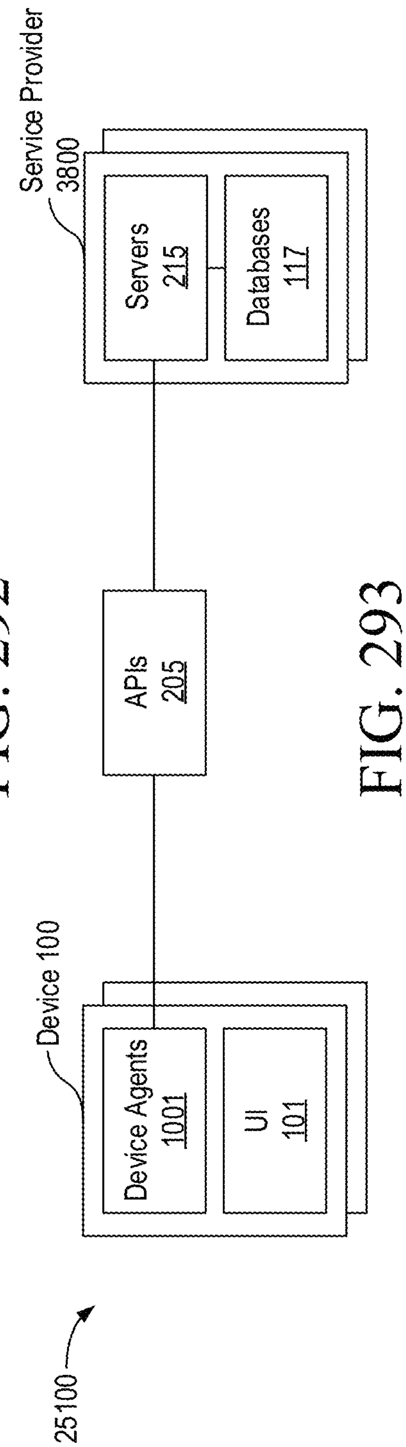

FIG. 293 illustrates a system in which multiple service providers communicate with devices from multiple device suppliers through a common set of device APIs in accordance with some embodiments.

Figure 294:
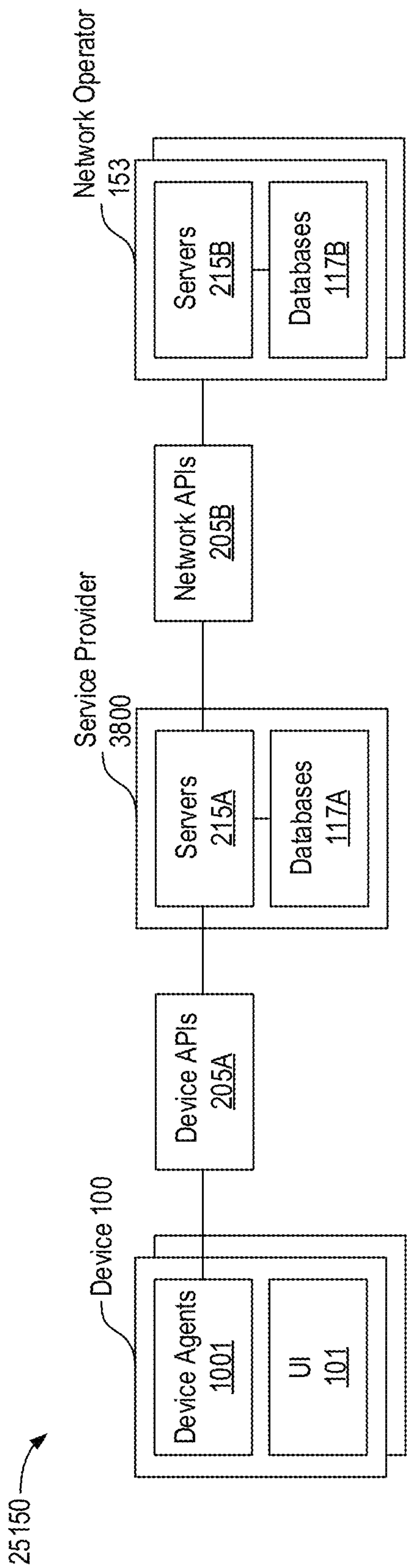

FIG. 294 illustrates a system in which a service provider offers one or more communication services to mobile devices over communication networks owned and managed by one or more network operators in accordance with some embodiments.

Figure 295:
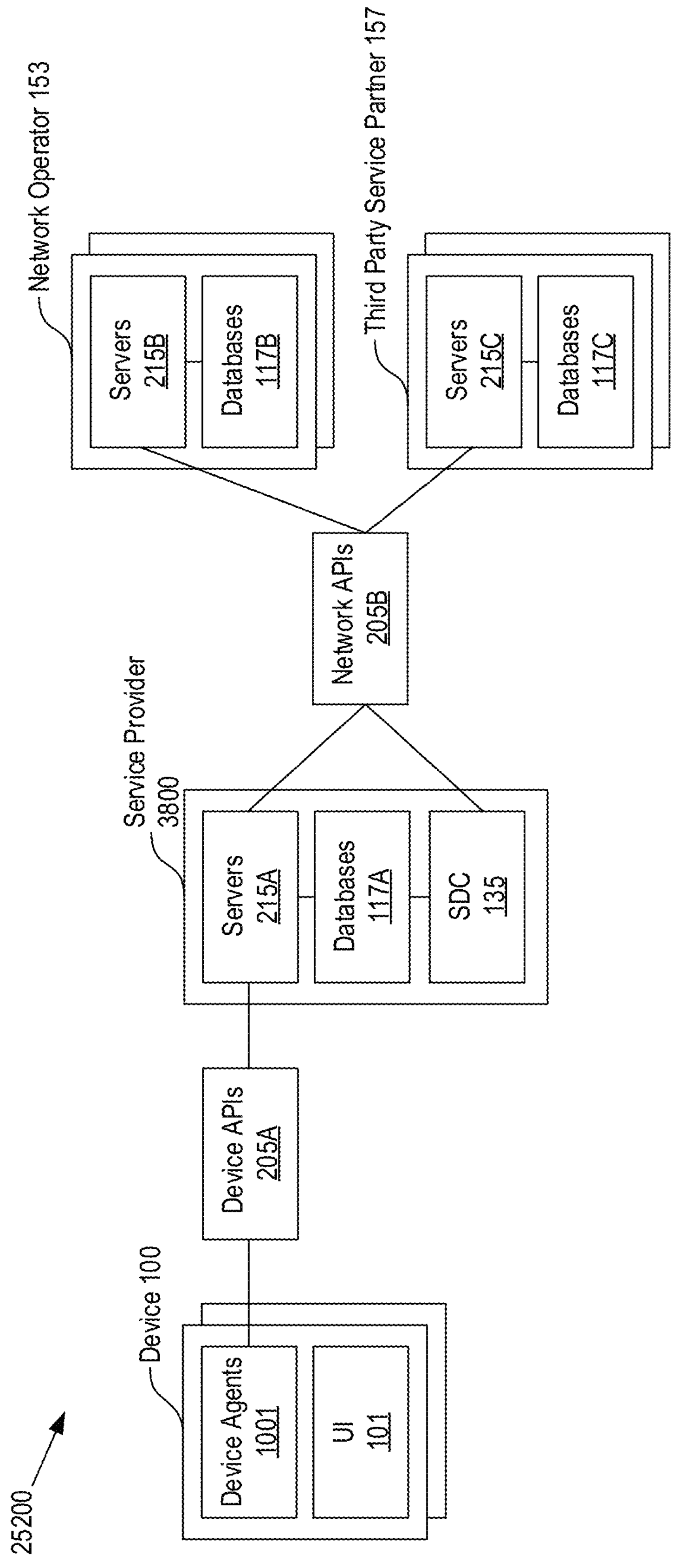

FIG. 295 illustrates a system in which a service provider includes a service design center to provide for service plan design and management through a set of APIs in accordance with some embodiments.

FIGS. 296 to 299 illustrate systems with one or more sets of APIs through which one or more service partners and/or service providers can interface to manage communication services for mobile devices in accordance with some embodiments.

FIG. 300 to 305 illustrate systems for providing service plan offer, selection, provisioning and management for mobile devices through one or more APIs in accordance with some embodiments.

Figure 306:
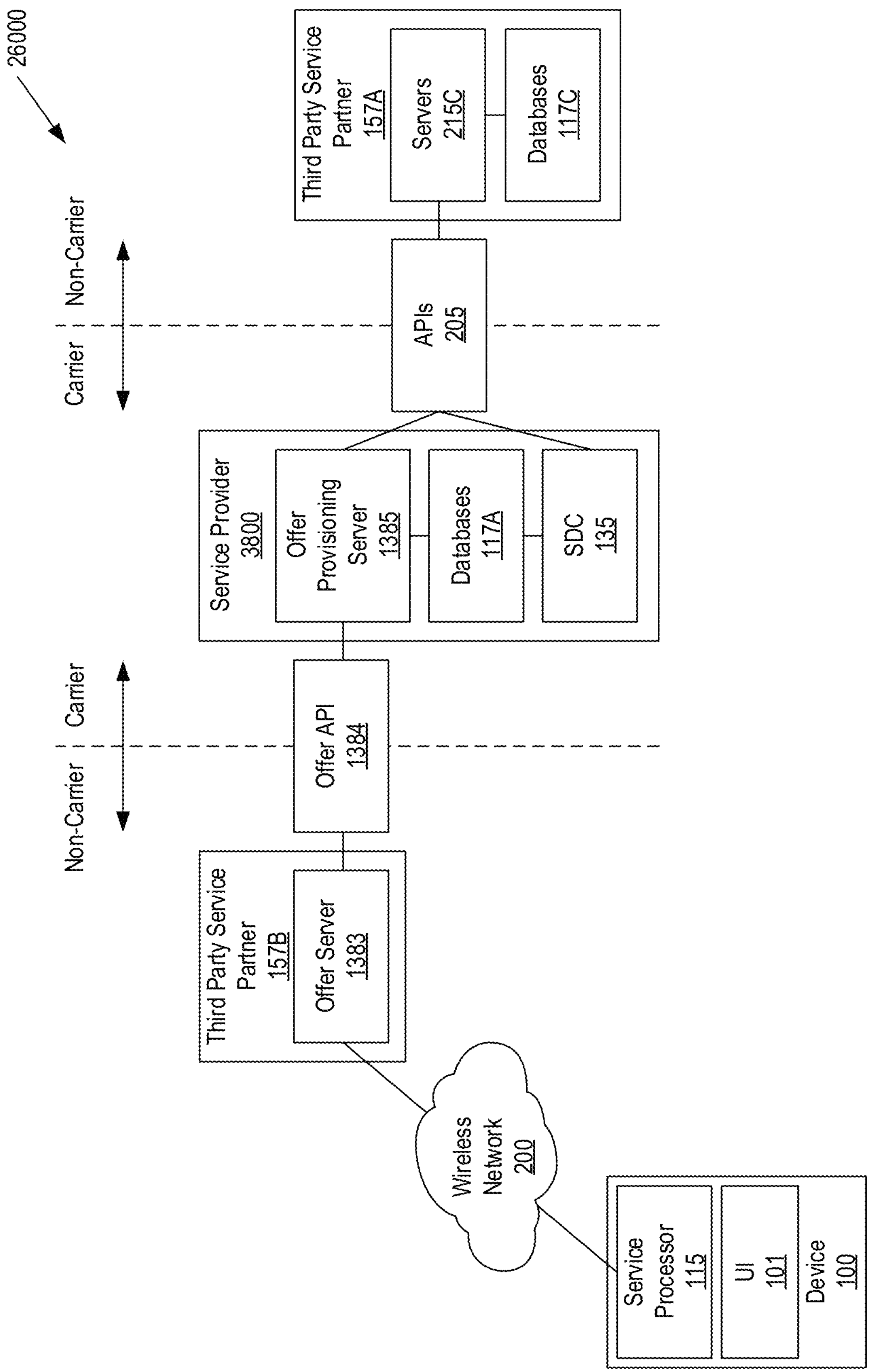

FIG. 306 illustrates a system to provide service plan offers to a mobile device in accordance with some embodiments.

Figure 307:
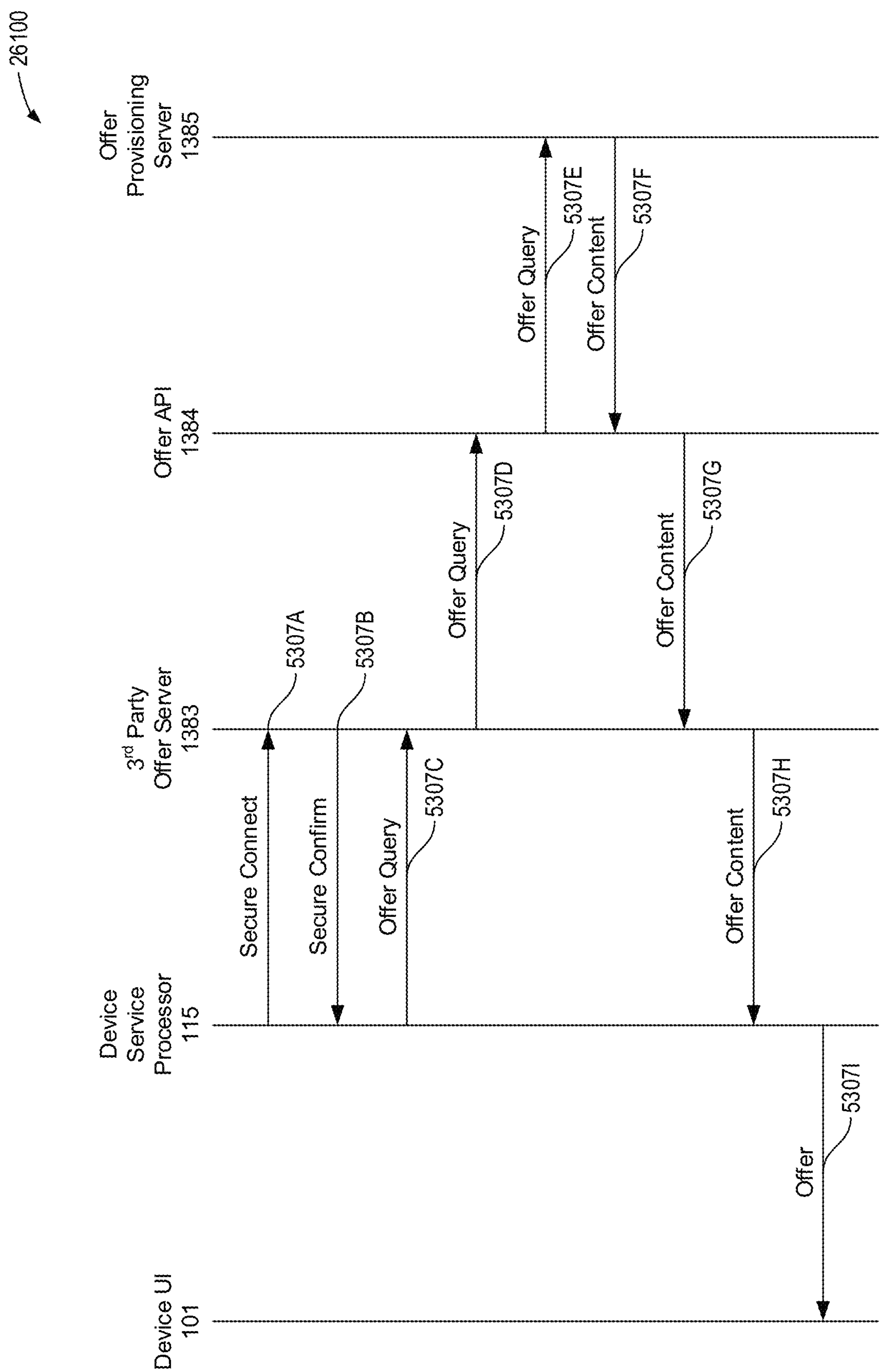
Figure 308:
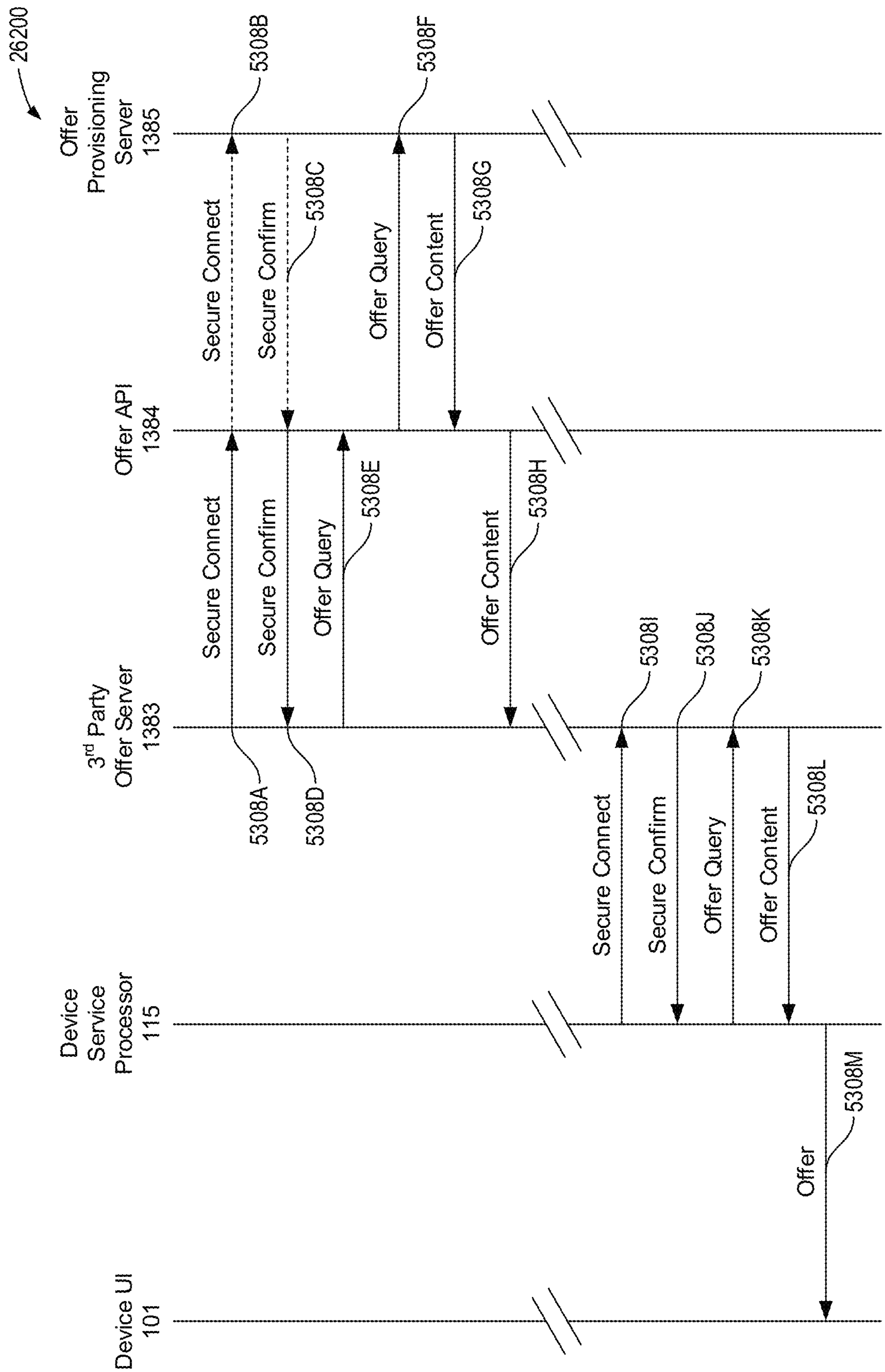

FIGS. 307 and 308 illustrate message exchange sequences to present service plan offers to a mobile device in accordance with some embodiments.

Figure 309:
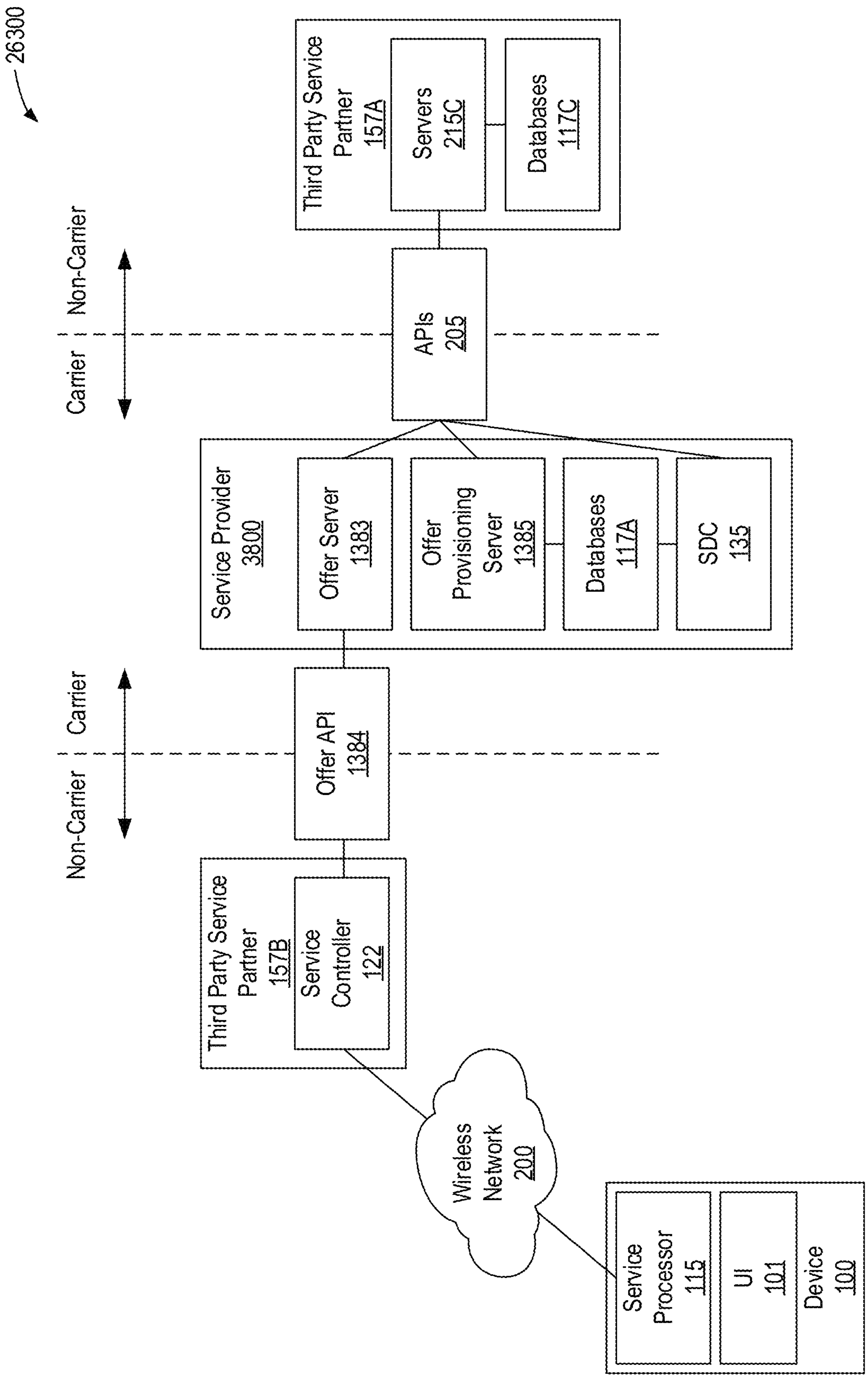

FIG. 309 illustrates another system to provide service plan offers to a mobile device in accordance with some embodiments.

Figure 310:
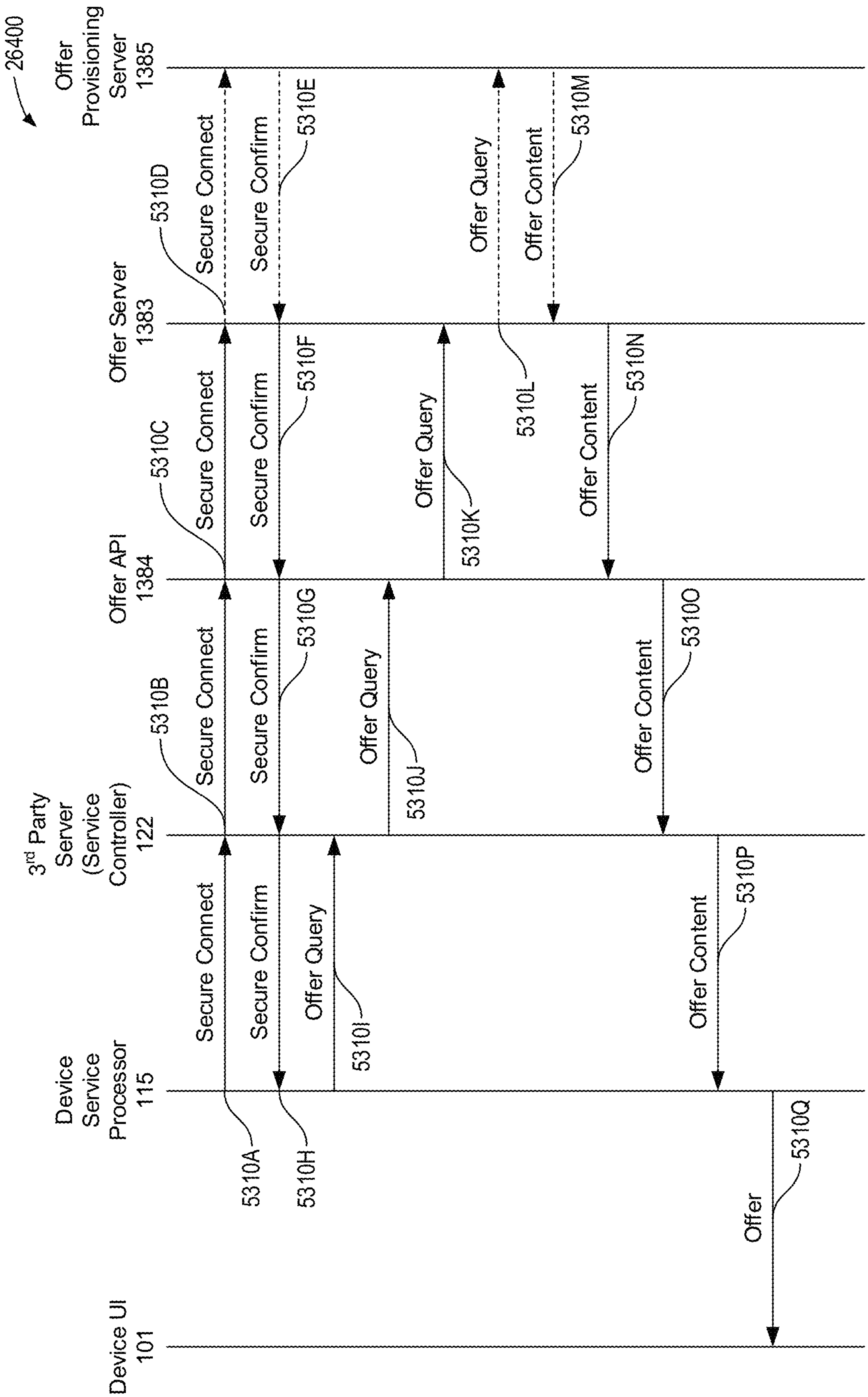
Figure 311:
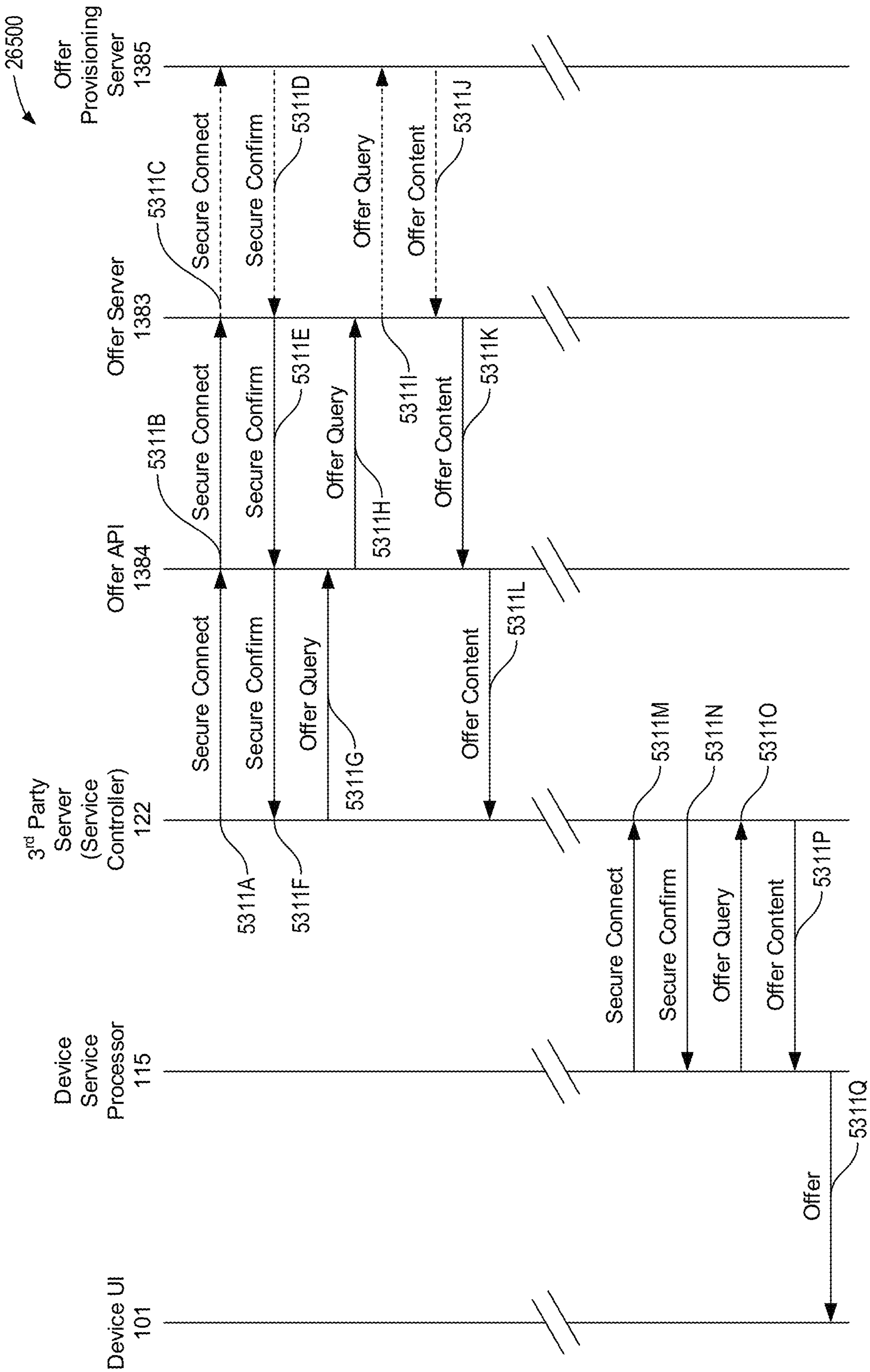

FIGS. 310 and 311 illustrate message exchange sequences to present service plan offers to a mobile device in accordance with some embodiments.

Figure 312:
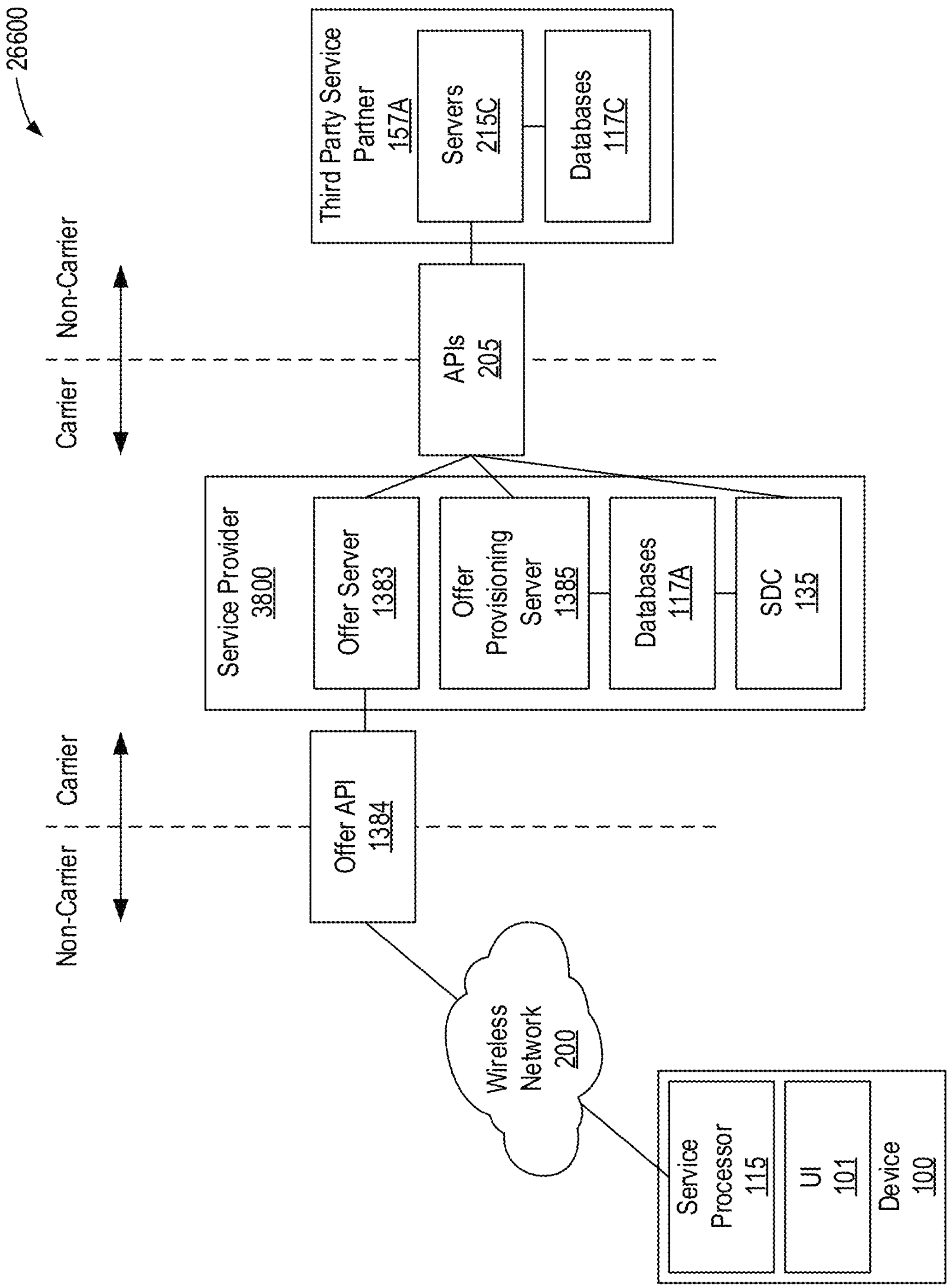

FIG. 312 illustrates another system to provide service plan offers to a mobile device in accordance with some embodiments.

Figure 313:
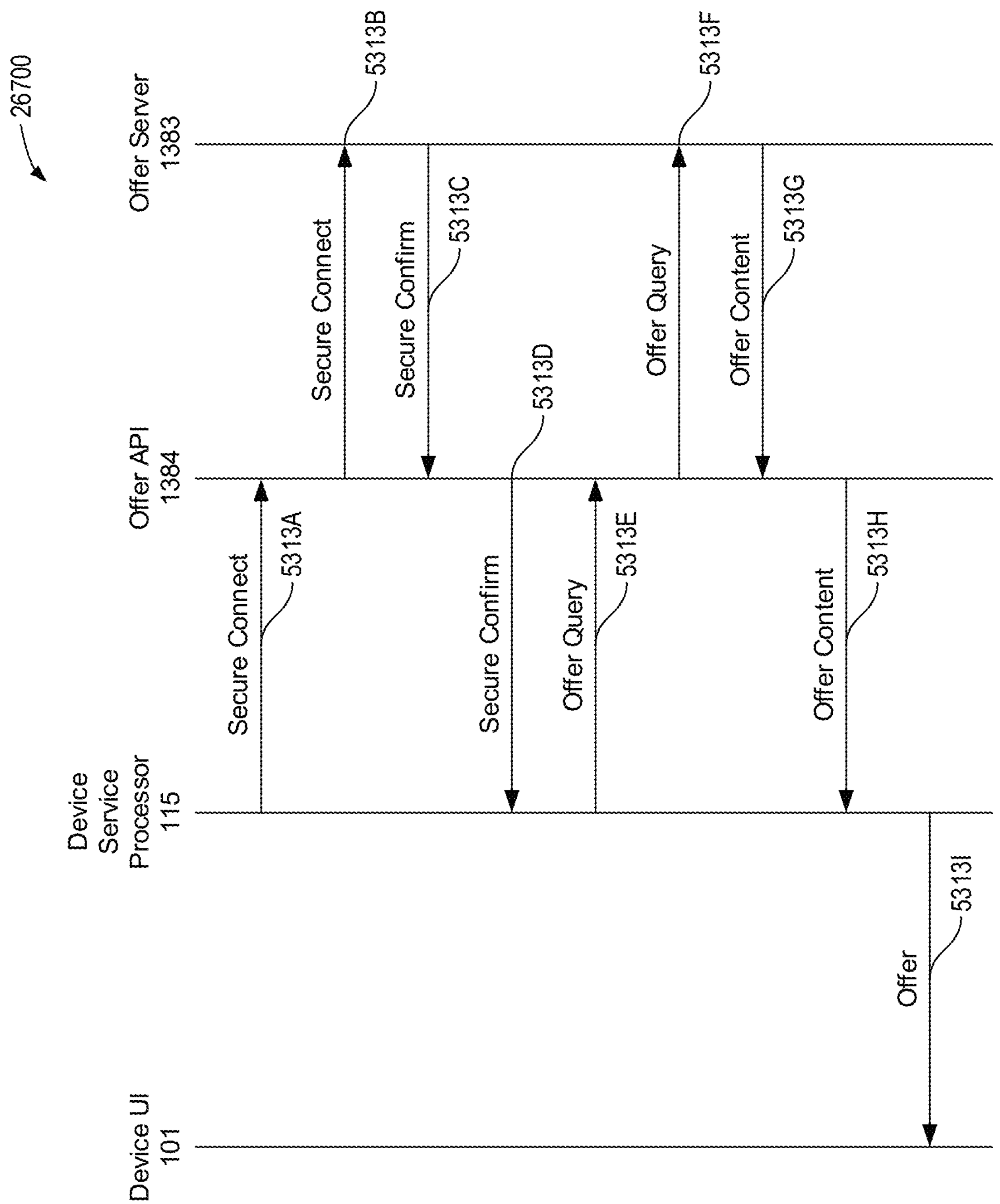

FIG. 313 illustrates a message exchange sequence to present service plan offers to a mobile device in accordance with some embodiments.

Figure 314:
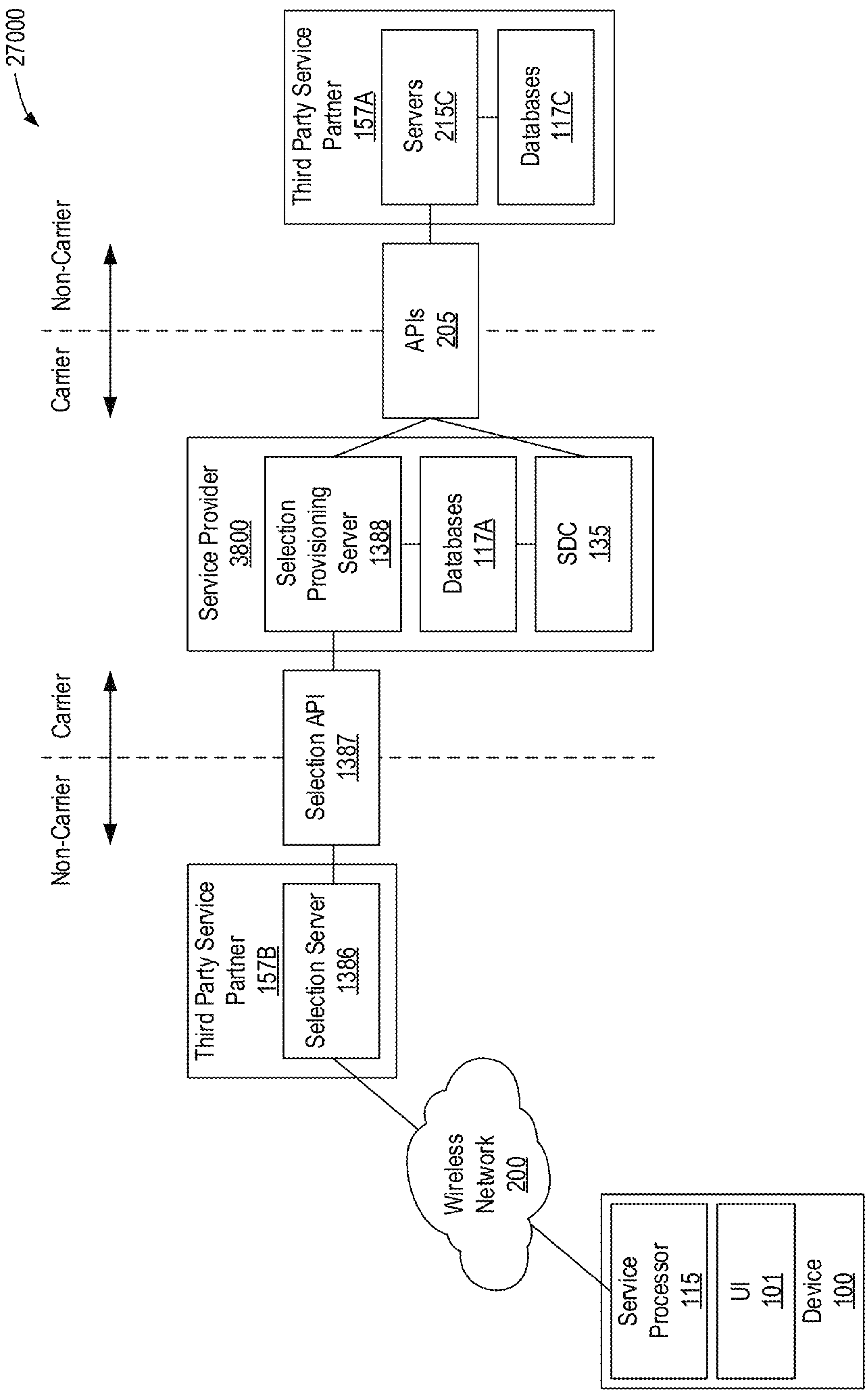

FIG. 314 illustrates a system to provide service plan selection, purchase and/or activation to a mobile device in accordance with some embodiments.

Figure 315:
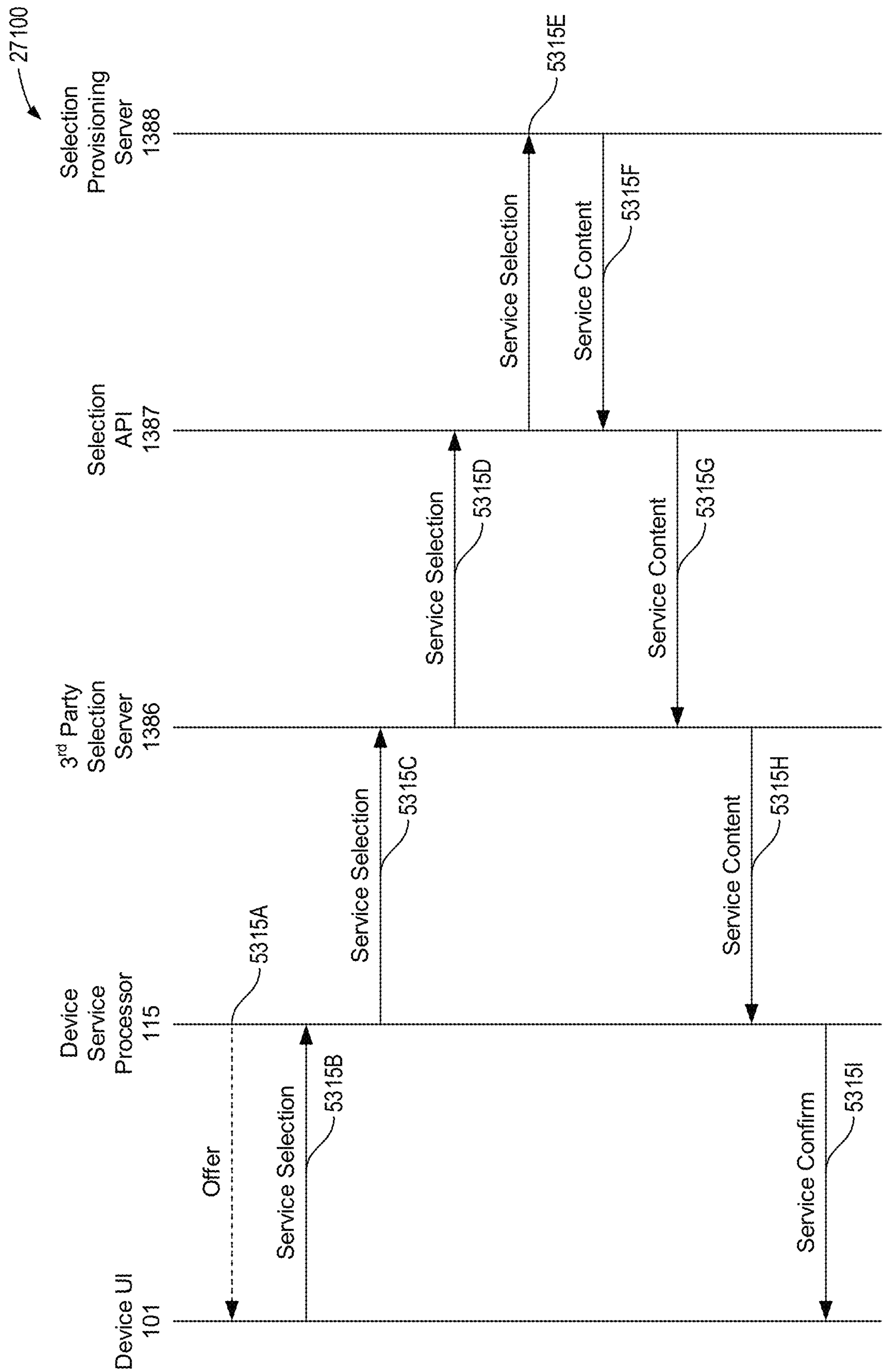
Figure 316:
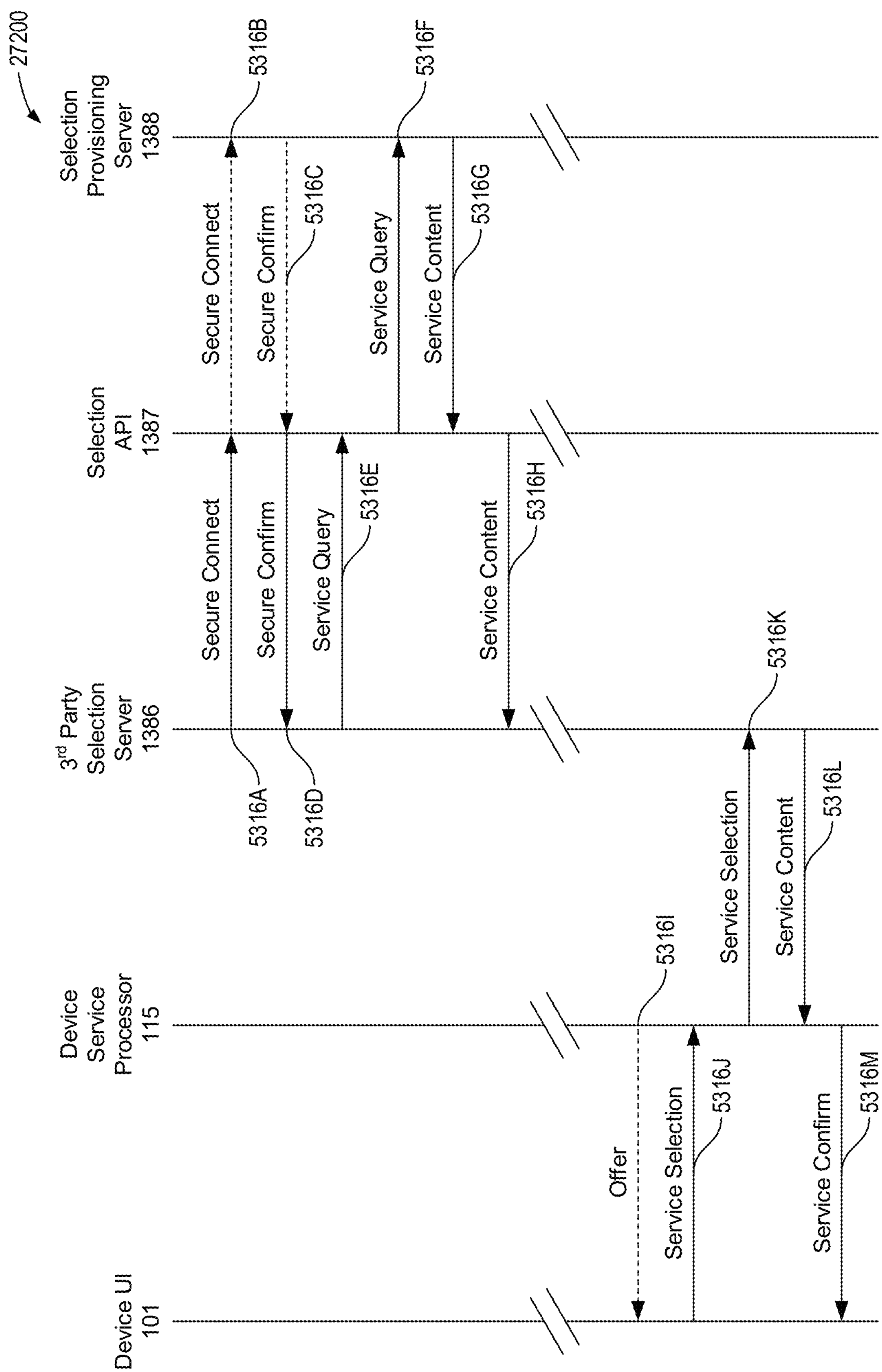

FIGS. 315 and 316 illustrate message exchange sequences for service plan selection, purchase and/or activation by a mobile device in accordance with some embodiments.

Figure 317:
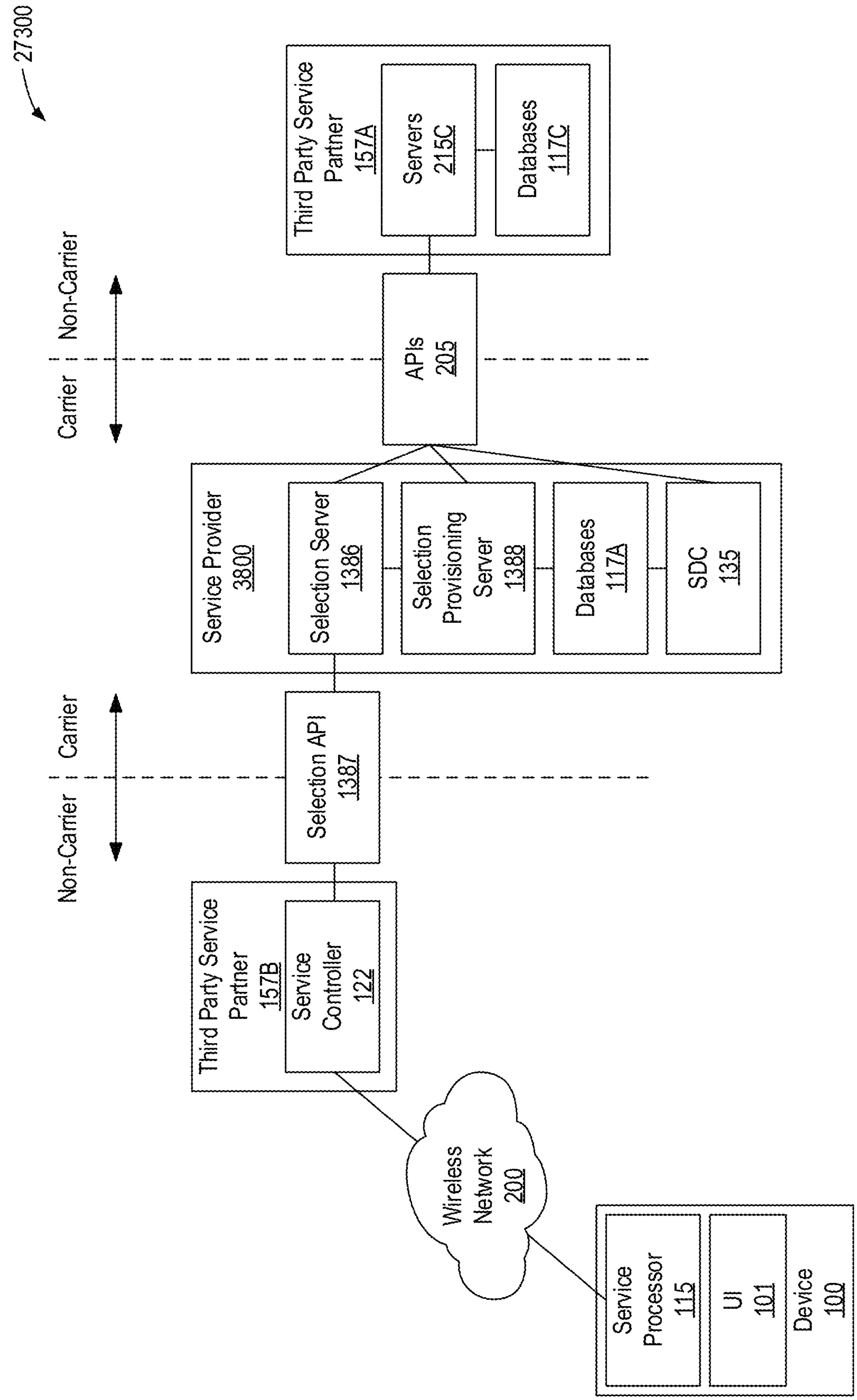

FIG. 317 illustrates another system to provide service plan selection, purchase and/or activation to a mobile device in accordance with some embodiments.

Figure 318:
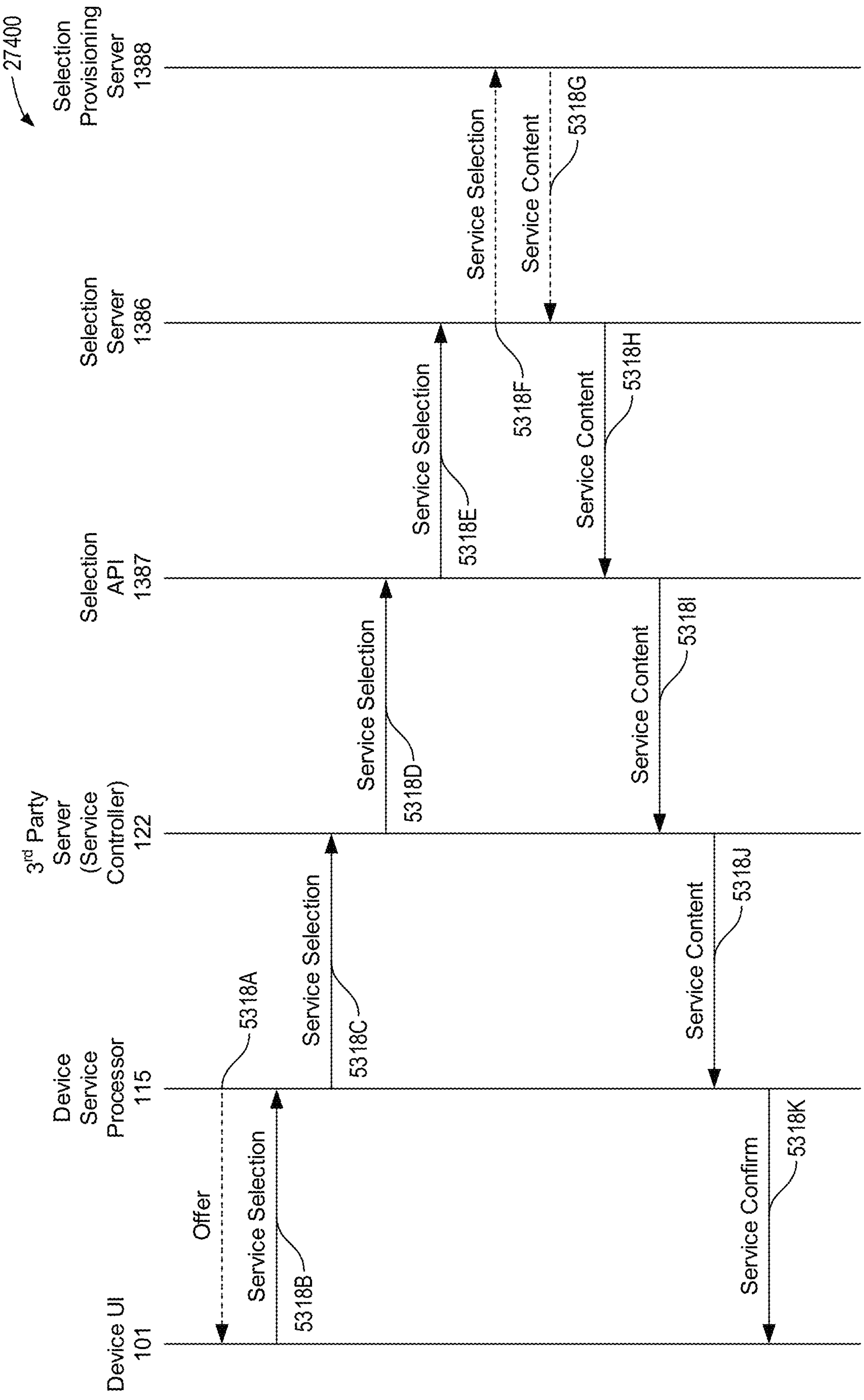
Figure 319:
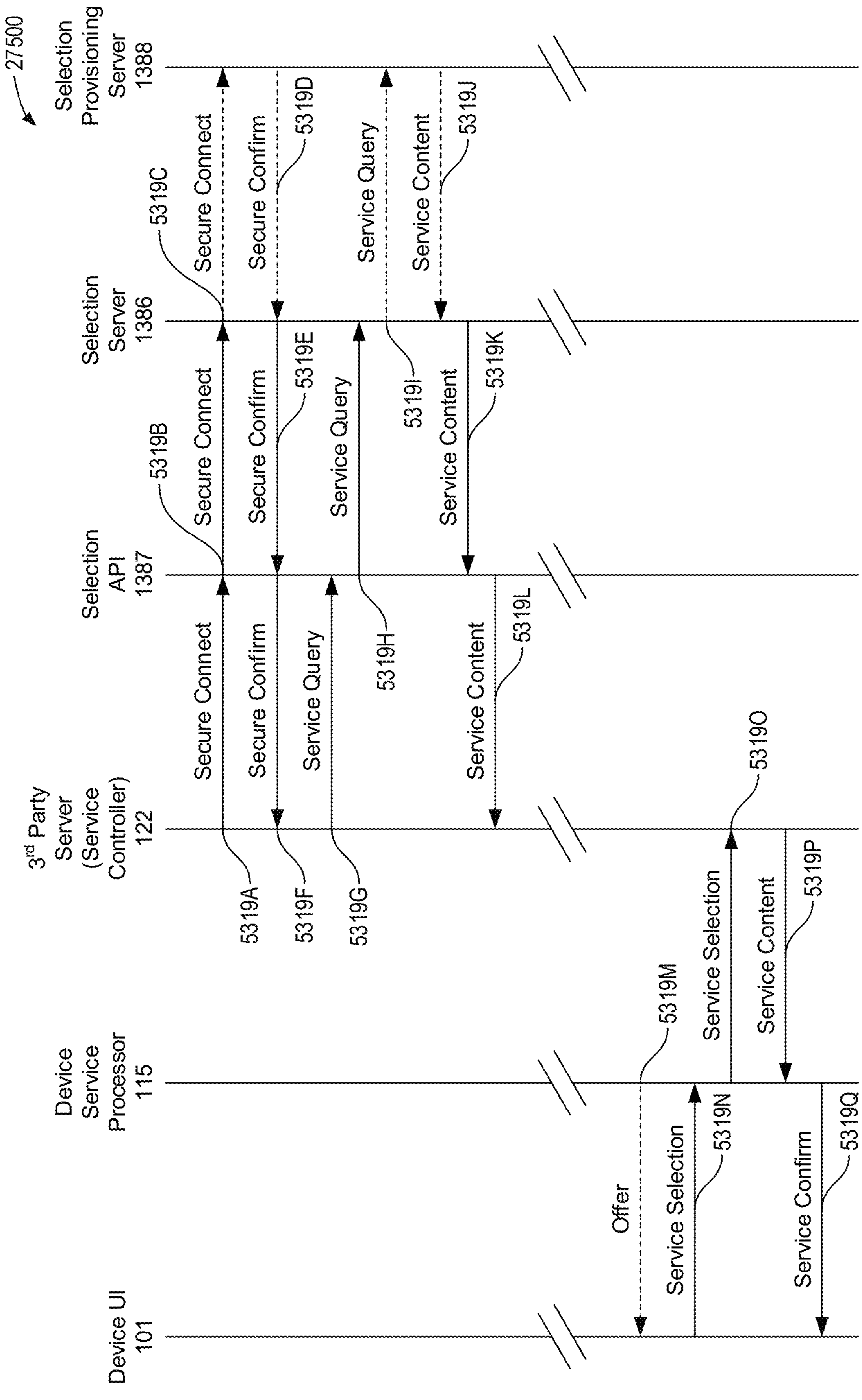

FIGS. 318 and 319 illustrate message exchange sequences for service plan selection, purchase and/or activation by a mobile device in accordance with some embodiments.

Figure 320:
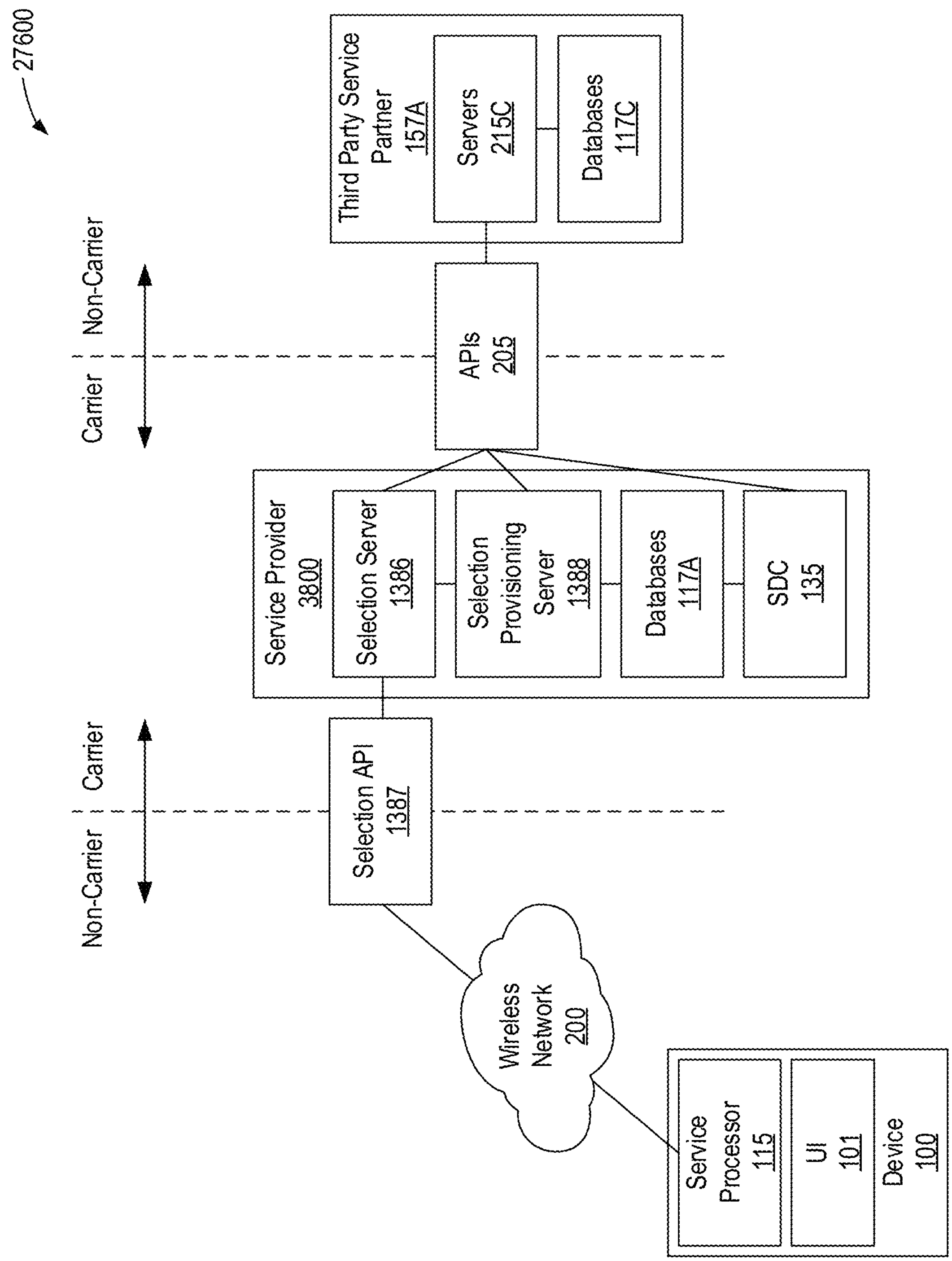

FIG. 320 illustrates another system to provide service plan selection, purchase and/or activation to a mobile device in accordance with some embodiments.

Figure 321:
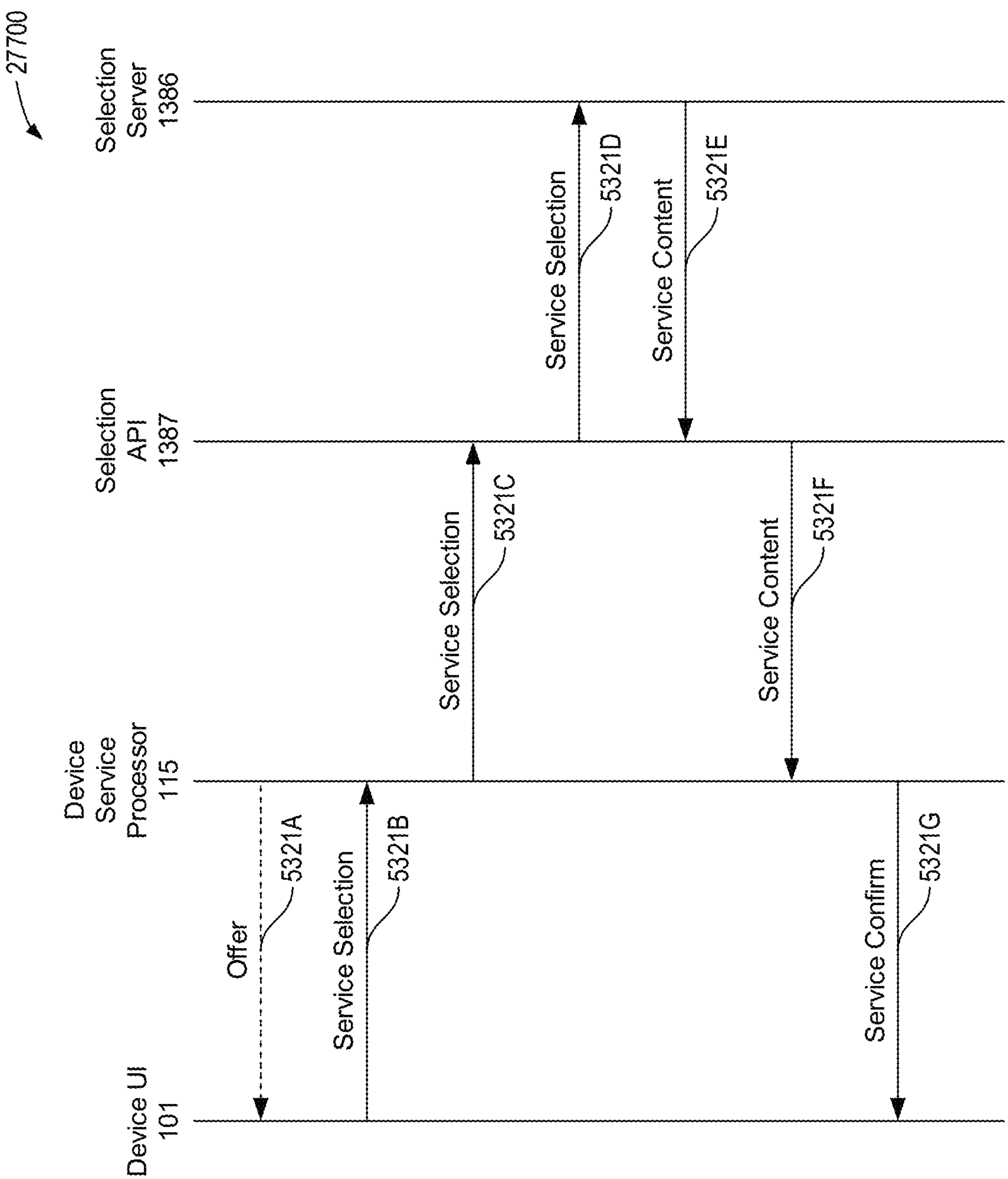

FIG. 321 illustrates a message exchange sequence for service plan selection, purchase and/or activation by a mobile device in accordance with some embodiments.

Figure 322:
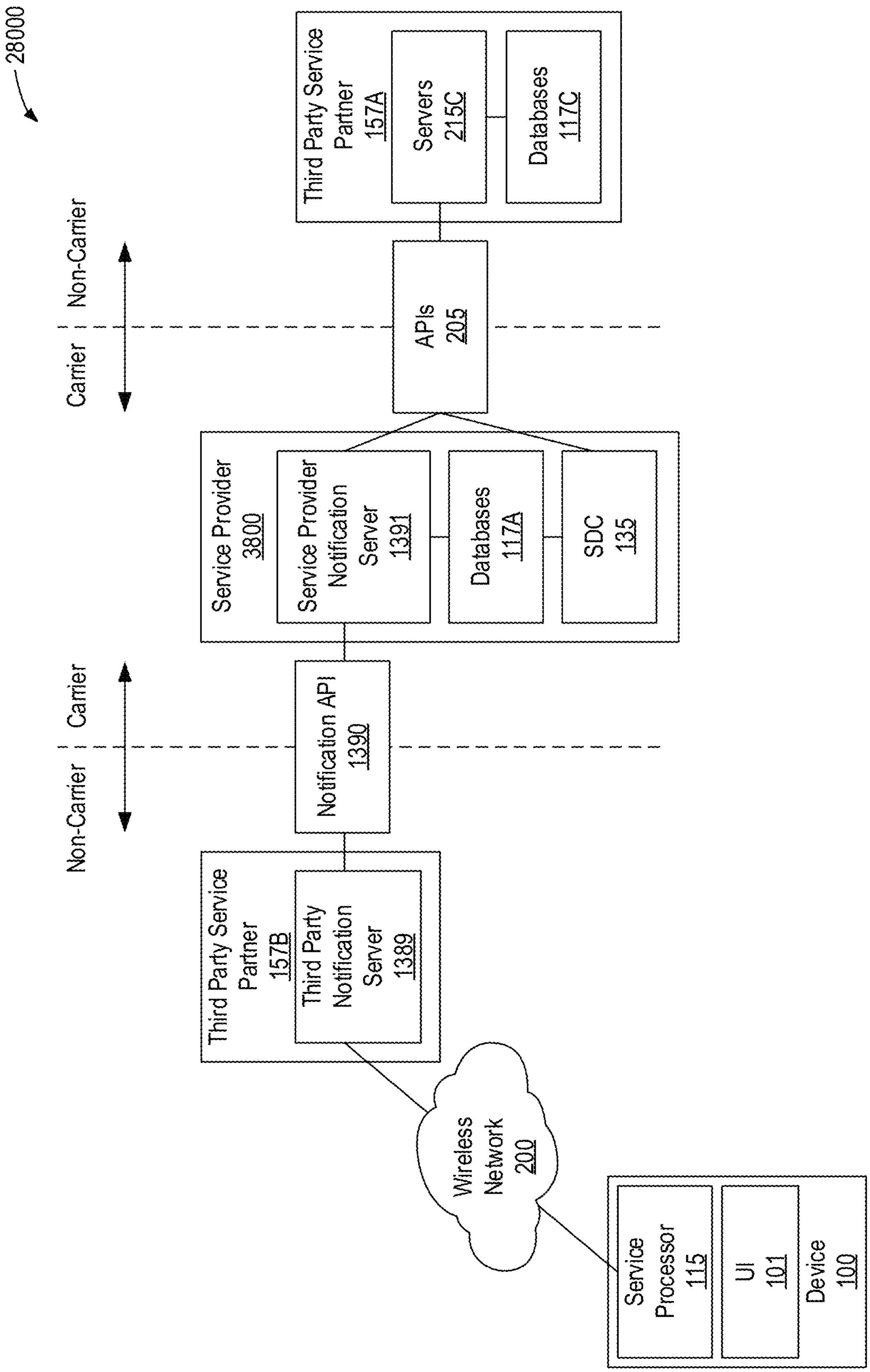

FIG. 322 illustrates a system to provide service notifications to mobile devices in accordance with some embodiments.

FIGS. 323 to 327 illustrate representative message sequences for service notifications in accordance with some embodiments.

Figure 328:
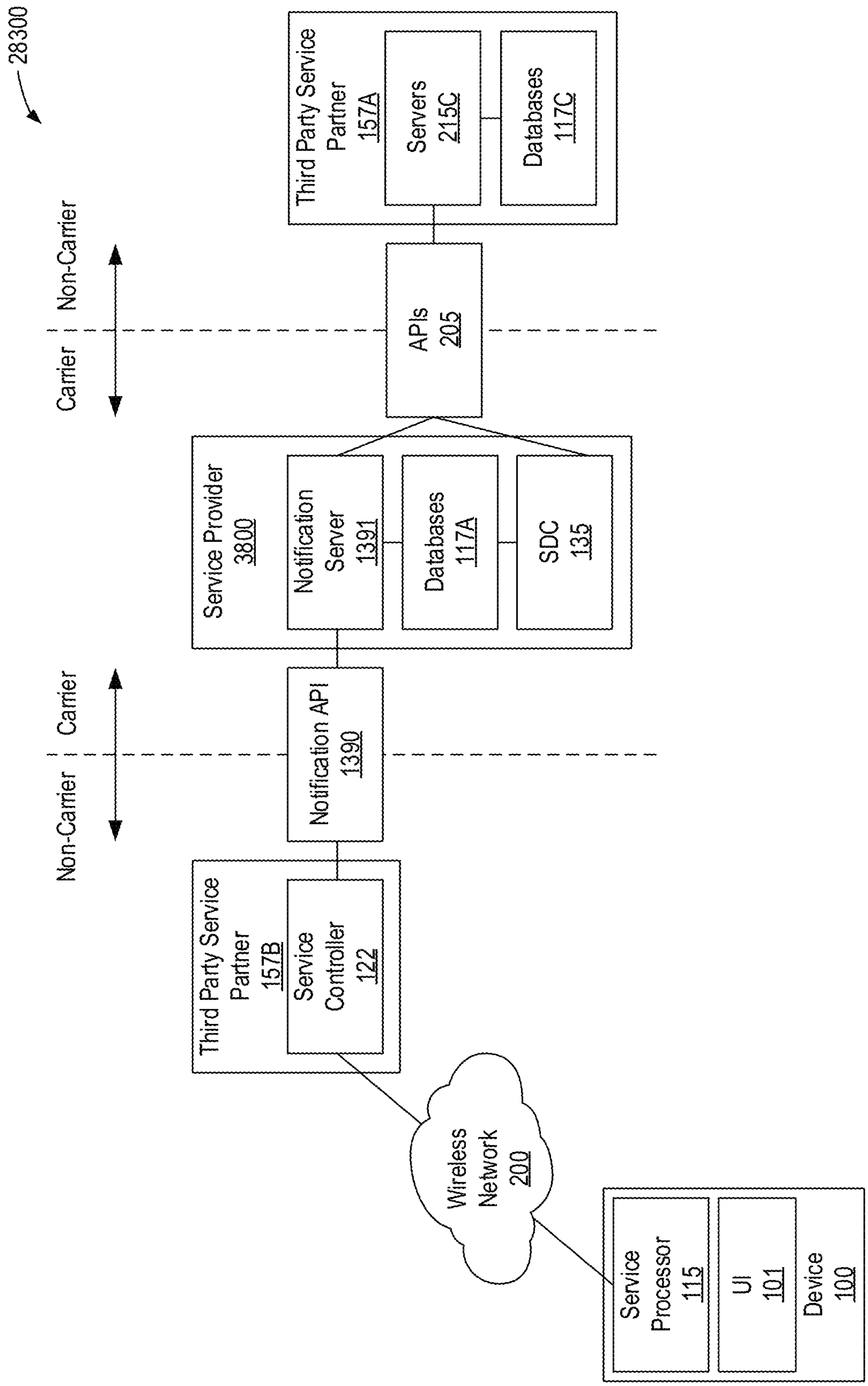
Figure 329:
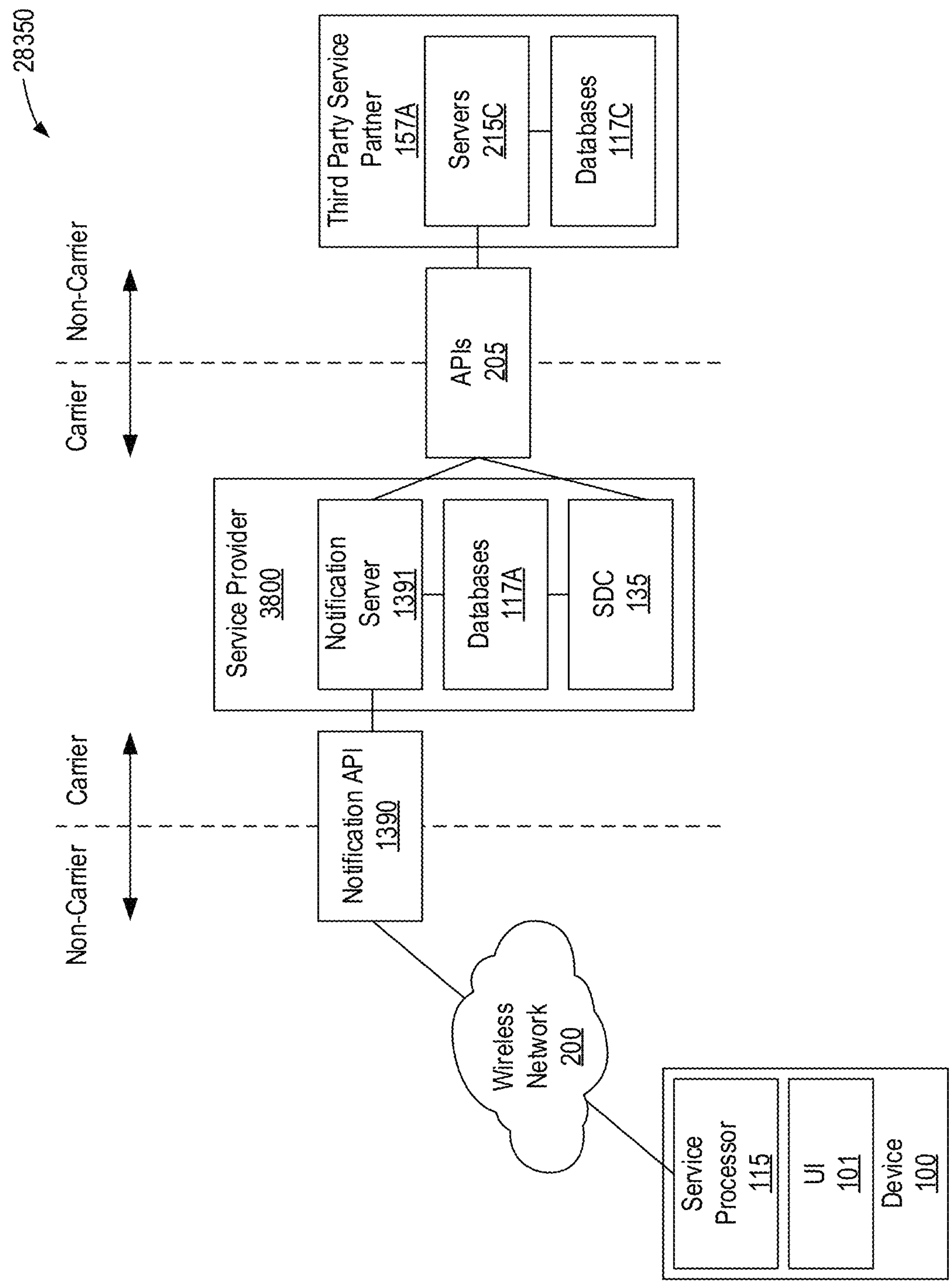

FIGS. 328 and 329 illustrate additional systems to provide service notifications to mobile devices in accordance with some embodiments.

Figure 330:
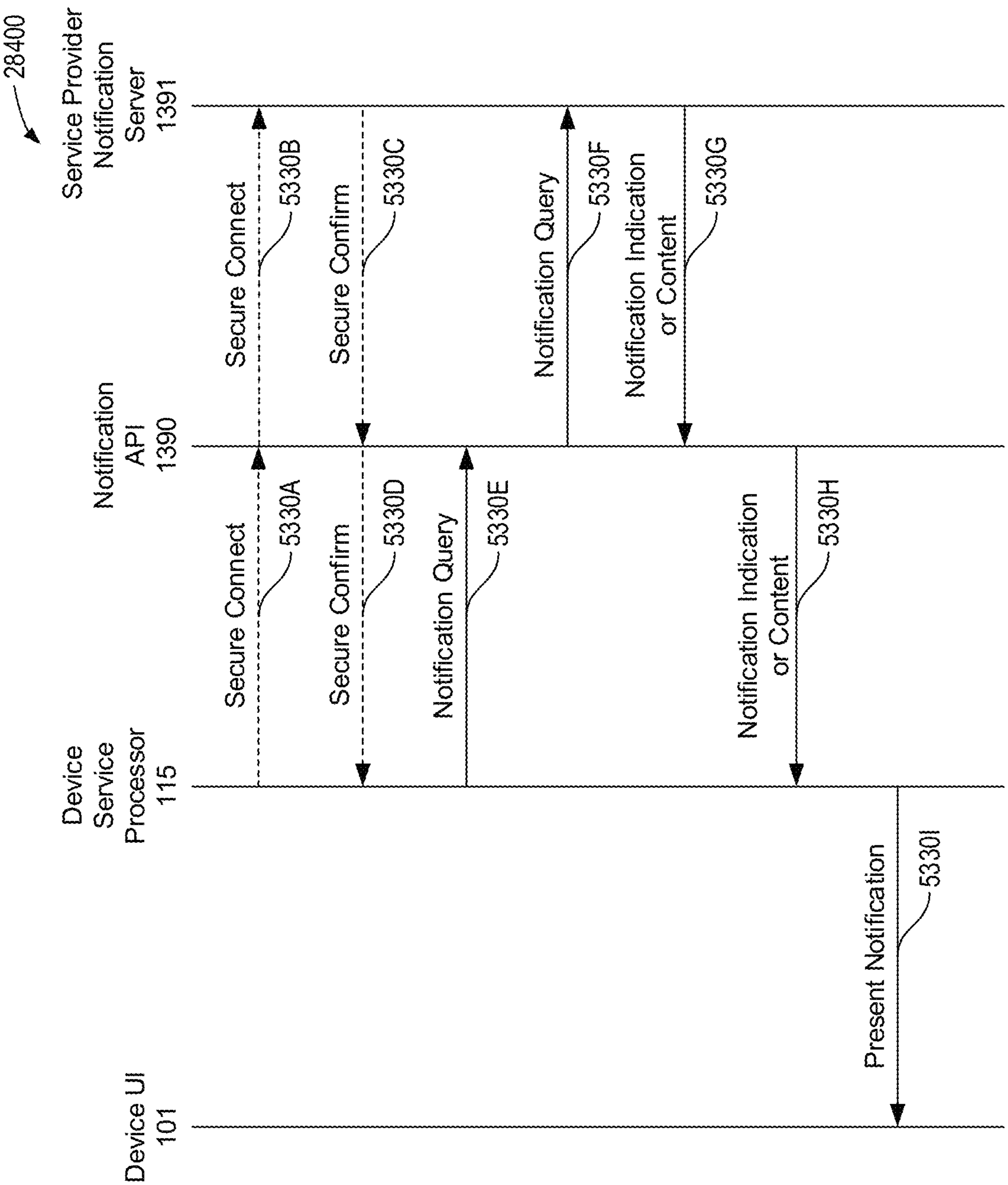
Figure 331:
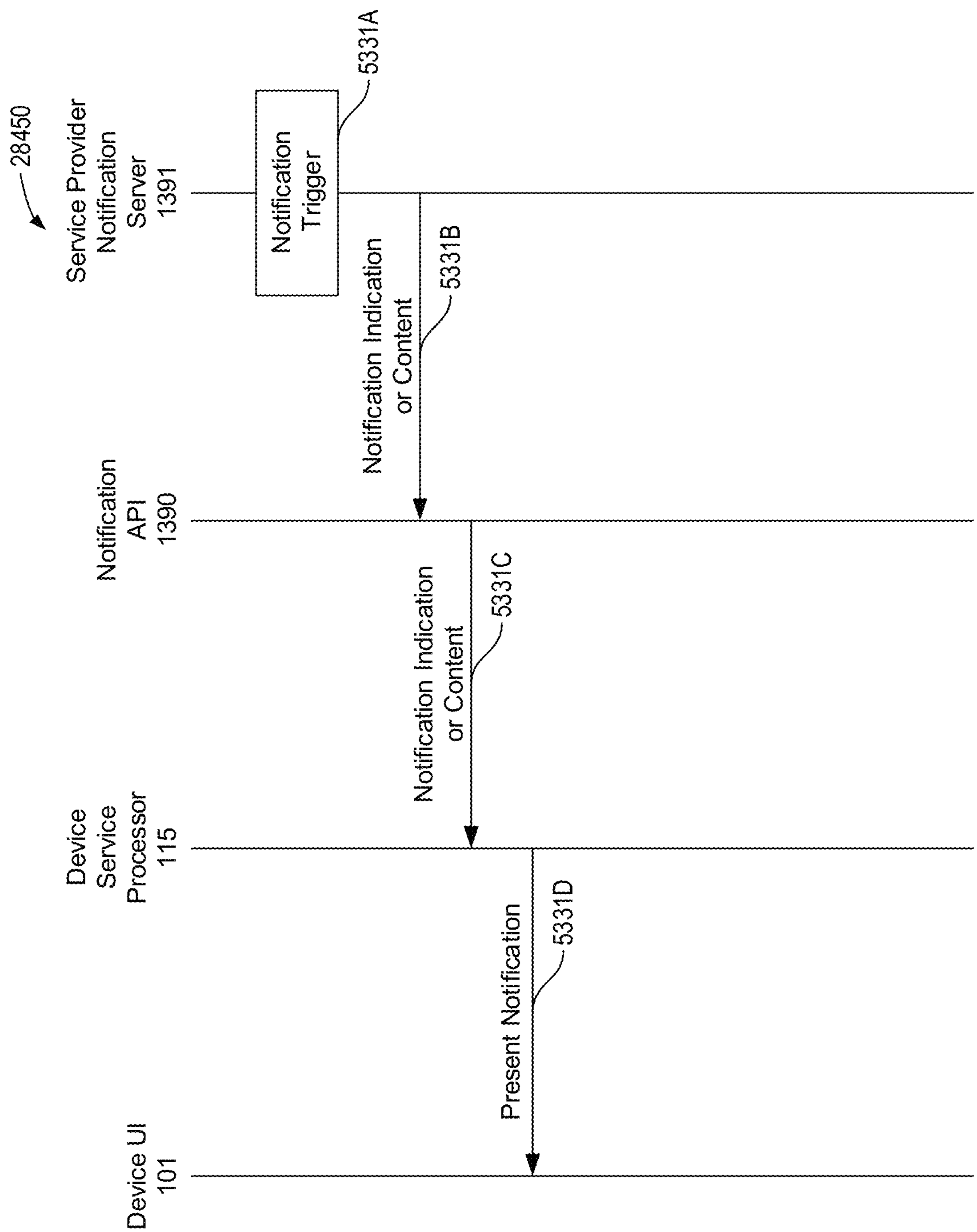

FIGS. 330 and 331 illustrate representative message sequences for service notifications in accordance with some embodiments.

FIGS. 332 to 335 illustrate systems to provide for service offer, selection, activation and/or provisioning for mobile devices in accordance with some embodiments.

FIGS. 336 to 339 illustrate systems to provide service notifications and policy enforcement for mobile devices in accordance with some embodiments.

FIGS. 340A to 340H provide tables summarizing various service processor heartbeat functions and parameters in accordance with some embodiments.

FIGS. 341A to 341N provide tables summarizing various device based service policy implementation verification techniques in accordance with some embodiments.

FIGS. 342A to 342D provide tables summarizing various techniques for protecting the device based service policy from compromise in accordance with some embodiments.

Figure 343:
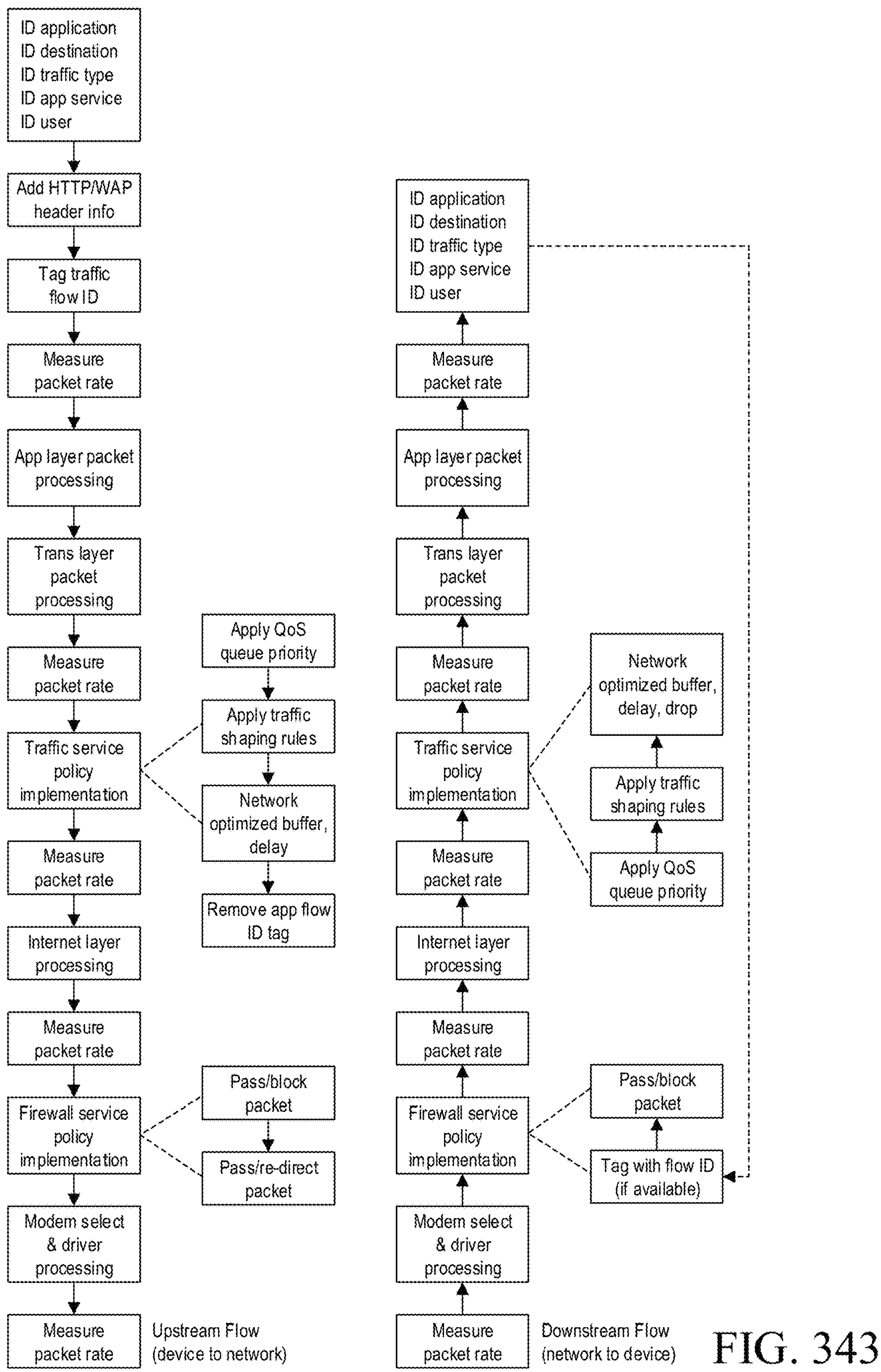

FIG. 343 is a functional diagram illustrating the device service processor packet processing flow in accordance with some embodiments.

Figure 344:
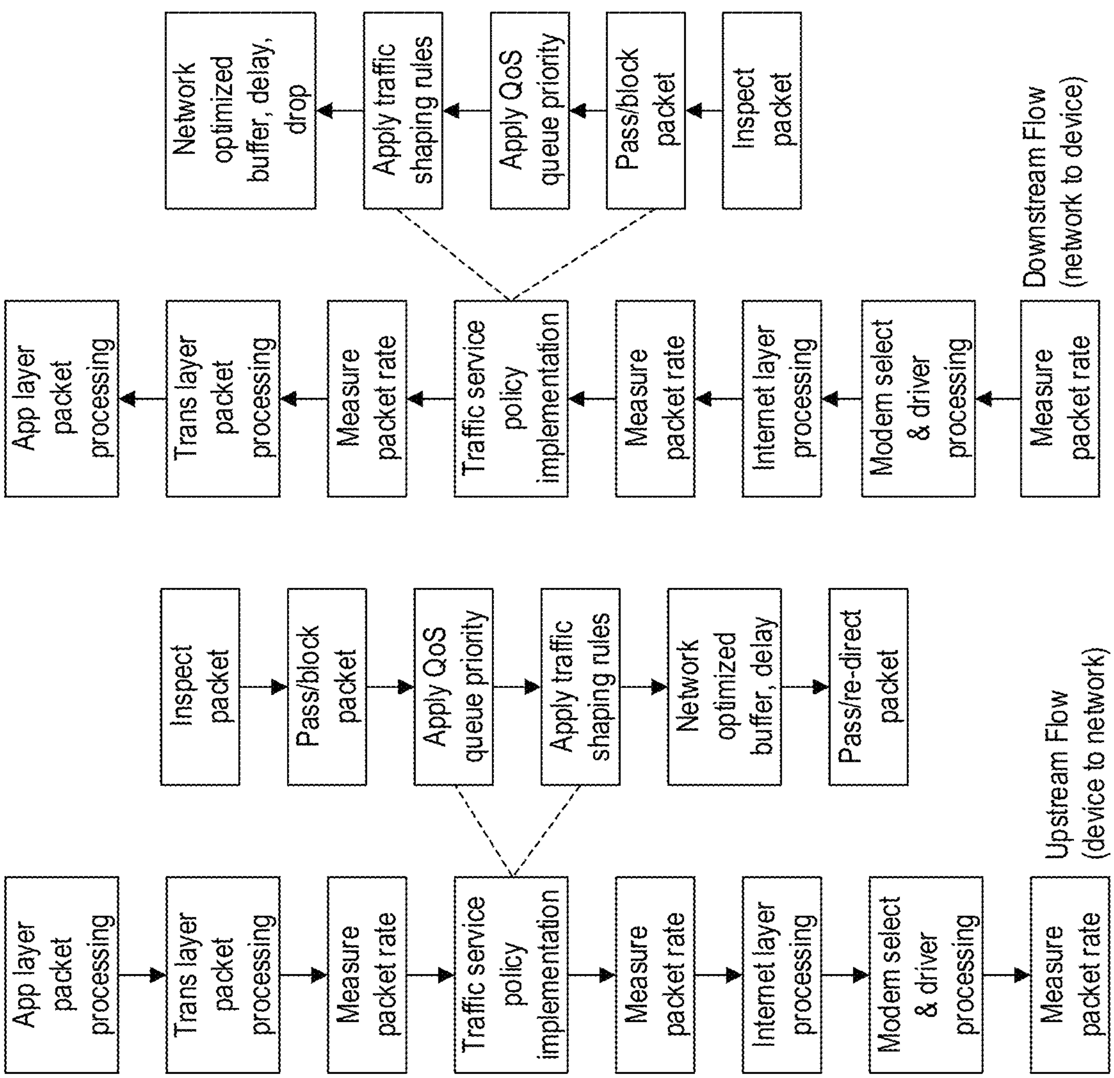

FIG. 344 is another functional diagram illustrating the device service processor packet processing flow in accordance with some embodiments.

Figure 345:
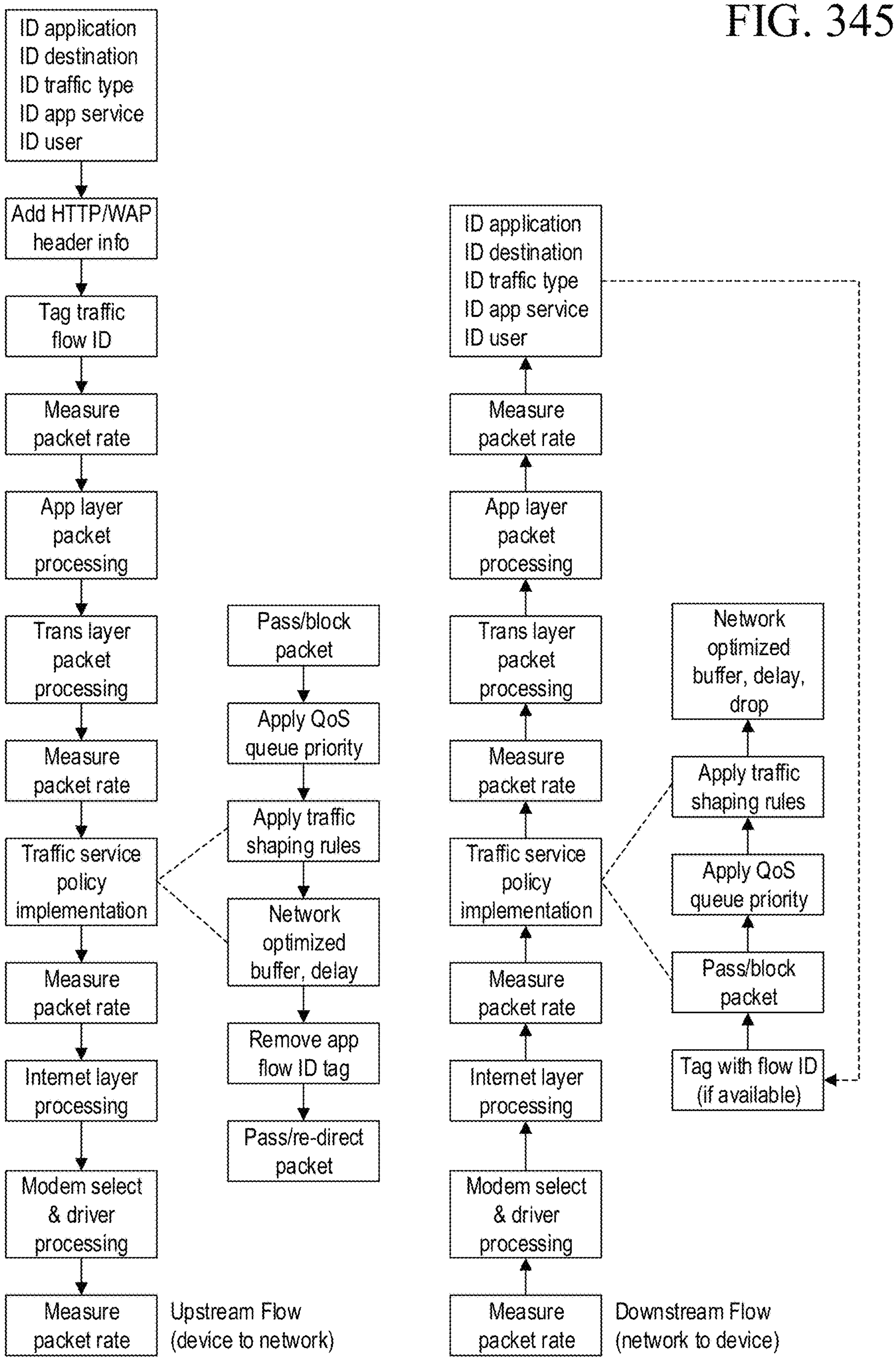

FIG. 345 is another functional diagram illustrating the device service processor packet processing flow in accordance with some embodiments.

Figure 346:
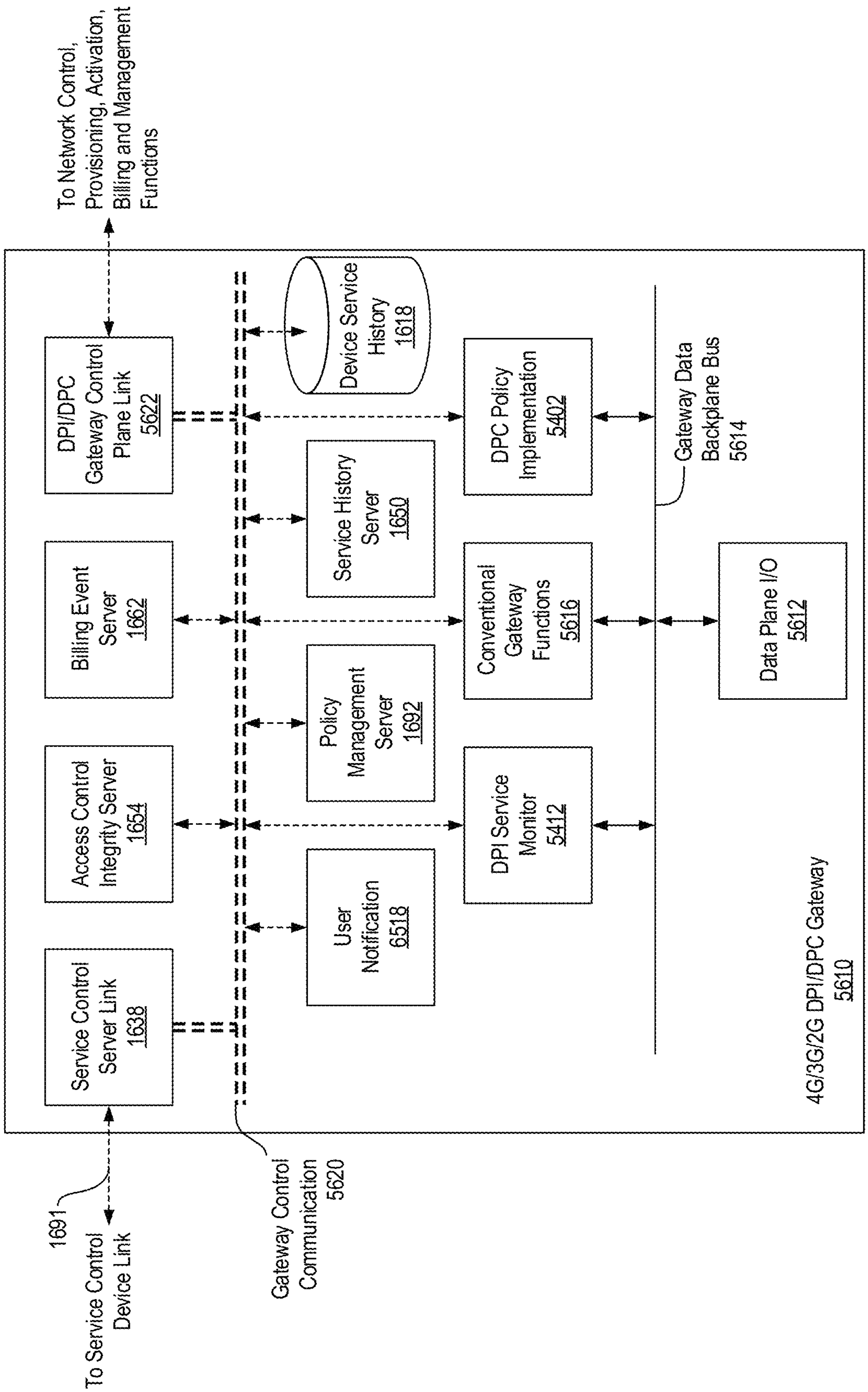

FIG. 346 illustrates a 4G/3G/2G DPI/DPC enabled gateway in accordance with some embodiments.

Figure 347:
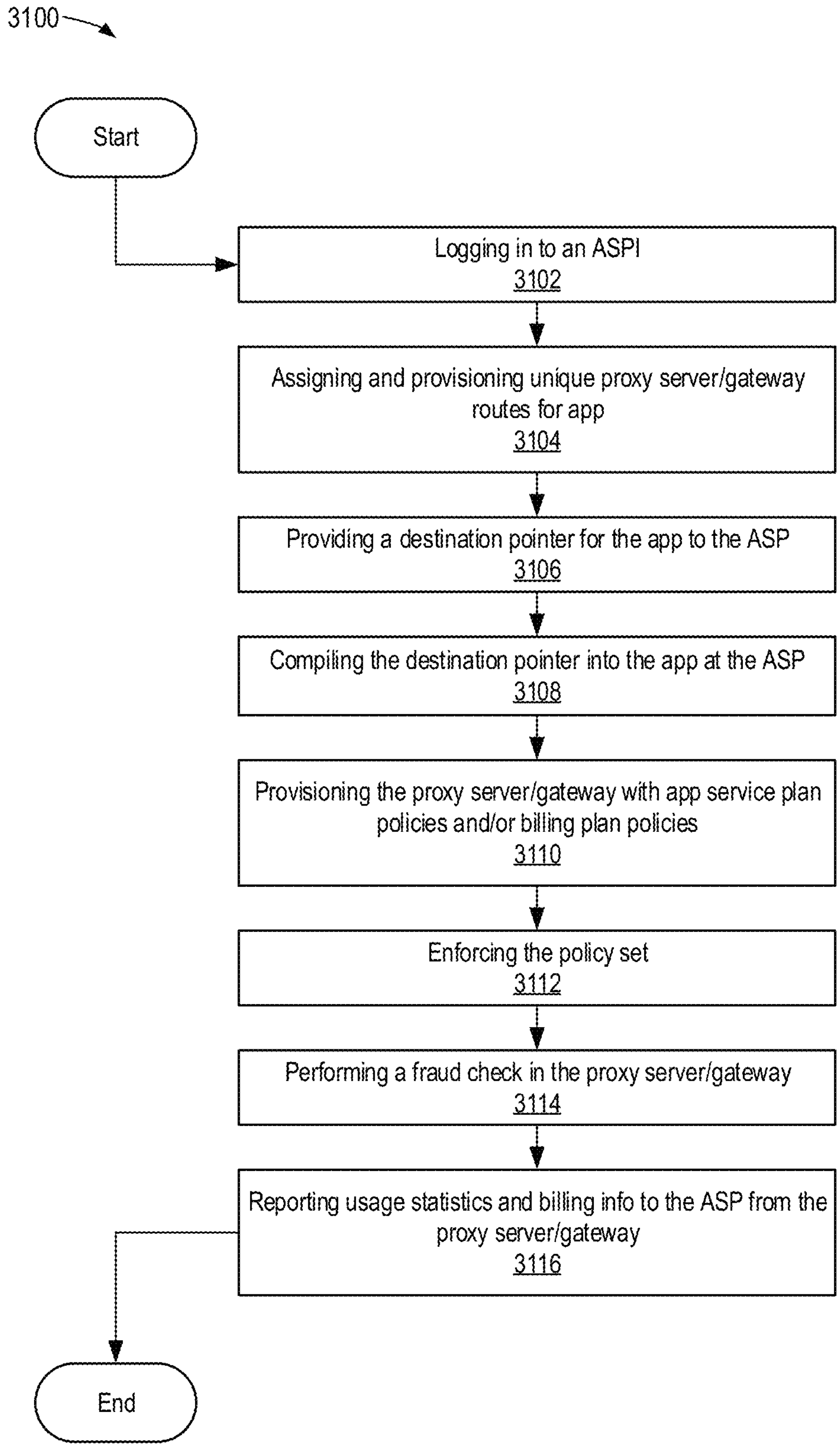

FIG. 347 depicts a flowchart of an example of a method for operating a system implemented in accordance with High Level Embodiment III.

Figure 348:
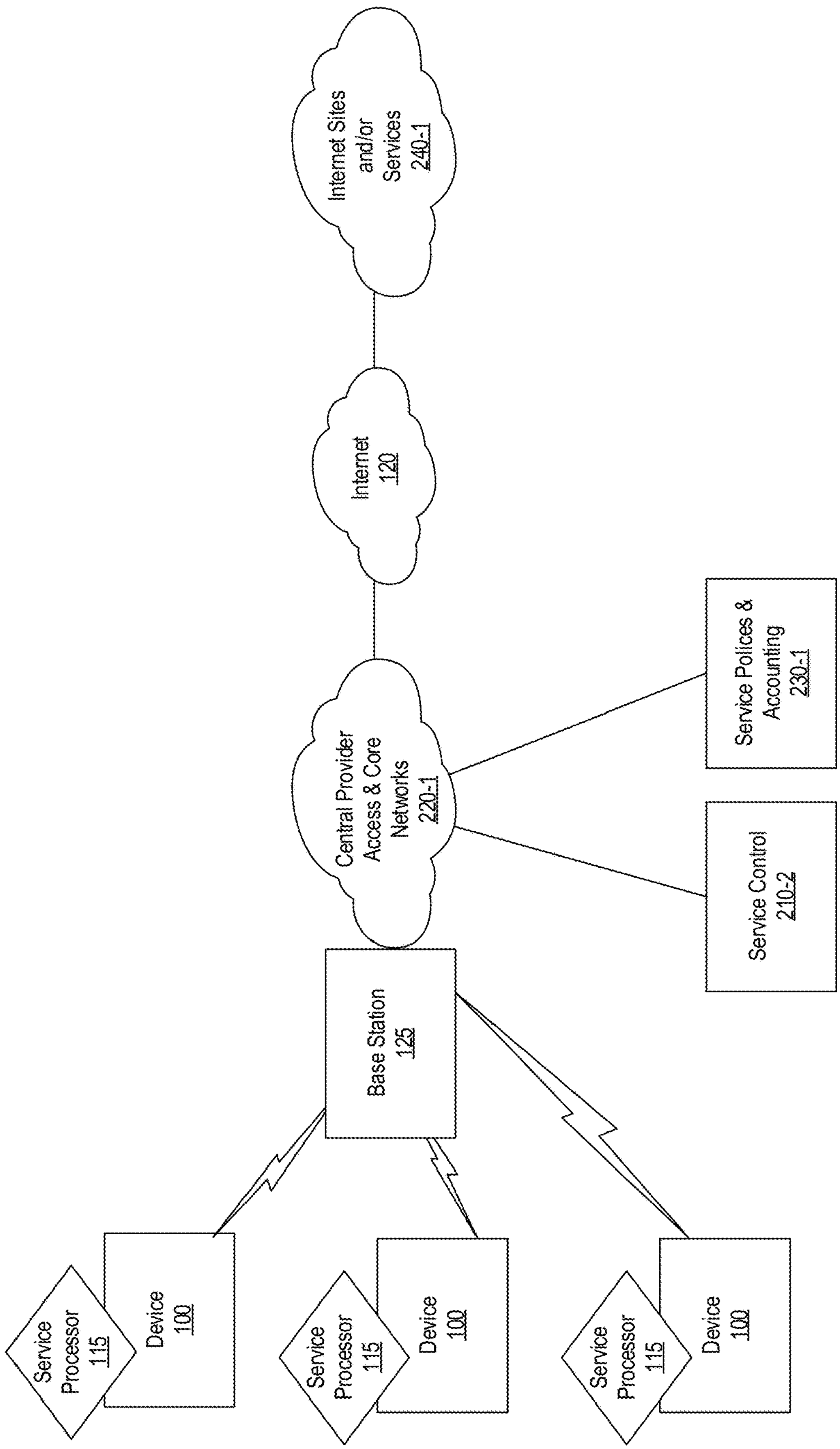

FIG. 348 illustrates a functional diagram of a network architecture for providing quality of service (QoS) for device assisted services (DAS) and/or for providing DAS for protecting network capacity in accordance with some embodiments.

Figure 349A:
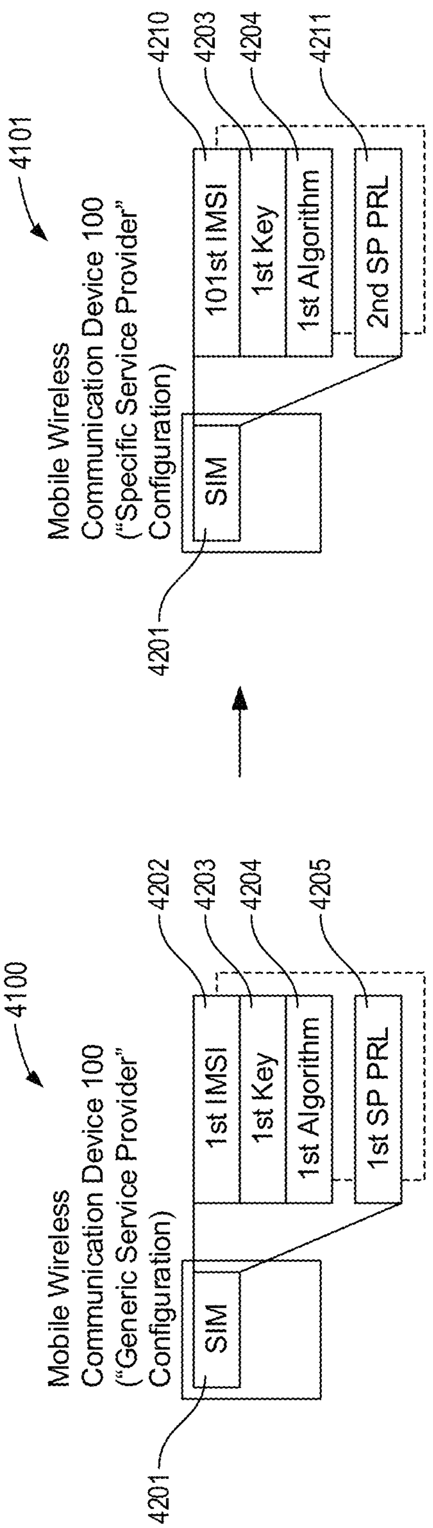
Figure 349B:
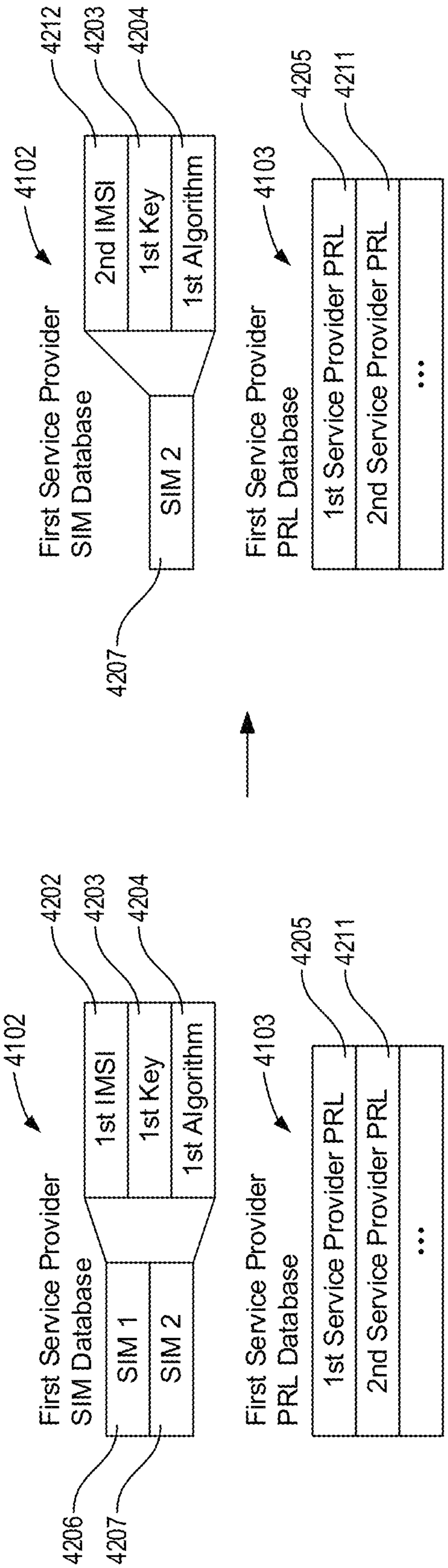
Figure 349C:
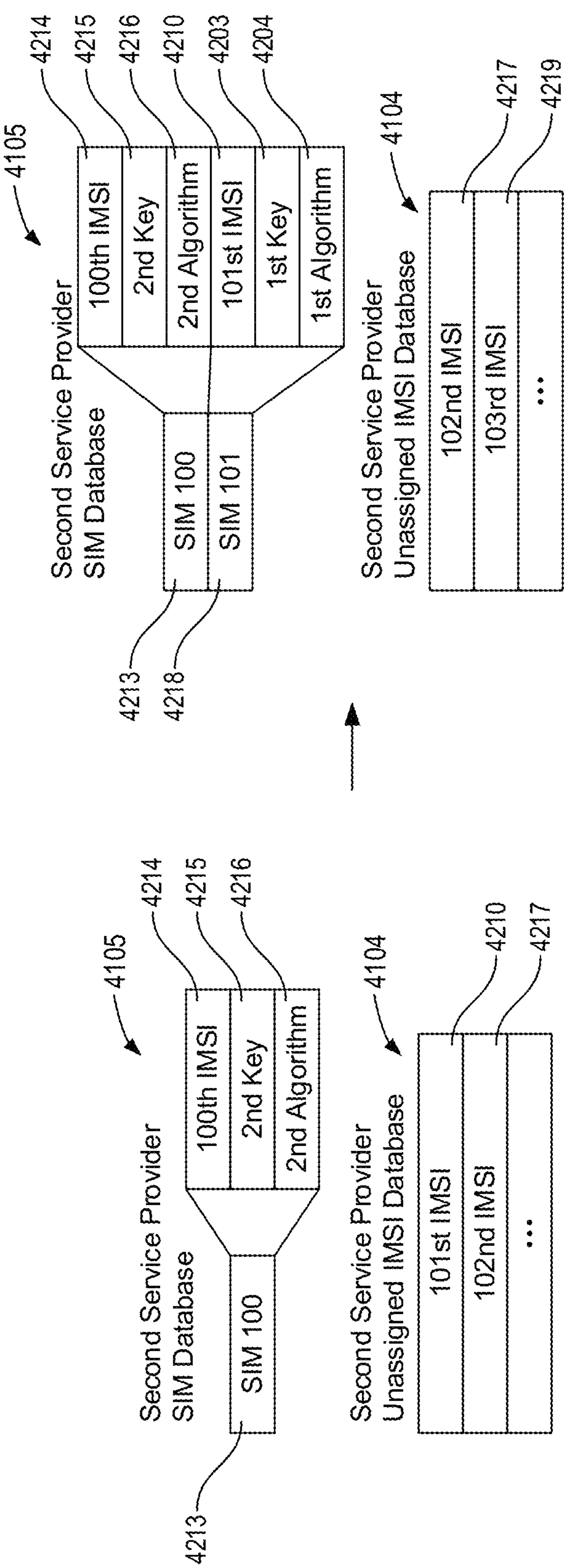

FIGS. 349A, 349B, and 349C illustrate a representative configuration of a mobile wireless communication device in accordance with some embodiments.

Figure 350A:
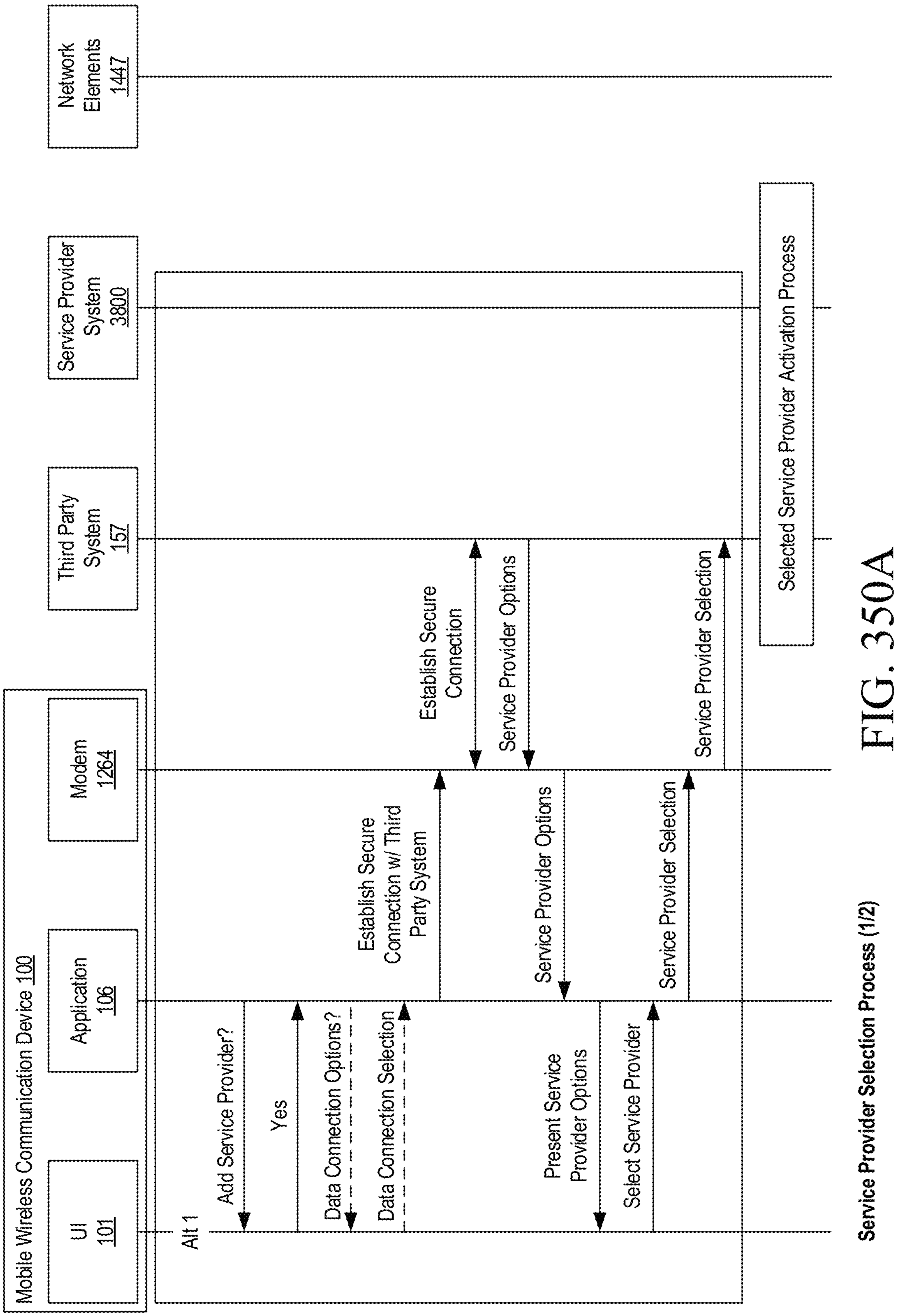

FIG. 350A illustrates a representative process by which a service provider is selected for a mobile wireless communication device in accordance with some embodiments.

Figure 350B:
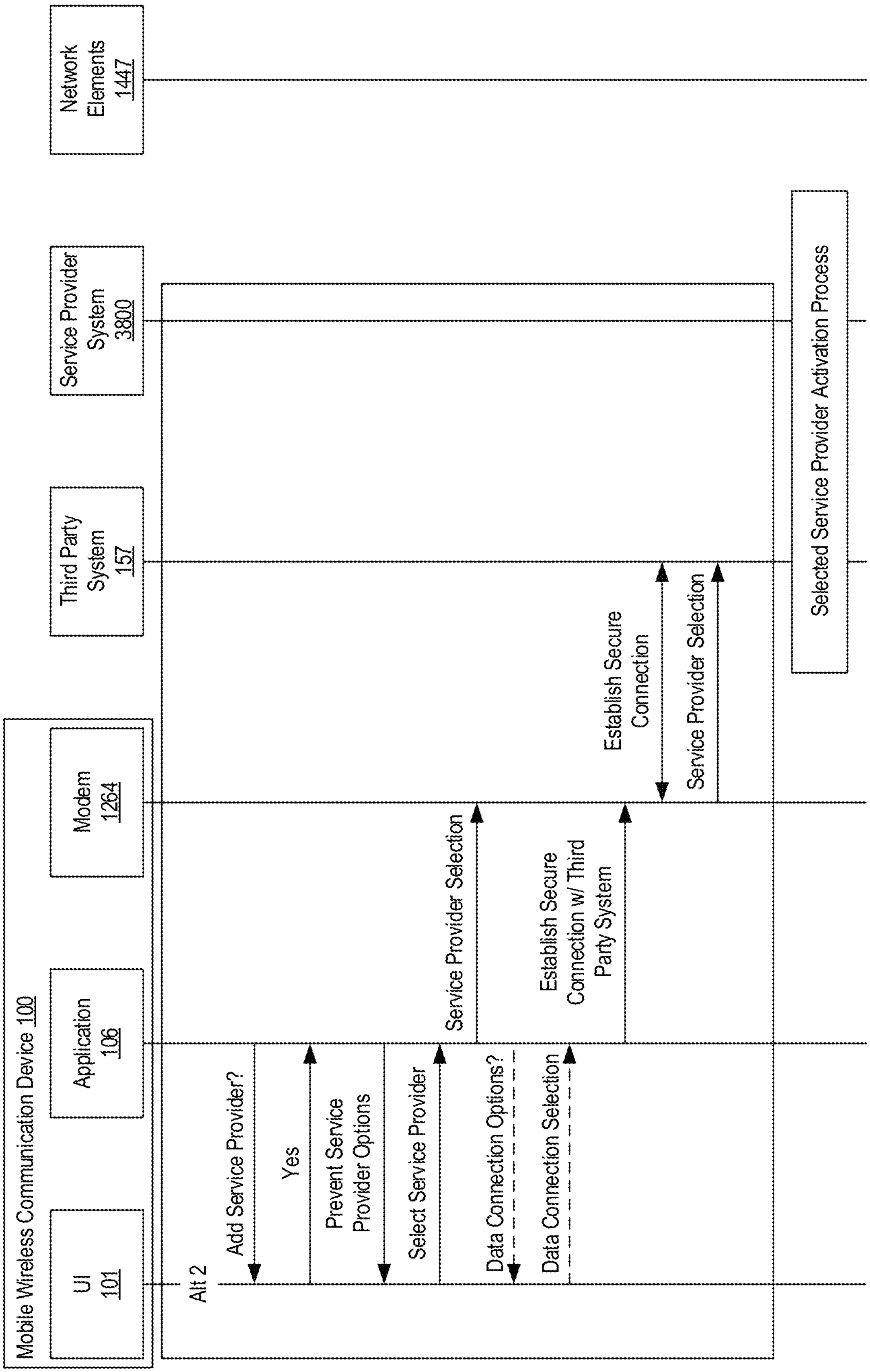

FIG. 350B illustrates another representative process by which a service provider is selected for a mobile wireless communication device in accordance with some embodiments.

Figure 351A:
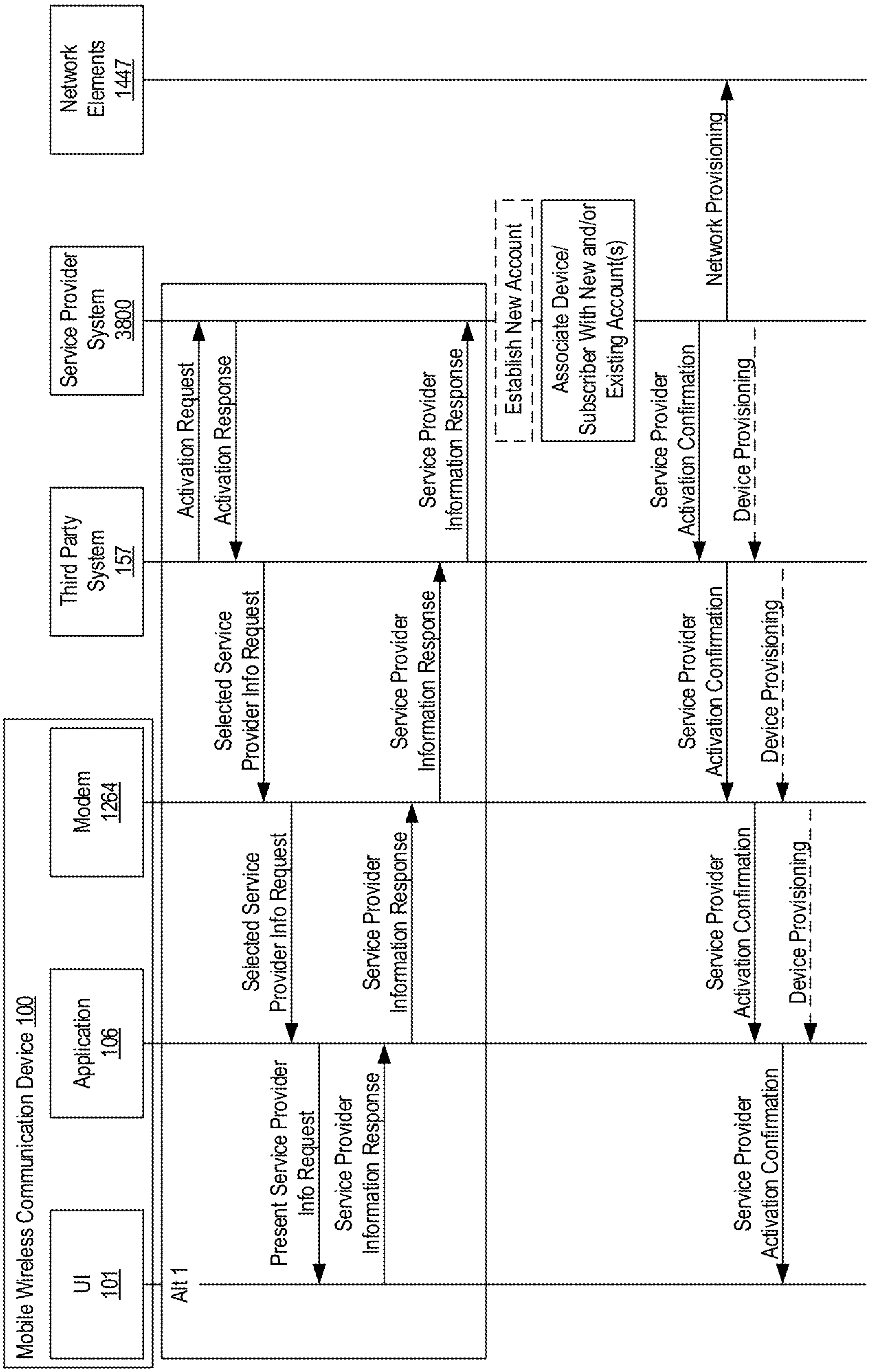

FIG. 351A illustrates a representative process to associate a mobile wireless communication device with a service account for a service provider in accordance with some embodiments.

Figure 351B:
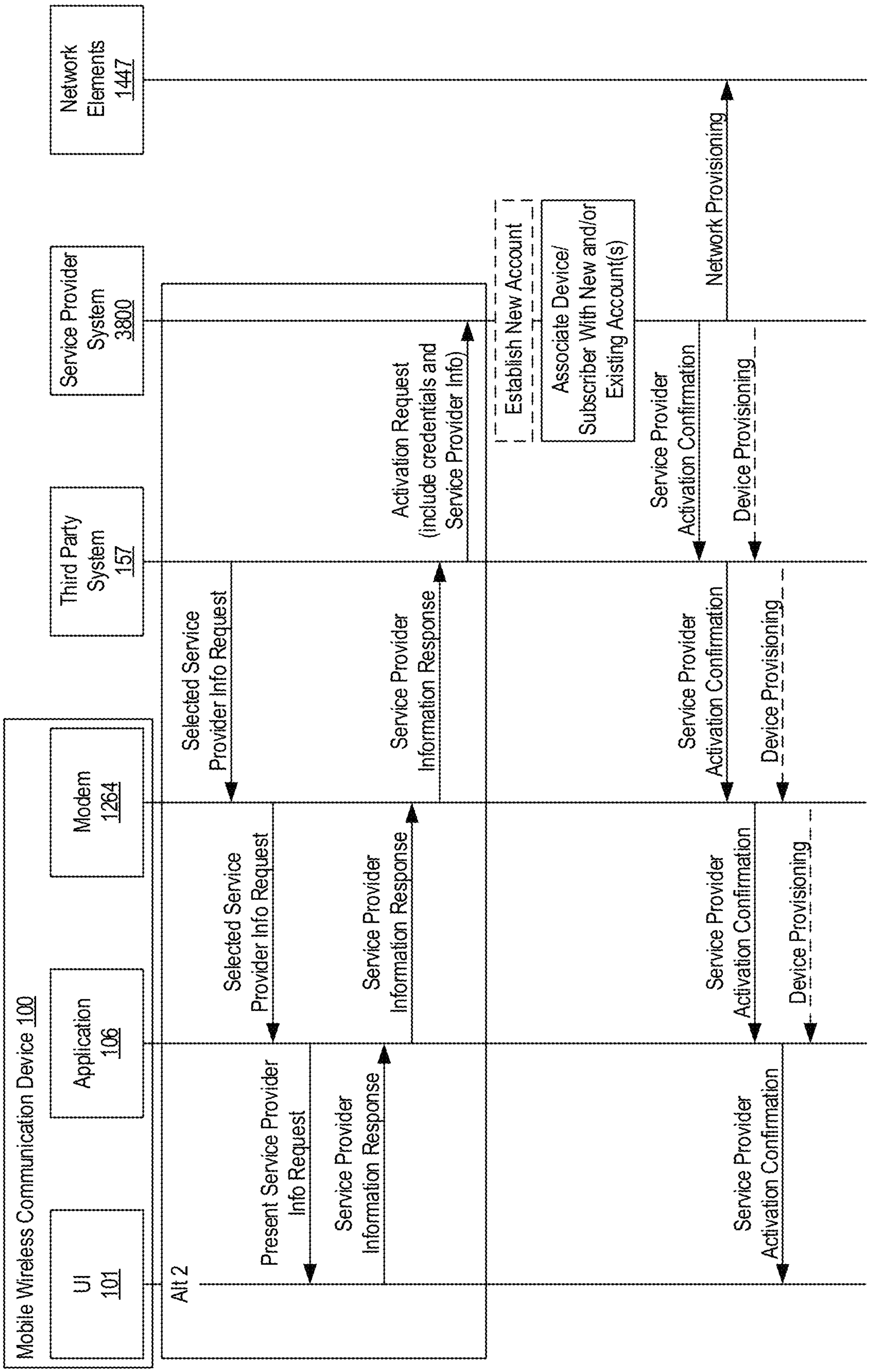

FIG. 351B illustrates another representative process to associate a mobile wireless communication device with a service account for a service provider in accordance with some embodiments.

Figure 352A:
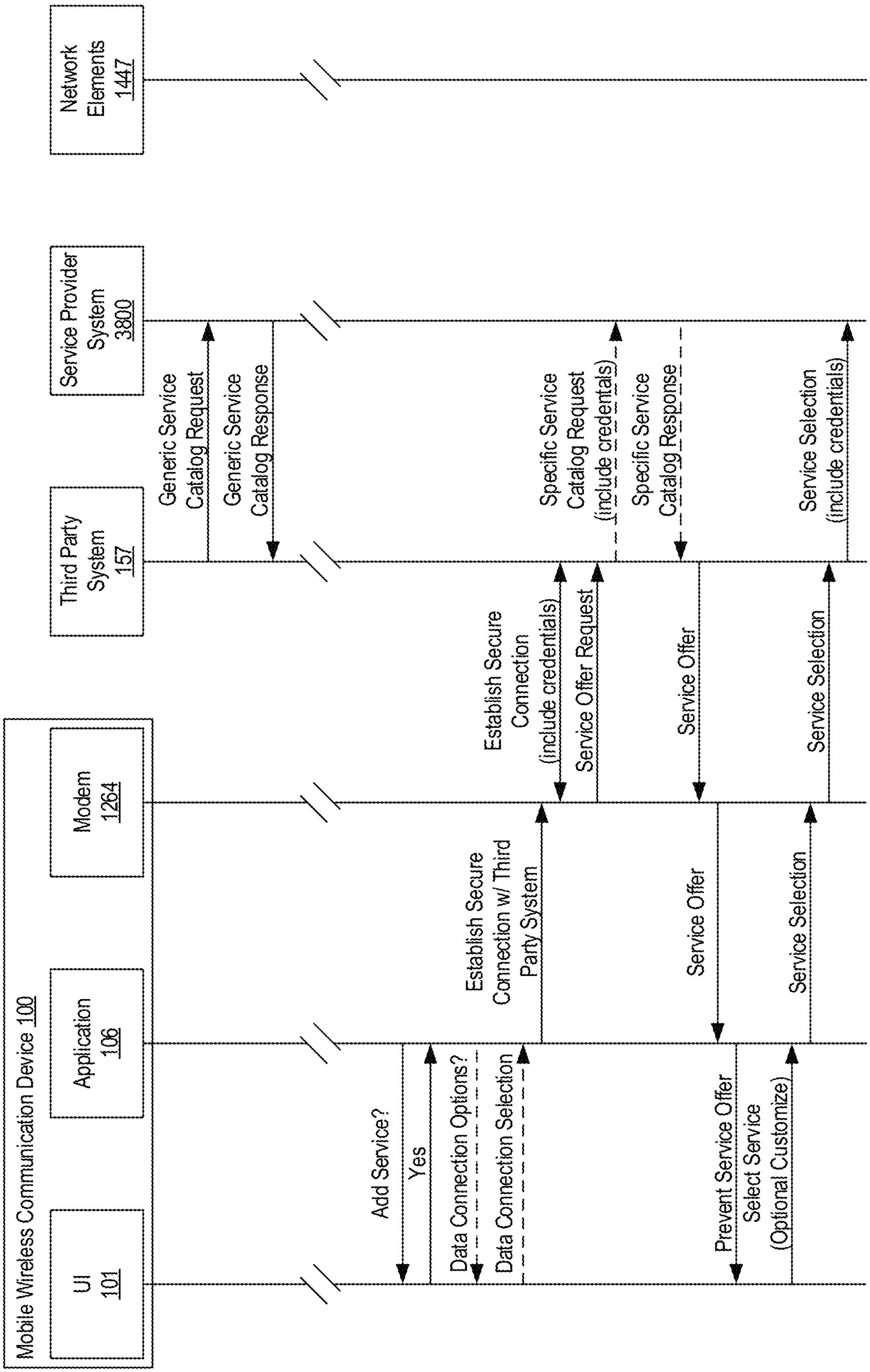

FIG. 352A illustrates a representative process to select a service offered by a service provider for a mobile wireless communication device in accordance with some embodiments.

Figure 352B:
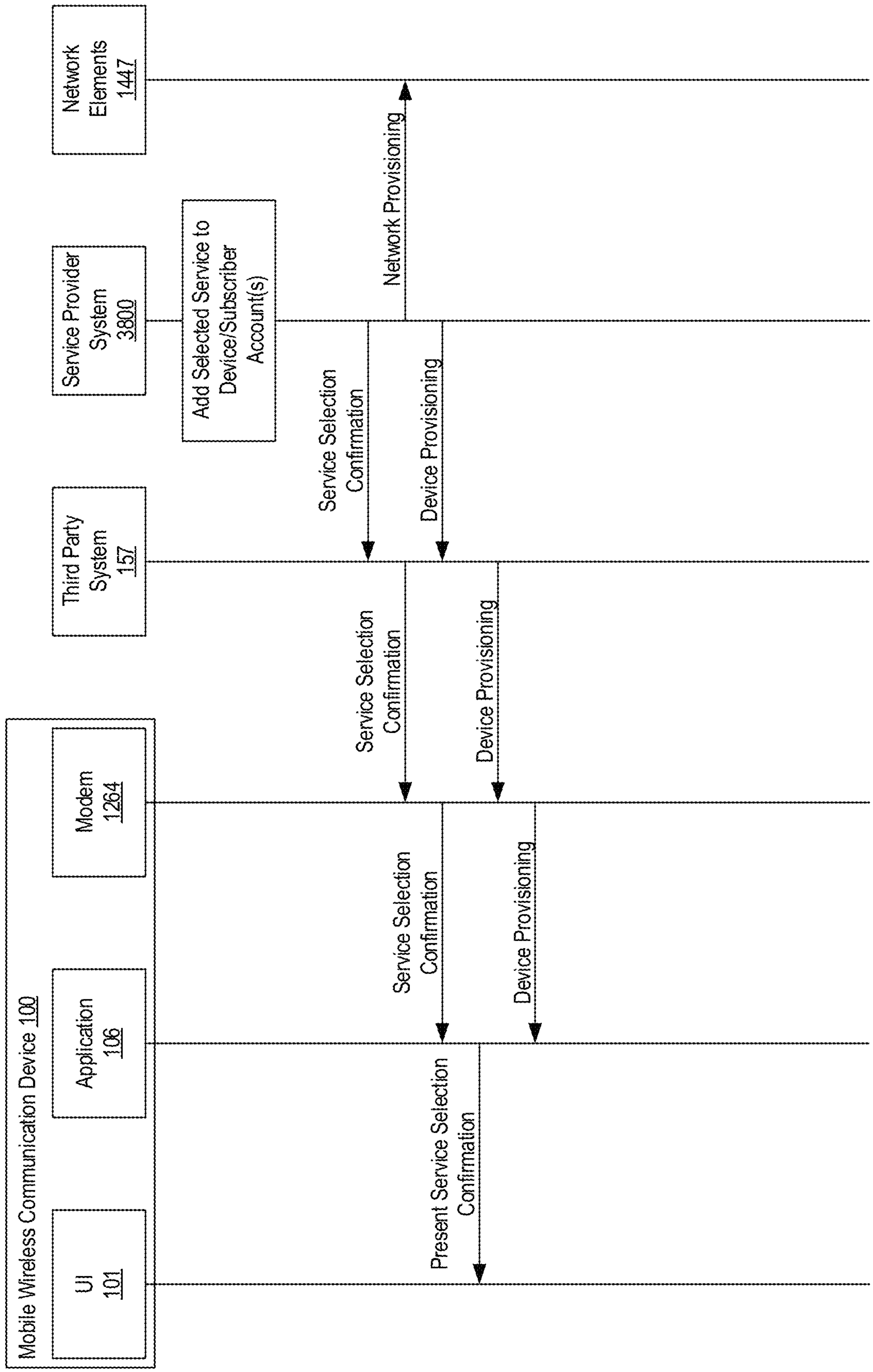

FIG. 352B illustrates another representative process to select a service offered by a service provider for a mobile wireless communication device in accordance with some embodiments.

Figure 353:
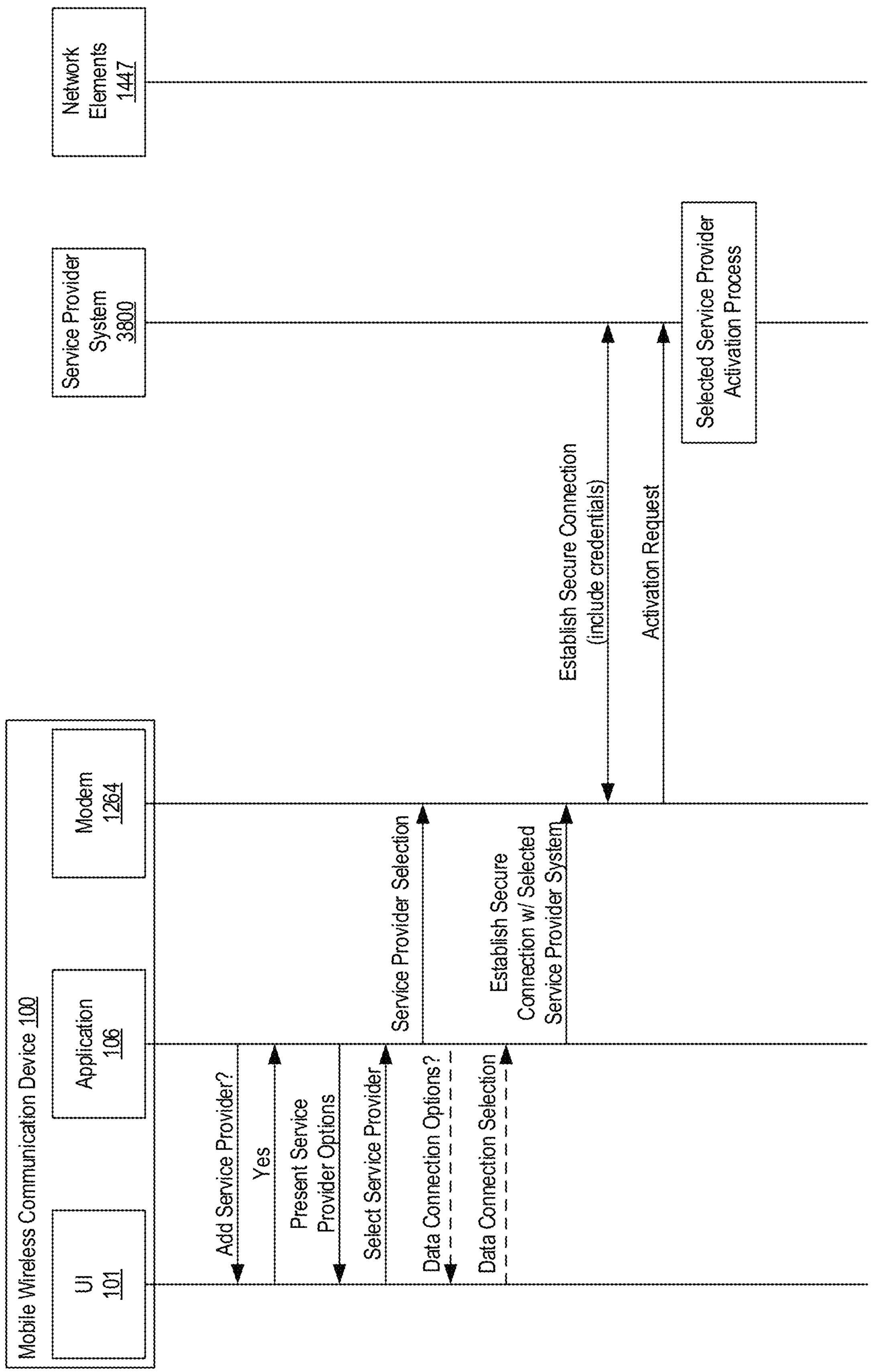

FIG. 353 illustrates a further representative process to select a service provider for a mobile wireless communication device in accordance with some embodiments.

Figure 354:
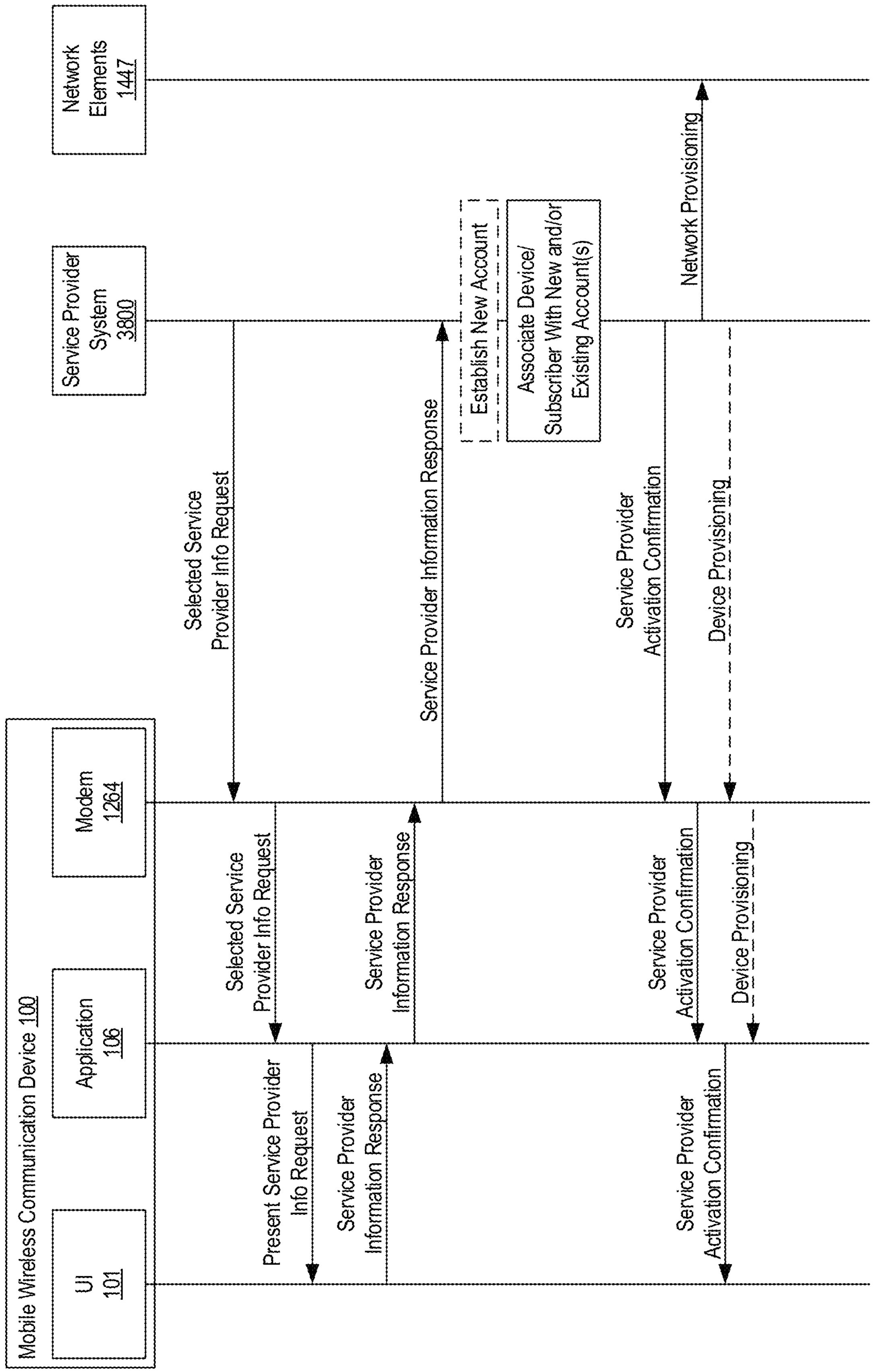

FIG. 354 illustrates a further representative process to associate a mobile wireless communication device with a service account for a service provider in accordance with some embodiments.

Figure 355:
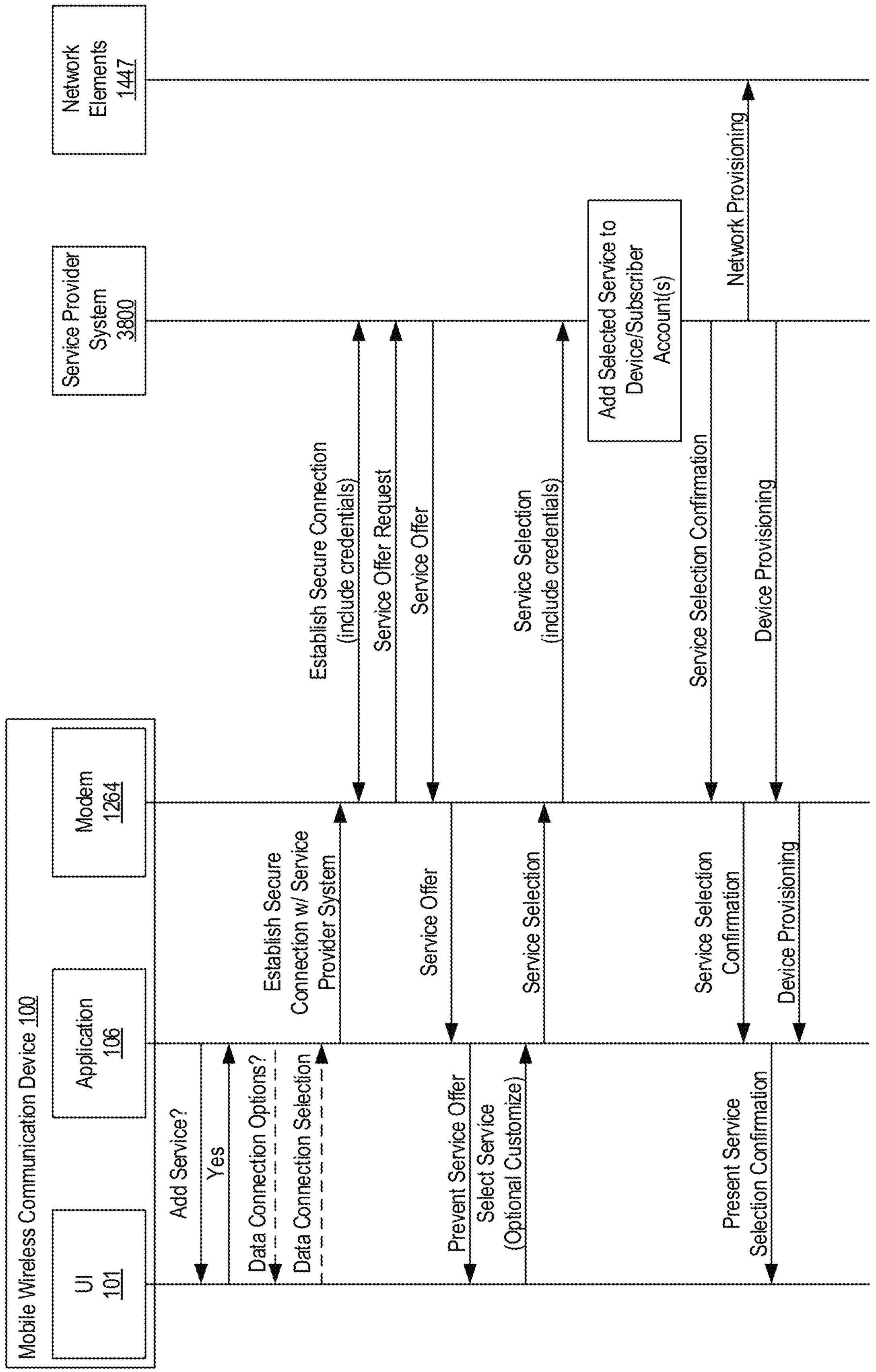

FIG. 355 illustrates a further representative process to select a service offered by a service provider for a mobile wireless communication device in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Disclosed herein a methods, systems, and apparatuses for the design, distribution, control and management of communication services for mobile wireless communication devices. As would be appreciated by one of ordinary skill in the art, mobile wireless communication devices include many types of computing devices. As used herein, the term device, mobile device, mobile communication device, mobile wireless communication device, wireless device, end-user device, wireless end-user device, and other equivalent terms are used interchangeably to refer to computing devices having one or more wireless communication capabilities to interoperate with one or more wireless networks. In some embodiments, the devices are mobile. In some embodiments, the devices include wired and wireless communication capabilities. In some embodiments, the devices are used to connect to one or more different wireless networks. In some embodiments, the devices include user interfaces through which information can be displayed and inputs received. In some embodiments, the devices include separate displays and input mechanisms. There are many other examples of devices having wireless communication capabilities and the representative embodiments disclosed herein are not intended to be limiting.

To date, service providers have provided a limited variety of different service plans and service plan bundles (multiple service plan elements bundled together) to which a user of the mobile wireless communication device may subscribe. With the increasing proliferation of a broad spectrum of mobile wireless communication devices having diverse communication and processing capabilities, it may be desirable to provide methods for an increased array of service plans and service plan bundles that may be easily accessed, reviewed, and selected by the subscriber of the mobile wireless communication device. In addition, customizable service plan bundles may be provided that permit the subscriber to select among a range of constituent service plan elements, thereby building the subscriber's own custom service plan bundle that best fits his or her particular communication service requirements. Service plan bundles may be customized based on numerous different criteria, including, but not limited to, service type (e.g., voice, messaging, data), applicable time period, geographic location, access network type, and application/service specific content. In addition, promotional service plans, subsidized service plans, and special service plan bundles that include multiple constituent service plan elements may be offered to the subscriber to increase the subscriber's exposure to featured service plans and service plan bundles. Through an easily navigable interface, e.g., using a flexible user interface of the mobile wireless communication device itself, through access to a website through a web browser, or through an application connected to an application portal, the subscriber may learn about, test out and subscribe to one or more service plans and/or service plan bundles that include a combination of service plan elements best suited for the subscriber's own needs. In some embodiments, a user or administrator also reviews, subscribes, shares, assigns or otherwise manages service plans and service plan bundles for devices in a device group. In some embodiments, the user or administrator manages service plans and service plan bundles for devices in a device group through an interface of one of the devices, or through a separate system that can interface with a service management system in the wireless network.

A mobile wireless communication device may need to be associated with a service account in order to allow a user or owner of the mobile wireless communication device (herein referred to as a subscriber) to use the mobile wireless communication device to communicate over a particular wireless communication network in a manner that is meaningful to the subscriber (e.g., to access content or a service offered by a service provider). Moreover, the mobile wireless communication device may need to be associated with one or more service plans that allow it to access services offered by a service provider. A service plan may, in general, allow for a quantity of communication that may be permitted during a time period of communication (e.g., 100 MB of data per month, 24 hours of network access, 100 minutes of phone calls, etc.). Some examples of services that may be offered by a service provider include the non-mutually-exclusive categories of voice services (e.g., phone calls, etc.), messaging services (e.g., text messages, multimedia messages, etc.), data services (e.g., Internet access, etc.), and hybrid services (e.g., voice over IP (VOIP), video chat, etc.). A service provider may be an operator of a wireless communication network, or may be another entity, such as a mobile virtual network operator (MVNO), a retail partner, a mobile wireless communication device original equipment manufacturer (OEM), a mobile wireless communication device operating system (OS) provider or a third-party service partner. There are many other examples of services, service plans, and service providers, and the examples provided herein are not intended to be limiting.

It may also be desirable to associate more than one mobile wireless communication device with a particular service account. There are many potential benefits of associating multiple wireless communication devices to a particular service account, including, for example, simplifying billing for the service provider and for the subscriber, and potentially reducing service costs for subscribers, e.g., by sharing the particular service account among multiple wireless communication devices. For example, a husband and wife may want to establish a single service account for both of their smart phones. As another example, a parent may want to establish a single service account for the several mobile phones used by family members. As another example, an employer may want to establish a single service account for multiple smart phones used by one or more of its employees. As another example, a person may want to establish a single service plan for multiple mobile wireless communication devices that the person uses, such as, for example, one or more of a smart phone, a tablet, a laptop, and an intermediate networking device that forwards traffic between a local area network and a wireless cellular network. There are many other examples of situations in which it might be desirable to associate multiple mobile wireless communication devices to a single service account (hereinafter referred to as a master service account).

In addition to associating multiple mobile wireless communication devices with a master service account, it may be desirable to share a service plan that is associated with the master service account among the multiple wireless communication devices associated with the master service account. For example, a parent might want to purchase a single service plan that is shared among all members of the family, or an employer might want to purchase a single service plan that is shared among multiple employees.

Today, subscribers who wish to share a service plan among multiple mobile wireless communication devices can only do so with several limitations. For example, creating a master service account and sharing a service plan among multiple wireless communication devices can require direct involvement of a service provider, e.g., a service provider customer representative. The service provider associates each of the mobile wireless communication devices with a master service account and with a service plan, and the associated mobile wireless communication devices then share the service plan. Often, subscribers cannot add or delete mobile wireless communication devices from the master service account without assistance from the service provider. In order to make changes to the master account, subscribers may need to call the service provider or may be required to log in to a web portal (e.g., by logging into a website), e.g., through a separate computing system. Another drawback is that although all of the mobile wireless communication devices associated with a master service account share a service plan, there are no controls to prevent a particular mobile wireless communication device from "hogging" allocations provided by the service plan. Another drawback is that although some service providers today allow sharing of voice minutes or text message allocations, they do not allow or limit sharing of a data plan. Yet another drawback is that today's shared service plans do not allow subscribers to associate different kinds of mobile wireless communication devices (e.g., a tablet and a smart phone) with a master service account. As a result of these drawbacks, the utility of shared service plans available today is limited.

As used herein, service activity is used to refer to any service usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, short messaging service (SMS), IP multimedia system (IMS), or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of verifiable service control policies. As will be apparent to one of ordinary skill in the art in view of the embodiments described herein, some embodiments identify various service activities for the purpose of decomposing overall service usage into finer subcategories of activities that can be verifiably monitored, categorized, cataloged, reported, controlled, monetized and used for end user notification in a manner that results in superior optimization of the service capabilities for various levels of service cost or for various types of devices or groups. In some embodiments, it will be apparent to one of ordinary skill in the art that the terms service activity or service usage are associated with categorizing and possibly monitoring or controlling data traffic, application usage, communication with certain network end points, or transactions, and it will also be apparent that In some embodiments, the term service activity is intended to include one or more of the broader aspects listed above. The shortened term service usage can be used interchangeably with service activity, but neither term is intended in general to exclude any aspect of the other. In some cases, where the terms service usage or service activity are used, more specific descriptors such as traffic usage, application usage, website usage, and other service usage examples are also used to provide more specific examples or focus in on a particular element of the more encompassing terms.

In some embodiments, a user of a mobile wireless communication device configures service plans and service plan bundles, including individual constituent service plan elements thereof, permissions associated therewith, and restrictions applied thereto through a flexible user interface of the mobile wireless communication device. In some embodiments, a user is presented a selection of content for service plans and service plan bundles through the user interface of the mobile wireless communication device. In some embodiments, service providers or third parties supply applications to the mobile wireless communication device through which service plan and service plan bundle selection, customization, and management are effected. In some embodiments, customization and selection of service plans and service plan bundles occurs through the user interface of the mobile wireless communication device. In some embodiments, service plan and service plan bundle customization and selection occurs through a web browser application on the mobile wireless communication device. In some embodiments, customization and selection of service plans and service plan bundles uses one or more specific applications provided by a service provider or by a third party and installed on the mobile wireless communication device. In some embodiments, service plan and service plan bundle customization and selection uses applications provided by an operating system for the mobile wireless communication device. In some embodiments, the user selects and customizes service plans and service plan bundles for one mobile wireless communication device through another mobile wireless communication device. In some embodiments, selection and customization of service plans and service plan bundles occurs through a web browser communicating with a server or a website or a web portal. In some embodiments, selection and customization of service plans and service plan bundles occurs through an application communicating with an application portal or server, e.g., an application on the mobile wireless communication device or an application on another computing system. In some embodiments, a server communicatively coupled to a wireless network provides information for service plan and service plan bundle selection and customization. In some embodiments, information displayed for service plan and service plan bundle selection and customization originates from storage in the mobile wireless communication device. In some embodiments, the user selects and customizes individual constituent service plan elements included within a service plan bundle. In some embodiments, the user selects and customizes features of a service plan, service plan element or service plan bundle.

In some embodiments, notification messages, e.g., marketing interceptors, provide service plan offers to a user of the mobile wireless communication device. In some embodiments, the notification messages are presented directly through the user interface of the mobile wireless communication device. In some embodiments, multiple service plan options are presented to the user of the mobile wireless communication device for service plan selection. In some embodiments, a set of service plan selection options (and/or customization options) is presented in response to a user action. In some embodiments, the content of the set of service plan selection options depends on the particular action of the user. In some embodiments, the user interface provides for sharing, assigning and controlling permissions for service plans among multiple mobile wireless communication devices. In some embodiments, the user interface provides for managing service plans of devices in a device group. In some embodiments, the user interface provides for restricting usage of specific service plans that are assigned or shared with one or more devices in a device group.

In some embodiments, an offer for subscription to a service plan is presented through the user interface directly to the user of the mobile wireless communication device. In some embodiments, notification messages, e.g., "try this app," are presented to highlight an available service plan to the user of the mobile wireless communication device. In some embodiments, a service plan is offered by placing an overlay message (e.g., within a callout box). In some embodiments, marketing features of a service plan, e.g., sponsorship and/or "paid for" time periods, are presented to the user of the mobile wireless communication device. In some embodiments, one or more device agents resident in the mobile wireless communication device obtain indications or information related to available service plans from a network element, e.g., a server in a wireless network. In some embodiments, a flexible user interface presents offers to purchase service plans, including a "bundle" of service plan elements grouped together, e.g., voice, messaging, and data service plan elements offered as a service plan bundle. In some embodiments, a user can customize the selection of service plan elements to include in a service plan bundle.

In some embodiments, a selection of options for service plans and/or service plan bundles is presented to a user of the mobile wireless communication device through a flexible user interface, and the user of the mobile wireless communication device selects one or more service plans or service plan bundles through the flexible user interface, e.g., Plan A, B or C, or Service Plan Bundle X, Y or Z. In some embodiments, a selection of options for individual service plan elements to include in a service plan bundle is presented to a user of the mobile wireless communication device through a flexible user interface, and the user of the mobile wireless communication device selects a set of service plan elements to build a customized service plan bundle. In some embodiments, a rotating "carousel" of service plan bundles is presented to the user of the mobile wireless communication device, and the user selects from the "carousel" a service plan bundle through the user interface. In some embodiments, the user cycles through the selection options by interacting with the user interface, e.g., through a touch screen, of the mobile wireless communication device. In some embodiments, multiple rotating "carousels" of service plan elements are presented to the user of the mobile wireless communication device, and the user selects individual service plan elements from each of the "carousels" to build a customized service plan bundle. In some embodiments, selection and customization occurs through an application on the mobile wireless communication device, e.g., connected to an application portal. In some embodiments, selection and customization occurs through a web browser, e.g., connected to a website. In some embodiments, selection options for service plans, service plan elements, and service plan bundles are stored in the mobile wireless communication device. In some embodiments, the selection options are provided through a communication link to a server communicatively coupled to the wireless network. In some embodiments, the selection options are partially stored in the mobile wireless communication device and partially obtained from a server in the wireless network. In some embodiments, display parameters for presenting selection options (or other service plan information) through a user interface are obtained from storage in the mobile wireless communication device, obtained from a server communicatively coupled to the wireless network, or obtained in part from the device and in part from a server communicatively coupled to the wireless network.

In some embodiments, a service plan (bundle) selection system interviews the user to determine a "best match" set of selection options to provide to the user. Based on responses obtained from the user to one or more interview questions, the service plan (bundle) selection system provides one or more service plan bundles (or constituent service plan elements thereof) and/or one or more service plans to include in one or more offered service plan bundles. In some embodiments, the service plan (bundle) selection system includes information gathered from previous service usage, present service usage, and/or a service usage history for the mobile wireless communication device or for a user thereof to determine options to present to the user for selection and customization of service plans and service plan bundles. In some embodiments, the service plan (bundle) selection system offers the user of the mobile wireless communication device assistance in selecting and configuring service plans and service plan bundles. In some embodiments, service plan offers and service plan bundle offers can match service usage patterns. In some embodiments, information about previous service usage and/or current service usage is presented simultaneously with service plan options and service plan bundle options to the user of the mobile wireless communication device. In some embodiments, service usage provides context to the user of the mobile wireless communication device when choosing and/or customization a service plan or service plan bundle.

In some embodiments, service plan bundle selection and customization can include one or more individual constituent service plan elements. In some embodiments, service plan bundle customization can include selecting an option for a constituent service plan element from each of a plurality of service plan categories. In some embodiments, service plan categories include voice service plans, messaging service plans, and data access service plans. In some embodiments, service plan categories include domestic voice service plans and international voice service plans. In some embodiments, service plan categories include "home network" service plans and "roaming" network service plans. In some embodiments, adding individual service plans to a base service plan bundle customizes the base service plan bundle. In some embodiments, selecting each of the individual constituent service plan elements of a base service plan bundle customizes the base service plan bundle. In some embodiments, recommendations for different levels of matching criteria are presented to the user in order to provide options for selecting and/or customizing service plan bundles. In some embodiments, the user selects criteria for service plan recommendations, e.g., "low cost," "high bandwidth," "roaming access," and the service plan bundle selection and customization system provides options for service plans to include in a service plan bundle. In some embodiments, a ranking of service plan options to include in a service plan bundle is provided. In some embodiments, when the user selects one or more service plan elements to include in a service plan bundle, a "better" matching service plan element is provided as an alternative selection option for the user of the mobile wireless communication device. In some embodiments, when the user customizes a service plan bundle, a "different" matching service plan bundle is provided as a service plan bundle offer to the user of the mobile wireless communication device. In some embodiments, matching criteria to determine the "better" matching service plan, service plan element or service plan bundle include service usage history. In some embodiments, sponsored service plans or service plan bundles based on service usage are presented to the user of the mobile wireless communication device. In some embodiments, service plans or service plan bundles are offered with one or more additional promotional features.

In some embodiments, a network system uses a service usage history of the mobile wireless communication device to determine a set of service plans to offer to a user of the mobile wireless communication device. In some embodiments, the network system determines a set of service plans that provide a different set of features or benefits to the user of the mobile wireless communication device compared with a current or recent set of service plans to which the user of the mobile wireless communication device subscribes. In some embodiments, one or more service plans in the determined set of service plans includes a cost savings and/or a feature benefit compared with the current or recent set of service plans. In some embodiments, the network system categorizes the features and/or benefits (e.g., cost savings). In some embodiments, the network system provides for a notification message to the mobile wireless communication device to indicate at least a portion of the determined set of service plans. In some embodiments, the notification message includes at least a portion of the categorized features and/or benefits of the service plans included in the notification message. In some embodiments, the notification message includes an option to subscribe to one of the service plans. In some embodiments, the notification message includes an option to review information about one or more of the service plans. In some embodiments, the notification message provides for a responsive action from the user of the mobile wireless communication device. In some embodiments, the network system obtains a response to the notification message. In some embodiments, the response indicates an acceptance or a rejection to subscribe to a service plan indicated in the notification message. In some embodiments, the network system provisions one or more network elements and/or the mobile wireless communication device when obtaining a affirmative indication from the user of the mobile wireless communication device to subscribe to a service plan offered in the notification message. In some embodiments, the network system replaces a current service plan with the selected new service plan. In some embodiments, the notification message indicates a cost savings to the user of the mobile wireless communication device for at least one of the service plans. In some embodiments, the network system determines a billing offset when the user selects to subscribe to a new service plan. In some embodiments, the network system applies the billing offset to a service account for the user of the mobile wireless communication device.

In some embodiments, a catalog of "free" services is presented to the user of the mobile wireless communication device. In some embodiments, a service plan provides access to a set of services, e.g., a quantity of voice minutes, and/or a number of text messages, and/or an amount of data access consumption, in return for subscribing to a particular service or for using a particular application. In some embodiments, promotional offers are provided for a limited time period. In some embodiments, promotional offers provide for a limited set of features. In some embodiments, promotional features are accessible only after the user takes additional actions, e.g., interacts with a particular application or website.

In some embodiments, service plan offers are displayed through the user interface of the mobile wireless communication device. In some embodiments, notification messages are displayed to provide service plan offers. In some embodiments, notification messages are triggered based on trigger conditions, e.g., based on a pre-determined condition being met, or based on a particular action of the user of the mobile wireless communication device, or based on a network state. In some embodiments, marketing interceptors offer service plan (bundle) selections or customization based on a set of numerical digits dialed by the user of the mobile wireless communication device to establish a connection for a service, e.g., for a voice call. In some embodiments, a marketing interceptor offers an alternative service in response to the particular set of dialed numerical digits. In some embodiments, the marketing interceptor offers a different set of features or costs for an alternative service compared to the "dialed" service. In some embodiments, an application or a part of an operating system on the mobile wireless communication device, alone or in conjunction with one or more network based systems, uses an alternative service implicitly changing the connection without intervention by the user of the mobile wireless communication device. In a representative embodiment, a voice call is transformed to a voice over Internet protocol (VOIP) call or other packet/data based voice connection. In some embodiments, an SMS text message is converted to use an alternative text/data connection service, e.g., from a text messaging service that counts individual text messages to a data service that counts data bytes. In a representative embodiment, a "video chat" call through a cellular connection is changed to a "video chat" call through a wireless local area network connection. In some embodiments, a service having a higher cost per unit time and/or per unit message and/or per unit data byte is transformed to a lower cost service. In some embodiments, marketing interceptors for alternative service can depend on a set of networks available and/or based on types of networks available to the mobile wireless communication device.

In some embodiments, one or more device agents of a service processor of a mobile wireless communication device intercept establishment of (and/or use of) a communication service connection or service activity, classify the communication service connection or service activity, compare the communication service connection or service activity to a service policy, and initiate an action based on the service policy. In some embodiments, the service policy is stored at least in part in the mobile wireless communication device. In some embodiments, the service policy is stored at least in part in a network element and communicated to the mobile wireless communication device. In some embodiments, the action initiated includes providing a notification message to the mobile wireless communication device. In some embodiments, the action includes displaying the provided notification message to a user of the mobile wireless communication device, e.g., through the user interface (UI) of the mobile wireless communication device. In some embodiments, the action includes displaying an actionable notification message from which further actions can be initiated. In some embodiments, the actionable notification message includes one or more options presented to the user of the mobile wireless communication device. In some embodiments, the actionable notification message includes a service plan offer. In some embodiments, the actionable notification message includes an option to start and/or download an application.

In some embodiments, a mobile wireless communication device intercepts a dialed phone number, classifies the phone number according to a pre-configured/pre-stored policy and initiates a policy action. In some embodiments, the mobile wireless communication device displays a pop-up notification message that includes one or more actionable buttons. In some embodiments, the pop-up notification message provides one or more options for an alternate service corresponding to the classification of the phone number. In some embodiments, the mobile wireless communication device provides for a Voice over Internet Protocol (VoIP) connection in place of a "dialed" voice connection. In some embodiments, the notification message offers an option to download an application that provides for a VoIP connection.

In some embodiments, a method for intercepting a communication service connection includes detecting an aspect of a number dialed to establish a connection, classifying an aspect of the connection, obtaining a service policy associated with the connection, intercepting the establishment of the connection, and redirecting the connection through an alternative communication service.

In some embodiments, aspects of the number dialed to establish a connection include one or more of: a specific number, an emergency services number, an information number, a long distance number, a local number, an international number, a toll free number, a number belonging to a preferred calling group, a number of a white list, and a number of a black list.

In some embodiments, a method for intercepting a communication service connection includes detecting an aspect of an attempted access to a communication service, classifying an aspect of the attempted access to the communication service, obtaining a service policy associated with the communication service, interrupting access to the communication service, and redirecting access to the communication service through an alternative communication service.

In some embodiments, aspects of the attempted access to the communication service include an application used, a network endpoint address, a wireless access network type, a website on a white list, a website on a black list, or a combination thereof.

In some embodiments, service plan (bundle) selection options are grouped based on a characteristic of the service plan or service plan bundle. In some embodiments, service plan (bundle) selection options are grouped based on an applicable time period for the service plan or service plan bundle. In some embodiments, a user interface provides flexible navigation to view a subset of all available service plan or service plan bundle options. In some embodiments, service plan (bundle) selection options are presented using a rotatable "carousel." In some embodiments, service plan (bundle) selection options are presented using one or more scrollable lists. In some embodiments, service plan (bundle) selection options are presented using an array of icons. In some embodiments, service plan (bundle) selection options are presented as a combination of graphics and text. In some embodiments, service plan (bundle) selection options are presented through one or more drop down menus. In some embodiments, service plan (bundle) selection options are presented through a set of tabs. In some embodiments, particular service plans or service plan bundles are highlighted to the user based on one or more criteria. In some embodiments, highlighted selections are determined based on service usage. In some embodiments, one or more tabs organize service plan (bundle) selection options include "featured service plans," "application based service plans," "voice service plans," "data service plans," and "messaging service plans." In some embodiments, a banner area of the user interface presents graphics and advertisements for particular service plans or service plan bundles. In some embodiments, graphics are static. In some embodiments, graphics are dynamic.

In some embodiments service usage history and/or service plan and/or service plan bundle subscription history influences a selection and customization of service plans and/or service plan bundles. In some embodiments, the selection of options for service plans or service plan bundles uses information resident in the mobile wireless communication device itself. In some embodiments, indicators are presented with service plan (bundle) selection options to provide the user information, e.g., "installed, purchased, expired, etc." In some embodiments, service plan (bundle) selection options are organized based on a history of viewing, e.g., "not seen" service plans or service plan bundles are presented, and "seen" service plans or service plan bundles are not presented. In some embodiments, service plan selection options presented are based on a set of user preferences. In some embodiments, a history of service plan and/or service plan bundle purchases and customizations is presented in conjunction with presentation of service plan selections and/or service plan offers. In some embodiments, one or more differences between an offered service plan (bundle), a current service plan (bundle), a past service plan (bundle), a customized service plan (bundle), and/or a standard service plan (bundle) are presented along with the service plan (bundle) options.

In some embodiments, "adding" a supplemental service plan element to a service plan bundle customizes the service plan bundle. In some embodiments, service plan (bundle) selection options include "upgrade" offers to provide the user a higher grade of service based on a current service plan or service plan bundle. In some embodiments, service plan or service plan bundle offers provide "upgrades" or "downgrades" based on service usage history.

In some embodiments, accounting information includes different billing options, including but not limited to credit cards, "virtual wallets" resident on the mobile wireless communication device, and "bill me later."

In some embodiments, an organization of information provided to the user to select and/or customize service plans and service plan bundles includes formatting the information based on choosing service plans and service plan bundles (or features of service plans and service plan bundles) for specific mobile wireless communication devices. In some embodiments, the organization of information, provided to the user to select and/or customize service plans and service plan bundles, includes formatting the information based on choosing mobile wireless communication devices for specific current or newly subscribed service plans or service plan bundles. In a representative embodiment, a user adds or deletes mobile wireless communication devices to a specific service plan or service plan bundle. In a representative embodiment, a user adds or deletes a service plan or service plan bundle to a specific mobile wireless communication device. In a representative embodiment, a user interface presents information for service plan (bundle) selection and customization using a "plan view," a "master device view" and/or a "slave device view." In some embodiments, the "plan view" provides for adding, deleting and/or modifying sharing/assignment of a mobile wireless communication device to a specific service plan or service plan bundle. In some embodiments, the "master device view" provides for adding, deleting or modifying sharing/assignment of a service plan or service plan bundle on one or more mobile wireless communication devices associated with a device group. In some embodiments, the "slave device view" provides for limited capabilities to add, delete or modify sharing/assignment of a service plan or service plan bundle on the specific "slave" mobile wireless communication device. In some embodiments, information is presented to the user of the mobile wireless communication device tailored to permissions controls that apply to the mobile wireless communication device.

In some embodiments, permissions controls for a mobile wireless communication device are contained in a device credential or in a user credential. In some embodiments, a level of permission control affects information displayed through a user interface of the mobile wireless communication device. In some embodiments, different applications and/or settings for applications are loaded based on permissions controls, e.g., based on a device credential or a user credential. In some embodiments, a network-based server determines information to provide to a mobile wireless communication device based on a device credential or a user credential. In some embodiments, an application on the mobile wireless communication device presents information to the user of the mobile wireless communication device based on a permission level.

In some embodiments, notifications are provided to a mobile wireless communication device for providing information to control and/or manage communication services available to, offered to, subscribed to, or otherwise usable by the mobile wireless communication device. In some embodiments, notifications are triggered to be obtained and/or displayed based on trigger conditions established by a user, an network administrator, a service provider, an enterprise administrator, a device group administrator, or a third-party service partner. In some embodiments, notification trigger conditions and/or notification content and/or notification display parameters are configured through a service design center. In some embodiments, notification trigger conditions are configured through access to a service provider service management system (including third-party service partners), e.g., through an application on the mobile wireless communication device, or through a web browser interacting with a specific website. In some embodiments, notification trigger conditions are configured through the user interface of the mobile wireless communication device, e.g., by the user of the mobile wireless communication device interacting with one or more screens presented on a display of the mobile wireless communication device.

In some embodiments, a service usage control policy includes a service usage notification policy. In some embodiments, the user notification includes one or more of the following: a notification that the application to be downloaded and/or launched is a network capacity controlled service; a list of one or more service activities (e.g., applications, OS/other software functions/utilities, and/or other functions/utilities as described herein) that have a network capacity controlled services classification; type of service policy in effect for one or more network capacity controlled services; notification that a service activity belongs to a network capacity controlled services class; notification that a service activity that is classified as network capacity controlled service can have the service class changed; notification that if the service class is changed for a service activity the service charges will change; notification that one or more networks are available (e.g., one or more alternative networks and/or network busy state information and/or charging information and/or incentives associated with such networks), a service plan upgrade/downgrade offer/option; and an offer for a service plan that rewards a user that responds to the notification a service plan is lower cost/discounted for responding to notification to use or not to use service activity based on usage level warning notification. In some embodiments, the user notification includes a user preference selection, including one or more of the following: a provision to associate an access policy control with the application (e.g., allow/block, notify of usage, notify of usage at a given threshold, traffic control settings, allow during certain times, allow when network not busy, and/or other policy controls as described herein), an over-ride option for selecting the service usage control policy; a modify option to select the service usage control policy; a select option to select a new service plan (e.g., an option to review and select alternative/new service plan upgrade/downgrade options), and an acknowledgement request (e.g., to confirm/acknowledge receipt of the notification, in which the acknowledgement can be transmitted to a network element/function and/or stored locally for later reference/transmission).

In some embodiments, before a given device application, process, function, OS service or other service activity is allowed to start, the intention to start is intercepted by a launch manager, the background service policy set or the network protection service policy set for the service activity is retrieved, and any necessary user notification or service launch control policies are implemented prior to allowing the service activity to launch. In such embodiments, a launch intercept manager may be used to implement this functionality. In some embodiments, this launch intercept manager is provided with a list identifying the service activities (e.g., application identifiers, OS function identifiers, aggregate service activity identifiers, and/or component service activity identifiers) that have a launch control policy in effect. In some embodiments, the list of launch control policies includes blocking or delaying launch of the one or more service activities. In some embodiments, the launch control policy includes a user notification before, during or after the service activity is launched. In some embodiments, the user is informed that a service activity that has a background service control policy in effect or a network protection service control policy in effect is attempting to launch, is about to launch or has launched. In a further set of embodiments, the launch is held up until the user is notified and is allowed to decide if they would like to launch the service activity. In some embodiments, the user notification includes a message that the service activity attempting to launch consumes a large amount of service usage and asks the user if they would like to continue (e.g., "This application consumes a large amount of data, would you like to continue?", "This application consumes data even when you are not using it, would you like to continue?", "This application consumes data while you are roaming which adds cost to your usage bill, would you like to continue?", etc.). In some embodiments, the decision on whether or not to launch a service activity is pre-programmed into the list identifying the service activities (e.g., application identifiers, OS function identifiers, aggregate service activity identifiers, and/or component service activity identifiers) that have a launch control policy in effect. In some embodiments a portion of the list is pre-programmed by the user in accordance with user preference for controlling usage of service activities. In some embodiments, a portion of the list is pre-programmed by a network element (e.g., a service controller) in accordance with network background service or network protection service policies specified by a service policy design management system operated by a service provider as described herein. In some embodiments, the policy implementation defined by the list identifying the service activities (e.g., application identifiers, OS function identifiers, aggregate service activity identifiers, and/or component service activity identifiers) that have a launch control policy in effect is verified to ensure that the user or malicious software has not defeated the policy enforcement specified in the list. In some embodiments the list identifying the service activities that have a launch control policy in effect includes launch policies that are a function of one or more of: background service state, network busy state (or performance state or QoS state), type of network the device is connected to, home or roaming connection, time of day or day of week.

In some embodiments, the various design techniques described herein that allow for intercepting a service activity intention to launch, and applying a background service policy set or a network protection service policy set can be designed into the OS itself. For example, the intercept and policy implementation functions can be designed into the activity manager, broadcast intent manger, media service manager, service manager, or other application or service activity management function in the Android OS. One of ordinary skill in the art will recognize that similarly, the various design techniques described herein that allow for intercepting a service activity intention to launch, and applying a background service policy set or a network protection service policy set can be designed into application launch management functions in the iPhone OS, windows mobile OS, windows PC OS, Blackberry OS, Palm OS, and other OS designs.

In some embodiments, the pre-launch user notification information indicates one or more of: typical service usage or cost, or projected service usage or cost for the service activity attempting to launch. In some embodiments, the user sets limitations on access for one or more service activities and once this limit is hit then when the service activities with exceeded limits attempt to launch the user is notified. In some embodiments, the user chooses from a set of service restrictions rather than simply blocking or allowing service activity launch, with example service restrictions including but not limited to: a pre-configured set of restriction policies to chose from (e.g., full access, limited access, highly restricted access or block access), block, throttle, delay, aggregate and hold, limit amount of usage per unit time, cap usage, set limit for additional notification, specify type of network, specify busy state (performance, QoS) or background state, or choose from pre-configured settings options.

In some embodiments, the user notification occurs after the user attempts to download or load an application onto the device (e.g., an application downloaded from the web or an online application store for a smart phone or other wireless/network computing device, such as an Apple iPhone or iPad, or Google Android/Chrome based device). In some embodiments, the user notification occurs after the user attempts to run the service activity or to initiate usage of a cloud based service/application (e.g., Google or Microsoft cloud service based apps). In some embodiments, the user notification occurs after one or more of the following: the service usage activity hits a usage threshold event, the service usage activity attempts a network service usage that satisfies a pre-condition, an update to a network capacity protection service activity classification list or policy set, and a network message is sent to the device triggering the notification. In some embodiments, the user notification provides information on the service usage activity that is possible, typical, or likely for the service usage activity. In some embodiments, the user notification includes a user option for obtaining more information about the service usage of the service activity (e.g., a message that the service usage activity may result in a high service usage and/or that the service usage activity may or will result in a high service usage as compared in some way to a limit of the current service plan) to make informed user preference settings.

In some embodiments, a user notification includes displaying (e.g., and as applicable, allowing users to provide UI input) one or more of the following: current and/or past/historical/logged network service usage activity list, current and/or past/historical/logged network capacity controlled service usage activities, current activity policy settings, current or available networks, service plan options (e.g., for how to treat one or more network capacity controlled service traffic types), selection option(s) to assign a network capacity controlled service activity into a different priority traffic control and/or charging buckets, network service usage by activity (e.g., network capacity controlled services and other services), network busy state (e.g., and with resulting policies in force), service activity policy setting vs. busy state and time/day/week, network service activity priority, network service activity usage statistics (e.g., vs. network busy state and/or network service usage control policy state).

In some embodiments, a UI notification is displayed when user attempts a network capacity controlled service activity during a network busy state (e.g., that modifies a network capacity controlled services policy). In some embodiments, the UI notification includes information on service plan choice and a network capacity controlled services policy over-ride option (e.g., one time, time window, usage amount, permanent by activity, and/or all), charging information based on a user selection, and/or service plan upgrade information and options.

In some embodiments, a UI notification is displayed for user input for preferences/configurations for multiple networks (e.g., Wi-Fi, 4G, 3G, and/or other wired or wireless access networks) including charging policy. In some embodiments, a UI notification is displayed when a specified network traffic service usage activity (e.g., based on network capacity controlled services classification, QoS classification, priority classification, time based criteria, network capacity, service plan, charging criteria, and/or other criteria/measures) is being attempted or is occurring and providing options (e.g., allow, block, delay, throttle, and/or other options).

In some embodiments, a UI fuel gauge is displayed (e.g., to depict current and/or historical network service usage, for example, relative to a service plan for the device, by network, relative to network busy state, time based criteria, and/or other criteria/measures). In some embodiments, a user notification includes a communication sent to the user (e.g., an email, SMS or other text message, voice message/call, and/or other electronic form of communication). In some embodiments, the communication sent to the user includes network service usage information, network capacity controlled service usage related information, and/or an instruction to log into a web page or send a communication for more information (e.g., regarding an information update and/or alert or warning message, such as related to network service usage and/or charging for network service usage).

In some embodiments, a notification (e.g., a user or network service cloud notification) is generated based on an aggregate service activity reports usage (e.g., allows network provider to generate user notifications and/or to notify application provider/service activity provider). In some embodiments, a notification (e.g., a user or network service cloud notification) is generated based on a publishing of an updated/new network capacity controlled services list based on an aggregate monitored activity (e.g., based on a service plan, velocity, sockets opening frequency/rate (e.g., messaging layer behavior), total data usage, peak busy time usage to formulate or update black list for monitoring, notifying, and/or controlling, which can be applied to one, multiple, group, or all devices). In some embodiments, a notification (e.g., a user or network service cloud notification) is generated based on data usage trends for particular device relative to an associated service plan and/or other comparable devices or data usage thresholds/statistical based data usage measures.

In some embodiments an application is actually composed of several component applications, processes or functions. Examples of this include but are not limited to: the components of a Java application JAR file; applications that use OS functions; applications that use a proxy service function; applications, functions or processes that coordinate with one another to implement a composite process, function or application; and OS process functions that support an application or overall OS function. In such embodiments it is important to be able to categorize all applications, functions and processes on a device that contribute to the service usage of a service activity so that the service activity can be monitored for service usage, have the service usage accounted for, implement the appropriate user notification when one or more service activity components attempts to start or use the network, implement the appropriate user notification when one or more service activity components reaches a pre-determined service usage level that requires user notification, and implement the appropriate background service or network protection service usage controls as specified herein ((including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein). In the case of service activity components that belong exclusively to one aggregate service activity (e.g., an application, application JAR file or OS function), this may be accomplished by including each of the component service activities on a list that identifies the service activity components that belong to the aggregate service activity, and then monitoring, possibly controlling and providing user notifications based on the aggregate or component behavior of each service activity in accordance with the policies specified for the aggregate service activity. For example, it is necessary to group all application launch behavior and/or network access behavior under the monitoring, launch, notification, accounting and background service controls or network protection service controls (or other background or network protection service policies as specified herein) in accordance with the background service or network protection service policies for the aggregate application that the JAR file supports. As another example, if an OS network synch or update function utilizes various software components or processes to implement the network synch or update function, then each of the software components or process must be monitored and aggregated under the background service policies or network protection service policies for the aggregate OS synch or update function.

In some embodiments, this ability to group usage for a related set of service activity components dedicated to an aggregate service activity as described herein is used to improve usage reporting of service activities to a service controller for the purpose of statistically identifying service activities that are candidates for background service policy controls or network protections service policy controls.

In some cases, multiple applications, processes, functions, OS services or other service activities can utilize a common set of component software applications, processes, functions or OS services. In such cases, in order to implement background service policies and/or network protection service policies for service activity monitoring and accounting, service activity launch control, user notification, or network access control as described herein, it is necessary to associate the specific network access data or information flows to and from the common component software applications, processes or functions that belong to the specific initiating application, process, function or other service activity that is to be managed according to a background service or network protection service policy set. In what follows, a specific set of examples are provided on how to map common component service activity for a set of common OS functions referred to as proxy service functions to a specific application, process, function, OS service or other service activity for the purpose of implementing a background service policy set or a network protection service policy set as described herein. Once these examples are reviewed, it will be obvious to one of ordinary skill in the art how to apply similar mapping of service activity for a common set of components to a service activity that is to be managed in accordance with a background service policy set or a network protection service policy set as described herein.

In some embodiments, this ability to group usage for a common set of service activity components as described herein is used to improve usage reporting of service activities to a service controller for the purpose of statistically identifying service activities that are candidates for background service policy controls or network protections service policy controls.

In some embodiments, a proxy network service manager refers to an intermediary data flow function in a device operating system that sits on a data path between a device application and a device networking stack interface to provide a level of network service abstraction from the network stack interface, a higher level service function above the network stack interface, enhanced or special traffic processing functions, media service transfer management, file download service, HTTP proxy service functions, QoS differentiation, or other similar or related higher level traffic processing. Example Proxy Service Managers include the following: media service manager (e.g., android media service library function), email service manger, DNS function, software download service manager, media download manager (e.g., audio player, streaming media player, movie downloader, media service OS function, etc.), data download service manager, Android "media" library function, Android.net library function, Jave.net library function, Apache library function, other similar software/library functions or services in other device operating systems, SMTP/IMAP/POP proxy, HTTP proxy, IM proxy, VPN service manager, SSL proxy, etc. Herein these alternative network access data flows that are initiated by an application are termed application proxy service flows. In such embodiments an app can sometimes simply requests a network access service activity from an OS component such as a proxy service component rather then directly accessing the network. In such embodiments, in order to implement background service controls or user notification of application service usage, it is necessary to monitor the application proxy service flows, classify them as being initiated by or belonging to a particular application or service activity, and implement the proper background service classifications, user notifications, application process launch intercept, background service accounting, and background service usage restrictions as described herein in accordance with the policies intended for the initiating application or service activity. This is accomplished by inserting service usage monitors that allow a mapping of (i) the initiating application identifier (e.g., app name, app fingerprint, application identification tag, application process number, application credential, or other secure or non-secure application or process identifier) to (ii) the request to the proxy service and subsequently to (iii) the network service flows between the proxy service and the network elements that service the information communications. Once this mapping is accomplished, the service usage flows of the proxy service can then be accounted back to the initiating application, device software process or other service activity, the proper policies can then be applied to each service usage flow for user notification, service activity launch control, service activity background accounting (including variable charge rating dependent on background service state and/or sponsored service charging), service activity background service controls or network usage restrictions as described herein (including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein).

In some embodiments, this ability to track service usage for an service activity through a proxy service as described herein is used to improve usage reporting of service activities to a service controller for the purpose of statistically identifying service activities that are candidates for background service policy controls or network protections service policy controls.

In some embodiments, the various design techniques described herein that allow for monitoring, accounting for and/or implementing service policy for component service activities that belong to an aggregate service activity can be designed into the OS itself. For example, in certain current mobile OS implementations (e.g., Android, iPhone, Blackberry, etc.) there are some applications available in the market that allow a user to get an estimate for how much data a certain subset of applications are consuming on a wireless service provider network, but it is not possible for the user or application to get an indication of the service usage for certain OS functions, whereas the embodiments disclosed herein will allow for this. As another example, in certain current mobile OS implementations it is not possible to associate proxy service usage (e.g., media download and media streaming proxy library software functions) with the specific applications that use the proxy service, so while the user can be informed of generic common OS functions or proxy services (e.g., in the case of Android: "media service", "media", "gallery", "Google service framework" and other generic common OS software library functions or proxy services), there is no way for the user to determine what applications widgets or other service activities are actually generating this common service function usage, whereas the invention described herein permits the user full visibility on such usage monitoring examples. Furthermore, if the OS is retrofitted with the intercept and policy implementation functions can be designed into the activity manager, broadcast intent manger, media service manager, service manager, or other application or service activity management function in the Android OS. One or ordinary skill in the art will recognize that similarly, the various design techniques described herein that allow for intercepting a service activity intention to launch, and applying a background service policy set or a network protection service policy set can be designed into application launch management functions in the iPhone OS, windows mobile OS, windows PC OS, Blackberry OS, Palm OS, and other OS designs.

Figure 1:
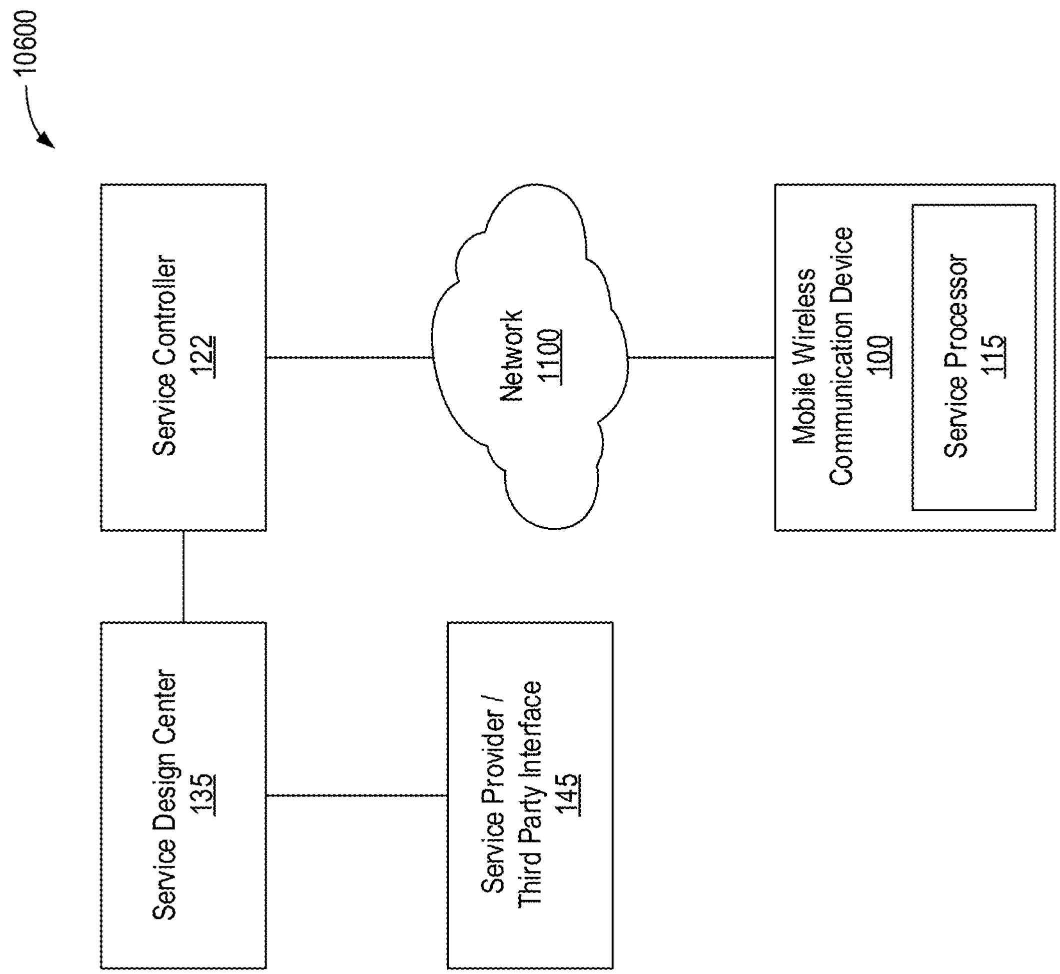
FIG. 1 illustrates a representative system of interconnected network elements communicatively coupled to a mobile wireless communication device in accordance with some embodiments.

FIG. 1 illustrates a system 10600 of interconnected elements including a mobile wireless communication device 100 communicatively coupled to a service controller 122 through a network 1100. The service controller 122 in turn is communicatively coupled to a service design center 135. The service design center 135 (SDC) allows a service provider or a third party to design service plans and/or service plan bundles for mobile wireless communication devices, such as voice service plans, messaging service plans, data service plans, application specific service plans, and other service plans and service plan bundles as described herein. Representative embodiments of the SDC 135 are described in detail in related documents, including U.S. patent application Ser. No. 13/248,025, entitled "Service Design Center for Device Assisted Services."

As illustrated by the solid line connecting the SDC 135 and the service controller 122, the SDC 135 communicates with the service controller 122, which is a network element that is generally located within the service-provider-controlled part of a wireless access network. Representative embodiments of the service controller 122 are described in detail in related documents, including U.S. Pat. No. 8,023,425, entitled "Verifiable Service Billing for Intermediate Networking Devices." In some embodiments, the SDC 135 sends service plan information to the service controller 122, or the service controller 122 obtains service plan information from the SDC 135. The service controller 122 communicates over the wireless access network with a mobile wireless communication device 100, as illustrated by the solid lines in FIG. 1. In some embodiments, the service controller 122 sends information about available service plans to a service processor 115 on the mobile wireless communication device 100, and the service processor 115 coordinates the presentation of service plan information to a user of the mobile wireless communication device 100. The service processor 115 and its functions are described in detail in related documents, including U.S. Pat. No. 8,023,425, entitled "Verifiable Service Billing for Intermediate Networking Devices." In some embodiments, the service processor 115 obtains information about the service plans from the service controller 122 or from another network element. In some embodiments, using the SDC 135, the service provider can specify various aspects of how the information entered in the SDC 135 is displayed or presented on a mobile wireless communication device 100.

In some embodiments, the mobile wireless communication device 100 includes a user interface device component for communicating with user interface devices (e.g., keyboards, displays and/or other interface devices) and other input/output (I/O) device components for communicating with other I/O devices. In some embodiments, user interface devices, such as keyboards, display screens, touch screens, specialized buttons or switches, speakers, and/or other user interface devices provide various interfaces for allowing one or more users to use the mobile wireless communication device 100.

In some embodiments a service provider (carrier) designs a suite of service plans using the service design center 135, and a service controller 122 or another network element communicates at least one of the service plans (or a selected subset of service plans) to the mobile wireless communication device, or the mobile wireless communication device otherwise obtains the one or more service plans from a network element. Likewise, in some embodiments, the service provider (or carrier) establishes (e.g., using one or more embodiments disclosed in U.S. Patent Application No. 61/472,606) how the one or more service plans will be presented through a user interface of the mobile wireless communication device 100 (for example, by using the SDC 135 or another network based device management system), and the mobile wireless communication device 100 is configured to present the one or more service plans as specified by the service provider (carrier) to the user of the mobile wireless communication device 100.

In some embodiments, device based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using Internet Protocol Detail Records (IPDRs, also sometimes and interchangeably referred to herein as Charging Data Records or CDRs), (e.g., using the device ID/device number for the device 100 to determine if the device 100 has been used in a manner that is out of plan for the service plan associated with the device 100, such as based on the amount of data usage exceeding the service plan's service data usage limits, out of plan/unauthorized access to certain websites, and/or out of plan/unauthorized transactions). In some embodiments, service data usage of the ambient activated device 100 is verified by setting a maximum data rate in a policy control agent and if/when it is determined that the device 100 is exceeding a specified data rate/data usage, then the service data usage is throttled accordingly. In some embodiments, various other verification approaches are used for ambient activation purposes.

In some embodiments, a billing agent in the device 100 detects and reports service billing events. In some embodiments, the billing agent plays a key role in transaction billing. In some embodiments, the billing agent performs one or more of the following functions: provides the user with service plan options, accepts service plan selections, provides options on service usage notification policies, accepts user preference specifications on service usage notification policies, provides notification on service usage levels, provides alerts when service usage threatens to go over plan limits or to generate excess cost, provides options on service usage control policy, accepts choices on service usage control policy, informs a policy control agent of user preference on service usage control policy, provides billing transaction options and/or accepts billing transaction choices. In some embodiments, the billing agent interacts with transaction servers (e.g., an open content transaction partner sites) to conduct ecommerce transactions with central billing.

Figure 2:
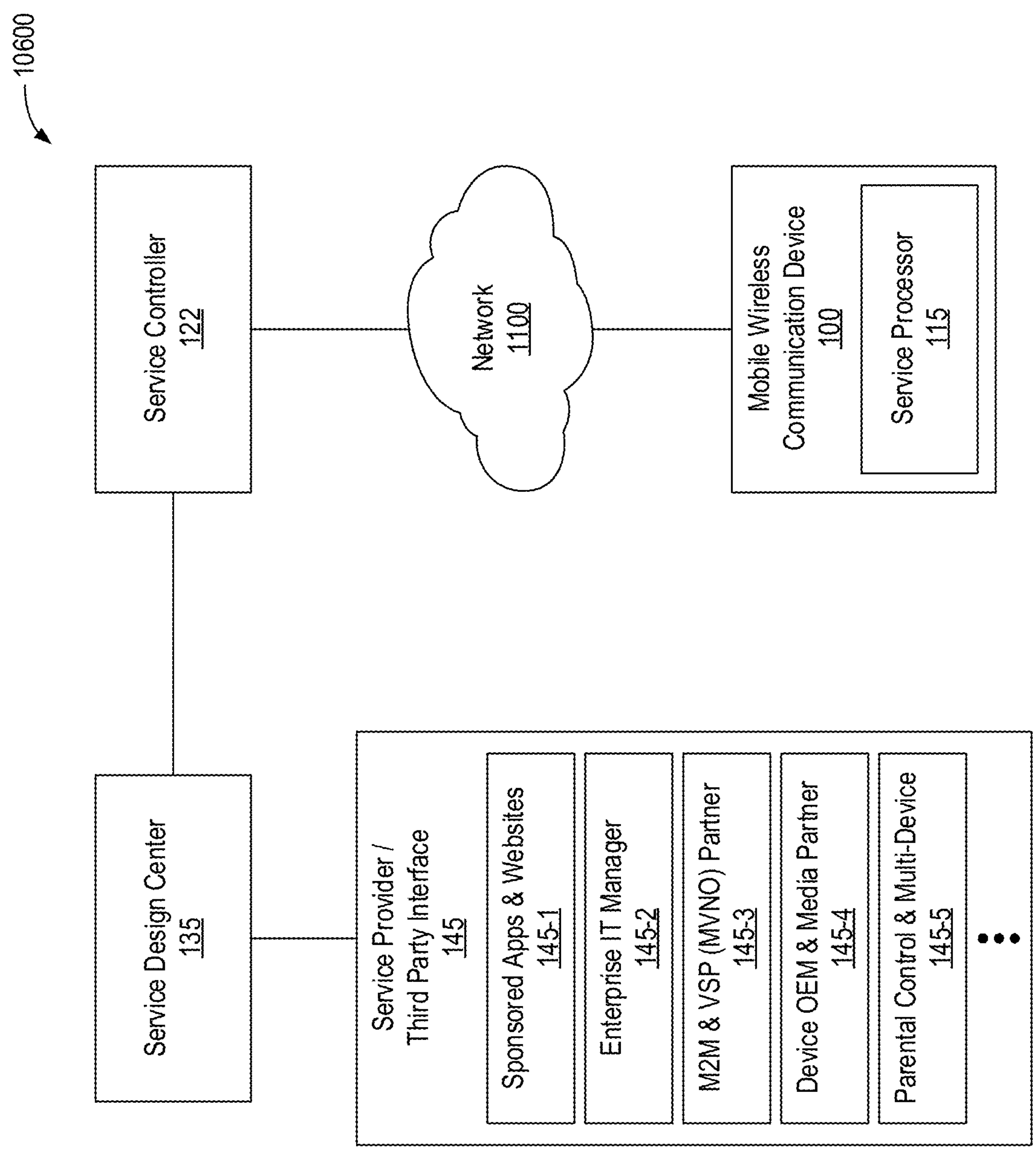
FIG. 2 illustrates a representative set of sandbox interfaces of a service design center to provide external design interfaces for a service provider and/or third parties in accordance with some embodiments.

FIG. 2 illustrates a representative set of "sandbox" interfaces of the service provider/third-party interface 145 of the service design center 135 to provide external design interfaces for a service provider and/or third parties. In some embodiments, the service design center 135 provides for service plan design and service plan policy management. In some embodiments, the service design center 135 provides for the design of information presented through a user interface of the mobile wireless communication device 100, e.g., during service selection, service offer, and other service management processes. In some embodiments, the service design center 135 provides for a user of the service design center 135 (e.g., a network operator administrator, a mobile virtual network operator administrator, or a third-party service partner administrator) to design a set of service plans and associate the service plans with service policies. In some embodiments, the service policies determine, at least in part, rules for enforcing the service plans and management of services provided to one or more mobile wireless communication devices 100. In some embodiments, the service design center is communicatively coupled to servers and/or databases in the wireless network. In some embodiments, the servers and/or databases provide for storage, distribution, and control of service policies to manage and control services configured through the service design center 135.

In some embodiments, one or more sandbox interfaces of the service design center 135 provide for service design and management with access to limited information and restricted controls to which the associated third party and/or service provider has permission and/or requires for services of interest to them. In some embodiments, multiple "sandbox" interfaces are available for different types of service provider and/or third parties. In some embodiments, the service provider/third-party interface 145 includes a sandbox interface 145-1 for sponsored applications and websites to be designed and managed by a sponsor, servicer provider or other third-party service partner. In some embodiments, the service provider/third-party interface 145 includes a sandbox interface 145-2 for an enterprise information technology (IT) administrator to manage communication services, e.g., service plans and device groups, for an enterprise business. In some embodiments, the service provider/third-party interface 145 includes a sandbox interface 145-3 for a machine-to-machine and/or a VSP/MVNO third-party service partner to design and manage services for mobile wireless communication devices 100. In some embodiments, the service provider/third-party interface 145 includes a sandbox interface 145-4 for a device original equipment manufacturer (OEM) and/or a media third-party service provider to design and manage communication services and device features and capabilities, e.g., user interface display properties, device applications, associated services and applications, media distribution, and other third-party service provider functions. In some embodiments, the service provider/third-party interface 145 includes a sandbox interface 145-5 for device group management and control, e.g., for a parent to manage capabilities and services of devices for a family unit. As would be understood by a person of ordinary skill, additional sandbox interfaces can be included in the service provider/third-party interface 145 illustrated in FIG. 2, and the sandboxes illustrated are representative but not limiting.

In some embodiments, the service design center 135 and the service design sandboxes share design and/or provisioning responsibilities. In some embodiments, the service design center 135 and the service design sandboxes can be hierarchically organized. In some embodiments, the service design center 135 delegates certain roles to a service design sandbox and, in some embodiments, retains an oversight capability for agents of the service design center 135. In some embodiments, a service design sandbox can be given the ability to impact policy control to a subset of subscriber groups of a network service plan provisioning system. In some embodiments, the network service plan provisioning system can be referred to as "distributed".

In some embodiments, entities that might desire to include one or more service design sandboxes in their networks include enterprises with employees that consume network services, MVNOs, application developers, gifters, and community-based organizations. In some embodiments, e.g., enterprises with employees that consume network services, a service design sandbox can enable fine-tuned control over traffic control and charging policy (as well as notification policy). Assume that XYZ company controls a service design sandbox. XYZ company can create a service plan specific to XYZ company network services on the XYZ company intranet, which will be referred to as the XYZ plan. Specifically, the XYZ company can sponsor the XYZ company network services on the XYZ company intranet for XYZ company employees. A paid plan offered by a carrier that controls the service design center 135, for example, can still be available for XYZ company employees that are using other network services (or XYZ company could partially sponsor a subset of the other network services). The XYZ plan could also include a component that prevents XYZ company employees from accessing certain restricted sites through the XYZ company intranet and has notification policy associated with the attempted access. Continuing the example, an agent (e.g., IT manager) of the XYZ company can define subscriber groups that comprise XYZ company members and assign different service plans (e.g., different traffic control, notification, or charging policies) to the different XYZ company subscriber groups. For example, employees could get limited usage, managers might get access to more usage and additional services (e.g., email), members of the sales team might get better roaming services, and a CEO might get everything in the carrier's service plan offering, perhaps with XYZ company as a sponsor for all services. Advantageously, split billing is possible using these techniques, such that XYZ company can pay for sponsored services and XYZ employees can pay for unsponsored services (or for a portion of subsidized services).

In some embodiments, an MVNO can purchase bulk data from a carrier and offer plans based on the bulk. Advantageously for MVNOs, a service design sandbox enables control over subscribers based on various specified criteria, e.g., network state. Indeed, for all subscribers "owned" by the MVNO, a great deal of policy control can be applied (dependent upon the amount of control a carrier is willing to give to the MVNO). Other providers that can benefit from the sandbox model include mobile virtual network enablers (MVNEs), mobile shared spectrum enablers (MSSEs), and service providers (SPs).

In some embodiments, e.g., for application developers, a service design sandbox can specify applications that can be covered by a service plan. In some embodiments, the service design center 135 may be responsible for creating the underlying control mechanism. In some embodiments, a company like amazon.com can be given some control over sponsorship settings for applications associated with amazon.com.

In some embodiments, e.g., for "gifters," a service design sandbox can enable specification of a sponsorship amount that is donated to some other organization, such as a non-profit organization. In some embodiments, e.g., for community-based organizations, a service design sandbox can specify free access for a particular network service. For example, the San Francisco Giants organization could have a plan group for fans that grants free access to the official site of the San Francisco Giants. As another example, AAA could sponsor access to services for AAA members.

In some embodiments, agents of the network service plan provisioning system can be given roles that grant access to certain aspects of service design and/or provisioning. In some embodiments, agents at the service design center 135 can have a role system administrator, super user, or the like, while agents of a service design sandbox can have roles such as enterprise IT manager, MVNO administrator, or the like. In some embodiments, agents of a service design sandbox can subdivide roles further, if applicable, depending upon implementation.

In some embodiments, the service design center 135 is connected to the Internet and is coupled to the service controller 122. In some embodiments, the service design center 135 can set up boundaries for "sandboxed" service and allow customizations for partner sets; lock in master tariffs based on negotiated rates for a given partner set or individual partner; create custom log-ins for different partner sets or individual partners; and carry out any applicable techniques appropriate for a service design system. In some embodiments, the service design center 135 allows authorized agents to manage service plan components and subscribers. In some embodiments, the agents can manage groups (collections of subscribers, SIMs, or devices) to create groups and group directories, assign an identity hierarchy for the operator, associated identifiers with groups, etc. In some embodiments, the agents can manage service plans (including one or more components) including plan name and description, groups using the plan, service plan components, service activities, network busy states and connection types, charging policies (including usage limits, thresholds, frequency, time, and payment type), notifications (e.g., for plan usage thresholds, plan cap, expiration, block, overage, no capable plan, etc.), and events (e.g., for plan usage thresholds, plan cap, expiration, block, overage, etc.). In some embodiments, the agents can manage service components (logical grouping of one or more filters and rules), including component name and description, plans using the component, network busy states and connection types, charging policies (including usage limits, thresholds, frequency, time and payment type), notifications (e.g., for plan usage thresholds, plan cap, expiration, block, overage, no capable plan, etc.), and events (e.g., for plan usage thresholds, plan cap, expiration, block, overage, etc.). In some embodiments, the agents can manage service activities (e.g., activity name, plans using the activity, components using the activity, filter name and description, and filter type details (e.g., operating system, application, remote, port, protocol, etc.). The agents can manage service group plans including assign and publish plan group, create activation workflow screens, create buy workflow screens. In some embodiments, the agents can receive, manage, customize, or generate reports for, for example, usage reports by destination for a subscriber over a period of time, usage reports by destination for a range of subscribers over a period of time (top destinations).

In some embodiments, a sandbox of the service design center 135 is coupled to the service design center 135 in an applicable convenient fashion. In some embodiments, the service design center 135 sandbox can provide a secure login environment in which a subset of SDC service management controls can be designed and/or used; enable selection from bounded service customization options for one or more device groups under management; customize device UI branding; access real time analytics for service usage, application usage, location, etc.; set up service usage alerts, fraud alerts, theft alerts, etc.; and carry out any applicable techniques appropriate for a service design system that have been delegated to the sandboxed environment.

The service provider/third-party interface 145 of the service design center 135, in some embodiments, is equivalent to at least a portion of capabilities of a virtual service provider (VSP) workstation or terminal interface. In some embodiments, virtual service provider (VSP) capabilities include making available to a third-party service partner one or more of the following: (1) device group definition, control and security, (2) provisioning definition and execution, (3) activation tracking service (ATS) owner, (4) service profile definitions, (5) activation and ambient service definition, (6) billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

Application Promotion and Sponsorship

In some embodiments, a service provider/network operator/carrier provides means for a third party to define information that is then provided to one or more mobile wireless communication device service processors 115. For example, in some embodiments, the network operator provides a service provider/third-party interface 145, shown in FIG. 1 as communicatively coupled to the SDC 135, that allows a third party to enter information for the purpose of sponsoring an application or a service. In some embodiments, the service provider/third-party interface 145 is a web interface. In some embodiments, the service provider/third-party interface 145 is part of the SDC 135. In some embodiments, the service provider/third-party interface 145 is a separate interface that is communicatively coupled to the SDC 135 (as shown in FIG. 1). In some embodiments, the service provider/third-party interface 145 is not communicatively coupled to the SDC 135.

In some embodiments, the third party (e.g., the sponsor) uses the service provider/third-party interface 145 to perform one or more of the following tasks: (1) establish a service account, (2) define an application or a service that the third party wishes to sponsor, (3) define the parameters associated with the sponsorship.

In some embodiments, establishing a service account comprises entering payment information, such as a credit card. In some embodiments, establishing a service account comprises entering information that identifies the third party (sponsor).

In some embodiments, defining the application or service that the third party wishes to sponsor comprises selecting the application or service from a menu, such as a drop down menu or from a graphical display. In some embodiments, defining the application or service that the third party wishes to sponsor comprises entering information into the interface (e.g., typing characters). In some embodiments, defining the application or service that the third party wishes to sponsor comprises uploading software through the interface.

In some embodiments, defining the parameters associated with the sponsorship comprises establishing one or more of the following: a device group for which to sponsor a service or application (e.g., a list of device or subscriber credentials authorized to take advantage of the sponsored service or application), a sponsorship period (e.g., a start time and an end time, such as Friday from 6:00 P.M. to 7:00 P.M.), a time period (e.g., 30 minutes of usage starting at any time), an amount or percentage of data usage (e.g., 2 MB or 50% of data usage during a sponsorship period), a cost of data usage (e.g., $1.00 of data usage), roaming constraints (e.g., no sponsorship if the device is roaming, but sponsorship if the device is on a home network), network constraints (e.g., different sponsorship parameters for WiFI networks versus for cellular networks, sponsorship parameters dependent on network type (e.g., 3G, 4G, Wi-Fi, roaming, etc.), expiration (e.g., offer sponsorship for the next seven days), device geography (e.g., sponsor a service or application for devices in a particular geographical region, etc.) and any other parameter that could define a sponsored application or service.

In some embodiments, the service provider/third-party interface 145 allows the third party to specify information associated with service launch, such as the service launch object itself, the service launch object discovery level, etc. In some embodiments, the interface can present information to the sponsor about costs associated with particular service launch object placement or discovery levels, thus enabling the sponsor to select the parameters that fit budgetary constraints.

In some embodiments, the service provider/third-party interface 145 allows the third party to enter information about notifications associated with the sponsored application or service. In some embodiments, the third party enters conditions that will cause a notification (e.g., launch of the service or application results in the presentation of a notification). In some embodiments, the third party enters information that defines the content of the notification (e.g., information about the sponsor, the application, or the service, or a service offer, or an advertisement, etc.). In some embodiments, the third party selects from a pre-fabricated set of notification options. In some embodiments, the third party may create or modify customized content for notification messages.

In some embodiments, the service provider/third-party interface 145 allows the third party to enter information about a revenue share associated with a particular application or service. In some embodiments, the service provider/third-party interface 145 allows the third party to enter conditions under which the sponsor will subsidize or pay for data access. For example, in some embodiments the sponsor enters information indicating that the sponsor will pay for data access associated with a particular application if a subscriber exhibits particular behavior (e.g., purchases a product or service using the particular application or another application, clicks through some number of advertisements, activates a service plan under certain conditions, etc.).

In some embodiments, the service provider/third-party interface 145 allows the third party to access data associated with usage of the sponsored service or application. For example, in some embodiments, the sponsor can access "analytics" the provide information about engagement, response metrics, upsell statistics or numbers, etc.

In some embodiments, the service provider/third-party interface 145 allows the sponsor to specify a sponsorship level selected from a set of two or more sponsorship levels. In some embodiments, the sponsorship levels may include one or more of the following: a base level, a featured level, a premium level, a banner ad level, and a promotional messaging level.

In some embodiments, selection of the base sponsorship level results in placement of a service launch object (e.g., an application icon) in a "standard" device catalog. In some embodiments, the service launch object is customizable. In some embodiments, selection of the base sponsorship level allows the sponsor to specify or configure user notifications (e.g., upsell messages, service offers, advertisements, etc.).

Figure 86:
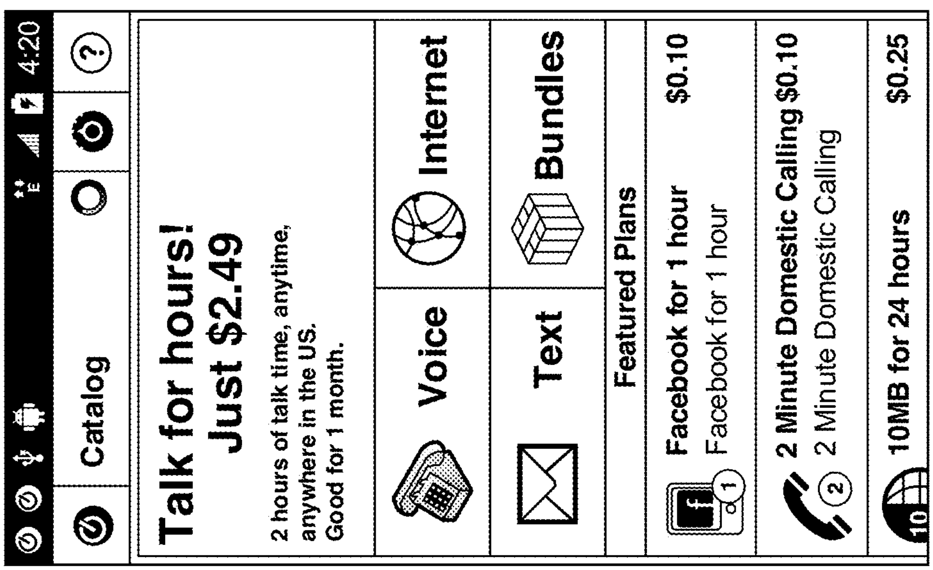
FIG. 86 illustrates a representative screen displayed when a user selects a "Catalogue" region of FIG. 67 in accordance with some embodiments.

In some embodiments, selection of the featured sponsorship level results in placement of a service launch object (e.g., an application icon) in both a "standard" device catalog and in a catalog of featured plans. FIG. 86 illustrates an embodiment with a listing of featured plans displayed as part of a screen 10470. In some embodiments, the featured plans have a placement on the device user interface that increases the likelihood of a device user seeing and selecting them. In some embodiments, the featured plans appear in a list through which a user can scroll to view featured plans. In some embodiments, the service launch object is customizable. In some embodiments, selection of the featured sponsorship level allows the sponsor to specify or configure user notifications (e.g., upsell messages, service offers, advertisements, etc.). In some embodiments, the featured sponsorship level is more expensive than the base sponsorship level.

In some embodiments, selection of the premium sponsorship level results in placement of a service launch object (e.g., an application icon) in a "standard" device catalog and in a catalog of premium plans. In some embodiments, the premium plans have a placement on the device user interface that increases the likelihood of a device user seeing and selecting them. In some embodiments, premium plans appear in the same catalog as featured plans, but premium plans appear first in a list (e.g., the premium plans are visible on the user interface without scrolling, whereas the featured plans are viewable only if the user scrolls down). In the example embodiment shown in FIG. 86, the visible plans under the "Featured Plans" label could be premium plans. In some embodiments, the catalog of premium plans is placed on the user interface in a position in which it is presumed to be more noticeable to a user than the position of featured plans or the "standard" catalog. In some embodiments, the catalog of premium plans is given more space on a user interface display than other content presented on the device user interface. In some embodiments, the service launch object associated with the premium sponsorship level is customizable. In some embodiments, selection of the premium sponsorship level allows the sponsor to specify or configure user notifications (e.g., upsell messages, service offers, advertisements, etc.). In some embodiments, the premium sponsorship level is more expensive than the featured and base sponsorship levels.

In some embodiments, the banner ad sponsorship level results in placement of a service launch object (e.g., an application icon) in a banner region of the device user interface. In some embodiments, the banner region has a placement on the device user interface that increases the likelihood of a device user seeing and selecting an item from the banner region. FIG. 86 illustrates the banner region above the four buttons labeled "Voice," "Internet," "Text," and "Bundles." In some embodiments, the banner region is placed on the user interface in a position in which it is presumed to be more noticeable to a user than the position of premium plans, featured plans, or the "standard" catalog. In some embodiments, the banner region is given more space on a user interface display than other content presented on the device user interface. In some embodiments, the service launch object associated with the sponsored service or application is customizable. In some embodiments, selection of the banner ad sponsorship level allows the sponsor to specify or configure user notifications (e.g., upsell messages, service offers, advertisements, etc.). In some embodiments, the banner region of the device user interface presents a static display. In some embodiments, the banner region rotates through a set of applications or services or offers associated with the banner ad sponsorship level. In some embodiments, the banner ad sponsorship level is more expensive than the premium, featured, and base sponsorship levels.

In some embodiments, the promotional messaging sponsorship level results in placement of a service launch object (e.g., an application icon) as a promotional message presented on the device user interface. In some embodiments, the promotional message is presented in the foreground of the device user interface. In some embodiments, the promotional message is presented to each mobile wireless communication device 100 in a particular subscriber group. In some embodiments, the promotional message prompts the user for a response. In some embodiments, the promotional messaging sponsorship level is more expensive than the banner ad, premium, featured, and base sponsorship levels.

Although the foregoing text described the service provider/third-party interface 145 as accessible to the third party (sponsor), it should be understood that the carrier/service provider/network operator can also configure partially or fully subsidized services or applications through the service provider/third-party interface 145 or directly through the SDC 135.

In some embodiments, the network operator/carrier/service provider uses the service provider/third-party interface 145 to provide information to prospective application or service sponsors. In some embodiments, the sponsor can learn about the levels of sponsorship, service discovery, pricing, etc. In some embodiments, the sponsor selects a sponsorship package from a pre-configured package. In some embodiments, the pre-configured package has been pre-configured by the network operator/carrier/service provider. In some embodiments, the pre-configured package has been configured by the sponsor or by another sponsor (e.g., a previous sponsor of the same or different application or service). In some embodiments, the sponsor selects a level of promotion (e.g., base, featured, premium, banner ads, promotional messaging, etc.). In some embodiments, the sponsor selects sponsorship parameters (e.g., amount of data to sponsor, amount of time to sponsor, roaming settings, etc.). In some embodiments, after configuring the sponsored application or service, the sponsor signs a contract. In some embodiments, the contract is electronic. In some embodiments, the contract is executed through the interface.

In some embodiments, after a sponsor has configured the sponsored application or service, the network operator/carrier/service provider enters information associated with the sponsored application or service into the service design center 135. In some embodiments, the information associated with the sponsored application or service includes: one or more application credentials, one or more device credentials, information defining notifications, information defining service parameters, information defining promotional parameters. In some embodiments, after the network operator/carrier/service provider has entered the information into the SDC 135, the sponsor approves the information. In some embodiments, information associated with the sponsored service in the SDC 135 is published to a specified device group. In some embodiments, the selected device group is specified or configured by the sponsor.

After a sponsor has configured the sponsored service or application parameters, the service controller 122 or another network element communicates the sponsored service to a mobile wireless communication device 100, or the mobile wireless communication device 100 otherwise obtains the sponsored service from a network element.

In some embodiments, when a user launches the service object (e.g., icon, banner ad, etc.) associated with the sponsored service or application, but the mobile wireless communication device 100 does not yet have an application (e.g., the sponsored application) necessary to use the sponsored service or application, an appropriate application (e.g., the sponsored application) is downloaded to the mobile wireless communication device 100. In some embodiments, the cost associated with downloading the application is charged to the sponsor.

In some embodiments, when a user launches the service object (e.g., icon, banner ad, etc.) associated with the sponsored service or application, the user interface displays information about the sponsored application or service.

In some embodiments, when a user has used a sponsored application or service, and the sponsorship of that service or application ends, a notification is presented through the device user interface 101. In some embodiments, the notification is a service offer (e.g., an offer for a paid service plan associated with the sponsored service or application). In some embodiments, if the user responds positively to the notification (e.g., the user purchases an offered service plan), the network operator/carrier/service provider credits the sponsor for some amount of sponsored access. In some embodiments, the credit is determined based on a revenue share agreement.

In some embodiments, the sponsor pays for all data usage associated with the sponsored application or service in order to maximize traffic using the application or service. For example, a bank may decide to sponsor all data usage associated with a banking application, or an insurance company may decide to sponsor all data usage associated with visits to the insurance company's website.

In some embodiments, the sponsor pays for only a portion of the data usage associated with the sponsored application or service in order to prevent excessive costs to the sponsor. In some embodiments, the sponsor pays for all data usage during a particular time period. Using such partial-sponsorship models, for example, an application developer may attempt to expose users to their applications in the hope that the users will like or need those applications and thereafter pay for data usage associated with those applications. As another example, a network operator/carrier/service provider may use a partial sponsorship model to encourage subscribers to try using data at no cost to them, the hope being that subscribers will then purchase a data service plan that will result in profit to the network operator.

In some embodiments, a free version of an application is offered along with free access for a limited time. In some embodiments, after the initial free period, the user is prompted to buy a paid version of the application or a paid data plan. Using such a "freemium" model, application developers can increase sales, and operators can improve revenues from subscriber uptake of data plans.

In some embodiments, a service plan or an application is offered to the user of a mobile wireless communication device 100 that permits a limited time or service amount usage of the service plan or application. In some embodiments, the service plan or application offer is provided in a notification message, e.g., through a UI of the device. In some embodiments, a user of the mobile wireless communication device 100 enters one or more credentials, e.g., a device credential, a user credential, and/or an account credential in order to "sign up" for the offered service plan or application. In some embodiments, the user is required to provide a form of credit information, e.g., a credit card or a user credential that points to a service account that includes credit information, before the user can access and use the service plan or application. In some embodiments, the user supplies the user credential to a third-party service partner system, e.g., an "Apple ID" to "iTunes" or to an "Application Store" or to an "iCloud" account. In some embodiments, service usage for the service plan or application by the mobile wireless communication device 100 (and/or a user thereof) is accounted by a network system. In some embodiments, when the service plan expires or an allocated service usage amount for the service plan is consumed, a notification message (e.g., a marketing interceptor) is provided to the user of the mobile wireless communication device 100. In some embodiments, the notification message provides for selecting to purchase, replace, upgrade or continue use of the service plan or application. In some embodiments, the notification message provides for selecting a pre-paid or post-paid service plan or application in place of the limited "free" service plan or application. In some embodiments, the user of the mobile wireless communication device 100 is not required to provide credit information to use the limited "free" service plan or application. In some embodiments, the user of the mobile wireless communication device 100 is required to provide credit information to purchase and/or subscribe to a service plan or application offered by the notification message when the limited "free" service plan or application expires or runs out.

In some embodiments, one or more of the mediation/reconciliation functions for device assisted billing, device generated billing events, device generated bill by account events and device generated open transaction billing events can be implemented in the service controller 122 (e.g., a billing event server) or in another function located in a billing system or elsewhere. This billing mediation server function accepts the device based billing events discussed immediately above, reformats the billing events into a format accepted and recognized by the billing system, mediates the billing event information to remove service usage billing from the user account and place it in other bill by account categories as appropriate according to the bill by account mediation rules, adds other billing events for service usage or transactions to the user account as appropriate according to the device based billing rules, and then applies the information to the billing information the user account to correct or update the account.

For example, a bill by account can allow for a website provider, such as Google or Yahoo, to pay for or offset certain account usage for web browsing, web based searching, web based email, or any other web based or other service usage activities, which may also be based (in whole or in part) on the activities performed by the user on such transactional services (e.g., based on advertisement viewing/accessing or click-through activities by the user, by which an advertisement business model used by such website providers directly or indirectly supports such service account subsidies). As another example, a bill by account can allow for an advertiser to pay for or offset certain account usage for viewing and/or accessing (e.g., clicking through) a web placed advertisement or other advertisement sent via the network to the device. As yet another example, various network chatter (e.g., heartbeat related network and other network chatter related service data usage) can be assigned to a dummy account and such can be used to offset the bill and/or used for tracking the data usage for such activities for the device. In another example, service data usage for access to a transactional service, such as a multimedia content download service (e.g., music, eBook, music/video streaming, and/or movie or other multimedia content download service), or an online shopping site (e.g., Amazon, eBay or another online shopping site), can be billed to a transactional service account assigned to a transactional service partner that sponsors access to that sponsor's transactional service, thereby allowing that transactional service partner to pays for or offset (e.g., subsidize) the account usage for such activities, which may also be based (in whole or in part) on the transactions actually performed by the user on such transactional services (e.g., based on the volume/cost of the multimedia service download purchases by the user and/or online activities)

Service Plan Selection and Customization

In some embodiments, a user of the mobile wireless communication device 100 obtains information about service plans and/or service plan bundles from the service controller 122 through the network 1100. In some embodiments, the user selects among service plans and/or service plan bundles to which to subscribe for one or more wireless communication devices 100. In some embodiments, selection of service plans and/or service plan bundles occurs through a user interface of the mobile wireless communication device 100. In some embodiments, the user determines a customized service plan bundle by selecting among options for different constituent service plans to include in the customized service plan bundle. In some embodiments, the options for constituent service plans to include in the customized service plan bundle are obtained from a network element, e.g., the service controller 122. In some embodiments, summary characteristics of the customized service plan bundle are presented simultaneously to the user of the mobile wireless communication device 100 during selection of the constituent service plans for the customized service plan bundle. In some embodiments, information on service plan and/or service plan bundle promotions and subsidies are presented along with service plans and/or service plan bundles to the user of the mobile wireless communication device 100. In some embodiments, the mobile wireless communication device 100 communicates selections of one or more service plans to a network element, e.g., the service controller 122. In some embodiments, the service processor 115 in the mobile wireless communication device 100 and the service controller 122 in the wireless network negotiate a customized service plan bundle. In some embodiments, information on service usage history is provided to inform the user of the mobile wireless communication device 100 during the selection process. In some embodiments, the service controller 122 provides one or more options for service plans or service plan bundles to the user of the mobile wireless communication device 100 that match to a previous use of, present use of or attempt to access or use one or more communication services.

In some embodiments, a subscriber can acquire a mobile device and establish a master service account through the mobile device user interface (e.g., a touch screen) or through, for example, a website. FIG. 1 illustrates mobile device 100 equipped with service processor 115 in accordance with some embodiments. Service processor 115 is communicatively coupled to service controller 122 through a wireless network. Service controller 122 is communicatively coupled to network elements that facilitate the provisioning of services to mobile devices, such as billing systems (not shown). The functions and capabilities of service processor 115 and service controller 122 have been described in many other patent applications and patents, including, for example, U.S. Pat. No. 8,023,425. One of the functions of service processor 115 is to present information to a user of mobile device 100 through a user interface of mobile device 100 (e.g., a touch screen display, etc.). In some embodiments, service processor 115 also collects information from a user through the user interface. In some embodiments, service processor 115 sends some or all of the collected information, or a representation of some or all of the collected information, over a control channel to service controller 122. In some embodiments, the control channel is secured by an encryption protocol.

In some embodiments, service controller 122 is also communicatively coupled to the service design center 135. In some embodiments, the service design center 135 allows a service provider or a service provider partner entity to configure service plan and service plan bundle offerings for distribution to mobile devices such as mobile device 100. In some embodiments, the service design center 135 allows a service provider or a service provider partner entity to configure the messages, information, and screens as illustrated by multiple figures provided herein.

In some embodiments, a device agent (e.g., software such as one or more components of a service processor 115 shown in FIG. 1) installed on the mobile wireless communication device 100 is configured to communicate a request to add the mobile wireless communication device 100 to a master service account, a device group, or a multi-device (i.e., shareable) service plan or service plan bundle. In some embodiments, at least an aspect of the request is received from a network element, such as service controller 122 of FIG. 1. In some embodiments, the communications between the device agent and the network element take place over a secure communications link. In some embodiments, the secure communications link is encrypted by a transport layer security (TLS), a secure socket layer (SSL), or by other suitable encryption mechanisms or protocols.

In some embodiments, the request to be added to the master service account, device group, or multi-device service plan (bundle) includes a credential that uniquely identifies the mobile wireless communication device 100, such as a subscriber identity module, a device identifier, a phone number, an international mobile subscriber identity (IMSI), a mobile equipment identifier (MEID), or any other credential. In some embodiments, the credential comprises a secure information aspect associated with the mobile wireless communication device 100. As would be appreciated by a person having ordinary skill in the art, a credential allows a user to access network services using the mobile wireless communication device 100. A credential uniquely identifies an entity, such as a particular mobile wireless communication device 100, a particular subscriber or account-holder, a particular service account, etc. Examples of credentials include, but are not limited to, a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, any other identifying information that uniquely identifies an entity, and combinations of these. Some credentials (e.g., a SIM, a phone number, etc.) may be moved from one mobile wireless communication device 100 to another mobile wireless communication device 100, whereas other credentials are permanently associated with a mobile wireless communication device 100 (e.g., an ESN, a device identifier, etc.). This document often refers to a credential as uniquely identifying the mobile wireless communication device 100 because even a credential that can be moved from one mobile wireless communication device 100 to another mobile wireless communication device 100 can uniquely identify a particular mobile wireless communication device 100 when the credential is installed in the particular mobile wireless communication device 100 (e.g., while a SIM card is in mobile wireless communication device 100, the SIM card uniquely identifies the particular mobile wireless communication device 100 because the SIM card can only be installed in one mobile wireless communication device 100 at a time). In some embodiments, the request to be added to the master service account, device group, or multi-device service plan or service plan bundle includes information that identifies a user of the mobile wireless communication device 100.

Figure 3:
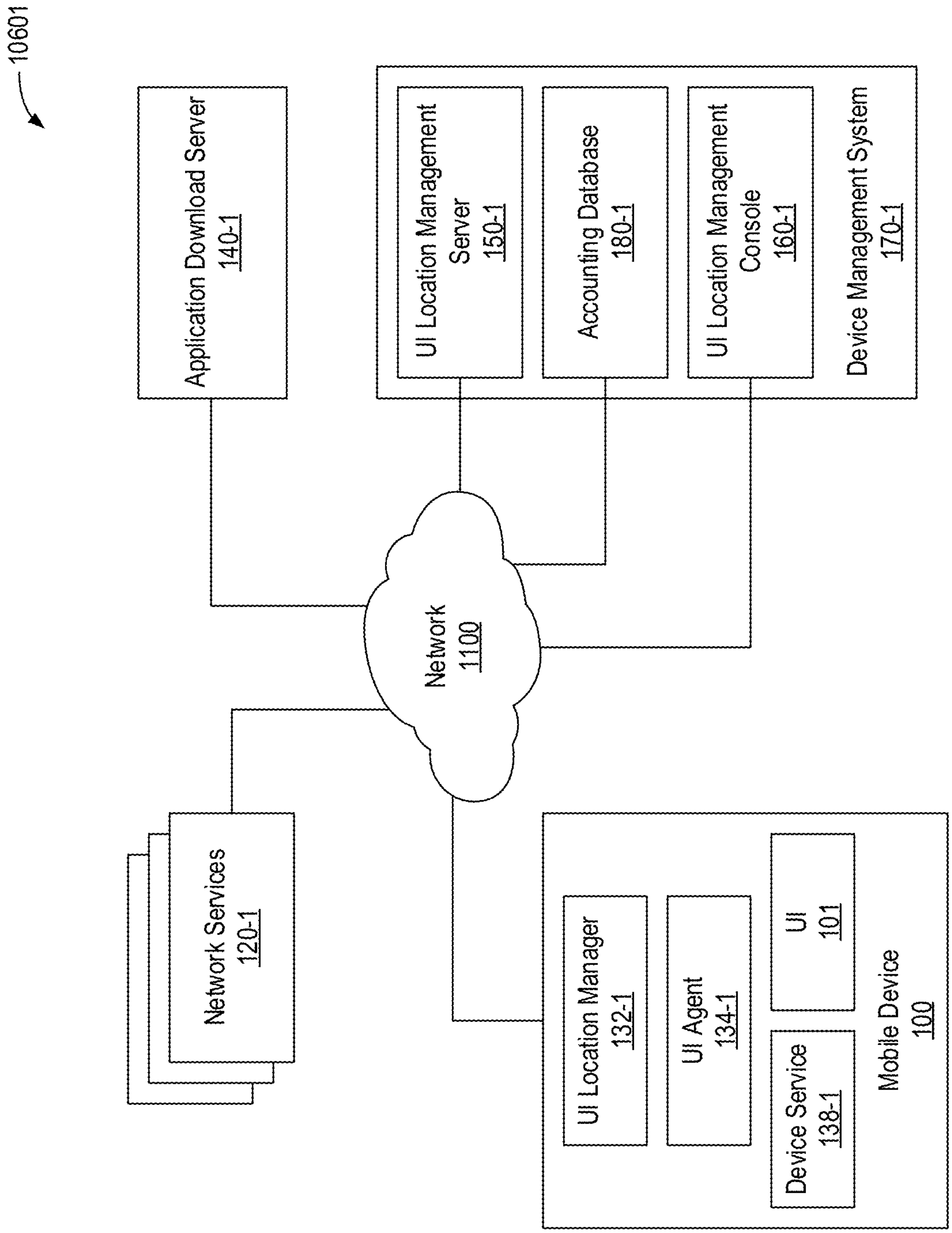
FIG. 3 illustrates a representative system for providing user interface management for mobile wireless communication devices in accordance with some embodiments.

FIG. 3 illustrates a network management system 10601, in accordance with some embodiments, including the mobile wireless communication device 100 communicatively coupled through the network 1100 to a set of network services 120-1 and to a device management system 170-1. In some embodiments, the mobile wireless communication device 100 is communicatively coupled through the network 1100 to an application download server 140-1. In some embodiments, the mobile wireless communication device 100 includes a user interface (UI) 101.

In some embodiments, the device agent initiates the request to be added to the master service account, device group, or multi-device service plan or service plan bundle based at least in part on a user input obtained through the user interface 101. In some embodiments, the mobile wireless communication device 100 includes a UI location manager 132-1, a UI agent 134-1, and a set of one or more device services 138-1. In some embodiments, the device management system 170-1 includes a UI location management server 150-1, an accounting database 180-1, and a UI location management console 160-1. In some embodiments, the device management system 170-1 determines placement of "service launch objects" and notification messages on the UI 101 of the mobile wireless communication device 100.

In some embodiments, a service provider (e.g., a wireless network operator or a third-party service provider) uses the network management system 10601 shown in FIG. 3 to manage and control information content and placement provided through the UI 101 of the mobile wireless communication device 100. In some embodiments, information content includes specific details on service plans and service plan bundles, such as availability, cost, features, promotions, subsidies, applicability, location, time frame, service usage amounts, restrictions, sharing capabilities, etc. Using the network management system 10601, in some embodiments, service providers determine visibility of pre-defined service plans, pre-defined service plan bundles, customizable service plans and customizable service plan bundles to which the user of the mobile wireless communication device 100 can subscribe. In some embodiments, the user selects, customizes and subscribes to service plans and/or service plan bundles through the UI 101 on the mobile wireless communication device 100. In some embodiments, the user shares or assigns a portion of or an entirety of a service plan or a service plan bundle among one or more different mobile wireless communication devices 100. In some embodiments, options on service plan and/or service plan bundle sharing are presented to the user of the mobile wireless communication device 100 through the UI 101. In some embodiments, service providers use the service design center 135 to define and publish pre-defined and customizable service plans or service plan bundles to users of mobile wireless communication devices 100. In some embodiments, information on service plans or service plan bundles is pushed from a network element, e.g., the service controller 122, to the mobile wireless communication device 100. In some embodiments, the user of the mobile wireless communication device 100 pulls information on service plans or service plan bundles from a network element, e.g., the service controller 122. In some embodiments, placement, formatting and content of service plan and service plan bundle information provided to the user of the mobile wireless communication device 100 and displayed on the UI 101 is determined at least in part by the device management system 170-1.

Figure 4:
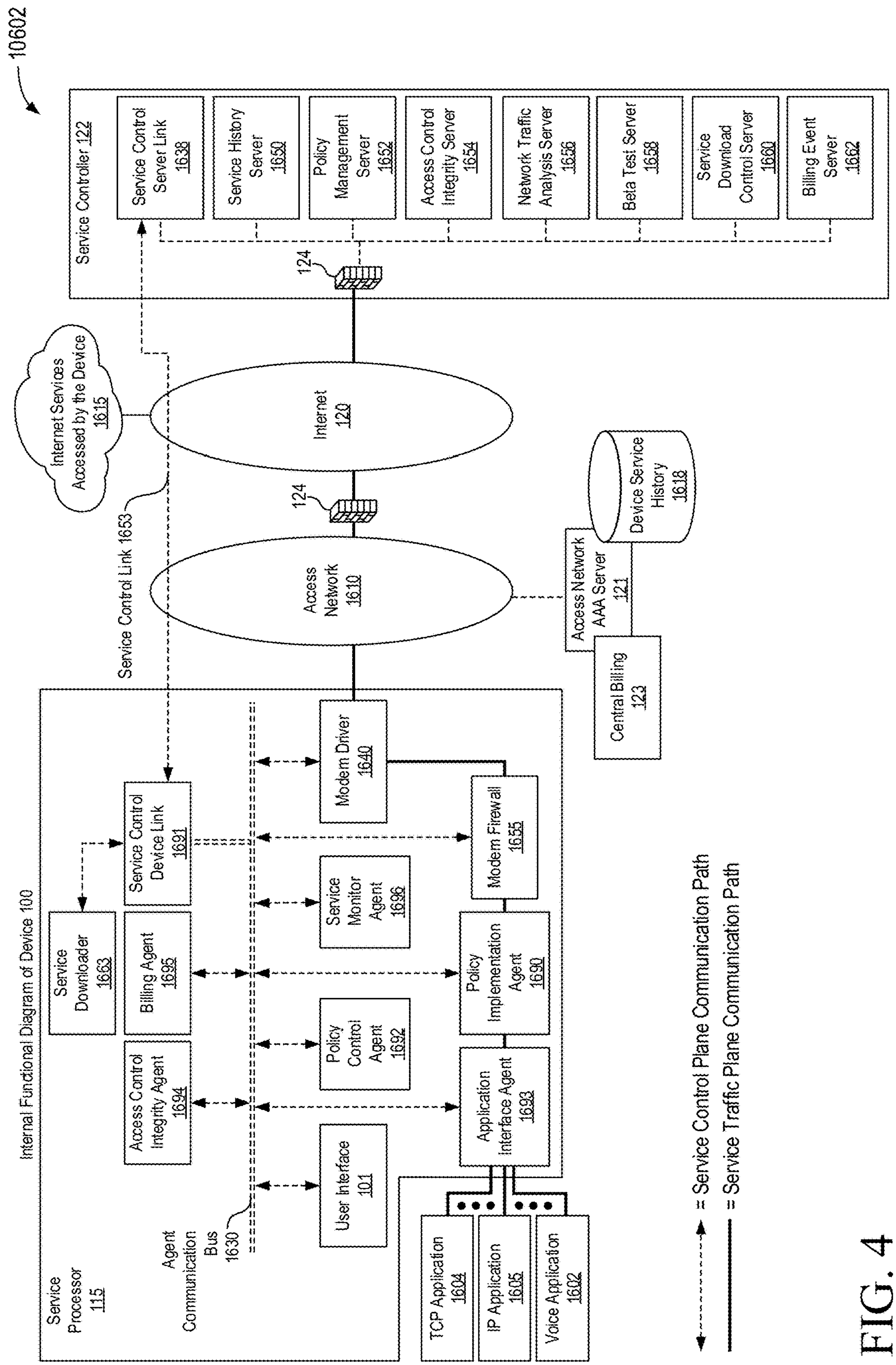
FIG. 4 illustrates a representative system including elements of a mobile wireless communication device interconnected to a service controller through a wireless network.

FIG. 4 illustrates a representative system 10602 including elements of a mobile wireless communication device 100 interconnected to a service controller 122 through a wireless network. While the embodiment illustrated in FIG. 4 illustrates the mobile wireless communication device 100 connected to the service controller 122 through a wireless radio access network and the Internet, other network combinations are also possible. In some embodiments, the wireless communication device 100 connects to the service controller through a radio access network, a core network, an access transport network, one or more service provider networks (e.g., of a network operator, mobile virtual network operator (MVNO), virtual service provider (VSP), or third-party service partner), or a combination of these. In some embodiments, the mobile wireless communication device includes a service processor 115 having one or more device agents that communicate through a control plane communication path to the service controller 122. In some embodiments, the service controller 122 includes one or more servers that provide communication service management functions. In some embodiments, one or more servers in the service controller 122 communicate with one or more device agents in the service processor 115 of the mobile wireless communication device 100.

In some embodiments, a service notification and billing interface is provided. For example, service usage and projected service usage, such as described herein, can be displayed to the user of the device (e.g., via user interface 101). Similarly, expected/projected service or cost overrun/overage, such as described herein, can also be displayed to the user. As another example, a most cost effective plan can be determined/projected based on historical and/or projected service usage, and this determined/projected most cost effective plan can be displayed to the user. In yet another example, a list of available networks accessible by the device can be displayed to the user. In this example, one or more undesired available networks can also be blocked from display thereby only displaying to the user desired and/or preferred available networks. In this example, service usage plans and/or service usage plan option comparison for one or more alternative networks or roaming networks can also be displayed to the user. Similarly, service cost plans and/or service/cost plan option comparison for one or more alternative networks or roaming networks can also be displayed to the user. In addition, roaming service usage, projected roaming service usage, estimated roaming service cost, and/or projected estimated roaming service cost can also be displayed to the user. These roaming service usage/costs can also be displayed to the user so that the user can utilize this information for selecting various roaming service billing options. In another example, alternative and/or least cost networks are determined and displayed to the user. In another example, alternative warnings are displayed to the user for any or specified roaming networks.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to a billing server (e.g., central billing 123). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

In some embodiments, an online portal or web server is provided for allowing the user to select and/or update policy settings. For example, user input provided via the online portal/web server can be recorded and reported to the billing server (e.g., central billing 123). In another example, the online portal/web server can display transaction billing information and/or accept input for a transaction billing request, which can then be reported to the billing server accordingly.

As shown in FIG. 4, the service processor 125 includes a service interface or user interface (UI) 101. In some embodiments, the user interface 101 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 101 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 123 can be used to synchronize local service usage counters and service monitor agent 1696 information to perform real-time updating of local service usage counters between billing system 123 synchronizations. As another example, the user interface 101 can display options and accept user preference feedback, such as similarly discussed above with respect to user privacy/CRM/GPS filtering, traffic monitoring and service controls. For example, the user interface 101 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 101 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO, VSP, service provider partner, and/or other "entity" in a manner specified or influenced by the user to maintain the user's desired level of information privacy.

As shown in FIG. 4, the service processor 115 includes a service downloader 1663. In some embodiments, the service downloader 1663 provides a download function to install or update service software elements on the device. In some embodiments, the service downloader 1663 requires a secure signed version of software before a download is accepted. For example, the download can require a unique key for a particular service downloader 1663. As another example, the service downloader 1663 can be stored or execute in secure memory or execute a secure memory partition in the CPU memory space. Those of ordinary skill in the art will appreciate that there are a variety of other security techniques that can be used to ensure the integrity of the service downloader 1663.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (or in some embodiments the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 4, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed herein, various embodiments disclosed herein for the service control device link 1691 provide an efficient and secure solution for transmitting and receiving service policy implementation, control, monitoring and verification information with other network elements.

In some embodiments, the service control device link 1691 agent messages are transmitted asynchronously as they are generated by one or more of the service agents. In some embodiments, the service control device link 1691 performs collection or buffering of agent messages between transmissions. In some embodiments, the service control device link 1691 determines when to transmit based potentially on several parameters including, for example, one or more of the following parameters: periodic timer trigger, waiting until a certain amount of service usage or traffic usage has occurred, responding to a service controller message, responding to a service controller request, initiated by one or more agents, initiated by a verification error condition, initiated by some other error or status condition. In some embodiments, once a transmission trigger has occurred, the service control device link 1691 assembles all buffered agent communications and frames the communications.

In some embodiments, the transmission trigger is controlled by waiting for an amount of service usage, such as waiting until a certain amount of data traffic has passed, which reduces the control plane communication channel traffic usage to a fraction of the data plane traffic. For example, this approach preserves network capacity and reduces service cost even in traffic scenarios in which data traffic is light.

In some embodiments, the transmission trigger is based on waiting for an amount of service usage, and also including a minimum transmission rate that triggers a transmission according to one or more of the following parameters: a maximum time between transmissions clock to keep the service processor 115 in communication with the service controller 122 when little or no service usage is occurring, a polling request of some kind from the service controller 122, a response to a service controller heartbeat, a transmission generated by a service verification error event, or a transmission generated by some other asynchronous event with time critical service processor 115 (or service controller 122) messaging needs, such as a transaction or service billing event or a user request. For example, service control plane traffic down is reduced to a relatively inexpensive and capacity conserving trickle when device 100 data traffic is not significant. At the same time, this approach also provides an effective flow of real time or near real-time service control plane traffic that is both cost and capacity efficient, because the service control plane traffic is a relatively small percentage of the data plane traffic when data plane traffic usage is heavy. For example, when data plane traffic usage is heavy is generally the time when close monitoring of service policy implementation verification or compromise prevention can be particularly important and by keeping the control plane overhead to a fraction of data plane traffic close monitoring and control of services are maintained at a reasonable cost in terms of percentage of both bandwidth used and network capacity. In some embodiments, the service usage or service activity trigger occurs based on some other measure than traffic usage, such as a number of messages transacted, one or more billing events, number of files downloaded, number of applications run or time that an application has been running, usage of one or more specified applications, GPS coordinate changes, roaming event, an event related to another network connection to the device and/or other service related measures.

In some embodiments, the service control device link 1691 provides for securing, signing, encrypting or otherwise protecting communications before sending. For example, the service control device link 1691 can send to the transport layer or directly to the link layer for transmission. In some embodiments, the communications are further secured with transport layer encryption, such as TCP TLS (Transport Control Protocol Transport Layer Security) or another secure transport layer protocol. In some embodiments, communications are encrypted at the link layer, such as IPSEC (Internet Protocol Security), various VPN (Virtual Private Network) services, other forms of IP layer encryption and/or another link layer encryption technique.

In some embodiments, the service control link 1691 includes the above discussed agent heartbeat function in which the agents provide certain required reports to the service controller 122 for the purpose of service policy implementation verification (e.g., verification related reports on certain aspects of the service processor 115) or for other purposes. For example, such agent heartbeat messages can be in the open/clear (unencrypted) or encrypted, signed and/or otherwise secured. In some embodiments, these messages include one or more of the below described types of messages: an agent information message, an agent check-in message and/or agent cross check message.

In some embodiments, an agent information message is included in the agent heartbeat service policy implementation verification message, which includes, for example, any information the agent needs to communicate to the service controller 122 as part of the operation of the service policy implementation system. For example, an agent response to a service controller challenge, as described below, can be included in the agent heartbeat service policy implementation verification message.

In some embodiments, an agent check-in message is included in an agent heartbeat service policy implementation verification message, which includes, for example, a transmission of a unique agent identifier, secure unique identifier, and/or hashed encrypted and signed message beginning with some shared secret or state variable for the hash. For example, an agent self-check can be included in the agent heartbeat service policy implementation verification message, which includes reporting on agent configuration, agent operation, agent code status, agent communication log, agent error flags, and/or other agent associated information potentially hashed, encrypted, signed or otherwise secured in the message (e.g., using a shared secret unique to that agent).

In some embodiments, an agent cross-check message is included in the agent heartbeat service policy implementation verification message, which includes, for example, reports on the status, configuration, operation observations, communication log or other aspects of another agent. For example, agent environment reports can be included in the agent heartbeat service policy implementation verification message, which includes, for example, reports on certain aspects of the service processor 115 operating environment, such as software presence (e.g., installation status of certain operating system and/or application software and/or components thereof), observed communication with agents or communication attempts, memory accesses or access attempts, network accesses or access attempts, software downloads or attempted downloads, software removal or download blocking, service policy implementation verification or compromise event error conditions with respect to the operating environment for the service processor 115, and/or other messages regarding the verification or possibility of compromise associated with the service processor 115 operating environment or agents.

In some embodiments, the agent heartbeat function also provides regular updates for information important to user service notification services. For example, the network based elements can provide regular synchronization updates for the device based service usage or service activity counters in which service usage or service activity measures available from one or more network service history elements is transmitted to the device 100. This allows the service usage counter errors between the device service counter and the counters used for central billing to be minimized. A common service usage or service activity measure is total traffic usage measured to date within a time frame over which a service limit is applicable. Other service usage or service activity measures can also be tracked and reconciled in a similar manner.

In some embodiments for the heartbeat function, the service controller 122 verifies that the scheduled agent reports are being received and that the reports are within expected parameters. In some embodiments, the access control integrity server 1654 issues signed challenge/response sequences to the policy implementation agent 1690. For example, the challenges can be asynchronous, issued when an event or error condition occurs, issued on a schedule or issued when a certain amount of data has passed. This approach, for example, provides a second layer of service policy implementation verification that strengthens the service usage or service activity measurement verification. For example, a challenge/response can be sent over the heartbeat link for the purpose of verifying device agent integrity. Various challenge/response related verification embodiments are described below.

In some embodiments, the challenge/response heartbeat message can include sending any kind of command or query, secure or transmitted in the open, receiving a response from the agent and then evaluating the response to determine if the response is within a range of parameters expected for a correctly configured agent, an agent that is operating properly, an agent that is not partially compromised or an agent that is not entirely compromised. In some embodiments, the agent is only required to respond with a simple acknowledgement of the challenge. In some embodiments, the agent is required to respond with a message or piece of information that is known by the agent. In some embodiments, the agent is required to respond with a message or piece of information that is difficult for the agent to respond correctly with if it were to be partially or entirely compromised. In some embodiments, the agent is required to respond back with information regarding the operation or configuration of the agent that is difficult for the agent to respond properly with if the agent is not properly configured, not operating properly, is partially compromised or is entirely compromised. In some embodiments, the first agent is required to respond back with information regarding the operation, configuration, status or behavior of a second agent that is difficult for the first or second agent to respond properly with if the first or second agent is not properly configured, not operating properly, is partially compromised or is entirely compromised. In some embodiments, the agent is required to respond with a response that includes a shared secret. In some embodiments, the agent is required to respond with information regarding the presence, configuration, operating characteristics or other information regarding other programs in the operating environment of the agent. In some embodiments, the agent is required to respond with hashed information to be portions of code or a code sample (e.g., the code portion or code sample can be specified by the service controller 122).

In some embodiments, the information the agent responds with is a response to a signed or encrypted message from the service controller 122 in which the agent must know how to decode the encrypted controller message in order to respond correctly or it would be difficult for the agent to respond properly if the agent is not configured properly, is not operating within appropriate limits, is partially compromised or is entirely compromised. In some embodiments, the agent signs or encrypts information in such a manner that it is difficult to respond correctly when the message is decoded by the service controller 122 unless the agent is configured properly, is operating within appropriate limits, is not partially compromised and is not entirely compromised. In some embodiments, the agent is required to respond with a signed or encrypted hash of information that is difficult for the agent to generate unless the agent is configured properly, is operating within appropriate limits, is not partially compromised and is not entirely compromised. For example, the hashed information can be local device configuration information, portions of code or all of the code, and/or the code portion to be used in the response can be specified by the service controller. In another example, the hashed information the agent responds with can include a shared secret, and/or the hashed information can be information regarding the presence, configuration, operating characteristics or other information regarding other programs in the operating environment of the agent.

Accordingly, as described above, the agent heartbeat function provides an important and efficient system in some embodiments for verifying the service policy implementation or protecting against compromise events. For example, there are many other functions the agent heartbeat service can perform and some are described herein while others will be apparent to one of ordinary skill in the art given the principles, design background and various embodiments provided herein.

In some embodiments, the service control device link 1691 facilitates another important function, which is the download of new service processor software elements, revisions of service processor software elements, and/or dynamic refreshes of service processor software elements. There are many embodiments for such operations. In some embodiments, the software is received as a single file over the service control device link 1691. For example, the file can have encryption or signed encryption beyond any provided by the communication link protocol itself. In some embodiments, the software files are segmented into smaller packets that are communicated in multiple messages sent over the service control device link 1691. In some embodiments, once the file(s) are received, or the segmented portions of the file(s) are received, they are communicated to a service downloader 1663 for file aggregation and installation, which, in some embodiments, is performed after further measures to verify the service processor software are completed. In some embodiments, the files are sent using other delivery means, such a direct TCP socket connection to the service downloader 1663 or some other software installer, which can also involve secure transport and additional levels of encryption.

As shown in FIG. 4, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 4, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function. As discussed below, various embodiments described herein for the service control server link 1638 provide an efficient and secure mechanism for transmitting and receiving service policy implementation, control, monitoring and verification information between the device agents (e.g., service processor agents/components) and other network elements (e.g., service controller agents/components).

In some embodiments, the service control server link 1638 can employ the counterpart service control plane secure transmission methods discussed above with respect to the service control device link 1691. For example, one or more layers of security can be used to secure the communications link, including, for example, basic IP layer security, TCP layer security, service control link layer security, and/or security specific from service controller servers to service processor agents.

In some embodiments, the service control server link 1638 reduces network chatter by efficiently transmitting service control related communications over the link. For example, the service control server link 1638 can transmit server messages asynchronously as they arrive. As another example, the service control server link 1638 can perform collection or buffering of server messages between transmissions. As another example, the service control server link 1638 can determine when to transmit based potentially on several parameters, such as one or more of: periodic timer trigger, waiting until a certain amount of service usage or traffic usage has occurred, responding to a service agent message, responding to a service agent request, initiated by one or more servers, initiated by a verification error condition, and/or initiated by some other error condition. For example, once a transmission trigger has occurred, the service control server link 1638 can take all buffered agent communications and frame the communications. In addition, the service control server link 1638 can provide for an efficient communication link based on various embodiments related to the timing of transmissions over the service control link, as similarly discussed above with respect to the service control device link 1691 description. For example, the timing functions, such as asynchronous messages or polling for messages, constant frequency transmission, transmission based on how much service usage or data traffic usage has taken place, transmission in response to device side control link message, service verification error events, other error events, and/or other message transmission trigger criteria can be determined, controlled and/or initiated by either the device side or the network side depending on the embodiment.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

In some embodiments, the service control server link 1638 includes the agent heartbeat function in which the agents provide certain required reports to the service processor for the purpose of service policy implementation verification or for other purposes. For example, the heartbeat function can also be used to issue queries or challenges, messages, service settings, service control objectives, information requests or polling, error checks and/or other communications to the agents. As another example, agent heartbeat messages can be in the open or encrypted, signed and/or otherwise secured. Additional heartbeat function and the content of heartbeat messages can be provided as similarly described herein, such as described above with respect to the service control device link 1691 and the access control integrity agent 1694 and other sections. In some embodiments, the service controller 122 and/or agents of the service controller 122 are programmed to periodically provide reports, such as upon a heartbeat response (e.g., an agent can repeatedly send necessary reports each heartbeat), and appropriate actions can then be taken based upon such received reports. Accordingly, the heartbeat function provides an important and efficient system in various embodiments described herein for verifying the service policy implementation and/or protecting against compromise events. There are many other functions the agent heartbeat service can perform many of which are discussed herein, while many others will be apparent to one of ordinary skill in the art given the principles, design background and various embodiments provided herein.

In some embodiments, the service control server link 1638 also provides a service control software download function for various embodiments, which, for example, can include a download of new service software elements, revisions of service software elements, and/or dynamic refreshes of service software elements of the service processor 115 on the device. In some embodiments, this function is performed by the service control server link 1638 transmitting the service control software as a single file over the service control link. For example, the file can have encryption or signed encryption beyond any provided by the communication link protocol itself for service control link 1653. In another example, the service control software files can be segmented/divided into smaller packets that are transmitted in multiple messages sent over the service control link 1653. In yet another example, the service control software files can be transmitted using other delivery mechanism, such as a direct TCP socket connection from a service download control server 1660, which can also involve secure transport and additional levels of encryption. In some embodiments, the service control server link 1638 and/or service download control server 1660 use(s) an agent serial number and/or a security key look up when agents are updated and/or when a dynamic agent download occurs.

As shown in FIG. 4, the service controller 122 includes an access control integrity server 1654. In some embodiments, the access control integrity server 1654 collects device information on service policy, service usage, agent configuration and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122) verifies device service policy, and the verification error conditions that can indicate a mismatch in service measure and service policy include one or more of the following: unauthorized network access (e.g., access beyond ambient service policy limits); unauthorized network speed (e.g., average speed beyond service policy limit); network data amount does not match policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy.

In some embodiments, the access control integrity server 1654 (and/or some other agent of service controller 122) verifies device service policy based at least in part on, for example, various error conditions that indicate a mismatch in service measure and service policy. For example, various verification error conditions that can indicate a mismatch in service measure and service policy include one or more of the following: mismatch in one service measure and another service measure; agent failure to report in; agent failure to respond to queries (e.g., challenge-response sequence and/or expected periodic agent reporting); agent failure to respond correctly to challenge/response sequence; agent improperly configured; agent failure in self checks; agent failure in cross-checks; unauthorized agent communication or attempted unauthorized communication; failure in service policy implementation test; failure in service usage reporting test; failure in service usage billing test; failure in transaction billing test; failure in download sequence; environment compromise event, such as unauthorized software load or execution (or attempt), unauthorized memory access (or attempt), unauthorized agent access (or attempt), known harmful software, and/or known harmful communications signature; and/or failure to respond to various messages, such as send message and suspend and/or send message and quarantine. In some embodiments, the access control integrity server 1654 (and/or some other agent of service controller 122) verifies device service policy by performing automated queries and analysis, which are then reported (e.g., anomalous/suspicious report results can be reported for further analysis by a person responsible for determining whether such activities indicate out of policy activities or to provide information to the user to inform the user of such anomalous/suspicious report results that may indicate out of policy activities). For example, the user can review the report to authorize whether such activities were performed by the user (e.g., website access requests, specific transactions, and/or phone calls) and/or indicate that such activities were not authorized by the user (e.g., indicate a potential compromise of the device, such as by malware or other unauthorized software/user use of the device). In another example, the user can also be connected to communicate with service support of the service provider regarding such reported activities (e.g., by text/chat, voice/phone, and/or video conference to a service support). Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

In some embodiments, upon detection of one or more service verification errors, such as the various service verification errors discussed above, the device is directed to a quarantine network status in which the device can, for example, only access network control plane functions, billing functions, and other functions generally controlled by the access network service provider or the central service provider. For example, quarantine network access restrictions and routing can be accomplished with the access network AAA and routing system (e.g., access network AAA server 121 and one or more of the gateways) or can be accomplished with device based access control or traffic control policy implementation. Quarantine network equipment or servers can, for example, be located within the access network or within another network with access to the access network. Communication with the quarantine network infrastructure can be accomplished, for example, with a secure link with one or more encryption levels or a dedicated private link. In some embodiments, quarantining a device includes, for example, a two step process for routing quarantine network device traffic, first, to a quarantine traffic handling router or server and, second, from there to the actual quarantine network infrastructure, with the route being determined by device parameters, user parameters, access service provider parameters or other parameters associated with the quarantine network routing. In some embodiments, the device is completely suspended from the network in which, for example, the device can first issue a user interface message to the user or issuing another form of a message to the user or service subscriber, such as via email, hard copy message and/or voice message. In some embodiments, the device network access, service capabilities and/or traffic shaping are limited, partially restricted or completely restricted, service capabilities. For example, these limitations and/or restrictions can be implemented in the device and/or in the network. For example, implementing a device quarantine (e.g., using a RADIUS server to quarantine the device) can involve assigning the device to a different billing profile.

In some embodiments, upon detection of one or more service verification errors, such as the various service verification errors discussed above, switch based port analysis is performed to further monitor the device (e.g., referred to as Switched Port Analyzer (SPAN) on Cisco switches, and various other vendors have different names for it, such as Roving Analysis Port (RAP) on 3Com switches). In some embodiments, the device service policy implementation behavior is monitored at a deeper level in the network by copying device traffic in the switch so that it goes to both an intended data path destination and to a specified port for switch based port analysis (e.g., the traffic content can be analyzed and recorded using deep packet inspection (DPI) techniques, which can provide a finer level of detail than the typical IPDR). For example, an advantage of performing a switch based port analysis function is that the traffic need not be analyzed in real time, and a sample subset of the devices on the network can be selected for such analysis based on, for example, either identifying devices that have suspect service policy implementation behavior and/or a regular sampling algorithm that eventually samples all devices, or some other selection approaches. As another example, a scheduled switch based port analysis sampling can be applied that eventually rotates through all devices and designates a higher priority in the sampling queue for devices that are suspect.

In some embodiments, switch based port analysis allows for off-line sampled or non-real-time DPI, as described above, as a verification measure for the device based service control measures that are implemented. In some embodiments, sophisticated DPI techniques are used to enhance the content of the IPDRs so that they provide detailed information that can be made available in the network. For example, some of the DPI packet analysis may be redundant between the device and the network, but this approach provides for a much finer grain validation for the device based service and less reliance on the device for some of the service traffic analysis that service providers need. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that the network level traffic inspection is accomplished in, or in one or more servers integrated to operate in a coordinated manner with the DPI boxes. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that provides deep service control capability (e.g., using DPI techniques) for devices that have some or all of the service processor functions installed and, in some embodiments, also providing coarser network control of the basics for devices that do not have a service processor installed in the device (e.g., such coarser network control functions include max data rate and/or max total data).

In some embodiments, the SPAN function is used in a revolving periodic manner as well to augment CDR data with deeper packet information for the purpose of spot-checking device based service usage measures. Examples of where this can be beneficial include spot checking network address access policies, spot checking ambient access policies, spot checking billing event reports, spot checking intermediate networking device/end point device count (via checking network source or destination addresses, token, cookies or other credentials, etc.). For example, the periodic SPAN can be scheduled for all devices equally, for certain devices or users with higher priority, frequency or depth of SPAN than others, higher priority, higher frequency or immediate priority for devices with higher usage patterns or unusual usage patterns, immediate or very high priority for devices with a policy violation status.

In some embodiments, a combination traffic inspection and service control approach implements traffic and service control functions in the network that are conducive for a network based implementation and implements traffic and service control functions in the device that are either more conducive for performing in the device or can only be performed in the device (e.g., activities involving inspection of traffic that is encrypted once it is transmitted to the network). For example, using this approach, activities that can be done in the network are generally performed in the network and/or are more efficiently performed in the network than the device, and activities that are more efficiently performed in the device or can only be performed in the device are performed in the device (e.g., depending on device processing/storage capabilities and/or other design/security considerations). For example, the following are various traffic and service control functions that, in some embodiments, are preferably or can only be performed in the device: network based packet processing capability limitations (e.g., encrypted traffic, application layer information unavailable once the traffic goes into the networking stack, other application/usage context information available on the device but not in the network); information that is generally/preferably maintained and processed locally in the device for network neutrality reasons (e.g., network neutrality issues can generally be efficiently implemented by keeping all, substantially all or at least some aspect of decisions on how to implement algorithms to control traffic local to the device and under user decision control, and/or by providing the user with a set of pre-packaged choices on how to manage service usage or service activity usage or manage service usage versus service cost or price); information that is generally/preferably maintained and processed locally in the device for user privacy reasons (e.g., deeper levels of traffic monitoring and service usage monitoring data where it is available for assisting the user in achieving the best, lowest cost experience and implementing a CRM filter function to the user so that the user can control the level of CRM the network is allowed to receive, such as with the higher levels of information being exchanged for something of value to the user, and/or user location information); information that is generally/preferably maintained and processed locally in the device for the purpose of informing the user of service control settings or service activity usage or to adjust service activity control settings or receive user feedback to choices regarding service usage policies or billing options (e.g., providing the user with a UI for the purpose of monitoring an estimate of service usage and/or notifying the user of at least some aspect of estimated service usage or projected service usage, providing the user with a UI for the purpose of monitoring an estimate of service cost and/or notifying the user of at least some aspect of estimated service cost or projected service cost, providing the user with a UI for the purpose of providing the user with one or more service usage and/or service cost notification messages that require user acknowledgement and/or a user decision and obtaining or reporting the user acknowledgements and/or decisions, providing the user with a UI for the purpose of providing the user with service options and/or service payment options, providing the user with a UI for the purpose of obtaining user choice for such options when service usage or cost estimates are about to run over limits or have run over limits or are projected to run over limits, providing the user with a UI for the purpose of monitoring or conducting open central billing transactions or other transactions, providing the user with a UI for the purpose of selecting the service control techniques and/or policies and/or algorithms and/or pre-packaged configurations that can be used to define or partially define the service activity usage control policies implemented in the device service processor or the network service control equipment/billing system or a combination of both); service control for roaming on different networks that typically do not have compatible DPI-type techniques with the home network; certain service notification and traffic control algorithms (e.g., stack-ranked activity statistical analysis and control of only the high usage activities); and/or a function for assigning a device to a service experience or ambient activation experience or virtual service provider (VSP) at various times from manufacturing to device distribution to a user of the device. In some embodiments, certain activities are implemented in the device as a solution for networks in which a new centralized DPI approach is not possible, not economically feasible, or for any number of reasons not an option or not a preferred option.

In some embodiments, a network based solution is provided for a more basic set of services for all devices that do not have service control capabilities, and a super-set of services and/or additional services are provided for devices that include a service processor. As described herein, a service controller function can be located in various places in the network in accordance with various embodiments. It should also be noted that various other embodiments described herein also employ a hybrid service control function performing certain service control functions in the network (e.g., collecting network service usage information, such as IPDRs, and/or performing DPI related functions in the network for collecting network service usage information and/or throttling/shaping traffic) and service control functions in the device (e.g., service processor 115, which, for example, monitors service usage in the device and/or performs throttling or traffic shaping in the device and/or performs certain billing event recording and reporting functions that are aptly performed on the device).

In some embodiments, lower level service policy implementation embodiments are combined with a higher level set of service policy supervision functions to provide device assisted verifiable network access control, authentication and authorization services.

In some embodiments, device based access control services are extended and combined with other policy design techniques to create a simplified device activation process and connected user experience referred to herein as ambient activation. As similarly discussed above, ambient activation can be provided by setting access control to a fixed destination, verifying access with IPDRs, verifying access by setting a max data rate and triggering off in the network if it exceeds the max data rate, and/or by various other techniques.

As shown in FIG. 4, service controller 122 includes a service history server 1650. In some embodiments, the service history server 1650 collects and records service usage or service activity reports from the Access Network AAA Server 121 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618. In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 4, service controller 122 includes a policy management server 1652. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

In some embodiments, the policy management server 1652 performs a service control algorithm to assist in managing overall network capacity or application QoS. In some embodiments, the policy management server 1652 performs an algorithm to determine which access network is best to connect to, such as based on network capacity or application QoS, service usage costs, and/or any other criteria. In some embodiments, the device is capable of connecting to more than one network, and accordingly, device service policies can be selected/modified based on which network the device is connected to. In some embodiments, the network control plane servers detect a network connection change from a first network to a second network and initiate the service policy implementation established for the second network. In other embodiments, the device based adaptive policy control agent (e.g., policy control agent 1692 described herein) detects network connection changes from the first network to the second network and implements the service policies established for the second network.

In some embodiments, when more than one access network is available, the network is chosen based on which network is most preferred according to a network preference list or according to the network that optimizes a network cost function. For example, the preference list can be pre-established by the service provider and/or the user. For example, the network cost function can be based on a minimum service cost, maximum network performance, determining whether or not the user or device has access to the network, maximizing service provider connection benefit, reducing connections to alternative paid service providers, and/or a variety of other network preference criteria. In other embodiments, the device detects when one or more preferred networks are not available, implements a network selection function or intercepts other network selection functions, and offers a connection to the available service network that is highest on a preference list. For example, the preference list can be set by the service provider, the user and/or the service subscriber.

As shown in FIG. 4, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In other embodiments, the network traffic analysis server 1656 estimates the service quality and/or service usage for the network under variable settings on potential service policy. In other embodiments, the network traffic analysis server 1656 identifies actual or potential service behaviors by one or more devices that are causing problems for overall network service quality or service cost.

As shown in FIG. 4, service controller 122 includes a beta test server 1658. In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 4, service controller 122 includes a service download control server 1660. In some embodiments, the service download control server 1660 provides a download function to install and/or update service software elements (e.g., the service processor 115 and/or agents/components of the service processor 115) on the device, as described herein.

As shown in FIG. 4, service controller 122 includes a billing event server 1662. In some embodiments, the billing event server 1662 collects billing events, provides service plan information to the service processor 115, provides service usage updates to the service processor 115, serves as interface between device and central billing server 123, and/or provides trusted third-party function for certain ecommerce billing transactions.

As shown in FIG. 4, the Access Network AAA server 121 is in network communication with the access network 1610. In some embodiments, the Access Network AAA server 121 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 121 also provides the ability to suspend service for a device and resume service for a device based on communications received from the service controller 122. In some embodiments, the Access Network AAA server 121 also provides the ability to direct routing for device traffic to a quarantine network or to restrict or limit network access when a device quarantine condition is invoked. In some embodiments, the Access Network AAA server 121 also records and reports device network service usage (e.g., device network service usage can be reported to device service history 1618).

As shown in FIG. 4, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 4, the central provider billing server 123 is in network communication with the access network 1610. In some embodiments, the central provider billing server 123 provides a mediation function for central provider billing events. For example, the central provider billing server 123 can accept service plan changes. In some embodiments, the central provider billing server 123 provides updates on device service usage, service plan limits and/or service policies. In some embodiments, the central provider billing server 123 collects billing events, formulates bills, bills service users, provides certain billing event data and service plan information to the service controller 122 and/or device 100.

Network Selection and Notification

In some embodiments, a mobile device 100 is capable of connecting to more than one network and device service policies are potentially changed based on which network the device is connected to at the time. In some embodiments, the network control plane servers detect a network connection change and initiate the service policy implementation established for the second network. In some embodiments, the device based adaptive policy control agent, as described herein (e.g., policy control agent 1692 illustrated in FIG. 4), detects network connection changes and implements the service policies established for the second network.

In some embodiments, when more than one access network is available, the network is chosen based on which network is most preferred according to a network preference list or according to which network that optimizes a network cost function. For example, the network preference list can be pre-established by the service provider and/or the user and/or later modified/adjusted by either the service provider and/or the user. For example, the cost function can be based on determining a minimum service cost, maximum network performance, whether or not the user or device has access to the network, maximizing service provider connection benefit, reducing connections to alternative paid service providers, and/or any other cost related criteria for network selection purposes.

In some embodiments, the mobile device 100 detects when one or more preferred networks are not available, implements a network selection function or intercepts other network selection functions, and offers a connection to the available service network that is highest on a preference list. For example, the preference list can be set by the service provider, the user and/or the service subscriber. In some embodiments, a notification is provided to the device/user when the device is not connected to a network (e.g., indicating in a pop-up/bubble or other UI based display a notification, such as "You are not connected to the network. Click here to learn more, get free trial, use a session, sign-up for service"). In some embodiments, the notification content can be determined based on usage service patterns, locally stored and/or programmable logic on the device and/or a server (e.g., device reports that user is not connected and WWAN is available). Decisions on what bubble to present when may be in pre-stored logic on device.

Open Content Distribution and Transaction System

Figure 53:
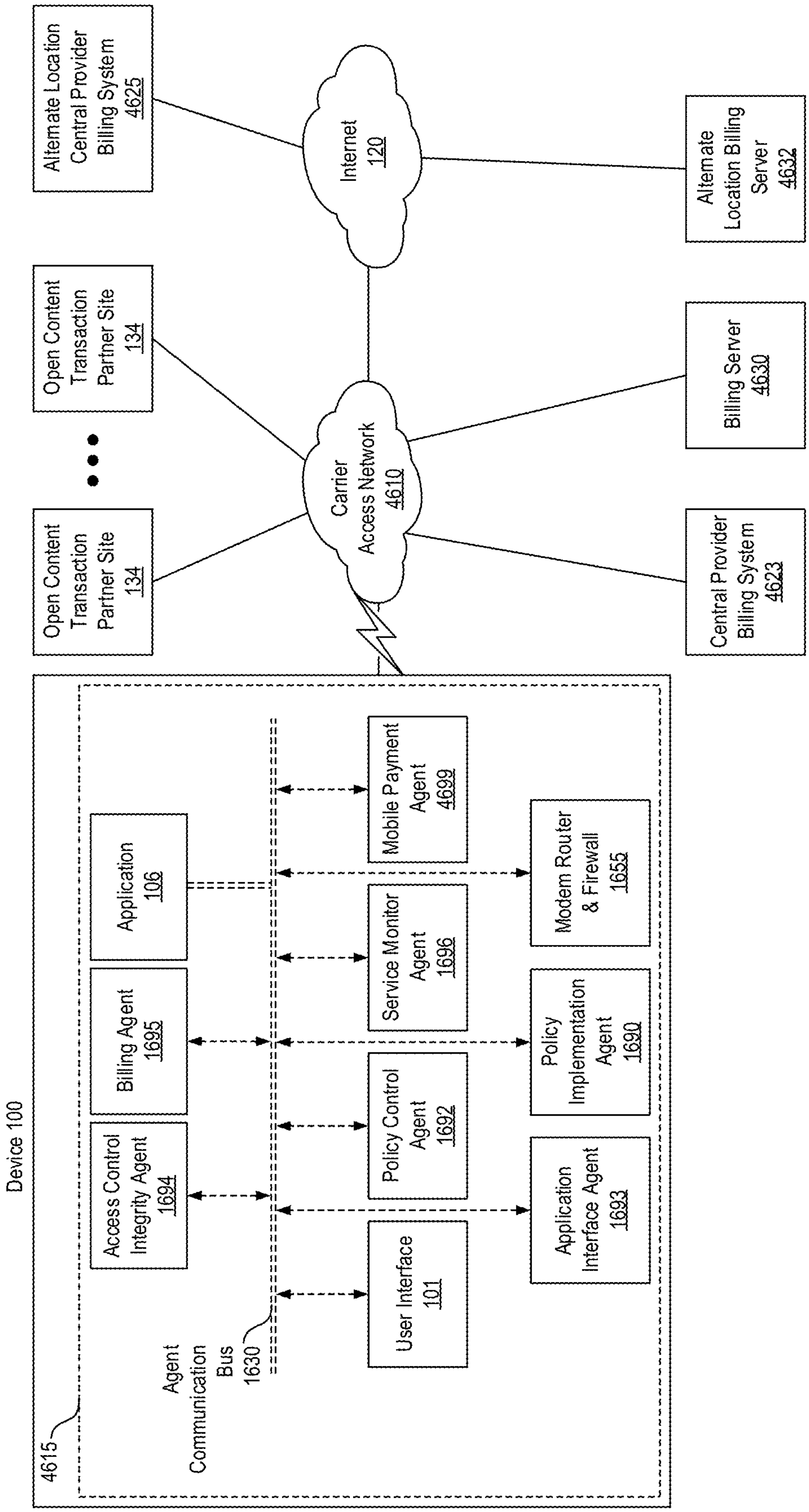
FIG. 53 is a functional diagram illustrating open, decentralized, device based mobile commerce transactions in accordance with some embodiments.
Figure 54:
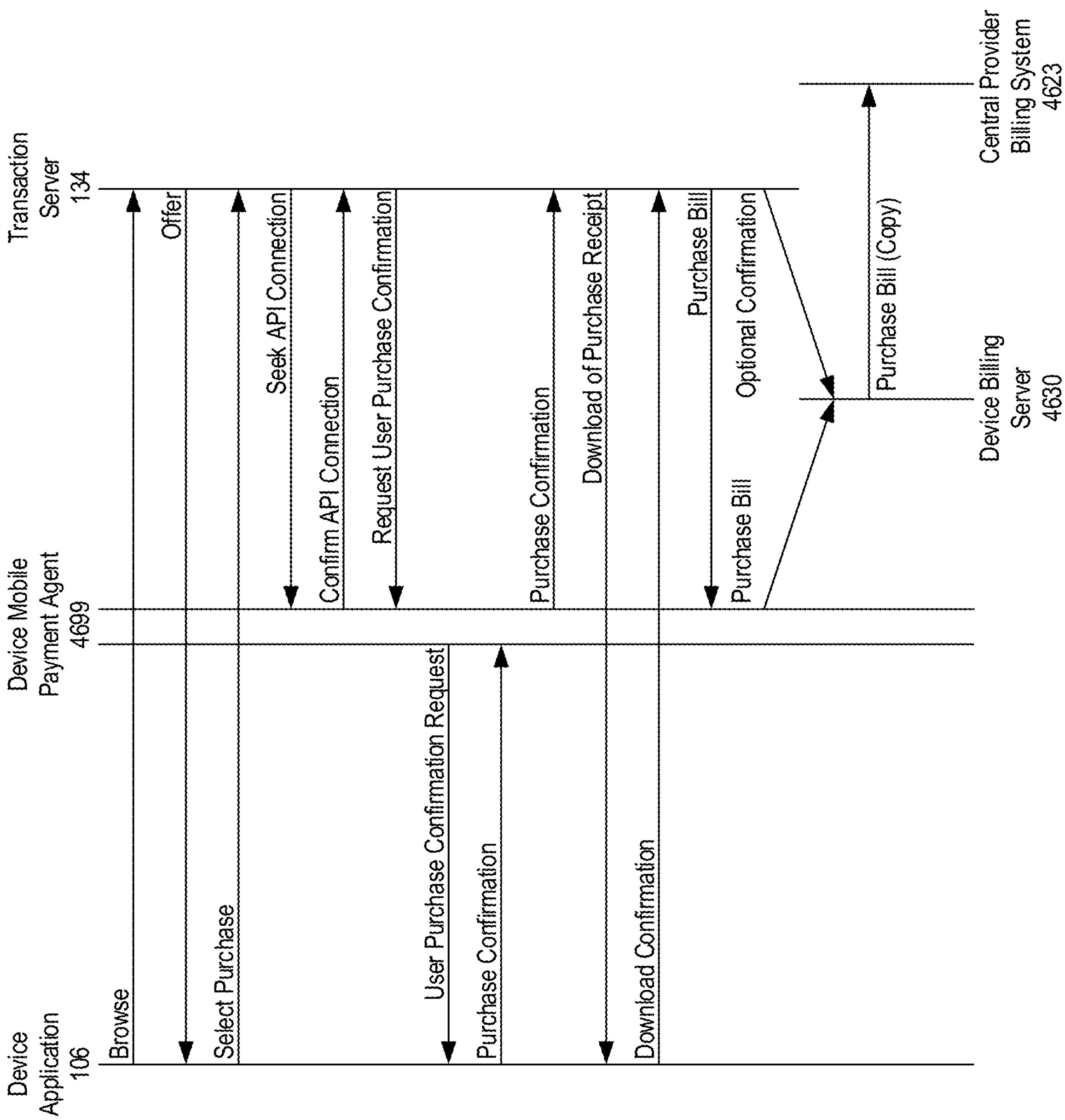
FIGS. 54 and 55 are transactional diagrams illustrating open, decentralized, device based mobile commerce transactions in accordance with some embodiments.
Figure 55:
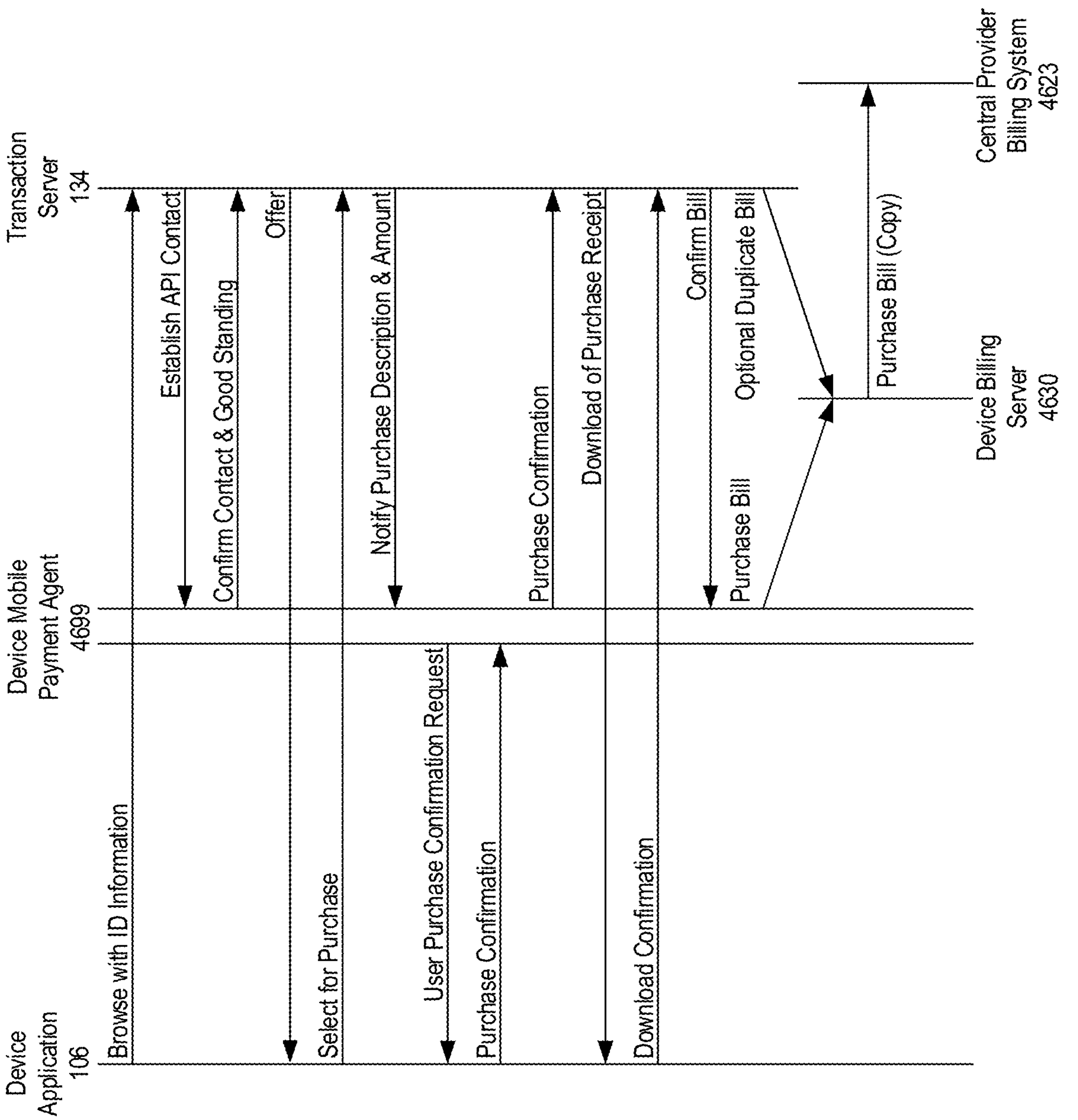

Referring now to FIGS. 53, 54 and 55, in another set of embodiments an open, decentralized, device based system for enabling central billing for third-party electronic commerce transactions for mobile commerce is provided as shown. For example, in these embodiments, device information can be embedded in HTTP, WAP or other portal browser/network header request information that indicates a central billing option is available to a compatible third-party transaction server, as further described below with respect to FIGS. 53, 54 and 55.

FIG. 53 is a functional diagram illustrating open, decentralized, device based mobile commerce transactions in accordance with some embodiments. As shown, a service processor 4615 of the device 100 (e.g., any mobile device capable of storing and executing the service processor 4615) includes access control integrity agent 1694, billing agent 1695, agent communication bus 1630, user interface 101, policy control agent 1692, service monitor agent 1696, application interface agent 1693, policy implementation agent 1690, and modem router and firewall 1655, as similarly described herein with respect to various other service processor embodiments. In some embodiments, an application 4604 (e.g., an HTML/WAP web browser) and a mobile payment agent 4699 are also included in the device, such as part of the service processor 4615 as shown. In some embodiments, the application 4604 is not integrated as part of the service processor 4615, but is executing and/or stored on the device. In some embodiments, the mobile payment agent 4699 includes billing agent 1695, user interface 101 and/or application interface agent 1693, and/or various other functional components/agents. As shown, the service processor 4615 is in communication with a carrier access network 4610, which is in network communication with the Internet 120.

In some embodiments, device information can be embedded in HTTP, WAP or other portal browser/network header request information that indicates a central billing option is available to a compatible third-party transaction server, such as the open content transaction partner site(s) 134. For example, the compatible transaction server can then send a signed confirmation request over a pre-assigned control socket channel to the billing agent 1695 with the billing agent 1695 confirming the signed confirmation request by either performing the signature check locally based on a stored and synchronized list of approved transaction servers or by passing the signed request onto a billing server 4630 for confirmation. Optionally, in another example, a triangle confirmation can be set up in which the billing server 4630 can confirm the transaction set up with the transaction server 134 or the transaction server 134 can confirm the transaction set up with the billing server 4630. Once the device confirms the compatible and approved status of the transaction server 134, the device/transaction server pair can then optionally further exchange keys for the remainder of the transaction for enhanced security. In another example, the transaction server 134 can also redirect the user browsing experience to one tailored to one or more of device type, service provider, device manufacturer or user. When the user selects a transaction, the transaction server sends the billing agent 1695 a transaction bill that describes the transaction and the amount. The billing agent 1695 can optionally confirm that the user account has sufficient credit limit to make the purchase by either confirming the stored credit limit on the device or querying the billing server 4630. The billing agent 1695 then invokes the device UI 101 to display the transaction description and amount and request user approval for the billing to be conducted through the central billing option. User approval can be acquired, for example, by a simple click operation or require a secure password, key and/or biometric response from the user. Upon user approval, the billing agent 1695 generates a billing approval and sends it to the transaction server 134, the transaction server 134 completes the transaction and then sends a bill to the billing agent 1695. The billing agent 1695 optionally sends a confirmation to the transaction server 134 and sends the bill to the billing server 4630. Again, optionally a triangle confirmation can be formed by the billing server sending a confirmation to the transaction server 134, or the transaction server 134 can send the bill to the billing server 4630. In some embodiments, the billing server 4630 can also communication such billed transactions to a central provider billing system 4623 via the carrier access network 4610. Also, in some embodiments, an alternate location billing server 4632 is in communication via the Internet 120, and an alternate location central provider billing system 4625 is also in communication via the Internet 120.

FIGS. 54 and 55 are transactional diagrams illustrating open, decentralized, device based mobile commerce transactions in accordance with some embodiments. Referring to FIG. 54, the device application 4604 browses (e.g., based on the user submitting a browse request using a browser application) to transaction server 134 (e.g., a transaction web server, such as the open content transaction partner site 134). The transaction server 134 provides an offer to the device application 4604. The device application 4604 selects a purchase (e.g., based on the user's selection input). In response, the transaction server 134 seeks an API connection with the device mobile payment agent 4699, which then confirms the API connection. The transaction server 134 requests user purchase confirmation (mediated by the device mobile agent 4699 as shown), and the purchase is confirmed by the device application 4604 (e.g., based on the user's acknowledgement as similarly described above with respect to FIG. 46). The transaction server 134 then transmits a purchase receipt, and the device application 4604 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 53. The device billing server sends a copy of the purchase bill to the central provider billing system (e.g., central provider billing system 4623).

Referring now to FIG. 55, the device application 4604 browses (e.g., based on the user submitting a browse request using a browser application) to transaction server 134 (e.g., a transaction web server, such as the open content transaction partner site 134), in which the browse request includes device ID information, such as similarly described above with respect to FIG. 53. The transaction server 134 establishes API contact with the device mobile agent 4699, which then confirms contact and good standing for transactional purchases from the device. The transaction server 134 provides an offer to the device application 4604. The device application 4604 selects a purchase (e.g., based on the user's selection input). The transaction server 134 notifies the device mobile payment agent 4699 of the purchase description and amount, and the device mobile payment agent 4699 then requests user purchase confirmation. The purchase is confirmed by the device application 4604 (e.g., based on the user's acknowledgement as similarly described above with respect to FIG. 53 and the device mobile payment agent 4699 then transmits a purchase confirmation to the transaction server 134. The transaction server 134 then transmits a purchase receipt, and the device application 4604 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 53. The device billing server sends the purchase bill to the central provider billing system (e.g., central provider billing system 4623). In some embodiments, the communications described above with respect to FIGS. 54 and 55 with the billing server and the central provider billing system are with the alternate location billing server 4632 and/or alternate location central provider billing system 4625 via the Internet 120. Similarly, in some embodiments, the transaction servers 134 are connected to the Internet 120.

Accordingly, these transaction billing embodiments do not require centralized content storage or content and transaction exchange infrastructure. For example, the transactions can be conducted over the Internet, and the user experience and content can be tailored versions of the transaction server/content provider's normal experience and content. This approach provides for a much wider array of content and transaction partners with minimal or no need to accommodate proprietary specialized systems. Moreover, the compatibility between the device billing agent transaction system and the transaction provider server is easily established, for example, by writing specifications for the header information transmitted by the device and for the secure handshake and signed message transactions that take place between the device billing agent, the transaction server and optionally the transaction server and the billing server. Once a transaction partner shows compatibility test results and concludes a business relationship with the service provider, the service provider can place the transaction partner on the compatible and approved list and exchange security keys and/or certificates. If a common user experience is desired by the service provider across multiple transaction partners, then the experience specifications for the browser redirects can also be specified in the compatibility specification and tested before the transaction partner gains approval.

User Interfaces

Figure 56:
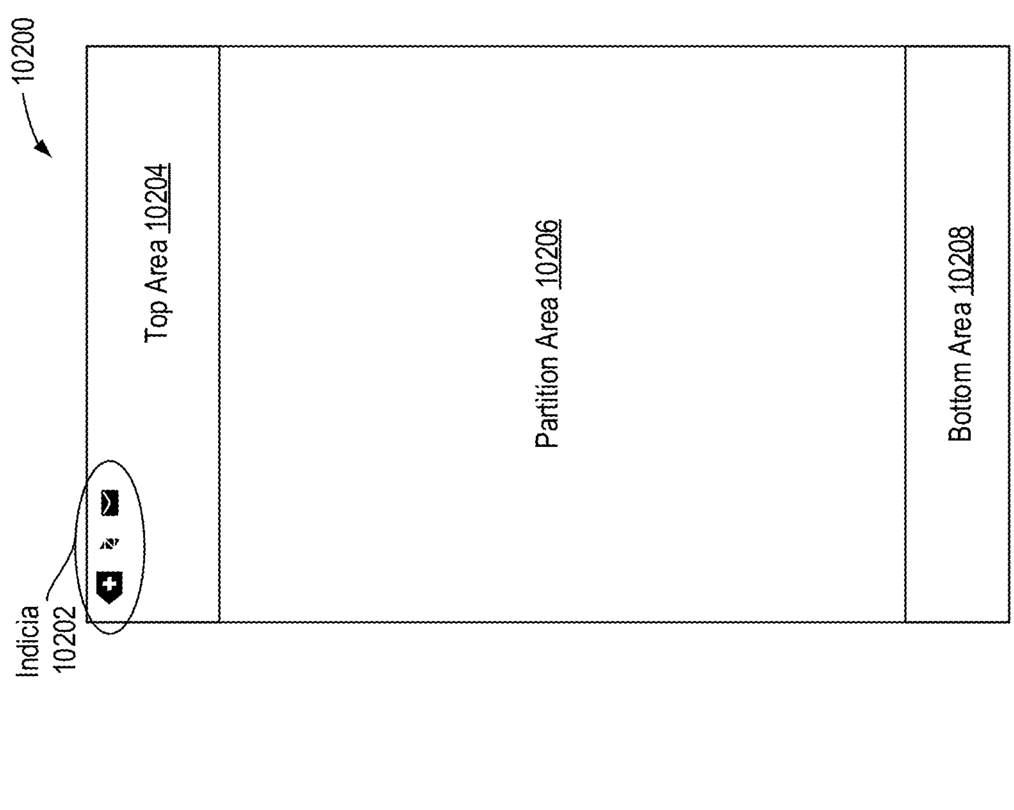
FIG. 56 illustrates a representative generic user interface arrangement for the mobile wireless communication device in accordance with some embodiments.

FIG. 56 illustrates a representative generic user interface (UI) arrangement 10200, for a mobile wireless communication device 100, including a top area 10204, a bottom area 10208 and a partition area 10206 in between the top area 10204 and the bottom area 10208. In some embodiments, the top area 10204 is used for information about the mobile wireless communication device 100 and for services available to the mobile wireless communication device 100. In some embodiments, one or more indicia 10202 are placed in the top area 10204. In some embodiments, the indicia 10202 are dynamically updated, in real time or in near real time, to indicate information about the mobile wireless communication device 100 and/or about one or more services available to or in use on the mobile wireless communication device 100. In some embodiments, the top area 10204 is always visible when the UI 101 of the mobile wireless communication device 100 is on. In some embodiments, the bottom area includes additional information related to services available to the user of the mobile wireless communication device 100. In some embodiments, one or more icons are placed in the bottom area providing information and/or links to additional information. In some embodiments, the bottom area is dynamically sized to change in size, thereby covering different amounts of area of the bottom area 10208 of UI 101.

Figure 57:
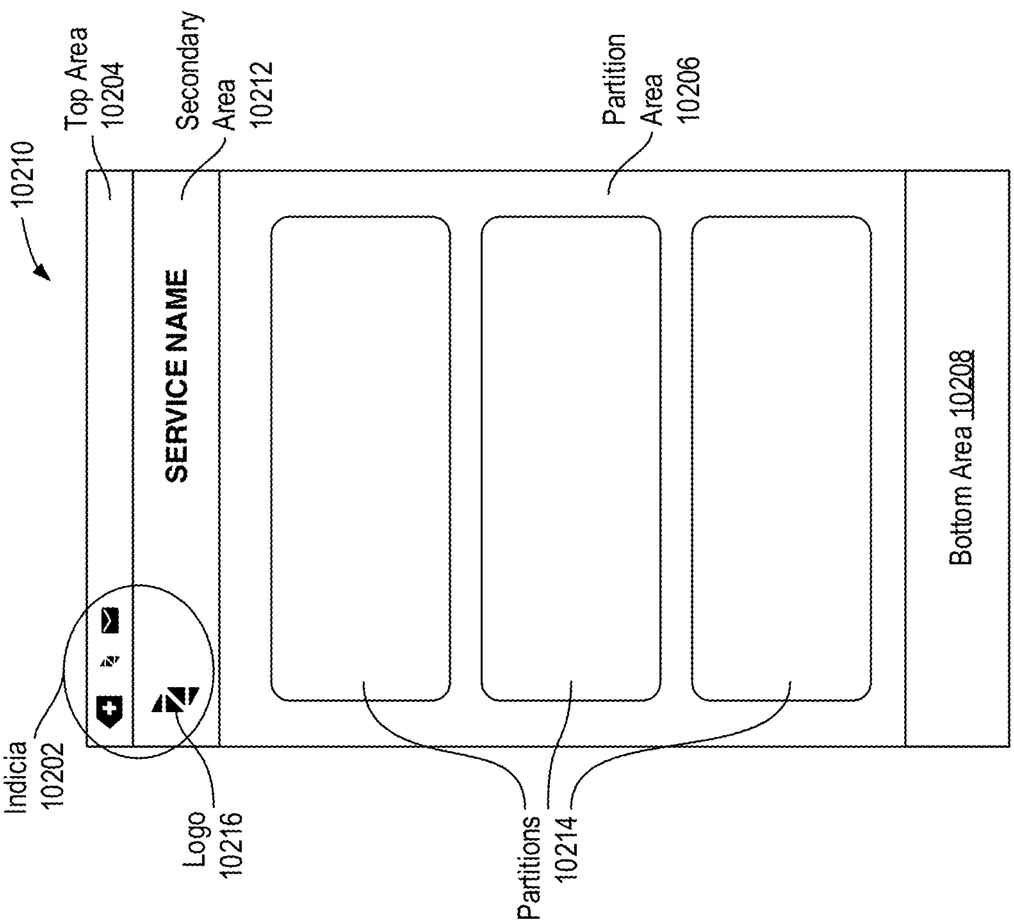
FIG. 57 illustrates the representative generic user interface arrangement of FIG. 56 including partitions in which to present service information to a user of the mobile wireless communication device in accordance with some embodiments.

FIG. 57 illustrates a representative generic UI arrangement 10210 including the indicia 10202 distributed along the top area 10204 and within a secondary area 10212. In some embodiments, the indicia 10202 include a logo 10216 that is displayed in the secondary area 10212 alongside a service name. In some embodiments, the partition area 10206 includes one or more distinct partitions for services available to, installed on, subscribed to or otherwise accessible by the user of the mobile wireless communication device 100. In some embodiments, the partition area 10206 includes multiple partitions 10214 that display information about services available to or accessible by the user of the mobile wireless communication device 100.

Ambient Services

In some embodiments, improved and simplified processes for provisioning a device or user for service on a central provider network, an MVNO network or a virtual service provider (VSP) on the central provider network are provided. In some embodiments, provisioning includes one or more of the following: a process or result of assigning, programming, storing or embedding into the device and/or network a set of credentials, or otherwise providing the credentials to the user; the credentials being at least in part carried on the device or with the user; and/or at least a portion of or a counterpart to the credentials being stored or recognized by the network so that the various network elements responsible for admitting the device access to the appropriate service activities do so once the device or user service is active.

As an example, as discussed herein, the credentials can include one or more of the following: phone number, device identification number, MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider, OEM, master agent (service distributor), VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user.

In some embodiments, provisioning includes assigning, programming or embedding into the device and/or network the information to define the level of service activity, referred to as a service profile, that the device is authorized to receive. In some embodiments, provisioning also includes establishing the device settings and/or network settings to define an ambient activation experience in which the device user receives a set of services after (e.g., within a short period of time after) purchasing or otherwise obtaining or installing the device whether the device has or has not been registered and activated with the device user or device owner.

In some embodiments, ambient services or adaptive ambient services for a device (e.g., any type of device capable of communicating with a wireless network, including an intermediate networking device) or use of a service on a wireless network are provided. In some embodiments, the ambient experience is the user experience that is available at the time the device is sold in the event the user has not yet signed up for a service plan, or the device is not sold with a prepaid service plan or other required service plan. In some embodiments, an ambient service generally refers to a set of application access, network destinations, sources, and/or traffic control rules to enable an ambient service experience, and, in some embodiments, also includes a set of billing rules to keep an accounting of service usage for different service usages (e.g., various bill by account rules or service usage accounts). For example, the ambient experience is defined by an ambient service profile, an ambient service plan, the other service usage activity control policies, and/or the ambient service or ambient experience bill-by-account usage accounting and/or billing policies in effect in the network, on the device, on an intermediate networking device, or any combination thereof. For example, if the device service processor (e.g., on the device, the intermediate networking device, or both) is used in large part to define the ambient service profile, then the initial provisioning and activation settings in the service processor, and possibly the service controller, can define the user service upgrade offering choices, network destination access control possibilities, traffic control policies, mobile commerce transaction capabilities (e.g., which transaction websites, WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet based text services have access but email downloads do not), or other example service capabilities. Examples of the type of useful services that can be enabled with the ambient service techniques disclosed herein include the following embodiments. In some embodiments, a content purchasing service (e.g., books, news, magazines, music, video, games, and mobile applications) is facilitated in which the device access is partially, largely, or entirely limited to the device or network based applications, source/destination addresses, and/or content transfers required to properly implement the service, in which other applications, source/destination addresses and/or content types are partly, largely, or entirely blocked. In some embodiments, such ambient services can have service usage monitoring and accounting that is reported for one or more individual ambient services. For example, the service usage for a book storefront browsing and download service can be separately accounted for while other services such as a general Internet shopping or auction service, a music service, a picture upload and store/print service, a search and/or advertisement service can also each have individual service usage accounting, or in some cases, groups of services can have aggregate service usage accounting. In some embodiments, an ambient service is provided for the device prior to the time a user has paid for permanent or full time access services, which, for example, can include a service selection platform for allowing the device user to access certain limited network functions and/or resources, and to access those network resources necessary to choose a pay-for-service plan option. In some embodiments, the individual and/or group ambient service usage accounting can be transformed into one or more billing records in which the service usage for each ambient service is billed to an entity, which can be the business entity that provides the ambient service experience and/or transaction platform, or the end user, or the central service provider, or an MVNO service provider, or a distribution partner, or an OEM, or another entity interested in paying for one or more ambient services.

It will be apparent to one of ordinary skill in the art that allowing all of these services, and blocking other ambient user service attempts (e.g., unpaid large file size Internet downloads or uploads or movie viewing or other access that would consume bandwidth and cause the ambient service to be a potential source of losses for the service provider) is made possible by the service profile control capabilities of the service processor and/or the service controller. The bill by account embodiments, as discussed herein, in which each service activity can, for example, be separately tracked with the service monitor and other agents and server functions to produce a billing offset that allows categorization and mediation of different billing entities (accounts) provides the capability for the service provider to individually account for the costs of each ambient service element. This allows business models wherein the free access to the end user is paid for or partially paid for by one or more service provider partners who are billed for service access using the bill by account capabilities (e.g., the transaction partners pay for user access to their transaction experience and perhaps pay a revenue share for transaction billing, the advertising sponsored website partners pay for their access service share).

While the service control capabilities of the service processor and the bill by account service cost sharing and transaction revenue sharing in some cases can create a profitable ambient business model, in other cases, the ambient services can be a potential source of losses for the service provider. Accordingly, in some embodiments, the ambient service capabilities can be modified over time to reduce service cost to the service provider or VSP based on a variety of decision factors. For example, the user can have one level of traffic control for a period of time, and if the user has not signed up for service by the end of the period or if the user is no longer in good standing (e.g., based on various service usage criteria) for use of the service, the ambient service access is reduced (e.g., the transmission speed can be reduced or throttled, and/or the total volume of data transmitted can be reduced or throttled, possibly additionally according to time of day parameters and/or network busy state parameters) by changing the service control policy settings in the service processor, and the service level can be further reduced over time if the user continues to not sign up for service or the user does not create much transaction revenue. In some embodiments, this can limit or prevent users from "camping" on free ambient services without generating any meaningful revenue to fund the service, or viewing any advertising to fund the service. In some embodiments, a user can be throttled in such a manner until the user executes a "useful activity" or a "preferred activity" (e.g., a purchase, viewing advertising, answering a questionnaire, signing up for a service, accepting a beta trial, and/or earning valued customer points), and after a useful or preferred activity occurs, then the access capabilities of the device are increased. As another example, the recursive throttling algorithms discussed herein can be utilized to one or more of the service activities offered in ambient service mode so that the user experiences what full speed service is like, and if the user continues consuming appreciable bandwidth with the service activity, then the activity is throttled back to reduce costs until or unless the user selects a pay-for-service plan (or accumulates sufficient service access points as described herein). In these examples, the service processor or service controller can issue the user a notification explaining that their service is currently free so their usage is being throttled, and if they desire to receive better service, service plan upgrade offers can be delivered to the user interface (UI). In some embodiments, the level of access (e.g., ambient service bandwidth and/or transfer limits, reachable addresses beyond the ambient service, and/or bandwidth or transfer limits for open Internet usage and/or email usage, text usage) is increased as the user increases the number of useful or preferred activities (e.g., the user accumulates "service access points," which are then spent on access activities). It will now be apparent to one of ordinary skill in the art that the various ambient service parameters including various provisioning and activation processes used to provide an ambient service, can also be managed by various virtual service provider (VSP) techniques. For example, this allows the same service controllers and service processor solutions to be used to define a wide range of ambient experiences for various device groups or user groups that are controlled by different VSPs.

Similarly, rather than controlling ambient service profile settings using the device assisted services functions and/or VSP functions to control the service controller, service processor, provisioning and activation settings, various other embodiments call for the ambient service profile settings to be controlled by various network based service activity control equipment as similarly described herein and/or by various intermediate networking devices. For example, depending on the level of service control and service monitoring sophistication (e.g., advanced DPI (Deep Packet Inspection), TCP (Transmission Control Protocol) session aware techniques, or other service aware techniques), some, much, most or all of the above described ambient services functionality can be implemented using network based service controls and various VSP management and control techniques. Similarly, in some embodiments, service processor, provisioning and activation settings, and the ambient service profile settings can also be (at least in part) controlled by various intermediate networking devices. In some embodiments, network equipment that can provide ambient service controls include, for example, service gateways, routers, charging functions, HLRs, home agents, proxy servers, and other network equipment as would be apparent to one of ordinary skill in the art.

Whether the ambient service monitoring and control apparatus is implemented with device assisted service techniques, network based techniques, or a combination of both, various embodiments described herein provide for adaptive ambient service embodiments that address the dynamic (e.g., non-static) nature of Internet service access needs (e.g., allowable source/destination and/or application lists, blocked source/destination and/or application lists, traffic control policies for each source/destination and/or application).

Providing an ambient service profile for an ambient service can be complicated by the variable nature of network addresses and offered services such as, for example, the Internet. For example, a central service provider, MVNO provider or VSP may desire to provide ambient service access to a given web site partner's web service, in exchange for a business deal with the website partner that motivates the service provider to provide the ambient access. In this example, the ambient access is intended to enable access (either wide open or throttled) to the website partner's collection of URLs (and possibly one or more applications) associated with the service, while blocking or differentially throttling access to other network destinations and/or applications not associated with the web site partner services. A problem can arise in this example whenever the website partner changes the addresses and/or domains associated with the website services, because any static access list and access list policies generally makes a static list impractical. In such cases, the adaptive ambient service embodiments described herein provide a solution to these and other problems, whether the adaptive ambient access controls and/or traffic controls are implemented with device assisted service apparatus, network based apparatus, or a combination of both.

As another example, an ambient service profile for a transaction service provider can include that service provider's domain or web site as an allowed destination. However, there are often inline advertisements provided by ad servers and/or partner sites that should also be included in the set of allowed destinations in the ambient service profile, and these are often dynamic or frequently changing. As another example, an ambient service provider may not want to allow access to sites that typically involve relatively high data usage (e.g., streaming and/or downloading of video content), while allowing other sites that result in less bandwidth intensive service usage activities. As another example, during a session a user may attempt to surf out of the ambient service, such as when the user attempts to access a website or service that is not an allowed or pre-approved destination in the ambient service profile (e.g., a search site can be the pre-approved ambient service, but the ambient service partner paying for the search service access may desire to also allow and pay for user click-through to search results and/or advertising offers, or, for example, an ambient shopping service sponsor may desire to also pay for click-through to vendor partners sites to provide a purchase transaction opportunity to the user). Moreover, the defined ambient service profile quickly stagnates as various applications and destinations, for example, change over time or on each request/usage (e.g., new applications become available and/or web site content and link changes occur daily if not hourly and/or are dynamically generated using well known web site techniques). Thus, what is needed are adaptive techniques for providing an adaptive ambient service.

Accordingly, in some embodiments, adaptive ambient services using an adaptive ambient service profile are provided. In some embodiments, a flexible and efficient adaptive ambient service control is provided by using an intelligent element in the network that performs one or more of the following functions: (1) beginning with an initial list of allowable ambient service device access behaviors (e.g., addresses/URLs, applications and/or content types, in some cases, with a set of traffic control policies that are differentiated as discussed above), (2) as the user accesses the ambient service, determine if the access behavior of the device is within or outside of the desired ambient service access and/or traffic control policies (e.g., determine if the access behavior is properly associated with the desired ambient services and/or service policies), (3) for those access behaviors that are within the desired ambient service policies, expand the list of allowable ambient service device access behaviors to include the new behaviors that are desired and/or preferred (e.g., new sub-domains, advertising content sources, transaction partner addresses, and/or desired surf-outs), (4) for those device access behaviors that are outside of the desired/preferred ambient service policies (e.g., are not associated or beneficially associated with the desired/preferred ambient service), expand the list of blocked or differentially throttled ambient service device access behaviors to include the new behaviors that are undesired or less desired (e.g., not preferred). In some embodiments, the intelligent network element used to adapt the ambient service control is included in one or more network equipment functions (e.g., service gateways, routers, charging gateways, HLRs, AAA, base station, service controller, and/or other network equipment functions). In some embodiments the intelligent network element used to adapt the ambient service control is included in the device and/or intermediate networking device service processor. In some embodiments, the intelligent network element used to adapt the ambient service control is included in a combination of the device (and/or intermediate networking device) and one or more network equipment functions.

In some embodiments, a flexible and efficient adaptive ambient service is provided using a baseline (e.g., a basic starting point) of an adaptive ambient service profile that includes default or previously defined (e.g., by an ambient service provider, network provider, VSP, or another entity) allowable access list and disallowed access list for the ambient service, such as to various applications, destinations, sources, traffic control rules, and/or bill by account rules or a combination thereof. In some embodiments, the ambient service profile is an automated and a self-evolving service profile using various techniques, such as those described herein.

In some embodiments, an adaptive ambient service includes providing an ambient service profile. In some embodiments, the ambient service profile includes ambient service allowed access rules and ambient service disallowed access rules. In some embodiments, the ambient service profile further includes ambient service monitored access rules, in which access to, for example, certain applications or destinations is allowed but is considered suspect or unknown, and thus, such access is monitored (e.g., until that application or destination is reclassified under an ambient service allowed access rule or ambient service disallowed access rule). In some embodiments, the ambient service allowed/disallowed/monitored access rules include IP addresses, domains (e.g., URLs for web sites), or any other unique network destination or application or source identifiers. In some embodiments, the ambient service rules provide differentiated traffic control rules. In some embodiments, the differentiated traffic control rules provide differentiated bandwidth and/or total data transfer limits according to traffic control policy elements, such as activities associated with the main ambient service functions (e.g., the main partner website or a transaction service), activities associated with secondary ambient service functions (e.g., a secondary surf-out website or a less desired service activity), activities transferring different content types, activities associated with different applications, activities based on time of day, activities based on network busy state, activities that require higher or lower QOS (Quality Of Service), and/or other activities.

In some embodiments, the ambient service allowed access rules and/or ambient service disallowed access rules are pushed to (e.g., published, at predefined times, during low service usage times or periods of low service usage activities, or upon request) the device or the intermediate networking device (e.g., any type of networking device capable of communicating with a device and a network, including a wireless network, example intermediate networking devices include a femto cell, or any network communication device that translates the wireless data received from the device to a network, such as an access network) from the network (e.g., an element in the network that securely provides such data, such as a service controller for the ambient service). In some embodiments, the ambient service allowed access rules and/or ambient service disallowed access rules are pulled by (e.g., at predefined times, during low service usage times or periods of low service usage activities, or upon request) the device or the intermediate networking device from the network (e.g., an element in the network that securely provides such data, such as a service controller for the ambient service).

In some embodiments, the device or intermediate networking device includes techniques for automatically adapting the service profile based on ambient service usage and thereby updates the ambient service allowed access rules, the ambient service monitored access rules, and/or ambient service disallowed access rules locally. Device access activities that fall into the monitored access rules are those activities that are determined not to be disallowed (as of that point in time) and are allowed to take place while the intelligent adaptive service element tests the activities on the monitored access rules list to determine if they should be moved to the allowed access rules list, should be moved to the disallowed access rules list, or should remain on the monitored access rules list for further testing and/or observation. In this way, a useful and friendly user experience can be maintained as the adaptive ambient service rules undergo "training" to accommodate dynamic changes to the ambient service sites/applications. The device or intermediate networking device can then periodically provide the updated ambient service allowed access rules, ambient service monitored access rules, and/or ambient service disallowed access rules with the network using various network communication techniques, such as those described herein. In some embodiments, the device periodically synchronizes its locally stored ambient service allowed access rules, ambient service monitored access rules, and/or ambient service disallowed access rules with the network using various network communication techniques, such as those described herein. In some embodiments, the training for one or more of the three lists occurs on the device. In some embodiments, the training for one or more of the three lists occurs in the network. In some embodiments, the training for one or more of the three lists occurs partly on the device and partly in the network (e.g., depending, in some cases, on the device (such as the computing/memory capacity of the device), network bandwidth, and/or any other architecture criteria).

It will now be apparent to one of ordinary skill in the art that the various ambient service parameters, including the provisioning and activation processes used to create the ambient service activation, can also be managed by the VSP apparatus and processes described herein. For example, this allows the same service controllers and service processor solutions to be used to define a wide range of ambient experiences for various device groups or user groups that are controlled by different VSPs.

Similarly, rather than controlling the ambient service profile settings using the VSP functions to control the service controller, service processor, provisioning and activation settings, other embodiments call for the ambient service profile settings to be controlled by the network based service activity control equipment as similarly discussed herein. Depending on the level of service control and service monitoring sophistication (e.g., highly advanced DPI or service aware techniques), some, much, most or all of the above described ambient services functionality can be implemented using network based service controls and the VSP management and control embodiments described herein.

In some embodiments, an adaptive ambient service includes implementing an ambient service profile for assisting control of a communications device use of an ambient service on a wireless network, in which the ambient service profile includes various service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service. In some embodiments, these techniques are performed by the communications device (e.g., using a service processor), a network element/function (e.g., using a service controller, proxy server, and/or other network elements/functions/devices), and/or an intermediate networking communications device and, in some embodiments in various combinations with each other and/or with other functions/elements on the network/in communication with the network. In some embodiments, the service policy settings include one or more of the following: access control settings, traffic control settings, billing system settings, user notification with acknowledgement settings, user notification with synchronized service usage information, user privacy settings, user preference settings, authentication settings, admission control settings, application access settings, content access settings, transaction settings, and network or device management communication settings.

In some embodiments, the ambient service profile is implemented at least in part by a proxy server, in which the monitored use of the ambient service based on the ambient service profile is performed at least in part by the proxy server, and in which the proxy server communicates the ambient service traffic to the communications device. In some embodiments, the ambient service plan allows for access to the ambient service with limited service capabilities that are limited based on one or more of the following: period of time, network address, service type, content type, application type, QOS class, time of day, network capacity (e.g., network busy state), bandwidth, and data usage. In some embodiments, the ambient service plan is a low cost or free trial service plan that is bundled or provided as an option for purchase at a point of sale of the communications device. In some embodiments, the communications device is activated prior to a point of sale of the communications device, and the ambient service plan is associated with the communications device during activation. In some embodiments, the ambient service plan is associated with the communications device during one or more of the following: a manufacture of the communications device, a distribution of the communications device, or a point of sale of the communications device. In some embodiments, the ambient service plan includes an option to purchase a new service plan for the communications device, in which the new service plan includes additional service capabilities. In some embodiments, the ambient service profile is programmable by one or more of the following: a manufacturer, a service provider, a distributor, a virtual service provider, and a device manager.

In some embodiments, the ambient service is a transaction based service, in which service usage for the ambient service by the communications device is not billed, and in which electronic commerce based transactions performed using the communications device are billed as transaction based charges. In some embodiments, the ambient service is a transaction based service, in which electronic commerce based transactions performed using the communications device are billed as transaction based charges, and in which at least a portion of service usage costs are billed to one or more of the following: an advertiser, a transaction provider, a mobile virtual network operator, a virtual service provider, and an ambient service provider.

In some embodiments, the communications device is a mobile communications device or an intermediate networking device, and the ambient service includes one or more Internet based services. In some embodiments, the communications device is a mobile communications device, and the ambient service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem.

In some embodiments, the various techniques for adaptive ambient services are performed (e.g., at least in part) on the device (e.g., device 100) and/or on an intermediate networking device (e.g., using a service processor 115 and an ambient service profile). For example, the various techniques for adaptive ambient services can be performed on a processor of the device, and the ambient service profile can be securely stored locally on the device using various techniques for secure execution and storage.

In some embodiments, the various techniques for adaptive ambient services are performed on the device or on the intermediate networking device with assistance or verification from the network (e.g., a service controller 122 executed on any network element, in which the service controller 122 is in secure communication with the device/intermediate networking device, including the service processor 115 executed on the device/intermediate networking device). In some embodiments, adaptive ambient services are performed on the device or on the intermediate networking device with assistance or verification from the network (e.g., using a service controller for maintaining a centralized set of ambient service allowed access rules and/or ambient service disallowed access rules, and a superset of all ambient service monitored access rules, working cross device population). In some embodiments, the service controller 122 or other network element(s) assist the device for implementing these techniques for adaptive ambient services (e.g., cross device, cross URL/domain usage patterns/monitoring, publishing centralized set of ambient service allowed access rules, ambient service monitored access rules, and/or ambient service disallowed access rules, including, for example, compromised and/or hacked URLs). In some embodiments, the service controller 122 or other network element(s) assist the device for implementing these techniques for adaptive ambient services by verifying the device maintained set of ambient service allowed access rules, ambient service monitored access rules, and/or ambient service disallowed access rules. In some embodiments, the service controller 122 or other network element(s) assist the device for implementing these techniques for adaptive ambient services by verifying the device monitored service usage with CDR service usage using various techniques, for example, such as those described herein. In some embodiments, the service controller 122 or other network element(s) assist the device for implementing these techniques for adaptive ambient services by verifying the device monitored service usage by IP address (e.g., using CDR by traffic destination).

In some embodiments the various techniques for adaptive ambient services are performed on the network (e.g., a gateway, router or any other network element using, for example, deep packet inspection (DPI) on the monitored (non-encrypted) network traffic).

In some embodiments, a device is suspended based on inactivity, or the device is placed in a suspended service state or suspended account state, so that the network does not get bogged down with a significant number of devices and credentials that are inactive. For example, this can also result in a portion of the device credentials being assigned back to an available pool rather than reserved for that particular device (e.g., phone numbers if phone numbers are scarce). The device account and/or activation state can be re-activated when the device comes back online. For example, the suspend state can be a simple suspension of services without changing the account status, in which case the re-activation process can be automatically completed as a subset or entire set of the activation sequence that occurs when the device is initially used as described herein. The suspend state can also involve changing the account status to inactive, in which case the re-activation process can automatically reconfigure the account status back to an active state when the device re-accesses the network. For example, the suspend state can involve de-assigning or possibly re-claiming a portion of the device credentials. If a portion of the credentials is de-assigned, then when the device re-accesses the network credentials can be automatically re-assigned as described in various embodiments described herein.

Provisioning and Activation

In some embodiments, automated provisioning and activation includes automation of one or more of the following functions: (1) programming device credentials or partial credentials and recording them in a database (or providing same when they are programmed into the device), (2) associating these credentials with the proper provisioning and/or activation actions to be taken on the device and in the network, (3) directing the device to the proper activation function (e.g., activation server) sequence when it attempts to connect to the network, (4) completing provisioning of the device, (5) programming the AAA, billing system, gateways, mobile wireless center and other network equipment to the proper initial device service control settings, and (6) establishing a service account for the device.

In some embodiments, improved processes for activating service for a device or user with a network service provided by a central provider network, an MVNO network or a VSP on the central provider network are provided. In some embodiments, activation includes one or more of the following: a process or result of associating a service account with device or user credentials; with the service account potentially further being associated with a service profile defining the service activities that the device is authorized to access; creating or updating a service usage or billing record and associating it with the service account to create a service plan; and/or initiating service to the device or user in which the network equipment allows access to the appropriate level of service activities. In some embodiments, VSP embodiments include the provisioning and activation apparatus embodiments of any or all forms.

In conventional mobile device provisioning systems, the provisioning and activation process required to create a user service account and enable the device to access the desired level of service activities can limit mass market, low cost or user friendly applications of the device or service, because the process can often be cumbersome, time consuming and/or expensive for the service provider, service owner, master agent (service distributor), MVNO, VSP and/or user. Accordingly, the various embodiments for provisioning and activation described herein simplify the provisioning and activation process for mobile devices. In some embodiments, provisioning and activation for the device and/or the network accommodates a wide variety of device types and service profile types, with the capability to perform the provisioning and activation at a number of points in the manufacturing, distribution, sales and usage progression for the device, and the ability to either pre-activate before first device use or very quickly activate during first device use (or during some later use of the device).

In some embodiments, as described herein, the term provisioning generally refers to those actions/processes associated with programming the device with credentials or other device settings or software installations used to later activate the device, as well as, in some embodiments, creating database entries and other credential associations in the network so that the network and/or device have the information used to recognize the device or credentials and implement the service policies in the service profile and/or service plan once the service profile and/or service plan are activated. In some embodiments, as described herein, the term activation generally refers to the process of creating or selecting the service plan and/or service profile, programming the settings that are used in each (e.g., required) network function and/or each (e.g., required) device function so that the system can properly associate the device credentials with the appropriate service activity policies, and then admitting the device onto the network. The term activation can also refer in some embodiments to the creation of a user or device service account, in some cases, with user or device owner information or billing information. In some embodiments, the process of provisioning amounts to assigning credentials to the device and programming a portion or all of the credentials on the device, entering a portion or all of the credentials in the various necessary network equipment databases so that the network components are capable of identifying the device and associating it with the network based portion of the admission, traffic processing, service monitoring, billing, service limits and other policies that are eventually defined by the service profile and service plan.

Further examples of the network based service profile policies include network access level, traffic routing, service monitoring, service limits and actions taken upon reaching service limits. Once the service profile is created and activated during the activation process, the device credentials and the associated service profile are communicated throughout the necessary network elements so that each element can implement its part of the network portion of the service profile policies. This process of propagating the service profile settings to all the required network equipment components is a portion of what is referred to herein as activation in accordance with some embodiments. In some embodiments, the activation process includes associating the credentials with the proper service plan and/or service profile, and possibly completing the process of programming the device functions and/or network functions so that the device can be admitted to the appropriate level of network services. In some embodiments, activation also includes the service processor software settings, configurations or installs for each function or agent in the service processor to implement its part of the service profile, service plan, service billing or transaction billing policies. In some embodiments, activation also includes the creation of entries in the various service account databases and/or billing databases to create a user account or device owner account for the purpose of managing the user choices for service plan and other account information storage and management aspects, such as maintaining status information, maintaining the central service profile configuration, conducting reconciliation and billing exchanges, service usage history, and/or account history.

In some embodiments, the term credentials generally refers to the set of information parameters that the network and/or device uses (e.g., requires) to admit the device onto the network and associate it with the appropriate service profile and/or service plan. For example, the credentials can include one or more of the following: phone number, device identification number, MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider, OEM, master agent (service distributor), VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user. In some embodiments, at least some of the credentials are unique to the device, and, in some embodiments, groups of devices share one or more aspects of the credentials. In some embodiments, the term permanent credentials generally refers to the set of credentials that includes at least a subset that are intended to be assigned to a device or user on a permanent basis. In some embodiments, the term temporary credentials generally refers to the set of credentials that includes at least a subset that are intended to be assigned to a device or user on a temporary basis. In some embodiments, temporary credentials are eventually replaced by permanent credentials. In some embodiments, at least some elements in the temporary credentials (e.g., phone number and/or access or authorization security credential) are used for more than one device. In some embodiments, the temporary credentials are recycled from one or more devices and used for one or more other devices, for example, when they remain unused for a period of time or when they are replaced with permanent credentials on one or more devices. It should not be inferred from the term permanent credentials that permanent credentials are never recycled, for example, when the user discontinues service or use of the credentials. Also, the term temporary credentials does not imply that temporary credentials are always temporary. In some embodiments, partial credentials or pre-activation credentials generally refer to a subset of credentials that are to gain access to limited network services for the purpose of provisioning of credentials and/or activation of a service plan or service profile. For example, prior to a phone number being assigned, a device can gain access to a limited set of network server destinations in which embedded information contained in the device (e.g., the partial credentials) is provided to the server, the server associates that information with the proper additional credentials (including the phone number) to assign to the device and/or associates the information with the proper service profile to activate service. In this example, partial credentials can include device type, OEM, service provider, VSP, device identification number, SIM, service processor configuration or some other information used by the server to determine what the credentials should be and the proper service profile.

In some embodiments, a permanent service account generally refers to the service account that is permanently associated with the user and/or device. For example, this account includes an association with the device or user credentials, user information or billing information, service profile, billing profile, network authorization status and other aspects that define the device or user service policies and billing policies. In some embodiments, the term temporary service account generally refers to a service account that is temporarily set up and associated with the device before some or all of the required permanent account information is available or entered for a device or user. For example, this account can be set up with an association with an actual user, or can be set up with a mock user or unassigned user association so that the network and billing system can recognize the credentials, authenticate the device, admit the device, provide the proper level of service activity control according to the service profile associated with the temporary service account, or collect the service activity usage information for various network and billing system accounting needs before actual user information or billing information has been entered into the network systems. For example, a temporary service account can make it possible or easier to use existing billing systems or other network systems to provide simplified provisioning, simplified activation or ambient services. A temporary service account can also become a permanent service account by replacing mock user or unassigned user information with actual user information, or a temporary service account may need to be replaced by a permanent service account when actual user information needs to be entered into the network systems, possibly including the billing or service profile databases.

In some embodiments, temporary or permanent device credentials and other information used/required for provisioning the device are generated with apparatus located at the manufacturer or in the distribution channel as discussed below. In some embodiments, the apparatus includes a local onsite server that typically shares some aspects of the provisioning information (e.g., phone number, phone number range, MEID or MEID range, SIM number or SIM number range, IP address or IP address range, MAC address or MAC address range, other secure device credential elements) with a network provisioning database. In some embodiments, the apparatus includes a server terminal, and the aforementioned portion of the credentials is generated by the network and shared with the local provisioning apparatus. In some embodiments, as will be discussed below, the provisioning credentials are in part generated in the network and shared with the device while it is connected online to an activation server (e.g., activation server 160) that is connected to the access network. Similarly, there can be activation servers connected to apparatus in the manufacturing or distribution channel that service device activation, or over the air or over the network apparatus connected to an activation server, which in turn connects to the device, can be used to accomplish activation programming of the network and device as further discussed below.

In some embodiments, when a device is provisioned and entered into the network provisioning database, it is associated with the automatic provisioning and/or activation sequence the device is intended to go through once it connects to the network or to the apparatus that will complete the process. In some embodiments, one or more device parameters (e.g., service owner, device type, OEM, plan type, IP address, security credential and/or software version) are used to determine what the appropriate network provisioning steps and/or settings are for completing the provisioning and/or activation process, and this association information is stored in the network provisioning database for propagation of the provisioning profiles or activation profiles to the various network equipment elements. In some embodiments, the network provisioning database is provided (e.g., in the network) that associates the pre-activation provisioning information (e.g., generated, as described herein, at time of manufacture, sometime during distribution, by the user on a website by a sales associate or other activation assistant, or by the network when a new device enters the automatic activation process). For example, the pre-activation provisioning information informs the network whether or not to let the device onto an activation sequence when the device attempts access, and in some cases, also instructs the network to direct the device to a specific activation sequence including, for example, an activation server (or other activation sequencing apparatus) sequence as described herein. In some embodiments, a central database is queried by other network equipment or the central database is included in one or more of the network elements (e.g., the AAA server and/or billing system, mobile wireless center 132), or the database is copied in part or in whole in various network elements (e.g., the central database, AAA server, mobile wireless center, billing system and/or gateways).

In some embodiments, propagating the network equipment provisioning information for a given device or group of devices is accomplished with a network provisioning system that has access to the network provisioning database and is capable of programming the appropriate network equipment. In some embodiments, this network equipment is referred to as "network management" equipment or "network provisioning" equipment. In some embodiments, there are several functions that take part individually or in concert, including, for example, the AAA server 121, service controller 122 (either with device based/assisted services through the service processor related embodiments or with network only embodiments as described herein), the mobile wireless center 132 (e.g., including the home location register (HLR) or other similar function referred to by other industry terms), the activation server(s) 160, other network provisioning or management equipment attached to or associated with the billing database system, and/or some other equipment apparatus. In some embodiments, the local database on the device, database in the AAA server and/or database elsewhere in network is provisioned to inform the gateway of the process for handling the pre-provisioned device according to, for example, the credentials. For example, if the device is not recognized or not authenticated onto the access network as an activated device with associated active service profile and/or service plan, the device connection or communication can be directed (or routed) to a generic activation server that provides an activation sequence that is not necessarily determined by one or more of the specific device credential elements, partial credential elements, device profile or partial device profile that define something specific about the activation sequence for the device. In another example, in which the device is not recognized or authenticated as an activated device with associated service profile and/or service plan, the device can be directed (or routed) to an activation service (or other activation sequencing apparatus) that uses some part of the credentials or range of partial credentials or a portion of a partial or complete device profile to determine a desired pre-determined device specific or device group specific activation sequence that is implemented by a specific activation service sequence or other activation sequence apparatus. In another example, in which the device is not recognized or authenticated as an activated device with associated active service profile and/or service plan, a portion of the device credentials or partial credentials can be used as a look-up index into a database that determines what the specific device activation sequence should be, and the device can be directed (or routed) to a specific activation server sequence or other activation sequencing apparatus.

In some embodiments, a database in the AAA server or database elsewhere in network is provisioned to inform the gateway what to do with a pre-provisioned device according to the credentials. For example, devices can be authenticated (for activated devices), routed to activation servers (or other activation sequencing apparatus) or denied access. In some embodiments, the AAA server (and/or other network elements) provide the above discussed look-up function for the above gateway description in which a lookup database, locally stored or stored in a central database, is queried to provide secondary routing information to the specific or generic activation servers.

In some embodiments, the pre-provisioned database is located in the billing system. In some embodiments, the billing system accesses the pre-provisioned database (e.g., stored on the billing system or another network element) for the purpose of setting up temporary accounts or permanent accounts and associating those accounts with pre-activation status, activated free ambient or activated paying customer.

In some embodiments, for zero activation, all the required pre-provisioning or programming of the above network elements, or others, is coordinated by the network provisioning system at some point after the partial or full device credentials have been associated with the device or reserved for a particular device type or service type. In some embodiments, the network provisioning system also coordinates the information to or from the device provisioning apparatus that is described elsewhere.

In view of the various embodiments described herein, it will be appreciated that many of the automated or background provisioning, activation and ambient embodiments described herein can be accomplished with network based approaches, device based approaches, or network/device combination/hybrid based approaches. For example, when the access control for the provisioning process is accomplished in the device (e.g., a device based approach), the activation server can be located anywhere on the Internet, and the device will ensure that the activation process is conducted with the activation server while blocking other traffic from occurring. As another example, some or all of the ambient provisioning programming steps become steps to program the access control, traffic control, application control, bill by account rules, and/or other aspects in the service processor or service controller as described herein.

In some embodiments, the provisioning apparatus described herein can be a computer located in the user's home or business, and the user or an IT manager has access to a website that provides the provisioning information, in which the computer serves as the provisioning or software programming apparatus. In some embodiments, the network itself, possibly through an activation server 160, website or other interface to the device, becomes the provisioning apparatus, in some cases, with the assistance of software on the device to affect the programming of provisioning information from the network or the communication of device credentials or other information to the network. For example, this software can be a background process that runs without user interaction, a portal/widget program, a web browser based program, a WAP browser based program, and/or any other program that provides a counterpart function to the network functions effecting the provisioning (e.g., activation server). In some embodiments, the activation server either initiates a specific provisioning sequence if device software is present to assist or routes to a website for manual entry if there is no software present.

Figure 8:
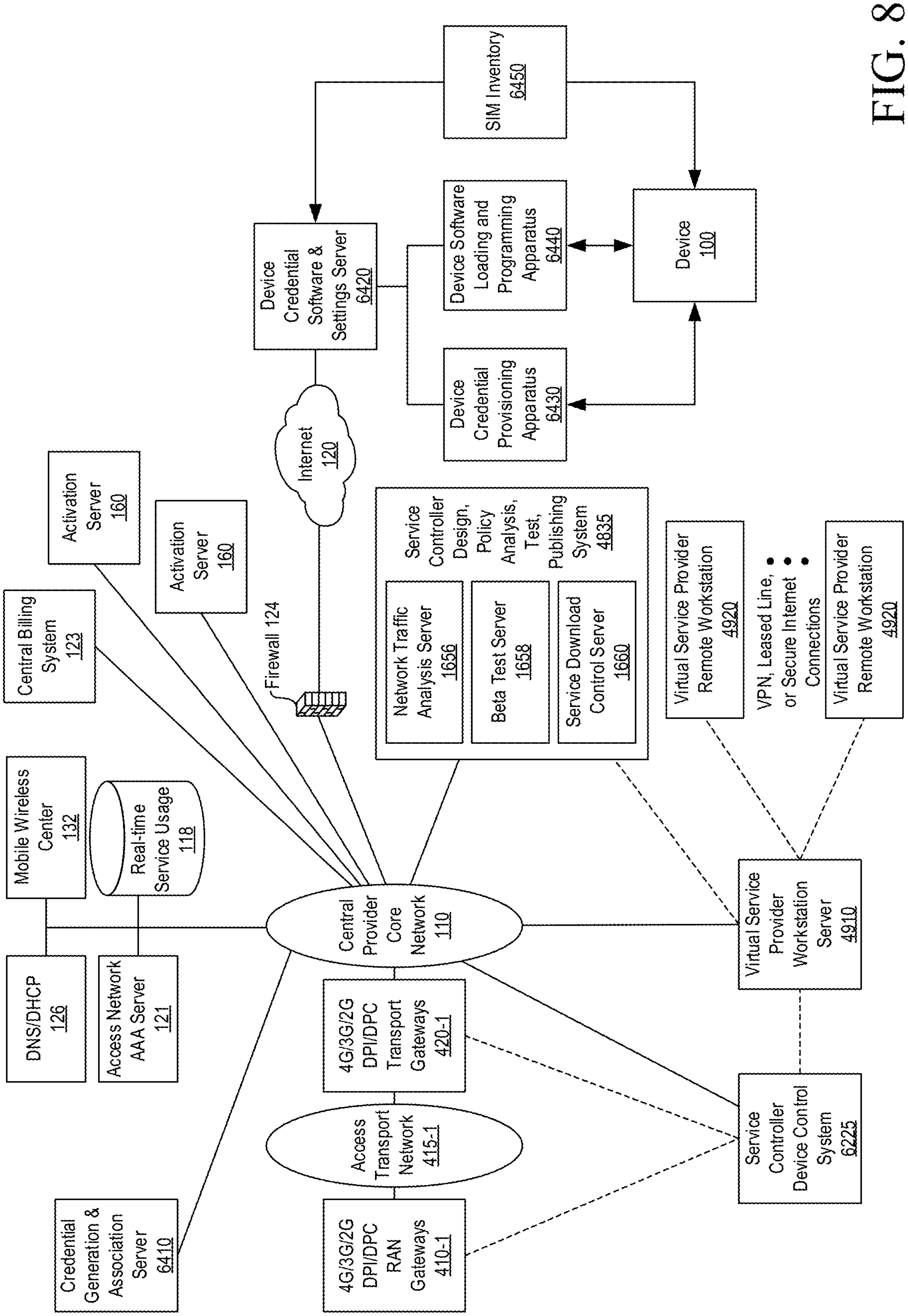
FIG. 8 illustrates a network architecture including a system located in the manufacturing or distribution chain that provides for provisioning, partial provisioning, and/or pre-activation in accordance with some embodiments.

FIG. 8 illustrates another network architecture including a system located in the manufacturing or distribution chain for the device that provides the device provisioning or partial provisioning, and any pre-activation required for the device to later activate on the network in accordance with some embodiments. Device credential, software and settings server 6420 provides a link to the network functions that generate or provide device credentials, and/or associate device credentials with activation profiles or pre-activation profiles in the network equipment (e.g., the billing system 123, service controller device control system 6225, gateways 410-1, 420-1, base station, credential generation and association server 6410, activation server 160, service download control server 1660 and/or other network apparatus). For example, the link between the device credential, software and settings server 6420 to the central provider core network equipment can be over the Internet 120 (e.g., a secure link over the Internet) as shown or over another connection such as a leased line. The device credential, software and settings server 6420 obtains credentials or partial credentials from the network apparatus that generates them, illustrated by the credential generation & association server 6410. Credential generation & association server 6410 need not be directly connected to the central provider core network 110 as shown, but can be located elsewhere (e.g., in another location connected by a secure Internet link). Credential generation & association server 6410 assigns credentials, or partial credentials, for use by device credential, software and settings server 6420. When these credentials are assigned to a device, they are programmed, loaded or otherwise associated with the device by device credential provisioning apparatus 6430, which is connected to the device wirelessly or via a wire line connection.

In some embodiments, a device software loading and programming apparatus 6440 provides software loading or device settings functions that form a portion or all of the provisioning or pre-provisioning device configuration, or form a portion or all of the device activation profile configuration, or form the device service owner, master agent or VSP device assignment or signature, and in some embodiments, using an activation tracking service (ATS) system. As discussed herein, the ATS monitors network connections and aspects of traffic that provide insight into which networks the device 100 is gaining access to, in some embodiments, for the purpose of ensuring that an OEM, master agent, device service owner or VSP is being compensated for devices that activate on a service provider network. In some embodiments, the ATS agent connects to a server counterpart that records and, in some embodiments, also analyzes the service or network connection information to make a determination of the type of access service the device is receiving and, in some cases, determine which networks the device is activated on. In some embodiments, the ATS is installed on the device in a manner that makes it difficult to tamper with or remove so that the entity that is intended to get credit for device service activation does get credit (e.g., the ATS agent can be loaded into secure memory, it can be installed with software that makes it difficult to de-install, it can be installed on the modem possibly in secure memory, it can be installed in the BIOS, it can be installed deep in the OS kernel, it can be installed with one or more additional device agents that monitor the ATS agent and alert a network function or re-install it if tampered with). The SIM inventory 6450 is provided to illustrate that, in some embodiments, hardware elements (e.g., a SIM security module as shown) or hardware configurations are also installed or manipulated in device 100 and these operations and the recording of the resulting associations form a portion of the provisioning or pre-provisioning process.

In some embodiments, at the time the credentials or partial credentials are loaded, programmed, set, installed, read from the device or otherwise recorded, they are, in some cases, all associated together in a database that allows for later identification of the device and its appropriate provisioning and/or activation process through such associations. For example, this can involve reading device parameters such as MEID, MAC address, device type, or other information that is associated with the information being loaded or configured on the device. As discussed herein, this credential configuration and association information is stored in the network equipment responsible using it to configure the network to activate the device in one of the various embodiments disclosed herein.

Some embodiments include tying some or all of the activation provisioning steps and information settings together into a database that defines a higher level activation profile for a group of users(/devices), and a server is used to perform device and equipment programming for the devices in the group, including, for example, associating the following device information into the group definition: credentials, service owner or master agent, provisioning information and/or activation profile. Some embodiments further provide for this device group information being distributed to the various network equipment components required to activate the devices as discussed elsewhere. In some embodiments, this programming and device group association is accomplished using the VSP workstation server 4910. For example, a device can be manufactured and distributed in a manner that provides flexible assignment of the device to a group that is assigned to an activation profile or a service owner.

In some embodiments, multiple activation servers 160 are provided (as shown), which illustrates that there can be multiple device activation servers 160 each with a different device activation experience and potentially controlled by a different VSP, service owner, service provider, OEM or master agent. As discussed herein, there are several ways that a device 100 can be routed to the proper activation server 160 so that the device provisioning and activation process can be completed. In some embodiments, all devices that are not activated are re-directed (or routed) to an activation server that reads one or more parameters in the device credentials. The device credential information can be determined either through the device identification information associated with the access network connection itself (e.g., MEID, IP address, phone number, security credentials, or other credentials identified for a device that gains access with the network), or with the aid of the device in a pre-arranged query-response sequence. The device can then be re-directed (or routed) to the appropriate activation server for that device, device group, device service owner or VSP. In some embodiments, the same process described above can be accomplished with a single re-direction from a service gateway 420-1 or 410-1, or another router enable network element. In some embodiments, the gateway or network element itself decodes the device credential information as described herein and performs the correct re-direct (or route) to the appropriate activation server 160 for that device. In some embodiments, the activation server 160 can be incorporated directly into the gateway 420-1 or 410-1, the base station or other network component. In some embodiments, the activation server 160 can be incorporated into the service controller 122 or the service controller device control system 6225.

In some embodiments, apparatus other than the activation server are used to facilitate provisioning of credentials or partial credentials, or activation, during manufacturing or device distribution, and, for example, these apparatus can augment, supplement, compliment or replace the activation server function. Such apparatus include, for example, device programming equipment (e.g., device credential provisioning apparatus 6430, device software loading and programming apparatus 6440 or SIM inventory 6450), equipment that is networked into a central provider, MVNO or VSP database (e.g., device credential, software and settings server 6420) to gain access to provisioning information or activation information that is programmed into a device or group of devices, or to place device credential or partial credential information in a network database for later recognition, or to receive or communicate security information such as certificates for devices or SIM modules that will later be used to complete provisioning or complete activation or gain access to a network. For example, these apparatus, or any other apparatus including the activation server, can be networked into a service provider network or device database, an MVNO network or device database or a VSP network or device database. In some embodiments, programming of the device credentials or other information associated with the service processor or device is provided, so that, for example, the device can be recognized by an activation server or similar network function at a later point in time so that provisioning or activation can be completed in an automated manner, potentially with reduced or no user involvement, that provides a provisioning or activation configuration that is in some way unique for the service provider or service provider partner, device type, user group, VSP, MVNO, master agent or other entity. In some embodiments, this programming is provided in a manner that is difficult to change without the proper authorization so that the device is properly associated with the proper "service owner" or master agent (e.g., for the purpose of activation incentive payments). For example, as discussed herein, various approaches can be applied to the device credential or other settings or software provisioning so that the settings or software are secure or protected, or so that if the software is removed, replaced or modified it is reported or replace or restored. In some embodiments, VSP control of the provisioning, partial provisioning or activation of devices is provided during manufacture or at different points in the distribution channel. As discussed herein, some of these embodiments allow the central provider to offer to service partners (e.g., VSPs, MVNOs, master agents, and/or OEMs) similar types of control for device activation experience design or device service assignment control (e.g., sometimes referred to as service provider device locking so that other service providers cannot provide primary access to the device) during the manufacturing or distribution process that are possible with devices manufactured and distributed for the central service provider.

In some embodiments, the device is provisioned before the user obtains the device with permanent credentials, temporary credentials or partial credentials. In this case, the necessary credential programming of the device occurs during manufacture, at some point in the device distribution, such as at a distribution depot or in a store, or at the point of sale or point of shipment. In some embodiments, provisioning of network information as discussed above is used, and the network information is provisioned at the same time, before or after the device information is provisioned. In some embodiments, the device provisioning information is programmed with dedicated apparatus that connects to the device either with wires or wirelessly. For example, the dedicated apparatus can be local to the location where the device is being provisioned, or it can be partially or entirely networked into a database or provisioning solution located elsewhere and operated by the central provider, a VSP, OEM or other entity. For example, the apparatus to program the network portions of the provisioning information can also be networked and the operators who set up the required network programming for a device or group of devices may be in the vicinity of the servers that host the provisioning and management tools or they may network into the servers. In some embodiments, provisioning system operators have full or partial control of any device provisioning equipment associated with the entity they work for (e.g., OEM, VSP or master agent) but only have remote access via secure terminal, secure website or other techniques to network into a central provider or VSP server farm in which they control or partially control the network portion of provisioning capabilities for that subset of devices that are assigned to the entity they work for with (e.g., OEM, VSP or master agent).

In some embodiments, provisioning is accomplished over the air on the mobile access network for mobile devices, or over the wired access network or WLAN connection for wired access networks, either before the user receives the device or after the user receives the device. In some cases, the device can be connected to general purpose equipment, such as a computer to perform the programming required to complete provisioning. In the cases in which the device is provisioned at point of sale or after point of sale, the device provisioning can be triggered by a user initiated sequence, or can be initiated by an automated background sequence at any time after the device is powered on. In such cases, in some embodiments, partial credentials that include information such as device type, OEM or service provider are used to assist in determining how to complete the provisioning, and the information can also include secure information, certificate or signature programmed into the partial credentials that is required for the network to perform the provisioning of the remaining credential information in the device and possibly the network. In some embodiments, any network information used/required to provision the device or service is generated at the time the partial credentials are determined rather than beforehand.

In some embodiments, the device is activated for service before the user obtains the device with permanent credentials, temporary credentials or partial credentials, or with a permanent service account or a temporary service account. For example, in this case, the necessary steps of provisioning and activating service for the device can occur during manufacture, at some point in the device distribution, such as at a distribution depot or in a store, or at the point of sale or point of shipment. In some embodiments, the steps for activating service include one or more of the following: provision the device (e.g., with permanent, temporary or partial credentials), provision the necessary network databases and equipment to prepare them to recognize the device and associate it with the service profile and/or service plan, create or select the service account (e.g., permanent or temporary service account), select or create the service profile and/or service plan, program any elements in the device required to activate service (e.g., account ID, device aspects of the service profile and/or service plan), and program the necessary network databases and equipment with the required associations of device credentials and service profile and/or service plan policy settings. In some embodiments, the device oriented programming portions of the service activation steps occur at the same time, before or after the network oriented programming portions of the service activation steps.

In some embodiments, the device activation information is programmed with dedicated apparatus that connects to the device via a wireless or wire line connection. For example, the dedicated apparatus can be local to the location where the device is being provisioned, or the dedicated apparatus can be partially or entirely networked into a database or service activation solution located elsewhere and operated by the central provider, a VSP, OEM or other entity. For example, the apparatus to program the network portions of the activation information can also be networked and the operators who set up the required network programming for a device or group of devices can be in the vicinity of the servers that host the service activation and management tools or they can network into the servers. In some embodiments, activation server tools operators have full or partial control of any device activation apparatus associated with the entity they work for (e.g., OEM, VSP or master agent) but only have remote and partial access via secure terminal, secure website or other techniques to network into the network portion of the activation tools that are controlled by the central provider or VSP. The server tools operators can be restricted in some embodiments to providing network activation information or settings only for those devices or device groups that are assigned to the entity they work for with (e.g., OEM, VSP or master agent). For example, the device control group restriction can be accomplished with a secure database that has secure sub-partitions for one or more entities so that they cannot impact the control of one another's network activation settings but can control their own devices. In this way, a centralized set of activation tools resources controlled by a central provider, VSP or other entity can be partitioned so that different entities can have partial or full control of the activation service definition for devices or groups of devices without impact or risk to others who share the network and activation tools resources.

In some embodiments, activation is accomplished with an over the air interface to a mobile device, or over the wired access network or WLAN connection for wired access networks, either before the user receives the device or after the user receives the device. In some cases, the device can be connected to general purpose equipment such as a computer to perform the programming required to complete activation. In the cases in which the device is activated at point of sale or after point of sale, the final device activation process can be triggered by a user initiated sequence, or can be initiated by an automated background sequence at any time after the device is powered on. In such cases, some embodiments call for a temporary service account that is used to bring the device onto the network before the user has input the information necessary to create a permanent service account. In some embodiments, a temporary or permanent service account can be applied to the device at the time the device reaches the network, and the type of account, service profile and/or service plan can be influenced (e.g., partially determined or informed) or determined by information embedded in the device credentials or partial credentials, such as device type, device ID, SIM, OEM or service provider. For example, the device credentials can also include secure information, certificate or signature that can be required by the network to perform the activation steps for temporary or permanent service account status. In some embodiments, in which the device is activated in this manner before the user information is available, or before the user has selected a pay for service plan, the service profile and service plan are set up for ambient services as described herein.

In some embodiments, the device is activated during the manufacturing or distribution process, and then the activated device status is suspended. Once the temporary or permanent service account is set up, with appropriate service profile and/or service plan and temporary or permanent credentials, in some networks and billing systems the service can often be more easily resumed once suspended as compared to provisioning and activating the device from scratch. The device is then later resumed (or re-activated) when some event triggers the resume process, such as when it ships to the end user or when the end user attempts to use it. This process prevents the network from needing to manage credentials and accounts for devices that have been activated but are not yet on the network.

In some embodiments, provisioning is accomplished at least in part with temporary credentials in a manner that is automated and convenient for the user or device owner. In some embodiments, at least some subset of the temporary credential elements replaced at a later point in time by permanent credential elements in a manner that is also automated and convenient for the user or device owner. In some embodiments, the temporary credential set is pre-programmed into the device along with a temporary or permanent service account including service profile during the manufacturing or distribution process so that the device is activated with temporary credentials when it ships. In some embodiments, the aforementioned pre-programming is performed for the network via a secure set of server access equipment that networks into the network databases used to define the service profile and/or the service plan. In some embodiments, a subset of the temporary credentials is recycled once it is replaced, if a temporary service account is not activated or used after some period of time, if a permanent account is not activated or used after some period of time, or if the credentials subset is revoked from the device for some other reason.

In some embodiments, more than one device is assigned one or more elements of the temporary credentials, such as the phone number, which may be limited in supply. In some embodiments, a network will accept more than one set of temporary credentials, one or more redundant elements, for two or more different devices. In some embodiments, a device that has two or more temporary credential sets, in which at least a subset of the credential elements are different for the sets, so that if one set of credentials has elements that are already being used to access the network, then one or more reserve sets can be drawn upon to gain access to the network.

In some embodiments, the temporary credentials are used to log onto the network to conduct an over the air or over the network activation process in which an activation server reads at least a portion the device credentials to determine some aspect of how the device service profile. In some embodiments, the aforementioned over the air activation process is accomplished in the background without user intervention. In some embodiments, the over the air activation process is initiated when the user first attempts to use the device or when the user first attempts to access the network or upon user request or approval. In some embodiments, the over the air activation process is initiated using a temporary service account for the device and/or network to gain access to the network. In some embodiments, the over the air activation process is initiated after the user has entered the information required to create a permanent user account into the device or into the network. In some embodiments, the user is required to enter the aforementioned user information before using the device or using some aspect of the device. In some embodiments, the temporary service account is replaced by a permanent service account some time after the user has entered the necessary information to create a permanent account into the device or network. In some embodiments, the over the air activation process is initiated using a permanent service account assignment for the device and/or network to gain access to the network.

In some embodiments, the service profile is assigned to the device and/or network during the aforementioned over the air activation to be a pay for service profile with a free trial period. In some embodiments, the service profile assigned to the device and/or network during the aforementioned over the air activation includes pre-pay, post-pay, session based pay or pay as you go options for service. As will be apparent to one of ordinary skill in the art, various embodiments disclosed herein are particularly well suited for control or pre-pay services. In some embodiments, the service profile that is assigned to the device and/or network during the aforementioned over the air activation is an ambient service profile providing service access before all the user information is available to assign a permanent account. In some embodiments, the service profile that is assigned to the device and/or network during the aforementioned activation is an ambient service profile providing a service upgrade selection option interface to the user. In some embodiments, the service profile that is assigned to the device and/or network during the aforementioned activation is an ambient service profile providing transaction services to the user. In some embodiments, the service profile that is assigned to the device and/or network during the aforementioned activation is an ambient service profile providing bill by account functionality for the network. In some embodiments, the service profile that is assigned to the device and/or network during the aforementioned activation is an ambient service profile providing some amount of free networking or information service to entice the user to use the other ambient services. In some embodiments, the aforementioned ambient service is at least partially implemented with device based service activity control or control assistance. In some embodiments, the aforementioned ambient service is at least partially implemented by gateways, routers or switches in the network that are programmed according to the ambient access profile for the device to implement the ambient policies for network access control, routing control, traffic control or service monitoring and reporting for bill by account.

In some embodiments, activation is accomplished at least in part with a temporary service account in a manner that is automated and convenient for the user or device owner. In some embodiments, at least some subset of the temporary service account is replaced at a later point in time by permanent service account subset in a manner that is also automated and convenient for the user or device owner. In some embodiments, the temporary service account settings (e.g., including the service profile settings and/or the service plan settings) are pre-programmed into the device along with a temporary or permanent credentials set during the manufacturing or distribution process so that the device is activated with temporary credentials when it ships. In some embodiments, the aforementioned pre-programming for the network is performed via a secure set of server access equipment that networks into the network databases used to define the service profile and/or the service plan. In some embodiments, the device is suspended once it is activated but before the user is using it, and then resumed before or commensurate with the point in time that the user begins to use it. In some embodiments, some subset of the temporary service account is recycled once it is replaced, if the temporary service account is not used after some period of time, if the temporary service account is not upgraded to a permanent service account after some period of time, or if the activation is revoked from the device for some other reason. In some embodiments, more than one device is assigned to the same temporary service account. In some embodiments, a network accepts more than one device on the same temporary service account. In some embodiments, a device includes or is associated with two or more temporary service accounts, in which at least a subset of the temporary service account elements are different, so that if one account is already being used to access the network then one or more reserve accounts can be drawn upon to gain access to the network. In some embodiments, the temporary service account is associated with a temporary credentials set. In some embodiments, the temporary service account is associated with a permanent credentials set.

In some embodiments, un-activated devices are detected by the network routing equipment (e.g., service gateways or routers in hierarchical networks or base stations with embedded gateways in flat networks) and the device routing is programmed to re-direct un-activated devices to an activation server network destination. For example, the activation server can first inspect the information associated with the device to determine if the device belongs to the list of devices, device types or device groups that the network is programmed to provide access to. For example, the information used to determine this can include device type, service provider, phone number, device ID, SIM ID or configuration, secure information used to qualify the device, IP address, MAC address, user, user group, VSP, OEM, device distributor, service distributor (master agent), service processor presence or configuration, presence or configuration of other software or hardware. There can also be some activation definition information embedded in the credentials, or associated with some portion of the credentials, or programmed additionally on the device that informs the activation server as to the service profile and/or service plan and/or service account that should be established for the device. If activation information (the service profile, service plan and/or service account information) is found through association with the device credentials (e.g., device ID, phone number, IP address, MAC address, SIM or other security credentials) rather than being read directly from information embedded in the device or device credentials, then the pertinent aspects of the credentials can be used as a cross reference to look up the service plan and/or service profile information stored in a database networked to or within the activation server. The activation information can include information to define a wide variety of service plans and service profiles that when properly implemented on the network functions, and perhaps device if necessary, can provide for a wide range of service activity policies, service billing policies, transaction billing policies and service account types that can be associated with the device over the air or over the network.

In some embodiments, once the activation server has determined the activation information from the device or from a look up based on some aspect of the device credentials, then the activation server initiates the necessary network settings and billing database entries to be programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. The provisioning can be with permanent credentials or temporary credentials, and the service account that is set up may be permanent or temporary. In some embodiments, the activation process described above is completed perhaps before the user has entered some or all of the user information necessary to set up a permanent service account, and, in these cases, a temporary service account can be set up. In some cases, the activation process can be completed in the background before the user has completed an attempt to access the network and the service profile can be set up to provide ambient services to a temporary service account. In some embodiments, the user is required to enter the information required to establish a permanent service account prior to gaining full use of the device, either on the device, on a computer or in the store, so that by the time the user begins using the device the above activation embodiments can provide for ambient services activation with permanent account status so that the user can purchase a service upgrade or any transaction without entering any more account information.

In some embodiments, a device status is changed from a temporary service account to a permanent service account. If the device is activated with a temporary service account, and the user information is available to set up a permanent account, then if the billing system rules and interfaces allow for such, the user information can be changed from the mock information to the actual user information while maintaining the same account identifiers in the billing system. If the billing system will not allow for such, then the user information can be used to establish a new account, the device credentials can be re-associated with the new account, in some cases, after modifying one or more of the device credential parameters, and the network functions can be re-programmed as required, and, in some cases, the device can be re-programmed as required to accommodate the new permanent account.

In some embodiments, code on the device pulls a temporary or permanent set of credentials. When the credentials are pulled, the network associates the device with an ambient service profile according to one or more of the following: embedded device information identifying device type, service owner (e.g., VSP), user group, or user, or device ID is cross referenced to a database that is populated some time from manufacturing time to post sale where the database provides information identifying device type, service owner (e.g., VSP), user group, or user. The device is then re-directed accordingly (e.g., for device based this is a matter of setting the policies or loading the software for the service processor, for the network based approach this is a matter of populating the routing tables and service profile). For example, credentials can be re-cycled after a period of time, and/or some portion of the credentials can be redundant with other devices. For example, this is essentially a dynamic service for (temporarily) assigning device credentials, and the duration of the temporary credential validity for that device ID can be time limited to give the user time to activate a real account or a free trial, session limited, or a longer duration of time that is perhaps refreshed each time the device logs on. For example, the device could also already have permanent or temporary credentials but not have a service account. The above process can be used to assign a temporary or permanent service account as well. Once the service account is assigned and the appropriate service profile is propagated to the network elements, the device can then be directed to or use the appropriate activation profile service activities or the appropriate ambient service activities.

In some embodiments, the device is activated in the background in a manner that is virtually transparent to the user. For example, at some point in the distribution channel, the device is programmed to seek the activation server system described above as soon as it is turned on, or as soon as some other event occurs like the user using the device or the user attempting to gain access. When the pre-programmed event is triggered, the device connects to the network and the gateways or routers re-direct the device to an activation server, as discussed above. As also described herein, the activation server either derives information from the device that informs the server what service the device should be activated with, or the server derives that information from a database look up with a portion of the device credentials as the cross reference parameter. Once the activation server has determined the activation information from the device or from a look up based on some aspect of the device credentials, then the activation server causes all the necessary network settings and billing database entries to be configured/programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. For example, the provisioning can be with permanent credentials or temporary credentials, and the service account that is set up can be permanent or temporary.

In some embodiments, background activation is performed using the aforementioned activate/suspend process. At some point in the distribution channel, the device is programmed to seek to resume service as soon as it is turned on, or as soon as some other event occurs like the user using the device or the user attempting to gain access. When the pre-programmed event is triggered, the device attempts to connect to the network and the gateways or routers re-direct the device to an activation server as described herein. As also described herein, the activation server either derives information from the device that informs the server that the device is ready to resume service, or the server derives that information from a database look up with a portion of the device credentials as the cross reference parameter. Once the server is aware of this information, it sends a message to resume service to the billing system, or other network function that controls the suspend/resume function, and the service is resumed.

In some embodiments, background activation is performed as described below. The service processor and the credentials are pre-programmed during the manufacturing or distribution process to provide the desired service profile support and/or billing profile support for the desired initial ambient service. As described herein, this programming can be accomplished with dedicated apparatus at the manufacturer or distribution depot. Furthermore, the party responsible for defining the service (e.g., typically the central provider, OEM, VSP, distributor or master agent) can network into the service processor programming apparatus to control service processor and/or credential programming for all or a subset or group of the devices or device types locally available. The service processor enabled device is programmed to seek the activation server system described above as soon as it is turned on, or as soon as some other event occurs like the user using the device or the user attempting to gain access. In some embodiments, the activation server is the access control server previously discussed or the access control server can act in concert with another server that performs the activation function. When the pre-programmed event is triggered, the device connects to the network and the gateways or routers re-direct the device to the activation server. As also described herein, the activation server can communicate with the service processor to verify the service processor security credentials, agents and configuration.

In some embodiments, if the activation server determines that the pre-programmed settings stored in the service processor need to be modified to provide the latest version of the desired service, or if the service processor agent software needs to be updated, then this can be accomplished prior to completing the activation process. Once the service processor configuration and settings are confirmed, the activation server causes the necessary network settings and billing database entries to be programmed by sending the service profile instructions to the network provisioning and activation apparatus and the service plan instructions to the billing system. Given that the service processor can perform some or much of the service activity control or control assistance, the service control options are generally larger than without the service processor, and there can be less configuration to perform for other networking equipment to complete the provisioning and activation process. The provisioning can be with permanent credentials or temporary credentials, and the service account that is set up can be permanent or temporary.

In some embodiments, pre-programming and pre-activation of devices with temporary credentials and a temporary service account are used to ship devices that are pre-activated. Given that the credentials are temporary and can be recycled when the permanent credentials are assigned, concerns about using up too many pre-assigned credentials are reduced. In embodiments in which a portion of credentials elements can be used for multiple devices, this concern is further reduced. If there is a concern about too many activated devices being assigned that are not actually active and generating service revenue, then the suspend/resume process discussed herein can be employed. In some embodiments, the temporary credentials and/or temporary account can be replaced with permanent credentials and/or account assignments at any time as follows. When a pre-programmed event in the device is triggered, then the device initiates a program that seeks the aforementioned activation server or another server that has the capability of fulfilling the device request to exchange the temporary credentials for permanent credentials and/or exchange the temporary account for a permanent account. The event that triggers the credential exchange can be the same or different than the event that triggers the service account exchange. The service account exchange can typically be triggered by the point in time that the user enters account information.

In some embodiments, the aforementioned ambient service is partly implemented with a combination of the techniques for pre-provisioning during manufacturing or distribution and at least partially implementing the service activity control (e.g., access control, routing policy, traffic control, usage limits, and/or policy for usage limit overage) required for implementing ambient using the service policy provisioning capabilities in the data path gateways, routers or switches in the network. The gateways, router or switches are pre-programmed as discussed herein according to the ambient access profile for the device to implement the ambient policies for network access control, routing control, traffic control or service monitoring and reporting for bill by account. In some embodiments, the provisioning credential elements are not all pre-programmed before the device ships, but a subset of the credential elements are programmed using the activation server technique discussed herein. This over the air automated provisioning is combined with the activation server reading the device credentials to derive the service activity control settings for the gateways, routers or switches that will result in the desired ambient services activity controls.

In some embodiments, the aforementioned ambient service is implemented with a combination of the techniques for pre-activation during manufacturing or distribution and at least partially implementing the service activity control (e.g., access control, routing policy, traffic control, usage limits, and/or policy for usage limit overage) required for implementing ambient using the service policy control capabilities in the data path gateways, routers or switches in the network. The gateways, router or switches are programmed to recognize the pre-activated device credentials as discussed herein according to the ambient access profile for the device to implement the ambient policies for network access control, routing control, traffic control or service monitoring and reporting for bill by account. In some embodiments, the device activation profile and/or service account are not pre-programmed in the network and/or the device before the device ships but the activation profile and/or service account are programmed using the activation server technique discussed herein. This over the air automated provisioning is combined with the activation server reading the device credentials to derive the service profile activity control settings for the gateways, routers or switches that results in the desired ambient services activity controls.

In some embodiment, a VSP capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and the network billing system database. By providing server tools that enable all these settings to be controlled (or perhaps only observed in the case of the billing system) by a secure workstation or secure website interface that networks into the equipment that programs the settings, and providing for a secure partitioning of the devices that can be controlled by a given secure workstation or secure website interface, a central provider can provide VSP services to multiple entities who all have different device and service plan combinations that they desire different flavors of ambient services for. These techniques can also be extended beyond ambient to any device/service profile/service plan combo the VSP desires to create. In some embodiments, the networking equipment is implemented to secure device service group domains in which the service policies for a group of devices can be controlled. In some embodiments, the pre-provisioning and pre-activation techniques are substituted with the over the air activation server techniques discussed herein, and a secure device group partition capability is provided in the activation server as well so that the activation server device group partition control capabilities can be added to the secure device group partition control capabilities of the network gateways, routers and/or switches, the device programming tools and the billing system to form a VSP partition solution for over the air activation of various device/service plan combinations. In some embodiments, the device groups are relatively small so that beta trials of arbitrarily large or small size can be designed and implemented by defining a service control group as described above, and after fine tuning and perfecting the beta trial settings the device group can be expanded to publish the automated provisioning and activation service settings to a larger user or device group for production services.

In some embodiments, device based service activity control assistance (e.g., based on the various service processor embodiments described herein) is combined with simplified provisioning techniques described herein so that service processor enabled devices can be shipped with pre-provisioned credentials (temporary or permanent) or can obtain credentials in an automated manner that is convenient and efficient for the user or device owner. In some embodiments, the service processor embodiments in combination with the manufacturing and supply chain credentials and provisioning apparatus described elsewhere provide various approaches for provisioning pre-provisioned service processor enabled devices. In some embodiments, the service processor embodiments in combination with the activation server variants discussed above provide various approaches for over the air or over the network simplified post-sale provisioning for service processor enabled devices. For example, these embodiments can also be used for ambient services given that as discussed herein the service processor has capability to implement service profile policies for deep control of ambient service activity control.

In some embodiments, provisioning includes provisioning partial device credentials that include, for example, a secure certificate that is used to authorize full credential provisioning and/or activation by performing a process for a later look-up/validation of the full device credentials. For example, the look-up/validation of the full device credentials can be performed by a gateway, router or similar network device that re-directs to a provisioning server and/or activation server or other network components that either: (1) recognizes the partial credentials that serve as a reference to direct the device communication to a specific provisioning/activation server determined from the partial credentials; or (2) does not recognize the partial credentials, and directs the device communication to a less specific provisioning/activation server that is not necessarily associated with a reference to the partial credentials.

In some embodiments, if the partial device credentials (e.g., temporary or permanent credentials) are being used for provisioning, then the partial credentials are read (e.g., and/or other credentials can be looked up based on the partial credentials as described above). The device is authorized if the proper credentials and/or secure certificate is present. The device credential provisioning is then completed (e.g., using activation server commands or settings to a device based software and/or hardware element), and the credentials are, in some cases, also communicated to the various network equipment elements.

In some embodiments, if the partial device credentials are being used for activation, then partial or full device credential provisioning is performed, such as described above. A service account (e.g., temporary or permanent service account) is created or looked up based on the partial device credentials (e.g., a user account associated with the device through embedded partial or full credentials or a look up process, or based on a dynamically created/assigned temporary account associated with the device through embedded partial or full credentials). An initial service profile and, in some cases, an initial service plan (e.g., service control policy settings including a billing profile) are determined from embedded information and/or using a look up process (e.g., based on the device type and/or partial or full device credentials). The device is then programmed to enable access with the service profile and plan, and, in some cases, the various network components/elements are programmed to enable the service profile and plan, and, in some cases, proper entries in the billing system are made or confirmed, and the device credentials are, thus, activated for service.

In some embodiments, the above described provisioning and/or activation processes are performed with the provisioning server(s) and/or activation server(s) in the background with reduced, minimal or no user input required, for example, after the device is sold to the user and the user turns on the device so that by the time the user attempts to access the service using the device, the provisioning and/or activation process is already completed.

In some embodiments, device based service activity control assistance (e.g., based on the service processor embodiments) is combined with simplified activation techniques described herein so that service processor enabled devices can be shipped with pre-activated accounts (temporary or permanent), or can obtain activated account status in an automated manner that is convenient and efficient for the user or device owner. In some embodiments, the service processor embodiments in combination with the manufacturing and supply chain activation and provisioning apparatus described elsewhere provide various approaches for pre-activated service processor enabled devices. In some embodiments, the service processor embodiments in combination with the activation server variants discussed above provide various approaches for over the air or over the network simplified post-sale account activation for service processor enabled devices. These embodiments can also be used for ambient services given that as discussed herein the service processor has capability to implement service profile policies for deep control of ambient service activity control.

As discussed herein, in some embodiments for activation, the network AAA (or other network function) either recognizes one or more aspects of a pre-activated device credentials and routes the pre-activated device communication to an activation server that is appropriate for that device (routing information either derived through look up of the credential aspect or by obtaining the required information directly from the credential itself), or the AAA (or other network function) does not recognize the credentials and routes the device communication to an activation server for unrecognized device credentials. In either case, in some embodiments, one or more of the credential aspects can then be used to perform a secondary determination of what provisioning and/or activation sequence to perform in association with the device, or which activation server sequence the device should be directed to. For example, one or more device credential aspects can be read and used as a cross-reference to determine a routing for the device communication (or the information required for routing can be in the device credential information itself) so that the device can be routed to the appropriate activation server sequence.

In some embodiments, an activation server sequence can be determined at least in part by using a browser server or a portal (e.g., http server, https server, WAP server or another standard or custom protocol server for a browser, embedded or automated browser or a portal client in the device). In some embodiments, the browser server is an http or https server. The pre-activated device communication can be routed to the https server in a manner similar to that described above, and the server can read the information embedded in the https communication to determine the device credential information required to initiate the correct provisioning completion and/or activation sequences. For example, the https header information, tokens, cookies or other secure information communicated over https from a secure embedded client on the device (or user) can either provide the activation server with the information required to perform the cross-reference to an appropriate provisioning and/or activation sequence, or the https embedded information or the embedded client (or user) information can instruct the activation server on which services the device is to be provisioned and/or activated on and any necessary device or user information (e.g., device owner and/or billing information) can be exchanged, or the device might be provisioned and/or activated first on a free ambient service with temporary or permanent credentials or account.

In some embodiments, the service processor can be combined with the pre-provisioning and pre-activation techniques described above to create an ambient service solution that will work on roaming networks in which the central provider or VSP has no control or minimal control over the network elements. For example, the device includes a service processor pre-programmed for ambient service activity control as discussed herein, and the device credentials and other settings are pre-provisioned and pre-activated for the central provider network, all of which is described in numerous embodiments disclosed herein. Provided that the service provider has a roaming agreement with other service providers, or provided that the device may gain access to the roaming network, when the device is roaming it will be capable of ambient connectivity with bill by account functionality and all the other features of ambient. Furthermore, as also discussed herein, the ambient service activity control policies can be different for different roaming networks to accommodate the varying network costs and performance. Also, for example, it would be permissible to sign up for initial services or additional upgrade services with the central provider while roaming on the roaming partner network. One of ordinary skill in the art will appreciate that this also allows for creating a VSP or MVNO for the purpose of creating a clearing house for central provider service activations according to geography or user choice. By using a global multi-mode modem module, and maintaining service agreements with a multitude of carriers, the MVNO or VSP can provide consistent ambient services across multiple carriers and multiple geographies while still maintaining a good degree of cost control. Using bill by account capabilities, it is also possible to have an activation agreement where a roaming service provider agrees to refund the cost of ambient roaming. From the ambient service platform, the VSP or MVNO can then provide service purchase options to the user based on the carrier networks available to the device, or the VSP or MVNO can broker the user off to any of the carriers by activating the device onto the carriers main central provider service.

Accordingly, these embodiments provide flexible capabilities for activating a device or group of devices with a broad range of service profiles and service plans by simply programming the device with the proper credentials at some time during manufacturing or distribution, or simply programming a database associated with the network so that a portion of the device credentials can be used to look up the desired service profile and service plan. For example, various activation embodiments described herein are highly convenient for the end user and need not, in many cases, involve any human intervention.

The service processor 115, service controller 122, policy implementation, and/or profile implementation, and various embodiments disclosed herein are applicable to conventional communication products as well as machine to machine applications. For example, if the machine to machine device includes a service processor 115 with an activated account, then the service profile settings can be optimized for machine communications to provide only the limited access required to support the particular machine to machine application. This allows for cost optimized access services and prevents the machine to machine device or access modem from being misappropriated and used for some other service access than that intended. For example, by programming the machine to machine communications device at time of manufacture or during distribution with credentials or partial credentials that provide for automated provisioning and activation as described herein, the device can be automatically provisioned and activated on the service network with a service account when deployed, thus eliminating the need for costly or time consuming human intervention. The various embodiments that make it simpler to design, manufacture, test and deploy devices may also be equally applied to machine-to-machine devices. These embodiments include the service processor 115, developer's kit, and the automated provisioning and activation management tools among others. Also, the service analysis and test tools and the virtual service provider embodiments can also be applied to machine-to-machine applications.

User Interfaces

Figure 58:
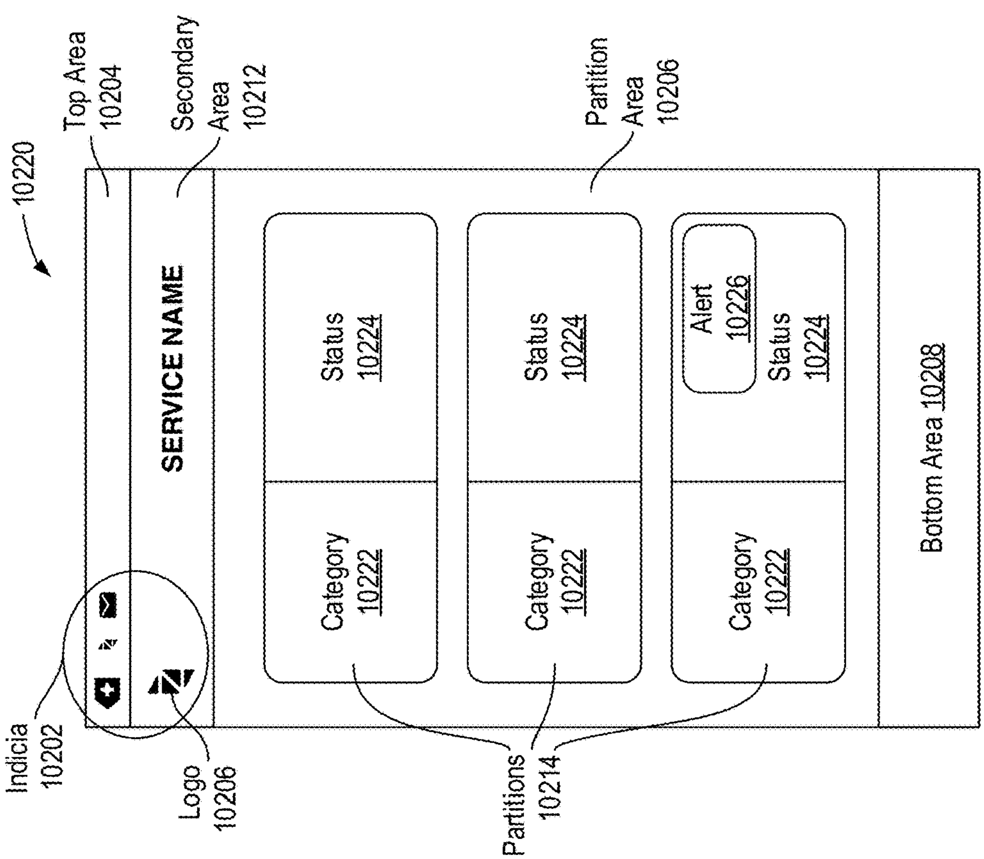
FIG. 58 illustrates the representative generic user interface arrangement of FIG. 57 including service plan categories, statuses and optional alerts in accordance with some embodiments.

FIG. 58 illustrates a representative generic UI arrangement 10220 including a display of service plan and/or service plan bundle information in the partitions 10214 of the partition area 10206 of the UI 101. Three different partitions 10214 include information on three different service plan categories 10222 available to and/or subscribed to and/or accessible to the user of the mobile wireless communication device 100. Information displayed includes a service plan category 10222 and a status 10224 for the service plan category 10222. Representative service plan categories 10222 include voice services, message services, data services, and application specific services. Representative status 10224 information includes a summary of service plans subscribed to, a number of distinct service plans of the service plan category 10222 subscribed to, specific service plans available, etc. In some embodiments, the status 10224 indicates that no service plans of a particular service plan category 10222 type are currently subscribed to. As illustrated in FIG. 58, in some embodiments, an alert 10226 is provided in addition to the status 10224 information for a service plan category 10222. In some embodiments, the alert 10226 provides the user of the mobile wireless communication device 100 with an indication of a change (or an impending change) in the status 10224 of one or more service plans in the service plan category 10222. In some embodiments, the alert 10226 also provides other information in a summary but easily understood form that can prompt the user of the mobile wireless communication device 100 to select to obtain additional information for the particular service plan category 10222 with which the alert 10226 is associated.

Figure 59:
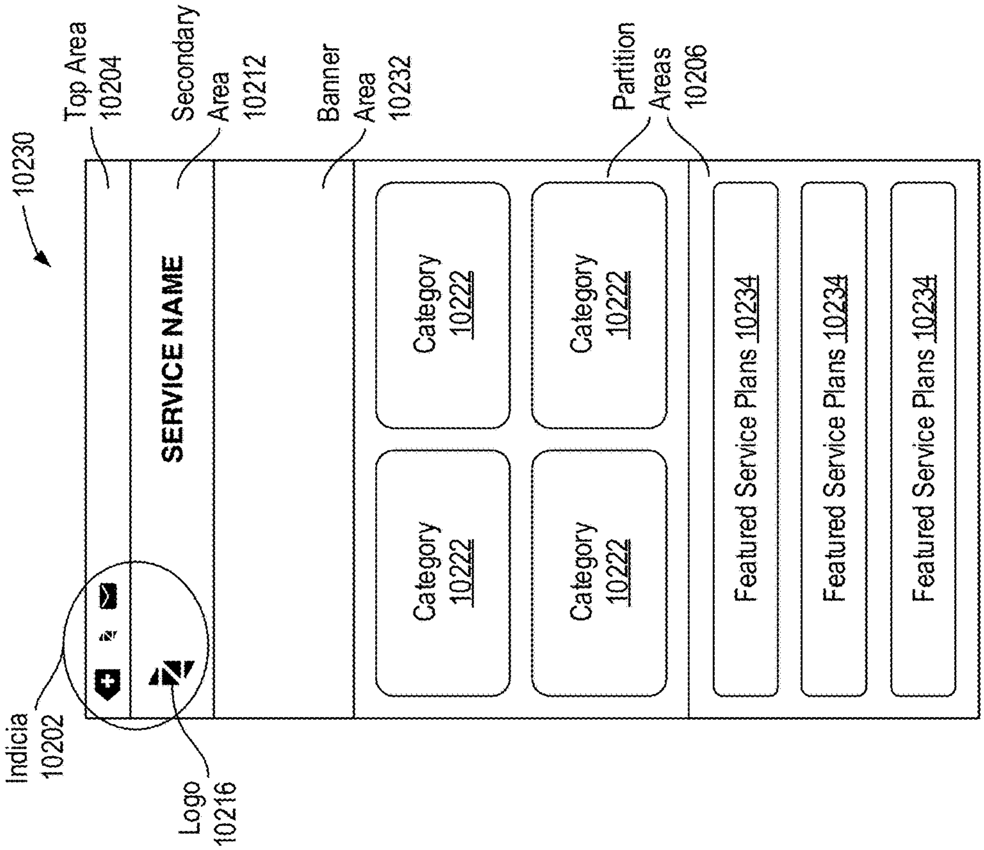
FIG. 59 illustrates a representative generic user interface arrangement for the mobile wireless communication device including service plan categories and featured service plans in accordance with some embodiments.

FIG. 59 illustrates a representative generic UI arrangement 10230 including a banner area 10232 between the secondary area 10212 and the partition areas 10206. In some embodiments, the banner area 10232 can be positioned anywhere on the UI 101 of the mobile wireless communication device. In some embodiments, the banner area can be placed temporarily over another area of the UI 101, e.g., for a limited time. In some embodiments, the banner area 10232 can provide one or more service plan promotions or advertisements for service plans, service plan bundles and/or features of service plans or service plan bundles available to the user of the mobile wireless communication device 100. In some embodiments, the banner area 10232 can provide a scrolling advertisement area in which information provided by service providers and/or third parties are displayed to the user of the mobile wireless communication device 100. The generic UI arrangement 10230 illustrated in FIG. 59 includes four service plan categories 10222 arranged in a matrix of partitions. Adjacent to the partition area that includes the service plan categories 10222, in some embodiments, a set of featured service plans 10234 (and/or service plan bundles) can be displayed. In some embodiments, information displayed for featured service plans 10234 is provided by service providers or by third parties with whom the featured service plans 10234 are associated.

Figure 60:
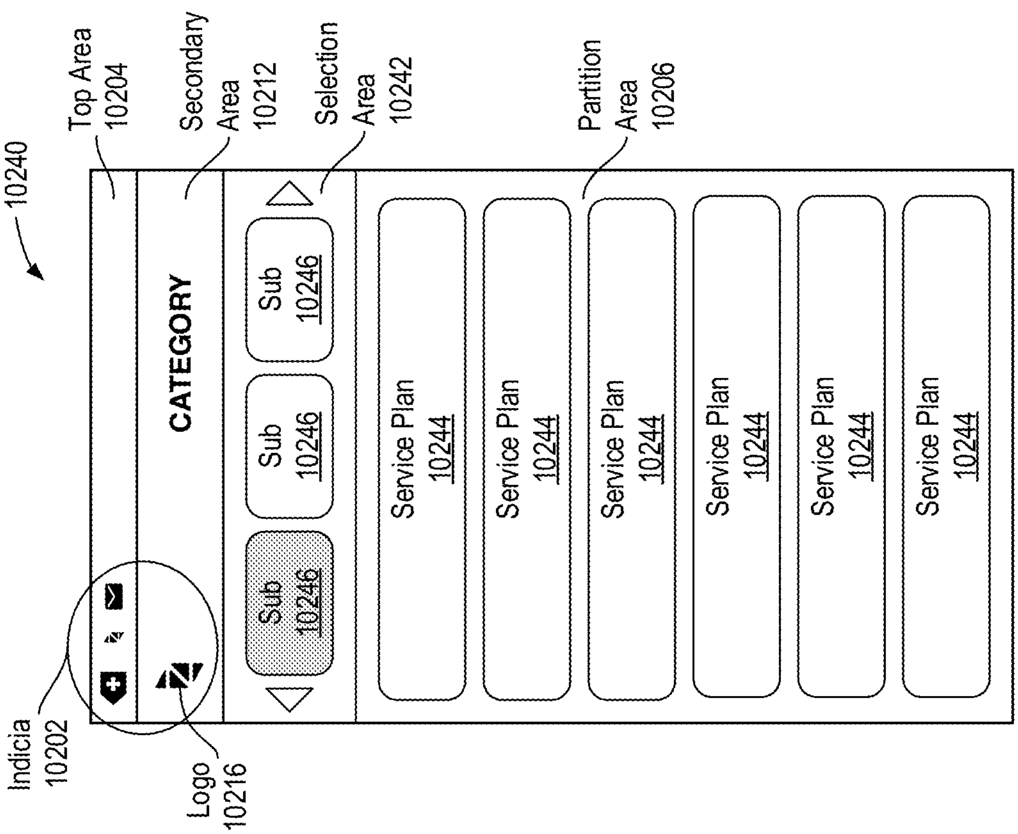
FIG. 60 illustrates a representative generic user interface arrangement for the mobile wireless communication device including service plans within a service plan category in accordance with some embodiments.

FIG. 60 illustrates a representative generic UI arrangement 10240 including a set of service plans 10244 (or service plan bundles) for a particular selected sub-category 10246 within a particular category. A selection area 10242 includes several different sub-categories that can be individually selected and beneath which can be displayed available service plans 10244 for the selected sub-category 10246. The number of sub-categories 10246 available can be more than can be displayed simultaneously within the selection area 10242 of the UI 101, and the selection area can be scrollable in one or more directions to view additional sub-categories 10246. The arrangement 10240 illustrated in FIG. 60 can provide the user of the mobile wireless communication device 100 access to numerous different service plans (or service plan bundles) from which to select for additional information, review and subscription. Selecting one of the service plans 10244, the user of the mobile wireless communication device 100 can access additional information as shown in FIG. 61.

Figure 61:
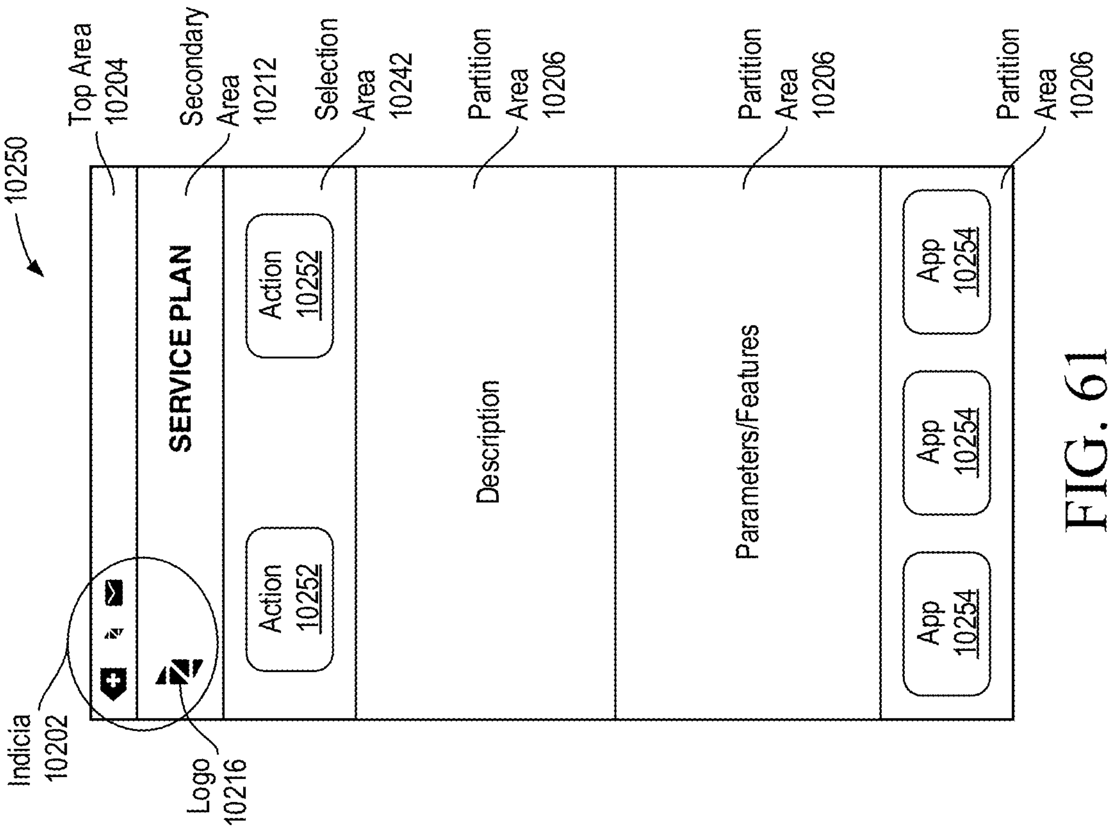
FIG. 61 illustrates a representative generic user interface arrangement for the mobile wireless communication device including information and selectable actions for a service plan in accordance with some embodiments.

FIG. 61 illustrates a representative generic UI arrangement 10250 including information about a particular service plan (or service plan bundle). An identifier for the service plan (e.g., a service plan name) can be displayed in the secondary area 10212. The service plan can be a service plan 10244 for a particular service plan category selected from the UI arrangement 10240 shown in FIG. 60 or from a featured service plan 10234 selected from the UI arrangement 10230 shown in FIG. 59. Several partition areas 10206 can provide a narrative description of the service plan 10234/10244, specific parameters that define the service plan 10234/10244, and key features of the selected service plan 10234/10244. In addition, one or more applications 10254 that can be associated with or applicable to the service plan 10234/10244 can also be displayed. The selection area 10242 can provide one or more actions 10252 that the user of the mobile wireless communication device 100 can choose for the selected service plan 10234/10244. In some embodiments, actions 10252 include a selection to choose to subscribe to the selected service plan 10234/10244. Actions 10252 can also include requests for additional information, requests to modify (if possible) the service plan 10234/10244 and requests to decline the service plan 10234/10244. Actions 10252 in the selection area 10242 can also relate to navigation among service plans 10234/10244 for a particular service plan category 10222 (e.g., "next" plan, "previous" plan).

Figure 62:
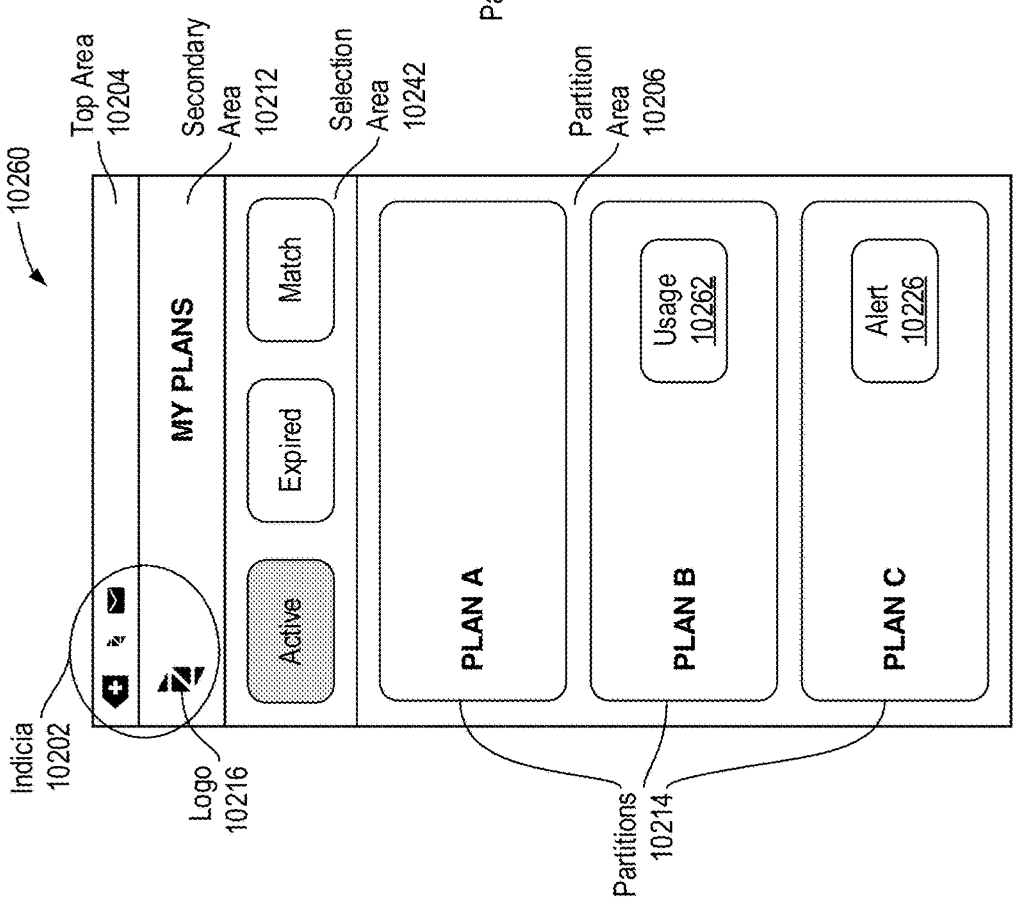
FIG. 62 illustrates a representative generic user interface arrangement for the mobile wireless communication device including information about subscribed service plans in accordance with some embodiments.

FIG. 62 illustrates a representative generic UI arrangement 10260 including information about several service plans or service plan bundles to which a user of the mobile wireless communication device 100 can be subscribed. The different service plans (labeled Plans A, B, and C) in the partitions 10214 of the partition area 10206 can represent a service plan within a single category of service plans (e.g., voice, messaging or data). The service plans illustrated can also represent service plans for individual applications or access to particular services (e.g., Facebook, Yahoo, Netflix, Amazon, etc.). Service plan bundles can also be displayed and can include multiple service plans from different service plan categories. As illustrated in the selection area 10242, a user of the mobile wireless communication device 100 can select to see service plans or service plan bundles that are active, i.e., currently subscribed to, or expired, i.e., previously subscribed to. The user can also select "match" in the selection area 10242 to view service plans or service plan bundles that can correspond to services to which the user of the mobile wireless communication device 100 can likely be interested in subscribing to. Service plans or service plan bundles can be matched based on numerous criteria, including but not limited to current service usage, previous service usage, search history, responses to interview questions, or other criteria that can gauge analytically a user's potential interest in features provided by various service plans or service plan bundles.

For a displayed service plan or service plan bundle, a minimal amount of summary information can be provided in the partition 10214. Important information can be overlaid on the summary information, e.g., a usage indication 10262 as shown for "Plan B" or an alert indication 10226 as shown for "Plan C." The usage indication 10262 can provide a basic view of an amount of service usage already used in a current accounting time period for the service plan or service plan bundle. The usage indication 10262 can also provide a basic view of an amount of service usage remaining in the current accounting time period for the service plan or service plan bundle. The alert indication 10262 can highlight a service plan or service plan bundle that requires attention from the user of the mobile wireless communication device 100, e.g., an impending expiration of the service plan or service plan bundle, or a service usage rate that can overrun the current allocation for service usage in the current accounting time period.

Figure 63:
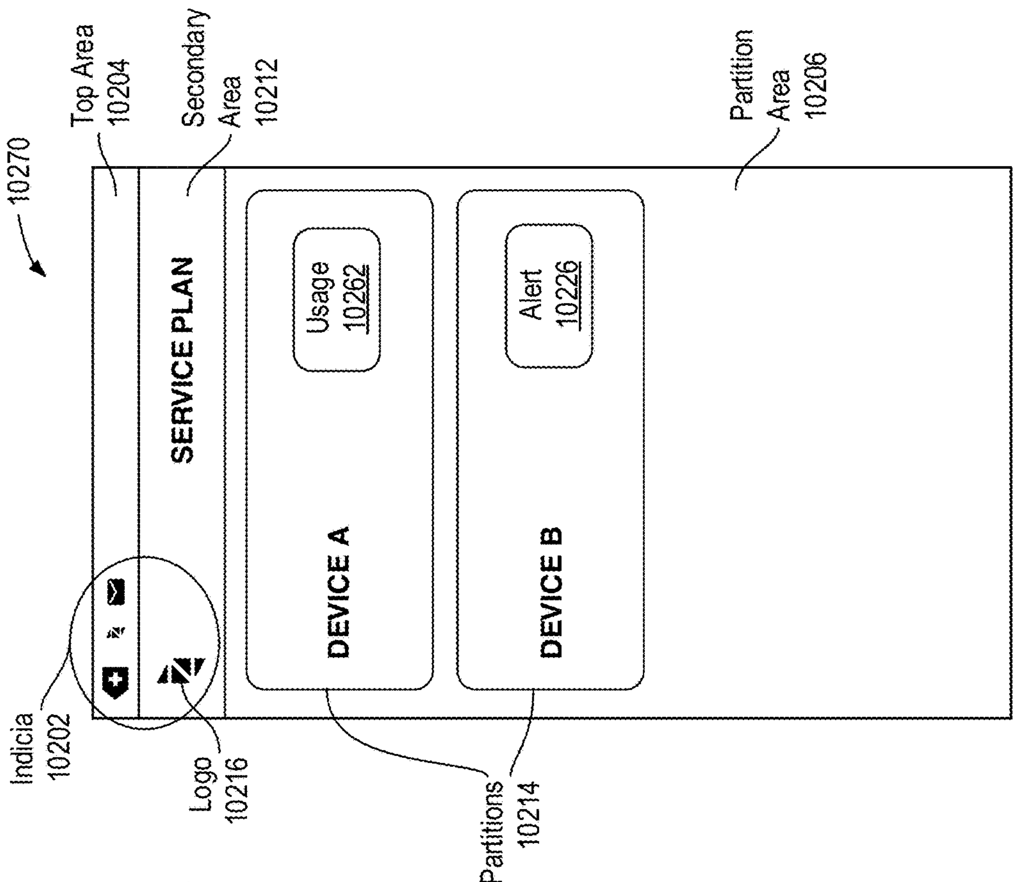
FIG. 63 illustrates a representative generic user interface arrangement for the mobile wireless communication device including information about multiple devices in accordance with some embodiments.

FIG. 63 illustrates a representative generic UI arrangement 10270 including information about several mobile wireless communication devices associated with one or more device groups for the user of the mobile wireless communication device 100. Each of the mobile wireless communication devices in the one or more device groups can be summarized in a partition 10214 of the partition area 10206. Additional information, e.g., usage information 10262 and/or alert notifications 10226 can be provided in, on, near to, or overlaid on the summary information of the partition 10214 for the mobile wireless communication device 100. Usage information 10262 can include consumed and/or available service usage information for one or more service plans and/or service plan bundles to which the particular mobile wireless communication device 100 subscribes. In some embodiments, service plans or service plan bundles can be shared among multiple mobile wireless communication devices 100, and the usage information 10262 can represent combined service usage information for a shared service plan or service plan bundle of a device group and/or individual service usage information available to the particular mobile wireless communication device 100. Alert notifications 10226 can indicate to the user of the mobile wireless communication device critical information that can require the user's attention.

Figure 64:
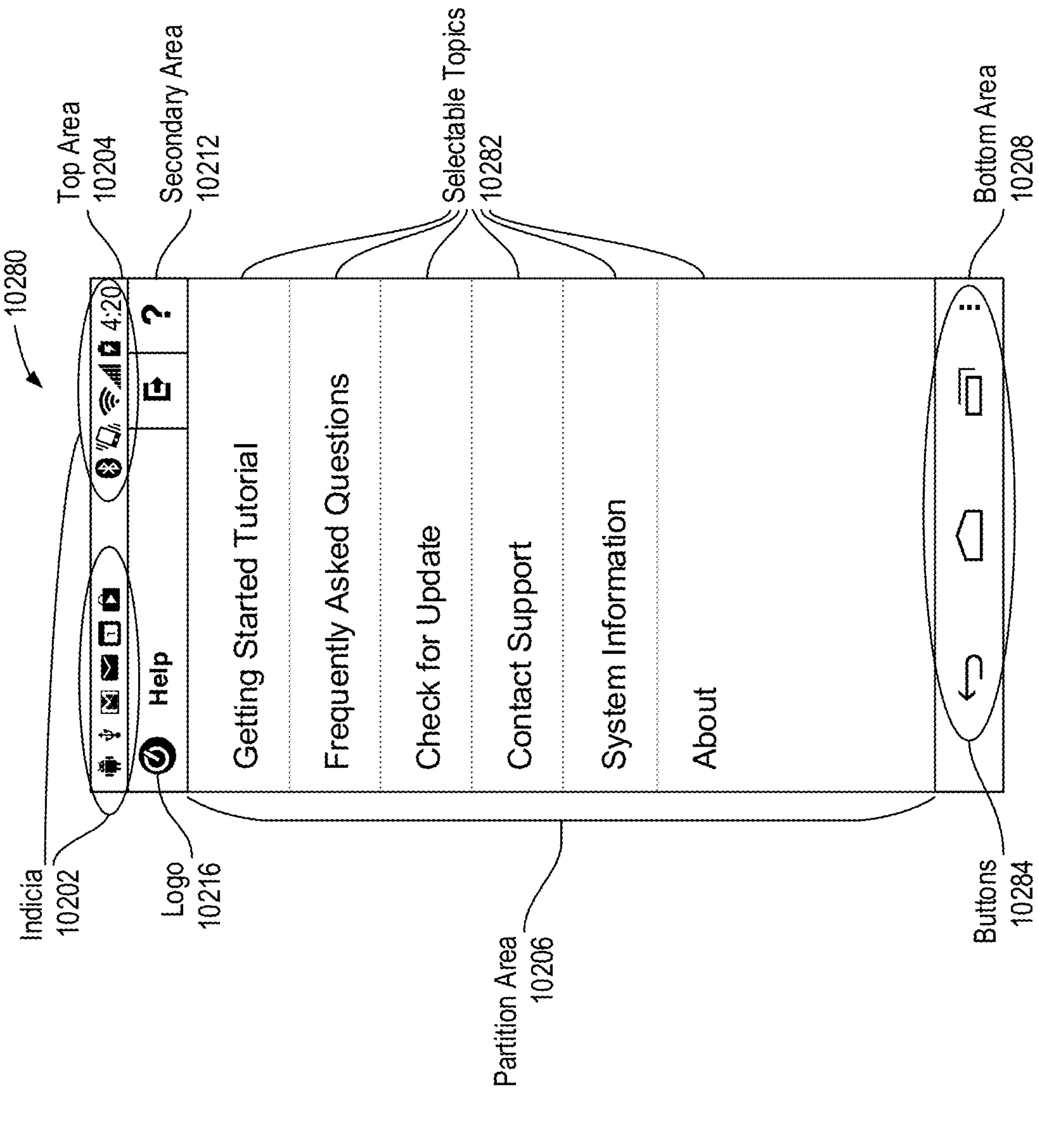
FIG. 64 illustrates a representative user interface arrangement for the mobile wireless communication device including a set of selectable help topics in accordance with some embodiments.

FIG. 64 illustrates a representative UI arrangement 10280 including information for "Help" to provide to the user of the mobile wireless communication device 100. Indicia 10202, e.g., as provided for by an operating system on the mobile wireless communication device 100, are displayed in the top area 10205. Additional indicia, e.g., the logo 10216 that can be customized for a particular service provider, are displayed in the secondary area 10212. Selectable buttons 10284 can be included in both the secondary area 10212 and in the bottom area 10208. Selectable topics 10282 related to "Help" can be arrayed within the partition area 10206. The user of the mobile wireless communication device 100 can access this representative UI arrangement 10280 by selecting the "?" button in the secondary area (or by a number of other ways). The bottom area 10208 can include a number of selectable buttons 10284 that can provide additional information, e.g., by expanding the bottom area 10208 using the vertical ellipsis illustrated. The selectable buttons 10284 can also include navigation features such as a "return" button, a "home" button, and direct access to select applications.

Figure 65:
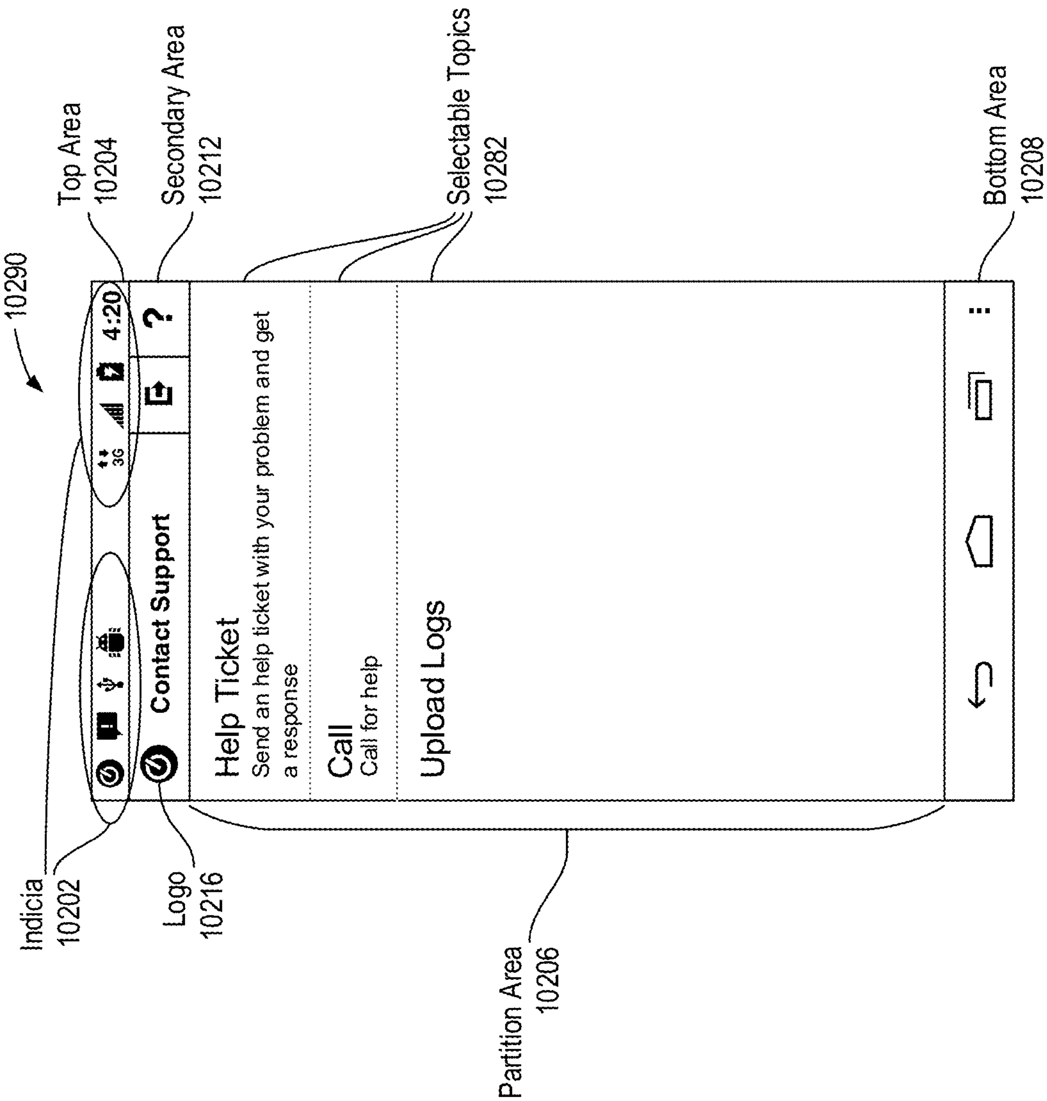
FIG. 65 illustrates a representative user interface arrangement for the mobile wireless communication device including a set of selectable response for contact support in accordance with some embodiments.

FIG. 65 illustrates a representative UI arrangement 10290 including information for "Contact Support" to provide to the user of the mobile wireless communications device 100. The partition area 10206 can include a set of selectable responses 10282 that can enable messaging and/or contacting appropriate entities to provide support to the user of the mobile wireless communication device 100.

Figure 66:
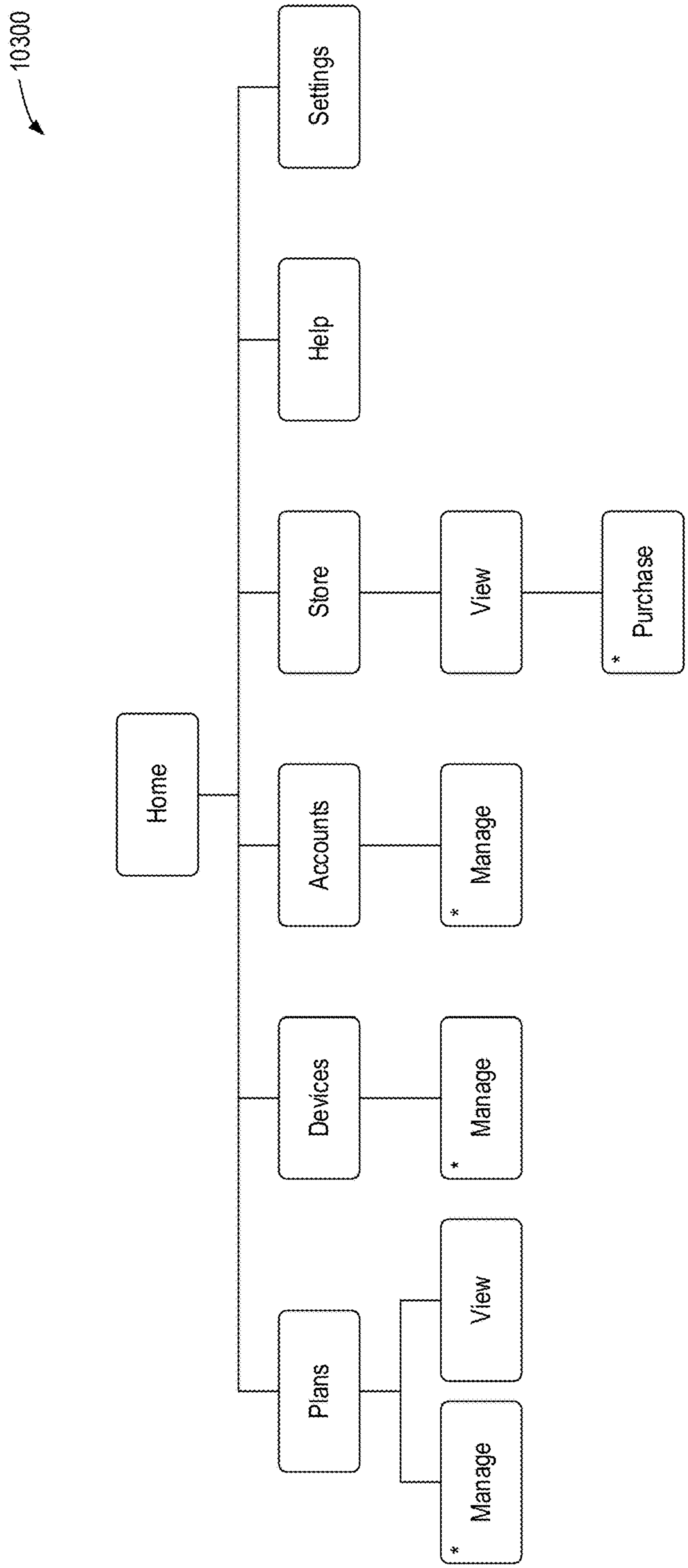
FIG. 66 illustrates a representative hierarchy summarizing screens and categories of screens presentable through a user interface of the mobile wireless communication device in accordance with some embodiments.

FIG. 66 illustrates a representative summary chart 10300 of a set of UI screens through which a user of the mobile wireless communication device 100 can navigate. The summary chart 10300 as shown is representative only and not intended to be limiting on the number of different screens and topics available through the UI 101 of the mobile wireless communication device 100. When the mobile wireless communication device 100 is provisioned with one or more service plans or service plan bundles, a home screen can provide a base from which more detailed information on services available to and/or devices associated with the mobile wireless communication device 100 can be retrieved. The home screen can provide direct access through the UI 101 to a summary of service plans, service plan bundles, devices, and accounts for the mobile wireless communication device 100. The home screen can also provide access to a "Store" of additional service plans and service plan bundles that are available to the mobile wireless communication device 100. In addition, "Help" information and "Settings" information can be accessed directly from the "Home" screen.

From a summary screen for "Plans," "Devices," "Accounts," or "Store," the user of the mobile wireless communication device 100 can view additional details (as illustrated by the "View" boxes). The user of the mobile wireless communication device 100 can also manage service plans, service plan bundles, individual mobile wireless communication devices 100, particular accounts associated with the mobile wireless communication device 100 (or other mobile wireless communication devices 100) and shop for additional services and products. Access to manage or purchase can include additional layers of security, e.g., password protected, as indicated by the asterisk "*" in FIG. 66.

Figure 67:
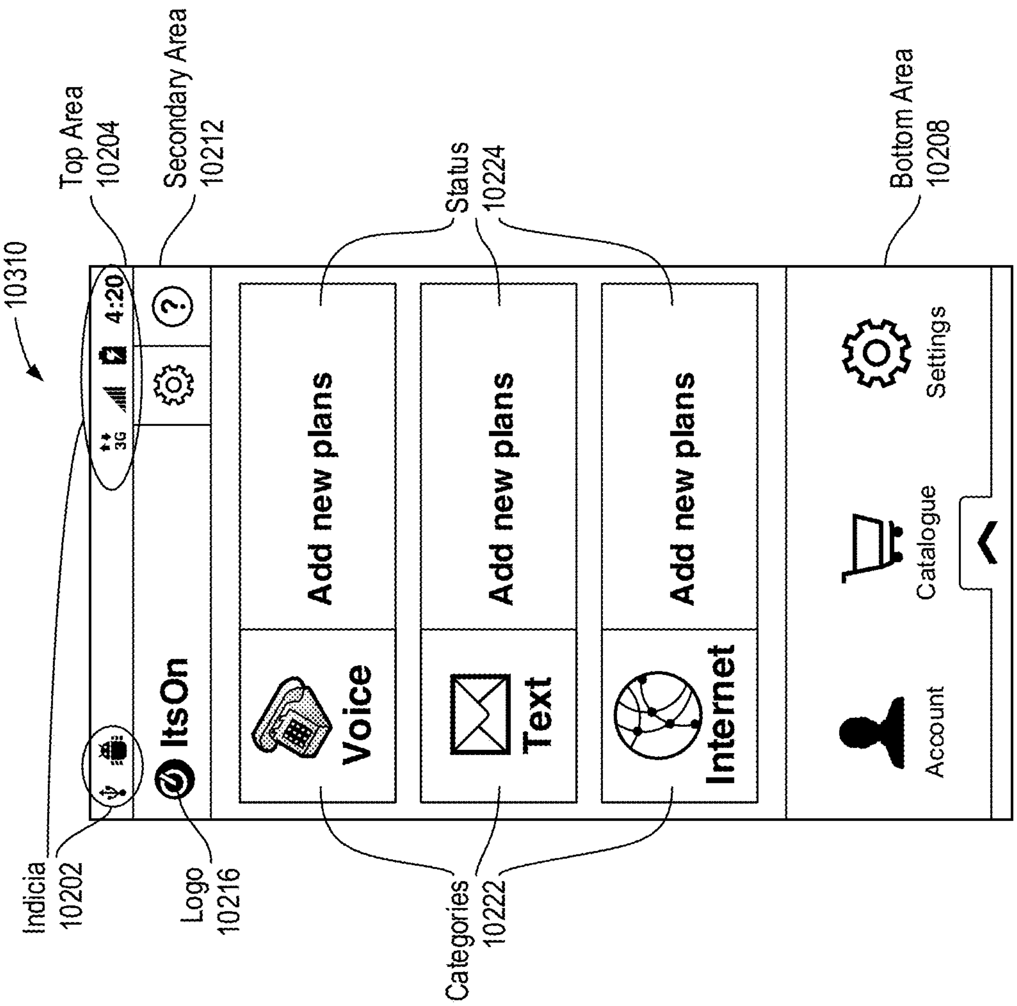
FIG. 67 illustrates a representative "Home" screen on the mobile wireless communication device having no presently subscribed service plans across a set of service plan categories in accordance with some embodiments.

FIG. 67 illustrates a representative "Home" screen 10310 that can be presented through the UI 101 of the mobile wireless communication device 100. As shown in FIG. 67, three categories 10222 of service plans can be explored. The mobile wireless communication device 100 can be not associated with any particular service plans or service plan bundles, as indicated by the status 10224 for each of the three categories 10222 illustrated in FIG. 67. Service plans in one or more of the categories, e.g., a "Voice" service plan, a "Text" messaging service plan, or a "Internet" data access service plan can be discovered, researched, reviewed and/or added to the mobile wireless communication device 100.

Figure 68:
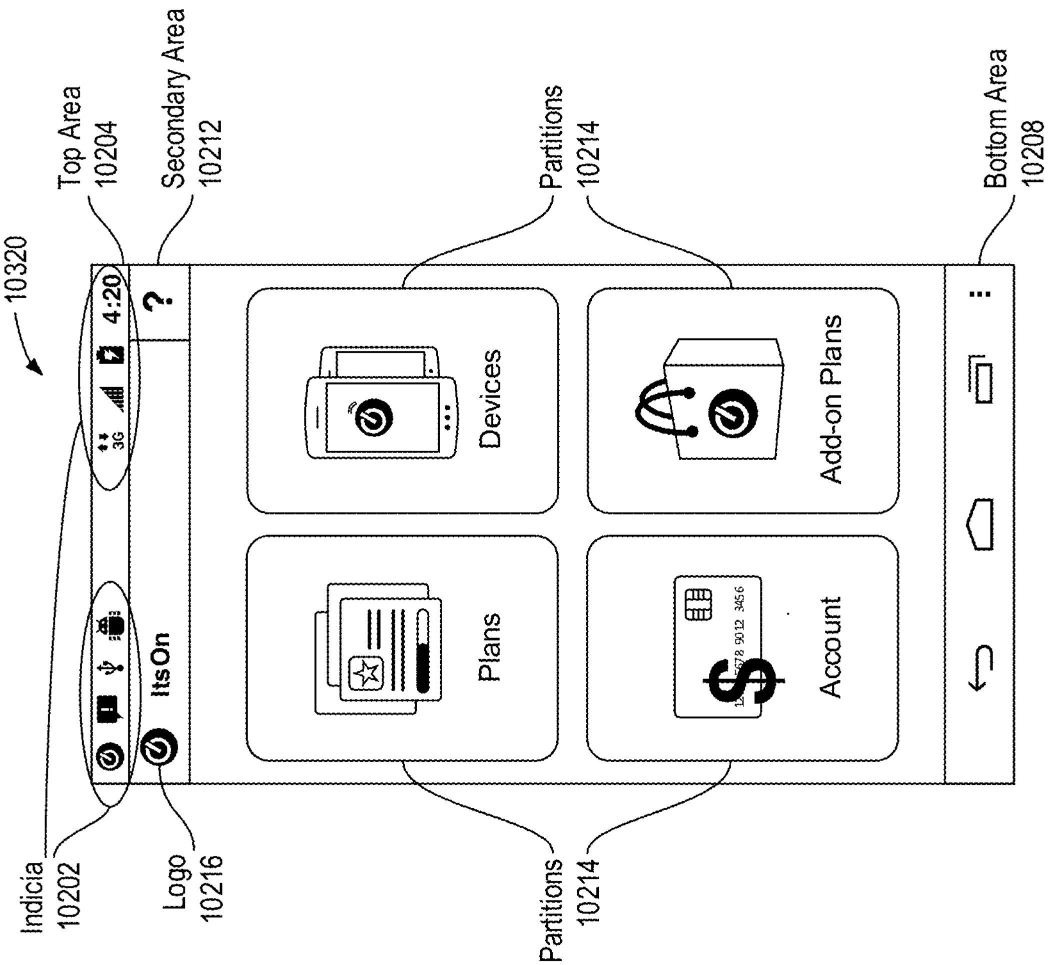
FIG. 68 illustrates a representative "Home" screen for a mobile wireless communication device in accordance with some embodiments.

FIG. 68 illustrates another representative "Home" screen 10320 that can be presented through the UI 101 of the mobile wireless communication device 100. In some embodiments, the "Home" screen 10320 is reached by the user of the mobile wireless communication device 100 selecting an icon for a service plan management application through the UI 101 of the mobile wireless communication device 100. Four different partitions 10214 can provide access for the user to subscribed service plans and/or service plan bundles ("Plans"), associated mobile wireless communication devices ("Devices"), specific account information ("Account") and a store for viewing and purchasing additional service plans, service plan bundles and service plan supplements ("Add-on Plans"). Service plans and service plan bundles presented through the UI 101 can include a variety of "base" service plans or "base" service plan bundles, at least one to which the user of the mobile wireless communication device 100 can subscribe. Service plans and service plan bundles can also include service plans that can be shared among multiple mobile wireless communication devices 100. Service plans and service plan bundles can also include "customizable" service plans and service plan bundles that can be tailored to suit the user of the mobile wireless communication device 100. Service plan supplements can be appended to one or more subscribed to service plans and/or service plan bundles. Supplemental service plans can provide access to specific services. Supplemental service plans can also provide for use of specific applications. Supplemental service plans can also provide for one time use or for recurring usage.

Figure 69:
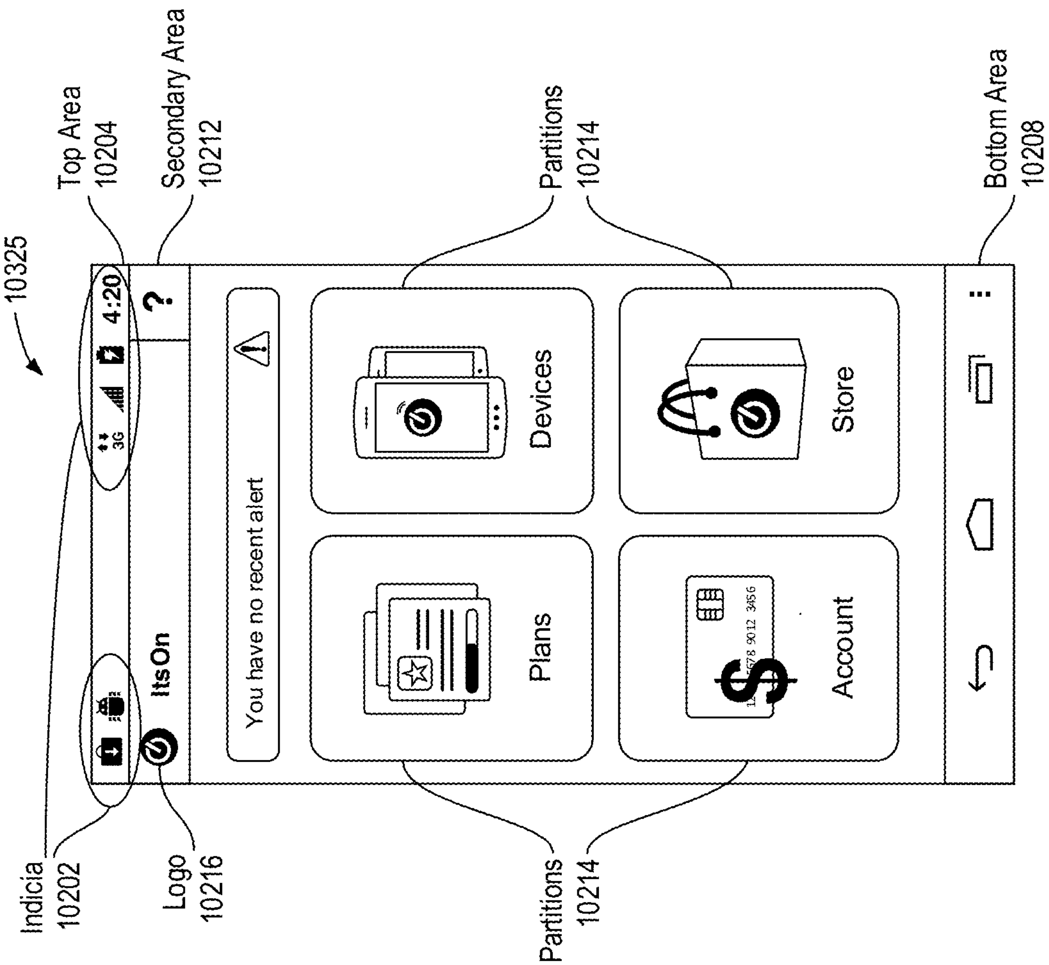
FIG. 69 illustrates another representative "Home" screen for a mobile wireless communication device in accordance with some embodiments.

FIG. 69 illustrates another representative "Home" screen 10325 that can be presented through the UI 101 of the mobile wireless communication device 100, similar to the "Home" screen 10320 shown in FIG. 68. The screen 10325 in FIG. 69 replaces the "Add-On Plans" partition 10214 with a "Store" partition 10214. In some embodiments, the "Store" partition provides access a variety of recurring and one-time service plans and service plan bundles to which the user of the mobile wireless communication device 100 can subscribe. The screen 10325 also includes an optionally displayed notification message indicating that the user of the mobile wireless communication device 100 has not received any recent alerts.

Figure 70:
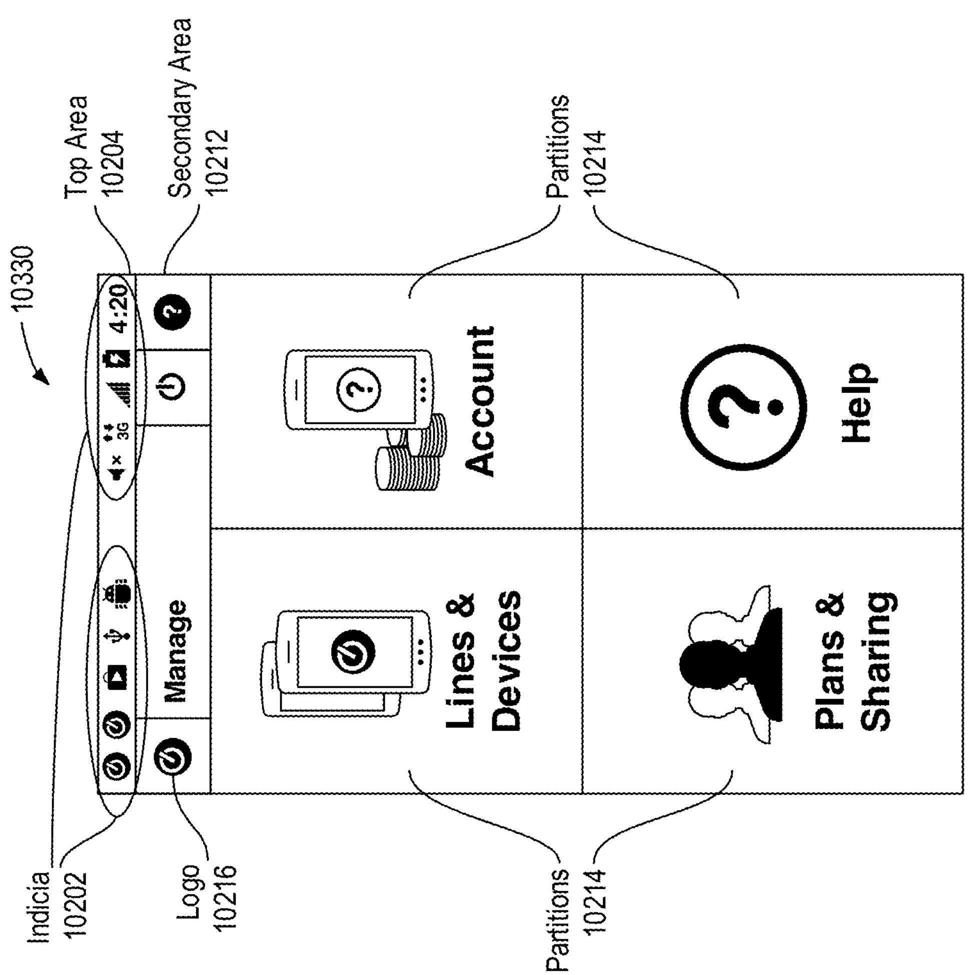
FIG. 70 illustrates another representative "Home" screen on the mobile wireless communication device in accordance with some embodiments.

FIG. 70 illustrates another representative "Home" screen 10330 that can be presented through the UI 101 of the mobile wireless communication device 100. The four partitions 10214 can provide access for the user of the mobile wireless communication device 100 to service plans and service plan bundles ("Plans & Sharing"), associated mobile wireless communication devices ("Lines & Devices"), specific account information ("Account") and a set of help screens and/or customer support ("Help"). In some embodiments, the mobile wireless communication device 100 is associated with a particular "line" (e.g., a "phone number" through which communication can be sent and received and associated for accounting.) In some embodiments, the mobile wireless communication device 100 is associated with multiple lines. In some embodiments, multiple mobile wireless communication devices 100 are associated with a particular line. Management of multiple mobile wireless communication devices 100 and associated lines can be accessed through the "Lines & Devices" partition 10214. In some embodiments, the mobile wireless communication device 100 can share and/or assign a portion (including all) of a service plan or service plan bundle among one or more other mobile wireless communication devices 100. In some embodiments, access to service plans and service plan bundles available to and/or subscribed to and/or accessible by the mobile wireless communication device can be reached through the "Plans & Sharing" partition 10214. In some embodiments, sharing and/or assignment of service plans and service plan bundles can also be reached through the "Plans & Sharing" partition 10214.

Figure 71:
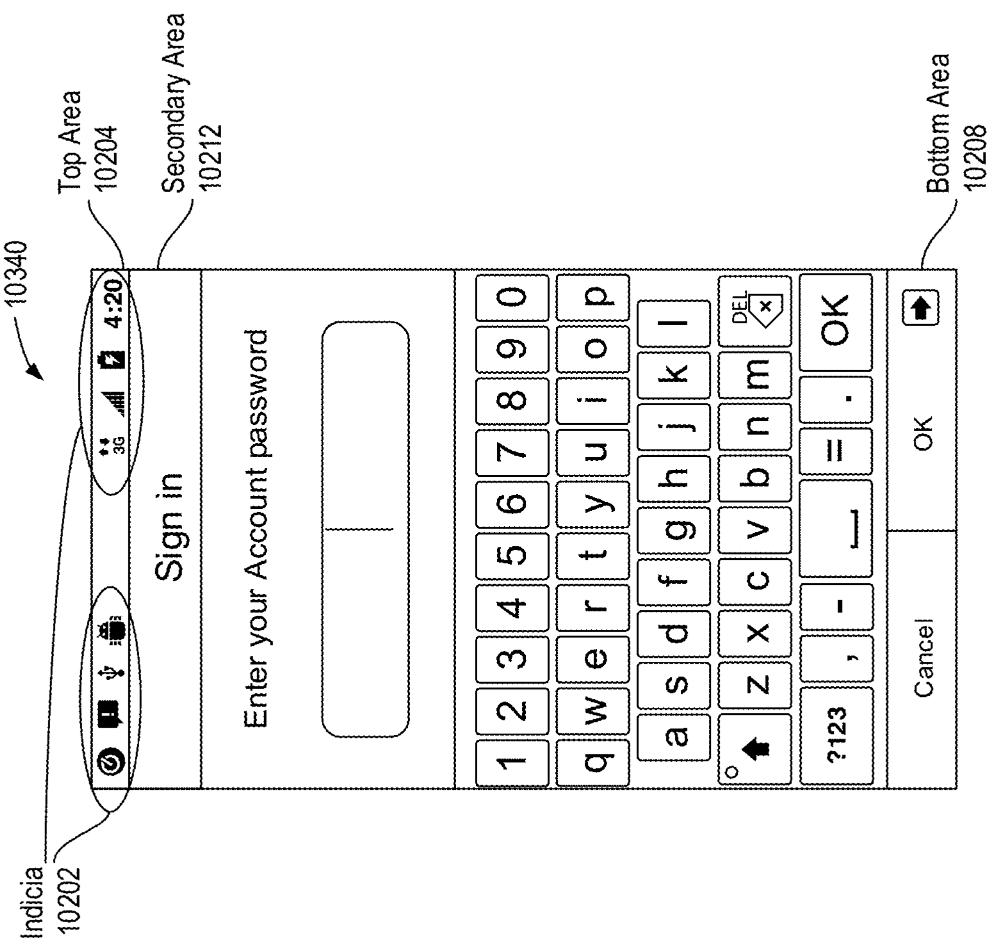
FIG. 71 illustrates a representative screen presented on a user interface through which an account password can be entered to provide access to restricted information for the mobile wireless communication device in accordance with some embodiments.

Access to select information through the UI 101 of the mobile wireless communication device 100 can be restricted for privacy and security reasons. For example, access to account information, or access to purchase service plans or service plan bundles, or access to share service plans or service plan bundles can require use of a password. FIG. 71 illustrates a representative UI screen 240 through which an account password can be entered to provide the user of the mobile wireless communication device 100 access to the restricted information.

Figure 72:
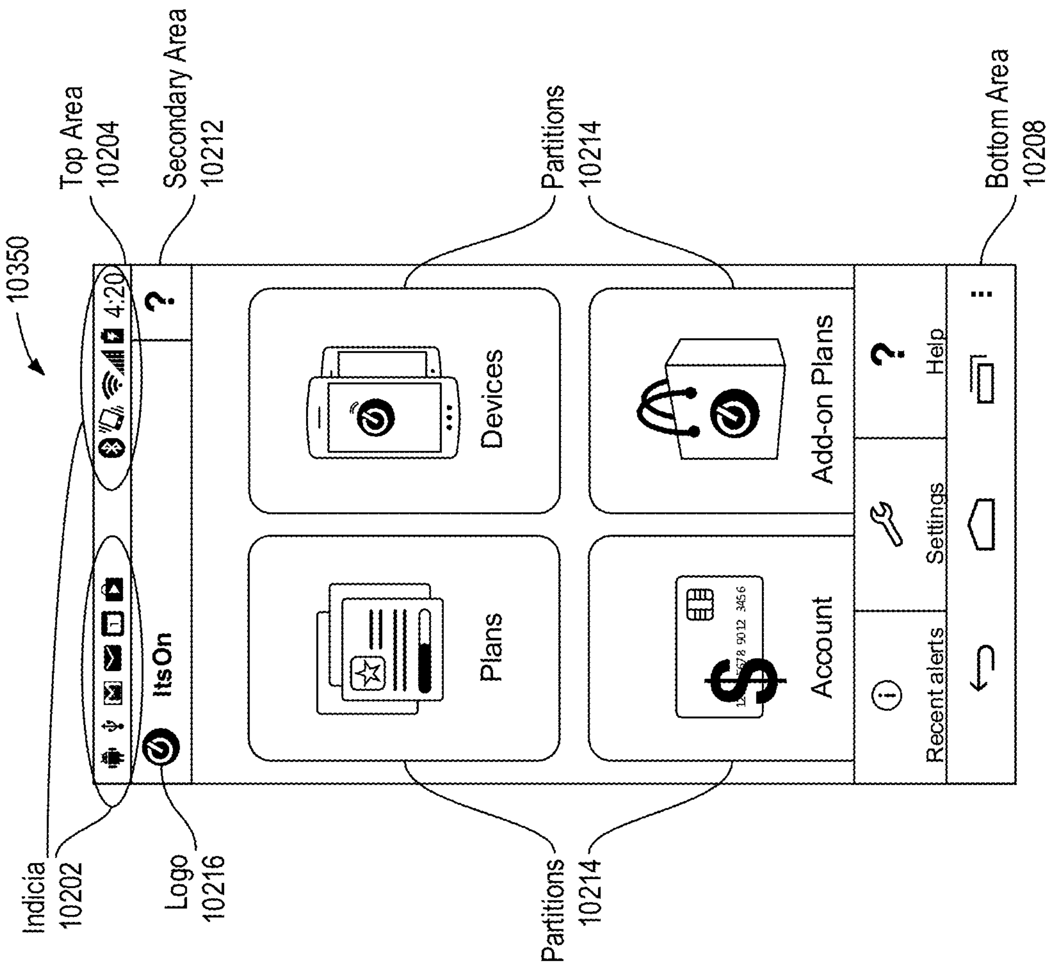
FIG. 72 illustrates a representative "Home" screen in which the bottom area of the "Home" screen of FIG. 68 is expanded in accordance with some embodiments.

FIG. 72 illustrates a representative "Home" screen 10350 in which the bottom area 10208 of the "Home" screen 10320 is expanded by selecting the vertical ellipsis to reveal additional buttons. The additional buttons illustrated in the bottom area 10208 of the "Home" screen 10350 can include access to alert notifications ("Recent Alerts"), access to configuration settings ("Settings") for the mobile wireless communication device, and access to "Help." The expandable bottom area 10208 can provide an area for additional useful buttons without cluttering the "Home" screen 10350 with too much information simultaneously. The expandable bottom area 10208 can be included as part of other representative screens of the UI 101 on the mobile wireless communication device 100 and need not be limited to the "Home" screen 10350 illustrated in FIGS. 68 and 72. (For example, FIGS. 64 and 65 also include the expandable bottom area 10208.)

FIGS. 73, 74, 75, and 76 illustrate representative screens that may be presented through the UI 101 of the mobile wireless communication device 100 to the user when selecting the "Plans" partition 10214 of FIGS. 68 and 72 and/or the "Plans & Sharing" partition 10214 of FIG. 70. A set of service plans or service plan bundles may be presented to the user through the UI 101 of the mobile wireless communication device 100 and may provide information about the set of service plans or service plan bundles organized into a number of parallel "tabs." The tabs can present different information about service plans and service plan bundles to the user of the mobile wireless communication device 100. In some embodiments, the user can review service plans or service plan bundles subscribed to presently as well as previously subscribed to service plans or service plan bundles. In some embodiments, the user can manage subscription to and sharing of service plans or service plan bundles through one or more of the presented screens. In some embodiments, the user can track service usage of one or more of the service plans or service plan bundles. In some embodiments, the user can view a service usage history for one or more presently subscribed to or previously subscribed to service plans or service plan bundles.

Figure 73:
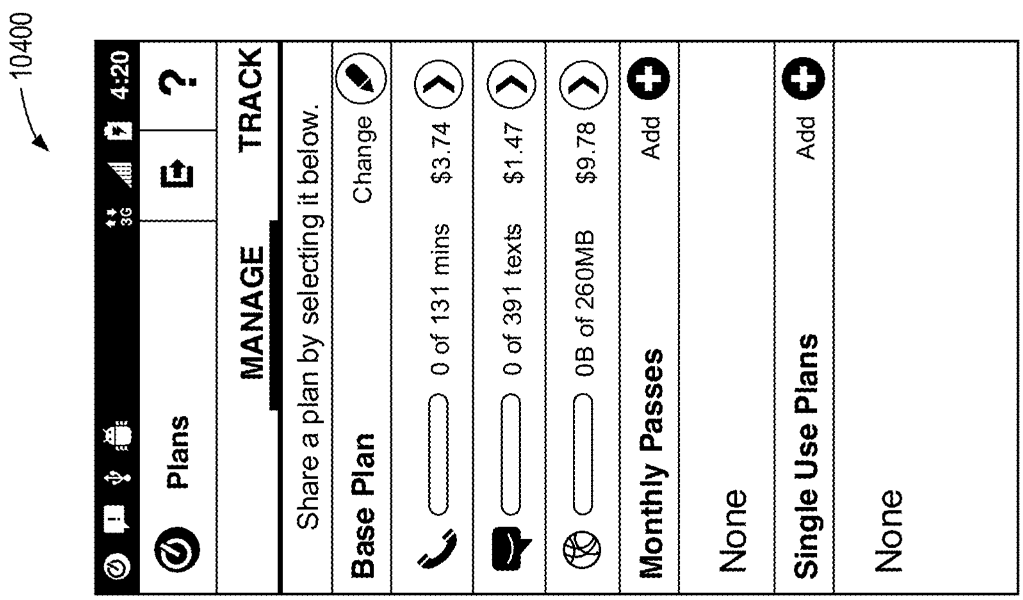
FIG. 73 illustrates a representative screen that provides information to manage service plans for the mobile wireless communication device in accordance with some embodiments in accordance with some embodiments.

FIG. 73 illustrates a representative screen 10400 that provides information to manage service plans for the mobile wireless communication device 100. The service plan management screen 10400 shown can be accessed by selecting the "Plans" partition 10214 of FIGS. 68 and 72. Equivalent screens can also be reached by selecting the "Plans & Sharing" partition 10214 of FIG. 70. The secondary area 10212 of screen 10400 includes several different "tabs" (of which a "Manage" tab and a "Track" tab are visible, while additional tabs can also be available, e.g., by scrolling to view the additional tabs.) The "Manage" tab of the "Plans" screen can provide a summary of service plans or service plan bundles available to, subscribed to, or accessible by the user of the mobile wireless communication device 100. The service plans or service plan bundles can be organized into one or more different groups according to relevant characteristics of the service plans or service plan bundles. For example, a base service plan bundle can include a set of service plans that provide services to which the user of the mobile wireless communication device 100 subscribes for a specified repeated time period. The base service plan bundle can include several individual service plans, such as a voice service plan with access to voice communication for a number of minutes each time period. The base service plan bundle can also include a messaging service plan providing a capability to receive and transmit a number of messages each time period. (Messages can be text messages as illustrated, or more generally can be messages of one or more media types, e.g., audio messages, picture messages, video messages, and multimedia messages.) The base service plan bundle can also include a quantity of data units (e.g., 260 MB as shown) that can be transmitted and received through the wireless network for one or more applications or operating system services. The mobile wireless communication device 100 can also include a number of additional service plans or service plan bundles that apply for a specified time period, e.g., a monthly pass to access an Internet site or service. The mobile wireless communication device 100 can also include a number of additional service plans or service plan bundles that apply for a specified usage, e.g., a single use service plan to download and view a movie.

As shown in FIG. 73, a summary of current service usage for several different service plans of a base service plan bundle can be shown on the "Manage" screen 10400 as well as accumulated service usage charges for each respective service plan included in the service plan bundle. Selecting an arrow within a specific service plan area can access additional detailed information about the specific service plan. The user of the mobile wireless communication device 100 can also access screens by which the base service plan bundle can be changed by selecting a change icon. Supplemental service plans, e.g., monthly passes and single use service plans, can be added to the base service plan bundle by the user of the mobile wireless communication device 100 by selecting the add icon. The user of the mobile wireless communication device 100 can also select a service plan bundle (or a constituent service plan, or a stand-alone service plan) to share with one or more other wireless communication devices 100.

Figure 74:
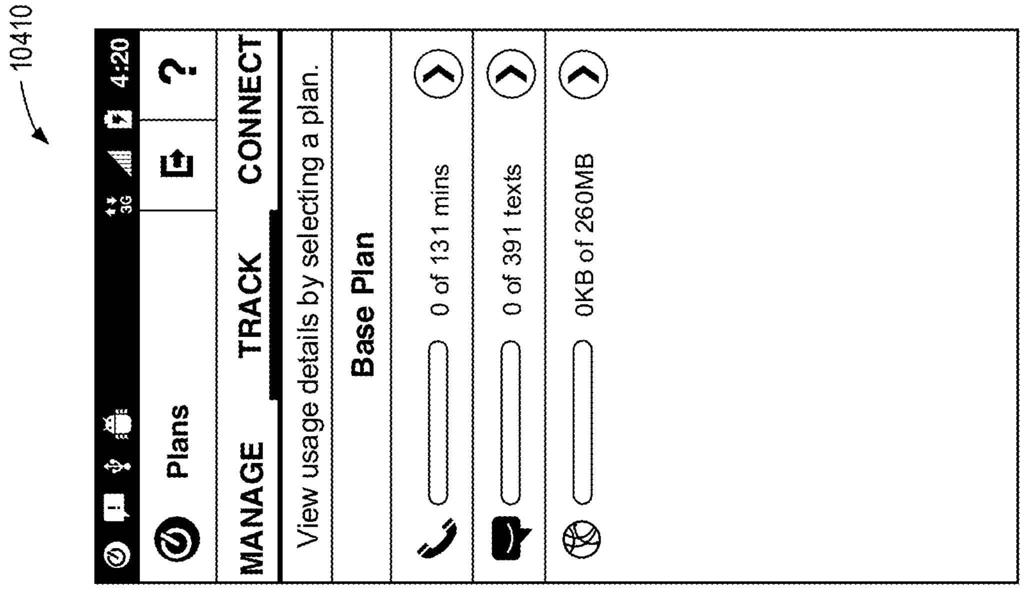
FIG. 74 illustrates a representative screen that provides information to track service usage for a base service plan for the mobile wireless communication device in accordance with some embodiments.

FIG. 74 illustrates a representative screen 10410 that provides information to track service usage for the base service plan bundle. A user of the mobile wireless communication device 100, in some embodiments, may access the screen 10410 to track service plan usage by selecting the "Track" tab of screen 10400 or screen 10410. A similar screen may be provided for information about any of the service plans or service plan bundles to which the user of the mobile wireless communication device 100 can use. Additional details of usage for a specific service plan, or for a service plan bundle, can be accessed by selecting the service plan or service plan bundle through the UI 101 of the mobile wireless communication device 100. The service usage details can include a representation of the amount of service usage consumed and a remaining (and/or total) allocation for each service plan (or service plan bundle). As shown in FIG. 74, the base service plan bundle includes an allocation of 131 minutes for a voice service plan of the base service plan bundle, an allocation of 391 text messages for a messaging service plan of the base service plan bundle, and an allocation of 260 Mbytes for a data service plan of the base service plan bundle. For each of the service plans illustrated, none of the allocation to the service plans has been used. As service usage occurs, an up-to-date value for service usage consumption can be displayed. In some embodiments, one or more device agents in the mobile wireless communication device 100 can determine the service usage consumption. In some embodiments, one or more network elements of one or more wireless networks, through which the mobile wireless communication device 100 can communicate, can determine the service usage consumption. In some embodiments, both device agents in the mobile wireless communication device 100 and network elements can determine the service usage consumption. In some embodiments, progress bars illustrate in real time (or near real time) actual service usage consumption for service plans and/or service plan bundles. In some embodiments, a finer breakdown of service usage for a service plan is presented. In some embodiments, a summary of service usage for certain types of service activities is presented. In some embodiments, the summary of service usage spans multiple service plans.

Figure 75:
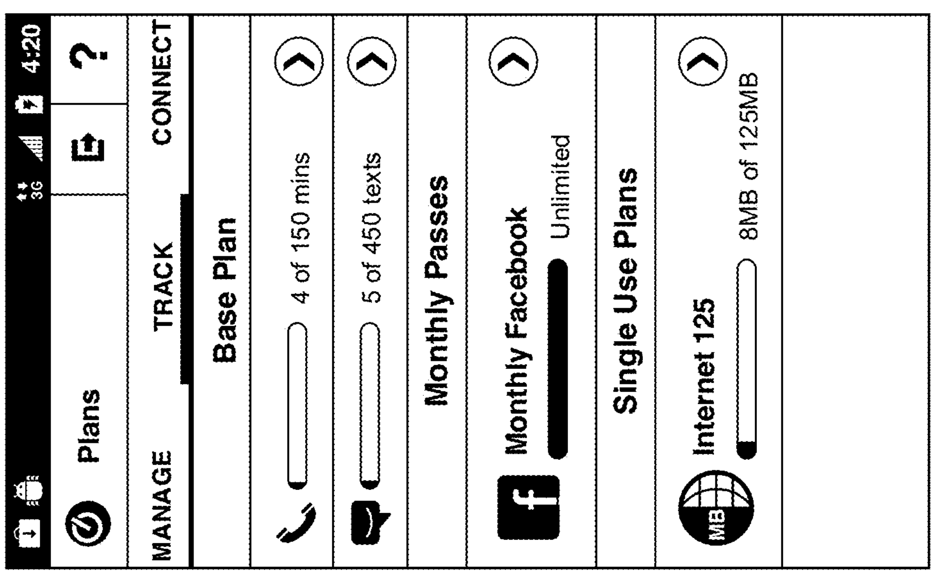
FIG. 75 illustrates another representative screen for tracking service usage of service plans in accordance with some embodiments.

FIG. 75 illustrates another representative screen 425 for tracking service usage of service plans and service plan bundles subscribed to by a user of the mobile wireless communication device 100. Screen 425 illustrates that the base service plan bundle includes two constituent service plans, a voice service plan having 150 minutes available in a subscription time period of which 4 minutes have been used, and a text messaging service plan having 450 text messages available in a subscription time period of which 5 text messages have been used. For the screen 425 shown in FIG. 75, the user of the mobile wireless communication device 100 also subscribes to a monthly Facebook service plan with unlimited access to Facebook and a single use Internet data access service plan having 125 MB available of which 8 MB has been used. In some embodiments, additional information for each of the subscribed to service plans and service plan bundles, including individual service plans within base service plan bundles, can be selected to determine additional detailed service usage information for the particular service plan or service plan bundle selected. In some embodiments, the user can display the detailed information of the particular service plan or service plan bundle on the UI 101 of the mobile wireless communication device 100 by selecting the "right arrow" displayed for the particular service plan or service plan bundle.

Figure 76:
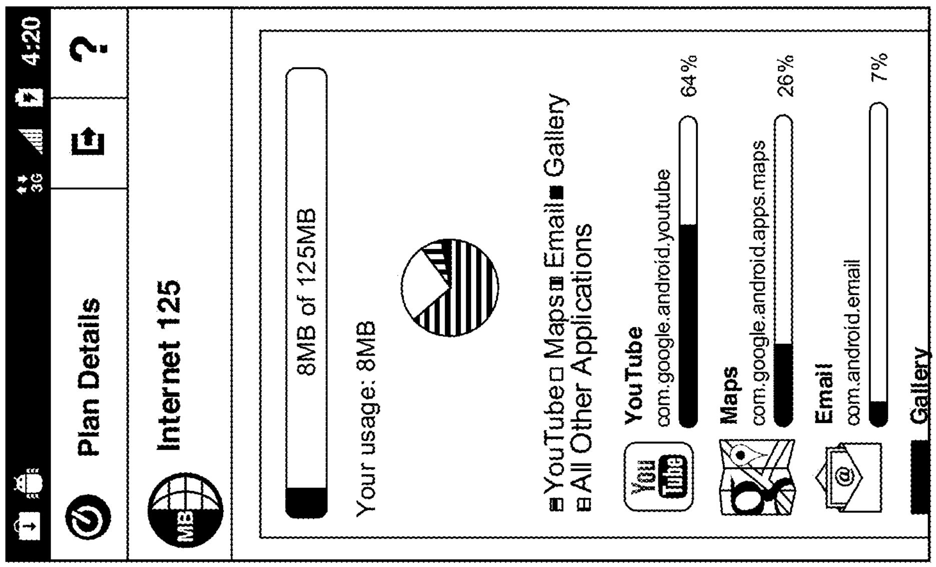
FIG. 76 illustrates a representative screen providing detailed service usage information for a particular service plan of FIG. 75 in accordance with some embodiments.

FIG. 76 illustrates a representative screen 10414 that provides detailed service usage information for the single use "Internet 125" data access service plan shown in on the screen 10412 of FIG. 75. In some embodiments, the detailed service usage information provides a breakdown of the service usage for the time period of the particular service plan or service plan bundle according to different appropriate sub-categories. In the representative screen 10414, the service usage detail for the "Internet" access plan provide a breakdown according to several different specific applications, namely for a YouTube application, a Maps application, an Email application, a Gallery application, and a summary for "All Other Applications." In some embodiments, the detailed breakdown is displayed according to one or more other criteria, e.g., websites, network addresses, application type, time period, geographic location, or any other subcategorization that can be useful to the user of the mobile wireless communication device 100 to track or analyze service usage. In some embodiments, the detailed breakdown provides service usage amounts for each sub-category. In some embodiments, the detailed breakdown provides a percentage of total service usage for each sub-category.

Figure 77:
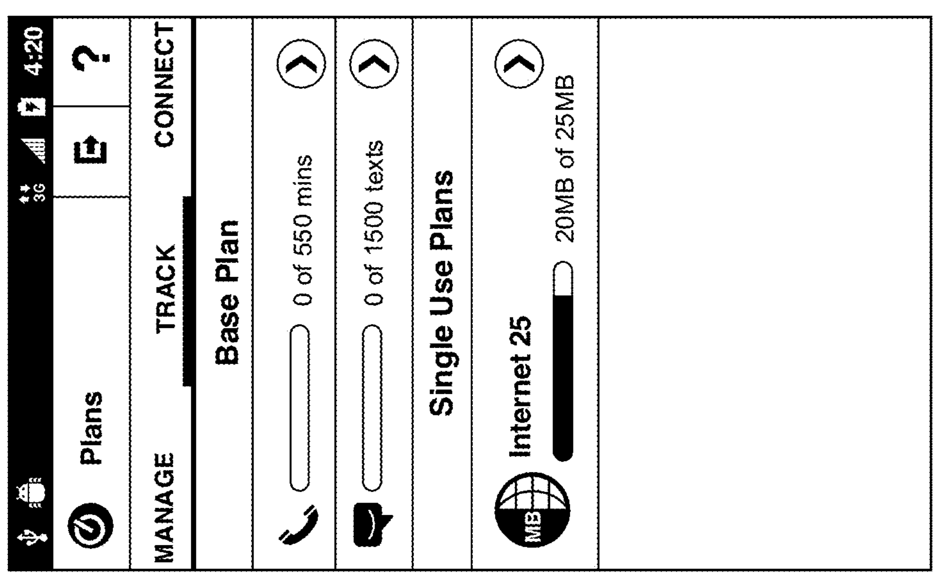
FIG. 77 illustrates a representative screen providing summary service usage tracking information for a set of service plans in accordance with some embodiments.

In some embodiments, notification messages are displayed on the UI 101 of the mobile wireless communication device 100 in response to alerts. In some embodiments, notification messages are triggered based on service usage for one or more service plans or service plan bundles. In some embodiments, a service usage notification is displayed when service usage for a particular service plan or a service plan bundle reaches a specified level, e.g., at 60%, 80%, and/or 100% of available service usage. FIG. 77 illustrates a representative screen 10415 that provides summary service usage tracking information for a set of service plans for the mobile wireless communication device 100. Screen 10415 illustrates a single use Internet data access plan labeled "Internet 25" having 20 MB of 25 MB available service usage consumed. In some embodiments, a notification message is displayed to alert the user that 80% of available service usage for the particular service plan has been consumed.

Figure 78:
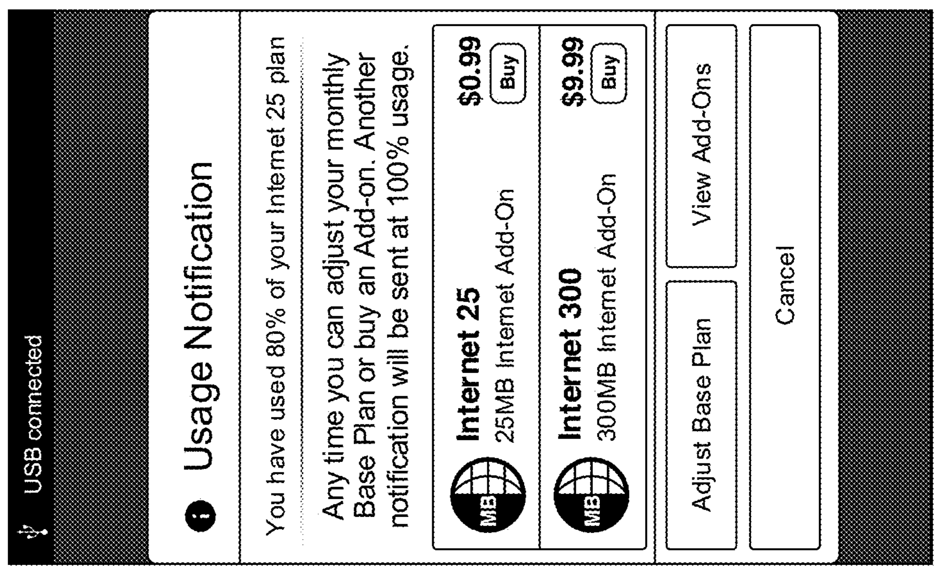
FIG. 78 illustrates a representative screen providing a notification message when a particular service plan has reached a pre-determined service usage level in accordance with some embodiments.

FIG. 78 illustrates a representative screen 10416 that provides a notification message alerting the user of the mobile wireless communication device 100 that a particular service plan has reached 80% service usage. In some embodiments, the notification message provides options for the user to purchase additional service usage. In some embodiments, the presented options are targeted to the service usage based on the particular service plan. In some embodiments, the notification message provides service plans based on a previous service usage, a present service usage, and/or a service usage history. Screen 10416 illustrates a notification message alerting the user of the option to adjust an allowance for a base service plan bundle, e.g., by adjusting or adding to a service plan included within a base service plan bundle. Screen 319 also provides the user an opportunity to add on specific targeted service plans and/or service plan bundles. In some embodiments, the notification message includes service offers that "up-sell" to the user service plans or service plan bundles having higher service usage capacity and higher service usage cost. The "up-sell" notification message provides a service provider opportunity to increase revenue targeted specifically to users that require the increased capacity service plans and service plan bundles, e.g., based on tracking of service usage of service plans and service plan bundles for the mobile wireless communication device 100. Screen 10416 includes two specific add on data access service plans, each having a different service usage capacity and service usage cost. In addition, screen 10416 includes selectable buttons for adjusting the base service plan bundle and to view additional add-on service plans.

In some embodiments, a service provider can sponsor a set of service plans and/or service plan bundles on the mobile wireless communication device 100. In some embodiments, a service plan or service plan bundle in the set of sponsored service plans and/or service plan bundles can be available for a pre-determined period of time and provide a limited introduction to a service. In some embodiments, the set of sponsored service plans and/or service plan bundles can be automatically subscribed to during an activation process for the mobile wireless communication device 100. In some embodiments, the set of sponsored service plans and/or service plan bundles can be pre-loaded into the mobile wireless communication device 100. In some embodiments, applications associated with the set of sponsored service plans and/or service plan bundles can be pre-loaded into the mobile wireless communication device 100 during a manufacturing process. In some embodiments, one or more sponsored service plans and/or service plan bundles can be associated with one or more applications in the mobile wireless communication device. In some embodiments, association of the one or more applications with the sponsored service plans and/or service plan bundles can occur during activation of the mobile wireless communication device 100.

Figure 79:
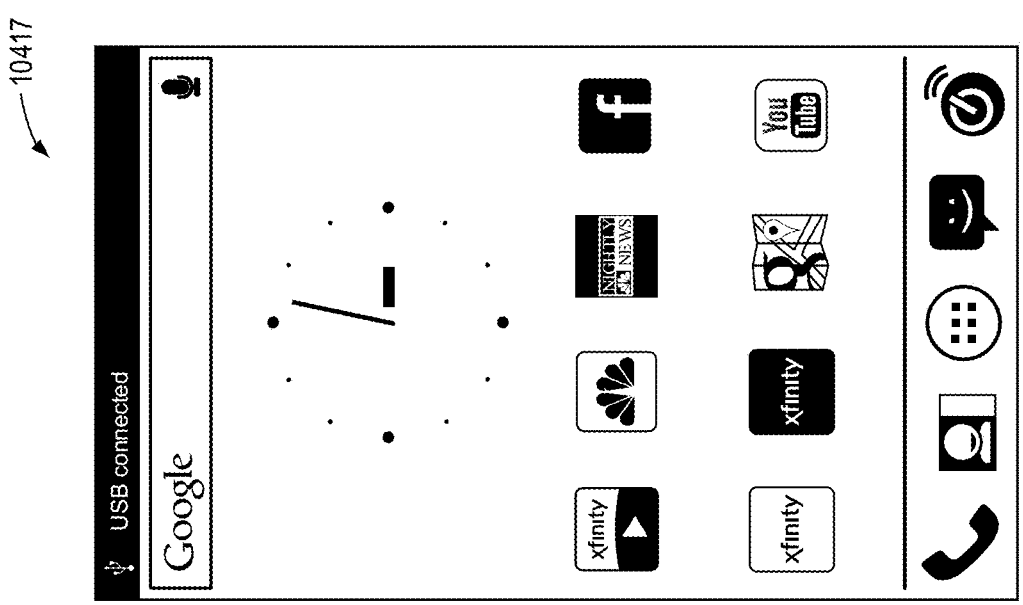
FIG. 79 illustrates a representative screen displaying a number of applications loaded into the mobile wireless communication device in accordance with some embodiments.

FIG. 79 illustrates a representative screen 10417 displaying a number of applications loaded into the mobile wireless communication device 100. In some embodiments, one or more of the applications displayed are pre-loaded into the mobile wireless communication device 100. In some embodiments, one or more of the applications displayed are loaded into the mobile wireless communication device 100 during an activation process for the mobile wireless communication device. In some embodiments, the pre-loaded or activation loaded applications can offer a sponsored service plan or service plan bundle for access to services using the application.

Figure 80:
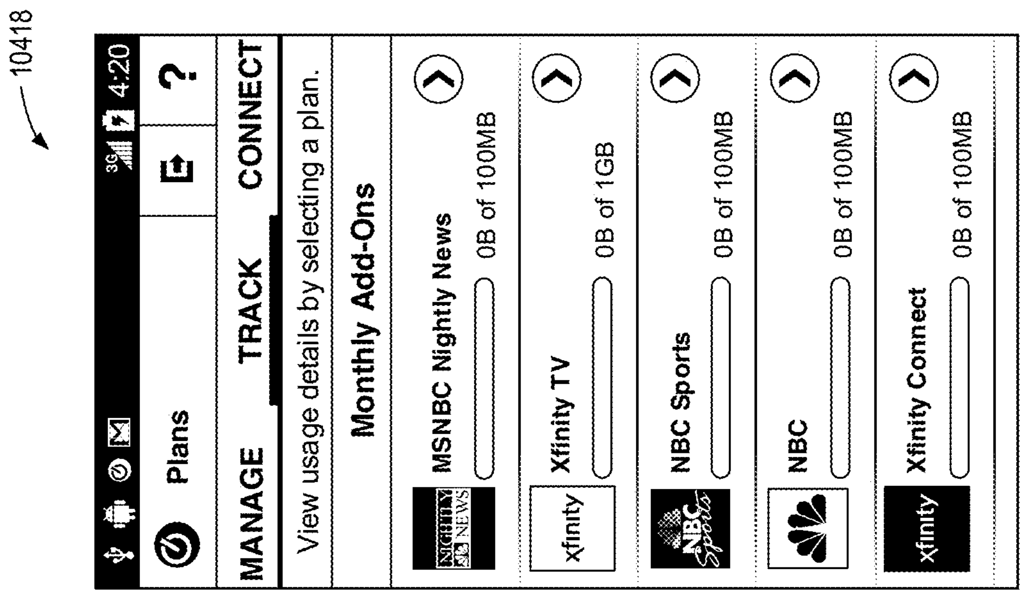
FIG. 80 illustrates a representative screen that provides tracking information for several service plans associated with the mobile wireless communication device in accordance with some embodiments.

FIG. 80 illustrates a representative screen 10418 that provides tracking information for several application-specific service plans on the mobile wireless communication device 100. In some embodiments, one or more of the application specific service plans illustrated by screen 10418 can be pre-loaded or loaded during activation to the mobile wireless communication device 100. In some embodiments, a service plan associated with an application displayed on screen 10418 provides a service associated with the application for a limited time. In some embodiments, a service plan associated with an application displayed on screen 10418 can be "upgraded" from a sponsored service plan to a subscription service plan. In some embodiments, the sponsored service plan provides for limited service usage, e.g., access to only a limited set of content, network destinations, limited for a period of time, etc., while the subscription service plan provides for more extensive service usage. In some embodiments, a service plan associated with an application displayed on screen 10418 can provide a limited amount of service usage. In some embodiments, a notification message can be displayed to a user of the mobile wireless device 100 through the UI 101 offering an "upgrade" to a subscription service plan when a pre-determined level of service usage for a sponsored service plan occurs.

Figure 81:
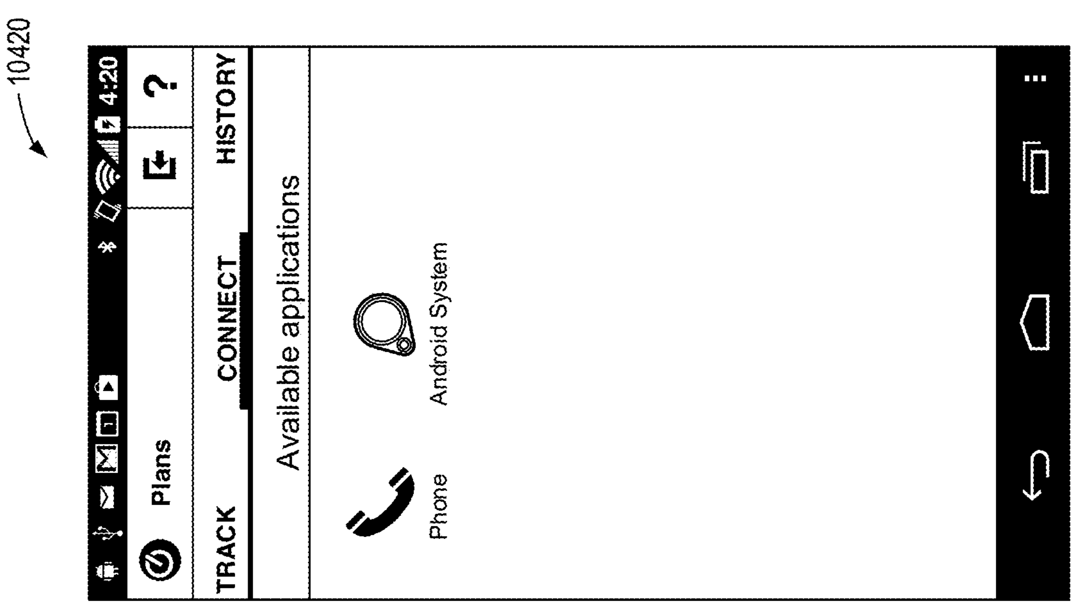
FIG. 81 illustrates a representative screen that provides information for several applications available to the user of the mobile wireless communication device in accordance with some embodiments.

FIG. 81 illustrates a representative screen 10420 that provides information for several applications available to the user of the mobile wireless communication device 100. Selecting the "Connect" tab of screen 10410 or screen 10420 can access the displayed screen 10420. The user of the mobile wireless communication device 100 can access one of the available applications by selecting one of the icons displayed on screen 10420, e.g., establishing a "voice" connection by selecting the "phone" icon to use a "phone" application.

Figure 82:
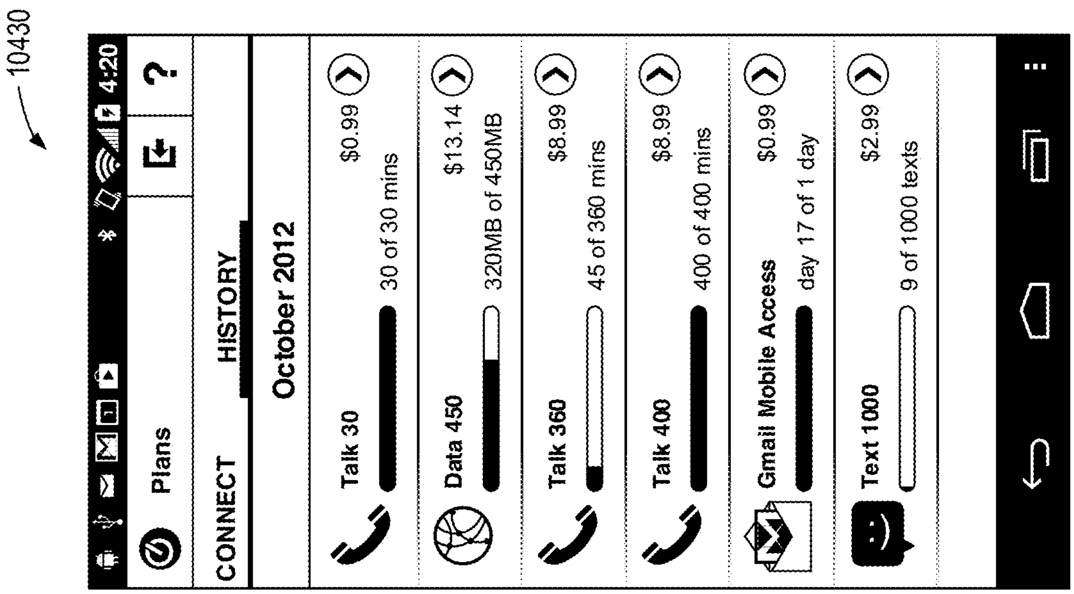
FIG. 82 illustrates a representative screen that provides a summary of a history of service usage for various service plans for the mobile wireless communication device in accordance with some embodiments.

FIG. 82 illustrates a representative screen 10430 that provides a summary of a history of service usage for various service plans to which the user of the mobile wireless communication device is presently subscribed to (and/or previously subscribed to) during a particular time period. As shown in FIG. 82, a history of service usage for six different service plans are shown. A "usage" indication (e.g., as shown by the embedded bar graphs in each service plan) can be displayed for each service plan along with a summary of service usage amounts and accumulated service usage cost. An allocation for each service plan for the particular time period can also be displayed. The graphical bar displays can represent an amount of service usage consumed out of a total allocation for the service plan. As illustrated by FIG. 82, the user of the mobile wireless communication device 100 can retrieve easily a summary of service usage for multiple service plans, including both current and past subscribed to service plans.

Three different voice service plans are illustrated in the screen 10430, including a 360 minute talk service plan of which 45 minutes have been consumed, and two talk service plans that have been completely consumed (Talk 30 and Talk 400). A 1000 text messaging service plan is also illustrated with only 9 text messages consumed. For a 450 MB data access service plan, a total of 320 MB are shown as consumed. Screen 10430 also illustrates a summary for a single use application specific plan that provides access for a limited time period (one day) to a particular application (Gmail). As indicated, the single use application specific Gmail plan has been consumed a number of days previously. Service plan cost information is also provided for each service plan. This service plan cost information can represent the total subscription cost or an accumulated cost for the applicable time period. Other service plan cost accounting breakdowns and usages can be determined and also displayed. Selecting an arrow button associated with a particular service plan can access details for the particular service plan.

Figure 83:
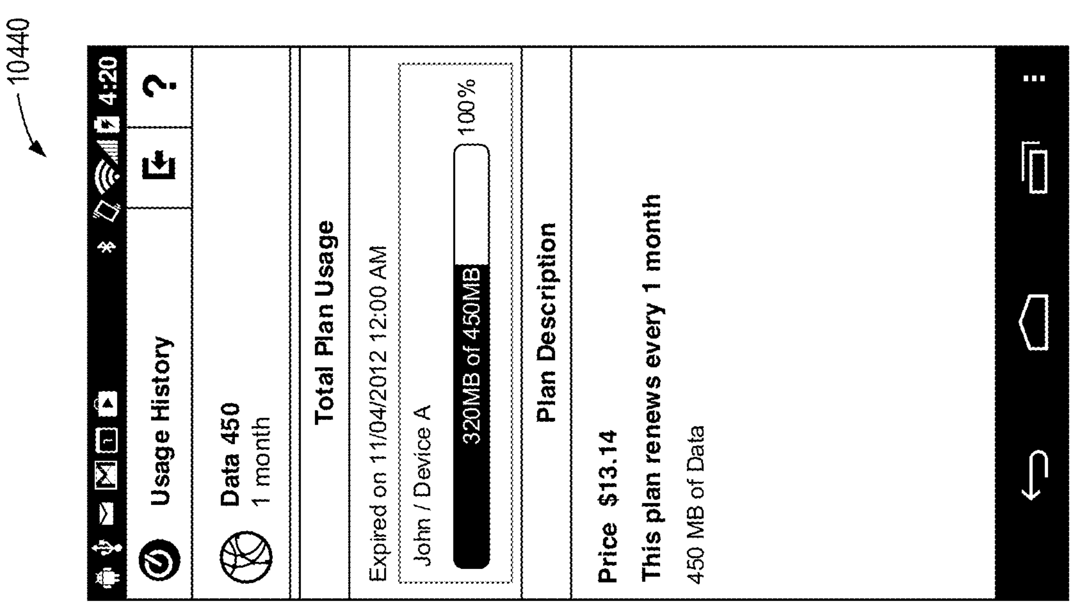
FIG. 83 illustrates a representative screen that provides details of service usage for a selected service plan in accordance with some embodiments.

FIG. 83 illustrates a representative screen 10440 that provides details of service usage for a selected service plan (the Data 450 plan shown in FIG. 82). The user of the mobile wireless communication device 100 can access the detailed service usage history by selecting the particular service plan from screen 10430. The service usage history screen 10440 can provide a summary of the service plan usage, relevant time periods for when service usage occurred, applicable time periods for when the service plan is/was valid. The service usage history screen 440 can also provide a breakdown of service usage and/or service usage cost by users and/or mobile wireless communication devices 100 for a service plan shared among multiple users and/or multiple mobile wireless communication devices 100. The service usage history screen 10440 can also provide a summary of service usage costs for the service plan.

Figure 84:
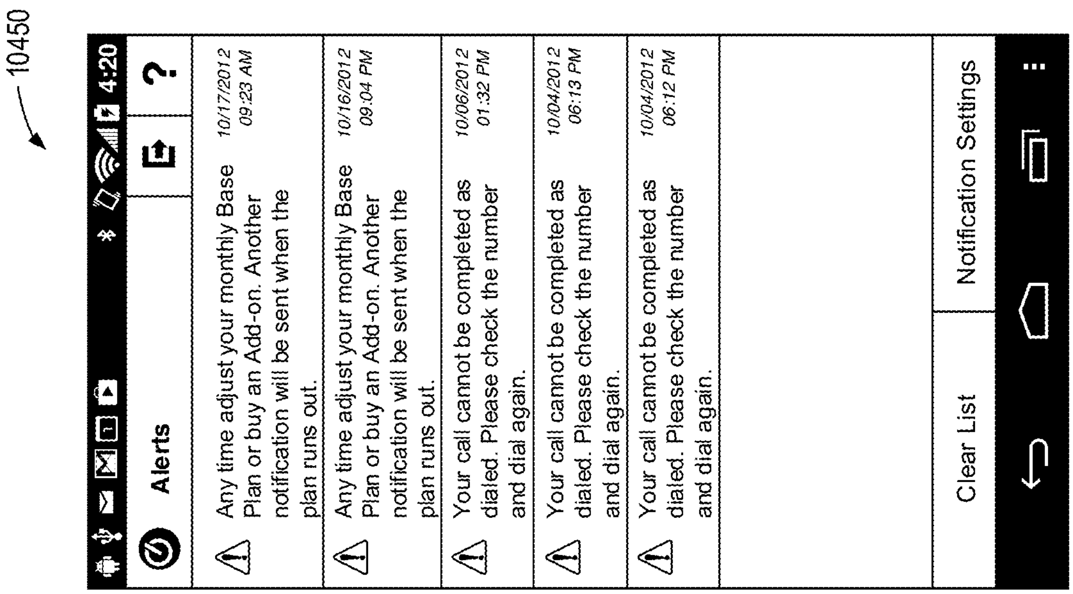
FIG. 84 illustrates a representative screen that provides a summary of notification alerts provided to the user of the mobile wireless communication device in accordance with some embodiments.

FIG. 84 illustrates a representative screen 10450 that provides a summary of notification alerts provided to the user of the mobile wireless communication device 100. In some embodiments, the user of the mobile wireless communication device 100, accesses the notification alert summary screen 10450 by selecting the recent alerts button displayed in the expanded bottom area 10208 (as illustrated in FIG. 72). The user of the mobile wireless communication device can view message contents for each notification alert as well as a time and date associated with the particular notification alert. In some embodiments, settings for notification alerts can be accessed through the notification alert screen 10450 by selecting a "Notification Settings" button. In some embodiments, the displayed list of notification alerts can be cleared by selection a "Clear List" button.

Figure 85:
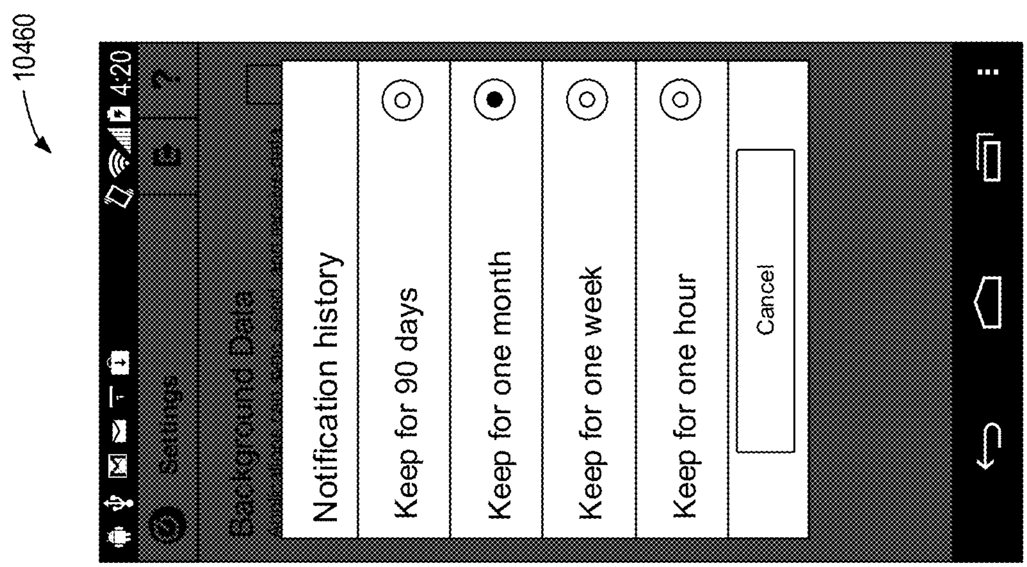
FIG. 85 illustrates a representative overlay screen that provides for setting a time period over which notification alerts are retained in accordance with some embodiments.

FIG. 85 illustrates a representative overlay screen 10460 that provides the user of the mobile wireless communication device 100 multiple options for setting a time period over which notification alerts are retained. The notification history settings overlay can be accessed, in some embodiments, by selecting the "Notification Settings" button illustrated in FIG. 84.

Presenting Information About Voice, Messaging, and Data Services on Mobile Wireless Communication Devices FIG. 3, as described above, illustrates the network management system 10601, in accordance with some embodiments, including device management system 170-1 to assist in defining locations of the UI 101 of the mobile wireless communication device 100 where one or more service launch objects are placed.

In general, a UI location management service provider entity utilizes the apparatus shown in FIG. 3 to establish a discovery level (explained below) for one or more "service launch objects" on the mobile wireless communication device 100 or on a group of mobile wireless communication devices 100 with UI placement (location) and notification messaging functions managed by a device based UI location manager agent 132-1, which is in turn managed by the device management system 170-1. The term "UI location management service provider" is sometimes used herein interchangeably with carrier, referring to a carrier of access services who has control of the UI location management apparatus. In some embodiments, the UI location management service provider is a network access carrier (e.g., a wireless network carrier such as Vodafone, Verizon, T-Mobile, Sprint, or AT&T, or a cable network carrier such as Comcast, etc.). In some embodiments, the UI location management service provider is a third party who provides the location services but does not control or own the access network assets (e.g., an application store or marketplace provider such as Apple or Android/Google, a search services entity such as Google or Bing, or a third-party UI location management entity, etc.). While it is often advantageous for a carrier or application store/marketplace provider to be the UI location management service provider, any entity that controls the UI location management apparatus shown in FIG. 3 controls the UI location management service and therefore controls the discovery level for one or more service launch objects on one or more mobile wireless communication devices in a device group.

"Service launch object discovery level" refers to the level of priority a service launch object (explained below) receives relative to gaining the attention of a user of the mobile wireless communication device 100 in order to encourage selection or launch of the service, content or application associated with the service launch object. A high discovery level generally implies a premium UI location for the service launch object (e.g., a prominent UI service launch partition, home screen, or permanent launcher bar). A high discovery level also generally implies highlighted service launch object icon features and/or prominent or frequent service launch object notification messages. A low discovery level implies less prominent service launch object UI location and service launch object notification messaging (e.g., location in the device application stable or perhaps even only on an application store/marketplace location, with perhaps no notification messaging or a one time notification message the first time the service launch object icon is displayed to the user).

A "service launch object" is an object on the UI 101 of the mobile wireless communication device 100 that the user can select (e.g., "click on," "open," etc.) to initiate a device service 138-1 (e.g., an application) or a network service 120-1. In some embodiments, selection of the service launch object initiates the service by launching an application that is associated with the service launch object, directing an application (such as a browser or portal application) to a particular network destination that is associated with the service launch object, opening a folder with one or more additional service launch object choices for the user to select from, providing the user with a notification regarding service status or service plan permissions for this service, providing the user with payment or service account configuration options to enable the service, and/or providing the user with means to download an application from the application download server 140-1 and launch the device service 138-1 or the network service 120-1. A service launch icon can be a graphic, a text string, a UI user entry field or any other means for the user to choose to activate a service launch object.

FIG. 67 illustrates an example of a home screen 10310 displayed on the user interface 101 of the mobile wireless communication device 100 (e.g., a tablet, smart phone, cell phone, or any other type of mobile wireless communication device 100). The screen 10310 of FIG. 67 is an example of a screen 310 that a user might see after he or she has purchased the mobile wireless communication device 100, but before he or she has purchased or otherwise acquired any service plans. FIG. 67 illustrates that the home screen 10310 contains various indicia 10202 related to the mobile wireless communication device 100. These indicia 10202 include the type of network to which the mobile wireless communication device 100 is connected (3G in FIG. 67), a signal strength (four bars shown in FIG. 67), a battery charge level, time, etc.

Below the top area 10204 of the screen presenting information about the mobile wireless communication device is a region that, in the example of FIG. 67, includes three categories 10222 of service plans the user is invited to purchase or otherwise acquire: "Voice," "Text," and "Internet." In the example of FIG. 67, "Voice" refers to service plans providing voice, "Text" refers to service plans providing messaging (e.g., SMS, MMS), and "Internet" refers to service plans providing data services (e.g., access to the Internet). As would be appreciated by a person having ordinary skill in the art, other categories and category names are possible, and more or fewer categories can be displayed or presented. In some embodiments, the service provider may specify, through the SDC 135 or through the device management system 170-1, that the categories 10222 are color-coded, e.g., the voice portion of the screen may be red, the text portion of the screen may be green, and the Internet portion of the screen may be blue. The service provider may also specify, through the SDC 135 or through the device management system 170-1, the displayed icons and how, if at all, those icons change (e.g., as time passes, based on network state, based on type of network to which the mobile wireless communication device is connected, based on a state of the mobile wireless communication device, etc.).

Each of the "Voice," "Text," and "Internet" regions/icons shown in FIG. 67 is configured so that a user may view more information about the service plans in a category 10222 (e.g., information about service plans the user has purchased or otherwise acquired) by selecting one of the regions/icons, e.g., by tapping within the "Voice," "Text," or "Internet" areas of the display screen or by some other means, such as by using a voice command, a shortcut key, a key press, a button, etc. Several figures that will be presented later illustrate the types of information that a user may access by selecting one of the categories.

Below the three service plan categories shown in FIG. 67, in the bottom area 10208, are user-selectable icons that are configured to allow a user to view information about a user account, to view a catalog of services or service plans, and to view settings for the mobile wireless communication device 100.

In some embodiments, a user who attempts to place a phone call, send a text message, or access the Internet from the mobile wireless communication device 100 in the state shown in FIG. 67 (e.g., with no associated service plans) is informed that he or she cannot do so because the mobile wireless communication device 100 does not have (is not associated with) any service plan that accommodates the desired activity. In some embodiments, the notification is a message displayed on the user interface 101 screen, e.g., as a pop-up message or through a different screen. In some embodiments, the notification is an audible message. In some embodiments, the notification is an audible noise. In some embodiments, the notification is a vibration of the mobile wireless communication device. In some embodiments, the notification is configured by the service provider using the SDC 135 or using the device management system 170-1. In some embodiments, the content of the notification or a notification policy specifying how and when the notification should take place is obtained from a network element (e.g., by pull or push). In some embodiments, the content of the notification is stored locally on the mobile wireless communication device 100, and the service processor 115 or a device agent detects that the user is attempting a service activity for which there is no service plan, accesses the notification content, and presents the notification to the user.

FIG. 86 illustrates an embodiment of a screen 10470 that may be displayed when a user selects the "Catalogue" region of FIG. 67. In some embodiments, a catalog is displayed on screen 10470 providing information on service plans available for the mobile wireless communication device 100. In some embodiments, the catalog displayed includes a combination of one or more paid service plans, sponsored service plans, free service plans, featured service plans, service plan promotions, and targeted service plans. At the top of the catalog page/screen 10470 is an optional banner area that may be used, in some embodiments, to present information such as advertisements, promotions, marketing materials, or any other content. In some embodiments, the banner area displays content specified by a service provider using the SDC 135 or using the device management system 170-1. For example, a service provider could choose to display one or more advertisements in the banner area. FIG. 86 illustrates the banner area showing an advertisement for a voice plan with 2 hours of talk time, anywhere in the United States, for $2.49. The advertisement shown in FIG. 86 also indicates that the plan expires 1 month after purchase. In some embodiments, the content of the banner area is static, such as one advertisement or a collage comprising several advertisements; a service provider logo; or any other content. In some embodiments, the banner area displays content that changes based on one or more of: time of day, the passage of time, a network state (e.g., a level of congestion, etc.), a network type (e.g., Wi-Fi, cellular, roaming, etc.), geographic location of device, device state (e.g., the device is new, etc.), or any other criterion. For example, using the SDC 135 or using the device management system 170-1, a service provider or other party may specify a sequence of content for display in the banner area. In some embodiments, the banner area presents a "cover flow control" that a user can scroll through. In some embodiments, the user can earn credit against a service plan by viewing or scrolling through the content of the banner area. In some embodiments, some or all of the content of the banner area is obtained, either by the SDC 135 or by the device management system 170-1 or by the mobile wireless communication device 100, from an external source, such as, for example, an ad server. As will now be clear to a person having ordinary skill in the art in view of the disclosures herein, by using the SDC 135 or the device management system 170-1, the service provider can specify not only the features, ordering, and number of advertisements or content, but also how long each item of content appears in the banner area, and this flexibility leads to infinite possibilities to specify and manage the content of the banner area.

The embodiment of FIG. 86 shows that below the banner area of the catalog page are four user-selectable regions, labeled "Voice," "Text," "Internet," and "Bundles." These are the four categories of service plans offered by the service provider in the example embodiment of FIG. 86. As would be appreciated by a person having ordinary skill in the art, the number, labeling, and content of service plan categories may differ, and FIG. 86 simply presents an example. Another example of a possible category of service plans is Wi-Fi, e.g., a collection of available Wi-Fi hotspots. Additional figures, discussed below, will illustrate the information a user may access by selecting one of the plan category icons shown in FIG. 86.

Below the service plan category area of FIG. 86 is an area labeled "Featured Plans." In some embodiments, using the SDC 135 or the device management system 170-1, a service provider, or a third party with access to at least a portion of the SDC 135 or the device management system 170-1, specifies one or more service plans that the service provider (or third party) wishes to promote, whether for the service provider's (third-party's) own benefit or as the result of a contract with a third party (e.g., a third party pays the service provider for a favorable placement of a service plan within the featured plans area). In the example of FIG. 86, the featured plan area contains three plans: Facebook for 1 hour for 10 cents, a 2-minute domestic calling plan for 10 cents, and a 10 MB data plan that expires in 24 hours for 25 cents. Using the SDC 135 or device management system 170-1, the service provider (or third party) can configure which plans appear in the featured plans area and the order in which the features plans are presented. Like the banner area, the content of the featured plans area may be static, or it may change based on a criterion or several criteria (e.g., based on one or more of a network state, a network type, a device state, a device type, a geographic location, etc.). For example, a service provider could use the SDC 135 or device management system 170-1 to specify that when the mobile wireless communication device 100 is a tablet, the featured plans will include e-readers, and the banner region will scroll through ten different plan, with each plan displayed for 5 seconds. As would be appreciated by a person having ordinary skill in the art, the featured plan area can contain service plans of the same types or of different types (e.g., one or more of voice, data, messaging, or any other conceivable plan type). It should now be clear in view of the disclosures herein that there are limitless possibilities for the content that may be displayed in the banner area.

Figure 87:
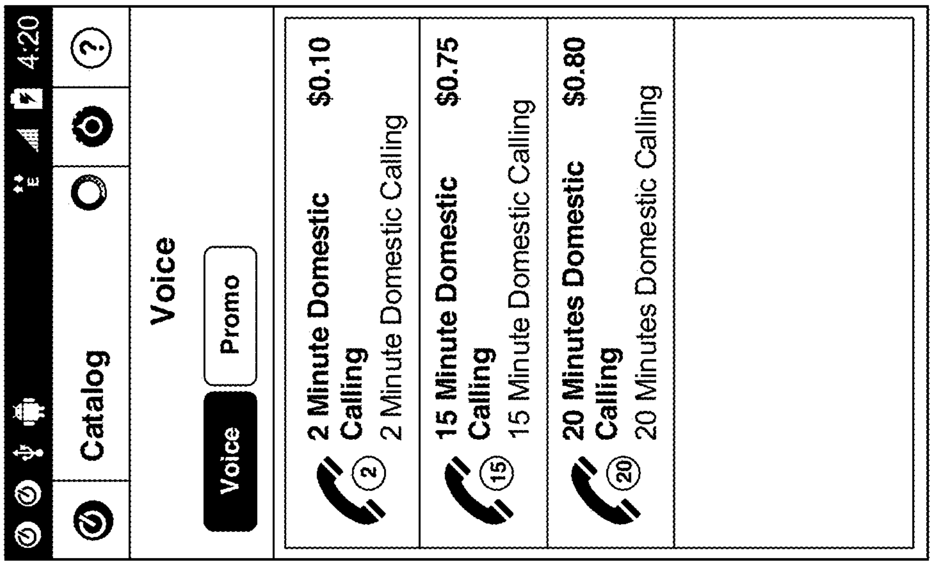
FIG. 87 illustrates a representative screen displayed when a user selects the "Voice" area of FIG. 86 in accordance with some embodiments.

FIG. 87 illustrates an example of a screen 10471 that might be displayed when a user selects the "Voice" area shown in FIG. 86. The example of FIG. 87 shows three voice service plans: a 2-minute domestic calling plan that costs 10 cents; a 15-minute domestic calling plan that costs 75 cents; and a 20-minute domestic calling plan that costs 80 cents. Although all of the voice service plans shown in FIG. 87 provide only for domestic calls, FIG. 87 is simply an example, and other voice service plans may provide for one or more of, for example, domestic calling, international calling, and voice over IP (VOIP) calling. FIG. 87 also shows two regions above the listing of voice service plans, labeled "Voice" and "Promo." Using the SDC 135 or device management system 170-1, a service provider can configure not only user-paid service plans, but also promotional service plans, such as sponsored service plans (e.g., wherein the user's access is subsidized or entirely paid-for by a sponsor entity), which would appear when the user selects the "Promo" area of the display. The same sorts of configuration controls (e.g., number of service plans, order of display, whether static or dynamic, etc.) that can be used to control the content of the banner area can also be applied to control the presentation of the "Voice" and/or "Promo" service plans. In addition, other service plan categories can be established based on user preferences (e.g., based on content that the user accesses through the mobile wireless communication device or by entering information about the user's likes or preferences through the mobile wireless communication device). For example, there may be a category called "Suggested Plans," in which are service plans that the user might want or like based on detected or entered user preferences.

Figure 88:
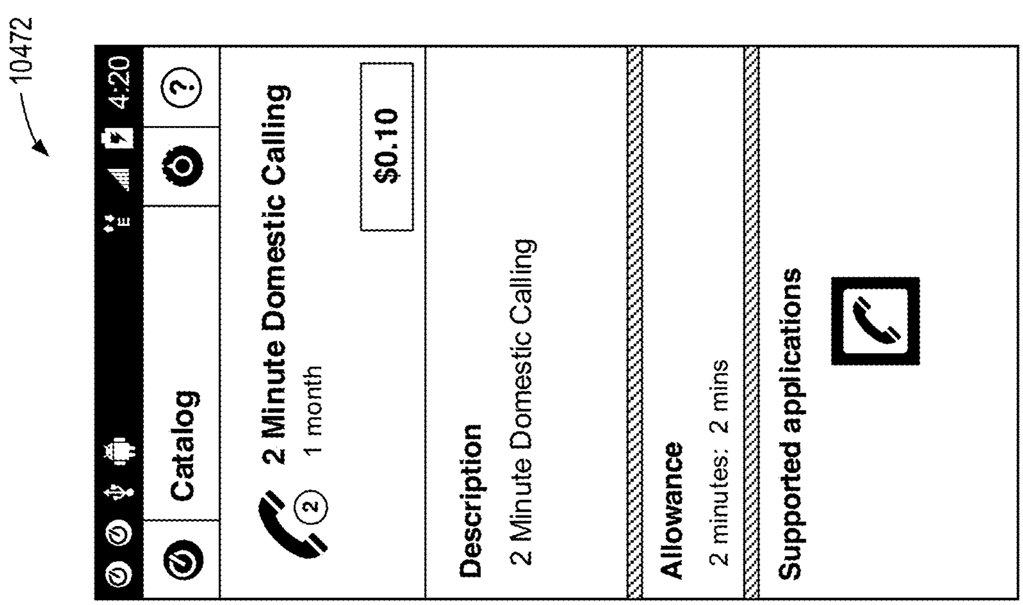
FIG. 88 illustrates a representative screen displayed when a user selects the 2-minute domestic calling plan of FIG. 87 in accordance with some embodiments.

FIG. 88 is an example of a screen 10472 that a user might see after selecting the 2-minute domestic calling plan shown in FIG. 87. FIG. 88 shows details of the 2-minute domestic calling plan, such as a description, an allowance, and the supported mobile wireless communication device applications.

Figure 89:
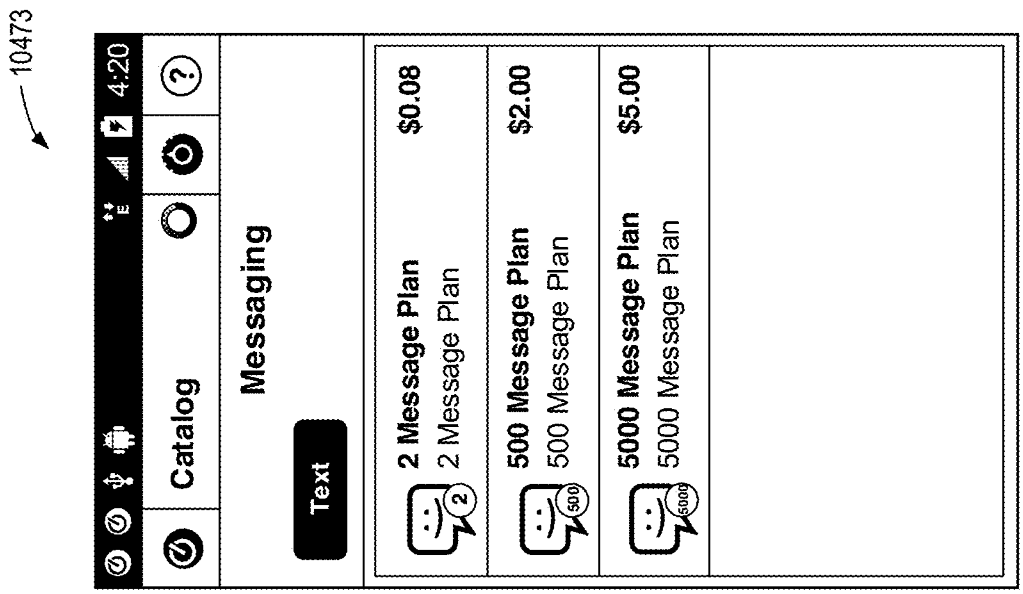
FIG. 89 illustrates a representative screen displayed when a user selects the "Text" area of FIG. 86 in accordance with some embodiments.

FIG. 89 illustrates an example of a screen 473 that might be displayed when a user selects the "Text" area shown in FIG. 86. FIG. 89 shows three messaging service plans: a 2-message plan that costs 8 cents, a 500-message plan that costs $2, and a 5000-message plan that costs $5. The messaging service plans shown in FIG. 89 are simply examples; the messaging service plans that would actually be displayed are those configured by a service provider using the SDC 135 or device management system 170-1. Although FIG. 89 illustrates three text message service plans, plans within the "Text" category, in some embodiments, can also include both SMS and MMS plans.

Figure 90:
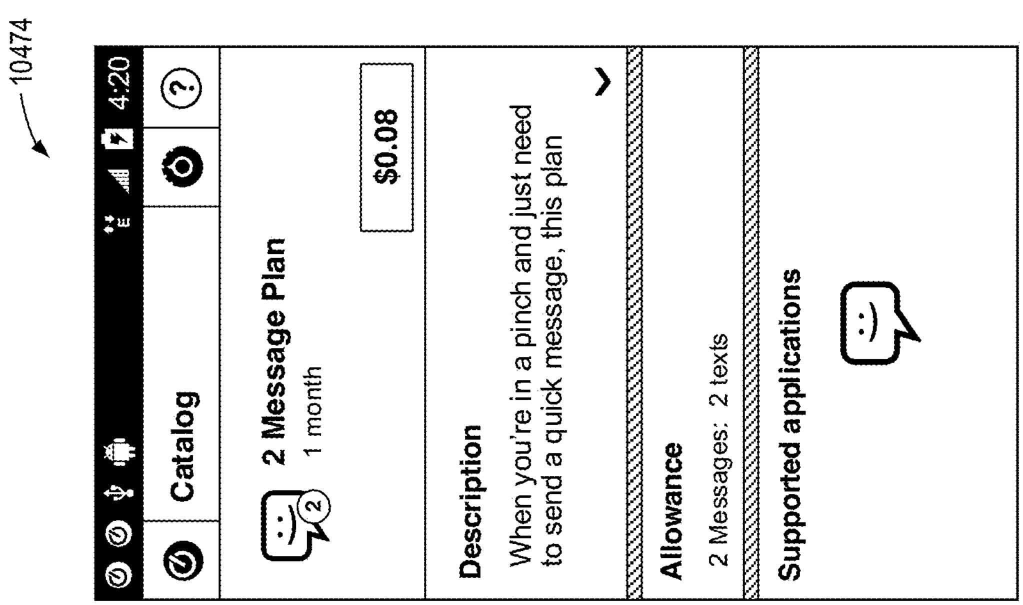
FIG. 90 illustrates a representative screen displayed when a user selects the 2-message text plan of FIG. 89 in accordance with some embodiments.

FIG. 90 is an example of a detail screen 10474 that a user might see after selecting the 2-message text plan shown in FIG. 89. FIG. 90 shows details of the 2-message plan, such as a description, an allowance, and the supported mobile wireless communication device applications.

Figure 91:
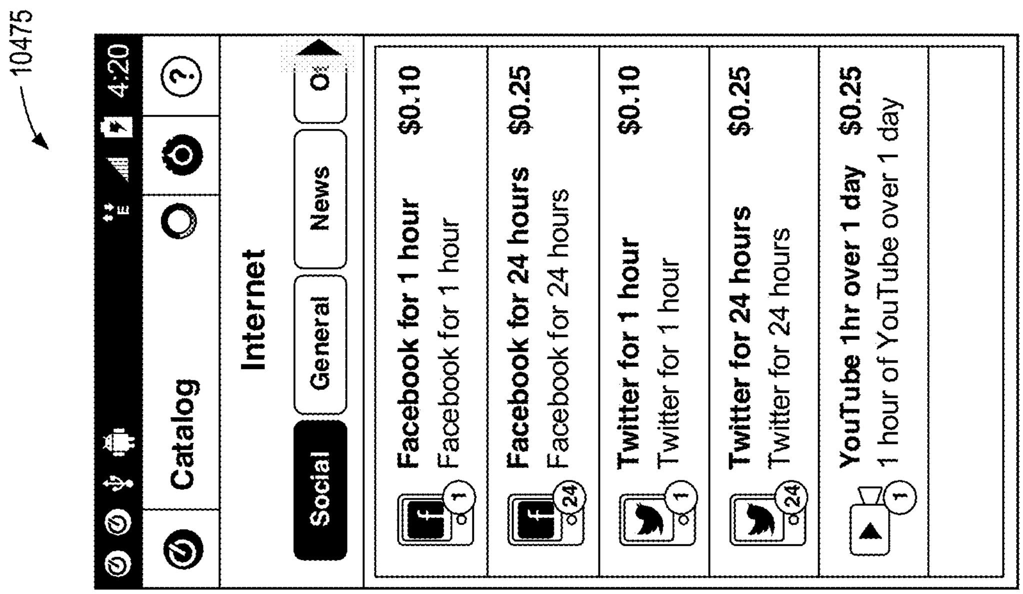
FIG. 91 illustrates a representative screen displayed when a user selects the "Internet" area of FIG. 86 in accordance with some embodiments.

FIG. 91 illustrates an example of a screen 10475 that might be displayed when a user selects the "Internet" area shown in FIG. 86. In the embodiment of FIG. 91, the Internet service plans are displayed in categories that appear as user-selectable regions near the top of the screen 10475: "Social," "General," "News," etc. In some embodiments, the particular categories, their order of display, and the service plans associated with them may be configured by a service provider or a third party using the SDC 135 or device management system 170-1. In FIG. 91, the "Social" area is highlighted, and the available plans are those that the service provider specified as "Social" plans. FIG. 91 shows five service plans available in the "Social" category: Facebook for 1 hour for 10 cents; Facebook for 24 hours for 25 cents; Twitter for 1 hour for 10 cents; Twitter for 24 hours for 25 cents; and YouTube for 1 hour, expiring in 1 day, for 25 cents.

Figure 92:
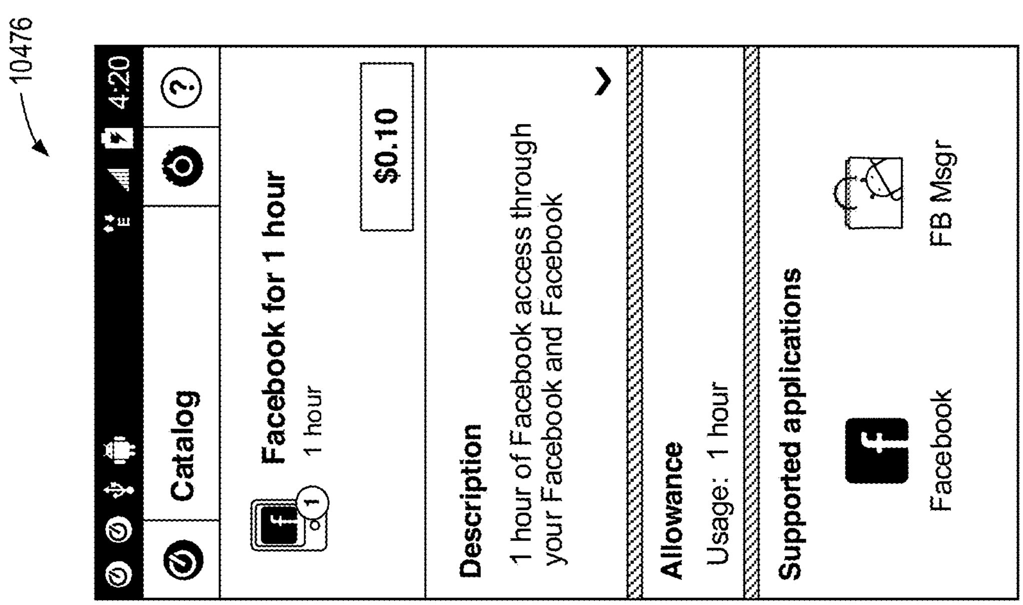
FIG. 92 illustrates a representative screen displayed when a user selects the service plan labeled "Facebook for 1 hour for 10 cents" of FIG. 91 in accordance with some embodiments.

FIG. 92 illustrates an example screen 10476 that might appear when a user selects the service plan labeled "Facebook for 1 hour for 10 cents" shown in FIG. 91. FIG. 92 shows details of the service plan, including a description, an allowance, and supported applications. In the example of FIG. 92, the service plan allows for one hour of Facebook access using the Facebook application and the Facebook Messenger application. Thus, as illustrated by FIG. 92, a service plan may be associated with more than one mobile wireless communication device application.

Figure 93:
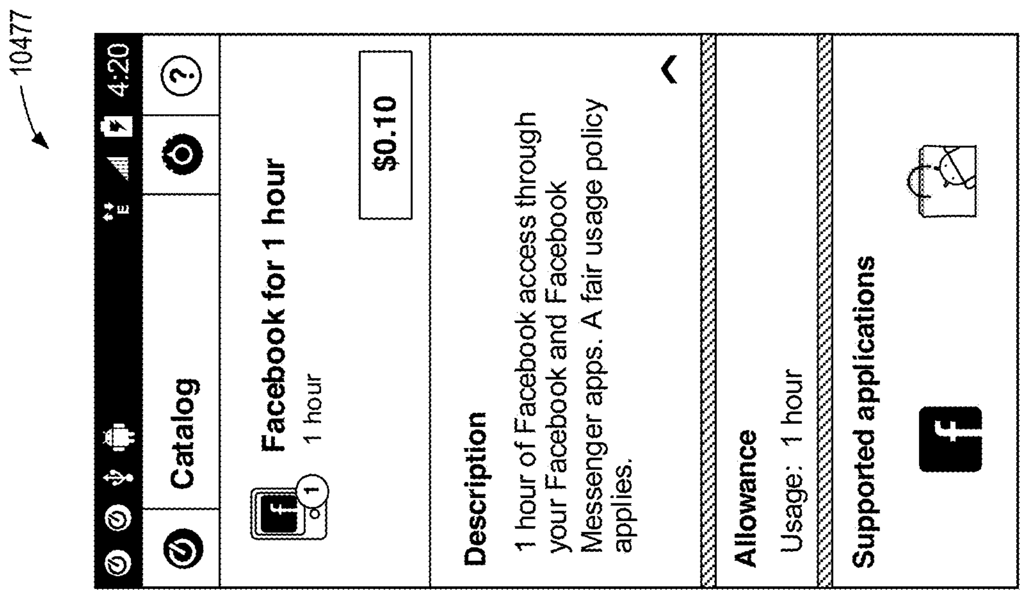
FIG. 93 illustrates a representative screen displaying a full description when a user selects a down arrow of FIG. 92 in accordance with some embodiments.

FIG. 92 contains a down arrow in the description field. FIG. 93 illustrates that when a user selects the down arrow, a full description appears. In the example of FIG. 93, the service provider has provided information about the applications that are associated with the service plan, and the service provider also warns the user about a fair usage policy applying, e.g., to give the service provider the ability to block a user's access if the user's use of the service plan is extremely high.

Figure 94:
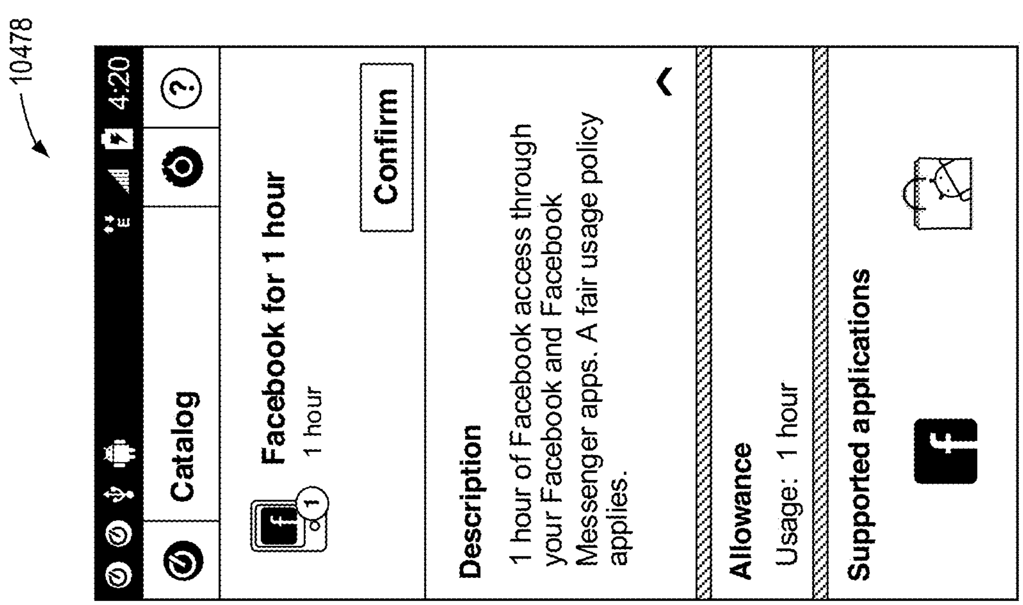
FIG. 94 illustrates a representative screen displayed when a user selects the price area ("$0.10") of FIG. 93 in accordance with some embodiments.

FIG. 94 illustrates a screen 10478 that might appear when a user selects the price area ("$0.10") of FIG. 93. A new region labeled "Confirm" is shown in FIG. 94.

Figure 95:
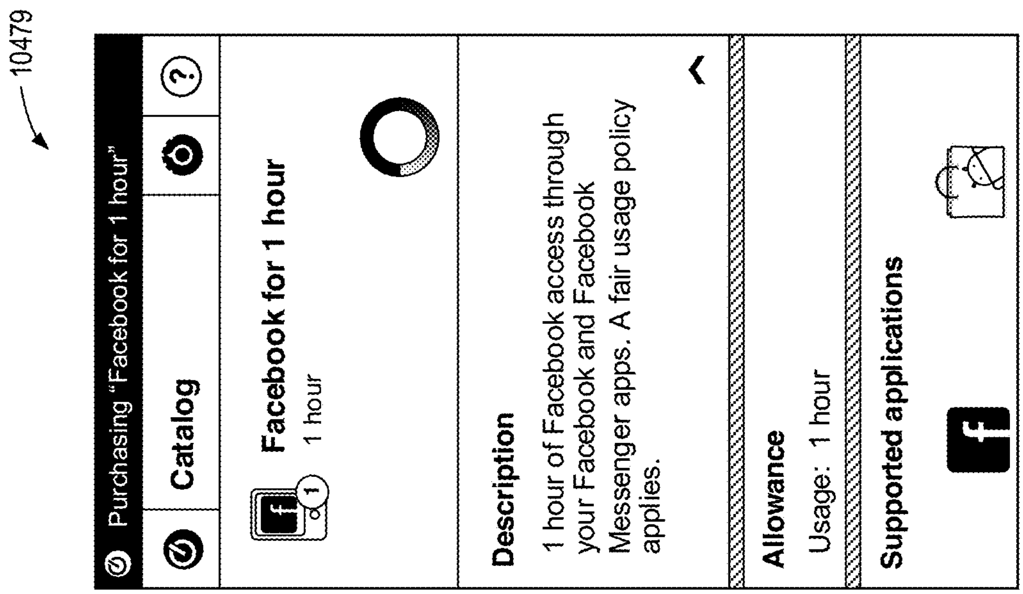
FIG. 95 illustrates a representative screen displayed when a user selects the "Confirm" region of FIG. 94 in accordance with some embodiments.

FIG. 95 illustrates a screen 10479 that might appear when a user selects the "Confirm" region of FIG. 94. The "Confirm" area changes to a symbol, such as a rotating circle, a progress bar, or any other content that indicates to the user that the purchase is in progress.

Figure 96:
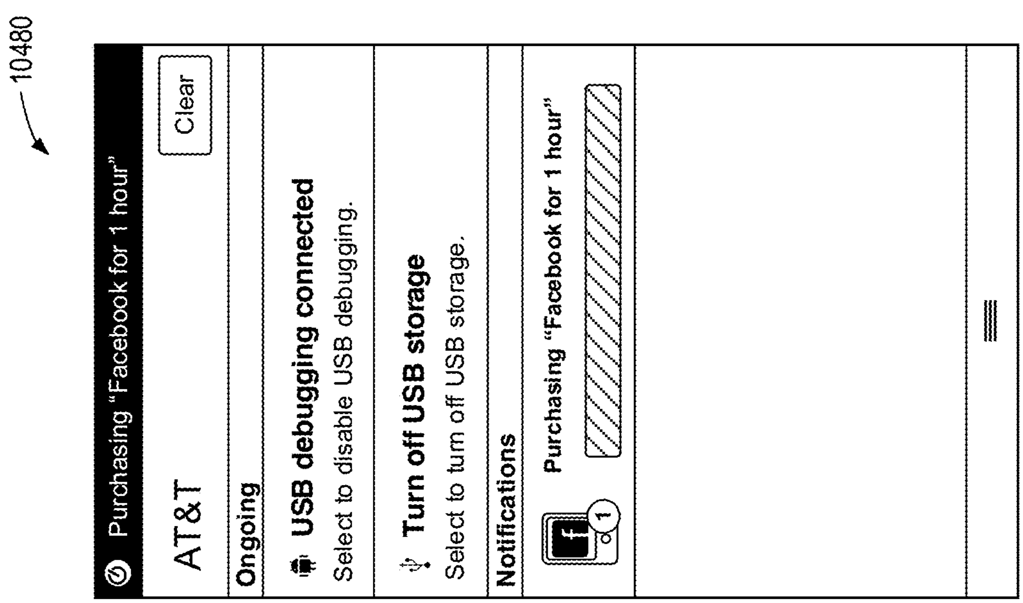
FIG. 96 illustrates a representative status screen indicating progress of a purchase of the particular service plan of FIG. 92 in accordance with some embodiments.

FIG. 96 illustrates a status screen 10480 that indicates a purchase of the Facebook for 1 hour plan is in progress. The screen 10480 of FIG. 96 may be accessed, for example, by a user swiping upward on the arrow that appears at the bottom of FIG. 67 while the purchase of FIG. 95 is in progress.

Figure 97:
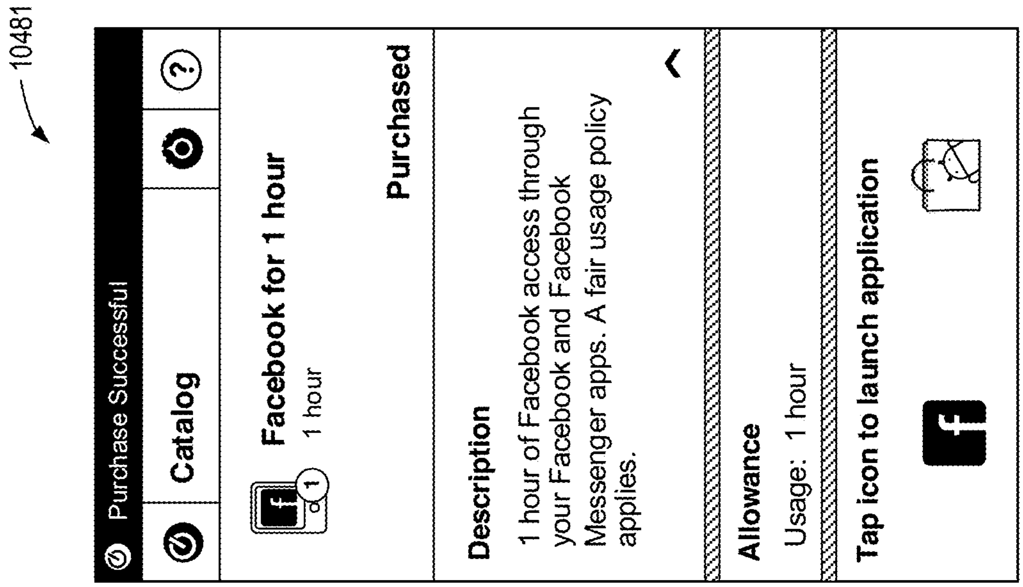
FIG. 97 illustrates a representative screen displayed after the purchase of the particular service plan of FIG. 92 in accordance with some embodiments.

FIG. 97 illustrates a screen 10481 that might appear after the purchase of the Facebook for 1 hour plan has been purchased. The symbol/content that indicated to the user that the purchase was in progress has been replaced by the word "Purchased" so that the user knows the selected plan has been purchased.

Figure 98:
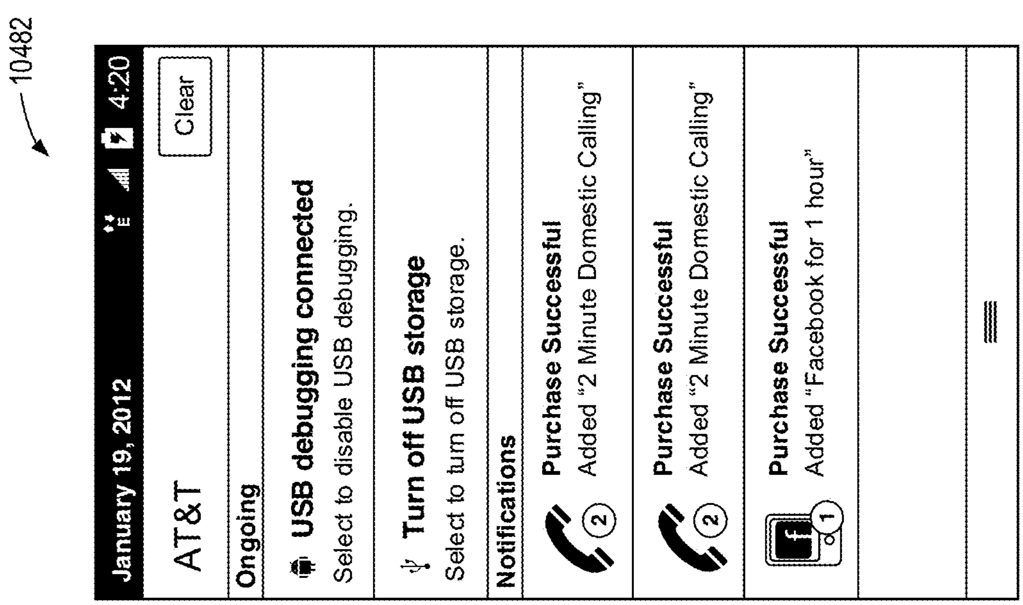
FIG. 98 illustrates a representative status screen displaying notifications through the user interface in accordance with some embodiments.

FIG. 98 illustrates a status screen 10482 that provides notifications to the user. In the example of FIG. 98, the screen 10482 notifies the user that he or she has purchased two voice service plans (each of which is the same 2-minute domestic calling plan, thus giving the user two, 2-minute domestic calling plans) and the Facebook for 1 hour plan. The screen of FIG. 98 may be accessed, for example, by a user swiping upward on the arrow that appears at the bottom of FIG. 67.

Although the process of selecting and purchasing a service plan was explained in the context of an Internet plan (e.g., a Facebook for 1 hour plan), the same process can be used to enable a user to purchase a text service plan, a voice service plan, or a bundled service plan. As would be appreciated by a person having ordinary skill in the art, a bundled service plan is a service plan that includes more than one feature or type of service plan. For example, a bundled service plan might include a voice service plan, a text service plan, and an Internet service plan. As another example, a bundled service plan might include multiple Internet service plans. For example, a social network bundle service plan could include a Twitter service plan, a Facebook service plan, and a text service plan. The inventive concepts disclosed herein provide for a nearly limitless variety in service plans and service plan bundles, and the service plans shown are simply examples that are not meant to be limiting.

Figure 99:
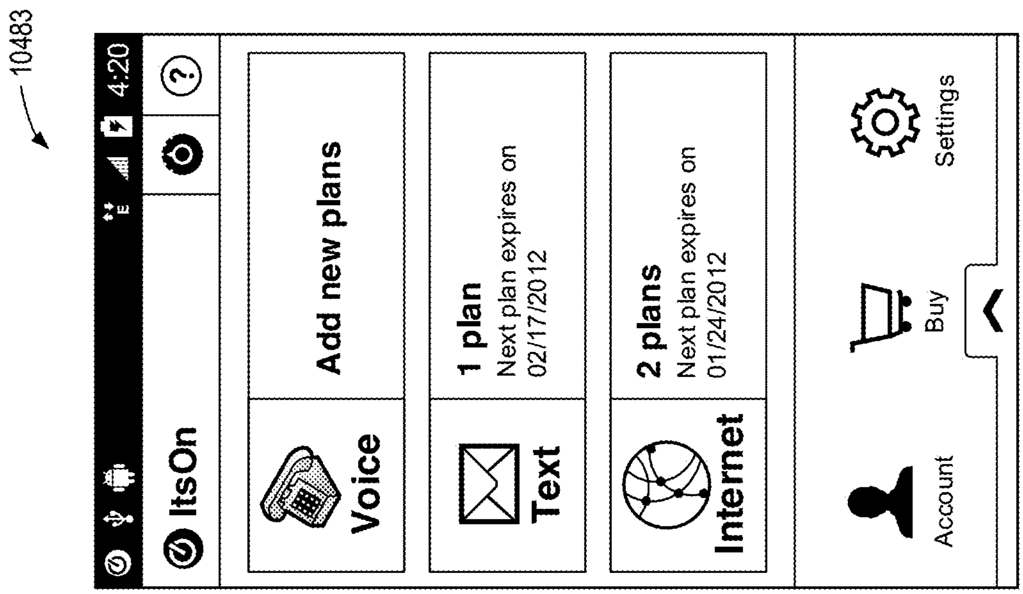
FIG. 99 illustrates a representative "Home" screen when a user has purchased one text service plan and two Internet service plans in accordance with some embodiments.

FIG. 99 illustrates an example of a home screen 10483 after a user has purchased one text service plan and two Internet service plans. The user can see from the home screen 10483 illustrated in FIG. 99 that he or she does not have any voice service plans, but that he or she has one text service plan that expires on Feb. 17, 2012, and that he or she has two Internet service plans, one of which expires on Jan. 24, 2012.

Figure 100:
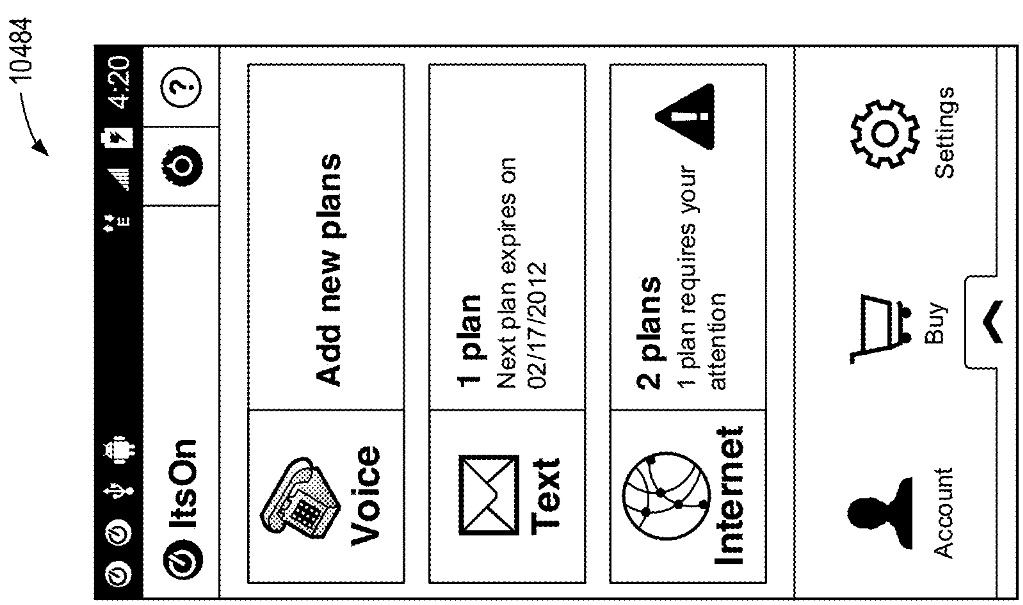
FIG. 100 illustrates a representative "Home" screen warning a user that a service plan requires attention in accordance with some embodiments.

FIG. 100 illustrates an example of a home screen 10484 that warns a user that a service plan requires user attention.

In FIG. 100, the user has no voice service plans, one text service plan, and two Internet service plans, and one of the Internet service plans requires the user's attention, as indicated by the text "1 plan requires your attention" and the triangular "warning" symbol. By selecting the "Internet" region/icon of the home screen 10484, the user can obtain additional information about the Internet service plan that requires user attention.

Figure 101:
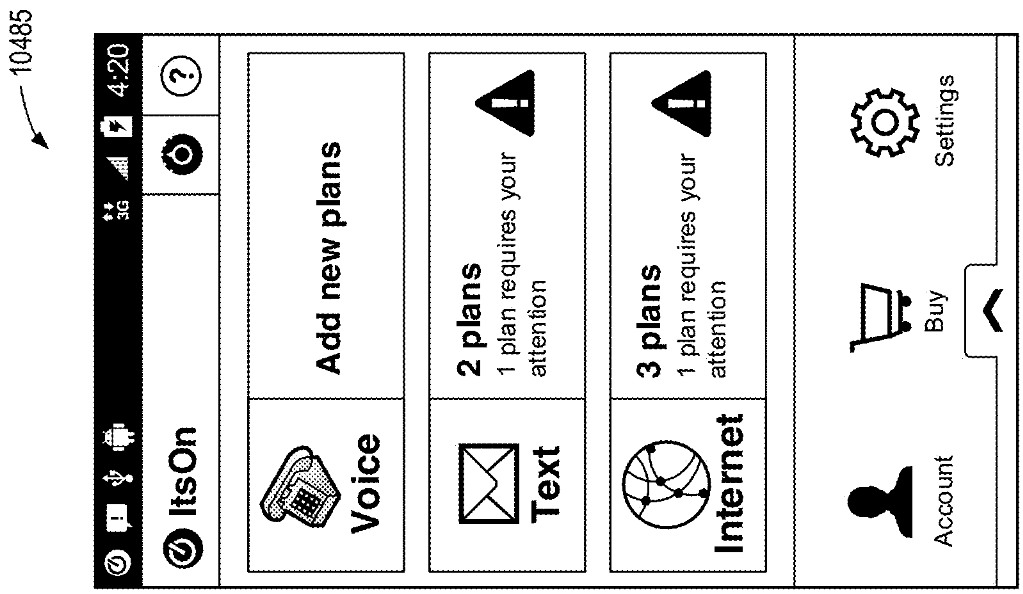
FIG. 101 illustrates a representative "Home" screen warning a user that multiple service plans require attention in accordance with some embodiments.

FIG. 101 illustrates an example of a home screen 10485 that warns a user that multiple service plans require user attention. In FIG. 101, the user has no voice service plans, two text messaging service plans, and three Internet service plans. As illustrated in FIG. 101, one of the text messaging service plans and one of the Internet service plans require the user's attention, as indicated by the text "1 plan requires your attention" and the triangular "warning" symbol shown in both the text messaging region/icon and in the Internet region/icon. By selecting the "Text" region/icon or the "Internet" region/icon of the home screen 10485, the user can obtain additional information about the test messaging service plan or the Internet service plan that requires the user's attention.

Figure 102:
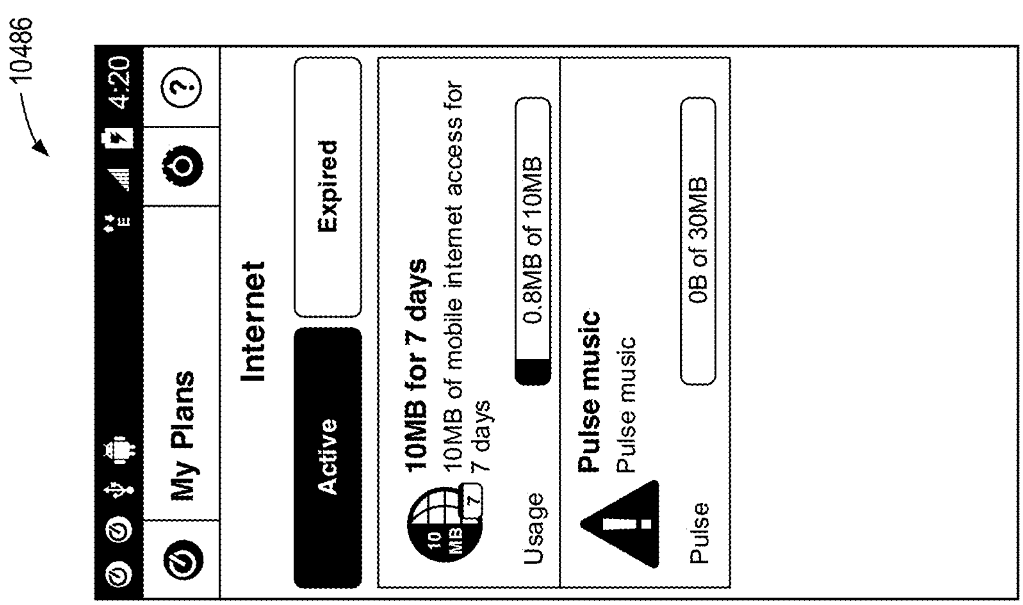
FIG. 102 illustrates a representative screen displayed when a user selects the "Internet" region/icon of the representative "Home" screen of FIG. 101 in accordance with some embodiments.

FIG. 102 illustrates an example of a screen 10486 that the user might access by selecting the "Internet" region/icon of the home screen shown in FIG. 101. The screen 10486 of FIG. 101 shows that the user has two Internet service plans: a 10 MB for 7 days usage Internet service plan, and a Pulse music service plan. FIG. 102 also shows a usage meter that indicates that the user has consumed 0.8 MB of the 10 MB allowed under the 10 MB for 7 days usage Internet service plan. FIG. 102 also illustrates that the user's Pulse music service plan requires attention, even though, according to the Pulse music usage meter, the user has not used that service plan.

Figure 103:
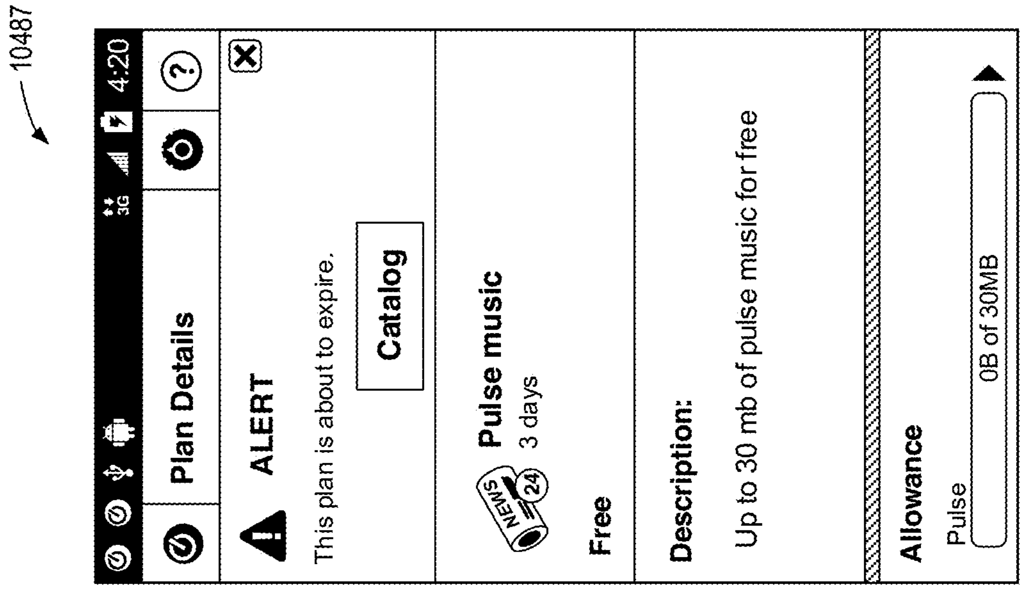
FIG. 103 illustrates a representative screen of information displayed when a user selects the Pulse music region of FIG. 102 in accordance with some embodiments.

FIG. 103 illustrates an example of a screen 10487 of information a user may access by selecting the Pulse music region of FIG. 102. FIG. 103 shows several details about the Pulse music service plan, including that the Pulse music service plan has a lifespan of 3 days, that it is a free service plan (e.g., a sponsored service plan) that provides for up to 30 MB of Pulse music for free, and that the user has not consumed any content associated with this service plan. The screen 10487 shown in FIG. 103 also indicates that the Pulse music service plan is about to expire, and it presents a "Catalog" button that the user may select to view the contents of the catalog (e.g., as shown in FIGS. 87, 88, 89, 90, 91, 92, 93, etc.). Although FIG. 103 illustrates only a "Catalog" button, other buttons can be provided. For example, recommended plans can be offered, where the recommendations may be based on an objective criterion (e.g., "We recommend that you buy this service plan, because it is being offered for half-price today"), based on the user's previous usage (e.g., "We recommend that you buy this service plan based on your previous usage"), or based on some other criterion (e.g., "We recommend that you buy this service plan because this is the most popular service plan among our subscribers"). In some embodiments, there is a "mini-menu" of service plans to pick so that the user can buy a new service quickly, without having to browse through many potential service plans.

Figure 104:
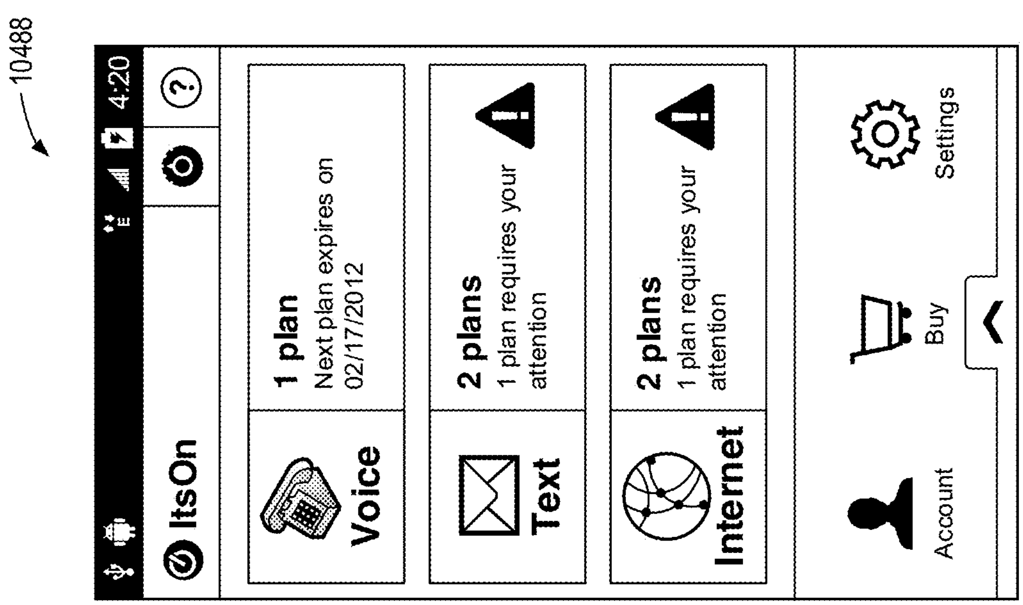
FIG. 104 illustrates a representative "Home" screen 488 displayed when a user has one voice service plan, two text service plans, and two Internet service plans in accordance with some embodiments.

FIG. 104 illustrates an example of a home screen 10488 that might appear when a user has one voice service plan, two text service plans, and two Internet service plans. In the example of FIG. 73, the home screen 10488 indicates that one of the text service plans and one of the Internet service plans require user attention.

Figure 105:
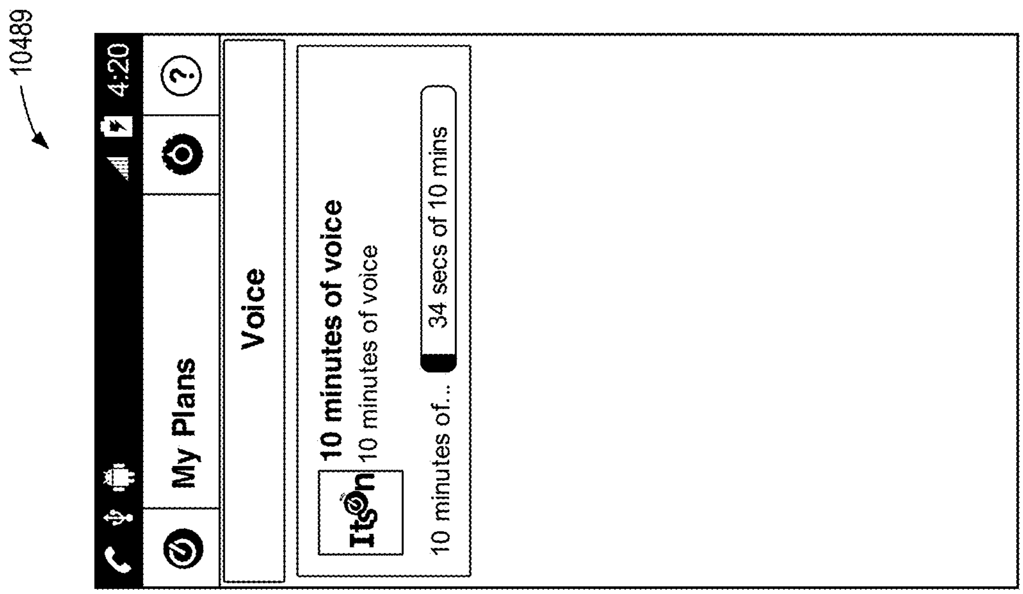
FIG. 105 illustrates a representative screen of information displayed when a user selects the voice plan area of FIG. 73 in accordance with some embodiments.

FIG. 105 illustrates an example of a screen 10489 of information a user might access by selecting the voice plan area of FIG. 73. The screen 10489 in FIG. 105 provides information about the user's voice service plan and a service usage meter. FIG. 105 indicates that the user's voice service plan provides for 10 minutes of voice, of which the user has used 34 seconds.

Figure 106:
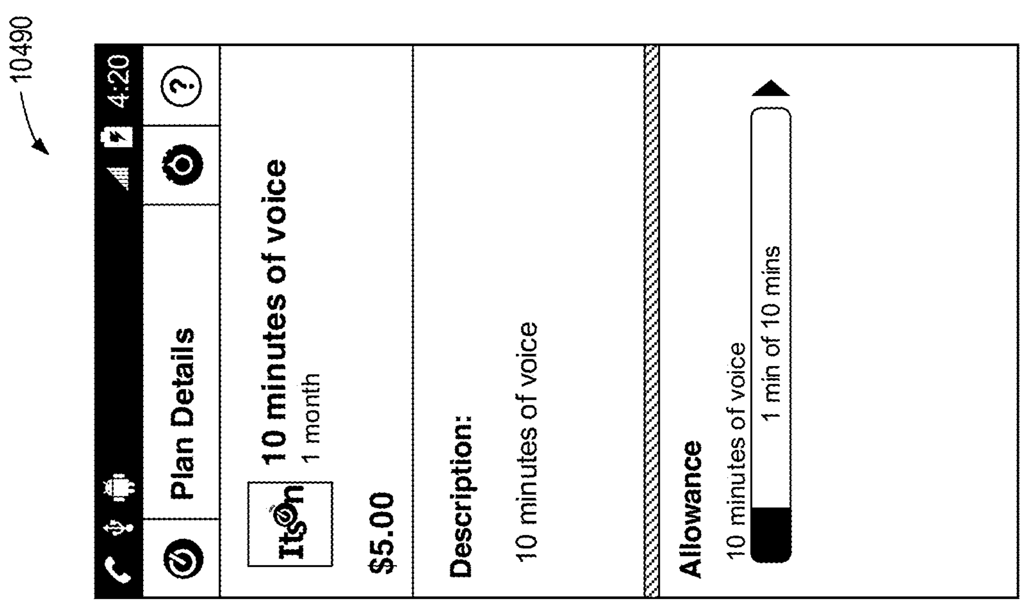
FIG. 106 illustrates a representative screen of additional information displayed when a user selects the voice service plan of FIG. 105 in accordance with some embodiments.

FIG. 106 illustrates an example of a screen 10490 of additional information a user might access by selecting the voice service plan shown in FIG. 105. The screen 10490 shown in FIG. 106 indicates that the voice service plan provides for 10 minutes of voice, expiring after one month, and that the user paid $5.00 for the voice service plan. The screen in FIG. 106 also presents a service usage meter, where the user's service usage is rounded to the nearest minute. The service usage meter of FIG. 106 indicates that the user has used 1 minute of the 10 minutes allowed under the voice service plan.

Figure 107:
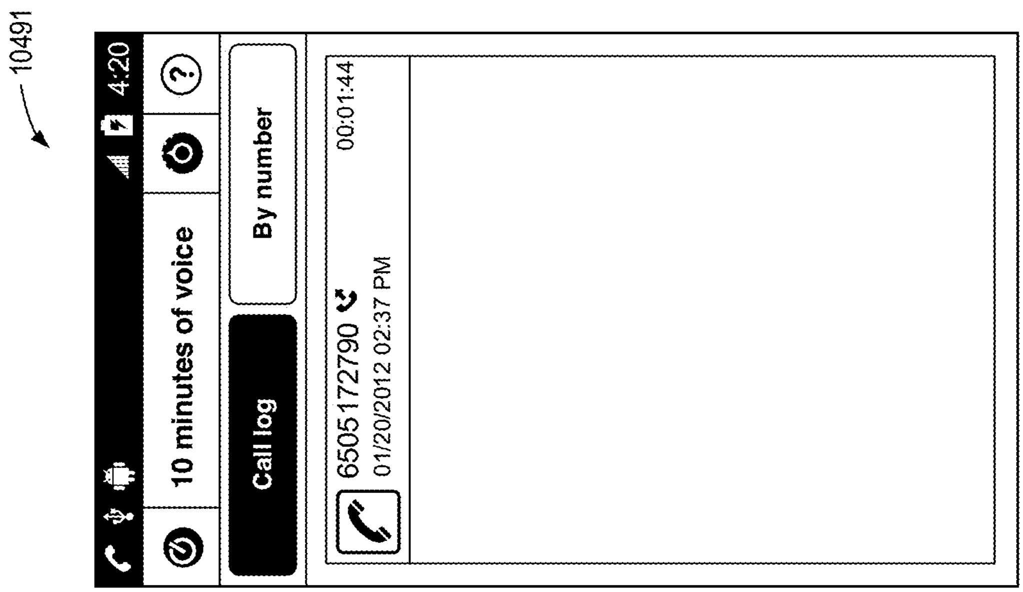
FIG. 107 illustrates a representative screen displayed as a call log when a user selects a field of FIG. 106 in accordance with some embodiments.
Figure 108:
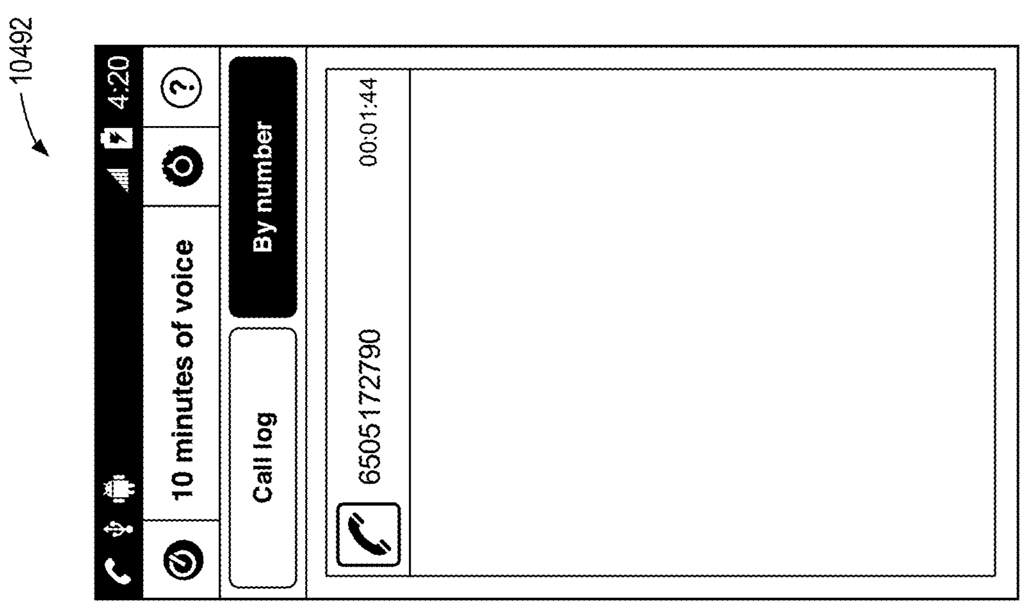
FIG. 108 illustrates a representative screen displayed by phone number when a user selects a field of FIG. 106 in accordance with some embodiments.

FIG. 107 illustrates an example screen 10491 a user might access by selecting a field of FIG. 106, such as, for example, the service usage meter (counting bar) in the "Allowance" region (e.g., the arrow to the right of the bar suggests to the user that by selecting the counting bar, he or she can learn more). In the example of FIG. 107, the user can access information about his or her service usage of the voice service plan either in the form of a call log or by phone number. FIG. 107 illustrates an example of the information that might be displayed as a call log, and FIG. 108 illustrates an example of the information that might be displayed by phone number. In both FIGS. 107 and 108, the duration of each call is shown. It should be understood that the information may be presented in other ways, such as on a per-network basis (e.g., voice calls while roaming versus while on a home network, voice calls on Wi-Fi versus on a cellular network, etc.), time of day (e.g., voice calls during weekdays versus on weekends, etc.), or based on any other classification that can be used to distinguish between voice calls (e.g., long distance calls versus local calls, domestic calls versus international calls, premium-rate calls versus standard-rate calls, etc.).

Figure 109:
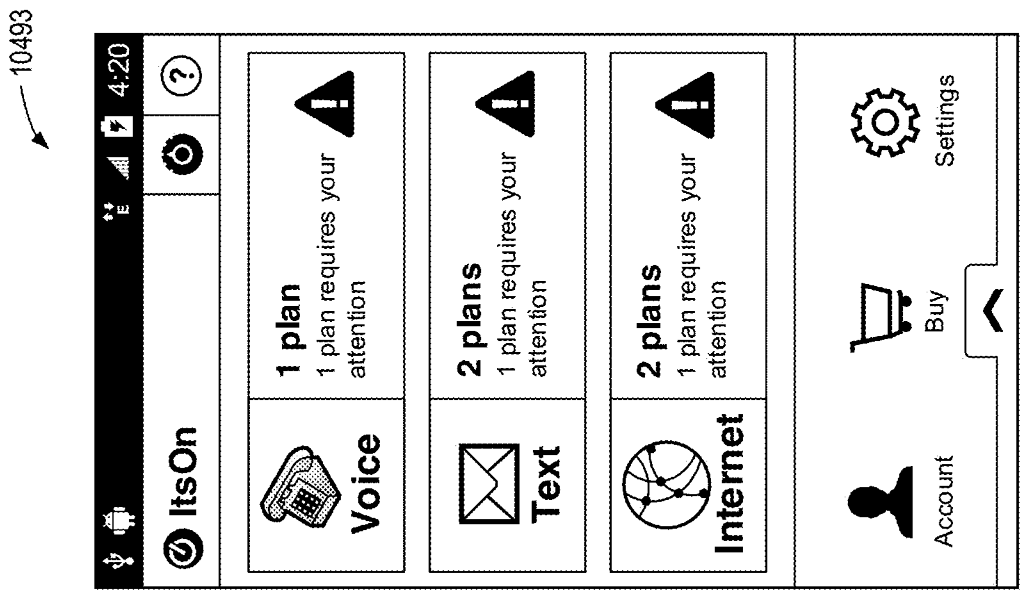
FIG. 109 illustrates a representative screen displayed when a user has one voice service plan, two text service plans, and two Internet service plans in accordance with some embodiments.

FIG. 109 illustrates an example home screen 10493 for a user having one voice service plan, two text service plans, and two Internet service plans. In the example of FIG. 109, one service plan in each of the categories of voice, text, and Internet requires user attention.

Figure 110:
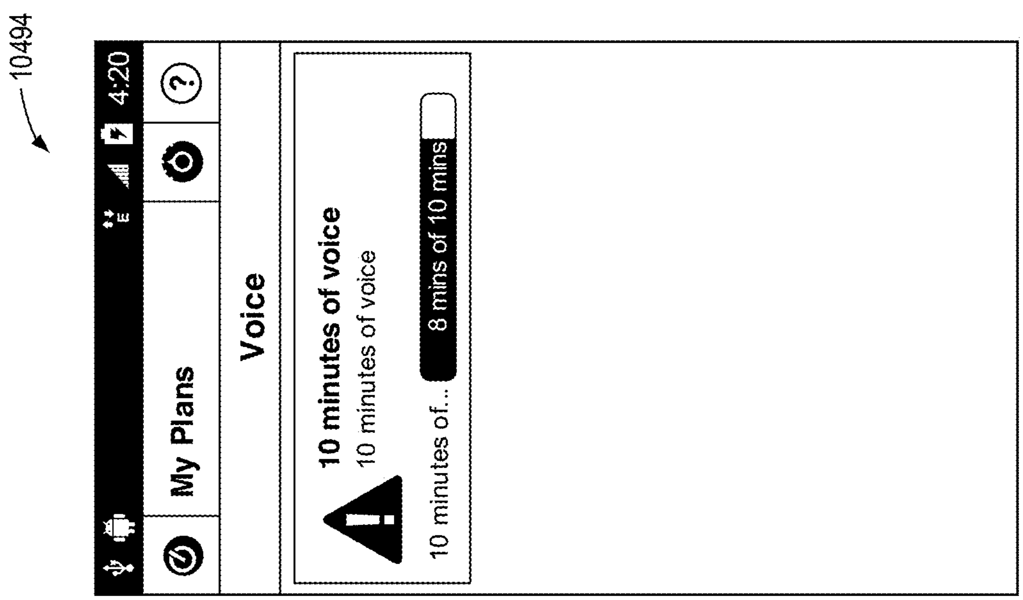
FIG. 110 illustrates a representative screen displayed when a user selects the voice area of FIG. 109 in accordance with some embodiments.

FIG. 110 illustrates an example of a screen 10494 that a user may access by selecting the voice area of FIG. 109. The screen of FIG. 110 warns the user that he or she has used eight of the ten minutes of his or her 10-minute voice plan. The criteria for warning the user may be user-selected or set by a service provider (e.g., through the SDC 135 or device management system 170-1). If user-selected, the user's preferences regarding notifications and warnings may be set through the mobile wireless communication device 100 or any other means, such as a website or even through the SDC 135 or device management system 170-1, if the service provider has granted access to at least a portion of the SDC 135 or device management system 170-1. In the case of FIG. 110, either the user or service provider configured a notification trigger to warn the user when 8 of the 10 minutes of voice service have been used, and FIG. 110 illustrates the display of the warning.

Figure 111:
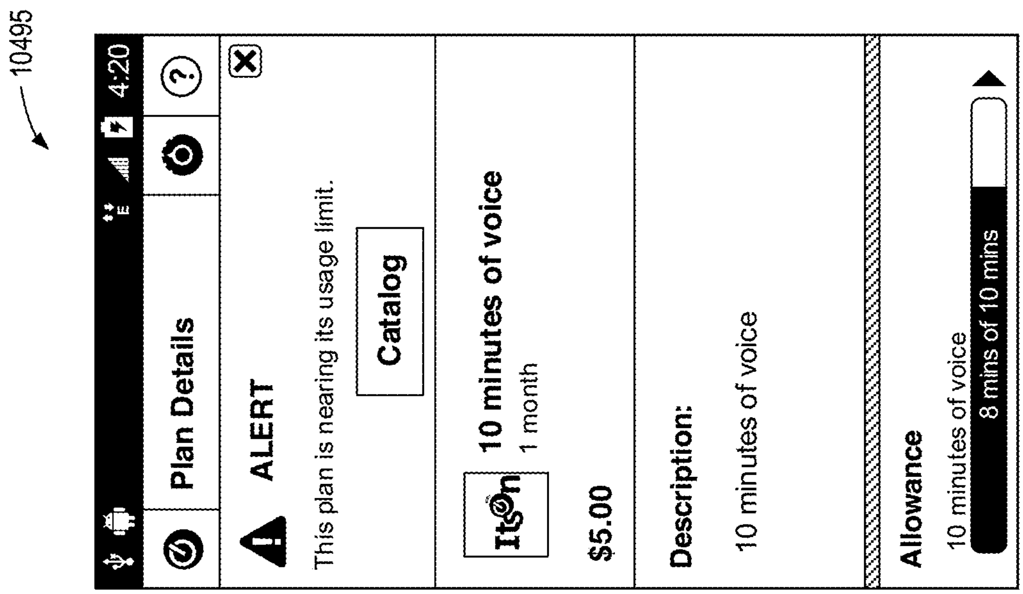
FIG. 111 illustrates a representative screen displayed when a user selects the "10 minutes of voice" area/icon of FIG. 110 in accordance with some embodiments.

FIG. 111 illustrates an example screen 10495 of information a user may access by selecting the "10 minutes of voice" area/icon of FIG. 110. In FIG. 111, the screen 10495 notifies the user that the voice service plan is nearing its usage limit, and that the user has used 8 of the 10 allowed minutes. The screen 10495 also presents a "Catalog" button that the user may select to view the contents of the catalog (e.g., as shown in FIGS. 87, 88, 89, 90, 91, 92, 93, etc.) and, for example, select another voice service plan.

In some embodiments, a user can determine service usage during a voice call, e.g., by viewing or otherwise accessing the service usage meter during the call. For example, in some embodiments, the user can tap the "Voice" region shown on the home screen (as shown in, e.g., FIG. 109) during a phone call to see the service usage meter incrementing during the call.

In some embodiments, the user receives an audible notification related to a service plan or usage of a service plan during a phone call. For example, in some embodiments, a user or a service provider establishes a service usage threshold, and the user receives an audible notification that the established threshold has been reached. The service usage threshold may be a number of minutes, a number of seconds, a cost, a percentage, or any other measure of usage. The notification may be any audible indicator, such as a tone, a bell, content of a sound file, a computer-generated voice, etc. In some embodiments, the notification is a vibration.

In some embodiments, the user receives a visual notification related to a service plan or usage of a service plan during a phone call. For example, in some embodiments, a user or a service provider establishes a service usage threshold, and the user receives a visual notification that the established threshold has been reached. The service usage threshold may be a number of minutes, a number of seconds, a cost, a percentage, or any other measure of service usage. The notification may be a text message, a pop-up, an e-mail, etc.

In some embodiments, the notification is audible/vibrating or visual based on the status of the mobile wireless communication device 100. For example, in some embodiments, the notification is audible or a vibration when the user is on a phone call with no connected devices such as a headset or a dock, and otherwise the notification is visual. In some embodiments, the form of the notification, or when or whether the notification occurs, can be configured by the user of the mobile wireless communication device 100. In some embodiments, the user configures the notifications through the user interface 101 of the mobile wireless communication device 100.

In some embodiments, in order to prevent the party on the other end of a voice connection from hearing the audible notification, a processor on the mobile wireless communication device 100 causes the microphone of the mobile wireless communication device 100 to be muted during the time that the audible notification is presented to the user of the mobile wireless communication device 100. In some embodiments, the microphone is muted when a user responds to the audible notification in an audible way, e.g., by pressing a dial pad button (which causes a DTMF tone).

Figure 112:
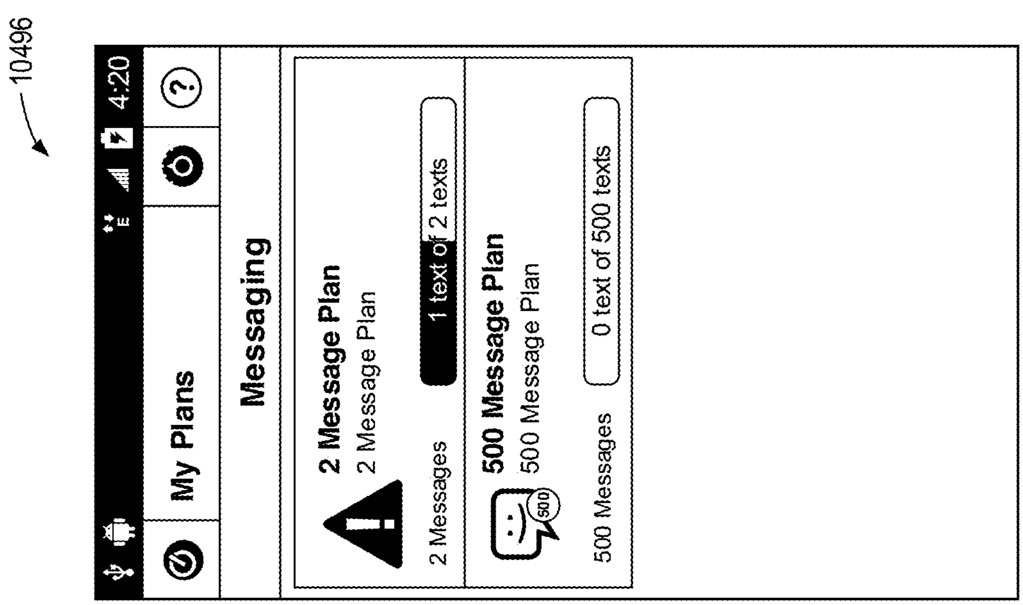
FIG. 112 illustrates a representative screen displayed when a user selects the "Text" area of FIG. 109 in accordance with some embodiments.

FIG. 112 illustrates an example of a screen 10496 that a user may access by selecting the "Text" area of FIG. 109. The screen of FIG. 112 warns the user that he or she has used one of the two text messages included in the 2-message plan. The criteria for warning the user may be user-selected or set by a service provider (e.g., through the SDC 135 or device management system 170-1). If user-selected, the user's preferences regarding notifications and warnings may be set through the mobile wireless communication device 100 or any other means, such as a website or even through the SDC 135 or device management system 170-1, if the service provider has granted access to at least a portion of the SDC 135 or device management system 170-1. In the case of FIG. 112, either the user or service provider configured a notification trigger to warn the user when one of the two available text messages has been used. FIG. 112 also notifies the user that he or she has not used any of the text messages included in the user's 500-message text service plan.

Figure 113:
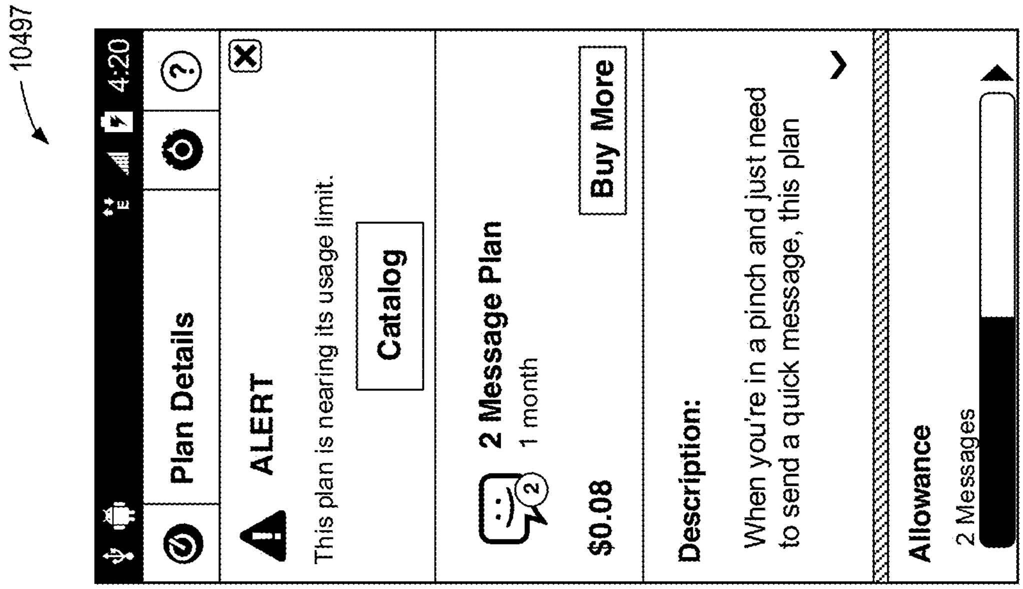
FIG. 113 illustrates a representative screen of additional information displayed when a user selects the "2 message plan" area/icon of FIG. 112 in accordance with some embodiments.

FIG. 113 illustrates an example screen 10497 of additional information a user may access by selecting the "2 message plan" area/icon of FIG. 112. In FIG. 113, the screen notifies the user that the 2-message text service plan is nearing its usage limit, and that the user has used one of the two allowed text messages. The screen 10497 also presents a "Catalog" button that the user may select to view the contents of the catalog (e.g., as shown in FIGS. 87, 88, 89, 90, 91, 92, 93, etc.) and, for example, select another text messaging service plan. In addition, the screen presents a "Buy More" button that, in some embodiments, allows the user to repurchase the same service plan (i.e., purchase a second instance of the 2-message text service plan).

Figure 115:
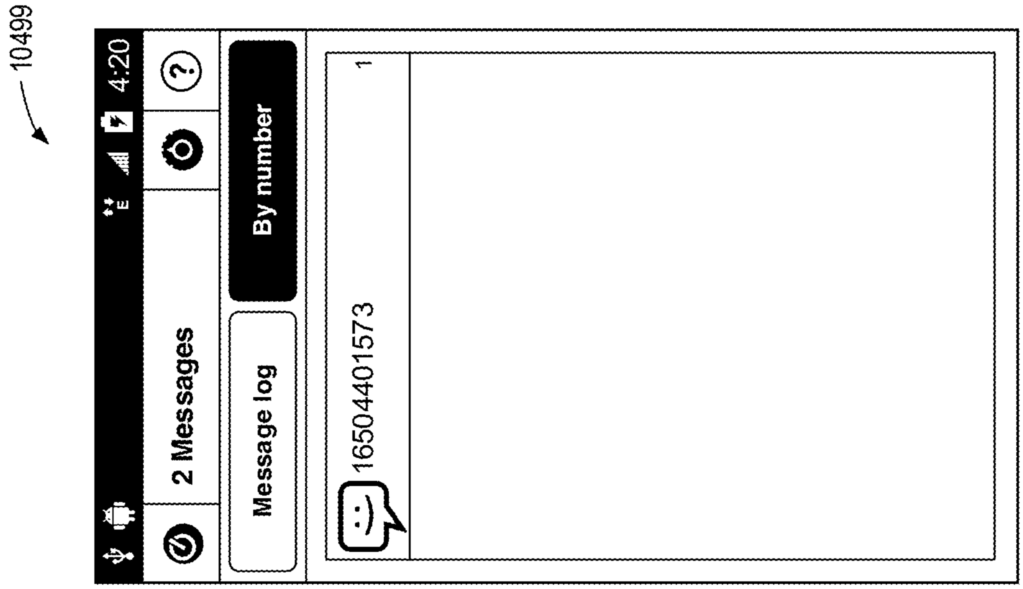
FIG. 115 illustrates a representative screen of information displayed by number for the "2 Message Plan" of FIG. 112 in accordance with some embodiments.
Figure 114:
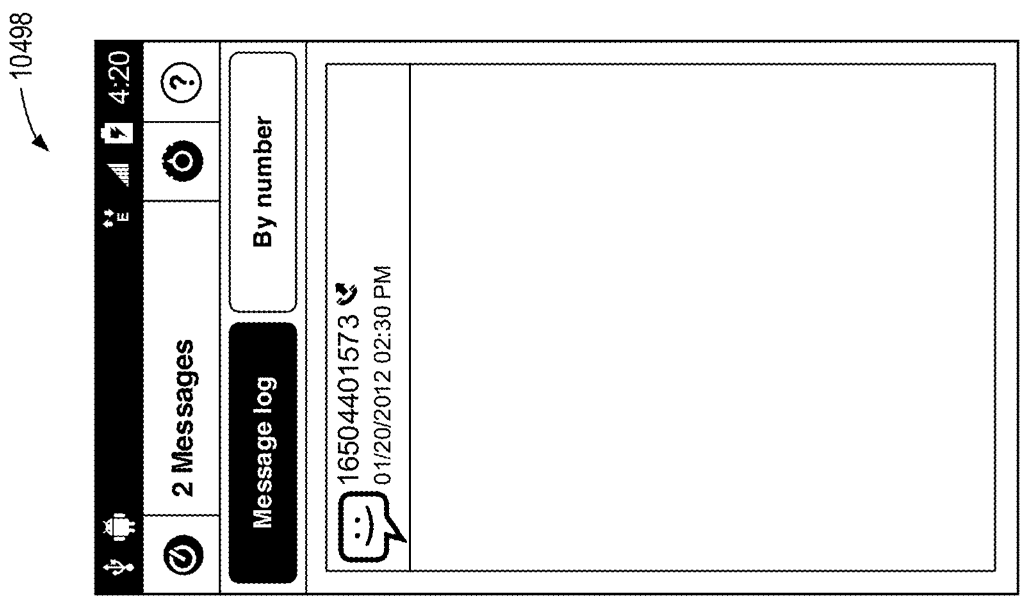
FIG. 114 illustrates a representative screen for a message log displayed for the "2 Message Plan" of FIG. 112 in accordance with some embodiments.

FIG. 114 illustrates an example screen 10498 a user might access by selecting the 2 Message Plan field/icon of FIG. 112. In the example of FIG. 114, the user can access information about his or her service usage of the text messaging plan either in the form of a message log or by phone number. FIG. 114 illustrates an example of the information that might be displayed as a message log, and FIG. 115 illustrates an example of the information that might be displayed by phone number. In both FIGS. 114 and 115, the number of messages is shown. It should be understood that the information may be presented in other ways, such as on a per-network basis (e.g., text messages while roaming versus while on a home network, messages sent/received on Wi-Fi versus on a cellular network, etc.), time of day (e.g., messages sent/received during weekdays versus on weekends, etc.), or based on any other classification that can be used to distinguish between messages.

Figure 116:
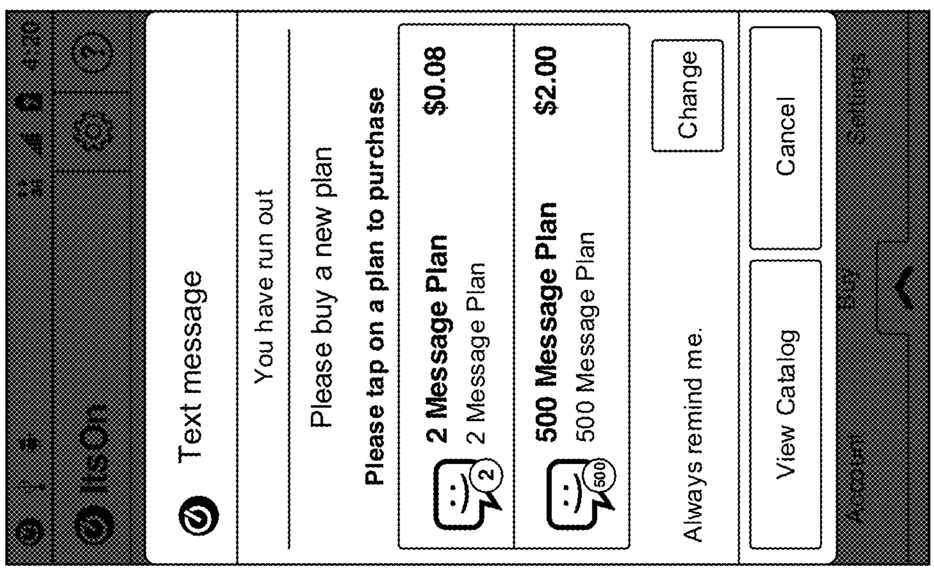
FIG. 116 illustrates a representative "upsell" screen for text messaging plans in accordance with some embodiments.

FIG. 116 illustrates an example of an "upsell" screen 10505 that might be shown after the user has exhausted all of his or her text messaging service plans and subsequently attempts to send or receive a text message. The screen 10505 of FIG. 116 offers two text messaging service plans (a two-message service plan that costs 8 cents, and a 500-message service plan that costs $2.00), which are the two text messaging service plans the user previously had. The screen 10505 also offers the user an option to change his or her notification preference, which, as illustrated in FIG. 116, is always to be reminded of previously purchased service plans. FIG. 116 also shows that the user can select a different service plan than either of the offered service plans by viewing the catalog. Although FIG. 116 illustrates upsells for messaging service plans, as would be apparent to a person having ordinary skill in the art, upsells can be used for voice service plans and for data service plans, too. Furthermore, upsells can be audible (e.g., presented through a speaker of the mobile wireless communication device 100) or visual (e.g., presented through a display screen of the user interface 101 of the mobile wireless communication device 100).

In some embodiments, the mobile wireless communication device 100 presents an audible or visual upsell offer before a service plan has run out. In some embodiments, if a call is being placed (e.g., the user is dialing or preparing to place the call) and the number of minutes left on the voice service plan is below a threshold number of minutes, an audible notification prompts the user with an upsell audible message. In some embodiments, the audible upsell message provides the user with information about a service plan and prompts the user to select the service plan by pressing one or more keys on the keypad. In some embodiments, if a phone call is in progress when the number of minutes left on the voice service plan falls below the threshold, and the audible upsell notification was not played at the start of the call or before the call was placed, the audible upsell message is presented during the call. In some embodiments, the user may respond to the audible upsell by pressing a keypad button, and the service processor 115 or a device agent on the mobile wireless communication device 100 captures the DTMF tone to facilitate the user's purchase of the offered service plan. In some embodiments, the user receives an audible, vibrating, or visual purchase confirmation during the call, or, if the purchase failed, an audible, vibrating, or visual message that the purchase failed. In some embodiments, the microphone of the mobile wireless communication device 100 is temporarily disabled when audible notifications and user responses are entered so that the person on the other side of the phone call cannot hear the messages or the user's responses.

When the carrier network is incapable of supporting simultaneous voice and data communications, and a phone call is in progress, it may not be possible to complete the user's purchase of a service plan until the phone call has ended, because the network cannot support the data communications necessary to complete the purchase until after the voice call has ended. Therefore, in some embodiments, if the user responds positively to an upsell message presented during a phone call (e.g., by accepting the offered service plan or indicating a desire to purchase a new service plan), the service provider extends a "service lease" that allows the in-progress phone call to continue for some time period beyond the expiration of the current plan so that the user's phone call is not terminated abruptly at the expiration of the current service plan. The service lease gives the user the impression that the purchase of the new service plan was instantaneous, even though the actual purchase cannot be completed until after the user's call has ended. Because extending a service lease is, in essence, akin to extending credit to a user, in some embodiments, the time period is selected so that if the user's planned purchase of the new or offered service plan is unsuccessful (e.g., if the user's credit card is declined, or for any other reason), the cost of the service lease, which is borne by the service provider, is not significant. By providing a service lease, the service provider enhances the customer's experience and prevents user frustration caused by phone calls abruptly terminating, even though the user wanted to renew a service plan or purchase a new service plan.

In some embodiments, when the user accepts a service offer made while a call is in progress, the purchase process proceeds as soon as the voice call ends. When the purchase is successful, the service provider may then debit the new service plan for the service lease provided on the call that was in progress when the previous service plan expired.

In some embodiments, the user may configure aspects of audible upsells. For example, the user can disable audible upsells or specify that all upsells should be visual.

In some embodiments, upsell messages, whether audible, vibrating, or visual, are configured in the SDC 135 or device management system 170-1. In some embodiments, audible upsells are played as text-to-speech, or they are audio files.

Service leases can also be extended in other circumstances such as, for example, when the time required to complete the purchase of a service plan would inconvenience a user. In some embodiments, a service lease is extended to users who have exhausted their messaging plans but have initiated the purchase of a new service plan. The service lease is extended so that these users can continue to send text messages while the purchase process, which takes a finite amount of time, is being completed. In some embodiments, the number of messages the user is allowed to send under the service lease is selected so that if the purchase is unsuccessful, the cost to the service provider bearing the cost of the user's out-of-plan messages is reasonable.

As would be understood by a person having ordinary skill in the art in light of the disclosures herein, a service provider can use service leases in a variety of circumstances in order to enhance the user's experience without the service provider having to undertake a large financial risk. The examples presented herein (e.g., extending a service lease during an in-progress phone call and extending a service lease at the end of a messaging plan) are not meant to be limiting.

Service Plan Selection and Customization

Figure 117:
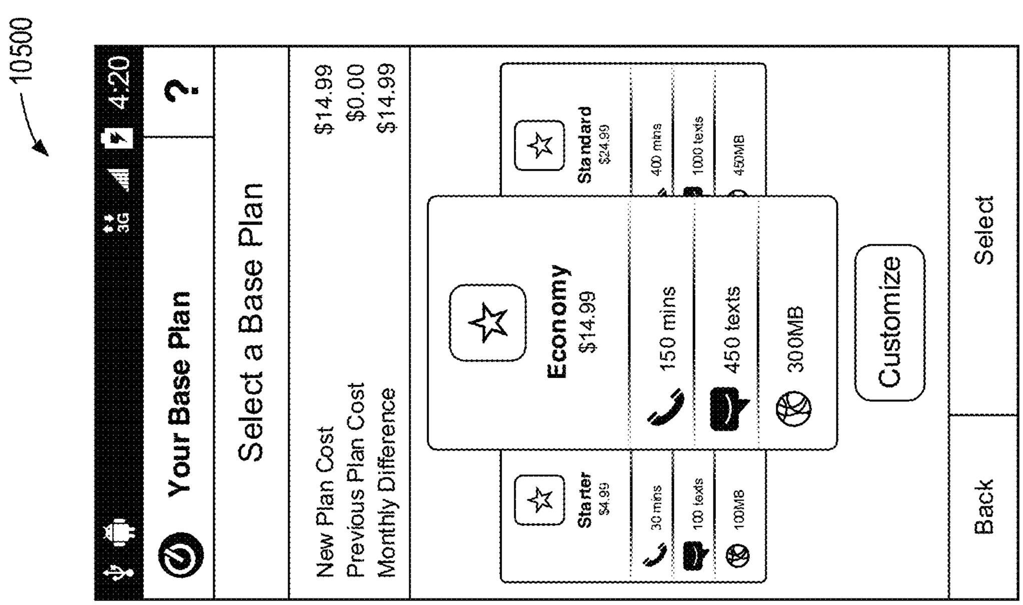
FIG. 117 illustrates a representative screen displaying a set of base service plans from which to select a base service plan for subscription presented as a virtual carousel of base service plans in accordance with some embodiments.

FIG. 117 illustrates a representative screen 10500 that provides to the user of the mobile wireless communication device 100 a set of base service plan bundles from which to select a base service plan bundle to subscribe. In some embodiments, the base service plan bundle selection screen 10500 is accessed by selecting the change button/icon illustrated in FIG. 73. In some embodiments, the base service plan bundle selection screen 10500 is accessed when selecting the "Plans" partition 10214 illustrated in FIG. 68 and no base service plan bundle is presently subscribed to. In some embodiments, the base service plan bundle selection screen 10500 is accessed when selecting the "Plans & Sharing" partition 10214 illustrated in FIG. 70 and no base service plan bundle is presently subscribed to. Through the UI 101 of the mobile wireless communication device 100, the user can select from several different base service plan bundles, summaries of which can be displayed simultaneously to the user. The base service plan bundle selection screen 10500 illustrated in FIG. 117 shows three different base service plan bundles from a set of base service plan bundles available. The summaries of the base service plan bundles can include a title, a cost, and key features, e.g., an amount of service usage for each service plan included in the base service plan bundle. The user of the mobile wireless communication device 100 can select one of the base service plan bundles (e.g., the "Economy" plan) by selecting the "Select" button. The graphical display through the UI 101 can represent a virtual carousel of base service plan bundles through which the user can scroll to view different base service plan bundles available for subscription. The "largest" displayed base service plan bundle can be selected with the "Select" button. A summary of a comparison of a selectable base service plan bundle to a previously (or presently) subscribed to base service plan bundle can also be displayed through the UI 101. Numerous base service plan bundles can be available, and a limited number of base service plan bundles can be displayed simultaneously to the user through the UI 101. The virtual carousel graphical interface can provide for browsing by the user of the mobile wireless communication device 100 through the different base service plan bundles. The user can also customize a base service plan bundle by selecting the "Customize" button for a particular base service plan bundle.

While the representative embodiment presented in FIG. 117 illustrates customization of a base service plan bundle, any service plan bundle having any number of service plans can also be customized in a similar manner. The individual service plans of a service plan bundle can be presented to the user of the mobile wireless communication device 100 through the UI 101 simultaneously, grouped in like categories, individually, serially, or by any other presentable and navigable means. In some embodiments, the user of the mobile wireless communication device 100, through the UI 101, can select individual service plans of a service plan bundle. In some embodiments, the user can set parameters that define key characteristics of individual service plans included in a service plan bundle. In some embodiments, parameters of a service plan that can be set can include an amount of service usage, a time period, an application, an application type, a network communication end point, a traffic content type, a service cost, etc. In some embodiments, the user can set ranges for parameters of an individual service plan, a service plan bundle, or a set of service plans or service plan bundles.

Figure 118:
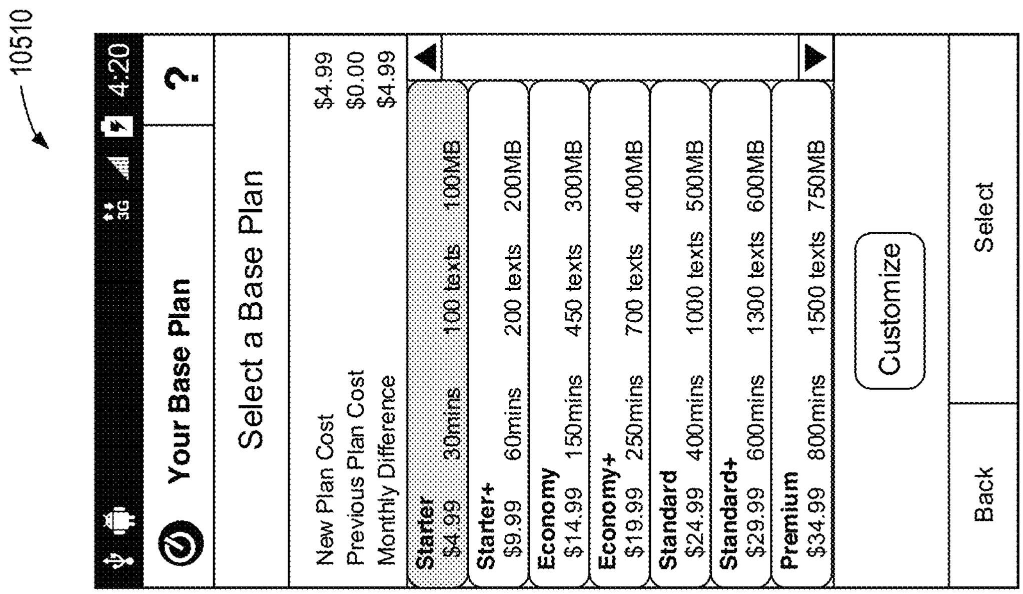
FIG. 118 illustrates another representative screen displaying a set of base service plans from which to select a base service plan for subscription presented as a scrollable list of base service plans in accordance with some embodiments.

FIG. 118 illustrates another representative screen 10510 that provides to the user of the mobile wireless communication device 100 a set of base service plan bundles from which to select a base service plan bundle to subscribe. At least a portion of the set of base service plan bundles from which the user can select can be displayed in a scrollable list. Each base service plan bundle available can be summarized with key relevant information, e.g., cost, features, etc. As with the carousel display shown in FIG. 117, one of the base service plan bundles can be selected using the "Select" button. In particular, the "shaded" displayed base service plan bundle can be selected with the "Select" button. In addition, a base service plan bundle can be customized using the "Customize" button.

Figure 119:
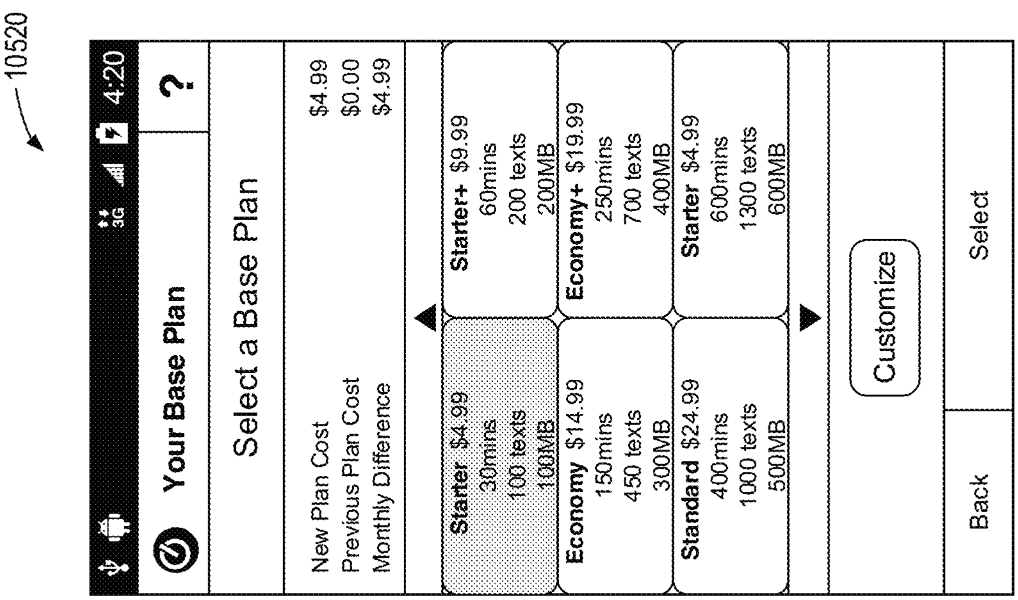
FIG. 119 illustrates another representative screen displaying a set of base service plans from which to select a base service plan for subscription presented as a navigable array of base service plans in accordance with some embodiments.

FIG. 119 illustrates another representative screen 10520 that provides to the user of the mobile wireless communication device 100 a set of base service plan bundles from which to select a base service plan bundle to subscribe. At least a portion of the set of base service plan bundles from which the user can select can be displayed in a navigable array. Each base service plan bundle available can be summarized with key relevant information, e.g., cost, features, etc. As with the carousel display shown in FIG. 117 and the list display shown in FIG. 118, one of the base service plan bundles can be selected using the "Select" button. In particular, the "shaded" displayed base service plan bundle can be selected with the "Select" button. In addition, a base service plan bundle can be customized using the "Customize" button.

Figure 120:
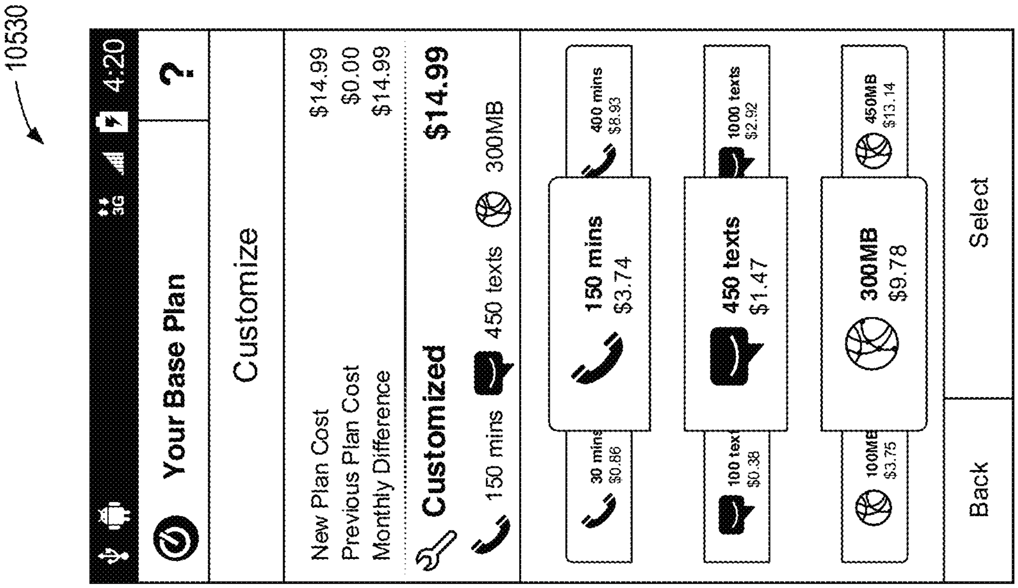
FIG. 120 illustrates a representative screen displaying multiple options for each constituent service plan of a customizable base service plan in accordance with some embodiments.

FIG. 120 illustrates a representative screen 10530 that provides to the user of the mobile wireless communication device 100 multiple selection options for each service plan included in a customizable base service plan bundle. The representative screen 530 can be accessed when selecting the "Customize" button in FIG. 117, 118 or 119. As shown in FIG. 120, a virtual carousel of selection options can be displayed for each individual service plan included in the base service plan bundle. A number of voice minutes, a number of text messages, and an amount of data service usage can be independently selected for each of the service plans included in the base service plan bundle. The user of the mobile wireless communication device 100 can select from multiple different options for each service plan included in the base service plan bundle. Key features and costs for each service plan can be displayed. A summary of key features selected for each of the service plans and an aggregate cost for a customized base service plan bundle can be displayed through the UI 101. In the representative screen 530, a customized base service plan bundle includes 150 minutes, 450 text messages, and 300 MB of data access. Individual service plan costs are provided. A total aggregate cost of $14.99 for the customized service plan bundle is also displayed to highlight the total cost to the user. A comparison of the total aggregate cost to a previous base service plan bundle cost can also be shown.

In some embodiments, all of the service plans included in a base service plan bundle can be customized. In some embodiments, only one of the service plans included in a base service plan bundle can be customized. In some embodiments, some of the service plans included in a base service plan bundle can be customized, and other service plans included in the base service plan bundle can be fixed. In some embodiments, a finite number of options can be available for a service plan included in the base service plan bundle. In some embodiments, a broad range of options (e.g., a "continuous" sliding scale) can be available for a service plan included in the base service plan bundle. In some embodiments, a service plan included in the base service plan bundle can be set to a zero amount, e.g., zero voice minutes, zero text messages, or zero Mbytes of data access. In some embodiments, a service plan included in the base service plan bundle can be set to an unlimited amount, e.g., unlimited voice minutes, unlimited text messages, or unlimited data access.

Figure 121:
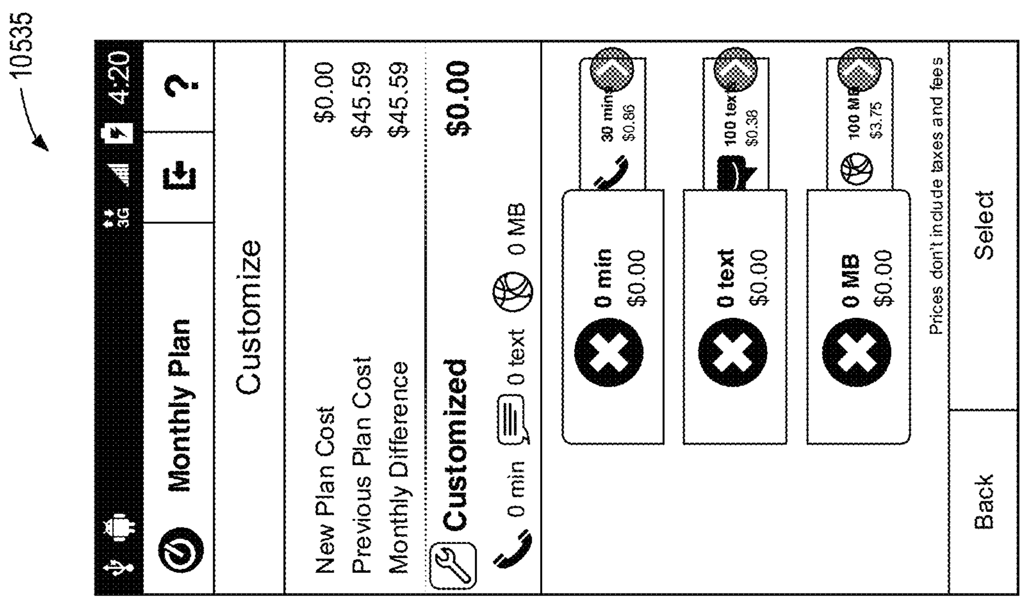
FIG. 121 illustrates a representative screen displaying multiple options for each service plan included in a customizable base service plan bundle in accordance with some embodiments.

FIG. 121 illustrates a representative screen 10535 that provides to the user of the mobile wireless communication device 100 multiple options for each service plan included in a customizable base service plan bundle. For the example illustrated in screen 10535, the user can select a new base service plan bundle having no service plans, i.e., each service plan of the new base service plan bundle is selected to have zero service usage (and zero cost). In some embodiments, the user of the mobile wireless communication device 100 can select to have a "null" base service plan bundle. In some embodiments, the user of the mobile wireless communication device 100 can select individual service plans that suits the user's requirements without subscribing to a base service plan bundle.

Figure 122:
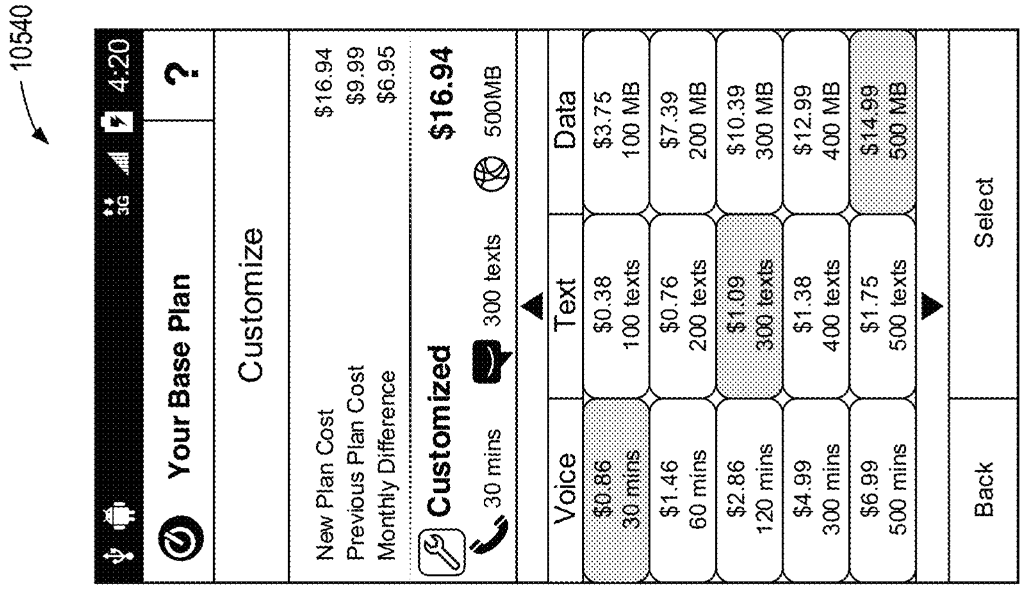
FIG. 122 illustrates another representative screen displaying multiple options for each constituent service plan of a customizable base service plan in accordance with some embodiments.

FIG. 122 illustrates another representative screen 10540 that provides to the user of the mobile wireless communication device 100 multiple options for each service plan of a customizable base service plan bundle. The options presented to the user of the mobile wireless communication device 100 can be displayed as a selectable matrix arrayed in columns (as shown) or rows (not shown). The options can be also displayed as a scrollable list (not shown). The user of the mobile wireless communication device 100 can select a customizable base service plan bundle by selecting one option for each of the service plans to include in the base service plan bundle, e.g., an option for a voice service plan, an option for a text messaging service plan, and an option for a data service plan. A display of key features selected and a total cost for the customizable base service plan bundle can be shown. A comparison of key features (including cost) of the customizable base service plan bundle to a previously (or presently) subscribed to base service plan bundle can also be shown.

Figure 123:
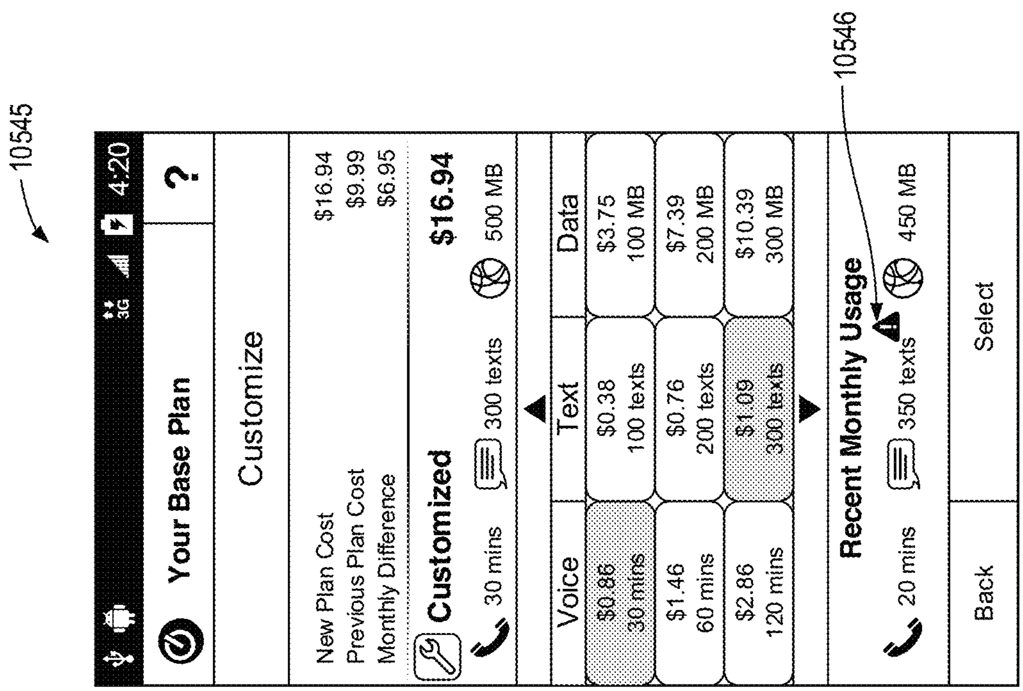
FIG. 123 illustrates a representative screen displaying multiple options for each constituent service plan of a customizable base service plan with select service usage information in accordance with some embodiments.

FIG. 123 illustrates another representative screen 10545 that provides to the user of the mobile wireless communication device 100 multiple options for each service plan included in a customizable base service plan bundle. In addition to the service plan options, a summary of recent service usage for each of the different categories of service plans available to the user is also presented. In some embodiments, the summary of recent service usage provides information for a time period length that matches the subscription time period for the customizable service plan bundle. In some embodiments, the summary of recent service usage provides information for a specific time period, e.g., for an hourly, daily, weekly, monthly, bi-monthly, quarterly or yearly time period. In some embodiments, the summary of recent service usage provides an average of service usage for the user over a particular time period. In some embodiments, the summary of recent service usage includes one or more indicators, e.g., alert icons, that highlight one or more differences between the service plans and previous service plans. In some embodiments, an alert icon highlights differences in service usage selection for a service plan compared with recent service usage. As illustrated in FIG. 123, an alert icon 10546 indicates to the user when an amount of recent service usage for a service plan exceeds a service usage amount available for a selected service plan. Alert icons, such as the alert icon 10546, can provide the user additional information to assist in selecting among options for service plans to include in a service plan bundle.

Figure 124:
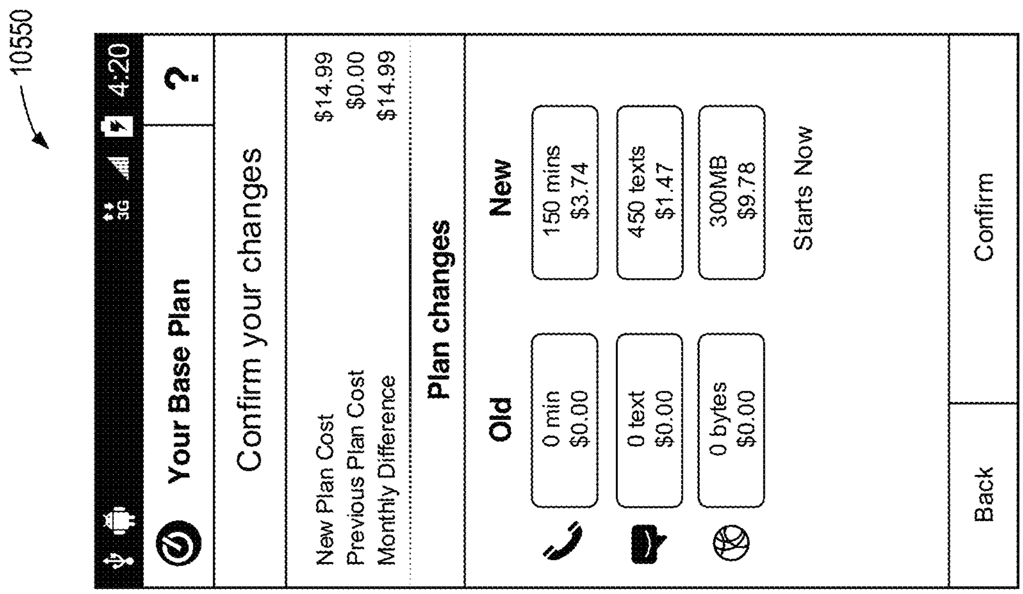

FIG. 124 illustrates a representative screen 10550 that provides through the UI 101 a summary of a changes to a base service plan bundle as selected by the user of the mobile wireless communication device 100. The new base service plan bundle and the old base service plan bundle are compared with both key features and costs summarized. The user of the mobile wireless communication device can confirm changes to the base service plan bundle by selecting the "Confirm" button. The base service plan bundle confirmation screen 10550 illustrated in FIG. 124 can be used when adding a new base service plan bundle, when changing from an existing base service plan bundle to a new base service plan bundle, and when selecting a customized base service plan bundle. In some embodiments, when the user of the mobile wireless communication device confirms the selected customized base service plan bundle, the new base service plan bundle is activated in real time (or near real time), providing an immediate customized service selection purchase experience.

In some embodiments, a service plan or service plan bundle is associated with a service identifier (service ID). In some embodiments, service plans and service plan bundles are associated with service IDs through a service design planning and management system such as the service design center 135, e.g., through an administrative terminal interface or through a sandbox interface attached thereto. In some embodiments, one or more service policies are associated with the service plans and service plan bundles. In some embodiments, service policies include rules for controlling and managing services provided to mobile wireless communication devices 100 (and/or users thereof), e.g., for service plans to which the user of the mobile wireless communication device 100 subscribes. In some embodiments, upon selection, customization, modification, and/or subscription to a service plan or service plan bundle, one or more service policies are obtained from one or more databases and distributed to one or more network elements, e.g., servers and/or databases, for controlling and/or managing communication services of the service plan or service plan bundle. In some embodiments, service policies for a service plan or service plan bundle include one or more of: access control policies, accounting policies, and notification policies. In some embodiments, service polices for a service plan or service plan bundle are associated with distinct service IDs. In some embodiments, policies for service plans are obtained from service policy storage databases based at least in part on one or more service IDs. In some embodiments, offers of service plans or service plan bundles provided to mobile wireless communication devices 100, e.g., during a service selection and/or service customization process, are associated with service IDs. In some embodiments, service plan offers include one or more of: service offer descriptors, service offer pricing, service offer graphics, service offer endpoints, and service offer conditions as described further herein. In some embodiments, elements of service offers are associated with service IDs and obtained from service offer storage databases based at least in part on one or more service IDs.

In some embodiments, a user of a mobile wireless communication device 100 selects a service plan through the UI 101 of the mobile wireless communication device 100, e.g., during a service plan selection, service activation, device initialization, or service setup process. In some embodiments, information for service offers are provided to the user of the mobile wireless communication device 100 by a service offer display and response system including one or more service IDs. In some embodiments, selection of the service plan by the user of the mobile wireless communication device 100 includes communication of a selected service ID from the mobile wireless communication device 100 to the service offer display and response system (or other network elements, e.g., the service controller 122, or a third-party service partner system). In some embodiments, selection of the service plan includes communication of an indication of a selected service plan to the service offer display and response system, and the service offer display and response system determines the service ID for the selected service plan. In some embodiments, service policies for the selected service plan are obtained from one or more storage databases of service policies for service plans based on the selected service ID. In some embodiments, a service policy provisioning system retrieves the service policies from the service policy storage databases using the selected service ID. In some embodiments, the service policy provisioning system distributes one or more service policies associated with the selected service plan to one or more network elements for controlling and managing services associated with the service plan selected by the user of the mobile wireless communication device 100. In some embodiments, the service policy provisioning system communicates a service policy for access control, obtained from the service policy storage database using the selected service ID, to one or more network elements responsible for access control of services for the mobile wireless communication device 100. In some embodiments, the service policy provisioning system communicates a service policy for accounting, obtained from the service policy storage database using the selected service ID, to one or more network elements responsible for accounting of services for the mobile wireless communication device 100. In some embodiments, the service policy provisioning system communicates a service policy for notification, obtained from the service policy storage database using the selected service ID, to one or more network elements responsible for providing notification services to the mobile wireless communication device 100.

In some embodiments, service plan offers and/or service plan policies are associated with service IDs through the service design center 135. In some embodiments, service plan bundles comprise a plurality of service plan elements, e.g., a voice service plan element, a messaging service plan element, and a data service plan element. In some embodiments, a service plan bundle is associated with a service ID for a unique combination of service plan elements. In some embodiments, one or more service plan elements of a service plan bundle can be customized, e.g., according to an offer of a plurality of options to a user and a selection by the user of the mobile wireless communication device 100. In a representative embodiment, a service plan bundle includes a voice service plan element having X different configuration options, a messaging service plan element having Y different configuration options, and a data service plan element having Z different configuration options. In some embodiments, the user of the mobile wireless communication device can selection one of the X different configuration options for the voice service plan element, one of the Y different configuration options for the messaging service plan element, and/or one of the Z different configuration options for the data service plan element to customize a service plan bundle. In some embodiments, the user can select from a total of X times Y times Z different combinations of service plan elements to customize the service plan bundle. In some embodiments, each combination of service plan elements is associated with a unique service ID. In some embodiments, only a subset of combinations of the total possible combinations of service plan elements is associated with a unique service ID. In some embodiments, only certain combinations of service plan elements are allowed. In some embodiments, customization of a service plan bundle by the user of the mobile wireless communication device 100 includes an explicit or implicit selection of a particular service ID that defines a particular combination of service plan elements for a service plan bundle. In some embodiments, the particular service ID is associated with a set of service plan policies to implement aspects of the services associated with the particular service ID. In some embodiments, the set of service plan policies are obtained from a service policy storage based on the particular service ID and distributed to one or more network elements for controlling and managing services for the customized service plan bundle identified by the particular service ID.

In some embodiments, service plan bundles can include a plurality of service plan elements, each service plan element associated with a service plan category. In some embodiments, a service plan category includes one or more service plan elements of a particular communication service type providing access to one or more communication services. In some embodiments, a service plan bundle includes a base service plan bundle including a voice service plan element and a data service plan element. In some embodiments, a service plan bundle includes a set of service plan elements, each service plan element for access to use one or more particular applications. In some embodiments, a service plan bundle includes a set of service plan elements, each service plan element for access to one or more particular network endpoints. As would be understood by a person of ordinary skill in the art, service plan bundles can combine service plan elements from multiple different service plan categories for service plans having diverse capabilities.

In some embodiments, service IDs include multiple fields, each field for representing a different service plan element and/or service plan category. In some embodiments, customization of a service plan element of a service plan bundle includes explicit or implicit selection of a value for a field in a service plan ID. In some embodiments, a set of service plan IDs are pre-stored in one or more of the mobile wireless communication device 100, the service controller 122, the service offer display and response system, service offer storage system, or service policy storage system. In some embodiments, a subset of service plan IDs are pre-stored in one or more of the mobile wireless communication device 100, the service controller 122, the service offer display and response system, service offer storage system, or service policy storage system. In some embodiments, selection of a customized service plan bundle includes selection of a unique service ID for the customized service plan bundle. In some embodiments, selection of a customization service plan bundle includes selection of values for different fields in a service ID.

In some embodiments, a customized service plan bundle is created "on the fly" during a service plan bundle selection and/or customization process. In some embodiments, a user of a mobile wireless communication device 100 selects multiple service plan elements for a customized service plan bundle, e.g., a voice service plan element, a messaging service plan element, and a data service plan element. In some embodiments, one or more network elements creates a customized service plan bundle based on the selection of particular service plan elements for the customized service plan bundle by the user of the mobile wireless communication device 100. In some embodiments, a new service ID for the customized service plan bundle is created and associated with the particular combination of service plan elements selected by the user of the mobile wireless communication device 100. In some embodiments, one or more service policies for the customized service plan bundle are created, retrieved, and/or obtained and distributed by a service policy provisioning system to one or more network elements, using at least in part the new service ID. In some embodiments, one or more service policies for controlling and/or managing services of the customized service plan bundle are communicated to the mobile wireless communication device 100, e.g., to be used by one or more device agents of a service processor 115 on the mobile wireless communication device 100. In some embodiments, the new service ID is stored with one or more of the service policies for the customized service plan bundle in a service policy storage database.

In some embodiments, a collection of customized service plan bundles is associated with a set of service IDs using a service design system, e.g., as part of the service design center 135. In some embodiments, each customized service plan bundle in the collection of customized service plan bundles is associated with a unique service ID. In some embodiments, service offers and/or service policies for a particular service plan bundle are associated with a particular service ID. In some embodiments, a set of service offers for the collection of customized service plan bundles is stored in a service offer storage system organized at least in part based on the set of service IDs. In some embodiments, a set of service policies associated with the customized service plan bundles is stored in a service policy storage system organized at least in part based on the set of service IDs. In some embodiments, a service offer and response system provides a user of a mobile wireless communication device 100 with one or more service offers that include at least a portion of the collection of customized service plan bundles. In some embodiments, the user of the mobile wireless communication device is presented options to customize service plan bundles. In some embodiments, the user selects one or more of the presented options to create a particular customized service plan bundle. In some embodiments, the particular customized service plan bundle is associated with a particular service ID. In some embodiments, one or more network elements determine a configuration of the particular customized service plan bundle. In some embodiments, the one or more network elements obtain the particular service ID for the particular customized service plan bundle. In some embodiments, a service policy provisioning system uses the particular service ID to obtain one or more service policies associated with the particular customized service plan bundle. In some embodiments, the service policy provisioning system provisions one or more network elements (and/or one or more device agents of a service processor in the mobile wireless communication device 100) with at least a portion of the one or more service policies. In some embodiments, the one or more service policies include service policies for access control, service accounting, and/or service notifications for the particular customized service plan bundle.

In some embodiments, a collection of base service plan bundles is associated with a set of service IDs using a service design system, e.g., as part of the service design center 135. In some embodiments, each base service plan bundle in the collection of base service plan bundles is associated with a unique service ID. In some embodiments, service offers and/or service policies for a particular base service plan bundle are associated with a particular service ID. In some embodiments, a set of service offers for the collection of base service plan bundles is stored in a service offer storage system organized at least in part based on the set of service IDs. In some embodiments, and a set of service policies associated the base service plan bundles is stored in a service policy storage system organized at least in part based on the set of service IDs. In some embodiments, a service offer and response system provides a user of a mobile wireless communication device 100 with one or more service offers that include at least a portion of the collection of base service plan bundles. In some embodiments, the user of the mobile wireless communication device is presented options to customize one or more of the base service plan bundles. In some embodiments, the user selects one or more of the presented options to create a particular customized service plan bundle. In some embodiments, the particular customized service plan bundle is associated with a particular service ID for a base service plan bundle. In some embodiments, the user selects one or more parameter values for service plan elements in the base service plan bundle. In some embodiments, the selected parameter values are communicated to a network system, e.g., the service offer display and response system. In some embodiments, the network system determines a configuration of the particular customized service plan bundle, e.g., based at least in part on the particular service ID for the base service plan bundle and the selected parameter values. In some embodiments, the network system obtains the particular service ID for the base service plan bundle. In some embodiments, a service policy provisioning system uses the particular service ID of the base service plan bundle to obtain one or more service policies associated with the base service plan bundle. In some embodiments, the service policy provisioning system modifies the service policies of the base service plan bundle based at least in part on the selected parameter values. In some embodiments, the modified service policies are associated with the particular customized service plan bundle for the user of the mobile wireless communication device 100. In some embodiments, the service policy provisioning system provisions one or more network elements (and/or one or more device agents of a service processor in the mobile wireless communication device 100) with at least a portion of the one or more modified service policies. In some embodiments, the one or more modified service policies include service policies for access control, service accounting, and/or service notifications for the particular customized service plan bundle.

Figure 125:
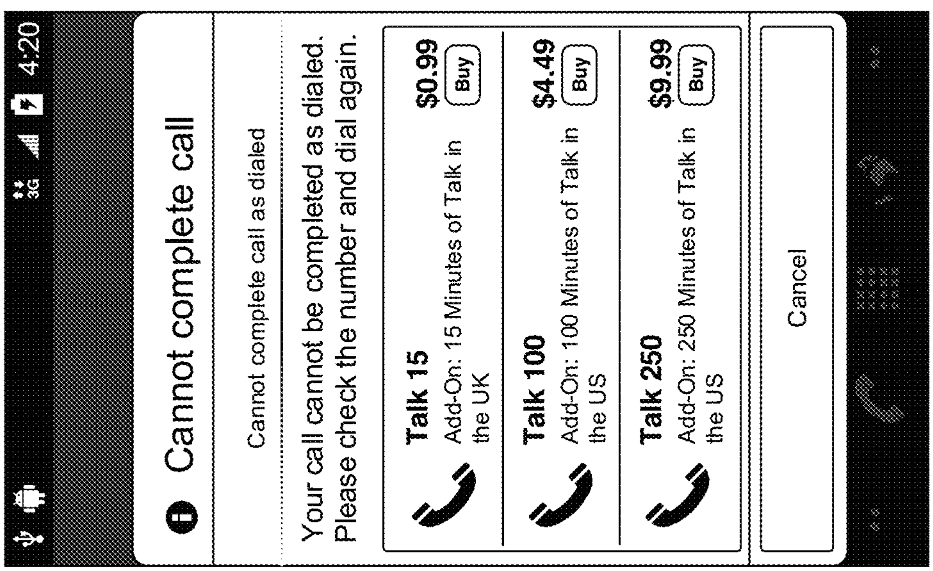

FIG. 125 illustrates a representative notification message 10600 that is presented through the UI 101 of the mobile wireless communication device 100 when the user of the mobile wireless communication device 100 attempts to access a voice service for which a service plan is not presently available. The notification message 10600 informs the user of the mobile wireless communication device 100 that a request to establish a voice connection (e.g., a dialed voice call) cannot be completed, as there is no existing voice service plan associated with the mobile wireless communication device 100. The notification message 10600 can include one or more options to purchase a voice service plan. By selecting one of the presented options, the user of the mobile wireless communication device 100 can learn more and/or subscribe directly to a particular service plan that provides voice service. The options presented in the notification message 10600 to the user of the mobile wireless communication device 100 can be tailored based on a number of different criteria. In some embodiments, the options presented to the user include voice service plans based on previous service usage, present service usage, one or more dialed numbers, present geographic location, home network location, available local networks, roaming properties, etc. As illustrated in FIG. 125, voice service plans can be offered that correspond to use in different geographic locations. In some embodiments, the user is also presented an option to explore a catalog of available service plans.

Figure 126:
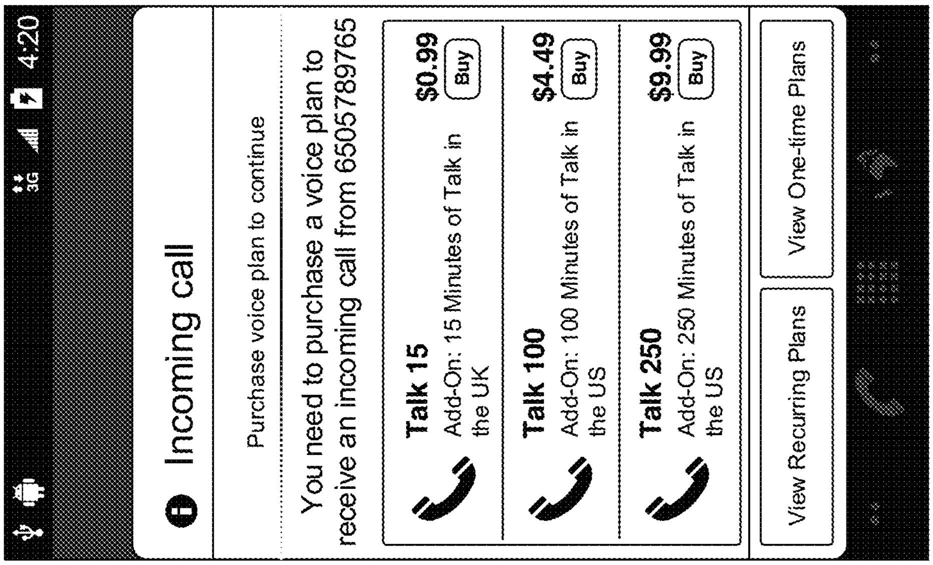

FIG. 126 illustrates a representative notification message 10605 that is presented through the UI 101 of the mobile wireless communication device 100 when the user of the mobile wireless communication device 100 receives an incoming voice call for which a service plan is not presently available. In some embodiments, no service plan is available when no service plan has been purchased, when a service usage allocation for a current service plan has been entirely (or nearly entirely) consumed, when no service plan has been purchased for roaming, etc. The notification message 10605 can be presented as a result of one or more different notification trigger conditions. The notification message 10605 informs the user of the mobile wireless communication device 100 that a request to complete a voice connection (e.g., an incoming call) cannot be completed, as there is no existing voice service plan associated with the mobile wireless communication device 100. The notification message 10605 can include one or more options to purchase a voice service plan. By selecting one of the presented options, the user of the mobile wireless communication device 100 can learn more and/or subscribe directly to a particular service plan that provides voice service. The options presented in the notification message 10605 to the user of the mobile wireless communication device 100 can be tailored based on a number of different criteria. In some embodiments, the options presented to the user include voice service plans based on previous service usage, present service usage, one or more dialed numbers, present geographic location, home network location, available local networks, roaming properties, etc. As illustrated in FIG. 126, voice service plans can be offered that correspond to use in different geographic locations. In some embodiments, the user is also presented an option to explore a catalog of available service plans. Service plans available can include both recurring voice service plans and one-time voice service plans. Service plans available can also include service plan bundles that combine voice service plan elements with other service plan elements (messaging and/or data service plan elements). In some embodiments, the user of the mobile wireless communication device 100 is presented an option to purchase a voice service plan and accept the incoming call. In some embodiments, the user of the mobile wireless communication device 100 is presented an option to purchase a voice service plan and reject the incoming call. In some embodiments, purchase of the voice service plan can require additional information from the user of the mobile wireless communication device 100. In some embodiments, additional information can be obtained from the user through the UI 101 of the mobile wireless communication device 100 in advance of connecting the incoming call. In some embodiments, additional information can be obtained from the user through the UI 101 of the mobile wireless communication device 100 after the incoming call is completed.

In some embodiments a notification message is presented through the UI 101 of the mobile wireless communication device 100 when the user of the mobile wireless communication device 100 is engaged in a particular service activity, e.g., using a voice connection, a data connection, a messaging service, a particular application, a particular service through a data connection, etc. In some embodiments, the notification message provides a warning to the user of the mobile wireless communication device 100 that a service plan to which the current service activity is accounted is about to expire or has expired. In some embodiments, a simultaneous audio warning, voice overlay message warning, or vibration alert warning is provided in addition to or in place of the notification message to the user of the mobile wireless communication device 100. In some embodiments, the notification message is presented in the foreground as a "pop-up" message. In some embodiments, the notification message provides one or more options to purchase additional service during the service activity, e.g., purchase additional minutes or MB, purchase an additional service plan, purchase a new service plan, add a service plan element to a service plan bundle, or renew a current service plan. In some embodiments, the notification message provides actionable options to the user of the mobile wireless communication device 100 in order to continue the current service activity, e.g., keep a voice connection alive, keep a data connection active, continue use of a particular application, etc. In some embodiments, the user of the mobile wireless communication device 100 is presented an option to continue the present service activity as an extension of a previously expired (or about to expire) service plan. In some embodiments, the user of the mobile wireless communication device 100 is presented one or more service plan offers in addition to options to continue the current service activity (e.g., use a previous/current service plan for the current service activity and purchase a new service plan for future service activity). In some embodiments, the user of the mobile wireless communication device 100 is presented an option to purchase additional minutes or MB to continue the current service activity (e.g., a temporary "supplemental" service plan) only. In some embodiments, the user of the mobile wireless communication device 100 is presented an option to purchase additional minutes or MB to continue the current service activity (e.g., a temporary "supplemental" service plan) and options to purchase additional service plans for future service activity. In some embodiments, the user of the mobile wireless communication device 100 is presented the option to discontinue the current service activity, e.g., drop an active voice connection, and following discontinuation, the user is presented options to purchase service plans for one or more service activities. In some embodiments, the user of the mobile wireless communication device 100 is presented a notification message with options to restart a discontinued service activity after purchase of a service plan, e.g., reconnect a dropped voice connection, restart a particular application, or re-establish a data connection.

Figure 127:
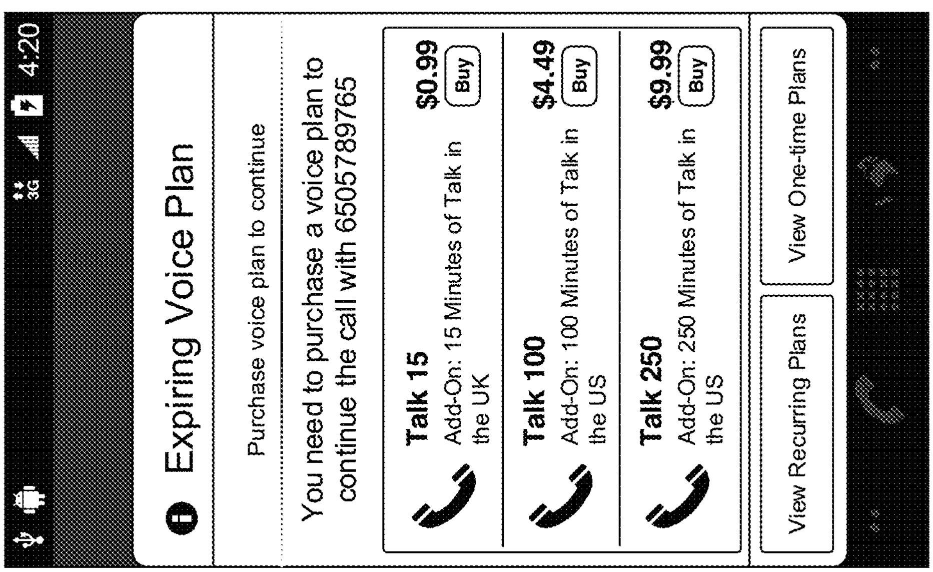

FIG. 127 illustrates a representative notification message 10607 presented through the UI 101 of the mobile wireless communication device 100 when the user is connected to an active voice connection and a current voice service plan, e.g., through which the active voice connection is used, is about to expire. In some embodiments, a similar representative notification message is provided for another service (data, messaging, video conference, etc.) for which an active connection or active service activity is interrupted by an expiring service plan. In some embodiments, the user is presented with one or more service plans through which the active connection can be continued. In some embodiments, the user can select through the UI 101 of the mobile wireless communication device 100 to purchase an offered service plan to continue the active connection. In some embodiments, the user can select to view a catalog of service plans that can provide for service activities representative of the active connection.

Figure 128:
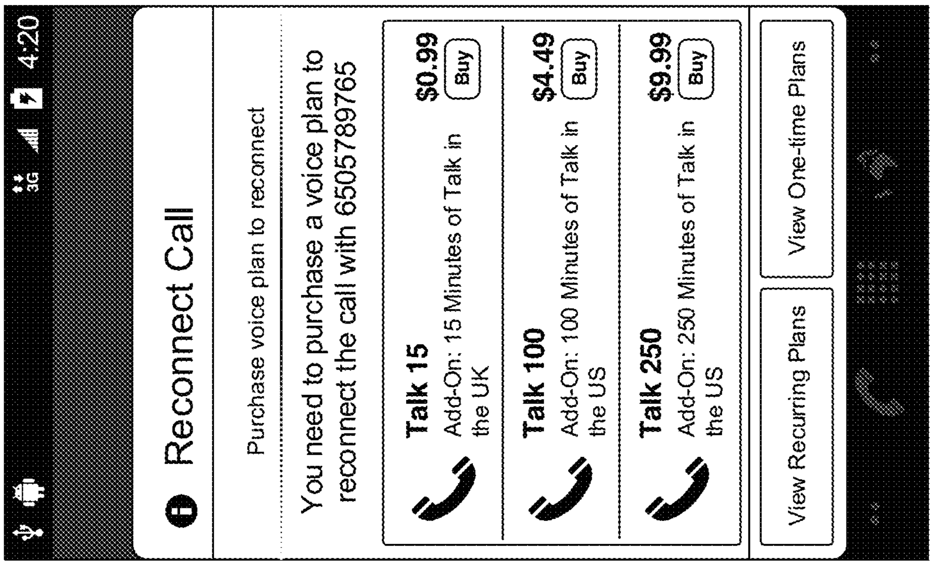

FIG. 128 illustrates a representative notification message 10609 presented through the UI 101 of the mobile wireless communication device 100 when an active voice connection is disconnected, e.g., as a result of an expired voice service plan. In some embodiments, a similar representative notification message is presented when an active connection for a service activity is interrupted by an expiring service plan. In some embodiments, the user is presented with one or more service plans through which a connection can be re-established. In some embodiments, the user can select through the UI 101 of the mobile wireless communication device 100 to purchase an offered service plan. In some embodiments, the notification message provides for reconnecting the previously active connection, e.g., dialing a dropped call, re-establishing a VoIP connection, re-establishing an interactive messaging session, etc. In some embodiments, the user can select to view a catalog of service plans that can provide for service activity representative of the previously active connection.

Figure 129:
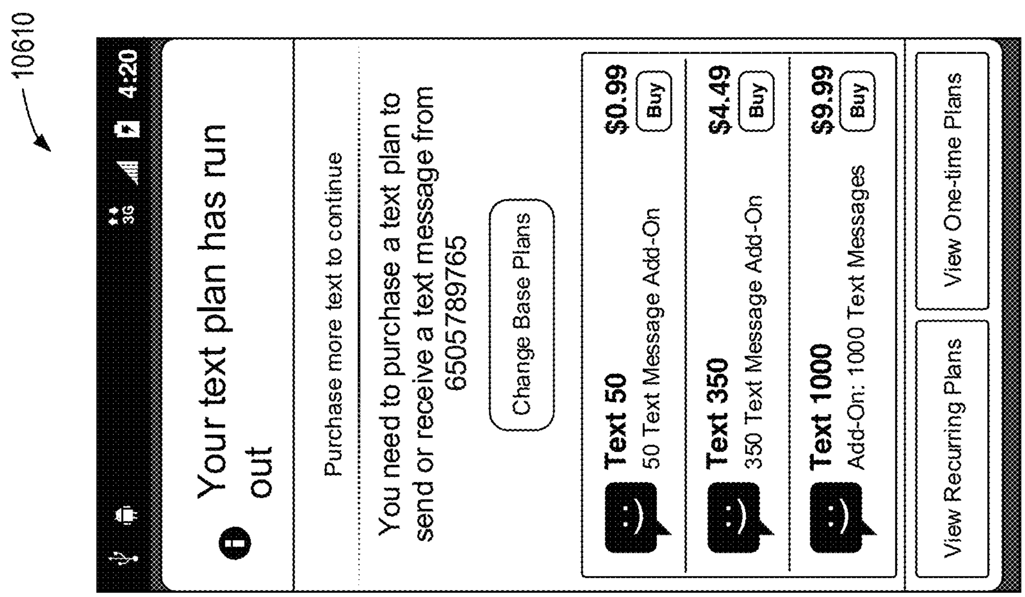

FIG. 129 illustrates a representative notification message 10610 presented through the UI 101 of the mobile wireless communication device 100 when the user of the mobile wireless communication device 100 attempts to use a text messaging service and a messaging service plan is not presently available. In some embodiments, no service plan is available when no service plan has been purchased, when a service usage allocation for a current service plan has been entirely (or nearly entirely) consumed, when no service plan has been purchased for a roaming network, etc. The notification message 610 can be presented as a result of one or more different notification trigger conditions. In some embodiments, the notification message informs the user of the mobile wireless communication device 100 that a request to send or receive a text message cannot be completed, e.g., as an existing data message service plan associated with the mobile wireless communication device 100 is depleted. The notification message 10610 can include one or more options to purchase additional text message units (e.g., as an "add on" supplemental messaging service plan or to change an existing messaging service plan within a base service plan bundle.) Options presented in the notification message 610 can be based on service usage history, a previous service usage, a present service usage, available network type, geographic location, and any other number of criteria that can be used to match an offered service plan with the attempt to use the text messaging service. The notification message can also include options to view one or more text messaging service plans that can recur for a specified time period (e.g., monthly text messaging service plans). The notification message can also include options to view one or more "one time" text-messaging service plans. Notification messages to purchase a service plan for a particular service activity, e.g., for a multi-media messaging service can also be presented as shown for text messaging services in FIG. 129. In some embodiments, the notification message can present options to purchase a service plan and accept an incoming text message or multi-media message (or equivalent). In some embodiments, the notification message can present options to purchase a service plan and reject the incoming text message or multi-media message. In some embodiments, purchase of a service plan can be completed before or after accepting and viewing an incoming text message or multi-media message.

Figure 130:
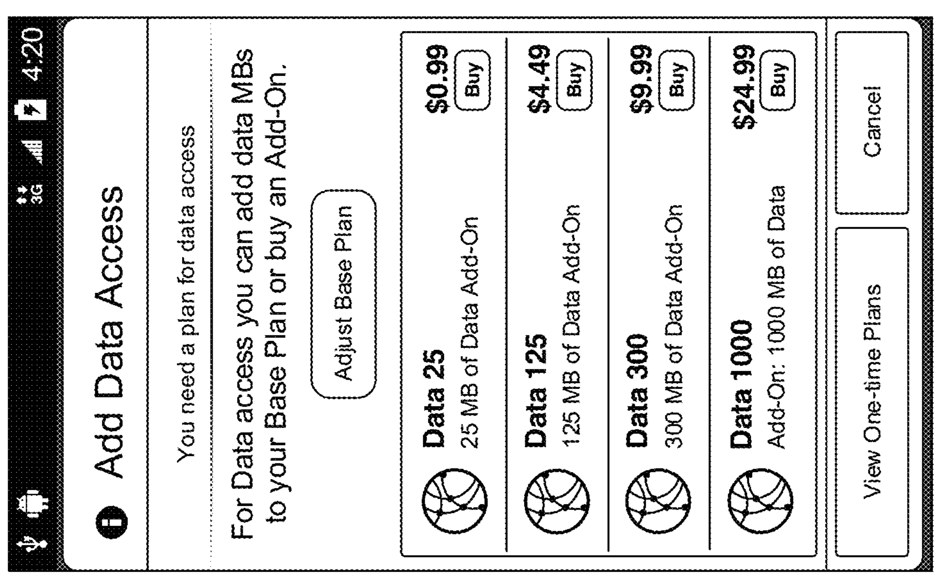

FIG. 130 illustrates a representative notification message 10620 presented through the UI 101 of the mobile wireless communication device 100 when the user of the mobile wireless communication device 100 attempts to use a data access service that is not available. For example, the base service plan bundle to which the user currently subscribes can have no data access service plan included, or an associated data access service plan can be expired, or the associated data access service plan can be depleted. The notification message can present a number of options to the user to purchase a supplemental data access service plan. The notification message can also include an option to view data access service plans that are recurring on "one time" only. The notification message can also provide the user an option to adjust a base service plan bundle. Service plans presented in the notification message can include multiple options based on any number of criteria determined to match the attempt to use the data access service, as described above also for notification messages and for other services. By selecting one or the presented service plans presented in the notification message 10620, the user of the mobile wireless communication device 100 can immediately learn about and subscribe to a service plan that can provide access to the data access service attempted.

Figure 131:
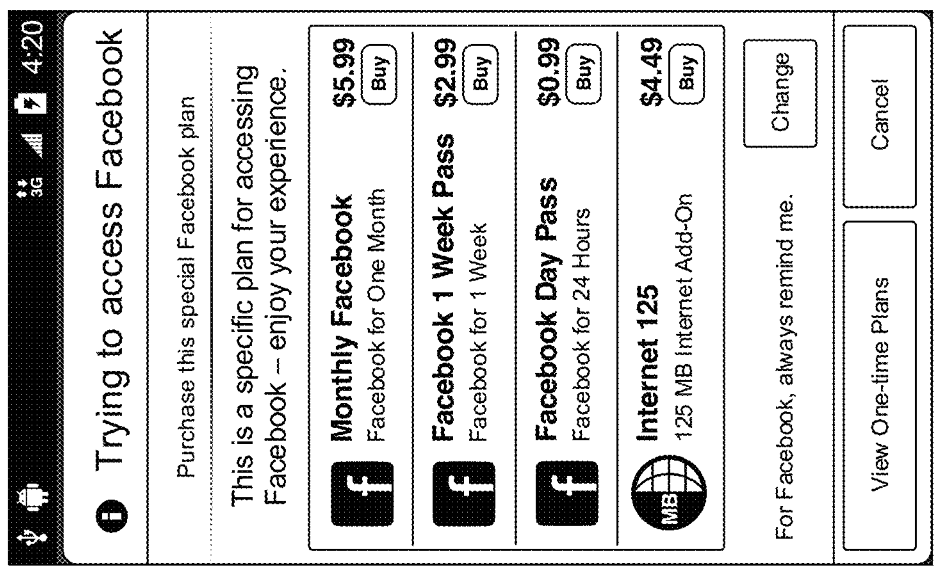

FIG. 131 illustrates a representative notification message 10625 that is presented through the UI 101 of the mobile wireless communication device 100 when the user of the mobile wireless communication device 100 attempts to access a service associated with a Facebook application that is not available. While the representative embodiment illustrated in FIG. 131 shows a notification message associated with attempting to access the Facebook application, similar notification messages can be presented for other application specific services, in some embodiments. In some embodiments, notification messages present offers tailored to a user's actions. In some embodiments, the notification message is presented through the UI 101 of the mobile wireless communication device 100 in response to different notification trigger criteria. For example, the base service plan bundle to which the user of the mobile wireless communication device 100 currently subscribes can have no general data access capability to access the Internet and no specific data access to access a Facebook website, portal, or server. Similarly, data access service plans associated with the mobile wireless communication device can be expired. Associated application specific Facebook service plans can also be expired. In some embodiments, the associated data access service plan is depleted. In some embodiments, the associated application specific Facebook service plan is expired. In some embodiments, the notification message presents options to through the UI 101 to purchase a supplemental application specific access service plan. In some embodiments, the notification present options through the UI 101 to purchase a general data (e.g., Internet) access service plan. The notification message can also include an option to view a catalog of access service plans that are recurring on "one time" only. The notification message can also provide the user an option to adjust settings for notifications associated with a specific application access service (e.g., Facebook access services). Through the UI 101, the user of the mobile wireless communication device 100 can be apprised of and explore multiple service plan options that can provide service access to a specific application or perform a specific service activity. The user of the mobile wireless communication device 100 can select to subscribe to one or more of the offered targeted service plans provided in the notification message. As a result, the user can enjoy access to services easily and quickly without requiring direct interaction with customer support through a service provider. Any number of relevant matching criteria based on service usage, service activity, service history, device type, device location, network type, network properties, etc. can be used to select the service plans presented in the notification message.

FIGS. 131, 132, 133, 134, and 135 illustrate representative screens that may be presented through the UI 101 of the mobile wireless communication device 100 to the user when selecting the "Add-On Plans" partition 10214 of FIGS. 68 and 72 and/or the "Plans & Sharing" partition 10214 of FIG. 70. A set of supplemental "add-on" service plans may be presented to the user through the UI 101. Information about the set of "add-on" service plans may be organized into a number of parallel "tabs," each tab providing groupings of information to present to the user of the mobile wireless communication device 100 about service plans. In some embodiments, the user can view and select among "add-on" service plans organized according to a service plan category (e.g., voice service plans, messaging service plans, data service plans). In some embodiments, the user can view and select among "add-on" service plans organized according to a applicable geographic location (e.g., plans applicable for US, North America, Europe, International, etc.)

Figure 132:
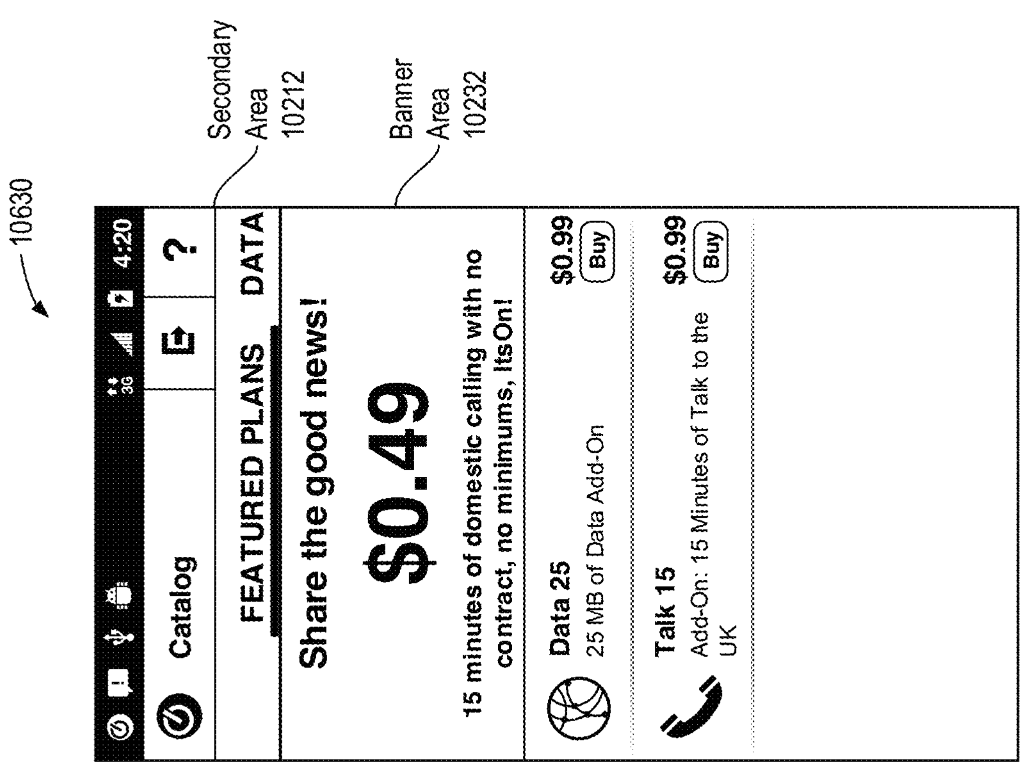

FIG. 132 illustrates a representative screen 10630 that provides through the UI 101 of the mobile wireless communication device 100 a summary of a set of featured service plans to which the user of the mobile wireless communication device 100 may subscribe. Selecting the "Featured Plans" tab in the secondary area 10212 of the UI 101 may access the set of featured service plans. Additional tabs may be included alongside the "Featured Plans" tab in the secondary area 10212 as shown. In some embodiments, the representative screen 10630 may be presented through the UI 101 when the user selects to view a catalog of service plans or service plan bundles by selecting the "Store" partition 10214 illustrated in FIG. 69. In some embodiments, the representative screen 10630 may be presented through the UI 101 when the user selects to view a catalog of service plans or service plan bundles by selecting the "Plans" partition 10214 illustrated in FIGS. 68 and 72. In some embodiments, the representative screen 10630 may be presented through the UI 101 when the user selects to view a catalog of service plans or service plan bundles by selecting the "Plans & Sharing" partition 10214 shown in FIG. 70. In some embodiments, the representative screen 10630 may be presented through the UI 101 when the user selects to view a catalog of service plans by selecting the "Add-On Plans" partition 10214 illustrated in FIGS. 68 and 72. In some embodiments, the representative screen 10630 may be presented when the user selects a "Catalog" button presented on another screen, on a marketing interceptor, or on a notification message. The user of the mobile wireless communication device 100 may obtain additional information about a specific featured service plan by selecting the particular featured service plan through the UI 101. Service providers may feature one or more service plans for a limited time period, to a specific set of users, to a particular set of mobile wireless communication devices 100, to a targeted device group, or to another set of users/devices. Featured service plans may provide a limited set of features for a low cost to entice the user to test out a service plan. One or more specific featured service plans can be prominently displayed in a banner area 10232 to highlight a particular featured service plan to the user of the mobile wireless communication device 100. In some embodiments, particular service plans displayed on the "Featured Plans" screen 10630 may depend on the previous screen from which the user navigated to the "Featured Plans" screen 10630. In some embodiments, the set of "Featured Plans" presented is tailored to the user of the mobile wireless communication device 100 based on knowledge of the user's service usage, based on indications from the user while browsing a catalog of service plans, based on answers to one or more "interview" questions presented to the user, or based on combinations of these. In some embodiments, the set of "Featured Plans" presented is updated regularly, e.g., each day to provide targeted service plans matched to time of day, day of week, time of year, holiday schedule, school schedule, work schedule or other time based criteria. In some embodiments, the set of "Featured Plans" presented is updated by a service provider and pushed to the mobile wireless communication device 100 through an over the air update. In some embodiments, the set of "Featured Plans" presented is updated by a third party. In some embodiments, screen 10630 includes an additional selectable input, e.g., a "button," (not shown) that the user of the mobile wireless communication device 100 can select to "refresh" the set of "Featured Plans" displayed. In response to the "refresh" selection, an updated set of "Featured Plans" can be obtained and displayed to the user of the mobile wireless communication device 100.

Figure 133:
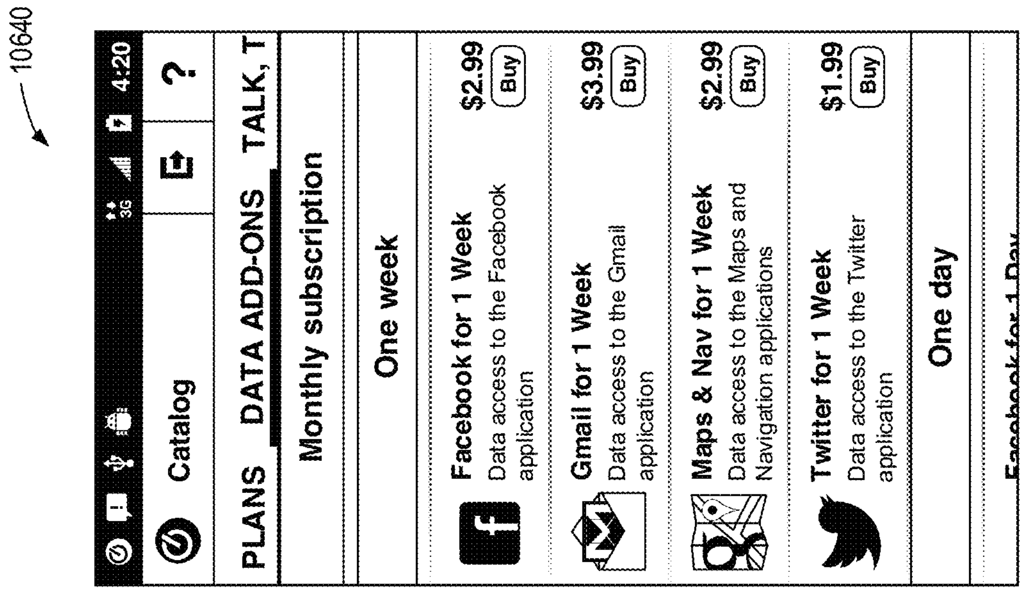

FIG. 133 illustrates a representative screen 10640 that provides through the UI 101 of the mobile wireless communication device 100 a set of supplemental service plans for data access to which the user may subscribe. One or more service plans in the set of supplemental service plans may be added to an existing base service plan bundle as "data add on" service plans. Each data add on supplemental service plan may provide general data access or specific data access for one or more data applications or services. Each data add on supplemental service plan may provide access on a recurring subscription basis or for a limited "one time" time period. The set of data add on service plans illustrated in FIG. 133 is organized according to time period. In some embodiments, the set of available data add on service plans may be organized by application or by service provided. The user of the mobile wireless communication device 100 may select one or more of the data add-on service plans to obtain additional information and/or to purchase and subscribe to the one or more data add-on service plans. The UI 101 may provide a broad array of supplemental service plans, a subset of which may be displayed, while additional supplemental service plans may be accessed by directionally scrolling as required through the UI 101. As displayed on the screen 10640 of FIG. 133, a set of "One Week" service plans is presented, while a set of "One Day" service plans is not visible below the bottom of the screen 10640. A user of the mobile wireless communication device 100, in some embodiments, can navigate to the "One Week" service plans by providing an input through the UI 101 of the mobile wireless communication device 100. In some embodiments, selecting the title bars, e.g., "Monthly Subscription," "One Week," and "One Day" can expand the title bar to display a set of service plans of the type specified in the title bar. In some embodiments, selecting the title bar a second time can collapse the displayed set of service plans displaying only the title bar itself. As illustrated in screen 10640, the "Monthly Subscription" service plans are collapsed and not visible; the "One Week" service plans are expanded, visible and selectable; and the "One Day" service plans are expanded, and not selectable. In some embodiments, the user can "swipe" the UI 101 to view additional service plans displayed and/or displayable for the currently selected catalog tab. In some embodiments, "data add on" service plans are separated into two separate tabs based on subscription type, e.g., recurring service plans and "one-time" service plans.

Figure 134:
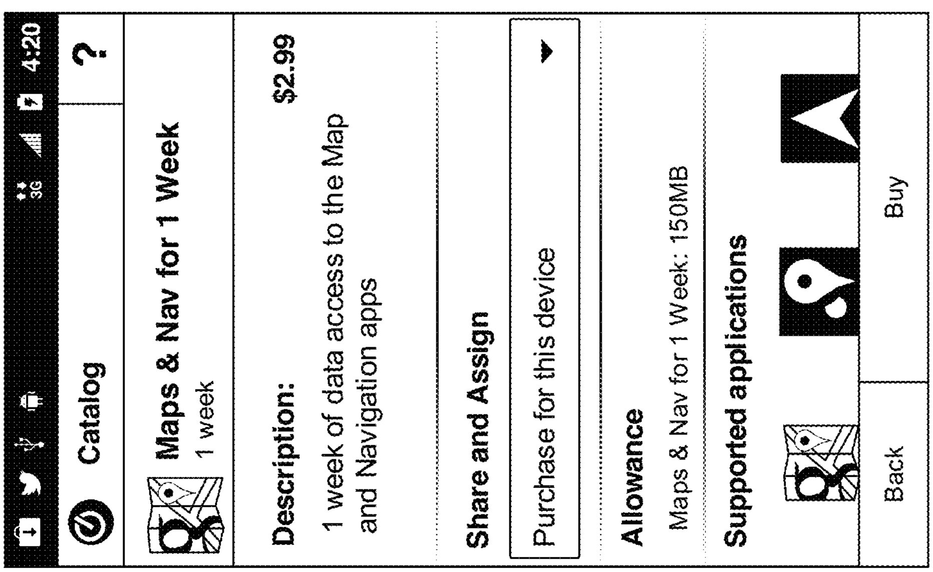

FIG. 134 illustrates a representative screen 10645 that provides through the UI 101 of the mobile wireless communication device 100 information on a specific service plan selected from the representative catalog of "Data Add-On" service plans shown in the screen 10640 of FIG. 133. The screen 10645 of FIG. 134 may be presented to the user in response to the user selecting the "Maps & Nay for 1 Week" service plan presented on screen 10640 of FIG. 133. The screen 10645 provides details about the selected service plan including a brief description, an applicable time period, a data usage allowance, and a set of supported applications that can be used with the service plan. The screen 10645 also presents an option to the user of the mobile wireless communication device 100 to buy the particular service plan for the particular mobile wireless communication device 100. The screen 10645 also includes a partition area entitled "Share and Assign" that may provide the user of the mobile wireless communication device 100 selection options to share and/or assign the purchased service plan with other mobile wireless communication devices 100.

Figure 135:
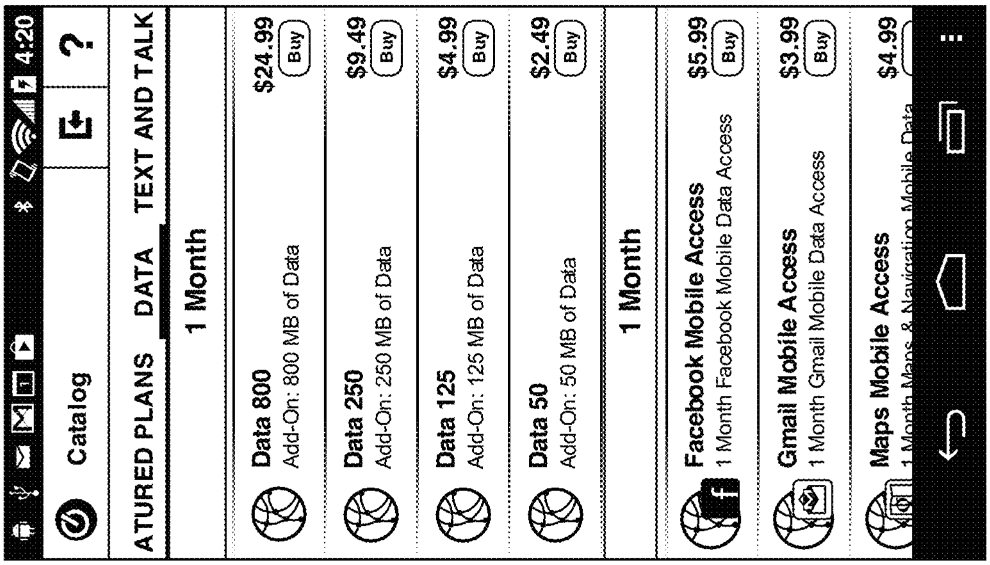

FIG. 135 illustrates a representative screen 10650 that provides through the UI 101 of the mobile wireless communication device 100 a set of data service plans to which the user may subscribe. The set of data service plans may be organized by a time period (as shown) or by another criteria suitable for displaying the set of data service plans. The set of data service plans may include service plans to supplement a base service plan bundle, i.e., an "add on" data service plan, and may also include data service plans providing access to specific applications or services, e.g., a "Facebook," "Gmail," or "Maps" data service plan. The user of the mobile wireless communication device 100 may select one or more of the data service plans to obtain additional information and/or to purchase and subscribe to the one or more data service plans displayed through the UI 101 of the mobile wireless communication device 100.

FIG. 136 illustrates a representative screen 10660 that provides through the UI 101 of the mobile wireless communication device 100 a set of text messaging service plans and voice service plans to which the user may subscribe. The set of service plans may be organized by a service category (as shown) or by another criteria suitable for displaying the set of service plans. The set of service plans may include service plans to supplement a base service plan bundle, e.g., an "add on" text messaging service plan or a voice "talk" service plan as shown. The user of the mobile wireless communication device 100 may select one or more of the text messaging service plans or voice service plans to obtain additional information and/or to purchase and subscribe to the one or more of the service plans displayed through the UI 101 of the mobile wireless communication device 100.

FIG. 137 illustrates a representative screen 10670 that provides through the UI 101 of the mobile wireless communication device 100 a set of international voice service plans to which the user may subscribe. The set of service plans may be organized by an applicable country or region (as shown) or by another criteria suitable for displaying the set of service plans. The set of service plans may supplement a service plan to which the user of the mobile wireless communication device 100 already subscribes, or may be added separately as a voice service plan to a base service plan bundle. The user of the mobile wireless communication device 100 may select one or more of the international voice service plans to obtain additional information and/or to purchase and subscribe to the one or more of the service plans displayed through the UI 101 of the mobile wireless communication device 100.

FIGS. 138-144 illustrate representative screens that may be presented through the UI 101 of the mobile wireless communication device 100 to the user when selecting the “Account” partition 10214 of FIGS. 68, 70, and 72. The user of the mobile wireless communication device 100 can obtain information about and manage payments for one or more service accounts associated with the user, the mobile wireless communication device 100 and one or more mobile wireless communication devices 100 associated with a device group. Access to viewing and managing account information can be password protected or otherwise provided with security features to restrict access through the UI 101 of the mobile wireless communication device 100.

FIG. 138 illustrates a representative screen 10700 that summarizes one or more invoices associated with one or more service plans, one or more users (subscribers), and one or more mobile wireless communication devices 100. Selecting the “Payments” tab, when the user views “Account & Billing” information, may access the information presented by screen 10700. As illustrated in FIG. 138, multiple invoices may be presented to a user of the mobile wireless communication device 100 through the UI 101, including a first invoice associated with a particular subscriber and a second invoice associated with one or more service plans. The user of the mobile wireless communication device 100 may access additional information about each of the individual invoices by selecting the particular invoice.

FIG. 139 illustrates a representative screen 10710 that presents additional detailed information for the second invoice shown on representative screen 700 of FIG. 138. Invoice details can include payments, purchases, and fees related to one or more service plans.

FIG. 140 illustrates a representative screen 10720 that summarizes account payment means, e.g., credit card information, associated with one or more service plans, one or more users (subscribers), and one or more mobile wireless communication devices 100. Selecting the “Account” tab, when the user views “Account & Billing” information, may access the information presented by screen 10720. Multiple payment means can be obtained, retrieved, managed and stored. The user of the mobile wireless communication device 100 can add a payment means by selecting the “Add” button. The user of the mobile wireless communication device 100 can also review and edit information about a payment means by selecting the particular payment means.

FIG. 141 illustrates a representative screen 10730 that details a particular payment means (e.g., credit card information). The user of the mobile wireless communication device 100 can input, review and update information related to the particular payment means through the UI 101 of the mobile wireless communication device 100. Some sensitive information, e.g., portions of or all digits of a credit card number, security codes, and expiration dates, can be obscured when presented through the UI 101 to provide added security.

FIG. 142 illustrates a representative screen 10740 that provides information about an account profile for a user of the mobile wireless communication device 100. The user of the mobile wireless communication device 100 can input, review and update information for the account profile through the UI 101 of the mobile wireless communication device 100. Some sensitive information, e.g., a password, can be obscured when presented through the UI 101 to provide added security.

FIG. 143 illustrates a representative screen 10750 that provides an alphanumeric interface through which the user of the mobile wireless communication device 100 can input and update the account profile information. The screen 10750 can be accessed, in some embodiments, by selecting the “Edit information” button illustrated on screen 10740 in FIG. 142.

FIG. 144 illustrates a representative screen 760 that provides an alphanumeric interface through which the user of the mobile wireless communication device 100 can update a password associated with an account. The screen 10760 can be accessed, in some embodiments, by selecting the “Change Password” button illustrated on screen 10740 in FIG. 142.

FIG. 145 illustrates a representative screen 10770 that provides information on a number of settings for the mobile wireless communication device 100 and administrative functions that may be accessed by the user of the mobile wireless communication device 100. The representative settings screen 10770 may be accessed, in some embodiments, by selecting the “Settings” button illustrated in the bottom area 10208 of FIG. 72. The user may change settings by selecting one or more different topics presented through the UI 101, including settings related to data transfers (“Background Data”) and notifications (“Reset reminder preferences” & “Notification history”). The user may also select to refresh operating system and/or application firmware (or software) stored on the mobile wireless communication device 100. The mobile wireless communication device 100 may communicate with one or more servers located in the wireless network to refresh itself. The user can also select to enable an “Activation Wizard” to guide the user through an activation process for the mobile wireless communication device 100, for a user of the mobile wireless communication device 100, and/or for a service account associated with the user and/or the mobile wireless communication device 100.

FIG. 146 illustrates a representative screen 10800 that summarizes information about mobile wireless communication devices 100, including users, service accounts and associated lines (e.g., phone numbers) that may be presented through the UI 101 of the mobile wireless communication device 100. The information presented on screen 10800 can be accessed, in some embodiments, by selecting the “Devices” partition 10214 illustrated in FIGS. 68 and 72.

FIG. 147 illustrates a representative screen 10810 that summarizes information about mobile wireless communication devices 100, including users, service accounts and associated lines (e.g., phone numbers) that may be presented through the UI 101 of the mobile wireless communication device 100. The information presented on screen 10810 can be accessed, in some embodiments, by selecting the “Lines & Devices” partition 10214 illustrated in FIG. 70.

FIG. 148 illustrates an exemplary message in a representative screen 10820, in accordance with some embodiments, that is presented through the UI 101 of the mobile wireless communication device 100 when the mobile wireless communication device 100 is not yet associated with a master service account. The message informs the subscriber that the mobile wireless communication device 100 is not associated with an existing service account and asks if the subscriber would like to create a new master service account or join this mobile wireless communication device 100 to an existing master service account. In some embodiments, the message informs the subscriber of an option to transfer a service account from a different device to the mobile wireless communication device 100. In some embodiments, the subscriber selects "New Account" and selects "Create."

In some embodiments, when creating a new account for a mobile wireless communication device 100, the user of the mobile wireless communication device 100 is provided access to an activation server, e.g., through which to enter information for the new account, to view a catalog of service plans, to select a service plan, to customize a service plan, and/or to perform other device activation, service account activation, service provider selection, service selection and service activation tasks as described elsewhere herein. In some embodiments, access to the activation server is provided through a sponsored service (or "ambient" service) at no cost (or at reduced cost) to the user of the mobile wireless communication device 100, e.g., through a wireless cellular access network. In some embodiments, the sponsored/ambient service provides for limited communication between the mobile wireless communication device 100 and one or more service activation systems in order to proceed with establishing a new service account for the mobile wireless communication device 100. In some embodiments, the user of the mobile wireless communication device 100 provides information required to activate a service account during the activation process. In some embodiments, the user of the mobile wireless communication device enters user specific information and selects a service plan with which to use the mobile wireless communication device 100. In some embodiments, the user of the mobile wireless communication device is provided a pre-configured service plan catalog. In some embodiments, the pre-configured service plan catalog permits the user to select from a set of pre-configured service plan offers. In some embodiments, the user of the mobile wireless communication device 100 customizes one or more service plan elements of a selected service plan (e.g., to alter the pre-configured service plan to more closely match requirements of the user of the mobile wireless communication device 100.)

FIG. 149 shows a message that is presented, in some embodiments, as a result of selecting "Create" in FIG. 148. In this particular example, the subscriber may choose between a prepay account and a post-pay account. As would be appreciated by a person having ordinary skill in the art, a prepay account is established by depositing some amount of money (or money equivalent) in the account and debiting that amount of money as the subscriber uses for-fee services. With a post-pay account, on the other hand, the subscriber uses services on credit and is then billed for service usage after some period of time (e.g., after one month has passed). In the example shown in FIG. 149, the subscriber chooses a prepay account and enters information to establish the master service account. The subscriber then selects "Create." In some embodiments, the subscriber is presented multiple screens in which to enter account information. In some embodiments, subscriber is presented an option to transfer all or part of account information from another account. In some embodiments, the subscriber is presented an option to transfer account information from a third-party service partner system (e.g., from an Apple ID account, an iTunes account, a iCloud account, a Google account, an Amazon account, or other account that can have requisite identification and/or credit information for the subscriber.)

FIG. 70, discussed earlier, shows a representative screen 10830 example of information that is presented, in some embodiments, through the user interface 101 of the mobile wireless communication device 100 after the subscriber has established a master service account for the mobile wireless communication device 100 (e.g., by following the procedure described above). In this representative screen 10830, there are four icons: "Lines & Devices," "Account," "Plans & Sharing," and "Help." In some embodiments, selecting "Lines & Devices" allows the subscriber to access information about mobile wireless communication devices 100 associated with the master service account. In some embodiments, selecting "Account" allows the subscriber to access information about the master service account. In some embodiments, selecting "Plans & Sharing" allows the subscriber to access information about available service plans and, if additional mobile wireless communication devices 100 are associated with the master service account, whether and how those service plans are shared among mobile wireless communication devices 100 in a device group.

When a subscriber selects the "Account" partition 10214 in FIG. 70, FIG. 150 illustrates a resulting display, in some embodiments. The display prompts the subscriber for the password associated with the master service account so that the user can view information about the account. After the subscriber enters the password, the subscriber selects "OK." In some embodiments, a password or other credential is required in order to establish a new account. In some embodiments, a password or other credential is required to be entered in order to associate with an existing account. In some embodiments, a password or credential is associated with a set of permission levels that determine what account information the subscriber/user can enter and/or modify for a new or existing account. In some embodiments, a set of screens presented to the subscriber/user is dependent on the type of credential and/or password entered by the subscriber/user during the account setup process. In some embodiments, additional information is obtained from the subscriber/user to be used for supplemental authentication. In some embodiments, a set of security questions is presented to the user/subscriber through one or more screens on the mobile wireless communication device 100. In some embodiments, answers to at least one of the set of security questions is used for supplemental authorization, e.g., when accessing a service management system or a customer support system.

FIG. 151 illustrates a representative screen 10850 of information that is presented to the subscriber who provides the correct account password. The subscriber can access information about the account history by selecting either "Transactions and Balance" or "Usage." The subscriber can access information about billing and payments by selecting "Payment methods," "Top up now," or "Configure Top up." The subscriber can access other information about the account by selecting "Account Information."

FIG. 152 illustrates an example of a display 10860 that is presented when the subscriber selects "Payment Methods." Although FIG. 152 illustrates the situation in which a subscriber pays by credit card, as would be appreciated by a person having ordinary skill in the art, many other payment schemes are possible, including, for example, debit cards, automated clearing house (ACH) transactions, direct debit from an account at a financial institution, PayPal, Scratcher, e-Money, or another form of virtual money. It is also possible that the payment method comprises other consideration, such as credits a subscriber earned in some manner (e.g., by viewing advertisements, for accepting an offer, etc.).

In the example of FIG. 152, the payment method is a credit card, and the subscriber selects a credit card type and enters information in various fields. The subscriber enters his or her name in the "Name" field; the credit card number in the "Card Number" field; the credit card's expiration date in the "Expiration" fields; the credit card's security code in the "Security Code" field; the subscriber's address in the "Address" field; and a nickname for the credit card in the "Payment Nickname" field. In this example, the subscriber can also choose to remove the credit card or use the credit card as the default payment method. The subscriber completes entry of the payment information by selecting "Update."

FIG. 153 illustrates a representative screen 10870 displaying that when the subscriber now selects "Payment methods" in FIG. 151, the credit card entered through the display shown in FIG. 152 is listed (in this example as the default payment method). This screen also invites the subscriber to enter an additional payment method by selecting "Add a new payment method."

FIG. 154 is an example of a screen 10880 that is presented, in accordance with some embodiments, when the subscriber selects "Top up now" from the display 10850 shown in FIG. 151. As shown in FIG. 154, the subscriber's master service account balance is $100. The subscriber has the option to add funds to the subscriber's prepay account. As shown in FIG. 154, the subscriber may choose to add $10, $20, $50, or $100 to the account balance. The subscriber's default payment method ("VISA-1111") is presented as the payment source. By selecting "Top up" with the selections shown in FIG. 154, the subscriber will add $10 to the account balance of $100, thus resulting in a total balance of $110. After selecting "Top up," the subscriber would be able to select "Refresh Balance" to confirm that the account balance is $110.

FIG. 155 illustrates an example of a screen 10890 presented when a subscriber selects "Configure Top up" shown in FIG. 151. As shown in the example of FIG. 155, the subscriber may choose to "top up" (e.g., add funds to) the account when the balance is less than a particular value ("Balance is less than"), on a particular day each month ("Every month on the"), or manually ("No auto top up"). The subscriber selects an amount for the top up and a payment source and selects "Update" to complete the configuration. Although FIG. 155 illustrates an example in which the user tops up the account using a credit card, other sources to top up are possible, including, for example, debit cards, automated clearing house (ACH) transactions, direct debit from an account at a financial institution, PayPal, Scratcher, e-Money, or another form of virtual money. It is also possible that the payment method comprises other consideration, such as credits a subscriber earned in some manner (e.g., by viewing advertisements, for accepting an offer, etc.).

Although FIGS. 152 through 155 described the configuration and management of a prepay account, it should be noted that, in some embodiments, the subscriber may alternatively configure the master service account to be a post-pay account. In some embodiments, the subscriber configures the master service account to be a post-pay account and is billed later for services. In some embodiments, the subscriber does not have to enter payment information to set up a post-pay account. In some embodiments, the service provider bills the subscriber with a post-pay account at a regular interval (e.g., monthly). In some embodiments, the service provider bills the subscriber after the subscriber has accumulated a particular amount of charges (e.g., after the subscriber has accumulated $5 of charges).

FIG. 147 illustrates a representative screen 10810 of information that is presented, in accordance with some embodiments, when the subscriber who has established a master service account selects "Lines & Devices" from the screen 330 shown in FIG. 70. As indicated by FIG. 147, there is only one mobile wireless communication device 100 associated with the master service account ("Jeff Master").

In some embodiments, the mobile wireless communication device 100 can be preconfigured for use with a new service account or an existing service account or to transfer an existing service account for an existing device to the new mobile wireless communication device 100, e.g., by entering information through access to a website, an application portal or other access method to a service management system for a network operator, service provider, and/or third-party service partner. In some embodiments, during the account setup process, the user/subscriber is presented options to associate the mobile wireless communication device 100 with one or more existing accounts maintained by third-party service partners, e.g., with an Apple ID account, an iTunes account, iCloud account, a Google account, an Amazon account, or account external to the service provider/mobile network operator. In some embodiments, the user/subscriber is presented options to establish an account with a third-party service partner, information for establishing the account is obtained through the UI 101 of the mobile wireless communication device 100, and information for establishing and/or associating with the third-party service partner service account is forwarded to network systems maintained and/or managed by the third-party service partner.

In some embodiments, the mobile wireless communication device 100 is supplied to the user/subscriber with a default account setup. In some embodiments, the mobile wireless communication device 100 is supplied to the user/subscriber with a "starter" account and a set of one or more initial "trial" services. In some embodiments, the mobile wireless communication device 100 is supplied to the user/subscriber with a portion of account information supplied through an initial account setup process, and additional information is collected from the user/subscriber during a final account setup process. In some embodiments, the mobile wireless communication device 100 is supplied without an assigned phone number, and a phone number is assigned during the setup process. In some embodiments, the user/subscriber is offered a selection of phone numbers from which to select a phone number for the mobile wireless communication device 100. In some embodiments, the mobile wireless communication device 100 is supplied with an assigned phone number, and the user/subscriber is offered an option to replace the assigned phone number with a different phone number. In some embodiments, the user/subscriber is presented options for phone numbers to assign to the mobile wireless communication device 100 based at least in part on information provided during an account setup process. In some embodiments, phone numbers presented for selection to the user/subscriber are based on geographic region information (e.g., based on a determination of the location of the mobile wireless communication device 100 during the account setup process). In some embodiments, phone numbers presented for selection to the user/subscriber are based on geographic information supplied directly or indirectly by the user/subscriber (e.g., a current phone number, address, zip code, area code or other identifying information).

In some embodiments, the account setup process includes a guided tutorial of screens for how to use the mobile wireless communication device 100. In some embodiments, the guided tutorial can be access by the user/subscriber of the mobile wireless communication device 100 at any time after the account setup process. In some embodiments, account setup process requires that at least one service plan be associated with the mobile wireless communication device 100 (e.g., pre-configured and/or selected during the account setup process). In some embodiments, the account setup process can be separate from a service selection process.

FIG. 156 illustrates a representative screen 10900 of information this is presented, in accordance with some embodiments, when a user of the mobile wireless communication device 100 selects to add a device to an existing service account. In some embodiments, the user of the mobile wireless communication device 100 is presented an option to add the mobile wireless communication device 100 to an already established service account. In some embodiments, the user of the mobile wireless communication device 100 is presented an option to transfer a service account from a different mobile wireless communication device 100 to the current mobile wireless communication device 100, e.g., when upgrading a mobile wireless communication device 100. In some embodiments, the user of the mobile wireless communication device 100 is presented an option to transfer selected aspects of a service account (e.g., a phone number or credit information) and to enter other aspects for a new service account. In some embodiments, user of the mobile wireless communication device 100 selects the option to add the mobile wireless communication device 100 to an existing service account and selects an actionable button to continue with a service activation process for the mobile wireless communication device 100. In some embodiments, the mobile wireless communication device 100 connects to an activation server in order to continue a process for adding the mobile wireless communication device 100 to an existing service account. In some embodiments, one or more screens are presented through the UI 101 to the user of the mobile wireless communication device 199 to provide for identifying the existing service account with which to associate the mobile wireless communication device 100. In some embodiments, one or more screens are presented to provide for authenticating that the user of the mobile wireless communication device 100 has the authority to associate the mobile wireless communication device 100 with the existing service account. In some embodiments, connection to the activation server uses a "sponsored" service (or "ambient" service) that provides for limited communication with the activation server (and/or one or more other service activation systems) in order to complete establishing an association between the mobile wireless communication device 100 and the existing service account.

In some embodiments, the mobile wireless communication device 100 provides one or more credentials to the activation server to identify the mobile wireless communication device 100 and/or the user thereof. In some embodiments, the activation server identifies the mobile wireless communication device 100 and/or the user thereof using at least in part the provided one or more credentials and determines one or more existing service accounts with which the mobile wireless communication device 100 can be associated. In some embodiments, one or more credentials provide for a "hardware" based identification of the mobile wireless communication device 100 (e.g., IMEI, MEID, MAC, etc.). In some embodiments, one or more credentials provide for an identification of a "subscriber/user" of the mobile wireless communication device 100 (e.g., IMSI, MSID, MSIDSN, MDN, IPv4/6 address, etc.). In some embodiments, the one or more credentials provide for a combination of device identification and subscriber identification. In some embodiments, the one or more credentials include a login ID and/or a password (or other equivalent security identification). In some embodiments, the one or more credentials include a unique code provided separately to the user of the mobile wireless communication device 100 (e.g., a barcode, a QR code, an authentication key, a pairing code, a sequence of alphanumeric characters, an image for scanning/photographic/optical recognition, a printed card, etc.). In some embodiments, one or more of the credentials are provided with a newly purchased mobile wireless communication device 100. In some embodiments, one or more credentials are provided in advance or after purchase of the mobile wireless communication device 100, e.g., through access to a website, application portal or other online service. In some embodiments, one or more credentials are stored in a cloud-based server and are retrievable by the user of the mobile wireless communication device 100. In some embodiments, one or more credentials are provided on a separate mobile wireless communication device 100 (or other computing device having a display and/or communication capabilities), and the user of the mobile wireless communication device 100 obtains the one or more credentials from the separate mobile wireless communication device 100, e.g., through a wireless, wired, optical, near field communication, infrared or other communication method.

Adding Devices to Master Service Account

Having used one mobile wireless communication device, hereinafter referred to as the "master device" ("Jeff Master" in FIG. 147), to establish a master service account and configure payment options, including a payment source and, if desired, an automated top up of master service account funds, in some embodiments, the subscriber is able to add other mobile wireless communication devices 100, hereinafter called "child devices," to the master service account and create a device group. It should be noted that the designation of the mobile wireless communication device used to set up the master service account as a "master device" is for illustrative purposes. As will be appreciated by a person having ordinary skill in the art in light of this disclosure, once a master service account has been established, the capabilities of and permissions granted to the mobile wireless communication devices associated with that master account can be modified. Thus, a device that was originally a "master" device can be made a child device, and a device that was originally a child device can be promoted to a master device. The use of the terms "master" and "child" herein is merely to improve readability. As would be appreciated by a person having ordinary skill in the art, whether a device is a "master" or a "child" is dependent on the capabilities of and permissions granted by a subscriber to that device.

In some embodiments, the "master" device is referred to as a "primary" device. In some embodiments, the "child" device is referred to a "secondary" device. In some embodiments, the "master" device has a different set of capabilities and/or permissions for managing devices within the device group compared to the "child" device. In some embodiments, the "master" device has a different set of capabilities and/or permissions for modifying aspects of service plans associated with devices in the device group compared to the "child" device. In some embodiments, a device can provide for different users to log into and use the device. In some embodiments, properties of a device can depend on the type of user logged into user the device. In some embodiments, a device can operate as a "master" device when a "master" user logs into the device. In some embodiments a device can operate as a "child" device when a "child/non-master" user logs into the device.

In some embodiments, the device group is a set of associated devices without a designated "master" device. In some embodiments, an administrator manages service plans and/or permission capabilities for devices in the device group. In some embodiments, different devices in the device group have different permission capabilities that determine what properties of service plans, control of services, sharing of service plans, assignment of service plans, and other service management that a user of the device can set for itself and for other devices in the device group. In some embodiments, different devices can be categorized according to a hierarchy of permission capabilities, e.g., a "master" device that can set and modify a maximum set of properties, a "child" device that can set and modify a minimum set of properties, and "intermediate" devices having a range of service plan configuration setting and modification capabilities in between the "master" device and the "child" device. In some embodiments, the "child" device has no access to set or modify service plan configurations for itself or other devices in the device group. In some embodiments, the "master" device has access to set or modify service plan configurations for itself and all other devices in the device group. In some embodiments, an "intermediate" device has access to set or modify service plan configurations for itself and one or more other devices in the device group.

In some embodiments, in addition to (or in place of) device permission capabilities, user of mobile wireless communication devices can have different permission capabilities. In some embodiments, an individual user can have a user credential and service capabilities of mobile wireless communication devices that the user can access depend on the user credential. In some embodiments, an individual user can belong to a user group of multiple users, and the user group can have a set of permission capabilities that determines communication service capabilities of users of the user group. In some embodiments, a "master" user or an "administrator" manages permission capabilities for a user or a user group. In some embodiments, the master user controls service account information for service accounts with which devices can be associated. In some embodiments, a user is associated with a service account in addition to (or in place of) associating the device with the service account. In some embodiments a user credential determines access to services for the user when using one or more wireless communication devices 100. In some embodiments, the user provides a user credential to a mobile wireless communication device 100 (e.g., through a UI 101), and service capabilities available to the user for the mobile wireless communication device 100 are determined at least in part by the provided user credential. In some embodiments, a user credential provides for unique identification of the user. In some embodiments, a user credential provides for unique identification of a user group with which the user is associated. In some embodiments, a subscriber management system (e.g., maintained by a network operator, service provider, and/or third-party service partner) includes information about users, user groups, devices, and/or device groups. In some embodiments, an access service system determines service access permissions for a user of a mobile wireless communication device 100 based at least in part on information stored in the subscriber management system and/or provided by the mobile wireless communication device 100 (and/or a user thereof). In some embodiments, a user of the mobile wireless communication device 100 "logs in" to use services of a mobile wireless communication device 100. In some embodiments, the set of service capabilities available to the user of the mobile wireless communication device 100 depends on a set of service permissions associated with the user, the mobile wireless communication device 100, a user group, a device group, or a combination of these. In some embodiments, based on an identification of the user, a set of permission capabilities (e.g., stored in the subscriber management system and/or in the mobile wireless communication device 100) determines at least in part what services (and/or capabilities of services) are available to the user while using the mobile wireless communication device 100.

In some embodiments, a user provides a "login" credential, e.g., through a UI 101 of the mobile wireless communication device 100, and at least an aspect of the "login" credential is provided to a service management system. In some embodiments, at least a portion of the "login" credential is stored in the mobile wireless communication device 100 and/or in the service management system. In some embodiments, information is communicated by the service management system to the mobile wireless communication device 100 to determine, at least in part, a set of service capabilities the user of the mobile wireless communication device 100 can use while logged into the mobile wireless communication device 100. In some embodiments, service capabilities for the user of the mobile wireless communication device 100 depend on one or more of: an identity of the user, permission capabilities associated with the user, an identity of a user group with which the user is associated, permission capabilities associated with the user group, an identification of the device, permission capabilities associated with the device. In some embodiments, a mobile wireless communication device 100 can operate according to permission capabilities for services associated with a user that is logged into the mobile wireless communication device 100. In some embodiments, a mobile wireless communication device 100 can operate as a "master" device when a "master" user is logged into the mobile wireless communication device 100. In some embodiments, a mobile wireless communication device 100 can operate as a "child" device when a "child" user is logged into the mobile wireless communication device 100. In some embodiments, permission capabilities associated with the user logged into the mobile wireless communication device 100 determine a set of services that the user can access or purchase (e.g., for the device, for a device group, or for another device). In some embodiments, permission capabilities associated with the user logged into the mobile wireless communication device 100 determine what settings (e.g., of the device, of services, of users, of user groups, of device groups) the user can access and set. In some embodiments, a configuration of the mobile wireless communication device 100 is adjusted based on the particular user logged into the mobile wireless communication device 100.

In a representative embodiment, a "master" user logs into a "child" mobile wireless communication device 100, e.g., a "child" device used by or intended for use by a "child" user. In the representative embodiment, the "master" user modifies a setting for a service associated with the "child" user and/or the "child" device, e.g., to upgrade or downgrade a service. In the representative embodiment, the "master" user logs out of the "child" device, thereby removing capability to modify settings for services (or configure the device to have a limited capability to modify settings for services). In the representative embodiment, the "master" user has capabilities to modify one or more settings of services for the "child" device, while the "child" user does not have capabilities (or different capabilities than the "master" user) to modify the one or more settings of services for the "child" device. In some embodiments, the "child" device acts as a "master" device while the "master" user is logged into the device and as a "child" device when the "child" user is logged into the device. In some embodiments, the device defaults to having a "child" device capability and attains one or more aspects of a "master" device capability when a "master" user logs into the device.

In some embodiments, user credentials determine at least in part service capabilities available to the user of the mobile wireless communication device 100. In some embodiments, user credentials determine at least in part access to, control of, management of, and/or features of services for the mobile wireless communication device 100. In some embodiments, the user credential provides for an "authorization" of the user to access and use various communication services through the mobile wireless communication device 100. In some embodiments, a service account is associated with a user of the mobile wireless communication device 100. In some embodiments, accounting of service usage for the mobile wireless communication device 100, e.g., by a service processor 115, a service controller 122, a service management system, or a combination of these, associates the service usage for the user with a "user" service account. In some embodiments, service usage accounted for the mobile wireless communication device 100 is associated with the user logged into the mobile wireless communication device 100 and is applied to one or more service accounts of the user. In some embodiments, each particular user of a mobile wireless communication device 100 has access to service capabilities based at least in part on identification of the particular user when logged into the mobile wireless communication device 100. In some embodiments, service usage is assigned to different service accounts for different users of the same mobile wireless communication device 100, e.g., based on which user is logged into the mobile wireless communication device 100 when accruing service usage for services through the mobile wireless communication device 100. In some embodiments, a user logs into a device, receives permissions for using the device, uses one or more services through the device, and accounting of service usage of the one or more services are allocated to particular service accounts (e.g., associated with the user) based at least in part on the particular user logged into the device.

In some embodiments, a user that purchases a mobile wireless communication device 100 is a "master" user of the mobile wireless communication device 100 by default. In some embodiments, the "master" user can control aspects of services available to and capabilities of the mobile wireless communication device 100. In some embodiments, the "master" user can specify one or more specific users that can log into and use the mobile wireless communication device 100. In some embodiments, the "master" user can specify services and capabilities of the mobile wireless communication device 100 for a specific user of the mobile wireless communication device 100. In some embodiments, the "master" user can determine one or more of: what services the specific user can access through the mobile wireless communication device 100, what aspects of services or capabilities of the mobile wireless communication device 100 the specific user can manage, or what services the specific user of the mobile wireless communication device 100 can purchase and/or download. In some embodiments, the "master" user enters one or more credentials to a service management system, and the service management system provides service management capabilities for the "master" user based at least in part on the entered one or more credentials. In some embodiments, the "master" user enters the one or more credentials through access to a website. In some embodiments, the "master" user enters the one or more credentials through the UI 101 of a mobile wireless communication device 100. In some embodiments, the "master" user enters the one or more credentials through an application of the mobile wireless communication device 100. In some embodiments, the "master" user enters the one or more credentials and configures permission capabilities of a mobile wireless communication device 100 in advance of purchasing (or during a purchase process for) the mobile wireless communication device 100. In some embodiments, the service management system includes a service controller 122, a service processor 115, a service design center 135, or a combination thereof. In some embodiments, the service management system is maintained by a network operator, a service provider, and/or a third-party service partner.

In some embodiments, a user enters one or more credentials (e.g., device credentials, user credentials, device group credentials, user group credentials) into a mobile wireless communication device 100, e.g., using an application on and/or through the UI 101 of the mobile wireless communication device 100. In some embodiments, the mobile wireless communication device 100 communicates to a service controller 122 the one or more credentials. In some embodiments, the service controller 122 communicates with a network system that determines one or more service policies for the user of the mobile wireless communication device 100 based at least in part on the one or more credential. In some embodiments, the service controller 122 communicates with a network system that provisions one or more service policies based at least in part on the one or more credentials. In some embodiments, the service controller 122 communicates the one or more credentials to the network systems that determine and/or provision service policies for the user of the mobile wireless communication device 100. In some embodiments, provisioning service policies includes setting one or more network-based policies for network access, e.g., in a policy control and rules function (PCRF) network element and/or a policy control enforcement function (PCEF) network element. In some embodiments, provisioning service policies includes setting one or more device-based policies, e.g., policies for a service processor 115 or a PCEF function in the mobile wireless communication device 100. In some embodiments, provisioning service policies includes setting options for purchasing service plans, setting service plan offers, and/or setting permission capabilities for accessing service plans for the mobile wireless communication device 100 and/or the user thereof. In some embodiments, provisioning service policies includes setting management allowances for the mobile wireless communication device 100 and/or the user thereof.

In some embodiments, provisioning service policies includes setting notification policies for the mobile wireless communication device 100 and/or the user thereof. In some embodiments, the one or more credentials entered by the user to the mobile wireless communication device 100 determine at least in part an "out of box experience" when initializing, setting up, configuring, and/or using the mobile wireless communication device 100. In some embodiments, an "out of box experience" refers to initializing, setting up, and/or otherwise configuring a mobile wireless communication device 100, e.g., upon initial purchase or receipt by a user of the mobile wireless communication device 100. In some embodiments, the user of the mobile wireless communication device 100 is presented a set of options for selecting a service provider, establishing a service account, selecting a service plan, and/or configuring the mobile wireless communication device 100 based at least in part on the one or more credentials. In some embodiments, initial service provider, service account activation, and/or service plan selection depend on the one or more credentials. In some embodiments, information presented and/or requested through one or more screens on the UI 101 of the mobile wireless communication device 100, e.g., during a device setup or configuration process, depend at least in part on the one or more credentials. In some embodiments, notifications provided to the mobile wireless communication device 100 depend at least in part on the one or more credentials. In some embodiments, a set of service account management options presented to the user of the mobile wireless communication device 100 depends at least in part on the one or more credentials. In some embodiments, a catalog of service plans offered to the user of the mobile wireless communication device 100 depends at least in part on the one or more credentials. In some embodiments, options available within a service plan offered to the user of the mobile wireless communication device 100 depend at least in part on the one or more credentials. In some embodiments, options to customize a service plan offered to the user of the mobile wireless communication device 100 depend at least in part on the one or more credentials.

In some embodiments, the one or more credentials include a user credential, a device credential, or a combination of these. In some embodiments, the one or more credentials include a "master" credential, a "child" credential, or a combination of these. In some embodiments, the one or more credentials include a common credential, e.g., a credential common to more than one user. In some embodiments, the one or more credentials include a "child" user credential combined with an aspect of a "master" user credential, e.g., used together as a set of credentials. In some embodiments, the user enters a first credential for use during a device configuration and/or service activation process and a second credential for use after establishing the device configuration and/or activating service for the mobile wireless communication device 100. In some embodiments, the first credential is a "master" user credential and the second credential is a "child" user credential. In some embodiments, a "master" user specifies the one or more credentials. In some embodiments, a service management system provides the one or more credentials. In some embodiments, the one or more credentials include elements provided by the "master" user and other elements provided by the service management system. In some embodiments, each user of a mobile wireless communication device 100 is provided a unique credential. In some embodiments, a "master" user specifies a credential for another user of the mobile wireless communication device 100. In some embodiments, the "master" user communicates a credential for another user of the mobile wireless communication device 100 to the service management system. In some embodiments, a first user of the mobile wireless communication device 100 specifies at least a first portion of a credential for the first user, and a second user of the mobile wireless communication device 100 provides at least a second portion of a credential for the first user. In some embodiments, the first user specifies a credential for the first user, and a second user communicates the credential specified by the first user to the service management system. In some embodiments, the second user communicates the credential specified by the first user with another credential (e.g., a credential for a "master" user) to the service management system. In some embodiments, the first user is a "master" user and the second user is a "child" user.

In some embodiments, the mobile wireless communication device 100 provides one or more screens to the user of the mobile wireless communication device 100 through the UI 101, e.g., during device activation, service activation or other configuration process. In some embodiments, the mobile wireless communication device 100 provides the user an option to join the mobile wireless communication device 100 to a new service account or an existing service account as part of a service account setup process for the mobile wireless communication device 100. In some embodiments, the mobile wireless communication device 100 provides the user an option to join the mobile wireless communication device 100 with an existing service plan or set up a new service plan as part of a service account setup process. In some embodiments, upon selection by the user to join the mobile wireless communication device 100 to an existing service account or to an existing service plan, the mobile wireless communication device 100 presents a screen to determine the type of user, e.g., a "master" user, or "non-master" (child, other) user. In some embodiments, when the user indicates being a "master" user, the mobile wireless communication device 100 presents a request to enter a credential, e.g., to confirm that the user is a "master" user. In some embodiments, when the user indicates being a "non-master" user, the mobile wireless communication device 100 presents a request to enter a credential, e.g., to confirm that the user is a "non-master" user. In some embodiments, the mobile wireless communication device 100, alone or in conjunction with a service management system, uses the credential to confirm the type of user. In some embodiments, the mobile wireless communication device 100 provides a particular "out of box experience" for the user of the mobile wireless communication device 100 based at least in part on the credential. In some embodiments, the service account setup (and/or device setup) process branches to different sets of screens based on the type of user as determined at least in part based on the credential. In some embodiments, the credential entered by the user provides for identification of the user. In some embodiments, the credential entered by the user provides for identification of another user. In some embodiments, the credential entered provides for identification of a service account. In some embodiments, the credential entered provides for identification of a service account and a particular user of the service account. In some embodiments, the credential entered provides for identification of a service account, a particular user, and a set of permissions/levels for the particular user. In some embodiments, the credential entered provides for identification of a service account and a particular user, and the mobile wireless communication device 100, alone or in combination with a service management system, obtains a set of permissions/levels for the particular user. In some embodiments, the set of permissions/levels for the particular user determine at least in part aspects of service account management, device management, service control, available services, and/or service features for the particular user. In some embodiments, the set of permissions/levels provide for a specific level of service control for the user of the mobile wireless communication device 100. In some embodiments, the set of permissions/levels provides for a specific level of device and/or service management. In some embodiments, the set of permissions/levels is stored at least in part in the mobile wireless communication device 100, and/or in a service management system maintained by a network operator, service provider, and/or third party service partner. In some embodiments, a user obtains a substantially equivalent service experience on different mobile wireless communication devices 100 based on the entered credential. In some embodiments, the mobile wireless communication device 100 and/or one or more network elements are configured to provide a particular set of services to the user based at least in part on the entered credential.

In some embodiments, the mobile wireless communication device 100 provides one or more screens through the UI 101 as part of a service activation process, a device activation process, and/or a device configuration process. In some embodiments, a user of the mobile wireless communication device 100 is presented options to join an existing service account or to establish a new service account. In some embodiments, upon choosing to join the existing service account, the user enters one or more credentials. In some embodiments, based at least in part on the one or more credentials, a type of user is determined (e.g., a "master" user or a "non-master" user). In some embodiments, based at least in part on the one or more credentials, a set of permissions/levels for the user is determined. In some embodiments, a specific "out of box experience" is provided to the user based at least in part on the one or more credentials. In some embodiments, a set of service accounts to join is presented to the user of the mobile wireless communication device 100, e.g., based at least in part on the one or more credentials. In some embodiments, a set of service plans to purchase is presented to the user of the mobile wireless communication device 100, e.g., based at least in part on the one or more credentials. In some embodiments, a set of user groups to join is presented to the user of the mobile wireless communication device 100, e.g., based at least in part on the one or more credentials. In some embodiments, the user of the mobile wireless communication device 100 is automatically joined to a service account, subscribed to a service plan, joined to a device group, joined to a user group, and/or otherwise configured for service based at least in part on the one or more credentials.

In some embodiments, a default "out of box experience" for a user of a mobile wireless communication device 100 is as a "non-master" user. In some embodiments, a user of the mobile wireless communication device 100 is presented options to join an existing service account or to establish a new service account. In some embodiments, upon choosing to join an existing service account, the user enters one or more credentials, e.g., a credential associated with the existing service account. In some embodiments, the user of the mobile wireless communication device 100 is presented an option to continue the service activation process, the device activation process, and/or the device configuration process as a "master" user or as a "non-master" user. In some embodiments, upon selection of continuing as a "master" user, the user is prompted to enter a credential providing for authorization as a "master" user. In some embodiments, upon entering a "master" credential, the service activation process, the device activation process, and/or the device configuration process continues as for a "master" user rather than as a "non-master" user. In some embodiments, the mobile wireless communication device 100, alone or in combination with a service management system, verifies the credential authorizes the user as a "master" user.

In some embodiments, a default "out of box experience" for a user of a mobile wireless communication device 100 is as a "master" user. In some embodiments, a user of the mobile wireless communication device 100 is presented options to establish permissions/levels for the mobile wireless communication device 100 and/or for particular user of the mobile wireless communication device 100. In some embodiments, the user enters one or more credentials to indicate "master" user status and to specify aspects of permissions/levels of services and/or capabilities of the mobile wireless communication device 100 and/or for one or more users thereof. In some embodiments, the mobile wireless communication device 100 requires entry of one or more credentials in order to establish or modify permissions/levels of services and/or capabilities of the mobile wireless communication device 100 and/or of one or more users thereof. In some embodiments, the "master" user having supplied one or more credentials that confirm authorization to set permissions/levels, the "master" user specifies one or more of: a device configuration, a device permission/level, a user permission/level, a set of service plans available to a user of the mobile wireless communication device 100, a set of types of service plans available to a user of the mobile wireless communication device 100, a set of applications available to a user of the mobile wireless communication device 100, or a set of restrictions/permissions to apply to service usage for one or more services on the mobile wireless communication device 100. In some embodiments, the "master" user determines service plan types, application types, or aspects of permissions to use services and/or applications through the mobile wireless communication device for the mobile wireless communication device 100 and/or for a user thereof. In some embodiments, the "master" user determines restrictions on service usage of the mobile wireless communication device 100 and/or for a user thereof. In some embodiments, the "master" user configures the mobile wireless communication device 100 for use of one or more particular service plans when used by another user.

In some embodiments, a "master" user provides one or more credentials to indicate authority to configure service for a mobile wireless communication device 100, and one or more network elements assist in permitting the "master" user to configure the mobile wireless communication device 100. In some embodiments, the "master" user enters one or more credentials. In some embodiments, an activation server (e.g., as part of a service controller 122) verifies the one or more credentials and provides permission for the "master" user to configure service for the mobile wireless communication device 100. In some embodiments, the activation server denies permission for the "master" user to configure service for the mobile wireless communication device 100, when the "master" user does not provide proper credentials.

In some embodiments, a "master" user provides one or more credentials to indicate authority to configure service for a mobile wireless communication device 100, and one or more device elements assist in permitting the "master" user to configure the mobile wireless communication device 100.

In some embodiments, the "master" user enters one or more credentials. In some embodiments, a service processor 115 in the mobile wireless communication device 100 verifies the one or more credentials and provides permission for the "master" user to configure service for the mobile wireless communication device 100. In some embodiments, the service processor 115 denies permission for the "master" user to configure service for the mobile wireless communication device 100, when the "master" user does not provide proper credentials.

In some embodiments, a "master" user provides one or more credentials to indicate authority to configure service for a mobile wireless communication device 100, and a combination of one or more network elements and one or more device elements assist in permitting the "master" user to configure the mobile wireless communication device 100. In some embodiments, the "master" user enters one or more credentials. In some embodiments, a network-based service controller 122 in combination with a device-based service processor 115 verifies the one or more credentials and provides permission for the "master" user to configure service for the mobile wireless communication device 100. In some embodiments, the network-based service controller 122 in combination with the device-based service processor 115 denies permission for the "master" user to configure service for the mobile wireless communication device 100, when the "master" user does not provide proper credentials.

In some embodiments, a mobile wireless communication device 100 provides for one or more different users to "log in" to the mobile wireless communication device 100. In some embodiments, the mobile wireless communication device 100 determines service and/or device capabilities for a user of the mobile wireless communication device 100 based at least in part on an identity of the "logged in" user. In some embodiments, the mobile wireless communication device 100 determines service and/or device capabilities for the user of the mobile wireless communication device based at least in part on one or more credentials entered by the user of the mobile wireless communication device 100. In some embodiments, the mobile wireless communication device 100 determines service and/or device capabilities for the user of the mobile wireless communication device based at least in part on a combination of an identity of the "logged in" user and on one or more credentials entered by the "logged in" user of the mobile wireless communication device 100. In some embodiments, the mobile wireless communication device 100 uses an identity of the "logged in" user, one or more credentials provided by the "logged in" user, or a combination thereof to determine at least in part service and/or device management capabilities for the "logged in" user, e.g., permission to establish and/or modify services for the mobile wireless communication device or a user thereof.

In some embodiments, a "master" user can establish one or more user credentials (master or non-master type) and/or configure permission controls associated with the one or more user credentials. In some embodiments, the "master" user can establish and/or configure user credentials through a service management system. In some embodiments, the "master" user can "log in" to the service management system from a mobile wireless communication device 100. In some embodiments, the "master" user can "log in" to the service management system through a separate computing system. In some embodiments, the "master" user can "log in" to the service management system to establish or configure permission controls for a mobile wireless communication device 100 (e.g., for a device credential associated with the mobile wireless communication device 100). In some embodiments, the "master" user can modify permission controls associated with a mobile wireless communication device 100, a device credential, a user of a mobile wireless communication device 100, a user credential, a device group, a device group credential, a user group, or a user group credential. In some embodiments, the "master" user can promote or demote permission controls for a user or for a mobile wireless communication device 100. In some embodiments, the "master" user can establish, configured and/or modify permissions controls through one or more account management screens of a service management system, e.g., provided by a service design center 135. In some embodiments, the "master" user connects to the service design center 135 through a terminal or through a "sandbox" that provides access to establish and/or modify properties of particular users, user groups, devices, device groups, service plans, and/or service plan catalogs. In some embodiments, the "sandbox" provides for a limited set of capabilities to the "master" user to establish and/or modify service properties, user properties, and/or device properties.

In some embodiments, a user of a mobile wireless communication device 100 provides a credential (e.g., a user credential, a device credential, a user group credential, or a device group credential) that provides for an identification of the user, of a device, of a user group, of a device group, or of a combination thereof. In some embodiments, the credential provides for determining one or more service management capabilities for the user. In some embodiments, the credential provides for determining or more service capabilities for the mobile wireless communication device 100 or for the user thereof. In some embodiments, the credential provides for determining permissions/levels for the mobile wireless communication device 100 or for a user thereof. In some embodiments, providing a credential includes scanning a QR code or capturing an image of a credential. In some embodiments, an image is captured from a printed object (e.g., paper, card, etc.). In some embodiments, an image is captured from a display screen. In some embodiments, the credential is provided for an image capture through a website. In some embodiments, the credential is provided for an image capture by communicating a message, e.g., an email, to the user of the mobile wireless communication device 100. In some embodiments, the credential is provided for an image capture by communicating to an application on the mobile wireless communication device 100. In some embodiments, providing a credential includes transferring a credential between two different mobile wireless communication devices 100. In some embodiments, the credential is transferred using a wired, wireless (Wi-Fi or cellular), optical, infrared, or near field communication connection.

In some embodiments, a user of a mobile wireless communication device 100 can join a device or a user of a device to an existing service account or to share a service plan by scanning a QR code or capturing an image of a credential. In some embodiments, the image of the credential is captured from a printed object or from a display screen. In some embodiments, the credential is provided using a fear field communication from a card or from another device. In some embodiments, the credential is provided through a wired connection or through a wireless connection (e.g., Wi-Fi or cellular).

In some embodiments, during establishment of a new service account or when joining a device or user to an existing service account, an amount of credit is provided to the service account (e.g., for the user or for the device or both). In some embodiments, a user of a mobile wireless communication device 100 provides credit information, e.g., by entering information through one or more screens displayed through the UI 101 of the mobile wireless communication device 100. In some embodiments, a user provides credit to a service account by scanning a pre-paid card, a QR code, a bar code, or capturing an image using the mobile wireless communication device 100. In some embodiments, the user provides credit to the service account by receiving a near field communication. In some embodiments, credit information is captured by the mobile wireless communication device 100 and subsequently transferred to a service management system in the network, e.g., an accounting, billing, and/or charging system. In some embodiments, the credit information is transferred to a third-party management system (e.g., an iTunes of Application Store account). In some embodiments, a website provides a QR code to the user of the mobile wireless communication device 100 that can be scanned by the mobile wireless communication device 100. In some embodiments, a separate computing device scans the QR code that is displayed on the mobile wireless communication device 100. In some embodiments, the mobile wireless communication device 100 scans the QR code displayed on a separating computing device. In some embodiments, credit information is transferred between mobile wireless communication devices 100 using a wired or wireless connection, e.g., a Wi-Fi, Bluetooth, cellular access, USB, infrared, or near field communication connection. In some embodiments, credit information is transferred from a third-party management system to a billing system of a service provider and/or network operator.

In some embodiments, a network system, e.g., a service controller 122 or an activation server, cooperates with one or more device agents, e.g., as part of a service processor 115, in a mobile wireless communication device 100 to join the mobile wireless communication device 100 to an existing service account. In some embodiments, the network system cooperates with the one or more device agents based on a set of inputs received through the UI 101 of the mobile wireless communication device 100. In some embodiments, the mobile wireless communication device 100 is pre-configured, e.g., during manufacture, distribution or at a sales point, to include a sponsored or ambient service access to the network system, e.g., to an activation server. In some embodiments, the sponsored or ambient service access provides for a limited service usage amount in time and/or data units available for the mobile wireless communication device 100 to communicate. In some embodiments, the sponsored or ambient service access provides for communication with particular network endpoints, network addresses and/or websites. In some embodiments, the sponsored or ambient service access provides for communication through particular wireless radio access network systems of one or more network operators and/or service providers. In some embodiments, the sponsored or ambient service access provides for connection to and communication with one or more network elements for device activation, service plan selection, service plan activation, device management and/or service plan management. In some embodiments, the mobile wireless communication device 100 communicates one or more credentials, e.g., a device credential, a user credential, a device group credential, a user group credential, or a combination of these, to the one or more network elements. In some embodiments, the one or more network elements determine the mobile wireless communication device 100 has limited access permission to communicate with the one or more network elements, e.g., with an activation server, for device activation and/or service activation based on the one or more credentials. In some embodiments, the mobile wireless communication device 100 is supplied to a user pre-configured to communicate with the activation server. In some embodiments, the mobile wireless communication device 100 communicates a device credential to the activation server, which in turn recognizes the device credential is associated with limited access permissions to communicate with the activation server. In some embodiments, the activation server cooperates with one or more device agents in the mobile wireless communication device 100 to provide an offer to join the mobile wireless communication device 100 to an existing service account through the sponsored or ambient service connection. In some embodiments, the one or more device agents accept user input, e.g., through the UI 101 of the mobile wireless communication device 100, to join the mobile wireless communication device 100 to an existing service account. In some embodiments, the offer from the activation server to join an existing service account includes one or more specific service accounts to which the mobile wireless communication device 100 can join. In some embodiments, the activation server provides the one or more specific service accounts based on the device credential. In some embodiments, the one or more device agents direct the mobile wireless communication device 100 to an activation server website. In some embodiments, the activation server website accepts user input to join the mobile wireless communication device 100 to an existing service account. In some embodiments, the one or more device agents provide an application on the mobile wireless communication device 100 that interfaces to the activation server (e.g., by communicating with an application portal). In some embodiments, the one or more device agents provide a configuration natively on the UI 101 of the mobile wireless communication device 100 through which information can be displayed to the user and collected from the user to join the mobile wireless communication device 100 to the existing service account. In some embodiments, the one or more device agents collect input from the user through the UI 101 using an application and/or native UI configuration and communicate at least a portion of the collected information to a network element, e.g. the activation server. In some embodiments, the activation server accepts information input by the user using the application and/or native UI configuration from the one or more device agents of the mobile wireless communication device, e.g., for joining the mobile wireless communication device 100 to the existing service account.

In some embodiments, the one or more network elements, e.g., the activation server, obtain a first set of credentials, e.g., a device credential and/or a device group credential, from a mobile wireless communication device 100 and subsequently obtain a second set of credentials, e.g., a user credential, a user group credential, and/or a service account credential. In some embodiments, the one or more network elements use the first set of credentials to determine authorization to provide limited network access to the mobile wireless communication device 100 for device activation and/or service activation. In some embodiments, the one or more network elements use the first set of credentials to determine one or more service accounts to which to offer the mobile wireless communication device 100 to join. In some embodiments, the one or more network elements provide to the mobile wireless communication device 100 an offer to join the mobile wireless communication device 100 to an existing service account without specifying particular service accounts. In some embodiments, the one or more network elements provide to the mobile wireless communication device 100 an offer to join the mobile wireless communication device 100 to a set of one or more particular service accounts. In some embodiments, the user of the mobile wireless communication device 100 chooses to join the mobile wireless communication device 100 to an existing service account, e.g., an unspecified service account or a specific service account. In some embodiments, the one or network elements obtain a request from the mobile wireless communication device 100 to join an existing service account. In some embodiments, the one or more network elements obtain a second set of credentials, e.g., a user credential, a user group credential, and/or a service account credential from the user of the mobile wireless communication device 100. In some embodiments, the one or more network elements uses the second set of credentials to determine, at least in part, authorization of the mobile wireless communication device 100 and/or the user thereof to join the mobile wireless communication device 100 to an existing service account. In some embodiments the second set of credentials includes a user credential specific to the user of the mobile wireless communication device 100. In some embodiments, the second set of credentials includes a user credential different from the user of the mobile wireless communication device 100, e.g., the user enters a different user's credential. In some embodiments, the second set of user credentials includes a password. In some embodiments, the password corresponds to an existing service account to which the user seeks to join the mobile wireless communication device 100. In some embodiments, the second set of credentials includes a "master" user credential. In some embodiments, the one or more network elements requires that the second set of credentials includes a "master" user credential in order to join the mobile wireless communication device 100 to an existing service account. In some embodiments, the second set of credentials includes only the "master" user credential. In some embodiments, the second set of credentials includes a user credential, and permissions/levels associated with the user credential determine, at least in part, whether the user is authorized to join the mobile wireless communication device 100 to an existing service account. In some embodiments, the one or more network elements use the second set of credentials to determine a set of specific service accounts to which the mobile wireless communication device 100 can be joined. In some embodiments, the one or more network elements communicate the set of specific service accounts to the mobile wireless communication device 100. In some embodiments, the one or more network elements obtain a selection of one of service accounts in the set of specific service accounts with which the user indicates to join the mobile wireless communication device 100.

In some embodiments, one or more network elements, e.g., an activation server, uses one or more credentials to identify a mobile wireless communication device 100 and/or a user thereof and associated the device and/or user with a service account. In some embodiments, the activation server provisions network elements and/or the mobile wireless communication device 100 in order for the mobile wireless communication device 100 to use one or more services in association with the service account. In some embodiments, the activation server retrieves information about the mobile wireless communication device 100 and/or user thereof from one or more databases using the one or more credentials. In some embodiments, the one or more credentials include a device credential, a device group credential, a user credential, a user group credential, a "master" user credential, a service account credential, and/or other credentials to identify and/or authorize the mobile wireless communication device 100 and/or user thereof to join with an existing service account (and/or establish a new service account). In some embodiments, the activation server uses the retrieved information to determine provisioning for the mobile wireless communication device 100 and/or the user thereof. In some embodiments, the activation server provisions permissions in one or more network elements and/or the mobile wireless communication device 100 to control access to wireless access networks and/or services provided through wireless access networks. In some embodiments, the activation server provisions permissions into an access control apparatus, e.g., in a wireless access network or a wireless core network. In some embodiments, the activation server provisions an accounting apparatus, e.g., in the wireless network, to associate the mobile wireless communication device 100 with the existing service account. In some embodiments, the activation server provisions the accounting apparatus to include service usage for one or more services used by the mobile wireless communication device 100 with the existing service account. In some embodiments, the activation server determines whether the existing service account is configured to allow the mobile wireless communication device 100 to join the existing service account. In some embodiments, the activation server determines whether the existing service account is configured to allow additional mobile wireless communication devices 100 to join the existing service account. In some embodiments, permissions for the existing service account limit the number of mobile wireless communication devices 100 that can be joined with the existing service account. In some embodiments, permissions for the existing service account restrict joining to a particular device group, a particular type of device, and/or a particular user group (set of users). In some embodiments, the activation server provides for a notification message to be sent to a particular mobile wireless communication device 100, e.g., a "master" user's device, or to a particular user, e.g., to a "master" user of one or more devices; the notification message indicating that a request by the mobile wireless communication device 100 to join with the existing service account. In some embodiments, the activation server joins the mobile wireless communication device 100 to the existing service account only when receiving an "affirmative" response from the "master" user device and/or the "master" user. In some embodiments, the existing service account is associated with one or more "master" users and/or "master" user devices. In some embodiments, notification messages for joining an existing service account are sent to one or more of the "master" users and/or "master" user devices by the activation server when a mobile wireless communication device 100 requests to join the existing service account.

In some embodiments, one or more network elements, e.g., an activation server, provision one or more other network elements, e.g., network access control server/database, service-billing server/database, service accounting server/database, and/or service notification server/database, to join a mobile wireless communication device 100 (and/or user thereof) with an existing (or new) service account. In some embodiments, provisioning includes adding one or more credentials, e.g., a device credential, a user credential, or a combination thereof, to a permissions database, associating the mobile wireless communication device 100 (and/or user thereof) with the existing (or new) service account. In some embodiments, provisioning includes adding one or more credentials to an accounting database, associating the mobile wireless communication device 100 (and/or user thereof) with the existing (or new) service account. In some embodiments, provisioning includes adding one or more credentials to a notification database, associating the mobile wireless communication device 100 (and/or user thereof) with the existing (or new) service account. In some embodiments, provisioning includes adding one or more credentials to a billing database, associating the mobile wireless communication device 100 (and/or user thereof) with the existing (or new) service account.

FIG. 156 illustrates a display 10900 that results, in some embodiments, when the subscriber attempts to use a child device that is not yet associated with the master device, any other devices, a device group, or the master service account. In this particular example, the information presented through the child device is the same as the information presented through the master device in the example of FIG. 148. As would be appreciated by a person having ordinary skill in the art, the information presented may differ, and the child device may display more or less information than the master device. Because the subscriber has already established a master service account, as described above, the subscriber selects "Existing Account" to indicate that the subscriber wishes to add the child device to the master service account. The subscriber selects "Next" to proceed.

In accordance with some embodiments, FIG. 157 illustrates a representative display 10910 that results when the subscriber selects "Next" in FIG. 156. The child device presents information that enables the subscriber to "link" (i.e., pair, associate, etc.) the child device with the master device and to add the child device to the master service account. In some embodiments, such as the example shown in FIG. 157, the information is displayed on the child device's user interface. In some embodiments, the information is included in a text message or an e-mail message received by the child device or by the master device or by the subscriber. In some embodiments, for security purposes, the provided information expires after a particular time period, and the display provides a countdown timer to indicate how long the subscriber has to complete the linking procedure. In some embodiments, there is no countdown timer. In some embodiments, the information that allows the subscriber to link the child device to the master service account is a bar code, a quick response (QR) code, or a sequence of alphanumeric characters (e.g., a password). In some embodiments, the information is an instruction for the subscriber to perform some type of action, such as holding the child device in proximity to the master device to allow the information transfer from the child device to the master device. There are many ways the information can be transferred, including, for example, infrared beaming, Bluetooth exchange, and text message exchange. As would be appreciated by a person having ordinary skill in the art, there are many types and forms of information that can enable the linking of the child device to the master device (and to the master service account), and the examples provided herein are not intended to be limiting.

FIG. 158 illustrates a representative screen 10920 of information that is presented on the master device, in accordance with some embodiments, when a subscriber attempts to link a child device to the master device (and master service account). In the example of FIG. 158, the subscriber is instructed to enter, through the master device user interface, the information that enables the subscriber to link the child device to the master device. In some embodiments, the subscriber enters the information by using the master device to scan the information presented through the child device (e.g., by using the master device to scan a barcode, QR code, or alphanumeric string displayed on the child device). In some embodiments, the subscriber manually enters (e.g., by typing) the information into the master device. In some embodiments, the subscriber holds the master device in proximity to the child device to allow a near-field communication transfer, a beam transfer, or some other wireless information transfer to occur. As would be appreciated by a person having ordinary skill in the art, the information transfer could also be accomplished through a wired transfer, e.g., through a personal computer or another device connected by a USB connection, an Ethernet connection, or another wired connection. As would be appreciated by a person having ordinary skill in the art, there are many ways to enter the information to allow the child device to join the master account, and the examples provided herein are not intended to be limiting.

FIG. 159 illustrates a representative screen 10930 displayed by the master device after the subscriber has entered the information that allows the child device to be linked to the master device and its associated master service account. In this example, the pairing code shown in FIG. 157 has been transferred to the master device, whether by manual entry, by scanning, or by some other method. The subscriber completes the joining process by selecting "Add now."

FIG. 160 illustrates a representative screen 10940 displaying an example message presented through the master device's user interface after the subscriber has selected "Add now" in FIG. 159. The master device message indicates that the subscriber has successfully added a new device to the master service account. The message also invites the subscriber to learn how to share service plans among devices associated with the master service account.

FIG. 161 illustrates a representative screen 10950 displaying an example message presented through the child device's user interface after the subscriber has selected "Add now" from FIG. 159. The child device indicates that it has been added to the master service account.

FIG. 162 illustrates a representative screen 10960 displaying that, in accordance with some embodiments, the subscriber can view all devices associated with the master service account by selecting "Lines & Devices" from the display of FIG. 70. As illustrated by FIG. 162, there are two devices associated with the master service account: "Jeff Child" and "Jeff Master." Although FIG. 162 presents an example in which there is only one master device in the device group, there can be more than one master device in a device group, and each master device can be configured so that it can, but need not necessarily, manage child devices in the device group.

In addition to establishing multiple master devices and permissions associated with each, the subscriber can establish permission privileges for added devices. FIG. 163 illustrates a representative screen 10970 displaying an example of permission privileges the subscriber can grant to a child device in accordance with some embodiments. In some embodiments, a subscriber grants full control to an added device. In some embodiments, a device with full control can manage the master service account, add or remove devices from the master service account, and purchase service plans. In some embodiments, a device with full control has the capabilities of a master device. In some embodiments, a subscriber grants an added device the ability to purchase service plans, but not the ability to configure or manage the master service account or the devices in the device group. In some embodiments, a subscriber grants no privileges to an added device. In some embodiments, a user of a device with no privileges cannot purchase service plans or view or manage the master service account.

FIG. 164 illustrates a representative screen 10980 of information presented through the UI 101 of the mobile wireless communication device 100 that summarizes details for the subscriber "Jeff Dev." In some embodiments, the subscriber has full control of permissions and can purchase service plans, share service plans, assign service plans, manage service plans, and otherwise administrate aspects of service plans associated with the mobile wireless communication device 100. In some embodiments, the subscriber can also manage aspects of service plans for other mobile wireless communication devices 100, e.g., those associated with a device group for which the mobile wireless communication device 100 has full permissions control. In some embodiments, the permissions control for the mobile wireless communication device 100 (or for another device to which the permissions control screen can be directed) can be altered by selecting the "Change" button illustrated in FIG. 164. In some embodiments, a set of parental controls can be instituted for the mobile wireless communication device 100 and/or the subscriber and/or a particular user. In some embodiments, parental controls can be applied to wireless cellular network connections only. In some embodiments, parental control scan be applied to both wireless cellular network connections and wireless local area network (e.g., Wi-Fi) connections. In some embodiments, particular wireless networks on which to apply and enforce parental control are selected using one or more options through the UI 101 of the mobile wireless communication device 100. In some embodiments, a time period is selected that determines when to apply particular parental controls to the mobile wireless communication device 100 or to services accessible by a user of the mobile wireless communication device 100.

In some embodiments, permission controls for a mobile wireless communication device and/or a user thereof can determine a set of applications that can be used and/or configurations for the set of applications. In some embodiments, the set of applications is restricted to service usage with particular service usage buckets. In some embodiments, the set of applications is restricted to access particular network destination endpoints and/or website addresses and/or application portals. In some embodiments, the set of applications is restricted to subset of users of the mobile wireless communication device 100. In some embodiments, a "master" user of the mobile wireless communication device 100 has access to use any application on the mobile wireless communication device 100, while a "non-master" user of the mobile wireless communication device 100 has access to use only a specific "white list" of applications on the mobile wireless communication device 100, and/or the "non-master" user of the mobile wireless communication device 100 is denied access to use a specific "black list" of applications on the mobile wireless communication device 100. In some embodiments, permission controls for use of applications by a "non-master" user of the mobile wireless communication device 100 can be combined with permission controls based on other service usage criteria, e.g., based on time of day/day of week/type of day, based on network type, based on available service plans, and/or based on available service usage amounts within service plans. In some embodiments, the mobile wireless communication device 100 and/or one or more network elements maintain a "white list" and/or a "black list" of applications. In some embodiments, a device agent (e.g., of a service processor 115) in the mobile wireless communication device 100 detects an attempt to use and/or an actual use of a particular application by the mobile wireless communication device 100 and/or by a "non-master" user thereof. In some embodiments, the device agent compares the particular application to a "white list" of allowed applications for the mobile wireless communication device 100 (and/or for the particular "non-master" user thereof) and blocks use of the particular application when the particular application is not on the "white list" of allowed applications. In some embodiments, use of applications on the mobile wireless communication device 100 (and/or by a "non-master" user of the mobile wireless communication device 100) is restricted to a set of applications provided in the "white list" of applications. In some embodiments, a "master" user configures the "white list" of applications and/or the "black list" of applications through the UI 101 of a mobile wireless communication device 100, through an application on the mobile wireless communication device 100, and/or through a website accessible through the mobile wireless communication device 100. In some embodiments, the "white list" of allowed applications and/or the "black list" of disallowed applications are configured though a service management system, e.g., the service design center 135. In some embodiments, one or more network elements, e.g., the service controller 122, detects use of an application by the mobile wireless communication device 100 (and/or a "non-master" user thereof), compares the application to a "white list" of allowed applications for the mobile wireless communication device 100 (and/or a "non-master" user thereof), and blocks data traffic for the application when the application is not on the "white list" of allowed applications. In some embodiments, permission controls for access to network endpoints and/or websites can be applied to the mobile wireless communication device 100 and/or a "non-master" user thereof as described above for applications. In some embodiments, a "white list" of allowed network endpoints and/or websites can be maintained and used to apply permission controls as described herein for applications. In some embodiments, a "black list" of disallowed network endpoints and/or websites can be maintained and used to apply permission controls as described herein for applications.

In some embodiments, a device agent (e.g., of a service processor 115) of the mobile wireless communication device 100 detects an attempt to download an application by the mobile wireless communication device 100 and/or by a "non-master" user thereof. In some embodiments, the device agent compares the application to a "white list" of allowed applications and permits download of the application only if the application is on the "white list" of allowed applications. In some embodiments, device agent compares the application to a "white list" of allowed applications and blocks download of the application if the application is not on the "white list" of allowed applications. In some embodiments, the device agent compares the application to a "black list" of disallowed applications and blocks download of the application if the application is on the "black list" of disallowed applications. In some embodiments, applications can be downloaded from a specific set of servers/websites only, e.g., as specified in the "white list" of allowed applications or in a separate "white list" of allowed servers and/or websites. In some embodiments, downloading of an allowed application can be blocked when the mobile wireless communication device 100, and/or a "non-master" user thereof, attempts to download the application from a disallowed server/website. In some embodiments, the mobile wireless communication device 100 and/or one or more network elements maintain a "black list" of disallowed servers/websites.

In some embodiments, one or more device agents on a first mobile wireless communication device 100, and/or one or more network elements, alone or in combination, monitor service usage of applications for the first mobile wireless communication device 100 (and/or of a "non-master" user thereof). In some embodiments, notification of attempted or actual usage of one or more applications by the first mobile wireless communication device 100 (and/or by the "non-master" user thereof) is provided to a second mobile wireless communication device 100 and/or to a "master" user, e.g., for a device group to which the first and second mobile wireless communication devices belong. In some embodiments, the notification message to the second mobile wireless communication device 100 (and/or to the "master" user thereof) includes an option to approve or disapprove usage of the one or more applications by the first mobile wireless communication device 100 (and/or for the "non-master" user thereof). In some embodiments, the one or more device agents use a "white list" of allowed applications and/or a "black list" of disallowed applications to determine, at least in part, when to provide for a notification message be sent to the second mobile wireless communication device 100 (and/or to the "master" user thereof). In some embodiments, a "master" user configures the first mobile wireless communication device 100 to provide notification messages about service usage activities for the first mobile wireless communication device 100 and/or for particular "non-master" users thereof. In some embodiments, the "master" user is notified of an attempted use, an actual use, an attempt to download, and/or an actual download of an application. In some embodiments, notification is provided to the "master" user at least in part based on a "white list" of allowed application and/or a "black list" of disallowed applications. In some embodiments, a notification message is provided to the second mobile wireless communication device 100, and/or to a "master" user thereof, to approve or disapprove download of an application by the first mobile wireless communication device 100, and/or by a "non-master" user thereof.

In some embodiments, a "master" device obtains or can view a service usage log and/or service usage history for a "non-master" device. In some embodiments, the "master" device obtains or can view a set of service activities undertaken by a "non-master" device (and/or a "non-master" user thereof). In some embodiments, the "master" device (and/or the "master" user for a device in a device group) can receive copies of messages (e.g., SMS text messages and/or MMS multi-media messages) sent and/or received by a "non-master" device (and/or by a "non-master" user of a device in a device group). In some embodiments, the "master" device can obtain copies of voice messages, websites visited, applications used, and/or other logs of service activities for a "non-master" device (and/or for a "non-master" user thereof).

In some embodiments, a "master" mobile wireless communication device 100 (and/or a "master" user thereof) maintains a "white list" of allowed applications for a "non-master" mobile wireless communication device 100 (and/or for a "non-master" user thereof). In some embodiments, the "master" mobile wireless communication device 100 (and/or the "master" user thereof) maintains a "black list" of disallowed applications for the "non-master" mobile wireless communication device 100 (and/or for the "non-master" user thereof). In some embodiments, the "master" user is permitted to add to, modify, delete from, update, or otherwise change the "white list" and/or the "black list" for the "non-master" device (and/or for the "non-master" user thereof). In some embodiments, changes to the "white list" and/or to the "black list" are provided to the "non-master" device by provisioning a policy to the "non-master" device and/or to one or more network elements to enforce the policy. In some embodiments, the "master" device (and/or "master" user thereof) provides one or more credentials, e.g., an application credential or an application identifier, to one or more network elements, the one or more credentials providing authorization for provisioning the "non-master" device to detect and control use of the application. In some embodiments, the "master" device (and/or the "master" user thereof) selects a "white list" of allowed applications from a pre-configured "white list" of allowed applications, e.g., through a service management system, directly from a "master" device, through an application on the "master" device, or through a website. In some embodiments, the service management system is maintained by a network operator, a service provider, or a third-party service partner. In some embodiments, the service management system provides a set of pre-configured "white lists" of applications to the "master" device/user from which to select a "white list" of allowed applications for a "non-master" device/user. In some embodiments, the set of pre-configured "white lists" of allowed applications is organized based on particular criteria, e.g., for particular networks, based on particular types of usage, for particular device types, or based on age appropriateness. In some embodiments, the set of pre-configured "white lists" of allowed applications provides for a particular set of service activities according to a particular service activity category, e.g., "white lists" of allowed applications for voice, data, video, social networking, gaming, etc. In some embodiments, the "white lists" of allowed applications include a combination of applications appropriate for a particular age range and/or based on one or more application ratings. In some embodiments, the "white list" of allowed applications includes a set of applications recommended for an age range or a particular type of "non-master" user. In some embodiments, the "white list" of allowed applications provides a pre-configuration for a mobile wireless communication device 100 for a "non-master" user having a combination of applications, e.g., one or more gaming applications, educational applications, limited voice applications, limited messaging applications. In some embodiments, the "white list" of allowed applications includes permission limits that apply to the one or more applications included in the "white list" of allowed applications, e.g., pre-configured time of day/day of week restrictions. In some embodiments, the "master" device/user can customize a pre-configured "white list" of allowed applications, e.g., to select one or more subsets of applications to include in the white list of allowed applications. In some embodiments, the "master" device/user provides one or more credentials to indicate authorization to customize the pre-configured "white list" of allowed applications. In some embodiments, the "master" device/user can configure the "non-master" device to download automatically a set of applications according to a pre-configured "white list" of allowed applications for use on the "non-master" device.

In some embodiments, a network system, e.g., an application store maintained by a third-party service partner, provides for selection of application packages for mobile wireless communication devices 100. In some embodiments, the network system provides one or more pre-configured packages of applications. In some embodiments, the network system provides information for the one or more pre-configured packages of applications, e.g., an indication of application type, an indication of age appropriateness for an application, a cost for an application (or use thereof), or other criteria by which a "master" user can determine to select one of the pre-configured packages of applications to download to a "non-master" device. In some embodiments, the network system provides recommendations of pre-configured packages of applications for different categories of users and/or devices, e.g., based on an age appropriate combination of applications included in the pre-configured package of applications. In some embodiments, the "master" user can review, select, purchase, and/or download a pre-configured package of applications for a mobile wireless communication device 100, e.g., for a "non-master" device and/or for a "non-master" user of the device. In some embodiments, the network system provides one or more sponsored applications or packages of sponsored applications. In some embodiments, the "master" user can review, select, purchase and/or download one or more sponsored applications and/or application packages for the mobile wireless communication device 100, e.g., for a "non-master" device and/or for a "non-master" user of the device. In some embodiments, the service usage of sponsored applications can be accounted for separately from service usage of non-sponsored applications. In some embodiments, accounting for service usage of sponsored applications uses one or more device agents (e.g., in a service processor 115) of the mobile wireless communication device 100 on which the sponsored applications are used. In some embodiments, accounting for service usage of sponsored applications includes monitoring service usage of sponsored applications by one or more network elements. In some embodiments, accounting for service usage of sponsored applications includes determining an offset or deduction of service usage for a service account with which the mobile wireless communication device 100 is associated. In some embodiments, service usage for sponsored applications is accounted to a service account associated with a sponsor. In some embodiments, sponsored service usage for sponsored service applications provides for a reduced cost or no cost use of the application on the mobile wireless communication device 100, and/or by a user thereof.

FIG. 165 illustrates a representative notification message overlay 10990 that can be presented through the UI 101 of the mobile wireless communication device 100 in response to selecting the "Change" permissions button of FIG. 164. In some embodiments, as illustrated, full control of permissions or no control of permissions may be selectable. In some embodiments, limited control of permissions may also be selectable.

FIG. 166 illustrates a representative screen 1000 that provides for a user of the mobile wireless communication device 100 to establish parameters for a "curfew" that can affect services available to a user of the mobile wireless communication device 100. A "curfew" can represent a time period during which access to services can be restricted or altered from those services available during an unrestricted time period. Restrictions can be applied to one or more service plans subscribed to (and/or accessible by) the user of the mobile wireless communication device 100. The curfew is customizable and the user of the mobile wireless communication device 100 may provide a label for the customized curfew. The user can select particular service plans, e.g., a voice plan, a text-messaging plan, and a data access plan, to which restrictions may be applied. Particular time periods can be specified for when the restrictions apply. In some embodiments, time periods can be specified by selecting days of the week to apply the curfew restrictions as illustrated in FIG. 166.

FIG. 167 illustrates a representative screen 1010 that provides for the user of the mobile wireless communication device 100 to set times of day during which the curfew restrictions apply. In some embodiments, times of day for each day of the week may be set individually. In some embodiments, times of day for specific dates may be set individually. In some embodiments, specific times, e.g., 6:30 P.M. to 9:30 P.M., can be set. In some embodiments, specific time periods can span more than one day and/or specific dates. FIG. 167 illustrates selectable "buttons" to specify days and hours. Alternative input displays, e.g., sliders, menus, lists, arrays, or other means to display and select days, dates, hours and other time periods may also be used. In some embodiments, curfews (or other permission control constructs) use information on schedules (e.g., holidays, school years, work schedules, etc.) to present options to specify time periods to apply (or allow) restrictions. In some embodiments, white lists are provided that can supersede curfews and permissions control to allow full access to one or more services to communicate with particular users and/or numbers and/or network addresses and/or email addresses and/or messaging identifiers. In some embodiments, black lists are provided that restrict access to services irrespective of permissions control settings.

FIG. 168 illustrates a representative screen 1015 that provides for the user of the mobile wireless communication device 100 to set exceptions to curfews. In some embodiments, the representative screen 1015 can be presented in response to the user of the mobile wireless communication device 100 selecting the "Edit" button illustrated on screen 1010 shown in FIG. 167. In some embodiments, the user of the mobile wireless communication device can retrieve or add a "white list" of specific phone numbers and/or email addresses, SMS/MMS address identifiers, and/or specific applications. The "white list" can over-ride an established curfew, e.g., permitting phone calls, emails, messages to specific individuals or accounts, and/or use of specific applications.

Sharing Service Plans

Having added another device to the master service account, the subscriber can manage all devices in the device group and can share one or more service plans among devices in the device group. The subscriber can also assign a service plan from a master device to a child device. In some embodiments, service plans are designed to be shareable, assignable (see below), or not shareable. In some embodiments, service plans are designed using a service design center, e.g., the service design center 135 illustrated in FIG. 1, and the sharing properties are entered through the service design center. In some embodiments, a service plan has an attribute that determines whether it is shareable. In some embodiments, service plans that are shareable are automatically shared when devices are added to the master service account. In some embodiments, service plans that are shareable are not automatically shared when devices are added to the master service account.

FIG. 169 illustrates a representative screen 1100 presenting an example of a service plan bundle, called "Starter Plan," that has been purchased from the master device. The illustrated service plan bundle includes service plans for 100 text messages, 20 hours of application use, and 250 minutes of phone calls.

In some embodiments, the subscriber can view information about shared service plans and can share service plans by selecting "Plans & Sharing" from the screen shown in FIG. 70. FIGS. 170 and 11C illustrate that before sharing the "Starter Plan," all of the "250 Minutes of Talk" service plan is allocated to the master device ("Jeff Master"), and that none of the "250 Minutes of Talk" service plan is allocated to the child device that is now also associated with the master service account. In some embodiments, selecting the "250 Minutes of Talk" service plan in the screen 1110 shown in FIG. 170, launches the screen 1120 shown in FIG. 171. By selecting "Share this plan" from the screen 1120 illustrated in FIG. 171, the subscriber can share the "250 Minutes of Talk" service plan with another device.

FIG. 172 illustrates a representative screen 1140 presenting an example of plan sharing options available to the subscriber, in some embodiments. In the example shown in FIG. 172, the subscriber can choose "Simple" or "Advanced" sharing, and the subscriber can choose which device(s) in a device group will be able to share the selected service plan. In some embodiments, "Simple" sharing allows all selected devices to share the service plan with no limits on their individual usage. Thus, all selected devices share in the usage of an aggregate amount of a resource (e.g., a total number of bytes or a total period of time). FIG. 173 illustrates a representative screen 1150 displaying that, after a simple share of "250 Minutes of Talk," both the master device ("Jeff Master") and the child device ("Jeff Child") are authorized to use up to 250 minutes of the service plan.

Rather than simply sharing a service plan among multiple mobile wireless communication devices, which may not prevent "hogging" of the allocation provided by the service plan by individual devices, it may be desirable to allocate discrete portions of a service plan to different mobile wireless communication devices within the device group. For example, a parent who has purchased a service plan that includes 500 voice minutes and 100 text messages per month might want to allocate 100 of the voice minutes and 40 text messages to each of her two children's mobile phones. FIG. 174 illustrates a representative screen 1160 for "Advanced" service plan sharing in accordance with some embodiments. As shown in FIG. 174, the subscriber can make less than all of the shared service plan available to mobile wireless communication devices in the device group. In FIG. 174, the master device is allowed to use the entire service plan allocation, whereas the child device is not allowed to use any of the service plan allocation. In FIG. 175, however, the subscriber has enabled the child device to use up to fifty percent of the "250 Minutes of Talk" service plan allocation. The master device is still allowed to use up to all of the "250 Minutes of Talk" service plans allocation, however. Thus, the master device may still "hog" the service plan's allocation, but the subscriber has ensured that the child device cannot use more than half of the service plan's allocation.

FIG. 176 illustrates a representative screen 1180 displaying that, following the "Advanced" share illustrated in FIG. 175, the master device may use up to all of the "250 Minutes of Talk" service plan allocation, whereas the child device may only use up to 125 minutes or half of the "250 Minutes of Talk."

FIG. 177 illustrates a representative screen 1180 for a master device with a service plan called "iStoryBooks" that is available to the master device ("Jeff Master") but not to the child device ("Jeff Child"). FIG. 177 is representative of a situation in which a parent purchased the service plan using the master device.

As would be appreciated by a person having ordinary skill in the art, there are many ways a service plan could be shared among devices. For example, the subscriber could allocate a certain percentage or amount (e.g., number of minutes, number of texts, number of bytes, etc.) of a service plan to each device associated with the master service account such that the sum of all individual allocations is equal to the total allowed by the service plan.

As would also be appreciated by a person having ordinary skill in the art, the subscriber may choose to share different service plans differently among devices in the device group. Similarly, when the subscriber has purchased a service plan bundle, such as "Starter Plan," the subscriber may choose to share constituent service plans of the service plan bundle differently (e.g., a parent may choose to share 80% of the text messages but only 50% of the voice minutes with a child), or she may choose to share all service plans included in a service plan bundle in the same way (e.g., a parent may allow a child to use up to 50% of each service plan included in the service plan bundle.)

In some embodiments, the subscriber chooses to place limits on a service usage amount (e.g., impose a cap or specify an allocation) that can be consumed by a particular device in the device group, e.g., by entering a specific service usage limit using the master device or by using another device and providing a credential that indicates that the subscriber has permission to set service usage limits. By providing a limit for a service usage amount, the subscriber can prevent the particular device from "hogging" the service plan. In some embodiments, the particular device that is limited is the master device. In some embodiments, the particular device that is limited is a child device in a device group shared with the master device. In some embodiments, the particular device is another device in a device group shared with the master device. In some embodiments, the particular device is a device managed by a system administrator.

In some embodiments, the subscriber specifies a "micro-lease" allocation, wherein a device (master or child) is provided an allocation of service usage, and the device subsequently requests an additional allocation after the initial allocation is exhausted.

In some embodiments, the master device monitors usage by devices in the device group and changes one or more plan-sharing parameters based on the monitored usage. In some embodiments, the master device revokes an allocation when the master device determines that the allocation is not being used, or when the master device determines that another device has a greater need for the allocation. In some embodiments, the master device changes an allocation (i.e., increases or decreases an allocation) based on a metric. In some embodiments, the metric is an amount of usage (or a failure to use a service plan) during a time period. In some embodiments, the metric is an expected usage during a time period. In some embodiments, the metric is based on service plan usage by one or more other devices in the device group. In some embodiments, the master device reapportions a service plan or an allocation of a service plan to one or more devices based on a determination that the reapportionment will reduce waste of the service plan.

In some embodiments, the subscriber specifies one or more parameters to assist the master device in managing plan sharing. In some embodiments, the master device manages plan sharing without subscriber involvement.

In some embodiments, the subscriber allocates a maximum amount of a service plan for a period of time and establishes a "metering" of the total during a sequence of time periods (e.g., a total of 100 text messages during a month and no more than 25 text messages per week). In some embodiments, the subscriber allocates an initial allocation to a child device and then allocates an additional allocation (e.g., a smaller allocation) when the child device exhausts the initial allocation.

In the examples provided herein, none of the "Starter Plan" service plan bundle had been consumed when the subscriber shared the service plan bundle with another device. In some embodiments, had a portion of the service plan bundle been consumed prior to sharing, the subscriber would only be able to share what service usage allocation remained of the service plan bundle. In some embodiments, each service plan within a service plan bundle can be shared individually.

In some embodiments, a service activity can be associated with a specific service plan. In some embodiments, a service activity can be associated with multiple service plans. In some embodiments, service usage for a service activity can be counted against different service plans according to a hierarchy of the different service plans. In some embodiments, the user of the mobile wireless communication device can determine an order for the hierarchy in which different service plans can be allocated service usage for one or more service activities. In some embodiments, service usage for service activities can be counted against a set of service plans according to one or more properties of the service plans in the set of service plans, e.g., based on a cost incurred or an applicable time period for the service plans. In a representative embodiment, service usage for service activities can be allocated to free service plans first. In some embodiments, service usage for service activities can be allocated in a manner to minimize service cost. In some embodiments, service usage for service activities can be allocated among service plans according to when the service activity occurs. In some embodiments, service usage for service activities can be allocated to application specific service plans before generic service plans, e.g., allocate "Facebook" service usage to a "Facebook" specific service plan before allocating "Facebook" service usage to an "Internet access" data service plan.

Shared Service Plan Permissions

As described above, in some embodiments, service plans can be shared among multiple devices in a device group. In some embodiments, a "primary" device (or a user with permissions capabilities) in the device group can share a service plan with a "secondary" device in the device group and can restrict service usage of the "secondary device" that can be allocated to the shared service plan to a specific subset of service activities. In some embodiments, the "primary" device can determine a set of particular applications or a set of particular network destinations that can be used by the "secondary" device and that can be allocated to the shared service plan. In some embodiments, the user establishes sharing and permission controls through the "primary" device. In some embodiments, the user establishes sharing and permission controls through the "secondary" device. In some embodiments, the user establishes sharing and permission controls through a website or web portal or through an application interface. In some embodiments, the user establishes sharing and permission controls through a network service provider console, e.g., through an interface of a service design center.

In some embodiments, a "primary" device and a "secondary" device in a device group share a service plan, e.g., a data service plan having a fixed allocation of data service usage (an X GB shared data plan), a data service plan having "unlimited" allocation of data service usage (an "unlimited" shared data plan), or a service plan bundle, e.g., an "unlimited" talk, "unlimited" text and "unlimited" data plan, or an "unlimited" talk, "unlimited" text and a fixed allocation of data (an unlimited talk & text and X GB shared data plan). In some embodiments, a first set of permission controls can be applied to the shared service plan that applies to all devices in the device group. In some embodiments, a second set of permission controls can be applied to the shared service plan that applies only to a subset of devices in the device group. In some embodiments, a "primary" device can establish the second set of permission controls for one or more "secondary" devices in the device group. In some embodiments, a shared bucket of service usage allocation (e.g., a shared amount of data) can have different restrictions applied for different devices in a device group. In some embodiments, the shared bucket of service usage allocation can be unrestricted for a "primary" device and be restricted for a "secondary" device. In some embodiments, the shared bucket of service usage allocation can be restricted to a first set of service activities for the "primary" device and be restricted to a second set of service activities for the "secondary" device. In some embodiments, the "primary" device can share or assign the bucket of service usage allocation to the "secondary" device and establish restrictions as to how the bucket of service usage allocation can be used by the "secondary" device. In some embodiments, the "primary" device can restrict the "secondary" device to use the bucket of service usage allocation with a particular application (or set of applications). In some embodiments, the "primary" device can restrict an amount of service usage from the bucket of service usage allocation that the "secondary" device can use, and also restrict use of the service usage from the bucket of service usage by the "secondary" device to a particular set of service activities, e.g., only particular applications can be used by the "secondary" device when using the shared bucket of service usage allocation. In a representative embodiment, a parent can share a "family" data plan with other family members and restrict usage of the shared "family" data plan for one or more family members to particular applications. In a representative embodiment, the parent can restrict a child's usage of a shared bucket of service usage allocation (e.g., a portion of a shared family data plan) to use with only one or more particular applications.

In some embodiments, permission controls for restricting usage of a shared bucket of service usage allocation to a set of applications for a particular device in a device group are managed at least in part by a service processor 115 in the particular device and/or by one or more network elements, e.g., a service controller 122. In some embodiments, permission controls for a "secondary" device are communicated to the "secondary" device by the one or more network elements and implemented at least in part by the service processor 115 on the "secondary" device. In some embodiments, the service processor 115 of the "secondary" device communicates information about service usage by the "secondary" device to the one or more network elements, e.g., the service controller 122. In some embodiments, the service usage information includes information about service usage for applications used, websites accessed, network endpoints communicated with, contacts (phone numbers, messaging identifiers, email addresses, etc.) communicated with. In some embodiments, the one or more network elements determine whether permission controls have been tampered with based at least in part on the service usage information. In some embodiments, the one or more network elements compare service usage reports from the device to service usage reports generated within the network to determine whether permission controls for the "secondary" device have been defeated. In some embodiments, the service processor 115 in the “secondary” device obtains information from one or more network elements to verify integrity of the permission controls for restricting usage of the shared bucket of service usage allocation. In some embodiments, the service processor 115 monitors usage of particular applications and communicates usage of the particular applications to one or more network elements to verify permission to use the particular applications by the “secondary” device and/or by a user thereof. In some embodiments, In some embodiments, the service processor 115 obtains information of usage of the particular application from one or more network elements and uses the information to verify permission to use the particular application on the “secondary” device and/or by a user thereof. In some embodiments, the service processor 115 compares service usage reports generated in the “secondary” device with service usage reports obtained from one or more network elements in order to verify proper operation of permission controls for restricting service usage of a shared bucket of service usage allocation by the “secondary” device and/or by a user thereof. In some embodiments, the service processor 115 compares permission control settings stored in the “secondary” device to a set of permission control settings for the “secondary” device stored in one or more network elements to verify integrity of the permission control settings. In some embodiments, one or more network elements compare permission control settings stored in the “secondary” device to a set of permission control settings for the “secondary” device stored in one or more network elements to verify integrity of the permission control settings. In some embodiments, upon detection that one or more permission controls have been improperly modified, (e.g., the integrity of the permission controls is compromised), the service processor 115, alone or in combination with one or more network elements (e.g., the service controller 122), disallows service usage of one or more applications by the “secondary” device and/or a user thereof. In some embodiments, a “master” user (e.g., for a device group to which the “secondary” device belongs) reconfigures the permission controls for the “secondary” device to allow usage of one or more of the disallowed applications. In some embodiments, one or more network elements examine data traffic from the “secondary” device to verify integrity of permission controls on the “secondary” device. In some embodiments, the one or more network elements use deep packet inspection (DPI) to examine data traffic and/or to classify the data traffic. In some embodiments, the one or more network elements compare the data traffic to a “white list” of supported applications (and/or application servers, network endpoints, website names/addresses) for the “secondary” device and/or the user thereof. In some embodiments, the one or more network elements block data traffic of the “secondary” device, when the data traffic is destined for application servers and/or network endpoints that are not included in (and/or supported by) the “white list” of supported applications. In some embodiments, one or more network elements examine one or more properties of data traffic to determine whether the data traffic is allowed based on permission controls established for the “secondary” device. In some embodiments, the one or more properties of data traffic examined by the one or more network elements include one or more of: data type, application type, specific application, network endpoint, originating network address, destination endpoint address, website type, website address, network type, network state, or a time of day. In some embodiments, permission controls for the “secondary” device are specific to a user logged into the “secondary” device. In some embodiments, the one or more network elements provide for a notification message to be sent to the “secondary” device that indicates blocking of data traffic. In some embodiments, the notification message includes a reason for blocking of data traffic. In some embodiments, the notification message includes an option to request “unblocking” of the data traffic, e.g., by sending a second notification message to a “master” device (or “master” user) for the device group to which the “secondary” device belongs. In some embodiments, the one or more network elements provide for sending a notification message to a “master” device and/or “master” user of a device group to which the “secondary” device belongs indicating the blocked data traffic. In some embodiments, the notification message to the “master” device/user includes information about the blocked data traffic, e.g., a specific application used, a network endpoint, a website accessed and/or other specific information about blocked data traffic. In some embodiments, the notification message to the “master” device/user includes an option to “unblock” the data traffic, e.g., to modify the permission controls for the “secondary” device.

In some embodiments, permission controls for a “secondary” device can include restrictions that apply to any shared service plan on the “secondary” device. In some embodiments, permission controls for a “secondary” device can include restrictions that apply only to a subset of shared service plans on the “secondary” device. In some embodiments, permission controls for a “secondary” device can include restrictions that apply to a specific shared service plan on the “secondary” device. In some embodiments, restrictions that apply to one or more shared service plans for a “secondary” device include a “black list” of excluded service activities. In some embodiments, the “black list” includes a set of phone numbers, a set of messaging identifiers, a set of network addresses, a set of websites, a set of Internet links, and/or a set of applications. In some embodiments, restrictions that apply to one or more shared service plans for a “secondary” device include a “white list” of allowed service activities. In some embodiments, the “white list” includes a set of phone numbers, a set of messaging identifiers, a set of network addresses, a set of websites, a set of Internet links, and/or a set of specific applications. In some embodiments, restrictions that apply to one or more shared service plans for a “secondary” device include a set of time/day/date restrictions. In some embodiments, a particular service activity for a “secondary” device is permitted only for a specific subset of shared service plans. In some embodiments, permission restrictions apply for a “secondary” device for all service plans, for a subset of service plans, for a specific service plan, for all service activities, for a subset of service activities, for a specific service activity, and/or for a combination of these on the “secondary” device.

In some embodiments, a “secondary” device (e.g., a “non-master” device) can be configured to always have permission to perform a specific set of service activities. In some embodiments, the “secondary” device can be configured to have access to a set of emergency services through one or more of: voice connections, text (short message service) messaging connections, multi-media message service connections, or use of specific applications. In some embodiments, the “secondary” device can be configured to always have access to a set of phone numbers, e-mail addresses, SMS/MMS identifiers, and/or use of particular applications on or through the “secondary” device. In some embodiments, the “secondary” device can have access to call or text a set of emergency numbers stored in the “secondary” device and/or in a network element. In some embodiments, the “secondary” device can have permission to connect through voice, text, video, other messaging services, email, voice mail, video mail, video chat, or through use of one or more applications to a “primary” device (e.g., a “master” device). In some embodiments, the “secondary” device belongs to a device group and can have permission to connect through voice, text, video, other messaging services, email, voice mail, video mail, video chat, or through use of one or more applications to one or more other devices in the device group, e.g., all devices in the device group, “master” devices of the device group, or a specific subset of devices in the device group.

In some embodiments, a service processor 115 in the mobile wireless communication device 100, e.g., a “child/secondary/non-master user” device, alone or in combination with one or more network elements, e.g. a service controller 122, assists in verifying the integrity of permission controls for the mobile wireless communication device 100, e.g., managing “white lists” and or “black lists” as described herein. In some embodiments, the mobile wireless communication device 100 communicates information about permission controls, e.g., copies of “white lists” and/or “black lists,” to one or more network elements, e.g., a service controller 122 or a service management system. In some embodiments, information on permission controls, e.g., “master user” copies of “white lists” and/or “black lists” are maintained by a network element and information about permission controls, e.g., “child/secondary/non-master user” copies of “white lists” and/or “black lists” are compared to verify integrity of permission controls in use on the “child/secondary/non-master user” mobile wireless communication device 100. In some embodiments, information about permission controls include white lists, black lists, time based control lists, network based control lists, application lists, website lists, contact lists, and/or service usage activity lists are maintained in the mobile wireless communication device 100 and periodically or on-demand communicated, at least in part, to a network element to verify their integrity. In some embodiments, the service processor 115 verifies integrity of permission control lists using information provided from a network element, e.g., based on information for permission control lists of the mobile wireless communication device 100 stored in one or more network elements.

In some embodiments, a service processor 115 in the mobile wireless communication device 100, alone or in combination with one or more network elements, e.g., a service controller 122 communicatively coupled to a wireless access network, assists in implementing permission controls for itself or for another mobile wireless communication device 100 in a device group. In some embodiments, one or more device agents in the mobile wireless communication device 100, alone or in combination with one or more network elements assist in implementing the permission controls for service activities of shared service plans. In some embodiments, the service processor 115 and/or the one or more device agents in the mobile wireless communication device 100 assist in implementing permission controls for a service activity with shared service plans by one or more of the following: identifying traffic for the service activity, classifying traffic for the service activity, assigning traffic for the service activity to a service plan, allowing traffic for the service activity, blocking traffic for the service activity, controlling traffic for the service activity, and managing traffic for the service activity. In some embodiments, the service processor 115 and/or the one or more device agents in the mobile wireless communication device 100 associate traffic with a shared service plan and/or with a specific subset of service activities.

In some embodiments, one or more permission policies include one or more permission rules to manage service activities for shared service plans among devices in a device group. In some embodiments, a permission policy applies to all shared service plans available to a device in a device group. In some embodiments, a permission policy applies to a subset of shared service plans available to the device in the device group. In some embodiments, a permission policy apples to all devices in a device group. In some embodiments, a permission policy applies to a subset of devices in a device group. In some embodiments, a permission policy applies to any device used by a specific user (subscriber) in a device group. In some embodiments, a permission policy applies to a subset of devices used by a specific user (subscriber) in a device group. In some embodiments, a permission policy applies to all service activities for a specific user (subscriber) in a device group. In some embodiments, a permission policy applies to a subset of service activities for a specific user (subscriber) in a device group. In some embodiments, a permission policy allows one or more service activities for a particular service plan and disallows one or more service activities for a different service plan. In a representative embodiment, a permission policy allows video streaming through a “YouTube” specific application service plan and disallows video streaming through a general “Internet Access” service plan. In a representative embodiment, a permission policy allows access only to a particular subset of network destinations (e.g., a defined set of websites) through a shared general “Internet Access” service plan. In a representative embodiment, a permission policy allows voice services to a specific set of phone numbers (e.g., a “first list”) to be allocated to a shared general “Voice” service plan and disallows voice services to another specific set of phone numbers (e.g., a “second list”) to be allocated to the shared general “Voice” service plan. As would be appreciated by a person of ordinary skill in the art, a variety of permission policies can be applied to restrict service activities for one or more shared service plans.

In some embodiments, a shared service plan for a device in a device group is restricted to a subset of service activities based on a set of one or more permission policies. In some embodiments, the set of one or more permission policies includes one or more of: a service provider (carrier) level permission policy, a device group level permission policy, a device subgroup level permission policy, a device level permission policy, a user group level permission policy, a user subgroup level permission policy, a user level permission policy, an application group level permission policy, and a specific application level permission policy. In some embodiments, a device group includes multiple devices associated with a service account. In some embodiments, a device subgroup includes a subset of devices of a device group. In some embodiments, a user group includes a set of users associated with a service account. In some embodiments, a user subgroup includes a subset of users of a user group. In some embodiments, one or more permission policies are applied to a service activity by (1) applying permission policies that apply to all service plans, (2) determining one or more applicable service plans for the service activity, and (3) applying permission policies for the determined one or more applicable service plans. In some embodiments, notifications are provided to one or more users, devices, and/or administrators when a service activity is restricted by a service policy. In some embodiments, when service activity is restricted, notifications are provided to a user of the device on which the service activity is restricted. In some embodiments, when service activity is restricted, notifications are provided to another user (e.g., a user of a "master" device) or to an administrator of a device group. In some embodiments, restriction of service activity includes one or more of: allowing, blocking, rate limiting, limiting to a pre-determined service usage amount, and restricting service usage to a pre-determined time period.

In some embodiments, operating system software in a mobile wireless communication device assists in implementing restrictions on service activities for shared service plans. In some embodiments, an application associated with service activity management on the mobile wireless communication device assists in implementing restrictions on service activities for shared service plans. In some embodiments, a particular application on the mobile wireless communication device assists in implementing restrictions on service activities associated with the particular application for shared service plans. In some embodiments, the application assists in identifying traffic associated with a shared service plan. In some embodiments, the application assists in providing permission for a service activity to occur. In some embodiments, the application assists in permitting access to one or more service activities. In some embodiments, one or more device agents communicate with the application to implement a permission policy. In some embodiments the one or more device agents communicate with the application through an application programming interface (API). In some embodiments, the application applies a permission policy to control traffic associated with a service activity. In some embodiments, an application level permission policy includes a set of rules that apply to a specific application on the mobile wireless communication device. In some embodiments, an application is aware of the application level permission policy and assists in implementing the application level permission policy. In some embodiments, an application is not aware of the application level permission policy and does not directly assist in implementing the application level permission policy. In some embodiments, the application determines permissions that apply to service activities associated with the application when the application is started. In some embodiments, the application determines permissions that apply to service activities associated with the application when a service activity is attempted. In some embodiments, the application determines permissions that apply to service activities associated with the application during a service activity. In some embodiments, the application allows service activities to use information stored locally in the mobile wireless device (e.g., stored in a local cache) and restricts service activities from using remote information (e.g., through a wireless connection to a remote location).

In some embodiments, one or more network elements communicatively coupled through a wireless access network to a mobile wireless communication device 100 assist in implementing restrictions on service activities for shared service plans. In some embodiments, the one or more network elements identify one or more traffic flows associated with a particular service activity. In some embodiments, the particular service activity is associated with a particular application. In some embodiments, the one or more network elements identify a traffic flow using one or more of the following: an application identifier in a packet in the traffic flow, "side information" associated with the traffic flow, patterns of access for the traffic flow, packet headers in the traffic flow, virtual or literal flow tags in the traffic flow, network destination endpoints for the traffic flow, logical traffic channels associated with the traffic flow, and an application portal, gateway, or website associated with the traffic flow. In some embodiments, the one or more network elements provide "HTTP" return codes to the mobile wireless communication device. In some embodiments, the return codes provide additional information about reasons for denial of a service activity. In some embodiments, the one or more network elements provide notifications associated with permissions of service activity through an in-band messaging capability. In some embodiments, the one or more network elements provide notifications through an out-of-band messaging capability, e.g., through a text messaging system. In some embodiments, the one or more network elements maintain data packets associated with a restricted service activity awaiting a response from the user of the mobile wireless communication device, e.g., in response to a notification message. In some embodiments, the one or more network elements discard data packets associated with a restricted service activity.

In some embodiments, the one or more network elements assisting in implementing restrictions on service activities for shared service plans include a proxy server and/or an application portal. In some embodiments, the network elements include mechanisms to account for traffic associated with restricted service activities for one or more mobile wireless communication devices. In some embodiments, the one or more network elements classify traffic for service activities. In some embodiments, the one or more network elements define a shared service usage "bucket" that is shared by one or more devices in a device group. In some embodiments, the one or more network elements limit service activities to allocate to the shared service usage "bucket." In some embodiments, the one or more network elements limit service activities to a subset of all service activities available to the mobile wireless communication device. In some embodiments, the one or more network elements implement service activity restrictions for shared service plans using one or more functions including: a deep packet inspection (DPI) function, a traffic detection function (TDF), a policy control rules function (PCRF), a policy control enforcement function (PCEF). In some embodiments, the one or more functions are implemented in one or more of: a gateway, a router, a server, and a proxy server.

In some embodiments, the one or more network elements communicatively assist in implementing restrictions on service activities for shared service plans by classifying traffic using a PCEF function in a gateway GPRS service node (GGSN) or equivalent network level service node. In some embodiments, a network element implementing the PCRF function provides a set of rules bases to one or more network elements to assist in implementing restrictions on service activities for shared service plans. In some embodiments, the set of rules bases includes a set of rating groups. In some embodiments, the rating groups are organized into an ordered hierarchy that determines in what order different rating groups apply to identifying, classifying and restricting traffic for a service activity. In some embodiments, traffic is classified to a specific rating group, and each rating group in the set of rules bases includes a set of rules that determine permissions for service activities. In some embodiments, the set of rules determines actions that occur when a service activity is detected and classified to the rating group. In some embodiments, service plans are associated with one or more specific rating groups. In some embodiments, when a service activity is classified to a particular rating group, one or more rules in the set of rules for the particular rating group are applied to the service activity. In some embodiments, when a service activity does not match a rating group, one or more of the following actions occurs: (1) search for a match of the service activity to additional rating groups, (2) restrict the service activity, e.g., disallow the service activity, and (3) provide notification messages to the user of the mobile wireless communication device when service activity is restricted.

In some embodiments a first network element, e.g., a PCRF, provides a rules base including a set of rules for one or more rating groups to a second network element, e.g., a gateway such as the GGSN, that tracks service usage of mobile device users (subscribers) according to the rating groups. In some embodiments, the gateway requests an allocation quota of service usage from a third network element, e.g., an online charging system (OCS), that maintains information about users (subscribers), service accounts, service usage allowances, subscriber groups, accounting rules, and/or charging rules. In some embodiments, the third network element provides an allocation quota of service usage to the gateway in response to the request for the allocation quota. In some embodiments, the allocation quota is associated with a specific user (subscriber). In some embodiments, the allocation quota is associated with a specific user (subscriber) that belongs to a specific device group (user group, subscriber group). In some embodiments, the allocation quota response from the third network element provides information that maps subscribers to a subscriber group (or equivalently, a device to a device group). In some embodiments, the gateway tracks service usage based on the supplied subscriber group information. In some embodiments, the gateway manages service usage tracking based on both an identification of an individual subscriber (user, device) and an identification of a subscriber group (user group, device group) to which the individual subscriber belongs. In some embodiments, the gateway uses two rules bases, one for a subscriber group and another rules base for an individual subscriber. In some embodiments, a service provider maintains the rules bases. In some embodiments, an administrator having service provisioning privileges maintains the rules bases. In some embodiments, the gateway restricts service activities for shared service plans by applying a rules base for a subscriber group followed by applying a rules base for an individual subscriber. In some embodiments, the gateway applies permissions rules to a service activity by applying a carrier level permissions policy, a subscriber group level permissions policy, and a subscriber level permissions policy. In some embodiments, the gateway performs one or more of the following actions: identify traffic associated with an individual subscriber, determine a subscriber group to which the individual subscriber belongs, obtain a subscriber group permission policy, apply the subscriber group permission policy to the traffic, obtain a subscriber permission policy, and apply the subscriber permission policy to the traffic.

In some embodiments, subscriber group permission policies and/or subscriber permission policies that apply to service activities for shared service plans are established and/or modified through a user interface. In some embodiments, the user interface is provided through a device associated with a device group. In some embodiments, the user interface is provided through a "primary device" in the device group. In some embodiments, the user interface is provided through a "secondary device" in the device group. In some embodiments, the user interface is provided through a website. In some embodiments, the user interface is provided through a network operator console, e.g., a service design center interface. In some embodiments, through the user interface, a set of one or more applications is associated with a shared service plan. In some embodiments, the set of one or more application is associated with a service usage allocation of the shared service plan. In some embodiments, the set of one or more applications associated with the service usage allocation of the shared service plan can consume a portion of the service usage allocation of the shared service plan. In some embodiments, one or more properties of service usage sharing for the shared service plan are defined through the user interface. In some embodiments, limitations on service usage for a device in a device group are defined through the user interface. In some embodiments, limitations for a particular device in the device group for a particular shared service plan are defined through the user interface. In some embodiments, a service usage classification that can access a shared service usage "bucket" is defined through the user interface. In some embodiments, restrictions on particular actions permitted for an application that shares service usage of a shared service usage "bucket" are defined through the user interface. In some embodiments, the shared service usage "bucket" is defined through the user interface. In some embodiments, aspects of a permission policy for a particular user (subscriber) and/or particular device in a device group are defined through the user interface. In some embodiments, aspects of a permission policy for a user group (subscriber group) and/or a device group are defined through the user interface.

In some embodiments, one or more devices in a device group include a service processor, e.g., including one or more device agents as described herein, that provides for assisting with communication service control and management, e.g., assisting to implement service plan sharing, assignment and/or permission controls as described herein. In some embodiments, one or more devices in a device group do not include a service processor, or includes only a "basic" version of a service processor, and the one or more devices use one or more applications in the device for one or more aspects of communication service control and management, e.g., including assisting to implement service plan sharing, assignment and/or permission controls as described herein. In some embodiments, a "primary device" of a device group shares, assigns and/or configures permission controls for one or more service plans to a "secondary device" of the device group. In some embodiments, service plan sharing, assignment, and/or permission controls for shared/assigned service plans use at least in part a service processor in the "primary device" and/or the "secondary device." In some embodiments, service plan sharing, assignment and/or permission controls for shared/assigned service plans use at least in part an application on the "primary device" and/or on the "secondary device."

In some embodiments, a "primary device" and a "secondary device" of a device group each include a service processor. In some embodiments, the service processors in the "primary device" and the "secondary device" assist in implementing service plan sharing, service plan assigning and/or permission controls for shared/assigned service plans. In some embodiments, service plan sharing, assignment and/or permission controls (restrictions) for shared/assigned service plans are communicated by the service processor of the "primary device" to a network service controller (or other applicable network element), which in turn communicates directly or indirectly with the service processor of the "secondary device" to implement the shared, assigned, and/or restricted service plans.

In some embodiments, the "primary device" includes a service processor, and the "secondary device" does not include a service processor (or only a "basic" service processor) and instead includes an application for communication service management. In some embodiments, the service processor in the "primary device" assigns service plans, shares service plans, and/or manages permission controls for assigned and/or shared service plans using its service processor to communicate with a network element (e.g., a service controller). In some embodiments, one or more network elements (e.g., server and/or application portal and/or service management system) configure an application on the "secondary device" (or an associated application resource, file or setting) to implement service plan sharing, assignment and/or permission controls for shared/assigned service plans on the "secondary device" as specified by the "primary device" to the network element (e.g., the service controller).

In some embodiments, the "primary device" does not include a service processor (or only a "basic" service processor) and instead includes an application for communication service management. In some embodiments, the "secondary device" includes a service processor. In some embodiments, the "primary device" assigns service plans, shares service plans, and/or manages permission controls for assigned and/or shared service plans using the application to communicate with an application portal, website, or a network element (e.g., a server or a service management system) that communicates directly or indirectly (e.g., through a service controller) with the service processor of the "secondary device." In some embodiments, the service processor of the "secondary device" assists in implementing service plan sharing, assignment and/or permission controls for shared/assigned service plans on the "secondary device" as specified by the "primary device."

In some embodiments, the "primary device" and the "secondary device" each do not include a service processor (or only a "basic" service processor) and instead each include an application for communication service management. In some embodiments, the "primary device" assigns service plans, shares service plans, and/or manages permission controls for assigned and/or shared service plans using the application to communicate with an application portal, website, or a network element (e.g., a server or a service management system). In some embodiments, one or more network elements (e.g., server and/or application portal and/or service management system) configure an application on the "secondary device" (or an associated application resource, file or setting) to implement service plan sharing, assignment and/or permission controls for shared/assigned service plans on the "secondary device" as specified by the "primary device."

In some embodiments, the "primary device" and/or the "secondary device" include both a service processor and one or more applications for communication service management. In some embodiments, the "primary device" uses the service processor, an application, or an application in conjunction with the service processor to share service plans, assign service plans, and/or set permission controls of shared/assigned service plans for the "secondary device." In some embodiments, the "primary device" communicates information for service plan sharing, assignment and/or permission controls for shared/assigned service plans with a network element, a service controller, an application portal, or a website using the application, the service processor or a combination of both. In some embodiments, the "secondary device" receives service plan sharing, assignment and/or permission controls for shared/assigned service plans specified by the "primary device" from a network element, a service controller, an application portal, and/or a website. In some embodiments, the service processor in the "secondary device," an application in the "secondary device" or a combination of both assist in implementing the service plan sharing, assignment, and/or permission controls for the shared/assigned service plans as specified by the "primary device."

In some embodiments, the "primary device" communicates service plan sharing, assignment and/or permission controls for shared/assigned service plans to a website that causes a service processor in the "secondary device" to implement the sharing, assignment and/or permission controls for the shared/assigned service plans. In some embodiments, the "primary device" communicates service plan sharing, assignment and/or permission controls for shared/assigned service plans to a website that causes one or more network elements to configure an application (or an associated application resource, file or setting) in the "secondary device" to implement the sharing, assignment and/or permission controls for the shared/assigned service plans.

Assigning Service Plans

In some embodiments, a subscriber may want to allocate the entirety of a service plan to a child device, leaving none of the service plan available to the master device. For example, a parent might purchase a service plan that is of great interest to her child but of no interest to the parent. In some embodiments, therefore, a subscriber may assign a service plan from one device in the device group to another device in the device group. In some embodiments, a service plan must be assignable to be assigned. In some embodiments, whether a service plan is assignable is configured using a service design center. In some embodiments, a service plan has an attribute that determines whether it is assignable. In some embodiments, a service plan is assignable but not shareable. In some embodiments, a service plan is shareable but not assignable. In some embodiments, a service plan is both shareable and assignable. In some embodiments, a service plan is neither shareable nor assignable. In some embodiments, one or more permission policies that can apply to a shared service plan can also apply to an assigned service plan.

FIG. 178 illustrates a representative screen 1200 for a master device that has a service plan ("iStoryBooks") that is available to both the master device and the child device. FIG. 178 is representative of a situation where the service usages of the shared service plan by the master device and the child device are presented on the master device (e.g., through user interface 101). In the embodiment shown in FIG. 178, the service usage of the master device is separated from the service usage of the child device. In some embodiments, the service usage can be consolidated into a single progress bar. In some embodiments, where the service usage is consolidated into a single progress bar, the service usage amounts from the master and the child device are represented with different colors, dividers, labels, or some other visual cue to delineate the service usage associated with the different devices.

FIG. 179 illustrates a representative screen 1210 for a master device that has a service plan ("iStoryBooks") that is available to both the master device and the child device. FIG. 179 is representative of a situation where the service usages of the shared service plan by the master device and the child device are displayed on the master device and the service usage is displayed as a percentage of a service usage allocation relative to a service plan allocation limit. In the embodiment illustrated in FIG. 179, the service usage of the master device is separated from the service usage of the child device. In some embodiments, the service usage can be consolidated to display on a single progress bar. In some embodiments, where the service usage is consolidated on a single progress bar, the service usage amounts from the master device and the child device are represented with different colors, dividers, labels, or some other visual cue to delineate the service usage of the different devices.

FIG. 180 illustrates a representative screen 1220 for a master device with a service plan that is available to both the master device and the child device. FIG. 180 is representative of a situation where the service usage is displayed by application and application service usage is shown for each device that is associated with the shared service plan. In some embodiments, the service usage can be consolidated on a progress single bar. In some embodiments, where the usage is consolidated on a single progress bar, the service usage amounts from the master device and the child device are represented with different colors, dividers, labels, or some other visual cue to delineate the service usage of the different devices.

FIG. 181 illustrates a representative screen 1230 for a master device with a service plan that is available to both the master device and the child device. FIG. 181 is representative of a situation where the service usages of the shared service plan per network end-point (e.g., domain, IP address, URL, etc.) by the master and the child devices are presented on the master device, and the service usage display is displayed as service usage per network end-point. In the embodiment of FIG. 181, the service usage of the master device is separated from the service usage of the child device. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

FIG. 182 illustrates a representative screen 1240 for a master device with a service plan that is available to both the master device and the child device. FIG. 182 is representative of a situation where the service plan has time of day usage measurements and the usage is displayed by time-of-day categories (e.g., peak and off-peak), and usage by time-of-day category is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

FIG. 183 illustrates a representative screen 1250 for a master device with a service plan that is available to both the master device and the child device. FIG. 183 is representative of a situation where the service usage is displayed by network type and service usage by network type is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

FIG. 184 illustrates a representative screen 1260 for a master device with a service plan that is available to both the master device and the child device. FIG. 184 is representative of a situation where the service plan includes QoS Level service usage measurements, the service usage is displayed by QoS Level (e.g., streaming and interactive), and service usage by QoS Level is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

As would be appreciated by a person having ordinary skill in the art, there are many different examples, combinations, and permutations of shared service usage displays and the examples presented herein are meant to be illustrative and not intended to be limiting.

FIG. 185 illustrates a representative screen 1270 displaying that the "iStoryBooks" service plan is currently available only to the master device ("Jeff Master"). By selecting "Assign this plan," the subscriber can assign the "iStoryBooks" service plan to another device in the device group.

FIG. 186 illustrates a representative screen 1280 that results from selecting "Assign this plan" in accordance with some embodiments. By selecting "Jeff Child" and selecting "Apply," the subscriber assigns the "iStoryBooks" service plan to the child device.

FIG. 187 illustrates a representative screen 1290 displaying that after the subscriber selects "Apply" from the display shown in FIG. 186, the "iStoryBooks" service plan has been assigned to the child device and is no longer available to the master device.

FIG. 188 illustrates a representative screen 1300 displaying that although the "iStoryBooks" service plan has been assigned to the child device, the subscriber can reassign the service plan by selecting "Assign this plan." For example, a parent could temporarily remove the "iStoryBooks" service plan from her child's device if she needed to.

Although FIG. 186 indicates that in some embodiments, the entirety of a service plan is assigned to a single device (i.e., either "Jeff Master" or "Jeff Child"), in some embodiments, a subscriber assigns a single service plan to more than one device. For example, a subscriber who has two children, each of whom has a mobile wireless communication device 100, can assign "iStoryBooks" to both children's mobile wireless communication devices 100. The children would then share the service plan. In some embodiments, when a subscriber assigns a service plan to multiple devices, the subscriber specifies how the service plan will be shared by the multiple devices (e.g., using the terminology of FIG. 172, in a "Simple" or "Advanced" manner).

As will be appreciated by a person having ordinary skill in the art in light of the disclosures herein, a difference between a subscriber assigning a service plan to one or more devices and the subscriber sharing the service plan is that, in some embodiments, a shared service plan remains visible on the master device as a service plan that is available to the master device, whereas an assigned service plan does not remain visible on the master device as a service plan that is available to the master device.

It should now be apparent to a person having ordinary skill in the art that there are many unique and interesting ways a subscriber can share and assign service plans, and the examples herein are not intended to be limiting.

Monitoring Usage and Transactions

In addition to adding devices to the master service account, sharing service plans, and assigning service plans, subscribers may track usage and access usage history by selecting "Usage" from the display 850 shown in FIG. 151. For example, FIG. 189 illustrates a representative screen 1310 showing that a subscriber may access child device usage (in this case, usage by "Jeff Child") through the child device. FIG. 189 shows that the child device has used only one minute of the 20 hours of application use, and none of the "iStoryBooks" service plan.

The subscriber may track usage for all devices or for just the master device from the master device by selecting "Usage" from the screen 850 illustrated in FIG. 151. For example, FIGS. 190 and 191 illustrate representative screens 1320 and 1330 showing usage for the categories of voice and data, respectively. According to FIG. 190, all "250 Minutes of Talk" remain available.

FIG. 192 illustrates a representative screen 1340 showing the master device's presentation of usage of the "20 Hours of Applications" plan by each device in the device group during a particular time period (in this example, the month of June 2012).

In addition to viewing information about service usage, in some embodiments, the subscriber can access information about transactions. FIG. 193 illustrates a representative screen 1350 of information available to a subscriber who selects "Transactions and Balance" from the screen 850 illustrated in FIG. 151. In FIG. 193, the transactions from the month of June 2012 are presented. They included a user initiated top-up and two service plan purchases ("Starter Plan" and "iStoryBooks"). As shown in FIG. 193, following these transactions, the subscriber's master account has a balance of $93.56.

In some embodiments, a child device sends a message to a master device when a usage allocation is exhausted (e.g., when the child device has exhausted its share of a service plan) or when a particular milestone is met (e.g., when the child device has only two minutes of talk time left). In some embodiments, the child device sends a message to a master device, and the master device presents a notification to the subscriber to provide information about the service usage event on the child device. In some embodiments, the master device suggests a solution to the service usage event, such as by presenting an offer to the subscriber, such as an offer to purchase an additional service plan or an offer to assist the subscriber in modifying the parameters of a shared service plan.

In some embodiments, a child device sends a message to a master device when a user of the child device has attempted an unauthorized service usage. For example, in some embodiments, if a user of a child device attempts to send a text message, but the child device does not have an allocation of text messages, the child device sends a message to the master device to report that the child device attempted to send a text message. In some embodiments, the child device sends a message about an attempted unauthorized service usage to the master device without interaction with or input from a user of the child device. In some embodiments, the master device presents an offer to the subscriber, such as an offer to purchase an additional service plan or an offer to assist the subscriber in modifying the parameters of a shared service plan.

In some embodiments, the child device presents a notification through its user interface when a user of the child device attempts an unauthorized service usage. In some embodiments, a user of a child device subject to an allocation (e.g., a maximum number of text messages) who exhausts the allocation can send a message to one or more master devices to request an additional allocation. In some embodiments, the child device assists a user of the child device in requesting a service plan or additional resources from the subscriber.

In some embodiments, a subscriber can access the master service account from a device that is not a master device, but is associated with the master service account, by logging into the master service account (e.g., through screens such as those shown in FIGS. 70 and 71). This functionality may be useful for when a master device is not immediately accessible, but the subscriber wishes to share a service plan, modify service plan sharing for one or more service plans, or assign a service plan.

In some embodiments, a subscriber can gift a service plan or a portion of a service plan to a mobile wireless communication device 100 that is not within the device group but that is capable of receiving the gift. For example, in some embodiments, a subscriber can gift a service plan or a portion of a service plan to a device outside a first device group but within a second device group.

In some embodiments, a user of child device with no purchase capability can, from the child device, request that the master device grant the child device access to a service. For example, in some embodiments, when a user of a child device attempts to use or access a service that is not authorized, the child device will present a notification that indicates the child device is not authorized for the service. In some embodiments, the notification facilitates the child device requesting access from the master device (e.g., the notification includes a button called "Request Access From Master." In some embodiments, the master device receives the request and presents a notification through the master device's user interface, thus allowing the subscriber to grant or deny access to the requested service. In some embodiments, the master device sends a message to the child device indicating whether the request was granted or denied. In some embodiments, after receiving the message from the master device, the child device presents a notification through a user interface to indicate whether the request was granted or denied.

FIG. 194 illustrates a representative screen 1400 that presents information through the UI 101 of the mobile wireless communication device 100 that summarizes account usage details for a particular service plan ("Talk 150" as shown). An amount of total service usage for all mobile wireless communication devices 100 that share the "Talk 150" service plan is provided. The user of the mobile wireless communication device 100 can share the available service usage allocation of the service plan with other mobile wireless communication devices 100 (and/or users thereof) by selecting the "Change" button or by selecting the "Share this plan" button. As illustrated, the entirety (100%) of the service plan is allocated to "Jeff Dev," the account owner of the mobile wireless communication device 100.

FIG. 195 illustrates a representative screen 1410 that provides the user of the mobile wireless communication device 100 with options to share all or a portion of the service usage associated with the service plan (e.g., "Talk 150" illustrated in FIG. 194.) The user of the mobile wireless communication device 100 can select a percentage of service usage allocation for the service plan, ranging from 10% to 100%, to share with another mobile wireless communication device 100. In some embodiments, service usage allocations of service plans may be apportioned in discrete percentage increments. In some embodiments, service usage allocations of service plans may be specified by a number of distinct units (e.g., minutes, seconds, hours, message units, Megabytes, Gigabytes, Kilobytes, etc.) In some embodiments sharing of one or more service plans can be restricted by permissions controls.

Multi-Device Enrollment

The following section presents several embodiments that provide for adding one or more devices to a master service account, device group, or multi-device service plan.

In some embodiments, two or more mobile devices are associated with a master account with the service provider (e.g., a single party is responsible for all network-access service usage charges incurred by a group of mobile devices, such as in a family service plan, an enterprise service plan, any type of multi-device service plan, etc.). For ease of explanation, it is assumed that the party responsible for the master account has access to or uses a "master device," and the other devices that are associated with the master account (or with the master device) are "secondary devices." In some embodiments, the master device is a mobile device, such as a smart phone, a tablet, a laptop, an ultrabook, etc. In some embodiments, each secondary device is a mobile device, e.g., a smart phone, a tablet, a laptop, an ultrabook, etc.

In some embodiments, there are multiple master devices. In some embodiments, a user enrolls a mobile device as a master device by entering credentials on the master device. In some embodiments, the user enrolls an additional master device by entering one or more settings on an existing master device. In some embodiments, the designation of an additional mobile device as a master device is verified with a secondary confirmation (e.g., an e-mail message with a link that the user must click to complete the enrollment of the master device, a text link, etc.).

In some embodiments, the party responsible for the master account manages the master account, and adds or deletes secondary devices, through the master device. In some embodiments, the master device is configured to assist in enrolling new devices by displaying an "add a device" screen or page, and the master user may interact with that screen or page to add a device to a device group managed by or associated with the master user. In some embodiments, the look and feel of the enrollment screen or page, and the configurations of the information fields, is configured by a service provider through the SDC 135 or device management system 170-1. In some embodiments, the page or screen is pushed to a master device. In some embodiments, when the master user attempts to initiate adding a device through the master device, the master device pulls some or all of the content of the screen or page from a network element (e.g., a service controller 122, a server, a website, etc.).

FIG. 196 shows an example of a user interface screen 1420 that the user of a master device may use to enroll additional devices in the master account in accordance with some embodiments. Using a keypad, keyboard, voice recognition, or any other means that allow the user to enter information into an information field, the user enters his or her name in one field of a screen on the user interface of the master device, a device identifier in a second field, a device group identifier in a third field, and a device group password in a fourth field. The master user then completes enrollment by selecting the "Enroll" button or field. As would be appreciated by a person having ordinary skill in the art, the fields shown in FIG. 196 are simply examples; more or fewer fields may be provided, and the enrollment page or screen may contain different or other information that assists in enrolling mobile devices in a master account. As would also be appreciated by a person having ordinary skill in the art, the device identifier can be any identifier that uniquely identifies a mobile device, such as, for example, a phone number, device identification number, device security signature or other security credentials, device identification and/or security hardware such as a SIM, device type identifier, one or more IP addresses, one or more connection MAC addresses, any other address identifier, device service owner or VSP identifier, device OEM, device distributor or master agent, and/or any other information the network can use for admission control, authorization control, identifying the device with a service profile, identifying the device with an initial activation, identifying the device with a service plan or authorized set of service activity capabilities, identifying the device with a service provider or service owner, identifying the device with an OEM or master agent, identifying the device with a distributor or master agent, or identifying the device with a user group or user.

As would be appreciated by a person having ordinary skill in the art, the master device can also be configured to assist in removing secondary devices from the master account by displaying a "delete a device" screen or page, and the master user may interact with that screen or page to delete a device from a group managed by or associated with the master user. The "delete a device" screen or page can be configured using the SDC 135 or device management system 170-1, and the fields it contains may be similar to those presented on the "add a device" page, such as the example fields shown in FIG. 196.

In some embodiments, users of would-be secondary devices can initiate enrollment of their mobile devices, and the user of the applicable master device receives a notification that a request has been made to add a secondary device to a device group associated with the master account. In some embodiments, a user of a would-be secondary device initiates the addition of the would-be secondary device through a user interface of the device (e.g., by launching an application or configuring a setting). In some such embodiments, the would-be secondary device sends a message to a network element (e.g., a service controller) indicating that the would-be secondary device has requested to be added to a device group. In some embodiments, after receiving the message from the would-be secondary device, the network element configures a notification message containing information about the would-be secondary device. The network element then assists in sending the notification message to the appropriate master device. In some embodiments, the notification message provides information about the would-be secondary device so that a user of the master device can determine whether to allow the would-be secondary device to be added to the master account or otherwise associated with the master device.

In some embodiments, the master device can receive a request to be added to a device group or to the master account directly from the would-be secondary device. In some embodiments, the master device operates as an intermediate networking device (e.g., a Wi-Fi hotspot), and the would-be secondary device is an end-point device that has established a connection to the master device.

FIG. 197 illustrates an example of a user interface screen 1430 presented to a user of the master device after a user of a would-be secondary device initiates enrollment of that device. Information about the would-be secondary device is provided in a first field of the screen. This information can include one or more of a device type, device identifier, etc. Information about the user of the would-be secondary device is provided in a second field. This information may include the user's name (as shown in FIG. 197) or other information to identify the person or entity requesting that the device be added to the master account. An optional third field provides information about the device group to which the would-be secondary device is asking to be added, in case the master user manages more than one device group. The master user is also presented with buttons or fields that allow him or her to approve the addition of the secondary device or to decline to add the secondary device. In some embodiments, if the master user indicates that he or she would like to approve adding the would-be secondary device, the master user is prompted for a password or some other information to verify the master user's identity. In some embodiments, the password prompt is presented when the master user selects the "Yes" button of FIG. 197. In some embodiments, the password prompt is included in the same page/screen as shown in FIG. 197.

In some embodiments, the master device receives information from a network element (e.g., a service controller, server, etc.) about one or more secondary devices associated with the master account. In some embodiments, the information received from the network element includes one or more of: usage of bulk (e.g., unclassified) data, usage of voice services, usage of text services, usage against a service plan bundle, usage for an app plan, usage for a classification of service (e.g., by application program (app), network destination, user or device, etc.), etc.

In some embodiments, a master device user can access usage summary information, representing the aggregate use by all devices associated with the master account (e.g., including all master devices and all secondary devices). The usage may be per service plan (e.g., all use of a shared Facebook service plan by all devices, all use of a VOIP service plan by all devices, etc.), or the usage may be a bulk measure (e.g., all data usage by all devices, or all voice usage by all devices). In some embodiments, a master device user can access usage information for a particular device or user. This usage information may be per service plan or bulk or per app/network destination.

In some embodiments, the master device can set usage notification limits or triggers for other devices. In some embodiments, the master device sends the limits or triggers to a network element (e.g., service controller, server, etc.), and the network element then sends the limits or triggers to the secondary users or devices. In some embodiments, the network element sends the limits or triggers to other master devices. In some embodiments, a master device receives from a network element (e.g., a service controller, server, etc.) notifications when secondary devices reach the limits or when the triggers are satisfied.

In some embodiments, a master device can select the service plans or set service permissions, limits, or restrictions on usage by secondary devices. In some embodiments, the master device can set roaming permissions or limits one secondary device usage of one or more classifications of services (e.g., no YouTube while roaming, but Facebook is allowed, etc.), service plans (e.g., use of Google Maps is allowed, but text messages are not, etc.), or service plan bundles.

In some embodiments, the master device can choose to allocate a particular service plan or service allocation (e.g., a particular amount of bulk data usage) to one or more secondary devices associated with the master account.

In some embodiments, the master device receives re-up requests (e.g., a request to replenish a service usage allowance) on behalf of a secondary device or user. In some embodiments, the master device can present, through a user interface, a way for the master user to respond to re-up requests. In some embodiments, the master user enters a credential or password and information about how much additional service is authorized. In some embodiments, the master device sends the authorization to a network element (e.g., service controller or server).

In some embodiments, the master device sets time-of-day usage restrictions for one or more classifications of service. In some embodiments, the master device can set application permissions (e.g., use of Facebook is not allowed during school hours, phone calls are not permitted after 9:00 P.M., etc.). In some embodiments, the master device can set network permissions or restrictions for one or more classifications of service. In some embodiments, the master device can accept and respond to requests to modify usage permissions or to remove usage restrictions (e.g., a secondary device indicates that a user requests to make a phone call during a time when phone calls ordinarily would not be permitted).

In some embodiments, the master user enters restrictions or modifications to permissions through the master device user interface, and the master device sends information about the restrictions or permission modifications to a network element (e.g., a service controller, server, etc.) The network element then determines the control policy that needs to be in place for each affected mobile device, based on the information from the master device. The network element then facilitates the enforcement of that policy, for example, by sending a modified control policy to the affected mobile devices (e.g., for implementation by a service processor on a mobile device) or by provisioning network equipment (e.g., a deep-packet inspection element, a gateway, etc.) to implement the desired control policy.

On-Device Multi-Device Service Sign-Up

FIG. 198 illustrates a system configuration 1500 that enables a master-subscriber-initiated on-device multi-device service sign-up procedure in accordance with some embodiments. FIG. 199 illustrates a representative flow chart 1510 illustrating an exchange of messages and processing of messages by the master device, the secondary device, the sign-up request processor and the subscriber management system illustrated in the system configuration 1500 of FIG. 198. FIG. 199 illustrates a representative embodiment for the subscriber of the master device to add a secondary device to the master service account, device group, or multi-device service plan. Additional embodiments are also discussed further herein.

In some embodiments, the master device subscriber initiates the linking process. In some embodiments, the master device subscriber (e.g., via a device agent 1001A) requests a one-time token from the sign-up request processor 9002. The sign-up request processor 9002 verifies with the subscriber management system 9004 that the subscriber associated with the master device 100A has permission to add additional devices to the master service account, device group, or multi-device service plan (e.g., by verifying a username and/or password, credential, etc.). The sign-up request processor 9002 generates a one-time token, associates it with the master subscriber (e.g., device credential, user credential, account credential, etc.), stores the token and the credential in the database 117 (labeled DB) and then delivers the token to the master subscriber (via the device agent 1001A). The master subscriber shares the one-time token with the intended secondary subscriber (e.g., via email, SMS, MMS, an image that can be scanned (e.g., bar code, QR Code, etc.), sound file, NFC, "bump," Bluetooth message, etc.). The secondary subscriber enters the one-time token (via the device agent 1001B) on his device 100B. There are many ways the secondary subscriber can enter the one-time token, e.g., by scanning an image, sending or receiving or opening an email attachment, sending or receiving or opening an SMS, sending or receiving or opening an MMS attachment, sending or receiving or opening a sound file, through a near field communication (NFC), through a "bump" with another device (e.g., a master device), using a Bluetooth message, etc. The device agent 1001B sends the entered token information plus its (e.g., device, user, etc.) credential (e.g., $2^{nd}$ credential shown in FIG. 199) from the secondary device 100B to the sign-up request processor 9002. The sign-up request processor 9002 looks up the token in the database 117 and obtains the master device credential (e.g., $1^{st}$ credential shown in FIG. 199). The sign-up request processor 9002 sends the master device credential, the secondary device credential and a request to join the secondary device 100B to the master service account, device group, or multi-device service plan to the subscriber management system 9004. The subscriber management system 9004 de-provisions (if necessary) the secondary device 100B from its current plan and adds it as a subscriber onto the master service account, device group, or multi-device service plan (e.g., for voice, text and data). (De-provisioning the secondary device 100B from its current plan is not shown explicitly in FIG. 199, but de-provisioning can occur, in some embodiments, before adding the secondary device 100B to the intended master service account, device group or multi-device service plan.) The subscriber management system 9004 provisions the network elements to recognize that the secondary device 100B is now associated with the master service account, device group, or multi-device service plan. The master device subscriber and secondary device subscribers both receive a notification that the devices are associated with the master service account, device group, or multi-device service plan.

Optionally, in some embodiments, the network (or the master subscriber) can assign usage quotas to the secondary device 100B. In some embodiments, the master device subscriber shares the token with the secondary device 100B by displaying, on the master device 100A screen, an image that can be scanned, and the secondary device 100B's device agent 1001B scans the image (e.g., with a built-in camera and scanning software). In some embodiments, the master device 100A's device agent 1001A displays a PIN code on the master device 100A and the secondary device subscriber enters that PIN code into the secondary device 100B via the device agent 1001B. In other embodiments, the master device 100A shares the token with the secondary device 100B via a Bluetooth link, a near-field communication (NFC), a "bump," or any other type of communication that allows devices in relatively close proximity to communicate with each other.

In some embodiments, the sign-up request processor 9002 does not send the token back to the master device 100A, but instead sends it directly to secondary device 100B to enable the secondary device subscriber to accept the "invitation" to be added to the share plan. In this embodiment, when the secondary device subscriber accepts the invitation, the token is sent back to the sign-up request processor 9002 as described above, and the provisioning process occurs.

In some embodiments, the master device subscriber initiates the share request from a web-site. In this embodiment, the process is very similar to the process where the share request is initiated from the master device 100A. In this embodiment, the master device subscriber logs into a secure website or portal and enters the necessary information to initiate the sharing request (e.g., his account number, user credential, device credential, etc.) and the request is then processed in the same manner as if the request originated from the master device 100A.

In some embodiments, the token is a PIN and the PIN is delivered out-of-band to the secondary device subscriber (e.g., via SMS, email message, etc.). In some embodiments, the secondary device subscriber calls an interactive voice recognition (IVR) system and enters the PIN. The IVR obtains the PIN (e.g., through DTMF tones or through voice-to-text processing) and delivers it to the sign-up request processor 9002. From there, the process continues as if the request were handled by the device agent 1001B on the secondary device 100B.

In some embodiments, the token is a PIN and the PIN is delivered out-of-band to the secondary device subscriber (e.g., via SMS, email message, etc.). In some embodiments, an IVR system automatically calls the secondary device subscriber (at a phone number specified by the master device subscriber in the share request or on the secondary device 100B itself, etc.). The secondary device subscriber then enters the PIN (e.g., using DTM voice-to-text processing) on the IVR and the IVR delivers the PIN to the sign-up request processor 9002. From there, the process continues as if the request were handled by the device agent 1001B on the secondary device 100B.

In some embodiments, the master device 100A is a first device that has a master device credential provisioned into a network access service permission system by a subscriber management system 9004 to provide for master device access network services in accordance with a multi-device service plan, and the secondary device 100B is a second device that has a secondary device credential provisioned into the network access service permission system by the subscriber management system 9004 to provide for secondary device access network services in accordance with a multi-device service plan.

In some embodiments, the master device credential is provisioned into the network access service permission system before the secondary device credential is provisioned into the network access service permission system. In some embodiments, the secondary device credential is provisioned into the network access service permission system before the master device credential is provisioned into the network access service permission system. In some embodiments, the secondary device credential and the master device credential are provisioned at the same time into the network access service permission system.

In some embodiments, the sign-up request processor 9002 is located in the carrier network. In some embodiments, the sign-up request processor 9002 is located in a third-party provider network (e.g., device OEM, VSP, MVNO, device OS provider, Voice over IP (VoIP) provider, etc.).

The system configuration 1500 of FIG. 198 also enables a secondary-subscriber-initiated on-device multi-device service sign-up procedure in accordance with some embodiments. FIG. 200 illustrates a representative flow chart 1520 illustrating an exchange of messages and processing of messages by the master device 100A, the secondary device 100B, the sign-up request processor 9002 and the subscriber management system 9004 illustrated in the system configuration 1500 of FIG. 198. FIG. 200 illustrates a representative embodiment for a subscriber of the secondary device 100B to request the subscriber of the master device 100A to add the secondary device 100B to the master service account, device group, or multi-device service plan. Additional embodiments are also discussed further herein.

The secondary device subscriber (via the device agent 1001B) sends a request to the sign-up request processor 9002 requesting to be added as a device to the master device 100A's master service account, device group, or multi-device service plan. The request includes the secondary device 100B's and/or user's credential (e.g., MEID, IMEI, IMSI, MSID, phone number, account number, etc.) and a credential for the master device 100A's account (e.g., MEID, IMEI, phone number, IMSI, MSID, account number, etc.). (The secondary device 100B and/or user's credential is labeled as "2$^{nd}$ credential" in FIG. 200. The credential for the master device 100A's account is labeled as "1$^{st}$ credential" in FIG. 200.) The sign-up request processor 9002 verifies with the subscriber management system 9004 that the subscriber of the master device 100A has permissions to add additional devices to the master service account, device group, or multi-device service plan (e.g., by verifying a credential, etc.). In some embodiments, the sign-up request processor 9002 saves the master device 100A and secondary device 100B and/or user information in the database 117. The sign-up request processor 9002 generates a request and delivers it to the master device subscriber (e.g., via SMS, email, PIN code, message to the device agent 1001A on the master device 100A, etc.). The master device subscriber receives the request, responds to the request via the device agent 1001A (e.g., enters his credentials, enters the PIN code, etc.). The device agent 1001A delivers the response to the sign-up request processor 9002. The sign-up request processor 9002 looks up the master device credential (labeled as "1$^{st}$ credential" in FIG. 200) in the database 117 and obtains the secondary device credential. The sign-up request processor 9002 sends the master device credential, the secondary device credential and a request to add the secondary device 100B to the master service account, device group, or multi-device service plan to the subscriber management system 9004. In some embodiments, the subscriber management system 9004 de-provisions (if necessary) the secondary device 100B from the secondary device's current plan and adds the secondary device 100B as a subscriber onto the master service account, device group, or multi-device service plan (e.g., for voice, text and data). (De-provisioning of the secondary device 100B from the secondary device's current plan, if needed, is not shown explicitly in FIG. 200.) The subscriber management system 9004 provisions the network elements to recognize that the secondary device 100B is now associated with the master service account, device group, or multi-device service plan. The master device subscriber and secondary device subscriber each receive a notification that that the devices are now associated with the master service account, device group, or multi-device service plan. Optionally, the network (or the master device subscriber) can assign usage quotas to the secondary device 100B.

FIG. 201 illustrates a system configuration 1530 enabling a secondary device 100B to be added to a master service account, device group, or multi-device service plan without the use or involvement of a master device in accordance with some embodiments. FIG. 202 illustrates a representative flow chart 1540 illustrating an exchange of messages and processing of messages by the master device 100A, the secondary device 100B, the sign-up request processor 9002 and the subscriber management system 9004 illustrated in the system configuration 1530 of FIG. 201. FIG. 202 illustrates a representative embodiment for a subscriber of the secondary device 100B to request to add the secondary device 100B to the master service account, device group, or multi-device service plan without the use or involvement of the master device 100A. Additional embodiments are also discussed further herein.

The master device subscriber enters his credentials on secondary device 100B (via the device agent 1001B). (The master device subscriber credentials are labeled "1$^{st}$ credential" in FIG. 202.) In some embodiments, the device agent 1001B sends a request including the master device subscriber credential (e.g., username, password, account number, phone number, etc.) and a secondary device credential (e.g., MEID, IMEI, MSID, IMSI, phone number, secondary device subscriber account number, etc.) to the sign-up request processor 9002 requesting the secondary device 100B be added as a device to the master service account, device group, or multi-device service plan. (The secondary device credential is labeled "2$^{nd}$ credential" in FIG. 202.) In some embodiments, the request includes the secondary device 100B or secondary device and/or user's credential (e.g., MEID, IMEI, IMSI, MSID, phone number, account number, etc.) and a credential for the master device 100A's account (e.g., MEID, IMEI, phone number, IMSI, MSID, account number, etc.). The sign-up request processor 9002 verifies with the subscriber management system 9004 that the subscriber of the master device 100A has permissions to add additional devices to the master service account, device group, or multi-device service plan (e.g., by verifying a credential, etc.). The sign-up request processor 9002 sends the master device credential, the secondary device credential and a request to join the secondary device 100B to the master service account to the subscriber management system 9004. The subscriber management system 9004 de-provisions (if necessary) the secondary device 100B from the secondary device 100B's current plan and adds the secondary device 100B to the master service account, device group, or multi-device service plan (e.g., for voice, text and data). The subscriber management system 9004 provisions the network elements to recognize that the secondary device 100B is now associated with the master service account, device group, or multi-device service plan. The master device subscriber and secondary device subscriber each receive a notification that that the devices are now associated with the master service account, device group, or multi-device service plan. Optionally, the network (or the master device subscriber) can assign usage quotas to the secondary device 100B.

In some embodiments, the sign-up request processor 9002 is located in the carrier network. In other embodiments, it is located in a third-party provider network (e.g., device OEM, VSP, MVNO, device OS provider, VoIP provider, etc.).

FIG. 203 illustrates a system configuration 1550 that enables the enrollment of a secondary device 100B entirely from a master device 100A in accordance with some embodiments. FIG. 204 illustrates a representative flow chart 1560 illustrating an exchange of messages and processing of messages by the master device 100A, the secondary device 100B, the sign-up request processor 9002 and the subscriber management system 9004 illustrated in the system configuration 1550 of FIG. 203. FIG. 204 illustrates a representative embodiment for adding the secondary device 100B to the master service account, device group, or multi-device service plan entirely from the master device 100A. Additional embodiments are also discussed further herein.

In some embodiments, the master device subscriber enters a secondary device credential (e.g., IMSI, MSID, IMEI, MEID, phone number, etc.) (via the device agent 1001A). (The secondary device credential is labeled "$2^{nd}$ credential" in FIG. 204.) The device agent 1001A sends a request including the master device subscriber credential (e.g., username, password, account number, phone number, IMSI, MSID, IMEI, MEID, etc.) and the secondary device credential (e.g., MEID, IMEI, MSID, IMSI, phone number, etc.) to the sign-up request processor 9002 requesting the secondary device 100B be added to the master service account, device group, or multi-device service plan. (The master device subscriber credential is labeled "$1^{st}$ credential" in FIG. 204.) The sign-up request processor 9002 verifies with subscriber management system 9004 that the subscriber of the master device 100A has permission to add additional devices to the master service account, device group, or multi-device service plan (e.g., by verifying a credential, etc.). The sign-up request processor 9002 sends the master device credential, the secondary device credential and a request to add the secondary device 100B to the master service account, device group, or multi-device service plan to the subscriber management system 9004. The subscriber management system 9004 de-provisions (if necessary) the secondary device 100B from its current plan and adds it to the master service account, device group, or multi-device service plan (e.g., for voice, text and data). The subscriber management system 9004 provisions the network elements to recognize that the secondary device 100B is now associated with the master service account, device group, or multi-device service plan. The master device subscriber and secondary device subscriber each receive a notification that that the devices are associated with the master service account, device group, or multi-device service plan. Optionally, in some embodiments, a network element (e.g., provisioning or policy management) or the master device subscriber can assign usage quotas to the secondary device 100B.

In some embodiments, prior to sending the "add" request to the subscriber management system 9004, the sign-up request processor 9002 may send a validation request to the secondary device 100B (via the device agent 1001B) or secondary device subscriber to confirm the change and wait for the response before performing the "add" action. In some embodiments, the request is an SMS, a call from an IVR system, an email, a notification on the device (via the device agent 1001B), etc.

In some embodiments, the master device subscriber adds the secondary device 100B to the master device subscriber's share plan prior to the secondary device being activated. In some embodiments, the master device subscriber adds the secondary device to the master device subscriber's share plan at the time that the secondary device is being provisioned or activated.

In some embodiments, where the secondary device is added to the master service account, device group, or multi-device service plan prior or during the activation process, the sign-up request processor 9002 delivers a notification to the secondary device subscriber indicating that the device has been associated with the master service account, device group, or multi-device service plan. In some embodiments, the notification is delivered to the device agent for presentation through a user interface of the secondary device. In some embodiments, the notification is delivered as an SMS, MMS, voice message (either live or IVR), or email. In some embodiments, the notification requires the secondary device subscriber to acknowledge the notification prior to associating the secondary device with the master service account, device group, or multi-device service plan. In some embodiments, the secondary device subscriber is automatically associated with the master service account, device group, or multi-device service plan without the secondary device subscriber having to confirm the notification.

In some embodiments, the sign-up request processor 9002 is located in the carrier network. In other embodiments, it is located in a third-party provider network (e.g., device OEM, VSP, MVNO, device OS provider, VoIP provider, etc.).

Service Plan Sharing with Allowance Limits

In some embodiments in which a service plan is shared, the master device subscriber may wish to only share a portion of the total service plan with a secondary device subscriber. In some embodiments, the sharing process includes a step where the master device subscriber defines what portion or portions of the service plan (voice service plan, messaging service plan, data access service plan, etc.) are to be shared with the secondary device subscriber. In some embodiments, the portions represent a set of services less than all of the services offered by the service plan to be shared. In some embodiments, the portions are represented by imitations expressed in voice minutes, long distance minutes, international calling destinations, international calling minutes, number of text messages, number of MMS messages, access to specific data services (e.g., website, domain, content type (e.g., streaming audio, streaming video, VoIP, etc.), quality-of-service (QoS) rated services, protocol type, general data access in time or usage (e.g., MB, kB, etc.), application usage, content downloads, content uploads, 3G access, 4G access, Wi-Fi access, etc.), time periods (e.g., days of the week, specific hours in a day, or total hours in a day, total hours in a week, total days in a month, etc.), or other units that are applicable to the shared portion of the service plan. In some embodiments, the portions can be expressed as percentage of the service plans' service usage allowance for a category of service (e.g., 5% of the voice minute allowance, 20% of the data allowance, etc.) or absolute values (e.g., 20 minutes of voice, 100 messages, 5 MB of data, 5 hours of data use, 1 hour of VoIP calling, 30 minutes of media streaming, etc.). In some embodiments, the sharing limits are set up with the initial offer to share. In some embodiments, the sharing limits are set up after the plan has been shared with the secondary device. In some embodiments, in which sharing limits are set up with the initial offer to share, the sharing attributes may be stored in the sign-up request processor database and associated with the sharing token. When the secondary device subscriber is provisioned onto the sharing plan, the sharing attributes are also communicated to the subscriber management system 9004 along with the "add" request.

In some embodiments, the master device subscriber may purchase an add-on service plan for the secondary device subscriber and allocate (e.g., assign) the entire add-on service plan to the secondary device subscriber (e.g., the secondary device subscriber gets an add-on service plan that provides additional service usage quota for a service that the secondary device subscriber uses more frequently than other users (e.g., an application-specific (e.g., facebook, email, etc.) service plan, an additional allocation of voice minutes or text messages, etc.). In some embodiments, the master device subscriber adds certain capabilities (that might be offered at a discount) to certain users so that those users do not consume the quotas of the shared service plan while using these activities. For example, a master device subscriber might share a non-streaming data plan with a secondary device subscriber, but the secondary device subscriber desires to stream data (e.g., by watching a video, listening to streaming audio, video conferencing, etc.) The master device subscriber may purchase an audio/video streaming-capable service plan and assign that service plan to the secondary device, but not to other devices. This allows the secondary device subscriber to stream data without the master device subscriber having to purchase a larger streaming capable plan.

Sharing with Curfews

In some embodiments in which a service plan is shared, the master device subscriber may wish to set curfews (e.g., no messaging between 10:00 P.M. and 6:00 A.M., email data access only during school hours, no voice calls except certain numbers during the school day (e.g., numbers on a "whitelist"), no international long distance calls, etc.) associated with the secondary device as part of the sharing process. In some embodiments, these curfews provide limits on usage of certain aspects of the shared portion of the service plan and thus provide for further control service plan sharing. In some embodiments, the service plan sharing process includes a step where the master device subscriber defines the curfews on the portion or portions of a service plan (voice service plan, messaging service plan, data access service plan, etc.) that are to be shared with the secondary device. The curfews can be expressed as limits on certain aspects of the service plan during certain time periods (no text messaging from 10:00 P.M. until 6:00 A.M. Monday-Friday, only allow voice calls to a certain set of numbers during school hours, no Hulu videos after 8:00 P.M., etc.), maximum usage of an aspect of a service plan during a time period (e.g., maximum of 30 minutes of voice calling per day on weekdays, maximum of 20 MB of Facebook during school hours, no text messaging on Mondays, etc.). In some embodiments, the curfews restrict certain types of access during a specified interval. In some embodiments, the curfews limit certain types of access during a specified interval. In some embodiments, the curfews are set up with the initial offer to share. In some embodiments, the curfews are set up after the secondary device subscriber has been joined to a shared service plan. In some embodiments in which the curfews are set up with the initial offer to share, the curfew attributes are stored in the sign-up request processor database and associated with the sharing token. When the secondary device subscriber is provisioned onto a shared service plan, the curfew attributes are communicated to the subscriber management system 9004 along with the "add" request. In some embodiments, curfews are combined with sharing limits (e.g., 100 MB of data usage during the service plan cycle and no data usage allowed during school hours, etc.).

User-Established Quotas/Curfews/Limitations on Service Usage

In some embodiments, a user may want to set quotas, curfews or limitations on his own service usage. One motivation for doing this may be cost related (e.g., a user wants to ensure a service plan allowance is not exhausted before the end of the service plan cycle, or a user wants to prevent overages, a user's company subsidizes only a certain percentage of service plan usage and the user does not want to exhaust his portion of the allowance, etc.), but there may be other reasons. In some embodiments, the notification enables the secondary subscriber to request additional service from the master subscriber when the notification is triggered. In some embodiments, the notification enables an automatic purchase (or re-purchase) of a specified service plan. In some embodiments, the automatic purchase of a service plan also delivers a notification to the master subscriber. In some embodiments, the notification that is delivered to the master subscriber is delivered via email, SMS, MMS, a message on the master device's device agent 1001, a message on a portal, or a message on a website. In some embodiments, the user interacts with the device agent 1001 on his device to set the desired service controls. The device agent 1001 communicates the service limits to the subscriber management system 9004 (either directly or via an intermediate element), and the subscriber management system 9004 provisions the controls to the appropriate enforcement elements. In some embodiments, the control elements are network elements (e.g., policy controller, policy charging and rules function (PCRF), policy charging enforcement function (PCEF), etc.). In some embodiments, the control elements are device-based agents/elements. In some embodiments, the control agents/elements exist both in the network and on the device.

Notifications

In some embodiments, the master device subscriber may desire to set up notifications for secondary users to alert them when they are reaching plan allowances, their individual quota allowances, plan time elapsed or remaining, usage velocity (e.g., rate of service usage), etc. In these types of embodiments, the master device user can, from his device or from an alternative device (e.g., a secondary device, another device associated with the master service account, device group, or multi-device service plan, a website visited from a computer or tablet, etc.) to set up these notifications. In some embodiments, the notifications can also include actions or offers to modify an aspect of service usage (e.g., turn off or block certain services because an allocated quota is running out, or because a service is expensive while roaming, etc.). In other embodiments, the notifications can include an action to also inform the master device subscriber of a secondary device subscriber's activity within the service. In some embodiments, this alert to the master device subscriber can also include a request from the secondary device subscriber to increase his quota allocation, purchase additional service and assign an additional allocation to him, re-allocate other users' quotas on the service towards this particular secondary user, etc. In some embodiments, these notifications can be initiated because a particular secondary user is not using much of his allocated quota, and the notification is sent to the master device subscriber to inform him of the condition and allow the master device subscriber to reallocate the quota as the master device subscriber deems appropriate (e.g., the subscriber may give more service allocation to a different user (including himself) since the particular secondary device subscriber is not going to use his allocation based on current usage velocity (e.g., the average rate of data consumption over a period of time (e.g., one hour, one day, one week, etc.)) trends).

In some embodiments, the master device subscriber uses an application (e.g., application locally on his device, a website from a computer, an application on a secondary device subscriber's device, etc.) to configure the notifications. In some embodiments, the master device subscriber enters a login credential, an account number, a phone number, etc. to identify him as someone who is authorized to make changes to the account. Once logged in, the master device subscriber interacts with the application to set up the desired notifications for the specific secondary device subscriber (or users). In some embodiments, the notifications are configured to be the same for all secondary device subscribers. In some embodiments, the notifications are specific to each secondary device subscriber. In some embodiments, the notifications are specific to a subset of secondary device subscribers. For example, in an enterprise scenario, there may be groups of users based on their position or function within the enterprise (e.g., sales, executive, field service, etc.). Each group of users may have different sets on notifications configured by the master device subscriber because each group of users may have different aspects of a service plan shared with them. For example, a sales group and a field service group may have a larger allocation of service usage for maps and navigation services and there could be notifications for service usage within that particular allocation for those groups, so they know if they are running out of that type of service. In a family share scenario, the children might have limited access to a social networking application during school hours (e.g., 10 MB, 30 minutes, etc.) and the master device subscriber sets a notification to notify the child when she is reaching her daily limit. In some embodiments, the notification that is configured is delivered to the specific user of the service (e.g., the child, etc.). In some embodiments, the notification is delivered to the master device subscriber. In some embodiments, the notification is delivered to both the master device subscriber and the specific user of the service. Once the notifications are configured, they are sent to the subscriber management system 9004. The subscriber management system 9004 provisions the notification type, parameters, text, actions, etc. to the various elements that are responsible for implementing the notification policy. In some embodiments, the elements are network-based elements (e.g., OCS, PCRF, PCEF, notification element, etc.). In some embodiments, the elements are device-based agents (e.g., agents for local usage counting, local classification and policy management, local notification agent, etc.). In some embodiments, the elements are located in both the network and the device (e.g., accounting and policy control in the network, notification agent on the device, etc.). Once the elements are provisioned, the notification policy is associated with the appropriate subscribers (e.g., the one or more secondary device subscribers) and enabled when the subscriber is actively using the services.

As discussed previously, in some embodiments, the notification is actionable by either the secondary device subscriber or the master device subscriber. For example, in an enterprise scenario, when the user is reaching the limit of an enterprise-paid service, the notification can include an option for the secondary device subscriber to purchase additional service just for him (e.g., not shared with other users). In some embodiments, the notification action is to alert the master device subscriber so he can take action (e.g., purchase additional shared service, purchase service just for that user, reallocate usage quotas, etc.). In some embodiments, the notification to the master device subscriber includes an option to purchase additional service. In some embodiments, the additional service includes shared service (e.g., additional usage for all subscribers on the shared account). In some embodiments, the additional service is specifically for the subscriber whose usage profile generated the notification. In some embodiments, the additional service is for a specific subset of subscribers on the shared service plan. In some embodiments, the master device subscriber has the option to decline the additional service offer. In some embodiments, the action taken by the master device subscriber (e.g., additional service purchased, no additional service purchased, etc.) is communicated to the secondary device subscriber. In some embodiments, the communication is via email, SMS, MMS, a message delivered to the device agent 1001 on the secondary device, a message displayed on a portal, or a message displayed on a website.

In some embodiments, the system is configured to detect when the device agent 1001 on the secondary device has been tampered with. In some embodiments, tampering includes removal of the device agent 1001, modification of the device agent, or modification of the configuration data used by the device agent. In some embodiments, this is achieved by detecting that the device agent on the secondary device has not sent a heartbeat message (e.g., a message configured to inform a network element that the device agent is present and operating properly, where such messages are possibly sent periodically or upon request by the network element) to the sign-up request processor 9002 (or other monitoring network element) or to the device agent 1001 on the master device in the configured time interval. In some embodiments, the detection is achieved by inspecting traffic to or from the secondary device and determining if the inspected traffic conforms to the controls that are expected to be enforced (e.g., whether there is data usage when data curfews are in place, whether there is a voice call to a non-whitelisted number when a voice curfew is in place, etc.). In some embodiments, detecting tampering is achieved by verifying a device agent credential, software signing key, software hash, software configuration integrity, software configuration hash, operating system (OS) credential, OS software hash, or OS signing key. In some embodiments, the detection occurs on the secondary device. In some embodiments, the detection occurs on the master device. In some embodiments, the detection occurs in the Network. In some embodiments, the detection is performed by two or more elements (e.g., missing heartbeat message between the secondary device and a network element). In some embodiments, when it has been detected that tampering has occurred on the secondary device, a notification is sent to the master device user. In some embodiments, the notification is delivered directly to the master device via, for example, SMS, device agent notification, email or IVR phone call. In some embodiments, the notification also includes an alert sound to bring immediate attention to the notification. In some embodiments, the notification is displayed on top of all other UI elements on the master device. In some embodiments, the notification is delivered to other account entities in addition to the master. In some embodiments, the notification is delivered to multiple account entities.

In some embodiments, the master device credential is provisioned into the network access service permission system to provide a master device user with a higher level of control over multi-device service plan configuration, and the secondary device credential is provisioned into the network access service permission system to provide a secondary device user with a lesser degree of control over multi-device service plan configuration. In some embodiments, the secondary device credential is provisioned into the network access service permission system to provide a secondary device user with a higher level of control over multi-device service plan configuration, and the master device credential is provisioned into the network access service permission system to provide a master device user with a lesser degree of control over multi-device service plan configuration. In some embodiments, the master device credential and the secondary device credential are provisioned into the network access service permission system to provide the same degree of control over multi-device service plan configuration to a user of the master device and a user of the secondary device.

In some embodiments, the control over multi-device service plan configuration comprises the ability to approve or initiate purchasing, upgrading, downgrading or discontinuing a service plan or a multi-device service plan. In some embodiments, the control over multi-device service plan configuration comprises the ability to approve or initiate adding or deleting one or more devices associated with the master service account, device group, or multi-device service plan. In some embodiments, the control over multi-device service plan configuration comprises the assignment of or approval of a service usage allowance for one or more devices capable of receiving services in accordance with the multi-device service plan. In some embodiments, the service usage allowance comprises a voice, text or data usage allowance for one or more wireless access networks. In some embodiments, the allowance comprises an allowance on one or more applications or one or more application types that may be used on one or more wireless access networks. In some embodiments, the allowance comprises a time of day or time period allowance during which one or more access network services may be used. In some embodiments, the allowance comprises an allowance for communication with one or more network end points or websites or one or more network endpoint types or website types over one or more wireless access networks. In some embodiments, the allowance comprises an allowance for one or more content types or traffic types on one or more wireless access networks. In some embodiments, the allowance comprises an allowance for one or more QoS levels on one or more wireless access networks. In some embodiments, the allowance comprises one or more roaming permission levels for one or more wireless roaming networks. In some embodiments, an allowance is implemented by provisioning an allowance policy instruction or allowance policy setting into one or more device agents on the device associated with the allowance. In some embodiments, the allowance is implemented by provisioning an allowance policy instruction or allowance policy setting into a device service processor on the device associated with the allowance.

In some embodiments, information defining at least an aspect of the allowance is obtained from one or more device agents on a master device. In some embodiments, information defining at least an aspect of the allowance is obtained from one or more device agents on a secondary device. In some embodiments, information defining at least an aspect of the allowance is obtained from a master device user or secondary device user input to a website or portal. In some embodiments, information defining at least an aspect of the allowance is obtained from an account owner input to a website or portal.

In some embodiments, the control over multi-device service plan configuration comprises the assignment of or approval of a service usage limit for one or more devices capable of receiving services in accordance with the multi-device service plan. In some embodiments, the service usage limit comprises a voice, text, or data usage limit for one or more wireless access networks. In some embodiments, the limit comprises a limit on one or more applications or one or more application types that may be used on one or more wireless access networks. In some embodiments, the limit comprises a time of day or time period limit during which one or more access network services may be used. In some embodiments, the limit comprises a limit on communication with one or more network end points or websites or one or more network endpoint types or website types over one or more wireless access networks. In some embodiments, the limit comprises a limit for one or more content types or traffic types on one or more wireless access networks. In some embodiments, the limit comprises a limit for one or more QoS levels on one or more wireless access networks. In some embodiments, the limit comprises one or more roaming limitations for one or more wireless roaming networks. In some embodiments, a limit is implemented by provisioning a limit policy instruction or limit policy setting into one or more network elements responsible for providing wireless access network permission for one or more wireless access networks to the device associated with the limit. In some embodiments, a limit is implemented by provisioning a limit policy instruction or limit policy setting into one or more network elements responsible for providing wireless access network permission for one or more wireless access networks to the device associated with the limit.

FIG. 205 illustrates a system configuration 1570 in accordance with some embodiments. In some embodiments, the master device 100A and secondary device 100B interact with the sign-up request processor 9002 (via the device agents 1001A and 1001B) to manage plan sharing. In some embodiments, the sign-up request processor 9002 interacts with the subscriber management system 9004 to complete a requested function. In some embodiments, the subscriber management system 9004 acts as the single interface point for the sign-up request processor 9002, and the sign-up request processor 9002 directs all of its queries and requests through the subscriber management system 9004. In some embodiments, the sign-up request processor 9002 makes "high level" requests to the subscriber management system 9004 (e.g., add a secondary device subscriber to a master service account, device group, or multi-device service plan, etc.) and the subscriber management system 9004 converts the "high level" request into a series of "low level" requests and workflows to the various elements needed to complete the requested action. In this manner, a service operator can make necessary changes to the "low level" processing while keeping the interface at the "high level" consistent. It also enables the service operator to support a multi-vendor configuration without having to expose the low-level requests and workflow details to the sign-up request processor 9002. In some embodiments, the sign-up request processor 9002 is a component of the subscriber management system 9004.

In some embodiments, such as the embodiment illustrated in FIG. 205, the permissions element 9012 verifies that the requestor (e.g., master device 100A subscriber) has the appropriate account permissions to initiate an action (e.g., request a subscriber be added to a master service account, device group, or multi-device service plan, remove a subscriber from a master service account, device group, or multi-device service plan, set quota and sharing limits for secondary device 100B subscribers, etc.). Additionally, in some embodiments, the provisioning element 9014 is responsible for provisioning the required elements based on actions requested by the sign-up request processor 9002 (e.g., add a secondary device 100B subscriber, remove a secondary device 100B subscriber, set a quota for a master device 100A or secondary device 100B subscriber, set a notification policy for a master device 100A or secondary device 100B subscriber, adjust a curfew, etc.). In some embodiments, when a request is made to the provisioning element 9014 by the sign-up request processor 9002, the provisioning element 9014 validates a credential to ensure that the requestor has the authority to perform the action (e.g., master device 100A subscriber can add a user, secondary device 100B subscriber can configure notifications, etc.). Additionally, in some embodiments, the provisioning element 9014 provisions the permissions element 9012 with updated account or subscriber level permissions (e.g., add or remove a subscriber from a shared account, grant or revoke certain account-level permissions to a secondary device 100B subscriber, grant or revoke certain subscriber-level permissions to a secondary device 100B subscriber, etc.). In some embodiments, the provisioning element 9014 also provisions the policy management (labeled "Policy Mgmt" in FIG. 205) element 9016 to set appropriate quotas, restrictions, events to monitor (e.g., attempting to perform an action that is not allowed either at the plan level or based on limits/restrictions set by the master device 100A subscriber that would then trigger a notification alert, etc.), etc. In some embodiments, the provisioning element 9014 provisions the usage accounting element 9018 with service plans associated with the account (shared and non-shared plans) and the subscriber IDs that are sharing the plans. In some embodiments, the usage accounting system 9018 is provisioned via a third party (e.g., device OEM, OS provider, retail partner, VSP, MVNO, etc.) server. In some embodiments, the usage accounting system 9018 is provisioned from a device agent 1001. In some embodiments, the usage accounting element 9018 is provisioned with rules regarding which services are free to the subscriber and which are not (e.g., sponsored services, carrier administration traffic, special phone numbers (e.g., 611, 911, operator customer support, retail partner, sponsored service partner, etc.)). In some embodiments, the usage accounting element 9018 is configured to report usage to a device agent 1001 on the subscriber devices. In some embodiments, the usage data information delivered to the device agent 1001 includes detailed usage information for each device associated with the master service account, device group, or multi-device service plan. In some embodiments, the usage information delivered to or displayed on the device is different for the master subscriber and the child subscriber. For example, in some embodiments, the master subscriber can view total plan usage, his own usage and usage by subscriber associated with the shared plan, while the child subscriber can only view his own usage.

In some embodiments, usage accounting 9018 and policy management 9016 interwork to meet a service policy objective (e.g., when usage within a service plan for a specific secondary device 100B subscriber hits a certain usage level, block further access to that service plan for that secondary device 100B). In some embodiments, the provisioning element 9014 also provisions the notification element 9020 with the details about notifications that need to be delivered to subscribers based on certain events. In some embodiments, these details include trigger identification, notification text and actions. In some embodiments, these details include other instructions that instruct the notification element 9020 (and, in some embodiments, the device agent 1001) on further workflow associated with a notification (e.g., a notification trigger identification that indicates that a service plan limit has been reached, the text to be shown to the subscriber when the condition occurs, the buttons to display on the notification (e.g., dismiss, purchase additional service, view product catalog, "snooze," "don't remind me again," etc.), and the action to take when specific buttons are selected (e.g., when the user selects "don't remind me again," show these choices for when to remind him again (e.g., never, 1 hour, 2 hours, 4 hours, etc.)).

In some embodiments, the elements in FIG. 205 are located in the network. In some embodiments, the elements in FIG. 205 are located on the subscriber device 100. In some embodiments, some of the elements in FIG. 205 are located in the subscriber device 100, and some of the elements are located in the network.

In some embodiments, the elements in FIG. 205 work in a coordinated manner. For example, in some embodiments, notifications are triggered when certain policy events (managed by policy management 9016) or certain usage thresholds (managed by usage accounting 9018) occur. As would be appreciated by a person having ordinary skill in the art, there are many combinations of interworking between network elements that will achieve the desired coordinated events. Additionally, although FIG. 205 illustrates the elements as separate entities, the elements can be combined or further divided as appropriate for the particular implementation.

In some embodiments, a network system is configured to provision a multi-device service plan access network permission configuration into one or more access network permission control elements, the permission configuration allowing access network service permission in accordance with a multi-device service plan for at least a master device 100A and a secondary device 100B. In some embodiments, the provisioning of the secondary device 100B service permissions is accomplished by providing a secondary device credential and service permission information to a subscriber management system 9004 that configures a set of one or more wireless access network permissions on one or more wireless access network access control elements, the one or more wireless access network permissions comprising access control permissions for attempted or actual access traffic associated with the secondary device credential. In some embodiments, the one or more access network permission control elements comprise one or more device agents 1001B located on the secondary device 100B. In some embodiments, the one or more device agents 1001 comprise a service processor 115. In some embodiments, the one or more access network permission control elements comprise a subscriber management system 9004. In some embodiments, the one or more access network permission control elements comprise a service controller 122. In some embodiments, the one or more access network permission control elements comprise a network AAA system. In some embodiments, the one or more access network permission control elements comprise one or more of a network gateway, router, policy control enforcement function, gateway GPRS support node (GGSN), serving GPRS support node (SGSN), packet data serving node (PDSN), home location register (HLR), home subscriber server (HSS), packet data network gateway (PGW), serving gateway (SGW), traffic monitoring function, deep packet inspection (DPI) function, or home agent.

In some embodiments, the sign-up request processor 9002 is located in the carrier network. In other embodiments, it is located in a third-party provider network (e.g., device OEM, VSP, MVNO, device OS provider, VoIP provider, etc.).

It is sometimes desirable that a common application programming interface (API) be implemented to simplify or eliminate the details of what has to happen in one or more carrier networks, and to establish a finite set of pre-specified API commands to support a common multi-device service plan assignment system that works with a plurality of third-party on-device multi-device service plan sharing and assignment solutions. In some embodiments, the pre-specified API commands include such actions as activate a device onto a shared plan, add a device to a master service account, device group, or multi-device service plan, remove a device from a master service account, device group, or multi-device service plan, manage quotas for devices on a shared plan, manage notifications for devices on a shared plan, or assign specific plans to certain devices on a shared plan. As would be appreciated by a person having ordinary skill in the art, there are many types actions that can be defined, and the examples provided herein are not intended to be limiting.

In some embodiments, such as the embodiment illustrated in FIG. 206, there is one sign-up request processor 9002 that interconnects with multiple service operators via a common API 9022. Specifying common API 9022 enables the sign-up request processor 9002 to add new service operators without having to implement new interfaces to support the new service operators. In some embodiments, the subscriber has a common sign up experience regardless of his service operator. This allows a third party (e.g., device OEM, VSP, MVNO, device OS provider, VoIP provider, etc.) to define a user interface (UI) and process and implement that UI once in the sign-up request processor 9002 and/or device agent 1001 to enable the third party to offer a common experience across all of the service operators that it interworks with. For example, a device manufacturer may want to have a common service sign-up and sharing management UI and process for all of its products and desires that the common service sign-up and sharing management UI and process are implemented consistently across all of the service operators that are selling the manufacturer's products. Thus, in some embodiments, the device manufacturer provides the sign-up request processor 9002 and the common API 9022 and works with the service operators to have them implement the required functionality to support the on-device service sign-up and multi-device sharing functions. In some embodiments, the manufacturer implements, on the sign-up request processor 9002, common APIs for functions like add new service, delete service, add a device to a master service account, device group, or multi-device service plan, delete a device from a master service account, device group, or multi-device service plan, manage quotas on a shared plan, etc., and then provides a well-defined API, interface, and protocol (e.g., JSON, WSDL, etc.) to the interface 9022 with the individual service operators. In some embodiments, the interface protocol between the sign-up request processor 9002 and the service operator subscriber management system 9004 is a "high level" functional interface as described above and the subscriber management system 9004 implements a series of "low level" instructions to each of the affected operator elements (as described in the discussion of FIG. 205). In some embodiments, the subscribers sharing a service plan must be subscribed to the same service operator. In some embodiments where a centralized accounting function is implemented, the subscribers may be, but need not be, subscribed to different service operators, and the centralized accounting function tracks, manages and aggregates the service usage of all of the devices sharing the shared plan across all of the service operators. By leveraging a single sign-up request processor 9002, the sign-up request processor 9002 brokers the multi-device plan sharing, management and assignment requests across the different service operators.

FIG. 206 illustrates a system configuration 1580 including a network that the devices 100 use to communicate with the sign-up request processor 9002 in accordance with some embodiments. In some embodiments, the network 1100 is a common network regardless of the service operator that the subscriber is subscribed to. In other embodiments, each service operator uses its own network to enable the device to connect to the sign-up request processor 9002. In some embodiments, the network 1100 is a cellular network. In some embodiments, the network 1100 is a Wi-Fi network. In some embodiments, the network 1100 is a Wi-Fi network for one device and a cellular network for the other device.

In some embodiments, the sign-up request processor 9002 is located in the carrier network. In other embodiments, it is located in a third-party provider network (e.g., device OEM, VSP, MVNO, device OS provider, VoIP provider, etc.). In some embodiments, there is a plurality of sign-up request processors 9002. In some embodiments, each of the plurality of sign-up request processors 9002 conforms to the common API 9022 command set. In some embodiments, each of the plurality of sign-up request processors 9002 is associated with a subset of the entities requiring access to manage multi-device plan sharing and assignment. In some embodiments, these entities include device OEM, OS provider, VSP, MVNO, MNO, retail distribution partners, or sponsored service providers. In some embodiments, each of the entities requiring access to manage multi-device plan sharing and assignment implements its own UI, device agent 1001 and on-device workflows to enable the entity to customize the process to suit its needs without impacting the service operator interfaces.

Although FIG. 206 illustrates the API 9022 coupled with the sign-up request processor 9002, in some embodiments, the API 9022 is defined by each service operator (e.g., MNO, MVNO, VSP, etc.) and coupled with each service operator's subscriber management system 9004. In some embodiments, the sign-up request processor 9002 conforms to each service operator's API specification. In some embodiments, the service operator API exposes the "high level" requests (e.g., add subscriber to a master service account, device group, or multi-device service plan, remove subscriber from a master service account, device group, or multi-device service plan, allocate quotas, add curfew, remove curfew, add notification, delete notification, etc.) to the sign-up request processor 9002 and then converts the "high level" commands into the appropriate "low level" commands and workflow specific to that service operator.

In some embodiments, a party specifies a global API that defines a superset of required "high level" commands that entities use to manage multi-device plan sharing capabilities and then provide an internal framework to allow the individual service operators to convert the "high level" commands received from the sign-up request processor 9002 into the service operator-specific "low level" commands and workflows that apply to that service operator. In some embodiments, the party is an operator, a VSP, an MVNO, an OEM, an OS provider, a retail distribution partner, or any type of partner that would benefit from a consistent multi-device service management experience across multiple service providers.

Device Credentials

In some embodiments, a device comprises one or more wireless modems that enable the device to connect to at least a first wireless network and one or more device agents that: obtain a first device credential from a device credential storage element, the first device credential uniquely identifying the device; present a multi-device service plan sign-up message through a user interface of the device, the multi-device service plan sign-up message offering the user an option to associate the device with a master service account, device group, or multi-device service plan, the master service account, device group, or multi-device service plan comprising access service permissions to enable communication over the first wireless network by one or more devices; obtain a user input indicating that the user desires to associate the device with the master service account, device group, or multi-device service plan; and communicate the first device credential and the user input to a network element responsible for associating the device with the master service account, device group, or multi-device service plan.

In some embodiments, the device receives an acknowledgment that the device was successfully associated with the master service account, device group, or multi-device service plan. In some embodiments, the device receives the acknowledgment from a network element and presents the acknowledgment through a device user interface.

In some embodiments, the device receives an instruction that assists in associating the device with the master service account, device group, or multi-device service plan. In some embodiments, the device receives that instruction from a network element and executes the instruction to assist in associating the device with the master service account, device group, or multi-device service plan. In some embodiments, the instruction modifies an aspect of a device connection to the first wireless network. In some embodiments, the instruction modifies an aspect of a device access permission associated with communicating over the first wireless network. In some embodiments, the instruction modifies an aspect of the first device credential or a second device credential.

In some embodiments, the first device credential comprises one or more of a phone number, an IMSI, an MSID, a SIM identifier, an ESN, an MEID, an IMEI, a device identifier, a subscriber identifier, a service account identifier, a token, and a one-time token.

In some embodiments, at least a portion of the service plan sign-up message is obtained from a device system memory. In some embodiments, the at least a portion of the service plan sign-up message is pre-stored in the device system memory before the service plan sign-up message display sequence is initiated. In some embodiments, at least a portion of the service plan sign-up message is obtained from a network destination. In some embodiments, the at least a portion of the service plan sign-up message is obtained from a network element before the service plan sign-up message display sequence is initiated. In some embodiments, the at least a portion of the service plan sign-up message is obtained from a network element immediately prior to the service plan sign-up message display sequence being initiated. In some embodiments, the network element comprises a website, a portal, or a message server.

In some embodiments, the device obtains at least a portion of the service plan sign-up message from a push message sent by a network server. In some embodiments, the network server is a push server. In some embodiments, the device receives the push message over a secure push message control link. In some embodiments, the device assists in securing the push message control link by sharing the first device credential with a push message server and establishing an encrypted link in cooperation with the push message server.

In some embodiments, a network system receives a secondary device multi-device service plan sign-up request from a device agent 1001B on a secondary device 100B. In some embodiments, the multi-device service plan sign-up request comprises a master user credential and a secondary device credential. In some embodiments, the network system compares the master user credential to an account owner credential associated with a master service account, device group, or multi-device service plan. In some embodiments, if the comparison indicates that the master user credential and the account owner credential are consistent, the network system provides a provisioning instruction to a wireless access network control system to associate the secondary device 100B with access control permissions associated with the master service account, device group, or multi-device service plan.

In some embodiments, a network system receives a secondary device multi-device service plan sign-up request from a device agent 1001B on a secondary device 100B. In some embodiments, the multi-device service plan sign-up request comprises a master user credential and a secondary device credential. In some embodiments, the network system compares the master user credential to an account owner credential associated with a master service account, device group, or multi-device service plan. In some embodiments, if the comparison indicates that the master user credential and the account owner credential are consistent, the network system provides a provisioning instruction to a wireless access network accounting system to account service usage associated with the secondary device 100B to the master service account.

Sign-Up Requests

In some embodiments, a master device 100A comprises one or more device agents 1001A that receive a multi-device sign-up option message or request message from a network element to add a secondary device 100B to a master service account, device group, or multi-device service plan. In some embodiments, the one or more agents 1001A present the multi-device sign-up option message or request message to a user through a user interface of the master device 100A. In some embodiments, the one or more agents 1001A obtain a user response through the user interface and send the user response to the network element. In some embodiments, the user response comprises a master account-holder credential and an acknowledgment of the request to add the secondary device 100B to the master service account, device group, or multi-device service plan. In some embodiments, the master device 100A also sends a master device credential to the network element, the master device credential uniquely identifying the master device 100A. In some embodiments, the master device 100A communicates with the network element over a secure link. In some embodiments, the master device 100A receives the multi-device sign-up option message or request message request from the network element over the secure link. In some embodiments, the secure link comprises a secure push message link, and the master device 100A receives the message over the secure link by receiving a push message from a network push message server. In some embodiments, the master device 100A assists in securing the secure push message link by executing a link establishment process during which the master device 100A shares a master credential with the network push message server and, in cooperation with the network push message server, establishes an encrypted link.

In some embodiments, a network system receives a secondary device multi-device service plan sign-up option response message or request message from a secondary device agent 1001B on a secondary device 100B. In some embodiments, the network system communicates information about the secondary device multi-device service plan sign-up option response message or request message to a master device agent 1001A on a master device 100A. In some embodiments, the network system obtains a response to the information about the secondary device multi-device service plan sign-up option response message or request message from the master device agent 1001A. In some embodiments, if the response indicates that the secondary device service plan sign-up option response or request is granted or acknowledged, the network system provides a provisioning instruction to a wireless access network control system to associate the secondary device 100B with access control permissions associated with the master service account, device group, or multi-device service plan. In some embodiments, the network system also receives a device credential from the master device 100A in association with the response. In some embodiments, the network system includes a secure message link server that communicates the information about the secondary device multi-device service plan sign-up option response message or request message to the master device agent 1001A. In some embodiments, the network system includes a network push message server and the secure link comprises a secure push message link, and the network system communicates the information about the secondary device multi-device service plan sign-up option response message or request message to the master device agent 1001A by sending a push message from a network push message server. In some embodiments, the network system secures the network push message server by executing a push message link establishment process in which the network push message server obtains a device credential and, in cooperation with the master device 100A, establishes an encrypted link.

In some embodiments, a network system receives a secondary device multi-device service plan sign-up option response message or request message from a secondary device agent 1001B on a secondary device 100B. In some embodiments, the network system communicates information about the secondary device multi-device service plan sign-up option response message or request message to a master device agent 1001A on a master device 100A. In some embodiments, the network system obtains a response to the information about the secondary device multi-device service plan sign-up option response message or request message from the master device agent 1001A. In some embodiments, if the response indicates that the secondary device service plan sign-up option response or request is granted or acknowledged, the network system provides a provisioning instruction to a wireless access network accounting system to account service usage associated with the secondary device 100B to the master service account. In some embodiments, the network system also receives a device credential from the master device 100A in association with the response. In some embodiments, the network system includes a secure message link server that communicates the information about the secondary device multi-device service plan sign-up option response message or request message to the master device agent 1001A. In some embodiments, the network system includes a network push message server and the secure link comprises a secure push message link, and the network system communicates the information about the secondary device multi-device service plan sign-up option response message or request message to the master device agent 1001A by sending a push message from a network push message server. In some embodiments, the network system secures the network push message server by executing a push message link establishment process in which the network push message server obtains a device credential and, in cooperation with the master device 100A, establishes an encrypted link.

In some embodiments, a secondary device comprises one or more device agents that receive a request from a network element to add a secondary device to a master service account, device group, or multi-device service plan. In some embodiments, the one or more agents present the multi-device sign-up option message or request message to a user through a user interface of the secondary device. In some embodiments, the one or more agents obtain a user response through the user interface and send the user response to the network element. In some embodiments, the user response comprises a master account-holder credential and an acknowledgment of the request to add the secondary device to the master service account, device group, or multi-device service plan. In some embodiments, the response comprises a credential associated with a user of the secondary device and an acknowledgment of the request to add the secondary device to the master service account, device group, or multi-device service plan. In some embodiments, the secondary device sends a secondary device credential to the network element in association with the response. In some embodiments, the secondary device communicates with the network element over a secure link. In some embodiments, the secondary device receives the request from the network element over the secure link. In some embodiments, the secure link comprises a secure push message link, and the secondary device receives the request over the secure link by receiving a push message from a network push message server. In some embodiments, the secondary device assists in securing the secure push message link by executing a link establishment process during which the secondary device shares a secondary credential with the network push message server and, in cooperation with the network push message server, establishes an encrypted link.

In some embodiments, a network system receives a secondary device multi-device service plan sign-up request from a master device agent 1001A on a master device 100A. In some embodiments, the network system communicates information about the secondary device multi-device service plan sign-up request to a secondary device agent 1001B on a secondary device 100B. In some embodiments, the network system obtains a response to the information about the secondary device multi-device service plan sign-up option request from the secondary device agent 1001B. In some embodiments, if the response indicates that the secondary device service plan sign-up option request is granted or acknowledged, the network system provides a provisioning instruction to a wireless access network control system to associate the secondary device 100B with access control permissions associated with the master service account, device group, or multi-device service plan. In some embodiments, the network system is further configured to obtain a device credential associated with the master device 100A in association with the request. In some embodiments, the network system is further configured to obtain a device credential associated with the secondary device 100B in association with the response. In some embodiments, the network system includes a secure message link server that communicates the information about the secondary device multi-device service plan sign-up request to the secondary device agent 1001B. In some embodiments, the network system includes a network push message server and the secure link comprises a secure push message link, and the network system communicates the information about the secondary device multi-device service plan sign-up request to the secondary device agent 1001B by sending a push message from a network push message server. In some embodiments, the network system secures the network push message server by executing a push message link establishment process in which the network push message server obtains a device credential and, in cooperation with the secondary device 100B, establishes an encrypted link.

In some embodiments, a network system receives a secondary device multi-device service plan sign-up request from a master device agent 1001A on a master device 100A.

In some embodiments, the network system communicates information about the secondary device multi-device service plan sign-up request to a secondary device agent 1001B on a secondary device 100B. In some embodiments, the network system obtains a response to the information about the secondary device multi-device service plan sign-up request from the secondary device agent 1001B. In some embodiments, if the response indicates that the secondary device service plan sign-up request is granted or acknowledged, the network system provides a provisioning instruction to a wireless access network accounting system to account service usage associated with the secondary device 100B to the master service account. In some embodiments, the network system obtains a device credential associated with the master device 100A in association with the response. In some embodiments, the network system obtains a device credential associated with the secondary device 100B in association with the response. In some embodiments, the network system includes a secure message link server that communicates the information about the secondary device multi-device service plan sign-up option response message or request message to the master device agent 1001A. In some embodiments, the network system includes a network push message server and the secure link comprises a secure push message link, and the network system communicates the information about the secondary device multi-device service plan sign-up option response message or request message to the master device agent 1001A by sending a push message from a network push message server. In some embodiments, the network system secures the network push message server by executing a push message link establishment process in which the network push message server obtains a device credential and, in cooperation with the master device 100A, establishes an encrypted link.

In some embodiments, a master device 100A comprises one or more device agents 1001A that present a user interface message offering to associate a secondary device 100B with a master service account, device group, or multi-device service plan. In some embodiments, the one or more device agents 1001A obtain an affirmative user response to the user interface message. In some embodiments, the one or more device agents 1001A obtain a secondary device credential and send an indication of the affirmative user response and the secondary device credential to a network element. In some embodiments, the one or more device agents 1001A obtain the secondary device credential from a user input obtained through the master device 100A user interface. In some embodiments, the one or more device agents 1001A obtain secondary device credential by communicating with the secondary device 100B through, for example, the first wireless network, Bluetooth, near-field communication, an object presented on the secondary device 100B user interface and captured by the master device 100A (for example, by a camera), an encoded sound signal, etc. In some embodiments, the one or more device agents 1001A obtain a user credential and send the user credential to the network element. In some embodiments, the one or more device agents 1001A obtain a master device credential and send the master device credential to the network element. In some embodiments, the one or more device agents 1001A obtain an indication of a user-established limit on service usage for the secondary device 100B. In some embodiments, the one or more device agents 1001A send information about the user-established limit on service usage to the network element. In some embodiments, the one or more device agents 1001A obtain a user-established permission level associated with the secondary device 100B. In some embodiments, the one or more device agents 1001A send information about the user-established permission level to the network element. In some embodiments, the one or more device agents 1001A obtain at least a portion of the user interface message offering to associate a secondary device 100B with a master service account, device group, or multi-device service plan from memory on the master device 100A. In some embodiments, the one or more device agents 1001A obtain at least a portion of the user interface message offering to associate a secondary device 100B with a master service account, device group, or multi-device service plan from a network element. In some embodiments, the network element is a website or a portal.

In some embodiments, a device 100A comprises one or more agents that present a user interface message offering an option to provide monetary credit (e.g., money or an equivalent) to a secondary device 100B. In some embodiments, the one or more agents accept a user response to the offer and provide the user response to a network element (e.g., by sending the user response to the network element).

In some embodiments, a network system communicates over a secure link with a master device agent 1001A on a master device 100A. In some embodiments, the network system obtains a request to provide monetary credit to a secondary device 100B. In some embodiments, the request includes a master user credential and a secondary credential identifying the secondary device 100B. In some embodiments, the network system determines if the master user credential is associated with the secondary credential, and, if it is, the network system provisions a monetary accounting system to provide monetary credit to the secondary device 100B.

In some embodiments, a device comprises one or more agents configured to present a user interface (UI) message offering an option to provide access usage credit to a secondary device 100B, accept a user input in response to the offer, and communicate the user input to a network element.

In some embodiments, a network system communicates over a secure link with a master device agent 1001A on a master device 100A. In some embodiments, the network system obtains a request to provide service usage credit to a secondary device 100B. In some embodiments, the network system obtains the request from the master device agent 1001A over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service usage accounting system to provide service usage credit to the secondary device 100B.

In some embodiments, a device system comprises one or more agents configured to present a user interface (UI) message offering an option to provide control of at least an aspect of a secondary device service permission level, obtain a user response to the offer, and communicate the user response to a network element.

In some embodiments, a network system communicates over a secure link with a master device agent 1001A on a master device 100A. In some embodiments, the network system obtains a request to control at least an aspect of a secondary device service permission level. In some embodiments, the network system obtains the request from the master device agent 1001A over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service permission control system to control the at least an aspect of the secondary device service permission level.

In some embodiments, a device system comprises one or more agents configured to present a user interface (UI) message offering an option to deny at least an aspect of a secondary device service permission level, obtain a user response to the offer, and communicate the user response to a network element.

In some embodiments, a network system communicates over a secure link with a master device agent 1001A on a master device 100A. In some embodiments, the network system obtains a request to deny at least an aspect of a secondary device service permission level. In some embodiments, the network system obtains the request from the master device agent 1001A over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service permission control system to deny the at least an aspect of the secondary device service permission level.

In some embodiments, a network system configures a notification regarding a secondary device usage level, wherein the notification to be delivered to a master device 100A. In some embodiments, the network system configures a usage level setting based on information from the master device 100A. In some embodiments, the network system configures the usage level setting based on information from website or portal. In some embodiments, the network system configures the usage level setting as part of a service plan provisioning interface.

In some embodiments, the usage level is associated with voice usage. In some embodiments, the voice usage is expressed in units of minutes. In some embodiments, the voice usage is expressed as a percentage of plan limit. In some embodiments, voice usage is expressed as a percentage of an allowance.

In some embodiments, the usage level is associated with text or SMS usage. In some embodiments, the text or SMS usage is expressed as a number of texts or SMS messages. In some embodiments, text or SMS usage is expressed as an object count. In some embodiments, text or SMS usage is expressed as a number of megabytes (MB). In some embodiments, text or SMS usage is expressed as a percentage of a plan limit. In some embodiments, a text or SMS usage is expressed as a percentage of an allowance (e.g., an allowance under a shared plan).

In some embodiments, the usage level is associated with data usage. In some embodiments, the data usage is expressed in MB. In some embodiments, the data usage is expressed as an amount of time. In some embodiments, the data is expressed as a percentage of a plan limit. In some embodiments, the data is expressed as a percentage of an allowance (e.g., an allowance under a shared plan).

In some embodiments, the usage level is for classification of data (e.g., a category of service activities less than all service activities available to the device). In some embodiments, the data classification usage expressed in MB. In some embodiments, the data classification is expressed as a usage during a period of time. In some embodiments, the data classification is expressed as a percentage of a plan limit. In some embodiments, the data classification is expressed as a percentage of an allowance (e.g., an allowance under a shared plan). In some embodiments, the classification of data is for one or more applications. In some embodiments, the classification is for one or more network end points. In some embodiments, the classification is for one or more voice services. In some embodiments, the classification is for one or more text messages or messaging services. In some embodiments, the classification is for one or more content types. In some embodiments, the classification is for roaming services (e.g., service usage while roaming, such as number of voice minutes used while roaming, amount of data used while roaming, etc.). In some embodiments, the classification is for home cellular network services (e.g., service usage while on a home cellular network, such as number of voice minutes used while roaming, amount of data used while roaming, etc.). In some embodiments, the classification is for Wi-Fi services (e.g., service usage while on one or more Wi-Fi networks, such as number of voice minutes used while on Wi-Fi networks, amount of data used while on Wi-Fi networks, etc.). In some embodiments, the classification is for one or more quality-of-service (QoS) levels or one or more QoS types. In some embodiments, the classification is for one or more traffic or content types (e.g., service usage for streaming video, service usage for streaming audio, service usage for a particular protocol, etc.). In some embodiments, the classification is for one or more time periods (e.g., service usage during the past day, week, month, etc.). In some embodiments, the classification is for one or more geographic areas or physical locations (e.g., service usage in Santa Clara County, service usage at the office, service usage at home, etc.). In some embodiments, classification is for one or more application types (e.g., service usage associated with user applications, service usage associated with social networking applications, service usage associated with video applications, etc.). In some embodiments, the classification is for one or more websites. In some embodiments, the classification is for one or more website types. In some embodiments, the classification is for one or more of categories of service usage, such as, for example, voice, text, data, gaming, video, browsing, chat, shopping, maps, audio, etc.

In some embodiments, a master device comprises one or more agents configured to receive secondary device usage level message and present information about the secondary device usage levels through a master device user interface (UI).

In some embodiments, a network system compares a pre-determined secondary device service usage limit with a measured secondary device service usage level associated with a secondary device 100B associated with a secondary device credential. In some embodiments, the network system determines if the measured secondary device service usage level exceeds the pre-determined secondary device service usage limit. In some embodiments, if the limit is exceeded, the network system obtains (e.g., configures, retrieves, etc.) a secondary device service usage message associated with the secondary device service usage limit. In some embodiments, the network system determines a master device credential of a master device 100A that is associated with the secondary device 100B and sends the secondary device service usage message to a master device agent 1001A on the master device 100A identified by the master device credential.

In some embodiments, a master device 100A comprises one or more agents configured to receive a secondary device usage level message and present information from or determined based on the secondary device usage level message through a master-device user interface. In some embodiments, the secondary device usage level message indicates that secondary device 100B is out of usage allocation. In some embodiments, the secondary device usage level message indicates that secondary device 100B is nearing a condition where it will be out of usage allocation. In some embodiments, the one or more agents also present an option to modify (e.g., increase or decrease) secondary device usage permissions or limits. In some embodiments, the one or more agents accept a user response to the option to modify the secondary device usage permissions or limits. In some embodiments, the one or more agents send the user response to a network element.

In some embodiments, a network system determines a usage level for a secondary device 100B. In some embodiments, the network system determines if secondary device usage level satisfies a pre-determined condition. In some embodiments, if the secondary device usage level satisfies the pre-determined condition, the network system determines a master device 100A that is associated with the secondary device 100B. In some embodiments, the network system determines (e.g., configures, obtains, etc.) a secondary device usage level message associated with the pre-determined condition sends the secondary device usage level message to the master device 100A. In some embodiments, the usage level message includes an option to increase a usage allowance for secondary device 100B. In some embodiments, the network system also obtains a master user response to increase the secondary device usage allowance. In some embodiments, the network system receives the master user response from the master device 100A. In some embodiments, the network system provisions one or more network elements to as needed to increase the secondary device usage allowance.

In some embodiments, the network system receives a secure request from a master account holder to add a first device to a master service account, device group, or multi-device service plan. In some embodiments, the secure request comprises a master account holder credential and a first device credential. In some embodiments, the network system confirms the master account credential and, after confirming the master account credential, provisions a network access system to provide the service usage or attempted service usage over a first wireless access network that is associated with the first device credential to support the access permissions associated with the master service account, device group, or multi-device service plan. In some embodiments, the request to add the first device to the master service account, device group, or multi-device service plan is obtained from a device agent on the first device. In some embodiments, the request to add the first device to the master service account, device group, or multi-device service plan is obtained from a device agent on a second device. In some embodiments, the request to add the first device to the master service account, device group, or multi-device service plan is obtained from a website or portal. In some embodiments, provisioning includes associating the first device credential to the master service account, device group, or multi-device service plan. In some embodiments, provisioning includes de-assigning the first device credential from a pre-existing service plan. In some embodiments, access permissions include one or more permissions for categories of service usage established by the master account holder.

In some embodiments, a network system receives a secure request from a master account holder to add a first device to a master service account, device group, or multi-device service plan, the secure request comprising a master account holder credential and a first device credential. In some embodiments, the network system confirms the master account credential and provisions a network service usage accounting system to account service usage over a first wireless access network that is associated with the first device credential to the master account. In some embodiments, the request to add the first device to the master service account, device group, or multi-device service plan is obtained from a device agent located on the first device. In some embodiments, the request to add the first device to the master service account, device group, or multi-device service plan is obtained from a device agent located on a second device. In some embodiments, the request to add the first device to the master service account, device group, or multi-device service plan is obtained from a website or portal. In some embodiments, provisioning includes associating the first device credential to the master service account, device group, or multi-device service plan. In some embodiments, provisioning includes de-assigning the first device credential from a pre-existing service plan. In some embodiments, the request to add the first device to the master service account, device group, or multi-device service plan is obtained from a device agent on the first device. In some embodiments, the request to add the first device to the master service account, device group, or multi-device service plan is obtained from a device agent on a second device. In some embodiments, the request to add the first device to the master service account, device group, or multi-device service plan is obtained from a website or portal. In some embodiments, provisioning includes associating the first device credential to the master service account, device group, or multi-device service plan. In some embodiments, provisioning includes de-assigning the first device credential from a pre-existing service plan. In some embodiments, access permissions include one or more permissions for a category of service usage established by the master account holder.

In some embodiments, a network system obtains a secondary device access credit indication for a classification of service (e.g., a category of service usage) from a master device agent 1001A on a master device 100A and provisions an access control system to provide access credit for the classification of service for a secondary device 100B from a master device 100A, the classification of service less than all services available to the device. In some embodiments, the classification is for one or more applications. In some embodiments, the classification is for one or more network end points. In some embodiments, the classification is for one or more voice services. In some embodiments, the classification is for one or more text messages. In some embodiments, the classification is for one or more content types. In some embodiments, the classification is for roaming services. In some embodiments, the classification is for home cellular services. In some embodiments, the classification is for Wi-Fi services. In some embodiments, the classification is for one or more QoS levels or one or more QoS types. In some embodiments, the classification is for one or more traffic types. In some embodiments, the classification is for one or more time periods. In some embodiments, the classification is for one or more geographic areas or physical locations. In some embodiments, the classification is for one or more application types. In some embodiments, the classification is for one or more websites. In some embodiments, the classification is for one or more website types. In some embodiments, the classification is for one or more of voice, text, data, gaming, video, browsing, chat, shopping, maps, audio, etc.

In some embodiments, a network system obtains a secondary device access credit indication for a classification of service from a master account holder user interface (UI), the classification of service less than all services available to the device. In some embodiments, the master account holder UI is located on a master device 100A. In some embodiments, the master account holder UI comprises a website.

In some embodiments, the service controller 122 illustrated in FIG. 1 is the same as the sign-up request processor 9002 shown in FIGS. 198, 201, 203, 205, and 206. In some embodiments, the sign-up request processor 9002 is a function within service controller 122. In some embodiments, the sign-up request processor 9002 is co-located with the service controller 122. In some embodiments, the request to be added to the master service account, device group, or multi-device service plan is communicated to a network element, such as service controller 122 shown in FIG. 1 or the sign-up request processor 9002 shown in FIGS. 198, 201, 203, 205, and 206. In some embodiments, the request to be added to the master service account, device group, or multi-device service plan is communicated to a second device. In some embodiments, the second device is a master device 100A. In some embodiments, the master device 100A is the device associated with the primary service account holder (e.g., the subscriber who pays for the service). In some embodiments, the master device 100A is any device associated with the shared account that also has permissions to add additional devices or subscribers to the master service account, device group, or multi-device service plan. In some embodiments, the request to be added to the master service account, device group, or multi-device service plan is communicated over a wireless network. In some embodiments, the request to be added to the master service account, device group, or multi-device service plan is communicated over a wired network. In some embodiments, the request to be added to the master service account, device group, or multi-device service plan is communicated using a code or a unique display object presented through a user interface of the first device. In some embodiments, the request to be added to the master service account, device group, or multi-device service plan is communicated using an audio signal.

In some embodiments, the request to be added to the master service account, device group, or multi-device service plan includes a credential that provides for unique identification of the master service account, device group, or multi-device service plan. In some embodiments, the credential further includes a secure service plan information aspect (e.g., a password, a personal identification number, etc.) known only to a subscriber of the master service account, device group, or multi-device service plan. In some embodiments, the credential comprises information associated with an aspect of an account that is associated with the master service account, device group, or multi-device service plan.

In some embodiments, the first device includes a user interface, and the first device agent initiates the request to be added to the master service account, device group, or multi-device service plan based at least in part on a user input obtained through the user interface. In some embodiments, the user input includes information associated with at least one of: a credential that provides for unique identification of the first device; information that provides for identification of a user of the first device; information that provides for identification of a unique master service account, device group, or multi-device service plan; information that provides for identification of a user of a second device (e.g., a master device) that is associated with the master service account, device group, or multi-device service plan; and information that provides for identification of an account associated with the master service account, device group, or multi-device service plan.

In some embodiments, a first device agent installed on a first device is configured to communicate a request to add a second device to a master service account, device group, or multi-device service plan. In some embodiments, at least an aspect of the request is received from a network element, such as service controller 122 shown in FIG. 1 or the sign-up request processor 9002 shown in FIGS. 198, 201, 203, 205, and 206. In some embodiments, the request to add a second device to a master service account, device group, or multi-device service plan is communicated to a network element. In some embodiments, the request to add a second device to a master service account, device group, or multi-device service plan is communicated to the second device. In some embodiments, the first device is a master device, and the second device is a child device. In some embodiments, the first device is a child device, and the second device is a master device. In some embodiments, both the first device and the second device are master devices. In some embodiments, the request to be added to the master service account, device group, or multi-device service plan is communicated over a wireless network. In some embodiments, the request to be added to the master service account, device group, or multi-device service plan is communicated over a wired network. In some embodiments, the request to be added to the master service account, device group, or multi-device service plan is communicated using a code or a unique display object presented through a user interface of the first device. In some embodiments, the request to be added to the master service account, device group, or multi-device service plan is communicated using an audio signal.

In some embodiments, the request to add the second device to the master service account, device group, or multi-device service plan includes a credential that provides for unique identification of the first device, such as a subscriber identity module, a device identifier, a phone number, an IMSI, an MEID, or any other credential. In some embodiments, the request to add the second device to the master service account, device group, or multi-device service plan includes information that provides for identification of a user of the first device (e.g., a subscriber). In some embodiments, the request to add the second device to the master service account, device group, or multi-device service plan includes a credential that provides for unique identification of the first device, such as a subscriber identity module, a device identifier, a phone number, an IMSI, an MEID, or any other credential. In some embodiments, the request to add the second device to the master service account, device group, or multi-device service plan includes information that provides for identification of a user of the second device. In some embodiments, the request to add the second device to the master service account, device group, or multi-device service plan includes a credential that provides for unique identification of the second device. In some embodiments, the credential comprises a secure information aspect associated with the first device. In some embodiments, the credential comprises a secure information aspect associated with the second device. In some embodiments, the request to be added to the master service account, device group, or multi-device service plan includes information that identifies a user of the first device. In some embodiments, the request to be added to the master service account, device group, or multi-device service plan includes information that identifies a user of the second device.

In some embodiments, the request to be added to the master service account, device group, or multi-device service plan includes a credential that provides for unique identification of the master service account, device group, or multi-device service plan. In some embodiments, the credential also includes a secure service plan information aspect known only to a subscriber of the master service account, device group, or multi-device service plan (e.g., a password, a personal identification number, etc.). In some embodiments, the credential comprises information associated with an aspect of an account that is associated with the master service account, device group, or multi-device service plan (e.g., an account number, etc.).

In some embodiments, the first device includes a user interface, and the first device agent initiates the request to add the second device to the master service account, device group, or multi-device service plan based at least in part on a user input obtained through the user interface. In some embodiments, the user input includes information associated with at least one of: a credential that provides for unique identification of the first device; a credential that provides for unique identification of the second device; information that provides for identification of a user of the first device; information that provides for identification of a user of the second device; information that provides for identification of a unique master service account, device group, or multi-device service plan; and information that provides for identification of an account associated with the master service account, device group, or multi-device service plan.

In some embodiments, a first device agent installed on a first device is configured to communicate an acknowledgment to add a second device to a master service account, device group, or multi-device service plan. In some embodiments, the acknowledgment comprises a permission or a request acceptance. In some embodiments, the acknowledgment is based on a user response to a message presented through a user interface of the first device. In some embodiments, the first device agent is configured to present the message. In some embodiments, the message includes information obtained from a network element. In some embodiments, the network element is a website, a web page, a wireless application protocol (WAP) site, a portal server, a message server, or an access network policy interface.

In some embodiments, the first device agent receives, from a network element, information associated with a second device's request to share a service plan. In some embodiments, the first device agent presents a message based on the information associated with the second device's request to share a service plan through a user interface of the first device, obtains a user response, and generates the acknowledgment based on the user response. In some embodiments, the network element is a website, a web page, a wireless application protocol (WAP) site, a portal server, a message server, or an access network policy interface.

In some embodiments, the first device agent receives, from a second device, information associated with another device's request to share a service plan. In some embodiments, the first device agent presents a message based on the information associated with the another device's request to share a service plan through a user interface of the first device, obtains a user response, and generates the acknowledgment based on the user response.

In some embodiments, a first device agent installed on a first device is configured to communicate an acknowledgment to add the first device to a master service account, device group, or multi-device service plan. In some embodiments, the acknowledgment comprises a permission or a request acceptance. In some embodiments, the first device agent assists in presenting a message through a user interface of the first device, the message being configured to seek the acknowledgment. In some embodiments, the acknowledgment is configured to assist in enrolling the first device in a master service account, device group, or multi-device service plan. In some embodiments, the message includes information obtained from a network element. In some embodiments, the network element is a website, a web page, a wireless application protocol (WAP) site, a portal server, a message server, or an access network policy interface.

In some embodiments, the first device agent receives, from a network element, information associated with a second device's request to share a service plan. In some embodiments, the first device agent presents a message based on the information associated with the second device's request to share the service plan through a user interface of the first device, obtains a user response, and generates the acknowledgment based on the user response. In some embodiments, the network element is a website, a web page, a wireless application protocol (WAP) site, a portal server, a message server, or an access network policy interface.

In some embodiments, the first device agent receives, from a second device, information associated with another device's request to share a service plan. In some embodiments, the first device agent presents a message based on the information associated with the another device's request to share the service plan through a user interface of the first device, obtains a user response, and generates the acknowledgment based on the user response.

In some embodiments, a network element (e.g., service controller 122 shown in FIG. 1 or the sign-up request processor 9002 shown in FIGS. 198, 201, 203, 205, and 206) is configured to accept, from a first device agent on a first device, a request to be added to a master service account, device group, or multi-device service plan. In some embodiments, the network element confirms a secure information aspect associated with the request, and, after confirming that the secure information aspect is consistent with a device that is to be added to the master service account, device group, or multi-device service plan, configures one or more network service policies to add the first device to the master service account, device group, or multi-device service plan. In some embodiments, the secure information aspect comprises at least one of: a credential that provides for unique identification of the first device; information that provides for identification of a user of the first device; information that provides for identification of a unique master service account, device group, or multi-device service plan; information that provides for identification of a user of a second device that is associated with the master service account, device group, or multi-device service plan; and information that provides for identification of an account associated with the master service account, device group, or multi-device service plan. In some embodiments, an aspect of the request is communicated to a second device agent installed on a second device, and an aspect of the secure information aspect associated with the request is associated with a user input obtained by the network element from the second device agent (e.g., communicated by the second device agent).

In some embodiments, the network element configures the one or more network service policies to add the first device to the master service account, device group, or multi-device service plan by provisioning a device service usage accounting system to identify service usage associated with the first device and account the identified first device service usage to the master service account, device group, or multi-device service plan. In some embodiments, the network element configures the one or more network service policies to add the first device to the master service account, device group, or multi-device service plan by provisioning a device access service policy system to identify attempted or successful network service activity associated with the first device and to apply a set of one or more access control policies associated with the master service account, device group, or multi-device service plan to the identified attempted or successful network service activity associated with the first device.

In some embodiments, the network element configures the one or more network service policies to add the first device to the master service account, device group, or multi-device service plan by provisioning a device access service notification system to identify attempted or actual network service activity associated with the first device and to apply a set of one or more access service notification policies associated with the first device and to apply a set of one or more access service notification policies associated with the multi-device service plan to cause a multi-device service plan notification to be presented through the first device's user interface.

In some embodiments, the aspect of the request that is communicated to a second device agent installed on a second device comprises an indication that a user of the first device desires to add the first device to the master service account, device group, or multi-device service plan, and the aspect of the secure information associated with the request that is communicated from the second device to the network element comprises an indication that a user of the second device approves enrollment of the second device in the master service account, device group, or multi-device service plan.

In some embodiments, a first device includes a user interface, and a device agent on the first device presents a breakdown of usage of a shared or assigned service plan through the user interface. In some embodiments, the breakdown of service usage includes a first subset of a shared service plan and a second subset of the shared service plan. In some embodiments, the first subset is associated with the first device, and the second subset is associated with a second device. In some embodiments, neither the first subset nor the second subset is associated with the first device. In some embodiments, the breakdown of service usage includes a characterization of the service activities that are generating service usage for the second subset. In some embodiments, the device agent is configured to accept user inputs to specify alert conditions for assisting in creating user interface alert messages when the service usage for the second subset of the shared device plan usage associated with the second device satisfies a condition. In some embodiments, the condition is based on an input from a user of the first device. In some embodiments, the second subset includes a characterization of at least a portion of the device activities responsible for at least a portion of the service usage of the second device. In some embodiments, the first device agent is configured to specify a policy limit on the service activities that are generating service usage for the second subset. In some embodiments, the policy limit specifies a limit on voice service usage. In some embodiments, the policy limit specifies a limit on data service usage. In some embodiments, the policy limit includes a limit on a subset of service activities less than all service activities available to the second device. In some embodiments, the policy limit includes a limit on service usage while the second device is roaming. In some embodiments, the policy limit includes a limit on cellular wireless services. In some embodiments, the policy limit includes a limit on Wi-Fi access.

In some embodiments, a first device includes a user interface, and a device agent on the first device is configured to present, through the user interface, a message configured to present a service policy management option associated with a second device's use of a shared or assigned service plan. In some embodiments, the message includes at least an aspect that is obtained from a network element. In some embodiments, the message includes at least an aspect that is stored locally on the first device. In some embodiments, the network element is a website, a web page, a wireless application protocol (WAP) site, a portal server, a message server, or an access network policy interface. In some embodiments, the message is pushed to the first device by a network element.

In some embodiments, the service policy management option is a service permission. In some embodiments, the service policy management option is a service allowance. In some embodiments, the first device agent assists in obtaining, through the user interface, a user input indicating that a user of the first device desires to implement the presented service policy management option. In some embodiments, the first device agent assists in causing the service policy management option to be implemented to govern, at least in part, one or more service policies of the second device. In some embodiments, the first device agent assists in causing the service policy management option to be implemented by providing information to a network element configured to implement the service policy management option. In some embodiments, the first device agent assists in causing the service policy management option to be implemented by providing information to a second device agent installed on the second device, the second device agent being configured to implement the service policy management option. In some embodiments, the first device agent assists in causing the service policy management option to be implemented by communicating information that causes a second device agent on the second device to implement the service policy management option.

In some embodiments, the service policy management option comprises an indication or acknowledgment that the second device is authorized to use wireless access services in accordance with access service policies associated with the master service account, device group, or multi-device service plan.

In some embodiments, the service policy management option comprises an indication or acknowledgment that the second device is authorized to use less than all of a total service allowance provided for under the service policies associated with a multi-device (e.g., shared, shareable, assignable, or assigned) service plan. In some embodiments, the less than all of the total service allowance is less than the entire allowance provided for under the service policies associated with the multi-device service plan. In some embodiments, the less than all of the total service allowance specifies a service usage limit. In some embodiments, the limit is expressed as a percentage. In some embodiments, the limit is expressed as an amount of a resource. In some embodiments, the less than all of the total service allowance specifies an allowance for a set of one or more service activities, the set of one or more device service activities being less than all service activities available to the second device. In some embodiments, the less than all of the total service allowance specifies a time period during which the second device is authorized for one or more services. In some embodiments, the less than all of the total service allowance specifies a time period during which the second device is authorized for a set of one or more service activities less than all service activities available to the second device. In some embodiments, the set of one or more service activities includes one or more emergency services (e.g., the ability to place an outgoing call to an emergency number, the ability to send an outgoing text to a specified emergency number, etc., where the emergency number is not necessarily a public services emergency number but could instead be a number associated with a parent or another trusted entity). In some embodiments, the set of one or more service activities includes communication with a subset of devices, the subset of devices less than all devices the second device is capable of communicating with. In some embodiments, the less than all of the total service allowance is network-dependent (e.g., there is one allowance when the second device is communicating over a cellular network and another, potentially different, allowance when the second device is communicating over a Wi-Fi network, or there is one allowance when the second device is communicating over a roaming network and another, potentially different, allowance when the second device is communicating over a home network, etc.). In some embodiments, the less than all of the total service allowance is associated with service policies that apply to more than one wireless network (e.g., the service policies apply whether the second device is connected to a roaming network or a home network, or the service policies apply whether the second device is connected to a cellular network or a Wi-Fi network, etc.).

In some embodiments, the less than all of the total service allowance specifies a time period during which the second device is to be de-authorized for service. In some embodiments, one or more service policies governing service usage in the de-authorized state provide for access to one or more emergency services (e.g., the ability to place an outgoing call to an emergency number, the ability to send an outgoing text to a specified emergency number, etc., where the emergency number is not necessarily a public services emergency number but could instead be a number associated with a parent or another trusted entity) while the second device is in the de-authorized state. In some embodiments, one or more service policies governing service usage in the de-authorized state provide for communication with a subset of devices while the second device is in the de-authorized state, the subset of devices being less than all devices the second device is capable of communicating with (e.g., the second device may communicate with a first parent's device but not with a sibling's device). In some embodiments, the one or more service policies governing service usage in the de-authorized state are network-dependent (e.g., the service policies in effect when the second device is connected to a roaming network are different from the service policies in effect when the second device is connected to a home network, or the service policies in effect when the second device is connected to a cellular network are different from the service policies in effect when the second device is connected to a Wi-Fi network, etc.). In some embodiments, the one or more service policies governing service usage in the de-authorized state apply to more than one wireless network (e.g., the service policies apply whether the second device is connected to a roaming network or a home network, or the service policies apply whether the second device is connected to a cellular network or a Wi-Fi network, etc.).

In some embodiments, the less than all of the total service allowance specifies a time period during which the second device is to be de-authorized for a set of one or more service activities, the set of one or more service activities less than all service activities available to the second device (e.g., in the de-authorized state, the second device may make phone calls to one or more numbers (e.g., an emergency number), but the second device may not stream video or use one or more applications or access one or more network destinations).

In some embodiments, the less than all of the total service allowance includes a first service allowance and a second service allowance, the first service allowance providing information to govern an aspect of a service policy for a first set of one or more service activities, the first set of service activities less than all service activities available to the second device, and the second service allowance providing information to govern an aspect of a service policy for a second set of one or more service activities. In some embodiments, the first service allowance allows one or more services associated with the first set of one or more service activities, and the second service allowance blocks one or more services associated with the second set of one or more service activities.

In some embodiments, the policy management option comprises a policy setting. In some embodiments, the policy setting is applicable to more than one wireless network that the second device is capable of connecting to (e.g., the policy setting applies whether the second device is connected to a cellular network or a Wi-Fi network). In some embodiments, the policy setting has at least an aspect that changes depending on the type of network the second device is connected to (e.g., the policy setting has a first aspect when the second device is connected to a cellular network and a second aspect when the second device is connected to a Wi-Fi network, or the policy setting has a first aspect when the second device is connected to a roaming network and a second aspect when the second device is connected to a home network, etc.).

In some embodiments, the device agent is configured to receive a message indicating a service condition exists for the second device. In some embodiments, the service condition is an "out of allowance" condition (e.g., the second device has exhausted a usage allowance, etc.). In some embodiments, the service condition is an indication that a particular amount or percentage of service usage has occurred. In some embodiments, the service condition is an indication that a particular service activity that is not allowed under the current service policy settings for the second device has been attempted by the second device. In some embodiments, the service condition is an indication that a user of the second device desires a particular service activity that is not allowed under the current service policy settings for the second device. In some embodiments, the first device includes a user interface, and the device agent is configured to present, through the user interface, a service-condition notification including information about the service condition. In some embodiments, the first device includes a user interface, and the device agent is configured to present, through the user interface, an option to modify a service policy associated with the second device in response to the service-condition notification.

In some embodiments, the multi-device (e.g., shared or assigned) service plan comprises a set of one or more service policies that govern at least an aspect of wireless network access permissions for one or more wireless access networks, and wherein the set of one or more service policies is capable of supporting wireless access services for a plurality of wireless devices.

In some embodiments, a network system is configured to provide a user interface to a service account owner or a manager of a master service account, device group, or multi-device service plan, wherein the user interface presents a user option to include a mobile device in the master service account, device group, or multi-device service plan, the mobile device not having been included in the master service account, device group, or multi-device service plan when the mobile device was initially purchased or activated. In some embodiments, the network system accepts a user input comprising an instruction to add the mobile device to the master service account, device group, or multi-device service plan. In some embodiments, the network system determines whether the mobile device is already associated with a pre-existing service plan provided by a particular mobile operator. In some embodiments, if the device is associated with a pre-existing service plan provided by the particular mobile operator, the network system provisions the mobile device to be de-activated from the pre-existing service plan and added to the master service account, device group, or multi-device service plan. In some embodiments, if the device is not associated with a pre-existing service plan provided by the particular mobile operator, the network system determines if the device requires a number port (e.g., the transfer of a phone number). In some embodiments, if the device is not associated with a pre-existing service plan provided by the particular mobile operator, and the device requires a number port, the network system communicates the number porting requirement to a number porting system queue in the network. In some embodiments, if the device is not associated with a pre-existing service plan provided by the particular mobile operator, and the device does not require a number port, the network system provisions the mobile device to be added to the master service account, device group, or multi-device service plan.

In some embodiments, the network system user interface is provided by a network element. In some embodiments, the network element is a website, a web page, a wireless application protocol (WAP) site, a portal server, a message server, or an access network policy interface. In some embodiments, the user interface is provided by communicating a user interface message to a device agent located on a mobile device (e.g., a master device). In some embodiments, the device agent is on a mobile device belonging to an account owner or account master for the master service account, device group, or multi-device service plan. In some embodiments, the mobile device accepts a user input. In some embodiments accepting the user input comprises accepting a user secure credential to authenticate the account owner or account master identity. In some embodiments, the mobile device belongs to a user who wishes to add the mobile device to a master service account, device group, or multi-device service plan, and accepting a user input comprises accepting a user secure credential to authenticate that the mobile device user has the permission of the multi-device service account owner or master to add the mobile device to the master service account, device group, or multi-device service plan. In some embodiments, accepting a user input includes accepting a user secure credential to authenticate the account owner or account master identity.

Managing Service User Discovery and Service Launch Object Placement on a Device

As the number and types of services on a mobile wireless communication device increase, it becomes increasingly important to differentiate the services and types of service to users in a way that users can easily understand, access, and launch. In some embodiments, device users can avail themselves of one or more of bite-sized bulk data plans, application-specific data plans, and sponsored data plans (for example, plans that are free to the end user because they are paid for by third-party sponsors who make money when users use their over-the-top service or application).

FIG. 3, as described above, illustrates a management system 10601 that supports service user discovery and service launch object placement on a mobile wireless communication device 100 in accordance with some embodiments. In some embodiments, the management system 10601 communicates with one or more mobile wireless communication devices 100 over a network 1100 coupled to one or more of network service 120-1, application download server 140-1, device management system 170-1, and mobile wireless communication device 100. In some embodiments, mobile wireless communication device 100 includes a user interface (UI) location manager 132-1, a UI agent 134-1, a UI 101 and device services 138-1. In some embodiments, the device management system 170-1 includes a UI location management server 150-1, a UI location management console 160-1 and an accounting database 180-1.

In some embodiments, the management system 10601 includes additional or fewer functions than those shown in FIG. 3. For example, in some embodiments, management system 10601 does not include network service 120-1. In some embodiments, management system 10601 does not include an application download server 140-1. In some embodiments, a device management system 170-1 does not include an accounting database 180-1. In some embodiments, functionality of a device management system 170-1 is split across two entities, for example, a service provider and a third party. In some embodiments, the application download server 140-1 and the device management system 170-1 functions are combined. In some embodiments, the application download server 140-1 and the network service 120-1 functionality is managed by the same entity (e.g., a service provider or a third party). In some embodiments, the mobile wireless communication device 100 does not include device services 138-1 or does not include UI agent 134-1. In some embodiments, two or more of the functionalities shown in FIG. 3 are combined into a single function. For example, UI agent 134-1 and UI location manager 132-1 can be combined.

In some embodiments, the device management system 170-1 defines the location in a device UI 101 where a service launch object is placed to aid in managing the manner in which a user discovers the network service 120-1 or device service 138-1 (for example, an application) and launches it. In some embodiments, the UI location manager 132-1 uses information associated with a service launch object (for example, metadata) to instruct the UI agent 134-1 where to locate the service launch object in the device UI 101.

In some embodiments, a UI location management service provider entity utilizes the apparatus shown in FIG. 3 to increase (for example, to optimize) the discovery level for one or more service launch objects on a mobile wireless communication device 100 or a group of mobile wireless communication devices 100 with UI location (for example, placement) and notification messaging functions managed by a device-based UI location manager 132-1. In some embodiments, a device-based UI location manager 132-1 is further managed by the device management system 170-1. In some embodiments, the UI location management service provider is a carrier (for example, a network access carrier or a service provider) of access services who has control of the UI location management system. In some embodiments, the carrier of access services may be a network access carrier (for example, a wireless network carrier such as Vodafone, Verizon, or AT&T, or a cable network carrier such as Comcast, etc.). In some embodiments, the UI location management service provider is a third party who provides the location management (for example, an application store or marketplace provider such as Apple or Android/Google, a search services entity such as Google or Bing, or a third-party UI location management entity, etc.). In some embodiments, the third party who provides the location management does not control or own the network access assets (for example, an application store or marketplace provider such as Apple or Android/Google, a search services entity such as Google or Bing, or a third-party UI location management entity, etc.). In some embodiments, it is advantageous for a carrier or application store/marketplace provider to be the UI location management service provider. In some embodiments, an entity that controls the UI location management system shown in FIG. 1 controls the UI location management service and therefore controls the discovery level for one or more service launch objects on one or more mobile wireless communication devices 100. In some embodiments, the mobile wireless communication device 100 is part of a device group.

In some embodiments, the service launch object is an object on a device UI 101 that a user of the mobile wireless communication device 100 or a network entity (for example, device management 170-1, service provider, carrier, etc.) can select (for example, "click on," "open," "launch," etc.) to initiate a network service 120-1 or device service 138-1. In some embodiments, the network service 120-1 or device service 138-1 is a service or an application. In some embodiments, initiating network service 120-1 or device service 138-1 provides (for example, by launching, initiating, streaming, playing, presenting, displaying, purchasing, downloading, or preloading) a content (for example, a video or movie or audio), or a software, or a software download, or software update. In some embodiments, selection of the service launch object initiates the network service 120-1 or device service 138-1 by launching an application that is associated with the service launch object; or directing an application (for example, as a browser or portal application) to a particular network destination that is associated with the service launch object; or opening a folder with one or more additional service launch object choices for the user to select from; or providing the user with a notification regarding service status or service plan permissions for this service; or providing the user with payment or service account configuration options to enable the service. In some embodiments, selection of the service launch object initiates the network service 120-1 or device service 138-1 by launching a purchase experience or a purchasing environment. In some embodiments, selection of the service launch object initiates providing a user of the mobile wireless communication device 100 with means to download an application from the application download server 140-1 and launch the network service 120-1 or device service 138-1. In some embodiments, the service launch object is an Android "APK" (i.e., an application package) comprising an application and additional associated information, for example, information about an icon (for example, a graphic or location) associated with a service or an application. In some embodiments, a service launch object icon is one or more of a graphic, a text string, a UI user entry field or any other means for the user to choose to activate a service launch object.

In some embodiments, service launch object discovery level refers to the level of priority a service launch object receives relative to gaining the device user's attention in order to encourage selection or launch a service or application associated with the service launch object. In some embodiments, a high discovery level corresponds to a premium UI location for the service launch object (for example, the service launch object is placed in a prominent UI service launch partition, a home screen, or a permanent launcher bar). In some embodiments, a high discovery level also includes or is indicated by one or more of highlighted service launch object icon features (wherein icon features include one or more of size, orientation, color, texture, persistence, transparency, foreground/background presence, skin, wallpaper, etc.) or prominent or frequent service launch object notification messages. In some embodiments, a low discovery level is characterized by a less prominent service launch object UI location or less prominent service launch object notification messaging. In some embodiments, a low discovery level includes one or more of: a service launch object location in the device application stable, a service launch object on an application store/marketplace location, a service launch object without notification messaging, and a one time notification message the first time the service launch object icon is displayed to the user.

In some embodiments, the management system provides for remote management of location and modification of appearance for a service launch object icon. In some embodiments, a service launch object icon is the graphic shown on the device UI screen that represents the service or application (which may include a content or purchase experience) associated with the service launch object. In some embodiments, the service launch object icon is positioned on a touch screen in the location that launches the service or application associated with the service launch object when the user touches it.

In some embodiments, the management system 10601 provides for remote management or modification of a service launch object notification message. In some embodiments, a service launch object notification message is a targeted user notification message that a user can observe (for example, see or hear) as associated with (or integral to) a particular actionable service launch object because the service launch object notification message is placed in, on, touching or in close proximity to the service launch object icon. In some embodiments, this kind of integral service launch object notification message requires management of how or when or where the notification message is displayed in the device UI. In some embodiments, the service launch object display location is based on (for example, targeted for, or optimized for) each service launch object or must be mapped for each service launch object and service launch object message pair. In some embodiments, association of a notification message with an actionable (for example, "clickable") service launch object icon on the device allows for targeted or specific user messaging about various aspects of an available service or application in a manner that does not require the user to search for an icon to act on, nor does the user need to do further research on what an actionable icon offers the user experience. In some embodiments, an advantage of the management system 10601 is the remote management of service launch object notification messages that are (easily) recognized or acted on by the user by virtue of the association of the notification message and the actionable service launch object icon. In some embodiments, an additional advantage of the management system 10601 is that multiple notification messages for multiple actionable service launch objects may be sent to the device (for presentation to a user) preventing the user from becoming confused about which service launch object notification message goes with which service launch object.

In some embodiments, different types of service launch objects are placed in a common device UI service launch partition in the device UI 101 to aid the user in understanding that one or more service launch object associated with network service 120-1 or device service 138-1 represented in that UI service launch partitions are related or of similar type. In some embodiments, the placement of the service launch object within the UI service launch partitions is specified in the device management system 170-1. In some embodiments, the device management system 170-1 provides a UI location where a service launch object is desired to be placed, and the UI location manager 132-1 translates that location into device UI 101 configuration to position the service launch object icon in the desired UI location.

In some embodiments, multiple device UI service launch partitions are used to identify multiple groups of service launch objects. In some embodiments, the device management system 170-1 specifies the one or more UI service launch partitions in which a service launch object is to be displayed.

In some embodiments, the device management system 170-1 specifies that a service launch object is to be placed in a location on a device UI 101, with the location being one or more of a UI service launch partition, a device main screen, a device secondary screen, a device permanent launch area, a device application stable, a device file system location, an application download server, or other division.

In some embodiments, a network service 120-1 is sponsored on a user's service plan, and it is difficult or inconvenient for the user to remember the website and enter it. In some embodiments, the ability to dynamically configure a device application (such as a browser, a portal application, a dedicated application such as a social network application, a search application, a maps or location application, a voice or chat application, media streaming application, music application, content viewing or purchase application, shopping application, driving directions application, service plan selection or configuration application, service usage reporting application, a gaming application, a weather application, an email application, a widget, or another service related application, etc.) with the proper destination, associate this configured application with a service launch object icon representing the sponsored network service 120-1, and place the service launch object icon in a convenient location on the device UI 101, provides the user with means to more easily "discover" or "launch" the sponsored network service 120-1. In some embodiments, a sponsored device service 138-1 is difficult of inconvenient for the user to remember and the management system performs one or more of the following: dynamically configure a device application with the proper destination, associate this configured application with a service launch object icon representing the sponsored device service 138-1, place the service launch object icon in a convenient location on the device UI 101, provide the user with means to more easily "discover" or "launch" the sponsored device service 138-1.

In some embodiments, the service provider (such as a wireless carrier) may have a new service plan that the carrier desires the user to "discover" by trying. In some embodiments, the service provider could configure a "try before buy" service plan wherein a "sample service" with shorter time span is provided or wherein the cost for service is less expensive for a period of time. The service provider can then configure or place a service launch object in a location on the device UI 101 where the user is likely to discover it.

In some embodiments, the service provider (for example, a wireless service provider, application store or application marketplace service provider, etc.) may provide means to specify where a given service launch object is placed on a device UI 101, and charge the application provider or service provider for the UI placement in accordance to the value of the placement. In some embodiments, placement in the application store or marketplace may be free. In some embodiments, placement in the on-device application stable might have lower cost, placement on one of the secondary device screens might be more expensive, placement in a UI service launch partition might cost even more, placement on the device main screen might be yet more expensive, and placement in the permanent launch area might be most expensive of all. It should be understood that the actual hierarchy of pricing may be configured by the service provider. In some embodiments, the hierarchy of pricing is be configured by the service provider or the device management system 170-1.

In some embodiments, the device management system 170-1 includes an accounting database 180-1 to associate the placement of a service launch object on a device UI 101 with a billing rate for the application provider or service provider or sponsor associated with the service launch object.

In some embodiments, the device UI discovery location is the portion of the device UI 101 in which a service launch object resides. In some embodiments, there is a single UI service launch partition (or folder or organization) with service launch objects within it. FIGS. 207 through 213 illustrate example embodiments with multiple partitions for service launch objects. FIG. 207 illustrates a screen 16000 having a multiple partition UI service launch partition where two or more types of services each have a UI service launch partition that makes it clear to the user which type of service a given service launch object resides in. FIG. 207 shows a two-partition UI service launch partition shown on a secondary device screen (e.g., the second device screen from the right as indicated by the single dot on right and three dots on left). In FIG. 207, the service launch object UI location specifies the partition or the location within the partition of several service launch object icons.

FIG. 208 illustrates a main device screen 16050 with service launch objects (labeled "Paid Data" and "Free Data"). FIGS. 209 and 210 illustrate secondary device screens 16100 and 16150 respectively accessible, for example, by selecting the "Paid Data" and "Free Data" icons of FIG. 208. FIG. 211 illustrates a device "quick launch" or "permanent launch" UI area. FIG. 213 illustrates a device application stable 16300. In addition, in some embodiments, service launch objects reside in a device marketplace, application store, website or network server.

In some embodiments, the portion of the device UI reserved for one or more service launch objects is identified by a differentiating characteristic or attribute. In some embodiments, the differentiating characteristic to identify the portion of the UI is defined by or characterized by one or more of: a color, a wallpaper, a transparency, a wall, a window, a texture, and a border. In some embodiments, different portions of a UI are classified into tiers (or, alternatively, classes or levels, etc.), and each of the classified sub-portions is differentiated by variations of one or more of: color, wallpaper, transparency, walls, windows, textures, borders, and a plurality of screens.

In some embodiments, the partitioned UI service launch partition portion provides for two or more UI service launch partitions that indicate to the user that the service launch objects in a given service launch partition are members of a type of service. In some embodiments, a service launch partition includes displaying user options for service launch objects for "default" sponsored network services, websites, applications or content. In some embodiments, default sponsored network services, websites, applications or content are subsidized by a service provider or third party. The term "default" refers to services that are pre-configured by a service provider, device original equipment manufacturer (OEM), operating system (OS) provider or third party. In some embodiments, a service launch partition displays user options for service launch objects for "user selected sponsored services," wherein the user selects from available sponsored service options and once the service option is selected by the user then the service launch object appears in the service launch partition. In some embodiments, the user is enabled to select a certain number of sponsored service options out of a larger list of sponsored service user options. In some embodiments, a service launch partition includes displaying user options for service launch objects for paid services that the user has elected to sign up for. In some embodiments, a service launch partition includes displaying user options for service launch objects for services, sponsored or paid, that the user has not yet elected to sign up for but are available to the user. In some embodiments, each of the two or more service launch partitions in the multi-partition UI service launch partition application (or widget) has text or graphics indicating to the user the type of service for one of more of the multiple partitions. In some embodiments, the device UI discovery location is a UI location within the partitioned service object launcher, and the service launch object UI location also specifies the partition or the location within the partition.

In some embodiments, a service plan or a service plan bundle is specified in a service design environment (wherein the "service design environment" may include a service design center, a service design platform, a service design management system, etc.). In some embodiments, the service design environment comprises associating the network service 120-1 or device service 138-1 with one or more service launch objects. In some embodiments, the service launch object includes one or more of an icon (graphic), a software application, a folder or similar collection of additional service launch objects, a network destination or a network communication end point, one or more notification message sequences or information, and service selection options. In some embodiments, the service design environment allows an entity to choose the device discovery UI location for the network service 120-1 or device service 138-1. In some embodiments, the device discovery UI location is one or more of service launcher application UI, partitioned service object launcher application UI, main device screen or a secondary device screen, quick launch area, permanent launch area, device application stable, device marketplace, application store, website or network server. In some embodiments, the service design environment allows the specification of where to preload an application if the application is not already loaded on the mobile wireless communication device 100 so that the application may be available the first time the user selects the network service 120-1 or device service 138-1. In some embodiments, the specification is formatted into a set of instructions for a network server that communicates with the UI location manager 132-1 on the mobile wireless communication device 100. In some embodiments, the set of instructions provides a service launch object with configuration or placement or message information that instructs the UI location manager 132-1 on the mobile wireless communication device 100 where to locate the service launch object in the device UI 101 or how to provision the service launch object so that it properly launches or instructs the user when the user selects the launch object. In some embodiments, the service launch object configuration or placement or message information can specify a network server destination where UI location manager 132-1 on the mobile wireless communication device 100 is to fetch one or more of the required service launch object parameters.

In some embodiments, mobile wireless communication device 100 receives a service launch object configuration or placement or message information from a network server. In some embodiments, mobile wireless communication device 100 identifies the portion of the service launch object configuration or placement or message information that specifies the device UI 101 location for the service launch object. In some embodiments, mobile wireless communication device 100 installs the service launch object icon in the device UI 101 location. In some embodiments, mobile wireless communication device 100 associates the service launch object icon with the service launch object that will initiate the network service 120-1 or device service 138-1 when the user selects the service launch object icon.

In some embodiments, the service launch object requires an application to launch the network service 120-1 or device service 138-1. In some embodiments, the mobile wireless communication device 100 is configured to search the available applications on the mobile wireless communication device 100, detect that a required application is not present on the mobile wireless communication device 100 and preload it prior to the user selecting to launch the network service 120-1 or device service 138-1 associated with the service launch object. In some embodiments, the mobile wireless communication device 100 is configured to detect that the required application is not present and then automatically download the application when the user first selects the service associated with the service launch object. In some embodiments, the mobile wireless communication device 100 is configured to detect that the required application is not present on the mobile wireless communication device 100 and offer the user the option to download the application when the user first selects the network service 120-1 or device service 138-1 associated with the service launch object. In some embodiments, wherein mobile wireless communication device 100 downloads or preloads application, the mobile wireless communication device 100 can either download the application from a pre-defined application download server 140-1 or can download it from a location specified in the service launch object placement instruction message.

In some embodiments, the service launch object is further configured to include notification messages that are displayed to the user when the user selects or first selects the service launch object icon. In some embodiments, the notification message includes information on how much the service costs or what the service allowances are. In some embodiments, the notification message involves service plan selection options that allow the user to elect to pay for a service, or allow the user to select a sponsored service. In some embodiments, notification messages may be handled by a UI agent 134-1.

In some embodiments, the UI location manager 132-1 automatically populates one or more of the service launch object, service launch object associated application, network destination specification or service launch object icon in the proper location in the device UI when user selects the network service 120-1 or device service 138-1.

In some embodiments, device network state information is used to define the state of one or more networks 1100 that the mobile wireless communication device 100 is connected to. Network state information includes one or more of the type of access connection to the network (for example, 4G wireless, 3G wireless, 2G wireless, Wi-Fi, cable, DSL, hot spot service provider, home LAN, corporate LAN, etc.), the list of available networks (for example, Wi-Fi and 3G, or 4G and corporate LAN, etc.), time of day, home vs. roaming carrier service provider status, network access cost (for example, service plan details and status), network congestion state, network quality-of-service (QoS) state, device data rate, device signal quality, and any other characteristic of the network.

Device usage state information (wherein information could comprise one or more of parameters, logs, history, etc.) provides information on the manner in which the device is used (for example, in the past, present or predicted future) by the device user. In some embodiments, device usage state information includes one or more of: the current or past state of service usage for one or more services, current or recent states of application usage for one or more selected applications, current or recent geographic locations, current or recent location searches, current or recent network destination history (websites, services, content, search terms, etc.), one or more applications currently being interacted with by the user, the current or recent network state, how long it has been since the user pressed one or more UI feedback elements on the device, whether an application is running in the foreground or background, etc. In some embodiments, the device can collect device usage state information (for example, collected by the UI location manager 132-1, or some other device agent). In some embodiments, the device usage state includes device cognitive state, wherein the device cognitive state includes information the device gathers from the environment based on the device sensors. In some embodiments, the device uses one or more of a camera, a microphone, a GPS, a motion sensor, a gyroscope, a accelerometer, a temp sensor, a touch sensor, a humidity sensor, to determine the device state relative to the environment or the user of the device. In some embodiments, the service launch object management (for placement, discovery level, notification message, bidding, etc.) is dynamic based on one or more of: device orientation (landscape vs. portrait vs. flat on a horizontal surface) or device distance or relative position to a user (near the head, in one or two hands, on a table, on the seat of a moving car, in the pocket of the user, indoors/outdoors, etc.) or ambient light/noise levels or components. In some embodiments, the device cognitive state is used to decide between a visual or audio or vibration notification or a specialized target bid population or to bill for a service launch object placement or associated service or application usage. In some embodiments, the service launch object management is based in part on the power state of the device, for example, powered up, active, screen saver, hibernate, sleep or powered down mode. In some embodiments, the service launch object management changes the power state (for example, from screen saver to active) to increase awareness of an associated service or application to a user. In some embodiments, the user may disable the power state change mode. In some embodiments, the service launch object management is based on the power mode (e.g., whether plugged in or battery-powered) or the state (percentage or time remaining) of the battery charge.

In some embodiments, device-based usage information is communicated with a network element for further processing or analysis to determine how to enhance (e.g., improve, increase, optimize, etc.) discovery level for one or more service launch objects. In some embodiments, device usage state information is collected by network elements and aggregated in the device management system 170-1 databases for further processing or analysis to determine how to enhance discovery level for one or more service launch objects. In some embodiments, device usage state information consists of a combination of information collected by the device and information collected by the network for further processing or analysis to determine how to enhance discovery level for one or more service launch objects.

In some embodiments, the availability of a network service 120-1 or device service 138-1 is dependent on the network state of the mobile wireless communication device 100. In some embodiments, if the network service 120-1 or device service 138-1 is available for a current network state the service launch object icon is displayed in the specified UI location. In some embodiments, if the network service 120-1 or device service 138-1 is not available for the current network state the icon is not displayed. In some embodiments, the service launch object configuration or placement or message information contains information that is a function of network state. In some embodiments, and the UI location manager 132-1 uses the service launch object configuration or placement or message information and network state information to instruct the UI agent 134-1 to display the service launch object icon in a given location in the device UI 101 in a first network state and instructs the UI agent 134-1 to not display the service launch object icon in a second network state.

In some embodiments, a UI location management console 160-1 provides a network manager a user interface environment for one or more of composing the network state policies describing when one or more services are available, specifying whether to present a service launch object (for example, display a service launch object icon), and specifying whether to provide network state notification information on one or more service launch object icons. FIG. 227 shows a UI location management console 160-1 UI template 1700 for a network manager to define a policy event notification to notify users (for example, to notify users regarding one or more details of a service plan status, such as data used (e.g., MB or GB used), percent of plan cycle used or remaining, plan expiration, etc.) in accordance with some embodiments.

In some embodiments, the availability of a network service 120-1 or device service 138-1 is dependent on the network state associated with the mobile wireless communication device 100, and if the network service 120-1 or device service 138-1 is available for a current network state then the service launch object icon is displayed with "normal" (or typical or standard) graphics features in the specified UI location, and if the network service 120-1 or device service 138-1 is not available for the current network state then the icon is displayed with graphics features that indicate the service is not available in the current network state. In some embodiments, instead of or in addition to modifying the service launch object icon graphics features to indicate the network service 120-1 or device service 138-1 is not available in the current network state, a notification message may be overlaid on the service launch object icon, with the message providing information indicating that the network service 120-1 or device service 138-1 is not available in the current network state.

In some embodiments, the service launch object configuration or placement or message information contains one or more of icon versions, icon placements, or network state messages, that are a function of network state, and the UI location manager 132-1 provides the appropriate one or more icon version, icon placement, network message to the UI agent 134-1 to modify the associated service launch object icon as the network state changes.

In some embodiments, a network service 120-1 or device service 138-1 is sponsored in a first network state and paid in a second network state. In some embodiments, a network service 120-1 or device service 138-1 is sponsored in a first network state and paid in a second network state and in the first network state the service launch object icon appears in a UI service launch partition for sponsored services, and in the second network state the service launch object icon appears in a UI service launch partition for paid services. In some embodiments, the service launch object configuration or placement or message information contains placement information that is a function of network state, and the UI location manager 132-1 uses this placement information to instruct the UI agent 134-1 to display the service launch object icon in a sponsored service location in the device UI 101 when the mobile wireless communication device 100 is in the first network state and instructs the UI agent 134-1 to display the service launch object icon in a paid service location in the device UI 101 when the mobile wireless communication device 100 is in the second network state.

In some embodiments, it is advantageous to show whether a service or application is free or paid by a feature differentiation directly on the service launch object icon. An example embodiment of this is shown in FIG. 212 where the dollar sign represents paid services (for this example YouTube and Skype are paid services) and the dollar sign with a circle and line through it represents free (or sponsored) (for this example Amazon and Calendar are free).

In some embodiments, there is a permanent UI service launch partition that the user is not allowed to modify or remove from the device. In some embodiments, the permanent UI service launch partition enables a UI location management service provider to enhance service launch object UI location, or service launch object icon appearance or service launch object notification messages for one or more service launch objects. In some embodiments, the UI location management service provider of the permanent UI service launch partition allows the user to manage the applications, folder and/or service launch objects that are located in other portions of the UI controlled by the user. In some embodiments, the user can control (for example, modify or alter or enhance) some parameters (for example, the ordering, or sorting, or formatting) of service launch objects within a UI service launch partition that is at least partially controlled by a UI location management service provider. In some embodiments, the user can add or delete service launch objects from a UI service launch partition that is at least partially controlled by a UI location management service provider. In some embodiments, the user is not allowed to add or delete or control (for example, modify or alter or enhance) service launch objects contained in a UI service launch partition that is controlled by a UI location management service provider.

In some embodiments, the UI location manager 132-1 is instructed (or follows a policy) to locate a service launch object in the UI based on the current time (wherein current time could be based time of day, or day of week, or work/holiday, etc.).

In some embodiments, a policy is implemented on the UI location manager 132-1 to specify that a service launch object is located in one area of the UI at a certain time of day or day of the week, and the service launch object is relocated at another time of day or day of the week. As another example embodiment, rather than storing the time based location policy on the mobile wireless communication device 100, the network (for example, the device management system 170-1) can instruct the UI location manager 132-1 to locate one or more service launch objects in the UI based on time. In related embodiments, other features of one or more service launch objects are altered as a function of time including service launch object appearance or features or service launch object notification messages.

In some embodiments, the UI location manager 132-1 is instructed (or follows a policy) to locate a service launch object in the UI based on the current network state. In some embodiments, a policy is implemented on the UI location manager 132-1 to specify that a service launch object is located in one area of the UI for certain network states and service launch object is re-located to another area of the UI for other network states. In some embodiments, the service launch object is located on the home screen or in a prominent location in a UI service launch partition when the device is connected to Wi-Fi, 4G, uncongested, or high QoS networks. In some embodiments, the service launch object is re-located to a less prominent UI location, such as a secondary device screen, a less prominent location in the UI service launch partition, the application stable, or is not displayed at all when network state changes to 3G, 2G, congested or low QoS or roaming network.

As another example embodiment, rather than storing the network state based location policy on the device, the network (for example, the device management system 170-1) instructs the UI location manager 132-1 to locate one or more service launch objects in the UI based on network state. In related embodiments, other features of one or more service launch objects are altered as a function of network state including service launch object appearance or features or service launch object notification messages.

In some embodiments, the UI location manager 132-1 is instructed (or follows a policy) to locate a service launch object in the UI based on the device usage state information (for example, based on current, or past, or predicted, or history, or logs of, device usage state information). For example, a policy might be implemented on the UI location manager 132-1 to specify that a service launch object is located in one area of the UI for certain device usage state, and the service launch object location is moved for other device usage state. In some embodiments, locate the service launch object on the home screen or in a prominent location in a UI service launch partition when the device usage state information (for example, based on application usage history or user current activity) indicates (for example, based on estimates, or predictions, or cost, etc.) that a given service offer is likely to be or interest to the user.

In some embodiments, the service launch object is located on the home screen or in a prominent location in a UI service launch partition when the device usage state information recognizes a geographic area where a service or retail opportunity is valuable or might be of interest to the user, such as a nearby purchase opportunity.

In some embodiments, the service launch object is relocated to a less prominent location in the UI service launch partition, to the application stable, or is not displayed at all when device usage state indicates that the current device usage information (for example, based on associated application history) is not related to the service launch object or indicates (for example, based on estimates, or predictions, or cost, etc.) that a given service launch object is not likely to be or interest to the user.

In some embodiments, the service launch object is relocated to a less prominent location in the UI service launch partition, the application stable, or is not displayed at all when device usage state indicates that the current geographic location is not close to a retail purchase opportunity associated with the service launch object.

In some embodiments, rather than storing the device usage state based location policy on the device, the network (for example, the device management system 170-1) instructs the UI location manager 132-1 to locate one or more service launch objects in the UI based on device usage state. In related embodiments, other features of one or more service launch objects are altered as a function of device usage state including service launch object appearance or features or service launch object notification messages. In some embodiments, a service launch object notification message can alert the user when the service, content, purchase opportunity or application associated with the service launch object is likely to be of interest to the user. In some embodiments, (which may be of interest to wireless access service providers), by using one or more of a service launch object notification messages, a service launch object UI location change or a service launch object icon change (for example, a feature, size, orientation, persistence, etc.), the user of mobile wireless communication device 100 is made aware of additional access services available for trial or purchase. In some embodiments, (which may be of interest to wireless access service providers), by using one or more of a service launch object notification messages, a service launch object UI location change or a service launch object icon change (for example, a feature, size, orientation, persistence, etc.), the user of mobile wireless communication device 100 is made aware of additional access services available for trial or purchase based on the device usage state information (for example, history or logs) indicating that the user has been using access services.

In some embodiments, by using one or more of a service launch object notification messages, a service launch object UI location change, or a service launch object icon change (for example, a feature, size, orientation, persistence, etc.), the user of mobile wireless communication device 100 is made aware of additional access services available for trial or purchase based on the device usage state information (for example, history or logs) indicating that the user has been using access services in a manner that suggests the user may desire to try or buy additional access services at the present or future time.

In some embodiments, additional service launch object notification messages are provided for services, applications or content marketing, wherein the notification message is placed in, on, touching or in close proximity to a service launch object icon (an icon proximity message), or wherein the notification message is located in a location in a UI display in which the service launch object icon is contained (an icon container message). In some embodiments, the notification messages include one or more of the following objectives: informative, draw attention to a service launch object, market special offers for a service launch object, provide service usage information for a launch object, or indicate to a user that a service activation or service purchase is required to use a service associated with a service launch object.

In some embodiments, marketing messages for an access service, an application, a content purchase, on-line shopping service, or another service is placed directly on a service launch object icon, or closely adjacent to a service launch object icon, or in a location in a UI display in which the service launch object icon is contained (for example, in service object launcher or a UI service launch partition), for the purpose of providing a convenient way for the device user to learn that the service or application associated with the service launch object icon is available or is available with special advantageous conditions or economics.

In some embodiments, the appearance of a service launch object icon is modified to enhance or downgrade the discovery level. In some embodiments, enhancing or downgrading the discovery level is accomplished by one or more of changing the service launch object icon features, changing the icon graphic, overlaying the service launch object icon graphic with a second icon or graphic, or merging the icon graphic with a second icon graphic. In some embodiments, the icon features or the color scheme are changed in accordance with service launch object icon UI management policy or instructions from the network. In some embodiments, the service launch object icon is made to alternate in appearance (for example, flash or change colors periodically or "bounce" or "wobble," etc.) according to service launch object icon UI management policy or instructions from the network.

In some embodiments, additional service launch object notification messages as described above are managed by the device management system 170-1. In some embodiments, additional service launch object notification messages as described above are managed by the device management system 170-1, wherein a service launch object and one or more of associated application, network destination or other policy information, are associated with a service launch object notification message. In some embodiments, additional service launch object notification messages as described above are managed by the device management system 170-1, wherein a service launch object and one or more of associated application, network destination or other policy information, are associated with a service launch object notification message and the device management system 170-1 then communicates the service launch object notification message along with the other service launch object information as described herein to the UI location manager 132-1; and the UI location manager 132-1 then displays the message in the appropriate UI location.

In some embodiments, the device management system 170-1 specifies the type of service launch object notification message or service launch object UI location; the type of message or UI location information is communicated to the UI location manager 132-1; and the UI location manager 132-1 displays the message in the proper format in the specified UI location. In some embodiments, the device management system 170-1 specifies the type of message or UI location of the service, application or content marketing message; the type of message or UI location information is communicated to the UI location manager 132-1 along with the other UI location manager 132-1 information described above; and the UI location manager 132-1 then displays the message in the proper format in the specified UI location.

FIG. 214 provides three examples of proximity messages in accordance with some embodiments. In FIG. 214 is an example screen 16350 of a multi-partition UI service launch partition with three service launch partitions 4220, 4221, and 4222. A first service launch partition 4220 is for sponsored (e.g., free to the user) services and applications. A second service launch partition 4221 is for pre-paid services and applications. A third service launch partition 4222 is for post-paid (for example, recurring) services and applications. A first example of a proximity message type is the bubble message 4223 on the pre-pay one-day service launch object icon 4224 that indicates: "Special Offer, 20% discount, Today only!!" A second example of a proximity message is the "Click for Free Trial" icon title message 4263 below the service launch object icon 4225 for pre-paid email. A third example of a proximity message is the "Check This Out" message 4262 under the post-paid (recurring) Twitter service launch object icon.

In some embodiments, a service launch object notification message is placed on or in a UI service launch partition UI area that has the capability of displaying one or more service launch object notification messages for one or more service launch objects that are or will be located in one of the UI service launch partitions. An example of this aspect of the invention is shown in the example embodiment illustrated by screen 16400 of FIG. 215, where the free Twitter access message 4226 and actionable icon 4227 are displayed on the UI service launch partition itself. In this embodiment the service launch object will automatically populate in the free mobile access partition 4220.

FIG. 216 shows example embodiments for elevating service or application discovery level with service launch object notification messages that are conditioned on time (e.g., Amazon discount today only 4228), geography (e.g., OpenTable 50% lunch discount within one block 4229) and a service launch object notification that is not conditioned on time or geography (e.g., calendar connected application service—"Check out this new app" 4230). In some embodiments, one or more of the service launch objects 4264, 4265, 4266, and 4267 in FIG. 216 have been placed by the UI location manager 132-1 on the main device home screen as instructed by the device management system 170-1. In some embodiments, one or more of the service launch objects 4264, 4265, 4266, and 4267 in FIG. 216 are placed by the user, and the UI location manager 132-1 locates where the user has placed each service launch object on the user device UI and then places the service launch object notification message in association with the proper UI location. In some embodiments in which the user has control of service launch object placement in the UI, the UI location manager 132-1 locates where the user has placed the service launch object on the user device UI and then modifies the appearance of the service launch object icon as described herein.

FIG. 217 shows an embodiment in which the service launch objects are located in the device application stable, and the UI location manager 132-1 locates a service launch object (e.g., Facebook icon 4231, Google maps icon 4232) and places the associated service launch object notification message (e.g., message 4233, message 4234) on that service launch object as directed by the device management system 170-1. In the example of FIG. 217, the notification messages are "Check out this new app!!" 4233 for Facebook and "Free Maps Access for the next hour!!" 4234 for Google maps.

In some embodiments, a UI location management console 160-1 provides a network manager a user interface environment for performing the one or more functions for composing service, application or content marketing or informative messages, associating the composed message with a service launch object, or initiating the communication of the message content to the device UI location manager 132-1.

In some embodiments, the UI location manager console 160-1 further provides a user interface for specifying when the composed message is to be displayed on the device. In some embodiments, the UI location manager console 160-1 further provides a user interface for specifying under what network state conditions the composed message is to be displayed on the device. In some embodiments, the UI location manager console 160-1 further provides a user interface for specifying under what device usage state conditions the composed message is to be displayed on the device.

In some embodiments, a variable is used to define notification messages in a notification template to automatically customize the notification for the associated event. FIG. 228 shows the use of a variable (for example, ${plan} to indicate a Name of service plan) to define notification messages (e.g., 4233, 4234) in a notification template (and associated device view) to automatically customize the notification for the associated event in accordance with some embodiments.

In some embodiments, a management console 160-1 UI provides a network manager a UI environment for displaying upsell plans. FIG. 229 shows a network manger UI environment 1720 for displaying upsell plans in accordance with some embodiments. In some embodiments, a management console 160-1 UI provides a network manager a UI environment for displaying promotional plans. In some embodiments, a management console 160-1 UI provides a network manager a UI environment for displaying a promotional service or application as a function of time (for example, daily, weekly or based on a network or device or user state). FIG. 230 shows a network manager UI environment 1730 for displaying promotional notification plan in accordance with some embodiments.

In some embodiments, a management console 160-1 UI provides a network manager a UI environment for displaying notification templates for defining a lack of capable plan (for example, lack of data service plan, or lack of access to an application or content—for example, requiring a service or application purchase) notification message for a desired service or application. FIG. 231 shows a network manager UI environment 1740 for displaying notification templates (and associated device views) for defining a lack of capable plan (which may be combined with a offer for a upsell plan) for a desired service or application in accordance with some embodiments.

In some embodiments, a management console 160-1 UI provides a network manager a UI environment for displaying notification templates for defining featured service or application (for example) notification message for a desired service or application. FIG. 232 shows a network manager UI environment 1750 for displaying notification templates (and associated device views) for defining a featured service or application in accordance with some embodiments.

In some embodiments, a management console 160-1 UI provides a network manager a UI environment for displaying notification templates for defining a promotional banner (or banner ad) for (or to promote or market) a service or application or a promotional banner for a service launch object (or icon) associated with a service or application. In some embodiments, the promotional banners notification templates include one or more of a language, image, or associated plans. FIG. 233 shows a network manager UI environment 1760 for displaying notification templates (and associated device views) for defining a promotional banner in accordance with some embodiments.

In some embodiments, a management console 160-1 UI comprises a service design center showing device UI launcher view. In some embodiments, the service design center includes drag and drop icons. In some embodiments, selection of icons provides menus to components or plan view or settings.

In some embodiments, the service launch object icon appearance is modified to indicate the status of service usage for a service plan. The status of service usage can be a graphic (such as a bar or gauge or hourglass or pie chart located on or near the service launch object icon) or a numeric value signifying amount used, amount remaining, percent used or percent remaining, etc. (for example, relative to a monthly quota or cap). FIG. 218 provides several examples of such embodiments. The service launch object icons 4235, 4236, 4237, 4238, 4239, 4240, 4224, 4241, 4242, 4243, 4244, and 4245 in screen 16550 of FIG. 218 are contained in the UI in a three-partition UI service launch partition, with partition 4220 for service launch objects associated with sponsored services and connected applications, partition 4221 for service launch objects associated with pre-paid services and connected applications, and partition 4222 for service launch objects associated with post-paid (or recurring) services and connected applications. For example, a service launch object can represent a specific wireless access service according to a set of service classification rules and the service launch object icon itself can display an amount (or percent or fraction) of service allowance consumed, or an amount of service allowance remaining. As a more detailed example embodiment, a pre-pay wireless service plan may allow for a certain amount of open Internet data usage (often specified in megabytes or gigabytes), and a usage indication is provided on a service launch object to indicate graphically how much usage is remaining or how much is consumed. An example is provided in FIG. 218 on the pre-pay 100 MB service plan service launch object icon 4240, with the bar portion of the icon showing that roughly 85% of the service plan limit is remaining and 15% has been consumed. Another pre-pay example is shown in FIG. 218 where the bar portion of the Maps service launch object icon 4239 shows only approximately 10% of the service limit remaining with 90% consumed. In some embodiments, the usage bar is displayed in a different color (e.g., the color changes from green to red) to indicate that the remaining service plan is low and to encourage the user to purchase additional service soon (before the current service runs out). These example embodiments include different service plan usage classifications—one for wide open Internet and the other specifically for maps. It will be appreciated that many classifications of service are possible, including classifications based on a single application (e.g., Facebook), a single network communication end-point (e.g., a destination), a group of applications (e.g., social networking applications, such as Facebook and Twitter), a group of network communication end-points (e.g., several destinations), etc.

It will now be appreciated that if the two usage meters were provided only in a UI screen format unrelated to the service launch object icons, then the user would need to open that UI screen, observe the usage status for each of the user's active services, and then remember the usage status later on when the user intended to act on one of the service launch object icons by selecting that icon. In some embodiments, usage information is provided on the same screen that the user uses to act on the available services and applications. In some embodiments, usage information is provided on the same screen that the user uses to act on the available service launch object.

Further example embodiments for usage information displayed directly in association with a service launch object icon are provided in screen 16550 of FIG. 218. For example, in FIG. 218 there is a limit to the amount of service usage available to the user in a given period of time for the sponsored (free in this case) services (partition 4220), and, from icons 4235, 4236, and 4237, a user can easily see that the sponsored trial access is almost used up while there is still plenty of usage remaining for the Facebook and CNN services. In some embodiments, one or more sponsored services have limited usage. In some embodiments, one or more sponsored services (or any other service) have unlimited usage when that is the policy set by the network apparatus (for example, the device management system 170-1 or another network element). There are other paid recurring service examples provided in the paid recurring services partition 4222 in FIG. 218, with various service plan usage classifications and usage allowances, with allowances being based on a limit to the usage amount under the service plan classification or time based limits.

FIG. 218 also displays another embodiment for changing the appearance of a service launch object icon to indicate that service has not been purchased or that additional service must be purchased before the service or application may be used. For the embodiment in FIG. 218, the service launch object icon appearance modification to indicate that the service has not been purchased (or that additional service must be purchased before the service or application may be used) is indicated by the gas pump icons 4246A and 4246B shown, respectively, on the pre-paid one-day service icon 4224 and the post-pay (recurring) maps service icon 4242. In some embodiments, the service application associated with the service launch object has not been downloaded yet when the user first clicks on it (as could be the case when the fuel pump icon feature 4246 is displayed), then the application is automatically downloaded, or the user is given an option to download the application.

In some embodiments, service launch object icon modifications make it easier for a user to identify one or more subsets of their one or more services or applications with plenty of service allowance remaining, or near the end of their service allowance, or requiring an initial or additional service purchase to use the service or application.

In some embodiments, usage information displayed on the service launch object icon is obtained by the UI location manager 132-1 (or an some other device agent), and the UI location manager 132-1 updates (for example, dynamically based on network state or device usage state) the service launch object icon as described in detail herein by changing the icon, overlaying another graphic, merging with another graphic or overlaying a notification message.

In some embodiments, usage information for a given service launch object is sent by a network element to the UI location manager 132-1 and formatted by the UI location manager 132-1 for display on the service launch object icon. In some embodiments, usage information is collected on the mobile wireless communication device 100 by the UI location manager 132-1 and formatted by the UI location manager 132-1 for display on the service launch object icon. In some embodiments, usage information collected on the mobile wireless communication device 100 by the UI location manager 132-1 is synchronized with usage information from network element, then displayed on the service launch object icon. In some embodiments, the usage information is displayed on the service launch object icon for a one or more network states. In some embodiments, the usage information is displayed on the service launch object icon when connected to a paid network (for example, 4G/3G/2G) but not displayed for a free network (e.g., home Wi-Fi). In some embodiments, the usage information is displayed on the service launch object icon when usage is above a threshold. In some embodiments, the usage information is updated when network state changes (for example, the device may be subject to different usage limits and/or usage levels for 4G, 3G/2G, Wi-Fi, home/roaming, etc.).

Screen 16600 of FIG. 219 displays a three-partition (4220, 4221, 4247) UI service launch partition in accordance with some embodiments. The embodiment in FIG. 219 includes a service launch partition 4220 for trial offers (for example, plans). In some embodiments, trial offers (wherein trial offers may be limited, for example, time- or data-limited offers) contain service launch objects (e.g., 4235, 4236, 4237) associated with services or applications that are available on a trial basis. In some embodiments, trial offers comprise limited trial offers. In some embodiments, limited trial offers contain service launch objects associated with services or applications that are available on a trial basis including one or more of the following limitations: for a period of time (for example, limited time trial offers) or for a subset of geographies (for example, limited geography trial offers) or for a subset of networks (for example, limited network trial offers). In some embodiments, limited trial offers contain service launch objects associated with services or applications that are available on a trial basis based on a limitation and are dynamically removed or swapped for other offers by the UI location manager 132-1. In some embodiments, limited trial offers contain service launch objects associated with services or applications that are available on a trial basis based on a limitation and are dynamically removed or swapped for other offers by the UI location manager 132-1 controlled by the device management system 170-1 (for example, a UI location management service provider). This is another embodiment for prominent discovery of services or applications that a UI location management service provider desires to present to a device user.

In some embodiments, one or more of the service launch object icon appearance, service launch object location or service launch object notification message changes as a function of network state. FIG. 220 shows an example embodiment 16650 where the device has entered the roaming state and a service launch object notification message 4252 is displayed for a video streaming service that would be very expensive during roaming conditions. In some embodiments, a service launch object graphic feature is added according to the UI location manager policy or network instruction to highlight the roaming indicator on the device display (for example, the arrow 4253 in FIG. 220). In some embodiments, applications and services have varying degrees of roaming warnings (for example, no warning at all) based on usage (for example, fewer or less obvious roaming warnings for low data usage or sponsored services or applications) during roaming conditions. In some embodiments, sponsored service or application coverage by the sponsored service provider does not include roaming, and the user is notified. In some embodiments, sponsored service or application coverage by the sponsored service provider does not include roaming, and the user is notified that he or she will receive roaming fees. In some embodiments, sponsored service or application coverage by the sponsored service provider does not include roaming, and the user is notified of a request for a response from the user (for example, by clicking or touching to select the service launch object) acknowledging that using the service will result in roaming fees. In some embodiments, the user's response is stored by the device management system.

In some embodiments, the service launch object icon changes appearance or color or animates to indicate a change in network state or service charges.

Screen 16700 of FIG. 221 shows a secondary notification message 4254 according to some embodiments. In some embodiments, a secondary notification message (for example, a warning) is configured to be presented when a user chooses to activate a service launch object under specific network state conditions (for example, while the device is connected to an expensive network, or a low performance network, or a low QoS network, etc.). In some embodiments, the secondary notification message (for example, warning) of the notification policy is managed by the remote device management system 170-1 and the device UI location manager 132-1, and after the user selects (for example, clicks) the service launch object a secondary notification message is provided. In some embodiments, the secondary notification message requires the user to (optionally) dismiss or accept for service launch object activation. In some embodiments, the secondary notification message persists for a set period of time or until the network state changes.

In some embodiments, the notification message is provided in a manner that does not interrupt service or application launch. In some embodiments, the service or application launch is held (for example, stalled or paused) until the user dismisses the message.

In some embodiments, the service launch object icon appearance, or service launch object location is modified, or a service launch object notification message is presented based on a network state (for example, network QoS, network congestion, network performance, network bandwidth, network data rate or network signal quality). For the example embodiment 16800 in FIG. 223, the network QoS has been assessed (by a device agent or the network) to meet a quality criteria (or alternatively to satisfy congestion criteria below a threshold or satisfy a data rate above a threshold or have high signal quality above a threshold) to support streaming voice over Internet protocol (VOIP) services (indicated by the message "good service" 4255 for icon 4269). For the example embodiment in FIG. 223, the network state (for example, QoS, etc.) does not meet the criteria to provide good video service quality (indicated by the message "marginal service" 4256 for icon 4268). In some embodiments (for example, the embodiment 16800 in FIG. 223), the UI location manager 132-1 determines the network state level of quality (or receives service launch object network state messages from the network) and provides targeted service launch notification messages to one or more service launch objects.

In some embodiments (for example, the embodiment 16800 in FIG. 223), the UI location manager 132-1 determines the network state level of quality (or receives service launch object QoS messages from the network) and provides targeted service launch notification messages to the VOIP service launch object 4269 (Skype—good service 4255) and the streaming video service launch object 4268 (YouTube—marginal service 4256).

In some embodiments, service or application discovery level is elevated by providing a service launch object notification message for an offer. In some embodiments, the offer is a limited offer. In some embodiments, the limited offer is a limited offer, wherein the limited offer is offered over one or more of a limited time, limited geography, limited network, limited devices, limited users. In some embodiments, the service launch object associated with the offer may be in a UI service launch partition or some other location on the device including a main or home UI screen, or a secondary UI screen or some other UI area. FIG. 224 shows an embodiment 16850 where the connected movie application icon 4257 (for example, Netflix or iTunes) is displaying a service launch object notification message 4258 indicating that movie download is available at a special price during a limited time that the network is not typically busy. In some embodiments, the notification message is based on a network state that has sufficient capacity to allow less expensive downloads (for example, Wi-Fi, 4G, etc.).

Screen 16900 of FIG. 225 shows another example embodiment where the streaming video application service launch object 4259 is indicating to the user a special price in the specific geographic location the device is in, with a time limit in case the network becomes busy again later. In some embodiments, a service launch object notification message to increase discovery level with a notification message is conditional on multiple limitations (for example, states or parameters). In some embodiments, a service launch object notification message to increase discovery level with a notification message is conditional on multiple limitations one or more of network state (for example, 3G in FIG. 225) and device usage state (for example, time of day and geographic location-"next 2 hours" and "this area" in FIG. 225).

It will now be clear to one of ordinary skill in the art that other combinations of network state and device usage state parameters may be used to condition the occurrence and content of one or more service launch object notification messages.

In some embodiments, a device user obtains service launch object usage (for example, network access service) allowance (for example, virtual cash, points, megabytes, etc.) by using services on the device which generate revenue for the UI location management service provider or a customer of the UI location management service provider. In some embodiments, a device user obtains service usage allowance (for example, virtual cash, points, megabytes, etc.) by using services on the device which generate revenue for the UI location management service provider or a customer of the UI location management service provider. Screen 16950 of FIG. 226 is an example embodiment wherein a device user can gain access service usage allowance by using services on the device which generate revenue for the UI location management service provider or a customer of the UI location management service provider. For example, in FIG. 226 the user is being informed by a service launch object notification message 4260 that the user can now get free Skype service as a result of the usage points the user has generated by using search services on the device.

In some embodiments, the UI location management service provider or UI location management service provider customer manages (for example, monitors or keeps track of) usage, visits, views, ad views, clicks, ad clicks, or user purchase revenue generated by the device user's use of service or on-device purchases, and manages (for example, monitors or keeps track of) of how many usage points (for example, point, virtual cash, megabytes, etc.) such events have generated for the user's account, and allows the user to convert the usage points into service or application usage (for example, access service) allowance for one or more services or services plans. In some embodiments, management system 10601 counts service launch object interactions or banner ad views, coupon clicks, etc. and gives credit for service or application, discount account, reward points or cash.

There are a number of ways the UI location manager 132-1 can be designed to accept the various information elements such as service launch object information, application information, destination information, service launch object notification messages, network state policies and usage state policies as described herein, and use the network state information and/or usage state information and/or notification messages from the device management system 170-1 to re-locate service launch objects (or icons) in the device UI, or to change the features or graphics on the service launch objects, or to display different messages in, on, touching or in proximity to the service launch objects. Several detailed embodiments are provided herein. An exhaustive list of all possible embodiments for these functions is not practical and is of limited value to one of ordinary skill in the art once the various embodiments herein are understood. Armed with the teaching provided herein it will be clear to one of ordinary skill in the art how to create other design embodiments to accomplish the same functions.

It is also understood that the following embodiments for moving service launch objects, modifying service launch objects, and providing service launch object notification messages as a function of network state, device usage state or service launch object UI placement instructions from the device management system 170-1 are taught individually, it is understood that these embodiments may be combined. For example, the embodiments for moving the service launch object icon to different UI locations as a function of network state, device usage state or service launch object UI placement instructions from the device management system 170-1 can be combined with one or more of the embodiments for changing the appearance of the service launch object icon or providing a service launch object notification message. Similarly, embodiments for changing service launch object appearance can be combined with embodiments for changing service launch object notification messages, and so on.

In some embodiments, wherein the UI locations of the service launch object are changed as a function of various network states, the various UI locations corresponding with the various network states are stored in a table managed by the UI location manager 132-1 which indexes the table according to changes in the network state, when the network state change is detected and the proper UI location is looked up with the network state index, and the service launch object is moved to new UI location by the UI location manager 132-1.

In some embodiments, wherein the features of the service launch object icon are changed as a function of network state, the various icon features (for example, graphics files) and the current service launch object UI location are stored in a table managed by the UI location manager 132-1 which indexes the table according to changes in the network state, when the network state changes is detected and the proper icon features is looked up with the network state index, and the newly featured service launch object icon is placed by the UI location manager 132-1 on the device UI in accordance with the current service launch object UI location stored in the table.

In some embodiments, the features of the service launch object icon are changed as a function of network state, the various icon features (for example, graphics files) for a network state overlay feature (wherein the term overlay is used to include overlay, or superposition, or merge, or combine) and the current service launch object UI location are stored in a table managed by the UI location manager 132-1, and the table is indexed by network state, and when the network state change is detected and the proper overlay icon graphic is used to overlay with a basic icon graphic on the device UI in accordance with the current service launch object UI location stored in the table. In some embodiments, the overlay feature may be obtained from a network element (such as the device management system 170-1) by the device (such as the UI location manager 132-1) as described above. In some embodiments, the overlay feature may be obtained jointly by a network element (such as the device management system 170-1) and by the device (such as the UI location manager 132-1) as described above.

In some embodiments, the overlay is accomplished by the device (such as the UI location manger 132-1), wherein the mobile wireless communication device 100 processes a basic (for example, standard) application icon or service launch object icon to perform the overlay of the basic icon with the overlay feature to build a new composite icon on the device. In some embodiments, the overlay is accomplished by presenting the overlay graphics in, on or in close proximity to the location in the UI containing the application or service launch object icon, with the current service launch object location being derived from the current service launch object UI position in the aforementioned table.

In some embodiments, a service launch object icon (for example, including overlay feature) that changes as a function of network state is obtained from a network element (such as the UI location management server 150-1), after the UI location manager 132-1 detects the network state change and receives the new corresponding icon from the network element, the UI location manager 132-1 places the new icon in the proper service launch object UI location.

In some embodiments, wherein a service launch object notification message is changed as a function of network state, the various service launch object notification messages that vary with network state and the current service launch object UI location are stored in a table managed by the UI location manager 132-1 which indexes the table according to changes in the network state. In further embodiments, after the network state change is detected and the proper service launch object notification message is looked up with the network state index, the new service launch object notification message is used to replace the service launch object notification message that was used in a prior network state, and the new service launch object notification message is placed in, on, touching or in proximity to the service launch object icon in accordance with the current service launch object UI location stored in the table.

In some embodiments, a service launch object notification message that changes as a function of network state is obtained from a network element (such as the UI location management server 150-1), after the UI location manager 132-1 detects the network state change and receives the new corresponding service launch object notification message from the network element, the UI location manager 132-1 places the notification message in, on, touching or in proximity to the service launch object icon, with the new service launch object notification message being placed in the proper service launch object UI location by the UI location manager 132-1.

In some embodiments, wherein a service launch object notification message is changed as a function of device usage state, the various service launch object notification messages that vary with device usage state and the current service launch object UI location are stored in a table managed by the UI location manager 132-1 which indexes the table according to changes in the device usage state.

In some embodiments, the device usage state change is detected and the proper service launch object notification message is looked up with the device usage state index, and the new service launch object notification message is used to replace the service launch object notification message that was used in a prior device usage state. In some embodiments, the device usage state change is detected and the new service launch object notification message is placed in, on, touching or in proximity to the service launch object icon in accordance with the current service launch object UI location stored in the table.

In some embodiments, an updated (for example, dynamic) service launch object (for example, by changing one or more of service launch object location, or service launch object icon, or service launch object overlay feature, or service launch object notification message, or UI service launch partition message) that changes as a function of device usage state is obtained from a network entity (such as the device management system 170-1), when the UI location manager 132-1 detects the device usage state change and requests an updated service launch object from the network element, and then the UI location manager 132-1 places the new service launch object at the appropriate UI location. In some embodiments, the mobile wireless communication device 100 keeps a device usage state log and provides to a network element (such as the device management system 170-1) one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; the mobile wireless communication device 100 receives from the network entity a new updated service launch object (or index) to replaced the previous service launch object and is placed by the UI location manager 132-1 in the UI location corresponding to the new updated service launch object. In some embodiments, at least a part of the usage state information is collected by the network entity. In some embodiments, at least a part of the usage state information collected by the mobile wireless communication device 100 is augmented by network entity usage state information. In some embodiments; the device management system 170-1 receives the device usage state information from the mobile wireless communication device 100, including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170-1 performs one or more of the following tasks: process the usage state information to select services or applications most advantageous to highlight to the user, or provide special use offers to the user, or create service launch object notification messages for a services or application, or re-locating a service launch object or updating (one or more of location, features, overlay, etc.) a service launch object icon, or create a new set of service launch object UI location instructions or placement policies for the device (for example, for the UI location manager 132-1); and send the new set of service launch object UI location, updates, instructions or placement policies to the device (for example, the UI location manager 132-1).

In some embodiments, the device management system 170-1 receives from the device the device usage state information from multiple devices in a device group (for example, multiple devices associated with a user, an enterprise, a family plan, etc.), including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170-1 performs one or more of the following tasks: process the usage state information to select services or applications most advantageous to highlight to one or more users of the device group, or provide special use offers to one or more users of the device group, or create service launch object notification messages for a services or application to one or more users of the device group, or re-locating a service launch object to one or more users of the device group or updating (one or more of location, features, overlay, etc.) a service launch object icon to one or more users of the device group, or create a new set of service launch object UI location instructions or placement policies for the one or more devices of the device group (for example, for the UI location manager 132-1); and send the new set of service launch object UI location, updates, instructions or placement policies to the one or more devices of the device group (for example, the UI location manager 132-1).

In some embodiments, an updated (for example, dynamic) service launch object (for example, by changing one or more of service launch object location, or service launch object icon, or service launch object overlay feature, or service launch object notification message, or UI service launch partition message) is changed with a new service launch object UI policy instruction received by the device UI location manager 132-1 from a network element (such as the device management system 170-1).

In some embodiments, the UI location manager 132-1 or the device management system 170-1 updates a service launch object (for example, by changing one or more of service launch object location, or service launch object icon, or service launch object overlay feature, or service launch object notification message, or UI service launch partition message) in order to change the level of user information or user attention gathering for one or more service launch objects.

In some embodiments, updating a service launch object in order to change the level of user information or user attention is desired because a UI location management service provider desires to change the user discovery or marketing messages associated with one or more service launch objects associated with one or more services or applications. In some embodiments, updating a service launch object in order to change the level of user information or user attention is the result of payments received by the UI location management service provider from service providers or application developers whose services or applications are being highlighted in the new service launch object UI locations, messages and discovery positioning. In some embodiments, updating a service launch object in order to change the level of user information or user attention is the result of the UI location management service provider benefiting directly from enhanced service or application usage by the user. In some embodiments, updating a service launch object in order to change the level of user information or user attention is encourages the user to try new services or applications that the user has not used before.

In some embodiments, updating (for example, dynamically modifying) a service launch object (for example, by changing one or more of service launch object location, or service launch object icon, or service launch object overlay feature, or service launch object notification message, or UI service launch partition message) by the device management system 170-1 is applied on one device at a time from a device group.

In some embodiments, updating (for example, dynamically modifying) one or more service launch objects (for example, by changing one or more of service launch object location, or service launch object icon, or service launch object overlay feature, or service launch object notification message, or UI service launch partition message) by the device management system 170-1 is applied on one device at a time in order to enhance the user discovery of one or more services or applications are put in effect for one device at a time in accordance to a desired improvement in service launch object discovery for that device. In some embodiments, for updating service launch objects for device groups, payments received by a UI location management service provider are for the device group and not just individual devices. In some embodiments, for updating service launch objects for device groups, payments received by a UI location management service provider are for the device group and not just individual devices, and the payments are adjusted as a function of how closely the device group information (for example, information derived from device usage state—history, logs, demographic, geographic, etc.) matches the desired device group information for the entity that is paying for enhanced service launch object discovery (or selection, or use, or clicks, etc.).

In some embodiments, the UI location management console 160-1 provides a web portal (for example, an automated or secure web portal) for application developers to log in to set up sponsored services or device discovery levels for their applications or services. In some embodiments, the web portal provides a variety of options in various embodiments, including but not limited to service launch object discovery pricing that varies with one or more of: time per day or per week or per month spent on a given discovery level; UI location; notification message type; notification message length, extent or content; notification message frequency; network state; device usage state. In some embodiments, the web portal provides one or more of: icon upload for user designed icons, upload of user application or application specification for application store or marketplace download; network destination (for example, URL, domain, website, IP address, port, etc.) for a browser based service; etc.

In some embodiments, updating (for example, dynamic) one or more service launch objects (for example, by changing one or more of service launch object location, or service launch object icon, or service launch object overlay feature, or service launch object notification message, or UI service launch partition message) by the device management system 170-1 in order to enhance the user discovery of one or more services or applications are put in effect in accordance to a desired improvement in service launch object discovery for multiple devices that are part of a device group. In such embodiments involving modifications to service launch object UI discovery management for device groups, payments received by a UI location management service provider are for the device group and not just individual devices, and the payments may be adjusted as a function of how closely the device group demographic information (for example, information derived from device usage state history) matches the desired demographics for the entity that is paying for enhanced service launch object discovery.

In some embodiments, the device management system 170-1 provides a bidding function for enhanced discovery of services or applications, wherein service providers (for example, shopping service providers, location based advertising providers, on-line sellers of merchandise, content providers, access service providers, streaming service providers, social network service providers, Internet search service providers, etc.) or application developers (developers of applications who whish their applications to be highlighted to device users) are provided with a bidding mechanism to bid on service launch object UI location placement, features and/or service launch object notification messages. In some embodiments, the device management system 170-1 provides a bidding function for enhanced discovery of services or applications, wherein service providers or application developers are provided with a bidding mechanism to bid on service launch object UI location placement, features and/or service launch object notification messages, wherein the highest bidder receives the service discovery position being bid upon.

In some embodiments, the device management system 170-1 provides a bidding function for enhanced discovery of services or applications, wherein service providers or application developers are provided with a bidding mechanism to bid on one or more service launch object properties: placement, icon features, icon overlay, icon format, notification messages. In some embodiments, the device management system 170-1 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state. In some embodiments, the device management system 170-1 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state, wherein the highest bidder receives the service discovery position being bid upon. In some embodiments, service launch object are classified based on UI location, icon features or service launch object notification messages into "service or application discovery levels," wherein the premium levels of service discovery in general earn higher bids. Some embodiments involve classifying the service launch object UI location, icon features or service launch object notification messages into "service or application discovery levels," wherein the premium levels of service discovery in general earn higher bids. In some embodiments, a higher discovery level typically gains more attention from the user by having one or more of: more prominent service launch object UI location placement, more frequent specific information regarding the service launch object, more prominent service launch object notification messages. In some embodiments, a premium discovery level has the service launch object icon placed in one or more of the following attributes: in first position in a permanent or prominent UI service launch partition, the device main screen, or a permanent launcher bar on the device, frequent service launch object notification, frequent service launch object notification involving device usage state dependent analysis for when to provide the notification messages. In some embodiments, a lower discovery level would typically cost a bidder less, involves placement in the application stable of the device with little or no service launch object notification messaging. In some embodiments, an in between (or intermediate or typical or standard) discovery level might include one or more of the following attributes: non-permanent placement (for example, the user can modify the placement or can remove the service launch object icon from all but the application stable) in a UI service launch partition or a secondary device screen, notification messaging taking place only at certain times of day or certain geographic locations.

In some embodiments, device management system 170-1 (or alternatively a service design center or UI location management console 160-1) presents device UI view of discovery position on bidding interface. In some embodiments, device management system 170-1 presents device UI view of icon animation on bidding interface. In some embodiments, device management system 170-1 presents device UI view of coupon issue from bidding interface. In some embodiments, device management system 170-1 presents device UI view of notification from bidding interface. In some embodiments, device management system 170-1 presents device UI view of notification animation or coupon animation from bidding interface.

In some embodiments, the device management system 170-1 supports static purchase of device UI discovery level via an automated secure portal interface. In some embodiments, the UI location management console 160-1 is configured as a secure web interface for remote terminals. In some embodiments, a remote terminal user can log into a user sign up system where the users credentials and credit are established. In some embodiments, the user of the device management system 170-1 (for example, service provider or application developer) purchases pre-configured discovery levels at pre-configured pricing for pre-configured device groups.

In some embodiments, the device group information (for example, demographics, device parameters, device user parameters) are displayed to the user of the device management system 170-1 to help in determining the relative value of the various levels of discovery available. In some embodiments, the user of device management system 170-1 purchases one or more of: a discovery level for a pre-determined period of time, or for a pre-determined number of user service launch object views, service launch object notification message views, or service launch object clicks.

In some embodiments, the device management system 170-1 supports dynamic bidding and purchase of device UI discovery level via an automated secure portal interface. In some embodiments, the UI location management console 160-1 is configured as a secure web interface for remote terminals. In some embodiments, a remote terminal user can log into a user sign up system where the users credentials and credit are established. In some embodiments, the user of the device management system 170-1 bids upon various device group discovery levels, with the winning bidder purchasing that discovery level. In some embodiments, the user of the device management system 170-1 bids upon various device group discovery levels, with the winning bidder purchasing that discovery level for one or more of: a pre-determined period of time, a pre-determined number of user service launch object views, service launch object notification message views, or service launch object clicks.

In some embodiments, the number of views or clicks or selections or usage are tracked by the device (for example, the UI location manager 132-1) and reported to the device management system 170-1. In some embodiments, the number of views or clicks or selections or usage are tracked or estimated by the device management system 170-1, by either estimating the number of views as a function of time or by observing network traffic, or by a combination of both.

In some embodiments, the device management system 170-1 is configured to allow a portion of the device UI (for example, a partition in a UI service launch partition) to be controlled by a third party, such as an application store or application marketplace service provider, or a search provider, or a location based services provider or a mobile wireless communication device advertising provider. In some embodiments, the device management system 170-1 is configured to allow a portion of the device UI (for example, one or more partitions in a UI service launch partition) to be controlled by a third party, such as an application store or application marketplace service provider, or a search provider, or a location based services provider or a mobile wireless communication device advertising provider for placement of service launch objects, for example, prioritized, ranked, displayed, tiered to enhance discovery of associated service or applications.

There are numerous other detailed embodiment examples for selling UI discovery levels to service providers, a third party, third-party service providers, content providers, merchandise retailers or application developers, either with discovery levels that are pre-negotiated and fixed for a period of time or geography or device or user population, or discovery levels that are bid upon in real time, that one of ordinary skill in the art will now understand. The teachings here show how to devise embodiments that enhance the ability to advertise services or applications by associating the marketing messages directly with the location, appearance and notification information directly associated with a service launch object or service launch object icon.

In some embodiments, the UI location manager 132-1 (or some other device agent), or the device management system 170-1 evaluates a user's use of services in order to determine a new service plan or an alternate service plan that the user might benefit from or be willing to purchase (an "alternate service"). In some embodiments, a user is currently using a pre-paid hourly Internet access plan, and the user is using several hours per day, and there is a less expensive post-paid recurring service plan, then the post-paid recurring service plan is identified as an alternate service by service analysis algorithms in the UI location manager 132-1 (or some another device agent), or the device management system 170-1. In some embodiments, a user is subscribed to a first service and the UI location manager 132-1 or the device management system 170-1 identify a service launch object notification message that is associated with a service launch object for the alternate service, and the service launch object message is communicated to the UI location manager 132-1 (or might be pre-cached on the device for retrieval by the UI location manager 132-1), and the UI location manager 132-1 places the service launch object notification message advertising an alternate service on, in, touching or near the service launch object corresponding to the alternate service.

In some embodiments, a user is subscribed to a first service and the UI location manager 132-1 or the device management system 170-1 identify a service launch object notification message that is associated with a service launch object for the alternate service, and the UI location manager 132-1 places the service launch object notification message advertising an alternate service on, in, touching or near the first service launch object.

In some embodiments, the UI location manager 132-1 manages the UI locations contained in a UI service launch partition with one or more launch partitions for organizing or displaying service launch objects. In some embodiments, the UI service launch partition displays a controlled version of a service launch object icon that is similar to a "standard" (e.g., generic or typical or normal) service or application icon (for example, the standard application icon that comes with an application delivered by conventional means such as application store or marketplace, Internet download or device user load) that is available in other UI locations on the device controlled by the user.

In some embodiments, the UI service launch partition displays a controlled version of a service launch object icon that is similar to a standard service or application icon (for example, that may be available in other UI locations on the device controlled by the user) wherein the controlled service launch object icon that exists within the one or more service launch partitions in the UI service launch partition has an appearance within the UI service launch partition that is modifiable, a location within the UI service launch partition that is modifiable, or has service launch object notification messages applied within the UI service launch partition as described herein.

In some embodiments, the service launch object icon appearance modifications, location modifications or service launch object notification messages that are managed or applied within the UI service launch partition are under the control of the UI location management service provider by means of the device management system 170-1 and the UI location manager 132-1 while the standard service or application icon that is located outside the UI service launch partition is not modifiable by the device management system 170-1.

In some embodiments, the UI service launch partition is an application, widget, OS library function or other software module that is installed in the OS or added to the OS (the "UI discovery management module") installed on the device. In some embodiments, the UI service launch partition is an application, widget, OS library function or other software module that is installed in the OS or added to the OS (the "UI discovery management module") installed on the device for the purpose of modularizing the software required to perform the device computing operations, communication operations, UI display operations and other operations required to implement the UI location manager 132-1. In some embodiments, the UI location manager 132-1 is integral to or contained within the UI discovery management module that manages which service launch objects are displayed to the user, the organization (wherein organizing includes any or all of ordering, prioritizing, ranking, sorting, classifying, etc.) of the service launch object icons within the UI service launch partition (including which partition a given service launch object is displayed in, the service launch object order within the partition, whether or not the service launch object is in the first display screen or the user has to scroll to see it, etc.).

In some embodiments, the UI discovery management module has pre-assigned UI location or UI graphic areas within the one or more service launch partitions for displaying service launch objects. In some embodiments, in order to simplify the process of communicating service launch object notification messages or placing them with the correct service launch object, each pre-assigned UI location or UI graphics area has the ability to display one or more service launch object notification message types in pre-configured locations or message formats, with the UI location manager 132-1 maintaining a table (for example, an array, a matrix, a look up table, etc.) or other means to identify which UI location or UI graphics area a given service launch object is located in so that when the service launch object notification message needs to be displayed it is placed in the correct UI location or UI graphics area. In some embodiments, placing a service launch object in a pre-assigned UI location or UI graphics area reduces the complexity of the modification, placement or notification messaging applied to one or more service launch objects, or simplifies or reduces the complexity of the UI location and notification messaging management instructions that are communicated from the device management system 170-1 to the UI location manager 132-1.

In some embodiments, service provider controlled UI launcher UI partition has a background that is different from the device screen background. In some embodiments, service provider controlled UI launcher UI partition has a background that is different from the device screen background, wherein different is one ore more of color, texture, font, transparency, intensity, gray scale, etc. In some embodiments, service provider controlled UI launcher UI partition has it's own background or is "opaque" to device screen background. In some embodiments, application or widget is "opaque" to screen background.

In some embodiments, service provider controlled UI launcher UI partition is partially visible relative (for example, translucent) to the background of the device screen.

In some embodiments, service provider controlled UI launcher UI partition is not visible (for example, it is transparent or see-through) and takes on the same background as the device screen. In some embodiments, the UI launcher UI partition takes on the background of a live wallpaper or other animated screen type.

In some embodiments, an application or widget is "transparent" to the screen background. In some embodiments, the transparent application or widget to screen background is accomplished with a UI partition graphic that is transparent. In some embodiments, the transparent application or widget to screen background is accomplished with a UI partition graphic that determines the screen background and uses it as the UI partition background. In some embodiments, the transparent application or widget to screen background is accomplished with a UI partition that consists of several individual launcher icons rather than an entire screen area.

In some embodiments, where the UI discovery management module is a OS library function or other software module that is installed in the OS or added to the OS for a group of devices, the advantageous aspects of the invention are included directly in the device OS. In some embodiments, wherein the UI discovery management module is a software application or widget it may be downloaded (for example, "over the air" (OTA) or "over the Internet") by a user, or installed by a user, or installed by a device OEM, or installed by a service provider or installed by a device distribution agent without the need to include it in the device OS. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget independent (for example, optional or not integral or erasable without affecting OS other operations) of the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module without the need to control other (including for example, similar) application icons on the rest of the device that are controlled by the user. In some embodiments, a UI location management service provider manages the discovery of service launch objects with little or no need to undertake the complexities of device software integration or OS software integration.

In some embodiments, a UI location management service provider, wherein the UI discovery management module is a software application or widget that may be downloaded, the complexities of OS software integration are reduced (for example, avoided).

In some embodiments, an organization screen is provided in the UI service launch partition to provide the user with a list of UI service launch partitions that the user can to choose from for displaying one or more categorized (wherein categorized may also be classified, ranked, organized) service launch objects within one or more partitions within the UI service launch partition. In some embodiments, the organization screen provides a user the option to select from a one or more display screens that each consist of one or more UI service launch partition that organizes a categorization of service launch objects. In some embodiments, the organization screen provides a user the option to select from a one or more display screens that each consist of one or more UI service launch partition that organizes a categorization of service launch objects and upon selection the user is provided with a categorization screen. In some embodiments, the categorization screen comprises display screens that organize service launch objects for one or more of: service plan types (have been purchased, available but have not been purchased, sponsored, free, paid, pre-paid, post-paid, recurring, time based, usage based, trial offers, special offers, family plan services, multi-device services, enterprise or work services, consumer services, etc.), services categorized by application type (for example, music and video, news, browsing, voice and video communications, shopping, location services, live event services, one time special event services, etc.), demographic based categorization (for example, work vs. play services, teen demographic services, pre-teen services, family services, etc.), etc.

In some embodiments, the organization screen displaying multiple categorizations of service launch objects is the first screen the user sees (the UI discovery module "default" screen). In some embodiments, the organization screen is accessed by the user via a user action (for example, a voice command, keep pad input, selecting the screen or clicking a UI button). In some embodiments, a organization screen may be provided wherein the user may select from a set of options to display one or more UI service launch partition categories on the default user partition display in the UI service launch partition. In some embodiments, a user may select to display one or more service launch partitions from: free services, pre-paid services and trial services partitions (or any other available service launch object categories) within the UI service launch partition. In some embodiments, a user may elect not to display one or more of post-paid or recurring services (or any other available service categorization). In some embodiments, a subset of the service launch partitions are user selectable. In some embodiments, a subset of the service launch partitions are not user selectable. In some embodiments, a subset of the service launch partitions are exclusively controlled by the device management system 170-1 via the UI location manager 132-1. In some embodiments, a some of the service launch partitions are user selectable while others are controlled by the device management system 170-1 via the UI location manager 132-1. In some embodiments, if too many service launch partitions are available within the UI service launch partition for simultaneous display to the user, then the UI service launch partition can provide for scrolling through the available service launch partitions.

In some embodiments, the UI discovery management module provides for an alternative display of service usage for one or more service launch objects wherein one or more service launch object identifiers (for example, service launch object icon) are displayed along with a usage indication for the one or more service launch objects. In some embodiments, the UI discovery management module provides for an alternative display of service usage, wherein the service usage is categorized. In some embodiments, service usage is categorized by service launch object. In some embodiments, service usage is categorized by (or further broken down by) one or more of application, network destination, network communication end-point (e.g., source to destination), application type, service type, network type, home vs. roaming, geography and service class.

In some embodiments, service or application discovery level (for example, discovery position) revolve through a UI partition according to a service launch object priority. In some embodiments, one of more of: a discovery level position or a discovery position range, a time in discovery position, a percent of time in discovery position, number of views or clicks, etc. are specified. In some embodiments, notification messaging is specified as a percent of service launch object icon interactions (for example, views, clicks, touches, voice commands, etc.).

In some embodiments, UI 160-1 manages at least a part of the device UI 101 presentation. In some embodiments, UI 160-1 manages at least a part of the device UI 101 presentation wherein presentation comprises one or more of view, display, format, number of screens. In some embodiments, UI 160-1 manages at least a part of the device UI 101 view for one or more of service launch object UI location, service launch object notification messages, service launch partition, service object launcher, UI discovery, service launch object icon. In some embodiments, UI 160-1 manages at least a part of the device UI 101 view for one or more of service launch object UI location, service launch object notification messages, service launch partition, service object launcher, UI discovery, service launch object icon based on user input (for example, user profile or preferences) or user behavior (for example, usage history or logs).

In some embodiments, UI 160-1 includes a console UI with view of device UI 101 one or more screens. In some embodiments, UI 160-1 includes a console UI with view of device UI 101 service launch partition. In some embodiments, UI 160-1 includes a console UI with view of device UI 101 for arranging configurations for service launch partitions. In some embodiments, UI 160-1 includes a console UI with view of device UI 101 for arranging configurations of one or more of skins, branding, color scheme, buttons and button arrangements. In some embodiments, UI 160-1 includes a console UI with view of device UI 101 to drag and drop (wherein for all instances drag and drop may be exchanged for drag or drop or move up or move down) of service launch object onto desired location in UI location management console 160-1 device UI launcher view for accomplishing correct positioning of service launch object on device. In some embodiments, UI 160-1 includes a console UI to associate service launch object icons with service launch object configuration elements.

In some embodiments, UI 160-1 enables drag and drop of service launch objects onto desired locations in UI 160-1 device UI launcher view to provision the device with service launch object parameters. In some embodiments, UI 160-1 associates service launch object icons with service policy elements in UI location management console 160-1.

In some embodiments, UI 160-1 enables drag and drop of service launch objects onto desired locations in UI 160-1 device UI launcher view to define service plan policies for the service launch object.

FIG. 234 shows a network manager UI environment 1770 for displaying notification templates (and associated device views) to drag a service or application up or down for presentation order (for example, priority, discovery level, etc.) in a device in accordance with some embodiments.

In some embodiments, UI 160-1 enables managing one or more of service launch object UI location, service launch object notification messages, service launch partition, service object launcher, UI discovery, service launch object icon as a function (or based on) network state, and device usage state.

In some embodiments, UI 160-1 defines a dynamic service launch object icon as a function of state, wherein the dynamic icon feature include one or more of icon service launch object appearance, overlay, placement, notification messages, etc.

In some embodiments, UI 160-1 defines a dynamic service launch object icon as a function of state, wherein the state includes one or more of network state, device usage state, and user state.

In some embodiments, UI 160-1 defines icon appearance as a function of network state or device usage state by selecting an icon and a secondary network state or device usage state screen to enter secondary appearance graphics (for example, one or more of: a new icon, an icon overlay, icon superposition). In some embodiments, UI 160-1 defines icon notification messages as a function of network state or device usage state by selecting an icon and a secondary network state or device usage state to enter secondary notification messages (for example, one or more of: type notification message text, select format, select graphics, select background, select a message from a table, etc.). In some embodiments, UI 160-1 defines icon notification message type as a function of network state or device usage state by selecting an icon and a secondary network state or device usage state to enter secondary notification messages. In some embodiments, UI 160-1 defines icon notification message type as a function of network state or device usage state by selecting an icon and a secondary network state or device usage state to enter secondary notification messages from one or more of: select notification message graphics background from drag and drop list, or enter new graphics, or type in notification message or choose from pre-specified list.

In some embodiments, UI 160-1 defines UI device views as a function of OS versions or device type. In some embodiments, UI 160-1 defines UI device views for a device group. In some embodiments, UI 160-1 defines UI device views for a device group sharing notification messages or icon appearance. In some embodiments, UI 160-1 defines UI device views for a device group includes one or more of: a configuration of launch objects, UI partitions, skins, branding, messages, etc. In some embodiments, UI 160-1 defines UI device views for a device group includes selecting notification messages or icon appearance from a common list.

In some embodiments, UI 160-1 includes a console UI "sandbox" for developers to manage (for example, design, modify, update, select, pick) a service plan. The UI sandbox provides third parties or developers with at least a subset of the suite of service plan management tools available to the service provider. In some embodiments, UI 160-1 management of a service plan comprises defining discovery position or time in discovery position.

In some embodiments, UI 160-1 management of a service plan comprises specifying time in discovery position based on a revolving percentage of time. In some embodiments, UI 160-1 management of a service plan comprises defining time in discovery position based on a screen view percentage.

In some embodiments, UI 160-1 management of a service plan comprises a developer entering credit credentials. In some embodiments, UI 160-1 management of a service plan comprises a developer billing based on more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, analytics generated messaging.

In some embodiments, UI 160-1 management of a service plan comprises a developer billing based on revenue share. In some embodiments, UI 160-1 management of a service plan comprises a developer obtaining analytics generated messaging.

In some embodiments, management system 10601 includes auto-download of associated service or application after UI launcher receives service launch object.

In some embodiments, management system 10601 includes auto-download of application when UI launcher receives service launch object so that user does not have to do this through marketplace. In some embodiments, the developer pays (or is billed) for auto-download of application or service capability.

In some embodiments, if a service or application or website is blocked (e.g., the device is not authorized to use the application or access the website under a current service plan or service policy), a notification message (for example, a text string with the blocked message) is presented that no plan is available to allow the service or application or website. In some embodiments, a button is provided to dismiss the message. In some embodiments, a button is provided to manage (for example, stop or stall or put into the background or kill) the service or application or website. In some embodiments, a button is provided to launch the user into an application management screen to manage (for example, stop or stall or put into the background or kill) the service or application or website.

In some embodiments, the UI location management system is associated (for example, coupled) to an application store or marketplace. In some embodiments, when or after an application developer uploads applications, the application developer receives an offer to bid on one or more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, and analytics generated messaging. In some embodiments, when or after an application developer uploads one or more applications, the application developer receives an offer based on revenue share. In some embodiments, when or after the application developer uploads applications, the application developer receives analytics generated messaging.

In some embodiments, when or after an application developer uploads applications, the application developer receives an offer to bid on one or more of more of: discovery position, views, time in position with percentage, clicks, messaging frequency (time, view refreshes, percentage), icon animation, icon feature change, purchase revenue share, analytics generated messaging.

In some embodiments, the management system 10601 recognizes the service or application plans a user (or device) has, and the launcher has a buy up (or upsell) selection (for example, a button) that offers upgrades. In some embodiments, the management system 10601 recognizes the service or application plans a user (or device) have and the UI 101 has a buy up button that offers upgrades.

In some embodiments, an offer to buy-down (or down-sell) is buried in (e.g., available through) a lower discovery screen.

In some embodiments, an offer to buy-down is buried in a lower discovery screen that has a larger number (including all) of service launch object choices and that the user has to discover through a multi-screen navigation.

In some embodiments, management system 10601 includes a web application programming interface (API) and application to implement a service object launcher widget. In some embodiments, management system 10601 includes a website to implement service object launcher widget.

In some embodiments, service launch objects are organized into categories set by the UI location management server 150-1. In some embodiments, service launch objects are organized into categories set by the device management system 170-1 as controlled by a service provider.

In some embodiments, the UI 101 is partitioned in areas of carrier (or service provider) control only or user control only or shared carrier and user control.

In some embodiments, a service launch object assists or becomes a discovery mechanism comprising one or more of the following: changing appearance of the service launch object based on carrier (wherein carrier could be a service provider or third party) control, placing notification messages on, in or near service launch object under carrier control, duplicating (for example, with derivate or modified or enhanced) icons of standard application icons, where duplicate icons are under carrier control and initiate other processes on the device (in addition to or instead of launching the service or application), automatic appearance or addition or removal of launch objects in a category, changing launch object categories, offering a marketing vehicle for application developers to market their services or applications.

In some embodiments, a service or application developer makes a widget (to replace the standard service or application icon) that the service or application developer controls and uses it to market a service or application. In some embodiments, a plurality of service or application developers make a widget to market a service or application. In some embodiments, a plurality of service or application developers share a widget by a third party to market a service or application. In some embodiments, a carrier or service provider or OEM desires to control network load or user attention (for example, so-called "eyeballs"). In some embodiments, a carrier or service provider or OEM desires to control network load or user attention by a shared widget to market services or applications. In some embodiments, management system 10601 provides a platform for a many (for example, a plurality of service or application providers) to one (shared device management system or application store or widget) to many (for example, a plurality of devices or users) marketing platform for one or more of: place notification messages (for example, promotions) on service launch object icons, move/add/delete service launch object icons, manage appearance of icons. In some embodiments, management system 10601 provides a marketplace for service or application developers or service providers to promote their service or application with a service launch object icon. In some embodiments, management system 10601 provides a marketplace for service or application developers or service providers to highlight their icons in the device discovery process.

In some embodiments, management system 10601 provides service or application developer levels (where levels is equivalent to classes, categories, ranking, etc.). In some embodiments, management system 10601 provides service or application developers one or more levels, with each level including one or more of the following features: place service or application in market place, monetize service or application use (for example, charge by view, click, time, update rate, bandwidth, etc. or for example, separate category for all application related traffic), positioning, amount of time/views/clicks in service discovery launcher, priority positioning, priority amount of time/views/clicks in service discovery launcher. In some embodiments, management system 10601 offers service or application developers charge by view or click at a given developer or discovery level.

In some embodiments, a service launch object ad is the presence of the service launch object icon in a managed system that controls the device service launch object icon service discovery level. In some embodiments, ads are for a service or application on the device. In some embodiments, ads are associated to a plurality of applications. In some embodiments, an ad management system determines a service or application on device 100 and provides an ad based on controlling the service launch object.

In some embodiments, the ad management system determines a subset of service or applications on device 100 and manages ads to multiple applications at the same time. In some embodiments, the ad management system advertising functionality comprises downloading the service or application, and highlighting the application on the UI.

In some embodiments, the ad management system presents the service launch object icon as if the service or application had been selected, and initiates other processes in addition to launching the service or application when the service launch object icon is selected. In some embodiments, the ad management system presents the service launch object icon as if the service or application had been selected, and initiates other processes comprising recording the selection for one or more of: analytics, usage statistics, charging, providing service sign up notification or usage notification (for example, "here are your options for service to use this application" or a roaming warning), download the applications, etc.

In some embodiments, ads are associated to a launch partition in, on, or near the service launch object being advertised. In some embodiments, an ad is placed directly on or next to the service launch object icon. In some embodiments, an ad is placed in a banner (for example, a ticker tape). In some embodiments, the device UI portion reserved for ads includes several classified (or tiered or ranked) partitions for ads (for example, a plurality of tiered banners). In some embodiments, the device UI portion reserved for ads includes several classified (or tiered or ranked) partitions for ads (for example, a plurality of tiered banners) and the ad management system places ads into each classified partition based on one or more of network, device usage, device or user state and desired discovery level. In some embodiments, the device UI portion reserved for ads includes several classified (or tiered or ranked) partitions for ads (for example, a plurality of tiered banners) and the ad management system places (alternatively prioritizes) ads into each classified partition based on one or more of network, device usage, device or user state and desired discovery level and bids from one or more ad providers.

In some embodiments, service launch object icon features are varied to increase or decrease service discovery (for example, highlight one or more apps, grey-down one or more apps). In some embodiments, ads associated to service launch object have icon features other (for example, different) than the icon features on the service launch object itself.

In some embodiments, service launch object icons are made available according to a priority policy. In some embodiments, a user controls service launch object presence or placement in certain device UI areas, and service provider controls presence and placement in other UI areas. In some embodiments, the mobile wireless communication device 100 has a permanent UI placement area that user cannot remove or modify service launch object. In some embodiments, the ads are placed in a service provider controlled device UI area, and dynamically change placement (for example, rotate or round-robin based on a random or ranked method) for presentation to a user.

In some embodiments, management system 10601 creates a service launch object icon similar to or identical to the standard service or application icon. In some embodiments, management system 10601 places the service launch object icon in a UI discovery location or applies notification messaging on, in or near the standard service or application icon or modifies the service launch object icon appearance according to a service discovery priority policy for that service launch object.

In some embodiments, selecting the service launch object icon registers the selection for one or more of the following functions: usage history log, click charging, intercepting the service or application launch and providing service notifications, downloading the associated service or application, launching the service or application.

In some embodiments, a list of device services or applications is obtained (for example, a search by UI location manager 132-1) for the on device screen or in an application stable. In some embodiments, management system 10601 indicates that the service or application is on the device to a marketing message management system. In some embodiments, the marketing message management system places a service launch object icon for a service or application in UI launcher. In some embodiments, the marketing message management system checks a device or user service plan status (for example, state) and if appropriate provides a marketing message to the user for services associated with that service or application. For example the marketing message management system notices the device has the YouTube application installed but does not have a special media streaming plan in place, and generates the marketing message: "would you like to learn more about a special media streaming plan service option?"

In some embodiments, the marketing message management system checks a device or user service plan status (for example, state) and generates a marketing message to the user for services associated with that service or application and the marketing message management system sends marketing messages related to the service or application. In some embodiments, the marketing message management system enters information of the device receiving the marketing message into a differentiated demographics value database indicating that marketing messages for that service or application are more valuable when sent to that device. In some embodiments, the marketing database charges more for sending marketing messages for that application to that device.

In some embodiments, interactions (responses, views, etc.) of a user with marketing messages are entered into a demographics value database for analysis (for example, regression, model fitting, classification, etc.). In some embodiments, the marketing message management system charges more for sending marketing messages for service or application to devices associated (for example, correlated) with analysis database information. In some embodiments, UI location manager 132-1 receives (for example, accepts) marketing message, finds service or application, places message on, in or near service or application.

In some embodiments, configuration or management of a UI launch area or other discovery management functions is performed by a device management agent, for improved user experience response time (for example, as user controlled UIs).

In some embodiments, configuration or management of UI launch area or other discovery management functions is performed by a device management agent, resulting in device software that is specific to a given OS. In some embodiments, the device management agent (for example, UI location management 132-1) accepts policies from a policy server (for example, UI location management server 150-1) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments, the device management agent (for example, UI location management 132-1) performs periodic update of service launch object (for example, one or more of service launch object icon, placement, notification messages, classification), or update of service launch object when user first clicks on portal widget. In some embodiments, the device management agent (for example, UI location management 132-1) downloads service or application (for example, if not available on device) via portal or portal instruction to download from application store or marketplace. In some embodiments, the device management agent (for example, UI location management 132-1) comprises device UI management policy instructions tied to UI location management console 160-1 which configures all of above. In some embodiments, UI location management console 160-1 accepts manager input and provisions device UI management policy instructions.

In some embodiments, the device management agent is assisted by a portal application and portal server API to define a part of policy on portal server rather than managing all on device. In some embodiments, this assistance provides an option for computation complexity sharing and device response time to user.

In some embodiments, the device management agent being assisted by a portal to define a part of a policy on a portal server results in less OS-specific software on device or a longer UI response. In some embodiments, the device management agent being assisted by a portal to define a part of policy on portal server results in considerable OS-specific software and slowed device responsiveness.

In some embodiments, the device management agent being assisted by a portal to define a part of policy on portal server (for example, UI location management server 150-1) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments, the device management agent (for example, UI location management 132-1) being assisted by a portal to define a part of policy on portal server (for example, UI location management server 150-1) performs periodic update of service launch object (for example, one or more of service launch object icon, placement, notification messages, classification), or update of service launch object when user first clicks on portal widget. In some embodiments, the device management agent (for example, UI location management 132-1) being assisted by a portal to define a part of policy on portal server (for example, UI location management server 150-1) downloads service or application (for example, if not available on device) via portal or portal instruction to download from application store or marketplace. In some embodiments, the device management agent (for example, UI location management 132-1) being assisted by a portal to define a part of policy on portal server (for example, UI location management server 150-1) comprises device UI management policy instructions tied to UI location management console 160-1 which configures all of above. In some embodiments, UI location management console 160-1 accepts manager input and provisions API information.

In some embodiments, the management system 10601 is website based and results in minimal OS specific software on device or longer UI response. In some embodiments, the website-based approach provides less OS-specific device software, but has a longer UI response.

In some embodiments, the website based management system 10601 manages one or more of UI launcher functionality: launch partition, service launch object classification, configuration, branding, device placement, icons, icon placement, icon features, icon overlay, icon messaging, icon rotation, highlighting, messaging policies, icon launch processes.

In some embodiments, the website based management system 10601 performs periodic update of service launch object (for example, one or more of service launch object icon, placement, notification messages, classification), or update of service launch object when user first clicks on portal widget. In some embodiments, the website based management system 10601 downloads from application store or marketplace. In some embodiments, the website based management system 10601 comprises device UI management policy instructions tied to UI location management console 160-1 which configures all of above. In some embodiments, UI location management console 160-1 accepts manager input and provisions device UI management policy instructions.

In some embodiments, UI location management console 160-1 displays a device view for a manager (for example, carrier, service provider, third party, service or application developer) to drag and drop icons or to drag and drop icons into a discovery priority bin for one or more of the following management location options: device management agent based with policy download, portal based with API server log in, or website based. In some embodiments, UI location management console 160-1 displays device view for manager to specify messaging, or messaging taken from sponsor sandbox or for manager to drags and drops icons into messaging frequency policy bin for one or more of the management location options: device management agent based with policy download, portal based with API server log in, or website based.

In some embodiments, a policy to control (for example, one or more of: allow, block, warn, throttle, background, etc.) a service or application is combined with the policy to present (for example, display) a service launch object (for example, through a service launch object icon).

In some embodiments, after a service or application that is attempted is identified, the application is offered as a service launch object in the "unpaid services," "paid services," or "free trial" offers. In some embodiments, when a user selects an unpaid service or application, a serve up service offer notification message is presented to the user. In some embodiments, the service launch object icon is used to get the user to try or buy services. In some embodiments, the device shares with a server that a service or application was attempted under a plan that did not cover the service or application. In some embodiments, after the device shares with a server that a service or application was attempted under a plan that did not cover the service or application, the server creates an offer notification message and instructs device to offer service or application in free trial area of service UI. In some embodiments, after the device shares with a server that a service or application was attempted under a plan that did not cover the service or application, a service launch object icon associated with the service or application is included in the launcher.

In some embodiments, statistics are collected on one or more top applications tried but not paid for. In some embodiments, a user enters new trial plan by hand.

In some embodiments, the device management system 170-1 highlights (for example, with notification messaging) to devices where users have tried to install. In some embodiments, the device management system 170-1 or UI location manager 132-1 performs automated association of application with application specific policies and notification for free trial. In some embodiments, the device management system 170-1 or UI location manager 132-1 performs automated association of application notification for a bulk bucket free trial ("click here for a free trial of a service plan that will allow 'textstringxyz' app").

In some embodiments, user friendly services or applications increase revenues by expanding data users or expanding data devices. In some embodiments, user friendly services or applications increase value for one or more of service providers, access carriers, OEMs, third-party over-the-top service or application providers, chipset providers and OS providers.

In some embodiments, a device is configured for select or trial or sponsored data access prior to delivery to a user. In some embodiments, a device is configured for select or trial or sponsored data access prior to delivery to a user, and the user does not need to configure or pay for partial service access. In some embodiments, basic device access is sponsored right out of the box and the user does not need to do anything to activate service. In some embodiments, from this sponsored out of the box condition, the user has certain "free" services that are sponsored by the service provider or third party. In some embodiments, the sponsored right out of the box devices include one or more of: sponsored website and application connection services, access to the carrier store, a limited amount of application specific services and bulk Internet access services that are provided on a trial (or limited or capped) basis. In some embodiments, the consumer is provided with an intuitive service or application user interface (for example, a permanent services discovery area on the device UI) where the user can instantly select from any number of service plans that are configured by the service provider.

In some embodiments, the arrangement of the permanent services discovery area on the device UI is OTA-configurable by the device management system 170-1 controlled by the carrier. In some embodiments, the enforcement of the required network control, charging or notification policies required to support service offerings, including one or more of sponsored and paid service offerings, is OTA-configurable by the device management system 170-1 controlled by the carrier. This policy enforcement and configuration capability is far beyond anything else in the market or on the drawing boards in the carrier network equipment world.

In some embodiments, over-the-top services or applications are monetized by managing application or service discovery placement and advertising. In some embodiments, an over-the-top service or application for a device group is sponsored, where the over-the-top service provider or application developer bids on earning a service discovery position for their service or application.

In some embodiments, a portion of the device home screen or other portions of the device UI are remotely configured or re-configured as a permanent carrier controlled service or application discovery UI environment. In some embodiments, a portion of the device home screen or other portions of the device UI are remotely configured or re-configured as a permanent carrier controlled service or application discovery UI environment (for example, dynamically or periodically or state based) by an OTA device management system 170-1. In some embodiments, an OTA device management system 170-1 configuration controls what the user can modify and what they cannot.

In some embodiments, the service or application icons displayed in the permanent discovery area are used to display a service or application launch opportunity the carrier wishes to provide the user.

In some embodiments, when the user selects a service launch object icon in the discovery area, the device inserts notification messages prior to, concurrently or after launching the service or application. In some embodiments, the notification messages include service plan offers customized to the service or application, service usage warnings (for example, service or application uses a lot of data, or service or application causes high roaming costs, etc.), offers for a related service or application, etc. In some embodiments, notification messages associated with a service launch object icon launch are OTA-configured.

In some embodiments, a network entity of management system 10601 provides updates to the service launch object management (for example, UI discovery, placement, notification message, etc.). In some embodiments, a network entity of management system 10601 provides a partial (or full) software upgrade for managing a service launch object. In some embodiments, a network entity of management system 10601 provides updates to the policy or policy software or policy parameters associated with a service launch object. In some embodiments, a network entity of management system 10601 provides a policy software updates to mobile wireless communication device 100. In some embodiments, a network entity of management system 10601 provides service launch object management (for example, UI discovery policy) software updates to mobile wireless communication device 100. In some embodiments, a network entity of management system 10601 provides a partial of full software upgrade (including new device software) to enable or update service launch object management (for example, UI discovery policy) to mobile wireless communication device 100.

In some embodiments, the service or application icons are re-arranged (for example, dynamically re-classified, re-ranked, re-prioritized, re-sorted) according to a discovery priority policy set by the device management system 170-1. In some embodiments, the re-arrangement is static between discovery policy updates between the device management system 170-1 and the device. In some embodiments, the re-arrangement is dynamic between policy updates between the device management system 170-1 and the device, wherein the arrangement of the service or application is modified periodically. In some embodiments, the re-arrangement is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments, each service launch object icon has a discovery placement priority policy so that some service launch object are always displayed in a high discovery location, some service launch object are often displayed in a high discovery location, and some service launch object are rarely or never displayed in a high discovery location.

In some embodiments, a subset of service launch object icon within the launch area have a marketing message placed on it according to a service discovery policy. In some embodiments, the marketing message is defined by the service provider or entered into the service provider system by the service or application sponsor.

In some embodiments, each service launch object icon has a messaging priority policy so that some service launch object have frequent discovery messages, some service launch object have less frequent service discovery messages, and some service launch object rarely or never get service discovery messages. In some embodiments, the frequency of service launch object discovery messages is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc.

In some embodiments, management system 10601 manages one or more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: time of day, geography, network state, device cognitive state, user state, user interaction with the device, etc.

In some embodiments, the management system 10601 locates a service launch object that has been downloaded to the device by the user and places service launch object icons in the launch area. In some embodiments, placing user-downloaded service launch object icons in the launch area is advantageous when the carrier offers services associated with the service or application that the carrier desires to promote. In some embodiments, this is advantageous if the service or application sponsor is willing to pay the carrier for increased discovery priority when the user has downloaded the service or application.

In some embodiments, the management system 10601 locates a user service or application that has been downloaded to the device, identifies the location in the UI where the service launch object icon has been placed by the user, and provides service or application marketing messages in, on, or near the service launch object icon. In some embodiments, a marketing message is defined by the service provider or entered into the service provider system (for example, a service design center) by the service or application sponsor.

In some embodiments, each service launch object icon defined by the service provider or entered into the service provider system has a messaging priority policy so that some service launch object have frequent discovery messages, some service launch object have less frequent service discovery messages, and some service launch object rarely or never get service discovery messages.

In some embodiments, the frequency of service launch object discovery messages is defined by the service provider or entered into the service provider system and is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments, the service provider (or entered into the service provider system) manages one ore more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: TOD, geography, network state, device cognitive state, user state, user interaction with the device, etc.

In some embodiments, the management system 10601 locates a user service or application that has been downloaded to the device, identifies the location in the UI where the service launch object icon has been placed by the user, and overlays graphics or text or sounds (for example, a modified icon) in, on, or near the service launch object icon to provide one or more of: highlight the discovery level of the service launch object (or associated service or application) to the user, indicate whether the service or application can access the network (for example, wireless wide-area network (WWAN)) given the services available to the user (for example, services the user has elected to pay for), indicate whether the service or application is free or is charged to a user bucket, indicate whether the service or application currently has access to the network (for example, WWAN or Wi-Fi) or not (for example, roaming policies can be set up according to applications, network policies can be set up according to application [4G, 3G, 2G, Wi-Fi, etc.], QoS or congestion policies can be set up according to applications, etc.).

In some embodiments, management system 10601 is configured with a device management secure back-end portal controlled by the carrier.

In some embodiments, the management system 10601 device management secure back-end portal has a sandbox capability that allows service or application sponsors (or developers) to log in and pay for, or bid on one or more of the service or application discovery services described above. In some embodiments, the system provides for bidding on discovery location, message frequency, views, clicks, etc.

In some embodiments, the user gets more control of the device UI when the user pays more (for example, buys up or purchases an upsell service). In some embodiments, the user gets less control of the device UI in exchange for a service plan discount from the service provider. In some embodiments, higher levels of service plan (for example, more expensive plans, or by accumulating rewards from service or application usage) provide higher levels of UI customization. In some embodiments, the user gets a discount or a sponsored service (for example, subsidized service or application access) in exchange for allowing the service provider (or some other network entity, such as an application provider) to control the device UI. In some embodiments, the user receives a discount on device service to turn over a UI portion or partition of the device.

In some embodiments, two or more network entities (for example, a carrier and an application developer) share the revenue for an over-the-top service. In some embodiments, two or more network entities (for example, carrier and application developer) share the revenue for an over-the-top service (for example, a service launch object associated to a service or application or content), where one entity provides the service, application or content and the other entity provides the access.

In some embodiments, the device UI changes as user changes service plan. In some embodiments, the device UI shows free service or application until the user tries the service or application. In some embodiments, after the user tries the service or application, the service launch object shows entry level paid service or application. In some embodiments, after the user tries the entry level paid service or application, the service launch object shows upgrade service or application (for example, upsells). In some embodiments, if the usage of service or application (or revenue) falls back, the service launch object shows a lower cost alternative (for example, free service or application again). In some embodiments, the management system 10601 change offered service launch object (or associated service or application) based on the available service launch object on the device.

In some embodiments, service plans are sorted from lowest to highest cost data plans based on (or normalized) a per unit time basis based on a number of previous weeks of usage. In some embodiments, only upsell (or buy up) service plans are shown in the sorted list.

In some embodiments, a user or network entity has several options for sponsored data and an auction (or bidding engine) selects the winning service.

In some embodiments, a service or application provider bids for UI discovery or placement (based on priority, user demographics, network state, device usage state, device cognitive state) over one or more geographies (for example, one or more area codes or cities) or over one or more geography tiers (nationwide, statewide, regional, sub-regional, address plus radius). In some embodiments, higher geography tiers receive a bid discount (for example, nationwide has a lower normalized cost than statewide).

In some embodiments, the service launch object provides control of the service or application. In some embodiments, the service launch object intercepts and controls the service or application. In some embodiments, the service provider (or OEM) takes over the service or application by installing a service launch object associated to the service or application. In some embodiments, the service launch object is associated to multiple services or applications and has a table of services or applications with policy entries for one or more of the associated services or applications. In some embodiments, the policies comprise one or more of: hold launch, notify (user or network entity) of launch, acknowledge selection of service or application, launch service or application and log acknowledgement in customer care, notify in parallel to launch, block launch, block launch and notify user or network entity, notify, acknowledge (for example, log selection).

In some embodiments, the notification associated to the service or application associated to the service launch object comprise one or more of the following types of notification: need a service plan, selected application is expensive on this network, selected application is expensive when roaming, an advertisement associated to service or application (typically in parallel, but could be in series), offering alternate applications, offering related applications, offering related activity, offering related merchandise, combine with location, state, etc. information. In some embodiments, the notification associated to the service or application associated to the service launch object comprise informing a user of fraud. In some embodiments, the service is discontinued or discounted or service use is accelerated based on fraud. In some embodiments, the notification ranks service or applications according to what is about to run out. In some embodiments, the notification ranks service or applications according to what is about to run out and give an option to click down.

In some embodiments, the service provider manages location management service or application (for example, access services).

In some embodiments, the service launch object icon is the standard (wherein standard could refer to the generic, normal or typical) icon, and the management system 10601 provides one or more of UI placement, location discovery (for example, including selecting portions in one or more UI partitions or tiers or classification) and network entity based policies (or directly managed by network entity) for the standard application icon.

In some embodiments, a service or application is launched when a network state change occurs, an entity of management system 10601 obtains usage counts to determine that a service or application is in use, searches through table (for example, for policy instructions associated to service or application) associated with service or application in use, and enforces policy (for example, shut down service or application or keep service or application operating and notify user in parallel). In some embodiments, a network state changes after a service or application is launched, a subset of the service or application included in the active table are forced to quit and to re-launch on new network state.

In some embodiments, for bidding on UI location (placement, discovery level, etc.) of service or application associated to service launch object comprises a bid table. In some embodiments, the bid table includes one or more entries for: spots, graphics, text, animation per entry. In some embodiments, bid table entries have time service launch objects. In some embodiments, bid table entries have a minimum time window. In some embodiments, bid table entries change with time of day. In some embodiments, bid table entries have entries change with device usage state. In some embodiments, bid table entries have entries change with geo. In some embodiments, bid table entries include one or more of: bid on one or more spots, bid on one or more time service launch objects, bid on one or more time of day, bid on one or more geos. In some embodiments, the service launch object are swapped based on one or more of: changes is geo, network state, device usage state, etc.

In some embodiments, the bid is for a pre-configured geography. In some embodiments, the bid is on geographic location (city, state, etc.) or zip with radius. In some embodiments, the user of bidding platform pays for one or more of: per display, per unit time, or per click. In some embodiments, the base pay is for a unit time. In some embodiments, payment increased per view (for example, with a limit). In some embodiments, additional payment per click (for example, with a limit or cap). In some embodiments, pay increases for animation, etc.

In some embodiments, bulk buys (for example, discounts, rebates, coupons, etc.) are provided for large geographic areas (for example, nationwide). In some embodiments, bidder pays more for geographic specific bids. In some embodiments, bids have TOD policies. In some embodiments, bids have device usage (or network) state policies. In some embodiments, table entry in a given geographic and time of day goes to highest bidder. In some embodiments, the bid includes a minimum time window.

In some embodiments, bid winner algorithms as based on geographic level (for example, population or area size or level) selection relative to bid offer. In some embodiments, bidder screen provides selection of geographic areas to bid on and high bidder wins. In some embodiments, the highest nationwide bidder (for example, regardless of regional or local bidders). In some embodiments, regional highest bidder is considered if higher than a nationwide bidder by a target amount (for example, percentage or threshold, etc.). In some embodiments, location specific bidder is considered if higher than a regional (or nationwide) bidder by a desired target amount. In some embodiments, a device usage (or network or device or user) state specific bidder is considered if higher than larger geographic bidders by a target amount. In some embodiments, a previous bid winner is shuffle down if knocked down by higher bid (or higher by a give percentage or threshold) for higher position. In some embodiments, the bid winner algorithm is based on maximizing the revenue from bid pool or devices.

In some embodiments, bidding includes one or more spots including: spot for search, spot for featured sponsored, spot for ads, spots for coupons, spot for maps, etc. In some embodiments, the bidding includes bid types, for example, bid on specialized spots or bid on general purpose spots (for example, based on target user, or device, or geographic location, or network state parameters). In some embodiments, select targeted time or geography or state rules for special spots (vs. general purpose spots). In some embodiments, the bidding platform includes an area (or portion of device UI) for OEM customization. In some embodiments, the bidding platform includes an area (or portion of device UI) for user customization. In some embodiments, the area for OEM or user customization may be viewed on a service design center (SDC) screen.

In some embodiments, the portion of the device UI reserved for the launcher is configurable (for example, left, center right, small, medium, large, upper, middle, lower). In some embodiments, the portion of the device UI reserved for the launcher is SDC or OTA-configurable. In some embodiments, the device is configured to include a UI menu for configurable discovery management display or launcher. In some embodiments, the device includes a default launcher, for example, for (first) power up, and then user can subsequently change. In some embodiments, the default launcher comes back every power cycle or comes back after a set time or comes back after sleep. In some embodiments, the return to default launcher is SDC or OTA-configurable. In some embodiments, the launcher configuration is viewable in SDC screen.

In some embodiment place a special identifier near the launcher (for example, make a shim below launcher) so that the launcher area is permanent. In some embodiments, the UI portion includes an enhanced launcher that recognizes permanent areas and gives the user control of all other areas when they download the enhanced launcher.

In some embodiments, a user or network entity can drag icons from launcher to standard UI display (or screen). In some embodiments, the icons could be converted (or reverted) between real icons or special launcher icons. In some embodiments, the icons could be converted (or reverted) between real icons or special launcher icons when the icons are dragged between the launcher and the standard UI display.

In some embodiments, a network system performs a method comprising: obtaining information to assist in identifying a plurality of portions of a user interface of a wireless device, the wireless device communicatively coupled to the network system over a wireless access network; obtaining an object placement policy, the object placement policy comprising a first set of one or more rules for identifying a particular portion of the plurality of portions of the user interface of the wireless device in which to place one or more objects; determining a differentiating attribute for the particular portion of the user interface; obtaining the one or more objects; based on the object placement policy, determining configuration information, the configuration information at least configured to assist the wireless device in placing the one or more objects in the particular portion of the user interface; and sending the configuration information to the wireless device over the wireless access network. In some embodiments, obtaining the object placement policy comprises obtaining the first set of one or more rules from a service design center. In some embodiments, obtaining the object placement policy comprises obtaining the first set of one or more rules from memory. In some embodiments, obtaining the object placement policy comprises obtaining the first set of one or more rules from an entity associated with at least one of the one or more objects.

In some embodiments, at least one of the one or more objects is a service launch object. In some embodiments, at least one of the one or more objects is an advertisement.

In some embodiments, the first set of one or more rules is configured to establish an ordering within the plurality of portions. In some embodiments, the plurality of portions includes a first portion and a second portion, and the first set of one or more rules is configured to establish the first portion as a higher priority portion than the second portion.

In some embodiments, at least one of the one or more objects is associated with one or more of a particular application program, a particular service, a particular content item, and a particular advertisement. In some embodiments, at least one of the one or more service launch objects is an icon. In some embodiments, at least one of the one or more service launch objects is a banner advertisement. In some embodiments, at least one of the one or more service launch objects is a particular icon for launching a particular application program. In some embodiments, at least one of the one or more service launch objects is a particular icon for launching a particular service. In some embodiments, at least one of the one or more service launch objects is a particular icon for launching a particular content item. In some embodiments, at least one of the one or more service launch objects comprises an advertisement. In some embodiments, at least one of the one or more service launch objects is configured to launch a purchase offer.

In some embodiments, obtaining information to assist in identifying the plurality of portions of the user interface of the wireless device comprises obtaining the information from an entity. In some embodiments, the entity is an operator of the wireless access network. In some embodiments, obtaining information to assist in identifying the plurality of portions of the user interface of the wireless device comprises obtaining the information from memory. In some embodiments, obtaining information to assist in identifying the plurality of portions of the user interface of the wireless device comprises obtaining the information from the wireless device. In some embodiments, obtaining information to assist in identifying the plurality of portions of the user interface of the wireless device comprises obtaining the information from an entity associated with at least one of the one or more objects. In some embodiments, obtaining information to assist in identifying the plurality of portions of the user interface of the wireless device comprises obtaining the information from a pre-determined configuration.

In some embodiments, the configuration information comprises a software build. In some embodiments, the software build comprises an update to a user interface software build.

In some embodiments, at least one of the one or more objects is a particular icon configured to launch a particular software application, and the configuration information is further configured to assist the wireless device in associating the particular icon with the particular software application.

In some embodiments, the plurality of portions of the user interface includes a partition of a screen of the wireless device. In some embodiments, the plurality of portions of the user interface includes a particular screen of a multi-screen user interface display. In some embodiments, the plurality of portions of the user interface comprises a plurality of partitions of a multi-screen user interface display. In some embodiments, the plurality of portions of the user interface comprises a plurality of partitions. In some embodiments, the plurality of partitions is classified based on ease of discovery to a user of the wireless device. In some embodiments, classifying comprises one or more of prioritizing, ranking, ordering, sorting, and establishing tiers.

In some embodiments, at least one of the one or more objects is associated with an entity comprising one or more of a user interface location manager, an original equipment manufacturer, a carrier, an access carrier, a service provider, and an object provider.

In some embodiments, determining the differentiating attribute or characteristic of the portion of the user interface comprises determining a characteristic to assist a user in identifying the particular portion of the user interface. In some embodiments, the differentiating attribute comprises one or more of a border, a window, a color, a wallpaper, a background, a texture, a transparency, and a brightness.

In some embodiments, the network system obtains information about a network state and obtains the one or more objects for placement in the particular portion of the user interface by obtaining the one or more objects based on the information about the network state. In some embodiments, the network state is one or more of a network type, a network cost, a network service plan, a network latency, and a network quality-of-service level. In some embodiments, the network type is one or more of Wi-Fi, cellular, home, and roaming.

In some embodiments, the network system obtains information about a device state and obtains the one or more objects for placement in the particular portion of the user interface by obtaining the one or more objects based on the information about the device state. In some embodiments, the device state comprises one or more of a current usage measure, a past usage measure, a current device location, a past device location, a current user interaction state, a past user interaction state, a current device cognitive state, and a past device cognitive state.

In some embodiments, the network system obtains information about a user and obtains the one or more objects for placement in the particular portion of the user interface comprises obtaining the one or more objects based on the information about the user. In some embodiments, the information about the user comprises one or more of a user profile, a user preference, a current behavior, or a past behavior.

In some embodiments, the configuration information assists the wireless device in preventing a user from modifying the particular portion of the user interface or a contents of the particular portion of the user interface.

In some embodiments, at least one of the one or more objects is associated with a particular service or a particular application, and wherein the configuration information is further configured to assist the wireless device in one or more of: enabling or launching the particular service or the particular application when a user selects the object, and providing additional management functions to the particular service or the particular application when the user selects the object. In some embodiments, the additional management functions include one or more of providing service usage information, allowing object modification, and providing object notification messages. In some embodiments, allowing object modification comprises allowing modifications to one or more of object placement, object positioning, and object classification.

In some embodiments, the network system classifies the one or more objects, and the configuration information is based on the classification of the one or more objects.

In some embodiments, the network system provides a view of the user interface of the wireless device to a network system manager.

In some embodiments, identifying the particular portion of the user interface of the wireless device comprises obtaining identifying information from a service design center. In some embodiments, determining the differentiating attribute of the identified portion of the user interface comprises obtaining attribute information from a service design center.

In some embodiments, the network system obtains the one or more objects for placement in the particular portion of the user interface by selecting the one or more objects based on a second set of one or more rules.

In some embodiments, at least one of the one or more objects is associated with a particular entity of a plurality of entities, and further comprising: obtaining bids from one or more of the plurality of entities, including the particular entity; and identifying the particular entity as a winning bidder.

Service Plan Creation and Display System

In some embodiments, the service design center 135 illustrated in FIG. 1 provides an interface 145 through which a service provider or a third party can design the appearance and content of service plans that can be available to the user of the mobile wireless communication device 100. In some embodiments, through the SDC interface 145, the service provider and/or the third party can determine properties for new and existing service plans including name, description, cost, time duration, time period of availability, associated icons, individual functional properties, placement, appearance, listing order and other display properties. In some embodiments, through the SDC interface 145, the service provider and/or the third party can include service plans in a catalog of service plans that can be displayed through the UI 101 of the mobile wireless communication device 100. In some embodiments, through the SDC interface 145, the service provider or third party determines for a service plan what information is displayed, how the information is displayed, where the information is displayed, and to whom the information is displayed. In some embodiments, through the SDC interface 145, notification messages associated with service plans can be designed. In some embodiments, a set of featured service plans can be designed with display properties that be highlighted to the user of the mobile wireless communication device 100. In some embodiments, promotional banners can be designed that provide for advertising service plans to the user of the mobile wireless communication device 100 through the UI 101. In some embodiments, through the SDC interface 145, the service provider and/or third party configures service plans, service plan bundles, base service plan sets, and featured service plan lists. In some embodiments, through the SDC interface 145, the service provider and/or third party configures marketing interceptors, notifications, promotional banners, promotional popups, and upsells. In some embodiments, through the SDC interface 145, the service provider and/or third party configures priorities for service plans. In some embodiments, through the SDC interface 145, the service provider and/or third party configures subscribers and subscriber groups.

FIG. 235 illustrates a representative screen 1780 displaying information about a representative service design center 135 and a set of inputs for securely logging into the service design center 135 using a username and a password. In some embodiments, the screen 1780 is presented to an administrator through a computer display communicatively coupled to and/or part of the service design center 135. In some embodiments, logging into the service design center 135 through the screen 1780 provides access to managing service plans for an authorized user and/or administrator (hereinafter referred to as the "administrative user.")

FIG. 236 illustrates a representative set of icons 1782 that can be presented through the SDC interface 145 to the administrative user, in some embodiments. The set of icons 1782 includes icons grouped together for service plan design, subscriber and group definition, and administrative functions. The service plan design group of icons includes individual icons for associating service plans with service policies, establishing and modifying service policies, defining service plan catalogs, defining and using service plan templates, and setting service provider (carrier) policies. The subscriber and group definition group of icons includes icons for creating and managing subscribers, creating and managing subscriber groups, and associating subscribers and subscriber groups with service plans. The administrative function icons include generating reports, creating administrative users, establishing roles for administrative users, and defining profiles for administrative users. The set of icons 1782 is representative of one possible grouping; however, a person of ordinary skill can understand that the set of administrative functions provided through the SDC interface 145 can be grouped into alternative sets and displayed with different icons and in different groups of icons.

FIG. 237 illustrates a representative screen 1784 displaying a set of properties for a service plan that the administrative user can enter and/or modify through the SDC interface 145, in some embodiments. In some embodiments, the administrative user can select a service policy to associate with the service plan. In some embodiments, the administrative user can determine an activation date when the service plan can be activated. In some embodiments, the administrative user can determine an optional deactivation date when the service plan can be deactivated. In some embodiments, the administrative user selects a type of service plan from a set of service plan classes to define the type of service plan. In some embodiments, the administrative user selects a "Paid" service plan class to create a service plan that can be selectable and purchasable by a subscriber, e.g., the user of the mobile wireless communication device 100, and for which the subscriber can be charged for service usage. In some embodiments, the administrative user selects an "Activation" service plan class to create a service plan that is free to the subscriber and is assigned to the mobile wireless communication device 100 during an activation process. In some embodiments, "Activation" type service plans are pre-loaded into the mobile wireless communication device 100 during manufacturing or distribution. In some embodiments, "Activation" type service plans are downloaded to the mobile wireless communication device 100 through a communication channel (over the air and/or through a physical connection) during an activation process during and/or after purchase of the mobile wireless communication device 100. In some embodiments, "Activation" type service plans provide the subscriber with a free trial period for a particular service or set of services. In some embodiments, the administrative user selects a "Sponsored" service plan class to create a service plan that is free to the subscriber for a particular service offered by a service provider or by a third party. In some embodiments, sponsored service plans provide free access to a particular service communication type (e.g., free Wi-Fi) or free access to a third-party website (e.g., free access to Android Play Store.) In some embodiments, the administrative user selects whether the sponsored service plan is provided to the subscriber automatically. In some embodiments, the administrative user selects whether the sponsored service plan can be shared with and/or assigned to different mobile wireless communication devices. In some embodiments, the administrative user selects whether the sponsored service plan can be re-purchased.

In some embodiments, the administrative user selects whether the service plan can be shared with one or more other subscribers associated with a common service account. In some embodiments, the administrative user determines whether the service plan is limited by an amount of service usage, e.g., a data amount or an amount of time used. In some embodiments, the administrative user determines an amount of data available for a time period. In some embodiments, the service plan recurs for successive time periods. In some embodiments, the amount of data available for successive time periods replenishes for each time period. In some embodiments, the administrative user creates a base service plan. In some embodiments, the base service plan recurs for regular time periods, e.g., hourly, daily, weekly, or monthly. In some embodiments, the base service plan can be shared among multiple users and/or mobile wireless communication devices 100. In some embodiments, the base service plan can be upgraded to provide a greater range of service capability and/or downgraded to provide a lesser range of service capability. In some embodiments, the administrative user determines a reporting interval based on an accumulated amount of service usage. In some embodiments, the administrative user can select that an activation service plan and/or a sponsored service plan can be hidden from the user of the mobile wireless communication device 100, e.g., not visible through the UI 101 of the mobile wireless communication device 100.

FIG. 238 illustrates a representative screen 1786 that informs the administrative user through the SDC interface 145 that a default icon will be associated with a service plan when a custom icon has not yet been assigned to the service plan. Screen 1786 illustrates a representative default icon 1787 for a service plan. During the service plan creation process, the administrative user can have, in some embodiments, an opportunity to associate the service plan with a custom icon.

FIG. 239 illustrates a representative screen 1800 that provides, in some embodiments, for the administrative user, through the SDC interface 145, to enter and/or modify a set of display properties of the service plan. In some embodiments, the administrative user selects a custom icon 1802 to associate with the service plan. In some embodiments, the administrative user selects the custom icon from a set of available icons. In some embodiments, the administrative user sets the custom icon by uploading a displayable bit map or picture. In some embodiments, the (default or custom) icon associated with the service plan displays on one or more screens through the UI 101 of the mobile wireless communication device. In some embodiments, the administrative user enters a display name 1804 for the service plan that displays to the user of the mobile wireless communication device 100 through the UI 101. In some embodiments, the (default or custom) icon 1802 displays together with the display name 1804 through the UI 101 of the mobile wireless communication device 100. In some embodiments, the icon 1802 and/or display name 1804 are displayed through the UI 101 for a catalog of service plans, for a service plan details screen, in a menu of service plans, in a notification message, or in a marketing interceptor. In some embodiments, the administrative user enters a short description 1806 for the service plan that displays with the service plan display name 1804 on select screens presented through the UI 101 of the mobile wireless communication device 100. In some embodiments, the administrative user enters a more detailed description 1808 for the service plan that displays with the service plan display name 1804 on select screens presented through the UI 101 of the mobile wireless communication device 100. In some embodiments, the administrative user determines a display type for service usage associated with the service plan and displayed through the UI 101 of the mobile wireless communication device 100. In some embodiments, an amount of service usage, a time period of service usage, or a combination of both an amount of service usage and a time period of service usage is displayed. In some embodiments, the service usage display dynamically updates. In some embodiments, service usage display is static.

FIG. 240 illustrates representative screens 640 and 645 that provide information through the UI 101 of the mobile wireless communication device 100 for a catalog of service plans and for a particular service plan respectively. In some embodiments, the catalog of service plans is displayed through the UI 101 organized into a tabbed display. The representative screen 640 displays a tab that includes a set of "Data Add-On" service plans organized by subscription time periods. A portion of screen 640 includes information for a particular service plan, namely the "Maps & Nav for 1 Week" service plan. In some embodiments, the information displayed in the catalog tab screen, through the UI 101 of the mobile wireless communication device 100, as illustrated by the representative screen 640 of FIG. 240, corresponds to information entered by the administrative user through the representative screen 1800 of the SDC interface 145 illustrated in FIG. 239. In particular, representative screen 1800 includes the icon 1802, the display name 1804, and the short description 1806 grouped together to provide information for a particular service plan, namely the "Maps & Nav for 1 Week" service plan, within a listing of service plans. As shown in screen 640 of FIG. 240, each service plan includes its own icon, display name, and short description, to provide the user of the mobile wireless communication device 100 a concise summary of information for each service plan. In some embodiments, a price 1812 for subscription to a particular service plan is displayed with the other service plan information, e.g., the "$2.99" price 1812 shown in screen 640 for the "Maps & Nav for 1 Week" service plan. In some embodiments, the user of the mobile wireless communication device 100 selects a portion of the UI 101 for a particular service plan to initiate purchase of the particular service plan, e.g., by selecting one of the "Buy" buttons displayed, such as button 4261 for the "Maps & Nav for 1 Week" service plan. In some embodiments, the user of the mobile wireless communication device selects a portion of the UI 101 for a particular service to learn more details about the service plan.

Representative screen 645 illustrated in FIG. 240 provides service plan details for the particular "Maps & Nav for 1 Week" service plan of the "One Week" service plans displayed in screen 640. In some embodiments, the service plan icon 1802 and the service plan name 1804 are displayed together at the top of the service plan details screen 645. In some embodiments, the details service plan screen 45 also displays a time period for the service plan, e.g., "1 week" as shown on screen 645 adjacent to the service plan icon 1802 and beneath the service plan display name 1804. In some embodiments, the detailed description 1808, provided through the SDC interface 145 and illustrated on screen 1800 of FIG. 239, is displayed on the service plan details screen 645, as shown in FIG. 240. In some embodiments, a service plan is associated with a set of supported applications. In some embodiments, the service plan icon 1802 is displayed in a portion of the service plan details screen 645 as a supported application. In some embodiments, the service plan details screen 645 includes the price 1812 for the service plan, e.g., $2.99 as displayed for the "Maps & Nav for 1 Week" service plan.

FIG. 241 illustrates a representative screen 1810 that provides, in some embodiments, for the administrative user, through the SDC interface 145, to enter and/or modify a set of billing properties for the service plan. In some embodiments, the administrative user sets the price 1812 for the service plan, e.g., $2.99 as shown in FIG. 241. In some embodiments, the administrative user sets a time period (cycle length) for the service plan over which a limited amount of service usage applies. In some embodiments, the service usage limit resets at the end of each cycle. In some embodiments, the time period is set to a number of hours, days, weeks, or months. In some embodiments, a service plan that is non-recurring requires a minimum time period of one cycle length. In some embodiments, the administrative user sets whether service usage limits for the service plan reset after each time period (cycle length) occurs. In some embodiments, the administrative user sets a minimum time period for the service plan. In some embodiments, the service plan is not cancelable until the minimum time period expires.

FIG. 242 illustrates a representative screen 1814 that provides, in some embodiments, for the administrative user, through the SDC interface 145, to enter a billing price with a selectable currency denomination and a separate display price 1812. In some embodiments, the display price 1812 (e.g., $1.25 as shown in FIG. 242) is the same as the billing price. In some embodiments, the display price differs from the billing price. FIG. 242 illustrates a representative screen 1816 that provides detailed information for a paid service plan, e.g., "YouTube 1 hr over 1 day." In some embodiments the service plan details screen 1816 displays the display price 1812 in a region of the UI 101 that includes the service plan name 1804, a service plan time period, and the service plan icon. In some embodiments, a region of the UI 101 includes a set of supported applications including the service plan icon 1802 through which the supported application can be directly launched when selected by the user of the mobile wireless communication device 100.

FIG. 243 illustrates a representative screen 1818 that provides detailed information for a free service plan, e.g., "Free Application Bundle." In some embodiments the display price for the free service plan is shown as "free" on the detailed information screen 1818 for the service plan. In some embodiments, an "Activation" service plan as can be selected by the administrative user through screen 1784 shown in FIG. 237 displays as a "free" plan through the UI 101 of the mobile wireless communication device 100, as shown for the "Free Application Bundle" service plan illustrated in FIG. 241. In some embodiments, a "Sponsored" service plan as can be selected by the administrative user through screen 1784 shown in FIG. 237 displays as a "free" plan through the UI 101 of the mobile wireless communication device 100, as shown for the "Free Application Bundle" service plan illustrated in FIG. 241. In some embodiments, an "Activation" service plan or a "Sponsored" service plan displays as "free" when the display price 1812 is set to be "zero," e.g., $0.00, through the SDC interface 145, in the display price 1812 field of screen 1810 (FIG. 241) or screen 1814 (FIG. 242).

FIG. 244 illustrates a representative screen 1820 that provides, in some embodiments, for the administrative user, through the SDC interface 145, to enter a time period, e.g., "30 days," for a "one time" service plan, that is displayed on a service plan details screen 1821 through the UI 101 of the mobile wireless communication device 100, as shown in FIG. 244.

FIG. 245 illustrates a representative screen 1822 that provides, in some embodiments, for the administrative user, through the SDC interface 145, to enter a recurring time period (cycle length), e.g., "1 month," for a "recurring" service plan, that is displayed on a service plan details screen 1823 through the UI 101 of the mobile wireless communication device 100, as shown in FIG. 244. Along with the recurring time period displayed, the service plan details screen 1823 includes an indication to the user that the service plan recurs, e.g., "Auto Renew" as shown.

FIG. 246 illustrates a representative screen 1824 that provides, in some embodiments, for the administrative user, through the SDC interface 145, to enter display properties of service usage information for a particular service plan that can be displayed through the UI 101 of the mobile wireless communication device 100. In some embodiments, service usage information is displayed based on an amount of service usage. In some embodiments, service usage information is displayed based on an amount of time elapsed for a particular time period, e.g., for a repeating cycle of a fixed length of time. In some embodiments, both an amount of service usage and an amount of elapsed time are displayed. As illustrated in FIG. 246, when setting the service usage display property to "Show Usage Information" in screen 1824, the UI 101 of the mobile wireless communication device 100 displays in a representative screen 1825 an amount of service usage consumed from an allocated service usage allowance for the service plan. The "Internet Access 500" service plan illustrated in FIG. 246 includes a service usage allowance of 500 MB of which none has been consumed as indicated in the screen 1825. In some embodiments, the service usage display is updated dynamically as service usage accumulates. Screen 1825 illustrates a representative display for service plan details of the "Internet Access 500" service plan that provides 500 MB of Internet access for a one month time period for a price of $10.00.

FIG. 247 illustrates a representative screen 1826 that provides, in some embodiments, for the administrative user, through the SDC interface 145, to select an amount of elapsed time to display through the UI 101 of the mobile wireless communication device 100 for a particular service plan. In the representative embodiment shown in FIG. 247, the "Free Application Bundle" service plan provides for free mobile internet access for a time period of one month. In some embodiments, the UI 101 displays a cumulative service usage amount, measured in time elapsed, for the "Free Application Bundle" service plan in a service details display screen 1827 through the UI 101 of the mobile wireless communication device 100. For the service plan depicted by screen 1827, 8 days of a 31 day month has elapsed, as shown by the progress bar in an "Allowance" region of the screen 1827. In some embodiments, the service usage display accurately accounts for the number of days in a month service usage allocation. In some embodiments, the service usage display of time elapsed is updated dynamically as time passes.

FIG. 248 illustrates a representative screen 1828 that provides, in some embodiments, for the administrative user, through the SDC interface 145, to select both an amount of elapsed time and a service usage amount to display through the UI 101 of the mobile wireless communication device 100 for a particular service plan. In the representative embodiment shown in FIG. 248, the "50 MB for 30 days" service plan provides for 50 MB of mobile internet access for a time period of 30 days at a service plan price of $1.25. In some embodiments, the UI 101 displays both a cumulative amount of elapsed time and a cumulative amount of service usage, measured in units of service usage, e.g., MB transmitted/received. As illustrated by representative screen 1829, 4 days of the 30 day time period for the particular service plan have elapsed, and 1.9 MB of service usage of a 50 MB total service usage allowance for the 30 day time period has been consumed. In some embodiments, a progress bar provides a graphical display of the amount of service usage consumed. In some embodiments, a text display provides an indication of the amount of service usage and/or elapsed time.

FIG. 249 illustrates a representative screen 1830 that provides, in some embodiments, for the administrative user, through the SDC interface 145, to determine components for a customized service plan. In some embodiments, the administrative user can create the customized service plan by creating new components from scratch or from an existing component. In some embodiments, the customized service plan can include multiple components as illustrated by the "Intranet Access" and "Corporate Email" components shown on screen 1830. In some embodiments, the administrative user can determine a priority order in which service usage is assigned to different constituent components of the customized service plan. In some embodiments, the administrative user can select that service usage for individual components of the customized service plan is displayed through the UI 101 of the mobile wireless communication device 100, e.g., as illustrated by screen 1832 of FIG. 249. The customized service plan entitled "CompanyXYZ Data Plan" includes two different components, one component for corporate email, providing an allocation of time for email service access, and a second component for intranet access, providing an allocation of data usage for intranet service access. As illustrated in screen 1832, both the time based component and the data based component can be displayed, in some embodiments, through the UI 101 of the mobile wireless communication device 100. In the representative embodiment shown in FIG. 249, 19 hours of a 30 day allocation for the Corporate Email time based component have elapsed, while 36 MB of a 50 MB data allocation for the Intranet Access data service usage based component has been consumed. In some embodiments, progress bars displayed through the UI 101 of the mobile wireless communication device 100 can be updated in real time or near real time. In some embodiments, measurements of service usage that are displayed through the UI 101 of the mobile wireless communication device 100 are taken at least in part by a service processor in the mobile wireless communication device 100. In some embodiments, measurements of service usage that are displayed through the UI 101 of the mobile wireless communication device 100 are taken at least in part by a service controller in a network element in the wireless network.

In some embodiments, the administrative user can determine properties for notification messages associated with particular service plans. FIG. 250 illustrates a representative screen 1900 that provides, in some embodiments, for the administrative user, through the SDC interface 145, to determine display properties for a particular notification message. Screen 1900 includes a notification name and a selection of radio buttons to select if the notification message displays in the foreground, in the background, or by an audible means. A representative screen 1902 illustrated in FIG. 250 shows a notification message displayed in the foreground, through the UI 101 of the mobile wireless communication device 100. As shown in FIG. 250, in some embodiments, the notification message displays in the foreground on top of an application and requires the user of the mobile wireless communication device 100 to select a button, e.g., the "Continue" button shown in screen 1902, to dismiss the notification message. In some embodiments, the administrative user selects properties of user interaction for the notification message through the SDC interface 145. In some embodiments, the administrative user selects a maximum number of times that the notification message for the particular service plan will be displayed through the UI 101 to the user of the mobile wireless communication device 100.

FIG. 251 illustrates a representative screen 1904 in which the administrative user selects to display a notification message for a particular service plan (e.g., the "CompanyXYZ Data Plan") as a background message only. In some embodiments, the background message notification, as illustrated by screen 1908, provides a summary notification message and a time the background notification message was sent or received. In some embodiments, the user of the mobile wireless communication device 100 selects the background notification message through the UI 101 of the mobile wireless communication device 100 to display a detailed notification message in the foreground, as illustrated by screen 1906 shown in FIG. 251. In some embodiments, the message content of the resulting foreground notification message is the same as would appear when designating a foreground only notification message through the SDC interface 145, e.g., through a screen such as representative screen 1900 shown in FIG. 250. In some embodiments, background notification message display in a notifications "drawer" provided by operating system firmware for the mobile wireless communication device 100, e.g., in an "Android" notifications drawer. In some embodiments, the user of the mobile wireless communication device 100 can retrieve notifications by swiping, tapping, or otherwise selecting to view the notifications drawer through the UI 101 of the mobile wireless communication device 100.

Representative screens 1900 and 1904 also provide for selection of an "Audible only" notification message for the particular service plan. In some embodiments, audible notification messages (and/or indications thereof) are presented through an audio interface of the mobile wireless communication device 100 to the user of the mobile wireless communication device 100. In some embodiments, the administrative user specifies one or more screens of the SDC interface 145 to present both an audible notification message and a visual notification message (background or foreground) through the UI 101 to the user of the mobile wireless communication device.

FIG. 252 illustrates a representative screen 1910 in which the administrative user selects to allow the user of the mobile wireless communication device 100 to suppress display of the notification message for a particular service plan. When the "Allow the user to suppress this notification" option is selected, a button is displayed with the notification message permitting the user an opportunity to change one or more notification settings for the notification message associated with the service plan. In some embodiments, a "Change" button is displayed through the UI 101 to the user of the mobile wireless communication device 100 as illustrated by representative screen 1902 in FIG. 252. In some embodiments, when the user selects the "Change" button, a notifications screen is displayed offering the user options notification settings.

FIG. 253 illustrates a representative screen 1912 that allows the user of the mobile wireless communication device 100 to input notification settings for an associated notification message of a particular service plan. In some embodiments, when the user selects a button, e.g., the "Change" button illustrated in screen 1902, the notification settings screen 1912 is displayed through the UI 101 of the mobile wireless communication device 100. In some embodiments, the notification settings provided to the user of the mobile wireless communication device 100 include a number of different time intervals for spacing of notification messages for the particular service plan. In some embodiments, the notification settings permit complete suppression of notification messages. In some embodiments, the administrative user, through the SDC interface 145, determines the options available to the user in the notification settings screen 1912.

FIG. 254 illustrates a representative screen 1914 that provides, in some embodiments, for the administrative user, through the SDC interface 145, to determine contents of a notification message for a service plan. In some embodiments, the administrative user enters a title for the notification message that displays in a title box field at the top of the notification message as illustrated by screen 1902 in FIG. 254 and provides a summary "high level" title for the service plan. In some embodiments, the administrative user enters a subtitle for the notification message that displays in the notification message screen 1902 and provides a more detailed title for the service plan. In some embodiments, the administrative user enters a short text description for the service plan that appears in an abbreviated log of notification on the mobile wireless communication device 100. In some embodiments, such as the one shown in FIG. 254, the short text description does not display in the notification message. In some embodiments, the administrative user enters a long text description that is displayed in the notification message, as illustrated by the representative screen 1902, and provides a detailed explanation of the service plan to the user of the mobile wireless communication device 100.

FIG. 255 illustrates a representative screen 1916 that provides, in some embodiments, for the administrative user, through the SDC interface 145, to determine a set of buttons to display to the user of the mobile wireless communication device 100 in the notification message for the particular service plan. In some embodiments, the buttons include one or more actions to view a catalog of service plans, to receive more information for a service plan, to permit a service usage amount that exceeds a service usage allowance (i.e., an overage), to launch a link an Internet URL link, and to dismiss the notification screen. As illustrated in FIG. 255, the administrative user, in some embodiments, enters a label for an action button that displays on the UI 101 as part of the notification message. In some embodiments, the administrative user enters the button label directly. In some embodiments, the administrative user selects the button label from a list or menu of pre-determined labels. In some embodiments, a default button label is provided. In some embodiments, an "Upsell" button is configurable to advertise one or more specific service plans to the user in conjunction with the notification message. In some embodiments, the administrative user selects to display upsell one or more service plans to which the user of the mobile wireless communication device 100 can subscribe.

In some embodiments, the service design center 135 provides for the administrative user, through the SDC interface 145, to assign or modify service plans in a set of service plan catalogs. In some embodiments, each service plan catalog includes multiple service plans that can be assigned separately as an individual service plan or grouped together as a service plan bundle to the mobile wireless communication device 100. In some embodiments, service plans and service plan bundles can be assigned to a group of mobile wireless communication devices. In some embodiments, a service plan catalog includes a collection of service plans that can be assigned to an individual subscriber or to a group of subscribers. In some embodiments, service plans are deployed to subscribers by publishing service plan catalogs. In some embodiments, a service plan catalog includes at least one service plan.

FIG. 256 illustrates a representative screen 2000 that provides, in some embodiments, for the administrative user, through the SDC interface 145, to view one or more service plan catalogs by name. In some embodiments, the representative screen 2000 also provides a catalog description associated with a service plan catalog. In some embodiments, the administrative user can select to view service plans in a service plan catalog by selecting through the SDC interface 145 a particular service plan catalog. Screen 2000 illustrates a specific service plan catalog 2002 entitled "ItsOn Demo" having the description "for demo purposes." By selecting a specific service plan catalog from the representative screen 2000, the administrative user can be presented with options for configuring properties of the service plan catalog and its constituent service plans.

FIG. 257 illustrates a representative screen 2004 that provides, in some embodiments, for the administrative user, through the SDC interface 145 to configure a particular service plan catalog, e.g., the "ItsOn Demo" service plan catalog 2002. Screen 2004 presents multiple options for configuring aspects of the service plan catalog 2002. In some embodiments, the administrative user can configure individual service plans and/or service plan bundles included in the service plan catalog. In some embodiments, the administrative user can configure base service plan sets included in the service plan catalog. In some embodiments, the administrative user can add service plans or service plan bundles to a list of "Featured" service plans displayed on the UI 1001 of the mobile wireless communication device. In some embodiments, the administrative user can configure marketing interceptors associated with one or more service plans. In some embodiments, the administrative user can create a promotional banner to display through the UI 101 of the mobile wireless communication device 100. In some embodiments, the administrative user can configure properties of promotional notification messages displayed to the user of the mobile wireless communication device 100 through the UI 101. In some embodiments, the administrative user can configure a service plan to "Upsell," assigning the service plan to a notification message to provide the user of the mobile wireless communication device 100 an opportunity to subscribe to the service plan. In some embodiments, the administrative use can adjust priorities for one or more service plans in the service plan catalog. In some embodiments, the administrative user can review service plans in the service plan catalog. In some embodiments, the administrative user can publish service plans, service plan bundles, base service plan sets and/or service plan catalogs. In some embodiments, the administrative user can associate service plans, service plan bundles, base service plan sets, and/or service plan catalogs with a subscriber or a subscriber group.

In some embodiments, by selecting "Configure Plans & Bundles" on the representative screen 2004 for the "ItsOn Demo" service plan catalog 2002, through the SDC interface 145, the administrative user is presented with a display of a set of service plans and service plan bundles that belong to the selected "ItsOn Demo" service plan catalog 2002, as shown by representative screen 2006. In some embodiments, service plans and service plan bundles for a service plan catalog display are grouped together in categories, e.g., data plans, voice plans, etc. In some embodiments, the administrative user selects "New Plan" on screen 2006 to generate a new service plan. In some embodiments, the administrative user selects "New Bundle" on screen 2006 to create a new service plan bundle.

FIG. 258 illustrates a representative screen 2008 that provides, in some embodiments, for the administrative user, through the SDC interface 145 to determine a set of tabs to categorize different service plans of a service plan catalog when displayed through the UI 101 of the mobile wireless communication device 100. In some embodiments, the administrative user can input one or more names for tabs that appear on the UI 101 of the mobile wireless communication device 100 when the user displays a catalog of service plans. In some embodiments, available service plans are organized into groups to display under different tabs. As shown in FIG. 258, the administrative user, in some embodiments, enters a set of tab names that display on the UI 101 of the mobile wireless communication device 100, e.g., as shown by representative screen 2010. In some embodiments, the administrative user selects tab names from a pre-determined list or menu of tab names. In some embodiments, tab names suggestions are provided to the administrative user for a grouping of service plans.

FIG. 259 illustrates a representative screen 2012 that provides, in some embodiments, for the administrative user, through the SDC interface 145 to indicate under which tab name (as defined in screen 2008 of FIG. 258) to display a service plan when presented through the UI 101 of the mobile wireless communication device 100. In some embodiments, service plans of a service plan catalog display under a tab as selected through representative screen 2012. In some embodiments, service plans also display through the UI 101 of the mobile wireless communication device 100 within a "Featured Plans" list of service plans in addition to displaying as part of the service plan catalog. In some embodiments, service plans can display under more than one tab as selected through the SDC interface 145.

FIG. 260 illustrates a representative screen 2014 that provides, in some embodiments, for the administrative user, through the SDC interface 145 to determine an order for displaying service plans under a tab name (as defined in screen 2008 of FIG. 258) when presented through the UI 101 of the mobile wireless communication device 100. In some embodiments, a display order for service plans within each tab is determined independently. In some embodiments, the administrative user determines an order for displaying service plans within a tab by selecting a service plan and "dragging" the service plan to a desired position. In some embodiments, an order for displaying service plans is indicated through the SDC interface 145 by an order numbering. In some embodiments, the SDC interface 145 provides a touch screen, a menu interface, a keyboard interface, a mouse interface, or another input interface through which service plan orders can be graphically manipulated. In some embodiments, the administrative user can enter alphanumeric characters for a divider to separate service plans into groups within a tab when displayed through the UI 101 of the mobile wireless communication device 100. In some embodiments, the alphanumeric characters for the divider provided through the SDC interface 145 display as a graphical divider, labeled with the entered alphanumeric characters, within a list of service plans provided under a tab, when presented through the UI 101 of the mobile wireless communication device 100. Screen 640, shown in FIG. 240, illustrates a list of service plans for a "DATA ADD-ONS" tab, in which the service plans are grouped into three different sets having dividers labeled "Monthly subscription," "One week," and "One day." In some embodiments, selecting the divider through the UI 101, the user of the mobile wireless communication device 100 expands the set of service plans grouped together for that divider. As illustrated in FIG. 240, service plans for the "Monthly subscription" group are not visible, service plans for the "One week" group are fully visible, and service plans for the "One day" group are only partially visible on the screen 640. In some embodiments, additional service plans can be viewed by providing an input through the UI 101, e.g., by swiping a touch sensitive surface displaying the UI 101 on the mobile wireless communication device 100.

FIG. 261 illustrates representative screens 2016 and 2018 that provide, in some embodiments, for the administrative user, through the SDC interface 145, to determine an order for grouping and displaying service plans under the "Text" tab and the "Data Passes" tab respectively. As illustrated by screen 2016, an alphanumeric label, e.g., "Test Divider," can represent a divider within a listing of service plans under a tab. When displaying the set of service plans for the "Text" tab, through the UI 101 of the mobile wireless communication device 100, the "Test divider" can display as a shaded bar labeled as "Test divider" and separating one grouping of service plans from a following grouping of service plans. In some embodiments, dividers provide an additional means to group service plans together to provide convenient and easily understood groupings and/or categories of service plans within a service plan catalog when presented to a user through the UI 101 of the mobile wireless communication device 100.

FIG. 262 illustrates representative screens 2020 and 2021 that provide, in some embodiments, for the administrative user, through the SDC interface 145, to determine an order for grouping and displaying service plans under the "Talk" tab and the "App Passes" tab respectively. As illustrated by screen 2021, a divider labeled "Monthly unlimited passes" can be entered through the SDC interface 145 to appear at the top of a grouping of service plans.

FIG. 263 illustrates a representative screen 2022 that provides, in some embodiments, for the administrative user, through the SDC interface 145, to determine a display order for a group of service plans under a set of tabs when displaying a service plan catalog to a user of the mobile wireless communication device 100. As illustrated by screen 2022, the ordered set of plans listed under the "Silver" tab displays in the same order on representative screen 2023 presented through the UI 101 of the mobile wireless communication device 100.

FIG. 264 illustrates a representative screen 2024 that provides, in some embodiments, for the administrative user, through the SDC interface 145, to determine a display for an application associated with a service plan. In some embodiments, a user selectable icon displays in a region of the UI 101 on the mobile wireless communication device 100 when presenting a detailed service plan screen for a particular service plan within a service plan catalog. Representative device screen 2026 illustrates a user selectable icon through which the user can launch a particular application, e.g., the "YouTube" application associated with a particular service plan, e.g., the "YouTube 1 hr over 1 day" service plan. In some embodiments, the administrative user enters a text name to display with the icon for the service plan on the UI 101 of the mobile wireless communication device. In some embodiments, the administrative user, through the SDC interface 145, can select a customized icon to display by choosing a file containing an icon in a pre-determined format. In some embodiments, the administrative user, through the SDC interface 145, can select that a service usage progress bar displays adjacent to the selectable icon associated with the service plan.

FIG. 265 illustrates a representative screen 2028 that provides, in some embodiments, for the administrative user, through the SDC interface 145, to select service plans and service plan bundles to display under a listing of "Featured" service plans. In some embodiments, a set of "Featured" service plans is displayed through the UI 101 of the mobile wireless communication device 100 within a particular tab of the service plan catalog. In some embodiments, the "Featured" service plans tab includes service plans in a particular order as determined by inputs received from the administrative user through the SDC interface 145. In some embodiments, the order of displaying service plans within the "Featured" service plans tab through the UI 101 of the mobile wireless communication device 100 is determined based on criteria selected by the service provider.

FIG. 266 illustrates a representative screen 2100 that provides, in some embodiments, for the administrative user, through the SDC interface 145, to select service plans and service plan bundles to display as a promotional banner highlighting their availability on the UI 101 of the mobile wireless communication device 100. In some embodiments, promotional banners for service plans display in a prominent location of the UI 101, e.g., at the top of a listing of service plans. In some embodiments, promotional banners display at the top of a particular tab of service plans when displaying a catalog of service plans available to the mobile wireless communication device 100, e.g., at the top of the "Featured Plans" tab as illustrated by the promotional banner 2102 shown for screen 2030 in FIG. 266. In some embodiments, promotional banners display in a banner area selected by the administrative user, the service provider, the user of the mobile wireless communication device 100, or a third-party provider, e.g., a device manufacturer. In some embodiments, different promotional banners display based on a priority order selected by the administrative user through the SDC interface 145. In some embodiments, the promotional banner image displayed through the UI 101 is linked to a corresponding purchase screen for a service plan or service plan bundle, and the user of the mobile wireless device 100 is prompted to purchase the service plan or service plan bundle when selecting the promotional banner. In some embodiments, promotional banners include an activation date for when to display and optionally a deactivation date for when to end display through the UI 101 of the mobile wireless communication device 100. In some embodiments, the administrative user, through the SDC interface 145, can create a new promotional banner.

FIG. 267 illustrates a representative screen 2104 that provides, in some embodiments, for the administrative user, through the SDC interface 145, to determine a set of properties for a promotional banner to display through the UI 101 of the mobile wireless communication device 100. In some embodiments, the administrative user selects a geographic location or language preference. In some embodiments, the geographic location or language preference determines at least in part a set of promotional banners available from which the administrative use can select an image to display with the promotional banner being created. In some embodiments, the administrative user selects an image to display from a graphical display of promotional banner images. In some embodiments, the administrative user uploads a file containing a promotional banner image. In some embodiments, a set of generic promotional banner images is presented to the administrative user to customize according to their specific requirements. FIG. 267 illustrates a representative promotional banner image 2106 that the administrative user can select, through the SDC interface 145, to associate with a service plan or service plan bundle to display through the UI 101 of the mobile wireless communication device 100. In some embodiments, promotional banner images are fixed in size. In some embodiments, promotional banner images are resizable by the administrative user. In some embodiments, promotional banner images are scalable to fit a number of different display area sizes.

FIG. 268 illustrates the representative screen 2104 that provides, in some embodiments, for the administrative user, through the SDC interface 145, to select a service plan or service plan bundle for a promotional banner. In some embodiments, the administrative user selects the service plan or service plan bundle from a set of available service plans or service plan bundles, e.g., from a scrollable list of service plans and service plan bundles as illustrated by screen 2108 shown in FIG. 268. In some embodiments, the service plans and service plan bundles are organized into service plan catalogs. In some embodiments, the service plans and service plan bundles are organized into sets targeted for specific subscribers or subscriber groups.

FIG. 269 illustrates a representative screen 2110 that displays a promotional banner configuration screen with a selected geographic location or language preference (English (US)), a selected promotional banner image, an associated service plan (Amex) and an activation date. In some embodiments multiple service plans and/or service plan bundles are associated with a single promotional banner. In some embodiments, a deactivation date is also entered. In some embodiments, the administrative user selects to save the created promotional banner, e.g., by selecting a save button available through the SDC interface 145.

FIG. 270 illustrates representative screens 2112 and 2114 that provide, in some embodiments, for the administrative user, through the SDC interface 145, to schedule a promotional notification message (promotional popup) that will display through the UI 101 of one or more mobile wireless communication devices. In some embodiments, the promotional notification message provides to the user of the mobile wireless communication device 100, through the UI 101, an opportunity to purchase or subscribe to a particular service plan or a particular service plan bundle, or to select one from a set of proffered service plans or service plan bundles. In some embodiments, service plans or service plan bundles in the promotional notification message are offered for a limited time, at a discounted price, or as a specially priced bundle. As illustrated by screen 2112, shown in FIG. 270, in some embodiments, the administrative user can create, through the SDC interface 145, a targeted promotional notification message to a specific list of users (subscribers), e.g., a targeted set of users. In some embodiments, the administrative user creates, through the SDC interface 145, a general promotional notification message for all users within a group of users. In some embodiments, the administrative user, through the SDC interface 145, determines a frequency at which a promotional notification message displays to the user of the mobile wireless communication device 100, e.g., specified by information entered through representative screen 2114. In some embodiments, promotional notification messages display for a single instance, daily, weekly, monthly or yearly. In some embodiments, promotional notification messages display at a specific time provided by the administrative user through the SDC interface 145.

FIG. 271 illustrates a representative screen 2116 that provides, in some embodiments, for the administrative user, through the SDC interface 145, to determine contents and properties for the promotional notification message. In some embodiments, the administrative user determines the contents and properties for the promotional notification message based on an existing notification template, e.g., by selecting from a listing of notification templates. In some embodiments, only promotional notification templates display in the listing of notification templates from which the administrative user selects. In some embodiments, the administrative user selects an amount of details provided for the notification templates listed on the screen 2116. In some embodiments, the administrative user selects to create a new promotional notification message.

FIG. 272 illustrates a representative screen 2118 that provides, in some embodiments, for the administrative user, through the SDC interface 145, to set properties for the promotional notification message. As shown by screen 2118, additional tabs are available, in some embodiments, for the administrative user to select, through the SDC interface 145, for determining scheduling, message content, and displayable buttons for the promotional notification message. In some embodiments, the administrative user sets properties for promotional notification messages as explained above with FIGS. 250-254 for notification messages in general. In some embodiments, the administrative user determines whether the promotional message displays on the UI 101 of the mobile wireless communication device in the foreground, in the background, or as an "audible" notification message. In some embodiments, the administrative user sets properties associated with user interaction through the UI 101 for the promotional notification message. In some embodiments properties include a maximum number of times the promotional notification message displays through the UI 101 of the mobile wireless communication device 100. In some embodiments, the user of the mobile wireless communication device 100 can change display properties for the promotional notification message, including suppressing their display.

FIG. 273 illustrates a representative screen 2120 that provides, in some embodiments, for the administrative user, through the SDC interface 145, to provide text for different message fields that can display as part of the promotional notification message through the UI 101 of the mobile wireless communication device 100. In some embodiments, the administrative user enters a title, a subtitle, a short text description, and/or a long text description for the promotional notification message. In some embodiments, one or more entered texts display as part of the promotional notification message through the UI 101 of the mobile wireless communication device 100. In some embodiments, the title displays at the top of the notification message, beneath which appears the subtitle and the long text description. In some embodiments, the long text description is replaced by the short text description. In some embodiments, the short text description displays as part of a notification message log on the mobile wireless communication device 100. In some embodiments, representative screen 2120 provides for on screen preview of the promotional notification message. In some embodiments, the on screen preview updates dynamically as text is entered into the notification message fields. In some embodiments, the on screen preview provides an approximation of the appearance of the promotional notification message. In some embodiments, the administrative user enters, through the SDC interface 145, text associated with the promotional notification message in multiple languages. In some embodiments, the SDC interface 145 provides for displaying a preview of the promotional notification message based on a selected language.

FIG. 274 illustrates a representative screen 2122 that provides, in some embodiments, for the administrative user, through the SDC interface 145, to select one or more buttons to display as part of the promotional notification message through the UI 101 of the mobile wireless communication device 100. In some embodiments, the administrative user selects from one or more different buttons that result in actions when selected by the user of the mobile wireless communication device 100. In some embodiments, the administrative user enters button labels through the SDC interface 145 using the representative screen 2122 (or an equivalent screen). In some embodiments multiple buttons display as part of the promotional notification message. In some embodiments, no buttons appear as part of the promotional notification message. In some embodiments, actions taken when a button is selected by the user through the UI 101 provide additional information, e.g., accessing a portion of a service plan catalog, modifying one or more service plans or service plan bundles, offering additional information screens, launching an Internet connection based on a URL, and dismissing display of the promotional notification message. As described earlier for general notification messages, the user can respond to learn more and/or subscribe to a specific service plan, a specific service plan bundle, a featured service plan, a catalog of service plans and service plan bundles, etc.

FIG. 275 illustrates a representative screen 2124 illustrating three actionable buttons selected by the administrative user, through the SDC interface 145, along with a representative notification message display for the selected actionable buttons. In some embodiments, the administrative user enters, through the SDC interface 145, text for buttons associated with the promotional notification message in multiple languages. In some embodiments, the SDC interface 145 provides for displaying a preview of the promotional notification message based on a selected language.

FIG. 276 illustrates a representative screen 2126 that provides, in some embodiments, for the administrative user, through the SDC interface 145, to associate a default button property associated with the promotional notification message. In some embodiments, representative screens 2124 and 2126 are part of the same screen that displays to the administrative user through the SDC interface 145. In some embodiments, the default button selection of screen 2126 determines an action or response that occurs when the user of the mobile wireless communication device 100 provides an input through a "default button" of the mobile wireless communication device 100 in response to display of the promotional notification message through the UI 101, e.g., a "Home" button, a "Select" button, a center button, a joystick input, or any other selectable input of the mobile wireless communication device 100. In some embodiments, default button actions include accessing a portion of a service plan catalog and dismissing display of the promotional notification message.

FIG. 277 illustrates a representative screen 2128 that provides, in some embodiments, for the administrative user, through the SDC interface 145, to associate a set of users (subscribers) with the promotional notification message. In some embodiments, a file having a pre-determined format specifies the set of users. In some embodiments, the administrative user uploads the set of subscribers to associate with the promotional notification message through the SDC interface 145. In some embodiments, the service design center 135 validates the set of users associated with the promotional notification message.

FIG. 278 illustrates a representative screen 2200 (or portion of a screen) that provides, in some embodiments, for the administrative user, through the SDC interface 145, to select to display one or more "Upsell" service plans with a notification message (including a promotional notification message). Representative screens that include an option to display "Upsell" service plans are also shown in FIGS. 229, 231, 254, 274, and 275, and the accompanying descriptions associated with those figures, in some embodiments, also apply herein. In some embodiments, the administrative user selects to advertise one or more specific service plans or service plan bundles with the notification message. In some embodiments, the notification message that includes one or more "Upsell" service plans or service plan bundles provides the user of the mobile wireless communication device an opportunity to learn more about and/or purchase (subscribe to) specific targeted service plans or service plan bundles. In some embodiments, the user can purchase at least one of the "Upsell" service plans directly from the displayed notification message through the UI 101 of the mobile wireless communication device 100. In some embodiments, the administrative user, through the SDC interface 145, selects one or more specific service plans or service plan bundles to associate with a notification message from a listing of available service plans and service plan bundles in a service plan catalog.

FIG. 279 illustrates a representative screen 2202 summarizing a set of "Upsells" associated with a specific service plan catalog, e.g., the "ItsOn Demo" service plan catalog. Screen 2202 provides information on promotional notification message upsells, generic notification message (interceptor) upsells, marketing interceptor notification message upsells, and policy event notification message upsells. In some embodiments, the administrative user learns of upsell opportunities to associate service plans with notification messages. Screen 2202 illustrates a specific example in which three upsell opportunities exist for generic interceptors (one each for a data, voice and messaging generic interceptor type), eight upsell opportunities exist for policy event notifications associated with certain conditions for specific service plans, and no upsell opportunities exist for promotional notification messages and marketing interceptor notification messages.

FIG. 280 illustrates a representative screen 2204 that provides, in some embodiments, for the administrative user, through the SDC interface 145, to select a set of service plans and/or service plan bundles to associate with a particular notification message as upsell opportunities. In some embodiments, the administrative user configures a display ordering for the selected service plans through the UI 101 of the mobile wireless communication device as part of the notification message. In some embodiments, display ordering for service plans can be rearranged by selecting a graphical icon, e.g., the "double arrow" shown on screen 2204 in FIG. 280.

FIG. 281 illustrates a portion of a representative screen 2206 that illustrates a display ordering for a set of service plans selected to be displayed as "Upsells" with a particular notification message. As illustrated by representative screen 2208, the notification message, when displayed through the UI 101 of the mobile wireless communication device 100, includes the set of service plans selected on screen 2206 and lists the service plans in the order configured on screen 2206. The notification message illustrated by screen 2208 provides the user of the mobile wireless communication device 100 with an opportunity to purchase a service plan or service plan bundle that permits access to a "Maps" application. In some embodiments, the user can select the service plan displayed directly through the UI 101 of the mobile wireless communication device 100 to subscribe to the displayed service plan. In some embodiments, the service plans displayed by the notification message are associated by the administrative user to one or more specific actions of the user of the mobile wireless communication device, e.g., attempting to access the Internet, attempting to use a particular application, attempting to place a voice call, attempting to send a message, etc.

FIG. 282 illustrates a portion of a representative screen 2300 that summarizes a set of promotional notification templates available to the administrative user through the SDC interface 145 in order to configure promotional notification messages. In some embodiments, the administrative user selects a promotional notification template from which to build a customized promotional notification message.

FIG. 283 illustrates a portion of a representative screen 2302 that summarizes a set of notification templates available to the administrative user through the SDC interface 145 in order to configure "Lacks Capable Plan Error" (LCPE) notification messages. In some embodiments, LCPE notification message are displayed to a user of the mobile wireless communication device when the user attempts a service activity that is not supported by the mobile wireless communication device 100 in its present configuration. In a representative embodiment, the user of the mobile wireless communication device attempts to access the Internet but does not subscribe to an Internet data access service plan. In some embodiments, the administrative user selects an LCPE notification template from which to build a customized LCPE notification message. In some embodiments, the administrative user configures a set of targeted service plans to display with the LCPE notification message.

In some embodiments, the administrative user, through the SDC interface 145, establishes subscriber groups by grouping together a collection of subscribers. In some embodiments, a subscriber is a unique identity that includes detailed information for an individual mobile wireless communication device 100 and/or a user thereof. In some embodiments, the mobile wireless communication device 100 is provisioned for one or more wireless networks. In some embodiments, the administrative user, through the SDC 145, assigns the subscriber to a subscriber group. In some embodiments, the administrative user, through the SDC 145, associates one more catalogs of service plans with one or more subscriber groups. In some embodiments, subscribers of a subscriber group can view and purchase service plans available within a catalog associated with a subscriber group to which the subscriber belongs. In some embodiments, subscribers are assigned to multiple subscriber groups. In some embodiments, service plan catalogs are associated with multiple subscriber groups.

FIG. 284 illustrates a portion of a representative screen 24000 that provides, through the SDC interface 145, to an administrative user a summary listing of a set of subscribers, including select information for each subscriber. In some embodiments, each subscriber is associated with a unique identification number. In some embodiments, each subscriber is associated with a cellular wireless number for communication over a wireless access network.

FIG. 285 illustrates a representative screen 24020 that provides, in some embodiments, for the administrative user, through the SDC interface 145, to create a new subscriber and enter detailed information for the new subscriber. In some embodiments, the administrative user enters a unique identification alphanumeric string for the subscriber, e.g., in the "Identity" field. In some embodiments, the administrative user enters a unique cellular telephone number associated with the subscriber. In some embodiments, the administrative user enters a nickname for the subscriber. In some embodiments, the administrative user selects a status indication for the subscriber that summarizes a status condition for the subscriber, e.g., "active," "inactive," "suspended," etc. In some embodiments, the administrative user selects a geographic locale or language preference for the subscriber. In some embodiments, the administrative user saves the entered subscriber information by selecting an input through the SDC interface 145.

FIG. 286 illustrates a representative screen 24040 that provides, in some embodiments, for the administrative user, through the SDC interface 145, to view a summary of subscriber groups, including a name for each subscriber group and a corresponding optional brief description of the subscriber group.

FIGS. 287, 288, 289, and 290 illustrate several representative screens of tabs 24060, 24080, 24100, and 24120 that provide, in some embodiments, for the administrative user to define properties of a subscriber group, associate service plan catalogs with the subscriber group, add or delete subscribers from the subscriber group, import information for subscribers in the subscriber group, and review the defined subscriber group.

Figure 287:
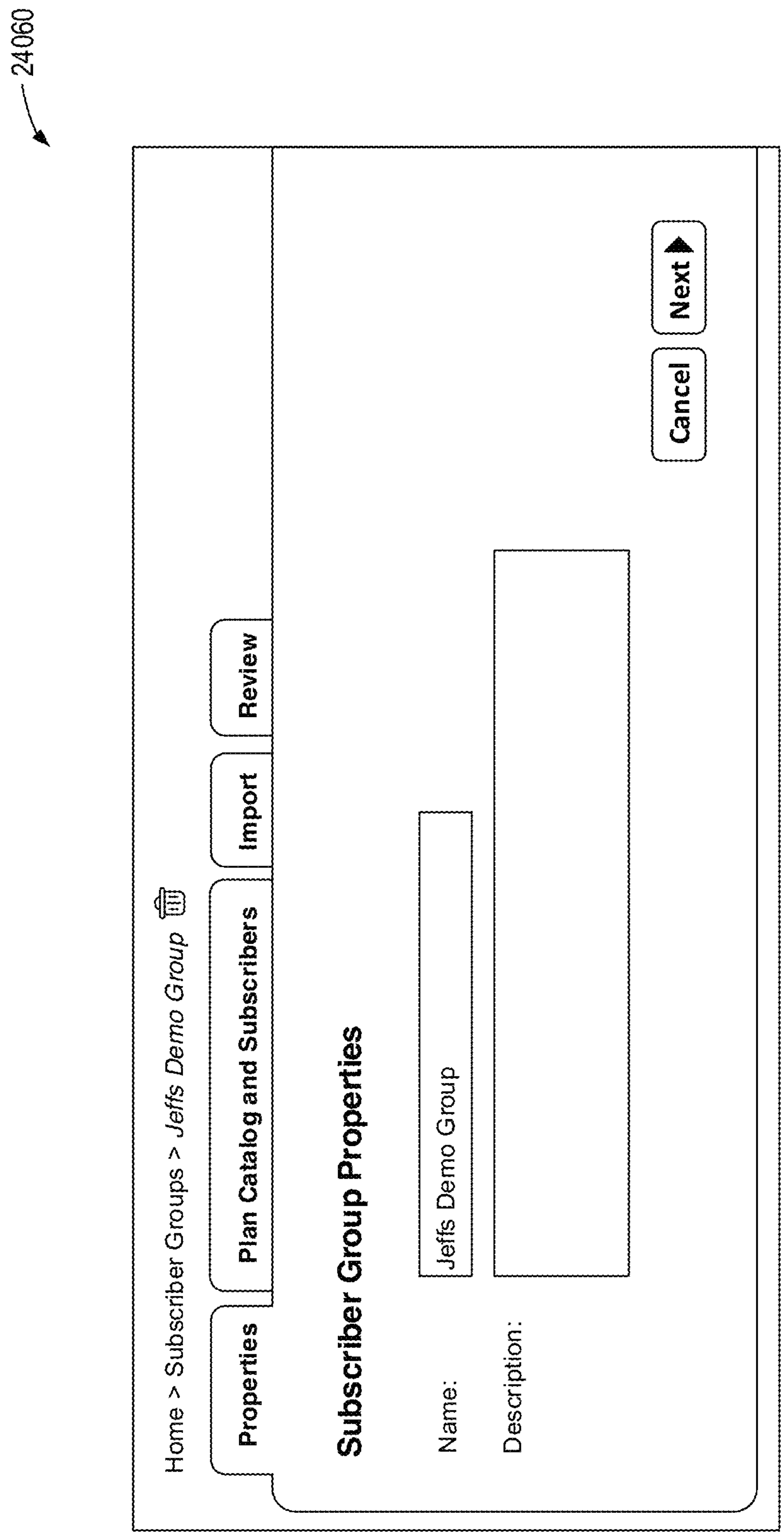

FIG. 287 illustrates a representative screen 24060 of a "Properties" tab that provides, in some embodiments, for the administrative user, through the SDC interface 145, to define a new subscriber group by entering at least a name for the subscriber group. In some embodiments, the administrative user, through the SDC interface 145, enters a short description of the subscriber group.

Figure 288:
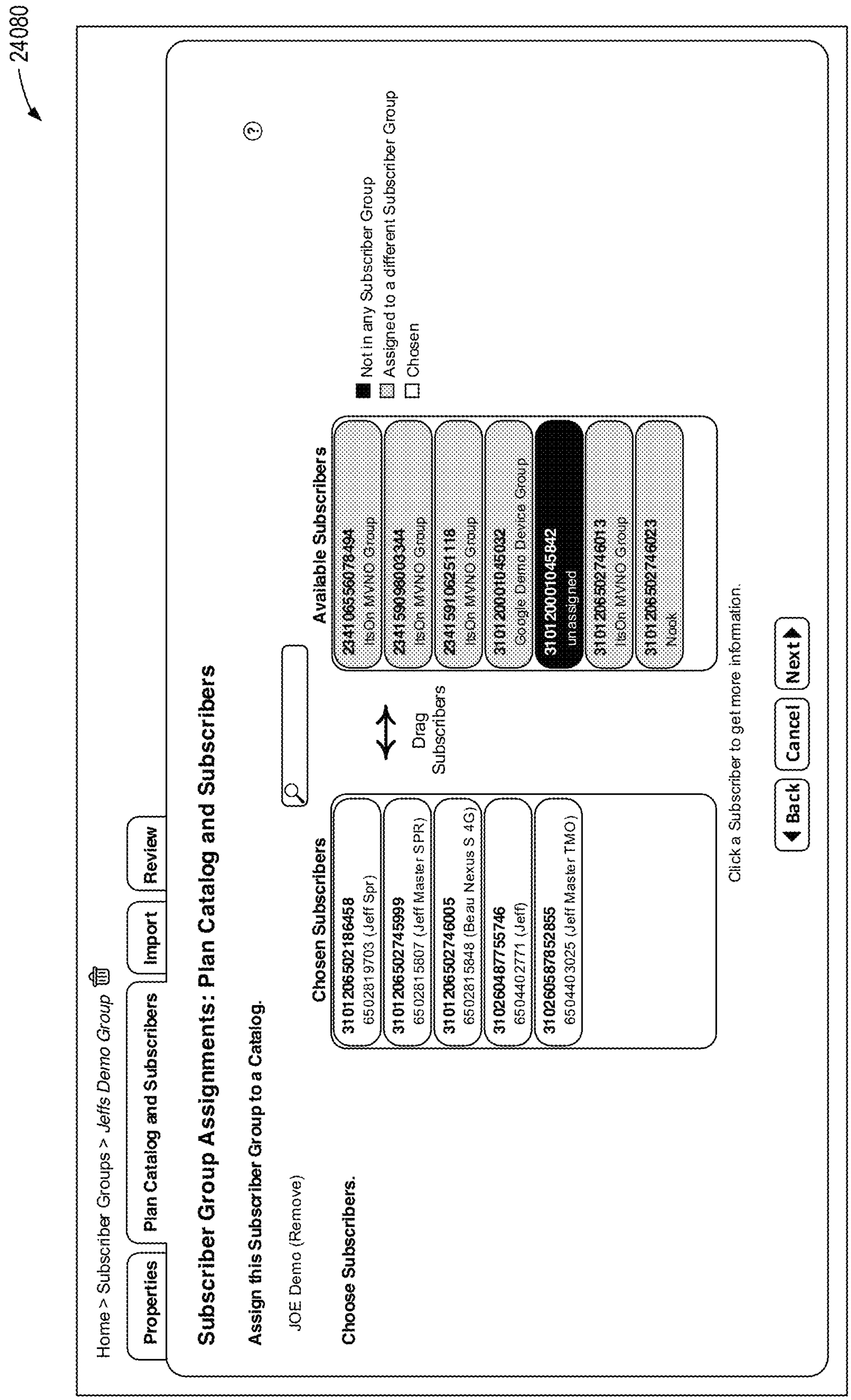

FIG. 288 illustrates a representative screen 24080 of a "Plan Catalog and Subscribers" tab that provides, in some embodiments, for the administrative user, through the SDC interface 145, to assign subscribers from a list of available subscribers to a subscriber group. In some embodiments, the administrative user can add or remove associations of one or more service plan catalogs with the subscriber group. In some embodiments, the administrative user identifies subscribers to add to or remove from the subscriber group based on the unique identification alphanumeric string, the unique cellular telephone number, the nickname, or a combination of these. In some embodiments, the administrative user can view a list of available subscribers, the list including an indication of an association of the subscriber with a particular subscriber group, with any subscriber group, or with no subscriber group. In some embodiments, the administrative user can retrieve additional information for a subscriber by selecting the subscriber from the list of available subscribers or from a list of chosen subscribers. In some embodiments, the administrative user can search for a subscriber using a search field.

Figure 289:
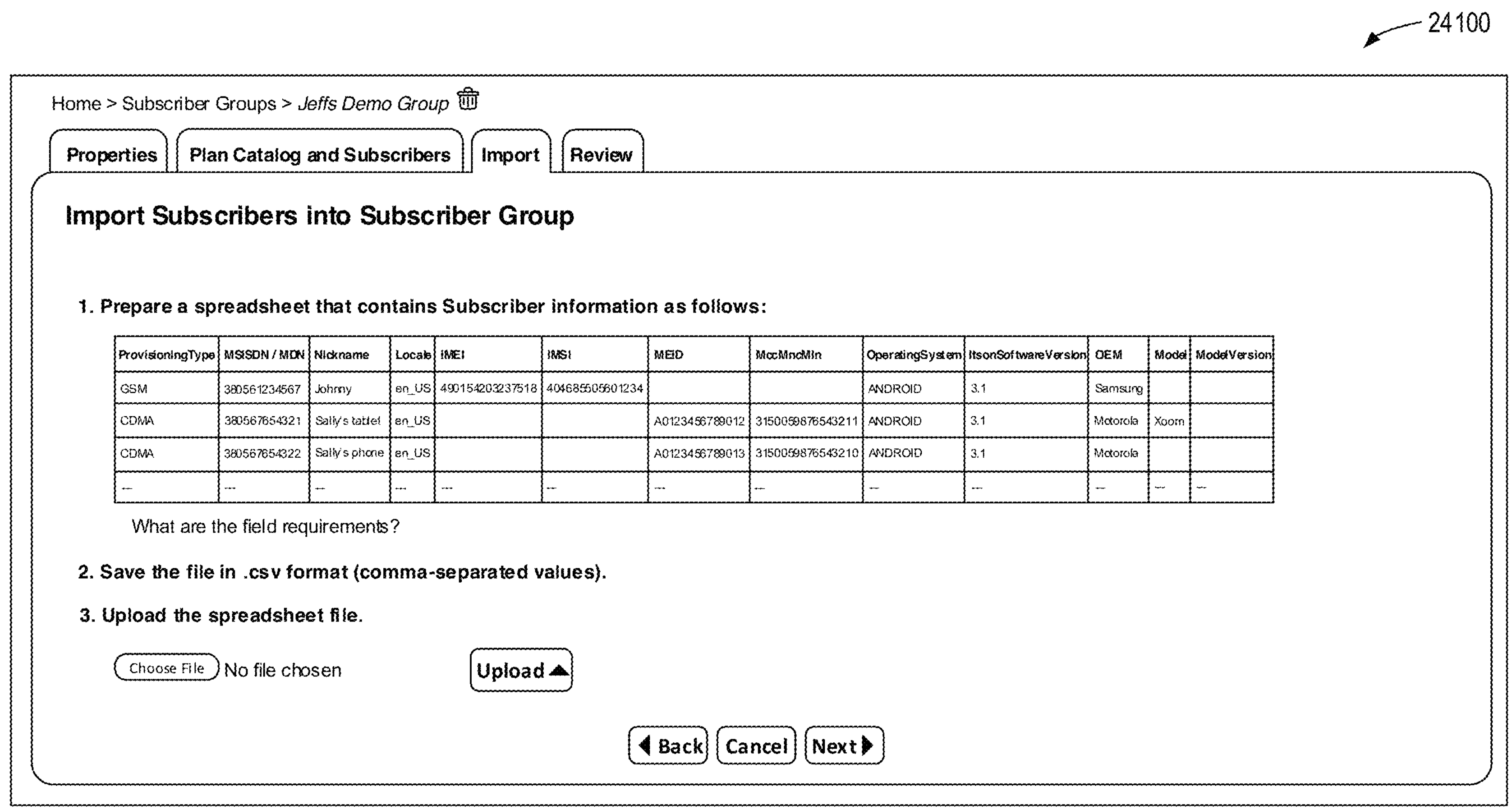

FIG. 289 illustrates a representative screen 24100 of an "Import" tab that provides, in some embodiments, for the administrative user, through the SDC interface 145, to select a particular file formatted with a set of fields to import and batch upload information for a set of subscribers and associate the set of subscribers in the imported file with the subscriber group. In some embodiments, the uploaded file is formatted using comma-separated values.

Figure 290:
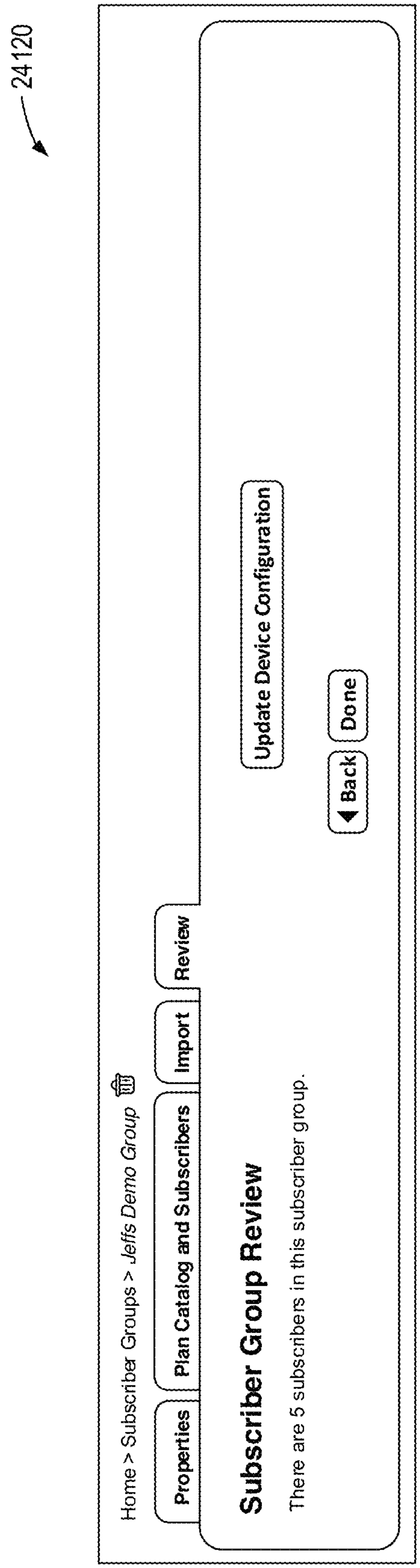

FIG. 290 illustrates a representative screen 24120 of a "Review" tab that provides, in some embodiments, for the administrative user, through the SDC interface 145, to review a summary of information for the subscriber group. In some embodiments, the administrative user can modify select information associated with a subscriber, e.g., by selecting the "Update Device Configuration" button as displayed in screen 24120 of FIG. 290.

In some embodiments, products that incorporate device assisted service policy implementation, network services and service profiles (e.g., a service profile includes a set of one or more service policy settings for the device for a service on the network) are disclosed, as described below. For example, aspects of the service policy (e.g., a set of policies/policy settings for the device for network services, typically referring to lower level settings, such as access control settings, traffic control settings, billing system settings, user notification settings, user privacy settings, user preference settings, authentication settings and admission control settings) that are moved out of the core network and into the end user device include, for example, certain lower level service policy implementations, service usage or service activity monitoring and reporting including, for example, privacy filtering, customer resource management monitoring and reporting including, for example, privacy filtering, adaptive service policy control, service network access control services, service network authentication services, service network admission control services, service billing, transaction billing, simplified service activation and sign up, user service usage or service activity notification and service preference feedback and other service capabilities.

As discussed below, product designs that move certain aspects of one or more of these service profile or service policy implementation elements into the device provide several advantageous solutions to the needs described above. For example, benefits of certain embodiments include the ability to manage or bill for a richer and more varied set of network services, better manage overall network capacity, better manage end user access costs, simplify user or new device service activation, simplify development and deployment of new devices with new service plans (e.g., service profile and billing/costs information associated with that service profile), equip central service providers with more effective open access networks for new third-party solutions, simplify the equipment and processes necessary to deploy wireless base stations and simplify the core networking equipment required to deploy certain access networks.

As discussed below, there are two network types that are discussed: a central provider network and a service provider network. The central provider network generally refers to the access network required to connect the device to other networks. The central provider network generally includes the physical layer, the Media Access Control (MAC) and the various networking functions that can be implemented to perform authentication, authorization and access control, and to route traffic to a network that connects to the control plane servers, as discussed below. The service provider network generally refers to the network that includes the control plane servers. In some embodiments, a central provider network and a service provider network are the same, and in some embodiments, they are different. In some embodiments, the owner or manager of the central provider network and the owner or manager of the service provider network are the same, and in some embodiments, they are different.

In some embodiments, control of the device service policies is accomplished with a set of service control plane servers that reside in the access network or any network that can be reached by the device. This server based control plane architecture provides for a highly efficient means of enabling third-party control of services and billing, such as for central carrier open development programs or Mobile Virtual Network Operator (MVNO) relationships. As device processing and memory capacity expands, moving to this distributed service policy processing architecture also becomes more efficient and economical. In some embodiments, several aspects of user privacy and desired network neutrality are provided by enabling user control of certain aspects of device based service usage or service activity reporting, traffic reporting, service policy control and customer resource management (CRM) reporting.

Figure 5:
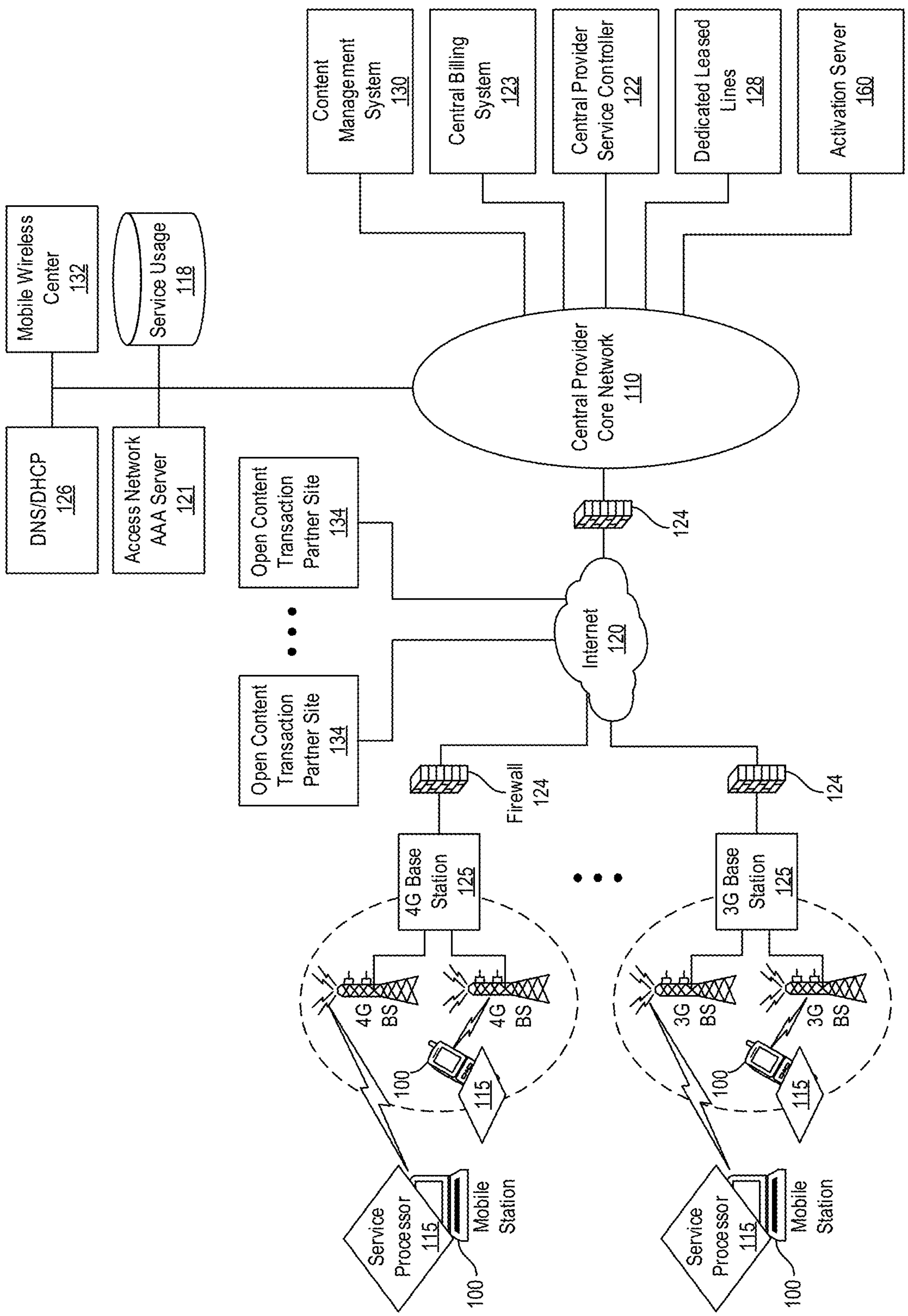
FIG. 5 illustrates a simplified (e.g., "flattened") network architecture in accordance with some embodiments.

FIG. 5 illustrates a simplified (e.g., "flattened") network architecture in accordance with some embodiments. In some embodiments, an activation server 160 (or other activation sequencing apparatus) provides for provisioning, as described below, of the devices 100 and/or network elements in the central provider network so that, for example, the device credentials can be recognized for activation and/or service by the network. In some embodiments, the activation server 160 provides activation functions, as described below, so that, for example, the devices can be recognized by the network, gain access to the network, be provided with a service profile, be associated with a service account and/or be associated with a service plan. As shown in FIG. 5, the activation server 160 is connected to the central provider core network 110. In this configuration, the activation server 160 acts as, an over the network or over the air, activation function. In some embodiments, the activation server 160, or variations of the activation server 160 as described below, is connected to apparatus in the manufacturing or distribution channel, or over the Internet 120, or as part of the service controller 122 to service provisioning or activation functions. In some embodiments, the activation server 160 is connected to the central provider core network 110. In some embodiments, the activation server 160 is connected to other network extensions such as an MVNO network or the Internet 120 if, for example, the routers in the service gateways or base stations have the capability to direct traffic from devices that are not fully activated or provisioned to an Internet destination, or if the service processor 115 is used for such direction. In some embodiments, the activation server 160 is included in the service controller 122.

Figure 6:
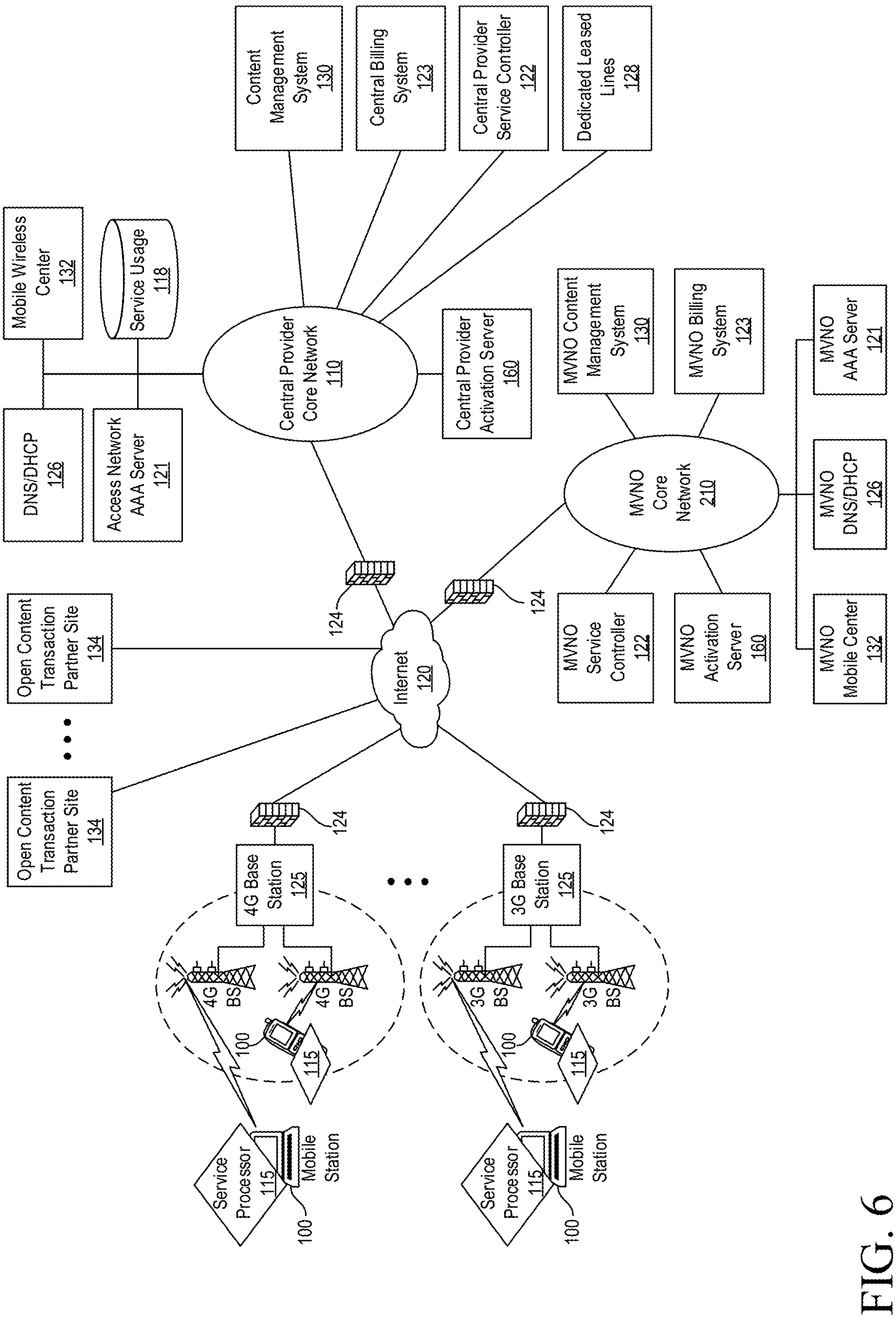
FIG. 6 illustrates another simplified (e.g., "flattened") network architecture including an MVNO (Mobile Virtual Network Operator) relationship in accordance with some embodiments.

FIG. 6 illustrates another simplified (e.g., "flattened") network architecture including an MVNO (Mobile Virtual Network Operator) relationship in accordance with some embodiments. As shown, an open MVNO configuration is provided in a simplified network as similarly described above with respect to FIG. 5. In some embodiments, the service provider (e.g., service owner) is defined by the entity that maintains and/or manages the service controller 122 associated with and controlling the service processors 115 that are inside the devices 100 using the service. In some embodiments, the service controller 122 requires only a non-real time relatively low data rate secure control plane communication link to the service processors 115. Accordingly, in some embodiments, the service controller 122 servers can reside in any network that can connect to (e.g., be in network communication with) the Internet 120. For example, this approach provides for a more efficient provisioning of the equipment used to set up an MVNO partnership between the central provider and the service provider, and as shown in FIG. 6, an MVNO network 210 is in network communication with the Internet 120 just as with the central provider network 110 is in network communication with the Internet 120. As shown, the following are connected to (e.g., in network communication with) the MVNO core network 210: MVNO billing system 123, MVNO service controller 122, MVNO content management system 130, MVNO DNS/DHCP server 126, MVNO AAA server 121, and MVNO mobile wireless center 132.

By showing two service controllers 122, one connected to (e.g., in network communication with) the MVNO network 210 and one connected to the central provider network 110, FIG. 6 also illustrates that some embodiments allow two entities on the same access network to each use the service controller 122 and service processor 115 to control different devices and offer different or similar services. As described below, the unique secure communication link pairing that exists between the two ends of the service control link, 1691 and 1638 (as shown in FIG. 4), ensure that the two service controllers 125 can only control the devices associated with the correct service provider service profiles.

Figure 7:
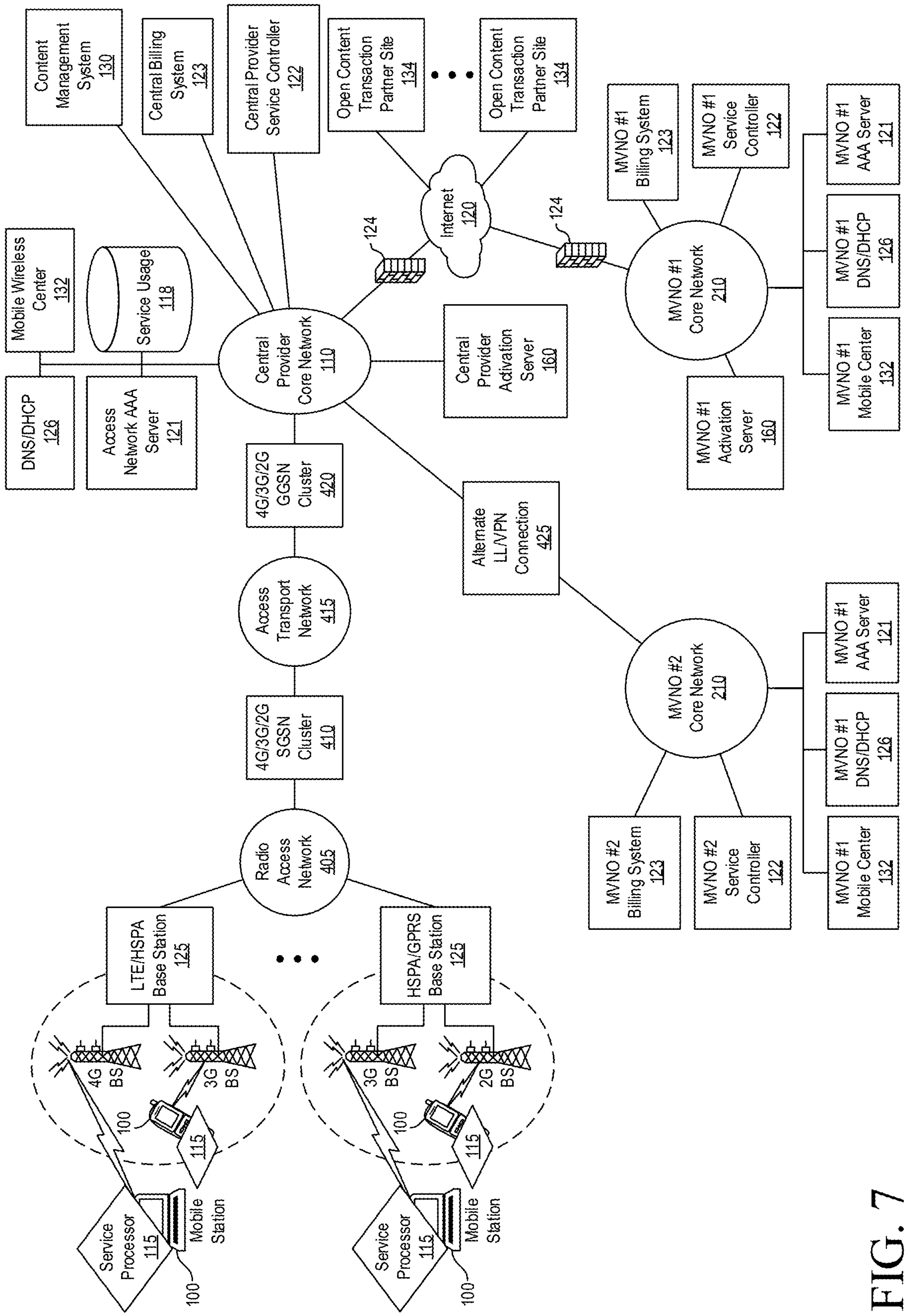
FIG. 7 illustrates a network architecture including a Universal Mobile Telecommunications System (UMTS) overlay configuration in accordance with some embodiments.

FIG. 7 illustrates a network architecture including a Universal Mobile Telecommunications System (UMTS) overlay configuration in accordance with some embodiments. As shown, FIG. 7 includes a 4G/3G/2G HSPA/Transport access network operated by a central provider and two MVNO networks 210 operated by two MVNO partners. In some embodiments, the central provider can offer improved service capabilities using a conventional UMTS network. As shown, the base stations 125 do not connect directly to the Internet 120, and instead the base stations 125 connect to the conventional UMTS network. However, as in various previous embodiments, the service processor 115 still connects through the secure control plane link to service controller 122. In some embodiments, the data plane traffic is backhauled across the various UMTS network routers and gateways as is the control plane traffic, and the IPDRs are obtained from the access network AAA server 121. Referring now to the 4G/3G/2G HSPA/Transport access network as shown in FIG. 7, the LTE/HSPA and HSPA/GPRS base stations/nodes 125 are in communication with 4G/3G/2G Service/Serving GPRS Support Nodes (SGSNs) cluster 410 via a radio access network 405, which are in communication with 4G/3G/2G Gateway GPRS Support Nodes (GGSNs) cluster 420 via an access transport network 415 (e.g., a GPRS-IP network), which are then in communication with central provider core network 110.

As shown in FIG. 7, as discussed elsewhere, service usage data store 118 is a functional descriptor for a network level service usage information collection and reporting function located in one or more of the networking equipment boxes attached to one or more of the sub-networks in the figure (e.g., RAN, transport and/or core networks). As shown in FIG. 7, service usage 118 is shown as an isolated function connected to the central provider core network 110 and the intention of this depiction is to facilitate all the possible embodiments for locating the service usage 118 function. In some UMTS network embodiments, the service usage 118 function is located or partially located in the GGSN gateway (or gateway cluster) 420. In some embodiments, service usage 118 functionality is located or partially located in the SGSN gateway (or gateway cluster) 410. In some embodiments, service usage 118 functionality is located or partially located in the equipment cluster that includes the AAA 121 and/or the mobile wireless center 132. In some embodiments, service usage 118 functionality is located or partially located in the base station, base station controller and/or base station aggregator, collectively referred to as base station 125 in FIG. 7 and many other figures described herein. In some embodiments, service usage 118 functionality is located or partially located in a networking component in the transport network 415, a networking component in the core network 110, the billing system 123 and/or in another network component or function. This discussion on the possible locations for the network based service usage history logging and reporting function can be easily generalized to all the other figures described herein by one of ordinary skill in the art (e.g., RAN Gateway 410 and/or Transport Gateway 420), and this background will be assumed even if not directly stated in all discussion above and below.

In some embodiments, a central provider provides open development services to MVNO, Master Value Added Reseller (MVAR) and/or Original Equipment Manufacturer (OEM) partners. In some embodiments, all three service providers, central provider service provider, MVNO #1 service provider and MVNO #2 service provider have service control and billing control of their own respective devices 100 through the unique pairing of the service processors 115 and service controllers 122. For example, MVNO #1 and MVNO #2 can each have open development billing agreements with the central provider and each can own their respective billing systems 123. As shown in FIG. 7, MVNO #1 core network 210 is in communication with the central provider core network 110 via the Internet 120, and MVNO #2 core network 210 is in communication with the central provider core network 111 via an alternate landline (LL)/VPN connection 425-1. In some embodiments, the two MVNOs each offer completely different devices and/or services, and the devices and/or services also differ significantly from those offered by the central provider, and the service profiles are adapted as required to service the different devices and respective service offerings. In addition, the central billing system 123 allows all three service provider user populations to access ecommerce experiences from transaction provider partners operating transaction servers 134, to choose central provider billing options that combine their third-party transaction bills on their service provider bill, and each subscriber population can experience a service provider specified look and feel that is unique to the respective service provider even though the different user populations are interfacing to the same transaction servers and the transaction partners do not need to require significant custom development to provide the unique central billing and unique consistent user experience look and feel.

In some embodiments, a central provider offers open network device and service developer services using one service controller server 125 (e.g., a service controller server farm) and allows the open development partners to lease server time and server tools to build their own service profiles. The central provider also provides service billing on behalf of services to the open development partners. For example, this reduces costs associated with setting up an MVNO network for the open development partners and does not require the partners to give up significant control or flexibility in device and/or service control.

In some embodiments, rather than attaching a service provider service plan account to a single device; it is attached to (e.g., associated with) a user. For example, when the user logs onto an access network with a service controller controlled by a service provider, regardless of what device the user logs onto with the user's service plan profile can be automatically looked up in the central billing system 123 and dynamically loaded (e.g., downloaded) onto the device 100 from the service controller 122 (e.g., a service profile provided on demand based on the user's identity). In some embodiments, in addition to dynamically loading the user's service policy implementation and control settings, one or more of the user's preferences including notification, service control, traffic monitor reporting privacy and Customer Relationship Management (CRM) reporting privacy are also dynamically loaded. For example, this allows the user to have the same service settings, performance and experience regardless of the device the user is logged into and using on the network. In addition, as discussed herein, in the various embodiments that call for roaming from one type of access network to another, the user service plan profile, that includes all of the above in addition to the service plan profile changes that take effect between different types of access network, can be used on any device and on any network, providing the user with a verifiable or compromise resistant, consistent service experience regardless of network or device.

In some embodiments, device based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using IPDRs (e.g., using the device ID/device number for the device 100 to determine if the device has been used in a manner that is out of plan for the service plan associated with the device 100, such as based on the amount of data usage exceeding the service plan's service data usage limits, out of plan/unauthorized access to certain websites, and/or out of plan/unauthorized transactions). In some embodiments, service data usage of the ambient activated device is verified by setting a maximum data rate in the policy control agent 1692 and if/when it is determined that the device is exceeding a specified data rate/data usage, then the service data usage is throttled accordingly. In some embodiments, various other verification approaches are used for ambient activation purposes.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to the billing server (e.g., central billing 123). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

In some embodiments, an online portal or web server is provided for allowing the user to select and/or update policy settings. For example, user input provided via the online portal/web server can be recorded and reported to the billing server (e.g., central billing 123). In another example, the online portal/web server can display transaction billing information and/or accept input for a transaction billing request, which can then be reported to the billing server accordingly.

As shown in FIG. 4, the service processor 115 includes a service interface or user interface 101. In some embodiments, the user interface 101 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 101 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 123 can be used to synchronize local service usage counters and service monitor agent 1696 information to perform real-time updating of local service usage counters between billing system 123 synchronizations. As another example, the user interface 101 can display options and accept user preference feedback, such as similarly discussed above with respect to user privacy/CRM/GPS filtering, traffic monitoring and service controls. For example, the user interface 101 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 101 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO, VSP, service provider partner, and/or other "entity" in a manner specified or influenced by the user to maintain the user's desired level of information privacy.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (or in some embodiments the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor 115. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allows for a large variety of service profiles to be defined and applied individually or as a superset to achieve the desired device 100 service features.

As shown in FIG. 4, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 4, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function. As discussed below, various embodiments described herein for the service control server link 1638 provide an efficient and secure mechanism for transmitting and receiving service policy implementation, control, monitoring and verification information between the device agents (e.g., service processor agents/components) and other network elements (e.g., service controller agents/components).

Figure 9:
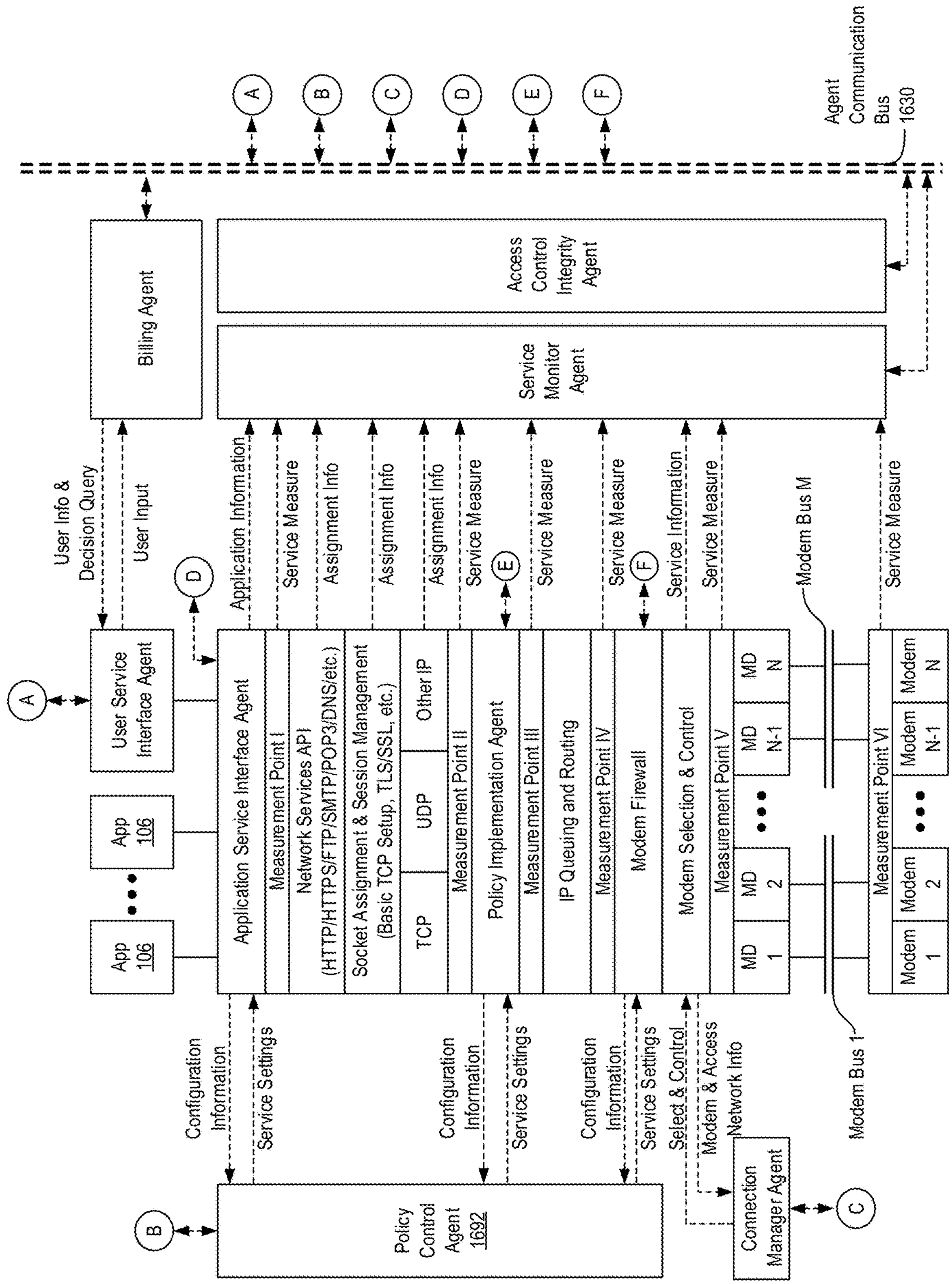
FIG. 9 is a functional diagram illustrating a device communications stack that allows for implementing verifiable traffic shaping policy, access control policy and/or service monitoring policy in accordance with some embodiments.

FIG. 9 is a functional diagram illustrating a device communications stack that allows for implementing verifiable traffic shaping policy, access control policy and/or service monitoring policy in accordance with some embodiments. As shown, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or in some embodiments the modem firewall agent 1655 or the application interface agent 1693, in making a determination regarding the traffic parameters or type once the traffic is farther down in the communication stack where it is sometimes difficult or impossible to make a complete determination of traffic parameters. For example, a detailed set of embodiments describing how the various measurement points can be used to help strengthen the verification of the service control implementation are described herein, including, for example, the embodiments described with respect to FIG. 4 and FIG. 51. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

Figure 51:
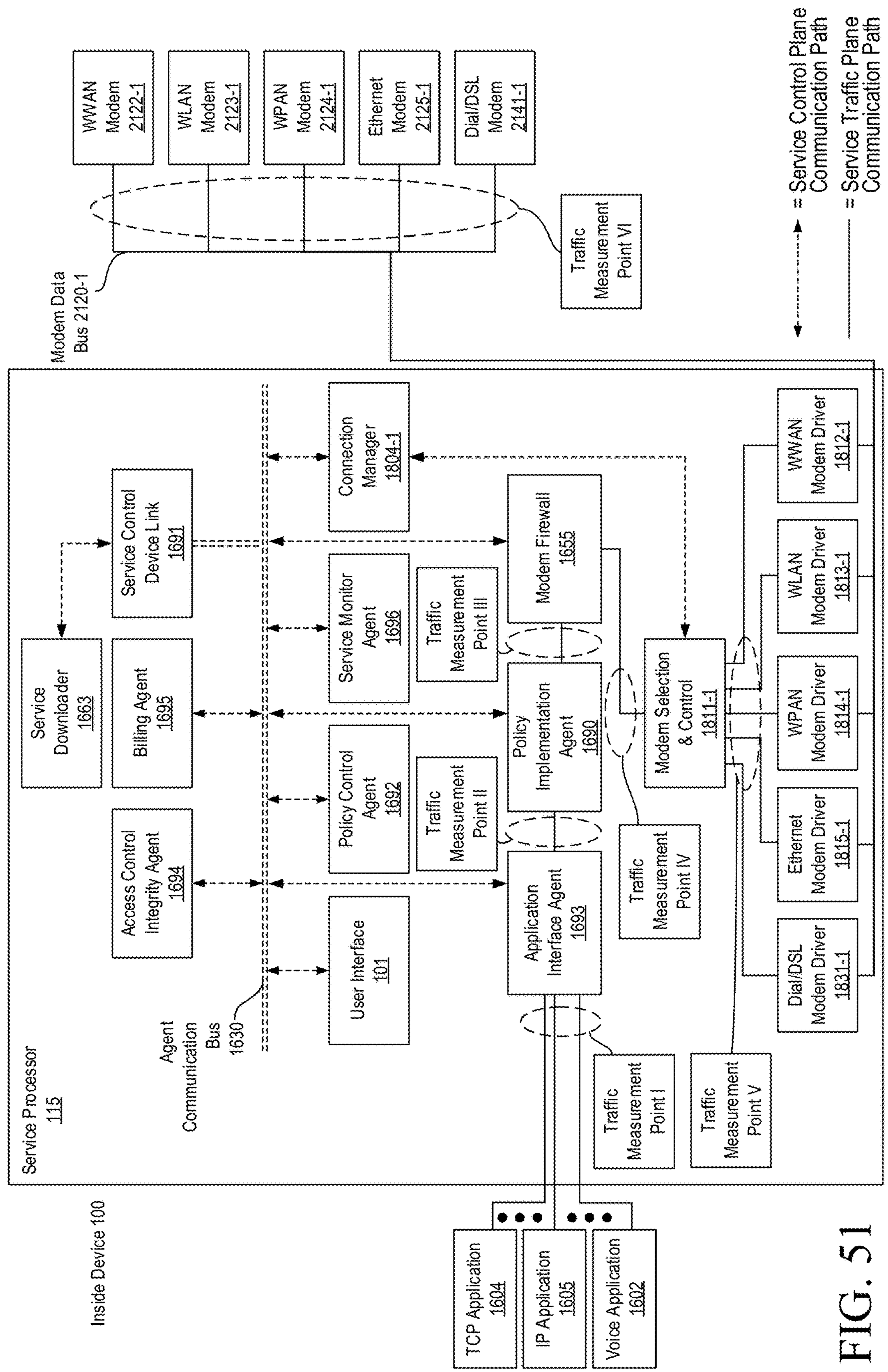
FIG. 51 is another functional diagram illustrating the service processor and the service controller in accordance with some embodiments.
Figure 52:
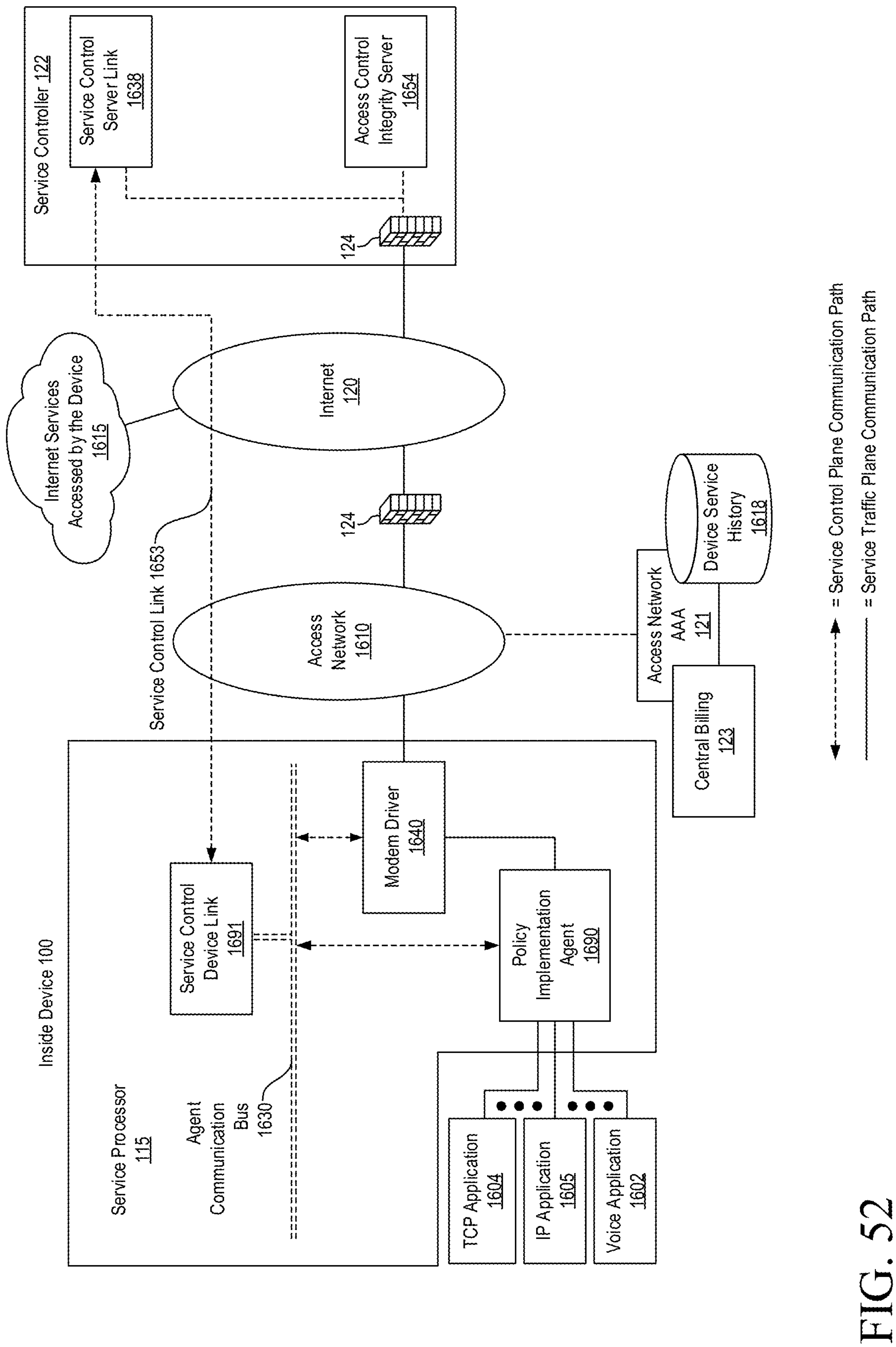
FIG. 52 is another functional diagram illustrating the service processor and the service controller in accordance with some embodiments.

It will be appreciated that although the implementation/ use of any or all of the measurement points illustrated in FIG. 9 is not required to have an effective implementation, such as was similarly shown with respect to various embodiments described herein, such as with respect to FIGS. 51 and 52, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack (e.g., such as for embodiments similarly described herein with respect to FIGS. 15 and 16) where, for example, it is more difficult to circumvent and can be more difficult to access for tampering purposes if the modem is designed with the proper software and/or hardware security to protect the integrity of the modem stack and measurement point(s).

Referring to FIG. 9, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multimode device based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent tampering of the service controls. In some embodiments, the modem firewall is implemented farther up the stack, possibly in combination with other layers as indicated in other Figures. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer. As shown, an IP queuing and routing layer is separate from the policy implementation layer where the policy implementation agent implements a portion of the traffic control and/or service usage control policies. As described herein, in some embodiments, these functions are separated so that a standard network stack function can be used for IP queuing and routing, and the modifications necessary to implement the policy implementation agent functions can be provided in a new layer inserted into the standard stack. In some embodiments, the IP queuing and routing layer is combined with the traffic or service usage control layer. Examples of this combined functionality are shown and described with respect to FIGS. 11, 12 and 13. For example, a combined routing and policy implementation layer embodiment can also be used with the other embodiments, such as shown in FIG. 9. Various detailed embodiments describing how the policy implementation layer can control traffic or other service usage activities are described with respect to FIG. 343. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 9.

As shown, the application service interface layer is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

Various applications and/or a user service interface agent communicate via this communications stack, as shown (illustrating such communications with a reference (A)). Also, the billing agent, which is in communication with the agent communication bus 1630, communicates user information and decision query and/or user input to the user service interface agent, as shown. The policy control agent communicates service settings and/or configuration information via this communications bus 1630, as shown (illustrating such communications with a reference (B) via the application layer, policy implementation agent layer, which is lower in the communications stack as shown, and/or the modem firewall layer). The connection manager agent communicates select and control commands and/or modem and access network information via this communications stack, as shown (illustrating such communications with a reference (C) via the modem selection and control layer). Various other communications (e.g., service processor and/or service controller related communications, such as service usage measure information and/or application information) are provided at various levels of this communications stack, as shown (illustrating such communications with references (D) at the application layer, (E) at the policy implementation agent layer, and (F) at the modem firewall layer).

As shown in FIG. 9, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

In some embodiments, one or more of the networking stack modifications described herein in combination one or more of the service verification and tamper prevention techniques described herein is provided. As similarly described with respect to FIG. 9, the various example embodiments for assisting service control verification described herein and as summarized in the example tables provided in FIGS. 340A-340H, 341A-341N, and 342A-342D can be employed individually or in combination to create increasingly secure cross-functional service control verification embodiments. In FIG. 9, the presence of the access control integrity agent, policy control agent, service monitor agent and the other agents that perform verification and/or tamper prevention functions illustrates verifiable service control aspects in accordance with some embodiments. Furthermore, the presence of the billing agent combined with the service verification and/or tamper prevention agents and techniques described herein provides for a set of verifiable billing embodiments for service billing, service billing offset corrections, bill by account, transaction billing and other billing functions. In addition, the presence of the user service interface agent in combination with the service control agent functions in the modified networking stack provide for embodiments involving a combination of service control with user preferences, which as described herein, provides the user with the capability to optimize service versus service cost in a network neutral manner. In some embodiments, the user control of service control policy is provided along with the service control verification and/or tamper prevention. The presence of the policy control agent that in some embodiments implements a higher than most basic level of policy decision and control with the policy implementation agents in the modified networking stack allows for, for example, the device to possess the capability to implement a higher level of service control for the purpose of obtaining a higher level service usage or service activity objective. In some embodiments, the application layer tagging in combination with other embodiments described herein provides for deep service activity control that is verifiable.

In some embodiments, verifiable traffic shaping as described herein can be performed using the device communications stack in a variety of embodiments for the combination of service control within the networking stack and service control verification and/or tamper prevention, with various embodiments depicted in FIGS. 9 through 17. Additional levels of detail regarding how such embodiments can be used to implement verifiable traffic shaping are provided in and described with respect to FIGS. 343 to 345 which depict example functional diagrams of packet processing flows for verifiable traffic shaping or service activity control in a device service processor for both upstream and downstream flows. Along with several other interesting features embodied in FIGS. 343 to 345, application traffic layer tagging is depicted in additional detail in accordance with some embodiments. For example, the application interface agent can determine service data usage at the application layer using measurement point I and a local service usage counter, and can, for example, pass this information to the service monitor agent. If service usage exceeds a threshold, or if using a service usage prediction algorithm results in predicted service usage that will exceed a threshold, then the user can be notified of which applications are causing the service usage overrun or potential service usage overrun, via the user service interface agent. The user can then identify which application service (e.g., traffic associated with a specified high service use or non-critical application, such as for example a high bandwidth consumption social networking website or service, media streaming website or service, or any other high bandwidth website or service transmitting and/or receiving data with the service network) that the user prefers to throttle. As another example, the user could select a service policy that allows for video chat services until those services threaten to cause cost over-runs on the user's service plan, and at that time the service policy could switch the chat service to voice only and not transmit or receive the video. The traffic associated with the user specified application can then be throttled according to user preference input. For example, for downstream traffic, packets (e.g., packets that are virtually or literally tagged and/or otherwise associated with the application traffic to be throttled) from the access network can be buffered, delayed and/or dropped to throttle the identified application traffic. For upstream traffic, packets (e.g., packets that are virtually or literally tagged and/or otherwise associated with the application traffic to be throttled) can be buffered, delayed and/or dropped before being transmitted to the access network to throttle the identified application traffic. As similarly described above, traffic shaping as described herein can be verified, such as by the service monitor agent via the various measurement points and/or using other agents.

Figure 10:
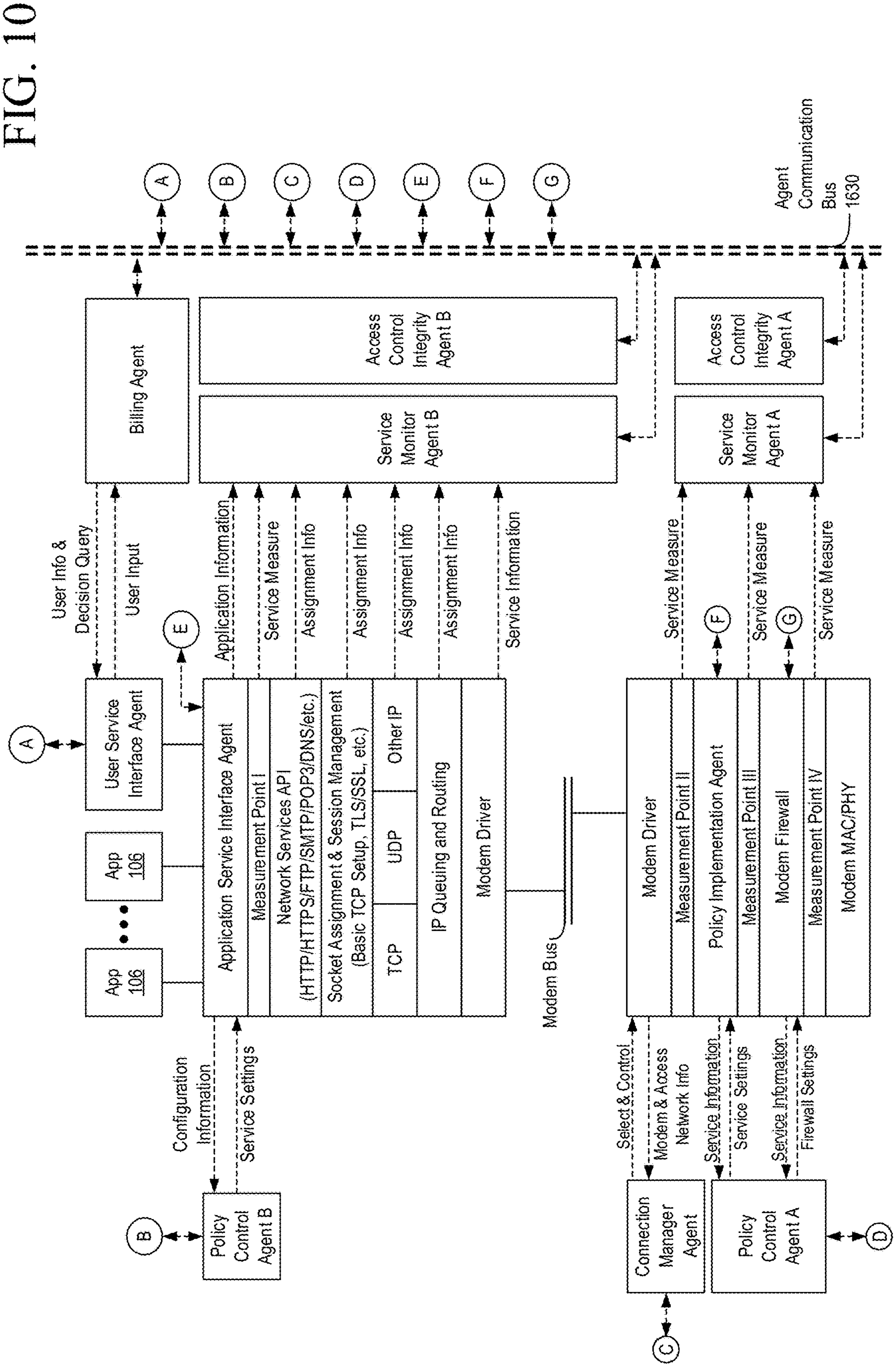
FIG. 10 is another functional diagram illustrating the device communications stack that allows for implementing traffic shaping policy, access control policy and/or service monitoring policy in accordance with some embodiments.

The embodiments depicted in FIG. 10 and other figures generally require enhancements to conventional device networking communication stack processing. For example, these enhancements can be implemented in whole or in part in the kernel space for the device OS, in whole or in part in the application space for the device, or partially in kernel space and partially in application space. As described herein, the networking stack enhancements and the other elements of the service processor can be packaged into a set of software that is pre-tested or documented to enable device manufacturers to quickly implement and bring to market the service processor functionality in a manner that is compatible with the service controller and the applicable access network(s). For example, the service processor software can also be specified in an interoperability standard so that various manufacturers and software developers can develop service processor implementations or enhancements, or service controller implementations or enhancements that are compatible with one another.

FIG. 10 is another functional diagram illustrating the device communications stack that allows for implementing traffic shaping policy, access control policy and/or service monitoring policy in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 10 are possible where more or less of the service processor functionality is moved onto the modem subsystem or onto the device application processor subsystem. For example, such embodiments similar to that depicted in FIG. 10 can be motivated by the advantages of containing some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 10, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 10.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent B communicates service settings and/or configuration information via this communications stack, as shown (illustrating such communications with a reference (B)) via the application layer. The policy control agent A communicates service settings and/or configuration information via this communications stack, as shown (illustrating such communications with a reference (D)) via the policy implementation agent layer and/or the modem firewall layer. The connection manager agent communicates select & control commands and/or modem and access network information via this communications stack, as shown (illustrating such communications with a reference (C)) via the modem driver layer. Various other communications (e.g., service processor and/or service controller related communications, such as service usage measure information, and/or application information) are provided at various levels of this communications stack, as shown (illustrating such communications with references (E)) at the application layer through the modem driver layer with the service monitor agent B as shown (and an access control integrity agent B is also shown), and communications with references (F) at the policy implementation agent layer and (G) at the modem firewall layer with the service monitor agent A as shown (and an access control integrity agent A is also shown). In some embodiments, the service usage policy verification or tamper prevention embodiments described herein can be applied, in isolation or in combination, in the context of FIG. 11 to provide for embodiments with increasing levels of service usage policy control verification certainty, such as provided with FIGS. 340A-340H, 341A-341N, and 342A-342D.

Figure 11:
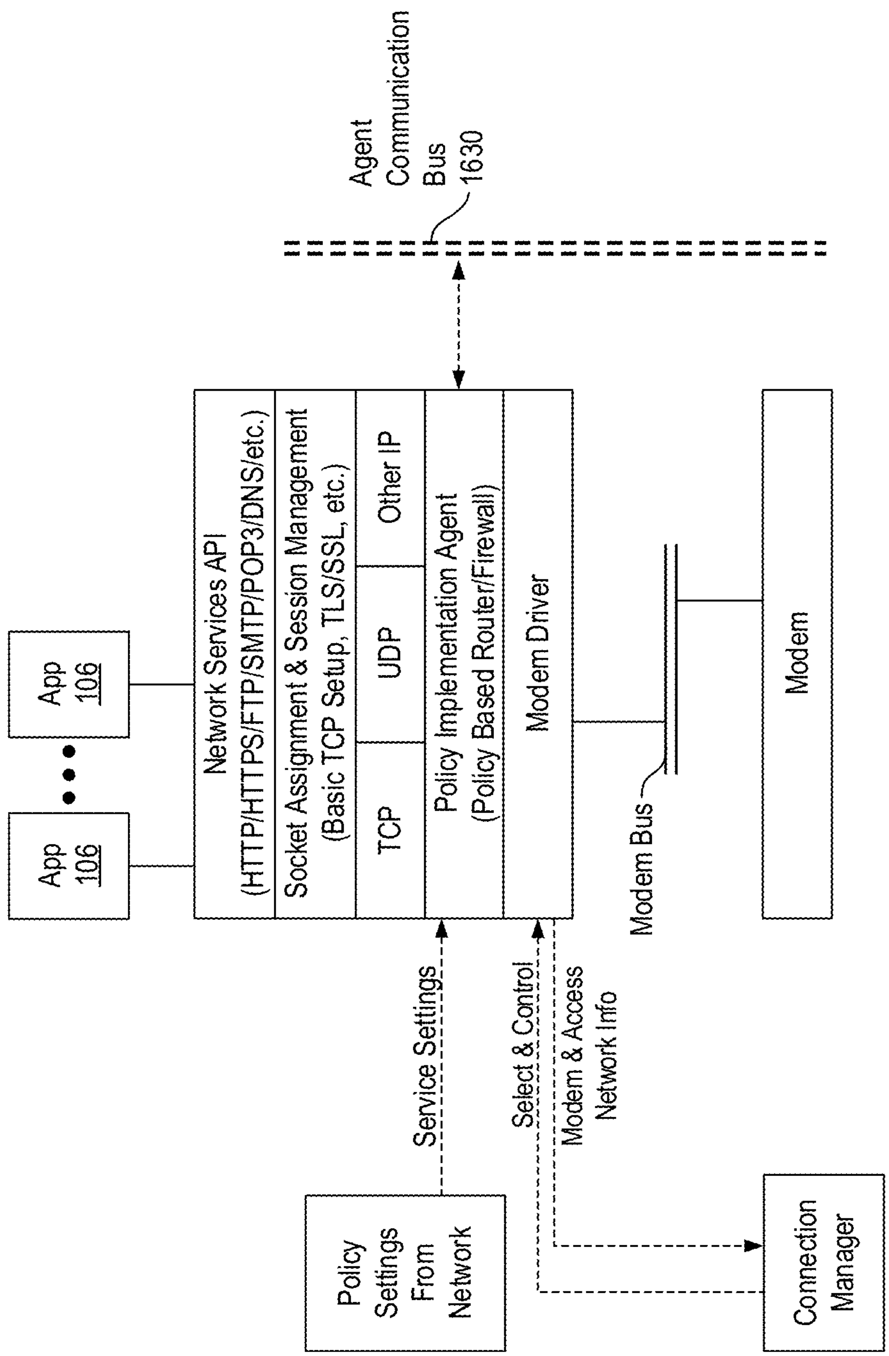
FIG. 11 is another functional diagram illustrating the device communications stack that allows for implementing traffic shaping policy, access control policy and/or service monitoring policy in accordance with some embodiments.

FIG. 11 is another functional diagram illustrating the device communications stack that allows for implementing traffic shaping policy, access control policy and/or service monitoring policy in accordance with some embodiments. In some embodiments, the service processor is a simplified implementation. For example, this approach can be used for applications with less capable device application processors, rapid time to market needs, fewer service usage control needs, and/or other reasons that lead to a need for a lower complexity implementation.

Referring to FIG. 11, describing the device communications stack from the bottom to the top of the stack as shown, the device communications stack provides a communication layer for the modem layer at the bottom of the device communications stack. The modem driver layer resides above the modem bus layer as shown. In the next higher layer, the policy implementation agent is provided, and the policy implementation agent is also in communication with the agent communication bus 1630 as shown. The next higher layer is shown as the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem driver as shown. Although FIG. 11 does not depict all of the service usage control verification functions provided by certain embodiments calling for additional service verification or control agents, a high level of service policy implementation verification certainty can be achieved within the context of the embodiments depicted in FIG. 11 by applying a subset of the service usage policy verification or tamper prevention embodiments described herein. For example, the embodiments depicted in FIG. 11 can be combined with the service controller embodiments that utilize IPDRs to verify service usage is in accordance with the desired service policy. There are also many other service usage control embodiments described herein that can be applied in isolation or in combination to the embodiments depicted in FIG. 11 to provide increasing levels of service usage control verification certainty, as will be apparent to one of ordinary skill in the art in view of FIGS. 340A-340H, 341A-341N, and 342A-342D and the various embodiments described herein.

Figure 12:
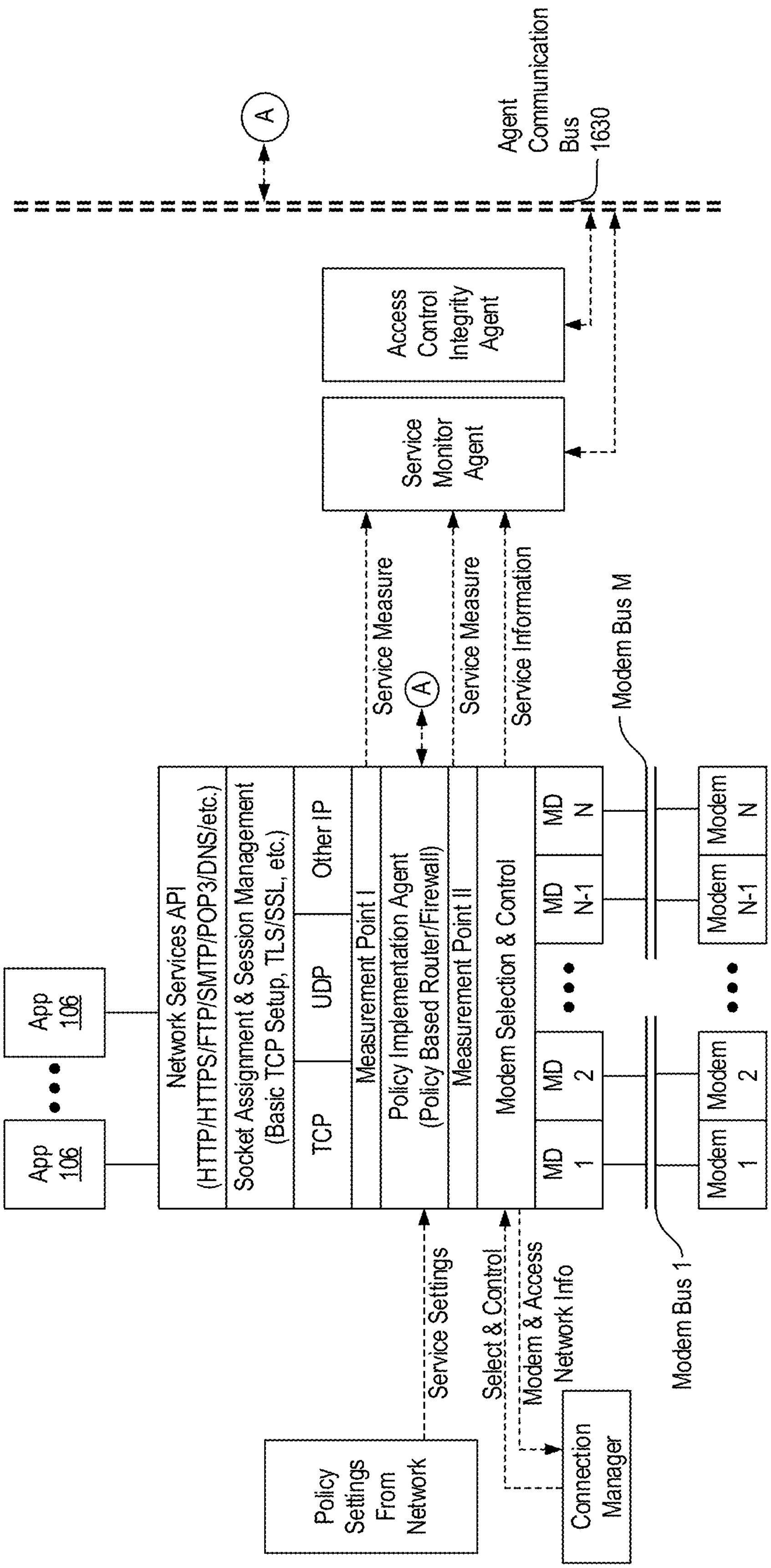
FIG. 12 is another functional diagram illustrating the device communications stack that allows for implementing traffic shaping policy, access control policy and/or service monitoring policy in accordance with some embodiments.

FIG. 12 is another functional diagram illustrating the device communications stack that allows for implementing traffic shaping policy, access control policy and/or service monitoring policy in accordance with some embodiments. In some embodiments, the service processor is a simplified implementation embodiment with device based monitoring and integrity control. For example, FIG. 12 provides for somewhat higher complexity (e.g., relative to the embodiments depicted in FIG. 10) in exchange for the enhanced service monitoring, control or verification that are possible by implement additional agent embodiments, such as the service monitor agent and the access control integrity agent functions.

Figure 13:
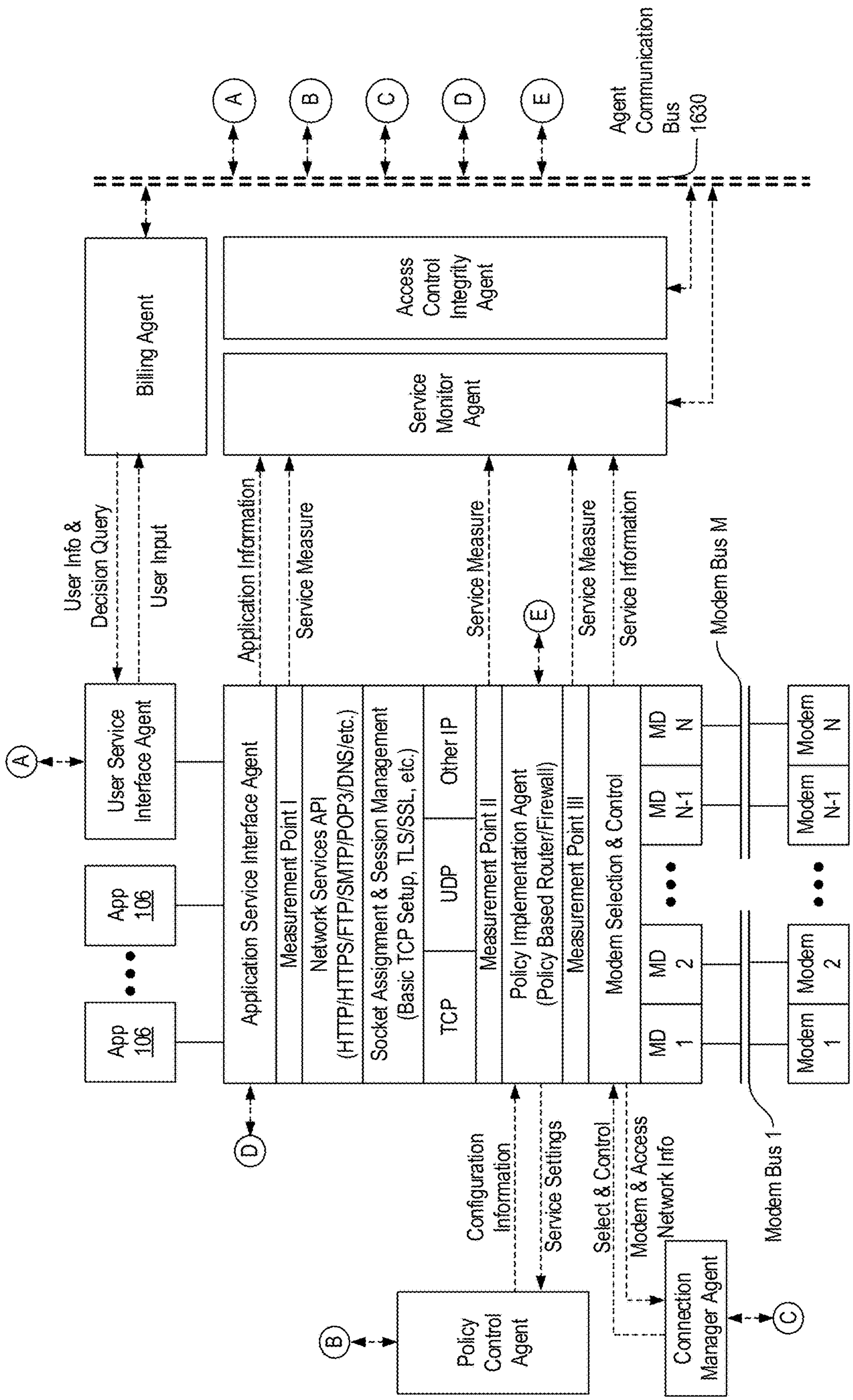
FIG. 13 is another functional diagram illustrating the device communications stack that allows for implementing traffic shaping policy, access control policy and/or service monitoring policy in accordance with some embodiments.

Referring to FIG. 13, describing the device communications stack from the bottom to the top of the stack as shown, the device communications stack provides a communication layer for each of the modems of the device at the bottom of the device communications stack. Measurement point II resides above the modem selection & control layer, which resides above the modem buses for each modem. Measurement point I resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem selection and control layer as shown. The service monitor agent, which is also in communication with the agent communication bus 1630, communicates with various layers of the device communications stack. For example, the service monitor agent, performs monitoring at each of measurement points I and II, receiving information including application information, service usage and other service related information, and assignment information. An access control integrity agent is in communication with the service monitor agent via the agent communications bus 1630, as also shown. As similarly described with respect to FIGS. 10 and 11, many of the service usage control verification embodiments described herein can be applied in isolation or in combination in the context of FIG. 12.

FIG. 13 is another functional diagram illustrating the device communications stack that allows for implementing traffic shaping policy, access control policy and/or service monitoring policy in accordance with some embodiments. Referring to FIG. 13, describing the device communications stack from the bottom to the top of the stack as shown, the device communications stack provides a communication layer for each of the modems of the device at the bottom of the device communications stack. Measurement point III resides above the modem selection & control layer, which resides above the respective modem buses for each modem. Measurement point II resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 13.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. The connection manager agent communicates select & control commands and/or modem and access network information via this communications stack, as shown (illustrating such communications with a reference (C)) via the modem selection and control layer. Various other communications (e.g., service processor and/or service controller related communications, such as service usage measure information, application information) are provided at various levels of this communications stack, as shown (illustrating such communications with references (D)) at the application layer and (E) at the policy implementation agent layer.

As shown in FIG. 13, a service monitor agent, which is also in communication with the agent communication bus 1630, communicates with various layers of the device communications stack. For example, the service monitor agent, performs monitoring at each of measurement points I through III, receiving information including application information, service usage and other service related information, and assignment information. An access control integrity agent is in communication with the service monitor agent via the agent communications bus 1630, as also shown. As similarly described with respect to FIGS. 10, 11 and 12, many of the service usage control verification embodiments disclosed herein can be applied in isolation or in combination in the context of FIG. 13.

Figure 14:
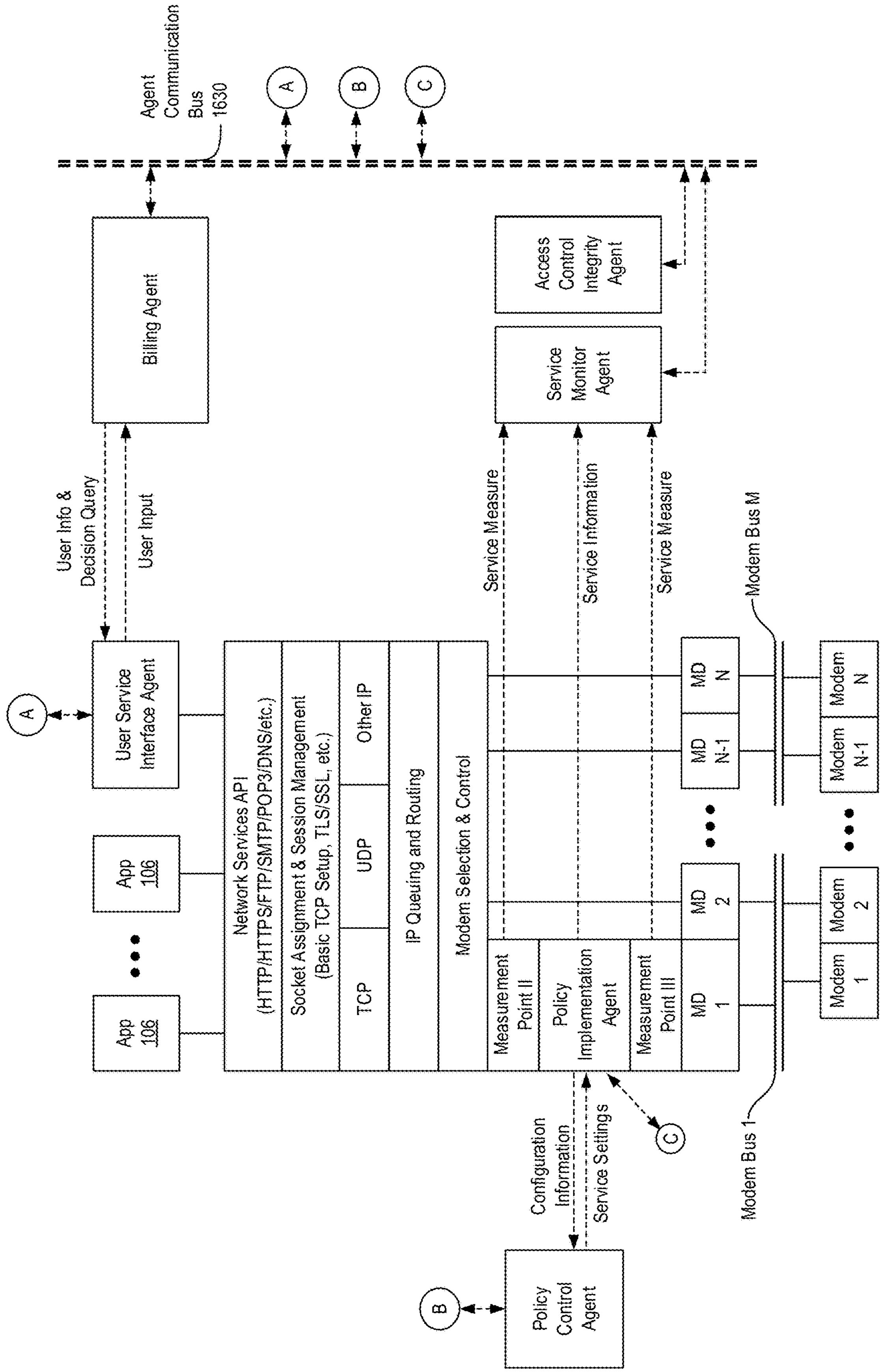
FIG. 14 is another functional diagram illustrating the device communications stack that allows for implementing traffic shaping policy, access control policy and/or service monitoring policy in accordance with some embodiments.

FIG. 14 is another functional diagram illustrating the device communications stack that allows for implementing traffic shaping policy, access control policy and/or service monitoring policy in accordance with some embodiments. In some embodiments, the data path processing for the service processor is provided in conjunction with a single modem driver as shown. As shown, the service processor communication stack processing is provided below the standard network communication stack and in combination with a modem driver (e.g., and this approach can be extended to more than one modem).

Referring to FIG. 14, describing the device communications stack from the bottom to the top of the stack as shown, the device communications stack provides a communication layer for each of the modems of the device at the bottom of the device communications stack. Measurement point II resides above the modem driver 1 layer. Measurement point I resides between the policy implementation agent (policy based router/firewall) layer and the modem selection and control layer, for the modem driver 1 stack in this single modem driver embodiment. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 14, applications communicate with the device communications stack via the network services API as shown (illustrating such communications with a reference (A)). Policy settings from the network (e.g., service settings) are communicated with the policy implementation agent as shown (illustrating such communications with a reference (B)). The service monitor agent, which is also in communication with the agent communication bus 1630, communicates with policy implementation agent layer of the device communications stack. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information, application information) are provided at various levels of this communications stack, as shown (illustrating such communications with references (C)) at the policy implementation agent layer. Also, the billing agent, which is in communication with the agent communication bus 1630 communications user information and decision query and/or user input to the user service interface agent, as shown. As similarly described with respect to FIGS. 10, 11, 12 and 13, many of the service usage control verification embodiments disclosed herein can be applied in isolation or in combination in the context of FIG. 14.

Figure 15:
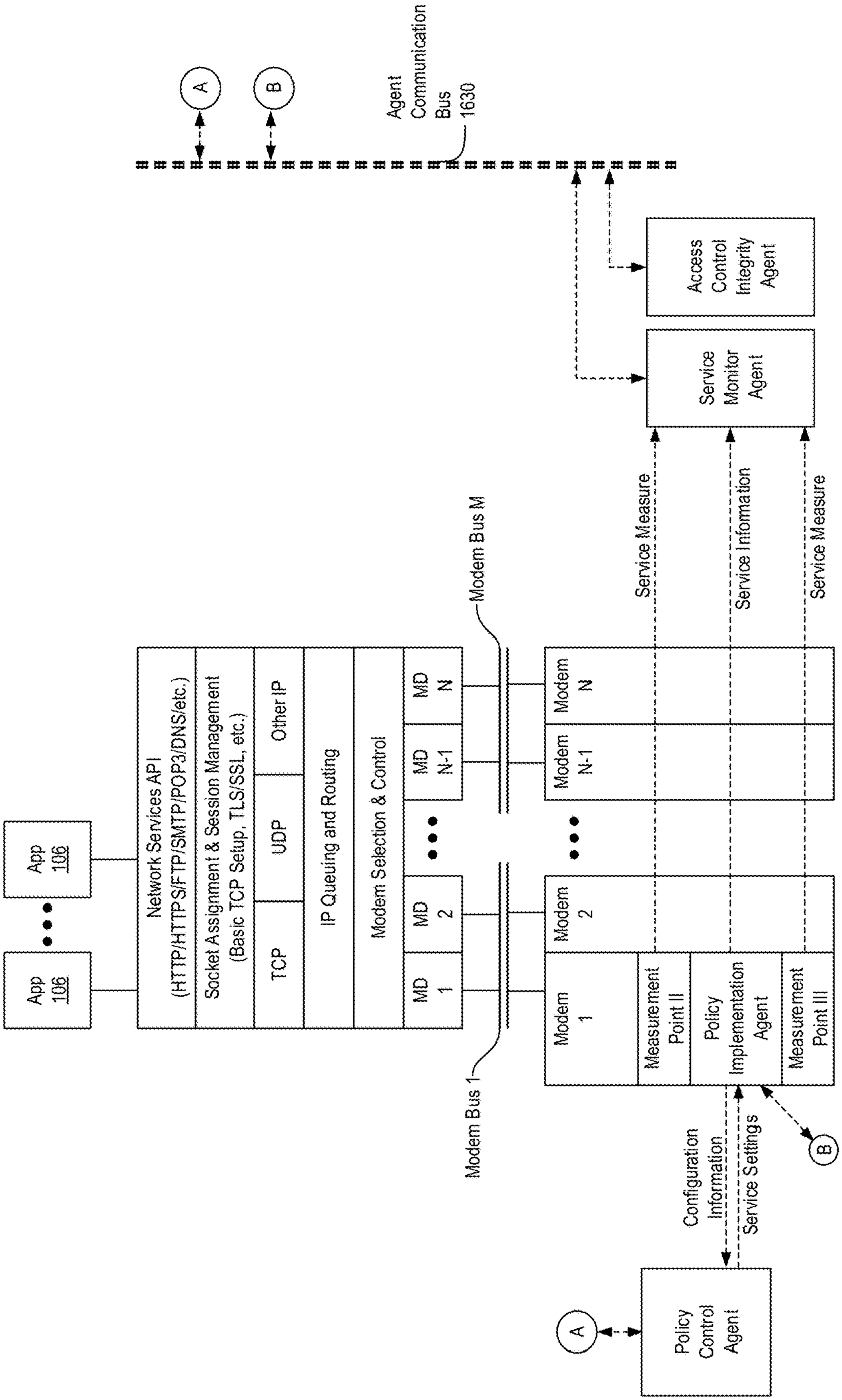
FIG. 15 is another functional diagram illustrating the device communications stack that allows for implementing traffic shaping policy, access control policy and/or service monitoring policy in accordance with some embodiments.

FIG. 15 is another functional diagram illustrating the device communications stack that allows for implementing traffic shaping policy, access control policy and/or service monitoring policy in accordance with some embodiments. In particular, FIG. 15 illustrates a single modem hardware embodiment as shown. As shown, the service processor network communication stack processing is provided on the modem hardware (e.g., and this approach can be extended to more than one modem). This approach allows for the service processor to be distributed as a standard feature set contained in a modem chipset hardware of software package or modem module hardware or software package, which, for example, can provide for easier adoption or development by device OEMs, a higher level of differentiation for the chipset or modem module manufacturer, higher levels of performance or service usage control implementation integrity, or other benefits.

Referring to FIG. 15, describing the device communications stack from the bottom to the top of the stack as shown, the device communications stack provides a communication layer for each of the modems of the device at the bottom of the device communications stack. As shown, measurement points I and II and the policy implementation agent reside on the modem 1 (e.g., implemented as hardware and/or software on modem 1). Measurement point I resides above the policy implementation agent (policy based router/firewall) layer, and measurement point II resides below the policy implementation agent later. The modem selection and control layer resides above the modem drivers layer, as shown. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 15, applications communicate with the device communications stack via the network services API as shown. Policy settings from the network (e.g., service settings) are communicated with the policy implementation agent as shown (illustrating such communications with a reference (A)). The service monitor agent, which is also in communication with the agent communication bus 1630, communicates with policy implementation agent layer of the modem 1. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information and/or application information) are provided at various levels of this communications stack, as shown (illustrating such communications with references (B)) at the policy implementation agent layer. As similarly described with respect to FIGS. 10, 11, 12, 13 and 14, many of the service usage control verification embodiments disclosed herein can be applied in isolation or in combination in the context of FIG. 15.

Figure 16:
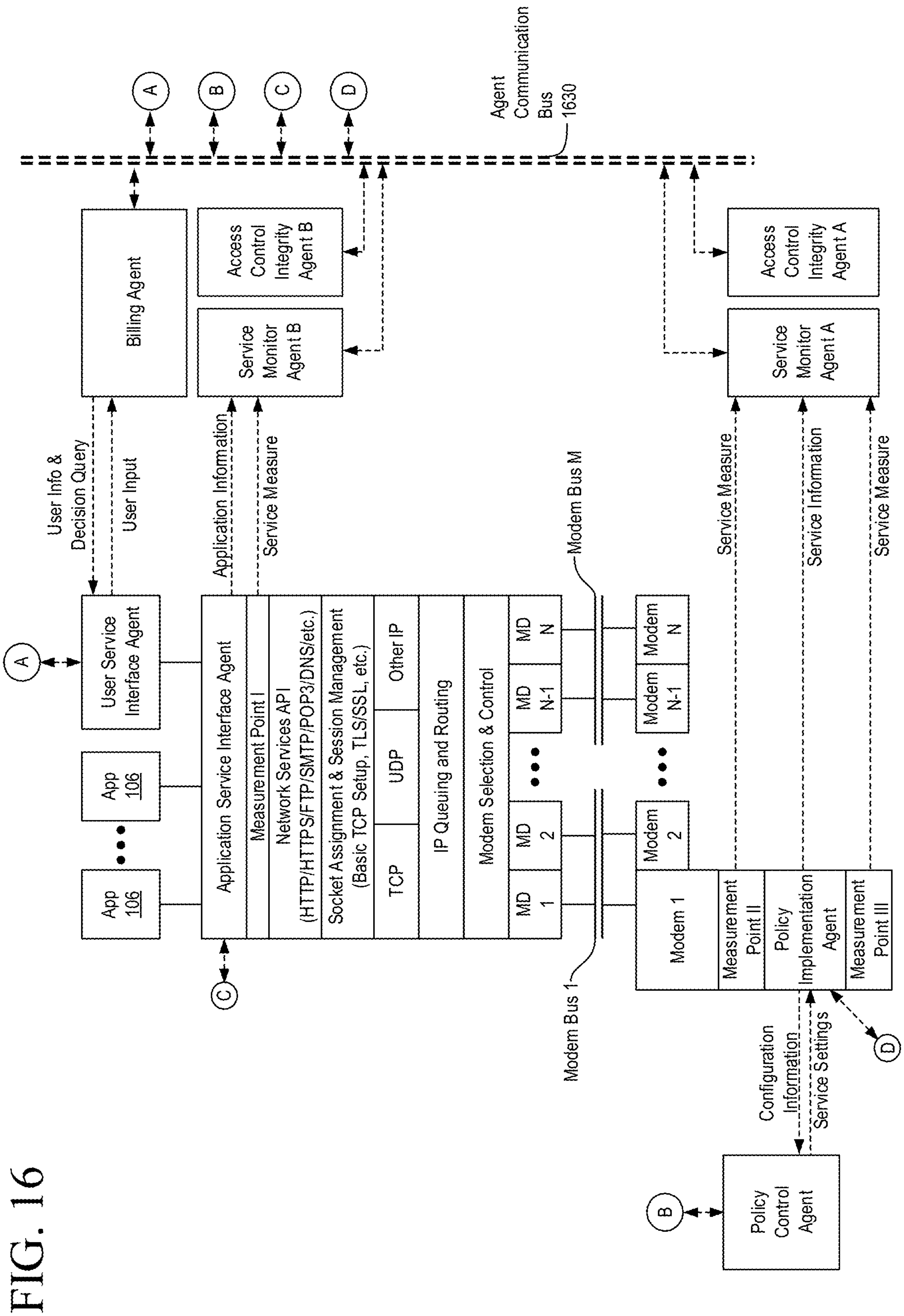
FIG. 16 is another functional diagram illustrating the device communications stack that allows for implementing traffic shaping policy, access control policy and/or service monitoring policy in accordance with some embodiments.

FIG. 16 is another functional diagram illustrating the device communications stack that allows for implementing traffic shaping policy, access control policy and/or service monitoring policy in accordance with some embodiments. In particular, FIG. 16 illustrates a single modem hardware embodiment, in which modem 1 includes a portion of the service processor networking communication stack processing and measurement points II and III and the policy implementation agent, as similarly shown in FIG. 15, and the higher levels of the device communications stack above the modem 1 layer, such as the application service interface layer, are implemented on the device application processor or in the device application processor memory as similarly described above, for example, with respect to FIG. 13, in which a measurement point I is shown between the application service interface agent layer and the network services API layer. For example, this approach allows for the application service interface agent to be provided on the device application processor or memory so that application layer service usage monitoring or control can be implemented. For example, the differences between the embodiments depicted in FIG. 16 and those of FIG. 10 include a simplified implementation and a policy control agent that is entirely implemented on the modem and not partially implemented in the application processor memory.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. Various other communications (e.g., service processor and/or service controller related communications, such as service usage measure information and/or application information) are provided at various levels of this communications stack, as shown (illustrating such communications with reference (C) at the application layer and communications with reference (D) at the policy implementation agent layer). As shown, the service monitor agent B communicates with the application service interface agent and measurement point I, and the service monitor agent A communicates with the policy implementation agent layer and measurement points II and III of the modem 1. As similarly described with respect to FIGS. 10, 11, 12, 13, 14 and 15, many of the service usage control verification embodiments disclosed herein can be applied in isolation or in combination in the context of FIG. 16.

Figure 17:
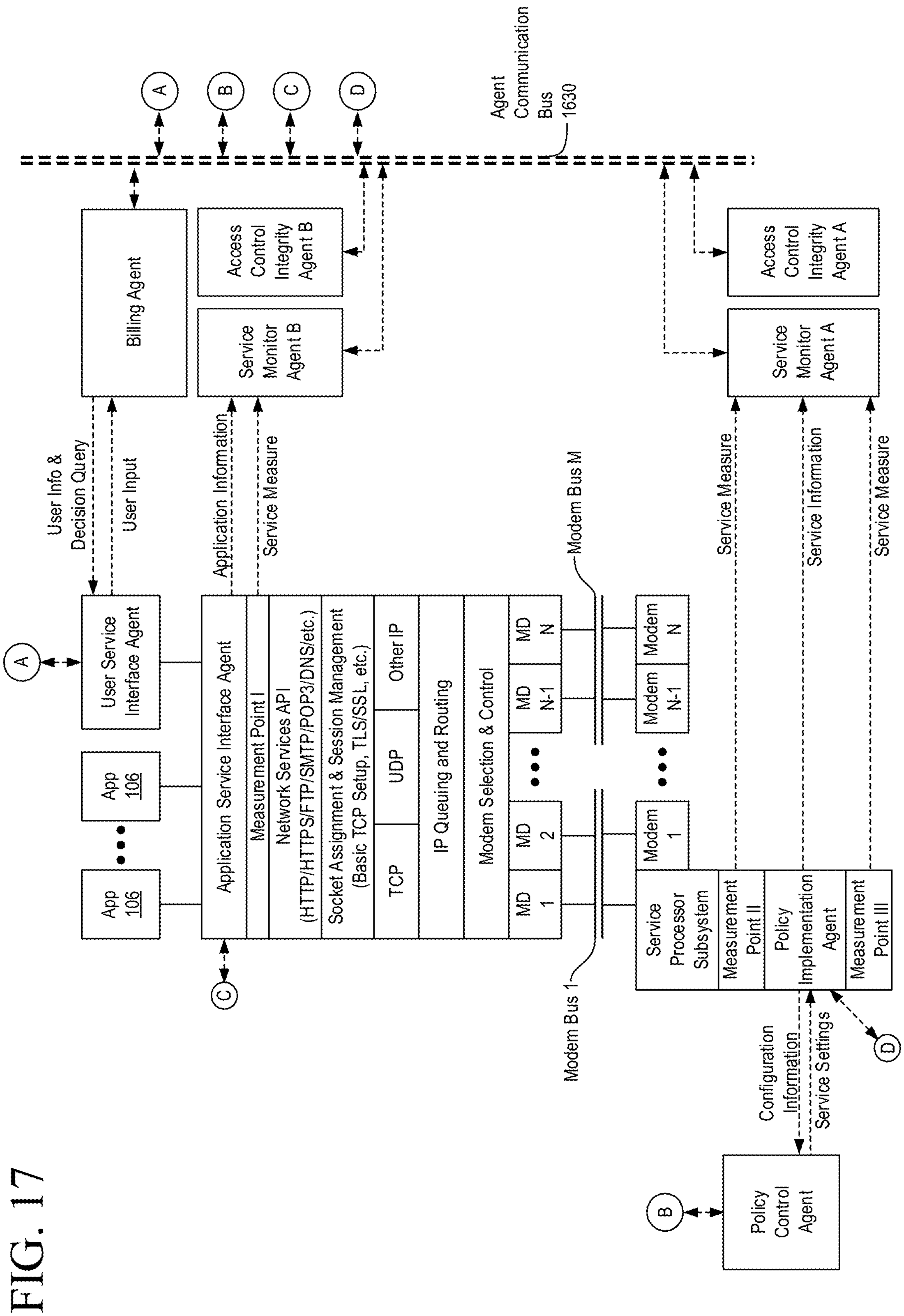
FIG. 17 is another functional diagram illustrating the device communications stack that allows for implementing traffic shaping policy, access control policy and/or service monitoring policy in accordance with some embodiments.

FIG. 17 is another functional diagram illustrating the device communications stack that allows for implementing traffic shaping policy, access control policy and/or service monitoring policy in accordance with some embodiments. In particular, FIG. 17 illustrates a device communications stack as similarly shown in FIG. 16, with the difference being that the service processor subsystem networking communication stack processing is implemented on a hardware function that is separate from the application processor and the modem. For example, this approach provides security advantages with a dedicated hardware system to protect some or all of the service usage control system from tampering. For example, some or all of the service processor can be implemented on a SIM card module. As another example, some or all of the service processor can be encapsulated on a self contained hardware module that can be added to a device without the need to modify the networking communication stack software or hardware.

Figure 18:
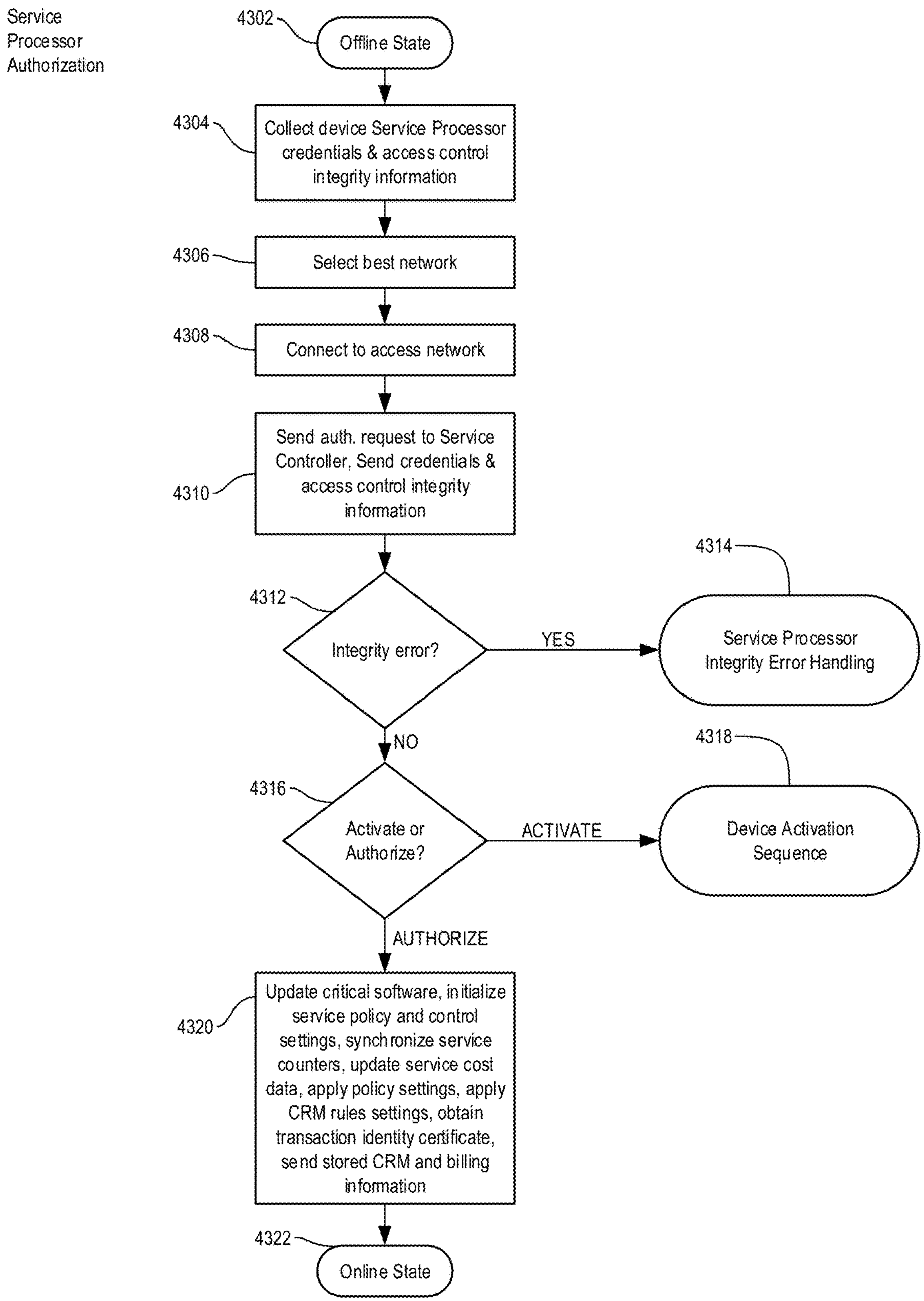
FIG. 18 and FIG. 19 are flow diagrams illustrating a flow diagram for a service processor authorization sequence as shown in FIG. 18 and a flow diagram for a service controller authorization sequence as shown in FIG. 19 in accordance with some embodiments.
Figure 19:
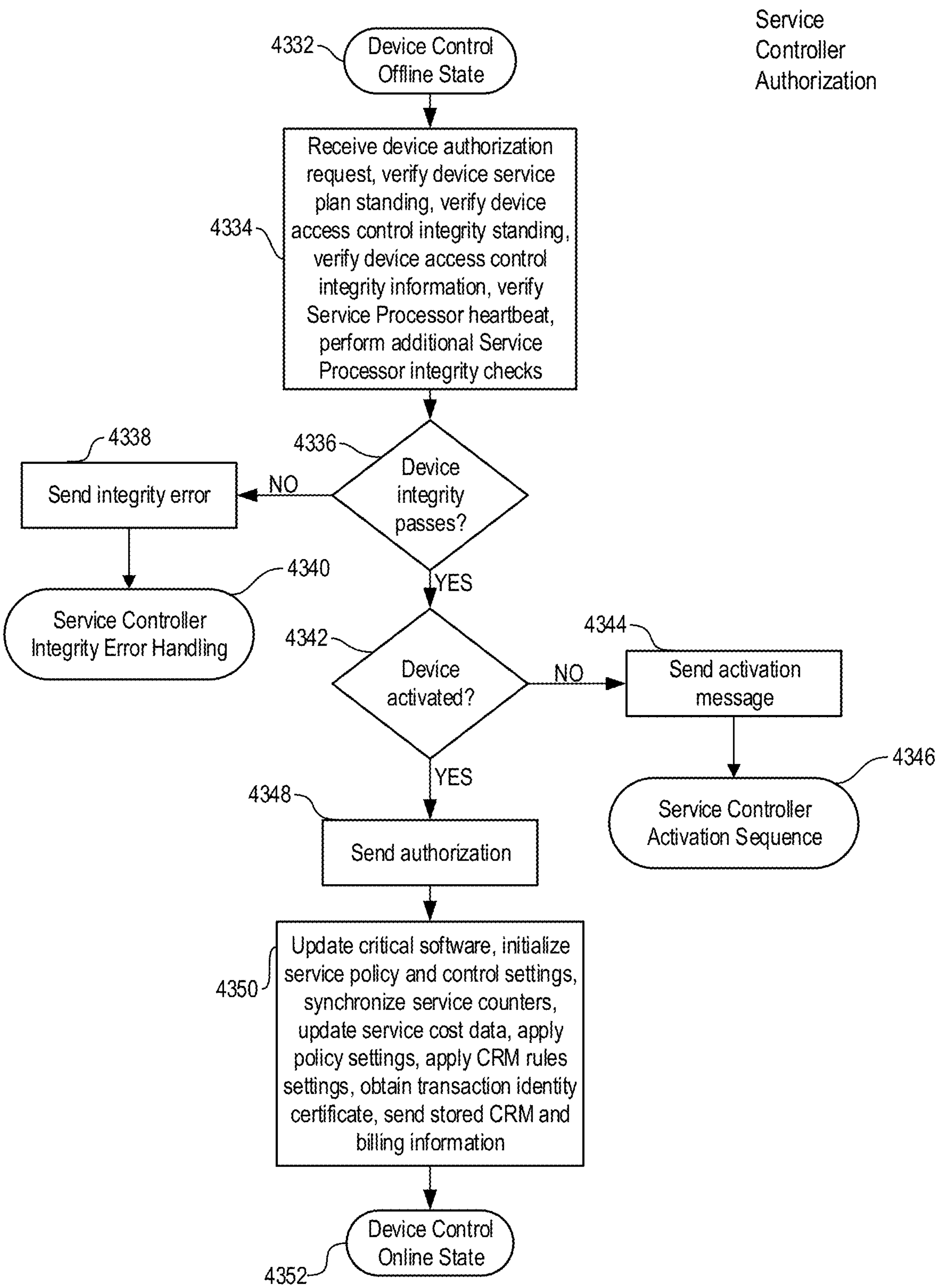

FIGS. 18 through 19 are flow diagrams illustrating a flow diagram for a service processor authorization sequence as shown in FIG. 18 and a flow diagram for a service controller authorization sequence as shown in FIG. 19 in accordance with some embodiments.

Referring to FIG. 18, at 4302, the device is in an offline state. At 4304, the service processor (e.g., service processor 115) of the device collects device service processor credentials and access control integrity information. At 4306, the service processor of the device selects a best network. At 4308, the device connects to an access network. At 4310, the service processor of the device sends an authorization request to the service controller (e.g., service controller 122) and also sends the credentials and access control integrity information. At 4312, the service processor determines whether an integrity error has occurred. If so, then the service processor performs integrity error handling at 4314. Otherwise, the service processor determines whether the device is activated and/or authorized for network access at 4316. If not, then the service processor performs a device activation sequence at 4318. At 4320, the service processor performs the following: updates critical software, initializes service policy and control settings, synchronizes service counters, updates service cost data, applies policy settings, applies CRM rules settings, obtains transaction identity certificate, and sends stored CRM and billing information. At 4322, the device is in an online state.

Referring to FIG. 19, at 4332, device control is in an offline state. At 4334, the service controller (e.g., service controller 122) receives a device authorization request, verifies device service plan standing, verifies device access control integrity standing, verifies device access control integrity information, verifies service processor heartbeat, and performs various additional service processor integrity checks (e.g., as similarly described herein). At 4336, the service controller determines whether the device integrity checks have all passed. If not, then the service controller sends an integrity error to the service processor (e.g., service processor 115) at 4338. At 4340, the service controller performs integrity error handling. Otherwise (the device integrity checks have all passed), the service controller determines whether the device is activated at 4342. If not, then the service controller sends an activation message to the service processor at 4344. At 4346, the service controller performs a service activation sequence. Otherwise (the device is activated), the service controller sends an authorization at 4348. At 4350, the service controller performs the following: updates critical software on the service processor, initializes service policy and control settings, synchronizes service counters, updates service cost data, applies policy settings, applies CRM rules settings, obtains transaction identity certificate, sends stored CRM and billing information. At 4352, the service controller is in a device online state.

Figure 20:
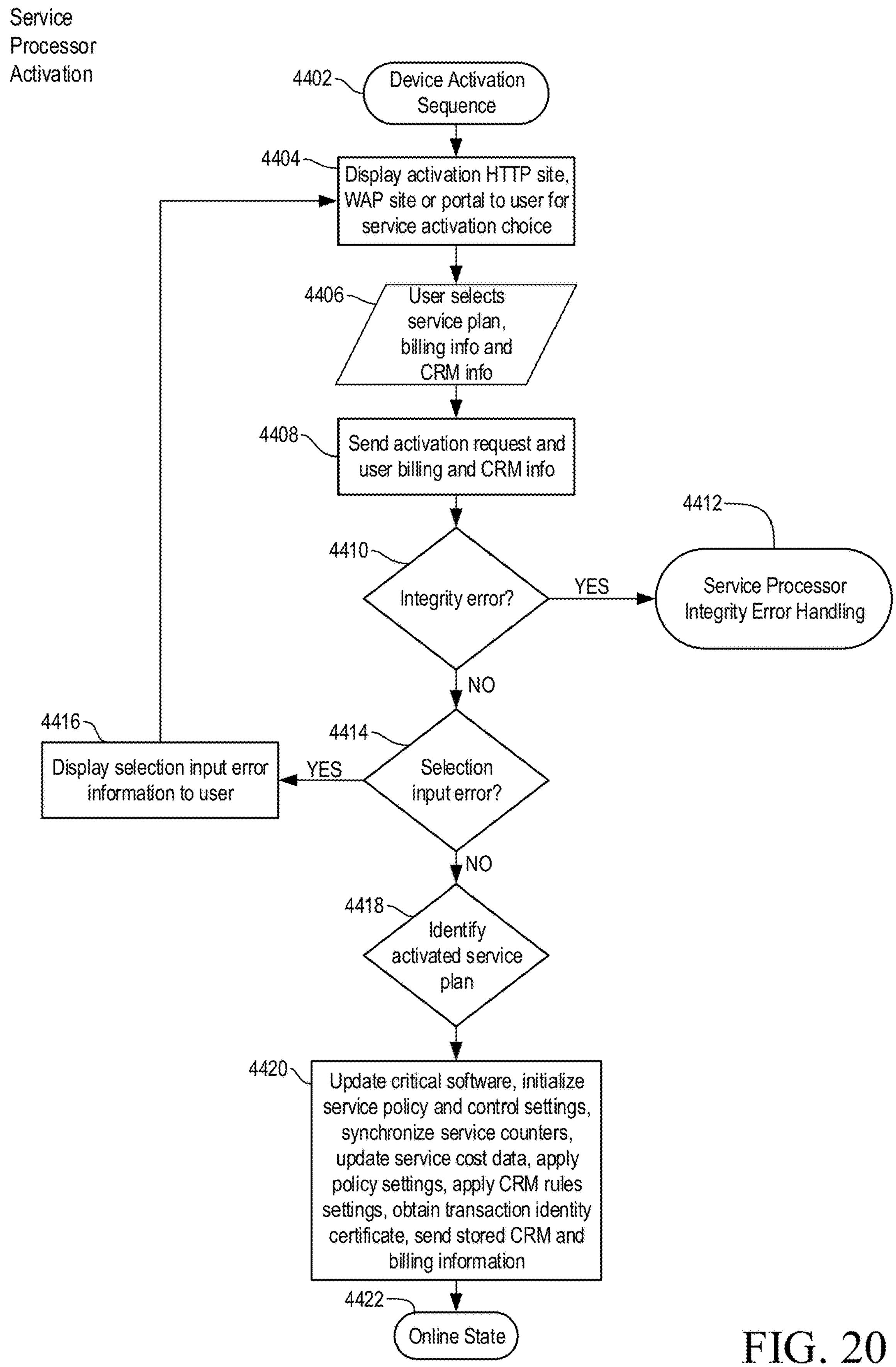
FIG. 20 and FIG. 21 are flow diagrams illustrating a flow diagram for a service processor activation sequence as shown in FIG. 20 and a flow diagram for a service controller activation sequence as shown in FIG. 21 in accordance with some embodiments.
Figure 21:
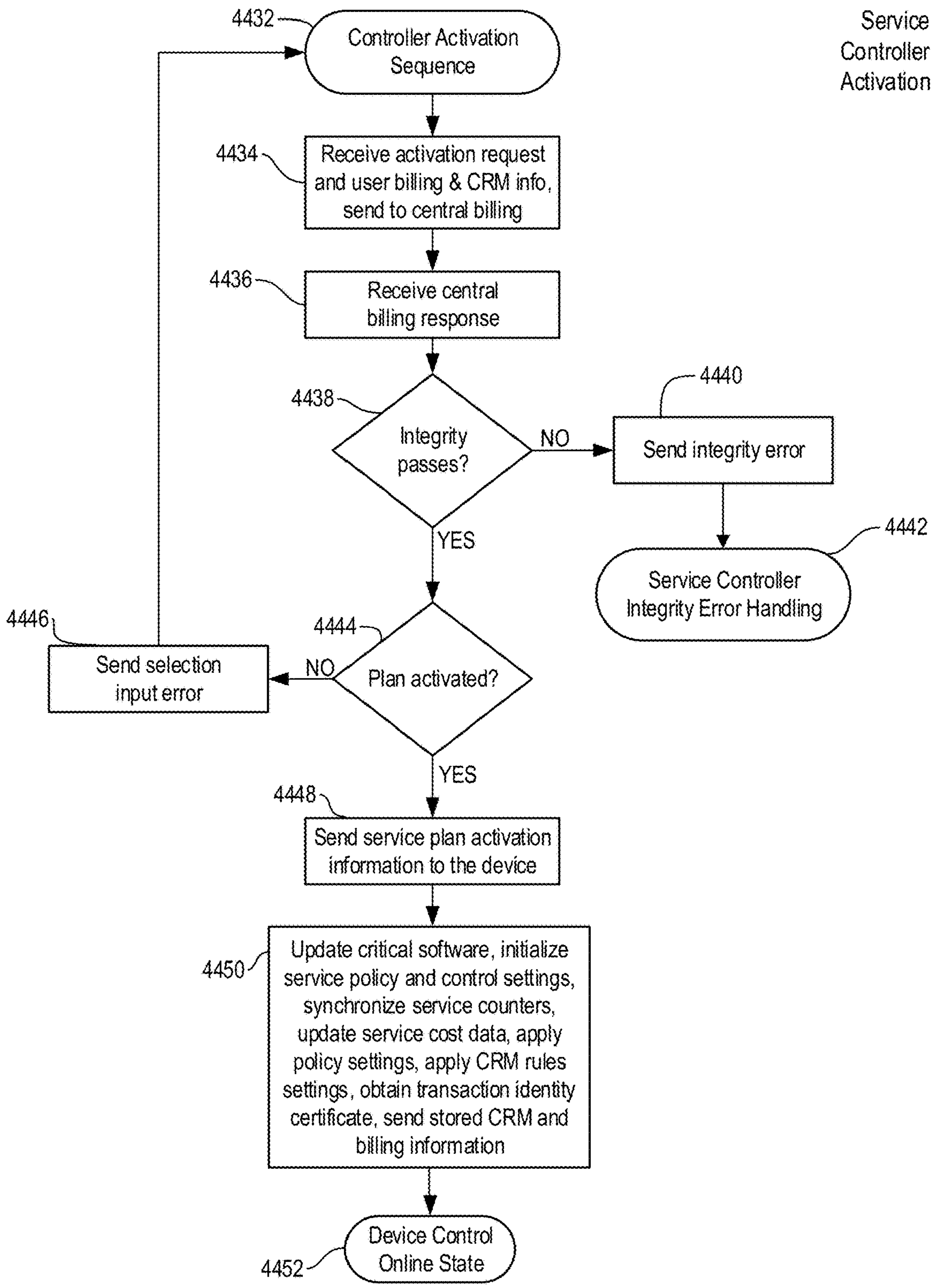

FIGS. 20 through 21 are flow diagrams illustrating a flow diagram for a service processor activation sequence as shown in FIG. 20 and a flow diagram for a service controller activation sequence as shown in FIG. 21 in accordance with some embodiments.

Referring to FIG. 20, at 4402, a service processor activation sequence is initiated. At 4404, the service processor (e.g., service processor 115) of the device displays an activation site (e.g., HTTP site, WAP site or portal) to the user for the user's service activation choice. At 4406, the user selects service plan, billing information and CRM information. At 4408, the service processor sends an activation request and user billing and CRM information to, for example, the service controller. At 4410, the service processor determines whether there is an integrity error. If so, then the service processor performs integrity error handling at 4412. Otherwise, the service processor determines whether there has been a selection input error at 4414. If so, the service processor displays the selection input error to the user at 4416 and returns to the activation site/portal at 4404. Otherwise, the service processor identifies the activated service plan at 4418. At 4420, the service processor performs the following: updates critical software, initializes service policy and control settings, synchronizes service counters, updates service cost data, applies policy settings, applies CRM rules settings, obtains transaction identity certificate, and sends stored CRM and billing information. At 4422, the device is in an online and activated state.

Referring to FIG. 21, at 4432, a service controller activation sequence is initiated. At 4434, the service controller (e.g., service controller 122) receives an activation request, including user billing and CRM information, and sends such to central billing. At 4436, the service controller receives a response from central billing. At 4438, the service controller verifies the integrity of the service processor. If an integrity error is detected, then an integrity error is sent at 4440. At 4442, the service controller performs integrity error handling. At 4444, the service controller determines whether the service plan has been activated. If not, then the service controller sends a selection input error to the device at 4446 and returns to 4432. Otherwise (device has been activated), the service controller sends the service plan activation information to the device at 4448. At 4450, the service controller performs the following: updates critical software, initializes service policy and control settings, synchronizes service counters, updates service cost data, applies policy settings, applies CRM rules settings, obtains transaction identity certificate, and sends stored CRM and billing information. At 4452, the service controller is in a device online and activated state.

Figure 22:
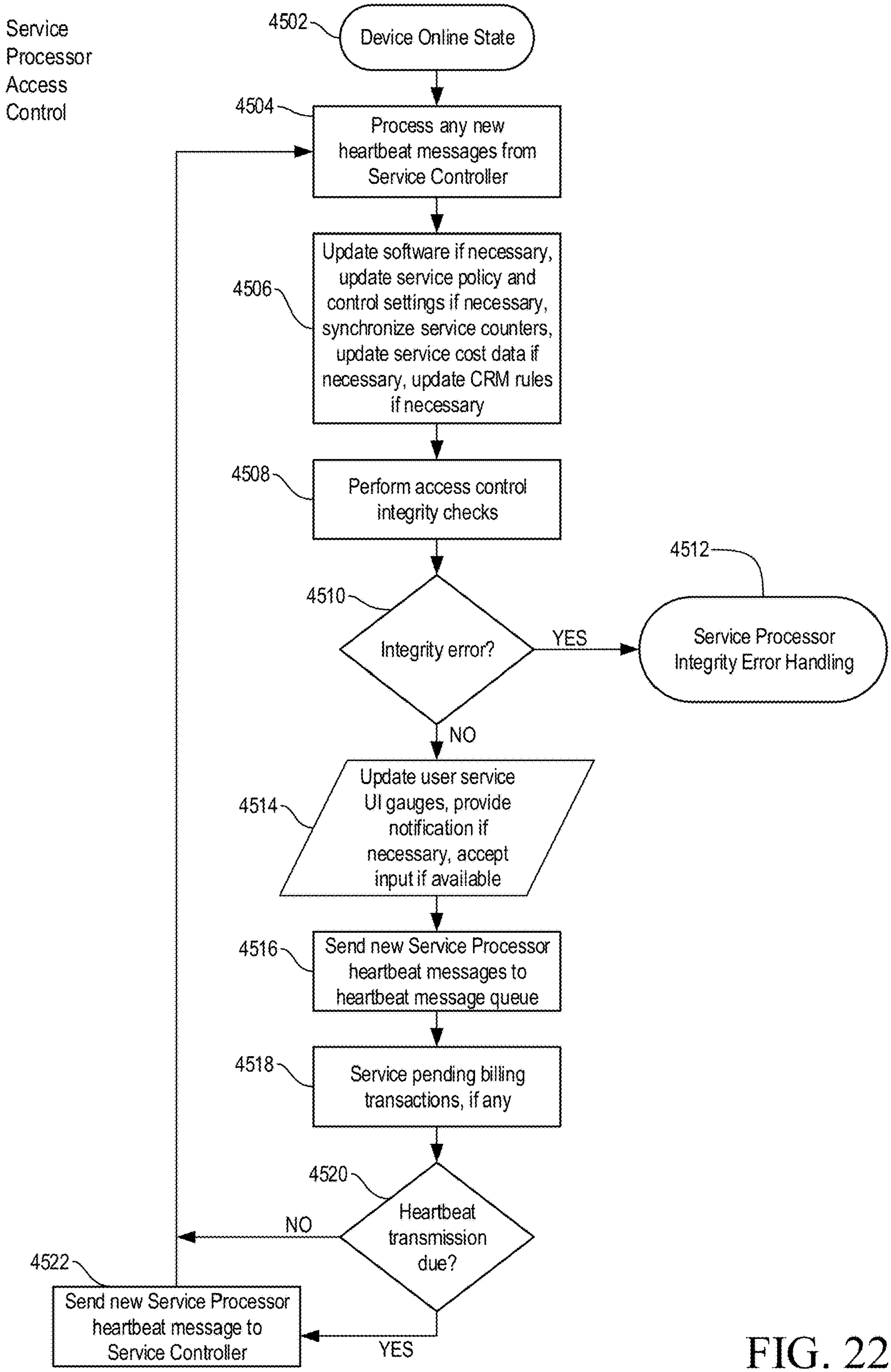
FIG. 22 and FIG. 23 are flow diagrams illustrating a flow diagram for a service processor access control sequence as shown in FIG. 22 and a flow diagram for a service controller access control sequence as shown in FIG. 23 in accordance with some embodiments.
Figure 23:
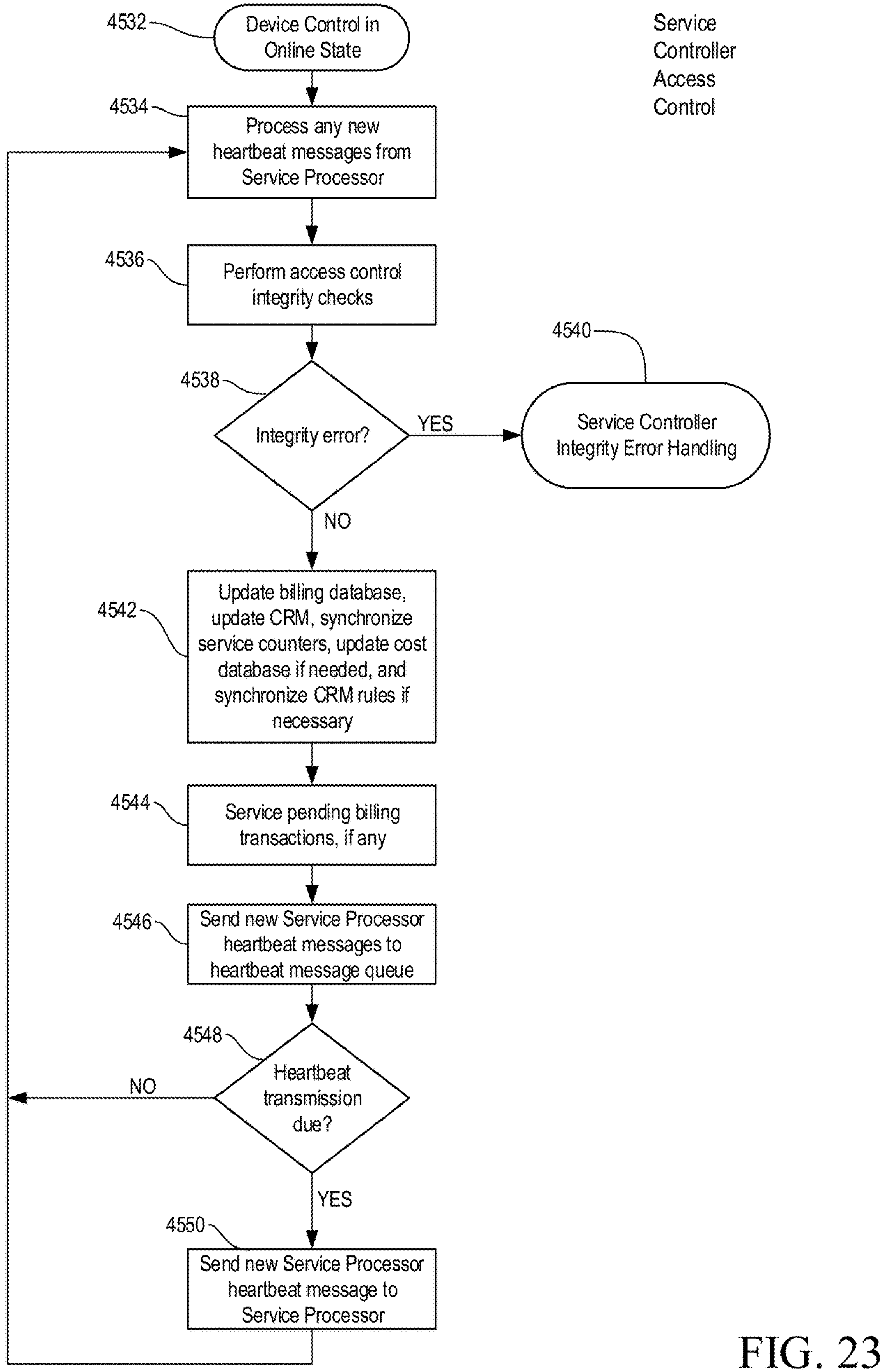

FIGS. 22 through 23 are flow diagrams illustrating a flow diagram for a service processor access control sequence as shown in FIG. 22 and a flow diagram for a service controller access control sequence as shown in FIG. 23 in accordance with some embodiments.

Referring to FIG. 22, at 4502, the device is in an online state. At 4504, the service processor (e.g., service processor 115) of the device processes any new heartbeat messages received from the service controller (e.g., service controller 122). At 4506, the service processor updates software if necessary, updates service policy and control settings if necessary, synchronizes service counters, updates service cost data if necessary, and updates CRM rules if necessary. At 4508, the service processor performs access control integrity checks. At 4510, the service processor determines whether there are any access control integrity errors. If so, then the service processor performs integrity error handling at 4512. Otherwise, the service processor updates user service UI gauges, provides notification if necessary, and accepts input if available at 4514. At 4516, the service processor sends new service processor heartbeat messages to the heartbeat message queue. At 4518, the service processor processes any pending billing transactions. At 4520, the service processor determines if a heartbeat transmission is due, and if not, returns to 4504 for processing any received heartbeat messages. If so, at 4522, the service processor sends the new service processor heartbeat message to the service controller.

Referring to FIG. 23, at 4532, the device is in an online state. At 4534, the service controller (e.g., service controller 122) processes any new heartbeat messages received from the service processor. At 4536, the service controller performs access control integrity checks. At 4538, the service controller determines whether there are any access control integrity errors. If so, then the service controller performs integrity error handling at 4540. At 4542, the service controller updates the billing database, updates the CRM information, synchronizes service counters, updates cost database if needed, and synchronizes CRM rules if necessary. At 4544, the service controller processes any pending billing transactions. At 4546, the service controller sends new service processor heartbeat messages to the heartbeat message queue. At 4548, the service controller determines if a heartbeat transmission is due, and if not, returns to 4534 for processing any received heartbeat messages. If so, at 4550, the service controller sends new service processor heartbeat message to the service processor.

In some embodiments, virtual service provider (VSP) capabilities include making available to a third-party service partner one or more of the following: (1) device group definition, control and security, (2) provisioning definition and execution, (3) ATS activation owner, (4) service profile definitions, (5) activation and ambient service definition, (6)

billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

Figure 24:
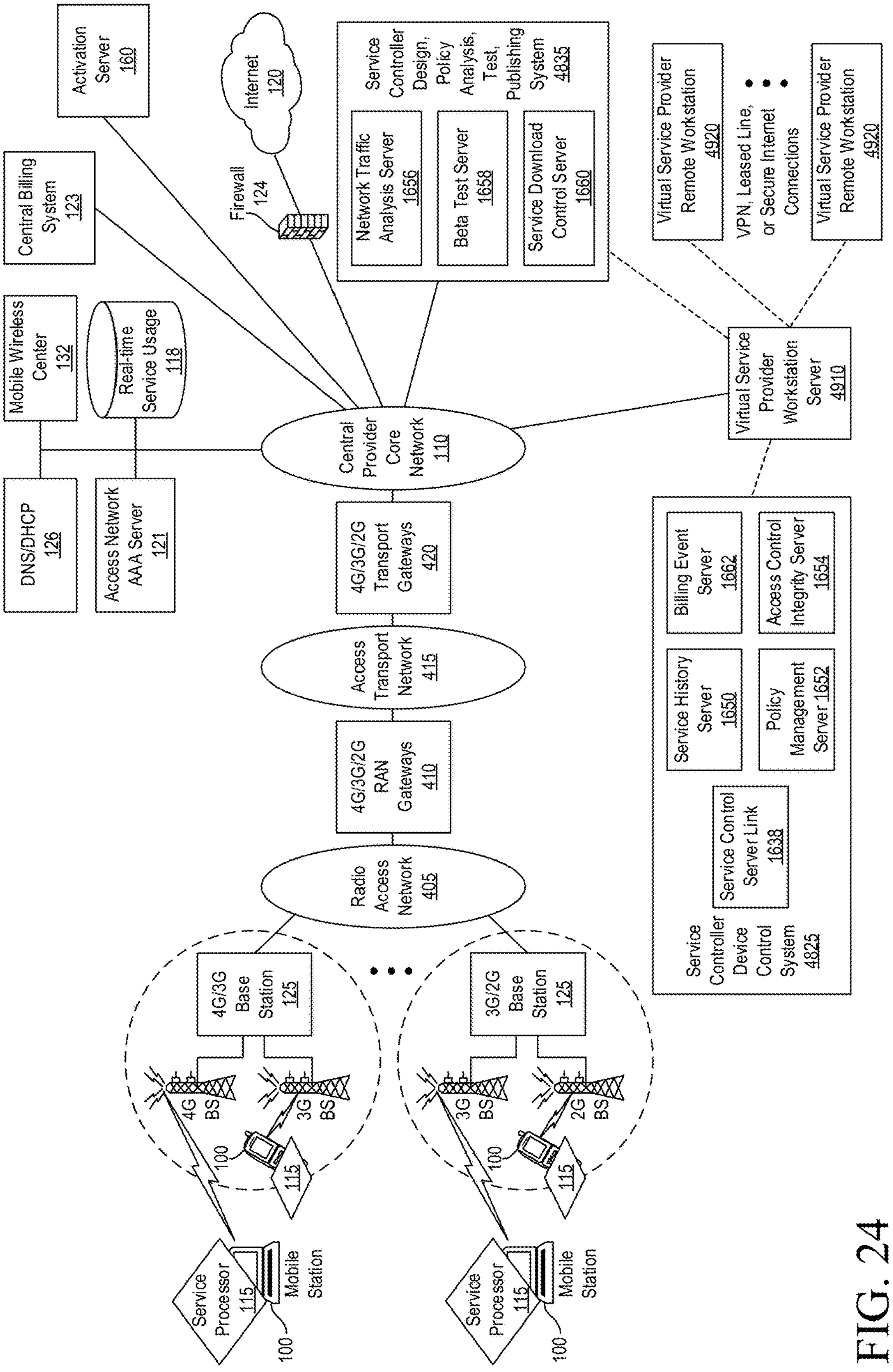
FIG. 24 illustrates a network architecture for an open developer platform for virtual service provider (VSP) partitioning in accordance with some embodiments.

FIG. 24 illustrates a network architecture for an open developer platform for virtual service provider (VSP) partitioning in accordance with some embodiments. As shown, the service controller design, policy analysis, definition, test, publishing system 4835 is configured so that multiple "service group owners" (e.g., the service provider for certain smart phones) or "device group owners" (e.g., eReader devices for the eReader service provider(s)) or "user group owners" (e.g., IT for Company X for their employees' corporate mobile devices), collectively referred to as the "Virtual Service Provider" (VSP), are serviced with the same service controller infrastructure and the same (or substantially similar) service processor design from virtual service provider workstation server 4910 and/or virtual service provider remote workstation(s) 4920. As shown, the virtual service provider remote workstation(s) 4920 communicates with the virtual service provider workstation server 4910 via VPN, leased line or secure Internet connections. The dashed lines shown in FIG. 24 are depicted to represent that, in some embodiments, the virtual service provider workstation server 4910 is networked with the service controller device control system 4825 and/or, in some embodiments, the service controller design, policy analysis, definition, test, publishing system 4835. Based on the discussion herein, it will be apparent to one of ordinary skill in the art that the VSP workstation server 4910 can also be networked in various embodiments with billing system 123, AAA server 121, gateways 410 or 420, or other network components to perform, for example, various network provisioning and activation related functions discussed herein for the device group assigned to one or more VSPs, or for other reasons as will be apparent to a given VSP embodiment.

In some embodiments, the service controller functionality is partitioned for a VSP by setting up one or more secure workstations, secure portals, secure websites, secure remote software terminals and/or other similar techniques to allow the service managers who work for the VSP to analyze, fine tune, control or define the services they decide to publish to one or more groups of devices or groups of users that the VSP "owns." In some embodiments, the VSP "owns" such groups by virtue of a relationship with the central provider in which the VSP is responsible for the service design and profitability. In some embodiments, the central provider receives payment from the VSP for wholesale access services. In some embodiments, the VSP workstations 4910 and 4920 only have access to the service analysis, design, beta testing and publishing functions for the devices or users "owned" by the VSP. In some embodiments, the user or device base serviced by the central provider network is securely partitioned into those owned by the central provider, those owned by the VSP, and those owned by any other VSPs.

In some embodiments, the VSP manages their devices from the VSP workstations 4910 and 4920 using device based service control techniques as described herein. In some embodiments, the VSP manages their devices from the VSP workstations 4910 and 4920 using device assisted and network based service control techniques as described herein. In some embodiments, the VSP manages their devices from the VSP workstations 4910 and 4920 using network based service control techniques (e.g., DPI techniques) as described herein.

For example, this approach is particularly well suited for "open developer programs" offered by the central providers in which the central provider brings in VSPs who offer special value in the devices or service plans, and using this approach, neither the central provider nor the VSP needs to do as much work as would be required to set up a conventional MVNO or MVNE system, which often requires some degree of customization in the network solution, the billing solution or the device solution for each new device application and/or service application that is developed and deployed. In some embodiments, the service customization is simplified by implementing custom policy settings on the service processor and service controller, and the custom device is quickly brought onto the network using the SDK and test/certification process. In some embodiments, the VSP functionality is also offered by an entity other than the central provider. For example, an MVNE entity can develop a wholesale relationship with one or more carriers, use the service controller to create the VSP capabilities, and then offer VSP services for one network or for a group of networks. In some embodiments, the service customization is simplified by implementing custom policy settings through the VSP embodiments on the network equipment, including, in some embodiments, service aware or DPI based network equipment that has a relatively deep level of service activity control capability. For example, using the embodiments described herein, and possibly also including some of the activation and provisioning embodiments, it is possible to efficiently design and implement custom ambient service plans that are different for different types of devices, different OEMs, different VSPs, different distributors, or different user groups all using the same general infrastructure, whether the service control policy implementation is accomplished primarily (or exclusively) with networking equipment (network) based service control, primarily (or exclusively) with device based service control or with a combination of both (e.g., hybrid device and network based service control).

As discussed herein, various VSP embodiments for performing one or more of analyzing traffic usage and defining, managing service profiles or plans, dry lab testing service profiles or plans, beta testing service profiles or plans, fine tuning service profiles or plans, publishing service profiles or plans, or other policy related settings can involve programming settings in the network equipment and/or programming settings or software on the device. For example, as discussed herein, the service processor settings are controlled by the service controller, which can be partitioned to allow groups of devices to be controlled. As another example, equipment in the network involved with network based service control, such as DPI based gateways, routers or switches, can similarly be programmed to utilize various VSP embodiments to implement that portion of the service profile (or service activity usage control) that is controlled by network level functions, and it will be appreciated that substantially all or all of the service activity control for certain embodiments can be accomplished with the network functions instead of the device. Continuing this example, just as the device service processor settings control functions of the service processor can have a group of devices that are partitioned off and placed under the control of a VSP, various VSP control embodiments can partition off a group of devices that have service usage activity controlled by the networking equipment, including, in some embodiments, sophisticated service aware DPI based service control equipment, to achieve similar objectives. It will be appreciated that the discussion herein regarding service controller design, policy analysis, test, publishing 4835, and the discussion regarding device group, user group and other VSP related embodiments, should be understood as applicable to various embodiments described in view of device based services control, control assistance and/or monitoring, or network based services control, control assistance and/or monitoring, or a combination of device based services control, control assistance and/or monitoring and network based services control, control assistance and/or monitoring. The various embodiments described herein related to service activation and provisioning also make apparent how the programming of network equipment service control, service control assistance and/or monitoring can be implemented prior to and following activation of the device. It will also be appreciated that the VSP capabilities described herein can also be applied to those devices that have services controlled by, provided by and/or billed by the central provider, so these techniques can be applied to central provider service embodiments, MVNO embodiments and other embodiments.

Figure 25:
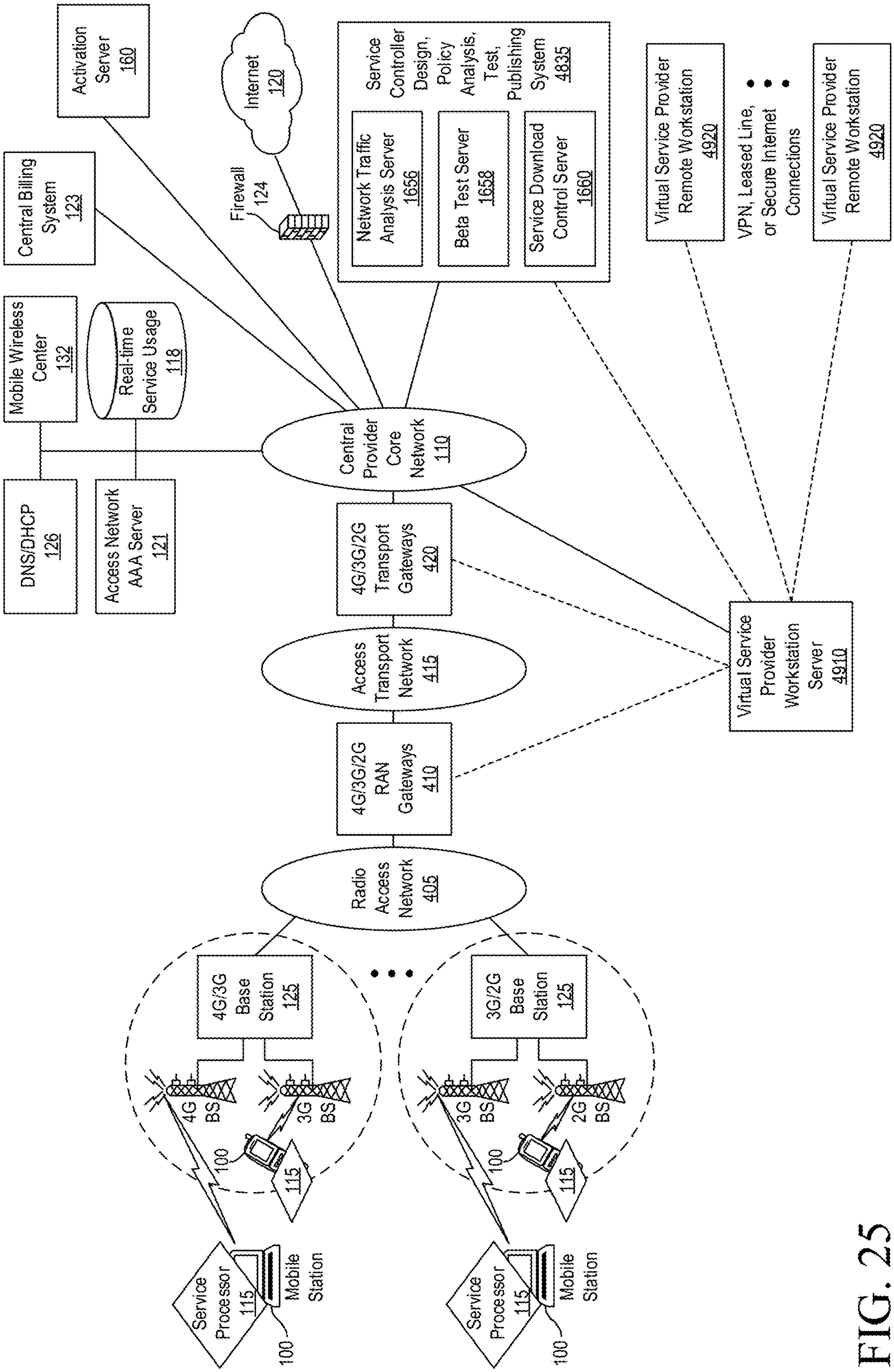
FIG. 25 illustrates a network architecture including the VSP workstation server in communication with the 4G/3G/2G DPI/DPC gateways in accordance with some embodiments.

FIG. 25 illustrates a network architecture including the VSP workstation server 4910 in communication with the 4G/3G/2G DPI/DPC gateways 410 and 420 in accordance with some embodiments. As shown, the VSP workstation server 4910 is in communication with the 4G/3G/2G DPI/DPC gateways 410 and/or 420, the Service Controller Design, Policy Analysis, Test, Publishing System 4835, and/or other networking elements including possibly the central billing system 123, the mobile wireless center 132 (HLR) and/or the AAA server 121 for the purpose of provisioning and/or controlling settings in the 4G/3G/2G DPI/DPC gateways 410 and/or 420, the mobile wireless center 132 and possibly other equipment for the purpose of implementing a portion of the VSP open partner functionality discussed herein. In FIG. 25, the 4G/3G/2G DPI/DPC gateway 5610 functionality as shown in FIG. 346 is implemented in the 4G/3G/2G DPI/DPC RAN gateway 410 and/or the 4G/3G/2G DPI/DPC transport gateway 420 as similarly described above. For example, the VSP functionality can also be used to set higher level policies associated with the 4G/3G/2G DPI/DPC gateway 420 or 410, such as provisioning or activation profiles or policies, ambient service profiles or policies, and/or bill by account service profiles or the other higher level service profile or service plan embodiments discussed herein. In some embodiments, the provisioning and/or activation steps described herein involve setting service policies in the 4G/3G/2G DPI/DPC gateway 420 or 410. In some embodiments, ambient services or ambient activation involve setting up service profiles within the 4G/3G/2G DPI/DPC gateway 420 or 410 that allow the desired activities and block the undesired activities. For example, these settings can be included as part of the open service provider partner programming capabilities of the VSP workstation server 4910 embodiments.

In some embodiments, the application interface agent 1693 provides an interface for device application programs. In some embodiments, the application interface agent 1693 identifies application level traffic, reports virtual service identification tags or appends literal service identification tags to assist service policy implementation, such as access control, traffic shaping QoS control, service type dependent billing or other service control or implementation functions. In some embodiments, the application interface agent 1693 assists with application layer service usage monitoring by, for example, passively inspecting and logging traffic or service characteristics at a point in the software stack between the applications and the standard networking stack application interface, such as the sockets API. In some embodiments, the application interface agent 1693 intercepts traffic between the applications and the standard network stack interface API in order to more deeply inspect the traffic, modify the traffic or shape the traffic (e.g., thereby not requiring any modification of the device networking/communication stack of the device OS). In some embodiments, the application interface agent 1693 implements certain aspects of service policies, such as application level access control, application associated billing, application layer service monitoring or reporting, application layer based traffic shaping, service type dependent billing, or other service control or implementation functions.

In some embodiments, the application interface agent 1693 interacts with application programs to arrange application settings to aid in implementing application level service policy implementation or billing, such as email file transfer options, peer to peer networking file transfer options, media content resolution or compression settings and/or inserting or modifying browser headers. In some embodiments, the application interface agent 1693 intercepts certain application traffic to modify traffic application layer parameters, such as email file transfer options or browser headers. In some embodiments, the application interface agent 1693 transmits or receives a service usage test element to aid in verifying service policy implementation, service monitoring or service billing. In some embodiments, the application interface agent 1693 performs a transaction billing intercept function to aid the billing agent 1695 in transaction billing. In some embodiments, the application interface agent 1693 transmits or receives a billing test element to aid in verifying transaction billing or service billing.

In some embodiments, one or more servers in the set of service control plane servers that reside in the service provider's network, or in a network operator's network, or in any network reachable by a mobile device, assist is providing for service control using one or more APIs. In some embodiments, the APIs provide a direct communication path between the servers and the mobile device. In some embodiments, the APIs provide an indirect communication path between a server and the mobile device, e.g., traversing one or more additional servers in the network of a service provider, network operator or a third-party service partner. In some embodiments, one or more APIs assist in providing for device based service usage reporting, traffic reporting, service policy control and customer resource management. In some embodiments, the activation server 160 illustrated in FIG. 5, assists in providing provisioning of services and activation functions using one or more APIs. In some embodiments, one or more device agents in the mobile device 100 communicate with a service controller, of which the activation server 160 is at least partly contained. In some embodiments, through one or more APIs, the device agents in the mobile device 100 and the activation server in the service controller exchange control plane messages to realize activation functions.

In some embodiments, one or more mobile devices 100 interconnect to network elements managed by a mobile virtual network operator (MVNO) as illustrated in FIG. 6. In some embodiments, device agents in mobile devices 100 communicate through a control plane link to servers in an MVNO network, e.g., MVNO activation server 160, MVNO service controller 122, MVNO content management system 130, and MVNO billing system 123 as illustrated in FIG. 6. In some embodiments, one or more of the servers in the MVNO network communicate with the mobile device 100 through one or more APIs. In some embodiments, one or more of the servers in the MVNO network communicate with servers managed by the central service provider, e.g., with servers managed by a network operator, through one or more APIs. In some embodiments, the MVNO service controller 122 communicates with the central provider service controller 122 through a set of APIs. In some embodiments, the MVNO activation server 160 communicates with the central provider activation server 160 through a set of APIs. In some embodiments, the MVNO content management system 130 communicates with the central provider content management system 130 through a set of APIs. In some embodiments, the MVNO billing system 123 communicates with the central billing system 123 through a set of APIs. In some embodiments, a central provider offers open development services to an MVNO, master value added reseller (MVAR) and/or an original equipment manufacturer (OEM) partner. In some embodiments, communication between one or more transaction provider partner's transaction servers 134, e.g., "open content transaction partner sites" 134 as illustrated in FIG. 6, and central provider network elements and/or MVNO network elements use a set of APIs to provide for third-party transaction billing.

In some embodiments, one or more device agents in a service processor 115 of a mobile device 100 communicate through a control plane communication path with one or more servers of a service controller 122 in a service provider network, e.g., as illustrated by device agents and service controller servers shown in FIG. 4. In some embodiments, the device agents communicate with the servers through a set of APIs. In some embodiments, the set of APIs assists in providing a service notification and billing interface to a user of the mobile device 100. In some embodiments, through a user interface of the mobile device 100 using the set of APIs, service usage notifications, service usage options and billing options from one or more servers in the service controller 122 are presented to the user, and responses from the user are forwarded to one or more servers in the service controller 122. In some embodiments, the user provides input on notification options and service plan options, and one or more device agents, e.g., the billing agent 1695 and/or the policy control agent 1692, are configured appropriately through the service control link 1653 by the service controller 122 using the set of APIs. In some embodiments, service control information is presented to the user of the mobile device 100 through the user interface 101 and responses received from the user through the user interface 101. In some embodiments, at least a portion of the service control information presented and/or a portion of the user responses are communicated by one or more device agents in the service processor 115 of the mobile device 100, e.g., the policy control agent 1692, to one or more servers in the service controller 122 in the service provider network, e.g., the policy management server, using a set of APIs. In some embodiments, service plan information is presented to the user of the mobile device 100 through the user interface 101 and responses received from the user through the user interface 101. In some embodiments, at least a portion of the service plan information presented and/or a portion of the user responses are communicated by one or more device agents in the service processor 115 of the mobile device 100, e.g., policy control agent 192, to one or more servers in the service controller 122 in the service provider network, the policy management server 1652, using a set of APIs. In some embodiments, service usage information is exchanged between device agents in the service processor 115 of the mobile device 100, e.g., the service monitor agent 1696 and/or the billing agent 1695, and servers in the service controller 122 in the service provider network, e.g., the service history server 1650, and/or the billing event server, and/or the network traffic analysis server 1656, through a set of APIs.

In some embodiments, as illustrated in FIG. 4, the service processor 115 in the mobile device 100 includes an application interface agent 1693 that interfaces to one or more applications resident at least in part on the mobile device 100. In some embodiments, the applications communicate with the application interface agent 1693 through a set of APIs. In some embodiments, the applications are provided by a service provider, a network operator, a third-party service partner, a device manufacturer, an original equipment manufacturer, and/or a device supplier. In some embodiments, applications on the mobile device 100 communicate with the application interface agent 1693 and then to servers in the service controller 122 of the service provider's network using one or more APIs. In some embodiments, the APIs assist in providing for communication service management functions between the applications on the mobile device 100 and one or more servers in the service provider's network.

In some embodiments, as illustrated by FIGS. 9 to 17, the mobile device 100 includes one or more device agents that provide and obtain information, e.g., user information & decision queries, user input, application information, service measures, service information, service settings, and configuration information used for communication service management functions. In some embodiments, the one or more device agents communicate this information with network elements, e.g., the service controller 122, using one or more APIs. In some embodiments, one or more applications in the mobile device 100 communicate with device agents, e.g., the application service interface agent, through one or more APIs. In some embodiments, one or more device agents in the mobile device 100 are integrated with one or more communication stacks, e.g., as illustrated in FIGS. 9 to 17. In some embodiments, communication between elements in the communication stacks is realized using one or more APIs. In some embodiments, the APIs used in the communication between elements in the communication stacks use standardized protocols and/or standardized APIs. In some embodiments, the APIs used in the communication between elements in the communication stacks use enhanced versions of standardized protocols and/or standardized APIs to provide for enhanced communication service management and control. In some embodiments, the APIs used in the communication stack are compatible with one or more specifications for APIs to communicate with the service controller 122, or with other network elements, or with third-party service partner systems in order to provide a consistent and uniform user experience for communication service management, as described herein.

In some embodiments, the service processor 115 in the mobile device 100 communicates with the service controller 122 to authorize the mobile device 100 to communicate with a service provider's network. In some embodiments, one or more device agents in the service processor 115 of the mobile device 100 communicate with one or more servers in the service controller 122 of the service provider's network to effect the device authorization. In some embodiments, communication between device agents and servers for device authorization use a set of APIs. In some embodiments, the set of APIs assists in providing information for device authorization, e.g., device credentials and/or access control integrity information, from the mobile device 100 to the service controller 122 in the service provider network. In some embodiments, the set of APIs assists in providing information for device activation from the service controller 122 in the service provider network to device agents in the service processor 115 of the mobile device 100, e.g., service policies, service control information, and/or software updates.

In some embodiments, the service processor 115 in the mobile device 100 communicates with the service controller 122 to activate the mobile device 100 to communicate with a service provider's network. In some embodiments, one or more device agents in the service processor 115 of the mobile device 100 communicate with one or more servers in the service controller 122 of the service provider's network to effect the device activation. In some embodiments, communication between device agents and servers for device activation use a set of APIs. In some embodiments, the set of APIs assists in providing information for device activation from the service controller 122 in the service provider network to device agents in the service processor 115 of the mobile device 100, e.g., service plan options, service billing options, and/or customer relationship management information to present to the user of the mobile device, e.g., through the user interface. In some embodiments, the set of APIs assists in providing information for device activation, e.g., service plan choices, service billing choices, and/or customer relationship management selections, received from the user, e.g., through the user interface of the mobile device 100, to one or more servers of the service controller 122 in the service provider's network.

In some embodiments, the service processor 115 in the mobile device 100 and the service controller 122 in the service provider network exchange heartbeat messages. In some embodiments, the heartbeat messages are exchanged using one or more APIs. In some embodiments, the heartbeat messages assist in providing, using one a set of APIs, service policy information, service control information, service usage information, service cost information, service notifications, and/or customer relationship management information. In some embodiments, at least a portion of information provided in heartbeat messages is displayed through the user interface of the mobile device 100 to the user. In some embodiments, heartbeat messages include information received from the user through the user interface of the mobile device 100, e.g., in response to presented information. In some embodiments, the set of APIs assists in providing for formatting and placement of information on the user interface of the mobile device 100. In some embodiments, one or more device agents in the service processor 115 of the mobile device 100 communicate with one or more servers in the service controller 122 of the service provider's network to exchange the heartbeat messages. In some embodiments, communication between device agents and servers for heartbeat messages use a set of APIs.

In some embodiments, a service provider and/or network operator provides for an open developer platform for a virtual service provider (VSP), e.g., as illustrated in FIG. 24 and FIG. 25. In some embodiments, the VSP is a third-party service partner. In some embodiments, the VSP communicates with servers in the service provider's network through a set of APIs, e.g., provided through VSP workstations 4920 as illustrated in FIG. 24 and FIG. 25. In some embodiments, through the set of APIs, the VSP implements communication service management functions, including one or more of: device group management, service plan definition and management, service provisioning, service control, service activation, service usage monitoring and service accounting/billing/charging. In some embodiments, using one or more APIs, the VSP designs the content and appearance of service plans, service offers, marketing interceptors, notifications, and other service messages provided to the user of the mobile device 100 through the user interface of the mobile device 100. In some embodiments, the VSP functionality is provided by an entity other than a network operator, e.g., an MVNO, an MVNE, an OEM, a device supplier, a device distributor, a sponsor, or a third-party service partner, and the entity can design, control and manage communication services through one or more APIs.

Figure 26:
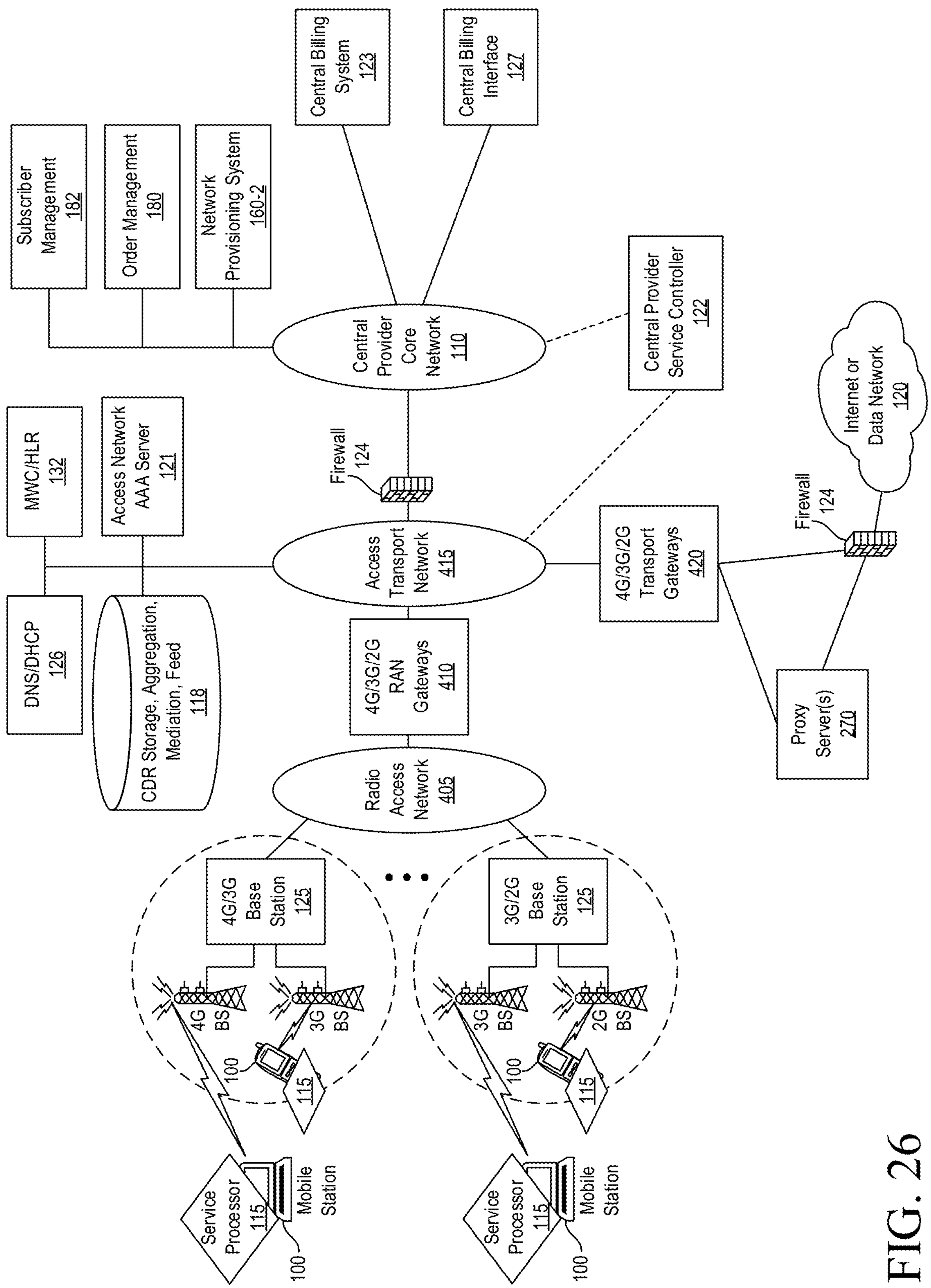
FIG. 26 illustrates a wireless network architecture for providing adaptive ambient service including a proxy server in accordance with some embodiments.

FIG. 26 illustrates a wireless network architecture for providing adaptive ambient service including a proxy server in accordance with some embodiments. As shown, FIG. 26 includes a proxy server 270 in communication with a 4G/3G/2G wireless network operated by, for example, a central provider. In some embodiments, each of the wireless devices 100 includes a service processor 115 (as shown), and each service processor connects through a secure control plane link to a service controller 122. In some embodiments, the network based service usage information (e.g., CDRs) is obtained from Radio Access Network (RAN) gateway(s) 410 and/or transport gateway(s) 420.

Referring now to the 4G/3G/2G access network as shown in FIG. 26, the 4G/3G and 3G/2G base stations/nodes 125 are in communication with a 4G/3G/2G Radio Access Network (RAN) gateway 410 via a radio access network 405, which are in communication with a 4G/3G/2G transport gateway 420 via an access transport network 415. The central provider core network 110 is in network communication with the access transport network 415 (e.g., via a dedicated/leased line, and as shown, via a firewall 124). The Internet 120 is available via a firewall 124 and the transport gateway(s) 420, as shown. Also, as shown, a network apparatus provisioning system 160-2, order management 180, and subscriber management 182 are in communication with the central provider core network 110. As shown, a AAA server 121, a mobile wireless center/Home Location Register (HLR) 132, a DNS/DHCP 126, and CDR storage, aggregation, mediation, feed 118 are also in communication with the access transport network 415. The central billing system 123 and the central billing interface 127 are shown in communication with the central provider core network 110.

In some embodiments, the various techniques for adaptive ambient services are performed using the proxy server 270. For example, the ambient service provider can provide the proxy server 270, and the ambient service provider monitors, accounts, controls, and/or optimizes the service usage through the proxy server 270 (e.g., using the adaptive ambient service profile and/or any of the techniques described herein). In some embodiments, the central service provider provides the proxy server 270, and the ambient service provider is provided access to monitor, account, control, and/or optimize the service usage through the proxy server 270 (e.g., using the adaptive ambient service profile and/or any of the techniques described herein).

In some embodiments, a proxy server or router is used to verify accounting for a given service, for example, an ambient service. In some embodiments, this is accomplished by the device service processor directing the desired service flows to a proxy server or router programmed to handle the desired service flows, with the proxy server or router being programmed to only allow access to valid network destinations allowed by the access control policies for the desired service, and the proxy server or router also being programmed to account for the traffic usage for the desired services. In some embodiments, the proxy service usage accounting may then be used to verify device based service usage accounting reported by the service processor. In some embodiments, the accounting thus reported by the proxy server or router can be used directly to account for service usage, such as ambient service usage or user service plan service usage.

In some embodiments, in which a proxy server is used for device service usage accounting, the proxy server maintains a link to the device service notification UI via a secure communication link, such as the heartbeat device link described herein. For example, the proxy server or router can keep track of device service usage versus service plan usage caps/limits and notify the user device UI through the device communication link (e.g., heartbeat link) between the service controller and the device. In some embodiments, the proxy server/router communicates with a device UI in a variety of ways, such as follows: UI connection through a device link (e.g., heartbeat link), through a device link connected to a service controller (e.g., or other network element with similar function for this purpose), presenting a proxy web page to the device, providing a pop-up page to the device, and/or installing a special portal mini-browser on the device that communicates with the proxy server/router. In some embodiments, the UI connection to the proxy server/router is used as a user notification channel to communicate usage notification information, service plan choices, or any of the multiple services UI embodiments described herein.

In some embodiments for the proxy server/router techniques for implementing service traffic/access controls and/or service charging bucket accounting, it is desirable to have the same information that is available to the service processor on the device, including, for example, application associated with the traffic, network busy state, QoS level, or other information about the service activity that is available at the device. For example, such information can be used to help determine traffic control rules and/or special services credit is due (e.g., ambient services credit). In some embodiments, information available on the device can be communicated to the proxy server/router and associated with traffic flows or service usage activities in a variety of ways. For example, side information can be transmitted to the proxy server/router that associates a traffic flow or service activity flow with information available on the device but not readily available in the traffic flow or service activity flow itself. In some embodiments, such side information may be communicated over a dedicated control channel (e.g., the device control link or heartbeat link), or in a standard network connection that in some embodiments can be secure (e.g., TLS/SSL, or a secure tunnel). In some embodiments, the side information available on the device can be communicated to the proxy server/router via embedded information in data (e.g., header and/or stuffing special fields in the communications packets). In some embodiments, the side information available on the device can be communicated to the proxy server/router by associating a given secure link or tunnel with the side information. In some embodiments, the side information is collected in a device agent or device API agent that monitors traffic flows, collects the side information for those traffic flows, and transmits the information associated with a given flow to a proxy server/router. It will now be apparent to one of ordinary skill in the art that other techniques can be used to communicate side information available on the device to a proxy server/router.

In some embodiments, as illustrated in FIG. 26, a proxy server 270 is provided in a service provider's network. In some embodiments, the proxy server 270 communicates with one or more device agents in the mobile device 100, e.g., through a secure communication link, such as the "heartbeat" link described herein. In some embodiments, the proxy server 270 communicates with the device agents using a set of APIs. In some embodiments, the set of APIs used between the proxy server 270 and one or more device agents in the mobile device 100 assists in providing for service usage monitoring, service control, service notifications, and service plan selection. In some embodiments, information included in messages communicated between the mobile device 100 and the proxy server 270 is presented through the device user interface of the mobile device 100 to the user of the mobile device 100.

In some embodiments, a QoS link is established between a device and an access network equipment element. In some embodiments, the access QoS link is established by direct communication from the device in which the device requests the QoS channel or link from the access network equipment element, or the device requests the QoS channel or link from an intermediate networking device, such as a service controller (e.g., or a readily substituted device with similar features, such as a home agent, an HLR, a mobile switching center, a base station, an access gateway, a AAA system, PCRF, or a billing system). In some embodiments, the device service processor bases the QoS channel or link request on an association the device performs to match a QoS service activity with a desired or required QoS class or QoS traffic control policy set. For example, this association of QoS class or QoS traffic control policy set with QoS service activity can be determined by a predefined policy mapping that is stored on the device and used by the service processor. In some embodiments, this policy mapping store is populated and/or updated by a service controller (e.g., or similar function as described herein). In some embodiments, the mapping is determined by a service controller (e.g., or similar function as described herein) based on a report from the device of the QoS service activity that needs the QoS channel or link.

In some embodiments, the mapping of QoS service activity to a desired level of QoS class or QoS traffic control policies is determined by providing a QoS API in the device service processor that applications use to request a QoS class or QoS channel connection. In some embodiments, an API is provided so that application developers can create application software that uses the standard interface commands to request and set up QoS channels. In some embodiments, the API does one or more of the following: accepts QoS requests from an application, formats the QoS channel request into a protocol appropriate for transmission to network equipment responsible for assessing QoS channel availability (e.g., including possibly the device traffic control system), coordinates with other network elements (e.g., including possibly the device traffic control system) to reserve a QoS channel, coordinates with other network elements (e.g., including possibly the device traffic control system) to provision a QoS channel, informs the application that the desired QoS channel can be created or not, and/or coordinates with other network elements (e.g., including possibly the device traffic control system) to connect the application with the desired QoS channel class. In some embodiments, the QoS API accepts the application QoS request and communicates and possibly coordinates with one or more QoS network equipment elements, such as a base station, cable head end or access point. In some embodiments, the QoS API accepts the QoS request from the application and communicates and possibly coordinates with an intermediate network element, such as a service processor (e.g., or other similar function as described herein). In some embodiments the QoS API assesses the QoS service plan standing for the device or user before sending QoS channel requests to other network elements, and only initiates the QoS request sequence if required service plan authorization is in place. In this manner, the potentially complex process of establishing a QoS channel with all the specific equipment communication protocols that typically need to be supported to assess QoS channel availability and provision the QoS channel are simplified into a limited set of API commands that are easy for an application development community to learn about and use for QoS differentiated services and applications.

In some embodiments, the device is enabled with ambient services that have differentiated QoS services and/or network capacity controlled services as part of the ambient service offering. For example, ambient QoS techniques can be provided using the pre-assigned QoS policies for a given service activity set within the ambient service, or using an ambient service application that requests QoS through the QoS API. Other embodiments for providing QoS differentiated service activities within ambient service offerings will now be apparent to one of ordinary skill in the art. As another example, ambient network capacity controlled service techniques can be provided using the pre-assigned network capacity controlled policies for a given service activity set within the ambient service, monitoring and dynamically assigned techniques, and/or using an ambient service application that uses API or emulated API techniques, and/or other techniques as described herein.

Figure 27:
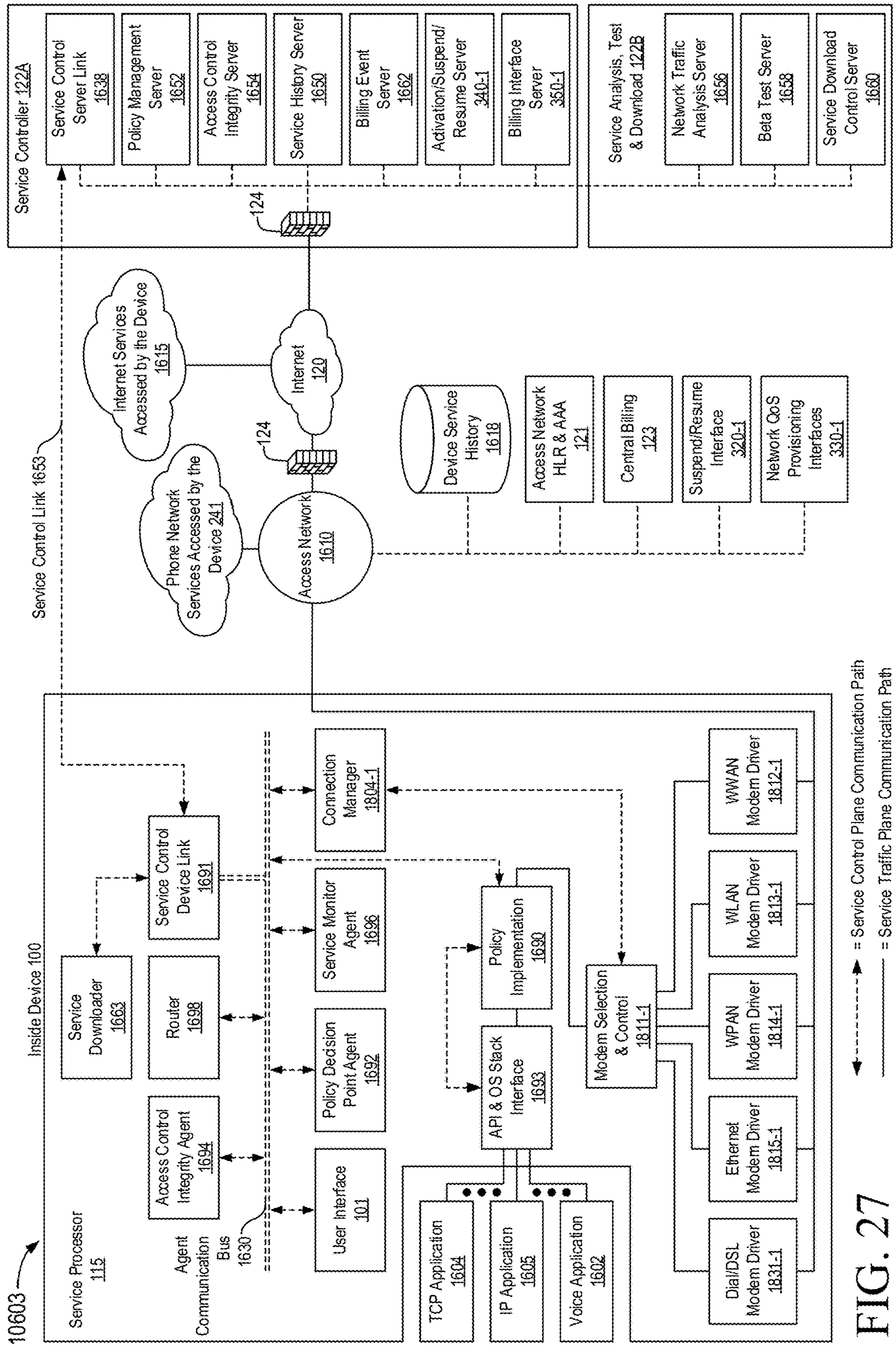
FIG. 27 illustrates a functional diagram of an architecture including a device based service processor and a service controller for providing device assisted services (DAS).

As shown in FIG. 27, service processor 115 includes an API and OS stack interface 1693. In some embodiments, the API and OS stack interface 1693 provides the QoS API functionality as similarly described herein with respect to various embodiments. In some embodiments, a QoS API is used to report back QoS availability to applications. In some embodiments, the API and OS stack interface 1693 provides the network capacity controlled API and/or emulated API functionality as similarly described herein with respect to various embodiments. As shown, service processor 115 also includes a router 1698 (e.g., a QoS router agent/function and/or a network capacity controlled services router agent/function) and a policy decision point (PDP) agent 1692. In some embodiments, the router 1698 provides QoS router functionality as similarly described herein with respect to various embodiments. In some embodiments, the router 1698 provides network capacity controlled services router functionality as similarly described herein with respect to various embodiments. In some embodiments, the QoS router supports multiple QoS channels (e.g., one or more provisioned/allocated QoS links forming a QoS channel between the device and the desired end point, such as an access point/BTS/gateway/network for a single ended QoS channel or other communication device for an end to end QoS channel, depending on the QoS connection/network support/availability/etc.). In some embodiments, the QoS router supports multiple QoS channels, which can each have different QoS classes/levels. In some embodiments, the QoS router routes application/service usage traffic to an appropriate QoS channel. In some embodiments, the QoS router determines the routing/mapping based on, for example, one or more of the following: a QoS API request, a QoS activity map, a user request, a service plan, a service profile, service policy settings, network capacity, service controller or other intermediate QoS network element/function/device, and/or any other criteria/measure, as similarly described herein with respect to various embodiments. In some embodiments, multiple different applications/services are routed to a particular QoS channel using various techniques described herein. In some embodiments, different applications/services are routed to different QoS channels using various techniques described herein. In some embodiments, the QoS router assists in managing and/or optimizing QoS usage for the communications device. In some embodiments, the QoS router assists in managing and/or optimizing QoS usage across multiple communications devices (e.g., based on network capacity for a given cell area/base station or other access point). In some embodiments, PDP agent 1692 provides the PDP agent functionality as similarly described herein with respect to various embodiments. As shown, architecture 10603 also includes a suspend resume interface 320-1, network QoS provisioning interfaces 330-1 (e.g., for providing the various QoS techniques described herein), and an activation/suspend resume server 340-1 and billing interface server 350-1 in the service controller 122A.

Figure 28:
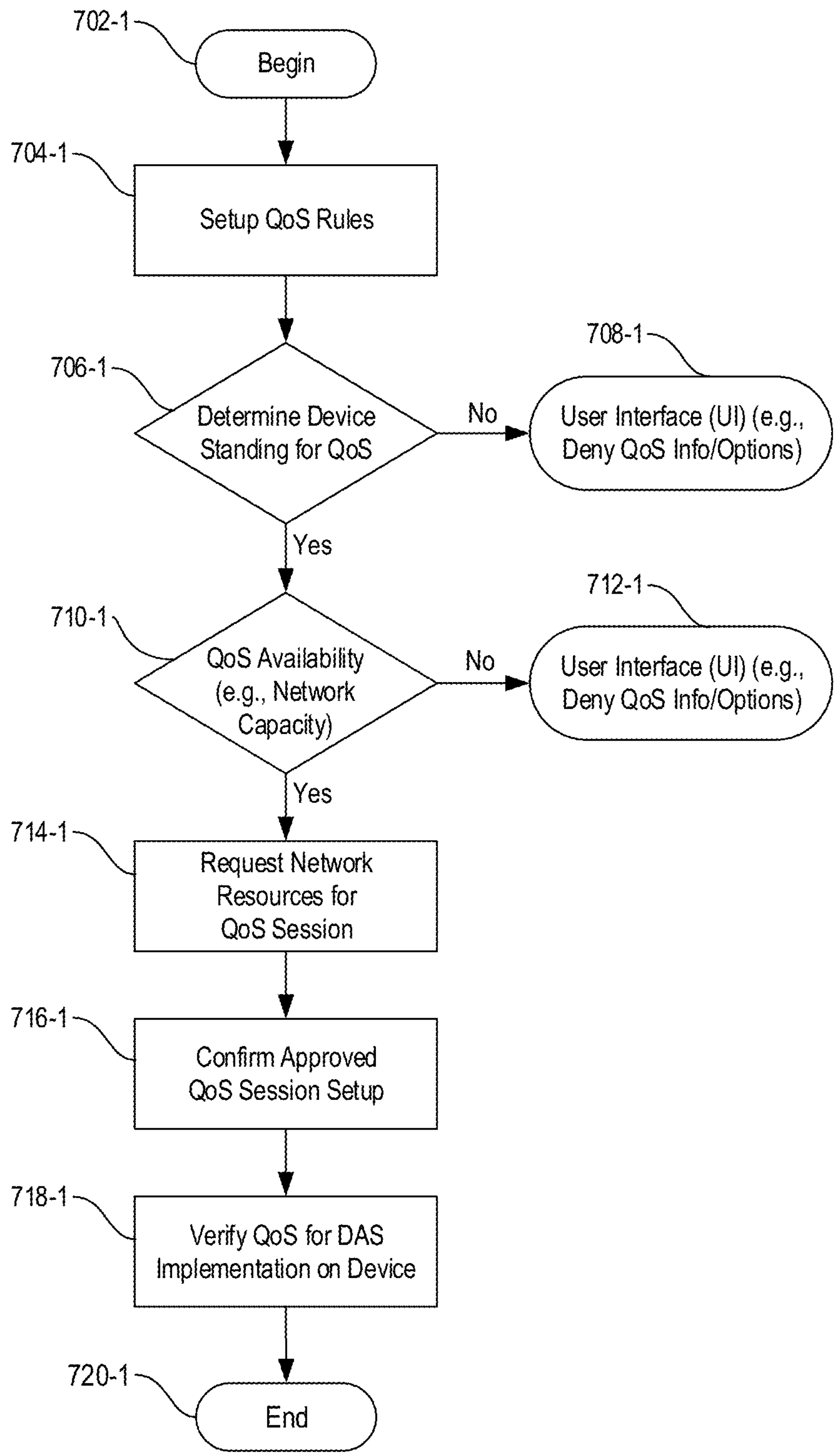
FIG. 28 illustrates a flow diagram for quality of service (QoS) for device assisted services (DAS) in accordance with some embodiments.

FIG. 28 illustrates a flow diagram for quality of service (QoS) for device assisted services (DAS) in accordance with some embodiments. At 702-1, the process begins. At 704-1, QoS rules are received or determined (e.g., a service processor receives or requests the QoS rules, which may be included in service plan, service profile, and/or service policy settings associated with the communications device). In some embodiments, the QoS rules are verified using various techniques as described herein (e.g., periodically updated, replaced, downloaded, obfuscated, and/or tested using by a service controller and/or using other verification techniques). In some embodiments, a QoS API is also used by various applications to initiate a QoS request, as described herein with respect to various embodiments. In some embodiments, the QoS rules are implemented in the form of a QoS activity map in accordance with various embodiments described herein. At 706-1, the communications device's standing for QoS is determined using various techniques described herein (e.g., based on the service plan, service profile, service policy settings, QoS rules, based on QoS class, current service usage, current billing standing, and/or any other criteria/measure). In some embodiments, in addition to verifying the device/user standing for the QoS request, whether the device is following or in compliance with an assigned QoS reservation request policy is also verified using various techniques described herein. If the device is determined to not be eligible for QoS, then at 708-1, the device User Interface (UI) provides information concerning the denial/ineligibility for QoS session(s) (e.g., denial/ineligibility explanation and/or options for providing for one or more QoS options, such as a service plan upgrade or payment for a certain/set of/period of time for QoS session(s) access). If the device is determined to be eligible for QoS, then at 710-1, QoS availability is determined (e.g., based on network capacity, which may be determined at the device, via communication with the service controller, via communication with the BTS, and/or any combination thereof, using the various techniques described herein). If QoS is determined to not be available, then at 712-1, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 714-1, a request for network resources for the QoS session is sent to one or more network resources (e.g., service controller, BTS, gateway, core/transport network, IPX/GRX networks, and/or other network elements/functions/resources). At 716-1, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 718-1, one or more verification techniques are performed to verify the QoS for DAS implementation on the device using various verification techniques described herein (e.g., comparing QoS service usage reports from a network source with the associated device policy; comparing QoS service usage reports from a network source with the QoS service usage reports from the device, and/or using other verification techniques as similarly described herein). At 720-1, the process is completed.

Figure 29:
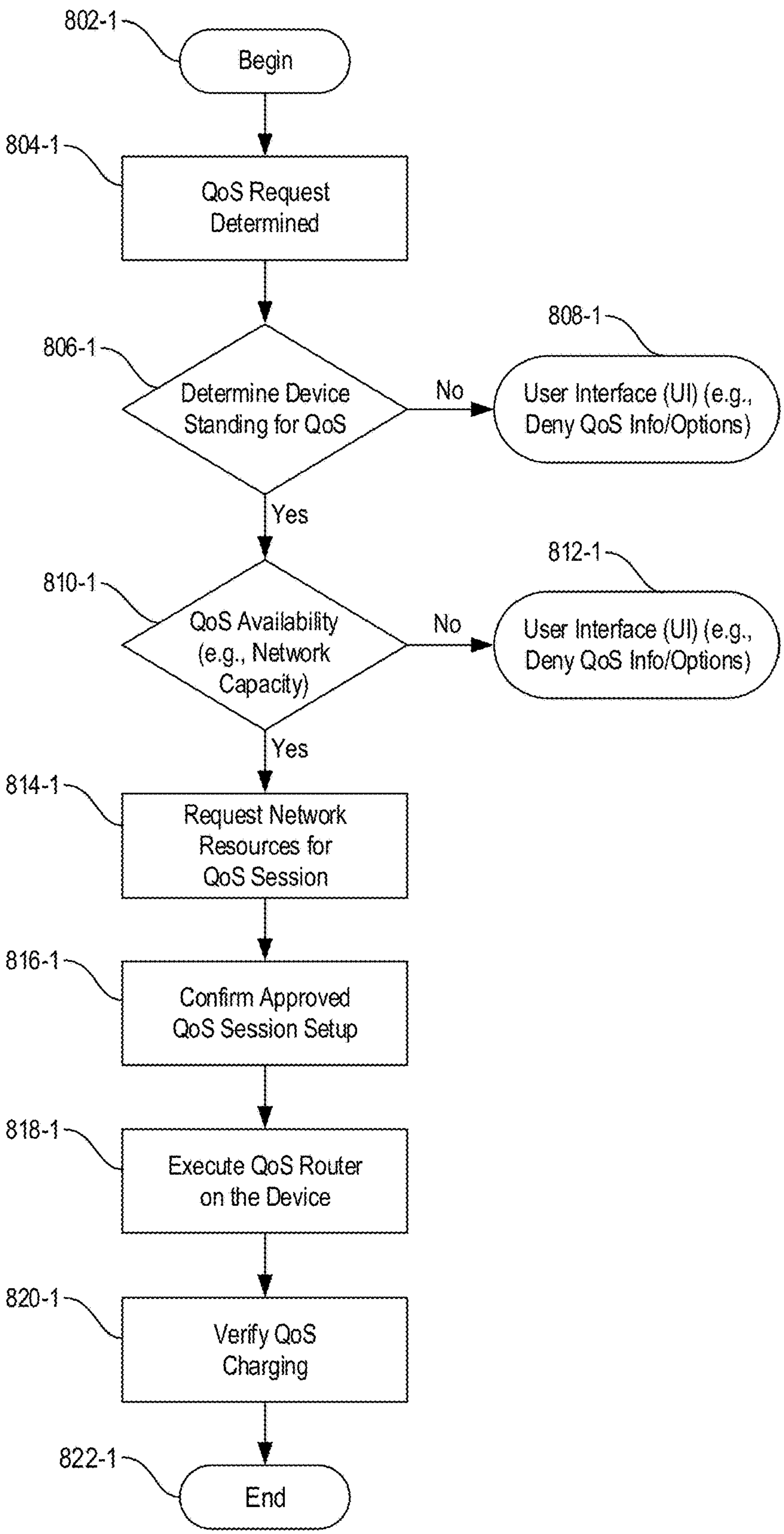
FIG. 29 illustrates another flow diagram for quality of service (QoS) for device assisted services (DAS) in accordance with some embodiments.

FIG. 29 illustrates another flow diagram for quality of service (QoS) for device assisted services (DAS) in accordance with some embodiments. At 802-1, the process begins. In some embodiments, the QoS policies are implemented on the device (e.g., service processor collects/receives an associated service plan that defines/specifies basic policies for QoS, which can include a QoS activity map, which, for example, maps QoS classes based on application, service usage, flow type, destination, time of day, network capacity, and/or other criteria/measures, as similarly described herein). In some embodiments, a QoS API is also used by various applications to initiate a QoS request, as described herein with respect to various embodiments. In some embodiments, the QoS rules are implemented in the form of a verified QoS activity map in accordance with various embodiments described herein. At 804-1, a QoS request is determined (e.g., by QoS class for a particular associated service/application). In some embodiments, the QoS request is determined at least in part by using the QoS activity map using various techniques described herein, for example, based on service/application usage monitoring on the device (e.g., by the service processor service usage monitoring agent). In some embodiments, the QoS request is determined based on the QoS API. In some embodiments, the QoS request is determined to be associated with an outgoing connection or an incoming connection. At 806-1, whether the QoS request is authorized is determined (e.g., whether the QoS request supported by the service plan, sufficient charging credit exists for this QoS request, and/or other criteria/measures). If not, then at 808-1, the UI provides a responsive notification and/or option as similarly described herein. If the QoS request is approved, then at 810-1, a request for network resources for the QoS session is sent to one or more network resources (e.g., service controller, BTS, gateway, core/transport network, IPX/GRX networks, a/another service controller in communication with another communications device such as for setting up a conversational class QoS connection with the other communications device, and/or other network elements/functions/resources). If the device is determined to be eligible for QoS, then at 810-1, QoS availability is determined (e.g., based on network capacity, which may be determined at the device, via communication with the service controller, via communication with the BTS or another network element/function, and/or any combination thereof, using the various techniques described herein). If QoS is determined to not be available, then at 812-1, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 814-1, a request for network resources for the QoS session is sent to one or more network resources (e.g., service controller, BTS, gateway, core/transport network, IPX/GRX networks, and/or other network elements/functions/resources, to setup, for example, a QoS end to end connection—coordinate all resources end to end for the approved and verified QoS flow). At 816-1, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 818-1, a QoS router is executed/performed on the communications device to assist in implementing QoS for DAS using various verification techniques described herein (e.g., to perform QoS queuing, throttling, and/or other QoS router related functions as described herein). At 820-1, verified QoS charging is performed (e.g., at least in part) on the device using various techniques described herein (e.g., using the service processor, such as the charging/service usage monitoring and/or other agents as described herein). In some embodiments, QoS charging records and/or reports are provided to one or more network elements for managing QoS billing and/or other QoS management/billing related service control functions (e.g., to the service controller and/or the billing interface or billing server). In some embodiments, QoS for DAS also facilitates reestablishing the QoS session/connection/channel/stream if the QoS session/connection/channel/stream is lost or goes down, using similar techniques to those described herein as would be apparent to one of ordinary skill in the art. At 822-1, the process is completed. In some embodiments, the QoS provisioning channel is closed when the device session is over to, for example, free up various resources.

Figure 30:
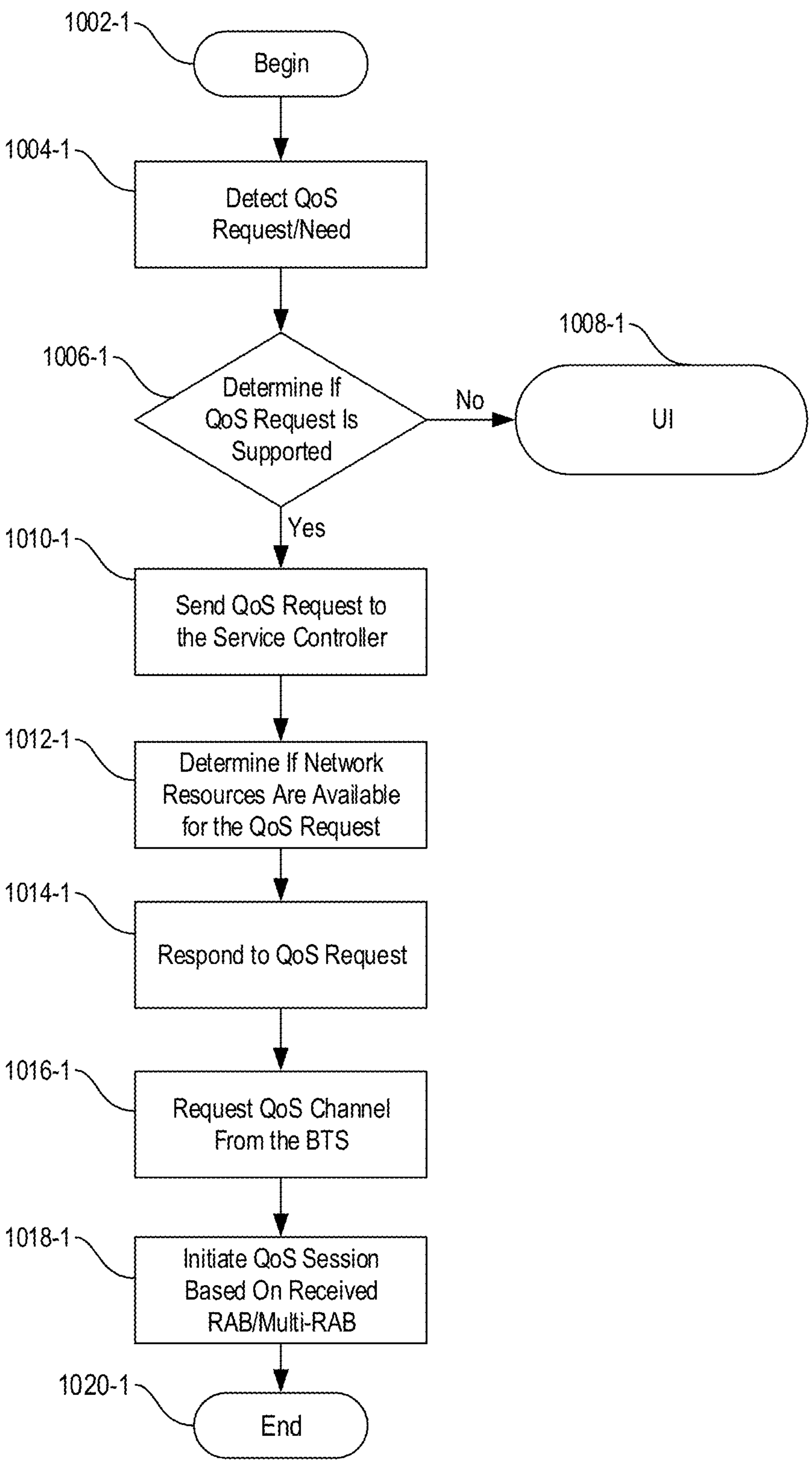
FIG. 30 illustrates another flow diagram for quality of service (QoS) for device assisted services (DAS) in accordance with some embodiments.

FIG. 30 illustrates another flow diagram for quality of service (QoS) for device assisted services (DAS) in accordance with some embodiments. In some embodiments, Radio Access Bearer (RAB) support is available, and the following process is performed in accordance with some embodiments. At 1002-1, the process begins. At 1004-1, the device service processor detects a QoS request or QoS need (e.g., a QoS API request, a QoS request or need/benefit of QoS session based on service usage monitoring, such as by application and/or another service usage measure/activity). At 1006-1, the service processor and/or the service processor in communication with the service controller determines if the service plan allows/supports the requested QoS. If not, then at 1008-1, a UI event is generated (e.g., notifying the device user that such QoS/QoS level/class is not available, and potentially offering a QoS/service plan upgrade/purchase for that QoS/QoS level/class). At 1010-1, the service processor communicates the QoS request to the service controller (e.g., using a secure service control link or secure communication channel, as similarly described herein) to request the QoS level/class. At 1012-1, the service controller determines whether network resources are available using various techniques as described herein. In some embodiments, network capacity is determined using various techniques, such as local device measurements; dedicated local device measurement reports; BTS reports; other network element reports; by assessing, for example, a combination of one or more of available bandwidth, traffic delay or latency, available QoS level, variability in available bandwidth, variability in latency, and/or variability in available QoS level; and/or other techniques as described herein. At 1014-1, the service controller responds to the QoS request (e.g., grants or denies the QoS request). In some embodiments, another UI event is generated if the QoS request is denied as similarly described herein. At 1016-1 (assuming the QoS request is granted), the device requests a QoS channel from the BTS. In some embodiments, the request includes a QoS request authorization code received from the service controller. In some embodiments, the service controller provides a notification of the QoS request approval for the communications device to the BTS, so that the BTS can verify the approval of the QoS request. In some embodiments, the BTS confirms the device QoS channel request directly with the service controller. For example, various other techniques for verifying the QoS channel request can also be used as similarly described herein and as would be apparent to one of ordinary skill in the art. In some embodiments, the device service processor and/or service controller provides QoS related reports informing the BTS of how many QoS channels (e.g., RABs) to provision and how many best effort resources to provision based on device demand projections. At 1018-1 (assuming the QoS channel request is verified), the QoS session is initiated based on an allocated RAB or multi-RAB reservation received from the BTS (e.g., and/or other network elements as similarly described herein). At 1020-1, the process is completed.

Figure 31:
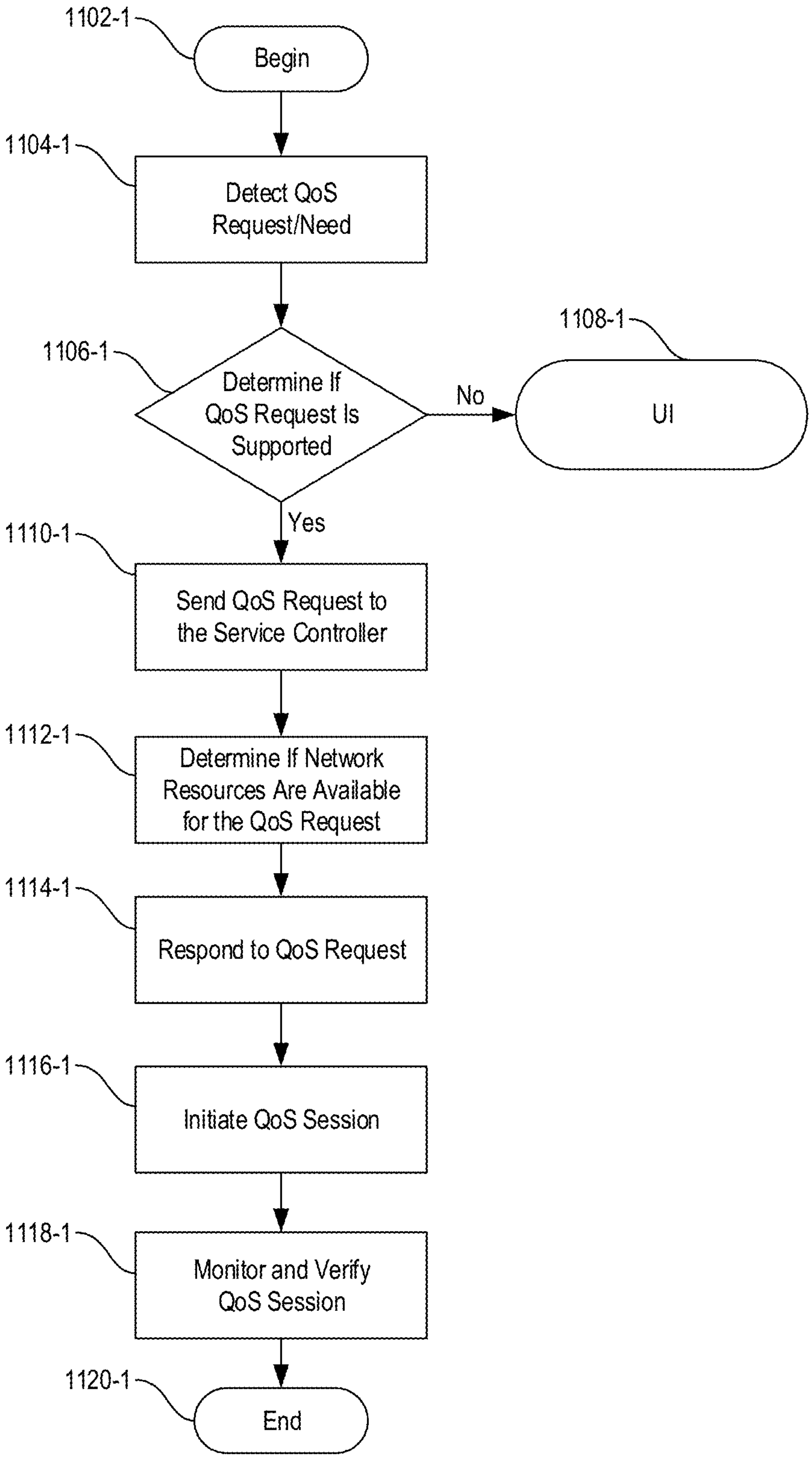
FIG. 31 illustrates another flow diagram for quality of service (QoS) for device assisted services (DAS) in accordance with some embodiments.

FIG. 31 illustrates another flow diagram for quality of service (QoS) for device assisted services (DAS) in accordance with some embodiments. In some embodiments, RAB support is not available, and the following process is performed in accordance with some embodiments. At 1102-1, the process begins. At 1104-1, the device service processor detects a QoS request or QoS need (e.g., a QoS API request, a QoS request or need/benefit of QoS session based on service usage monitoring, such as by application, or other service usage measure/activity). At 1106-1, the service processor and/or the service processor in communication with the service controller determines if the service plan allows/supports the requested QoS. If not, then at 1108-1, a UI event is generated (e.g., notifying the device user that such QoS/QoS level/class is not available, and potentially offering a QoS/service plan upgrade/purchase for that QoS/QoS level/class). At 1110-1, the service processor communicates the QoS request to the service controller (e.g., using a secure service control link or secure communication channel, as similarly described herein) to request the QoS level/class. At 1112-1, the service controller determines whether network resources are available using various techniques as described herein. In some embodiments, network capacity is determined using various techniques, such as local device measurements, BTS reports, other network element reports, and/or other techniques as described herein. In some embodiments, the service controller throttles other devices on the link so that the requested QoS level can be achieved (e.g., as RAB support is not available). In some embodiments, the service controller time slots traffic from the device end in synchronization with a BTS clock or absolute clock to facilitate the requested QoS level and to achieve necessary network capacity to support/facilitate the requested QoS level (e.g., minimizing jitter/inter-packet delay variation) based on current/forecasted network capacity on the link. At 1114-1, the service controller responds to the QoS request (e.g., grants or denies the QoS request). In some embodiments, another UI event is generated if the QoS request is denied as similarly described herein. At 1116-1 (assuming the QoS request is granted), the device initiates the QoS session. At 1118-1, the device service processor and/or the device service processor in secure communication with the service controller monitors and verifies the QoS session using various monitoring and verification techniques described herein (e.g., checks CDRs to determine if the QoS channel is properly implemented by the device). In some embodiments, a UI event is generated to notify the device user if there are potential problems with the QoS session implementation, to periodically inform the user of QoS charging, and/or other events/information related to QoS activities. At 1120-1, the process is completed.

In some embodiments, DAS for protecting network capacity includes classifying a service activity as a network capacity controlled service and implementing a network capacity controlled services policy. In some embodiments, DAS for protecting network capacity includes device assisted/based techniques for classifying a service activity as a network capacity controlled service and/or implementing a network capacity controlled services policy. In some embodiments, DAS for protecting network capacity includes network assisted/based techniques (e.g., implemented on a network element/function, such as a service controller, a DPI gateway, a BTS/BTSC, etc., or a combination of network elements) for classifying a service activity as a network capacity controlled service and/or implementing a network capacity controlled services policy. In some embodiments, DAS for protecting network capacity includes providing a network access API or an emulated or virtual network access API (e.g., such an API can provide network busy state information and/or other criteria/measures and/or provide a mechanism for allowing, denying, delaying, and/or otherwise controlling network access). In some embodiments, DAS for protecting network capacity includes implementing a service plan that includes a network capacity controlled services policy (e.g., for differential network access control and/or differential charging for network capacity controlled services, which can also be based on a network busy state and/or other criteria/measures).

As described above, one or more APIs can be used to assist in providing for and managing communication service with QoS properties. In some embodiments, one or more APIs on a mobile device 100 provide interfaces to applications to facilitate managing communication channels having one or more QoS properties. In some embodiments, one or more APIs assist in providing for requesting, establishing, and controlling communication channels with QoS properties. In some embodiments, one or more APIs assist in providing for setting and managing QoS properties associated with communication resources used for communication services by the mobile device 100. In some embodiments, one or more APIs assist in providing network based information, e.g., network state and/or network service measures and/or other network criteria, that can assist in implementing differentiated service control. In some embodiments the one or more APIs provide the network based information to an application, a device agent, a service processor, the mobile device, a service controller, or a network element to assist in implementing device assisted services, e.g., with differential service control properties. In some embodiments, the APIs described herein can provide interfaces for applications, operating system (OS) components, or networking stack elements to provide and/or to obtain information for managing device assisted services, including services with QoS properties, for the mobile device 100. In some embodiments, one or more APIs described herein are located on the mobile device 100, on a network element, and/or partly on both the mobile device 100 and the network element.

Figure 32:
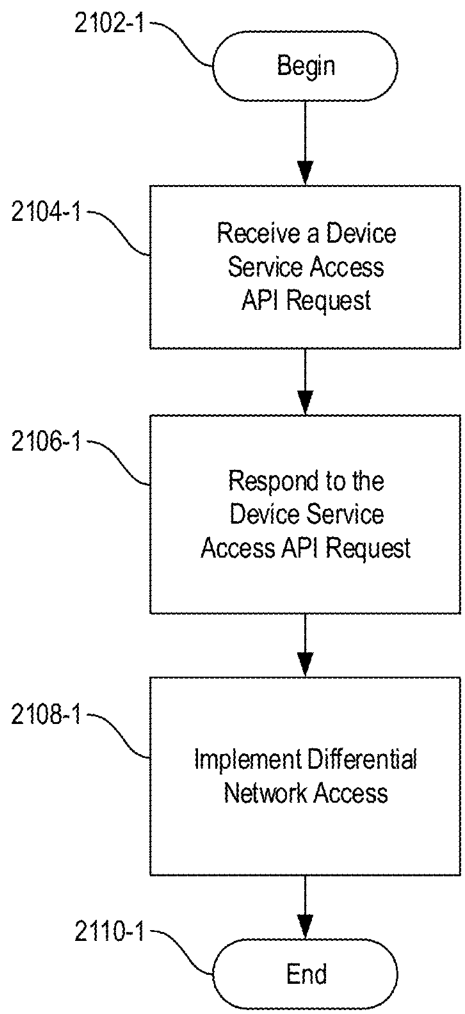
FIG. 32 illustrates another flow diagram for device assisted services (DAS) for protecting network capacity in accordance with some embodiments.

FIG. 32 illustrates another flow diagram for device-assisted services (DAS) for protecting network capacity in accordance with some embodiments. In some embodiments, DAS for protecting network capacity includes providing a device service access API that provides an interface for applications, OS functions, and/or other service usage activities to a network access connection (e.g., or stack) for providing differential network access for protecting network capacity. In some embodiments, the differential network access is determined by one or more of the following: a service priority of the service usage activity and a network busy state. At 2102-1, the process begins. At 2104-1, a device service access API request is received. At 2106-1, the device service access API request is responded to. In some embodiments, the differential network access (e.g., for network capacity controlled services and/or based on network busy state and/or other criteria/measures) is implemented by one or more of the following: providing network busy state information to the service usage activity, receiving network busy state information, receiving network capacity demands for the service usage activity, receiving a scheduled time/time slot demand from the service usage activity, receiving and/or providing network location and/or physical location information (e.g., base station, communication channel, cell sector, roaming or non-roaming network to which the device is connected, and/or GPS or other physical location data), providing information to the service usage activity informing it when it is allowed to access the network, providing information to the service usage activity informing it what traffic controls must be applied/implemented, providing information to the service usage activity informing it when the network is available to it for access, and providing information to the service usage activity of its scheduled access time/time slot (e.g., based on one or more of the following: priority, network busy state, and time of day) (e.g., with a specified performance level or service level, such as data transfer size, speed, network capacity controlled service priority level, QoS level, data transfer type, scheduling time(s), and/or network connection parameters), and instructing the device and/or service usage activity to transition to a different state (e.g., power save state, sleep state dormant, idle, wait state, and/or an awake state). At 2108-1, differential network access is implemented. At 2110-1, the process is completed. In some embodiments, the device service access API is a programmatic interface, a virtual interface, and/or an emulated interface that provides instructions for differential access to a network to protect network capacity, as described herein.

In some embodiments, the API is served or located on the device, on a network element (e.g., using a secure communication between the device and the network element for the API communication, such as HTTPS, TLS, SSL, an encrypted data connection or SS7 control channel, and/or other well known secure communication techniques), and/or both/partly in both. In some embodiments, a network based API is an API that facilitates an API or other interface communication (e.g., secure communication as discussed above) between an application executing on the device and a network element and/or service cloud for protecting network capacity. For example, a network API can provide an interface for an application to communicate with a service cloud (e.g., network server) for obtaining network access control information (e.g., network busy state, multiple network information based on available networks and/or network busy state information of available networks, network capacity controlled service priorities and availability, scheduled time/time slots for network access based on network busy state, service plan, network capacity controlled service, and/or other criteria/measures). As another example, a network API can facilitate an application provider, central network/service provider, and/or a third party with access to communicate with the application to provide and/or request information (e.g., physical location of the application, network location of the application, network service usage information for the application, network busy state information provided to the application, and/or other criteria/measures). As yet another example, a network API can facilitate a broadcast to one or more applications, OS functions, and/or devices (e.g., partitioned based on geography, network, application, OS function, and/or any other criteria/measure) with network capacity related information (e.g., network busy state, availability based on network capacity controlled service classification and/or priority level, scheduled time/time slots for certain network capacity controlled service classification and/or priority level, emergency/high priority software/anti-malware/vulnerability update and scheduled time/time slots for such software updates, and/or other criteria/measures). In some embodiments, the network access API for protecting network capacity is an open API or standard/required API (e.g., required or standardized for applications for a certain network service provider, such as to be provided via the Verizon application store or the Apple AppStore) published for application and OS developers so that the applications and OS functions are designed to understand and implement the network access API for protecting network capacity. For example, a certification program can be established to provide application and OS developers with test specifications, working implementations, and/or criteria to make sure the network access API is properly implemented and is functioning in accordance with the specified requirements. In some embodiments, the network access API is an interface for communication with a service controller (e.g., service controller 122) or another network element/function (e.g., a service usage API for communication with a service usage server or billing interface/server or another network element/function that facilitates a secure communication for sending/receiving or otherwise communicating network access related information for protecting network capacity). In some embodiments, the network API provides for sponsored billing (e.g., reverse billing) of all, classified, and/or a subset of network service usage charges to a sponsored partner associated with the network service usage activity (e.g., application) that accesses the network API. In some embodiments, the network API provides for a sponsored service in which the network service usage activity (e.g., application) that accesses the network API provides a sponsored service partner credential to the network API, the credential is used as a billing mechanism to charge the sponsored partner, the user account is mediated to remove the sponsored partner charge, and the network API provides access service and/or information service (e.g., location information, local information, content information, network information, and/or any other information).

In some embodiments, implementing traffic control for network capacity controlled services is provided using various techniques. In some embodiments, the device includes a service processor agent or function to intercept, block, modify, remove or replace UI messages, notifications or other UI communications generated by a network service activity that whose network service usage is being controlled or managed (e.g., using various measurement points as shown in and described with respect to FIG. 9 and FIG. 10). For example, this technique can be used to provide for an improved user experience (e.g., to prevent an application that is being controlled for protecting network capacity from generating repeated and/or confusing messages/alerts to the user). In some embodiments, a network stack interface of the device is replaced or modified to provide for intercept or discontinuance of network socket interface messages to applications or OS functions or other functions/software.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/other such messages). As another example, an emulated network API can modify, swap, and/or inject network socket application interface messages (socket( ), connect( ), read( ), write( ), close( ), and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

In some embodiments, implementing traffic control for network capacity controlled services using DAS techniques is provided using various techniques in which the network service usage activity is aware of network capacity control (e.g., the network service usage activity supports an API or other interface for implementing network capacity control). For example, a network access API as described herein can be used to implement traffic control for network capacity controlled services. In some embodiments, the API facilitates communication of one or more of the following: network access conditions, network busy state or network availability state of one or more networks or alternative networks, one or more network capacity controlled service policies (e.g., the network service can be of a current network access setting, such as allow/block, throttle, queue, scheduled time/time slot, and/or defer, which can be based on, for example, a current network, a current network busy state, a time based criteria, a service plan, a network service classification, and/or other criteria/measures), a network access request from a network service activity, a query/polled request to a network service activity, a network access grant to a network service activity (e.g., including a priority setting and/or network capacity controlled service classification, a scheduled time/time slot, an alternative network, and/or other criteria/measures), a network busy state or a network availability state or a network QoS state.

In some embodiments, implementing traffic control for network capacity controlled services using network assisted/based techniques is provided using various techniques in which the network service usage activity is unaware of network capacity control (e.g., does not support an API or other interface for implementing network capacity control). In some embodiments, DPI based techniques are used to control network capacity controlled services (e.g., to block or throttle network capacity controlled services at a DPI gateway).

In some embodiments, implementing traffic control for network capacity controlled services using network assisted/based techniques is provided using various techniques in which the network service usage activity is aware of network capacity control (e.g., does support an API or other interface for implementing network capacity control). In some embodiments, the application/messaging layer (e.g., a network API as described herein) is used to communicate with a network service activity to provide associated network capacity controlled service classifications and/or priorities, network busy state information or network availability of one or more networks or alternative networks, a network access request and response, and/other criteria/measures as similarly described herein.

In some embodiments, one or more device APIs and/or network APIs can assist in communicating information between servers (e.g., as part of the service controller 122) in a network of a service provider, network operator, MVNO, or third-party service partner and one or more device agents in the service processor 115 of the mobile device 100. In some embodiments, one or more APIs assist in communicating information for applications and/or operating system functions of the mobile device 100. In some embodiments, one or more APIs assist in communication information for service plan selection, service control, service usage monitoring, network availability, network capacity, network service measures, service billing, device credentials, service partner credentials, and/or location information that can be used by one or more servers of a service controller 122, by a proxy server 270, by servers maintained by a third-party service partner, by device agents in a service processor 115 of the mobile device 100, by applications and/or by operating system components in the mobile device 100. In some embodiments, one or more device APIs and/or network APIs can assist in communication information between network elements, or between network elements an mobile devices, or between network elements and third-party service management systems in order to provide for device assisted services as described herein. In some embodiments, one or APIs assist in providing for QoS services, for differentially controlled services, and/or for network managed services.

Figure 33:
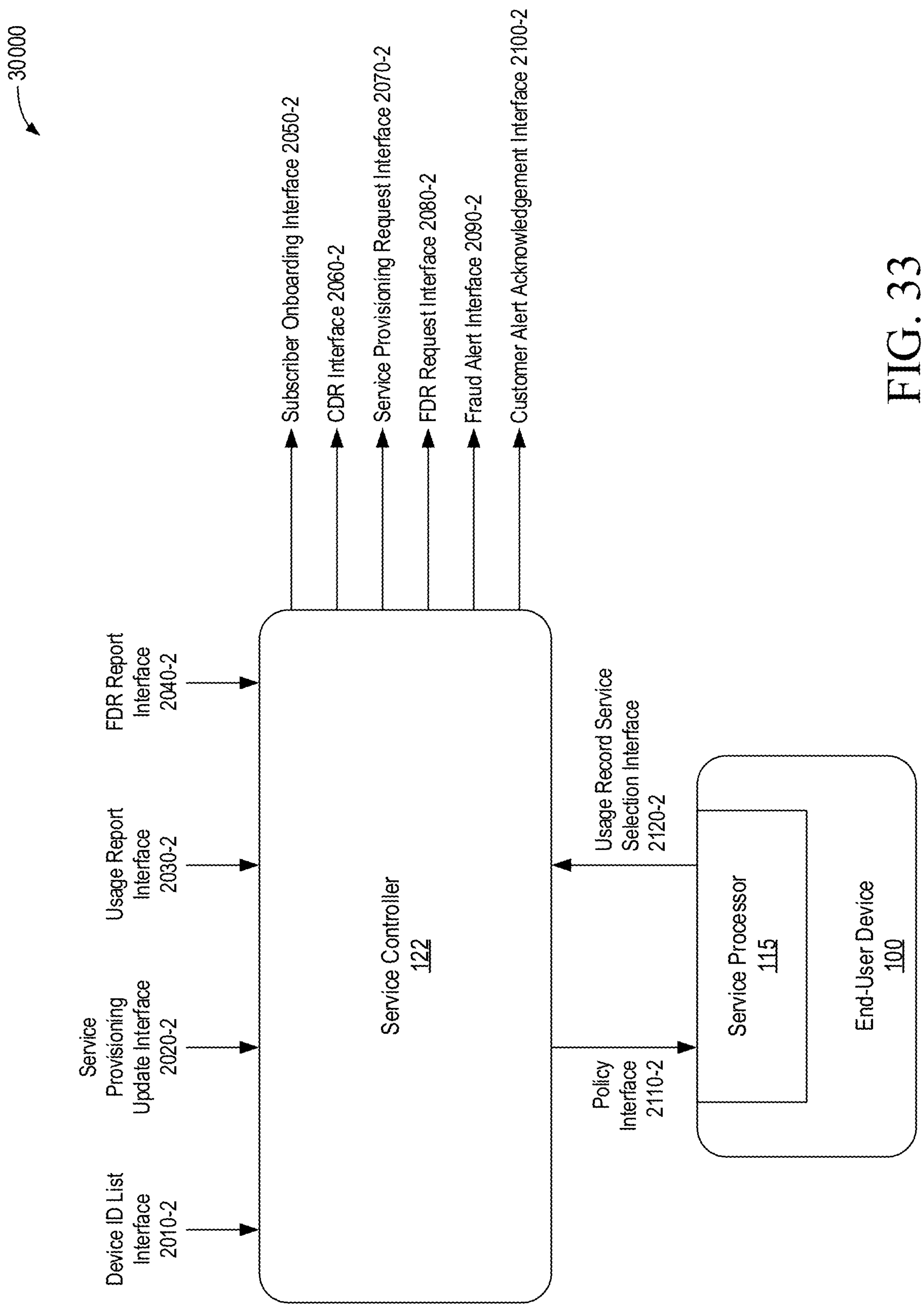
FIG. 33 illustrates example service controller interfaces in accordance with some embodiments.

FIG. 33 illustrates a diagram 30000 of examples of service controller interfaces that may be used to facilitate communications to and from service controller 122. As shown in FIG. 33, end-user device 100 is equipped with service processor 115 and is capable of supporting device-assisted services.

Some interfaces shown in FIG. 33 allow service controller 122 to receive information. Examples include device identification list interface 2010-2, service provisioning updates interface 2020-2, usage report interface 2030-2, and flow data record (FDR) report interface 2040-2. Other interfaces shown in FIG. 33 allow service controller 122 to deliver information or make requests. For example, these interfaces may include one or more of subscriber onboarding interface 2050-2, carrier data record (CDR) interface 2060-2, service provisioning request interface 2070-2, FDR request interface 2080-2, fraud alert interface 2090-2, and customer alert acknowledgment interface 2100-2.

As illustrated in FIG. 33, service controller 122 also has various interfaces that allow it to communicate with end-user device 100. For example, policy interface 2110-2 (or service control device link 1691, service control server link 1638, or other another interface) allows service controller 122 to send a policy or other information to service processor 115. As another example, usage record service selection interface 2120-2 allows service controller 122 to receive usage data records from end-user device 100.

As would be appreciated by a person having ordinary skill in the art, the interfaces shown in FIG. 33 are conceptual and exemplary. The interfaces illustrated in FIG. 33 are not necessarily an exhaustive or complete set of interfaces. The interfaces illustrated in FIG. 33 do not necessarily correspond to different physical interfaces. The physical interfaces may be unidirectional or bidirectional. Moreover, a single physical interface may support more than one of the interfaces shown in FIG. 33.

Possible uses of the exemplary interfaces shown in FIG. 33 are now described in more detail.

Uniform Interfaces for On-Device Service Selection

On-device user selection or purchase of a network service plan offered to an end user through a device user interface agent (e.g., a service processor client software or firmware agent configured with a service plan selection user interface function) can be difficult to implement because different wireless service provider networks often have different service plan provisioning systems or different service plan activation systems. This circumstance can make it difficult to create a consistent user experience for selecting or purchasing a service plan on a device because different carrier networks can have different service plan selection or purchase processes. This can also make it difficult to develop a consistent device service selection or purchase user interface agent (e.g., a service processor software or firmware agent that supports on-device service plan selection or purchase via an end-user device user interface) because differences between wireless networks can cause differences in service plan selection or purchase interfaces to the network, which in turn cause differences in the required end-user device agent (e.g., service processor) design or service selection interface. It is therefore desirable to create a uniform wireless network service selection information exchange interface system.

An example service selection/provisioning workflow for network-based service policy control and an on-device user interface with service plan selection or service plan purchase capability is now described using the embodiment illustrated in FIG. 33. A user of end-user device 100 initiates a device activity that triggers a service plan options notice informing the end user that one or more service plan options are available to the end user for service plan selection or service plan purchase. The end user elects to view the service plan options. Service processor 115 on end-user device 100 sends the service selection information request to service controller 122. The service selection information request includes information about end-user device 100, including, in some embodiments, device credentials. After receiving the service selection information request via usage record service selection interface 2120-2, service controller 122 sends a message requesting information about available service plans to the network over service provisioning request interface 2070-2. Service controller 122 then receives from the network, through service provisioning update interface 2020-2, an update for the available service plans associated with end-user device 100 (e.g., the service plans available for the device group or user group that includes device credentials for end-user device 100). Based on the update of the available service plans, service controller 122 generates a service plan offer set for end-user device 100. Service controller 122 sends the service plan offer set to service processor 115 via policy interface 2110-2 (or service control device link 1691, service control server link 1638, or another interface). Service processor 115 displays the service plan offer set to the end user via a user interface (not shown) on end-user device 100. The end user selects one or more service plans, and service processor 115 transmits the service selection to service controller 122. After receiving the service selection via usage record service selection interface 2120-2, service controller 122 sends a service selection message to the network over service provisioning request interface 2070-2. A network provisioning system then provisions or activates the selected service plan (possibly in conjunction with billing system 123, subscriber management 182, or order management 180) and sends service controller 122 a service plan activation confirmation through service provisioning update interface 2020-2. Service controller 122 then sends service processor 115 a service plan confirmation that is in turn presented to the user through a user interface on the end-user device 100.

In some embodiments, a uniform wireless network service selection interface system comprises a uniform service plan selection, service plan activation, or service plan purchase information exchange that facilitates communication of user service plan selection options or user service plan selection choices between an end-user device interface agent capable of displaying service options to a user and accepting service selections from the device user (e.g., using a service processor) and one or more network elements that facilitate service plan provisioning, service plan activation, or service plan purchase (e.g., network provisioning system 160-2, billing system 123, subscriber management 182, or order management 180).

In some embodiments, a uniform wireless network service selection interface system comprises uniform service provisioning update interface 2020-2. In some embodiments, the uniform wireless network service selection interface system includes a service controller that implements service provisioning update interface 2020-2. In some embodiments, a service controller includes a service provisioning update interface 2020-2 that comprises a uniform service plan selection, service plan activation, or service plan purchase information exchange for communication of user service plan selection options between a wireless network element (e.g., network provisioning system 160-2, billing system 123, subscriber management 182, or order management 180) and the service controller. In some embodiments service provisioning update interface 2020-2 comprises a uniform service plan selection, service plan activation, or service plan purchase information exchange for communication of user service plan selection options between a wireless network element (e.g., network provisioning system 160-2, billing system 123, subscriber management 182, or order management 180) and a service controller in a manner that maintains a consistent interface for multiple wireless networks. In some embodiments, the service controller service plan information exchange protocols used in service provisioning update interface 2020-2 are used to communicate with a common service selection information exchange protocol across multiple wireless networks. In some embodiments, a service controller implements a uniform service plan selection exchange protocol for service plan selection communication with a device service processor, wherein the uniform service plan selection exchange protocol is consistent across multiple wireless networks. In this way, service controller 122 can provide a uniform translation function that allows an on-device service selection agent (e.g., service processor 115) to interface with the network in a consistent manner to provide a consistent user experience with multiple wireless networks that may have different service plan activation or service plan purchase processes.

In some embodiments, implementing service provisioning update interface 2020-2 comprises implementing a uniform information exchange protocol in a service controller, wherein the formatting of service plan selection option information or service plan purchase option information is defined in the protocol. In some embodiments, the predefined protocol employed in service provisioning update interface 2020 for service plan selection option information or service plan purchase option information communicates one or more service plan selection options or one or more service plan purchase options from a wireless network element (e.g., network provisioning system 160-2, billing system 123, subscriber management 182, or order management 180) to a service controller.

In some embodiments a service controller communicates the service plan selection options or service plan purchase options to an end-user device service selection user interface function (e.g., using a service processor configured to communicate with a service selection user interface). In some embodiments, service controller 122 translates the service plan selection option or service plan purchase option so that it is compatible with a uniform service plan selection information exchange protocol used between service controller 122 and service processor 115. In some embodiments, service controller 122 communicates the service plan selection options or service plan purchase options to a service processor 115 (e.g., on end-user device 100, which is also configured with a service selection user interface) via policy interface 2110-2 (or service control device link 1691, service control server link 1638, or another interface). In some embodiments, policy interface 2110-2 comprises a uniform service plan selection, service plan activation, or service plan purchase information exchange configured to communicate user service plan selection options or service plan purchase options between service controller 122 and service processor 115. In some embodiments, service controller 122 communicates the service plan selection options or service plan purchase options to service processor 115 via a uniform service plan selection, service plan activation, or service plan purchase information exchange, such as policy interface 2110-2 (or service control device link 1691, service control server link 1638, or another interface), that maintains consistent protocols across multiple wireless networks. In this manner, a network element such as service controller 122 can provide a consistent interface across one or multiple networks to allow device agents or device applications to receive service plan selection options or service plan purchase options for display to an end-user device user interface.

In some embodiments, service processor 115 has a user interface that is capable of presenting one or more service plan selection options or service plan purchase options to the end user so that the end user may select a service plan. In some embodiments, the user then selects one of the service plan selection options via the service processor 115 user interface, and service processor 115 communicates the user selection to service controller 122. In some embodiments, service processor 115 communicates a service plan selection via usage record service selection interface 2120-2. In some embodiments usage record service selection interface 2120-2 comprises a uniform service plan selection, service plan activation, or service plan purchase information exchange for communication of user service plan selection information between service processor 115 and service controller 122. In some embodiments, the uniform service plan information exchange interface provided to service processor 115 by service controller 122, such as the usage record service selection interface 2120-2, is consistent across multiple wireless networks so that the service processor 115 service plan selection interface and the device service plan selection user experience are consistent for multiple carrier networks. In this manner, a network element such as service controller 122 can provide a consistent interface across one or multiple networks to enable device agents or device applications to transmit device user service plan selections or service plan purchases to the network elements responsible for provisioning or activating device service plans.

In some embodiments, service controller 122 communicates the user service plan selection to the network elements responsible for provisioning or activating the service plan (e.g., network provisioning system 160-2, billing system 123, subscriber management 182, or order management 180) via subscriber onboarding interface 2050-2. In some embodiments, subscriber onboarding interface 2050 comprises a uniform service plan selection, service plan activation, or service plan purchase information exchange for communication of user service selections between a wireless network element (e.g., network provisioning system 160-2, billing system 123, subscriber management 182, or order management 180) and service controller 122. In some embodiments, subscriber onboarding interface 2050-2 comprises a uniform service plan selection, service plan activation, or service plan purchase information exchange for communication of device user service plan selections between a wireless network element and service controller 122 that is consistent across multiple carrier networks. In this way, service controller 122 can provide a uniform translation function that allows an on-device service selection agent (e.g., service processor 115) to interface with the network in a consistent manner to provide a consistent user experience with multiple wireless networks that may have different service plan activation or service plan purchase processes. Another example service selection/provisioning workflow for device-assisted service policy control and an on-device user interface with service plan selection or service plan purchase capability is now described using the embodiment illustrated in FIG. 33. A user of end-user device 100 selects one or more services for purchase using end-user device 100. For example, the user may respond to a service offer presented through a user interface of end-user device 100. Service processor 115 on end-user device 100 sends the service selection to service controller 122. After receiving the service selection via usage record service selection interface 2120-2, service controller 122 sends a message to the network over service provisioning request interface 2070-2. Service controller 122 then receives from the network, through service provisioning update interface 2020-2, an update for the service plan associated with end-user device 100. Based on the update for the service plan, service controller 122 generates a policy set for end-user device 100. Service controller 122 sends the policy set to service processor 115 via policy interface 2110-2 (or service control device link 1691, service control server link 1638, or another interface). Service processor 115 applies the policy set so that end-user device 100 operates as prescribed by the policy.

In some embodiments, device identification list interface 2010-2 allows the network to provide service controller 122 with the device identifications or credentials of end-user devices that are able to participate in device-assisted services, including, for example, end-user devices with service processors, such as end-user device 100. In some embodiments, such end-user devices are identified by service controller 122. In some embodiments, such end-user devices are associated with an appropriate device group before those end-user devices may participate in device-assisted services.

In some embodiments, device identification list interface 2010-2 is a batch interface. In some embodiments, data is sent across device identification list interface 2010-2 using the FTP protocol. In some embodiments, the records sent to service controller 122 via device identification list interface 2010-2 are fixed-length records. The data elements that may be passed over device identification list interface 2010-2 include any or all of: IMSI, MSID, MDN, MEID, and device group. As would be appreciated by a person having ordinary skill in the art, other protocols, data formats, and data elements are possible.

In some embodiments, service provisioning update interface 2020-2 allows the network to provide service controller 122 with updated service plan selections for an end-user device that supports device-assisted services, such as end-user device 100. In some embodiments, service provisioning update interface 2020-2 is a single-device interface. In some embodiments, service provisioning update interface 2020-2 is a device group or user group multi-device interface. In some embodiments, data is sent across service provisioning update interface 2020-2 using a web services protocol. In some embodiments, the data sent to service controller 122 via service provisioning update interface 2020-2 is formatted as XML. The data elements that may be passed over service provisioning update interface 2020-2 include any or all of: IMSI, MSID, MDN, MEID, service plan selection information (e.g., service plan, charging code, plan start date, plan start time, plan end date, plan end time). As would be appreciated by a person having ordinary skill in the art, other protocols, data formats, and data elements are possible.

In some embodiments, subscriber onboarding interface 2050-2 allows service controller 122 to provide the network with device user (or subscriber) credentials or other information, billing information, and/or device user service selection information associated with end-user device 100. In some embodiments, subscriber onboarding interface 2050-2 is a single-device interface. In some embodiments, subscriber onboarding interface 2050-2 is a device group or user group multi-device interface. In some embodiments, data is passed over subscriber onboarding interface 2050-2 using a web services protocol. In some embodiments, the data sent by service controller 122 via subscriber onboarding interface 2050-2 is formatted as XML. The data elements that may be passed over subscriber onboarding interface 2050-2 include any or all of: device data (e.g., MEID, IMSI, etc.), subscriber data (e.g., name, address, etc.), billing data (e.g., credit card information, billing address, etc.), selected service plan, charging code, and acceptance of terms and conditions. As would be appreciated by a person having ordinary skill in the art, other protocols, data formats, and data elements are possible.

In some embodiments, service provisioning request interface 2070-2 allows service controller 122 to provide the network with subscriber service selection information associated with an end-user device, such as end-user device 100. In some embodiments, service provisioning request interface 2070-2 is a single-device interface. In some embodiments, data is passed over service provisioning request interface 2070-2 using a web services protocol. In some embodiments, the data sent by service controller 122 via service provisioning request interface 2070-2 is formatted as XML. The data elements that may be passed over service provisioning request interface 2070-2 include any or all of: IMSI, MSID, MDN, MEID, selected service plan, charging code, and acceptance of terms and conditions. As would be appreciated by a person having ordinary skill in the art, other protocols, data formats, and data elements are possible.

Uniform Interfaces for Classification of Service Usage

Network usage report interface 2030-2 comprises a uniform information exchange interface for communication of end-user device 100 service usage information to service controller 122. In some embodiments, end-user device 100 service usage information is gathered in the network and communicated to service controller 122. In some embodiments, service usage information is communicated from service controller 122 to end-user device 100 via a uniform service usage information exchange interface (e.g., policy interface 2110-2, service control device link 1691, service control server link 1638, or another interface) so that end-user device agents or applications (such as a service processor 115) can be configured to receive service usage information from a uniform interface. In some embodiments, service usage information is communicated from service controller 122 to end-user device 100 via a uniform service usage information exchange interface (e.g., policy interface 2110-2, service control device link 1691, service control server link 1638, or another interface) that is consistent across multiple wireless networks. In some embodiments, network usage report interface 2030-2 is a single-device interface. In some embodiments, service provisioning update interface 2020-2 is a device group or user group multi-device interface. In some embodiments, service usage information is passed over network usage report interface 2030-2 using a web services protocol. In some embodiments, the data sent to service controller 122 via network usage report interface 2030-2 is formatted as XML.

In some embodiments, network usage report interface 2030-2 (or FDR report interface 2040-2) can comprise a uniform network service usage information exchange that includes a classification of service usage. In some embodiments, the classification of service usage can include classification of data network usage by one or more of device application, network destination, network service type, network service class, network traffic type, network QoS class, device type, network type, time of day, network congestion level, or home or roaming network service usage. In some embodiments, the service usage information that is communicated to service controller 122 comprises one or more classifications of service usage. In some embodiments, the service usage information that is communicated via a uniform service usage information exchange interface (e.g., policy interface 2110-2, service control device link 1691, service control server link 1638, or another interface) to service processor 115 comprises one or more classifications of service usage. The data elements that may be passed over network usage report interface 2030-2 include any or all of: IMSI, MSID, MDN, MEID, usage report start time, usage report end time, number of bytes sent by the end-user device, number of bytes sent to the end-user device, service plan, charging code, percentage of plan used. As would be appreciated by a person having ordinary skill in the art, other protocols, data formats, and data elements are possible.

In some embodiments, CDR interface 2060-2 allows service controller 122 to provide the network with detailed device usage information, such as for end-user device 100. In some embodiments, CDR interface 2060-2 is a single-device interface. In some embodiments, data is passed over CDR interface 2060-2 using a web services protocol. In some embodiments, the data sent by service controller 122 via CDR interface 2060-2 is formatted as XML. The data elements that may be passed over CDR interface 2060-2 include any or all of: MEID, IMSI, MSID, MDN, start time, end time, usage data (e.g., service plan, charging code, number of bytes sent by the end-user device, number of bytes received by the end-user device). As would be appreciated by a person having ordinary skill in the art, other protocols, data formats, and data elements are possible.

In some embodiments, FDR report interface 2040-2 allows the network to provide service controller 122 with detailed data usage information for an end-user device, such as end-user device 100. In some embodiments, the report is based on a prior FDR report request initiated by service controller 122. In some embodiments, FDR report interface 2040-2 is a single-device interface. In some embodiments, data is passed over FDR report interface 2040-2 using a web services protocol. In some embodiments, the data sent to service controller 122 via FDR report interface 2040-2 is formatted as XML. The data elements that may be passed over FDR report interface 2040-2 include any or all of: IMSI, MSID, MDN, MEID, usage report start time, usage report end time, usage data (e.g., remote IP address, remote port, number of bytes sent by the end-user device, number of bytes sent to the end-user device). As would be appreciated by a person having ordinary skill in the art, other protocols, data formats, and data elements are possible.

In some embodiments, FDR request interface 2080-2 allows the service controller 122 to request FDRs for a specific end-user device, such as end-user device 100, for a specific period of time. In some embodiments, FDR request interface 2080-2 is a single-device interface. In some embodiments, data is passed over FDR request interface 2080-2 using a web services protocol. In some embodiments, the data sent by service controller 122 via FDR request interface 2080-2 is formatted as XML. The data elements that may be passed over FDR request interface 2080-2 include any or all of: IMSI, MSID, MDN, MEID, start time, end time. As would be appreciated by a person having ordinary skill in the art, other protocols, data formats, and data elements are possible.

Service Usage Anomaly Detection

An exemplary embodiment illustrating the detection of service usage anomalies in device-generated usage data records using carrier-based usage data records is now described with reference to FIG. 33.

Service processor 115 on end-user device 100 sends device-generated (also referred to as "device-based") usage data reports (UDRs) to service controller 122 via the access network. The UDRs contain information about the data usage of end-user device 100. For example, the UDRs may indicate how many bytes of data associated with a particular application, such as a map application, or service, such as a music streaming service, end-user device 100 consumed since the last report, or during a particular time period. For example, a UDR may contain some or all of the following information: subscriber identification (e.g., IMSI, MSID, NAI, MDN), equipment identification (e.g., IMEI or MEID), start time, stop time, domain name, remote IP address, remote port, application, control policy identification, charging policy identification, filter identification, network busy state, information about the active network (e.g., whether it is 2G, 3G, 4G, or Wi-Fi), access point name (APN), access point type, classification type (e.g., whether direct or associative), number of bytes sent by end-user device 100, number of bytes received by end-user device 100. As would be appreciated by a person having ordinary skill in the art, a UDR may contain other information associated with end-user device 100. In some embodiments, end-user device 100 sends the UDRs periodically. In some embodiments, end-user device 100 sends the UDRs in response to one or more requests from service controller 122.

In addition to receiving UDRs from end-user device 100, service controller 122 also receives carrier-based device usage reports from the carrier usage reporting system. In some embodiments, these carrier-based reports are received via usage report interface 2030. The carrier-based usage reports contain information about data usage by end-user device 100, as determined by the network. For example, a carrier usage record, which may be, for example, a charging data record (CDR), may contain some or all of the following information: subscriber identification (e.g., IMSI, MSID, NAI, or MDN), equipment identification (e.g., IMEI or MEID), correlation identification, start time, stop time, number of bytes sent by end-user device 100, number of bytes received by end-user device 100, access point name (APN). As would be appreciated by a person having ordinary skill in the art, a carrier-based device usage report may contain other information associated with end-user device 100.

In some embodiments, service controller 122 compares information in UDRs sent by service processor 115 to carrier-based usage reports received from the network to determine whether end-user device 100 is likely operating in compliance with an established policy, or whether end-user device 100 is likely operating in a fraudulent manner.

The carrier-based usage report may specify a time period associated with the data included in the report. In some embodiments in which the carrier-based usage report specifies a time period associated with the data included in the report, for the time period specified in the carrier-based usage report, service controller 122 compares information in the received UDRs to constraints in effect during the specified time period. Such constraints may include, for example, policy limits, usage metrics, or other measures associated with the use of data by end-user device 100. In some embodiments, for the time period specified in the carrier-based usage report, service controller 122 compares aggregated usage counts in the carrier-based usage report to an aggregated usage count determined based on one or more UDRs received from service processor 115.

In some embodiments, service controller 122 reconciles time period differences between information received from service processor 115 and network sources of service usage information. In some embodiments, time period reconciliation is accomplished by aggregating a number of measurement time periods until the percentage difference in time periods is small. In some embodiments, time period reconciliation is accomplished by aggregating a first number of device-based usage reports and a second number of network-based usage reports. In some embodiments, time period reconciliation is accomplished by maintaining a running average or running accumulation of service usage from each source.

In some embodiments, if service controller 122 detects possible fraudulent activity by end-user device 100, service controller 122 requests flow data record (FDR) data from the network for the time period specified in the carrier-based usage report and performs additional analysis based on the FDR data. In some embodiments, service controller 122 requests the FDR data via FDR request interface 2080-2.

In some embodiments, based on its analysis of the UDRs and carrier-based data records, which may include FDR data, service controller 122 sets an indicator or flag to indicate potential fraudulent activity. The indicator or flag is specific to end-user device 100 and, in some embodiments in which the carrier-based usage reports specify a time period, the time period specified by the carrier-based usage report.

In some embodiments, the indicator or flag is communicated to the network using fraud alert interface 2090-2. In some embodiments, fraud alert interface 2090-2 allows service controller to notify the network of potential fraud detection associated with an end-user device, such as end-user device 100. In some embodiments, fraud alert interface 2090-2 is a single-device interface. In some embodiments, data is passed over fraud alert interface 2090-2 using a web services protocol. In some embodiments, the data sent by service controller 122 via fraud alert interface 2090-2 is formatted as XML. The data elements that may be passed over fraud alert interface 2090-2 include any or all of: IMSI, MSID, MDN, MEID, fraud alert start time, fraud alert end time, affected service plan, affected charging code, fraud reason code (e.g., no device report, count mismatch, etc.). As would be appreciated by a person having ordinary skill in the art, other protocols, data formats, and data elements are possible.

In some embodiments, after service controller 122 has completed the anomaly detection procedure, if the potential fraud indicator or flag is not set, service controller 122 generates charging data records with detailed charging codes for the data usage by end-user device 100. In some embodiments in which the carrier-based usage reports specify a time period, the charging data records are for the time period specified in the carrier-based usage record. In some embodiments, service controller 122 sends the charging data records to the service provider over CDR interface 2060-2.

In some embodiments, if the potential fraud indicator or flag is set, service controller 122 waits for the network to send an FDR report via FDR report interface 2040-2 for end-user device 100. When service controller 122 receives the FDR report, service controller 122 performs validation of the carrier-based usage report based on the FDR report. If the counts do not agree, service controller 122 sends a fraud alert message over fraud alert interface 2090-2. If the counts agree, service controller 122 generates charging data records with detailed charging codes for data usage by end-user device 100 during the time period specified in the carrier-based usage record. In some embodiments, service controller 122 sends the charging data records to the service provider over CDR interface 2060-2.

Uniform Customer Acknowledgment Interface

In some embodiments, customer acknowledgment interface 2100-2 allows service controller 122 to notify the network of an end user's selecting of "Acknowledge" in response to an end-user device notification that has an "Acknowledge" option. In some embodiments, customer acknowledgment interface 2100-2 is a single-device interface. In some embodiments, data is passed over customer acknowledgment interface 2100-2 using a web services protocol. In some embodiments, the data sent by service controller 122 via customer acknowledgment interface 2100-2 is formatted as XML. The data elements that may be passed over customer acknowledgment interface 2100-2 include any or all of: IMSI, MSID, MDN, MEID, acknowledge time, acknowledge event (e.g., allow an overage), acknowledge service plan (e.g., 50 MB browsing plan), and acknowledge charging code. As would be appreciated by a person having ordinary skill in the art, other protocols, data formats, and data elements are possible.

It is sometimes desirable that a common application programming interface (API) be implemented to simplify or eliminate the details of what has to happen in one or more carrier networks, and to establish a finite set of pre-specified API commands to support a common multi-device service plan assignment system that works with a plurality of third-party on-device multi-device service plan sharing and assignment solutions. In some embodiments, the pre-specified API commands include such actions as activate a device onto a shared plan, add a device to a master service account, device group, or multi-device service plan, remove a device from a master service account, device group, or multi-device service plan, manage quotas for devices on a shared plan, manage notifications for devices on a shared plan, or assign specific plans to certain devices on a shared plan. As would be appreciated by a person having ordinary skill in the art, there are many types actions that can be defined, and the examples provided herein are not intended to be limiting.

In some embodiments, one or more of the interfaces illustrated in FIG. 33 facilitate communications between the service controller 122 in the service provider network (or in another network communicatively coupled to the mobile device 100) and the service processor 115 in the mobile device 100 using a set of APIs. In some embodiments, the set of APIs assists in providing for communication service management between the service controller 122 and the service processor 115. In some embodiments, the set of APIs assists in providing communication between one or more servers in (or associated with) the service controller 122 and one or more device agents in (or associated with) the service processor 115 of the mobile device 100. In some embodiments, the set of APIs assists in providing communication between the service controller 122 and one or more servers maintained by other service providers, network operators, and/or third-party service partners. In some embodiments, the set of APIs assists in providing for service plan offers to, service plan selections by, service plan customizations by, and service plan purchases by a user of the mobile device 100.

In some embodiments, the set of APIs assists in providing a uniform service selection information exchange system that presents and obtains information to a user of the mobile device 100, e.g., through a user interface contained therein. In some embodiments, the set of APIs assists in providing for a uniform wireless network service selection interface system including service plan selection, service plan activation, service plan purchase and service plan provisioning. In some embodiments, the set of APIs assists in providing for a uniform presentation of communication service management information to and reception of communication service management responses from the user of the mobile device 100, e.g., through the user interface of the mobile device 100, that interoperates with network elements, e.g., servers, databases, service controllers, and/or service design systems of various service providers, network operators, and third-party service partners. In some embodiments, the set of APIs assists in providing for communication with network elements that provide for service plan provisioning, activation, purchase, billing, device management, and/or subscriber management. In some embodiments, the set of APIs assists in providing for a uniform and consistent user experience in communication service management (e.g., service plan selection, purchase, modification, and control) with multiple service providers, network operators, and/or third-party service partners.

In some embodiments, the uniform information exchange protocol implemented in the service controller 122 as described above uses a set of APIs to communicate service plan selection, service plan activation, service plan purchase, and service control information to and obtain responses from one or more device agents in the mobile device 100. In some embodiments, a set of APIs assists in providing a uniform service plan information exchange interface, e.g., the usage record service selection interface 2120-2 and the policy interface 2110-2 illustrated in FIG. 33. In some embodiments, a set of APIs provides for service provisioning, including communicating service policy information from one or more servers in the service provider's network, e.g., one or more servers in the service controller 122, to the service processor 115 in the mobile device 100, e.g., through the policy interface 2110-2. In some embodiments, a set of APIs provides for communicating service provisioning information between the service controller 122 and one or more servers and/or databases of the service provider, e.g., through the service provisioning update interface 2020-2 and/or the service provisioning request interface 2070-2. In some embodiments, a set of APIs provides for communicating device activation and/or service activation information between the service controller 122 and one or more servers and/or databases of the service provider, e.g., through the subscriber onboarding interface 2050-2 and/or the service provisioning request interface 2070-2. In some embodiments, a set of APIs provides for communicating service usage information and accounting, charging, and/or billing information, between the service controller 122 and one or more servers and/or databases of the service provider (or a network operator, another service provider, or a third-party service partner), e.g., through the usage report interface 2030-2, the FDR report interface 2040-2, the CDR interface 2060-2, and/or the FDR request interface 2080-2. In some embodiments, a set of APIs provides for communicating device identifications or credentials (or user credentials) to assist in device activation, service plan selection, service control, service provisioning, device group management, and other communication service management functions, between the service controller 122 and one or more servers and/or databases of the service provider (or a network operator, another service provider, or a third-party service partner), e.g., through the device ID list interface 2010-2, the subscriber onboarding interface 2050-2, and/or the service provisioning update interface 2020-2. In some embodiments, a set of APIs provides for communicating information for service usage monitoring and reporting, between the service processor 115 in the mobile device 100 and the service controller 122, e.g., through the usage record service selection interface 2120-2. In some embodiments, a set of APIs provides for communication information for service usage anomaly detection between the service controller 122 and one or more servers and/or databases of the service provider (or a network operator, another service provider, or a third-party service partner), e.g., through the fraud alert interface 2090-2, the usage report interface 2030-2, the FDR request interface 2080-2, the FDR report interface 2040-2, and/or the CDR interface 2060-2.

As would be understood by a person of ordinary skill in the art, the set of interfaces illustrated in FIG. 33 is representative and provided as an example and not intended to be limiting. In some embodiments, the set of interfaces between the service controller 122 and the service processor 115 can be fewer or more than illustrated, e.g., consolidating or dividing interface functions among fewer or more interfaces can be implementation dependent. In some embodiments, the set of interfaces between the service controller 122 and various servers, databases, and/or other network elements can be fewer or more than illustrated. In some embodiments, the set of APIs used between the service controller 122 and the service processor 115 can be divided into groups of APIs for different interfaces, can be individually applied to individual interfaces or can be applied equally to all interfaces. In some embodiments, the set of APIs used between the service controller 122 and other servers, databases and/or network elements can be divided into groups of APIs for different interfaces, can be individually applied to individual interfaces or can be applied equally to all interfaces.

In some embodiments, a proxy server or router is used to verify accounting for a given service, for example, an ambient service. In some embodiments, this is accomplished by the device service processor directing the desired service flows to a proxy server or router programmed to handle the desired service flows, with the proxy server or router being programmed to only allow access to valid network destinations allowed by the access control policies for the desired service, and the proxy server or router also being programmed to account for the traffic usage for the desired services. In some embodiments, the proxy service usage accounting may then be used to verify device based service usage accounting reported by the service processor. In some embodiments, the accounting thus reported by the proxy server or router can be used directly to account for service usage, such as ambient service usage or user service plan service usage.

In some embodiments, in which a proxy server is used for device service usage accounting, the proxy server maintains a link to the device service notification UI via a secure communication link, such as the heartbeat device link described herein. For example, the proxy server or router can keep track of device service usage versus service plan usage caps/limits and notify the user device UI through the device communication link (e.g., heartbeat link) between the service controller and the device. In some embodiments, the proxy server/router communicates with a device UI in a variety of ways, such as follows: UI connection through a device link (e.g., heartbeat link), through a device link connected to a service controller (e.g., or other network element with similar function for this purpose), presenting a proxy web page to the device, providing a pop-up page to the device, and/or installing a special portal mini-browser on the device that communicates with the proxy server/router. In some embodiments, the UI connection to the proxy server/router is used as a user notification channel to communicate usage notification information, service plan choices, or any of the multiple services UI embodiments described herein.

In some embodiments for the proxy server/router techniques for implementing service traffic/access controls and/or service charging bucket accounting, it is desirable to have the same information that is available to the service processor on the device, including, for example, application associated with the traffic, network busy state, QoS level, or other information about the service activity that is available at the device. For example, such information can be used to help determine traffic control rules and/or special services credit is due (e.g., ambient services credit). In some embodiments, information available on the device can be communicated to the proxy server/router and associated with traffic flows or service usage activities in a variety of ways. For example, side information can be transmitted to the proxy server/router that associates a traffic flow or service activity flow with information available on the device but not readily available in the traffic flow or service activity flow itself. In some embodiments, such side information may be communicated over a dedicated control channel (e.g., the device control link or heartbeat link), or in a standard network connection that in some embodiments can be secure (e.g., TLS/SSL, or a secure tunnel). In some embodiments, the side information available on the device can be communicated to the proxy server/router via embedded information in data (e.g., header and/or stuffing special fields in the communications packets). In some embodiments, the side information available on the device can be communicated to the proxy server/router by associating a given secure link or tunnel with the side information. In some embodiments, the side information is collected in a device agent or device API agent that monitors traffic flows, collects the side information for those traffic flows, and transmits the information associated with a given flow to a proxy server/router. It will now be apparent to one of ordinary skill in the art that other techniques can be used to communicate side information available on the device to a proxy server/router.

In some embodiments, the proxy server or router described herein is a network element that participates in management of communication services for a mobile device 100. In some embodiments, the proxy server connects to the mobile device through a secure communication link, e.g., to one or more device agents of a service processor 115 in the mobile device 100. In some embodiments, the proxy server exchanges information with the mobile device 100 through the secure communication link for service management and/or service control. In some embodiments, the information exchanged includes service notifications, service plan options, and/or service plan selections for service management. In some embodiments, the information exchanged includes service usage and/or service usage accounting, e.g., side information associated with traffic flows, in order to control and account for services. In some embodiments, information can be exchanged between the proxy server and the mobile device 100 using one or more APIs described herein.

Figure 34:
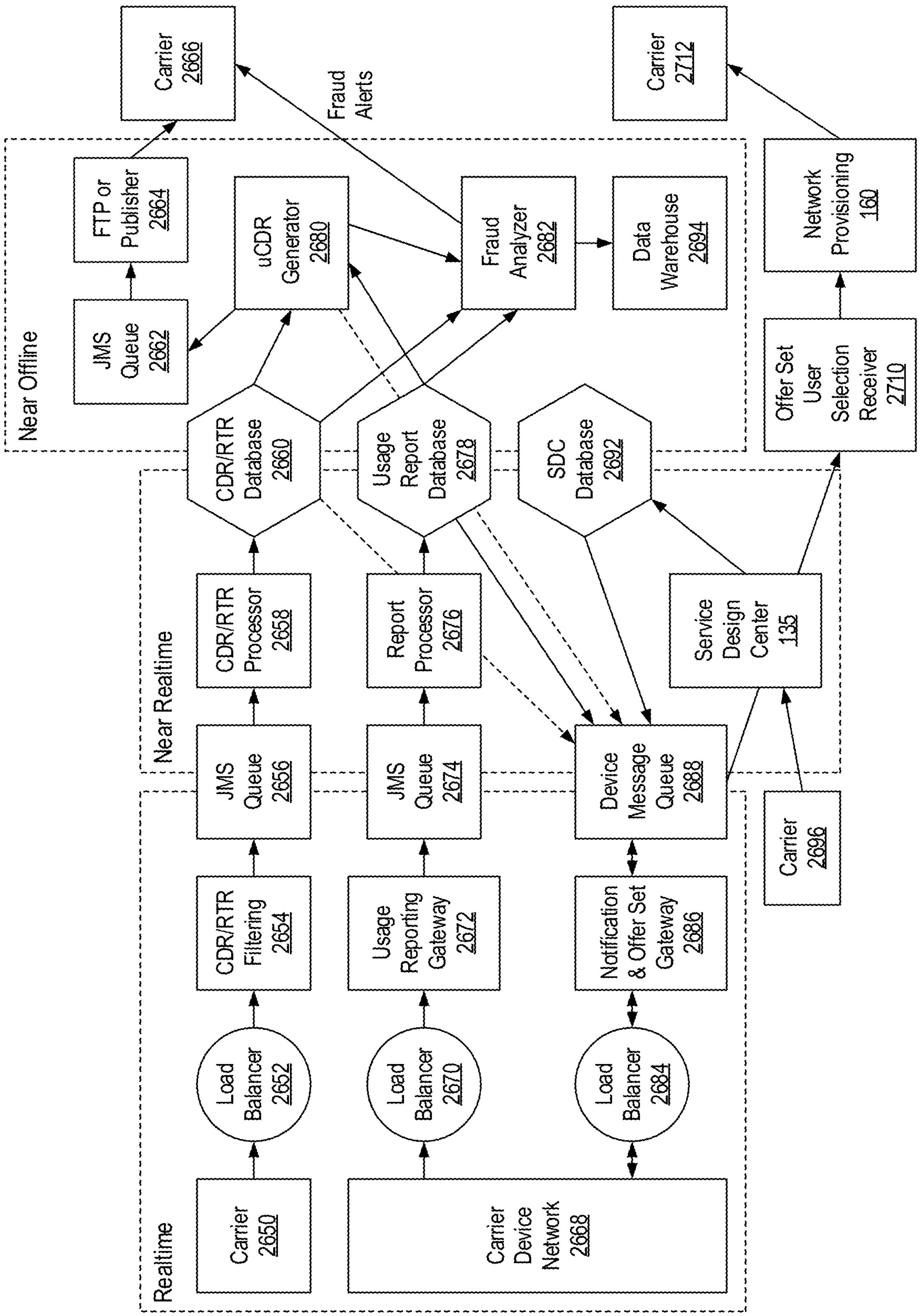
FIG. 34 illustrates an example embodiment with network system elements that can be included in a service controller system to facilitate device-assisted services (DAS) implementation and the flow of information between those elements.

FIG. 34 illustrates an exemplary embodiment with network system elements that can be included in a service controller system to facilitate a device-assisted services (DAS) implementation and the flow of information between those elements. FIG. 34 shows the flow of information to facilitate reconciliation of device-generated data usage records with network-generated (e.g., wireless network carrier-generated) data usage records associated with an end-user device. In addition, FIG. 34 shows the flow of information from a carrier to an end-user device for the purpose of publishing an offer set. A user of the end-user device may then select or act on the offer set.

In some embodiments, a service design center is used to create service offers (e.g., service plan offers to purchase or activate a bulk service plan, an application specific service plan, an application group-specific service plan, a website service plan, a website-group service plan, etc.). In some embodiments, the service offers are published to DAS-enabled devices. To publish an offer to one or more devices in carrier device network 2668, carrier 2696 enters information in service design center 135. Service design center (SDC) 135 stores the offer set in SDC database 2692. The offer set then flows to device message queue 2688. In some embodiments, device message queue 2688 is a database-backed persistent queue. In some embodiments, when an end-user device with an authenticated service processor connects to offer set gateway 2686, offer set gateway 2686 pushes the offer set to the end-user device. In some embodiments, offer set gateway pushes the offer set to the end-user device at the next usage report. In some embodiments the new offer is an offer to purchase or activate a service plan, and the offer notification is configured with offer acceptance features that allow the device user to select an option to purchase or activate the service offer in the device UI.

In some embodiments, a list of service offers that are available to a device group or user group, wherein the list of service offers is created in a service design center user interface, is stored in SDC database 2692 and published to the devices that belong to the device group or user group.

In some embodiments, an offer set is defined in service design center (SDC) 135. In some embodiments, this offer set includes multiple service plans that can be communicated to the device service processor for display to the device end user for service plan selection, purchase or activation through the device UI. In some embodiments, the offer set UI display is configured to allow the user to purchase or activate a service plan within the offer set in real-time or near-real-time. In some embodiments, the offer set information is received from the service controller and the offer set information is processed for UI display by a device service processor. In some embodiments, service processor offer set information processing and UI display is configured to allow the user to purchase or activate a service plan within the offer set in real-time or near-real-time. In some embodiments, the user's selection of a service plan for purchase or activation is communicated to the user via an offer set UI display that is configured by a service processor, and the service processor communicates with a service controller via a communication interface to the notification and offer set gateway 2686 to purchase or activate the service plan in real-time or near real-time. In some embodiments the notification and offer set gateway 2686 communicates the user selection of service plan to the offer user selection receiver 2710, which then causes the service plan policy enforcement settings corresponding to the user's service plan selection to be implemented by communicating the user's service plan selection to network provisioning system 160-2 (or subscriber management 182, order management 180, mobile wireless center 132, billing 123, etc.), which in turn communicates with carrier network 2712 to cause the proper service play policy enforcement settings to be programmed in the various network elements responsible for service plan policy enforcement. In this manner, in some embodiments the network service policy enforcement required to implement the new service plan for the device can be provisioned in the various network elements responsible for network-based policy enforcement (e.g., aggregation/transport gateways 420 [e.g., PDN or GGSN], mobile wireless center 132 [e.g., HLR], AAA server 121, RAN/access gateway 410 [e.g., SGSN, PDSN], BSC 125). In some embodiments, the network service policy enforcement that implement the new service plan for the device can be provisioned in the various service processor device agents responsible for network based policy enforcement. In some embodiments, when the service plan policy provisioning is complete, the service controller communicates with the device service processor that the new service plan has been purchased or activated. In some embodiments, the service processor communicates a message from the service controller to the device UI that the new service plan has been purchased or activated.

In some embodiments, the service processor offer set information processing and UI display is configured to allow the user to purchase or activate a service plan within the offer set in real-time or near-real-time. In some embodiments, the user's selection of a service plan for purchase or activation is accepted by an offer set UI display that is configured by a service processor, and the service processor communicates with a service controller to allow the user to purchase or activate the service plan in real-time or near real-time, and the service plan policy settings are communicated by the service controller to the service processor so that the service processor policy enforcement agents that implement the new service plan for the device can be provisioned.

In some embodiments, a service design center is used to create device user notification messages (e.g., a service offer message, a service usage notification message, a message indicating an amount of bulk service used, a notification indicating an amount of a micro-CDR service classification used, a notification indicating that a bulk usage limit has been reached, a notification indicating that a micro-CDR usage classification usage limit has been reached, etc.). In some embodiments, the notification messages are published to a device service processor (or a group of device service processors that belong to a device group or a user group), and the service processor determines when a trigger condition exists for displaying a specific notification message. In some embodiments, a service usage notification trigger condition (e.g., a state of device usage such as a state of bulk service usage or attempted usage, application usage or attempted usage, website usage or attempted usage, home/roaming usage or attempted usage, cellular/Wi-Fi usage or attempted usage, etc.) is associated with each message. In some embodiments, the service processor on a device determines when the trigger condition has been met and displays a pre-stored notification message associated with the trigger condition. In some embodiments, a network element determines when the trigger condition has been met and uses the notification and offer set gateway 2686 via device message queue 2688 to transmit the notification message to the device for display by the device service processor. In some embodiments, a device service notification message includes a service usage update from CDR/RTR database 2660, which is sent through notification and offer set gateway 2686 via device message queue 2688. In some embodiments, a device service notification message includes a service usage update from micro-CDR generator 2680, which is sent through notification and offer set gateway 2686 via device message queue 2688. In some embodiments, service usage updates from one or more of CDR/RTR database 2660 or micro-CDR generator 2680 are sent through the notification and offer set gateway 2686 via device message queue 2688 on a recurring basis. In some embodiments, the recurring basis is based on a pre-determined amount of usage being reached (e.g., a pre-determined byte count, pre-determined time count or pre-determined percentage of a pre-determined limit, etc.). In some embodiments the recurring basis is based on a usage notification update frequency or time interval.

In some embodiments, the interface protocols for notification and offer set gateway 2686 can be exposed to device OEMs or application developers in the form of an API. In some embodiments, the API for notification and offer set gateway 2686 provides for a uniform means for device application software or OS software developers to write various application software that can utilize a uniform interface for requesting from a service controller a listing of service offers that are available to a device and displaying the listing to the device user interface. In some embodiments, a list of service offers that are to be made available to a device group or user group is created using a service design center user interface, stored in an SDC database, and published to the API for notification and offer set gateway 2686. In some embodiments, the service plan enforcement policies for one or more of network access permissions or traffic control, service usage limitations, service usage charging or accounting, or service usage notification can also be configured in service design center 135. In some embodiments, the API for notification and offer set gateway 2686 provides for a uniform means for device application software or OS software developers to write various application software that can utilize a uniform interface for providing user service plan choices for service purchase or activation in a device UI, collect the user choice and transmit the user choice to a service controller that then activates the new service for the device. In some embodiments, the available service plan listing or service plan purchase or activation user selection components of the API for notification and offer set gateway 2686 is created with an XML interface. In some embodiments, the available service plan listing or service plan purchase or activation user selection components of the API for notification and offer set gateway 2686 is offered via a secure web connection.

In some embodiments, the interface protocols for notification and offer set gateway 2686 can be exposed to sponsored device providers or sponsored application providers in the form of an API. In some embodiments, the API for notification and offer set gateway 2686 provides for a uniform means for sponsored service providers to develop device application software or OS software that can utilize a uniform interface for requesting from a service controller activation of a sponsored service plan for the device from a service controller. In some embodiments, the sponsored service plan offered and activated through the API is for sponsoring all device access. In some embodiments, the sponsored service plan offered and activated through the API is for sponsoring an application or group of applications. In some embodiments, the sponsored service plan offered and activated through the API is for sponsoring a website or group of websites. In some embodiments, the API for notification and offer set gateway 2686 provides for a uniform means for sponsored device application software or OS software developers to write various application software that can utilize a uniform interface for activating a sponsored service plan for the device, an application or a website.

In some embodiments the interface protocols for notification and offer set gateway 2686 can be exposed to device OEMs or application developers in the form of an API that provides a uniform interface for device application software or OS software to request service usage information updates from a service controller. In some embodiments, the service usage information updates are provided by the service controller in the form of bulk service usage. In some embodiments, the service usage information updates are provided by the service controller in the form of service usage classification or micro-CDR service usage updates. In some embodiments, a device user software application or OS function is configured to utilize a uniform interface for obtaining service usage updates from a service controller, and displaying the service usage updates to a device user interface. In some embodiments the service usage update displayed to the device UI is in the form of a gauge, meter, bar, amount used, amount remaining, percent used or percent remaining. In some embodiments, a device user software application or OS function is configured to utilize a uniform interface for obtaining service usage updates for a classification of service usage (e.g., an application classification or website classification, or another classification) from a service controller, and displaying the service usage updates to a device user interface. In some embodiments, a group of one or more service usage notifications that are to be provided by the API for notification and offer set gateway 2686 to devices that belong to a device group or user group are created using a service design center user interface, stored in SDC database 2692 and published to the API for notification and offer set gateway 2686. In some embodiments, the service plan notification policies (e.g., the conditions that trigger a given service usage notification and the information content of the notification) can also be configured in service design center 2692. In some embodiments, the service usage notification interface component of the API for notification and offer set gateway 2686 is created with an XML interface. In some embodiments, the service usage notification interface component of the API for notification and offer set gateway 2686 is offered via a secure web connection.

In some embodiments, the API for notification and offer set gateway 2686 comprises a secure interface that can only be accessed by providing a device credential corresponding to a known device or user account on the network (e.g., a SIM card credential, an IMSI, a phone number, an MDID, a signed API communication, an encrypted API communication or another form of secure device agent communication with the API). In some embodiments, the API for notification and offer set gateway 2686 comprises a secure interface that can only be accessed by providing a user credential corresponding to a known device or user account on the network (e.g., a user PIN, password, secure question answer, biometric credential or other secure user credential available in general only to a device user or an entity trusted by the device user). In some embodiments, the API for notification and offer set gateway 2686 comprises a secure interface that can only be accessed by providing an application credential (e.g., application certificate, signature, hash information, signed communication, encrypted communication, encrypted message or other application credential that securely identifies an application or OS function) corresponding to a known application that is allowed to access the API for notification and offer set gateway 2686. In some embodiments, a device software application or OS function must provide a secure device credential, secure application credential or secure user credential in accordance with a proper pre-defined API format to obtain service usage notification information from the API for notification and offer set gateway 2686. In some embodiments, a device software application or OS function must provide a secure device credential, secure application credential or secure user credential in accordance with a proper pre-defined API format to obtain service offer set information from the API for notification and offer set gateway 2686. In some embodiments, a device software application or OS function must provide a secure device credential, secure application credential or secure user credential in accordance with a proper pre-defined API format to communicate user service plan selection information to the API for notification and offer set gateway 2686. In some embodiments, a device software application or OS function must provide a secure device credential, secure application credential or secure user credential to the API for notification and offer set gateway 2686 in order to receive a sponsored service. In some embodiments, the API for notification and offer set gateway 2686 comprises a secured XML interface. In some embodiments, the API for notification and offer set gateway 2686 comprises a secure web connection.

As described herein, in some embodiments, a network element, e.g., a gateway or server, communicates with a mobile device 100 through one or more APIs to assist in providing for service offers, service selection, service purchase and/or service activation. In some embodiments, information for service plan designs is provided through one or more APIs to a service design center. In some embodiments, information exchanged though one or more APIs includes service notifications, service offer sets, service usage information, and/or service purchase information (e.g., device and/or user credentials). In some embodiments, the one or more APIs assist in providing a real time or near real time service selection and purchase experience for a user of the mobile device. In some embodiments, the one or more APIs assist in providing a uniform and consistent service selection and purchase process for the user of the mobile device 100. In some embodiments, the one or more APIs assist in providing for offering services from multiple service providers, network operators, and/or third-party service partners, e.g., through the proxy gateway or server described herein, to the user of the mobile device 100.

FIG. 27 illustrates another functional diagram of an architecture 10603 including a device based service processor 115 and a service controller 122 for providing DAS. In some embodiments, DAS techniques described herein are implemented using the functions/elements shown in FIG. 27. For example, the architecture 10603 provides a relatively full-featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As will be apparent to one of ordinary skill in the art, the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments.

As shown in FIG. 27, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

As shown in FIG. 27, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 27, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

As shown in FIG. 27, the service controller 122 includes an access control integrity server 1654 (e.g., service policy security server). In some embodiments, the access control integrity server 1654 collects device information on service policy, service usage, agent configuration, and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent 1694 (e.g., service policy security agent) reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs or CDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (e.g., and/or some other agent of service controller 122) verifies device service policy, and the verification error conditions that can indicate a mismatch in network service usage measure and service policy include one or more of the following: unauthorized network access (e.g., access beyond sponsored service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

As shown in FIG. 27, service controller 122 includes a service history server 1650 (e.g., charging server). In some embodiments, the service history server 1650 collects and records network service usage or service activity reports from the Access Network AAA Server 121 and the Service Monitor Agent 1696. For example, although network service usage history from the network elements can in certain embodiments be less detailed than service history from the device, the network service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618 (e.g., CDR feed and CDR mediation). In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 27, service controller 122 includes a policy management server 1652 (e.g., policy decision point (PDP) server) for managing service usage policies, such as network service policies. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other datastores used for CRM for maintaining user privacy.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on the service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history, and/or other sensitive information) is not communicated to the network without the user's approval. In some embodiments, the policy management server 1652 adjusts service policy based on TOD. In some embodiments, the policy management server 1652 receives, requests, and/or otherwise obtains a measure of network availability/capacity and adjusts traffic shaping policy and/or other policy settings based on available network availability/capacity (e.g., a NBS).

As shown in FIG. 27, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In some embodiments, the network traffic analysis server 1656 estimates the service quality and/or service usage for the network under variable settings on potential service policies. In some embodiments, the network traffic analysis server 1656 identifies actual or potential service behaviors by one or more devices that are causing problems for overall network service quality or service cost. In some embodiments, the network traffic analysis server 1656 estimates the network availability/capacity for the network under variable settings on potential service policies. In some embodiments, the network traffic analysis server 1656 identifies actual or potential service behaviors by one or more devices that are impacting and/or causing problems for overall network availability/capacity.

As shown in FIG. 27, Service Analysis, Test & Download 122B includes a beta test server 1658 (e.g., policy creation point and beta test server). In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization, such as for protecting network capacity.

As shown in FIG. 27, service controller 122 includes a service download control server 1660 (e.g., a service software download control server). In some embodiments, the service download control server 1660 provides a download function to install and/or update service software elements (e.g., the service processor 115 and/or agents/components of the service processor 115) on the device, as described herein.

As shown in FIG. 27 service controller 122 includes a billing event server 1662 (e.g., micro-CDR server). In some embodiments, the billing event server 1662 collects billing events, provides service plan information to the service processor 115, provides service usage updates to the service processor 115, serves as interface between device and central billing server 123, and/or provides trusted third-party function for certain ecommerce billing transactions.

As shown in FIG. 27, the Access Network HLR AAA server 121 is in network communication with the access network 1610. In some embodiments, the Access Network AAA server 121 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine-to-machine network. This additional layer of access control can be implemented, for example, by the service processor 115 on the device. In some embodiments, the Access Network AAA server 121 also provides the ability to suspend service for a device and resume service for a device based on communications received from the service controller 122. In some embodiments, the Access Network AAA server 121 also provides the ability to direct routing for device traffic to a quarantine network or to restrict or limit network access when a device quarantine condition is invoked. In some embodiments, the Access Network AAA server 121 also records and reports device network service usage (e.g., device network service usage can be reported to the device service history 1618).

As shown in FIG. 27, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation (e.g., to verify service usage charging). In some embodiments, the device service history 1618 is used to synchronize and/or verify the local service usage counter (e.g., to verify service usage accounting).

As shown in FIG. 27, the central billing 1619 (e.g., central provider billing server) is in network communication with the access network 1610. In some embodiments, the central provider billing server 123 provides a mediation function for central provider billing events. For example, the central provider billing server 123 can accept service plan changes. In some embodiments, the central provider billing server 123 provides updates on device service usage, service plan limits and/or service policies. In some embodiments, the central provider billing server 123 collects billing events, formulates bills, bills service users, provides certain billing event data and service plan information to the service controller 122 and/or device 100.

As shown in FIG. 27, in some embodiments, modem selection and control 1811-1 (e.g., in communication with connection manager 1804-1 as shown) selects the access network connection and is in communication with the modem firewall 1655, and modem drivers 1831-1, 1815-1, 1814-1, 1813-1, 1812-1 convert data traffic into modem bus traffic for one or more modems and are in communication with the modem selection and control 1811-1. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (e.g., potentially for higher service payments) than other users). As another example, sponsored services (e.g., as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with sponsored services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free sponsored service discussed above, the user may later choose a post-pay monthly Internet, email, and SMS service. In this case, the service controller 122 would obtain from the billing system 123 in the case of network based billing (e.g., or the service controller 122 billing event server 1622 in the case of device based billing) the billing plan code for the new Internet, email and SMS service. In some embodiments, this code is cross referenced in a datastore (e.g., the policy management server 1652) to find the appropriate service profile for the new service in combination with the initial sponsored service. The new superset service profile is then applied so that the user maintains free access to the sponsored services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 27, an agent communication bus 1630 represents a functional description for providing communication for the various service processor 115 agents and functions. In some embodiments, as represented in the functional diagram illustrated in FIG. 27, the architecture of the bus is generally multipoint to multipoint so that any agent can communicate with any other agent, the service controller or in some cases other components of the device, such user interface 101 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned, and/or otherwise protected from unauthorized monitoring or usage. In some embodiments, an application interface agent (not shown) is used to literally tag or virtually tag application layer traffic so that the policy implementation agent(s) 1690 has the necessary information to implement selected traffic shaping solutions. In some embodiments, an application interface agent (not shown) is in communication with various applications, including a TCP application 1604, an IP application 1605, and a voice application 1602.

As shown in FIG. 27, service processor 115 includes an API and OS stack interface 1693. In some embodiments, the API and OS stack interface 1693 provides the API functionality as similarly described herein with respect to various embodiments. In some embodiments, an API is used to report back network service availability to applications. In some embodiments, the API and OS stack interface 1693 provides emulated API functionality. As shown, service processor 115 also includes a router 1698 and a policy decision point (PDP) agent 1692. In some embodiments, the router supports multiple channels (e.g., one or more provisioned/allocated links forming a channel between the device and the desired end point, such as an access point/BTS/gateway/network for a single ended channel or other communication device for an end to end channel, depending on the connection/network support/availability/etc.). In some embodiments, the router supports multiple channels, which can each have different classes/levels. In some embodiments, the router routes application/service usage traffic to an appropriate channel. In some embodiments, the router determines the routing/mapping based on, for example, one or more of the following: an API request, an activity map, a user request, a service plan, a service profile, service policy settings, network capacity, service controller or other intermediate network element/function/device, and/or any other criteria/measure. In some embodiments, multiple different applications/services are routed to a particular channel. In some embodiments, different applications/services are routed to different. In some embodiments, the router assists in managing and/or optimizing network service usage for the communications device. In some embodiments, the router assists in managing and/or optimizing network service usage across multiple communications devices (e.g., based on network capacity for a given cell area/base station or other access point). In some embodiments, PDP agent 1692 provides the PDP agent functionality as similarly described herein with respect to various embodiments. As shown, architecture 10603 also includes a suspend resume interface 320-1, network service provisioning interfaces 330-1, and an activation/suspend resume server 340-1 and billing interface server 350-1 in the service controller 122A.

In some embodiments, DAS techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent (not shown), service monitor agent 1696 (e.g., charging agent), or another agent or function (or combinations thereof) of the service processor 115 provides a DAS activity map. In some embodiments, a policy control agent (not shown), service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by socket (such as by IP address, protocol, and/or port), by socket id (such as port address/number), by port number, by content type, by application or application type, and/or any other service usage activity classification/categorization) with associated IP addresses and/or other criteria/measures. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques. In some embodiments, the DAS activity map is used to provide the user various UI related information and notification techniques related to network service usage. In some embodiments, the DAS activity map is used to provide network service usage monitoring, prediction/estimation of future service usage, service usage billing (e.g., bill by account and/or any other service usage/billing categorization techniques), DAS techniques for sponsored services usage monitoring, DAS techniques for generating micro-CDRs, and/or any of the various other DAS related techniques.

In some embodiments, all or a portion of the service processor 115 functions disclosed herein are provided in software for implementation in an engine. In some embodiments, all or a portion of the service processor 115 functions are implemented in hardware. In some embodiments, all or substantially all of the service processor 115 functionality (e.g., as discussed herein) is implemented and stored in software that can be performed on (e.g., executed by) various components in device 100. In some embodiments, it is advantageous to store or implement certain portions or all of service processor 115 in protected or secure memory so that other undesired programs (e.g., and/or unauthorized users) have difficulty accessing the functions or software in service processor 115. In some embodiments, service processor 115, at least in part, is implemented in and/or stored on secure non-volatile memory (e.g., non volatile memory can be secure non-volatile memory) that is not accessible without pass keys and/or other security mechanisms (e.g., security credentials). In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as shown in FIG. 27. In some embodiments, a secure software download embodiment also uses a secure non-volatile memory. Those of ordinary skill in the art will also appreciate that all memory can be on-chip, off-chip, on-board, and/or off-board.

In some embodiments, the policy control agent 1692 in the service processor 115 illustrated in FIG. 4 is equivalent to the policy decision point agent 1692 in the service processor 115 illustrated in FIG. 27. In some embodiments, the application interface agent 1693 in the service processor 115 illustrated in FIG. 4 is equivalent to the API & OS stack interface agent 1693 in the service processor 115 illustrated in FIG. 27.

In some embodiments, the service control link 1653 between the service device link 1691 in the service processor 115 of the mobile device 100 and the service control server link 1638 in the service controller 122A of the service provider's network provides a communication link to carry information formatted according to one or more APIs. In some embodiments, information communicated between one or more device agents in the service processor 115 of the mobile device 100 and one or more servers in the service controller 122A of the service provider's network is communicated through the service control link 1653 and is formatted according to one or more APIs. In some embodiments, the APIs assist in providing for functions as described above that use the service control link 1653, e.g., the agent heartbeat function, service policy implementations, service policy control, service policy monitoring, and service policy verification.

In some embodiments, various device agents in the service processor 115 of the mobile device 100 communicate with various servers in the service controller 122 of the service provider network through the service control link 1653 using one or more APIs. In some embodiments, the access control integrity server 1654 communicates with the access control integrity agent 1694, using one or more APIs, to collect device information on service policy, service usage, agent configuration, and/or agent behavior. In some embodiments, the access control integrity server 1654 uses information communicated through the service control link 1653, using one or more APIs, to verify integrity of service control of the mobile device 100. In some embodiments, the service history server 1650 communicates with the service monitor agent 1696, using one or more APIs, to collect service usage history. In some embodiments, the service history 1650 maintains service history information in a database (e.g., the device service history 1618 network element illustrated in FIG. 27). In some embodiments, communication between a service provider server and a network operator server uses one or more APIs. In some embodiments, the policy management server 1652 communicates with one or more agents, e.g., the policy implementation agent 1690, of the service processor 115 in the mobile device 100, using one or more APIs, to manage service usage policies, service policy settings, and/or monitor service usage. In some embodiments, the billing event server 1662 collects information from and provides information to one or more device agents in the service processer 115 of the mobile device 100, using one or more APIs, to manage service usage accounting, charging, and/or billing. In some embodiments, the billing event server 1662 is maintained by a service provider that offers services in conjunction with a network operator, e.g., as an MVNO or a third-party service partner, and the service history server 1650 communicates with one or more servers maintained by a network operator, e.g., central billing server 123, to coordinate service usage accounting, charging and billing. In some embodiments, communication between one or more servers of the service controller 122 in the service provider's network and one or more servers in the network operator's network use one or more APIs, e.g., for communication between the billing event server 1662 and the central billing server 123. As would be appreciated by a person of ordinary skill in the art, communication between network elements, e.g., servers in the service controller 122 and servers in the central provider's network, can be effected through the use of one or more APIs. In some embodiments, one or more APIs are used for the communication of information to manage and control one or more communication service functions described above. The embodiments described herein are representative and not intended to be limited. One of ordinary skill will appreciate that one or more APIs can be used to communicate information between device agents in the service processor 115 and servers in the service controller 122 to assist in providing device-assisted services as described herein. One of ordinary skill will also appreciate that one or more APIs can be used to communicate information between different network elements, e.g., servers in the service controller 122 and servers of the central service provider or of a third-party service partner, to assist in providing device-assisted services as described herein.

The system 10603 in FIG. 27 illustrates multiple elements that, in some embodiments, are included in the service processor 115 of the mobile wireless communication device 100. In some embodiments one or more device agents in the service processor 115 communicate with one or more applications resident on the mobile wireless communication device 100. In some embodiments, elements of the service processor 115 connect to one or more elements of the service controller 122 (illustrated in FIG. 27 divided into two parts 125A and 125B). In some embodiments, the service processor 115 includes an application programming interface (API) and operating system (OS) stack interface 1693 through which one or more applications on the mobile wireless communication device 100 interact with the service processor 115 to communicate with various network services and systems, including the service controller 122A/B.

In some embodiments, the potentially complex process of offering a catalog of communication services and interacting with a user of the mobile wireless communication device 100 to review, select, customize and use service plans provided by a catalog of communication service plans is simplified into a set of API commands that are easy for an application development community to learn about and use to offer applications and services. In some embodiments, as illustrated in FIG. 27, the service processor 115 includes an API and OS stack interface 1693 that provides at least a portion of the API functionality described herein. In some embodiments, the API and OS stack interface 1693 provides emulated API and/or virtual API functionality.

Advantageously, application service providers (ASPs) can be granted access to a service design center sandbox to facilitate policy and other controls within a domain in which the ASPs are authorized to do so. Such as sandbox, which is generally referred to in this paper as an ASP interface (ASPI), takes advantage of the differential policy controls that are described herein. The ASPI enables ASPs to tie access network service policy enforcement to applications. One way to classify ASPI implementations is as follows:

1) High Level Embodiment I: ASPI System with Network Destination Path Control and No Device Service Processor Client. See FIG. 35.

2) High Level Embodiment II: ASPI System with Network Destination Path Control and Device Service Processor Client. See FIG. 36.

3) High Level Embodiment III: ASPI System with Proxy/GW Server and No Service Processor Client. See FIG. 37.

4) High Level Embodiment IV: ASPI System with Proxy/GW Server and Device Service Processor Client. See FIG. 38.

5) High Level Embodiment V: See FIG. 39.

6) High Level Embodiment VI: ASPI System with Third-Party Service Distribution and Control of ASPI. See FIG. 40.

The embodiments summarized above are referred to herein as "high level embodiments." It should be understood that this is simply a useful reference and is not intended to mean that other embodiments cannot be "high level" or that descriptions of the "high level embodiments" include only "high level" components.

The various embodiments support a basic services model for distributing access services integral to applications: When a user chooses to install an app, or an OEM or carrier chooses to install an app on the device, the app comes with a predefined set of access network service plan access policy allowances bundled with the app. A network system is able to identify a specific app and associate it with the correct access network service policies for one or more of access control, charging and/or service usage notification. Different apps can have different service policies. The service payments can be embedded in the app purchase agreement or the service can be sponsored.

In some embodiments, the carrier network service policy enforcement is able to automatically classify access network connections for a specific application on a device and differentially control, charge for or notify the user about access network usage for that application.

In some embodiments, the application access network service policy enforcement is accomplished by the device and/or the device in coordination with the network or the application server. In some embodiments the application access network service policy enforcement is accomplished by the network. In some embodiments the application access network service policy enforcement is accomplished by the app server in coordination with the network. In some embodiments the app itself participates in service policy enforcement for one or more of access control policy, service accounting/charging policy, service usage notification.

Basic services model for app participation in service plan provisioning and/or policy enforcement: application communicates with, coordinates policy enforcement with or is monitored by one or more of (A) device service processor, (B) carrier network servers and/or (C) application sponsor servers to participate in access network service plan provisioning and implementation in one or more of the following areas: (i) access network service usage classification/accounting/charging, (ii) access network access control enforcement and/or traffic control policy enforcement, (iii) access network service user notification. Means are provided to verify that application is properly participating in service policy enforcement. Application may have programmable service policies that are updated by device, service controller/network or app server.

Services distribution model 1: carrier controlled/offered services. Carrier creates a business model where the application becomes an integral component of service classification, control, charging and notification. Application is integral to specialized "sponsored service plans or service plan components," and/or "application specific service plans or service plan components."

Services distribution model 2: app sponsor controlled/offered services. App developer can become "app service sponsor." App service sponsor defines the services that go with an app, agrees to a service payment deal with a carrier. Carrier provides infrastructure that allows app service sponsor to pay for app access services or include app access services as part of app purchase agreement with end user.

Services distribution model 3: app sponsor partner offered services. Partner of app sponsor works with app sponsor on "surf-out" basis. App sponsor offers user service activities that result in "surf-out" to app sponsor partners is user chooses the service activity (e.g., web site click off of sponsored service site, ad click off of sponsored service site, shopping and/or content purchase or other purchase transaction off of sponsored service site, etc.)

Services distribution model 4: app store becomes app service distributor to app sponsors-reduces or eliminates need for carrier to deal with all the app developer/sponsors, reduces or eliminates need to app developer/sponsors to create infrastructure to deal with carrier, allows app store to offer same app services across multiple carrier stores.

Carrier provides for app services via pre-load of app or app that belongs to carrier specific service plan with carrier specified policies.

Carrier provides for app services via app sponsor belonging to qualified app services program: (i) app sponsor in control of app policies (1) defined in app itself, SDC for app; (2) defined in device service processor, SDC for app settings in service processor (API from service processor to define access policies and policy state for app; service processor as primary implementer of service controls, charging; service processor allows app to control services and count, service processor monitors service policy implementation for app, counts service usage and report, detects fraud; (3) defined in app server, SDC for app server policies (proxy server/gateway function for surf-out; SDC for proxy server/gateway function). (ii) carrier bills based on usage. (iii) carrier can also over-rule app policies depending on policy state variables (active network, TOD, NBS, fraud detection, etc.). (iv) app based service policies implemented in app itself (hard to detect fraud because device and network may not know policies). (v) app based service policies are implemented on device (app certificate can come with policy list for device programming). (vi) app based service policies are implemented in network.

App store becomes main carrier partner, distributes app based service policies to individual apps in store per agreement with each app store app developer: (i) app developer does have to deal with carrier infrastructure and app store is just a conduit for disseminating app based services to app store partners. (ii) app store provider deals with carrier and app developer does not have to deal with infrastructure to work with carrier network.

Various embodiments provide for differing levels of app awareness of app based service policy enforcement and various levels of app participation in policy enforcement: (i) app awareness of app based policy enforcement is limited only limits access to specific service usage required to run app and app usage restrictions are known to device, network or app server (very useful for early adoption of app based services because app developers do not need to change app to accommodate app based services distribution models). (ii) app interacts with app based services system through API-device service processor app services API or network app services API (useful because apps do not get confused by differential access services available to different apps and apps can directly access service status information to adapt policies and implement user notification. (iii) app participates in policy enforcement for one or more of charging, access control, service status notification (useful for app developers or app sponsors to tightly control app access service policies).

Figure 35:
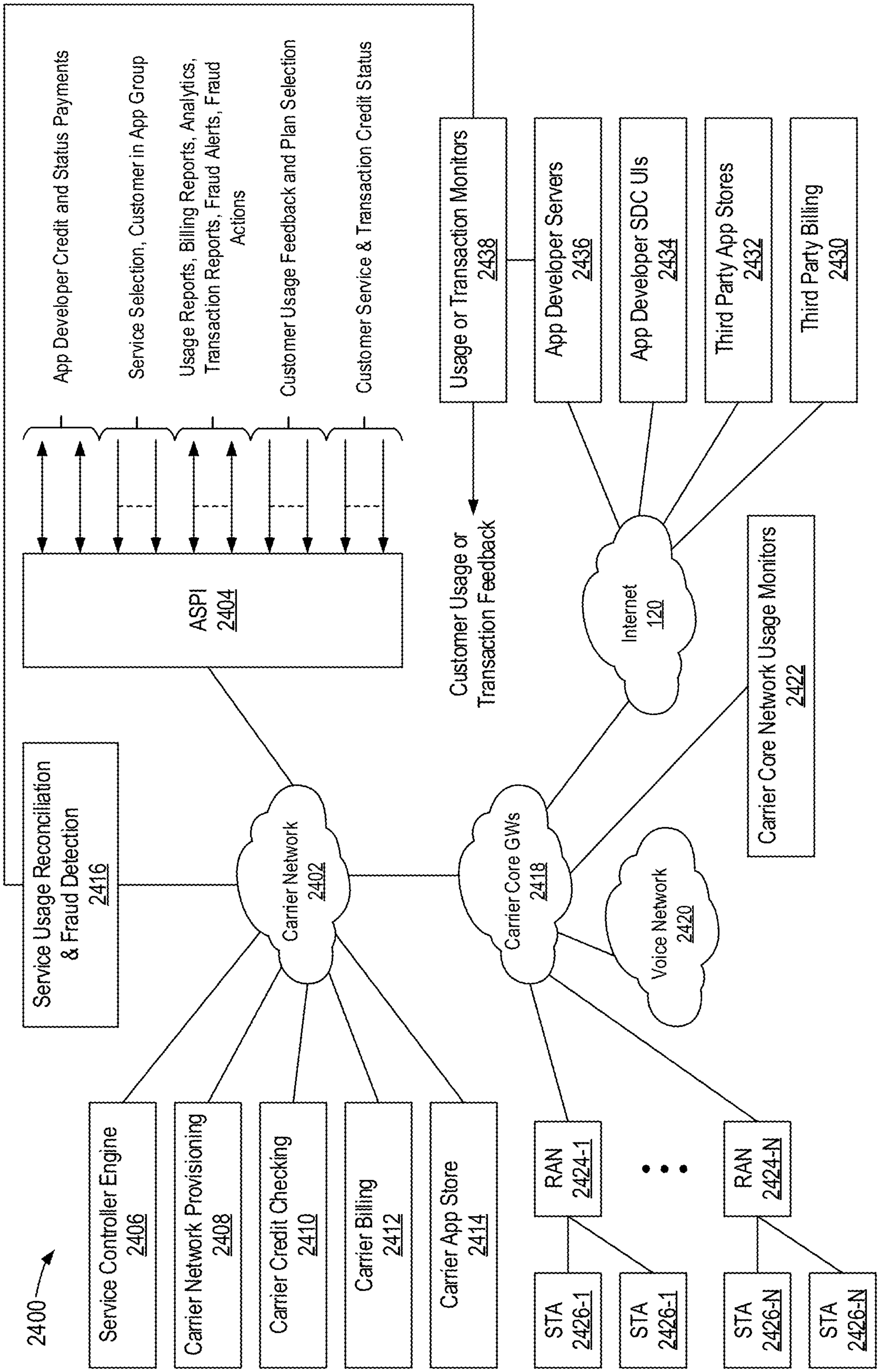
FIG. 35 depicts an example of a system implemented in accordance with High Level Embodiment I.

FIG. 35 depicts an example of a system 2400 implemented in accordance with High Level Embodiment I: ASPI System With Network Destination Path Control And No Device Service Processor Client. Techniques associated with this embodiment can be applied to an access network wherein the application services are limited to a restricted set of pre-defined network destinations that are provisioned in the access network gateway apparatus. The system 2400 includes features such as an app service provider portal for credit check & plan selection, network address provisioning (pre-defined IP address, host name, etc.), application address provisioning (pre-defined IP address, host name, etc.), a billing rate engine limited to portal configuration (plan selection), and the app service provider pays for everything that goes to their address (not just APP traffic, no APP awareness). Some drawbacks might include no general purpose Internet access, no sponsored search, no ad injection, difficult-to-implement NBS awareness and rating, centralized/scaling issues, roaming issues, different network issues (2/3/4G, and Wi-Fi), and network box hardware roadmap and service time to market issues.

In the example of FIG. 35, the system 2400 includes a carrier network 2402, an ASPI engine 2404, a service controller engine 2406, a carrier network provisioning engine 2408, a carrier credit checking engine 2410, a carrier billing engine 2412, a carrier app store engine 2414, a service usage reconciliation & fraud detection engine 2416, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, a third-party billing engine 2430, third-party app store engines 2432, app developer service design center (SDC) UI engines 2434, app developer server engines 2436, and usage or transaction monitor engines 2438.

As used herein, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 35, the carrier network 2402, in a specific implementation, is both 3G and 4G capable, and the STAs 2426 can be either 3G, 4G, or multi-mode 3G and 4G (or compatible with other RANs 2424, such as Wi-Fi). In the more general case, the carrier network 2402 could be 2G, 3G and 4G capable, or the device could be 2G, 3G and 4G capable with all or a subset of Global System for Mobile (GSM), General Packet Radio Service (GPRS), Code Division Multiple Access (CDMA) 1×, High Speed Packet Access (HSPA), Evolution Data Optimized (EVDO), Long Term Evolution (LTE) and WiMax modem capability. In a specific implementation, data flows can be assigned policy within the carrier network 2402. In this way, an ASP is able to introduce apps (with corresponding flows) that have associated policies, e.g., control, billing, and notification policies.

In the example of FIG. 35, the ASPI engine 2404 is coupled to the carrier network 2402. Advantageously, as the acronym suggests, the ASPI engine 2404 provides an interface for the ASP into the carrier network 2402.

In the example of FIG. 35, the service controller engine 2406 is coupled to the carrier network 2402. If the STAs 2426 are single mode, then 3G devices will be activated with a service profile applied to a service processor that is consistent with the 3G network capacity and speed, and 4G devices will be activated with service profiles applied to a service processor that is consistent with 4G network capacity and speed. In both cases, in a specific implementation, the service controller engine 2406 manages services for both sets of devices in accordance with some embodiments. If the devices are multimode, then a service processor can be activated with a dual mode service profile capability in which the service profile for 3G offers a similar rich set of services as the service profile for 4G but with, for example, scaled back bandwidth. For example, this approach is allows central providers to offer a richer set of service offerings with 3G and then migrate the same set of service offerings to 4G but with higher performance. In particular, this approach allows 3G to 4G rich service migration to occur, for example, with the only change being the increased bandwidth settings in the service profiles that will be available in 4G at the same cost as 3G with lower service profile bandwidth settings.

In the example of FIG. 35, the carrier network provisioning engine 2408 is coupled to the carrier network 2402. In some embodiments, temporary or permanent device credentials and other information used/required for provisioning the device are generated with apparatus located at the manufacturer or in the distribution channel. In some embodiments, the apparatus includes a local onsite server that typically shares some aspects of the provisioning information (e.g., phone number, phone number range, MEID or MEID range, SIM number or SIM number range, IP address or IP address range, MAC address or MAC address range, other secure device credential elements) with a network provisioning datastore, which, for illustrative simplicity, is considered part of the carrier network provisioning engine 2408. In some embodiments, the apparatus includes a server terminal, and the aforementioned portion of the credentials is generated by the network and shared with the local provisioning apparatus. In some embodiments, as will be discussed below, the provisioning credentials are in part generated in the network and shared with the device while it is connected online to an activation server that is coupled to the access network. Similarly, there can be activation servers connected to apparatus in the manufacturing or distribution channel that service device activation, or over the air or over the network apparatus connected to an activation server, which in turn connects to the device, can be used to accomplish activation programming of the network and device as further discussed below. For illustrative simplicity, the activation servers are considered part of the carrier network provisioning engine 2408.

In some embodiments, when a device (e.g., one of the STAs 2426) is provisioned and entered into the network provisioning datastore, it is associated with the automatic provisioning and/or activation sequence the device is intended to go through once it connects to the network or to the apparatus that will complete the process. In some embodiments, one or more device parameters (e.g., service owner, device type, OEM, plan type, IP address, security credential and/or software version) are used to determine what the appropriate network provisioning steps and/or settings are for completing the provisioning and/or activation process, and this association information is stored in the network provisioning datastore for propagation of the provisioning profiles or activation profiles to the various network equipment elements. In some embodiments, the network provisioning datastore is provided (e.g., in the network) that associates the pre-activation provisioning information (e.g., generated, as described herein, at time of manufacture, sometime during distribution, by the user on a website by a sales associate or other activation assistant, or by the network when a new device enters the automatic activation process). For example, the pre-activation provisioning information informs the network whether or not to let the device onto an activation sequence when the device attempts access, and in some cases, also instructs the network to direct the device to a specific activation sequence including, for example, an activation server (or other activation sequencing apparatus) sequence as described herein. In some embodiments, a central datastore is queried by other network equipment or the central datastore is included in one or more of the network elements (e.g., the AAA server and/or billing system, mobile wireless center, or the like), or the datastore is copied in part or in whole in various network elements (e.g., a central datastore, AAA server, mobile wireless center, billing system and/or gateways).

In some embodiments, the carrier network provisioning engine 2408 has access to the network provisioning datastore and is capable of programming the appropriate network equipment when providing the network equipment provisioning information for a given device or group of devices. In some embodiments, this network equipment is referred to as "network management" equipment or "network provisioning" equipment. In some embodiments, there are several functions that take part individually or in concert, including, for example, the AAA server, service controller engine 2406 (either with device based/assisted services through the service processor related embodiments or with network only embodiments as described herein), a mobile wireless center (e.g., including the home location register (HLR) or other similar function referred to by other industry terms), the activation server(s), other network provisioning or management equipment attached to or associated with the billing datastore system, and/or some other equipment apparatus. In some embodiments, the local datastore on the device, datastore in the AAA server and/or datastore elsewhere in network is provisioned to inform the gateway of the process for handling the pre-provisioned device according to, for example, the credentials. For example, if the device is not recognized or not authenticated onto the access network as an activated device with associated active service profile and/or service plan, the device connection or communication can be directed (or routed) to a generic activation server that provides an activation sequence that is not necessarily determined by one or more of the specific device credential elements, partial credential elements, device profile or partial device profile that define something specific about the activation sequence for the device. In another example, in which the device is not recognized or authenticated as an activated device with associated service profile and/or service plan, the device can be directed (or routed) to an activation service (or other activation sequencing apparatus) that uses some part of the credentials or range of partial credentials or a portion of a partial or complete device profile to determine a desired pre-determined device specific or device group specific activation sequence that is implemented by a specific activation service sequence or other activation sequence apparatus. In another example, in which the device is not recognized or authenticated as an activated device with associated active service profile and/or service plan, a portion of the device credentials or partial credentials can be used as a look-up index into a datastore that determines what the specific device activation sequence should be, and the device can be directed (or routed) to a specific activation server sequence or other activation sequencing apparatus.

In some embodiments, a datastore in the AAA server or datastore elsewhere in network is provisioned to inform one or more of the carrier core GW engines 2418 what to do with a pre-provisioned device according to the credentials. For example, devices can be authenticated (for activated devices), routed to activation servers (or other activation sequencing apparatus) or denied access. In some embodiments, the AAA server (and/or other network elements) provide the above discussed look-up function for the above gateway description in which a lookup datastore, locally stored or stored in a central datastore, is queried to provide secondary routing information to the specific or generic activation servers.

In some embodiments, the pre-provisioned datastore is located in the billing system. In some embodiments, the billing system accesses the pre-provisioned datastore (e.g., stored on the billing system or another network element) for the purpose of setting up temporary accounts or permanent accounts and associating those accounts with pre-activation status, activated free sponsored or activated paying customer.

In some embodiments, for zero activation, all the required pre-provisioning or programming of the above network elements, or others, is coordinated by the carrier network provisioning engine 2408 at some point after the partial or full device credentials have been associated with the device or reserved for a particular device type or service type. In some embodiments, the carrier network provisioning engine 2408 also coordinates the information to or from the device provisioning apparatus that is described elsewhere.

In view of the various alternatives described herein, it will be appreciated that many of the automated or background provisioning, activation and sponsored service embodiments described herein can be accomplished with network based approaches, device based approaches, or network/device combination/hybrid based approaches. For example, when the access control for the provisioning process is accomplished in the device (e.g., a device based approach), the activation server can be located anywhere on the Internet, and the device will ensure that the activation process is conducted with the activation server while blocking other traffic from occurring. As another example, some or all of the sponsored services provisioning programming steps become steps to program the access control, traffic control, application control, bill by account rules, and/or other aspects in a service processor or the service controller engine 2406 as described herein.

In some embodiments, the carrier network provisioning engine 2408 can be a computer located in the user's home or business, and the user or an IT manager has access to a website that provides the provisioning information, in which the computer serves, at least in part, as the carrier network provisioning engine 2408 or software programming apparatus. In some embodiments, the carrier network 2402 itself, possibly through an activation server, website or other interface to the device, becomes the carrier network provisioning engine 2408, in some cases, with the assistance of software on the device to affect the programming of provisioning information from the network or the communication of device credentials or other information to the network. For example, this software can be a background process that runs without user interaction, a portal/widget program, a web browser based program, a WAP browser based program, and/or any other program that provides a counterpart function to the network functions effecting the provisioning (e.g., activation server). In some embodiments, the activation server either initiates a specific provisioning sequence if device software is present to assist or routes to a website for manual entry if there is no software present.

Alternatively, at least a portion of the carrier network provisioning engine 2408 can be located in the manufacturing or distribution chain for the device that provides the device provisioning or partial provisioning, and any pre-activation required for the device to later activate on the network in accordance with some embodiments. A device credential, software and settings server provides a link to the network functions that generate or provide device credentials, and/or associate device credentials with activation profiles or pre-activation profiles in the network equipment (e.g., a billing system, the service controller engine 2406, the carrier core GW engines 2418, a base station of the RANs 2424, a credential generation and association server, an activation server, a service download control server and/or other network apparatus). For example, the link between the device credential, software and settings server to the central provider core network equipment can be over the Internet 120 (e.g., a secure link over the Internet) as shown or over another connection such as a leased line. The device credential, software and settings server obtains credentials or partial credentials from the network apparatus that generates them, illustrated by the credential generation & association server. The credential generation & association server need not be directly connected to the carrier core GW engines 2418, but can be located elsewhere (e.g., in another location connected by a secure Internet link). The credential generation & association server assigns credentials, or partial credentials, for use by device credential, software and settings server. When these credentials are assigned to a device, they are programmed, loaded or otherwise associated with the device by the carrier network provisioning engine 2408, which is connected to the device wirelessly or via a wire line connection.

In some embodiments, a device software loading and programming apparatus provides software loading or device settings functions that form a portion or all of the provisioning or pre-provisioning device configuration, or form a portion or all of the device activation profile configuration, or form the device service owner, master agent or VSP device assignment or signature, and in some embodiments, using an activation tracking service (ATS) system. The ATS monitors network connections and aspects of traffic that provide insight into which networks the STAs 2426 are gaining access to, in some embodiments, for the purpose of ensuring that an OEM, master agent, device service owner or VSP is being compensated for devices that activate on a service provider network. In some embodiments, the ATS agent connects to a server counterpart that records and, in some embodiments, also analyzes the service or network connection information to make a determination of the type of access service the device is receiving and, in some cases, determine which networks the device is activated on. In some embodiments, the ATS is installed on the device in a manner that makes it difficult to tamper with or remove so that the entity that is intended to get credit for device service activation does get credit (e.g., the ATS agent can be loaded into secure memory, it can be installed with software that makes it difficult to de-install, it can be installed on the modem possibly in secure memory, it can be installed in the BIOS, it can be installed deep in the OS kernel, it can be installed with one or more additional device agents that monitor the ATS agent and alert a network function or re-install it if tampered with). In some embodiments, hardware elements (e.g., a SIM security module) or hardware configurations are also installed or manipulated in the STAs 2426 and these operations and the recording of the resulting associations form a portion of the provisioning or pre-provisioning process.

In some embodiments, at the time the credentials or partial credentials are loaded, programmed, set, installed, read from the device or otherwise recorded, they are, in some cases, all associated together in a datastore that allows for later identification of the device and its appropriate provisioning and/or activation process through such associations. For example, this can involve reading device parameters such as MEID, MAC address, device type, or other information that is associated with the information being loaded or configured on the device. As discussed herein, this credential configuration and association information is stored in the network equipment responsible using it to configure the network to activate the device in one of the various embodiments disclosed herein.

Some embodiments include tying some or all of the activation provisioning steps and information settings together into a datastore that defines a higher level activation profile for a group of users(/devices), and a server is used to perform device and equipment programming for the devices in the group, including, for example, associating the following device information into the group definition: credentials, service owner or master agent, provisioning information and/or activation profile. Some embodiments further provide for this device group information being distributed to the various network equipment components required to activate the devices as discussed elsewhere. In some embodiments, this programming and device group association is accomplished using a VSP workstation server. For example, a device can be manufactured and distributed in a manner that provides flexible assignment of the device to a group that is assigned to an activation profile or a service owner.

In some embodiments, multiple activation servers can each facilitate a different device activation experience and potentially controlled by a different VSP, service owner, service provider, OEM or master agent. As discussed herein, there are several ways that a device can be routed to the proper activation server so that the device provisioning and activation process can be completed. In some embodiments, all devices that are not activated are re-directed (or routed) to an activation server that reads one or more parameters in the device credentials. The device credential information can be determined either through the device identification information associated with the access network connection itself (e.g., MEID, IP address, phone number, security credentials, or other credentials identified for a device that gains access with the network), or with the aid of the device in a pre-arranged query-response sequence. The device can then be re-directed (or routed) to the appropriate activation server for that device, device group, device service owner or VSP. In some embodiments, the same process described above can be accomplished with a single re-direction from the carrier core GW engines 2418, or another router enable network element. In some embodiments, the gateway or network element itself decodes the device credential information as described herein and performs the correct re-direct (or route) to the appropriate activation server for that device. In some embodiments, the activation server can be incorporated directly into the carrier core GW engines 2418, a base station of the RANs 2424 or other network component. In some embodiments, the activation server can be incorporated into the service controller engine 2406 or a service controller device control system.

In some embodiments, apparatus other than the activation server are used to facilitate provisioning of credentials or partial credentials, or activation, during manufacturing or device distribution, and, for example, these apparatus can augment, supplement, compliment or replace the activation server function. Such apparatus include, for example, device programming equipment (e.g., device credential provisioning apparatus, device software loading and programming apparatus or SIM inventory), equipment that is networked into a central provider, MVNO or VSP datastore (e.g., a device credential, software and settings server) to gain access to provisioning information or activation information that is programmed into a device or group of devices, or to place device credential or partial credential information in a network datastore for later recognition, or to receive or communicate security information such as certificates for devices or SIM modules that will later be used to complete provisioning or complete activation or gain access to a network. For example, these apparatus, or any other apparatus including the activation server, can be networked into a service provider network or device datastore, an MVNO network or device datastore or a VSP network or device datastore. In some embodiments, programming of the device credentials or other information associated with the service processor or device is provided, so that, for example, the device can be recognized by an activation server or similar network function at a later point in time so that provisioning or activation can be completed in an automated manner, potentially with reduced or no user involvement, that provides a provisioning or activation configuration that is in some way unique for the service provider or service provider partner, device type, user group, VSP, MVNO, master agent or other entity. In some embodiments, this programming is provided in a manner that is difficult to change without the proper authorization so that the device is properly associated with the proper "service owner" or master agent (e.g., for the purpose of activation incentive payments). For example, as discussed herein, various approaches can be applied to the device credential or other settings or software provisioning so that the settings or software are secure or protected, or so that if the software is removed, replaced or modified it is reported or replace or restored. In some embodiments, VSP control of the provisioning, partial provisioning or activation of devices is provided during manufacture or at different points in the distribution channel. As discussed herein, some of these embodiments allow the central provider to offer to service partners (e.g., VSPs, MVNOs, master agents, and/or OEMs) similar types of control for device activation experience design or device service assignment control (e.g., sometimes referred to as service provider device locking so that other service providers cannot provide primary access to the device) during the manufacturing or distribution process that are possible with devices manufactured and distributed for the central service provider.

In some embodiments, the device is provisioned before the user obtains the device with permanent credentials, temporary credentials or partial credentials. In this case, the necessary credential programming of the device occurs during manufacture, at some point in the device distribution, such as at a distribution depot or in a store, or at the point of sale or point of shipment. In some embodiments, provisioning of network information as discussed above is used, and the network information is provisioned at the same time, before or after the device information is provisioned. In some embodiments, the device provisioning information is programmed with dedicated apparatus that connects to the device either with wires or wirelessly. For example, the dedicated apparatus can be local to the location where the device is being provisioned, or it can be partially or entirely networked into a datastore or provisioning solution located elsewhere and operated by the central provider, a VSP, OEM or other entity. For example, the apparatus to program the network portions of the provisioning information can also be networked and the operators who set up the required network programming for a device or group of devices may be in the vicinity of the servers that host the provisioning and management tools or they may network into the servers. In some embodiments, provisioning system operators have full or partial control of any device provisioning equipment associated with the entity they work for (e.g., OEM, VSP or master agent) but only have remote access via secure terminal, secure website or other techniques to network into a central provider or VSP server farm in which they control or partially control the network portion of provisioning capabilities for that subset of devices that are assigned to the entity they work for with (e.g., OEM, VSP or master agent).

In some embodiments, provisioning is accomplished over the air on the mobile access network for mobile devices, or over the wired access network or WLAN connection for wired access networks, either before the user receives the device or after the user receives the device. In some cases, the device can be connected to general purpose equipment, such as a computer to perform the programming required to complete provisioning. In the cases in which the device is provisioned at point of sale or after point of sale, the device provisioning can be triggered by a user initiated sequence, or can be initiated by an automated background sequence at any time after the device is powered on. In such cases, in some embodiments, partial credentials that include information such as device type, OEM or service provider are used to assist in determining how to complete the provisioning, and the information can also include secure information, certificate or signature programmed into the partial credentials that is required for the network to perform the provisioning of the remaining credential information in the device and possibly the network. In some embodiments, any network information used/required to provision the device or service is generated at the time the partial credentials are determined rather than beforehand.

In some embodiments, the device is activated for service before the user obtains the device with permanent credentials, temporary credentials or partial credentials, or with a permanent service account or a temporary service account. For example, in this case, the necessary steps of provisioning and activating service for the device can occur during manufacture, at some point in the device distribution, such as at a distribution depot or in a store, or at the point of sale or point of shipment. In some embodiments, the steps for activating service include one or more of the following: provision the device (e.g., with permanent, temporary or partial credentials), provision the necessary network datastores and equipment to prepare them to recognize the device and associate it with the service profile and/or service plan, create or select the service account (e.g., permanent or temporary service account), select or create the service profile and/or service plan, program any elements in the device required to activate service (e.g., account ID, device aspects of the service profile and/or service plan), and program the necessary network datastores and equipment with the required associations of device credentials and service profile and/or service plan policy settings. In some embodiments, the device oriented programming portions of the service activation steps occur at the same time, before or after the network oriented programming portions of the service activation steps.

In some embodiments, the device activation information is programmed with dedicated apparatus that connects to the device via a wireless or wire line connection. For example, the dedicated apparatus can be local to the location where the device is being provisioned, or the dedicated apparatus can be partially or entirely networked into a datastore or service activation solution located elsewhere and operated by the central provider, a VSP, OEM or other entity. For example, the apparatus to program the network portions of the activation information can also be networked and the operators who set up the required network programming for a device or group of devices can be in the vicinity of the servers that host the service activation and management tools or they can network into the servers. In some embodiments, activation server tools operators have full or partial control of any device activation apparatus associated with the entity they work for (e.g., OEM, VSP or master agent) but only have remote and partial access via secure terminal, secure website or other techniques to network into the network portion of the activation tools that are controlled by the central provider or VSP. The server tools operators can be restricted in some embodiments to providing network activation information or settings only for those devices or device groups that are assigned to the entity they work for with (e.g., OEM, VSP or master agent). For example, the device control group restriction can be accomplished with a secure datastore that has secure sub-partitions for one or more entities so that they cannot impact the control of one another's network activation settings but can control their own devices. In this way, a centralized set of activation tools resources controlled by a central provider, VSP or other entity can be partitioned so that different entities can have partial or full control of the activation service definition for devices or groups of devices without impact or risk to others who share the network and activation tools resources.

In some embodiments, activation is accomplished with an over the air interface to a mobile device, or over the wired access network or WLAN connection for wired access networks, either before the user receives the device or after the user receives the device. In some cases, the device can be connected to general purpose equipment such as a computer to perform the programming required to complete activation. In the cases in which the device is activated at point of sale or after point of sale, the final device activation process can be triggered by a user initiated sequence, or can be initiated by an automated background sequence at any time after the device is powered on. In such cases, some embodiments call for a temporary service account that is used to bring the device onto the network before the user has input the information necessary to create a permanent service account. In some embodiments, a temporary or permanent service account can be applied to the device at the time the device reaches the network, and the type of account, service profile and/or service plan can be influenced (e.g., partially determined or informed) or determined by information embedded in the device credentials or partial credentials, such as device type, device ID, SIM, OEM or service provider. For example, the device credentials can also include secure information, certificate or signature that can be required by the network to perform the activation steps for temporary or permanent service account status. In some embodiments, in which the device is activated in this manner before the user information is available, or before the user has selected a pay for service plan, the service profile and service plan are set up for sponsored services as described herein.

In some embodiments, the device is activated during the manufacturing or distribution process, and then the activated device status is suspended. Once the temporary or permanent service account is set up, with appropriate service profile and/or service plan and temporary or permanent credentials, in some networks and billing systems the service can often be more easily resumed once suspended as compared to provisioning and activating the device from scratch. The device is then later resumed (or re-activated) when some event triggers the resume process, such as when it ships to the end user or when the end user attempts to use it. This process prevents the network from needing to manage credentials and accounts for devices that have been activated but are not yet on the network.

In some embodiments, provisioning is accomplished at least in part with temporary credentials in a manner which is automated and convenient for the user or device owner. In some embodiments, at least some subset of the temporary credential elements replaced at a later point in time by permanent credential elements in a manner that is also automated and convenient for the user or device owner. In some embodiments, the temporary credential set is pre-programmed into the device along with a temporary or permanent service account including service profile during the manufacturing or distribution process so that the device is activated with temporary credentials when it ships. In some embodiments, the aforementioned pre-programming is performed for the network via a secure set of server access equipment that networks into the network datastores used to define the service profile and/or the service plan. In some embodiments, a subset of the temporary credentials is recycled once it is replaced, if a temporary service account is not activated or used after some period of time, if a permanent account is not activated or used after some period of time, or if the credentials subset is revoked from the device for some other reason.

In some embodiments, more than one device is assigned one or more elements of the temporary credentials, such as the phone number, which may be limited in supply. In some embodiments, a network will accept more than one set of temporary credentials, one or more redundant elements, for two or more different devices. In some embodiments, a device that has two or more temporary credential sets, in which at least a subset of the credential elements are different for the sets, so that if one set of credentials has elements that are already being used to access the network, then one or more reserve sets can be drawn upon to gain access to the network.

In some embodiments, the temporary credentials are used to log onto the network to conduct an over the air or over the network activation process in which an activation server reads at least a portion the device credentials to determine some aspect of how the device service profile. In some embodiments, the aforementioned over the air activation process is accomplished in the background without user intervention. In some embodiments, the over the air activation process is initiated when the user first attempts to use the device or when the user first attempts to access the network or upon user request or approval. In some embodiments, the over the air activation process is initiated using a temporary service account for the device and/or network to gain access to the network. In some embodiments, the over the air activation process is initiated after the user has entered the information required to create a permanent user account into the device or into the network. In some embodiments, the user is required to enter the aforementioned user information before using the device or using some aspect of the device. In some embodiments, the temporary service account is replaced by a permanent service account some time after the user has entered the necessary information to create a permanent account into the device or network. In some embodiments, the over the air activation process is initiated using a permanent service account assignment for the device and/or network to gain access to the network.

In some embodiments, the service profile is assigned to the device and/or network during the aforementioned over the air activation to be a pay for service profile with a free trial period. In some embodiments, the service profile assigned to the device and/or network during the aforementioned over the air activation includes pre-pay, post-pay, session based pay or pay as you go options for service. As will be apparent to one of ordinary skill in the art, various embodiments disclosed herein are particularly well suited for control or pre-pay services. In some embodiments, the service profile that is assigned to the device and/or network during the aforementioned over the air activation is a sponsored service profile providing service access before all the user information is available to assign a permanent account. In some embodiments, the service profile that is assigned to the device and/or network during the aforementioned activation is a sponsored service profile providing a service upgrade selection option interface to the user. In some embodiments, the service profile that is assigned to the device and/or network during the aforementioned activation is a sponsored service profile providing transaction services to the user. In some embodiments, the service profile that is assigned to the device and/or network during the aforementioned activation is a sponsored service profile providing bill by account functionality for the network. In some embodiments, the service profile that is assigned to the device and/or network during the aforementioned activation is a sponsored service profile providing some amount of free networking or information service to entice the user to use the other sponsored services. In some embodiments, the aforementioned sponsored service is at least partially implemented with device based service activity control or control assistance. In some embodiments, the aforementioned sponsored service is at least partially implemented by gateways, routers or switches in the network that are programmed according to the sponsored service access profile for the device to implement the sponsored service policies for network access control, routing control, traffic control or service monitoring and reporting for bill by account.

In some embodiments, activation is accomplished at least in part with a temporary service account in a manner that is automated and convenient for the user or device owner. In some embodiments, at least some subset of the temporary service account is replaced at a later point in time by permanent service account subset in a manner that is also automated and convenient for the user or device owner. In some embodiments, the temporary service account settings (e.g., including the service profile settings and/or the service plan settings) are pre-programmed into the device along with a temporary or permanent credentials set during the manufacturing or distribution process so that the device is activated with temporary credentials when it ships. In some embodiments, the aforementioned pre-programming for the network is performed via a secure set of server access equipment that networks into the network datastores used to define the service profile and/or the service plan. In some embodiments, the device is suspended once it is activated but before the user is using it, and then resumed before or commensurate with the point in time that the user begins to use it. In some embodiments, some subset of the temporary service account is recycled once it is replaced, if the temporary service account is not used after some period of time, if the temporary service account is not upgraded to a permanent service account after some period of time, or if the activation is revoked from the device for some other reason. In some embodiments, more than one device is assigned to the same temporary service account. In some embodiments, a network accepts more than one device on the same temporary service account. In some embodiments, a device includes or is associated with two or more temporary service accounts, in which at least a subset of the temporary service account elements are different, so that if one account is already being used to access the network then one or more reserve accounts can be drawn upon to gain access to the network. In some embodiments, the temporary service account is associated with a temporary credentials set. In some embodiments, the temporary service account is associated with a permanent credentials set.

In some embodiments, un-activated devices are detected by the network routing equipment (e.g., service gateways or routers in hierarchical networks or base stations with embedded gateways in flat networks) and the device routing is programmed to re-direct un-activated devices to an activation server network destination. For example, the activation server can first inspect the information associated with the device to determine if the device belongs to the list of devices, device types or device groups that the network is programmed to provide access to. For example, the information used to determine this can include device type, service provider, phone number, device ID, SIM ID or configuration, secure information used to qualify the device, IP address, MAC address, user, user group, VSP, OEM, device distributor, service distributor (master agent), service processor presence or configuration, presence or configuration of other software or hardware. There can also be some activation definition information embedded in the credentials, or associated with some portion of the credentials, or programmed additionally on the device that informs the activation server as to the service profile and/or service plan and/or service account that should be established for the device. If activation information (the service profile, service plan and/or service account information) is found through association with the device credentials (e.g., device ID, phone number, IP address, MAC address, SIM or other security credentials) rather than being read directly from information embedded in the device or device credentials, then the pertinent aspects of the credentials can be used as a cross reference to look up the service plan and/or service profile information stored in a datastore networked to or within the activation server. The activation information can include information to define a wide variety of service plans and service profiles that when properly implemented on the network functions, and perhaps device if necessary, can provide for a wide range of service activity policies, service billing policies, transaction billing policies and service account types that can be associated with the device over the air or over the network.

In some embodiments, once the activation server has determined the activation information from the device or from a look up based on some aspect of the device credentials, then the activation server initiates the necessary network settings and billing datastore entries to be programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. The provisioning can be with permanent credentials or temporary credentials, and the service account that is set up may be permanent or temporary. In some embodiments, the activation process described above is completed perhaps before the user has entered some or all of the user information necessary to set up a permanent service account, and, in these cases, a temporary service account can be set up. In some cases, the activation process can be completed in the background before the user has completed an attempt to access the network and the service profile can be set up to provide sponsored services to a temporary service account. In some embodiments, the user is required to enter the information required to establish a permanent service account prior to gaining full use of the device, either on the device, on a computer or in the store, so that by the time the user begins using the device the above activation embodiments can provide for sponsored services activation with permanent account status so that the user can purchase a service upgrade or any transaction without entering any more account information.

In some embodiments, a device status is changed from a temporary service account to a permanent service account. If the device is activated with a temporary service account, and the user information is available to set up a permanent account, then if the billing system rules and interfaces allow for such, the user information can be changed from the mock information to the actual user information while maintaining the same account identifiers in the billing system. If the billing system will not allow for such, then the user information can be used to establish a new account, the device credentials can be re-associated with the new account, in some cases, after modifying one or more of the device credential parameters, and the network functions can be re-programmed as required, and, in some cases, the device can be re-programmed as required to accommodate the new permanent account.

In some embodiments, code on the device pulls a temporary or permanent set of credentials. When the credentials are pulled, the network associates the device with a sponsored service profile according to one or more of the following: embedded device information identifying device type, service owner (e.g., VSP), user group, or user, or device ID is cross referenced to a datastore that is populated some time from manufacturing time to post sale where the datastore provides information identifying device type, service owner (e.g., VSP), user group, or user. The device is then re-directed accordingly (e.g., for device based this is a matter of setting the policies or loading the software for the service processor, for the network based approach this is a matter of populating the routing tables and service profile). For example, credentials can be re-cycled after a period of time, and/or some portion of the credentials can be redundant with other devices. For example, this is essentially a dynamic service for (temporarily) assigning device credentials, and the duration of the temporary credential validity for that device ID can be time limited to give the user time to activate a real account or a free trial, session limited, or a longer duration of time that is perhaps refreshed each time the device logs on. For example, the device could also already have permanent or temporary credentials but not have a service account. The above process can be used to assign a temporary or permanent service account as well. Once the service account is assigned and the appropriate service profile is propagated to the network elements, the device can then be directed to or use the appropriate activation profile service activities or the appropriate sponsored service activities.

In some embodiments, the device is activated in the background in a manner that is virtually transparent to the user. For example, at some point in the distribution channel, the device is programmed to seek the activation server system described above as soon as it is turned on, or as soon as some other event occurs like the user using the device or the user attempting to gain access. When the pre-programmed event is triggered, the device connects to the network and the gateways or routers re-direct the device to an activation server, as discussed above. As also described herein, the activation server either derives information from the device that informs the server what service the device should be activated with, or the server derives that information from a datastore look up with a portion of the device credentials as the cross reference parameter. Once the activation server has determined the activation information from the device or from a look up based on some aspect of the device credentials, then the activation server causes all the necessary network settings and billing datastore entries to be configured/programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. For example, the provisioning can be with permanent credentials or temporary credentials, and the service account that is set up can be permanent or temporary.

In some embodiments, background activation is performed using the aforementioned activate/suspend process. At some point in the distribution channel, the device is programmed to seek to resume service as soon as it is turned on, or as soon as some other event occurs like the user using the device or the user attempting to gain access. When the pre-programmed event is triggered, the device attempts to connect to the network and the gateways or routers re-direct the device to an activation server as described herein. As also described herein, the activation server either derives information from the device that informs the server that the device is ready to resume service, or the server derives that information from a datastore look up with a portion of the device credentials as the cross reference parameter. Once the server is aware of this information, it sends a message to resume service to the billing system, or other network function that controls the suspend/resume function, and the service is resumed.

In some embodiments, background activation is performed as described below. The service processor and the credentials are pre-programmed during the manufacturing or distribution process to provide the desired service profile support and/or billing profile support for the desired initial sponsored service. As described herein, this programming can be accomplished with dedicated apparatus at the manufacturer or distribution depot. Furthermore, the party responsible for defining the service (e.g., typically the central provider, OEM, VSP, distributor or master agent) can network into the service processor programming apparatus to control service processor and/or credential programming for all or a subset or group of the devices or device types locally available. The service processor enabled device is programmed to seek the activation server system described above as soon as it is turned on, or as soon as some other event occurs like the user using the device or the user attempting to gain access. In some embodiments, the activation server is the access control server previously discussed or the access control server can act in concert with another server that performs the activation function. When the pre-programmed event is triggered, the device connects to the network and the gateways or routers re-direct the device to the activation server. As also described herein, the activation server can communicate with the service processor to verify the service processor security credentials, agents and configuration.

In some embodiments, if the activation server determines that the pre-programmed settings stored in the service processor need to be modified to provide the latest version of the desired service, or if the service processor agent software needs to be updated, then this can be accomplished prior to completing the activation process. Once the service processor configuration and settings are confirmed, the activation server causes the necessary network settings and billing datastore entries to be programmed by sending the service profile instructions to the network provisioning and activation apparatus and the service plan instructions to the billing system. Given that the service processor can perform some or much of the service activity control or control assistance, the service control options are generally larger than without the service processor, and there can be less configuration to perform for other networking equipment to complete the provisioning and activation process. The provisioning can be with permanent credentials or temporary credentials, and the service account that is set up can be permanent or temporary.

In some embodiments, pre-programming and pre-activation of devices with temporary credentials and a temporary service account are used to ship devices that are pre-activated. Given that the credentials are temporary and can be recycled when the permanent credentials are assigned, concerns about using up too many pre-assigned credentials are reduced. In embodiments in which a portion of credentials elements can be used for multiple devices, this concern is further reduced. If there is a concern about too many activated devices being assigned that are not actually active and generating service revenue, then the suspend/resume process discussed herein can be employed. In some embodiments, the temporary credentials and/or temporary account can be replaced with permanent credentials and/or account assignments at any time as follows. When a pre-programmed event in the device is triggered, then the device initiates a program that seeks the aforementioned activation server or another server that has the capability of fulfilling the device request to exchange the temporary credentials for permanent credentials and/or exchange the temporary account for a permanent account. The event that triggers the credential exchange can be the same or different than the event that triggers the service account exchange. The service account exchange can typically be triggered by the point in time that the user enters account information.

In some embodiments, the aforementioned sponsored service is partly implemented with a combination of the techniques for pre-provisioning during manufacturing or distribution and at least partially implementing the service activity control (e.g., access control, routing policy, traffic control, usage limits, and/or policy for usage limit overage) required for implementing sponsored services using the service policy provisioning capabilities in the data path gateways, routers or switches in the network. The gateways, router or switches are pre-programmed as discussed herein according to the sponsored services access profile for the device to implement the sponsored services policies for network access control, routing control, traffic control or service monitoring and reporting for bill by account. In some embodiments, the provisioning credential elements are not all pre-programmed before the device ships, but a subset of the credential elements are programmed using the activation server technique discussed herein. This over the air automated provisioning is combined with the activation server reading the device credentials to derive the service activity control settings for the gateways, routers or switches that will result in the desired sponsored services activity controls.

In some embodiments, the aforementioned sponsored service is implemented with a combination of the techniques for pre-activation during manufacturing or distribution and at least partially implementing the service activity control (e.g., access control, routing policy, traffic control, usage limits, and/or policy for usage limit overage) required for implementing sponsored services using the service policy control capabilities in the data path gateways, routers or switches in the network. The gateways, router or switches are programmed to recognize the pre-activated device credentials as discussed herein according to the sponsored service access profile for the device to implement the sponsored service policies for network access control, routing control, traffic control or service monitoring and reporting for bill by account. In some embodiments, the device activation profile and/or service account are not pre-programmed in the network and/or the device before the device ships but the activation profile and/or service account are programmed using the activation server technique discussed herein. This over the air automated provisioning is combined with the activation server reading the device credentials to derive the service profile activity control settings for the gateways, routers or switches that results in the desired sponsored services activity controls.

In some embodiment, a VSP capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and the network billing system datastore. By providing server tools that enable all these settings to be controlled (or perhaps only observed in the case of the billing system) by a secure workstation or secure website interface that networks into the equipment that programs the settings, and providing for a secure partitioning of the devices that can be controlled by a given secure workstation or secure website interface, a central provider can provide VSP services to multiple entities who all have different device and service plan combinations that they desire different flavors of sponsored services for. These techniques can also be extended beyond sponsored services to any device/service profile/service plan combo the VSP desires to create. In some embodiments, the networking equipment is implemented to secure device service group domains in which the service policies for a group of devices can be controlled. In some embodiments, the pre-provisioning and pre-activation techniques are substituted with the over the air activation server techniques discussed herein, and a secure device group partition capability is provided in the activation server as well so that the activation server device group partition control capabilities can be added to the secure device group partition control capabilities of the network gateways, routers and/or switches, the device programming tools and the billing system to form a VSP partition solution for over the air activation of various device/service plan combinations. In some embodiments, the device groups are relatively small so that beta trials of arbitrarily large or small size can be designed and implemented by defining a service control group as described above, and after fine tuning and perfecting the beta trial settings the device group can be expanded to publish the automated provisioning and activation service settings to a larger user or device group for production services.

In some embodiments, device based service activity control assistance (e.g., based on the various service processor embodiments described herein) is combined with simplified provisioning techniques described herein so that service processor enabled devices can be shipped with pre-provisioned credentials (temporary or permanent) or can obtain credentials in an automated manner that is convenient and efficient for the user or device owner. In some embodiments, the service processor embodiments in combination with the manufacturing and supply chain credentials and provisioning apparatus described elsewhere provide various approaches for provisioning pre-provisioned service processor enabled devices. In some embodiments, the service processor embodiments in combination with the activation server variants discussed above provide various approaches for over the air or over the network simplified post-sale provisioning for service processor enabled devices. For example, these embodiments can also be used for sponsored services given that as discussed herein the service processor has capability to implement service profile policies for deep control of sponsored service activity control.

In some embodiments, provisioning includes provisioning partial device credentials that include, for example, a secure certificate that is used to authorize full credential provisioning and/or activation by performing a process for a later look-up/validation of the full device credentials. For example, the look-up/validation of the full device credentials can be performed by a gateway, router or similar network device that re-directs to a provisioning server and/or activation server or other network components that either: (1) recognizes the partial credentials that serve as a reference to direct the device communication to a specific provisioning/activation server determined from the partial credentials; or (2) does not recognize the partial credentials, and directs the device communication to a less specific provisioning/activation server that is not necessarily associated with a reference to the partial credentials.

In some embodiments, if the partial device credentials (e.g., temporary or permanent credentials) are being used for provisioning, then the partial credentials are read (e.g., and/or other credentials can be looked up based on the partial credentials as described above). The device is authorized if the proper credentials and/or secure certificate is present. The device credential provisioning is then completed (e.g., using activation server commands or settings to a device based software and/or hardware element), and the credentials are, in some cases, also communicated to the various network equipment elements.

In some embodiments, if the partial device credentials are being used for activation, then partial or full device credential provisioning is performed, such as described above. A service account (e.g., temporary or permanent service account) is created or looked up based on the partial device credentials (e.g., a user account associated with the device through embedded partial or full credentials or a look up process, or based on a dynamically created/assigned temporary account associated with the device through embedded partial or full credentials). An initial service profile and, in some cases, an initial service plan (e.g., service control policy settings including a billing profile) are determined from embedded information and/or using a look up process (e.g., based on the device type and/or partial or full device credentials). The device is then programmed to enable access with the service profile and plan, and, in some cases, the various network components/elements are programmed to enable the service profile and plan, and, in some cases, proper entries in the billing system are made or confirmed, and the device credentials are, thus, activated for service.

In some embodiments, the above described provisioning and/or activation processes are performed with the provisioning server(s) and/or activation server(s) in the background with reduced, minimal or no user input required, for example, after the device is sold to the user and the user turns on the device so that by the time the user attempts to access the service using the device, the provisioning and/or activation process is already completed.

In some embodiments, device based service activity control assistance (e.g., based on the service processor embodiments) is combined with simplified activation techniques described herein so that service processor enabled devices can be shipped with pre-activated accounts (temporary or permanent), or can obtain activated account status in an automated manner that is convenient and efficient for the user or device owner. In some embodiments, the service processor embodiments in combination with the manufacturing and supply chain activation and provisioning apparatus described elsewhere provide various approaches for pre-activated service processor enabled devices. In some embodiments, the service processor embodiments in combination with the activation server variants discussed above provide various approaches for over the air or over the network simplified post-sale account activation for service processor enabled devices. These embodiments can also be used for sponsored services given that as discussed herein the service processor has capability to implement service profile policies for deep control of sponsored service activity control.

In some embodiments, the service processor can be combined with the pre-provisioning and pre-activation techniques described above to create a sponsored service solution that will work on roaming networks in which the central provider or VSP has no control or minimal control over the network elements. For example, the device includes a service processor pre-programmed for sponsored service activity control as discussed herein, and the device credentials and other settings are pre-provisioned and pre-activated for the central provider network, all of which is described in numerous embodiments disclosed herein. Provided that the service provider has a roaming agreement with other service providers, or provided that the device may gain access to the roaming network, when the device is roaming it will be capable of sponsored service connectivity with bill by account functionality and all the other features of sponsored services. Furthermore, as also discussed herein, the sponsored service activity control policies can be different for different roaming networks to accommodate the varying network costs and performance. Also, for example, it would be permissible to sign up for initial services or additional upgrade services with the central provider while roaming on the roaming partner network. One of ordinary skill in the art will appreciate that this also allows for creating a VSP or MVNO for the purpose of creating a clearing house for central provider service activations according to geography or user choice. By using a global multi-mode modem module, and maintaining service agreements with a multitude of carriers, the MVNO or VSP can provide consistent sponsored services across multiple carriers and multiple geographies while still maintaining a good degree of cost control. Using bill by account capabilities, it is also possible to have an activation agreement where a roaming service provider agrees to refund the cost of sponsored roaming.

From the sponsored service platform, the VSP or MVNO can then provide service purchase options to the user based on the carrier networks available to the device, or the VSP or MVNO can broker the user off to any of the carriers by activating the device onto the carriers main central provider service.

Accordingly, these embodiments provide flexible capabilities for activating a device or group of devices with a broad range of service profiles and service plans by simply programming the device with the proper credentials at some time during manufacturing or distribution, or simply programming a datastore associated with the network so that a portion of the device credentials can be used to look up the desired service profile and service plan. For example, various activation embodiments described herein are highly convenient for the end user and need not, in many cases, involve any human intervention.

Given the large number of embodiments just described, it should be understood that the carrier network provisioning engine 2408 can include a number of components located in a number of places. Context can be used to determine what components and where are applicable in a given case, or the location of the carrier network provisioning engine 2408 can be stated explicitly.

Referring once again to the example of FIG. 35, the carrier credit checking engine 2410 is coupled to the carrier network 2402. The carrier credit checking engine 2410 can check the credit of an ASP who logs in through the ASPI engine 2404.

In the example of FIG. 35, the carrier billing engine 2412 is coupled to the carrier network 2402. The carrier billing engine 2412 facilitates management of the level of services delivered to networked devices to provide cost effective services that match growing digital networking usage patterns. For example, access providers can move away from only billing for basic access and move toward billing for higher level service delivery with example services including rich Internet access and email, application based billing, content distribution, entertainment activities, information or content subscription or gaming. In addition, a growing number of new special purpose and general purpose networked devices are fueling demand for new service plans, for example, tailored to the new device usage models (e.g., a special service plan for an e-book reader device). The carrier billing engine 2412 takes advantage of flexible service and billing policy management solutions. In some embodiments, this includes billing for different types of service elements, such as total traffic, content downloads, application usage, information or content subscription services, people or asset tracking services, real time machine to machine information or electronic commerce transactions.

In the example of FIG. 35, the carrier app store engine 2414 is coupled to the carrier network 2402. Just as third-party app developers can make apps available in third-party app stores (described later), a carrier can make apps available in a carrier app store, possibly with components that have levels of service that are not available to third-party app developers, depending upon the amount of control that is given by the carrier to third-party app developers.

In the example of FIG. 35, the service usage reconciliation & fraud detection engine 2416 is coupled to the carrier network 2402. Service usage reconciliation & fraud detection is described in more detail below. The service usage reconciliation & fraud detection engine 2416 would make use of one or more of the later-described techniques.

In the example of FIG. 35, the carrier core GW engines 2418 are coupled to the carrier network 2402. In a specific implementation, the carrier core GW engines 2418 includes a Wi-Max core gateway, though the carrier core GW engines 2418 need not be associated with any particular protocol.

In the example of FIG. 35, the voice network 2420 is coupled to the carrier core GW engines 2418. Voice networks are relatively well-understood in the relevant art.

In the example of FIG. 35, the carrier core network usage monitors are coupled to the carrier core GW engines 2418. In some embodiments, if base station data plane traffic is transmitted via the Internet 120, then IPDRs (Internet Protocol Detail Records, also sometimes and interchangeably referred to herein as Charging Data Records or CDRs, which as used herein refer to any network measure of service usage or service activity for voice and/or data traffic (e.g., IPDRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the IPDRs can be generated by one or more of the following: base station, RAN or transport gateways and AAA. In some access network embodiments, the IPDRs are transmitted to equipment functions that aggregated the IPDRs for the purpose of service billing and other functions. Aggregation can occur in the AAA, the transport gateways or other functions including the billing system. As discussed below, it is often the case that the IPDRs is assumed to be obtained from the AAA server and/or a service usage data store (e.g., a real-time service usage collection stored in a datastore or a delayed feed service usage collection stored in a datastore), or some other network function. However, this does not imply that the IPDRs may not be obtained from a variety of other network functions, and in some embodiments, the IPDRs are obtained from other network functions as disclosed herein. In some embodiments, existing IPDR sources are utilized to obtain network based service usage measures for multiple purposes including but not limited to service policy or profile implementation verification, triggering service verification error responds actions, and service notification synchronization. Certain types of IPDRs can be based on, or based in part on, what are sometimes referred to as CDRs (Charging Data Records, which can track charges for voice and data usage) or modifications of CDRs. Although the capability to monitor, categorize, catalog, report and control service usage or service activity is in general higher on the device than it is in the network, and, as described herein, device based service monitoring or control assistance is in some ways desirable as compared to network based implementations, as described herein many embodiments take advantage of network based service monitoring or control to augment device assisted service monitoring or control and vice versa. For example, even though many embodiments work very well with minimal IPDR service usage or service activity information that is already available in a network, deeper levels of IPDR packet inspection information in general enable deeper levels of service monitoring or service control verification, which can be desirable in some embodiments. As another example, deeper levels of network capability to control service usage or service activity can provide for more sophisticated error handling in some embodiments, for example, providing for more options of the Switched Port Analyzer (SPAN) and network quarantine embodiments as described herein. As another example, in some embodiments it is advantageous to take advantage of network based service monitoring or control for those service aspects the network is capable of supporting, while using device assisted service monitoring or control for the service aspects advantageously implemented on the device.

In some embodiments, where base station data plane traffic is backhauled and concentrated in the carrier network 2402, the IPDRs can originate in a base station of the RANs 2424 or the carrier core GW engines 2418, and the IPDRs can be collected at an AAA server and stored in a service usage data store. In some embodiments, the central billing system collects the IPDRs from the AAA server for service billing accounting purposes. In some embodiments, a central billing system collects the IPDRs directly from the initial IPDR source or some other aggregator. In some embodiments, outside partners like MVNOs gain access to the IPDRs from the central billing system. In a specific implementation, the IPDRs are obtained from the AAA server and it is understood that the source of the IPDRs is interchangeable in various embodiments.

In some embodiments, the IPDR information is used by a service processor, the service controller engine 2406 and/or other network apparatus or device apparatus to implement service control verification. In some embodiments, an IPDR feed (e.g., also referred to as a charging data record (CDR)) flows between network elements. For example, an IPDR feed can flow from the RANs 2424 (e.g., SGSN, BSC packet control or RNC) and the carrier core GW engines 2418 (e.g., GGSN or PDSN). In other embodiments, the IPDRs originate and flow from a base station or some other component/element in the network. In some embodiments, one or more of these IPDR feeds is transmitted to an IPDR aggregation function (e.g., also referred to as a charging gateway). For example, this aggregation function can be located in the AAA, in a mobile wireless center (and/or in a home location register (HLR) or other similar function referred to by other common industry names), in the carrier core GW engines 2418 or in some other network element. This aggregation function collects the IPDR feeds into a datastore with an entry for each device. In some embodiments, an intermediate aggregation function is provided that feeds a higher level aggregation function, for example, the carrier core GW engines 2418 can receive IPDR feeds from the RANs 2424 or a base station before sending them to another aggregation function at the carrier core network usage monitor engines 2422. At some point in time (e.g., at the end of a specified time period, at the end of a device network connection session and/or at a specified time of day), the IPDR aggregation function sends summary information or detailed information of the IPDRs for a given device or group of devices to the billing system for billing and/or reconciliation. In some embodiments, in which the IPDR aggregation feed to the billing system is frequent enough for one or more of the IPDR information purposes described herein, the IPDR feed for the service controller engine 2406 is derived from the aggregated feed, either by having the billing system transmit it to the service controller engine 2406, or by copying it from the IPDR aggregation function.

In some embodiments, the IPDR feed is obtained from the network function that is generating or aggregating the IPDR feed as described herein. In some embodiments, the IPDR feed is copied from the aggregation function in a manner that does not interrupt the operation of the network. For example, a switch based port analysis function can be used to copy the traffic to a traffic analysis or server element that filters out the IPDR traffic and records it to a datastore that is then either pushed to the service controller engine 2406 (or any other network element that uses IPDR information as described herein), or is queried by the service controller engine 2406 (or any other function that uses the IPDR information as described herein). In some embodiments, if the aggregated IPDR information transmitted to the billing system is delayed from real-time traffic usage events by an amount of time that is, for example, too long for desired operation, or for any other reason that makes it less desirable to obtain the IPDR information from the same aggregated feed used for the billing system, the IPDR information can be collected from one or more of the sources discussed above including, for example, from another aggregation point (e.g., the feed to the charging gateway, AAA server and/or mobile wireless center/HLR), one or more of the gateways, a base station and/or another network element. In some embodiments, the IPDR feeds from these or other network functions are copied to a datastore as described above, which is either pushed or queried to get the information to the service controller engine 2406 or other network elements that request the IPDR information.

In some embodiments, at least a basic traffic monitoring or service monitoring function is performed at a base station similar to the service history records or IPDRs collected deeper in the network in more conventional hierarchical access network infrastructure architectures. For example, the service or traffic monitoring history records are advantageous for tracking device network service usage or service activity behavior and for certain verification methods for device based service policy implementation or higher device based services as discussed below. In some embodiments, a traffic monitoring function is provided in a base station in which the traffic for each device is at least counted for total traffic usage and recorded. In some embodiments, traffic inspection beyond simply counting total traffic usage is provided. For example, the base station traffic monitor can record and report IP addresses or include a DNS lookup function to report IP addresses or IP addresses and associated Uniform Resource Locators (URLs). Another example allows a base station to attach location data to the IPDR to provide device location data in the records. In some embodiments, traffic inspection includes recording deeper levels of traffic or service monitoring.

In some embodiments, a service processor and the service controller engine 2406 provide an overlay for existing networks without significantly changing the billing system, gateways/routers or other network components/elements, and also provide verifiable service monitoring to control services and/or service usage/costs without involving, for example, a service provider or MVNO (e.g., for smart phone devices and/or laptops or netbooks (or any other network accessible device) with an unlimited data plan or any other service plan). For example, applications that are deployed by device owners or service subscribers (e.g., an IT manager) and do not involve a service provider include roaming services provided as an after-market product without carrier/service provider involvement. In this example, device activity is recorded by the service processor and transmitted to the service controller engine 2406 (e.g., the IT manager controls the service controller engine 2406). In another example, a third-party after-market product is provided in which the service controller engine 2406 is hosted by the third party and the device management entity (e.g., the IT manager or parents of the device user for parental controls) uses a secure Virtual Service Provider (VSP) website to control the devices that belong to that management entity's device partition. VSP secure website techniques described herein can also be applied to service provider owned servers with device partitions for the purpose of controlling, for example, Deep Packet Inspection (DPI) controllers to provide similar or substantially equivalent service usage/control capabilities using network based service control techniques (e.g., IT manager VSP control of a group partition and/or MVNO VSP control of a group partition).

In the example of FIG. 35, the carrier core network usage monitor engines 2422 are coupled to the STAs 2426. In a specific implementation, the carrier core network usage monitor engines 2422 are implemented on a server and coupled to the STAs 2426 through the Internet 120. However, at least a portion of the carrier core network usage monitor engines 2422 can alternatively be implemented on the STAs 2426, with or without a connection to a server that includes another portion (e.g., a server portion) of the carrier core network usage monitor engines 2422.

In a specific implementation, the carrier core network usage monitor engines 2422 analyzes a subset of traffic between the STAs 2426 and a source or destination. The analyzed traffic may or may not be limited to a network segment, such as between a cellular phone and a base station. The carrier core network usage monitor engines 2422 can analyze traffic for a subset of devices in service areas of the RANs 2424. The analyzed traffic may or may not be limited to subscribers.

In a specific implementation, the carrier core network usage monitor engines 2422 include a network service usage classification engine. In a specific implementation, the network service usage classification engine is implemented on a server, which may or may not be the same server on which the carrier core network usage monitor engines 2422 is implemented. However, at least a portion of the network service usage classification engine can alternatively be implemented on the STAs 2426, with or without a connection to a server that includes another portion (e.g., a server portion) of the network service usage classification engine.

The network service usage classification engine can categorize traffic based upon the service class (e.g., conversational, streaming, interactive, background, or some other service class) requested or needed for a service. The categorization facilitates identification of a snapshot of service class use at a given time, and, in some implementations, predictions of future service class use based upon the snapshot (e.g., making an assumption that future service class use is at least somewhat related to service class use of the snapshot), historical data analysis (e.g., service class usage at certain times of day/days of the week), identification of trends, or the use of some other predictive technology.

In a specific implementation, the carrier core network usage monitor engines 2422 analyze traffic from one or more devices, including the STAs 2426, a network service usage classification engine predicts the amount of resources needed for service classes, and a differential network access control engine dynamically allocates resources on an as-needed basis to adjust the service classes that are available to the one or more devices and/or adjusts device behavior for a subset of the one or more devices or instructs a subset of the one or more devices to adjust device behavior such that the device consumes service class-specific resources in accordance with an access control policy appropriate for the resources allocated to the applicable service classes.

In the example of FIG. 35, the RANs 2424 are coupled to the carrier core GW engines 2418 and the STAs 2426 are coupled to the carrier core GW engines 2418 through the RANs 2424. The STAs 2426 will at a minimum include a processor, memory (though the memory could be implemented in the processor), a radio, and a radio interface (though the radio interface could be implemented as "part of" the radio). In order to make the STAs 2426 useful, they will typically have at least one input device and at least one output device, including input and output interfaces, if applicable. A station, as used herein, may be referred to as a device with a media access control (MAC) address and a physical layer (PHY) interface to the wireless medium that comply with, e.g., cellular standards or the IEEE 802.11 standard. A station can be described as "IEEE 802.11-compliant" when compliance with the IEEE 802.11 standard is intended to be explicit. (I.e., a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std. 802.11™-2007 (Revision of IEEE Std. 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference. In alternative embodiments, one or more of the wireless devices 2402 may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

The RANs 2424 will typically include an internetworking unit (IWU) that interconnects wireless devices on the relevant one of the RANs 2424 with another network, such as a wired LAN, and to the Internet 120 and/or the carrier core GW engines 2418. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station. The RANs 2424 can be implemented using any applicable technology, which can differ by network type or in other ways. The RANs 2424 can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The RANs 2424 can be identifiable by network type (e.g., 2G, 3G, Wi-Fi), service provider, WAP/base station identifier (e.g., Wi-Fi SSID, base station and sector ID), geographic location, or other identification criteria. The RANs 2424 may or may not be coupled together via an intermediate network. The intermediate network can include practically any type of communications network, such as, by way of example but not limitation, the Internet 120, a public switched telephone network (PSTN), or an infrastructure network (e.g., private LAN).

In the example of FIG. 35, the Internet 120 is coupled to the carrier core GW engines 2418. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 35, the third-party billing engines 2430 are coupled to the Internet 120. An ASP can receive usage billing information for each app and/or device that uses the ASP service, as is described in more detail later.

In the example of FIG. 35, the third-party app store engines 2432 are coupled to the Internet 120. An ASP can place apps using the third-party app store engines 2432, as is described in more detail later.

In the example of FIG. 35, the app developer SDC UI engines 2434 are coupled to the Internet 120. An ASP can use the app developer SDC UI engines 2434 to select or design a service plan policy set for an app group, as is described in more detail later.

In the example of FIG. 35, the app developer server engines 2436 are coupled to the Internet 120. The app developer server engines 2436 are used by the ASP to develop and/or provide services via the Internet 120.

In the example of FIG. 35, the usage or app transaction engines 2438 are coupled to the app developer server engines 2436 and the service usage reconciliation & fraud detection engines 2416. It may be noted that, depending upon the implementation, the usage or transaction monitors 2438 can be coupled to different service usage reconciliation & fraud detection engines than those of the carrier (or coupled to the carrier network 2403 through the ASPI engine 2404, or coupled to the carrier network 2402 through the Internet 120 and the carrier core GW engines 2418), but the service usage reconciliation & fraud detection engines of carriers and app developers are treated similarly, and therefore depicted as the same in the example of FIG. 35 for illustrative convenience.

Figure 36:
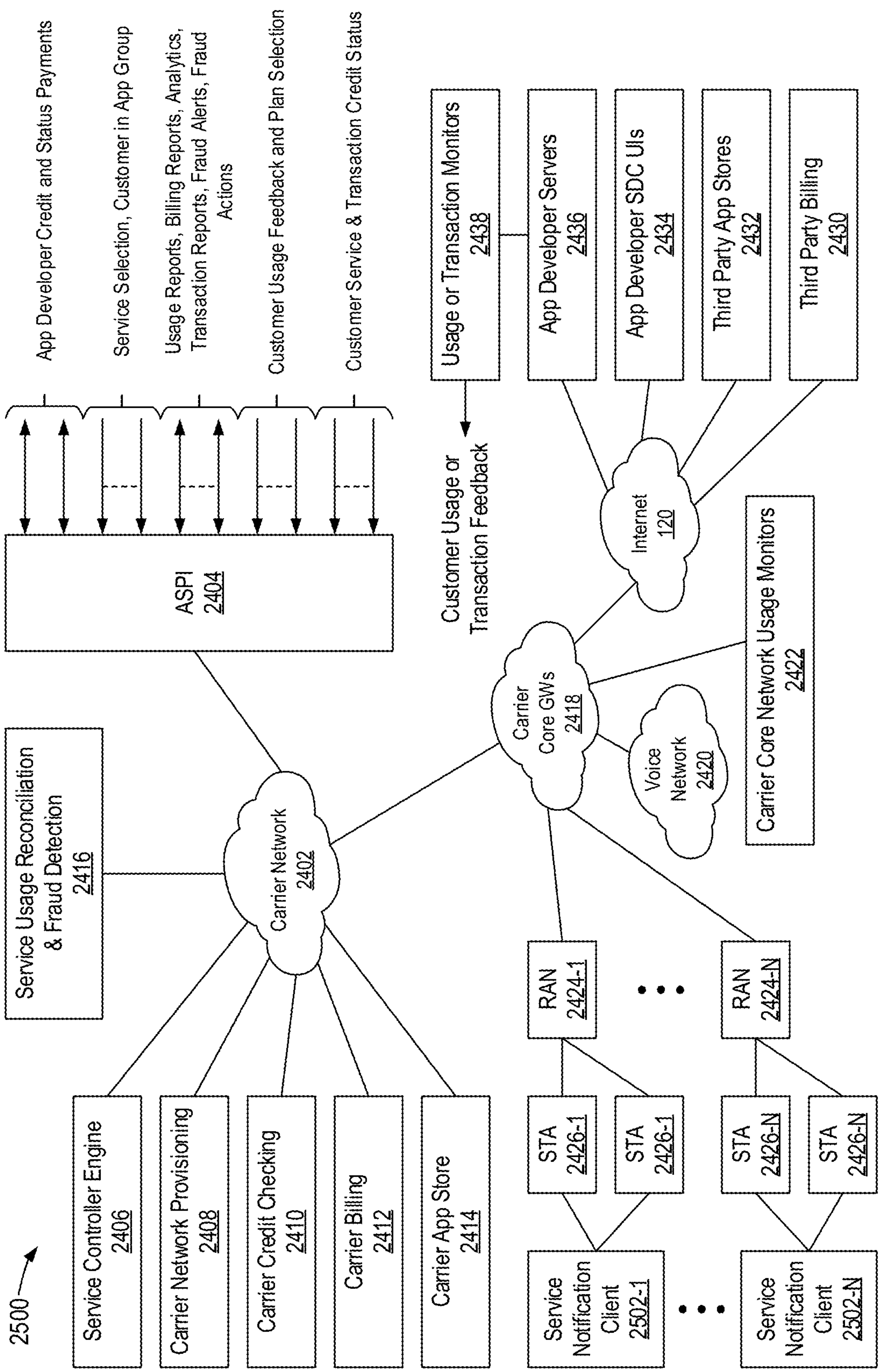
FIG. 36 depicts an example of a system implemented in accordance with High Level Embodiment II.

FIG. 36 depicts an example of a system 2500 implemented in accordance with High Level Embodiment II: ASPI System with Network Destination Path Control and Device Service Processor Client. Techniques associated with this embodiment can be applied to an access network wherein the application services are limited to a restricted set of pre-defined network destinations that are provisioned in the access network gateway apparatus and a device service processor client is included to provide one or more of the following functions: a) a real time application services status, usage or service option selection notification system for the end user; b) assistance in service usage accounting for application services; c) assistance in service usage transaction support for application services.

The system 2500 includes features such as an app service provider portal for credit check & plan selection, assignment of a unique gateway/proxy server flows to app (unique APN with SSL, secure with fraud reconciliation and/or unique tagged traffic flow, tagged (e.g., header) and secured by app, service includes fraud reconciliation), billing rate engine is limited to portal configuration (plan selection), ASP can pay only for app traffic as app can go anywhere, need to have secure login/authentication from app to GW/proxy server, could set up app API in proxy server to inform app of service status and/or allow app access to services. Some drawbacks might include no Real-time device client for notification and service plan selection, less NBS awareness and rating on device, centralized/scaling issues, roaming issues, different network issues (2/3/4G, and Wi-Fi), and network box hardware roadmap and service time to market issues.

In the example of FIG. 36, the system 2500 includes a carrier network 2402, an ASPI engine 2404, a service controller engine 2406, a carrier network provisioning engine 2408, a carrier credit checking engine 2410, a carrier billing engine 2412, a carrier app store engine 2414, a service usage reconciliation & fraud detection engine 2416, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, a third-party billing engine 2430, third-party app store engines 2432, app developer service design center (SDC) UI engines 2434, app developer server engines 2436, and usage or transaction monitor engines 2438. Changes between FIGS. 35 and 36 with respect to the above components are made for the purpose of adding a new component: service notification client engines 2502-1 to 2502-N (referred to collectively as service notification client engines 2502), which are coupled to the STAs 2426. The service notification clients 2502 enable the functionality described above with reference to FIG. 35 that relate to service processors on wireless devices.

Figure 37:
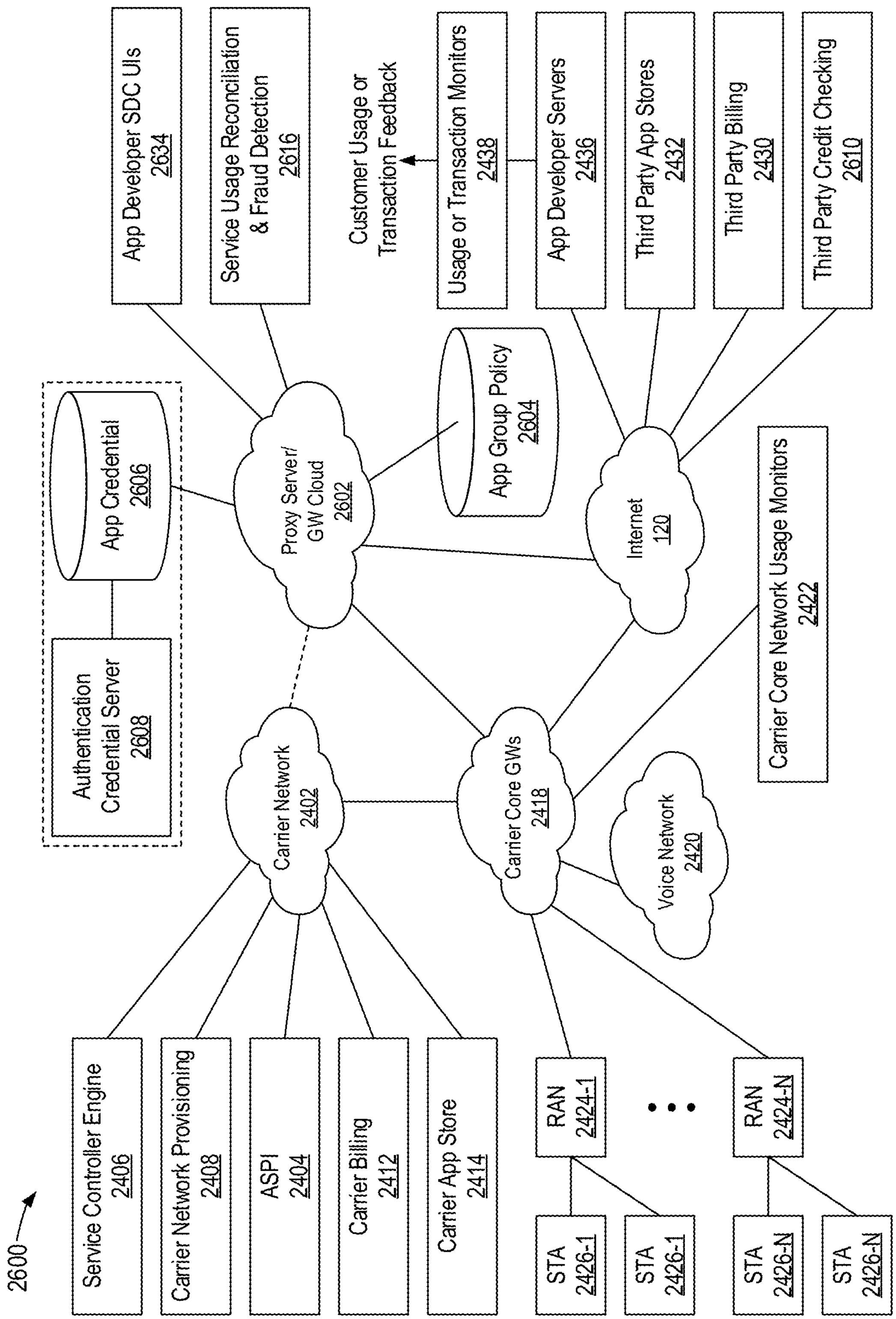
FIG. 37 depicts an example of a system implemented in accordance with High Level Embodiment III.

FIG. 37 depicts an example of a system 2600 implemented in accordance with High Level Embodiment III: ASPI System with Proxy/GW Server and No Device Service Processor Client. Techniques associated with this embodiment can be applied to an access network wherein a set of service policies that allow applications to gain access beyond pre-defined network destinations by provisioning adaptive rules in a proxy server/gateway cloud to enable an application to gain access for service policy conditions that are more sophisticated than simply allowing or blocking access based on a pre-defined list of network destinations. The system 2600 includes features such as a service controller and/or network provisioning apparatus can map ASP service plan template choices and variable service policy parameters entered through ASPI into access control and service usage accounting policies in proxy server/gateway cloud traffic processing elements, ASP can specify a service plan that allows the app to go to destinations that are less limited than with strict network destination control (e.g., use previously disclosed USPTO embodiments on associative traffic for apps, surf-out for apps, customer usage and/or transaction feedback ("good customer feedback"), etc.), app can have secure login/authentication to GW/Proxy server, can set up app API in proxy server to inform app of service status and/or allow app access to services. Some drawbacks might include no real-time device client for notification and service plan selection, less NBS awareness and rating on device, centralized/scaling issues, roaming issues, different network issues (2/3/4G, and Wi-Fi), and network box hardware roadmap and service time to market issues. In a specific implementation, the carrier can own proxy cloud and programs via ASPI. In an alternative implementation, a developer can own proxy server and programs only path to proxy through ASPI.

In the example of FIG. 37, the system 2600 includes a carrier network 2402, an ASPI engine 2404, a service controller engine 2406, a carrier network provisioning engine 2408, a carrier billing engine 2412, a carrier app store engine 2414, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, a third-party billing engine 2430, third-party app store engines 2432, app developer server engines 2436, and usage or transaction monitor engines 2438. Changes between FIGS. 35 and 37 with respect to the above components are made for the purpose of adding a new components. Note that carrier credit checking engine 2410 (FIG. 35) has been replaced with third-party credit checking engine 2610 (FIG. 37), service usage reconciliation & fraud detection engine 2416 (FIG. 35) has been replaced with service usage reconciliation & fraud detection engine 2616 (FIG. 37), and app developer SDC UI engines 2434 has been replaced with proxy/server cloud SDC UI engine 2634. New components are: a proxy server/GW cloud engine 2602, an app group policy datastore 2604, an app credential datastore 2606, and an authentication credential server engine 2608.

The proxy server/GW cloud engine 2602 can be provisioned with app service plan policies and/or billing plan policies from the app group policy datastore 2604. The proxy server/GW cloud engine 2602 can enforce policy sets in the proxy server/gateway. App credentials from the app credential datastore 2606 can be associated with a service policy to ensure the app does not change. As the name suggests, the authentication credential server engine 2608 authenticates credentials. App credentials can include, e.g., a signature or hash, or even a name (though that is not particularly secure). Advantageously, this embodiment enables, e.g., dragging an app from an app store and associating a policy with it immediately. One simply gets the credential from the app credential datastore 2606, then sucks the app down. Also, it becomes possible to associate policy with an app that is specific to an access network and secure with a credential. App usage can be broken down by network (e.g., 3G, Wi-Fi), or foreground/background, and apps can be turned on/off according to network state. Thus, it is possible to secure policy by app and by network. Userid for a subscriber might be considered secure from a network perspective. In a specific embodiment, a device ID can also be used to determine policy (e.g., Amazon is free on a Kindle, but not on a Droid). Advantageously, it becomes possible to provide a multi-sponsor system for a single device. These embodiments are described in more detail later with reference to FIG. 347.

Figure 38:
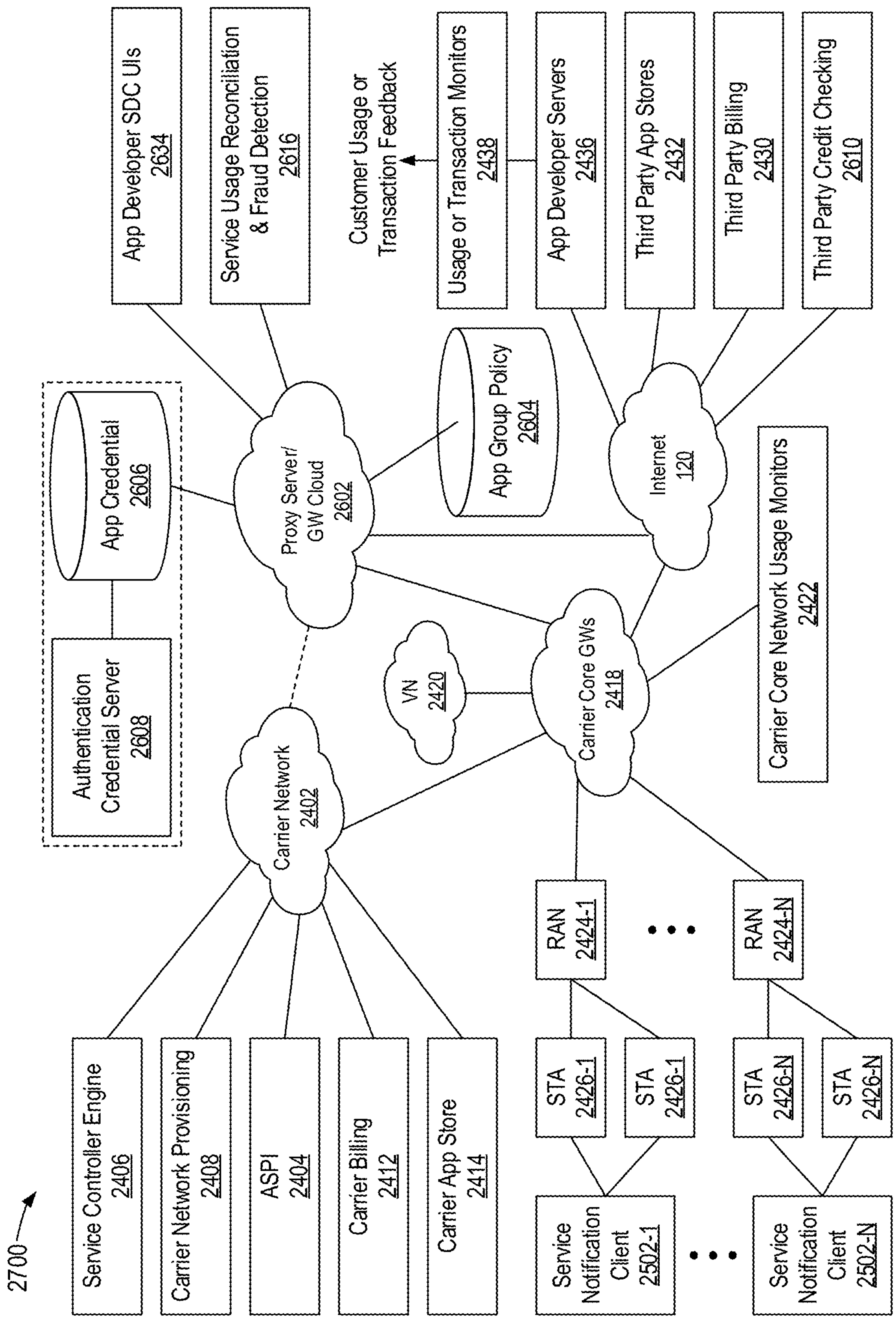
FIG. 38 depicts an example of a system implemented in accordance with High Level Embodiment IV.

FIG. 38 depicts an example of a system 2700 implemented in accordance with High Level Embodiment IV. Techniques associated with this embodiment can be applied to an access network wherein a set of service policies that allow applications to gain access beyond pre-defined network destinations by provisioning adaptive rules in a proxy server/gateway cloud in combination with a DAS device Service Processor client is included to provide one or more of the following functions: a) a real time application services status, usage or service option selection notification system for the end user; b) assistance in service usage accounting for application services; c) assistance in service usage transaction support for application services; d) assistance in service usage measurement or service transaction measurement. The system 2700 includes a combination of the features described with reference to FIGS. 36 and 37.

In the example of FIG. 38, the system 2700 includes a carrier network 2402, an ASPI engine 2404, a service controller engine 2406, a carrier network provisioning engine 2408, a carrier billing engine 2412, a carrier app store engine 2414, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, a third-party billing engine 2430, third-party app store engines 2432, app developer server engines 2436, usage or transaction monitor engines 2438, a proxy server/GW cloud engine 2602, an app group policy datastore 2604, an app credential datastore 2606, an authentication credential server engine 2608, a third-party credit checking engine 2610, a service usage reconciliation & fraud detection engine 2616, and a proxy/server cloud SDC UI engine 2634. Changes between FIGS. 37 and 38 with respect to the above components are made for the purpose of adding a new component: service notification client engines 2502-1 to 2502-N (referred to collectively as service notification client engines 2502), which are coupled to the STAs 2426, and which were described previously with reference to FIG. 36.

In a specific implementation, the service notification client engines 2502 provide for notification connection to inform a user of proxy server/gateway traffic control actions, to provide user with description of service plan configuration and capabilities, to provide user with service selection platform, to provide user with options to upgrade/downgrade/acknowledge actions or notifications, to provide user with real time usage and/or billing status, etc. Options for gateway and client communications link management and programming include the proxy server/gateway cloud engine 2602 sends service activity enforcement information messages directly to the service notification clients 2502; the service notification clients 2502 send responses directly to the proxy server/gateway cloud engine 2602; the proxy server/gateway cloud engine 2602 sends enforcement information messages to the service controller engine 2406 that then formats gateway messages into user notification messages and sends the user notification messages to the service notification clients 2502. The service notification clients 2502 send responses to the service controller engine 2406, which then formats responses into new gateway service policy commands; the service controller engine 2406 formats information messages to service notification client 2502 UI and converts client selection choices into new gateway service policy commands. In a specific implementation, a carrier can own the proxy server/GW cloud engine 2602 and programs via the ASPI 2404. In a specific implementation, a developer can own the proxy server/GW cloud engine 2602 and program the only path to the proxy server/GW cloud engine 2602 through the ASPI 2404. The service processor clients 2502 can also perform an application credential check and identity confirmation function to ensure that an app that is receiving application specific access services is the correct app version and is not another app fraudulently seeking access service (see embodiments for confirming app credentials/identity).

Figure 39:
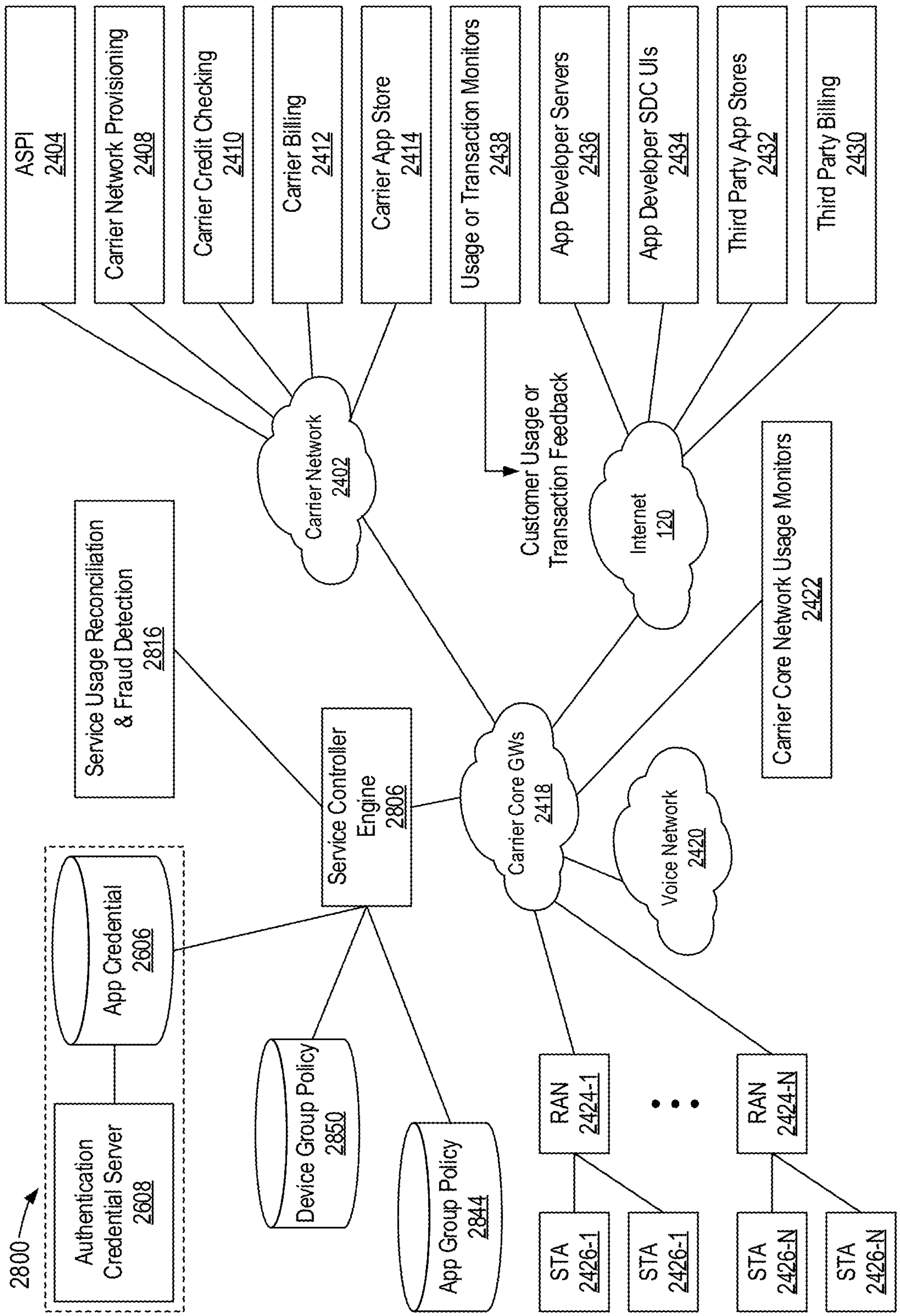
FIG. 39 depicts an example of a system implemented in accordance with High Level Embodiment V.

FIG. 39 depicts an example of a system 2800 implemented in accordance with High Level Embodiment V. Techniques associated with this embodiment can be applied to an access network wherein the network implements a device Service Processor client to implement DAS. The system 2800 includes a combination of the features described with reference to FIGS. 35 and 37, with some variations.

In the example of FIG. 39, the system 2800 includes a carrier network 2402, an ASPI engine 2404, a carrier network provisioning engine 2408, a carrier credit checking engine 2410, a carrier billing engine 2412, a carrier app store engine 2414, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, a third-party billing engine 2430, third-party app store engines 2432, app developer SDC UI engines 2434, app developer server engines 2436, usage or transaction monitor engines 2438. Changes between FIGS. 35 and 28 with respect to the above components are made for the purpose of adding a new components. Note that service controller engine 2406 (FIG. 35) has been replaced with service controller engine 2806 (FIG. 39), service usage reconciliation & fraud detection engine 2416 (FIG. 35) has been replaced with service usage reconciliation & fraud detection engine 2816 (FIG. 39), app group policy datastore 2604 (FIG. 37) has been replaced with app group policy datastore 2844 (FIG. 39), app credential datastore 2606 (FIG. 37) has been replaced with app credential datastore 2846 (FIG. 39), authentication credential server 2608 (FIG. 37) has been replaced with authentication credential server 2848 (FIG. 39). New components are a device group policy datastore 2850.

In a specific implementation, the device group policy datastore 2850 enables policy to be assigned to groups of devices (e.g., a Kindle device group gets free Amazon, but a Droid device group does not). In a specific implementation ASP interfaces with ASPI engine 2404 to do the following: applies for carrier credit in order to publish its app service; carrier credit checking engine 2410 checks ASP credit status and issues appropriate credit for the app service to go online; carrier conveys its business rules to the ASP and obtains agreement/signature before proceeding with the service offer; carrier provides service plan selection offers to the ASP to choose from; ASP provides the app credential associated with selected plan and policy-set for storage in the app credential datastore 2846; ASP can also connect to the authentication credential server engine 2848 directly to deliver the app credential; ASP selects plan, app group (app group policy datastore 2844), devices (device group policy datastore 2850) on which the app can operate, and also sets fraud parameters for carrier to notify; ASP can use app developer SDC UI engines 2434 (e.g., a web-portal interface to the carrier SDC) in order to create plans, assign policy-set, set fraud parameters and also selects if it wants to use network state information (e.g., NBS, TOD, QoS, background traffic, etc.) delivered by the device API in order to optimize app service usage; carrier provides ongoing usage reports, transaction reports, analytics, fraud detection alerts to the ASP to manage its app service; ASP can provide ad placement to carrier and/or to the app store engine 2432 for a nominal fee or in exchange for analytics; ASP provides "good customer" feedback to the carrier indicating potentially bump-up on the service usage for a given app, device credential (MEID) and potentially user credential combination.

In a specific implementation, carrier provisions the app service in its network elements: carrier configures service controller datastore (SDC) with plan selection, plan policy-set (e.g., control, charging/billing, and notification) and fraud trigger parameters; ASP can assign billing responsibility to carrier, a third-party (app store) or directly to the user. ASP informs the service controller engine 2806 of the selected app group and potentially the devices (or device groups) that the app can operate under.

In a specific implementation, carrier core network usage monitor engines 2422 and service usage reconciliation & fraud detection 2816 are run by carrier: service processor delivers ongoing app service usage reports to the service controller engine 2806; carrier network elements (GW, AAA, HA, etc.) delivers CDR/FDR to the service controller engine 2806 for used by the service usage reconciliation at the service usage reconciliation & fraud detection engine 2816; app service provider provides fraud trigger parameters; app service provider provides "good customer" feedback as the mean to overrule potential fraud and/or usage overage.

In a specific implementation the service processor performs app validation using various techniques including code signing, code hash verification and/or certificate based: app validation can be done during download, launch and/or during service usage; app validation can be done locally in SP; app validation can be done with help of SC; app validation can be done via the third-party app store engines 2432.

In a specific implementation, the service processor provides app API to inform app service with network state information such as NBS, TOD, QoS, Background traffic, etc.

In a DAS carrier embodiment, in a specific implementation, ASP is a highly restricted sponsored services partner. A small and restricted subset of SDC capabilities and screens are provided to the ASP to enable, e.g., service plan selections, service plan cycle selections, service plan billing/charging policy selections (prepay, post-pay, plan duration, etc.), fraud detection parameter settings. Carrier offers bulk (open access) plans and larger partner a la carte plans. ASP is responsible for fraud; user notification is key when credit status system protects carrier (ASP is shut down). The ASP can set up and manage app access services as follows: credit check is carried out separately by carrier (ASP receives credit for service, but cannot go beyond that credit; default for new unknown ASP can be pre-pay with guaranteed payment (e.g., wire transfer); pre-pay and/or post-pay is available for ASP); shut down ASP services for their app when they exceed their credit limit or run out of pre-pay credit; it is important to have a device notification system that explains app service is not available but device/network/other apps are fine. ASP gets real-time feedback on service usage stats and remaining credit for app groups (can also sell analytics for real-time ad and transaction optimization by ASP). Can also provide app placement options as part of what ASP pays for (highlighted in store, placed on device, placed with high visibility on device, etc.). Can also provide centralized transaction billing system and/or app store for ASP.

Additional DAS carrier embodiments include: carrier can offer ASPI for ASP service on any network even if network assets are not controlled or owned by carrier since access control and accounting are carried out by service processor in conjunction with service controller (previously, disclosed hardware secured DDR also makes this fraud resistant/proof without carrier network usage reports in real time); worldwide, Wi-Fi, 3G/4G, roaming/home, etc. (no backhaul issues); app can control its own usage and go wherever it likes: ASP services are unrestricted (not only app services allowed), any service possible with no changes to the existing APN provisioning, e.g., sponsored search with click-out, supports current Internet ad model (arbitrarily inserted reference URL to any ad server); ASP takes fraud risk for app services; graceful way to shut down ASP services and notify user when ASP gets behind on service payouts (again, device notification UI is important for making sure user understands that it is an ASP service problem, not a device service or network service problem, when the ASP runs out of credit or is shut down due to fraud events); highly scalable with zero carrier touch.

Device embodiments for verifying that app credentials belong to an app group with a specific app services access policy or service plan include: app credential checker—signature checker/hash checker for app that is part of the service processor, part of the OS or sits in secure OS execution—first fraud detection layer (confirm app signature/hash with known signature/hash stored in: service controller, download file on device, central authority); check app when it is loaded to confirm that it is the right app (possibly also check app each time it is launched and/or during app operation); report results to service controller; if app signature/hash is not correct, then suspend, kill, block app; if app signature/hash is not correct, then notify service controller.

Network embodiments for verifying that app credentials belong to an app group with a specific app services access policy or service plan include: service controller or equivalent on carrier network maintains datastore of valid signatures/hashes and corresponding service policies (distributes to device checker via push or pull, evaluates device checker hash result sent to server); app credentials datastore or equivalent maintains datastore of valid signatures/hashes and corresponding service policies (distributes to device checker via push or pull, evaluates device checker hash result sent to server).

Figure 40:
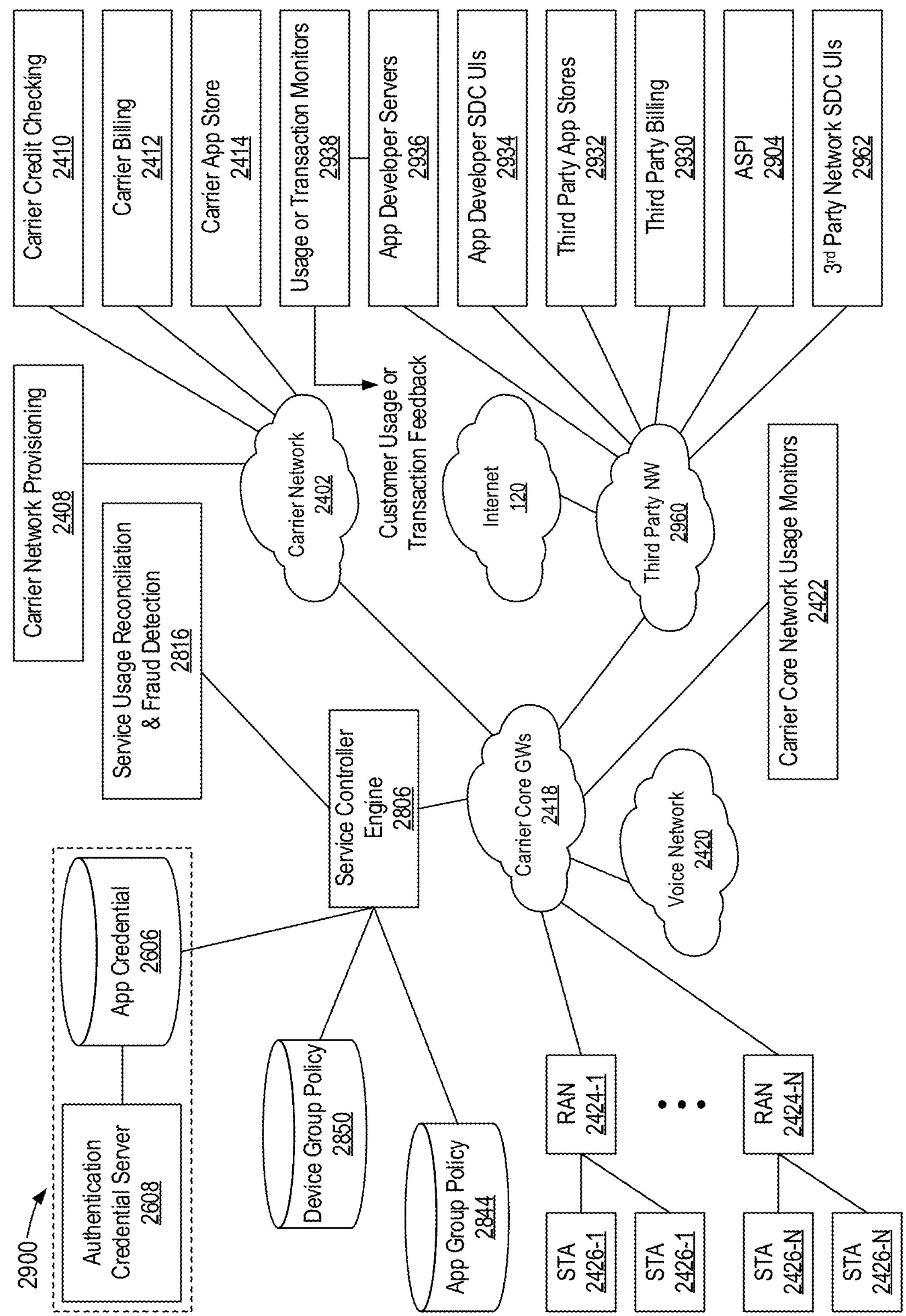
FIG. 40 depicts an example of a system implemented in accordance with High Level Embodiment VI.

FIG. 40 depicts an example of a system implemented in accordance with High Level Embodiment VI. Techniques associated with this embodiment can be applied to an access network wherein the network implements a device service processor client to implement DAS, wherein a third party (e.g., an app store provider and/or an OS system provider) provides an intermediary ASPI function to re-distribute carrier access services provided by one or more carrier networks to application service providers. The system 2900 includes a combination of the features described with reference to FIGS. 35 and 39, with some variations.

In the example of FIG. 40, the system 2900 includes a carrier network 2402, a carrier network provisioning engine 2408, a carrier credit checking engine 2410, a carrier billing engine 2412, a carrier app store engine 2414, carrier core gateway (GW) engines 2418, a voice network 2420, carrier core network usage monitor engines 2422, remote access networks (RANs) 2424-1 to 2424-N (referred to collectively as RANs 2424), wireless stations (STAs) 2426-1 to 2426-N (referred to collectively as STAs 2426), the Internet 120, an app group policy datastore 2604, an app credential datastore 2606, an authentication credential server engine 2608, a service usage reconciliation & fraud detection engine 2816. Changes between FIGS. 35/37 and 40 with respect to the above components are made for the purpose of adding a new components. Note that ASPI engine 2404 has been replaced with ASPI engine 2904, third-party billing engine 2430 with third-party billing engine 2930, third-party app store engines 2432 with third-party app store engines 2932, app developer SDC UI engines 2434 with app developer SDC UI engines 2934, app developer server engines 2436 with app developer server engines 2936, and usage or transaction monitor engines 2438 with usage or transaction monitor engines 2938. New components are a third-party network engine 2960 and third-party network SDC UI engines 2962.

The example of FIG. 40 is similar to MVNO DAS embodiments, but this embodiment extension includes an ASPI engine. In specific implementations, the system 2900 provides for third parties to create virtual networks using either proxy server/gateway approach (see, e.g., discussion with reference to FIG. 27) or DAS approach.

Example approach A: Third party owns and/or controls the proxy server/gateway cloud network, negotiates wholesale access service deal with one or more carriers who own/control access network assets, and provides ASPI interface to set up app service provider system as described herein.

Example approach B: Third party owns and/or controls the DAS service controller and service processor cloud, negotiates wholesale access service deal with one or more carriers who own/control access network assets, and provides ASPI interface to set up app service provider system as described herein.

Example third-party provider scenarios (i.e., party that provides service and is not the party that owns the access network assets): global carrier with wholesale partnerships with other carriers; app store providers (e.g., Google, Apple); OS providers (e.g., Google, Microsoft); device OEMs (e.g., Apple, RIM, Samsung, Nokia); M2M service providers (e.g., car connection services provider, vending machine connection services provider, home two-way power meter connection services provider, etc.); other third-party connection services provider.

Figure 41:
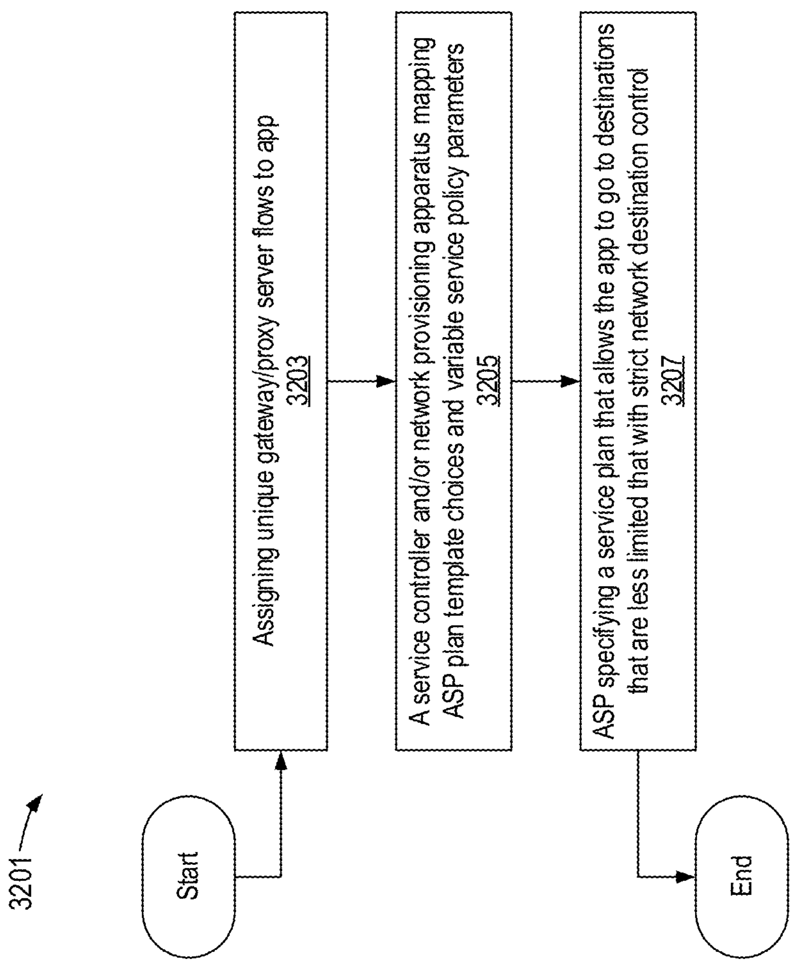
FIG. 41 depicts a flowchart of an example of a method for operating a system implemented in accordance with High Level Embodiment IV.

In the example of FIG. 41, the flowchart 3201 continues to module 3205 with a service controller and/or network provisioning apparatus mapping ASP plan template choices and variable service policy parameters. In a specific implementation, the ASP plan template choices and variable service policy parameters are entered through ASPI into access control and service usage accounting policies in proxy server/gateway cloud traffic processing elements.

In the example of FIG. 41, the flowchart 3201 continues to module 3207 with ASP specifying a service plan that allows the app to go to destinations that are less limited than with strict network destination control. For example, this can entail use of associative traffic for apps, surf-out for apps, customer usage and/or transaction feedback ("good customer feedback"), etc.

In a specific implementation, the app can have secure login/authentication to the gateway/proxy server. In a specific implementation, the app API can be set up in the proxy server to inform app of service status and/or allow app access to services. In a specific implementation, the app can have an on-device API (e.g., the app does not need to reach out to proxy for API). In a specific implementation, the method can include a secure app credential check. In a specific implementation, the method includes notifying using a notification agent for app services. It may be noted that the method for operating a system implemented in accordance with High Level Embodiment IV can do many full DAS functions, but may or may not have the following issues: lots of chatter traffic between DAS client and proxy, centralized solution/scaling issues, roaming issues, different network issues (2/3/4G, and Wi-Fi) (network box hardware roadmap and service time to market issues), and notification sequences can be long unless notification policy enforcement is fully under client control.

Figure 42:
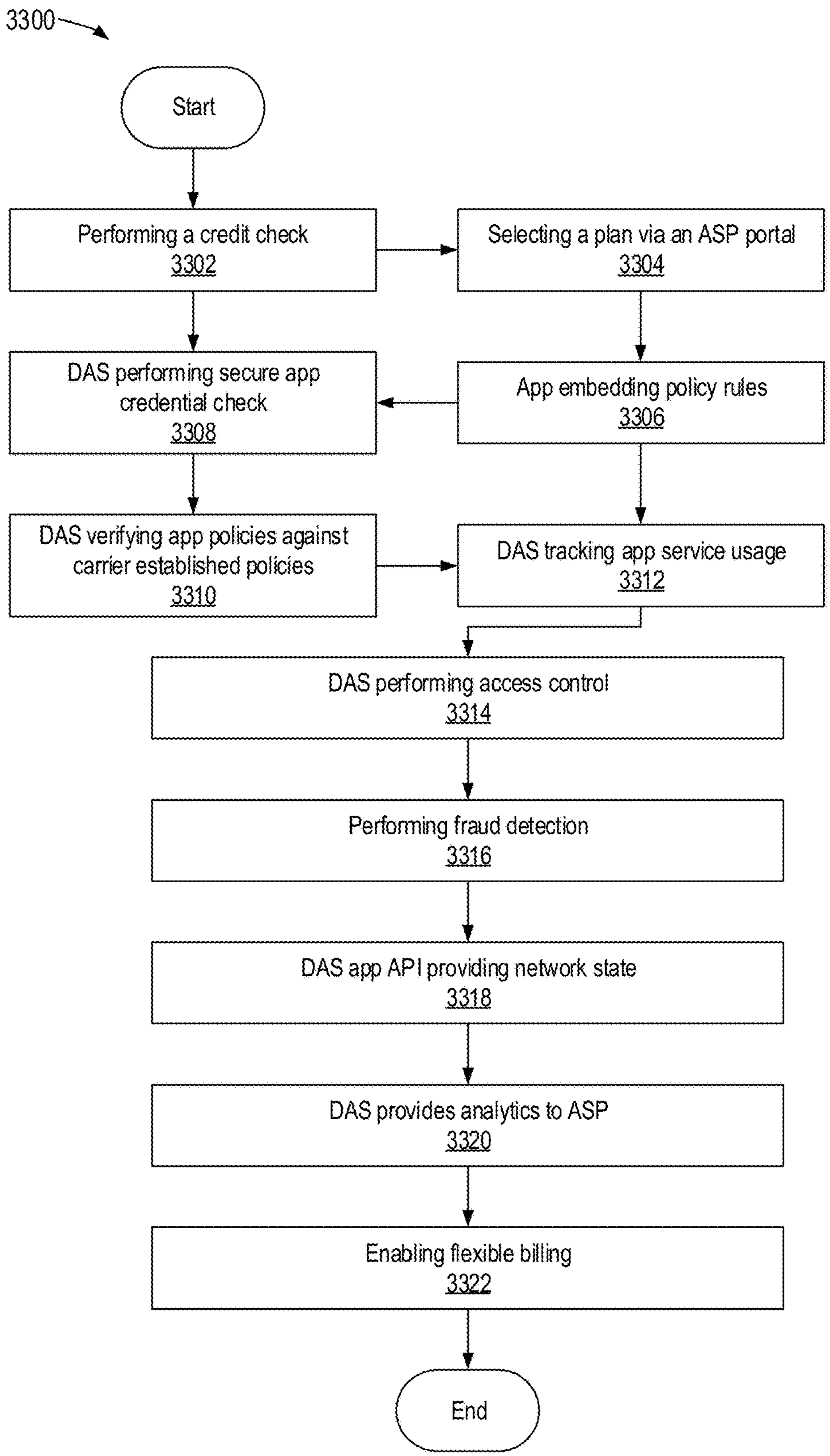
FIG. 42 depicts a flowchart of an example of a method for operating a system implemented in accordance with High Level Embodiment V.

FIG. 42 depicts a flowchart 3300 of an example of a method for operating a system implemented in accordance with High Level Embodiment V. In the example of FIG. 42, the flowchart 3300 starts with performing a credit check. The credit check may or may not be initiated through an ASP portal.

In the example of FIG. 42, the flowchart 3300 continues to module 3304 with selecting a plan via an ASP portal.

In the example of FIG. 42, the flowchart 3300 continues to module 3306 with app embedding policy rules. In a specific implementation, the policy rules are for access control, charging (e.g., charged to user account, ASP, or app sponsor), and notification UI messages.

In the example of FIG. 42, the flowchart 3300 continues to module 3308 with DAS performing secure app credential check.

In the example of FIG. 42, the flowchart 3300 continues to module 3310 with DAS verifying app policies against carrier established policies. The verification can take the form of a cross-check.

In the example of FIG. 42, the flowchart 3300 continues to module 3312 with DAS tracking app service usage.

In the example of FIG. 42, the flowchart 3300 continues to module 3314 with DAS performing access control.

In the example of FIG. 42, the flowchart 3300 continues to module 3316 with performing fraud detection. In a specific implementation, performing fraud detection can use DAS based usage measure against app usage measure, NAS based usage measure against app usage measure, and/or DAS & NAS based usage measures against app based usage measure.

In the example of FIG. 42, the flowchart 3300 continues to module 3318 with DAS app API providing network state. In a specific implementation, network states can include NBS, TOD, QoS, active networks (2/3/4G, Wi-Fi), background traffic, etc., for optimum app usage rating.

In the example of FIG. 42, the flowchart 3300 continues to module 3320 with DAS providing analytics to ASP. In a specific implementation, the analytics are provided in exchange for ad services placement or for a fee.

In the example of FIG. 42, the flowchart 3300 continues to module 3322 with enabling flexible billing. In a specific implementation, flexible billing can include carrier bill consolidation, ASP billing, or app sponsored billing.

Advantageously, in some embodiments, a method in accordance with High Level Embodiment V can provide advanced service plans, access control, usage charging, and notification on roaming networks. Secure hardware DDR embodiments strengthen fraud prevention.

Figure 43:
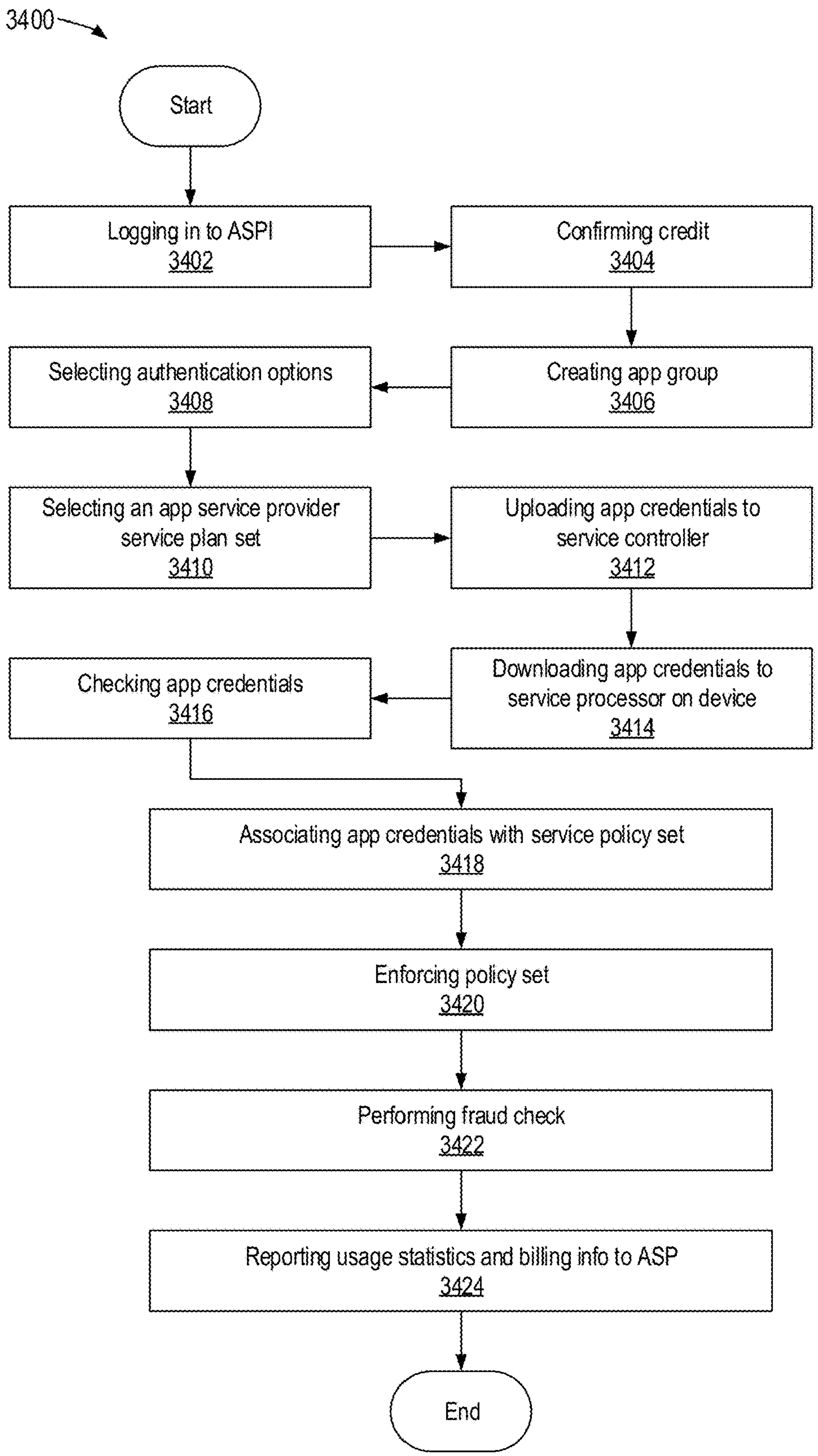
FIG. 43 depicts a flowchart of an example of a method for operating an application service provider interface (ASPI) with device assisted services (DAS).

FIG. 43 depicts a flowchart 3400 of an example of a method for operating an ASPI with DAS. In the example of FIG. 43, the flowchart 3400 starts at module 3402 with logging into the ASPI. In the example of FIG. 43, the flowchart 3400 continues to module 3404 with confirming credit. In the example of FIG. 43, the flowchart 3400 continues to module 3406 with creating an app group. In the example of FIG. 43, the flowchart 3400 continues to module 3408 with selecting authentication options. In the example of FIG. 43, the flowchart 3400 continues to module 3410 with selecting ASP service plan set. In the example of FIG. 43, the flowchart 3400 continues to module 3412 with uploading app credentials to service controller. The upload can be to a carrier network datastore.

As part of an app based service plan or service plan component, app based service policy enforcement system is assigned a set of access control policies (traffic control policies) on device. (i) app implements access control policies. (1) policies implemented by app are programmable (secure API; secure programmable policy set pushed to app or pulled by app from app server, network, device; updated by device; updated by network; updated by app server (in this case device charges app sponsor based on agreed upon usage rating rules). (2) restrict access to only those network destinations that support app (URL/domain restrictions; while list of known specific to app or known multi-use; black list; unclassified list; report list usage counts; analyze list usage counts). (3) app may be aware of various policy state variables (app determines variable state; device sets app variable state; network sets app variable state; app server sets app variable state; API informs app of variable state; active network; NB S for device measure or network measure; TOD; geographic location). (4) apply traffic controls based on destinations, content types, protocols, active network, NBS, TOD. (5) surf-out access leases (surf-out depth (number of domains, URLs, UPs/other address counts, bytes, or seconds; app counts surf-out traffic and reports for purpose of fraud detection; app determines allowed surf-out user click options (highlight on web page display or UI display, e.g., paid advertiser web site vs. general search result, organize search results or surf-out click options based on who is paying for surf-out relationship); app provides app server or websites with information identifying app based service credentials (credentials indicates that service is app based; IDs service configuration, app, app developer, app distributor, app service sponsor, carrier, device type, device/user credentials, active network, service policies, service charging information, etc.; credentials identified by header, special side channel/packet, or which server destination app goes to (e.g., SSL); web site can decide whether or not to accept access server connections and/or service access conditions, e.g., agrees to pay (sends signed credential checked by app, device, network server, or app server; pre-agreed deal to pay if web traffic is served); web site chooses optimized content for app based service configuration and/or business arrangements; web site provides good customer feedback; web site provides usage counts; web site provides transaction counts; web site provides new usage policy limits); bring back to main service UI state after lease expires (provide notification of why brought back to main service state; provide option to roll over or purchase service if user desires to continue); automatically roll-over to user bucket when lease expires (just roll over as part of service agreement; provide notification of rollover; provide option to roll over or return to main service state; provide notification of available plan purchase options if no user bucket exists or if another user choice exists); allow increased surf-out allowance based on good customer standing, e.g., surf-out points spent during surf-out access; surf-out controlled by app sponsor proxying service for surf-out lease (app server becomes proxy server for surf-out service access; proxy server first authenticates or determines app credentials or device credentials as above; proxy server can determine what rules to put in place; proxy server can account for surf-out charges to app sponsor partners; proxy server can determine what links to highlight and what links to de-emphasize or remote; proxy server can add header information (or other means) to identify that transaction is sponsored and/or to identify one or more aspects of app, device or user credentials; proxy server can inject ads or other content into web pages served back to device; proxy server can determine good customer standing; proxy server can receive good customer feedback form app sponsor partner servers to change app surf-out access policies for one or more sponsored services). (6) count service usage. (7) count content transactions to device agent, to network server, or to app server. (8) report service usage or transactions to device agent, to network server, or to app server. (9) multi-service application (count service usage and associate to correct service based on which service is being accessed—differentiate usage counts; count transactions for each service; report; self-contained service app in multi-service app; launch external service app from multi-service app either external aware app (count service usage, count transactions, report within launched app) or external app not aware (count service usage, count transactions in an agent outside of app (stack API, e.g., API replacement; stack API shim, e.g., API shim plus app wrapper to make app think it is seeing same API instructions that rest of device apps are seeing; route traffic to counter app; kernel space stack sidekick/interceptor/driver; modem bus driver agent; modem agent)).

(ii) Device implements access control policies. (1) classifies traffic by application and applies appropriate access policy rules for that application, e.g., capability to provide differential access control policies for different applications. (2) monitors app access behavior, e.g., FDRs based on domain, URL, IP, port, protocol, etc. with time stamp, NBS, active network, location, etc. (3) reports app access behavior to service controller. (4) device compares policies against behavior as a second fraud detection layer (compare FDRs to white list; known app specific destinations; known shared app destinations; compare app to black list; compare app access behaviors to known fraudulent detection patterns; cap app).

App includes design elements for an integral service usage notification system within app code. (i) app code designed to track service usage and service activity trigger events that kick off service notification sequences. (ii) carrier or app store sponsor publishes app design specs for service usage notification.

App includes design elements for an API for service processor service status updates. (i) API provides app with information that app then displays to user directly or with additional processing. (ii) device service processor sends notice of service usage or service status changes to app through API. (iii) app polls device service processor API to determine changes in service usage or service status. (iv) carrier or app store sponsor publishes service processor app based services API.

App includes design elements for an API for network based service status updates. (i) API provides app with information that app then displays to user directly or with additional processing. (ii) network sends notice of service usage or service status change to app through API. (iii) App polls network API to determine changes in service usage or service status. (iv) carrier or app store sponsor publishes app based services network API.

App includes service plan sign up or service plan upgrade or service plan change platform integral to app.

Service notification sequences and trigger events. (i) notify at a given point in service usage allowance—example activity trigger: app usage hits X % of app usage allowance for a given time window. (ii) notify app on cap—example activity trigger: usage hits app service usage allowance for given time window. (iii) notify of app usage levels, remaining service, usage velocity meter—example trigger: upon usage update from app, device service processor, secure device monitor, or network usage meter, remaining service meter and/or velocity meter are updated. (iv) notify of possible service plan changes—example triggers: if current plan does not suit app usage patterns, or if app is consistently hitting usage limits due to app usage patterns, or if app is using allowance at a velocity that is better suited to another service plan. (v) notify user of service status of app specific service—example triggers: active network change; network availability change; network congestion, performance or busy state change; roaming condition. (vi) notify user of service plan options for app specific service—example triggers: user hits service plan cap, user does not have an app service plan in effect and user attempts to use app, user requests service plan option information. (vii) notify user of billing status for app specific service. (viii) notify user when fraud is detected. (ix) notify user input on service plan sign up or changes. (x) notify user with self-help screens for access network service trouble shooting. (xi) notify user with communication to app service support resources or personnel. (xii) notify user of "good customer service credit standing". (xiii) notify of "good customer service credit building opportunities." (xiv) notify user of "good customer service credit spending opportunities."

Good customer standing to modify app policies provided by feedback from app server (good customer feedback). (i) app server identifies app/device/user credentials/service plan or plan component configuration and/or charging rules, e.g., app provides app server or websites with information identifying app based service credentials (credential indicates that service is app based; IDs service configuration, app, app developer, app distributor, app service sponsor, carrier, device type, device/user credentials, active network, service policies, service charging information, etc.; credentials identified by header, special side channel/packet, or which server destination app goes to, e.g., SSL; app server can decide whether or not to accept access service connections and/or service access conditions, e.g., app server can agree to pay (pre-agreed deal to pay for server traffic or sends signed credential checked by app, device, network server, or app server). (ii) app server can identify app access specific to service plan or plan component. (iii) app server monitors user purchases and/or transaction counts. (iv) app server monitors user activities that are beneficial to app distributor and/or other party (carrier, MVNO, 3rd party customer of app developer, etc.), e.g., purchases, sponsored usage or viewing activities, ad views, clicks, revenues, CRM data to mobile device marketing/ad platforms. (v) app server monitors usage that is detrimental to use model—can reduce caps and/or access control policy levels. (vi) API from network to app to modify app policies and/or report customer activity/standing.

Good customer standing to modify app policies provided by app. (i) same as above under app server. (ii) API between app and policy controls on device. (iii) API reports standing to app server.

Good customer standing to modify app policies provided by device monitor, e.g., same as above under app server.

Good customer standing can be applied to an individual service based on good customer activity on that particular service, or good customer activity on one or more services can be applied to some other service's good customer standing, e.g., someone who buys on line for one service may be a good customer for another service to increase access allowances since they are more likely to buy there; e.g., an app sponsor who receives good customer feedback for one service may use that credit to sponsor additional surfing for other services.

Change app caps based on good customer activity.

Change app access policy levels based on good customer activity.

Provide good customer access allowance points to app or device based on good customer activity.

Provide device user with a notification UI for good customer standing to notify of standing, remaining usage allowance, activities that user can conduct to increase good customer standing; or allow user to increase standing by using other service allowance or paying for additional allowance.

App based service accounting and charging: app is assigned a set of classification, accounting, charging and reporting policies, e.g., traffic usage classification (classify usage based on service used by app, e.g., classify multiple service app usage by each service used by app); app reports to service controller/network charging system, e.g., service controller/network charging system API; service controller/network charging system reports to app sponsor server.

App based service accounting and charging: app server is assigned a set of classification, accounting, charging, and reporting policies. (i) traffic usage classification, e.g., classify usage based on services served to app credentials, device credentials, or user credentials. (ii) app server reports to network charging system. (iii) app server keeps local records. (iv) credit system—device/user account credited for app services that are served by app server—third level of fraud detection, e.g., app can be configured to only point to app server (fraudulent traffic is not credited and is therefore charged to user account; reconciliation determines if reported app traffic being used by device does not match app server reports—signals fraud event.

App based service accounting and charging: network charging system is assigned a set of classification, accounting, charging and reporting policies, e.g., traffic usage classification based on device credentials and services communicated with a given network destination.

App based service accounting and charging: reconciliation and fraud detection. (i) compare one trusted measure vs. another measure, e.g., network vs. app; network vs. app server; network vs. device service processor; secure device vs. app; secure device vs. app server; secure device vs. device service processor; classify usage patterns by known specific to app, known used by multiple apps, unknown, black listed for app, app usage patterns for unknown, black listed usage patterns, app traffic usage vs. traffic control policies that should be in place, e.g., tag usage records by time of access, access control policy intended to be in place at that time, NBS at that time, active network at that time, location at that time, etc., e.g., device sometimes knows more of this than network or app server, so there is sometimes a need to get a second measure other than service processor or app (secure device FDR tags; secure controller NBS tests via device agent, e.g., device agent gets traffic priority for test; service controller active network testing; service controller communication with secure device agent, e.g., secure API, modem driver, modem; monitor network CDR/FDR patterns, e.g., record network measures of active network, NB S, etc. at time of CDR/FDR measurements); fraud detection methods include usage measure vs. policy that should be in place, e.g., given secure device usage reports and secure measures of network state (TOD, NBS, etc.), compare inferred access policies (e.g., destination, allow/block, speed, etc.) vs. policy that should have been in place given the service plans that are in effect at the time of usage measurement (compare usage by device vs. usage that can be credited to valid app services over a given time, e.g., monitor patterns of usage by device vs. usage that can be credited to valid app services over multiple time periods to detect consistent policy violations; compare patterns in unclassified usage reported by secure measures, e.g., consistently high levels of unclassified traffic in secure measures or insecure measures; bursty levels of unclassified traffic in secure measures or insecure measures; analyze black listed usage patterns, e.g., existence of black listed usage pattern in secure or other measure when no service plan is in place to support; usage cannot be directly correlated between the policy enforcement point and the reconciliation analysis point because there will be a certain error between one usage measure and another, e.g., provide allowance or tolerance for usage measures; usage cannot be directly compared to policy because there will be a portion of traffic that cannot be classified as accurately with one measure as it was with another measure (e.g., usage by app), e.g., provide allowance or tolerance for unclassified traffic in one or both measures). Verify app usage measure, compare app usage measure with policies that should be in place (given app report (possibly with tagging) of device usage, use second measure (e.g., trusted/secure report from network, secure device, app server) to verify app usage report; trigger fraud error if app usage report does not check out; if app usage report checks out, then use app usage report to compare inferred access policies (e.g., destination, allow/block, speed, etc.) vs. policy that should have been in place given the service plans that are in effect at the time of usage measurement; verify device measure, compare app usage measure with policies that should be in place; compare app server measure with second measure. Use app server measure as credit to user account to help eliminate fraud in app based services (user app server measure as a credit to user account, e.g., user pays for any usage above cumulative credits from app servers, e.g., paid for with debit to bulk usage account or overage payments from user). Reconciliation for carrier to app sponsor billing purposes: carrier charges app sponsor based on reconciled measures of usage; algorithm examples: choose most trusted measure of app service usage when discrepancy exists, choose lowest usage measure of app service usage when discrepancy exists, bill to, bill to user when fraud is detected). Additional network centric embodiment: app requests service through network API on device or on network, network instructs device to hash app and confirm that it is valid, provided app is valid network instructs device to let it on, and network based fraud embodiments as above.

As described above, in some embodiments, an application service provider (ASP) can interwork with a service provider to offer applications closely associated with and/or integral to one or more communication services. In some embodiments, the ASP designs services to associate with an application through a sandbox connected to a service design center, e.g., through the application developer SDC user interfaces 2434 illustrated in FIGS. 35 to 40. In some embodiments, the application developer SDC user interfaces 2434 use one or more APIs for communication through the application developer SDC user interface 2434 between an application developer system and a network element, e.g., the service design center. In some embodiments, the application service provider designs service plans, assigns and/or sets service policies, selects service plan parameters, through the application SDC user interface 2434 using one or more APIs. In some embodiments, a service provider and/or network operator provides an application service provider interface (ASPI) through which applications (and application developers) interwork with communication services provided by the service provider in association with the applications. In some embodiments, the interfaces of the ASPI illustrated in FIGS. 35 and 36 (and also provided for in FIG. 40) use one or more APIs for communication of information between the network elements of the carrier network 2402 and systems managed by the application developer. In some embodiments, the ASPI uses one or more APIs to communicate service information, customer information, service usage reports, billing information, customer usage feedback, customer credits, application developer credits, payments, transaction credits, and/or other information as illustrated in FIGS. 35 and 36 and described in the text provided herein. In some embodiments, one or more communication service management functions to support services associated with applications use one or more APIs for communication between a mobile device 100, network servers, service controllers, and/or application servers. In some embodiments, an application on the mobile device 100 interacts with application based services provided by one or more systems illustrated in FIGS. 35 to 40 and described herein through one or more APIs provided on a service processor 115 of the mobile device 100 and/or by network servers. In some embodiments, an application gains access to services and/or provides information to servers that monitor, manage and/or control services through one or more APIs, e.g., through a gateway and/or a proxy server as illustrated in FIGS. 36 and 37. In some embodiments, the service processor 115 in the mobile device 100 provides information to an application through one or more APIs, e.g., service usage information and/or network state information, which the application can use. In some embodiments, a service provider and/or network operator with which the application service provider is partnered can provide service information, service usage reports, transaction reports, analytics and/or other service information gathered and/or processed by the service provider and/or network operator, through one or more APIs, to the application service provider.

As described above, application developers and application service providers can participate in application based services, e.g., by designing and providing applications closely associated with communication services, including in some embodiments, applications that integrate more closely with communication services management, service plans, service policies, service control, and/or service policy decision making, and service policy enforcement. In some embodiments, applications and service plans are designed and associated together and offered through a communication service marketplace, e.g., through a service design center in conjunction with one or more network servers and/or third-party service partner servers that communicate with mobile devices 100. In some embodiments, the application based service plans are designed through the service design center using one or more APIs. In some embodiments, the applications communicate through a service processor 115 in the mobile device 100 to network elements, servers and/or gateways and accompanying databases, and/or to third-party service partner systems, e.g., servers and databases attached thereto, using one or more APIs. In some embodiments, communication by the application developers with the service design center is through one or more APIs. In some embodiments, communication service management by an application on a mobile device 100 uses one or more APIs to communicate with one or more network elements and/or third-party systems.

As would be understood by a person of ordinary skill in the art, the use of APIs for communicating information within mobile devices, between mobile devices and network elements, between network elements, and between devices/network elements and third-party service partner systems is not limited to the specific descriptions provided herein, and the use of APIs can apply to many other combinations of devices, network elements and third-party systems. In some embodiments, one or more APIs can assist in providing information through one or more of the user interfaces illustrated in FIGS. 35 to 40 and 41 to 43 above. In some embodiments, one or more APIs can assist in communicating information between different systems, servers and or devices illustrated in FIGS. 35 to 40 and 41 to 43. In some embodiments, one or more APIs can assist in providing communication service management functions as described above for FIGS. 35 to 40 and 41 to 43.

Figure 44:
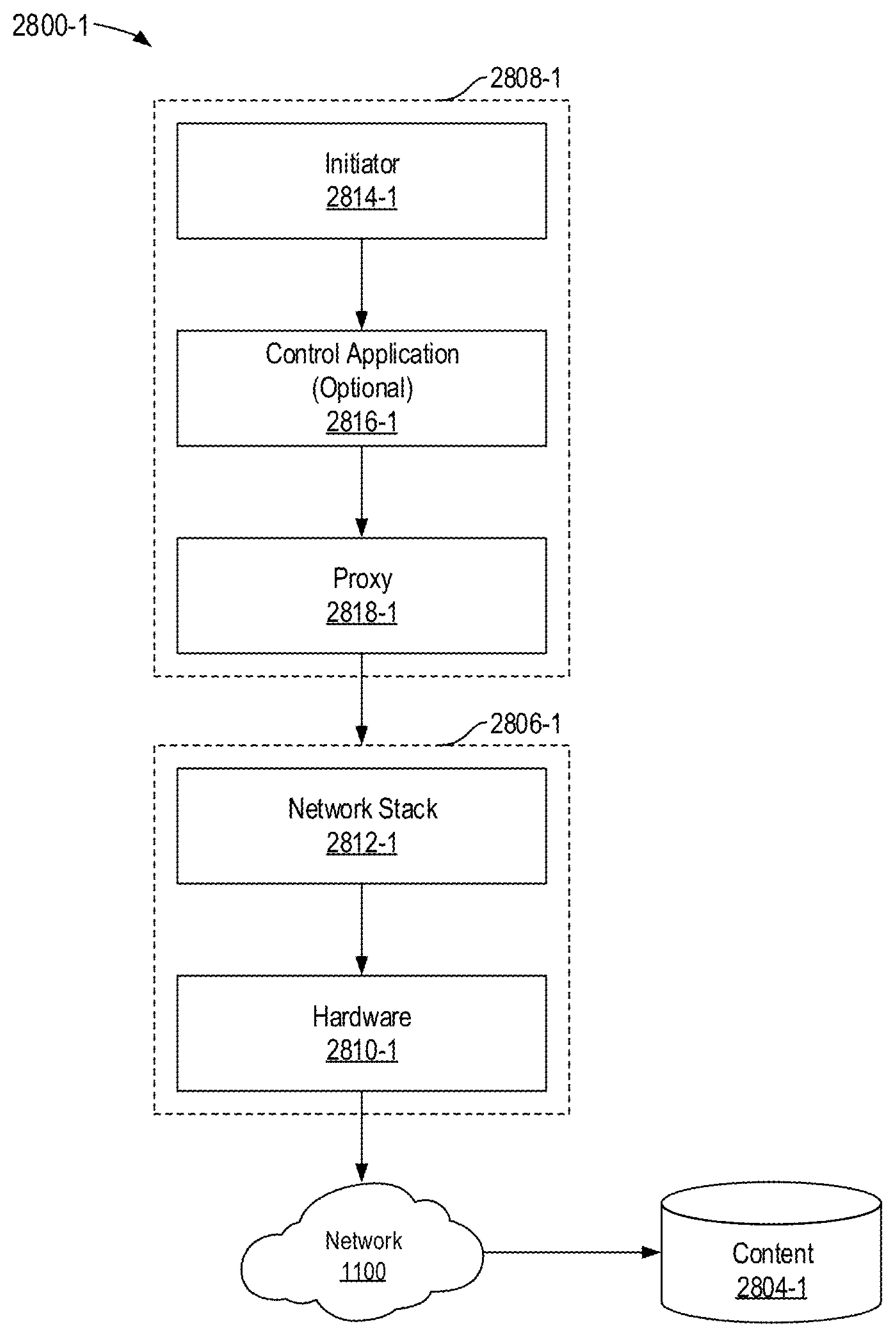
FIG. 44 depicts an example of a system for flow tracking.

FIG. 44 depicts an example of a system 2800-1 for flow tracking. In the example of FIG. 44, the system 2800-1 includes a network 1100, a content datastore 2804-1, a network element 2806-1, and a service policy implemented device 2808-1.

In the example of FIG. 44, the network 1100 is intended to include an applicable communications network such as the Internet, a public switched telephone network (PSTN), an infrastructure network (e.g., private LAN), or some other network that is capable of acting as a link between the various components depicted in FIG. 348. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). A PSTN can include wired or wireless (e.g., 4G/3G/2G) network operated by, for example, a central provider. An infrastructure network that offers wireless connectivity can include wired and wireless devices in communication with wireless access points (WAPs). The wired and wireless devices can include various network equipment including by way of example but not limitation a cable network head end, a DSL network DSLAM, a fiber network aggregation node, and/or a satellite network aggregation node.

The network 1100, if it includes a wireless network, will typically include an internetworking unit (IWU) that interconnects wireless devices on the network 1100 with another network, such as a wired LAN on the network 1100. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station. The network 1100 can be implemented using an applicable technology, which can differ by network type or in other ways. The network 1100 can include networks of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. Networks can be identifiable by network type (e.g., 2G, 3G, Wi-Fi), service provider, WAP/base station identifier (e.g., Wi-Fi SSID, base station and sector ID), geographic location, or other identification criteria.

In the example of FIG. 44, the network 1100 is coupled to the content datastore 2804-1. The content datastore 2804-1 is intended to illustrate any applicable content that is accessed by the service policy implemented device 2808-1. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 44, the network element 2806-1 is coupled to the network 1100 and includes hardware 2810-1 and a network stack 2812-1. In operation, the network stack 2812-1 can be implemented as an engine on the hardware 2810-1. As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 44, the service policy implemented device 2808-1 is coupled to the network element 2806-1. As the name suggests, the service policy implemented device 2808-1 has an implemented service policy. Cellular phones often have implemented service policies, such as those described previously herein, but the service policy implemented device 2808-1 need not necessarily be limited to a cellular phone implementation. In an embodiment, the service policy implemented device 2808-1 includes any applicable computing device on which a service policy is implemented. The service policy implemented device 2808-1 can implement device-assisted services as described in this paper.

The service policy implemented device 2808-1 includes an initiator 2814-1, an optional control application 2816-1, and a proxy 2818-1. In operation, the initiator 2814-1, optional control application 2816-1, and proxy 2818-1 can be implemented as engines. In an instance and/or embodiment in which the optional control application 2816-1 is not present, the initiator 2814-1 can invoke the proxy 2818-1 through, e.g., a media service API. Where the optional control application 2816-1 is not necessary, the initiator 2814-1 will typically include an app that is capable of its own rendering or control. The optional control application 2816-1 can include a rendering or control application that invokes the proxy 2818-1 on behalf of the initiator 2814-1. This can be useful for a requesting app that does not include rendering or control capabilities, such as an audio file. In this particular example, the optional control application 2816-1 can include a media player that has been registered to handle attempts to certain audio files, much like a program on a personal computer can be registered to handle files of certain types (e.g., on a personal computer, an attempt to open a Word document results in launching Microsoft Word to open the Word document because Microsoft Word has been registered to handle files of that type on the personal computer). Proxies 2818-1 can include download, media (e.g., streaming audio, streaming video, etc.), VoIP, instant messaging (IM), video conference/IM (including, e.g., a 2-way video client), backup, or other managers/services.

In operation, traffic can be tagged at various points. For example, traffic can be tagged at an activity stack between the initiator 2814-1 and the optional control application 2816-1. As another example, traffic can be tagged at a manager/service API between the optional control application 2816-1 and the proxy 2818-1 (or in an instance or embodiment that does not include the optional control application 2816-1, at a manager/service API between the initiator 2814-1 and the proxy 2818-1). As another example, traffic can be tagged at a network interface between the proxy 2818-1 and the network stack 2812-1.

The example of FIG. 44 will now be used to illustrate a specific implementation with reference to actual apps by name by way of example, but not limitation. An initiator (skysport) triggers a control application (HTC player) to utilize a proxy (media service). The activity stack and API data from the HTC player are provided to a classification and enforcement engine. The technique used to obtain traffic information for the purpose of tagging can be by, for example, a hook, call-back, injection point, broadcast receiver, intent filter, or some other applicable mechanism. In this way, traffic from a thread that is identified as that of the media server can be attributed to skysport, and appropriate policy (e.g., traffic control, notification, and billing) can be enforced. Similarly, traffic from a thread that is identified as that of HTC player can be attributed to skysport and appropriate policy can be enforced.

After tagging a flow, it may be desirable to act on the flow in various ways related to the relevant service policy. For example, a mobile data limit can be set. Advantageously, it is possible to go to each app to restrict background and/or foreground data. It is also possible to disable background for a device across the board. Because of the way the flow is tagged, an app will not even be aware of restrictions to, e.g., background data.

Figure 45:
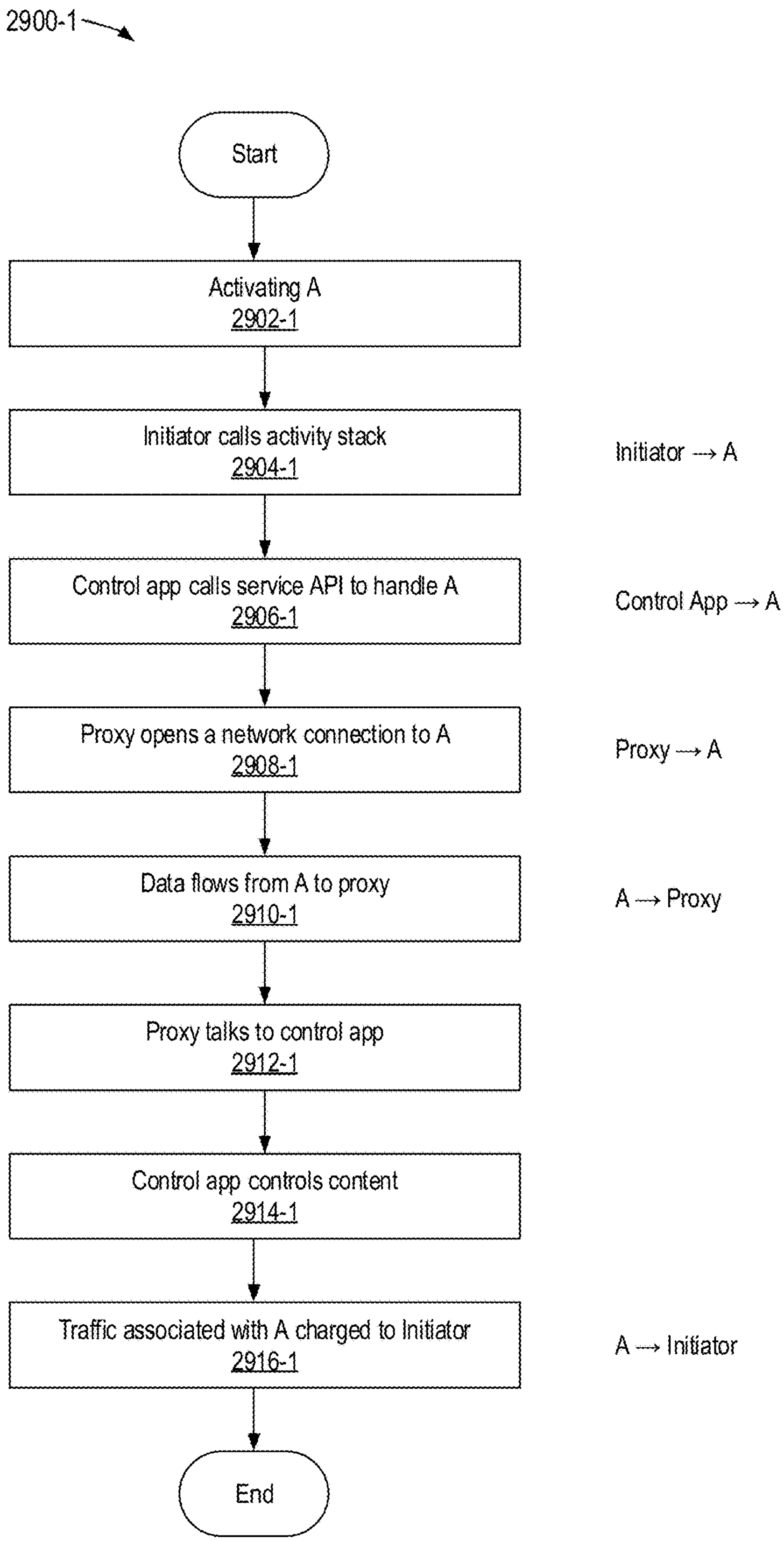
FIG. 45 depicts a flowchart of an example of a method of flow tracking.

FIG. 45 depicts a flowchart 2900-1 of an example of a method of flow tracking. For illustrative purposes, a mapping (flow tracking) of an application is depicted to the right of the flowchart 2900-1. In the example of FIG. 45, the flowchart 2900-1 starts at module 2902-1 with activating A. In this example, A is intended to identify an electronic traffic source, such as a URL, phone number, or other applicable mechanism for forming a connection such that data can flow between a service policy implemented device and some other device. Thus, activating A can entail clicking on a URL, dialing a phone number, or initiating a connection with another device in some other applicable manner. The data can flow in one direction or in more than one direction, depending upon the instance and/or implementation.

In the example of FIG. 45, the flowchart 2900-1 continues to module 2904-1 with an initiator calling an activity stack. In this paper, the activity stack is located between an initiator (e.g., a file and system components that identify the control app) and a control app. Where no control app is used, the term activity stack is not used in favor of making reference to a proxy API. For the purposes of this example, the initiator is the engine, component, or otherwise identifiable thing that is responsible for traffic associated with A. In a system that tracks service usage for the purpose of implementing a service policy in a manner that is described in this paper, it may be desirable to be able to identify the initiator and charge for the traffic appropriately. (As opposed to, for example, charging the proxy or control app or controlling policy in some other manner that is not as finely tuned.) It may be noted that the activity stack is located between an initiator and a control app, but if there is no control app, the initiator instead calls a service API. The initiator can be mapped to A at the activity stack.

In the example of FIG. 45, the flowchart 2900-1 continues to module 2906-1 with a control app calling a service API to handle A. An example of a control app that could be used in this manner is the HTC player (or some other media player). In a specific example, the HTC player could be registered to handle files of a certain type. (For the sake of this example, let us assume it is registered to handle "audio files"). A user could click on audio file content of a website. The audio file itself does not have rendering capabilities; so the HTC player runs on the audio file's behalf to play the audio file for a user. The control app can be mapped to A at the service API.

In the example of FIG. 45, the flowchart 2900-1 continues to module 2908-1 with a proxy opening a network connection to A. Naturally, opening a connection to A can require certain actions by the proxy, such as finding A in a network. In a specific implementation, the proxy uses an IP lookup to find an IP address (generally having a format 1.2.3.4). The proxy can be mapped to A at the network interface. It is possible that A will have moved to B, in which case a DNS request can be used to find B. If that happens, A can be mapped to B, and the thread can be tracked back to A and, ultimately, the initiator.

In the example of FIG. 45, the flowchart 2900-1 continues to module 2910-1 with data flowing from A to the proxy (or from B to the proxy if A was moved to B). The traffic of the data flow can be tagged, and because the initiator, control app (if applicable), and proxy were all mapped to A, it is possible to figure out that the network resources can be charged to A (or to some other component to which the traffic has been mapped, if applicable).

In the example of FIG. 45, the flowchart 2900-1 continues to module 2912-1 with the proxy talking to the control app and to module 2914-1 with the control app controlling the content. Thus, in the example where A is an audio file and the control app is an audio player, the proxy provides streamed audio to the player, which plays the audio content for a user. As was previously noted, the content can be matched to the location of the content (e.g., on a website) and can be treated in a manner that is appropriate for an active service policy.

In the example of FIG. 45, the flowchart 2900-1 ends at module 2916-1 with charging traffic associated with A to the initiator. It may be noted that traffic tagging can occur at different points in the network stack, such as at socket flows or IP packet transmissions. Also, an initiator could at least in theory have any number of intervening apps between the initiator and the proxy, and traffic could be tagged between each app. Advantageously, it is possible to track whether apps have other characteristics. For example, tracking is possible when in foreground or background. This can include background service protocols and background network access. This can have an impact on how traffic is charged or otherwise controlled in accordance with the applicable service policy.

Traffic tagging may or may not entail the use of hooks. The amount of control over the proxy will depend upon whether, for example, the proxy was written by the same party that wrote other components of a device framework. It is somewhat more likely that a third party will make use of hooks. It may also be desirable to hook at certain locations, such as in the socket, to tag back to a traffic stack "opened socket for thread" and give a socket-to-thread mapping. Combined with an API mapping, it is possible to map socket-to-app, which can then be pushed to a low level interface where traffic can be observed (e.g., a driver, in a kernel, etc.). As was previously discussed, the activity stack makes it possible to use hooks (if applicable) to map socket-to-control app-to-initiating app. Where every packet is counted at, e.g., a firewall, the low level interface can see the thread and can map each packet to the appropriate app even though the counted packets are, e.g., identified as those of the proxy. This facilitates traffic can being accurately dropped into the appropriate service policy buckets.

Tagging traffic flows enables discrete service control policy enforcement. For example, a service policy could block A (or B) in accordance with a service control policy even if the proxy is not normally blocked (for example, for other content). Blocking can occur at the network and is possible even in the case where an initiator calls a control app that is not necessarily blocked because tagging happens in the activity stack. It may also be the case that a control app should be blocked regardless of whether A (or B) should be blocked, which is possible because the traffic is tagged at the API. It may be noted that blocking is not the only traffic control policy, and other traffic control policies could be used, as well, such as notification.

In an implementation in which the proxy includes a VoIP manager, the proxy can run encoding/protocols (SIP, H323, etc.). A VoIP service control cloud can ensure routing to a low latency backbone. The VoIP service manager can do core functions of VoIP there. An API enables running consistent VoIP services with a consistent set of tools for apps. A VoIP service manager can have special performance features, QoS functions, interactive cloud service, and can be charged differently, routed to APN or server, manage offloading to Wi-Fi/2G/3G/4G, manage roaming aspects, and manage presence.

Figure 46:
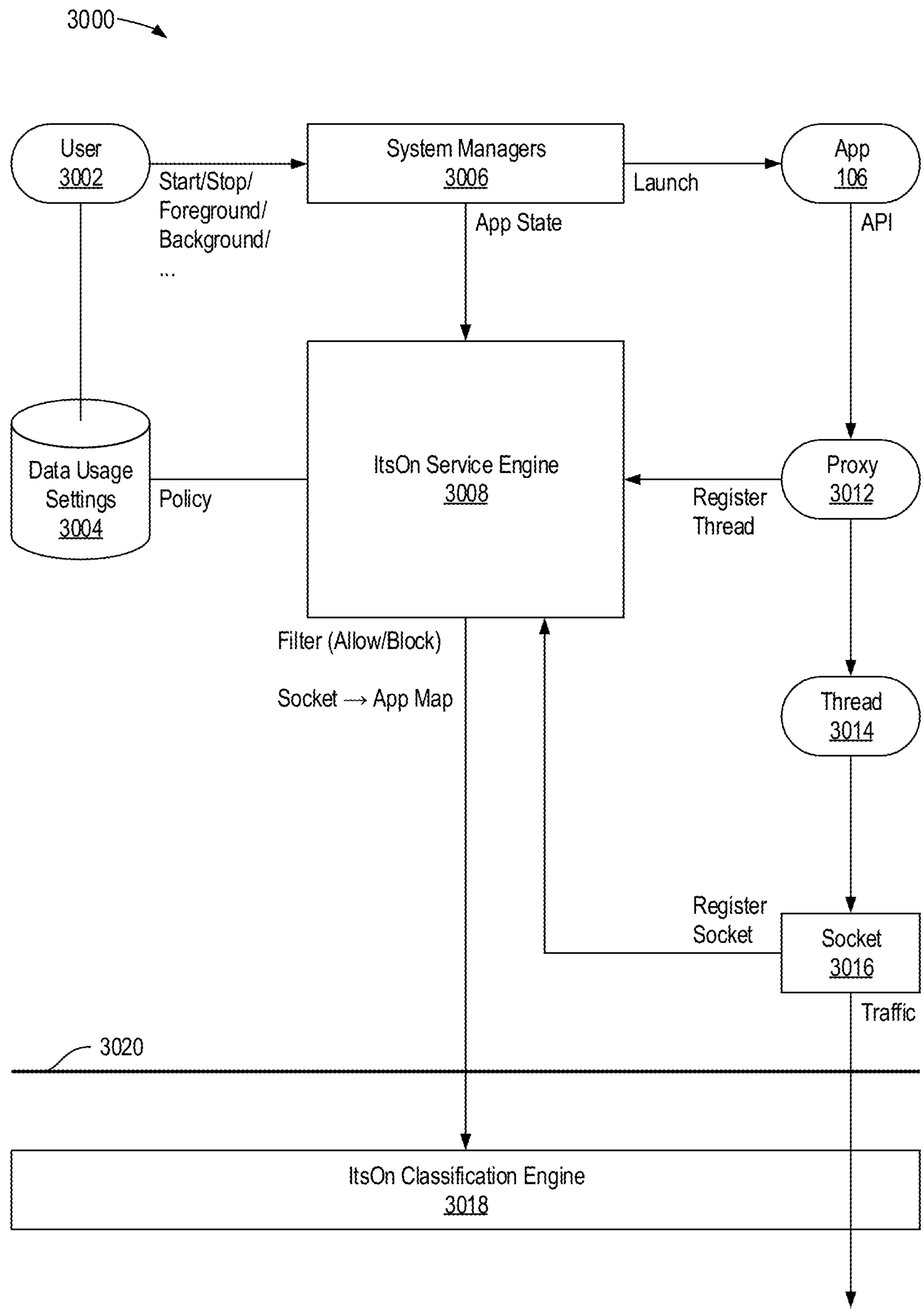
FIG. 46 depicts an example of a system with a tagged traffic flow.

FIG. 46 depicts an example of a system 3000 with a mapped traffic flow. The system 3000 includes a user 3002, a data usage settings datastore 3004, system managers 3006, an ItsOn service engine 3008, an app 106, a proxy 3012, a thread 3014, a socket 3016, and an ItsOn classification engine 3018. Although reference is made to "ItsOn" in this example, it should be noted that this is simply one specific implementation, and that the techniques described in association with this example are broadly applicable, not limited to any actual ItsOn implementation.

In the example of FIG. 46, a user 3002 can provide data usage settings to the data usage settings datastore 3004 and start/stop/foreground/background/ . . . instructions to the system managers 3006. It may be noted that a user agent, network agent, service provider agent, or some other agent can provide data usage settings instead of or in addition to the user 3002. Similarly, a user agent, network agent, service provider agent, or some other agent can provide start/stop/foreground/background/ . . . instructions instead of or in addition to the user 3002.

In the example of FIG. 46, the data usage settings datastore 3004 includes service policy that can be accessed by the ItsOn service engine 3008. Service policy can be implemented and/or enforced using techniques described elsewhere in this paper. An example of policy that may be used by the ItsOn service engine 3008 is "allow app" or "restrict app."

In the example of FIG. 46, the system managers 3006 (or a system manager thereof) launch the app 106 and report app state to the ItsOn service engine 3008. An example of app state is "call-back on state change." This can, for example, result in a call-back if an app changes from running in the background to running in the foreground, or vice versa, or when the app is shut down.

In the example of FIG. 46, the app 106 utilizes an API to trigger the proxy 3012 which in turn passes through a socket connection at the socket 3016 as traffic. In operation, the app 106, the proxy 3012, and the socket 3016 can be implemented as engines. The proxy 3012 generates the thread 3014 and registers the thread with the ItsOn service engine 3008. The socket 3016 registers the socket connection with the ItsOn service engine 3008.

In the example of FIG. 46, the ItsOn service engine 3008 has data sufficient to map the socket to the app, using the thread registration from the proxy 3012 and the socket registration from the socket 3016. The ItsOn service engine 3008 sends the socket-to-app mapping to the ItsOn classification engine 3018, along with a filter, which can be to allow, block, or perform some other filtering. The ItsOn service engine 3008 can be logically (or physically) divided into at least two components: a network policy manager and a traffic stack. The network policy manager can include, e.g., a policy decision point agent. See, e.g., FIG. 27, policy decision point agent 1692. The network policy manager accesses policy in the data usage settings datastore 3004, receives the app state from the system managers 3006, and provides a filter parameter to the ItsOn classification engine 3018. The traffic stack receives the registration of the thread and the registration of the socket and provides the socket→app map to the ItsOn classification engine 3018.

In the example of FIG. 46, the ItsOn classification engine 3018 is capable of enforcing policy for a thread (mapped to an app), including, e.g., traffic control, notification, and/or charging. The ItsOn classification engine 3018 can be logically (or physically) divided into at least two components: a firewall (e.g., iptables) and a tagging engine (e.g., qtaguid). The tagging engine receives the socket→app map from the traffic stack and provides a tag to the firewall. The firewall receives the filter from the network policy manager and the tag from the tagging engine and provides a count back to the tagging engine. The firewall also filters (e.g., blocks, allows, or performs some other filtering) traffic from the socket 3016.

Figure 47:
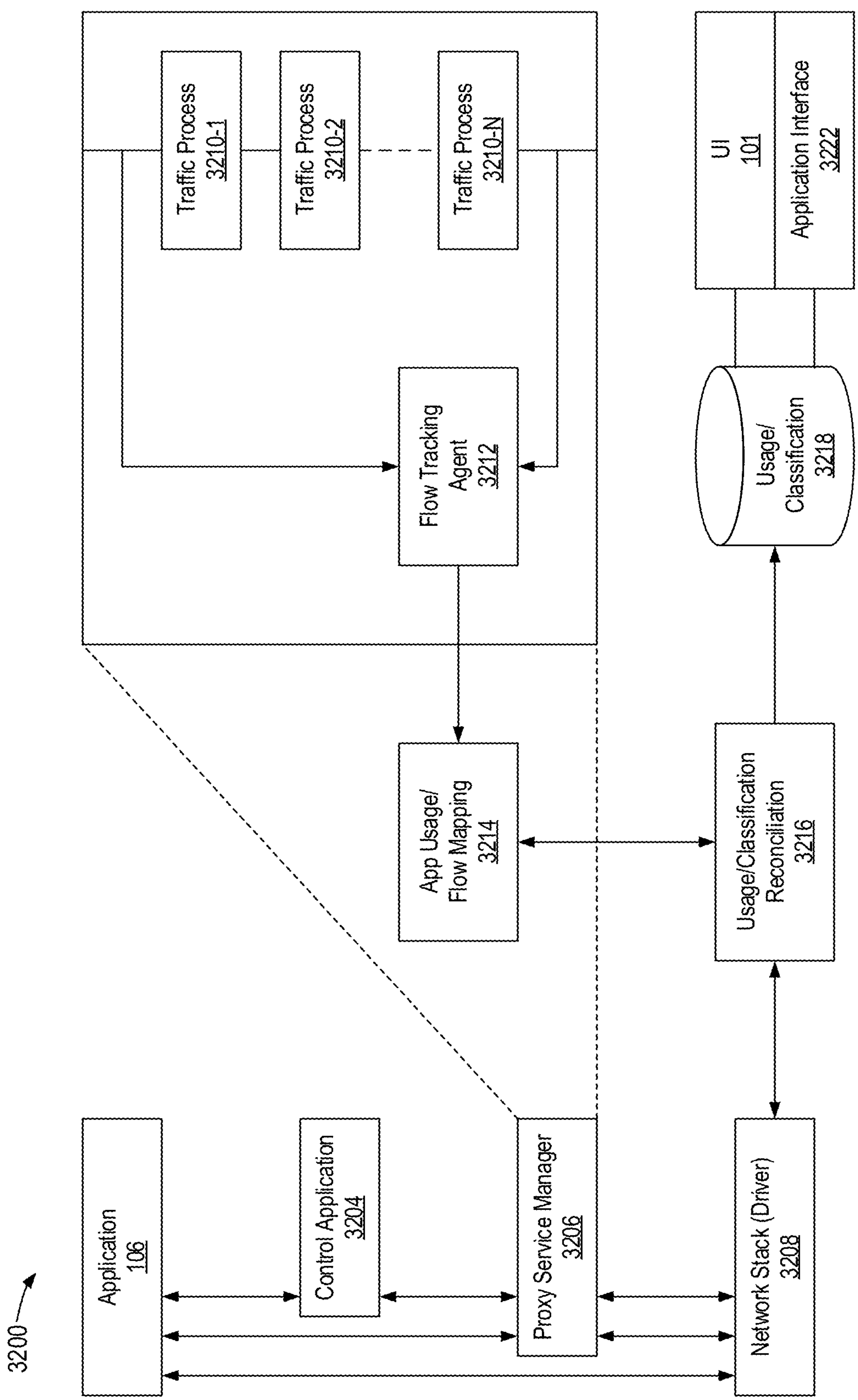
FIG. 47 depicts an example of a system for classification mapping using virtual tagging.

FIG. 47 depicts an example of a system 3200 for classification mapping using virtual tagging. The system 3200 includes an application 106, a control application 3204, a proxy service manager 3206, a network stack (driver) 3208, traffic processes 3210-1 to 3210-N (collectively, traffic processes 3210), a flow tracking agent 3212, an application usage/flow mapping engine 3214, a usage/classification reconciliation engine 3216, a usage/classification datastore 3218, a user interface (UI) engine 101, and an application interface engine 3222. In operation, the application 106, control application 3204, proxy service manager 3206, network stack (driver) 3208, and flow tracking agent 3212 are implemented as engines.

In the example of FIG. 47, the application 106 may or may not, depending upon instance and/or implementation, need to use the control application 3204 (e.g., to render content) and/or the proxy service manager 3206. This is represented by the three double arrows from the application 106 to the control application 3204, the proxy service manager 3206, and the network stack (driver) 3208.

In the example of FIG. 47, traffic processes associated with the application 106 are depicted as traffic processes 3210. The flow tracking agent 3212 can obtain information about the traffic processes 3210 at the start and end of the traffic flow that comprises the traffic processes 3210. The start and end are intended to illustrate, for example, a hook, call-back, injection point, etc., at a proxy service manager API (the start) and at a socket connection (the end). It may be noted that in an instance or embodiment where the application 106 does not use the proxy service manager 3206, data at the socket will accurately identify the app as the initiator of the data flow. In an instance or embodiment where the application 106 uses the proxy service manager 3206, data at the socket will be insufficient to identify the application 3203 as the initiator of the data flow, making it desirable to add a virtual tag at the proxy API or some other applicable upstream location. In an instance or embodiment where the application 3203 uses the control application 3204, an additional virtual tag is necessitated at the activity stack.

In the example of FIG. 47, the virtual tags are sent from the flow tracking agent 3212 to the app usage/flow mapping engine 3214, which communicates with the usage/classification reconciliation engine 3216, which in turn communicates with the network stack (driver) 3208. The usage/classification reconciliation engine 3216 can track usage of the app, classify the app, and to the extent there is disagreement at different system locations, reconcile usage in accordance with rules. The usage/classification reconciliation engine 3216 saves the usage/classification in the usage/classification datastore 3218, which can be made available to a user via the user interface 101 or an application via the application interface 3222.

In an alternative embodiment, flow tracking agents are coupled between traffic process elements 3210. For example, between traffic process 3210-1 and traffic process 3210-2.

Figure 48:
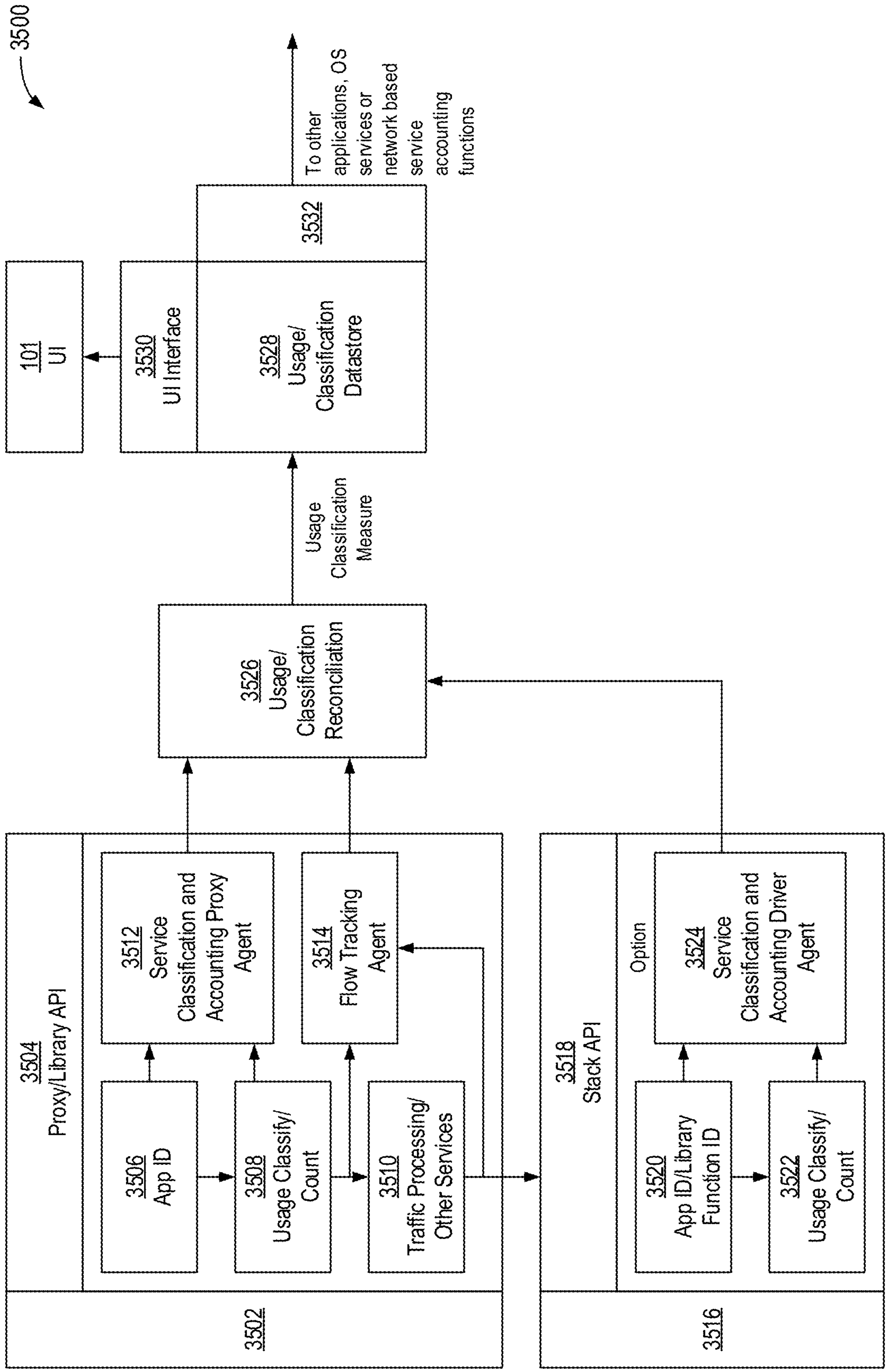
FIG. 48 depicts an example of a system for proxy client counting.

FIG. 48 depicts an example of a system 3500 for proxy client counting. The system 3500 includes a proxy service manager 3502, a proxy/library API 3504, an app ID 3506, usage classify/count 3508, a traffic processing/other services 3510, a service classification and accounting proxy agent 3512, a flow tracking agent 3514, a network stack (driver) 3516, a stack API 3518, an app ID/library function ID 3520, usage classify/count 3522, a service classification and accounting driver agent 3524, a usage/classification reconciliation engine 3526, a usage/classification datastore 3528, a UI interface 3530, an application interface 3532, and a UI 101.

Figure 49:
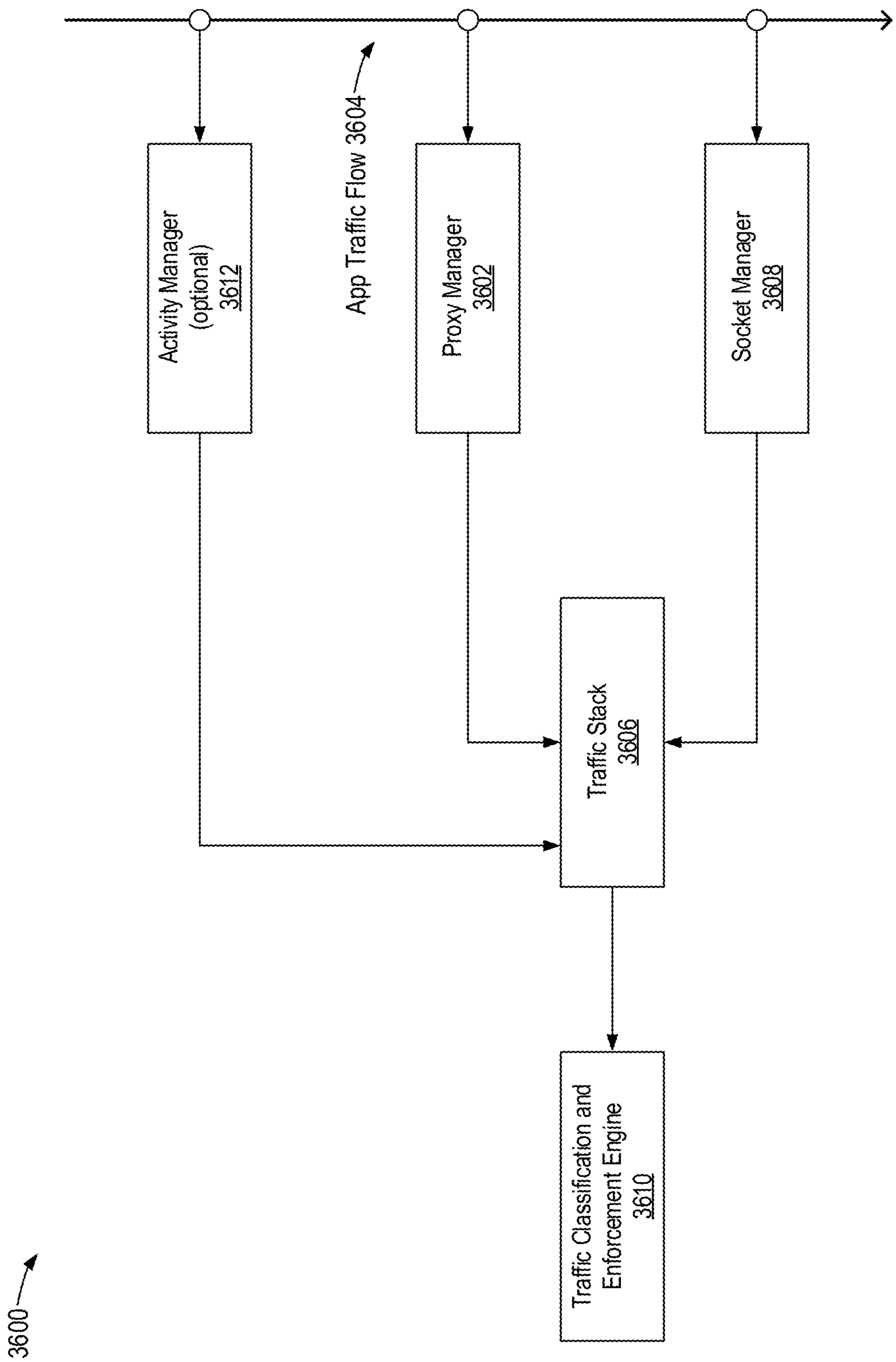
FIG. 49 depicts an example of a system for classifying traffic and enforcing a service policy based upon the classification.

FIG. 49 depicts an example of a system 3600 for classifying traffic and enforcing a service policy based upon the classification. The system 3600 includes a proxy manager 3602, an app traffic flow 3604, a traffic stack 3606, a socket manager 3608, and a traffic classification and enforcement engine 3610. The proxy manager 3602 and the socket manager 3608 can be implemented as engines. The traffic stack 3606 can be implemented as an engine or a datastore. Where the traffic stack 3606 is implemented as a datastore, the proxy manager 3602, the socket manager 3608, the traffic classification and enforcement engine 3610, or some other engine can provide the processor to carry out activities that are attributed to the traffic stack 3606.

In the example of FIG. 49, the proxy manager 3602 tags the app traffic flow 3604 at a first point in the flow. The first point in the flow corresponds to an API call by an app to the proxy manager 3602, or an equivalent activity. The proxy manager 3602 can identify the app making the call and identify the thread that is (or will be) associated with the app. In this way, the proxy manager 3602 can identify a mapping of the app to the app traffic flow 3604. The proxy manager 3602 registers the thread (e.g., the app-to-flow mapping) at the traffic stack 3606.

In the example of FIG. 49, the socket manager 3608 tags the app traffic flow 3604 at a second point in the flow. The second point in the flow corresponds to a socket call by the proxy manager 3602 to the socket manager 3608, or an equivalent activity. The socket manager 3608 can identify the proxy making the call and identify the thread that is associated with the proxy. In this way, the socket manager 3608 can identify a mapping of the proxy to the app traffic flow 3604. The socket manager 3608 registers the socket (e.g., the proxy-to-flow mapping) at the traffic stack 3606.

In the example of FIG. 49, the traffic classification and enforcement engine 3610 uses the thread registration to identify the app-to-flow and the socket registration to identify the proxy-to-flow. Because the traffic classification and enforcement engine 3610 knows the app called the proxy (from the thread registration) and the proxy called the socket (from the socket registration), the traffic classification and enforcement engine 3610 can properly identify the app as the initiator of the app traffic flow 3604, as opposed to, for example, the proxy manager 3602 that made the socket call. With this knowledge, the traffic classification and enforcement engine 3610 can use the appropriate traffic control, notification, and charging policies to control the traffic, notify relevant parties, and/or assign the app traffic flow 3604 to the appropriate bucket or buckets.

In the example of FIG. 49, an optional activity manager 3612 tags the app traffic flow 3604 at a third point in the flow. The third point in the flow corresponds to a control application call made on behalf of the app. The activity manager 3612 can identify the app making the call to the control application and identify the activity that is associated with the app. Conceptually, relative to the description just provided with reference to the proxy manager 3602 and the socket manager 3608, the activity manager 3612 pushes the app up one more level, such that the data flow is from the app to a control application and to the proxy. Using the registered activity, the traffic classification and enforcement engine 3610 can trace the app traffic flow back up the chain to the app, rather than identifying the control application as the initiator.

Figure 50:
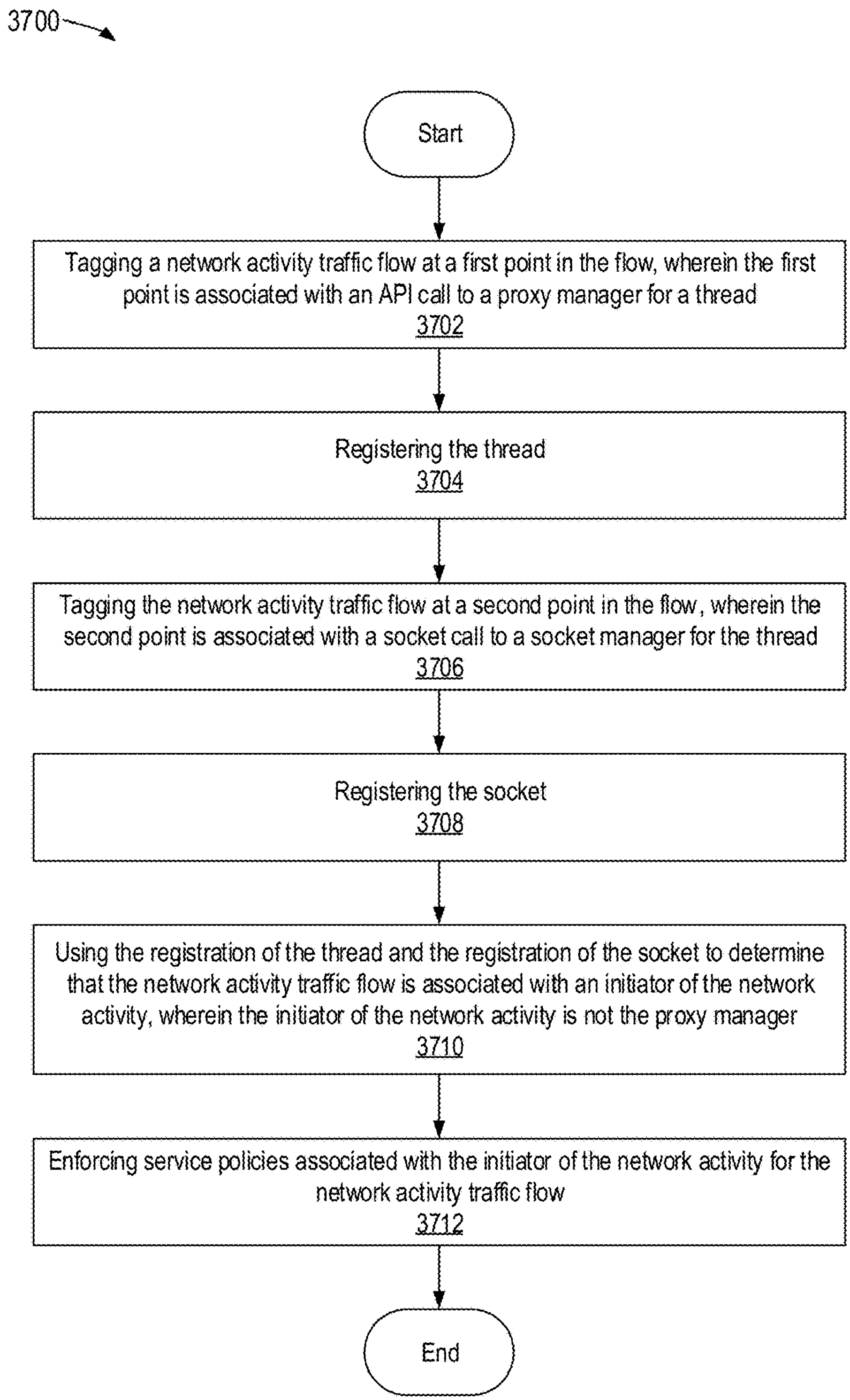
FIG. 50 depicts a flowchart of an example of a method for flow tagging and enforcing service policies associated with an identified initiator of the flow.

FIG. 50 depicts a flowchart 3700 of an example of a method for flow tagging and enforcing service policies associated with an identified initiator of the flow. In the example of FIG. 50, the flowchart 3700 starts at module 3702 and ends at module 3712, which include the following: tagging a network activity traffic flow at a first point in the flow, wherein the first point is associated with an API call to a proxy manager for a thread; registering the thread; tagging the network activity traffic flow at a second point in the flow, wherein the second point is associated with a socket call to a socket manager for the thread; registering the socket; using the registration of the thread and the registration of the socket to determine that the network activity traffic flow is associated with an initiator of the network activity, wherein the initiator of the network activity is not the proxy manager; and enforcing service policies associated with the initiator of the network activity for the network activity traffic flow.

FIGS. 44 to 50 illustrate representative embodiments for using APIs within a mobile device 100 to assist in providing one or more communication service management functions, e.g., specifically to identify and track service activities using one or more flow tagging methods. The set of APIs described above is representative and not intended to be limiting. A set of APIs in a mobile device 100 can assist in providing for many different functions for management and control of device assisted services. A set of APIs can be integral to an implementation of device assisted services, e.g., assisting to provide communication between an application and one or more network elements, to assist in providing for communication between applications and operating system components, and/or to assist in providing for communicating information between applications and operating system stack layers and/or networking stack layers. The embodiments described above can be extended to apply APIs to additional communication services management functions for device-assisted services.

In some embodiments, such as the embodiment illustrated in FIG. 206, a sign-up request processor 9002 interconnects with multiple service operators via a common API 9022. In some embodiments, the sign-up request processor 9002 is the service controller 122. Specifying a common API 9022 enables the sign-up request processor 9002 to add new service operators without having to implement new interfaces to support the new service operators. In some embodiments, the subscriber has a common sign up experience regardless of his service operator. This allows a third party (e.g., device OEM, VSP, MVNO, device OS provider, VoIP provider, etc.) to define a user interface (UI) and process and implement that UI once in the sign-up request processor 9002 and/or device agent 1001 to enable the third party to offer a common experience across all of the service operators that it interworks with. For example, a device manufacturer may want to have a common service sign-up and sharing management UI and process for all of its products and desires that the common service sign-up and sharing management UI and process are implemented consistently across all of the service operators that are selling the manufacturer's products. Thus, in some embodiments, the device manufacturer provides the sign-up request processor 9002 and the common API 9022 and works with the service operators to have them implement the required functionality to support the on-device service sign-up and multi-device sharing functions. In some embodiments, the manufacturer implements, on the sign-up request processor 9002, common APIs 9022 for functions like add new service, delete service, add a device to a master service account, device group, or multi-device service plan, delete a device from a master service account, device group, or multi-device service plan, manage quotas on a shared plan, etc., and then provide a well-defined API, interface, and protocol (e.g., JSON, WSDL, etc.) to the interface with the individual service operators. In some embodiments, the interface protocol between the sign-up request processor 9002 and the service operator subscriber management system 9004 is a "high level" functional interface as described above and the subscriber management system 9004 implements a series of "low level" instructions to each of the affected operator elements (as described in the discussion of FIG. 206). In some embodiments, the subscribers sharing a service plan must be subscribed to the same service operator. In some embodiments where a centralized accounting function is implemented, the subscribers may be, but need not be, subscribed to different service operators, and the centralized accounting function tracks, manages and aggregates the service usage of all of the devices sharing the shared plan across all of the service operators. By leveraging a single sign-up request processor 9002, the sign-up request processor 9002 brokers the multi-device plan sharing, management and assignment requests across the different service operators.

FIG. 206 illustrates a system configuration 1580 including a network that the devices use to communicate with the sign-up request processor 9002 in accordance with some embodiments. In some embodiments, the network 1100 is a common network regardless of the service operator that the subscriber is subscribed to. In other embodiments, each service operator uses its own network to enable the device 100 to connect to the sign-up request processor 9002. In some embodiments, the network is a cellular network. In some embodiments, the network 1100 is a Wi-Fi network. In some embodiments, the network 1100 is a Wi-Fi network for one device and a cellular network for the other device.

In some embodiments, the sign-up request processor 9002 is located in the carrier network. In other embodiments, it is located in a third-party provider network (e.g., device OEM, VSP, MVNO, device OS provider, VoIP provider, etc.). In some embodiments, there is a plurality of sign-up request processors 9002. In some embodiments, each of the plurality of sign-up request processors 9002 conforms to the common API command set. In some embodiments, each of the plurality of sign-up request processors 9002 is associated with a subset of the entities requiring access to manage multi-device plan sharing and assignment. In some embodiments, these entities include device OEM, OS provider, VSP, MVNO, MNO, retail distribution partners, or sponsored service providers. In some embodiments, each of the entities requiring access to manage multi-device plan sharing and assignment implements its own UI, device agent 1001 and on-device workflows to enable the entity to customize the process to suit its needs without impacting the service operator interfaces.

Although FIG. 206 illustrates the common API 9022 coupled with the sign-up request processor 9002, in some embodiments, the API is defined by each service operator (e.g., MNO, MVNO, VSP, etc.) and coupled with each service operator's subscriber management system 9004. In some embodiments, the sign-up request processor 9002 conforms to each service operator's API specification. In some embodiments, the service operator API exposes the "high level" requests (e.g., add subscriber to a master service account, device group, or multi-device service plan, remove subscriber from a master service account, device group, or multi-device service plan, allocate quotas, add curfew, remove curfew, add notification, delete notification, etc.) to the sign-up request processor 9002 and then converts the "high level" commands into the appropriate "low level" commands and workflow specific to that service operator.

In some embodiments, a party specifies a global API that defines a superset of required "high level" commands that entities use to manage multi-device plan sharing capabilities and then provide an internal framework to allow the individual service operators to convert the "high level" commands received from the sign-up request processor 9002 into the service operator-specific "low level" commands and workflows that apply to that service operator. In some embodiments, the party is an operator, a VSP, an MVNO, an OEM, an OS provider, a retail distribution partner, or any type of partner that would benefit from a consistent multi-device service management experience across multiple service providers.

In some embodiments, the sign-up request processor 9002 described herein is a network element managed or maintained by a service provider, a network operator, or a third-party service partner. In some embodiments, the sign-up request processor 9002 is integrated as part of a server, a gateway, a proxy server, or a service controller 122 that provides additional communication service management functions. In some embodiments, the APIs described herein for the sign-up request processor 9002 are representative of one or more network-based APIs that assist in providing for the exchange of information used in communication service management, e.g., of device assisted services. In some embodiments, additional communication service functions of the sign-up request processor 9002 (e.g., integrated as part of a service controller 122) include service activation, service selection, service purchase, service control, device group management, service sharing, service restriction, service notification and/or other service management functions. In some embodiments, the sign-up request processor 9002 acts as a conduit for service management information communicated between one or more mobile devices 100 and service management systems 9004 of service providers, network operators and/or third-party service partners. In some embodiments, the sign-up request processor 9002 transfers information to and from a mobile device 100 using one or more APIs, e.g., a set of device APIs. In some embodiments, the sign-up request processor 9002 transfers information to other network elements using one or more APIs, e.g., using a set of network APIs that form a part of and/or a superset of the common APIs described herein.

In some embodiments, a user of a mobile wireless communication device configures service plans, including individual elements of a service plan, permissions associated with a service plan, and restrictions applied to a service plan through a flexible user interface of the mobile wireless communication device. In some embodiments, one or more device APIs, one or more network APIs, or a combination of these is used to implement communication services management, including service plan design, customization, purchase and sharing. In some embodiments, a device API provides for interaction between the mobile wireless communication device and one or more network elements that manage communication services. In some embodiments, a device API provides for interaction between device applications and one or more device agents in the mobile wireless communication device. In some embodiments, a network API provides for interaction between a service provider or a third party and one or more network elements that manage communication services. As would be understood by a person of ordinary skill, designation of an API as a "device" API or a "network" API is for clarity of description only and is not intended to be limiting. Also, as would be understood by a person of ordinary skill, API functionality can be divided or combined between different APIs, and the individual API's described herein provide functionality that can be realized using one or more different interfaces. The APIs described herein are not necessarily an exhaustive or complete set of APIs that can be used to provide for communication service management.

In some embodiments, a set of device APIs assists in providing one or more of the following communication services functions for mobile devices 100, service providers, network operators, and/or third-party service partners: service plan catalog information delivery, service plan selection, service plan customization, service plan purchase, device activation, service plan activation, device authorization, device group management, service plan controls, service notifications, marketing interceptors, notification triggers, service usage monitoring, service usage reporting, and device policy provisioning. In some embodiments, a set of network APIs assists in providing one or more of the following communication service functions for mobile devices 100, service providers, network operators, and/or third-party service partners: service plan design, sponsored service management, service design center sandbox interfaces, service accounting/billing/charging, user level service management, network operator level service management, service management for service partners, e.g., original equipment manufacturers, operating system suppliers, and/or application developers, network policy provisioning, and device group management. The list of functions that the device APIs and the network APIs support is not necessarily an exhaustive or complete set of functions that can be provided for by using the device APIs and the network APIs for communication service management.

FIG. 1 illustrates a system 100 of interconnected elements including a mobile wireless communication device 100 communicatively coupled to a service controller 122 through a network 1100. The service controller 122 in turn is communicatively coupled to a service design center 135. In some embodiments, a user of the mobile wireless communication device 100 obtains information about service plans and/or constituent elements of service plans from the service controller 122 through the network 1100. In some embodiments, the user selects service plans to research, review, modify, and/or purchase for one or more wireless communication devices 100. In some embodiments, selection of service plans and/or constituent elements of service plans occurs through a user interface of the mobile wireless communication device 100. In some embodiments, the user determines a customized service plan by selecting among options for different constituent elements for the customized service plan. In some embodiments, supplemental information, e.g., service usage history, is provided during the service plan selection, review, customization and purchase process to inform the user of the mobile wireless communication device 100 during the process. In some embodiments, the service controller 122 provides one or more options for service plans or constituent elements of a service plan to the user of the mobile wireless communication device 100 that match to a previous use of, present use of or attempt to access one or more communication services.

In some embodiments, a service processor 115 in the mobile wireless communication device 100 interacts with the service controller 122 to assist in providing a communication service marketplace to the user of the mobile wireless communication device 100. In some embodiments, a service provider or a third party, e.g., an equipment manufacturer or operating system supplier, interacts with the service design center 135 through a service provider/third-party interface 145 to design service plans, service plan offers, elements of service plans, features of service plans, and characteristics of service plans that can be presented to the user of the mobile wireless communication device 100. In some embodiments, service plans designed through the service design center 135 are provided through a communication service marketplace to the user of the mobile wireless communication device 100. In some embodiments, information for service plan selection, review, customization, and purchase are communicated using one or more APIs between the service processor 115 of the mobile wireless communication device 100 and the service controller 122. In some embodiments, the service plans are designed and managed by service providers and/or third parties using one or more APIs between the service controller 122, the service design center 135 and other service management systems (not shown).

FIG. 3 illustrates a network management system 10601 including the mobile wireless communication device 100 communicatively coupled through the network 1100 to a set of network services 120-1 and to a device management system 170-1. In some embodiments, the mobile wireless communication device 100 includes a user interface (UI) 101 as illustrated in FIG. 3, and a device agent initiates a request to add the mobile device 100 to a master service account, device group, or multi-device service plan based at least in part on a user input obtained through the user interface 101. The mobile wireless communication device 100 also includes a UI location manager 132-1, a UI agent 134-1, and a set of one or more device services 138-1. The device management system 170-1 includes a UI location management server 150-1, an accounting database 180-1, and a UI location management console 160-1. In some embodiments, the device management system 170-1 determines placement of "service launch objects" and notification messages on the UI 101 of the mobile wireless communication device 100. A service provider (e.g., a wireless network operator or a third-party service provider) can use the network management system 10601 shown in FIG. 3 to manage and control information content and placement provided through the UI 101 of the mobile wireless communication device 100. Information content can include specific details on service plans and service plan components, such as availability, cost, features, promotions, subsidies, applicability, location, time frame, service usage amounts, restrictions, sharing capabilities, etc. Using the network management system 10601, service providers can determine visibility of pre-defined and customizable service plans to which the user of the mobile wireless communication device 100 can subscribe. In some embodiments, the user can select, customize and subscribe to service plans through the UI 101 on the mobile wireless communication device 100. In some embodiments, the user can share or assign a portion or all of a service plan or service plan component among one or more different mobile wireless communication devices 100. In some embodiments, options on service plan sharing are presented to the user of the mobile wireless communication device 100 through the UI 101. In some embodiments, service providers use the service design center 135 to define and publish pre-defined and customizable service plans to users of mobile wireless communication devices 100. In some embodiments, information on service plans is pushed from a network element, e.g., the service controller 122, to the mobile wireless communication device 100. In some embodiments, the user of the mobile wireless communication device 100 pulls information on the service plans from a network element, e.g., the service controller 122. In some embodiments, placement, formatting and content of service plan information provided to the user of the mobile wireless communication device 100 and displayed on the UI 101 is determined at least in part by the device management system 170-1. In some embodiments, all or portions of the device management system 170-1 are implemented in the service controller 122 and/or the service design center 135 illustrated in FIG. 1. In some embodiments, all or portions of the UI agent 134-1 are included in one or more device agents in the service processor 115 of the mobile device 100 illustrated in FIG. 1. In some embodiments, all or portions of the UI location manager 132-1 are included in one or more device agents in the service processor 115 of the mobile device 100 illustrated in FIG. 1. In some embodiments, information communicated between the mobile device 100 and the device management system use one or more APIs.

FIGS. 291 to 306, 309, 312, 314, 317, 320, 322, 328, and 329 illustrate devices 100 interconnected through one or more APIs 205 with various servers 215, databases 117, service controllers 122, service design centers 135, service management systems and/or other network elements managed by a service provider 3800, a network operator 153, or a third-party service partner 157. In some embodiments, the one or more APIs 205 illustrated in FIGS. 291 to 306 and FIGS. 309, 312, 314, 317, 320, 322, 328, and 329 provide for implementing communication service management functions using a commonly agreed protocol among multiple participants, e.g., device manufacturers, service providers 3800, third-party service partners 157, etc. In some embodiments, the one or more APIs 205 provide for service discovery, service launch, service establishment, service control, service selection, service customization and other service management features using a "standardized" interface, e.g., as a privately published design document, as a formally ratified communication protocol, or as a combination of each of these. In some embodiments, the one or more APIs 205 provide for one or more of the following communication service management functions: service notifications, service offers, service selection, service customization, service purchase, service sponsorship, service activation, device group establishment, device group management, and service account management. In some embodiments, many different types of services can be supported through the one or more APIs 205 including application specific services, sponsored services, single device services, multi-device services, services dependent on network state, services dependent on network type, roaming services, intermediate networking device (IND) services, and other services described herein. In some embodiments, the one or more APIs 205 can be used for communication service management by a user or administrator, e.g., setting usage controls, setting service preferences, setting notification triggers, setting service plan limitations, sharing service plans, and other forms of user or administrator managed service control. In some embodiments, the one or more APIs 205 provide for a uniform environment and protocol in which to define service offers (what to present), service offer display parameters (how to present), service notification and offer trigger conditions (when to present), and responsive actions (what additional information to present). In some embodiments, the one or more APIs 205 provide for a format and/or protocol for objects to display through a user interface (UI objects) of the device 100. In some embodiments, the one or more APIs 205 provide for a communication protocol to obtain UI objects to display to the user of the device 100.

In some embodiments, the set of APIs 205 includes one or more notification APIs to provide service notifications to one or more devices 100. In some embodiments, the one or more notification APIs define notification parameters, e.g., notification content, notification trigger conditions, notification display information, targeted devices, targeted users, targeted device groups, or other parameters that can determine properties for notification messages. In some embodiments, the one or more notification APIs provide for notification messages to be pushed from a server, e.g., managed by a service provider, network operator, or third-party service partner, to the mobile device 100. In some embodiments, the one or more notification APIs provide for notification messages to be obtained from the server by the device 100. In some embodiments, the one or more notification APIs provide for defining content of a notification message pushed to or obtained by the device 100. In some embodiments, the notification content that can be provided through the one or more notification APIs include one or more of: message text, message graphics, message placement (e.g., placement within a particular area of a UI of the device 100), actionable buttons, and display parameters. In some embodiments, the one or more notification APIs provide for defining notification triggers (e.g., under what conditions notifications are triggered, where notifications are triggered, what is the source of the notification triggers) and notification trigger actions (e.g., what occurs as a result of the notification trigger occurring). In some embodiments, notification trigger information provided through the one or more notification APIs can be stored in the device 100, in one or more network elements, e.g., servers and/or databases managed by a service provider, a network operator or a third-party service partner, or in a combination of both the device 100 and one or more network elements. In some embodiments, notification triggers are sent by a network element to the device 100 based on detection of the trigger condition by the network element (or by an associated network element). In some embodiments, the device 100 detects a notification trigger. In some embodiments, notification trigger actions cause a pre-stored message to be displayed to the user of the device 100, e.g., through a UI on the device 100. In some embodiments, the pre-stored message is configured for use with one or more notification APIs. In some embodiments, notification triggers and/or notification content and/or notification display parameters are configured through a service design center, e.g., through a terminal, sandbox, web interface, application portal interface or other controlled interface that provides access to an authorized user or administrator. In some embodiments, the notification message is pre-stored in the device 100. In some embodiments, the notification message is pre-stored in one or more network elements, e.g., in a server or a database maintained by a service provider, a network operator, or a third-party service partner. In some embodiments, the notification message is pre-stored in a combination of the device 100 and one or more network elements. A representative embodiment for a notification API includes a push notification API that pushes a notification message to the device 100 from a network element based on a trigger condition with defined notification message content, graphics display information, user interface placement and notification actions. A representative embodiment for a notification API includes a network-triggered notification API that displays a notification on the UI of the device 100 as a result of a trigger indication sent from a network element. A representative embodiment for a notification API includes a device-triggered notification API that displays a notification on the UI of the device 100 as a result of a trigger occurring on the device 100. A representative embodiment for a notification API includes a pre-stored notification message API that defines a pre-stored message to display based on one or more specified trigger conditions. A representative embodiment for a notification API includes a device "pull" notification API that pulls a notification from a network element, e.g., as a result of a trigger at the device 100 or a trigger sent to the device 100 by a network element. In some embodiments, notifications defined and/or provided through one or more notification APIs provide for informing a user of available services, a requirement for services, service options, requests for services, request for service modifications, or other service information for service management and control.

In some embodiments, the set of APIs 205 includes one or more offer APIs to provide for offers of communication services to one or more devices 100. In some embodiments, the one or more offer APIs provide for communicating one or more service plans, e.g., in a service plan catalog, to a device 100. In some embodiments, the one or more offer APIs provide for a uniform environment and a communication protocol by which to define service offers for one or more devices 100. In some embodiments, the one or more offer APIs define under what conditions service offers are provided to one or more devices 100. In some embodiments, the one or more offer APIs provide for specifying a set of service plans to offer to one or more devices 100. In some embodiments, the one or more offer APIs provide for communication of a service plan catalog to the device 100. In some embodiments, the one or more offer APIs provide for defining a service plan offer set that includes choices of service plans for the device 100. In some embodiments, the one or more offer APIs define the content to describe and display for the service plan choices provided to the device 100, e.g., text that describes a service plan, display information to specify how to present the service plan, graphical elements, e.g., icons, to display as part of the service plan offer, placement information to specify where to present the service plan on a UI, and actionable buttons to display that provide for additional information screens to present in response to user inputs. In some embodiments, the one or more offer APIs provide for defining notification and/or marketing interceptor trigger conditions tied to one or more service offers. In some embodiments, service offers provided to the device 100 depend on one or more conditions, e.g., based on a set of available networks, based on types of available networks, based on a location of the device 100, and/or based on a set of preferences defined by a user of the device 100. In some embodiments, the set of information defined for offer APIs can be considered as a set of objects communicated to the device 100. In some embodiments, the one or more offer APIs define a communication protocol by which to obtain one or more objects in the set of objects to display on the device 100.

FIG. 291 illustrates a system 25000 in which one or more devices 100 communicate through a set of APIs 205 with a service provider 3800. In some embodiments, the APIs 205 illustrated in FIG. 291 include one or more APIs that are specified at least in part by the service provider 3800. In some embodiments, the service provider 3800 can create a set of APIs 205 through which device agents 1001 can communicate with one or more network elements within or communicatively coupled to the service provider's network. In some embodiments, the one or more network elements include a service controller 122. In some embodiments, one or more of the device agents 1001 are part of a service processor 115 in the device 100. In some embodiments, the device agents 1001 communicate with elements of an operating system (OS) to present information to a user of the device 100 through a user interface (UI) 101. In some embodiments, the device agents 1001 receive information, indications and/or responses from the user of the device 100 through the UI 101. In some embodiments, the set of device APIs 205 is provided to third-party service partners, e.g., original equipment manufacturers, and/or device manufacturers, and/or device suppliers, and/or software suppliers. In some embodiments, the set of device APIs 205 provides for one or more device agents 1001 in devices 100 to communicate with servers 215 and/or databases 117 in the network of the service provider to implement communication services management, including one or more functions to realize service control, device authorization, device activation, service plan selection, service plan customization, service activation, service usage monitoring, notifications, and service policy control. In some embodiments, the set of device APIs 205 provided by the service provider 3800 ensures that different devices 100 from different device suppliers provide a similar service activation, service monitoring, service control, and service management experience for users of the mobile devices 100. In some embodiments, the set of device APIs 205 in FIG. 291 may be sufficiently specific to a particular service provider 3800 that suppliers of the device 100 may be required to customize the device 100 to communicate with the particular service provider 3800, e.g., pre-load or download to the device 100 custom software/firmware for the particular service provider 3800.

FIG. 292 illustrates a system 25050 in which one or more service providers communicate with a device 100 through a set of device APIs 205. In some embodiments, the APIs 205 illustrated in FIG. 292 include one or more device APIs that are specified at least in part by the device supplier, e.g., by an original equipment manufacturer, and/or by a software supplier, and/or by a device manufacturer. In some embodiments, the set of device APIs 205 is provided to different service providers 3800 that offer communication services, e.g., to different network operators that offer communication services in a common region, or to different network operators that offer communication services in different regions. In some embodiments, the set of device APIs 205 provides for one or more device agents 1001 in devices 100 to communicate with servers 215 and databases 117 in the networks of the service providers 3800 to implement certain aspects of communication services management, including one or more functions to realize service control, device authorization, device activation, service plan selection, service plan customization, service activation, service usage monitoring, notifications, and service policy control. In some embodiments, the set of device APIs 205 provided by the device supplier ensures that the device 100 provides a similar service activation, service monitoring, service control and service management experience to users of the mobile device 100 irrespective of the service provider 3800 to which the mobile device 100 communicates to obtain and provide services.

FIG. 293 illustrates a system 25100 in which multiple service providers 3800 communicate with devices 100 from multiple device suppliers through a common set of device APIs 205. In some embodiments, the common set of device APIs 205 is specified in part by one or more device suppliers and/or in part by one or more service providers 3800. In some embodiments, the common set of device APIs 205 is published as a standardized communication protocol. In some embodiments, the common set of device APIs 205 is a superset of portions of device APIs used by one or more device suppliers and/or by one or more service providers 3800. In some embodiments, the common set of device APIs 205 is a "de facto" standard. In some embodiments, the common set of device APIs 205 provides for one or more device agents 1001 in devices 100 to communicate with network elements managed by service providers 3800 to implement aspects of communication services, e.g., as described above for FIGS. 291 and 292. In some embodiments, the common set of device APIs 205 enables the user of the mobile devices 100 to experience a level of "uniformity" and "consistency" for communication service management when using different mobile devices 100 and/or when subscribing to and using communication services from different service providers 3800.

FIG. 294 illustrates a system 25150 in which a service provider 3800, e.g., a mobile virtual network operator (MVNO), offers one or more communication services to mobile devices 100 over communication networks owned and managed by one or more network operators 153. In some embodiments, the service provider 3800 maintains a set of network elements that provide for communication service management and control. In some embodiments, the network elements of the service provider include one or more servers 215A and one or more databases 117A attached thereto. In some embodiments, communication service management by the service provider 3800 interoperates cooperatively with network elements managed by the one or more network operators 153, including one or more servers 215B maintained by the network operator and databases 117B attached thereto. In some embodiments, the service provider 3800 provides a set of device APIs 205A through which one or more devices 100 can communicate with the service provider 3800 to manage and control communication services. In some embodiments, the set of device APIs 205 is specified at least in part by the service provider 3800. In some embodiments, the set of device APIs 205A is specified at least in part by one or more device manufacturers, device suppliers, operating system suppliers, and/or software (e.g., application) developers. In some embodiments, the service provider 3800 provides a set of network APIs 205B through which network elements of one or more network operators 153 can communicate with the service provider 3800 to manage and control communication services. In some embodiments, the set of network APIs 205B is specified at least in part by the service provider 3800. In some embodiments, the set of network APIs 205B is specified at least in part by one or more network operators 153. In some embodiments, the set of network APIs 205B can be used to facilitate communication between servers 215A maintained by the service provider and servers 215B maintained by the network operator to manage and control communication services provided to mobile devices 100 by the service provider 3800. In some embodiments, the set of device APIs 205A and the set of network APIs 205B assist in providing communication service management for mobile devices 100 to interwork with different network operators 153 in a consistent and uniform manner. In some embodiments, the user of the mobile device 100 can review, select, customize, and subscribe to an array of service plans offered through the service provider 3800 and using one or more communication networks owned and/or managed by different network operators 153.

FIG. 295 illustrates a system 25200 in which a service provider 3800, e.g., a mobile virtual network operator (MVNO), adds a service design center 135 to the system 25150 illustrated in FIG. 294 and provides for service plan design and management through a set of network APIs 205B to one or more network operators 153 and one or more third-party service partners 157. In some embodiments, at least a portion of the set of network APIs 205B illustrated in FIG. 295 is used to provide at least in part the service provider/third-party interface 145 illustrated in FIG. 1. In some embodiments, at least a portion of the set of network APIs 205B illustrated in FIG. 295 is used to provide at least in part the common API of system 1580 illustrated in FIG. 206. In some embodiments, the set of network APIs 205B illustrated in FIG. 295 is specified at least in part by the service provider 3800, by one or more network operators 153, and/or by one or more third-party service partners 157.

Figure 296:
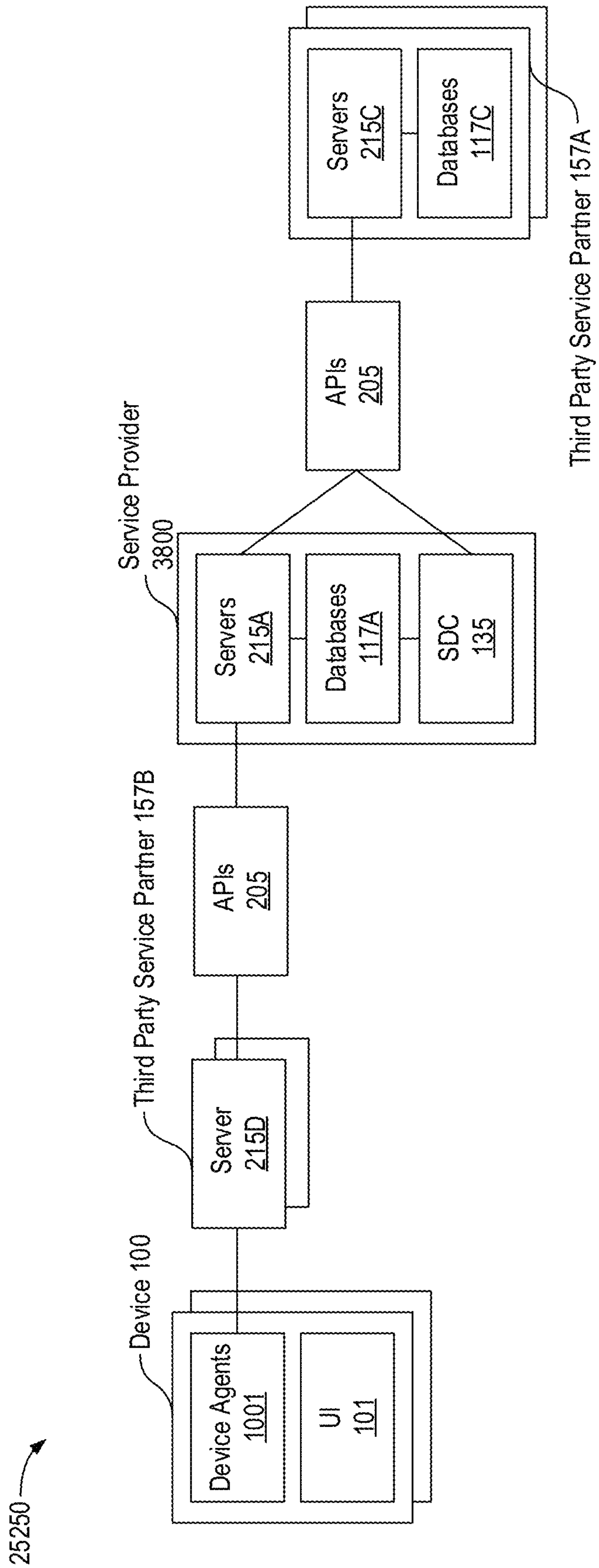

FIG. 296 illustrates a system 25250 in which a service provider 3800, e.g., a network operator, provides a set of APIs 205 through which one or more service partners 157A, 157B can interface to servers 215A managed by the service provider 3800 for providing communication services to user of mobile devices 100. In some embodiments, the set of APIs 205 is specified by the service provider 3800 and/or by the service partners 157A, 157B. In some embodiments, one or more servers 215C (or 215D) maintained by a service partner 157A (or 157B) interconnect with one or more servers 215A maintained by the service provider 3800 through the set of APIs 205. In some embodiments, the service partner's servers 215A include a service controller 122 that communicates with one or more device agents 1001 in the mobile device 100. In some embodiments, the service partner's servers 215A provide for translation of messages used for communication service management between formats used by different mobile devices 100 and a format used by the service provider 3800. In some embodiments, a set of network APIs 205 provides an interface between the service provider 3800 and third-party service partners 157A, 157B to interconnect one or more servers 215A in the service provider's network with one or more servers maintained by third-party service partners (e.g., servers 215C of third-party service partner 157A and/or servers 215D of third-party service partner 157B). In some embodiments, the set of network APIs 205 provides an interface between a service design center 135 of the service provider 3800 and the third-party service partners 157A, 157B. In some embodiments the set of network APIs 205 to the SDC 135 provides sandboxes through which the third-party service partners 157A, 157B can design and manage service plans that are distributed to mobile devices 100 through the service provider 3800 and/or through another third-party service partner's servers.

Figure 297:
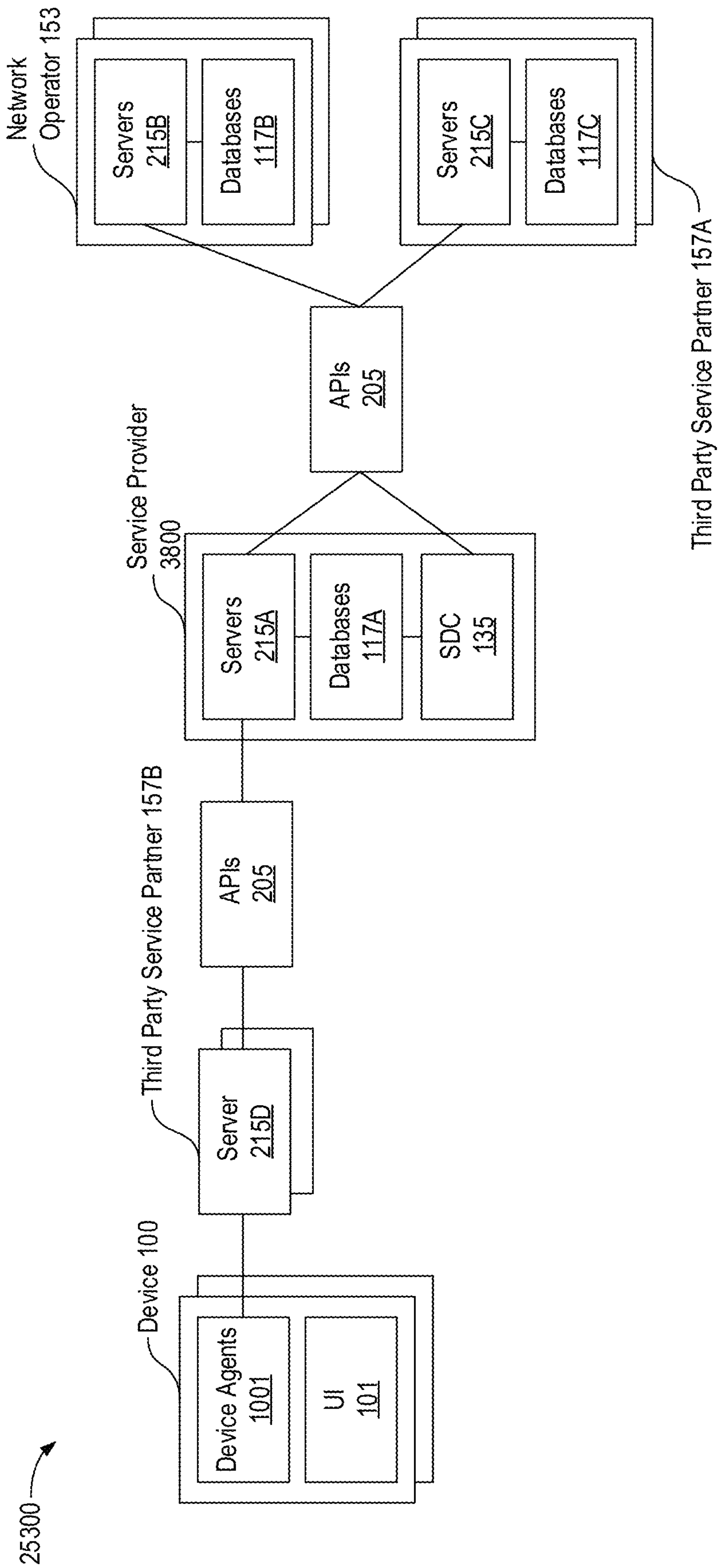

FIG. 297 illustrates a system 25300 in which a service provider 3800, e.g., a mobile virtual network operator (MVNO), provides a set of APIs 205 through which one or more service partners 157A, 157B, 153 can interface to servers managed by the service provider 3800 for providing communication services to user of mobile devices 100. As with the system 25200 illustrated in FIG. 295, the service provider 3800 can communicate through a set of network APIs 205 with multiple network operators 153 to provide communication services for different network operators to a mobile device 100.

Figure 298:
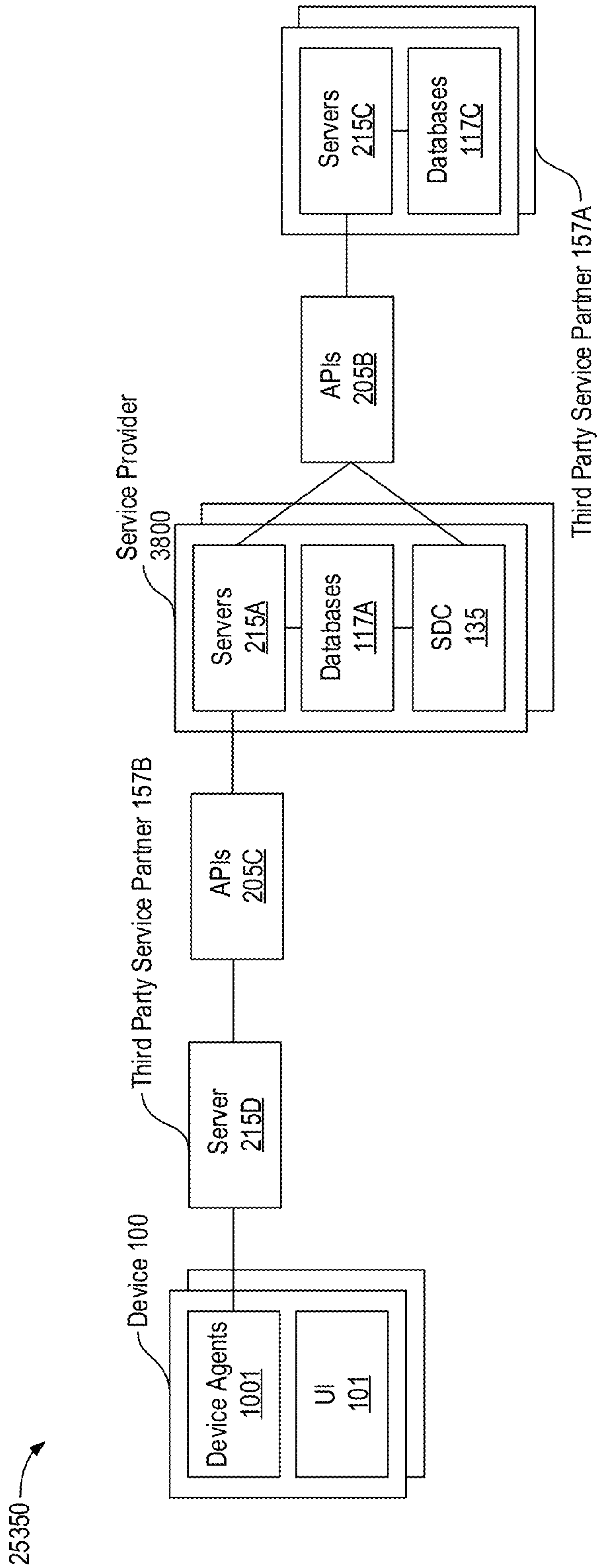

FIG. 298 illustrates a system 25350 in which a third-party service partner 157B provides a set of APIs 205C through which different service providers can communicate with different mobile devices 100 by way of the third-party service partner's server 215D. In some embodiments, the third-party service partner 157B specifies at least a portion of the set of APIs 205C to the service providers. In some embodiments, one or more service providers specify at least a portion of the set of APIs 205C to the third-party service partner 157B. In some embodiments, the third-party service partner 157B provides a communication service marketplace directly to users of mobile devices 100, e.g., akin to or integrated with an application store (Apple App Store, Google Play Store, Amazon App Marketplace). In some embodiments, the third-party service partner's server 215D provides a uniform and consistent communication service plan purchase and communication service management experience to users of mobile devices 100 for different service providers 3800 and/or for additional third-party service partners 157A, e.g., for communication service application developers. In some embodiments, the service providers 3800 provide a set of APIs 205B for communication service plan design and communication service management to interconnect one or more service provider network elements, e.g., servers 215A and/or databases 117A and/or service design centers 135, with service management systems, e.g., servers 215C and/or database 117C, of one or more of the third-party service partners 157A.

Figure 299:
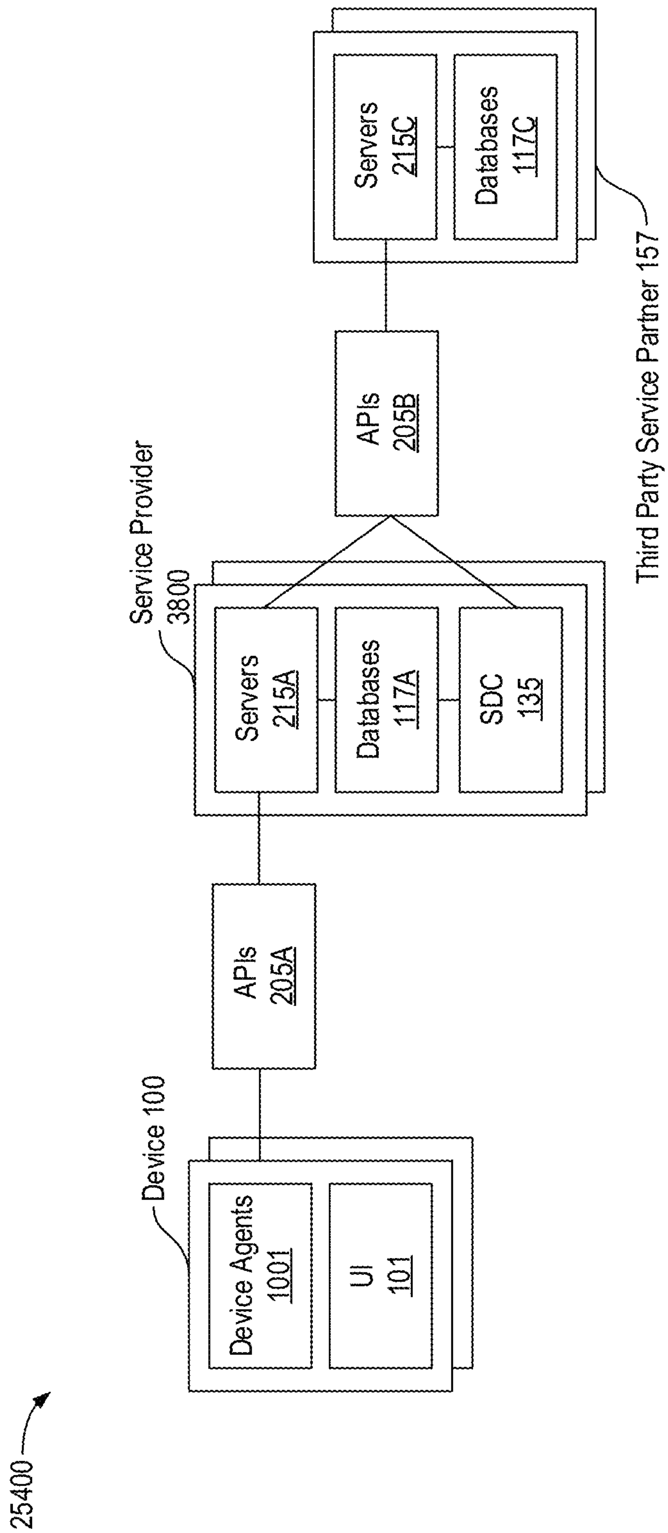

FIG. 299 illustrates a system 25400 similar to system 25350 of FIG. 298, except that the mobile devices 100 connect directly through a set of APIs 205A to the multiple service providers 3800. In some embodiments, the service providers 3800 adopt a common set of device APIs 205A to interface with multiple mobile devices 100 and/or a common set of network APIs 205B to interface with multiple third-party service partners 157 to offer a more consistent and uniform service plan purchase and service management experience for users of mobile devices 100.

In some embodiments, one or more APIs 205 are provided to implement service plan selection and customization for mobile wireless communication devices 100. In some embodiments, information to display service plans to the user and responses obtained from the user about service plan selection and customization are communicated through one or more APIs 205. In some embodiments, a user is presented a selection of content for service plans through the user interface 101 of the mobile wireless communication device 100. In some embodiments, the content is provided through one or more APIs 205. In some embodiments, service providers and/or third parties supply applications to the mobile wireless communication device 100 through which service plan selection, customization, and management are effected. In some embodiments, customization and selection of service plans occurs through the user interface 101 of the mobile wireless communication device 100. In some embodiments, service plan customization and selection occurs through a web browser application on the mobile wireless communication device 100. In some embodiments, customization and selection of service plans uses one or more specific applications provided by a service provider or by a third party and installed on the mobile wireless communication device 100. In some embodiments, service plan customization and selection uses applications provided with an operating system for the mobile wireless communication device 100. In some embodiments, the user selects and customizes service plans for one mobile wireless communication device 100A through another mobile wireless communication device 100B. In some embodiments, selection and customization of service plans occurs through a web browser communicating with a server or website or web portal. In some embodiments, a server 215 communicatively coupled to a wireless network provides information to the mobile wireless communication device 100 for service plan selection and customization. In some embodiments, information displayed to the user of a mobile wireless communication device for service plan selection and customization originates from storage in the mobile wireless communication device 100.

In some embodiments, one or more APIs 205 are provided to implement notifications for mobile wireless communication devices 100. In some embodiments, information to trigger and display notifications to the user and inputs obtained from the user in response to the notifications are communicated through one or more APIs 205. In some embodiments, notification messages, e.g., marketing interceptors, provide service plan offers to a user of the mobile wireless communication device 100. In some embodiments, the notification messages are presented directly through the user interface 101 of the mobile wireless communication device 100. In some embodiments, multiple service plan options are presented to the user of the mobile wireless communication device 100 for service plan selection. In some embodiments, a set of service plan selection options (and/or customization options) is presented in response to a user action. In some embodiments, the content of the set of service plan selection options depends on the particular action of the user. In some embodiments the user interface provides for sharing, assigning and controlling permissions for service plans among multiple mobile wireless communication devices 100.

Each generation of new mobile wireless communication devices provides improved processing and communication capabilities, and users enjoy a rich variety of applications offered for their mobile wireless communication devices through a number of application marketplaces (e.g., Apple iOS Application Store, Android OS Application Store, Amazon Application Store). To date, purchase platforms for communication services, e.g., as offered by service providers, have been restricted to a menu of pre-determined service plans, with limited (if any) options for selection, customization, sharing or controlling of service plans. A communication service marketplace, akin to or integrated with an application marketplace, can offer a much greater array of services to a user of the mobile wireless communication device than provided today. To realize a purchase platform through which a user can view, select, and customize communication services directly from the mobile wireless communication device, a service provider and/or a device hardware/software supplier can define one or more interfaces through which users, service providers, device suppliers, etc. communicate and exchange information to realize a "smart" service experience. In some embodiments, the one or more interfaces can include application programming interfaces (APIs) 205, including but not limited to, one or more device APIs 205A and one or more network APIs 205A.

A user's purchase experience and use of communication services through a communication service marketplace can be determined, at least in part, by interfaces defined and maintained by a managing entity of the communication service marketplace, e.g., a service provider, and also by interfaces defined and maintained by an original equipment manufacturer (OEM) and/or operating system (OS) supplier, e.g., a device hardware/software provider. A portion of interfaces can be realized through defined APIs that can connect between a mobile wireless communication device, one or more network elements of a service provider, and/or one or more service management systems of a third party, e.g., an OEM/OS supplier.

Disclosed herein are methods, systems, and apparatuses to provide for realizing a communication service marketplace through which a user can view, research, select and customize communication service plans for one or more mobile wireless communication devices 100. In some embodiments, the communication service marketplace is implemented using application programming interfaces (APIs) 205 between mobile wireless communication devices, network elements, and third-party service management systems. In some embodiments, the communication service marketplace offers communication services to users of mobile wireless communication devices 100. In some embodiments, users can access the communication service marketplace directly from mobile wireless communication devices 100. In some embodiments, users can activate new services for mobile wireless communication devices 100 in (near) real time. In some embodiments, charging and accounting systems are provided to simplify communication service purchases. In some embodiments, information is exchanged between one or more mobile wireless communication devices 100 and one or more network elements and/or service management systems to generate and enforce service policies associated with services offered through the communication service marketplace. In some embodiments, device agents 1001 in one or more mobile wireless communication devices 100 communicate with service controllers 122 in the service provider network to assist in implementing the communication service marketplace. In some embodiments, a user experience in purchasing a communication service through the communication service marketplace is simple and flexible, providing a consistent user experience across different devices and/or different service providers.

In some embodiments, the user of the mobile wireless communication device interacts with the communication service marketplace through an application on the mobile wireless communication device. In some embodiments, a service provider supplies the application on the mobile wireless communication device, e.g., a dedicated service provider application for service management that includes access to the communication service marketplace. In some embodiments, an original equipment manufacturer, an operating system supplier, or another third party provides the application on the mobile wireless communication device, e.g., a marketplace application that includes access to communication services in addition to other purchase objects, e.g., device applications. In some embodiments, the user of the mobile wireless communication device interacts with the communication service marketplace through a combination of one or more applications and operating system software resident on the mobile wireless communication device. In some embodiments, the user of the mobile wireless communication device purchases a communication service through the communication service marketplace, and one or more applications are also associated with the purchased communication service. In some embodiments, one or more of the associated applications are downloaded to the mobile wireless communication device in response to the communication service purchase. In some embodiments, a combination of software and hardware elements in the mobile wireless communication device interact with a service provider network to implement a service policy of a service plan associated with the service purchased through the communication service marketplace.

In some embodiments, purchases of services are billed to a credit card or a user credit account separate from a service provider network billing system. In some embodiments, service purchases are coordinated between a service provider network billing system and one or more external accounting and charging systems. In some embodiments, the user launches a service selection, customization and purchase interface directly from the mobile wireless communication device 100. In some embodiments, a service design center 135 is provided to customize services offered through the communication service marketplace. In some embodiments, a user researches, selects, reviews, modifies, shares, assigns, customizes and/or purchases communication services through an interface on the mobile wireless communication device 100.

Figure 300:
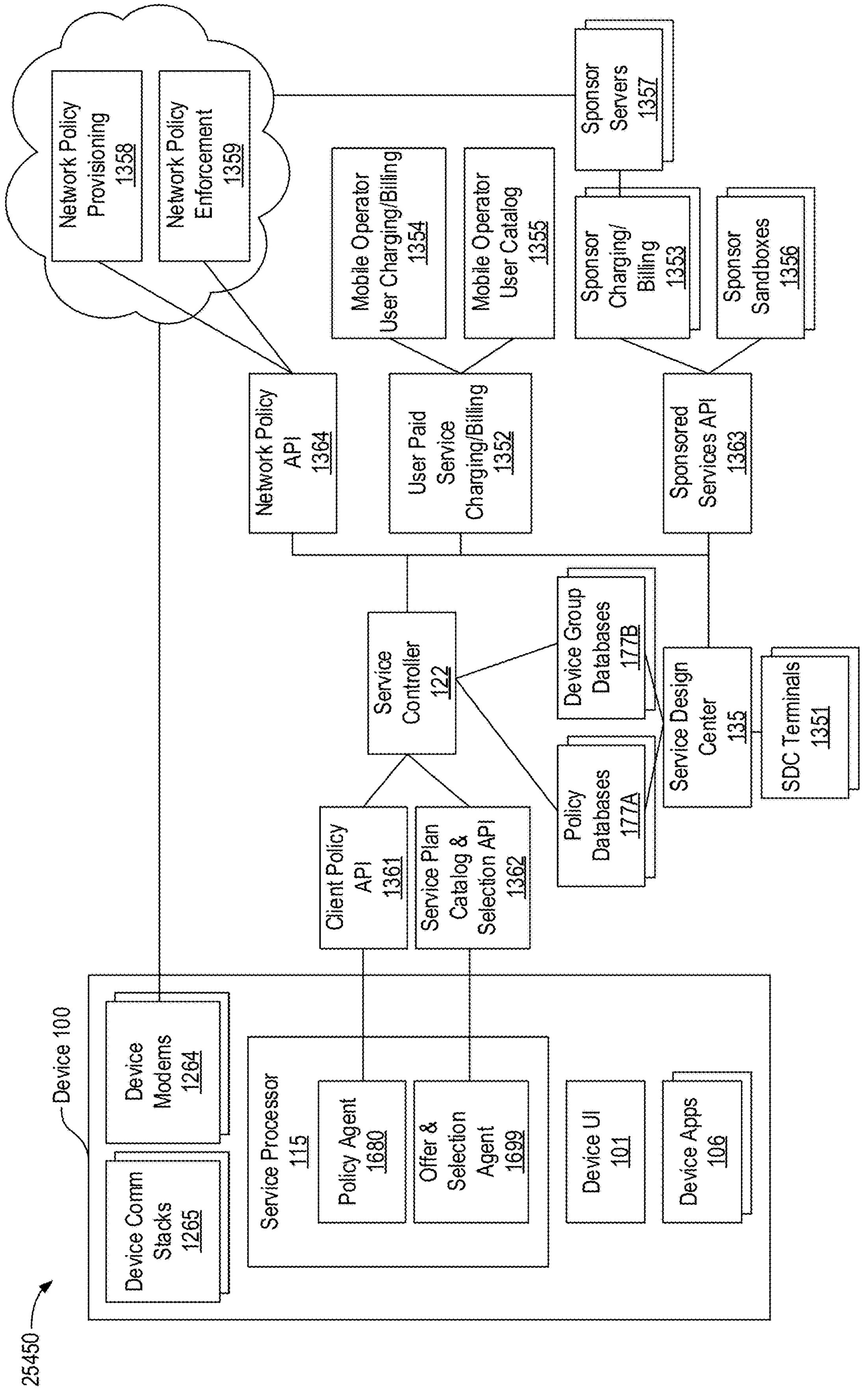

FIG. 300 illustrates an interconnected system 25450 including the mobile wireless communication device 100, the service controller 122, the service design center 135, additional service provider network elements, and third-party service partner systems. In some embodiments, the system 25450 illustrated in FIG. 300 provides an architecture for realizing the system 25200 of FIG. 295. In some embodiments, the mobile wireless communication device 100 interconnects to the service controller 122 through one or more device APIs. In some embodiments, the service controller 122 interconnects to one or more service provider network elements and third-party service partner systems through one or more network APIs. In some embodiments, the service design center 135 interconnects to one or more service provider network elements and third-party service partner systems through one or more network APIs. In some embodiments, one or more device agents (e.g., policy agent 1680, offer & selection agent 1699) in the mobile wireless communication device 100 communicate through one or more device APIs (e.g., client policy API 1361, service plan catalog & selection API 1362) with one or more network elements, e.g., with the service controller 122. In some embodiments, one or more device agents (e.g., policy agent 1680, offer & selection agent 1699) are included in the service processor 115 of the mobile wireless communication device 100.

In some embodiments, one or more device APIs include an API for communication and management of service policies for service plans that provide communication services for the mobile wireless communication device 100, e.g., a "Client Policy" API 1361. In some embodiments, one or more device APIs include an API for service plan selection and customization, e.g., a "Service Plan Catalog and Selection" API 1362. In some embodiments, additional device APIs (not shown) can interconnect the service controller 122 with one or more device agents of the service processor in the device 100.

In some embodiments, one or more network APIs include an API for communication and management of service policies between network elements, e.g., a "Network Policy" API 1364. In some embodiments, one or more network APIs include an API between one or more network elements, one or more service management systems, and/or one or more service design systems for the design and management of sponsored services, e.g., a "Sponsored Services" API 1363. In some embodiments, one or more network APIs include an API between one or more network elements and one or more service provider service management systems, including systems for user management and accounting/billing/charging systems, e.g., a "User Paid Service Charging/Billing" API 1352. In some embodiments, additional network APIs (not shown) can interconnect the service controller 122 with one or more network elements of mobile operators. In some embodiments, additional network APIs (not shown) can interconnect the service design center 135 with one or more service management systems of third-party service partners.

In some embodiments, design and management of communication services and service plans is facilitated at least in part by providing one or more device APIs that device agents and/or device applications of the mobile wireless communication device 100 use to interact with one or more network elements to realize a communication service marketplace. In some embodiments, information is provided and responses obtained through one or more device APIs between device agents of the mobile wireless communication device 100 and a network element, e.g., the service controller 122, to assist in the selection, customization, purchase and use of communication services. In some embodiments, one or more device APIs provide for communication of information for device group management for associating together one or more wireless communication devices. In some embodiments, one or more device APIs provide for communication of information for notifications to present to the user of the mobile wireless communication device 100 in response to various notification trigger conditions. In some embodiments, one or more device APIs provide for notifications to link users to a catalog of communication services, e.g., the communication service marketplace. In some embodiments, one or more device APIs provide for device application developers to create device application software that uses interface commands to view, select, customize, share, assign, modify, and use service plans for communication services.

In some embodiments, one or more device APIs include a “Service Plan Catalog & Selection” API 1362 as illustrated in FIG. 300 that interconnects an “Offer & Selection” device agent 1699 in the mobile wireless communication device 100 to the service controller 122. In some embodiments, through the “Service Plan Catalog & Selection” API 1362, information is exchanged to facilitate the presentation, selection, customization, purchase, subscription, sharing, and assigning of one or more service plans. In some embodiments, one or more service plans are organized into one or more service plan catalogs. In some embodiments, the “Offer & Selection” device agent 1699 communicates with the user through a user interface (UI) 101 of the device 100 to provide and obtain information for a service plan selection process. In some embodiments, the “Offer & Selection” device agent 1699 communicates with the user through a device application that communicates through the user interface (UI) 101 of the device to provide and obtain information for a service plan selection process.

In some embodiments, one or more device APIs provide for communication of information to the mobile wireless communication device 100 for communication service management. In some embodiments, the one or more device APIs include the “Service Plan Catalog & Selection” API 1362. In some embodiments, the information communicated through the one or more device APIs includes a set of options for service plans, e.g., all or a portion of a service plan catalog, that the user of the mobile wireless communication device 100 can view, research, modify, select, purchase and/or use. In some embodiments, the information communicated through the one or more device APIs includes options for sharing, assigning, or gifting service plans with other users and/or with other mobile wireless communication devices 100, e.g., devices belonging to a device group. In some embodiments, the information communicated through the one or more device APIs includes establishing and management of device groups. In some embodiments, the information communicated through the one or more device APIs includes adding devices to a service plan, service account or a device group. In some embodiments, the information communicated through the one or more device APIs includes establishing new service plans, service accounts, or device groups. In some embodiments, the information communicated through the one or more device APIs includes selections, modifications and/or purchase decisions from the user of the mobile wireless communication device 100. In some embodiments, the information communicated through the one or more device APIs includes service usage information. In some embodiments, the information communicated through the one or more device APIs includes triggers and/or trigger conditions for providing notifications to the user of the mobile wireless communication device 100. In some embodiments, information communicated through the one or more device APIs includes service usage information for one or more services used by the mobile wireless communication device 100. In some embodiments, the information communicated through the one or more device APIs includes marketing interceptors and service plan offers during device activation, service initialization, or application startup. In some embodiments, the information communicated through the one or more device APIs includes marketing interceptors and service plan offers during device use, service use or application use. In some embodiments, the information communicated through the one or more device APIs includes communication services, service plans, service plan offers, sponsored service plans, and/or service plan elements. In some embodiments, the information communicated through the one or more device APIs provides for displaying one or more communication services offered in a service plan catalog, including text elements and/or graphical elements, e.g., a service title, a service description, a service icon, a service provider logo, service features, service costs, and/or a service transaction code. In some embodiments, the information communicated through the one or more device APIs includes a device type identifier (e.g., from the mobile wireless communication device 100 to the service controller 122), and a “targeted” catalog of communication services (e.g., from the service controller 122 to the mobile wireless communication device 100) is returned based on the device type identifier supplied for the mobile wireless communication device 100. In some embodiments, the catalog of communication services is matched to the device type identifier. In some embodiments, the user selects a device type identifier to obtain the catalog of communication services. In some embodiments, the device type identifier for the mobile wireless communication device 100 is automatically detected. In some embodiments, the catalog of communication services includes services for multiple device types. In some embodiments, the catalog of communication services is presented to the user of the mobile wireless communication device 100 organized by device type. Representative device type identifiers include basic phone, feature phone, smart phone, tablet computer, portable computer, intermediate network device, or other communication device type identifiers. In some embodiments, the information communicated through the one or more device APIs includes display properties (e.g., size, color, etc.) to format text and/or graphics communicated to the mobile wireless communication device 100. In some embodiments, the information communicated through the one or more device APIs includes information for placement of text and/or graphics on the user interface of the mobile wireless communication device 100, e.g., organized into tabs, grouped into distinct regions, placed in specific areas, etc. through the device user interface. In some embodiments, the information communicated through the one or more device APIs includes user interface formatting and display constructs for presenting text and/or graphics through the user interface of the mobile wireless communication device 100. In some embodiments, any of the information described above is communicated through one or more device APIs, e.g., the “Service Plan Catalog & Selection” API 1362.

In some embodiments, a device agent on the mobile wireless communication device 100 submits a query through a device API to provide or obtain service usage information. In some embodiments, a notification is generated as a result of service usage information communicated through the device API. In some embodiments, a notification based on the service usage information is generated by a cloud-based service managed by a third party. In some embodiments, the notification generated by the cloud-based service is provided to the user of the mobile wireless communication device 100 through the user interface of the mobile wireless communication device 100. In some embodiments, an application on the mobile wireless communication device 100 generates a notification to the user of the mobile wireless communication device 100 based on the service usage information. In some embodiments, a service provider generates a notification based on the service usage information and provides the notification to the user of the mobile wireless communication device. In some embodiments, the service provider generated notification is communicated to the user of the mobile wireless communication device 100 through a cloud-based service managed by a third party. In some embodiments, notifications are presented to the user of the mobile wireless communication device through a device agent on the mobile wireless communication device 100. In some embodiments, service usage information and/or notifications and/or notification triggers are communicated between the mobile wireless communication device 100 and one or more network elements or third parties through a device API, a network API or a combination of both.

In some embodiments, as illustrated in FIG. 300, the device APIs include a "Client Policy" API 1361 that interconnects a "Policy" device agent 1680 in the mobile wireless communication device 100 to the service controller 122. In some embodiments, information required to implement service policies associated with service plans viewed, reviewed, selected, customized, shared, assigned, and/or purchased by the user of the mobile wireless communication device 100 are communicated by the service controller 122 to the policy agent 1680 in the mobile wireless communication device 100 through the "Client Policy" API 1361. In some embodiments, service policy information is obtained by the service controller 122 from one or more policy databases 177A and communicated to the policy agent 1680 on the mobile wireless communication device 100 through the "Client Policy" API 1361. In some embodiments, service policies in the policy databases 177A are designed and managed through the service design center 135. In some embodiments, service providers or third-party entities design and manage service plans and/or service policies through service design center terminals 1351 connected to the service design center 135.

In some embodiments, one or more network APIs 205B are provided between one or more network elements, e.g., the service controller 122 and the service design center 135, and other network elements or third-party service management systems that participate in communication service management.

In some embodiments, one or more network APIs 205B assist in facilitating communication between applications on the mobile wireless communication device 100 and elements of a service cloud, e.g., one or more network servers involved with communication service management. In some embodiments, one or more network APIs assist in facilitating communication between an application provider, a service provider, and/or a third party and the mobile wireless communication device 100, including applications resident and operational thereon. In some embodiments, one or more network APIs provide for information required by the application to facilitate communication service management, including access to the communication service marketplace, provisioning of network elements to realize communication services, and exchange of accounting, charging, and/or billing information for one or more communication services. In some embodiments, a network API is an open API (or a standard API, or a "required" API) published for application and operating system software developers to implement communication service management.

In some embodiments, one or more device APIs 205A and/or one or more network APIs 205B are determined at least in part by a service provider that offers communication services. Thus, a user experience of communication service management is controlled at least in part by the service provider, e.g., through service-provider-determined APIs. In some embodiments, to provide a more "uniform" user experience of communication service management across different devices, different original equipment manufacturers and/or different operating system suppliers conform at least in part to the service-provider-defined portion of one or more device APIs and/or network APIs. In some embodiments, network elements in a network controlled by the service provider are involved in designing, presenting, accepting and implementing service plans and in managing users (subscribers) of service plans. In some embodiments, the service design center 135 obtains information for service plan management through a device API and/or a network API.

In some embodiments, one or more device APIs 205A and/or one or more network APIs 205B are determined at least in part by an original equipment manufacturer or operating system supplier that provides hardware and/or software for the mobile wireless communication device 100. Thus, a user experience of communication service management is controlled at least in part by the original equipment manufacturer or operating system supplier, e.g., through one or more APIs that they determine. In some embodiments, to provide a more "uniform" user experience of communication service management across different service providers, the different service providers conform at least in part to the original equipment manufacturer or operating system supplier defined portion of a device API and/or a network API. In some embodiments, interfaces between applications and an operating system on the mobile wireless communication device 100 conform at least in part to a device API and/or a network API.

In some embodiments, communication service management, including services offered through the communication service marketplace, provides for the user of the mobile wireless communication device 100 to select among services offered by multiple service providers. In some embodiments, e.g., through an application that supports access to the communication service marketplace, the user of the mobile wireless communication device 100 selects a service provider from a set of service providers. In some embodiments, the selection of the service provider by the user of the mobile wireless communication device 100 is communicated through a device API to a network element (or other communication service management system communicatively linked to the network 1100), e.g., the service controller 122. In some embodiments, the service provider selection is communicated through the "Service Plan Catalog & Selection" API 1362. In some embodiments, the service controller 122 communicates a catalog of communication services to the mobile wireless communication device 100 based at least in part on the service provider selection communicated through the device API, e.g., the "Service Plan Catalog & Selection" API 1362. In some embodiments, the catalog of communication services communicated to the mobile wireless communication device 100 is matched to the mobile wireless communication device 100 (e.g., based on a device type identifier), the user of the mobile wireless communication device 100 (e.g., based on a user identifier), a service usage history associated with a service account, and/or a set of responses provided by the user of the mobile wireless communication device 100 to a set of queries from the service controller 122. In some embodiments, the user of the mobile wireless communication device 100 selects one or more of the services offered in the provided service catalog through a device API, e.g., the "Service Plan Catalog & Selection" API 1362. In some embodiments, the user of the mobile wireless communication device 100 customizes a selected service through a device API, e.g., the "Service Plan Catalog & Selection" API 1362. In some embodiments, the user of the mobile wireless communication device 100 shares or assigns all or a portion of the selected service with another wireless communication device 100 through a device API, e.g., the "Service Plan Catalog & Selection" API 1362.

As illustrated in FIG. 1, the service design center 135 provides, in some embodiments, a service provider interface and/or a third-party interface 145 through which service plans can be designed and managed. In some embodiments, catalogs of service plans are designed through a service provider/third-party interface 145 of the service design center 135. In some embodiments, the service provider/third-party interface 145 of the service design center 135 includes one or more network APIs through which information is communicated to manage service plans. In some embodiments, a service provider or a third party determines elements of a service plan through one or more network APIs connected to the service design center 135. In some embodiments, the service provider or the third party associates user interface constructs with a service plan to design the look and feel of the service plan when presented to a user through the user interface of the mobile wireless communication device 100.

In some embodiments, multiple service design centers 135 are involved in service plan design and management. In some embodiments, a service provider manages a first service design center 135 and an original equipment manufacturer or operating system supplier manages a second service design center 135. In some embodiments, through a network API of the first service design center 135 managed by the service provider, a communication service manager (e.g., a service plan designer, an application designer, a service administrator) selects elements of service plans, designs pre-defined and customizable service plans, and/or organizes catalogs of service plans. In some embodiments, through a network API of the second design center 135 managed by the original equipment manufacturer or the operating system supplier, the communication service manager selects user interface elements and organizes the display of service plan information for a communication service catalog as presented through the user interface to the user of the mobile wireless communication device. In some embodiments, the first service design center 135 provides for the communication service information content presented to the user of the mobile wireless communication device 100, and the second service design center 135 provides for the look and feel of the presentation of the information. In some embodiments, the functions described for the first and second service design centers 135 are realized in a single service design center 135.

In some embodiments, a network API of the service design center 135 (and/or the service controller 122) provides for design and management of sponsored services, e.g., a "Sponsored Services" API 1363 as illustrated in FIG. 300. In some embodiments, a service provider managed service design center 135 provides a network API for determining sponsored services, e.g., the "Sponsored Services" API 1363. In some embodiments, an original equipment manufacturer or operating system supplier managed service design center 135 provides a network API for determining sponsored services, e.g., the "Sponsored Services" API 1363. In some embodiments, the service design center 135 provides for one or more "sandboxes" that are included in the service provider/third-party interface 145, through which information is communicated between the service design center 135 and a service provider or third party. In some embodiments, individual sandboxes provide a protected, defined environment for service plan design and management for a subset of service plans, devices, and/or users (subscribers) of communication services. In some embodiments, a sandbox provides a subset of service design center management controls through which service plans can be designed. In some embodiments, the sandbox provides for selection of devices, device groups, user and user groups. In some embodiments, the sandbox provides for customizing service plan appearance (e.g., branding). In some embodiments, the sandbox provides an interface for a limited set of functions applicable for sponsored service design by one or more third parties. In some embodiments, design and management of sponsored service plans is implemented using sponsor sandbox terminals interconnected through a network API, e.g., the "Sponsored Services" API 1363 illustrated in FIG. 300, to the service design center 135 and/or the service controller 122.

In some embodiments, one or more sandboxes of the service provider/third-party interface 145 provide for the design and management of sponsored services. In some embodiments, through a network API provided through a sponsored service sandbox, e.g., the "Sponsored Services" API 1363 illustrated in FIG. 300, a third party can select from pre-configured or customizable service plans to sponsor. In some embodiments, through a network API, e.g., the "Sponsored Services" API 1363, the third party can sponsor a service plan for a user, a user group, a device, or a device group. In some embodiments, through a network API, e.g., the "Sponsored Services" API 1363 an application developer can sponsor a service plan and associate one or more applications with the sponsored service plan. In some embodiments, through a network API, e.g., the "Sponsored Services" API 1363, information for sponsorship of the service plan is communicated, including transaction codes, service plan descriptors, charging information, accounting information, billing information, and revenue sharing arrangements for the sponsored service plan. In some embodiments, one or more sponsor's charging and billing management systems interconnect with the service controller 122 and/or the service design center 125 through a network API, e.g., the "Sponsored Services" API 1363. In some embodiments, charging and billing information associated with one or more sponsored services for one or more users of mobile wireless communication devices 100, is communicated through a network API, e.g., the "Sponsored Services" API 1363.

In some embodiments, through a network API, the third party can design parameters of a sponsored service credit system. In some embodiments, the sponsored service credit system provides for user points/credits based on one or more different service activities, e.g., based on application purchase or use, advertisement views, quantifiable amounts of service usage, etc. In some embodiments, through a network API, information to maintain a tally of service credits earned and spent for the sponsored service is communicated. In some embodiments, through the network API, information to relate a purchase from a storefront to a service credit is provided. In some embodiments, the third party, through a network API, designs the sponsored service including parameters for the sponsored service credit system, e.g., for each X monetary units spent in a particular storefront, a user is credited Y monetary units in service credit. In some embodiments, the service provider provides sponsored services in a wholesale configuration, in a pass through configuration, or in a direct configuration.

In some embodiments, a network API of the service controller 122 (and/or the service design center 135) provides for network policy management of services, e.g., a "Network Policy" API 1364 as illustrated in FIG. 300. In some embodiments, the "Network Policy" API 1364 communicates information between the service controller 122 (and/or the service design center 135) to one or more network elements used for network policy provisioning and network policy enforcement. In some embodiments, the network elements used for network policy provisioning and network policy enforcement are situated in the network 1100. In some embodiments, the service controller 122 exchanges information for communication service management, e.g., in response to service plan selection and/or customization by the user of the mobile wireless communication device 100, with a network element in the network 1100, e.g., with the "Network Policy Provisioning" system 1358 illustrated in FIG. 300, through the "Network Policy" API 1364. In some embodiments, the "Network Policy Provisioning" system 1358 provisions or activates a selected and/or customized service plan in response to information obtained through the "Network Policy" API 1364 from the service controller 122. In some embodiments, the "Network Policy Provisioning" system 1358 provisions or activates the service plan in conjunction with one or more charging and billing systems. In some embodiments, the "Network Policy Provisioning" system 1358 communicates through the "Network Policy" API 1364 to the service controller 122 to confirm service provisioning of the selected and/or customized service plan. In some embodiments, the service controller 122 communicates with one or more device agents in the service processor 115 of the mobile wireless communication device 100, e.g., the "Policy" device agent 1680 illustrated in FIG. 300, to confirm the service plan selection and/or customization through a device API, e.g., through the "Client Policy" API 1361.

In some embodiments, the "Network Policy" API 1364 communicates information for service provisioning, service updating, service selection, service customization, and/or service activation between the "Network Policy Provisioning" network element 1358 and the service controller 122. In some embodiments, the service controller 122 communicates with different wireless networks managed by different service providers using a common network API, e.g., the "Network Policy" API 1364, for each of the different wireless networks. In some embodiments, the service controller 122 implements common protocols through one or more network APIs interconnecting one or more network elements of wireless networks managed by different service providers, wherein the common protocols provide for uniform communication service management across multiple service providers. In some embodiments, the service controller 122 provides a uniform "translation" function between device agents of the service processor 115 of the mobile wireless communication device 100 and network elements in one or more wireless networks managed by different service providers, thereby providing a consistent communication service management experience for the user of the mobile wireless communication device 100.

In some embodiments, a network API of the service controller 122 (and/or the service design center 135) provides for communicating information for accounting, charging and billing of communication services provided to the user of the mobile wireless communication device 100, e.g., a "User Paid Service Charging/Billing" API 1352 as illustrated in FIG. 300. In some embodiments, the "User Paid Service Charging/Billing" API 1352 communicates information between the service controller 122 (and/or the service design center 135) to one or more network elements and/or one or more third-party service management systems used for accounting, billing, and/or charging for service usage of communication services. In some embodiments, detailed service usage records are communicated between the service controller 122 and a service provider system used for accounting, charging, and/or billing for service usage, e.g., the "Mobile Operator User Charging/Billing" system 1354 illustrated in FIG. 300, through the "User Paid Service Charging/Billing" API 1352. In some embodiments, service usage information communicated includes one of more classifications of service usage. In some embodiments, service usage information to assist in accounting, charging and billing for services include one or more of: device credentials, user credentials, service usage amounts, service usage times, service plans, service usage accounting codes, service usage charging codes, and service usage billing codes. In some embodiments, the "User Paid Service Charging/Billing" API 1352 communicates information between the service controller 122 (and/or the service design center 135) and one or more service management systems (of a service provider or a third party) that manages information about users (subscribers) of service plans.

Figure 301:
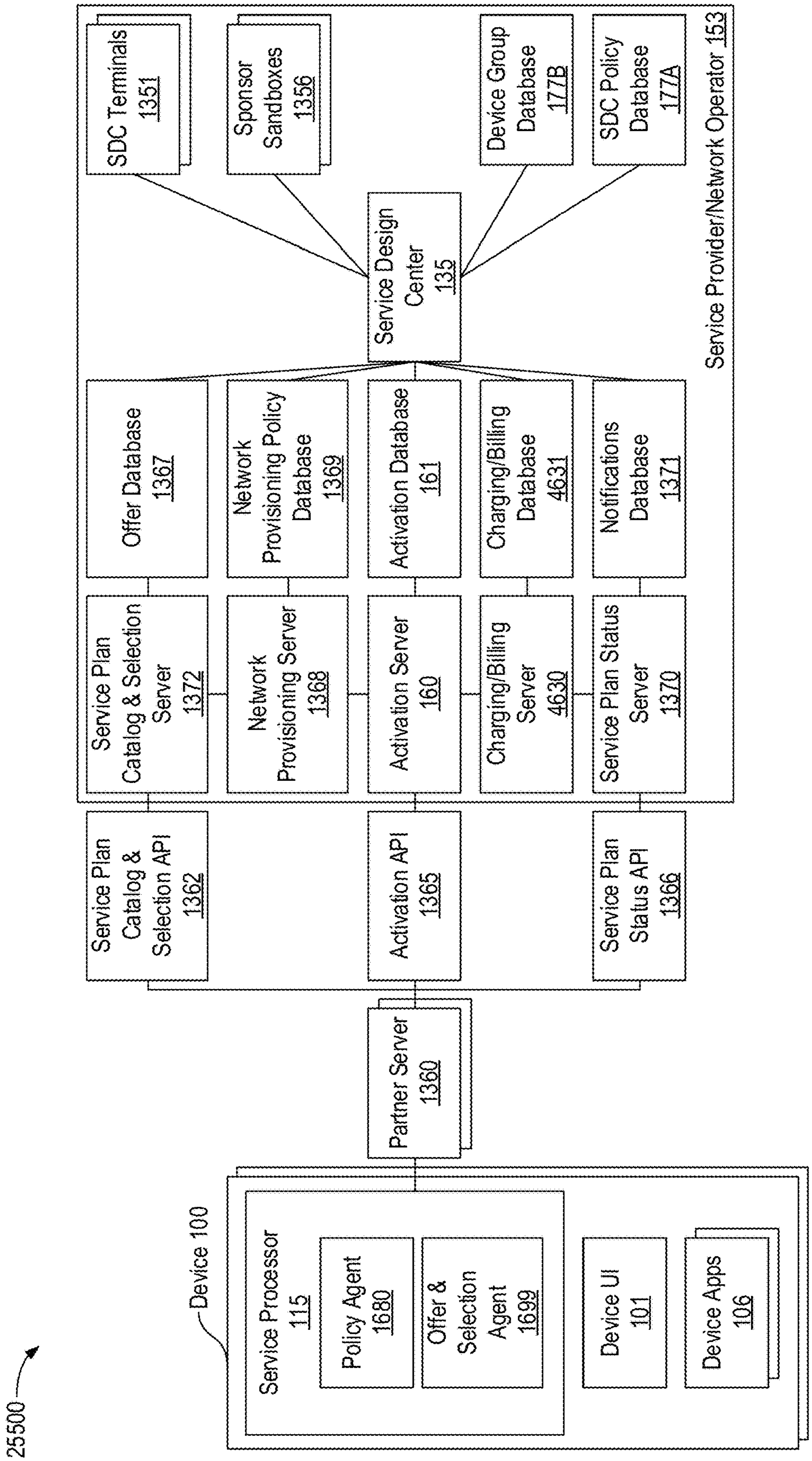

FIG. 301 illustrates a system 25500 that interconnects one or more mobile devices 100 through one or more servers 1360 provided and managed by third-party service partners to network elements of a service provider 153, e.g., servers (e.g., 1372, 1368, 160, 4630, 1370), databases (e.g., 1367, 1369, 161, 4631, 1371), and a service design center 135. In some embodiments, FIG. 301 illustrates a representative system architecture for the system 25250 illustrated in FIG. 296 that provides for third-party partners to interconnect mobile devices 100 of users to a service provider through a set of APIs (e.g., 1362, 1365, 1366) to provide communication services, and also provides for third-party partners to interconnect communication service management systems, e.g., servers and databases that the third-party partner maintains, to network elements in the service provider for communication service plan design and communication service administrative management. In some embodiments, one or more device agents (e.g., policy agent 1680, offer & selection agent 1699) of a service processor 115 in a mobile device 100 interact with a service controller in a server of a third-party service partner. In some embodiments, the third-party service partner's server communicates with the device agents (e.g., policy agent 1680, offer & selection agent 1699) to provide for communication service management, including one or more of: device activation, service plan catalog distribution, service plan selection, service plan customization, service plan provisioning, service plan status reporting, service usage monitoring, service notifications, and service usage accounting.

In some embodiments, the third-party service partner server connects to servers maintained by a service provider (and/or network operator) through one or more APIs. In some embodiments, multiple servers in the service provider network provide for individual APIs to the third-party service partner's server. In some embodiments, a "Service Plan Catalog & Selection" server 1372 interconnects to the third-party service partner's server 1360 through a "Service Plan Catalog & Selection" API 1362 through which service plan information is communicated to offer service plans to the user of the mobile device 100 and through which service plan selections and customization choices are obtained from the user of the mobile device 100. In some embodiments, the "Service Plan Catalog & Selection" Server 1372 connects to an "Offer" database 1367 that contains a collection of service plan catalogs, service plan offer sets, and individual service plans that can be communicated to the user of the mobile device 100 through the "Service Plan Catalog & Selection" API 1362. In some embodiments, a portion of the collection of service plan catalogs, service plan offer sets, and individual service plans in the offer database is designed through the service design center 135. In some embodiments, service plans, offer sets, and catalogs are designed through SDC terminals 1351 connected to the service design center 135. In some embodiments, service plans, offer sets, and catalogs are designed through one or more "sandboxes" 1356 that provide for limited access by third-party service provider partners, e.g., by service sponsors.

In some embodiments, an "Activation" server 160 interconnects to the third-party service partner's server 1360 through an "Activation" API 1365 through which mobile devices 100 and/or service plans for mobile device 100 can be activated with the service provider, the network operator, and/or a third-party service partner. In some embodiments, the activation server 160 interconnects with additional servers (e.g., 1368, 1372, 4630, 1370) maintained by the service provider and/or the network operator to provide for establishing service usage accounting, billing, and charging for services subscribed to and/or consumed by the user of the mobile device 100. In some embodiments, the activation server 160 communicates information about device activation and/or service plan activation obtained through the activation API 1365 from the third-party service partner's server to a network provisioning server 1368 and/or an accounting/billing/charging server 4630. In some embodiments, the network provisioning server 1368 obtains network provisioning policy information from a network provisioning policy database 1369 in response to information received from the activation server 160 in order to provision one or more network elements in the service provider and/or network operator's network in order to realize communication services selected and/or customized by the user of the mobile device 100. In some embodiments, in response to information obtained from the activation server 160, the accounting/billing/charging server 4630 exchanges account information with an accounting/billing/charging database 4631 to establish and/or update accounting, charging, and/or billing arrangements for services subscribed to by the user of the mobile device 100.

In some embodiments, a "Service Plan Status" server 1370 interconnects to the third-party service partner's server 1360 through a "Service Plan Status" API 1366 through which service usage information and service notifications can be exchanged. In some embodiments, the service plan status server 1370 provides service usage information to the accounting/billing/charging server 4630 to provide for determining service charges for services consumed by the mobile device 100. In some embodiments, the service plan status server 1370 interconnects with a notifications database 1371 that includes information for notification triggers, notification content, marketing interceptors, and other service usage and service plan information that can be provided to the user of the mobile device 100. In some embodiments, information from the notifications database 1371 is provided to the mobile device 100 in response to service usage monitoring based on service usage communicated to the service plan status server 1370 through the service plan status API 1366. In some embodiments, information contained in the notifications database 1371 for notification triggers, notification content, and marketing interceptors is designed by administrators of the service provider through an SDC terminal 1351 connected to the service design center 135. In some embodiments, third-party service partners design information contained in the notifications database 1371 through an SDC terminal 1351 or through a sponsor sandbox 1356.

In some embodiments, the service design center 135 interconnects with a device group database 177B that provides for information on associating mobile devices 100 together as a device group. In some embodiments, properties of and/or content for service plans, service notifications, service restrictions, service offers, and service accounting/charging/billing are determined, at least in part, by a device group to which the mobile device 100 belongs. In some embodiments, service provider administrators and/or device group administrators can manage device groups, e.g., through the SDC terminals 1351 and/or the sponsor sandboxes 1356. In some embodiments, a device group manager is a user of a mobile device 100, and the device group manager can establish and modify device groups and service controls for devices 100 in device groups. In some embodiments, the device group administrator manages device groups, service plan properties, service plan controls, notifications, and other service management through the device UI 101 of the mobile device 100. In some embodiments, information for device group control is communicated to one or more servers maintained by a service provider, network operator and/or third-party service partner through one or more APIs that interconnect the servers to a third-party service partner's server (or directly to the mobile device 100). In some embodiments, the device group database 177B interconnects with the "Service Plan Catalog & Selection" server 1372 or another server that interconnects with the third-party service partner's server 1360 through one or more APIs.

Figure 302:
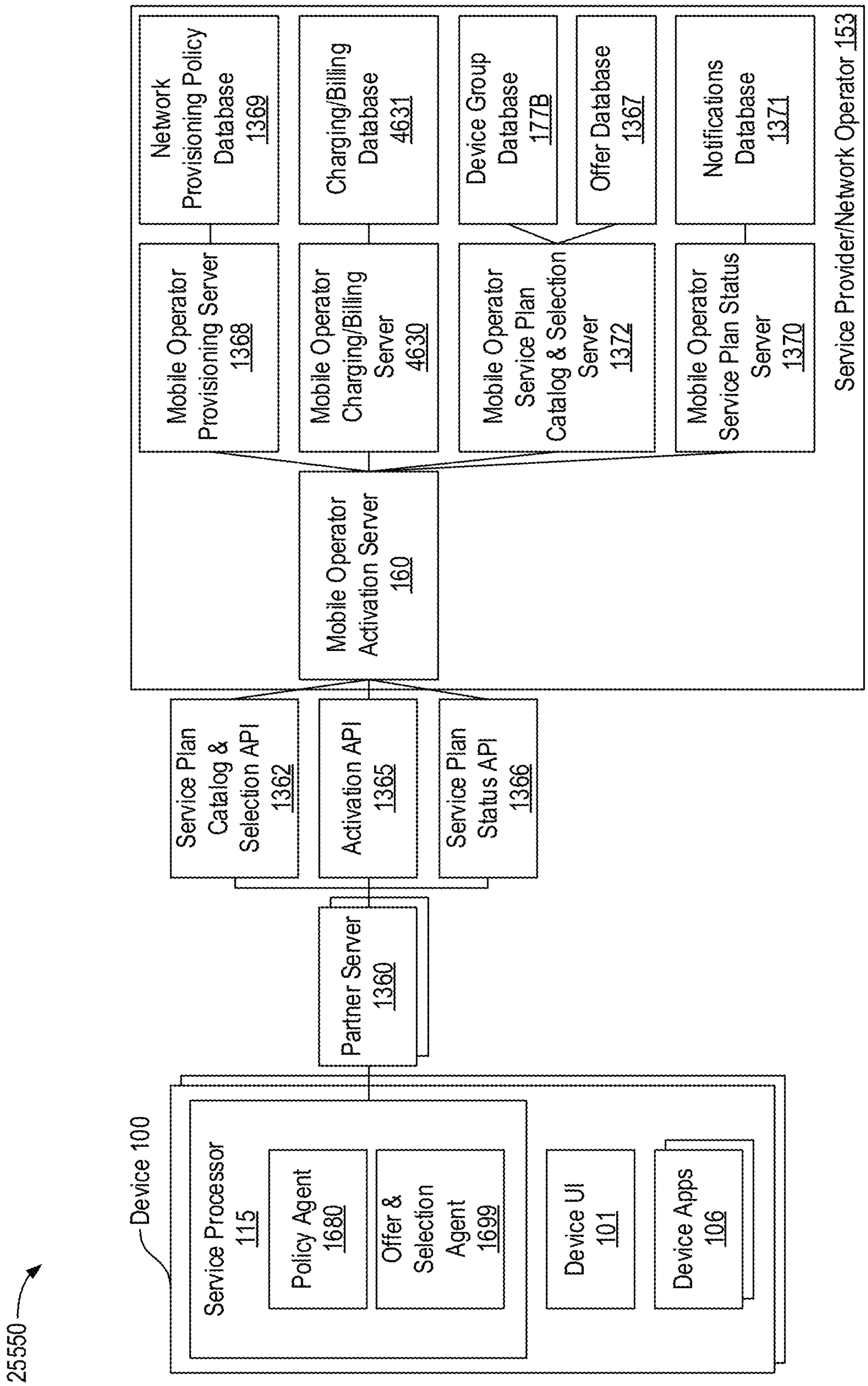

FIG. 302 illustrates a system 25550 that interconnects one or more mobile devices 100 through one or more servers 1360 provided and managed by third-party service partners to network elements of a service provider, e.g., servers (e.g., 160, 1368, 4630, 1372, 1370), databases (e.g., 1369, 4631, 177B, 1367, 1371), and a service design center 135 (not shown). In some embodiments, as described above for FIG. 301, one or more device agents 1001 (e.g., policy agent 1680, offer & selection agent 1699) of a service processor 115 in a mobile device 100 interact with a service controller in a server 1360 of a third-party service partner. In some embodiments, the third-party service partner's server 1360 communicates with the device agents 1001 to provide for communication service management, including one or more of: device activation, service plan catalog distribution, service plan selection, service plan customization, service plan provisioning, service plan status reporting, service usage monitoring, service notifications, and service usage accounting. In some embodiments, the third-party service partner's server communicates with a mobile operator activation server 160 through one or more APIs (e.g., service plan catalog & selection API 1362, activation API 1365, service plan status API 1366). In some embodiments, the APIs provide for communication service management between the mobile devices 100 and the service provider and/or network operator 153 through the third-party service partner's server 1360. In some embodiments, the same APIs (or variants thereof) described above for FIG. 301 can also be used between the third-party service partner's server 1360 and the mobile operator activation server 160. In the system 25550 illustrated in FIG. 302, the mobile operator activation server 160 acts as a single point of communication with the third-party service partner's server 1360, and communicates with additional servers and databases connected thereto within the mobile operator's network. In some embodiments, the service provider/network operator 153 (mobile operator) specifies the set of APIs, and multiple third-party service partners configure their servers 1360 to communicate with the mobile operator activation server 160 through the specified set of APIs. In some embodiments, the set of APIs is specified at least in part by one or more of the third-party service partners in addition to the mobile operator.

Figure 303:
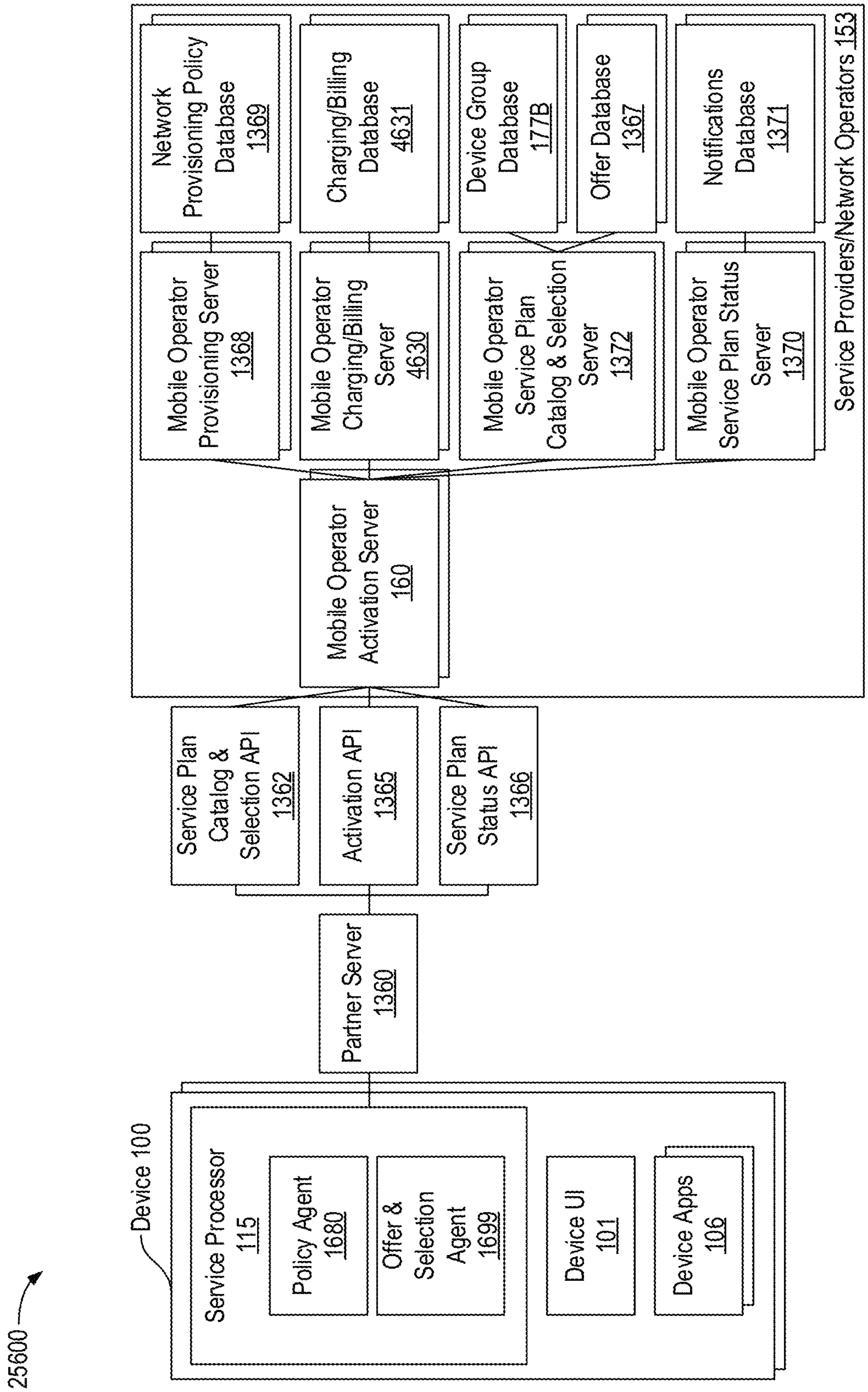

FIG. 303 illustrates a system 25600 that interconnects one or more mobile devices 100 through a third-party service partner's server 1360 to network elements of multiple service providers, e.g., servers (e.g., 1368, 4630, 1372, 1370, 160), databases (e.g., 1369, 4631, 177B, 1367, 1371), and service design centers 135 (not shown). In some embodiments, as described above for FIGS. 301 and 302, one or more device agents 1001 (e.g., policy agent 1692, offer & selection agent 1699) of a service processor 115 in a mobile device 100 interact with a service controller in a server 1360 of a third-party service partner. In some embodiments, the third-party service partner's server 1360 communicates with the device agents 1001 to provide for communication service management, including one or more of: device activation, service plan catalog distribution, service plan selection, service plan customization, service plan provisioning, service plan status reporting, service usage monitoring, service notifications, and service usage accounting. In some embodiments, the third-party service partner's server communicates with different mobile operators' activation servers 160 through one or more APIs (e.g., service plan catalog & selection API 1362, activation API 1365, service plan status API 1366). In some embodiments, the APIs provide for communication service management between the mobile devices 100 and the service provider and/or network operator 153 through the third-party service partner's server 1360. In some embodiments, the same APIs (or variants thereof) described above for FIGS. 301 and 302 can also be used between the third-party service partner's server 1360 and the mobile operator activation server 160. In the system 25600 illustrated in FIG. 303, each mobile operator's activation server 160 acts as a single point of communication with the third-party service partner's server 1360, and communicates with additional servers and databases connected thereto within the respective mobile operator's network. In some embodiments, the set of APIs is specified by one or more of the service providers/network operators 153 (mobile operators), and a third-party service partner configures its server to communicate with the mobile operator activation server 160 through the specified set of APIs. In some embodiments, the set of APIs is specified at least in part by one or more of the third-party service partners in addition to the mobile operator.

Figure 304:
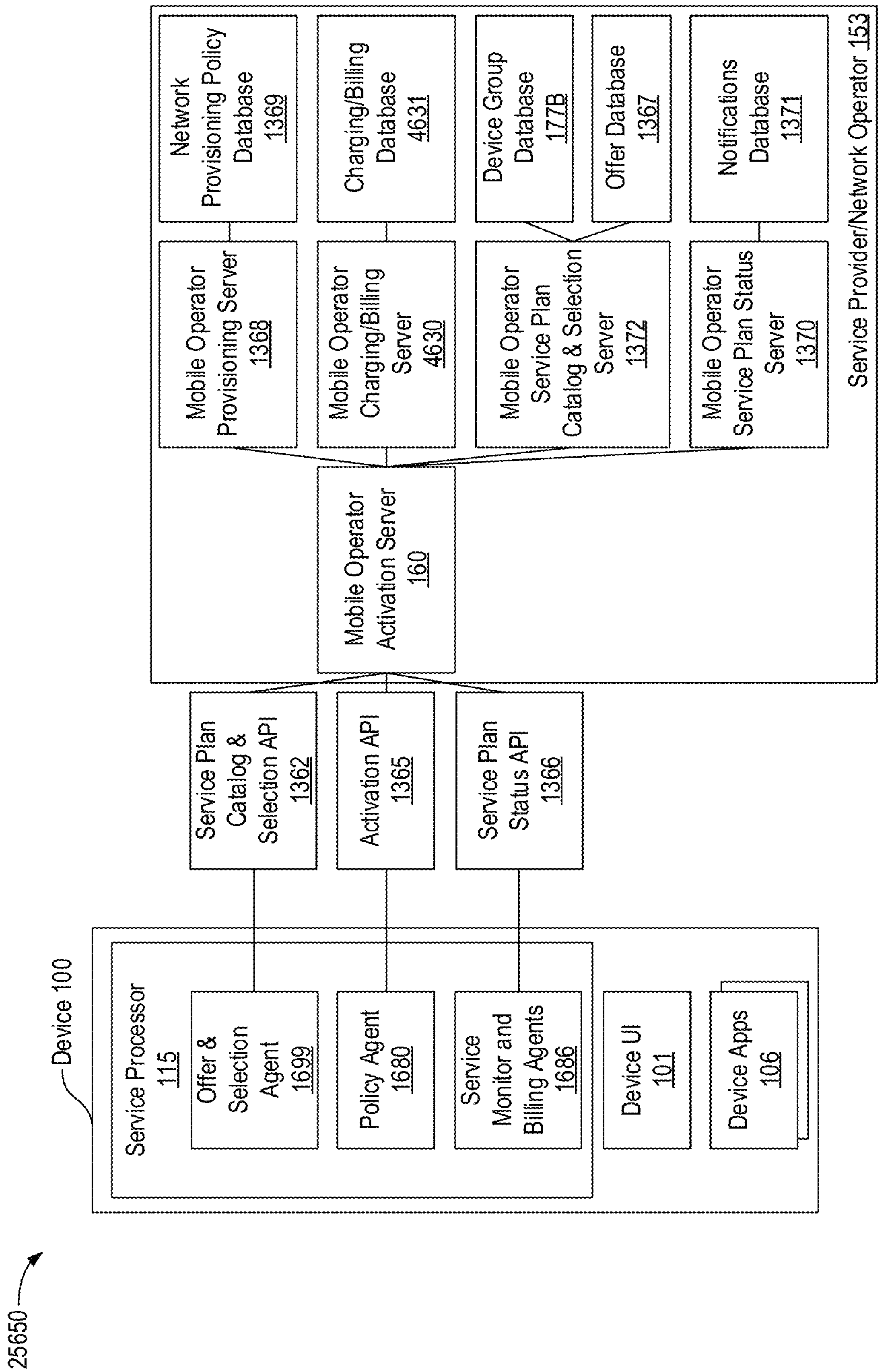
Figure 305:
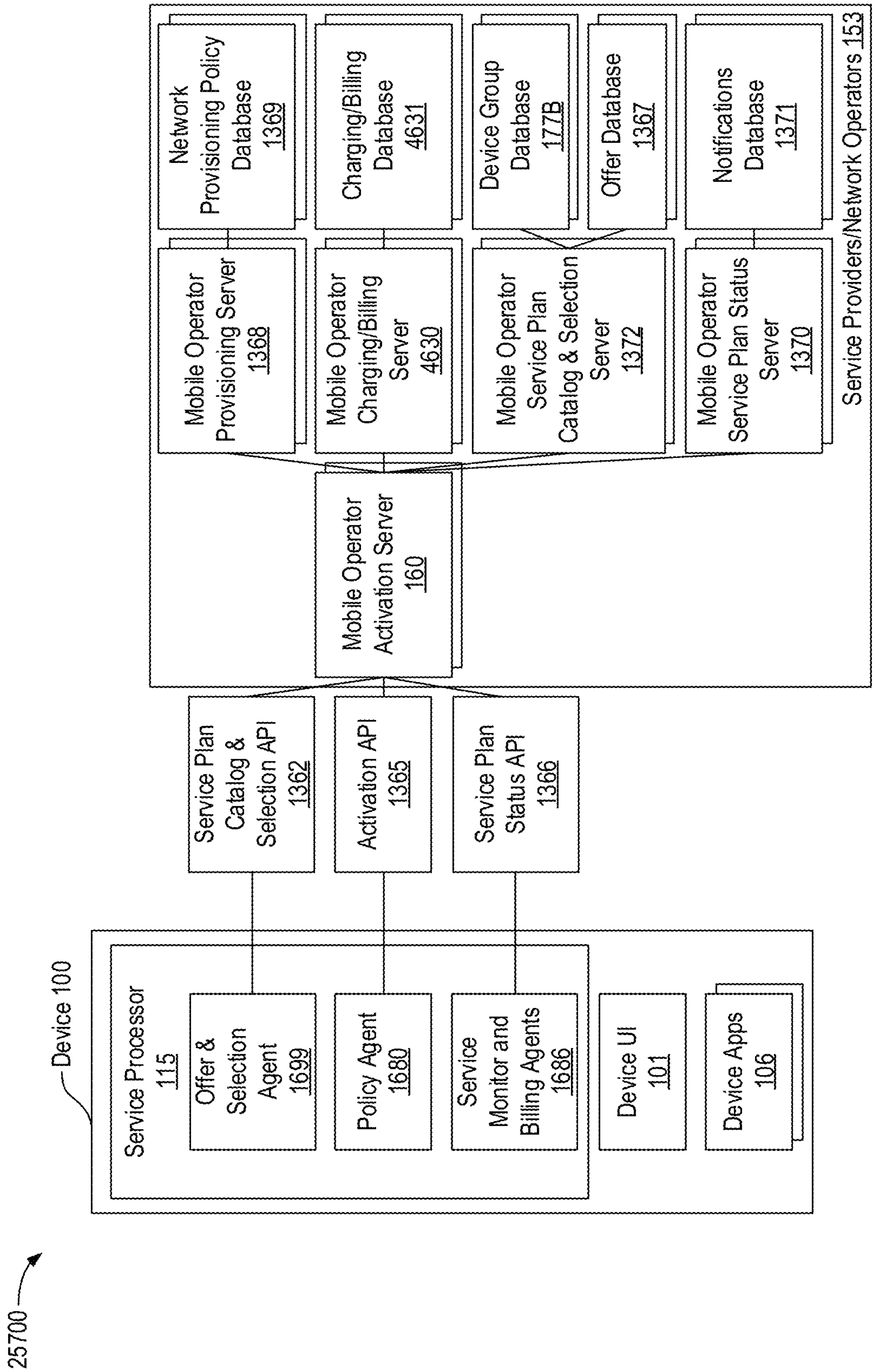

FIGS. 304 and 305 illustrate additional systems 25650 and 25700, respectively, that interconnect a mobile device 100 to a single mobile operator (FIG. 304) or to multiple mobile operators (FIG. 305) directly through a set of APIs (e.g., service plan catalog & selection API 1362, activation API 1365, service plan status API 1366), without an intervening third-party service partner's server. As described above for FIGS. 291-303, in some embodiments, the set of APIs between the mobile device 100 and the mobile operator activation server 160 provides for communication service management between the mobile device 100 and the service provider and/or network operator 153. In some embodiments, the set of APIs provides for communication service management, including one or more of: device activation, service plan catalog distribution, service plan selection, service plan customization, service plan provisioning, service plan status reporting, service usage monitoring, service notifications, and service usage accounting.

In some embodiments, the set of APIs illustrated in FIGS. 291-305 (e.g., service plan catalog & selection API 1362, activation API 1365, service plan status API 1366) assists in providing for communication service and device group management for mobile devices 100. In some embodiments, one or more APIs in the set of APIs assist in providing for the presentation of service plan options (e.g., catalogs of service plans, service plan selection options, service plan customization options) to a user of a mobile device 100. In some embodiments, the presentation of service plan options occurs through the user interface 101 of the mobile device 100. In some embodiments, indications of service plan selection and/or customization are provided to a server through one or more APIs in the set of APIs (e.g., service plan catalog & selection API 1362, activation API 1365, service plan status API 1366). In some embodiments, the service plan selection and/or customization indications are provided to an activation server 160 maintained by a service provider and/or a network operator 153. In some embodiments, the service plan selection and/or customization indications are provided directly to the activation server 160 from the mobile device 100 through one or more APIs (e.g., service plan catalog & selection API 1362, activation API 1365, service plan status API 1366). In some embodiments, the service plan selection and/or customization indications are provided directly to a server 1360 of a third-party service partner that then communicates them to the service provider and/or network operator activation server 160 through one or more APIs. In some embodiments, the service plan selection and/or customization indications are provided to a different server, e.g., one of the "Service Plan Catalog & Selection" servers 1372 illustrated in FIGS. 301-305, either directly from the mobile device 100 through an API (e.g., as shown in FIGS. 304 and 305) or indirectly from the mobile device 100 through a third-party service partner server 1360 and then through an API (e.g., as shown in FIGS. 301-303). In some embodiments, the one or more APIs assist in providing a common format for service plan catalogs, service plans, and service plan descriptions that are communicated through the APIs. In some embodiments, a common format for service plan information includes one or more of: system identifiers, text descriptions, graphical elements, service customization (branding) information (text and/or graphics), user interface placement and display information, (e.g., in which area of the UI, in what display format to present on the UI, under what tab to display, in what order to display, etc.), and service plan category placement. In some embodiments, the set of APIs assists in providing formatting and constructs for placement and display of information on the UI 101 of the mobile device 100. In some embodiments, the set of APIs is commonly used across multiple service providers and/or multiple network operators 153. In some embodiments, the set of APIs is commonly used across multiple device suppliers, original equipment manufacturers, and/or operating system suppliers. In some embodiments, one or more APIs in the set of APIs assists in providing for establishing and managing device groups. In some embodiments, the user of a mobile device 100 acts as an administrator of one or more device groups and establishes and/or manages device groups through the UI 101 of the mobile device 100. In some embodiments, the device group administrator adds or deletes mobile devices 100 from a device group through the UI 101 of the mobile device 100. In some embodiments, the device group administrator modifies service plans and/or service plan settings and/or service plan controls for mobile devices 100 (and/or users thereof) in the device group.

In some embodiments, one or more APIs in the set of APIs (e.g., service plan catalog & selection API 1362, activation API 1365, service plan status API 1366) assist in providing for the design, distribution, purchase, and/or management of sponsored services. In some embodiments, one or more APIs assist in providing a user interface through which third-party service partners can design and manage sponsored services. In some embodiments, the one or more APIs are presented through one or more "sandbox" interfaces 1356 from a service design center 135. In some embodiments, the one or more APIs assist in interconnecting and communication of information for sponsored services among multiple service providers, network operators and/or third-party service partners in a common format. In some embodiments, the one or more APIs assist in providing for the design and configuration of sponsored services. In some embodiments, a service provider offers service plans in a "wholesale" arrangement to third-party service partners (and/or to other service providers). In some embodiments, the third-party service partners and/or other service providers offer "retail" service plans to mobile device 100 users based on the "wholesale" service plans provided by the service provider. In some embodiments, the third-party service partners and/or other service providers customize the "wholesale" service plans and offer differentiated "retail" service plans to users of mobile devices 100. In some embodiments, the one or more APIs assist in providing for associating service activities with service policies for sponsored service plans, e.g., through interfaces to the service design center 135. In some embodiments, the service policies determine one or more aspects of charging, billing, and/or notifying users for sponsored service plans. In some embodiments, the service policies also determine on or more aspects of providing notifications, notification triggers, marketing interceptors, upsells, and other sponsored service plan information to users of mobile devices 100. In some embodiments, the one or more APIs assist in providing for the formatting, display and presentation of sponsored service plan information to user of mobile devices 100, e.g., through the UI 101 of mobile devices 100.

In some embodiments, one or more APIs in the set of APIs (e.g., service plan catalog & selection API 1362, activation API 1365, service plan status API 1366) assist in providing for the design and/or management of a sponsored service credit system. In some embodiments, one or more APIs assist in providing a user interface through which third-party service partners can design and manage a sponsored service credit system. In some embodiments, the one or more APIs are presented through one or more "sandbox" interfaces 1356 from a service design center 135. In some embodiments, the one or more APIs assist in interconnecting and communication of information for the sponsored service credit system among multiple service providers, network operators and/or third-party service partners in a common format. In some embodiments, the one or more APIs assist in providing for designing content and display properties for "loyalty" credits associated with one or more service activities presented to users of mobile devices 100 through user interfaces 101 on the mobile devices 100. In some embodiments, the third-party service partners can design and manage their own sponsored service credit systems through "sponsor sandboxes" 1356 connected to the service design center 135. In some embodiments, the third-party service partner maintains information related to "good customer feedback." In some embodiments, various forms of "good customer feedback" are converted into user "loyalty" credits. In some embodiments, the user of the mobile device 100, through the user interface 101 of the mobile device 100, can be presented "loyalty" credit information, e.g., in an area of the user interface 101 and in a display format specified by the third-party service partner through the service design center 135. In some embodiments, notifications and/or marketing interceptors and/or service plan upsells are provided to the user of the mobile device 100, e.g., through the user interface 101 of the mobile device 100, in conjunction with the sponsored service credit system. In some embodiments, one or more service activities of the user of the mobile device 100 are converted into a quantity of loyalty credits that can be displayed through the user interface 101 of the mobile device 100.

FIG. 306 illustrates a representative system 26000 of interconnected elements that include a representative "Offer API" 1384 to provide for offering one or more service plans to a user of a mobile device 100. As described in detail in earlier sections herein, in some embodiments, an "Offer API" 1384 provides a uniform environment and protocol for defining under what conditions to provide service offers, what service offers to present based on one or more criteria, and what content to include within service offers. In some embodiments, offers are provided in conjunction with a notification or a "marketing interceptor" that informs the user of service offers (service plan options) triggered by certain criteria. In some embodiments, a marketing interceptor is provided in response to detection of one or more available networks to which the device 100 can connect. In some embodiments, a user of the device 100 attempts to use a communication service (e.g., attempts to access an Internet website), and a marketing interceptor is presented to offer the user of the device 100 one or more services that can provide for the attempted communication service usage. In some embodiments, a marketing interceptor is provided based on recognizing the device 100 requires a service plan, e.g., to activate an initial service plan for the device 100, or to add a service plan to support an attempted service activity. In some embodiments, a set of service plans associated with the marketing interceptor presented to the user in a service offer depends on one or more of: types of available networks, e.g., home, roaming, Wi-Fi, 3G, 4G, LTE, etc., capabilities of the device 100 to match up to various networks, service plans already subscribed to, service plans available in a specific geographic region, service plans of specific service types (voice, text, data), application-specific service plans, sponsored service plans, or network destination specific service plans.

In some embodiments the device 100 obtains service offers through a third-party service partner's server 1383, e.g., an "Offer" server 1383 as illustrated in FIG. 306, over a connection through a wireless network 200. In some embodiments, the third-party service partner's "Offer" server 1383 is located outside of a network of the service provider and/or network operator through which one or more communication services are provided. In some embodiments, the "Offer" server 1383 managed by the third-party service partner 157B is communicatively coupled to one or more servers (e.g., offer provisioning server 1385) and/or databases (e.g., databases 117A) in the service provider or network operator's network through an "Offer" API 1384 having one or more of the features and properties described in detail above herein. In some embodiments, the "Offer" server 1383 connects to an "Offer Provisioning" server 1385 maintained by the service provider 3800. In some embodiments, the "Offer Provisioning" server 1385 contains service plan information that is or can be formatted into objects to provide through the "Offer" API 1384 in a specific format and/or protocol recognized by the third-party service partner's "Offer" server 1383. In some embodiments, the third-party service partner's offer server 1383 can obtain service plan information through a common "Offer" API 1384 from different "Offer Provisioning" servers 1385 maintained by different service providers 3800. In some embodiments, service plan offers to a user of the device 100 can be provided using the common "Offer" API 1384 resulting in a "uniform" user service offer and selection experience across different service providers 3800 that follow the "Offer" API 1384. In some embodiments, the third-party service partner specifies at least a portion of the "Offer" API 1384. In some embodiments, one or more service providers 3800 specify at least a portion of the "Offer" API 1384. In some embodiments, the third-party service partner in conjunction with one or more service providers 3800 specifies at least a portion of the "Offer" API 1384. In some embodiments, through the "Offer" API 1384, messages having a common format and/or protocol are exchanged between various elements illustrated in FIG. 306 to provide one or more service offers to a user of the device 100. In some embodiments, service plan information (e.g., service plan content, organization of service plans into catalogs, conditions for presenting service plans, etc.) is specified, at least in part, through a service design center (SDC) 135. In some embodiments, the service provider 3800 specifies at least a portion of the service plan information. In some embodiments, a third-party service partner (e.g., the third-party service partner 157B that manages the "Offer" server 1383, or another third-party service partner 157A that provides communication services) specifies at least a portion of the service plan information through the SDC 135, e.g., through one or more additional APIs 205. In some embodiments, the service provider 3800 specifies a format for providing service plan information for third-party service partners to design service plans through the one or more APIs 205 from the SDC 135. In some embodiments, the service provider 3800 and/or the third-party service partner specifies service plan information content and format, and the third-party service partner uploads service plan information according to the specified format through one or more APIs 205 to the SDC 135, to the "Offer Provisioning" server 1385 or to one or more databases 117A attached thereto. In some embodiments, the "Offer" API 1384 provides for defining (in a common format and/or protocol) one or more of: an offer set (a set of service plans from which a service plan offer can be selected to provide to the user of the device 100), a set of service plan options, text descriptions of service plans, display information to present service plans, graphics and icons to present as part of the service plans, user interface (UI) placement information for determining location on an area of the UI 101 of the device 100, actionable buttons that can provide for additional screens of information, actionable buttons that can link to a website, to an application associated with an application portal, to a URL, to a network address, or to another external connection that can provide additional information about service plan offers). In some embodiments, the "Offer" API 1384 provides for defining trigger conditions under which service plan offers are made to the user of the device 100. In some embodiments, the "Offer" API 1384 provides for defining subsets of service plans to offer to the user of the device 100 based on various conditions.

FIG. 306 illustrates a third-party service partner's "Offer" server 1383 and a service provider's "Offer Provisioning" server 1385 interconnected through the "Offer" API 1384 through which content and conditions for service plan offers can be provided. In some embodiments, the "Offer" server 1383 obtains the service plan offer information from the "Offer Provisioning" server 1385 in response to a service query from the device 100, e.g., in (near) real time. In some embodiments, the "Offer" server 1383 obtains the service plan offer information in advance from the "Offer Provisioning" server 1385 and stores the service plan information in the "Offer" server 1383 to provide later to the device 100. In some embodiments, the service provider uses the "Offer" API 1384 to provision a service offer in the third-party service partner's "Offer" server 1383. In some embodiments, the third-party offer server 1383 provides a "marketplace" for communication services, e.g., akin to an application marketplace provided for by iTunes. In some embodiments, the third-party offer server 1383 provides for service plan offer in conjunction with applications, e.g., based on a previous or present application purchase. In some embodiments, service plans are offered in conjunction with application offers. In some embodiments, the third-party service partner's "Offer" server 1383 includes a database of service plan information stored in the "cloud" as objects according to a format and/or protocol defined for one or more APIs. In some embodiments, the third-party service partner's "Offer" server 1383 obtains the objects from a service provider 3800, e.g., from the "Offer Provisioning" server 1385, using the "Offer" API 1384 and stores them in a "cloud" based database, e.g., for presentation through a common marketplace akin to or integrated with an App store as provided through iTunes.

FIG. 307 illustrates a representative message exchange sequence 26100 between the device 100, the third-party service partner's "Offer" server 1383 and the service provider's "Offer Provisioning" server 1385 that provides for presenting a service offer to a user of the device 100 using the "Offer" API 1384. In some embodiments, a service processor 115 in the device 100 is used to communicate with the third-party service partner's "Offer" server 1383. In some embodiments, communication between the device service processor 115 and the third-party service partner's "Offer" server 1383 uses a secure communication link. In some embodiments, the device service processor 115 establishes a secure communication link with the third-party service partner's "Offer" server 1383 by sending a "Secure Connect" message, at 5307A, and obtaining in return, at 5307B, a "Secure Confirm" message. In some embodiments, establishment of the secure connection between the device service processor 115 and the third-party service partner's "Offer" server 1383 includes providing one or more credentials that "authenticate" the device 100 and/or a user, e.g., providing for device and/or user identification. In some embodiments, the device service processor 115 initiates the message exchange sequence 26100 in response to a notification message (e.g., triggered based on a need for or attempt to use a service that requires a service plan), or a marketing interceptor (e.g., triggered based on a service usage history, an expiration of a service plan, or an offer of an alternative service plan), or a request for service plan information from the user of the device 100. In some embodiments, device service processor 115 requests to obtain service plan information by sending, at 5307C, an "Offer Query" message to the third-party service partner's "Offer" server 1383. In some embodiments, at 5307D, the "Offer Query" message is relayed by the third-party service partner's "Offer" server 1383 to the "Offer" API 1384. In some embodiments, the format and protocol for communication of the "Offer Query" message between the device service processor 115 and the third-party service partner's "Offer" server 1383 is the substantially the same as the format and protocol used for the "Offer" API 1384. In some embodiments, the format and protocol for communication of the "Offer Query" message between the device service processor 115 and the third-party service partner's "Offer" server 1383 differs from the format and protocol used for the "Offer" API 1384. In some embodiments, at 5307E, the "Offer" API 1384 communicates the "Offer Query" message to the "Offer Provisioning" server 1385 of the service provider 3800 in a format suitable for obtaining service plan information from the "Offer Provisioning" server 1385. In some embodiments, in response to the "Offer Query" message, at 5307F and 5307G, the "Offer Provisioning" server 1385 provides "Offer Content" through the "Offer" API 1384 to the third-party service partner's "Offer" server 1383. In some embodiments, the "Offer" content obtained from the "Offer Provisioning" server 1385 includes at least a portion of service plan information as described above to provide for displaying one or more service plan offers to the device 100. In some embodiments, at 5307H, the third-party service partner's "Offer" server provides the "Offer Content" to the device service processor 115, which, at 5307I, uses the provided "Offer Content" to present a service offer through the user interface (UI) 101 of the device 100. In some embodiments, the user responds to the presented service plan offer, e.g., to select, purchase and activate a service plan option presented in the service plan offer.

FIG. 308 illustrates another representative message exchange sequence 26200 between the device 100, the third-party service partner's "Offer" server 1383, and the service provider's "Offer Provisioning" server 1385 that provides for presenting a service offer to a user of the device 100 using the "Offer" API 1384. The message exchange sequence 26100 illustrated in FIG. 307, in some embodiments, provides for obtaining the service plan offer information from the service provider's "Offer Provisioning" server 1385 in response to a query from the device service processor 115 of the device 100. The message exchange sequence 26200 illustrated in FIG. 308, in some embodiments, provides for obtaining the service plan offer information from the service provider's "Offer Provisioning" server 1385 by the third-party service partner's "Offer" server 1383 in advance and storing the service plan offer content information to provide later to the device 100. As illustrated in FIG. 308, at 5308A and 5308D, the third-party service partner's "Offer" server 1383 establishes a secure connection with the "Offer" API 1384 (and optionally through the "Offer" API 1384 to the service provider's "Offer Provisioning" server 1385, as shown by the dashed lines 5308B and 5308C), in some embodiments. Using the secure connection, in some embodiments, at 5308E, the third-party service partner's "Offer" server 1383 provides an "Offer Query" message to the Offer API 1384, which, at 5308F, relays the "Offer Query" message to the service provider's "Offer Provisioning" server 1385. In response to the "Offer Query" message, in some embodiments, at 5308G, service plan information is provided in the form of an "Offer Content" message from the service provider's "Offer Provisioning" server 1385 through the "Offer" API 1384 to the third-party service partner's "Offer" server 1383, at 5308H. In some embodiments, the third-party service partner's "Offer" server 1383 stores the service plan offer content for later retrieval to provide to a device 100. In some embodiments, the third-party service partner's "Offer" server 1383 retrieves a set of service plan offers, e.g., a service plan catalog, from which one or more specific service plans can be offered to the device 100 in response to a service plan offer query. In some embodiments, the "Offer Query" message from the third-party service partner's "Offer" server 1383 includes information to request specific subsets of service plans, e.g., based on user groups and/or device groups managed by and known to the third-party service partner (and information about the user groups and/or device groups, in some embodiments, is contained in or obtained by the third-party service partner's offer server 1383). In some embodiments, the "Offer Query" message requests service plans for a particular type of service (e.g., voice plans, messaging plans, data plans, application specific plans, roaming plans, sponsored plans, etc.). In some embodiments, the "Offer Query" message requests all available service plans. In some embodiments, the "Offer Query" message requests for service plans specific to a geographic location. As described for FIG. 307, at 5308I and 5308J, the service processor 115 of the device 100 establishes a secure connection with the third-party service partner's "Offer" server 1383 and subsequently, at 5308K, presents an "Offer Query" to obtain service plan information for one or more service offers. In some embodiments, the establishment of the secure connection and the "Offer Query" result from a notification message or marketing interceptor that prompts the device service processor 115 and/or the user of the device 100 to inquire about available service plans. As in FIG. 307, in some embodiments, at 5308L, the third-party service partner's "Offer" server 1383 provides service offer content that the device service processor 115 uses to present service offers through the device UI 101 to the user of the device 100. Unlike in FIG. 307, in FIG. 308 the service plan offer content provided by the third-party service partner's offer server 1383 can be stored in the third-party service partner's offer server 1383 rather than obtained from the service provider's "Offer Provisioning" server 1385 in (near) real time. In some embodiments, the third-party service partner's "Offer" server 1383 includes service plan offers from multiple service providers (e.g., obtained through a common "Offer" API 1384 from different service provider's "Offer Provisioning" servers 1385). In some embodiments, at 5308L, the third-party service partner's "Offer" server 1383 provides service plan offer content for multiple service providers simultaneously in response to an "Offer Query" message. In some embodiments, the "Offer Content" provides for the user to select service plans from multiple different service providers, network operators, and other third-party service partners. In some embodiments, the third-party service partner's "Offer" server 1383 provides a marketplace for users of devices 100 to "shop" for service plans among multiple different service providers. In some embodiments, the third-party service partner's "Offer" server 1383 provides for a "uniform" service plan purchase experience for service plans from different service providers to a user of the device 100.

FIG. 309 illustrates a representative system 26300 of interconnected elements that include a representative "Offer API" 1384 to provide for offering one or more service plans to a user of a mobile device 100. As described above for FIG. 306, the "Offer" API 1384 in the representative system 26300 provides for a uniform environment and protocol for defining service offers and service offer conditions. The earlier description of notification messages and marketing interceptors triggering inquiry for and presentation of service offers equally applies to the system 26300 illustrated in FIG. 309. FIG. 309 differs from FIG. 306 in that the "Offer" server 1383 is maintained by the service provider 3800 rather than by the third-party service partner 157B. The "Offer" server 1383 is located within the service provider's network and interconnects to the service provider's "Offer Provisioning" server 1385 and associated databases 117A. The "Offer" API 1384 in FIG. 309 resides between the third-party service partner's server (service controller 122) and the service provider's "Offer" server 1383. The service design center (SDC) 135 in FIG. 309, also maintained by the service provider 3800, provides the same functions as described earlier herein, including one or more APIs 205 to provide for defining service plan offers, service plan catalogs, and other service management functions to a service provider, network operator and/or third-party service partner 157A. In some embodiments, the SDC 135 includes one or more terminals (not shown in FIG. 309) through which service plan offers and catalogs are designed and managed. In some embodiments, the SDC 135 includes one or more sandboxes (e.g., design portals, not shown in FIG. 309) through which objects are defined and stored in one or more servers (e.g., offer server 1383, offer provisioning server 1385) and databases (e.g., databases 117A) of the service provider 3800. In some embodiments, service plans, service plan offers, service plan catalogs or other groups of service plans are maintained in the "Offer" server 1383 of the service provider and/or the "Offer Provisioning" server 1385 of the service provider. In some embodiments, information for service plan offers is also stored in one or more databases 117A associated with the "Offer Provisioning" server 1385 and/or "Offer" server 1383. In some embodiments, a third-party service partner 157B manages the service controller 122 to provide an interface to devices 100 through a wireless network 200. In some embodiments, the third-party service partner's service controller 122 connects to one or more service providers through the "Offer" API 1384, thereby providing a uniform service offer experience to the user of the device 100 across different service providers.

FIG. 310 illustrates a representative message exchange sequence 26400 between the device 100, the third-party service partner's server (service controller 122), the service provider's "Offer" server 1383, and optionally the service provider's "Offer Provisioning" server 1385, in some embodiments. As described above for FIG. 307, in some embodiments, at 5310I, 5310J, and 5310K, an offer query from the device service processor 115 is presented to an "Offer" server 1383, in this case, through an "Offer" API 1384 by the third-party service partner's server (service controller 122). In some embodiments, at 5310A and 5310H, the device service processor 115 establishes a secure communication channel with the third-party service partner's server (service controller 122), which in turn, at 5310B and 5310G, establishes a secure communication channel through the "Offer" API 1384, and, at 5310C and 5310F, to the "Offer" server 1383. In some embodiments, at 5310D and 5310E, a secure communication channel is further established between the "Offer" server 1383 and the "Offer Provisioning" server 1385 in the service provider's network. In some embodiments, with a secure communication channel chain established from the device service processor 115 to the "Offer" server 1383, an "Offer" query for service plan information from the device service processor 115 at 5310I can result in a return of service plan information in the form of an "Offer" content message from the "Offer" server 1383 to the device service processor 115, traversing through the "Offer" API 1384 and through the third-party service partner's server (service controller 122) (i.e., via the paths labeled 5310N, 5310O, and 5310P). In some embodiments, at 5310Q, the device service processor 115, as described earlier, can present a service plan offer to the user of the device 100 through a device UI 101 based on the service plan "Offer" content message. In some embodiments, the "Offer" API 1384 illustrated in FIG. 309 and FIG. 310 provides for the same third-party service partner's server 1383 to interface to a mobile device 100 and to different "Offer" servers 1383 maintained by different service providers using a common "Offer" API 1384. In some embodiments, the third-party service partner's server 1383 uses the "Offer" API 1384 to obtain service plan offer information from the "Offer" server 1383 of the service provider (or in some embodiments, from more than one service provider) in response to an "Offer" query received from the device 100. In some embodiments, at 5310L and 5310M, service plan information ("Offer Content") is obtained from the "Offer Provisioning" server 1385 and relayed through the "Offer" server 1383, by way of the "Offer" API 1384, to the third-party service partner's server (service controller 122), rather than obtained directly from the "Offer" server 1383.

FIG. 311 illustrates another representative message exchange sequence 26500 between the device 100, the third-party service partner's server (service controller 122), the service provider's "Offer" server 1383, and optionally the service provider's "Offer Provisioning" server 1385 that provides for presenting a service offer to a user of the device 100 using the "Offer" API 1384, in some embodiments. As described above for FIG. 308, in some embodiments, an offer query from the device service processor 115 results in a service plan offer displayed to the user of the device 100, e.g., through the UI 101. In FIG. 311, at 5311M and 5311N, the device service processor 115 establishes a secure connection with the third-party service partner's server (service controller 122) and subsequently, at 5311P, in response to an "Offer" query at 5311O, obtains "Offer" content from the third-party server (service controller 122). In some embodiments, using the obtained "Offer" content, the device service processor 115 provides a service plan offer through the device UI 101. As shown in FIG. 311, in some embodiments, the "Offer" content provided by the third-party service partner's server (service controller 122) need not be obtained in (near) real time from the service provider's "Offer" server 1383 (or the service provider's "Offer Provisioning" server 1385), but rather can be stored in the third-party server (service controller 122) for retrieval by the device service processor 115 at a later time. In some embodiments, at 5311A, 5311B, 5311E, and 5311F, the third-party service partner's server (service controller 122) establishes a secure connection with the service provider's "Offer" server 1383 through the "Offer" API 1384 and subsequently, at 5311G and 5311H, provides an "Offer" query to the service provider's "Offer" server 1383 to obtain service plan offer information, e.g., "Offer" content. At 5311K and 5311L, the service provider's "Offer" server 1383 communicates service plan information in the form of "Offer" content formatted according to the "Offer" API 1384 format/protocol to the third-party service partner's server (service controller 122). In some embodiments, a secure connection is established at 5311C and 5311D and service plan information is retrieved from the service provider's "Offer Provisioning" server 1385 through the service provider's "Offer" server 1383 at 5311I and 5311J. As described above for FIG. 308, in some embodiments, service plan information ("Offer Content") obtained by the third-party service partner's server (service controller 122) from the service provider's "Offer" server 1383 can vary in scope, e.g., complete service plan catalogs for multiple device types, targeted service plan catalogs for specific device types, targeted service plan catalogs for specific device groups and/or user groups, service promotion catalogs, sponsored service plan catalogs, etc. In some embodiments, the third-party service partner's server (service controller 122) obtains the service plan "Offer Content" information in response to an update notification provided through the "Offer" API 1384 by the "Offer" server 1383. In some embodiments, the third-party service partner's server (service controller 122) obtains the service plan "Offer Content" information by regularly polling for updates through the "Offer" API 1384. In some embodiments, the "Offer" server 1383 pushes an update notification through the "Offer" API 1384 to the third-party service partner's server (service controller 122) to inform about updated service plan offers, specific service plans, new service plan offers, updated service plan catalogs, etc. In some embodiments, in response to a service provider, network operator or third-party service partner updating their service plan offerings, e.g., through the SDC 135, the "Offer" server 1383 notifies through the "Offer" API 1384 of new and/or updated and/or outdated service plan offers to the third-party service partner's server (service controller 122). In some embodiments, the "Offer Provisioning" server 1385 manages the update notifications.

FIG. 312 illustrates a representative system 26600 of interconnected elements that include a representative "Offer API" 1384 to provide for offering one or more service plans to a user of a mobile device 100. FIG. 312 illustrates a device service processor 115 connecting through the "Offer API" 1384 to an "Offer" server 1383 in the service provider's network. In some embodiments, the service processor 115 of the device 100 communicates with the service provider's "Offer" server 1383 through the "Offer" API 1384, via a wireless network 200. As described earlier herein, the "Offer" API 1384 in the representative system 26600 provides for a uniform environment and protocol for defining service offers and service offer conditions. All of the earlier description of notifications, marketing interceptors and service plan offer content presentation applies equally to the system 26600 illustrated in FIG. 312. In some embodiments, the service processor 115 in the device 100 is a specific application that uses the "Offer" API 1384 to obtain service plan offer content and display information from the service provider's "Offer" server 1383. The "Offer" server 1383 is located within the service provider's network and interconnects to the service provider's "Offer Provisioning" server 1385 and associated databases 117A. The service design center (SDC) 135 in FIG. 312, maintained by the service provider 3800, provides the same functions as described earlier herein, including one or more APIs 205 to provide for defining service plan offers, service plan catalogs, and other service management functions to a service provider, network operator and/or third-party service partner 157A, e.g., through terminals and/or sandboxes (design portals) and/or other service management interfaces provided by the SDC 135. In some embodiments, service plans, service plan offers, service plan catalogs or other groups of service plans are maintained in the "Offer" server 1383 of the service provider and/or the "Offer Provisioning" server 1385 of the service provider. In some embodiments, information for service plan offers is also stored in one or more databases 117A associated with the "Offer Provisioning" server 1385 and/or "Offer" server 1383.

FIG. 313 illustrates a representative message exchange sequence 26700 between the device service processor 115 and the service provider's "Offer" server 1383 through the "Offer" API 1384. In some embodiments, the device service processor 115 obtains service plan "Offer Content" information from the service provider's "Offer" server 1383 to present one or more service plan offers to the user through the UI 101 of the device 100. In some embodiments, the device service processor 115 initiates the message exchange sequence 26700 illustrated in FIG. 313 as a result of a notification message, marketing interceptor, or other triggered condition. In some embodiments, the device service processor 115 initiates the message exchange sequence 26700 when the device 100 encounters a new or different network type. In some embodiments, the device service processor 115 initiates the message exchange sequence 26700 in response to a user input. In some embodiments, the device service processor 115 is a specific application on the device 100 that uses the "Offer" API 1384 to retrieve service plan information. In some embodiments, the device service processor 115 establishes a secure connection through the "Offer" API 1384 with the "Offer" server 1383 of the service provider. In some embodiments, at 5313A, service processor 115 communicates a secure connection request and a credential to the "Offer" API 1384, e.g., a credential to authenticate the device and/or the user and/or identify the device 100 and/or the user. In some embodiments, at 5313B, the "Offer" API 1384 provides the request to establish a secure connection and the provided credential to the "Offer" server 1383 of the service provider. In some embodiments, at 5313C, the "Offer" server 1383 of the service provider responds with a secure connection confirmation that is relayed through the "Offer" API 1384 to the device service processor 115 (application) at 5313D. In some embodiments, the "Offer" server 1383 authenticates the user and/or device 100 using the provided credential. In some embodiments, the "Offer" server 1383 provides the credential to another server in the service provider's network to authenticate the device 100 and/or user. Following establishment of the secure connection, in some embodiments, at 5313E and 5313F, the device service processor 115 (application) provides an "Offer Query" message through the "Offer" API 1384 to the service provider's "Offer" server 1383. In some embodiments, in response to the "Offer Query" message, the service provider's "Offer" server provides service plan information at 5313G in the form of "Offer Content" that is relayed through the "Offer" API to the device service processor 115 (application) at 5313H. In some embodiments, at 5313I, the device service processor 115 (application) uses the obtained "Offer Content" to present a service plan offer to the user of the device 100 through the device UI 101.

For the different embodiments illustrated in FIGS. 306 to 313, the "Offer Query" can range from a broad non-specific request for service plan information to a narrower targeted request for service plan information. In some embodiments, the "Offer Query" includes one or more properties of service plans about which to receive service plan content information, e.g., service plans for voice, text, messaging, multimedia, specific applications, associated websites, location based, sponsored, free, pre-paid, post-paid, specific network type, specific radio technology, home network, roaming network, and other service plan types as described herein. In some embodiments, the "Offer Query" depends on one or more previously received marketing interceptors and/or service notifications. In some embodiments, the "Offer Query" presented to the "Offer" server is supplemented by additional information provided by one or more network elements through which the "Offer Query" traversed. In some embodiments, device-provided service usage information accompanies the "Offer Query" to provide additional information to determine service plans to present. In some embodiments, network provided service usage information accompanies the "Offer Query" to provide additional information to determine service plans to present. In some embodiments, network state information and/or network type information is used to determine service plan offers to present in response to the "Offer Query."

In some embodiments, a database in a cloud-based server, e.g., an iTunes or Application store, through an API, obtains service plan offer information formatted as objects and retains the object information in the database to provide later to a device 100. In some embodiments, the device 100 obtains service plan information objects through an API from the cloud-based server in response to a notification message, marketing interceptor, or based on an offer query. In some embodiments, the device 100 directly obtains service plan information objects to use for service plan offer display through an API from a third-party service partner portal. In some embodiments, the device 100 obtains the service plan information objects through an API to a service provider website or portal. In some embodiments, the device 100 pre-stores service plan object information obtained through an API from a cloud-based server, e.g., an iTunes or Application store. In some embodiments, the device 100 pre-stores service plan object information obtained through an API from a service provider server. In some embodiments, a design portal or SDC sandbox is used to define service plan information objects according to an API format/protocol that are stored in a cloud-based server. In some embodiments, an SDC terminal is used to define service plan information objects according to an API format/protocol to configure a service provider server and/or database. In some embodiments, methods, systems, and apparatuses are provided to synchronize one or more service provider provisioning systems, and/or accounting/billing/charging systems to generate network policies for implementing service plans associated with a service plan offer.

FIG. 314 illustrates a representative system 27000 of interconnected elements that include a representative "Selection API" 1387 to provide for selecting, purchasing and/or activating one or more service plans by a user of a mobile device 100. As similarly described in detail in earlier sections herein, in some embodiments, a "Selection API" 1387 provides a uniform environment and protocol for defining a service selection, purchase and activation process invoking an exchange of messages with information between the device 100 and one or more network elements including servers (e.g., selection provisioning server 1388) and databases (e.g., databases 117A). In some embodiments, the "Selection API" 1387 illustrated in FIG. 314 and "Offer API" 1384 illustrated in FIG. 306 are combined as a "Selection Plan Catalog & Selection API" 1362 as illustrated in FIGS. 300 to 305. In some embodiments, the third-party service partner's "Selection Server" 1386 illustrated in FIG. 314 and the third-party service partner's "Offer Server" 1383 illustrated in FIG. 306 are combined as a "Partner Server" 1360 as illustrated in FIGS. 301 to 303. The descriptions provided herein earlier for the "Partner Server" 1360 illustrated in FIGS. 301 to 303 apply equally to the "Offer" server 1383, "Selection" server 1386, and "Notification" server 1389 shown in FIGS. 306, 314 and 322 respectively. In some embodiments, the "Selection Provisioning" server 1388 in the service provider's network illustrated in FIG. 314 is combined with the "Offer Provisioning" server 1385 in the service provider's network illustrated in FIG. 306 as a "Mobile Operator Service Plan Catalog & Selection" server 1372 as illustrated in FIGS. 301 to 305. In some embodiments, the "Selection API" 1387 shown in FIG. 314 represents a portion of the "Service Plan Catalog & Selection API" 1362 of FIGS. 300 to 305. In some embodiments, the "Selection API" 1387 shown in FIG. 314 represents a combination of a portion of the "Service Plan Catalog & Selection API" 1362 of FIGS. 300 to 305 and the "Activation API" 1365 of FIGS. 300 to 305. As described herein, the figures provide for representative illustrations of representative embodiments, and the specific division or combination of API functions into individual blocks is illustrative and not intended to be limiting. In some embodiments, one or more API functions can be grouped together as needed for a particular implementation. In some embodiments, one or more servers can be grouped together as needed for a particular implementation.

The "Selection API" 1387 shown in FIG. 314, in some embodiments, provides for defining one or more message exchanges to provide for a service plan selection by the user of the device 100, e.g., in response to a presented service plan offer. In addition, the "Selection API" 1387, in some embodiments, provides for defining one or more message exchanges to subscribe to and/or purchase a service plan by the user of the device 100. In addition, the "Selection API" 1387, in some embodiments, provides for defining one or more message exchanges to activate a selected, purchased, and/or subscribed to service plan (or group of service plans). In some embodiments, the "Selection API" 1387 provides for a transaction between a user of the device 100 and a service provider and/or third-party service partner to select and activate a service plan. In some embodiments, as a result of a user selection of a service plan through the "Selection API" 1387, one or more service policies are provisioned to one or more network elements and/or to the device 100. In some embodiments, the service provider controls at least a portion of the service provisioning, e.g., from one or more service-provisioning servers (e.g., selection provisioning server 1388) in the service provider's network 3800. In some embodiments, a third-party service partner controls at least a portion of the service provisioning, e.g., from one or more servers maintained by the third-party service partner. In some embodiments, the service provider is a mobile network operator that maintains its own wireless networks. In some embodiments, the service provider is a mobile virtual network operator (MVNO) that provides service through a separate network operator's network(s). In some embodiments, the third-party service partner acts as an MVNO and controls the service provisioning process. In some embodiments, the third-party service partner manages devices and service management systems to provide for "device assisted services" (DAS) as described in multiple patent applications and issued patents incorporated by reference herein. In some embodiments, the third-party service partner manages service provisioning of service plans selected by the user of the device 100 for both "DAS" devices 100 and "non-DAS" devices 100. FIG. 314 illustrates a third-party service partner's "Selection" server 1386 communicating through the "Selection" API 1387 with the service provider's "Selection Provisioning" server 1388. In some embodiments, the third-party service partner's "Selection" server 1386 relays service selection information according to a format/protocol specified by the "Selection" API 1387 to the "Selection Provisioning" server 1388 of the service provider. In some embodiments, the third-party service partner's "Selection" server 1386 obtains service content in response to one or more messages communicated through the "Selection" API 1387 to the service provider's "Selection Provisioning"

server 1388. In some embodiments, the third-party service partner's selection server 1386 retrieves service content information from the "Selection Provisioning" server 1388 in the service provider's network 3800 in advance and stores the information locally, e.g., in the "Selection" server 1386 or an associated database (not shown). In some embodiments, stored service content information is provided to the user of the device 100 in response to a service selection received by the third-party service partner's "Selection" server 1386.

FIG. 315 illustrates a representative message exchange sequence 27100 between the device 100, the third-party service partner's "Selection" server 1383 and the service provider's "Selection Provisioning" server 1388 that provides for presenting service content to a device 100 using the "Selection" API 1387 in response to a service selection by user of the device 100. In some embodiments, at 5315B, a service selection is obtained through the device UI 101 in response to a presented service offer at 5315A, e.g., as described above herein. In some embodiments, the service selection includes a choice of one or more service plans presented in a service offer. In some embodiments, the service selection includes selections of options associated with one or more service plans presented in the service offer. In some embodiments, the service selection includes information for associating the service plan with a particular user, device, user group, or device group. In some embodiments, the service selection includes a request to establish a new service account. In some embodiments the service selection includes a request to add the service plan to an existing service account. In some embodiments, the service selection includes information to specify sharing of the service plan with one or more other devices 100, e.g., as part of a managed device group. In some embodiments, the service selection includes information to specify assigning the service plan to one or more other devices 100, e.g., as part of a managed device group. In some embodiments, the service selection includes information to specify sharing of the service plan with one or more other users, e.g., as part of a managed user group. In some embodiments, the service selection includes information to specify assigning the service plan to one or more other users, e.g., as part of a managed user group. In some embodiments, the service selection includes account information, billing information, and/or charging information required for purchase and/or provisioning of the service plan. In some embodiments, the service selection includes a transaction code, service code, catalog code or service plan code to identify the service plan. In some embodiments, at 5315C the device service processor 115 forwards the service selection information to the third-party service partner's selection server 1386. In some embodiments, the service selection includes credential information that identifies the user, the device 100, and/or an account with which to associate the service plan. In some embodiments, the credential information provides for an authorization to select, purchase, and/or activate the service plan. In some embodiments, at 5315D and 5315E, the service selection message is communicated through the "Selection" API 1387 according to a common format/protocol to the service provider's "Selection Provisioning" server 1388. In some embodiments, in response to the service selection message, at 5315F the service provider's "Selection Provisioning" server 1388, through the "Selection" API 1387 at 5315G, provides service content to the third-party service partner's "Selection" server 1386. In some embodiments, at 5315H the third-party service partner's "Selection" server 1386 relays the service content to the service processor 115 in the device 100. In some embodiments, at 5315I a service confirmation message is presented to the user through the UI 101 of the device 100 in response to receipt of the service content from the third-party service partner's "Selection" server 1386. In some embodiments, information included in the service content message is presented to the user through the device UI 101. In some embodiments, the service content includes service policy information to provision the service plan in the device 100 and/or in the third-party selection server 1386. In some embodiments, the service provider's "Selection Provisioning" server 1388 (or another associated service provider server) provisions one or more network service policies associated with the selected service plan, e.g., including network service policies for accounting, charging, billing, control and/or notification. In some embodiments, the "Selection Provisioning" server 1388 (or another associated service provider server) associates the service plan with an accounting policy and one or more service accounts. In some embodiments, the selected service plan is a sponsored service plan, and accounting for the service plan is associated with an account of a sponsor entity. In some embodiments, the selected service plan is a "free" service plan and accounting for the service plan is associated with an account of a service provider, e.g., for "zero rating" service activities associated with the "free" service plan. Service provisioning for a service plan, as used above in some embodiments, is described in multiple patent applications and issued patents that are incorporated by reference herein as set forth at the beginning of this specification.

FIG. 316 illustrates another representative message exchange sequence 27200 between the device 100, the third-party service partner's "Selection" server 1386 and the service provider's "Selection Provisioning" server 1388 that provides for communicating service selection, purchase, and/or activation messages through the "Selection" API 1387 and providing service content associated with selected, purchased and/or activated service plans to the device 100 using the "Selection" API 1387. The message exchange sequence 27100 illustrated in FIG. 315, in some embodiments, provides for obtaining the service plan content information from the service provider's "Selection Provisioning" server 1388 in response to a service selection from the device service processor 115 of the device 100. The message exchange sequence 27200 illustrated in FIG. 316, in some embodiments, provides for obtaining the service plan content information from the service provider's "Selection Provisioning" server 1388 by the third-party service partner's "Selection" server 1386 in advance and storing the service plan content information to provide later to the device 100. As illustrated in FIG. 316, at 5316A and 5316D, the third-party service partner's "Selection" server 1386 establishes a secure connection with the "Selection" API 1387 (and optionally, at 5316B and 5316C, through the "Selection" API 1387 to the service provider's "Selection Provisioning" server 1388), in some embodiments. Using the secure connection, in some embodiments, at 5316E the third-party service partner's "Selection" server 1386 provides an "Service Query" message to the "Selection" API 1387, which, at 5316F, relays the "Service Query" message to the service provider's "Selection Provisioning" server 1388. In response to the "Service Query" message, in some embodiments, at 5316G and 5316H, service plan information is provided in the form of a "Service Content" message from the service provider's "Selection Provisioning" server 1388 through the "Selection" API 1387 to the third-party service partner's "Selection" server 1386. In some embodiments, the third-party service partner's "Selection" server 1386 stores the service plan content information for later retrieval to provide to a device 100. In some embodiments, the third-party service partner's "Selection" server 1386 retrieves service plan content information for a set of service plans, e.g., associated with service plans in a service plan catalog, from which service plan content for one or more specific service plans can be provided to the device 100 in response to a service selection. In some embodiments, the "Service Query" message from the third-party service partner's "Selection" server 1386 includes information to request service plan content information for specific subsets of service plans, e.g., based on user groups and/or device groups managed by and known to the third-party service partner (and information about the user groups and/or device groups, in some embodiments, is contained in or obtained by the third-party service partner's offer server). In some embodiments, the "Service Query" message requests service plan content information for one or more service plans of a particular service type (e.g., voice plans, messaging plans, data plans, application specific plans, roaming plans, sponsored plans, etc.). In some embodiments, the "Service Query" message requests service plan content information for all available service plans. In some embodiments, the "Service Query" message requests service plan content information for service plans specific to a geographic location. In some embodiments, at 5316K the service processor 115 of the device 100 presents a "Service Selection" message to the third-party service partner's "Selection" server 1386 to select, purchase, and/or activate one or more service plans. In some embodiments, at 5316J the user inputs a service selection through the device UI 101, e.g., in response to a service selection offer at 5316I. As in FIG. 315, in some embodiments, at 5316L the third-party service partner's "Selection" server 1386 provides service plan content to the device service processor 115, which, at 5316M, uses the service plan content to confirm a service selection, purchase and/or activation with the user through the device UI 101. In some embodiments, the service plan content information received from the third-party service partner's "Selection" server 1386 includes service provisioning information to implement the selected, purchased, and/or activated service plan. As shown in FIG. 316, the service plan content provided by the third-party service partner's "Selection" server 1386 can be stored in the third-party service partner's "Selection" server 1386 (or an associated database not shown) rather than obtained from the service provider's "Selection Provisioning" server 1388 in (near) real time. In some embodiments, the third-party service partner's "Selection" server 1386 includes service plan content obtained from multiple service providers (e.g., obtained through a common "Selection" API 1387 from different service providers' "Selection Provisioning" servers 1388).

FIG. 317 illustrates a representative system 27300 of interconnected elements that include a representative "Selection" API 1387 to provide for selecting, purchasing and/or activating one or more service plans by a user of a mobile device 100. As described above for FIG. 314, the "Selection" API 1387 provides a uniform environment and protocol for defining a service selection, purchase and activation process invoking an exchange of messages with information between the device 100 and one or more network elements including servers and databases. The same description for the "Selection" API 1387 as presented herein for FIG. 314 applies equally to FIG. 317. FIG. 317 differs from FIG. 314 in that the "Selection" server 1386 is maintained by the service provider rather than by the third-party service partner. The "Selection" server 1386 is located within the service provider's network 3800 and interconnects to the service provider's "Selection Provisioning" server 1388 and associated databases 117A. The "Selection" API 1387 in FIG. 317 resides between the third-party service partner's server (service controller 122) and the service provider's "Selection" server 1386. The service design center (SDC) 135 in FIG. 317, also maintained by the service provider, provides the same functions as described earlier herein, e.g., for service plan content definition through terminals, design portals, sandboxes or other means for a service provider, network operator, and/or third-party service partner. In some embodiments, the "Selection" server 1386 and the "Selection Provisioning" server 1388 of the service provider are combined as a single server. In some embodiments, service plan content and service provisioning information for service plans is maintained in the "Selection" server 1386 of the service provider and/or the "Selection Provisioning" server 1388 of the service provider. In some embodiments, service plan content information and/or service provisioning information are also stored in one or more databases 117A associated with the "Selection Provisioning" server 1388 and/or the "Selection" server 1386. In some embodiments, a third-party service partner 157B manages the service controller 122 to provide an interface to devices 100 through a wireless network 200. In some embodiments, the third-party service partner's service controller 122 connects to one or more service providers through the "Selection" API 1387, thereby providing a uniform service selection, purchase, and/or activation experience to the user of the device 100 across different service providers.

FIG. 318 illustrates a representative message exchange sequence 27400 between the device 100, the third-party service partner's server (service controller 122), the service provider's "Selection" server 1386, and optionally the service provider's "Selection Provisioning" server 1388, in some embodiments. In some embodiments, at 5318B the device service processor 115 of the device 100 obtains a service selection from the user of the device 100 through the UI 101 of the device 100, e.g., in response to a service offer presentation at 5318A. In some embodiments, at 5318C the device service processor 115 communicates the service selection message to the third-party service partner's service controller 122, which, at 5318D and 5318E, relays the service selection message through the "Selection" API 1387 to the service provider's "Selection" server 1386. In some embodiments, the service selection message includes information for service plan selection, purchase and/or activation, as described herein for FIGS. 314 to 316. In some embodiments, as described herein, at 5318H and/or at 5318G, one or more service provider servers, e.g., the "Selection" server 1386 and/or the "Selection Provisioning" server 1388 provide service plan content in response to the service selection message presented through the "Selection" API 1387 by the third-party service partner's service controller 122. In some embodiments, at 5318H and 5318I the service plan content information is provided through the "Selection" API 1387 to the third-party server (service controller 122) to provide to the device service processor 115 at 5318J. As described above for FIGS. 315 and 316, one or more servers in the service provider's network provision one or more network service policies associated with the selected service plan, e.g., including network service policies for accounting, charging, billing, control and/or notification. The same description provided for FIG. 315 applies equally to FIG. 318, except that the "Selection" server 1386 is maintained by the service provider rather than the third-party service partner, and service content information, including provisioning information, is provided through the third-party service partner's server (service controller 122) to the service processor 115 of the device 100, rather than directly from the "Selection" server 1386.

FIG. 319 illustrates another representative message exchange sequence 27500 between the device 100, the third-party service partner's server (service controller 122), the service provider's "Selection" server 1386, and optionally the service provider's "Selection Provisioning" server 1388 that provides for communicating service selection, purchase, and/or activation messages through the "Selection" API 1387 and providing service content associated with selected, purchased and/or activated service plans to the device 100 using the "Selection" API 1387, in some embodiments. The message exchange sequence 27500 illustrated in FIG. 319, in some embodiments, provides for obtaining the service plan content information from the service provider's "Selection" server 1386 and/or the service provider's "Selection Provisioning" server 1388 by the third-party service partner's server (service controller 122) in advance and storing the service plan content information to provide later to the device 100. As illustrated in FIG. 319, at 5319A, 5319B, 5319E, and 5319F, the third-party service partner's server (service controller 122) establishes a secure connection through the "Selection" API 1387 to the service provider's "Selection" server 1386 (and optionally, at 5319C and 5319D, to the service provider's "Selection Provisioning" server 1388), in some embodiments. Using the secure connection, in some embodiments, at 5319G and 5319H the third-party service partner's server (service controller 122) provides an "Service Query" message to the service provider's "Selection" server 1386, through the "Selection" API 1387. In some embodiments, the "Service Query" message is optionally relayed at 5319I to the service provider's "Selection Provisioning" server 1388. In response to the "Service Query" message, in some embodiments, at 5319K and 5319L, and optionally at 5319J, service plan information is provided in the form of a "Service Content" message from the service provider's "Selection" server 1386 through the "Selection" API 1387 to the third-party service partner's server (service controller 122). In some embodiments, the third-party service partner's server (service controller 122) stores the service plan content information for later retrieval to provide to a device 100. As described above for FIGS. 314 to 318, the "Service Query" message requests service plan content information for a service plan selection, purchase, and/or activation, and the "Service Content" message obtained in response contains service plan content information to provide for completing the selection, purchase, and/or activation of one or more service plans. In some embodiments, at 5319M, in response to an offer presented by the service processor 115 through the device UI 101, the user indicates a service selection through the device UI 101 to the device service processor 115, which in turn, at 5319O, sends a service selection message to the third-party service provider's server (service controller 122). In response to the service selection message received by the third-party service partner's server (service controller 122), at 5319P the device service processor 115 receives service plan content information from the third-party service partner's server (service controller 122) to implement the selected, purchased, and/or activated service plan. In some embodiments, at 5319Q confirmation of the service plan selection, purchase, and/or activation is presented to the user through the device UI 101. As described above for FIGS. 314 to 318, one or more network elements are provisioned with network provisioning policies associated with the selected, purchased, and/or activated service plans. The network provision policies, in some embodiments, include policies for accounting, billing, charging, control and/or notification. In some embodiments, user accounts for the service plans selected, purchased and/or activated are associated with user entities, sponsor entities, service providers, third-party service partners, and/or network operators for accounting, charging, and/or billing.

FIG. 320 illustrates a representative system 27600 of interconnected elements that include a representative "Selection API" 1387 to provide for selecting, purchasing and/or activating one or more service plans by a user of a mobile device 100. FIG. 320 illustrates a device service processor 115 connecting through the "Selection API" 1387 to a "Selection" server 1386 in the service provider's network 3800. In some embodiments, the service processor 115 of the device 100 communicates with the service provider's "Selection" server 1386 through the "Selection" API 1387, via a wireless network 200. As described above for FIGS. 314 to 319, the "Selection" API 1387 provides a uniform environment and protocol for defining a service selection, purchase and activation process invoking an exchange of messages with information between the device 100 and one or more network elements including servers (e.g., selection server 1386, selection provisioning server 1386) and databases (e.g., databases 117A). The same description for the "Selection" API 1387 as presented herein for FIGS. 314 to 319 applies equally to FIG. 320. The same description for the "Selection" server 1386 and the "Selection Provisioning" server 1388 of the service provider as presented herein for FIG. 317 applies equally to FIG. 320. FIG. 320 provides for communication of service selection, purchase and/or activation information from the device 100 through the "Selection" API 1387 according to a common format and/or protocol to the service provider's "Selection" server 1386 directly, e.g., without an intervening third-party service partner's server.

FIG. 321 illustrates a representative message exchange sequence 27700 between the device service processor 115 and the service provider's "Selection" server 1386 through the "Selection" API 1387. In some embodiments, the device service processor 115 obtains service plan "Content" information from the service provider's "Selection" server 1386 to provide for implementation of one or more service plans selected, purchased, and/or activated by the user of the device 100. In some embodiments, the device service processor 115 initiates the message exchange sequence 27700 illustrated in FIG. 321 as a result of a service selection, purchase, and/or activation indication received through the device UI 101 at 5321B, e.g., in response to a presented service plan offer at 5321A. The device service processor 115 in FIG. 321, in some embodiments, at 5321C and 5321D presents service selection information to the service provider's "Selection" server 1386 through the "Selection" API 1387, e.g., as described above for FIG. 318. In some embodiments, at 5321E and 5321F the device service processor 115 in FIG. 321 obtains service plan content information from the service provider's "Selection" server 1386 through the "Selection" API 1387, e.g., as described above for FIG. 318. The "Service Selection" message communicated at 5321C and 5321D from the device service processor 115, through the "Selection" API 1387, to the service provider's "Selection" server 1386 as shown in FIG. 321, in some embodiments, includes information pertaining to service selection, purchase, and/or activation as described earlier herein with respect to FIGS. 314 to 320. The "Service Content" message communicated at 5321E and 5321F from the service provider's "Selection" server, through the "Selection" API, to the device service processor 115 as shown in FIG. 321, in some embodiments, includes information for provisioning and implementing services associated with selected, purchased, and/or activated service plans, as described herein with respect to FIGS. 314 to 320.

FIGS. 322, 328 and 329 illustrate representative systems 28000, 28300 and 28350 respectively with interconnected elements that include a representative "Notification API" 1390 to provide for communicating notifications and/or notification triggers between one or more network elements and a mobile device 100. FIGS. 323 to 327, 330, and 331 illustrate representative message exchanges that use the "Notification API" 1390 in some embodiments to communicate notification triggers, notification trigger indications, and/or notification content for one of the representative systems illustrated in FIGS. 322, 328, and 329. In some embodiments, the "Notification API" 1390 provides for communication of notification messages in response to notification triggers in a common format and/or protocol. In some embodiments, the "Notification API" 1390 provides for defining notification content, notification display information, notification graphics, notification text messages, notification placement (e.g., on a UI 101 of the device 100), and/or notification actions (e.g., actionable buttons that the user can select through the UI 101). In some embodiments, the "Notification" API 1390 provides for defining notification triggers when one or more notifications are provided and/or presented. In some embodiments, the "Notification API" 1390 includes definitions for objects to communicate notification indications from one or more network elements (and/or from third-party service partner systems) to the device 100. In some embodiments, the "Notification API" 1390 includes definitions for objects to communicate notification information to pre-store in a service provider server, a network operator server, a third-party service partner server, and/or in the device 100. In some embodiments, the "Notification API" 1390 includes definitions for objects to push notifications from a server to the device 100. In some embodiments, the "Notification API" 1390 includes definitions for objects to pull notifications from a server to the device 100. In some embodiments, the "Notification API" 1390 exists between two different servers, e.g., a server maintained by a third-party service partner and a separate sever maintained by the service provider. In some embodiments, the "Notification API" 1390 exists between the device 100 and a third-party service partner server. In some embodiments, the "Notification API" 1390 exists between the device 100 and a service provider server. In some embodiments, the SDC 135 provides for defining notifications and notification triggers, e.g., through terminals, design portals, sandboxes or other service management system interfaces. In some embodiments, one or more interfaces to the SDC 135 provide for defining notifications and notification triggers using one or more APIs, e.g., as described elsewhere herein. In some embodiments, notification triggers occur on the device 100, in a server, in a service provider network, in a third-party service partner network, and/or in a mobile operator network. In some embodiments, notifications, including content and display information, are communicated through a "Notification API" 1390 and stored in the device 100, in a server or database, in a service provider network, in a third-party service partner server, and/or in a network operator network. In some embodiments, the "Notification API" 1390 includes definitions for notification triggers that the device 100 detects. In some embodiments, the "Notification API" 1390 includes definitions for notification triggers that a network element sends to another network element and/or to the device 100. In some embodiments, the "Notification API" 1390 includes definitions for notification trigger actions that result when a notification trigger occurs. In some embodiments, the "Notification API" 1390 includes definitions for a trigger action that causes a stored message to be presented to the user, e.g., through a device 100 UI 101. In some embodiments, the "Notification API" 1390 includes definitions for a trigger action that causes retrieval of a notification message from a server, e.g., in a service provider network, in a third-party server network, and/or in a "cloud-based" network. In some embodiments, the "Notification API" 1390 provides for storing notifications in the device 100, in a service provider server (and/or associated database), or in a third-party service provider server (and/or associated database). In some embodiments, the "Notification API" 1390 provides for defining service activities and/or service usage measures that trigger a notification. In some embodiments, objects communicated through the "Notification API" 1390 include one or more of: service usage based notifications, notification message content, notification object placement, and notification display information. In some embodiments, the "Notification API" 1390 includes definitions for objects for marketing interceptors. In some embodiments, the "Notification API" 1390 includes definitions for objects for sponsor notifications.

Notification messages and notification triggers are defined in numerous filed patent applications and issued patents that are incorporated by reference herein, as set forth at the beginning of this specification. In some embodiments, the "Notification API" 1390 provides for defining, presenting, storing, communicating, and/or controlling notification messages and/or notification triggers as described therein. In some embodiments, the "Notification API" 1390 refers to one or more interfaces and/or protocols through which notification messages and/or notification triggers are defined, presented, stored, communicated and/or controlled.

FIG. 322 illustrates a third-party service partner's "Notification" server 1389 and a service provider's "Notification" server 1391 interconnected through a "Notification" API 1390 through which content and conditions (e.g., triggers) for service notifications can be provided. In some embodiments, the third-party service partner's "Notification" server 1389 obtains the service notification information from the service provider's "Notification" server 1391 in response to a notification query from the device 100, e.g., in (near) real time. In some embodiments, the third-party service partner's "Notification" server 1389 obtains the service notification information in advance from the service provider's "Notification" server 1391 and stores the service notification information in the third-party service partner's "Notification" server 1389 to provide later to the device 100. In some embodiments, a notification trigger occurs at the device 100, and a notification query is sent to the third-party service partner's "Notification" server 1389, which provides notification content stored in the third-party service partner's "Notification" server 1389 to the device 100. In some embodiments, the third-party service partner's "Notification" server 1389 obtains notification content from the service provider's "Notification" server 1391 to provide to the device 100. In some embodiments, a notification trigger occurs at the third-party service partner's "Notification" server 1389, and the third-party service partner's "Notification" server 1389 pushes notification content stored in the third-party service partner's Notification server 1389 to the device 100. In some embodiments, a notification trigger occurs at the third-party service partner's "Notification" server 1389, and the third-party service partner's "Notification" server 1389 obtains notification content from the service provider's "Notification" server 1391 and then pushes the obtained notification content to the device 100. In some embodiments, a notification trigger occurs in a service provider's network element and communicates the notification trigger indication to the service provider's "Notification" server 1391, which in turn communicates either a notification trigger or notification content to the device 100 through the third-party service partner's "Notification" server 1389.

Figure 323:
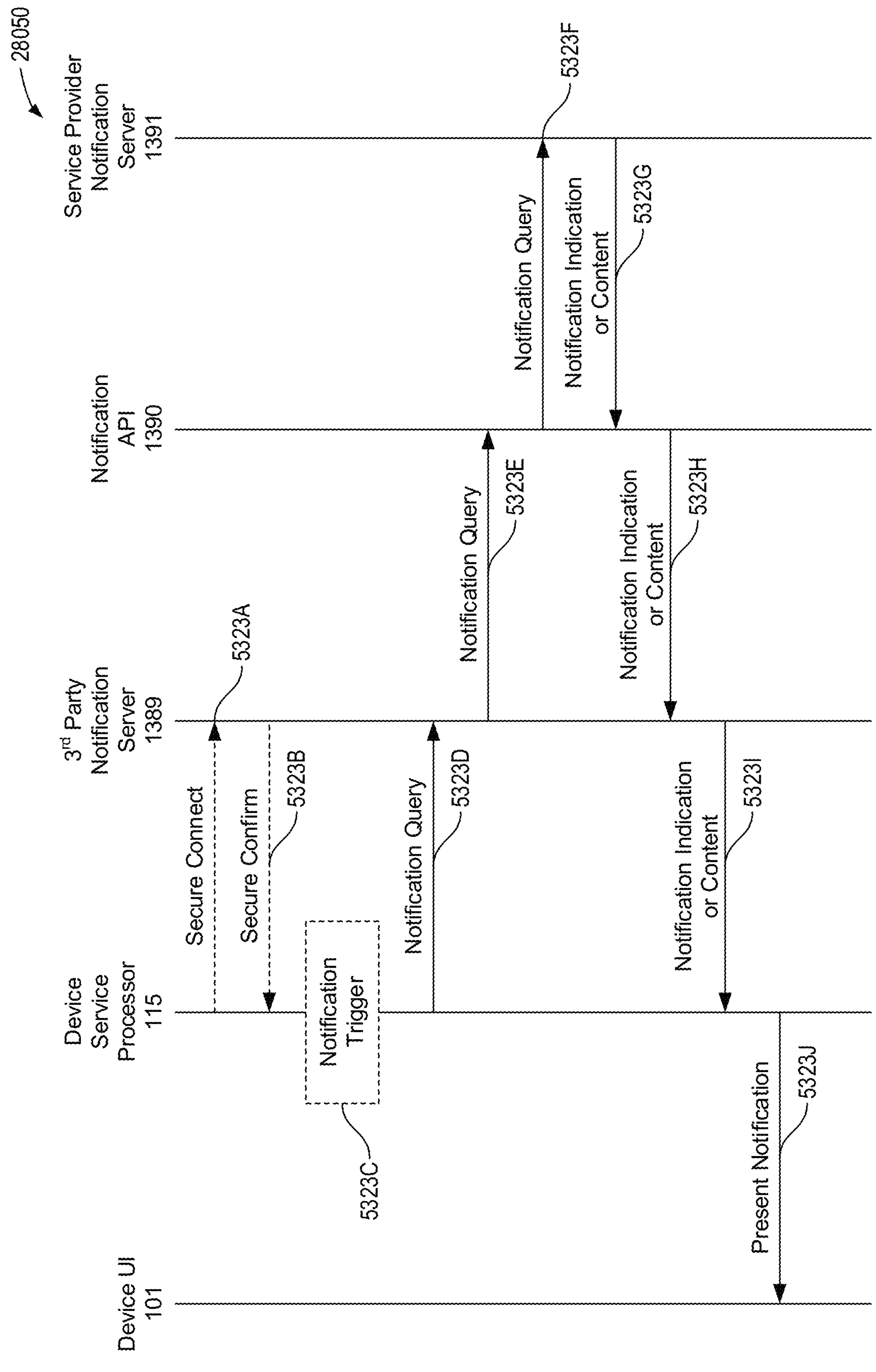

FIG. 323 illustrates a representative message exchange sequence 28050 between the device 100, the third-party service partner's "Notification" server 1389 and the service provider's "Notification" server 1391 that provides for presenting a notification to a user of the device 100 using the "Notification" API 1390. In some embodiments, at 5323A and 5323B the device service processor 115 establishes a secure connection with the third-party service partner's "Notification" server 1389 through an exchange of messages. In some embodiments, at 5323D the device service processor 115 communicates a notification query to the third-party service partner's "Notification" server 1389, e.g., polling for notification content. In some embodiments, the device service processor 115 communicates the notification query to the third-party service partner's "Notification" server 1389 in response to a notification trigger 5323C occurring in the device 100. In some embodiments, at 5323E and 5323F the third-party service partner's "Notification" server 1389 relays the notification query through the "Notification" API 1390, according to a common format/protocol, to the service provider's "Notification" server 1391. In some embodiments, in response to the notification query at 5323F from the third-party service partner's "Notification" server 1389, at 5323G the service provider's "Notification" server 1391 replies with a notification indication (e.g., notification trigger occurred in a network element and an indication of the notification trigger is stored in the network until the device polls for notification) and/or notification content through the "Notification" API 1390. In some embodiments, the third-party service partner's "Notification" server 1389 receives, at 5323H, a notification indication from the service provider's "Notification" server 1391 and, at 5323I, relays the notification indication to the device service processor 115. In some embodiments, at 5323H the third-party service partner's "Notification" server 1389 receives the notification indication from the service provider's "Notification" server 1391 and, at 5323I, provides notification content to the device service processor 115. In some embodiments, at 5323J the device service processor 115 presents a notification to the user, e.g., through the device UI 101, in response to receiving a notification indication or notification content. In some embodiments, the notification content is retrieved from storage in the device 100. In some embodiments, the notification content is obtained from the network, e.g., from the third-party service partner's "Notification" server 1389 or from the "Notification" server 1391 of the service provider network and then through the third-party service partner's "Notification" server 1389.

Figure 324:
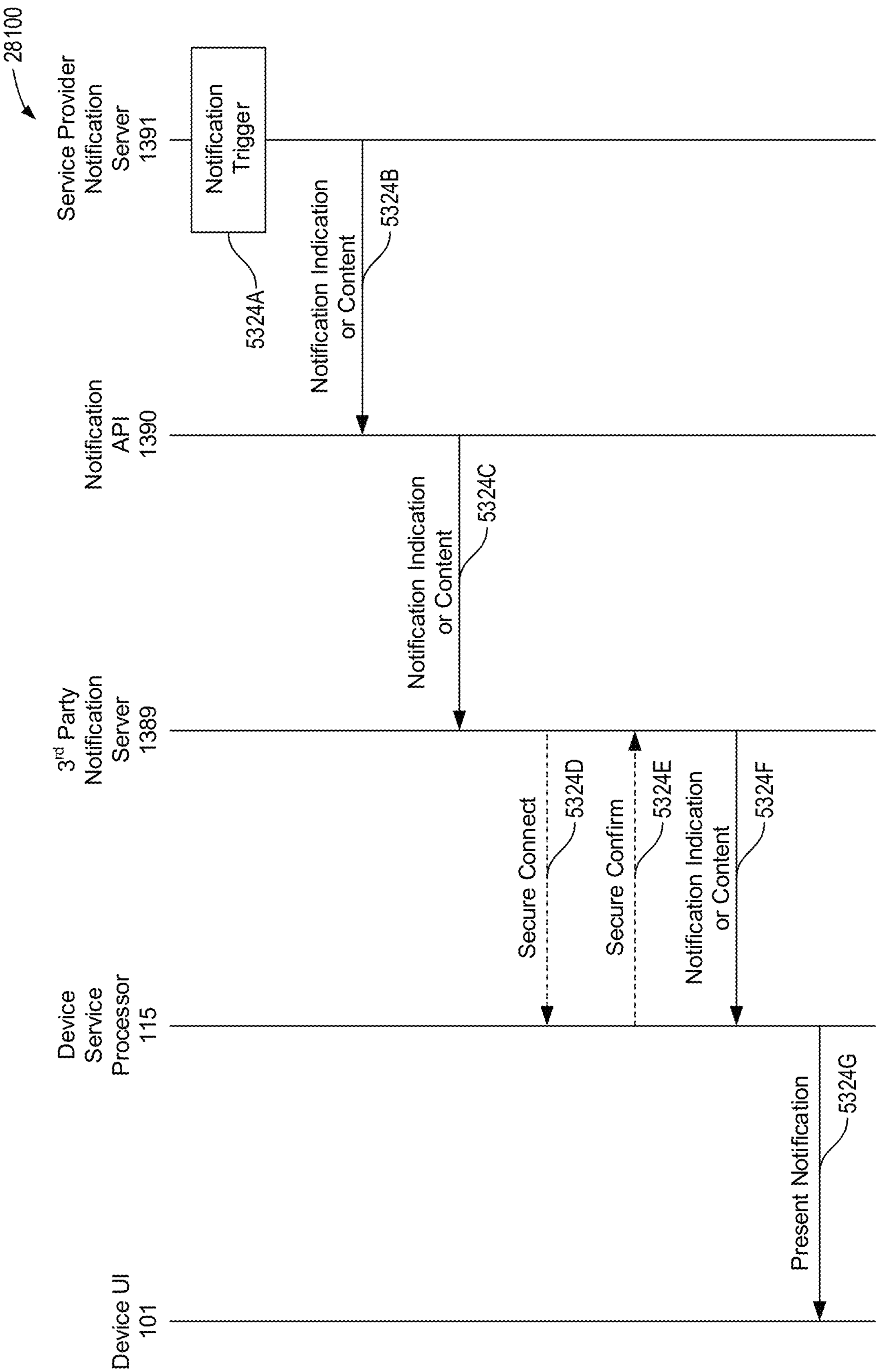

FIG. 324 illustrates a representative message exchange sequence 28100 between the device 100, the third-party service partner's "Notification" server 1389 and the service provider's "Notification" server 1391 that provides for presenting a notification to a user of the device 100 using the "Notification" API 1390. In some embodiments, a notification trigger 5324A occurs at a network element and is communicated to the service provider's "Notification" server 1391. In some embodiments, at 5324B and 5324C the service provider's "Notification" server 1391 communicates an indication of the notification trigger and/or notification content as a results of the notification trigger through the "Notification API" 1390 to the third-party service partner's "Notification" server 1391. In some embodiments, at 5324D and 5324E the third-party service partner's "Notification" server 1391 establishes a secure connection with the device service processor 115 and communicates the indication of the notification trigger and/or the notification content to the device service processor 115. In some embodiments, at 5324G the device service processor 115 presents a notification, e.g., through the device UI 101, as a result of receiving, at 5324G, the notification indication or the notification content from the third-party service partner's "Notification" server 1389. In some embodiments, the notification content is pre-stored in the device 100 and retrieved in response to receiving the notification indication from the third-party service partner's "Notification" server 1389. In some embodiments, the notification content is pre-stored in the third-party service partner's "Notification" server 1389 and provided to the device service processor 115 in response to receiving the notification indication from the service provider's "Notification" server 1391, through the "Notification" API 1390.

Figure 325:
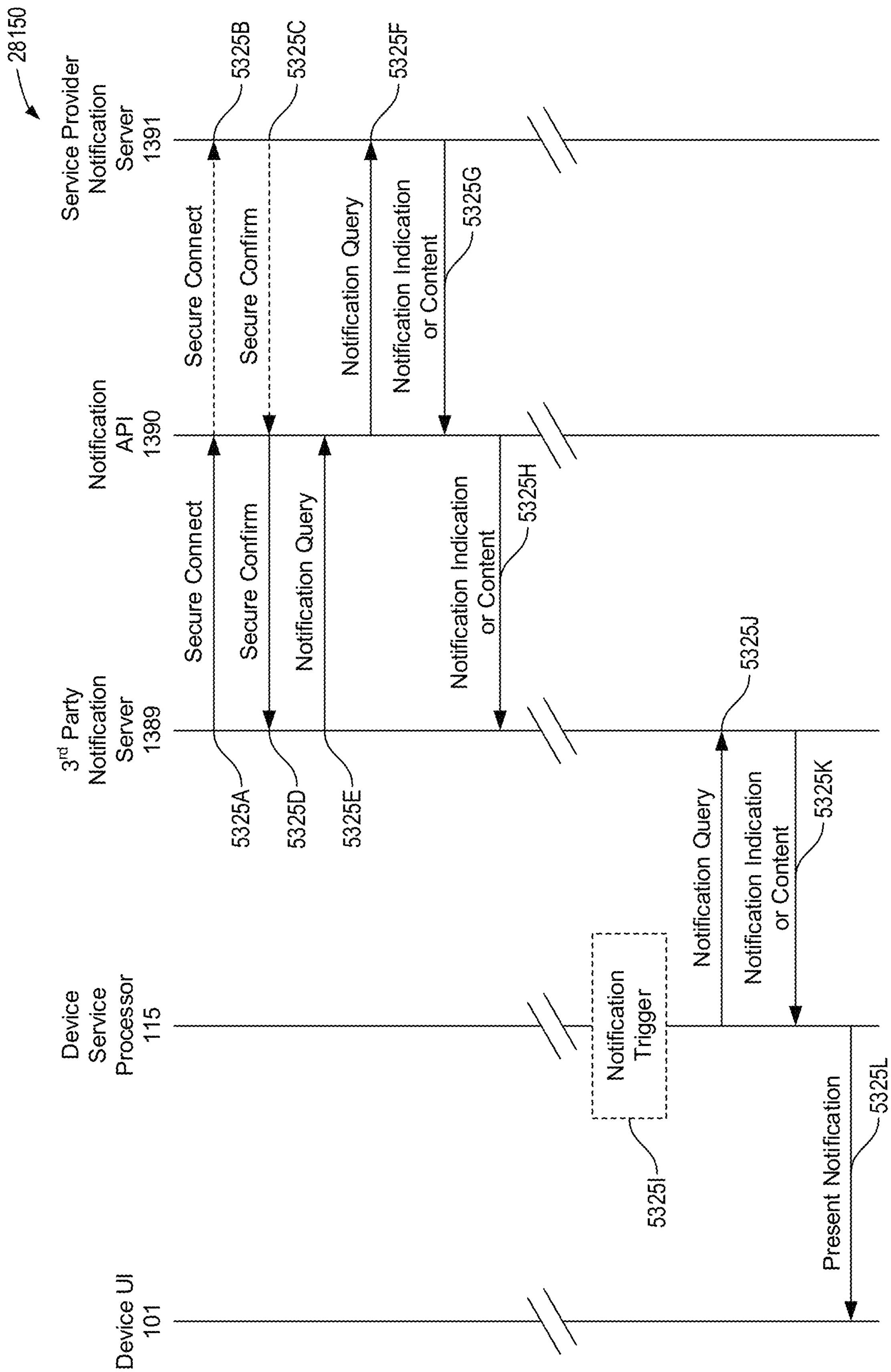

FIG. 325 illustrates a representative message exchange sequence 28150 between the device 100, the third-party service partner's "Notification" server 1389 and the service provider's "Notification" server 1391 that provides for presenting a notification to a user of the device 100 using the "Notification" API 1390, in some embodiments. In some embodiments, notification trigger indications and/or notification content are obtained by the third-party service partner's "Notification" server 1389 from the service provider's "Notification" server 1391 through the "Notification" API 1390 and stored in the third-party service partner's "Notification" server 1389 (or in an associated database not shown) for later retrieval by the device 100. In some embodiments, at 5325A and 5325B, the third-party service partner's "Notification" server 1391 establishes a secure connection with or, at 5325A, 5325B, 5325C, and 5325D, through the "Notification" API 1390. In some embodiments, at 5325E and 5325F, the third-party service partner's "Notification" server 1389 submits a notification query message, according to a common format/protocol through the "Notification" API 1390, to obtain notification information from the service provider's "Notification" server 1391. In some embodiments, in response to receiving the notification query message from the third-party service partner's "Notification" server 1389, at 5325G and 5325H the service provider communicates notification indications and/or notification content through the "Notification" API 1390 to the third-party service partner's "Notification" server 1389. In some embodiments, the third-party service partner's "Notification" server 1389 stores the obtained notification indications and/or notification content obtained from the service provider's "Notification" server 1391. In some embodiments, the third-party service partner's "Notification" server 1391 connects through a common "Notification" API 1390 to one or more service providers. In some embodiments, the third-party service partner's "Notification" server 1389 consolidates notification information (e.g., triggers, content) received from one or more servers of one or more service providers. In some embodiments, the third-party service partner's "Notification" server 1389 connects with different devices 100 that subscribe to service plans provided by different service providers, and the third-party service partner's "Notification" server 1389 acts as a common notification server for the different service providers to the devices 100. In some embodiments, at 5325J the third-party service partner's "Notification" server 1389 communicates a notification query for a single device 100, for multiple devices 100, for a device group, or for devices associated with a user group. In some embodiments, at 5325G and 5325H, the third-party service partner's "Notification" server 1389 obtains notification indications and/or notification content from servers maintained by one or more service providers through the "Notification" API 1390, and subsequently, at 5325K, provides notification indications and/or content to individual devices 100 in response to notification queries from the individual devices 100 at 5325J. In some embodiments, at 5325J the device processor 115 communicates a notification query to the third-party service partner's "Notification" server 1389 and, at 5325K, obtains a notification indication and/or notification content in response. In some embodiments, the device processor 115 obtains multiple notification indications and/or notification content for multiple notification messages. In some embodiments, at 5325L the device service processor 115 presents one or more notification messages to the user of the device 100, e.g., through the device UI 101. In some embodiments, notification message content that is obtained and presented to the user of the device 100 is stored in the device 100, in the third-party service partner's "Notification" server 1389, and/or in the service provider's "Notification" server 1391. FIG. 325 illustrates a representative embodiment in which the third-party service partner's "Notification" server 1389 polls the service provider's "Notification" server 1391 for notification indications and/or notification content.

Figure 326:
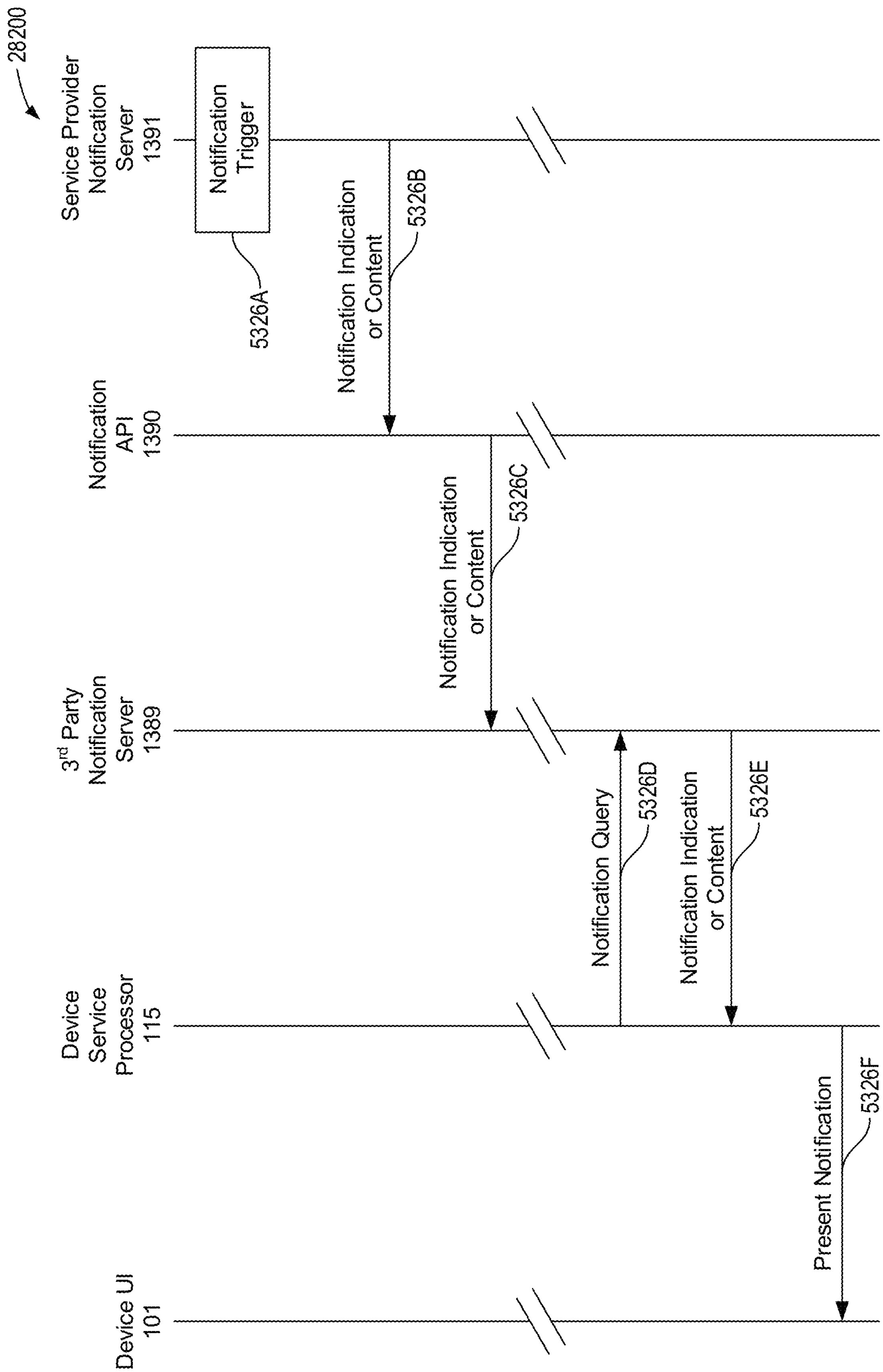

FIG. 326 illustrates a representative message exchange sequence 28200 between the device 100, the third-party service partner's "Notification" server 1389 and the service provider's "Notification" server 1391 that provides for presenting a notification to a user of the device 100 using the "Notification" API 1390. In some embodiments, at 5326B and 5326C the service provider's "Notification" server 1391 communicates notification indications and/or notification content to the third-party service partner's "Notification" server 1389 through the "Notification" API 1390 in response to a notification trigger 5326A. In some embodiments, the notification trigger 5326A occurs at the service provider's "Notification" server 1391. In some embodiments, the notification trigger 1391 occurs at another server in the service provider's network (or is communicated by a notification trigger indication through one or more servers in the service provider's network) to the service provider's "Network" server 1391. In some embodiments, the third-party service partner's "Notification" server 1389 stores the notification indication and/or content information to provide later to one or more devices 100. In some embodiments, as described earlier, the third-party service partner's "Notification" server 1389 obtains notification indications and/or notification content from one or more servers maintained by one or more different service providers and stores the notification indications and/or notification content for distribution to one or more devices 100. In some embodiments, each of the one or more different service providers uses a common "Notification" API 1390 to communicate with the third-party service partner's "Notification" server 1389. In some embodiments, at 5326D the device service processor 115 communicates a notification query to the third-party service partner's "Notification" server 1389 and, at 5326E, obtains in response notification indications and/or notification content. In some embodiments, at 5326F the device service processor 115 presents one or more notification messages, e.g., through the device UI 101, to the user of the device 100. In some embodiments, at least part of the content and/or display information for the notification messages is pre-stored in the device 100. In some embodiments, at least part of the content and/or display information for the notification messages is stored in the third-party notification server and subsequently communicated to the device 100.

Figure 327:
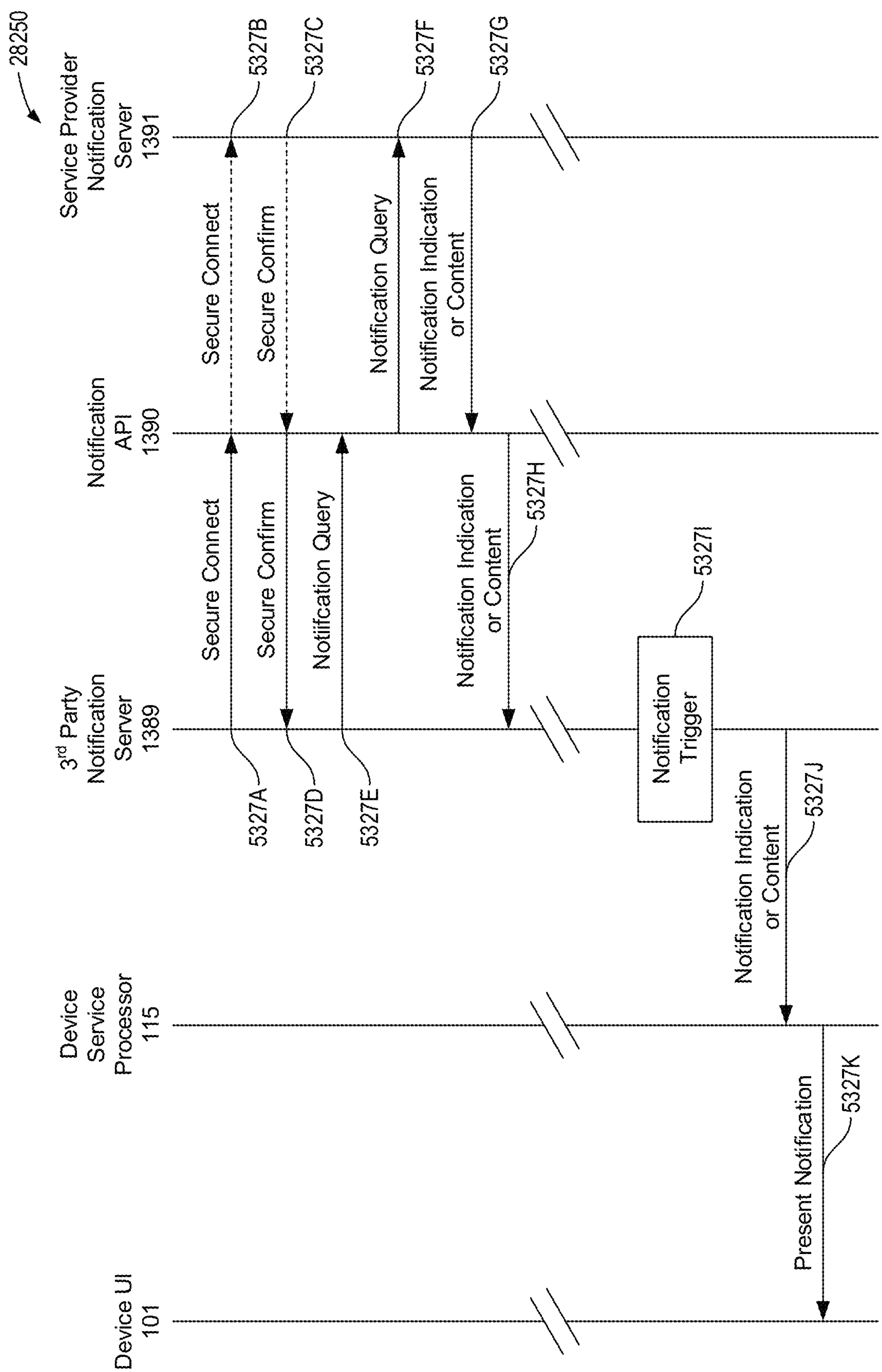

FIG. 327 illustrates a representative message exchange sequence 28250 between the device 100, the third-party service partner's "Notification" server 1389 and the service provider's "Notification" server 1391 that provides for presenting a notification to a user of the device 100 using the "Notification" API 1390. In some embodiments, the third-party service partner's "Notification" server 1389 obtains notification indications and/or notification content form the service provider's "Notification" server 1391 and stores the notification indications and/or notification content for later distribution to one or more devices 100. In some embodiments, at 5327A, 5327B, 5327C, and 5327D the third-party service partner's "Notification" server 1389 establishes a secure connection with or through the "Notification" API 1390 to the service provider's "Notification" server 1391 and subsequently, at 5327E and 5327F, sends a notification query message to retrieve, at 5327G and 5327H, notification indications and/or notification content from the service provider's "Notification" server 1391. In some embodiments, the third-party service partner's "Notification" server 1389 supports multiple devices 100 having services from multiple service providers. In some embodiments, the third-party service partner's "Notification" server 1389 uses a common "Notification" API 1390 to communicate requests for notification indications and/or notification content and to obtain notification indications and/or notification content from servers in one or more service provider networks. In some embodiments, at 5327J, the third-party service partner's "Notification" server 1389 provides a notification indication and/or notification content to the device service processor 115 in response to a notification trigger 5327I occurring at (or received by) the third-party notification service partner's "Notification" server 1391. In some embodiments, at 5327K one or more notification messages are presented to the user of the device 100, e.g., through the device UI 101, by the device service processor 115 in response to receiving the notification indication and/or notification content from the third-party service partner's "Notification" server 1389 at 5327J. In some embodiments, notification content in the notification message presented to the user is retrieved from storage in the device 100. In some embodiments, notification content in the notification message presented to the user of the device 100 is obtained from the third-party service provider's notification server 1389.

FIGS. 328 and 329 illustrate representative systems 28300 and 28350 respectively, in which the "Notification" server 1391 is maintained in a service provider's network 3800, in some embodiments. In some embodiments, the device 100 communicates with a third-party service partner's server (service controller 122), which in turn communicates with the service provider's "Notification" server 1391 through the "Notification" API 1390, as illustrated in FIG. 328. In some embodiments, the device 100 communicates directly with the service provider's "Notification" server 1391 through the "Notification" API 1390, as illustrated in FIG. 329. As described herein, the "Notification"

API 1390 provides for defining, presenting, storing, communicating, and/or controlling notification messages and/or notification triggers, in some embodiments. In some embodiments, notification content and/or triggers are defined through one or more APIs 205 connecting to servers (e.g., notification server 1391), databases (e.g., databases 117A) and/or the SDC 135 in the service provider network. In some embodiments, the third-party service partner's service controller 122 connects to "Notification" servers 1390 in networks maintained by different service providers and aggregates notification queries and notification messages for communication with one or more devices 100. In some embodiments, the different service providers' "Notification" servers 1390 communicate with the third-party service partner's service controller 122 through the "Notification" API 1390. As already described herein, notification triggers can occur, in some embodiments, in the device 100, in a third-party service partner's server (e.g., the service controller 122), or in a service provider's server (e.g., the "Notification" server 1391). As also described herein, notification content can be stored in the device 100, in the third-party service partner's server (e.g., the service controller 122), or in one or more service providers' servers and/or databases (e.g., the "Notification" server 1391 and/or databases 117A associated therewith). In some embodiments, notification triggers occur in one element (device 100 and/or network element) and notification messages to provide to the user of the device 100 as a result originate in another element (device 100 and/or network element), and communication of one or more notification queries and/or notification content are provided through the "Notification" API 1390.

FIG. 330 illustrates a representative message exchange sequence 28400 between the device 199 and the service provider's "Notification" server 1391 that provides for presenting a notification to a user of the device 100 using the "Notification" API 1390. In some embodiments, at 5330A, 5330B, 5330C, and 5330D the device service processor 115 establishes a secure connection to (or through) the "Notification" API 1390. In some embodiments, at 5330E and 5330F the device service processor 115 communicates a notification query message through the "Notification" API 1390, in a common format/protocol, to the service provider's "Notification" server 1391. In some embodiments, the notification query from the device service processor 115 is used to poll for notification indications and/or notification content from the service provider's "Notification" server 1391. In some embodiments, a notification trigger occurs at the device 100 (not shown), and, at 5330E, the device service processor 115 in response communicates the notification query through the "Notification" API 1390 to the service provider's "Notification" server 1391 to obtain notification content. In some embodiments, at 5330G and 5330H the service provider's "Notification" server 1391 returns one or more notification indications and/or notification content through the "Notification" API 1390 to the device service processor 115. In some embodiments, at 5330I the device service processor 115 presents a notification message, e.g., through the device UI to a user of the device 100, in response to receiving the notification indication and/or notification content from the service provider's "Notification" server 1391. In some embodiments, the notification content is stored in the device 100 and retrieved in response to receiving the notification indication from the service provider's "Notification" server 1391. In some embodiments, the notification content is stored in the service provider's "Notification" server 1391 (or an associated server or database) and retrieved to provide to the device 100 through the "Notification" API 1390.

FIG. 331 illustrates a representative message exchange sequence 28450 between the device 100 and the service provider's "Notification" server 1391 through the "Notification" API 1390 that provides for presenting a notification to a user of the device 100. In some embodiments, a notification trigger 5331A occurs at (or is communicated to) the service provider's "Notification" server 1391. In response to the notification trigger, at 5331B and 5331C the "Notification" server 1391 communicates a notification indication and/or notification content through the "Notification" API 1390 to the device service processor 115. In some embodiments, at 5331D the device service processor 115 presents a notification message to the user of the device 100, e.g., through the device UI 101. In some embodiments, the notification message presented to the user includes content at least in part retrieved from storage in the device 100 (e.g., in response to reception of the notification indication). In some embodiments, the notification message presented to the user includes content received at least in part from the service provider's "Notification" server 1391.

Figure 332:
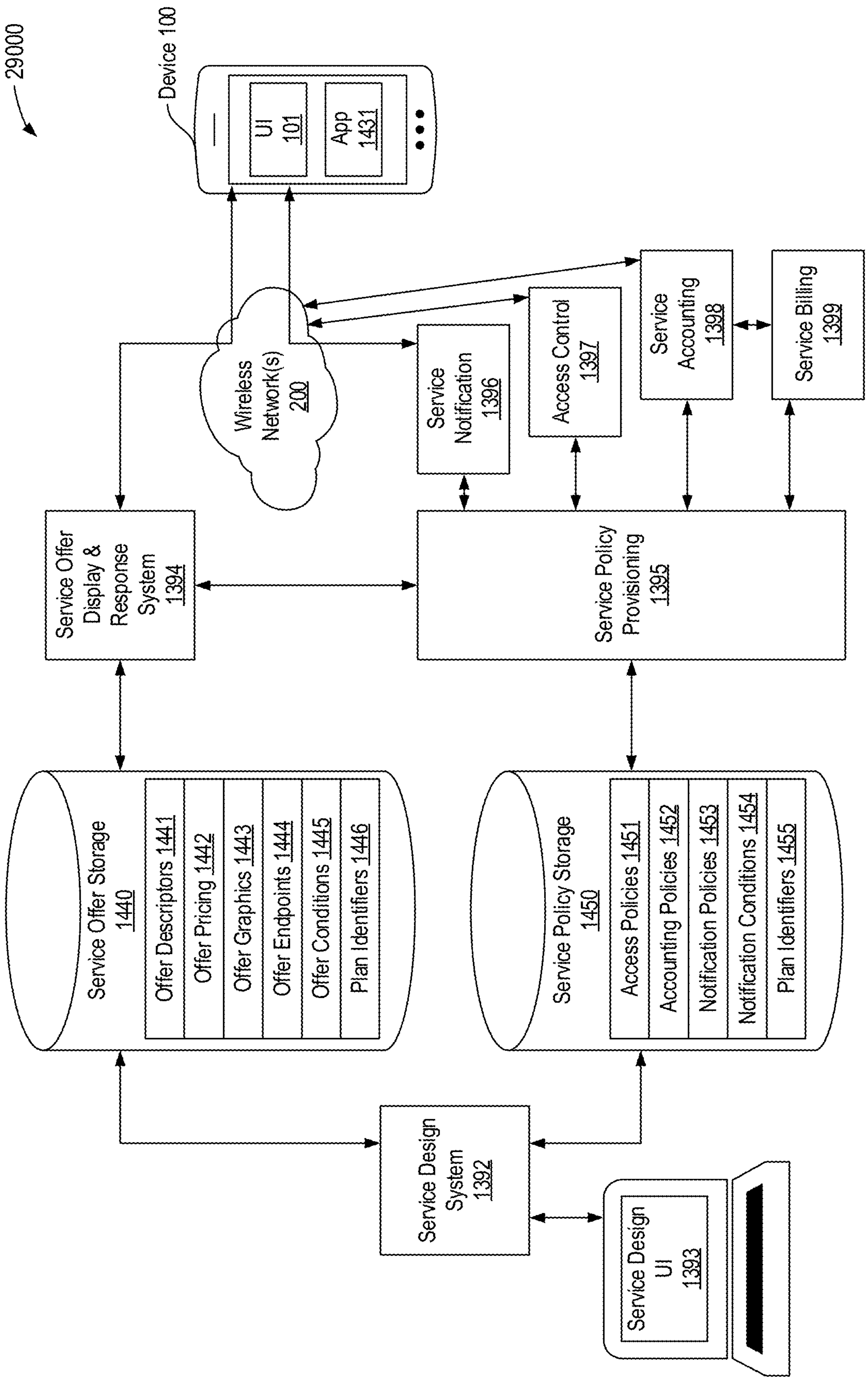

FIG. 332 illustrates a representative system 29000 that provides for implementing a service offer, service selection, service activation and/or service provisioning system for a mobile device 100. In some embodiments, the system 29000 is a portion of a system for designing and managing communication services as described herein. In some embodiments, the system 29000 includes one or more APIs that implement various communication service design and management functions, as explained for accompanying FIGS. 333 to 335. In some embodiments, the representative system 29000 includes one or more APIs that implement various communication service design and management functions, as detailed herein for FIGS. 291 to 331.

In some embodiments, the device 100 illustrated in FIG. 332 communicates through one or more wireless networks 200 using one or more applications 1431, operating system components, and/or device agents, e.g., using a service processor 115 as described herein above, resident on the device 100 and interacts with a user of the device 100 through a user interface 101. In some embodiments, in response to an external event (e.g., the device 100 entering a particular geographic location, a new set of wireless networks, or a trigger provided through a wireless network to which the device 100 is already connected) or an internal event (e.g., powering on the device 100, initializing the device 100, activating the device 100, or based on an input received through the UI 101 from a user of the device 100), the application 1431 (and/or OS components, and/or device agents, and/or service processor 115) in the device 100 communicates with a "Service Offer Display & Response" system 1394 in order to obtain a service plan offer, e.g., for a set of service plans to which the user of the device 100 can select and subscribe. In some embodiments, the "Service Offer Display & Response" system 1394 retrieves information for one or more service plan offers from a database that stores service plan offer information, e.g., the "Service Offer Storage" database 1440. In some embodiments, the "Service Offer Display & Response" system 1394 retrieves information for one or more service plan offers from the "Service Offer Storage" database 1440 based on one or more criteria, e.g., based on properties of the device 100, preferences obtained from the device 100, preferences maintained in a device 100 database (not shown), user input, administrator input, network type, device type, application type, or a combination of these. In some embodiments, the "Service Offer Display & Response" system 1394 obtains information about a set of service plans and presents them to the user of the device 100, e.g., through the device 100 UI 101. In some embodiments, the service plan information stored in the "Service Offer Storage" database 1440 is organized based on service plan identifiers 1446. In some embodiments, the service plan information includes a set of service plans grouped as a service plan offer. In some embodiments, the service plan information includes text descriptors 1441, pricing 1442, graphics 1443, endpoints 1444, and other information to present to the user of the device 100 in a service plan offer. In some embodiments, the service plan information includes offer conditions 1445 under which a service plan or set of service plans is offered to a device 100. In some embodiments, the "Service Offer Display & Response" system 1394 presents a service plan offer to the device 100 using service plan information retrieved from the "Service Offer Storage" database 1440, e.g., presenting through the UI 101 of the device 100 one or more screens formatted with text, graphics and pricing (and based on UI placement information provided by the device 100 and/or from the "Service Offer Storage" database 1440). In some embodiments, at a minimum a service plan offer presented to the user of the device 100 includes an offer descriptor 1441 and a plan identifier 1446. In some embodiments, a portion of service plan information displayed to the user is obtained from the "Service Offer Storage" database 1440 and a portion of service plan information displayed to the user is obtained (or derived) locally from the device 100. In some embodiments, service plan information in the "Service Offer Storage" database 1440 is managed through a "Service Design System" 1392. In some embodiments, the Service Design System 1392 includes a service design and management interface (Service Design UI 1393 of FIG. 332), e.g., design portals, terminals, sandboxes, or other interfaces through which an administrator of the service plans and service plan offers can enter, modify, remove, and/or otherwise manage service plan information for service plan offers. In some embodiments, a set of service plan policies associated with service plans included in the "Service Offer Storage" database 1440 is stored in a "Service Policy Storage" database 1450. In some embodiments, the service plan policies of the "Service Policy Storage" database 1450 are also managed through the Service Design System 1392, e.g., using the Service Design UI 1393. In some embodiments, the service plan policies are organized in the "Service Policy Storage" database 1450 according to service plan identifiers 1455, which may be the same service plan identifiers 1446 as used to organize the service plan information in the "Service Offer Storage" database 1440.

In some embodiments, the user of the device 100 responds to the service plan offer and selects, purchases, subscribes to, activates, and/or requests additional information for one or more service plans. In some embodiments, the service plan information presented to the user in the service plan offer includes one or more "offer endpoints" 1444 from which additional information about the service plans or service plan offer can be obtained. In some embodiments, the user can select to retrieve the additional service plan or service plan offer information, e.g., by redirection to a website, a server, a web portal, an application portal, a network endpoint, a URL, or another directional link that can provide the user with additional service plan and/or service plan offer information for the service plan selection process. In some embodiments, the "Service Offer Display & Response" system 1394 obtains a response from the user of the device 100 that selects, purchases, subscribes to, activates or requests additional information for one or more service plans presented in the service plan offer. In some embodiments, the response from the user includes one or more service plan identifiers 1446 (or indications thereto) for service plans the subscriber selects, subscribes to, purchases and/or activates. In some embodiments, the "Service Offer Display & Response" system 1394 communicates to a "Service Policy Provisioning" system 1395 at least one of the service plan identifiers 1446 for service plans selected/purchased/subscribed to by the user of the device 100, and the "Service Policy Provisioning" system 1395 obtains one or more service policies (e.g., access policies 1451, accounting policies 1452, notification policies 1453) from the "Service Policy Storage" database 1450 in order to provision one or more network elements and/or the device 100 to implement the service plan(s) identified by the service plan identifier(s) 1446. In some embodiments, the "Service Policy Storage" database 1450 includes service plan policies for different communication service management functions used to implement a communication service for service plans. In some embodiments, the service plan policies include policies for managing access control (e.g., access policies 1451), service accounting (e.g., accounting policies 1452), service billing, service charging, and/or service notifications (e.g., notification policies 1453). In some embodiments, the "Service Policy Provisioning" system 1395 obtains service policies for one or more communication service management functions from the "Service Policy Storage" database 1450 and communicates service policies to one or more network elements and/or to the device 100. In some embodiments, the "Service Policy Provisioning" system 1395 distributes access control policies (e.g., access policies 1451) to one or more network elements that manage access control for one or more service plans of a wireless network (e.g., the "Access Control" network element 1397). In some embodiments, the "Service Policy Provisioning" system 1395 distributes accounting and/or billing policies (e.g., accounting policies 1452) to one or more network elements that manage accounting and/or billing for one or more service plans of the wireless network (e.g., the "Service Accounting" network element 1398 and/or the "Service Billing" network element 1399). In some embodiments, the "Service Policy Provisioning" system 1395 distributes notification policies (e.g., notification policies 1453) and/or notification conditions 1454 (e.g., for notification triggers) to one or more network elements that manage service notifications for one or more service plans of the wireless network (e.g., the "Service Notification" network element 1396).

Figure 333:
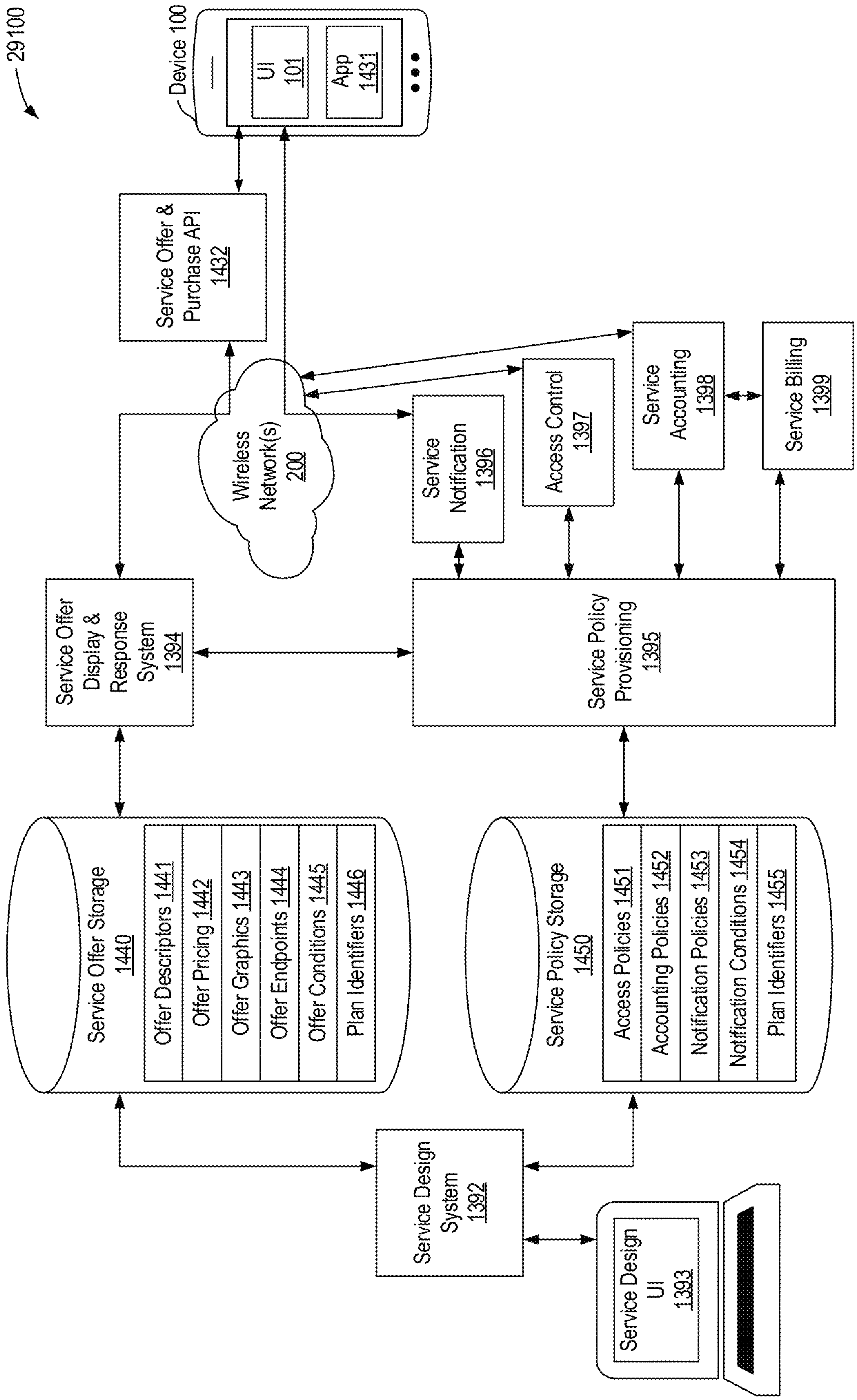

As described herein, one or more APIs can be used for communication between the device 100 and one or more network elements, as well as between different network elements, to provide for a common format/protocol with which to implement aspects of communication service management and control. FIG. 333 illustrates a system 29100 that includes a "Service Offer & Purchase" API 1432 between the device 100 and the "Service Offer Display & Response" system 1394 through which messages can be communicated to present service plan offers to the user of the device 100, in some embodiments, and to obtain service plan selection and purchase information from the user of the device 100, in some embodiments. In some embodiments, the "Service Offer & Purchase" API 1432 provides for one or more aspects of service plan offer and selection management as described herein for the "Service Plan Catalog & Selection" API 1362 of FIGS. 300 to 305, the "Offer" API 1384 of FIGS. 306 to 313, and the “Selection” API 1387 of FIGS. 314 to 321. In some embodiments, the “Service Offer & Purchase” API 1432 provides for communication between the mobile device 100 and different service providers' servers, e.g., service management systems that include instantiations of the “Service Offer Display & Response” system in different service provider networks.

Figure 334:
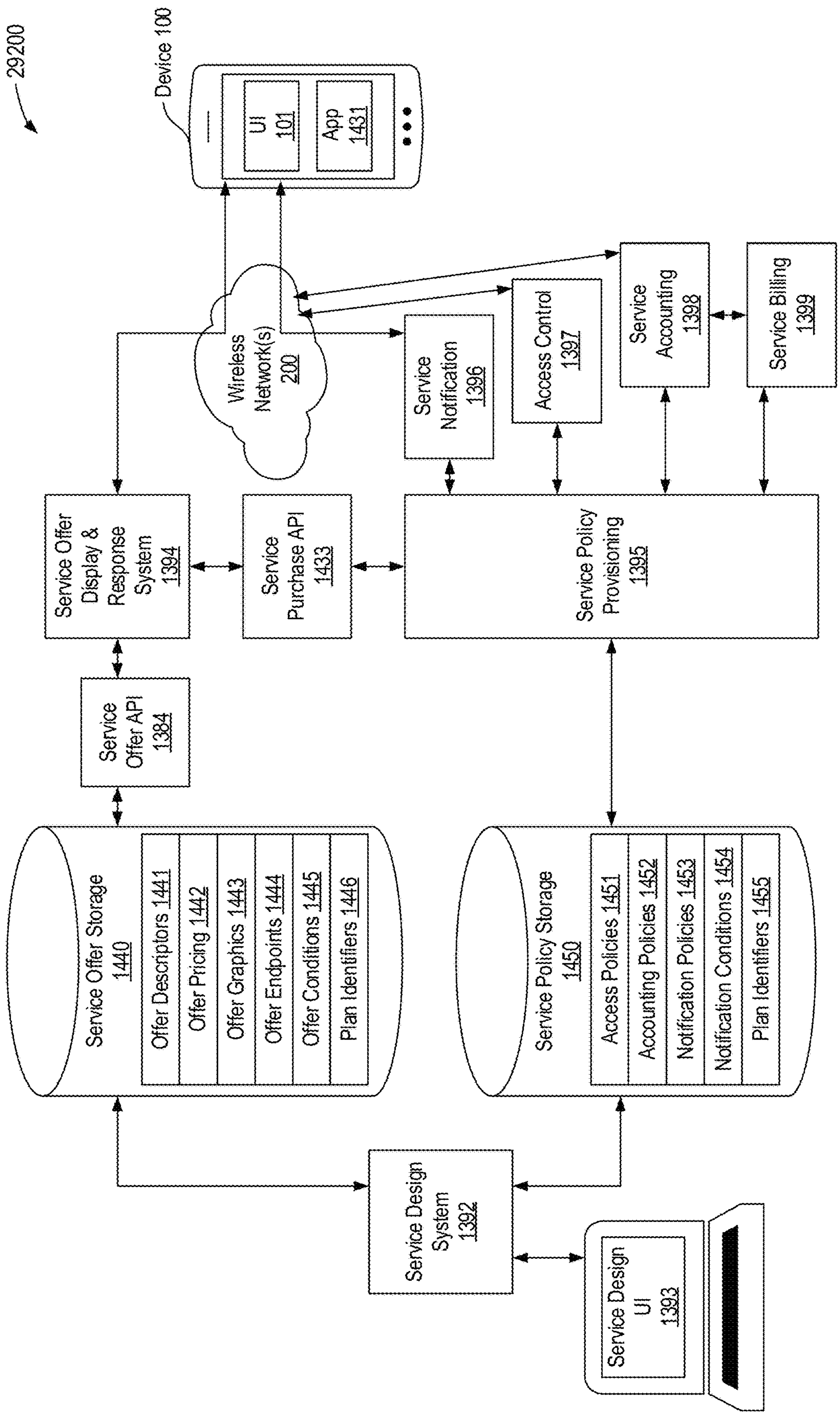

FIG. 334 illustrates a system 29200 that includes a “Service Offer” API 1384 between the “Service Offer Display & Response” system 1394 and the “Service Offer Storage” database 1440 through which messages can be communicated to obtain service plan offers to present to the user of the device 100 and, in some embodiments, to return service plan selection and purchase information obtained from the user of the device 100. The system 29200 illustrated in FIG. 334 also includes a “Service Purchase” API 1433 between the “Service Offer Display & Response” system 1394 and the “Service Policy Provisioning” system 1395 through which service plan selection and/or purchase information obtained from the user (and/or generated by the “Service Offer Display & Response” system 1394) to cause provisioning of one or more service plans selected, purchased, and/or subscribed to by the user of the device 100. In some embodiments, the “Service Offer Display & Response” system 1394 is maintained by a first service provider, network operator and/or third-party service partner; and the “Service Offer Storage” database 1440, the “Service Policy Storage” database 1450, and the “Service Policy Provisioning” system 1395 are maintained by a second service provider, network operator, and/or third-party service partner. In some embodiments, the “Service Offer Display & Response” system 1394 is managed by a third-party service partner that connects to different service management systems (e.g., servers, systems, and/or databases) of service providers and/or network operators through the “Service Offer” API 1384 and the “Service Purchase” API 1433 using a common format/protocol. In some embodiments, the system 29200 of FIG. 334 provides for offering service plans and obtaining service plan selections, purchases and/or activations from user of mobile devices 100 for multiple service providers, network operators and/or third-party service partners simultaneously. In some embodiments, the “Service Offer Display & Response” system 1394 provides a uniform service plan offer and selection “marketplace” experience for the user of the mobile device 100. In some embodiments, the “Service Offer” API 1384 provides for one or more aspects of service plan offer management as described herein for the “Service Plan Catalog & Selection” API 1362 of FIGS. 300 to 305 and the “Offer” API 1384 of FIGS. 306 to 313. In some embodiments, the “Service Purchase” API 1433 provides for one or more aspects of service plan selection and purchase management as described herein for the “Service Plan Catalog & Selection” API 1362 of FIGS. 300 to 305 and the “Selection” API 1387 of FIGS. 314 to 321.

Figure 335:
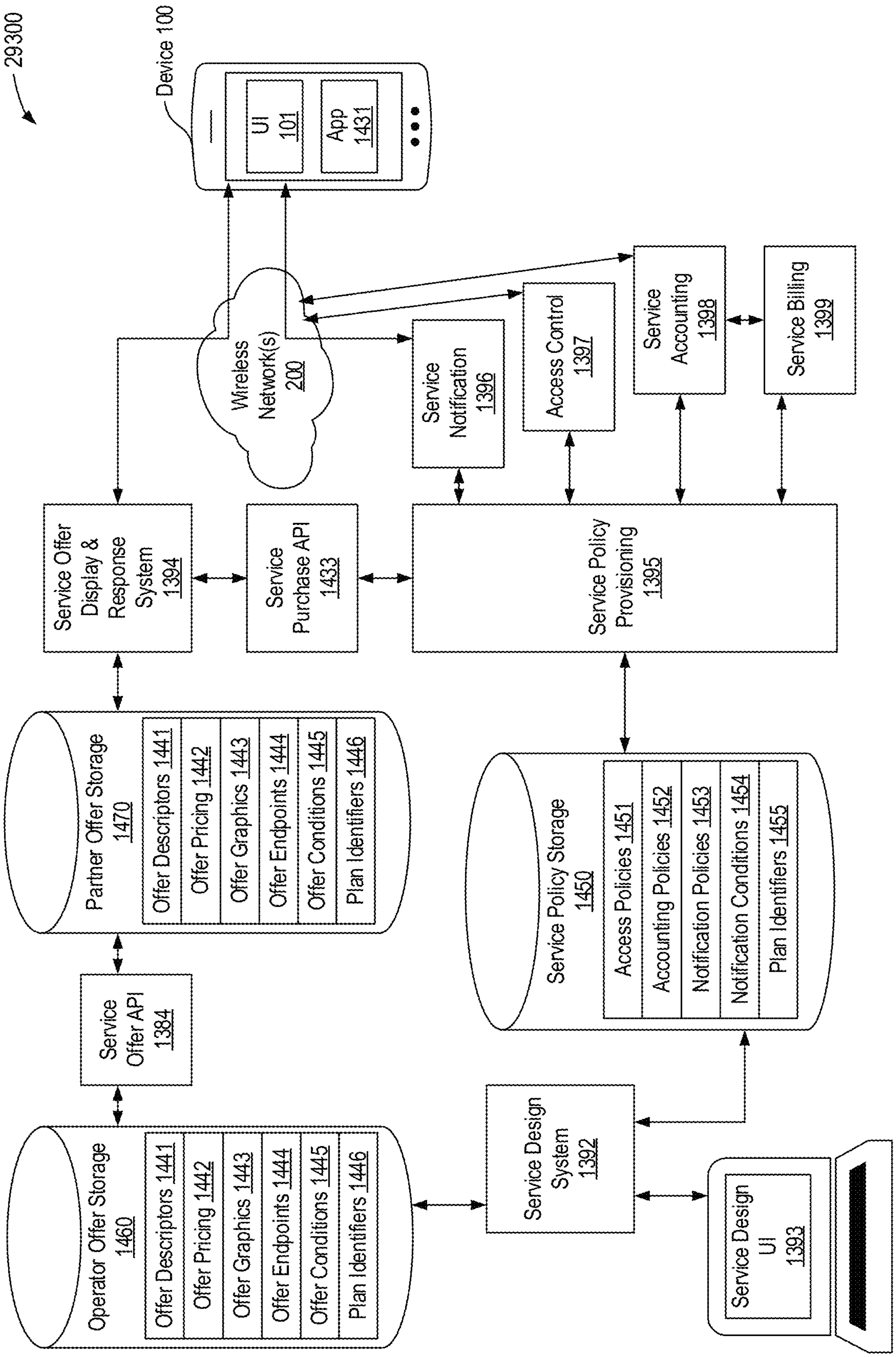

FIG. 335 illustrates a system 29300 that includes both an “Operator Offer Storage” database 1460 and a “Partner Offer Storage” database 1470 to store service plan information as described herein for service plan offers, service plan selection, service plan purchase and/or service plan activation. The system 29300 also includes a “Service Purchase” API 1433 between the “Service Offer Display & Response” system 1394 and the “Service Policy Provisioning” system 1395, as also shown for system 29200 in FIG. 334. The system 29300 further includes a “Service Offer” API 1384 between the “Operator Offer Storage” database 1460 and the “Partner Offer Storage” database 1470. As with the systems illustrated in FIGS. 29A to 29C, the system 29300 provides for communicating messages between the device 100 and different network elements, managed by one or more entities, to present service plan offers to a user of the device 100 and to obtain service plan selection, purchase and/or activation decisions from the user of the device 100, in some embodiments. The system 29300 also provides, in some embodiments, for service plan offer design and management through a service design system 1392 as described earlier herein. In some embodiments, the system 29300 further provides for service provisioning of one or more network elements in response to service plan selections, purchase and/or activations. In some embodiments, the “Service Offer Display & Response” system 1394 is managed by a third-party service partner and provides a uniform service plan offer, selection and purchase “marketplace” experience to the user of the device 100 for service plans provided by multiple service providers (who interface with the third-party service partner's systems and databases through one or more APIs). In some embodiments, the “Service Offer Display & Response” system 1394 provides service plan offers to the user of the device 100 based on service plan information retrieved from the “Partner Offer Storage” database 1470. As described earlier herein, service plan information communicated to the user of the device 100 can include, in some embodiments, one or more of service plan offer descriptors 1441A, 1441B, pricing 1442A, 1442B, graphics 1443A, 1443B, identifiers 1446A, 1446B, and/or endpoints 1444A, 1444B. In some embodiments, service plans to include in service plan offers depend at least in part on service plan offer conditions 1445B stored in the “Partner Offer Storage” database 1470. In some embodiments, the “Partner Offer Storage” database 1470 connects to “Operator Offer Storage” databases 1460 maintained by different service providers through the “Service Offer” API 1384. In some embodiments, the “Partner Offer Storage” database 1470 includes service plan information and service plan offers for multiple service providers. In some embodiments, the “Service Offer Display & Response” System 1394 interconnects with “Service Policy Provisioning” systems 1395 in one or more different service providers' networks through the “Service Purchase” API 1433 based on a common format/protocol. In some embodiments, the “Service Offer Display & Response” system 1394 provides service plan selection, purchase, and/or activation information obtained from the device 100 to one or more service provider provisioning systems (e.g., Service Policy Provisioning 1395) through the “Service Purchase” API 1433. In some embodiments, service providers use the provided service plan selection, purchase, and/or activation information provided through the “Service Purchase” API 1433 to obtain service plan policies (e.g., access policies 1451, accounting policies 1452, notification policies 1453) to provision one or more network elements responsible for service notification (e.g., service notification 1396), service access control (e.g., access control 1397), service accounting, and/or service billing (e.g., service accounting 1398, service billing 1399). In some embodiments, the “Service Policy Provisioning” system 1395 obtains the service plan policies from a “Service Policy Storage” database 1450. In some embodiments, service plans, service plan offers and service plan policies are organized based on service plan identifiers 1446. In some embodiments, service plan identifiers 1446 are communicated to the mobile device 100 as part of the service plan offers, and service plan identifiers 1446 (or indications thereof) are communicated back from the mobile device 100 to use to identify selected, purchased, and/or "request to activate" service plans. In some embodiments, the service plan identifiers 1446 (or indications thereof) are used to retrieve appropriate service plan policies (e.g., access policies 1451, accounting policies 1452, notification policies 1453) by which to provision services associated with the selected, purchased, and/or activated service plans. In some embodiments, the "Service Offer" API 1384 provides for one or more aspects of service plan offer management as described herein for the "Service Plan Catalog & Selection" API 1362 of FIGS. 300 to 305 and the "Offer" API 1384 of FIGS. 306 to 313. In some embodiments, the "Service Purchase" API 1433 provides for one or more aspects of service plan selection and purchase management as described herein for the "Service Plan Catalog & Selection" API 1362 of FIGS. 300 to 305 and the "Selection" API 1387 of FIGS. 314 to 321 respectively.

Figure 336:
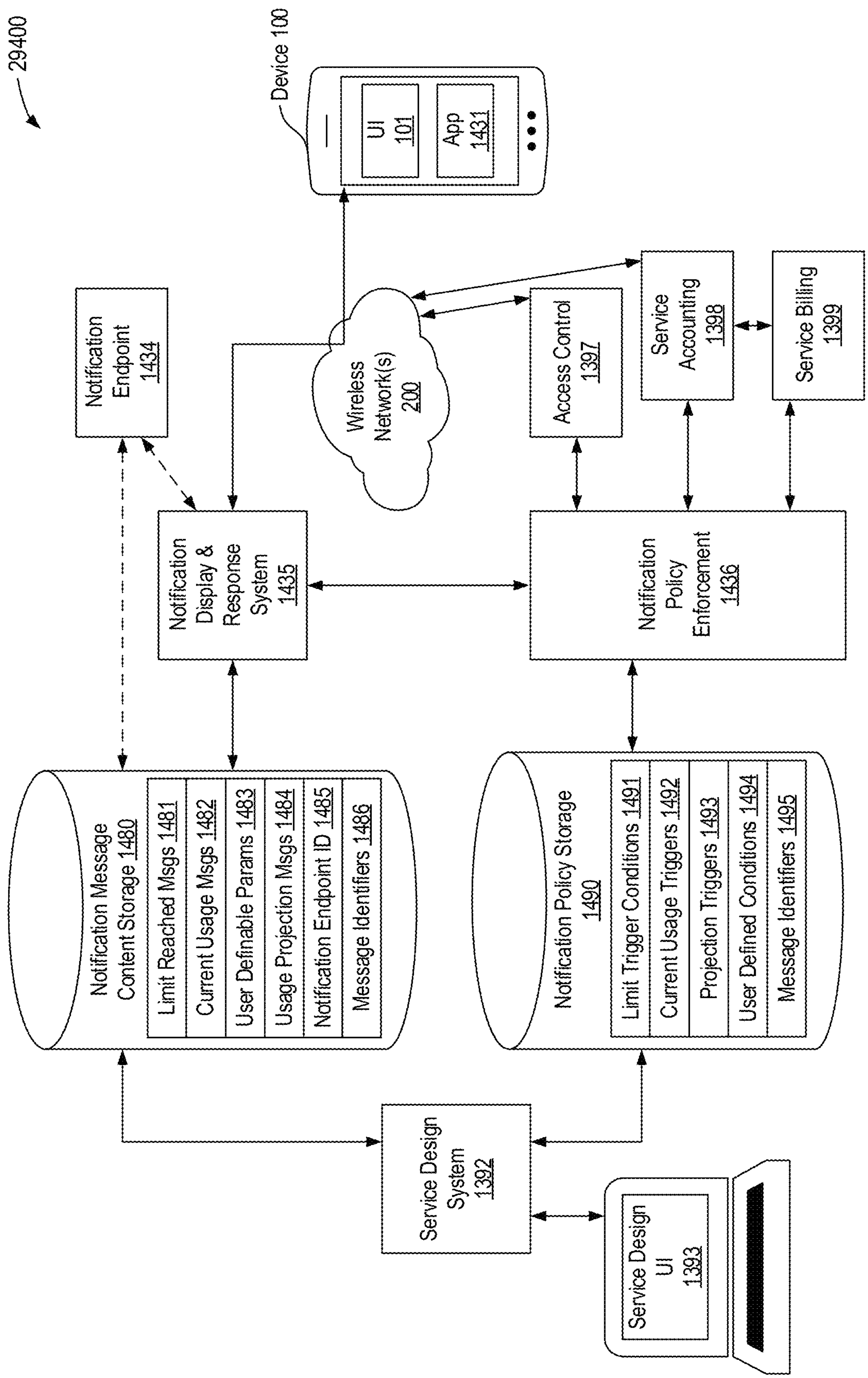

FIG. 336 illustrates a representative system 29400 that provides for implementing a service notification design, display, response and policy enforcement system for a mobile device 100. In some embodiments, the system 29400 is a portion of a system for designing and managing communication services as described herein. In some embodiments, the system 29400 includes one or more APIs that implement various communication service design and management functions, as explained for accompanying FIGS. 337 to 339. In some embodiments, the representative system 29400 includes one or more APIs that implement various communication service design and management functions, as detailed herein for FIGS. 291 to 331.

In some embodiments, the device 100 illustrated in FIG. 336 communicates through one or more wireless networks 200 using one or more applications 1431, operating system components, and/or device agents, e.g., using a service processor 115 as described herein above, resident on the device 100 and interacts with a user of the device 100 through a user interface 101. In some embodiments, the device 100 receives notification messages and/or notification indications through the one or more wireless networks 200 from a "Notification Display & Response" system 1435. In some embodiments, the device 100 presents one or more notification messages to the user of the device 100, e.g., through the device UI 101, the one or more notification messages being obtained from the "Notification Display & Response" system 1435 and/or being generated at the device 100 in response to reception of one or more notification indications. In some embodiments, notification messages are triggered based on one or more trigger conditions for notifications stored in the device 100 or in a network server and/or database (e.g., "Notification Policy Storage" database 1490). In some embodiments, an application 1431 (or an operating system component, a device agent, a service processor, or a combination thereof) receives a notification message and/or a notification indication and displays a notification message as a result through the UI 101 to the user of the device 100. In some embodiments, the displayed notification message includes notification content received from the "Notification Display & Response" system 1435, including text, graphics, and/or actionable buttons as described herein. In some embodiments, a network database, e.g., "Notification Message Content Storage" database 1480, includes notification message content to provide to the device 100 for display to the user through the device UI 101. In some embodiments, the notification message content in the "Notification Message Content Storage" database 1480 is organized based on notification message identifiers 1486. In some embodiments, the notification message content includes information for notification messages based on different notification trigger conditions being met, e.g., notification content messages based on service usage measures, service usage limits, current service usage amounts, projected service usage amounts, and/or user definable parameters. In some embodiments, when a particular notification trigger condition occurs, the "Notification Display & Response" system 1435 retrieves an associated notification message from the "Notification Message Content Storage" database 1480 and presents the notification message to the device 100. In some embodiments, the notification message content provided to the device 100 includes one or more notification endpoint identifiers that point to "notification endpoints" 1434 from which additional information associated with the notification can be obtained. In some embodiments, the user can select to retrieve the additional information associated with the notification, e.g., by redirection to a website, a server, a web portal, an application portal, a network endpoint, a URL, or another directional link that can provide the user with additional notification information as part of the notification process. In some embodiments, the notification message includes marketing interceptors and/or service plan offers that the user of the device 100 can select, e.g., to purchase a service plan and/or to retrieve additional information about service plans. In some embodiments, one or more service plan offers including service plans of various types, as described in detail herein, are presented in conjunction with the notification message to the user of the device 100. In some embodiments, the user responds to the notification message, e.g., through the device UI 101, and the "Notification Display & Response" system 1435 communicates with a "Notification Policy Enforcement" system 1436 based on the obtained user response to the notification message. In some embodiments, the response of the user of the device 100 to the notification message results in a change of services, e.g., a service plan purchase, a service plan upgrade, a service plan downgrade, a service plan cancellation, a service plan suspension, a modification of features of a service plan, sharing a service plan, assigning a service plan, setting restrictions on a service plan, or other service plan selection, purchase, activation and control as described herein. In some embodiments, the "Notification Policy Enforcement" system 1436 responds to the change in services by provisioning and/or updating service policies for the one or more devices 100 by communicating with network elements that manage access control (e.g., access control 1397), service accounting (e.g., service accounting 1398), and/or service billing (e.g., service billing 1399) for services of the one or more devices 100.

In some embodiments, the "Notification Policy Enforcement" system 1436 applies one or more associated service policies that impact access control, service accounting, service billing and/or other service management control functions for services of the device 100, in response to one or more notification trigger conditions being met. In some embodiments, notification messages are provided to the device 100 by the "Notification Display & Response" system 1435 in conjunction with the enforcement of various service policies by the "Notification Policy Enforcement" system 1436. In some embodiments, notification messages inform the user of changes to services to which the user of the device 100 subscribes in conjunction with service policy enforcement, e.g., service limiting, service suspension, service activation, service deactivation, service updates, and/or service permission controls.

In some embodiments, notification message content information in the "Notification Message Content Storage" database 1480 is managed through a "Service Design System" 1392. In some embodiments, the Service Design System 1392 includes a service design and management interface (Service Design UI 1393), e.g., design portals, terminals, sandboxes, or other interfaces through which an administrator of service plans, devices, device groups, users and/or user groups and can enter, modify, remove, and/or otherwise manage notification information including notification message content, notification endpoint 1434 identification, notification policy information, notification trigger conditions (e.g., limit trigger conditions 1491, current usage triggers 1492, protection triggers 1493), and/or notification actions for service plans, devices, device groups, users and/or user groups. In some embodiments, a set of notification policies associated with notification messages included in the "Notification Message Content Storage" database 1480 is stored in a "Notification Policy Storage" database 1490. In some embodiments, the notification policies of the "Notification Policy Storage" database 1490 are also managed through the Service Design System 1392, e.g., using the Service Design UI 1393. In some embodiments the notification policies are organized in the "Notification Policy Storage" database 1490 according to notification message identifiers 1486, e.g., the same notification message identifiers as used to organize the notification message information in the "Notification Message Content Storage" database 1480.

In some embodiments, the "Notification Policy Enforcement" system 1436 monitors (or obtains from associated network elements) one or more service usage measures that can trigger a notification message and/or a notification policy enforcement action. In some embodiments, the "Notification Policy Enforcement" system 1436 enforces one or more service plan policies based on one or more of the trigger conditions (e.g., limit trigger conditions 1491, current usage triggers 1492, projection triggers 1493) stored in the "Notification Policy Storage" database 1490 being met. In some embodiments, the "Notification Policy Enforcement" system 1436 communicates a message identifier 1486 associated with the trigger condition of a service plan for a device 100 and/or user being met to the "Notification Display & Response" system 1435, which in turn retrieves notification message content from the "Notification Message Content Storage" database 1480 based on notification message identifier 1486 received from the "Notification Policy Enforcement" system 1436. In some embodiments, the "Notification Display & Response" system 1435 communicates one or more notification messages (e.g., limit reached msgs 1481, current usage msgs 1482, usage projection msgs 1484) and/or notification identifiers, including in some embodiments notification endpoint identifiers 1485, to the device 100 for display to the user, e.g., through the device UI 101. In some embodiments, in response to displayed notification messages, the user of the device 100 enters a response that is communicated to the "Notification Display & Response" system 1435, which in turn communicates with the "Notification Policy Enforcement" system 1436 based on the received user response. In some embodiments, the user is directed to a notification endpoint 1434 based on the user response. In some embodiments, the "Notification Policy Enforcement" system 1436 communicates with one or more communication service management network elements to distribute, enforce and/or modify one or more access control policies that manage access control for one or more service plans associated with the notification messages (e.g., the "Access Control" network element 1397) based on the user response to the notification message. In some embodiments, the "Notification Policy Enforcement" system 1436 communicates with one or more communication service management network elements to distribute, enforce and/or modify one or more service accounting, billing and/or charging policies that manage accounting, charging and/or billing for one or more service plans associated with the notification messages (e.g., the "Service Accounting" network element 1398 and the "Service Billing" network element 1399) based on the user response to the notification message.

Figure 337:
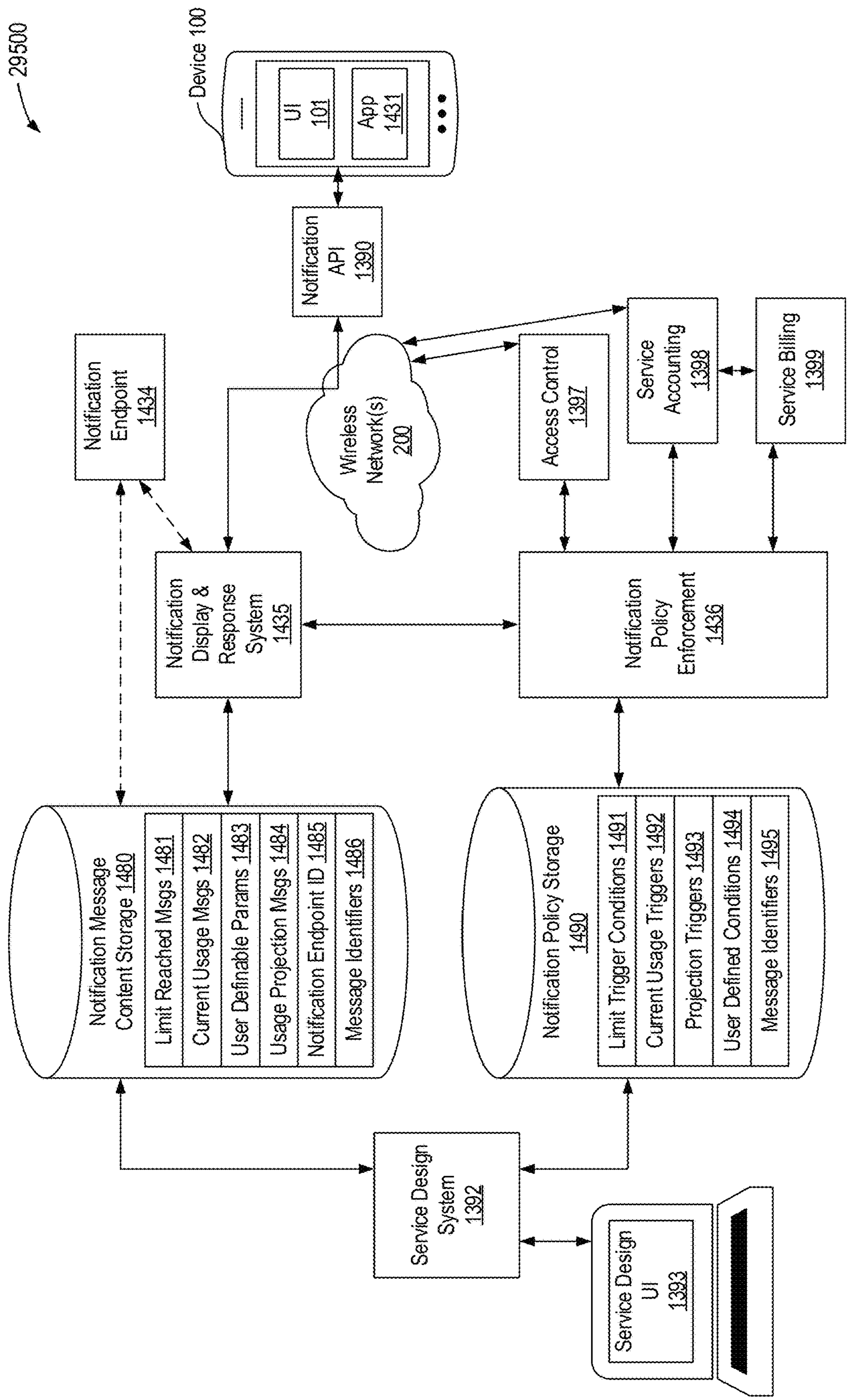

As described herein, one or more APIs can be used for communication between the device 100 and one or more network elements, as well as between different network elements, to provide for a common format/protocol with which to implement aspects of communication service management and control, including service notification management functions. FIG. 337 illustrates a system 29500 that includes a "Notification" API 1390 between the device 100 and the "Notification Display & Response" system 1435 through which notification messages and/or notification indications can be communicated to the user of the device 100 to present notification messages, in some embodiments, and to obtain responses from the user of the device 100 to the presented notification messages, in some embodiments. In some embodiments, the "Notification" API 1390 provides for one or more aspects of service notification management as described herein for the "Service Plan Status" API 1366 of FIGS. 301 to 305 and the "Notification" API 1390 of FIGS. 322 to 331. In some embodiments, the "Notification" API 1390 provides for communication between the mobile device 100 and different service providers' servers, e.g., service management systems that include instantiations of the "Notification Display & Response" system 1435 in different service provider networks.

Figure 338:
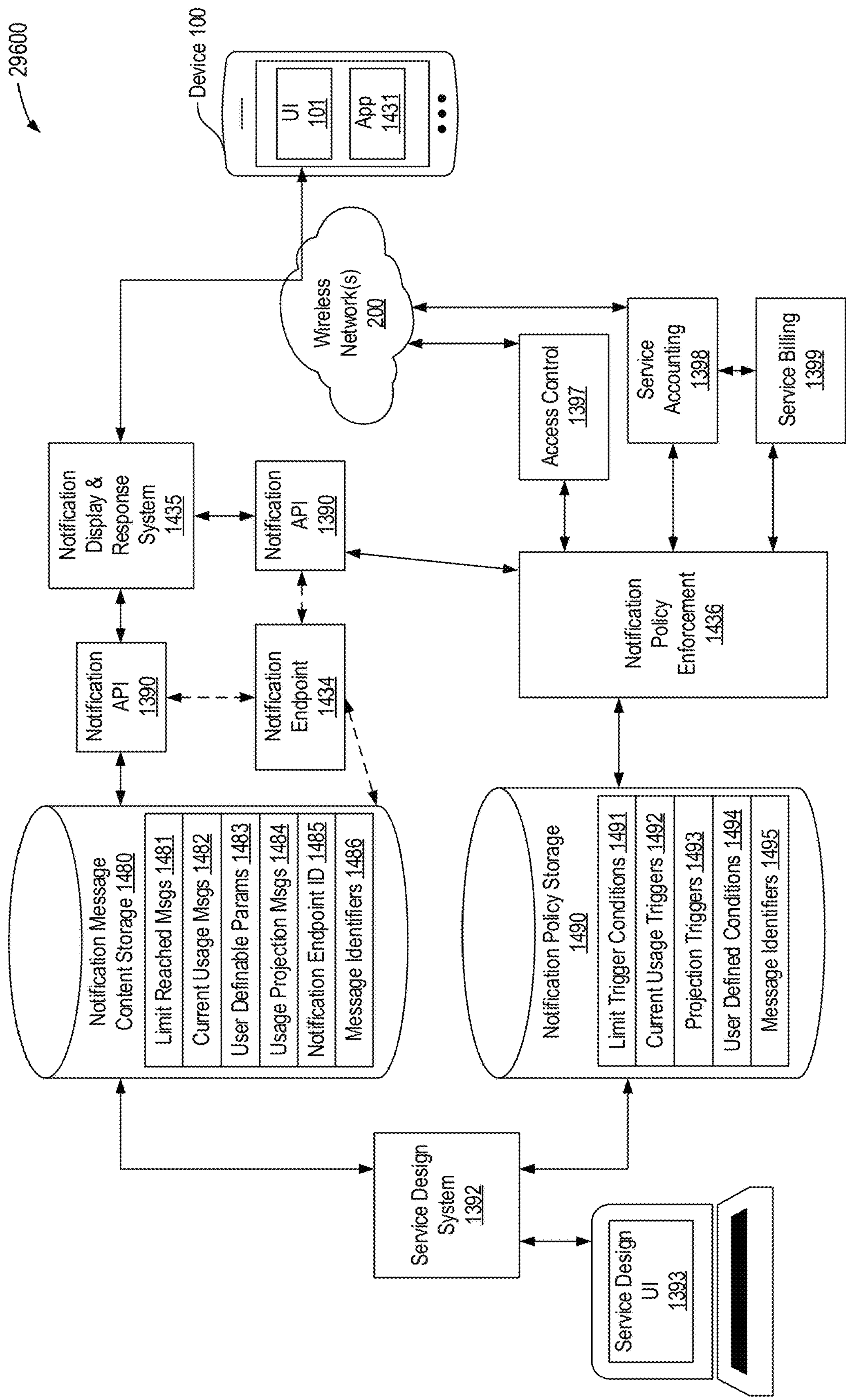

FIG. 338 illustrates a system 29600 that includes a "Notification" API 1390A between the "Notification Display & Response" system 1435 and the "Notification Message Content Storage" database 1480 through which notification message content can be communicated to obtain notification messages to present to the user of the device 100 and, in some embodiments, to return notification responses obtained from the user of the device 100. The system 29600 also includes a connection of the "Notification" API 1390A to one or more notification endpoints 1434, to which the user of the device 100 can communicate to retrieve additional information in response to the notification message, in some embodiments. In some embodiments, the notification endpoints 1434 are service management systems maintained by one or more service providers for communication service management. The system 29600 illustrated in FIG. 338 also includes a "Notification" API 1390B between the "Notification Display & Response" system 1435 and the "Notification Policy Enforcement" system 1436 through which notification triggers and/or notification policies (e.g., for the device 100) can be communicated from the "Notification Policy Enforcement" system 1436, in some embodiments. The "Notification" API 1390B between the "Notification Policy Enforcement" system 1436 and the "Notification Display & Response" system 1435 also provides for communication of responses from the user of the device 100 to the "Notification Policy Enforcement" system 1436, which can impact service plan policy enforcement in response to one or more notification messages, in some embodiments. The "Notification Policy Enforcement" system 1436 also connects to the "Notification Endpoint" 1434 through the "Notification" API 1390B, in some embodiments, providing for changes to service policy enforcement based on information obtained from the "Notification Endpoint" 1434 e.g., service plan policy changes due to user input when the "Notification Endpoint" 1434 is a communication service management system.

In some embodiments, the "Notification Display & Response" system 1435 is maintained by a first service provider, network operator and/or third-party service partner; and the "Notification Message Content Storage" database 1480, the "Notification Policy Storage" database 1490, and the "Notification Policy Enforcement" system 1436 are maintained by a second service provider, network operator, and/or third-party service partner. In some embodiments, the "Notification Display & Response" system 1435 is managed by a third-party service partner that connects to different service management systems (e.g., servers, systems, and/or databases) of service providers and/or network operators through the "Notification" APIs 1390 using a common format/protocol. In some embodiments, the system 29600 of FIG. 338 provides for presenting notifications to and obtaining responses to notifications from users of mobile devices 100 for multiple service providers, network operators and/or third-party service partners simultaneously. In some embodiments, the "Notification Display & Response" system 1435 provides a uniform notification message (communication service management) experience for the user of the mobile device 100 across multiple service providers. In some embodiments, one or more of the "Notification" APIs 1390 provide for one or more aspects of service notification management as described herein for the "Service Plan Status" API 1366 of FIGS. 301 to 305 and the "Notification" API 1390 of FIGS. 322 to 331. In some embodiments, one or more "Notification" APIs 1390 provide for communication between a "Notification Display & Response" system 1435 maintained by a first service provider and additional servers and databases maintained by other service providers.

Figure 339:
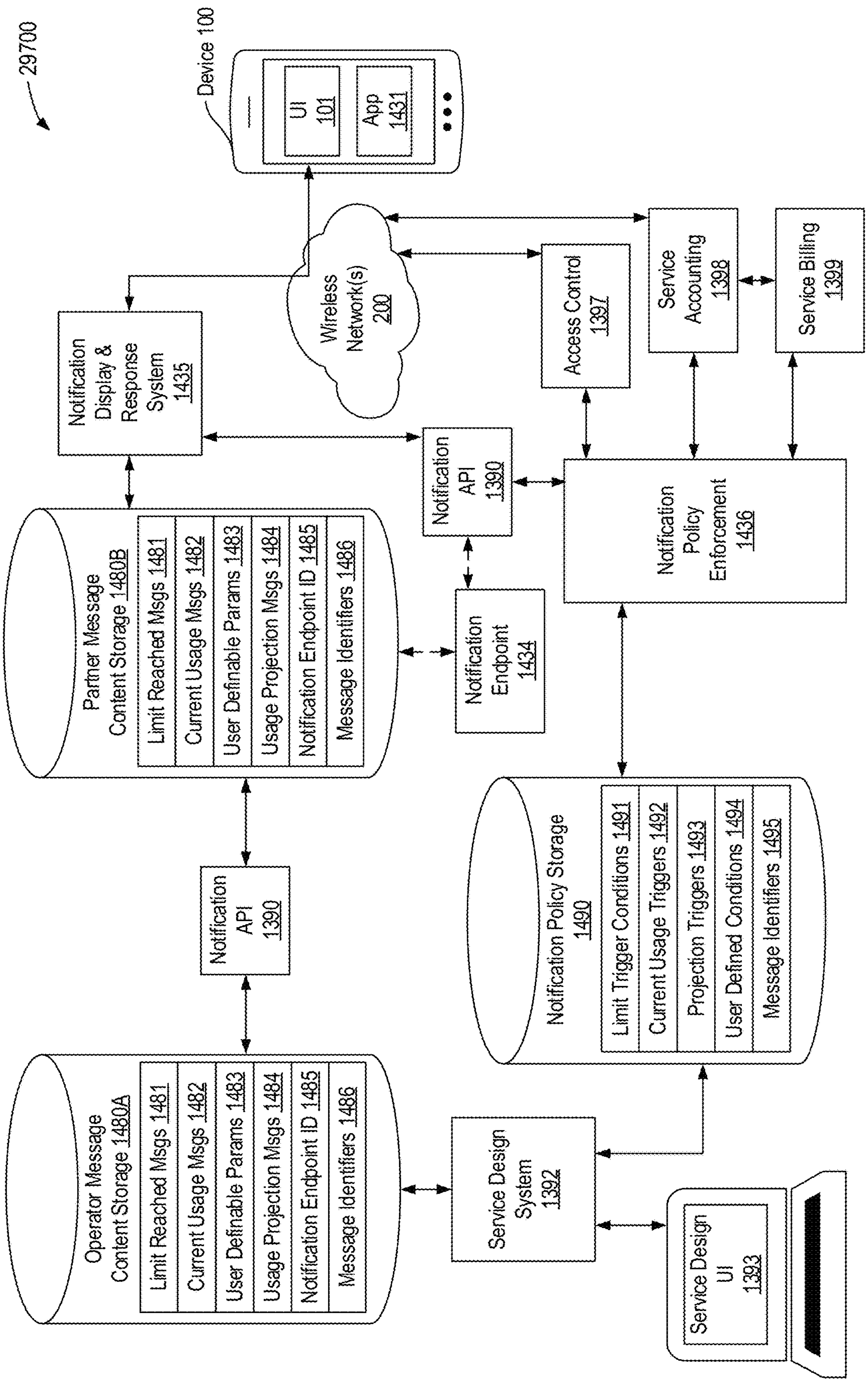

FIG. 339 illustrates a system 29700 that includes both an "Operator Message Content Storage" database 1480A and a "Partner Message Content Storage" database 1480B to store notification message information as described herein for service notification of communication services for mobile devices 100. The system 29700 also includes a "Notification" API 1390B between the "Notification Display & Response" system 1435 and the "Notification Policy Enforcement" system 1436, as also shown for system 29600 in FIG. 338. The system 29700 further includes a "Notification" API 1390C between the "Operator Message Content Storage" database 1480A and the "Partner Message Content Storage" database 1480B. As with the systems illustrated in FIGS. 336 to 338, the system 29700 provides for communicating messages between the device 100 and different network elements, managed by one or more entities, to present notifications to a user of the device 100 and to obtain responses to the notifications from the user of the device 100, in some embodiments. The system 29700 also provides, in some embodiments, for the design and management of notification message content and trigger conditions through a service design system 1392 as described earlier herein. In some embodiments, the system 29700 further provides for distribution of service policies for service policy enforcement by one or more network elements in response to notification triggers and/or user responses.

In some embodiments, the "Notification Display & Response" system 1435 is managed by a third-party service partner and provides a uniform notification message experience to the user of the device 100 for service plans provided by multiple service providers (who interface with the third-party service partner's systems and databases through one or more APIs). In some embodiments, the "Notification Display & Response" system 1435 provides notification messages and/or notification indications to the user of the device 100 based on notification message content retrieved from the "Partner Message Content Storage" database 1480B. As described earlier herein, notification message information communicated to the user of the device 100 can include, in some embodiments, one or more of notification messages triggered based on specific conditions, e.g., reaching limits (limit trigger conditions 1491), current service usage (current usage triggers 1492), projected service usage (projection triggers 1493), and user defined conditions (user defined conditions 1494) and/or notification endpoint 1434 identifiers. In some embodiments, notification message content depends at least in part on notification trigger conditions stored in the "Notification Policy Storage" database 1490 (e.g., limit trigger conditions 1491, current usage triggers 1492, projection triggers 1493, user defined conditions 1494). In some embodiments, the "Partner Message Content Storage" database 1480B connects to "Operator Message Content Storage" databases 1480A maintained by different service providers through the "Notification" API 1390C. In some embodiments, the "Partner Message Content Storage" database 1480B includes notification message content information for multiple service providers. In some embodiments, the "Notification Display & Response" system 1435 interconnects with "Notification Policy Enforcement" systems 1436 in one or more different service providers' networks through the "Notification" API 1390B based on a common format/protocol. In some embodiments, the "Notification Display & Response" system 1435 provides responses to notification messages obtained from the device 100 to one or more service provider policy enforcement systems (e.g., notification policy enforcement 1436) through the "Notification" API 1390B. In some embodiments, service providers use the provided notification responses (or information communicated from a "Notification Endpoint" 1434) provided through the "Notification" API 1390B to enforce service plan policies for one or more network elements responsible for service notification, service access control, service accounting, and/or service billing. In some embodiments, the "Notification Policy Enforcement" system 1436 obtains the service plan policies based on information stored in a "Notification Policy Storage" database 1490. In some embodiments, notification messages are organized based on notification message identifiers 1486. In some embodiments, notification message identifiers 1486 are communicated to the mobile device 100 as part of the notifications and/or notification indications (e.g., to retrieve notification content in the device 100 to display as part of the notification message to the user). In some embodiments, the notification message identifiers 1486 (or indications thereof) are used to match notification trigger conditions to specific notification messages. In some embodiments, the "Notification" APIs 1390 provide for one or more aspects of service notification management as described herein for the "Service Plan Status" API 1366 of FIGS. 301 to 305 and the "Notification" API 1390 of FIGS. 322 to 331.

Service plan policies for service notification, access control, service accounting, and service billing are described herein and additionally in numerous patent applications and issued patents that are incorporated by reference herein, as detailed at the beginning of this specification. The systems illustrated in FIGS. 332 to 339, in some embodiments, can provide for implementations of aspects of the service plan policies for service notification, access control, service accounting and service billing as described herein and in incorporated-by-reference patent applications and issued patents. In some embodiments, service plan policies to implement service notifications, access control, service accounting, and/or service billing are provisioned in response to a selection, purchase, subscription, and/or activation of a service plan by the user of the device 100, e.g., as provided through the "Service Offer & Display Response" system 1394 illustrated in FIGS. 332 to 335. In some embodiments, the "Service Notification" network element 1396 provides for issuing service notifications to the user of the device 100 based on one or more notification conditions. In some embodiments, the notifications can include marketing interceptors, service up-sells, and other service plan information to provide service plan offers to the user of the device 100.

Multiple Service Provider Selection and Activation

In some embodiments, methods, systems, and/or apparatuses are provided to interconnect multiple devices 100 to multiple service providers through a common, uniform interface, e.g., using a set of APIs. In some embodiments, a third-party service partner provides a storefront through which service plans for multiple service providers are made available. In some embodiments, service plans from multiple service providers are presented to a user for a device 100 at the time of activating the device 100. In some embodiments, service plans from multiple service providers are presented to the user for the device 100 following activation of the device 100, e.g., during device use. In some embodiments, a set of service plans can be offered to the device 100 based on one or more of the following criteria: available networks, network types, device configuration, geographic location, or a preferred service provider list (e.g., in the device 100 or stored in a network element). In some embodiments, the third-party service partner presents service plans from multiple service partners in a common format. In some embodiments, service plan offers are obtained through one or more APIs from multiple service providers to present to the device 100. In some embodiments, a subset of available service plans from the multiple service providers is determined to offer to the device 100, e.g., based on criteria as listed above. In some embodiments, a user of the device 100 is presented service offers from multiple service providers and selects from the multiple service plans offered. In some embodiments, the user of the device 100 is presented a set of service providers from which to select to obtain service plan offers. In some embodiments, a set of APIs is used to provide for service provider selection, service plan offers from multiple service providers, and/or service plan selection across multiple service providers. In some embodiments, the set of APIs is used to join a user and/or device to an existing service account, e.g., using an account identifier, a device credential, and/or a user credential. In some embodiments, the set of APIs is used to establish a new service account for a user and/or a device. In some embodiments, a notification message is provided to the user of the device 100 with options to establish a new account or join an existing account. In some embodiments, a selection by the user to establish a new account results in a first activation sequence, while a selection by the user to join an existing account results in a second activation sequence. In some embodiments, service plans are organized into service plan catalogs of different service plan types, e.g., pre-pay, post-paid, device specific, device agnostic, family, enterprise, multi-device service plans, etc. In some embodiments, service plan offers presented to the device 100 depend on the type of device 100, e.g., a mobile phone, a "smart" phone, a tablet computer, a laptop computer, an intermediate networking device, a "feature" phone. In some embodiments, information about the device 100 to which service plans are offered is obtained from the device 100 or from a server that specifies one or more properties of the device 100 and/or preferences of the user, and a set of service plans is offered based on the one or more specified properties and/or preferences.

In some embodiments, a third-party service partner contracts with one or more network operators to provide temporary service connections through their networks, e.g., for the purpose of service activation and providing service offers. In some embodiments, the third-party service partner provides offers and activates service plans (and/or devices) using the temporary service connections. In some embodiments, the third-party service partner manages one or more servers to which devices 100 connect for device activation, service plan offers, and/or service plan activation. In some embodiments, the third-party service partner's servers connect to one or more servers in multiple service providers, e.g., through a set of APIs. In some embodiments, a set of available service providers is presented to the device 100 upon activation, or when the device 100 enters a network operator's geographic location, or based on a query for service plan information from the device 100. In some embodiments, the third-party service partner's server determines a set of service providers to present to the device 100. In some embodiments, the third-party service partner's server detects properties of the device, properties of the network, location information, preference lists for the device, or other information by which a set of service providers and/or service plans is determined to offer to the device 100. In some embodiments, the third-party service partner's server uses a credential (or other unique information about the device or a user of the device 100) to determine what service providers to offer and/or service plans to offer. In some embodiments, the device 100 includes a specific subscriber identity module (SIM) or an equivalent (e.g., CSIM, USIM, R-UIM). In some embodiments, the SIM or SIM-equivalent is based on hardware, firmware, software or combination of these. In some embodiments, the device 100 includes a generic SIM, a "wholesale" SIM or a SIM that supports multiple service providers. In some embodiments, the device 100 includes a service-provider-specific SIM that allows for activation services over the service provider's network, e.g., providing an "ambient" service. In some embodiments, the service-provider-specific SIM includes roaming relationships with additional service providers to offer device activation, service plan activation, service plan offers, and/or service plan selection through the roaming service partner's networks. In some embodiments, a "generic" or "wholesale" SIM includes limited capabilities to communicate through one or more service providers' networks, e.g., to provide an ambient service for service provider offers, service provider selection, service plan offers, service plan selection, and service plan activation. In some embodiments, service usage of the ambient service provided through a service provider's network is zero-rated by the service provider. In some embodiments, service usage of the ambient service through a service provider's network is accounted to an ambient activation service. In some embodiments, a user of the mobile device 100 uses the ambient service to select a service provider, select a service provider, and activate a service plan to which the device subsequently connects for service. In some embodiments, the device 100 includes a multiple-service-provider SIM that functions to connect through multiple service providers' networks. In some embodiments, a user of the device 100 selects a service provider with which to complete a device activation or service activation process. In some embodiments, the user of the device 100 selects a service provider and uses that service provider's network to receive service plan offers, select a service plan, purchase a service plan, and/or activate a service plan for that service provider's network. In some embodiments, user of the device 100 selects a service provider and uses that service provider's network to receive service plan offers, select a service plan, purchase a service plan, and/or activate a service plan for a different service provider's network. In some embodiments, a "generic" or "wholesale" SIM that provides for service provider selection, service plan selection, service plan offers, and/or service plan activation through one or more networks using a limited ambient service is subsequently reprogrammed to function on one or more specific service providers' networks. In some embodiments, the "generic" or "wholesale" SIM is converted to a service-provider-specific SIM.

In some embodiments, a SIM (or an equivalent hardware or software version) provides for authentication of a device 100 with a service provider network. In some embodiments, the SIM includes a credential that provides for unique identification of the device 100 and/or a user of the device 100. In some embodiments, the SIM includes an international mobile subscriber identity (IMSI) that comprises a mobile country code (MCC), a mobile network code (MNC) and a mobile subscription identification number (MSIN). In some embodiments, a mobile device 100 includes a SIM pre-programmed with a unique IMSI. In some embodiments, the MCC and MNC identify a specific service provider, and the MSIN identifies the device 100 or user of the device 100 associated with the specific service provider identified by the MCC and MNC. In some embodiments, the IMSI is used in conjunction with an authentication key (also referred to as $K_i$) to authenticate the SIM on a service provider network. In some embodiments, a SIM (or SIM equivalent) is defined according to a 3GPP (Third Generation Partnership Project), 3GPP2 (Third Generation Partnership Project 2) or ETSI (European Telecommunications Standards Institute) specification. In some embodiments, the IMSI in the SIM can be reprogrammed over the air (e.g., through a wireless radio connection). In some embodiments, the device 100 can include a "generic" or "wholesale" SIM associated with an initial service provider. In some embodiments, the device 100 that includes the "generic" or "wholesale" SIM can communicate through one or more service provider networks in order to complete a service plan offer, selection, purchase, and/or activation process. In some embodiments, the device 100 having the "generic" or "wholesale" SIM (and/or the user thereof) can select a service provider and/or service plan using an "ambient" service and following reprogramming the SIM can be converted to a service-provider-specific SIM, e.g., for a service provider selected by the user of the device 100. In some embodiments, the device 100 includes a first "temporary" credential and is later provided with a second "permanent" credential, e.g., as a result of reprogramming a SIM. In some embodiments, specific stored information of the SIM is changed, e.g., one or more of an IMSI, an authentication key, an authentication algorithm, and/or a preferred roaming list (PRL) in the SIM (or its equivalent) is updated from a first temporary credential to a second credential. In some embodiments, the first temporary credential can be used with a set of one or more service provider networks for a limited purpose. In some embodiments, the second credential can be used with a specific service provider wireless network (and with associated roaming networks with whom the specific service provider has roaming agreements).

In some embodiments, a mobile device 100 authenticates with a first service provider using a first IMSI, a first authentication key, a first authentication algorithm, and a first PRL. In some embodiments, the first service provider provides a connection to the mobile device 100 for service provider selection, service plan selection, and/or service plan activation. In some embodiments, the first service provider presents an offer to the mobile device 100 to select among different service providers. In some embodiments, the user of the mobile device 100 selects a second service provider, and the first service provider accepts the selection of the second service provider from the mobile device 100. In some embodiments, the first service provider and the selected second service provider are separate service providers, e.g., different network operators, a network operator and an MVNO, or different MVNOs. In some embodiments, the first service provider obtains a second IMSI and optionally a second PRL from the selected second service provider, e.g., through one or more APIs between network elements, servers, and/or service management systems of the first service provider and the selected second service provider. In some embodiments, the first service provider pre-stores a set of IMSIs for each of one of more service providers, including the selected second service provider. In some embodiments, the first service provider obtains the second ISMI from the pre-stored set of IMSIs. In some embodiments, the first service provider pre-stores a set of PRLs for each of one of more service providers, including the selected second service provider. In some embodiments, the first service provider obtains the second PRL from the pre-stored set of PRLs. In some embodiments, the first service provider communicates the second IMSI, the first authentication key, and optionally an indication of a first authentication algorithm to the selected second service provider. In some embodiments, the first service provider presents service plan offers to the mobile device 100 for the selected second service provider. In some embodiments, the mobile device 100 communicates service plan selection information to the first service provider. In some embodiments, the first service provider relays the selected service plan information to the selected second service provider, e.g., through one or more APIs between network elements, servers, and/or service management systems of each of the service providers. In some embodiments, the first service provider causes a reprogramming of the mobile device 100, e.g., of a SIM or a SIM equivalent in the mobile device 100, to replace the first IMSI with the second IMSI obtained from the selected second service provider (or from a pre-stored set of IMSIs valid for the selected second service provider) and optionally replace the first PRL with the second PRL. In some embodiments, the first service provider causes a reset of the mobile device 100, and/or terminates the connection to the mobile device 100, so that the mobile device 100 subsequently seeks to authenticate using the updated information, i.e., with the second IMSI, to the selected second service provider's network.

In some embodiments, a second service provider receives a request for a second IMSI and optionally a second PRL from a first service provider for a mobile device 100. In some embodiments, the second service provider communicates the second IMSI and optionally the second PRL to the first service provider, e.g., through a set of APIs between network elements, servers, and/or service management systems maintained by the respective service providers. In some embodiments, the second service provider receives one or more of: the second IMSI, a first authentication key, and a first authentication algorithm from the first service provider for the mobile device 100. In some embodiments, the second service provider provisions and initial service for the mobile device 100. In some embodiments, the second service provider authenticates the mobile device 100 based at least in part on one or more of the second IMSI, the first authentication key, and the first authentication algorithm received from the first service provider. In some embodiments, the second service provider presents a service activation offer and/or an offer of a set of service plans to the mobile device 100. In some embodiments, the second service provider obtains a service plan selection and/or service plan purchase information from the first service provider for the mobile device 100. In some embodiments, the second service provider accounts for a service plan purchase for the mobile device 100 communicated by the first service provider. In some embodiments, the second service provider shares a portion of revenue for the mobile device 100 with the first service provider.

In some embodiments, a portion of a SIM (or a SIM equivalent) of the mobile device 100 is provided by a first service provider to a second service provider. In some embodiments, the second service provider updates a database of information for mobile devices 100 and/or subscribers/users of mobile devices 100 to account for the portion of the SIM received from the first service provider. In some embodiments, the portion of the SIM provided includes one or more of an authentication key and an authentication algorithm. In some embodiments a portion of a credential of a SIM of the mobile device 100 is updated, e.g., reprogrammed, by a first service provider using information received from a second service provider. In some embodiments, the first service provider updates the portion of the credential of the SIM based on information obtained from a pre-stored database containing credential information for one or more service providers including the second service provider. In some embodiments, the information portion of the credential of the SIM updated is an IMSI. In some embodiments the pre-stored database contains IMSIs for one or more service providers including the second service provider. In some embodiments, the first service provider updates a portion of the SIM based on information obtained from a pre-stored database containing preferred roaming lists for one or more service providers including the second service provider.

In some embodiments, a first credential management entity controls a temporary credential configuration (e.g., a temporary device credential, a temporary user credential, or a combination thereof) that provides for authentication and access to one or more communication services by a mobile device 100 over a first wireless access network configuration. In some embodiments, the temporary credential configuration is subsequently exchanged for a permanent credential configuration when a user of the mobile device 100 selects a mobile operator (or service provider) that the user desires to provide wireless access service for the mobile device 100, (e.g., from a service selection offer, presented on a user interface (UI) of the device 100, in some embodiments, supplied by a service offer application, through access to a service offer website, or by another means of presenting a service offer application as described in detail herein). In some embodiments, the mobile device 100 subsequently authenticates and gains access to one or more communication services over a second wireless access network configuration, e.g., using the permanent credential configuration obtained in response to the mobile operator selection by the user of the mobile device 100. In some embodiments, the temporary credential configuration is comprised of a first SIM credential configuration for a SIM (or SIM equivalent) on the mobile device 100, and the permanent credential configuration is a second SIM credential configuration for the SIM (or SIM equivalent) on the mobile device 100. In some embodiments, the first SIM credential configuration comprises a first IMSI, a first private key to assist in network access authentication and/or encryption of communications, and a first algorithm definition to assist in network access authentication and/or encryption of communication, and the second SIM credential configuration comprises a second IMSI, the first private key, and the first algorithm definition. In some embodiments, exchanging (and/or otherwise updating or modifying) the mobile device's SIM credential configuration can prove advantageous, as the mobile device's SIM IMSI can be re-assigned from the first IMSI assigned to the first credential management entity to the second IMSI assigned to the mobile operator (or service provider) selected by the user without requiring an exchange of SIM private key information with the mobile device 100 and without requiring re-programming or re-configuring the mobile device SIM private key information.

In conventional SIM credential creation systems, which associate together an IMSI, a private key and a private key algorithm, a mobile operator acquires from a central authority one or more pairs of mobile country codes (MCC) and mobile network codes (MNC), each MCC/MNC pair uniquely identifying the mobile operator and which the mobile operator then uses along with a device serial number (and/or other unique device or user identifying information) to create an IMSI. The mobile operator associates the IMSI with a private key and a private key algorithm definition created (or selected) by the mobile operator, and the IMSI is programed into a SIM and also stored in a mobile operator SIM database (e.g., a home location register (HLR)) so that the mobile operator network can securely authenticate and recognize the SIM when it is used in a mobile device 100 that attempts to connect with the mobile operator network. In some embodiments, rather than associating an IMSI created by the mobile operator with a mobile operator created private key and algorithm definition, a second (new) IMSI is created by the mobile operator and is not associated with a mobile operator created private key and algorithm definition. In some embodiments, the second IMSI is provided to a first credential management entity, and the second IMSI is associated with a first private key and first private key algorithm definition created (or selected) by the first credential management entity and stored in the mobile operator SIM information data base (e.g., the HLR).

In some embodiments, the first credential management entity is recognized as a mobile operator (or service provider) and acquires one or more MCC/MNC pairs, which are used along with a device serial number (and possibly other information) to create a first IMSI. In some embodiments, the first credential management entity also creates a first private key and a first private key algorithm definition that are associated with the first IMSI in the first credential management entity SIM credential data base (e.g., an HLR), and the first IMSI, first private key, and first private key algorithm definition are programmed into a SIM to create a first SIM credential configuration.

In some embodiments, the first wireless access network configuration comprises the first credential management entity operating a first wireless network that is used to provide an initial ambient or sponsored access service to enable selection of a mobile operator or activation of a service plan with a mobile operator. In some embodiments, the first wireless access network configuration further comprises an access classification and control system (e.g., a network based access classification and control system, a device-assisted [e.g., service-processor-assisted] network access classification and control system, or a combination of network-based access classification and/or control and device-based network access classification and/or control) that identifies the access service activity associated with enabling selection of a mobile operator or activation of a service plan with a mobile operator while restricting or not allowing other access service activity.

In some embodiments, the first wireless access network configuration comprises the first credential management entity acting as an MVNO with an MVNO operating agreement with a network operator of a first wireless network that is used to provide initial ambient or sponsored access services to enable selection of a mobile operator (or service provider) or activation of a service plan with a mobile operator (or service provider). In some embodiments the first wireless access network configuration further comprises an access classification and control system (e.g., network based access classification and control system, a device-assisted [e.g., service-processor-assisted] network access classification and control system, or a combination of network-based access classification and/or control and device-based network access classification and/or control) that identifies the access service activity associated with enabling selection of a mobile operator or activation of a service plan with a mobile operator while restricting or not allowing other access service activity. In some embodiments, the access classification and control system is located in an MVNO network “cloud” operated by the first credential management entity (e.g., the first credential management entity acts as an MVNO with its own HLR, access classification and control system, etc.) In some embodiments, the access classification and control system is located in the first wireless network, and the first wireless network operator configures equipment to provide the access classification and control system used by the first credential management entity as described herein.

In some embodiments, the second wireless access network configuration comprises a wireless access network operated by and on behalf of a mobile operator, and the mobile operator stores the association of the second IMSI, the first private key and the first algorithm definition in a SIM credential storage database (e.g., HLR). In some embodiments, the SIM credential storage database is used for authenticating the mobile device 100 and for providing service access to the mobile device 100 when the first IMSI is exchanged with the second IMSI on the mobile device 100.

In some embodiments, in addition to a first IMSI, a first PRL defines a preferred connection list or a preferred roaming list, which identifies the priority of wireless access networks or wireless network operators the first credential management entity desires to utilize to provide an initial ambient or sponsored access service to enable selection of a mobile operator or activation of a service plan with a mobile operator as described herein. In some embodiments, when the first IMSI is exchanged on a mobile device SIM with the second IMSI, the first PRL is also exchanged with a second PRL obtained by the mobile operator that the user has selected for providing wireless access service to the mobile device 100.

In some embodiments, a first credential management system operated by a first credential management entity interacts with a second credential management system operated by a mobile network operator to change a temporary (or first) credential associated with a mobile device 100 or a user of a mobile device 100 into a permanent (or second) credential associated with the mobile device 100 or the user of the mobile device 100. In some embodiments, the first credential management system also interacts with a device agent 1001 of the mobile device 100 to assist in changing, on the mobile device 100, the temporary (or first) credential associated with the mobile device 100 or a user of the mobile device 100 into a permanent (or second) credential associated with the mobile device 100 or the user of the mobile device 100. In some embodiments, communication between the first credential management system and the device agent 1001 of the mobile device 100 comprises a secure communication link between a service controller 122 (or other equivalent network server) and a service processor 115 (or equivalent mobile device agent 1001). In some embodiments, the temporary (or first) credential provides access for the mobile device 100 over a first wireless network configuration that enables initial ambient or sponsored access services to enable user selection of a mobile operator or activation of a service plan with a mobile operator. In some embodiments, the first credential management system assists in causing presentation of a UI message on the mobile device 100, the UI message offering selection of a mobile operator and/or activation of a service plan with a mobile operator. In some embodiments the UI message is displayed on the mobile device UI 101. In some embodiments, the first credential management system accepts a user selection of the mobile operator or activation of a service plan with the mobile operator. In some embodiments, the first credential management system obtains permanent (or second) credential information from the second credential management system and based on the permanent (or second) credential information provides a permanent (or second) credential to the mobile device 100 which then replaces at least an aspect of the temporary (or first) credential with at least an aspect of the permanent (or second) credential. In some embodiments, the first credential management system also obtains a permanent (second) PRL from the second credential management system and also causes the device to replace a temporary (first) PRL with the permanent (second) PRL. In some embodiments, the first credential management system further provides at least an aspect of the temporary (first) credential to the second credential management system. In some embodiments, the second credential management system stores the at least an aspect of the temporary (first) credential and uses this information to recognize, authenticate and provide access to the mobile device 100. In some embodiments, after the first credential management system provides a permanent (or second) credential to the mobile device 100 and provides a permanent (second) PRL to the mobile device 100, the first credential management system causes the mobile device 100 to disconnect from the first wireless network configuration associated with the first credential management system and connect to a second wireless network configuration operated by the mobile operator. In some embodiments a device agent 1001 on the mobile device 100 is pre-configured to disconnect from the first wireless network configuration associated with the first credential management system and connect to a second wireless network configuration operated by the mobile operator after the mobile device 100 replaces at least an aspect of the temporary (or first) credential with at least an aspect of the permanent (or second) credential, and, in some embodiments, also replaces the temporary (first) PRL with the permanent (second) PRL.

In some embodiments, a first SIM credential management system operated by a first credential management entity interacts with a second SIM credential management system operated by a mobile network operator to change a temporary (or first) SIM credential associated with a mobile device 100 or a user of a mobile device 100 into a permanent (or second) SIM credential associated with the mobile device 100 or the user of the mobile device 100. In some embodiments, the first SIM credential management system also interacts with a device agent 1001 on the mobile device 100 to assist in changing, on the mobile device, the temporary (or first) SIM credential associated with the mobile device 100 or the user of the mobile device 100 into the permanent (or second) SIM credential associated with the mobile device 100 or the user of the mobile device 100. In some embodiments, interaction of the first SIM credential management system with the device agent 1001 of the mobile device 100 comprises a secure communication link between a service controller 122 or similar network server and a service processor 115 or similar mobile device agent 1001. In some embodiments, the temporary (first) SIM credential is a temporary (first) IMSI. In some embodiments, the permanent (second) SIM credential is a permanent (second) IMSI. In some embodiments, the temporary (or first) SIM credential (e.g., temporary [first] IMSI) provides access for the mobile device 100 over a first wireless network configuration using an initial ambient or sponsored access service to provide for user selection of a mobile operator and/or for activation of a service plan with a mobile operator. In some embodiments, the first credential management system causes a UI message offering selection of the mobile operator and/or activation of a service plan with the mobile operator to be displayed on the UI of the mobile device 100, and the first SIM credential management system accepts a user selection identifying that the user has selected the mobile operator and/or selected activation of a service plan with the mobile operator. In some embodiments, the first SIM credential management system obtains permanent (or second) SIM credential information (e.g., information about a permanent [second] IMSI) from the second SIM credential management system, and based on the permanent (or second) SIM credential information, the first SIM credential management system provides a permanent (or second) SIM credential (e.g., a permanent [second] IMSI) to the mobile device 100. In some embodiments, the mobile device 100 replaces at least an aspect of the temporary (or first) SIM credential (e.g., temporary [first] IMSI) with at least an aspect of the permanent (or second) SIM credential (e.g., a permanent [second] IMSI). In some embodiments, the first SIM credential management system also obtains a permanent (second) PRL from the second SIM credential management system, and the first SIM credential management system also causes the device to replace a temporary (first) PRL with the permanent (second) PRL. In some embodiments, the first SIM credential management system further provides at least an aspect of the temporary (first) SIM credential (e.g., temporary [first] private key and/or algorithm definition) to the second SIM credential management system. In some embodiments, the second SIM credential management system stores the at least an aspect of the temporary (first) SIM credential (e.g., temporary [first] private key and/or algorithm definition) and uses this information (along with the permanent (second) IMSI) to recognize, authenticate and provide access to the mobile device 100. In some embodiments, after the first SIM credential management system provides a permanent (or second) SIM credential (e.g., a permanent [second] IMSI) to the mobile device 100 and also provides a permanent (second) PRL to the mobile device, the first SIM credential management system causes the mobile device to disconnect from the first wireless network configuration associated with the first credential management system and connect to a second wireless network configuration operated by the mobile operator using the permanent (second) SIM credential. In some embodiments, a device agent 1001 on the mobile device 100 is pre-configured to disconnect from the first wireless network configuration associated with the first credential management system and connect to a second wireless network configuration operated by the mobile operator after the mobile device replaces at least an aspect of the temporary (or first) SIM credential with at least an aspect of the permanent (or second) SIM credential and also replaces the temporary (first) PRL with the permanent (second) PRL.

In some embodiments, the first credential management system is configured with a service sign up system that assists in providing a service offer and purchase experience through the UI 101 of the mobile device 100, (in some embodiments, with the assistance of a device agent 1001,) prior to causing the mobile device 100 to modify the temporary (first) credential and connect to the mobile operator network. In some embodiments, the service offer and purchase experience on the UI 101 of the mobile device 100 is associated with an ambient or sponsored access service to enable user selection of a mobile operator or activation of a service plan with a mobile operator.

In some embodiments, the second credential management system operated by the mobile operator assists in providing a service offer and purchase experience on the UI 101 of the mobile device 100 (in some embodiments, with the assistance of a device agent 1001) after the first credential management system causes the mobile device 100 to modify the temporary credential and connect to the mobile operator network. In some embodiments, the service offer and purchase experience on the UI 101 of the mobile device 100 is associated with an ambient or sponsored access service to enable user selection of a mobile operator or activation of a service plan with a mobile operator.

In some embodiments, the first credential management system is configured with an credential exchange API configured with pre-defined communication protocols for communicating the temporary (first) credential information and the permanent (second) credential information between the first credential management system and the second credential management system as described herein. In some embodiments the credential exchange API provides a common interface point allowing the first credential management system to exchange credentials and change mobile device credentials in a manner that provides for a mobile device 100 to connect to and/or activate on more than one mobile operator network. In some embodiments, multiple network operators can use the credential exchange API (e.g., defined in a public or private protocol specification) to allow the first credential management system to exchange credential information on a given mobile device 100 so that the mobile device 100 has the capability to connect to or activate with any of a multitude of network operator (or service provider) networks.

In some embodiments, the first credential management system is further configured with a service plan purchase, activation or sign up offer API configured with pre-defined communication protocols for communicating one or more service plan purchase, activation or sign up offers from one or more mobile network operators (or service providers). In some embodiments, the service plan purchase, activation or sign up offer API provides a common interface point allowing the first credential management system to provide service plan purchase, activation or sign up offers (possibly with the assistance of a device agent 1001 or a website or portal) to a user of a mobile device 100 through the UI 101 of the mobile device 100, so that the user of the mobile device 100 can acquire services from one or more mobile network operators or through one or more mobile operator networks. In some embodiments, multiple network operators can learn about and use one or more API protocol specifications to provide service plan offer information to a user of a mobile device 100, and as a result, the user of the mobile device 100 can connect to or activate with one or more mobile network operators or through one or more mobile operator networks. In some embodiments, the service plan purchase, activation or sign up offer API provides for an exchange of network endpoint identification information (e.g., a URL, or a network address) to enable a device agent 1001 of the mobile device 100 to present one or more screens on the UI 101 of the mobile device, information to present the one or more screens on the UI 101 of the mobile device from a specific mobile operator plan purchase, activation or sign up offer website or portal (e.g., a website, WAP site, or application portal operated by a specific mobile operator) when the user of the mobile device 100 chooses the specific mobile operator for service activation or connection. In some embodiments, the service plan purchase, activation or sign up offer API provides for exchange of service offer information that is provided to the UI 101 of the mobile device 100 by one or more network servers and/or one or more device agents 1001 associated with the first credential management system. In this way, an entity that operates the first credential management system can provide a service sign up experience that is under the entity's control and is consistent across multiple mobile operators, thereby providing a uniform service activation experience to the user of the mobile device 100. In some embodiments, service offer information that can be exchanged through the service plan purchase, activation or sign up offer API includes one or more offer descriptors, one or more offer prices, one or more offer graphics, one or more offer placement instructions for assisting in how to place offer objects on the UI 101 of the mobile device 100, one or more network end point identifiers for network end points that provide the offer, and one or more service offer identifiers that provide the first credential management system (or another associated network system) to identify one or more service selection options the user of the mobile device 100 chooses.

In some embodiments, the first credential management system is further configured with a service selection API configured with pre-defined communication protocols for communicating a user selection for one or more service plan purchases, activations or sign ups for one or more mobile operator networks. In some embodiments, the service selection API provides a common interface point allowing the first credential management system to provide service selections chosen by a user of the mobile device 100 (in some embodiments, with the assistance of a device agent 1001 or a website or an application portal) to one or more mobile operators in a manner that provides a capability for a user of the mobile device 100 to acquire services from more than one mobile operator and/or through more than one mobile operator network. Examples of service selection information that can be exchanged through the service selection API include service offer identifiers that allow the system to identify the service selection option the user chooses, user payment information, user address, user identity, user credential and user service preferences.

In some embodiments, the first credential management system is further configured to provide the functionality described herein over multiple first wireless network configurations. In some embodiments, the multiple first wireless network configurations comprise multiple MVNO service configurations with each of multiple mobile operators so that the first credential management system is enabled to provide initial ambient or sponsored access services over a multitude of mobile networks to enable selection of a mobile operator or activation of a service plan with a mobile operator. In some embodiments, the multitude of mobile networks comprise at least one mobile network in each of multiple geographic areas so that the first credential management system may provide for activation in the multiple geographic areas. In some embodiments, the multitude of mobile networks comprise multiple mobile networks in a common geographic area so that the first credential management system may provide user service offers for multiple mobile network choices in the same geographic area. In some embodiments, multiple mobile operators in multiple geographic areas or a single geographic area utilize one or more of the credential exchange API, the service plan purchase, activation or sign up offer API, or the service selection API as described herein to allow a single first credential management entity to activate a given mobile device 100 on a multitude of mobile network choices.

In some embodiments, a device supplier provides a mobile device 100 preconfigured with a first credential, (e.g., a "generic" SIM as described herein), and a combination of hardware, software, and/or firmware configured to activate the mobile device 100 through one or more wired or wireless networks. In some embodiments, the mobile device 100 is configured for activation in any number of geographic regions, including in some embodiments worldwide. In some embodiments, the mobile device 100 communicates with a network system, e.g., a first credential management system, to determine a service provider (and/or network operator) with which to be configured to operate. In some embodiments, the mobile device 100 communicates with the network system to select a service provider (and/or network operator) using one or more APIs described herein. In some embodiments, the first credential is updated, replaced or otherwise modified, based at least on a service provider (and/or network operator) selected during a service provider selection process, to a second credential that provides at least for access to one or more wireless networks of the selected service provider (and/or network operator). In some embodiments, the mobile device 100 is configured to select one or more services using a service selection process, e.g., through a service selection API, service plan purchase, activation or sign up offer API, or other API for service selection. In some embodiments, the mobile device 100 provides for selecting one or more services in conjunction with selection of the service provider. In some embodiments, the mobile device 100 provides for selection of one or more services and a service provider together before an exchange of the first credential for the second credential. In some embodiments, the mobile device 100 provides for selection of the service provider, an exchange of the first credential for the second credential, followed by a selection of one or more services for the selected service provider. In some embodiments, the mobile device 100 communicates with one or more network elements during the service provider selection, service selection, and/or credential exchange process. In some embodiments, the one or more network elements include one or more servers and/or databases that provide for selection of a service provider, association with a service account, and/or selection of a service plan for the mobile device 100. In some embodiments, the one or more servers and/or databases are provided by a service provider, a network operator, and/or a third-party service partner as described herein.

In some embodiments, the first credential management system is further configured with a multi-device service plan sign up capability wherein a first mobile device 100 and a second mobile device 100 are associated with the same mobile service account. In some embodiments, the first credential management system is configured to perform a temporary (first) credential exchange with a permanent (second) credential on the second mobile device 100 as described herein, and to further provide information to the second credential management system that causes the second mobile device 100 to be activated or signed up to a service plan associated with the first mobile device 100. In some embodiments, the first credential management system is configured with a multi-device account service sign up system that assists in providing a multi-device service sign up offer and purchase experience on the UI 101 of the first mobile device 100 and/or the UI 101 of the second mobile device 100 (in some embodiments, with the assistance of a device agent 1001 on the first mobile device 100 and/or a device agent 1001 on the second mobile device 100) prior to causing the second mobile device 100 to modify the temporary credential and connect to the mobile operator network. In some embodiments, one or more of the credential exchange API, the service plan purchase, activation or sign up offer API, or the service selection API as described herein may be modified to provide a common interface point for multiple mobile operators for activation of multiple mobile devices on a single account. In some embodiments, one or more of the credential exchange API, the service plan purchase, activation or sign up offer API, or the service selection API can be included as part of, equal to, or a superset of additional APIs described herein above.

FIGS. 349A, 349B, and 349C illustrate representative configurations 4100 and 4101 of a mobile wireless communication device 100 in accordance with some embodiments. In some embodiments, the mobile wireless communication device 100 is supplied by an equipment manufacturer, device supplier, device distributor, and/or third-party seller to a user with a "generic" configuration 4100 that includes a first "temporary" credential, e.g., a SIM 4201 (or equivalent) initially configured for a "temporary" service, e.g., in order to provide for service provider selection and activation. In some embodiments, the SIM 4201 of the mobile wireless communication device 100 includes a first credential (e.g., a first IMSI 4202, a first key 4203, and a first algorithm 4204) and optionally a first service provider preferred roaming list 4205. In some embodiments, the first credential provides for a limited service connection through one or more wireless networks of the first service provider, e.g., to provide for service provider selection and/or activation. In some embodiments, the first credential provides authorization for the mobile wireless communication device 100 to interact with one or more activation servers in order to select a service provider and/or a service for the mobile wireless communication device 100. In some embodiments, the first service provider maintains a first database 4102 of credentials that provide, at least in part, for authorization of mobile wireless communication devices 100 to access through one or more wireless networks. In some embodiments, the first database of credentials includes one or more credentials that are supplied to mobile wireless communication devices 100 for service provider and/or service selection/activation. In some embodiments, a network system of the first service provider obtains a request for service provider selection/activation. In some embodiments, the network system authorizes the request based on the first credential being obtained from the mobile wireless communication device 100. In some embodiments, the first service provider acts as a broker to offer a selection of service providers to the mobile wireless communication device 100, e.g., in response to a request for service provider selection from the mobile wireless communication device 100. In some embodiments, the mobile wireless communication device 100 automatically connects to a network system for service provider selection, e.g., in order to complete an initialization/activation process for the mobile wireless communication device 100.

In some embodiments, the user of the mobile wireless communication device 100 is presented a set of service providers from which to select. In some embodiments, the mobile wireless communication device 100 defaults to a particular service provider, e.g., based on the first credential and/or based on a pre-configuration of the mobile wireless communication device 100. In some embodiments, the user of the mobile wireless communication device 100 is presented an option to change from a default service provider to a different service provider. In some embodiments, the network system of the first service provider communicates with a second network system of a second service provider to obtain a second credential for the mobile wireless communication device 100. In some embodiments, the first network system of the first service provider communicates with the second network system of the second service provider through a secure connection. In some embodiments, the first network system of the first provider communicates with the second network system of the second service provider through one or more APIs, e.g., "network" APIs for communication between network elements as described herein. In some embodiments, the second credential includes an ISMI distinct from the first IMSI 4202 of the first credential, e.g., a "101st IMSI" 4210 as indicated in configuration 4101 of FIG. 349A. In some embodiments, the second network system of the second service provider provides the second credential to the first network system of the first service provider, which in turn provides the second credential to the mobile wireless communication device 100. In some embodiments, the second network system of the second service provider communicates the second credential to the mobile wireless communication device 100 through a separate direct connection. In some embodiments, the mobile wireless communication device 100 reconfigures the SIM 4201 (or equivalent) to replace the 1st IMSI 4202 used for communication with the first service provider with the 101st IMSI 4210 to use for communication with the second service provider. In some embodiments, the first service provider maintains a database of preferred roaming lists (PRLs) 4103 (FIG. 349B) for one or more service providers. In some embodiments, the first service provider communicates a PRL for a selected second service provider (2nd Service Provider PRL 4211 of FIG. 349B) to the mobile wireless communication device 100. In some embodiments, the first service provider obtains updates for the PRL database 4103 from one or more other service providers. In some embodiments, the first service provider communicates a PRL for the second service provider 4211 communicated by the second service provider in conjunction with the second credential, e.g., with the "101st IMSI" 4210. In some embodiments, the mobile wireless communication device adds or replaces a PRL (e.g., 1st SP PRL 4205) in the SIM 4201 with the PRL for the second service provider (e.g., 2nd SP PRL 4211). In some embodiments, the mobile wireless communication device 100 is configured to communicate with the second service provider when the credential is updated with the ISMI (e.g., 101st IMSI 4210) provided by the second service provider.

In some embodiments, the second service provider maintains a database of credentials 4105 (FIG. 349C), e.g., a combination of IMSI/Key/Algorithm information, that provides for authorization of mobile wireless communication devices 100 to access one or more wireless networks of the second service provider. In some embodiments, the second service provider maintains a database of unassigned credentials (or constituent elements of credentials), e.g., a database of unassigned ISMI values 4104. In some embodiments, the second service provider selects an unassigned IMSI (e.g., 101st IMSI 4210) from the unassigned IMSI database 4104 and communicates the selected unassigned IMSI to the first service provider to reconfigure the mobile wireless communication device 100 for use with one or more wireless networks of the second service provider. In some embodiments, the first service provider communicates a first key 4203 and first algorithm 4204 used by the mobile wireless communication device 100 to the second service provider. In some embodiments, the second service provider updates the database of credentials 4105 to include a credential having an ISMI selected from the unassigned ISMI database 4104 (e.g., 101st IMSI 4210) and the first key 4203 and first algorithm 4204 received from the first service provider for the mobile wireless communication device 100. In some embodiments, a new credential based on the selected ISMI, e.g., the 101st IMSI 4210 in combination with the first key 4203 and first algorithm 4204, provide for authorization of the mobile wireless communication device 100 to access one or more wireless networks of the second service provider. In some embodiments, the second service provider deletes from the unassigned ISMI database 4104 the selected IMSI (in this example, 101st IMSI 4210) after successfully adding the new credential to the database of credentials, e.g., the second service provider SIM database 4105. In some embodiments, mobile wireless communication device 100 communicates a confirmation to the first service provider indicating acceptance of the credential from the second service provider, e.g., the 101st IMSI 4210, and successful reconfiguring of the SIM 4201 for the mobile wireless communication device 100 to use wireless networks of the second service provider. In some embodiments, the first service provider communicates an indication of the confirmation from the mobile wireless communication device 100 to the second service provider. In some embodiments, the first service provider deletes the first credential (e.g., the 1st IMSI 4202, 1st key 4203, 1st algorithm 4204 combination) from the database of credentials 4102 maintained by the first service provider, thereby de-authorizing the mobile wireless communication device 100 for communication with the first service provider wireless networks. In some embodiments, the first credentials used by mobile wireless communication devices 100 are unique and used one-time only. In some embodiments, the first credentials are re-usable by the first service provider for another mobile wireless communication device 100, e.g., after a "quiescent period." In some embodiments, first credentials for communication with the first service provider are supplied to multiple mobile wireless communication devices 100, and an additional credential is obtained from the mobile wireless communication device 100 to identify uniquely the mobile wireless communication device 100 during initialization processes, e.g., during service provider selection and/or service selection. In some embodiments, the mobile wireless communication device 100 retains the first credential after the initialization process and adds the second credential, thereby retaining authorization to communicate with the first service provider (e.g., for subsequent service provider selection, service activation, and/or service selection) and also to communicate with the second service provider (e.g., for service selection, service activation, and/or use of one or more services).

Service Provider/Service Selection and Activation

Each new generation of mobile wireless communication device 100 seeks to integrate additional communication capabilities to improve performance and increase flexibility in use across multiple operating environments. Users of mobile wireless communication devices 100 can prefer a device that can interconnect with a broad variety of wireless networks, including networks that use different generations or types of wireless communication protocols. Device manufacturers and equipment suppliers can also prefer to minimize the number of different wireless devices to design, manufacture, test and distribute to multiple markets worldwide. Both users and device manufacturers can prefer mobile wireless communication devices 100 that can be dynamically associated with different service providers and services. Described herein are various methods, systems, and apparatuses to provide for selection of service providers and services and activation of service accounts and services for mobile wireless communication devices 100.

In some embodiments, the mobile wireless communication device 100 includes one or more interfaces through which information is communicated to and/or received from a user of the mobile wireless communication device 100. The one or more interfaces are referred to herein as a user interface (UI 101) and can include both display capabilities and input reception capabilities. In some embodiments, display and input reception can be through a common hardware interface, e.g., a touch screen display. In some embodiments, display and input capabilities can be provided through separate interfaces, e.g., a display and a separate keyboard. In some embodiments, the mobile wireless communication device 100 presents information through the UI 101 to the user of the mobile wireless communication device 100 and receives responses from the user through the UI 101 to facilitate service provider selection, service selection, service account activation, and service activation. In some embodiments, information content presented through the UI 101 and/or formatting information for presenting information content through the UI 101 is obtained from one or more of: storage in the mobile wireless communication device 100, a server or database of a third-party service partner system, or a server or database of a service provider system.

In some embodiments, the mobile wireless communication device 100 includes software, firmware, hardware, or a combination of these, referred to hereinafter as an application, to manage service provider selection, service selection, service account activation, and/or service activation. In some embodiments, at least a portion of the application is pre-loaded in the mobile wireless communication device 100 to provide for initial service provider selection, service account activation, service selection, and/or service activation. In some embodiments, the application includes a user level application, one or more core operating system components, one or more device agents 1001, a portion of a service processor 115, or a combination of these. Functions of device agents 1001 and of the service processor 115 are described in detail elsewhere herein and in patent applications and patents incorporated by reference herein as detailed at the beginning of this specification. In some embodiments, the application is part of or works in conjunction with a service processor 115. In some embodiments, the mobile wireless communication device 100 stores information about the mobile wireless communication device 100, a user of the mobile wireless communication device, service accounts, subscribed services, and/or service policies associated with subscribed services.

In some embodiments, the mobile wireless communication device 100 includes software, firmware, hardware, or a combination of these, referred to as a modem, to manage communication of messages between the mobile wireless communication device 100 and one or more different network entities using on or more communication protocols. In some embodiments, the modem includes one or more operating system components, hardware components, device agents 1001, a portion of a service processor 115, or a combination of these. In some embodiments, the modem manages the establishment and maintenance of communication channels to transport messages between the mobile wireless communication device 100 and various external network entities through wired networks and/or wireless radio access networks.

In some embodiments, the mobile wireless communication device 100 is supplied with a combination of hardware, software, and/or firmware that restricts use to a particular service provider (or a set of particular service providers). In some embodiments, the mobile wireless communication device 100 is supplied with a "generic" combination of hardware, software, and/or firmware that permits a user to select a service provider (or set of service providers) with which to use the mobile wireless communication device 100. In some embodiments, the mobile wireless communication device 100 is pre-programmed for use over a first cellular wireless access network and is re-programmed during the service provider selection process for use over a second cellular wireless access network based on the service provider selected by the user of the mobile wireless communication device 100. In some embodiments, the mobile wireless communication device 100 is programmed with a particular access point name (APN) with which to connect for service provider selection, service provider activation, service selection, and/or service activation.

In some embodiments, one or more network entities managed by a third-party service partner or a service provider can participate in processes to select service providers and/or services (and activate service accounts and/or services for service providers) for the mobile wireless communication device 100. In some embodiments, the service provider is a mobile network operator or a mobile virtual network operator. As described in detail elsewhere herein, service providers and third-party service partners can maintain multiple servers and databases to manage communication services for multiple mobile wireless communication devices 100. In some embodiments, various servers and databases include information for service plan selection, device activation, service activation, service account management, service usage monitoring, service usage accounting, charging and billing, service design, device group management, service policies, notifications, and access control. One or more servers and databases for managing communication services maintained by a third-party service partner are referred to hereinafter as a third-party service partner system. In some embodiments, the third-party service partner system is split into multiple components, e.g., an Internet "cloud-based" server that hosts an application and service management system (e.g., an application store cloud server) and a local computing platform (e.g., an application store resident on a computer). In some embodiments, the application on the mobile wireless communication device 100 communicates with a cloud-based server directly. In some embodiments, the application on the mobile wireless communication device 100 communicates with the cloud-based server through a local computer application store. In some embodiments, the third-party service partner system includes or is part of a service controller 122, embodiments of which are described elsewhere herein and in patent applications and patents incorporated by reference herein as detailed at the beginning of this specification.

In some embodiments, the third-party service partner system works in conjunction with a service provider system to perform one or more aspects of service management including service provider selection, service account activation, service account management, service selection, or service activation. One or more servers and databases for managing communication services maintained by a service provider are referred to hereinafter as a service provider system. In addition to the third-party service partner system and service provider system, one or more network elements maintained by a network operator can be configured to control and manage communication services selected by the user of the mobile wireless communication device 100. In some embodiments, the service provider system includes or is part of a service controller 122. In some embodiments, the service provider system includes a service design center 135 through which service plans, service plan catalogs, and/or service plan offers can be designed, stored, and/or distributed. In some embodiments, one or more elements of the mobile wireless communication device 100, e.g., the "Application," communicate with the third-party service partner system and/or the service provider system through one or more application programming interfaces (APIs) as part of the service provider selection, service provider account activation, and/or service selection processes. Aspects of APIs are described elsewhere herein this patent application (and in patent applications and patents incorporated by reference herein as detailed at the beginning of this specification) and can apply equally to aspects of service provider selection, service provider account activation, and/or service selection processes for FIGS. 350A, 350B, 351A, 351B, 352A, 352B, and 353 to 355. In some embodiments, elements of the third-party service partner system and the service provider system of FIGS. 350A, 350B, 351A, 351B, 352A, 352B, and 353 to 355 communicate with each other through one or more APIs.

FIGS. 350A and 350B illustrate representative processes to select a service provider for a mobile wireless communication device 100. FIG. 350A illustrates a first alternative process by which a service provider is selected for the mobile wireless communication device 100 based at least in part on information retrieved from the third-party service partner system 157. In some embodiments, the application 106 in the mobile wireless communication device 100 presents a notification message to the user through the UI 101 querying if the user would like to add a service provider to supply communication services for the mobile wireless communication device 100. In some embodiments, the notification message is presented through the UI 101 to the user of the mobile wireless communication device 100 in response to one or more notification trigger conditions occurring. In some embodiments, the notification message is triggered when the mobile wireless communication device 100 is initialized for service, e.g., by the user, an administrator, or a sales associate. In some embodiments, the notification message is included as part of an initialization process for setting up the mobile wireless communication device 100. In some embodiments, the notification message initiates the process to add at least one service provider to the mobile wireless communication device 100, when no service provider selection has been made for the mobile wireless communication device 100. In some embodiments, the notification message is triggered when the mobile wireless communication device 100 detects a change in network state, e.g., when no current home network service provider or roaming network partner service provider associated with the current home network service provider is available for the mobile wireless communication device 100. In some embodiments, the notification message is triggered by a request or a query by the user of the mobile wireless communication device 100 received through the UI 101 (e.g., through a setting or by starting an application). In some embodiments, the notification message is triggered by a message received by the wireless communication device 100 from the third-party service partner system 157 or the service provider system 3800. In some embodiments, an affirmative acknowledgement (e.g., "Yes") is received through the UI 101 in response to the notification message, providing an indication to proceed with selection of a service provider to add to the mobile wireless communication device 100.

In some embodiments, the application 106 presents a set of data connection options through which the mobile wireless communication device 100 can establish a secure connection with an external entity in order to proceed with selection of the service provider to add to the mobile wireless communication device 100. In some embodiments, the data connection options presented include one or more of: a wired connection (e.g., a USB connection to a wide area network connected computer), a wireless local area network connection to a router connected to a wide area network (e.g., a Wi-Fi connection), or a cellular wireless connection (e.g., through a wireless service provider radio access network). In some embodiments, one of the data connection options is selected through the UI 101. In some embodiments, no data connection options are presented, and the mobile wireless communication device 100 determines an appropriate data connection, e.g., based on information pre-stored in the mobile wireless communication device 100 and/or based on available networks detected by the mobile wireless communication device 100. In some embodiments, data connection options presented through the UI 101 are based on information pre-stored in the mobile wireless communication device 100 and/or based on available networks detected by the mobile wireless communication device 100. In some embodiments, the application 106 requests the modem 1264 establish a secure connection to a third-party service partner system 157. In some embodiments, the modem 1264 establishes a secure connection with the third-party service partner system 157 using an exchange of messages. In some embodiments, the modem 1264 establishes the secure connection through an intermediate radio access network (RAN) system (not shown), e.g., through a RAN of a wireless service provider. In some embodiments, the secure connection uses an "ambient" service, as described in other patent applications and patents incorporated by reference herein as detailed at the beginning of this specification, or a temporary service lease that provides for a limited amount of communication between the mobile wireless communication device 100 and the third-party service partner system 157. In some embodiments, the third-party service partner system 157 includes an application portal to which the application 106 of the mobile wireless communication device 100 connects and communicates. In some embodiments, the third-party service partner system 157 is a web-based server and the application 106 provides a web interface to the third-party service partner system 157 for communication between the mobile wireless communication device 100 and the third-party service partner system 157. In some embodiments, the modem communicates one or more credentials to the third-party service partner system 157, e.g., when establishing the secure connection, the one or more credentials providing for unique identification of the mobile wireless communication device 100 and/or a user thereof.

In some embodiments, the third-party service partner system 157 communicates one or more service provider options to the mobile wireless communication device 100, e.g., through the secure connection. In some embodiments, the set of service provider options depends on information provided by the mobile wireless communication device 100, e.g., credentials, one or more user preferences, or one or more device settings, and/or based on detected network information or pre-stored network information, e.g., available network service providers or a set of preferred service providers. In some embodiments, credentials include device identifiers, user/subscriber identifiers, device group identifiers, or a combination of these. In some embodiments, the set of service provider options provided to the mobile wireless communication device 100 matches one or more communication protocol capabilities of the mobile wireless communication device 100. In some embodiments, the set of service provider options provided to the mobile wireless communication device 100 matches a geographic location of the mobile wireless communication device 100. In some embodiments, the application 106 presents through the UI 101 the set of service provider options (or a portion thereof) to the user for selection of a service provider to add to the mobile wireless communication device 100. In some embodiments, the third-party service partner system 157 communicates a "superset" of service provider options to the mobile wireless communication device 100 and the application 106 determines a "subset" of service provider options to present through the UI 101. In some embodiments, the application 106 uses the set of service provider options provided by the third-party service partner system 157 in conjunction with information pre-stored in the mobile wireless communication device 100 to determine a set of service provider options to present through the UI 101. In some embodiments, the user provides an indication to select a service provider from the set of service provider options presented through the UI 101. In some embodiments, the application 106 of the mobile wireless communication device 100 forwards the selected service provider to the third-party service partner system 157, e.g., through the secure connection.

In some embodiments, the third-party service partner system 157 branches to a service provider activation process for the service provider selected by the user of the mobile wireless communication device 100. In some embodiments, the service provider activation process for the selected service provider continues to use the third-party service partner system 157 for communication, e.g., as illustrated in FIGS. 351A and 351B. In some embodiments, the service provider activation process for the selected service provider redirects the mobile wireless communication device 100 to connect directly to the service provider system 3800 without the intervening third-party service partner system 157, e.g., by establishing a secure connection between the modem 1264 and the service provider system 3800 and continuing the service provider activation process as illustrated in FIGS. 353 and 354.

FIG. 350B illustrates a second alternative process by which a service provider is selected for the mobile wireless communication device 100 based at least in part on information pre-stored in the mobile wireless communication device 100. As in FIG. 350A, in some embodiments, a notification message is presented through the UI 101 to a user of the mobile wireless communication device 100 querying whether the user would like to add a service provider to the mobile wireless communication device 100. Notification triggers as described above for FIG. 350A also can apply, in some embodiments, to initiate the process for selecting a service provider in the process of FIG. 350B. In some embodiments, in response to an affirmative indication received through the UI 101, the application 106 presents a set of service provider options to the user of the mobile wireless communication device 100 through the UI 101. In some embodiments, at least a portion of the set of service provider options presented to the user is pre-stored in the mobile wireless communication device 100. In some embodiments, the application 106 of the mobile wireless communication device 100 uses information about the user (e.g., user preferences), the device (e.g., device settings, device configuration, device capabilities), and/or wireless networks (e.g., available wireless networks, preferred wireless service provider networks) to determine at least a portion of the set of service provider options to present to the user through the UI 101 of the mobile wireless communication device 100. In some embodiments, the user selects a service provider from the set of service provider options presented. In some embodiments, the mobile wireless communication device 100 establishes a secure connection with a third-party service partner system 157 and communicates the service provider selection to the third-party service partner system 157 through the secure connection. In some embodiments, the application 106 presents a set of data connection options to the user and obtains a selection of a data connection option before establishing the secure connection based on the obtained data connection option selected by the user of the mobile wireless communication device 100. As described for FIG. 350A, the secure connection between the mobile wireless communication device 100 and the third-party service partner system 157 can be accomplished through a wired, wireless local area network, wireless cellular network, or a combination of such networks. In some embodiments, the third-party service partner system 157 branches to a service provider activation process based on the selected service provider. In some embodiments, the third-party service partner system 157 continues to participate during the selected service provider activation process. In some embodiments, the third-party service partner system 157 redirects the mobile wireless communication device 100 to connect to the service provider system 3800 directly to continue the service provider activation process for the selected service provider.

In some embodiments, the mobile wireless communication device 100 is pre-programmed or configured to function with a particular service provider, so that selection of a service provider from a set of service providers is not required. In some embodiments, the user of the mobile wireless communication device 100 can initiate a service account activation process for establishing a new service account for the mobile wireless communication device 100 or associating the mobile wireless communication device 100 with an existing service account. In some embodiments, one or more of the steps described for the service provider selection process illustrated in FIGS. 350A and 350B can be performed to initiate a service account activation process for a “default” service provider. In some embodiments, the “Add Service Provider?” message can be part of or replaced by a “Start Service Account Activation?” message. In some embodiments, the mobile wireless communication device 100 automatically initiates the service account establishment process when detecting no service account has already been established for the mobile wireless communication device 100, e.g., based on examining information stored in the mobile wireless communication device 100. In some embodiments, all or part of the service account activation process illustrated in FIGS. 351A and 351B can be used for establishing a new service account for the mobile wireless communication device 100 or associating the mobile wireless communication device 100 with an existing service account for a “default” service provider, e.g., a service provider with which the mobile wireless communication device 100 can be pre-programmed or pre-configured with which to operate. In some embodiments, in place of presenting service provider options (or in addition to presenting service provider options), the application 106 presents options for service account activation through the UI 101, e.g., for a particular service provider. In some embodiments, the application 106 presents options to establish a new service account for the mobile wireless communication device 100, associate the mobile wireless communication device 100 with an existing service account, or transfer an existing service account from a different mobile wireless communication device 100 to the mobile wireless communication device 100.

FIGS. 351A and 351B illustrate representative processes to activate an association between a service provider and the mobile wireless communication device 100, e.g., to establish a new service account or associate the mobile wireless communication device 100 with an existing service account of the service provider. FIG. 351A illustrates a first alternative process by which a service provider is activated for the mobile wireless communication device 100 based on information obtained from the mobile wireless communication device 100 and provided to a service provider system 3800 by the third-party service partner system 157. In some embodiments, communication between the third-party service partner system 157 and the service provider system 3800 of the selected service provider uses a secure communication channel (establishment of the secure communication channel not shown). In some embodiments, the third-party service partner system 157 provides an activation request to the service provider system 3800 of the selected service provider. In some embodiments, the activation request includes information about the mobile wireless communication device 100 and/or of a user of the mobile wireless communication device 100, e.g., obtained from the mobile wireless communication device 100 during the service provider selection process or pre-stored in a database of the third-party service partner system 157. In some embodiments, the third-party service partner system 157 communicates one or more credentials to the service provider system 3800 of the selected service provider in the activation request message. In some embodiments, the service provider system 3800 provides an activation response message to the third-party service partner system 157 in response to the activation request message. In some embodiments, the activation response message includes an indication of information to obtain from the mobile wireless communication device 100 (or its user). In some embodiments, the service provider system 3800 retrieves information about the mobile wireless communication device 100 or the user thereof based on information provided in the activation request message. In some embodiments, the third-party service partner system 157 communicates the information request from the selected service provider to the mobile wireless communication device 100 through a secure communication channel.

In some embodiments, the application 106 in the mobile wireless communication device 100 presents a request for information from the user of the mobile wireless communication device through the UI 101, the request for information based at least in part on the information request received by the mobile wireless communication device 100 from the service provider system 3800 through the third-party service partner system 157. In some embodiments, the user provides responses to the information request through the UI 101 to supply to the selected service provider. In some embodiments, the application 106 presents the requests for service provider information as a series of screens through the UI 101 that the user fills in response. In some embodiments, the information includes one or more of: user identity, user contact information (e.g., actual physical or virtual addresses), credit information (e.g., for billing services), or security information (e.g., password). In some embodiments, the service provider system 3800 requests information to establish a new service account for the mobile wireless communication device 100 or a user thereof. In some embodiments, the service provider system 3800 requests information for associating the mobile wireless communication device 100 with an existing service account, e.g., requiring appropriate identification of the mobile wireless communication device 100 and/or the user thereof to associate with the existing service account. In some embodiments, the service provider system requests information to transfer an existing service account from a different mobile wireless communication device 100 to the mobile wireless communication device 100. FIGS. 140 to 144 and FIGS. 148 to 155 described above illustrate representative screens through which information can be obtained from a user of the mobile wireless communication device 100 to establish a new service account of the selected service provider. FIGS. 156 to 159 described above illustrate representative screens through which information can be obtained from a user of the mobile wireless communication device 100 to associate the device 100 with an existing service account of the selected service provider. The descriptions provided herein for these figures can also apply, at least in part, to the service provider selection process of FIGS. 350A, 350B, 351A and 351B.

In some embodiments, the application 106 provides responses obtained from the user of the mobile wireless communication device 100 to the third-party service partner system 157 to forward to the service provider system 3800 of the selected service provider. In some embodiments, the application 106 provides information for the service provider system 3800 based at least in part on responses from the user received through the UI 101. In some embodiments, the application 106 provides information to the service provider system 3800 based at least in part on information pre-stored in the mobile wireless communication device 100. In some embodiments, the third-party service partner system 157 provides information to the service provider system 3800 of the selected service provider based at least in part on information received from the mobile wireless communication device 100. In some embodiments, the third-party service partner system 157 provides information to the service provider system 3800 of the selected service provider based at least in part on information stored in a database of the third-party service partner system 157. In some embodiments, the third-party service partner system 157 communicates information for a user of the mobile wireless communication device 100 already stored in the database, e.g., identity, contact, and/or credit information. In some embodiments, the third-party service partner system 157 stores information obtained from the user of the mobile wireless communication device 100 through the UI 101 in the database of the third-party service partner system 157. In some embodiments, at least a portion of information collected form the user of the mobile wireless communication device 100 is stored in the mobile wireless communication device 100 (e.g., in non-volatile memory, in a subscriber identity module (SIM), in a user identity module (UIM) or equivalent), in storage of a computing device associated with the mobile wireless communication device 100 (e.g., associated with an iTunes or Application Store account), in storage of the third-party service partner system 157 (e.g., in an iCloud account), or in storage of the service provider system 3800 (e.g., a subscriber profile repository (SPR)).

In some embodiments, the service provider system 3800 of the selected service provider establishes a new service account for the mobile wireless communication device 100 or a user thereof based at least in part on information provided by the third-party service partner system 157. In some embodiments, the service provider system 3800 of the selected service provider associates the mobile wireless communication device 100 and/or the user thereof with the new service account or with an existing service account. In some embodiments, the mobile wireless communication device 100 is associated with multiple service accounts, e.g., with an existing account and with a new account, or with multiple existing accounts. In some embodiments, the service provider system 3800 of the selected service provider communicates a message confirming activation of the new service account and the association of the mobile wireless communication device 100 therewith. In some embodiments, the service provider system 3800 of the selected service provider communicates a message confirming association of the mobile wireless communication device 100 with one or more existing service accounts. In some embodiments, confirmation of a new service account activation and association of the mobile wireless communication device 100 with new or existing service accounts is communicated by the third-party service partner system 157 to the mobile wireless communication device 100. In some embodiments, the application 106 on the mobile wireless communication device 100 provides a confirmation message to the user of the mobile wireless communication device 100 through the UI 101. FIGS. 160 and 161 described above illustrate representative screens that present notifications to a user of the mobile wireless communication device 100 when associating the mobile wireless communication device 100 with a service account.

In some embodiments, the service provider system 3800 of the selected service provider communicates information to one or more network elements 1447 to provide at least in part for provisioning of the one or more network elements 1447 based one or more of: establishment of the new service account, association of the mobile wireless communication device 100 with the new service account, or association of the mobile wireless communication device 100 with one or more existing service accounts. In some embodiments, network provisioning includes updating one or more databases, e.g., a subscription profile repository (SPR) database maintained by the selected service provider. In some embodiments, the service provider system 3800 of the selected service provider, optionally, communicates information through the third-party service partner system 157 to the mobile wireless communication device 100 to provide for provisioning of the mobile wireless communication device 100. In some embodiments, device provisioning includes providing information to configure the mobile wireless communication device 100 to access one or more wireless radio access networks of the service provider. In some embodiments, device provisioning includes providing information to configure the mobile wireless communication device 100 to use one or more services of the service provider, e.g., "free," "sponsored," or "trial" services provided at no cost to the user of the mobile wireless communication device 100.

FIG. 351B illustrates a second alternative process by which a selected service provider is activated for the mobile wireless communication device 100 based on information obtained from the mobile wireless communication device 100 and provided to a service provider system 3800 by the third-party service partner system 157. In some embodiments, as described above for FIG. 351A, the third-party service partner system 157 requests information from the mobile wireless communication device 100 and/or the user thereof to supply to the service provider system 3800 in order to associate the mobile wireless communication device 100 with an existing service account or to establish a new service account for the mobile wireless communication device 100. The same description provided above for FIG. 351A applies equally to FIG. 351B, in some embodiments, except that the third-party service partner system 157 collects information for the selected service provider from the mobile wireless communication device 100 before submitting an activation request to the service provider system 3800 of the selected service provider. In some embodiments, the third-party service partner system 157 uses one or more of: information obtained from the user of the mobile wireless communication device 100 (e.g., through the UI 101), information obtained from the mobile wireless communication device 100 (e.g., pre-stored in the mobile wireless communication device 100), or information retrieved from a database associated with the third-party service partner system 157 (e.g., information for the user of the mobile wireless communication device 100 provided for other service providers or for services provided by the third-party service partner), to submit an activation request to the service provider system 3800 of the selected service provider. In some embodiments, the activation request includes one or more credentials to identify the mobile wireless communication device 100 and/or the user thereof to the service provider system 3800 of the selected service provider. As described for FIG. 351A, the service provider system 3800 of the selected service provider uses at least in part information received from the third-party service partner system 157 to associate the mobile wireless communication device 100 and/or the user thereof with a new service account and/or with one or more existing service accounts. In some embodiments, the third-party service partner system 157 maintains information required by one or more service providers to associate devices with service accounts in a database associated with the third-party service partner system 157. Thus, in some embodiments, the third-party service partner system 157 collects information for an activation request for a particular selected service provider, e.g., from the mobile wireless communication device 100, from the user of the mobile wireless communication device 100, from a database reachable by the third-party service partner system 157, or from a combination of these, in advance of submitting an activation request for the mobile wireless communication device 100 to the service provider system 3800 of the selected service provider.

FIGS. 352A and 352B illustrate a representative process for selecting a service for a mobile wireless communication device 100. In some embodiments, selection of a service is conducted in conjunction with selection of a service provider as described above. In some embodiments, selection of a service is prompted by a notification trigger condition for the mobile wireless communication device 100, e.g., detection of no service plans, detection of an expiring or expired service plan, monitoring of particular service activities, monitoring of service usage, detection of a change in network state, etc. In some embodiments, a notification trigger condition results in a notification message being presented to the user of the mobile wireless communication device 100, e.g., by the application 106 communicating through the UI 101. In some embodiments, the notification trigger condition occurs in the mobile wireless communication device 100. In some embodiments, the notification trigger condition occurs in the wireless network, and a notification trigger indication for a notification message and/or the notification message itself is communicated to the mobile wireless communication device 100. In some embodiments, the notification message presented to the user through the UI 101 includes an option to add one or more services to the mobile wireless communication device 100. In some embodiments, the notification message presents an option to explore a catalog of services for a particular service provider, e.g., a service catalog for the selected service provider with which the mobile wireless communication device 100 and/or user thereof has an associated service account. In some embodiments, the notification message presents a set of particular service plans, e.g., based on detected and/or monitored service usage, device states, and/or network states. In some embodiments, in response to the notification message presented through the UI 101, the user of the mobile wireless communication device 100 provides an affirmative indication to proceed with selection of a service for the mobile wireless communication device 100.

FIG. 78 illustrates a representative embodiment of a notification message that includes options to add services to a mobile wireless communication device 100. FIG. 103 illustrates a representative embodiment of a notification message to review a catalog of service plans in response an expiring service plan. FIGS. 111 and 113 illustrate representative embodiments of notification messages to review a catalog of service plans in response to a service plan nearing a usage limit. FIG. 116 illustrates a representative embodiment of a notification message to select a service plan or review a catalog of service plans in response to a service usage limit. FIGS. 125 to 131 illustrate representative embodiments of notification messages to select a service plan based on different trigger conditions. The descriptions provided herein for these figures can also apply, at least in part, to the service selection process of FIGS. 352A and 352B.

In some embodiments, the application 106 presents a set of data connection options through which the mobile wireless communication device 100 can establish a secure connection with an external entity in order to proceed with selection of a service to add to the mobile wireless communication device 100. As described above for adding a service provider, the set of data connection options can provide for communicating with the external entity through a variety of wired or wireless interfaces. The same description for a set of data connection options as described above for FIGS. 350A and 350B also can apply to FIG. 352A. In some embodiments, the mobile wireless communication device 100 establishes a secure connection with a third-party service partner system 157. In some embodiments, the secure connection with the third-party service partner system 157 can be already established, e.g., for service provider selection or for another service control function, and can be reused for service selection. In some embodiments, the mobile wireless communication device 100 requests information about a set of available service plans or information about one or more specific service plans from the third-party service partner system 157. In some embodiments, the third-party service partner system 157 maintains information for a generic catalog of service plans for a service provider from which one or more service plans can be offered to a user of the mobile wireless communication device 100. In some embodiments, the third-party service partner retrieves the generic catalog of service plans from the service provider system 3800, e.g., by regularly updating the service plan information in an associated database of the third-party service partner system 157. In some embodiments, the service provider system 3800 pushes updates of generic service plan catalogs to the third-party service partner system 157 without being prompted for a request.

In some embodiments, when establishing the secure connection a set of one or more credentials for the mobile wireless communication device 100 and/or the user thereof is communicated to the third-party service partner system 157. In some embodiments, the third-party service partner system 157 uses at least a portion of the set of one or more credentials to identify the mobile wireless communication device 100 and/or the user thereof. In some embodiments, the mobile wireless communication device 100 communicates a request for service plans to the third-party service partner system 157, and in response, the third-party service partner system 157 communicates to the mobile wireless communication device 100 a service offer that includes one or more service plans. In some embodiments, the set of service plans in the service offer is based at least in part on information included in the service offer request received by the third-party service partner system 157. In some embodiments, the set of service plans included in the service offer is based at least in part on conditions that triggered a notification message, e.g., a notification message that presents options to add service plans to the mobile wireless communication device 100. In some embodiments, the third-party service partner system 157 communicates with the service provider system 3800 to request information for a catalog of service plans. In some embodiments, the third-party service partner system 157 includes one or more credentials for the mobile wireless communication device 100 and/or the user thereof with the service catalog request communicated to the service provider system 3800. In some embodiments, the service catalog request is "specific" to the mobile wireless communication device 100, the user thereof, and/or to network conditions, and the service provider system 3800 provides a service catalog response accordingly. In some embodiments, the set of service plans included in the service offer communicated by the third-party service partner system 157 to the mobile wireless communication device 100 includes one or more service plans based on the specific service plan catalog request and response.

In some embodiments, a message is presented through the UI 101 of the mobile wireless communication device 100 presenting a set of one or more service plans to which the user of the mobile wireless communication device 100 can subscribe. In some embodiments, the user of the mobile wireless communication device 100 can select a service plan from the set of one or more service plans. In some embodiments, the user of the mobile wireless communication device 100 can retrieve additional detailed information about one or more service plans in the set of one or more service plans. In some embodiments, the user of the mobile wireless communication device 100 can choose to customize one or more features of a service plan in the set of service plans offered. In some embodiments, the user selects a service plan through the UI 101, and the mobile wireless communication device 100 communicates the service plan selection to the third-party service partner system 157. In some embodiments, the third-party service partner system 157 communicates the service plan selection to the service provider system 3800 and includes one or more credentials with the service plan selection. In some embodiments, the one or more credentials are used by the service provider system 3800 to identify the mobile wireless communication device 100 and/or a user thereof and/or a service account associated with the mobile wireless communication device 100 or user thereof. In some embodiments, the service selection information communicated by the third-party service partner system 157 to the service provider system 3800 includes one or more customizations of features of a selected service plan. In some embodiments, the third-party service partner system 157 stores information about the selected service plans and/or customization of features of the selected service plans in a database associated with the third-party service partner system 157.

FIGS. 86 to 94 illustrate representative embodiments of screens of information presented through the UI 101 of the mobile wireless communication device 100 that present a set of service plans (organized in different formats and providing different levels of detail for service plans) to the user of the mobile wireless communication device 100. FIGS. 117 to 119 illustrate representative embodiments of screens of information presented through the UI 101 of the mobile wireless communication device 100 that present a catalog of service plan bundles that include multiple service plan elements. FIGS. 120 to 124 illustrate representative embodiments of screens of information presented through the UI 101 of the mobile wireless communication device 100 that provide for customizing one or more service plan elements of a service plan bundle. FIGS. 132 to 137 illustrate additional representative embodiments of screens of information that can be presented through the UI 101 to the user of the mobile wireless communication device 100 to present a set of service plans from which the user can select a service plan for the mobile wireless communication device 100. The descriptions provided herein for these figures can also apply, at least in part, to the service selection process of FIGS. 352A and 352B.

In some embodiments, the service provider system 3800 adds (and/or customizes) one or more selected service plans to a service account associated with the mobile wireless communication device 100 and/or the user thereof. In some embodiments, the service provider system 3800 provides a confirmation of the addition (and/or customization) of the service plans to the mobile wireless communication device 100 through the third-party service partner system 157. In some embodiments, a notification message confirming the addition of (and/or customization of) one or more service plans for the mobile wireless communication device 100 and/or the user thereof is presented through the UI 101 to the user of the mobile wireless communication device 100. In some embodiments, the service provider system 3800 communicates messages to one or more network elements 1447 that provide for provisioning of the selected service plans. In some embodiments, provisioning of one or more network elements 1447 includes communication of one or more service policy rules for service accounting, control, maintenance, charging, notification, and/or billing for the selected service plans. In some embodiments, service policy information is also communicated by the service provider system 3800 through the third-party service partner system 157 to the mobile wireless communication device 100 to provision the mobile wireless communication device 100 for the selected service plans.

In some embodiments, the third-party service partner system 157 includes one or more servers (e.g., servers 160, 215, 1360, 1368, 1370, 1372, 4630) and databases (e.g., databases 117, 161, 1367, 1369, 1371, 4631) as illustrated in FIGS. 296 to 299 and FIGS. 301 to 303. In some embodiments, the third-party service partner system 157 includes an offer server 1383 as illustrated in FIG. 306, a service controller 122 as illustrated in FIG. 309, a selection server 1386 as illustrated in FIG. 314, a service controller 122 as illustrated in FIG. 317, a notification server 1389 as illustrated in FIG. 322, a service controller 122 as illustrated in FIG. 328, or a combination of these. The descriptions provided herein for FIGS. 296 to 299, 301 to 303, 306, 309, 314, 317, 322 and 328 and accompanying message exchange diagrams can also apply, at least in part, to systems and apparatuses for service provider selection processes of FIGS. 350A, 350B, to systems and apparatuses for service provider activation processes of FIGS. 351A and 351B, and to systems and apparatuses for service selection processes of FIGS. 352A and 352B.

In some embodiments, the mobile wireless communication device 100 communicates with the service provider system 3800 for service provider selection, service provider activation and/or service selection without the assistance of a third-party service partner system 157 for at least a portion of a service provider selection process, service provider activation process and/or a service selection process. In some embodiments, one or more aspects of a service provider selection process, service provider activation process and/or a service selection process as described above for FIGS. 350A, 350B, 351A, 351B, 352A, and 352B can apply equally to all or parts of a service provider selection process, a service provider activation process or a service selection process as described below for FIGS. 353 to 355. In some embodiments, representative screens presented through the UI 101 of the mobile wireless communication device 100 for service provider selection, service provider activation and/or service selection as described above for FIGS. 350A, 350B, 351A, 351B, 352A, and 352B can apply equally to all or parts of a service provider selection process, service provider activation process, or a service selection process as described below for FIGS. 353 to 355.

In some embodiments, the third-party service partner system 157 of FIGS. 350A, 350B, 351A, 351B, 352A and 352B includes all or part of the "Service Offer Display & Response System 1394" and "Service Offer Storage 1440" illustrated in FIGS. 332 to 334. In some embodiments, the descriptions for processes, systems, and apparatuses to present service offers and obtain responses through a service offer display and response system (e.g., 1394) for FIGS. 332 to 334 presented above apply equally at least in part to processes, systems, and apparatuses to select a service provider, activate a service account for a service provider and/or to select a service for FIGS. 350A, 350B, 351A, 351B, 352A and 352B. In some embodiments, one or more network elements of FIGS. 350A, 350B, 351A, 351B, 352A and 352B include one or more service notification, access control, service accounting, or service billing functional blocks (e.g., service notification 1396, access control 1397, service accounting 1398, service billing 1399) as illustrated in FIGS. 332 to 335 and described above. In some embodiments, the service provider system 3800 of FIGS. 350A, 350B, 351A, 351B, 352A and 352B includes all or part of the "Service Policy Provisioning 1395" system, the "Service Policy Storage 1450," the "Service Offer Storage 1440," and/or the "Service Design System 1392" illustrated in FIGS. 332 to 335 and described above. In some embodiments, the third-party service partner system 157 of FIGS. 350A, 350B, 351A, 351B, 352A and 352B includes all or part of the "Service Offer Display & Response System 1394" of FIG. 334, and the service provider system 3800 of FIGS. 350A, 350B, 351A, 351B, 352A and 352B includes all or part of the "Service Offer Storage 1440," "Service Policy Storage 1450," "Service Policy Provisioning 1395," and "Service Design System 1392" of FIG. 334. In some embodiments, the third-party service partner system 157 of FIGS. 350A, 350B, 351A, 351B, 352A and 352B includes all or part of the "Service Offer Display & Response System 1394" and the "Partner Offer Storage 1470" of FIG. 335, and the service provider system 3800 of FIGS. 350A, 350B, 351A, 351B, 352A and 352B includes all or part of the "Operator Offer Storage 1460," "Service Policy Storage 1450," "Service Policy Provisioning 1395," and "Service Design System 1392" of FIG. 335.

In some embodiments, all or part of the third-party service partner system 157 and/or the service provider system 3800 of FIGS. 350A, 350B, 351A, 351B, 352A and 352B includes all or part of the "Notification Display & Response System 1435," the "Notification Message Content Storage 1480," the "Notification Policy Storage 1490," the "Notification Policy Enforcement 1436" system, and/or the "Service Design System 1392" of FIGS. 336 to 339. In some embodiments, notification messages generated by the notification systems illustrated in FIGS. 336 to 339 can be triggered and presented to the user of the mobile wireless communication device 100 through the UI 101 for service provider selection and/or service selection for FIGS. 350A, 350B, 351A, 351B, 352A and 352B. The descriptions provided herein for notification messaging for FIGS. 336 to 339 can apply equally at least in part to aspects of service provider selection processes, service provider activation processes and/or service selection processes for FIGS. 350A, 350B, 351A, 351B, 352A and 352B.

FIG. 353 illustrates a representative embodiment for a service provider selection process in which the mobile wireless communication device 100 communicates directly with the service provider system 3800. In some embodiments, a notification message is presented through the UI 101 of the mobile wireless communication device 100 querying the user about adding (or selecting) a service provider for the mobile wireless communication device 100. In some embodiments, the notification message is triggered by any of a number of different trigger conditions as described above for FIGS. 350A and 350B. In some embodiments, the notification message is presented in response to a user of the mobile wireless communication device 100 selecting to configure a setting, initializing the mobile wireless communication device 100, or powering on or restarting a newly purchased or a "clean" mobile wireless communication device 100 for which at least service provider settings are not initialized. In some embodiments, the option to add a service provider to the mobile wireless communication device 100 is included as part of a step to set up the mobile wireless communication device 100 for service. In some embodiments, the option to add a service provider to the mobile wireless communication device 100 is to supplement service capabilities for the mobile wireless communication device 100 (e.g., to use an alternative service provider than one to which the mobile wireless communication device 100 is already configured to operate). In some embodiments, the user of the mobile wireless communication device 100 provides through the UI 101 an indication of an affirmative response to proceed with adding/selecting a service provider for the mobile wireless communication device 100.

In some embodiments, the application 106 presents a set of service provider options through the UI 101 to the user of the mobile wireless communication device 100, who responds by selecting a service provider from the set of service providers presented through the UI 101. In some embodiments, the application 106 forwards the service provider selection to the modem 1264 for communication to the service provider system 3800. In some embodiments, the application 106 provides a set of data connection options through which the mobile wireless communication device 100 can communicate with the service provider system 3800. In some embodiments, the set of data connection options is presented before providing the set of service provider options to the user through the UI 101 of the mobile wireless communication device 100. In some embodiments, the user selects one of the data connection options presented through the UI 101 to complete the service provider selection process. In some embodiments, the application 106 requests establishing a secure connection to the service provider system 3800, e.g., using the selected data connection and/or to communicate the selected service provider information to the service provider system 3800. In some embodiments, the modem 1264 establishes a secure connection between the mobile wireless communication device 100 and the service provider system 3800. In some embodiments, the modem 1264 communicates one or more credentials when establishing the secure connection with the service provider system 3800. In some embodiments, the credentials provide for identification of the mobile wireless communication device 100 and/or a user thereof.

In some embodiments, the modem 1264 communicates a request to activate service for the mobile wireless communication device 100 with the service provider system 3800. In some embodiments, activating service includes establishing a new service account with the selected service provider. In some embodiments, activating service includes joining the mobile wireless communication device 100 to an existing service account of the selected service provider. In some embodiments, activating service includes transferring a service account from a different mobile wireless communication device 100 to the mobile wireless communication device 100. In some embodiments, the mobile wireless communication device 100 proceeds to an activation process for the selected service provider using the secure connection established with the service provider system 3800. In some embodiments, the mobile wireless communication device 100 proceeds to an activation process for the selected service provider using a separately established secure connection with the selected service provider (e.g., through a different type of data connection).

FIG. 354 illustrates a representative service provider activation process for the selected service provider. In some embodiments, the service provider system responds to an activation request received from the mobile wireless communication device 100 by requesting information from the mobile wireless communication device 100. In some embodiments, the selected service provider's request for information is communicated through the secure connection. In some embodiments, the mobile wireless communication device 100 presents one or more screens to the user through the UI 101 to request information to activate the mobile wireless communication device 100 with the selected service provider. In some embodiments, the user provides information required by the selected service provider through the UI 101 to activate service for the mobile wireless communication device 100, and the mobile wireless communication device 100 communicates the information in a service provider information response to the service provider system 3800. In some embodiments, the service provider system 3800 and the mobile wireless communication device 100 exchange a series of requests and responses to provide information for activating the mobile wireless communication device 100 with the selected service provider. In some embodiments, a portion of the information required by the service provider system 3800 is retrieved by the service provider system 3800 from one or more servers or databases. In some embodiments, information for the mobile wireless communication device 100 and/or the user thereof is retrieved from the one or more servers or databases based at least in part on one or more credentials provided to the service provider system 3800. In some embodiments, service provider information for activating the mobile wireless communication device 100 for the selected service provider includes one or more of: user information, device information, contact information, or billing information. In some embodiments, at least portions of the required information are obtained from a server or a database maintained by the service provider or by a third-party service partner.

In some embodiments, the service provider system 3800 establishes a new service account for the mobile wireless communication device 100 or for a user thereof based at least in part on the information supplied by the mobile wireless communication device 100. In some embodiments, the service provider system 3800 associates the mobile wireless communication device 100 with the new service account or with an existing service account. In some embodiments, the service provider system 3800 returns a confirmation message of the activation with the selected service provider to the mobile wireless communication device 100. In some embodiments, the mobile wireless communication device 100 presents a message through the UI 101 to the user of the mobile wireless communication device 100 confirming activation of the mobile wireless communication device 100 with the selected service provider.

In some embodiments, the service provider system 3800 initiates a process of provisioning one or more network elements 1447 for service access, control, notification, billing, charging, accounting or other communication service management functions of the mobile wireless communication device 100 and/or the user thereof. In some embodiments, the network provisioning process includes communication of service policy to one or more network elements 1447. In some embodiments, the service provider system 3800 initiates a device provisioning process after associating the mobile wireless communication device 100 (or user thereof) with the new or existing service account. In some embodiments, the service provider system communicates service policy to the mobile wireless communication device 100 as part of the device provisioning process.

FIG. 355 illustrates a representative embodiment of a service selection process for a mobile wireless communication device 100. In some embodiments, an application 106 on the mobile wireless communication device 100 presents a notification message through the UI 101 to the user of the mobile wireless communication device 100 for adding a service for the mobile wireless communication device 10. In some embodiments, notification to add a service can be combined with a service provider selection process. In some embodiments, the notification message can be triggered by an attempt to use or access a particular communication service. In some embodiments, the notification message can be triggered by an expiring or expired service plan to which the mobile wireless communication device 100 or user thereof subscribes. In some embodiments, the notification message can be combined with a service usage notification, e.g., when service usage of an existing service plan reaches a pre-determined or user-selected limit. In some embodiments, the notification message to add a service is included as part of a "marketing interceptor" offered to the user of the mobile wireless communication device 100 in response to one or more triggers detected in the wireless network and/or on the mobile wireless communication device 100. In some embodiments, the mobile wireless communication device presents a set of data connection options through which the mobile wireless communication device 100 can connect to a service provider system 3800 to add the service. In some embodiments, the mobile wireless communication device 100 selects a data connection option without receiving a data connection selection from the user of the mobile wireless communication device 100, e.g., the mobile wireless communication device 100 can be configured by default and/or by the user to choose various data connection options in a particular order. In some embodiments, the mobile wireless communication device 100 re-uses a data connection already established between the mobile wireless communication device 100 and the service provider system 3800. In some embodiments, the mobile wireless communication device 100 establishes a secure connection with the service provider system 3800 in response to an affirmative indication to add a service to the mobile wireless communication device 100. In some embodiments, the mobile wireless communication device 100 communicates one or more credentials to the service provider system 3800 when establishing the secure connection.

In some embodiments, the mobile wireless communication device 100 requests information on service plans available to the mobile wireless communication device 100 from the service provider system 3800 through the secure connection. In some embodiments, the service provider system 3800 provides a service offer that includes one or more service plans for the mobile wireless communication device 100. In some embodiments, the set of service plans included in the service offer is based at least in part on information about the mobile wireless communication device 100, the user thereof, one or more network states, or other trigger conditions that can result in presenting a notification message to add a service plan to the mobile wireless communication device 100. In some embodiments, the set of service plans provided in the service offer is specific to the type of mobile wireless communication device 100 (e.g., smartphone, "feature" phone, tablet, laptop, intermediate networking device, etc.). In some embodiments, the set of service plans provided in the service offer is specific to a particular geographic region. In some embodiments, the set of service plans provided in the service offer is specific to a type of communication network. In some embodiments, the set of service plans included in the service offer is based at least in part on information supplied when establishing the secure connection. In some embodiments, the set of service plans included in the service offer is based on information stored in a database maintained by the service provider or by a third-party service partner for the mobile wireless communication device 100 and/or for the user thereof. In some embodiments, the set of service plans included in the service offer is based on a service usage history of the mobile wireless communication device 100 or the user thereof. In some embodiments, the set of service plans includes one or more sponsored services, provided at a reduced cost, at a subsidized cost, or at no cost to the user of the mobile wireless communication device 100.

In some embodiments, the mobile wireless communication device 100 presents a set of service plans through the UI 101 to the user of the mobile wireless communication device 100 from which to select one or more service plans and/or to retrieve additional information about one or more service plans, and/or to customize aspects of one or more service plans. In some embodiments, the user selects a service plan through the UI 101, and the mobile wireless communication device 100 communicates the selected service plan to the service provider system 3800 through the secure connection. In some embodiments, the selected service plan message includes one or more credentials that identify the mobile wireless communication device 100, the user thereof, or a service account to which the selected service plan can be associated. In some embodiments, the service provider system 3800 retrieves information about service plans and/or service accounts for the mobile wireless communication device 100 or a user thereof. In some embodiments, the service provider system 3800 adds the selected service plan to a service account associated with the mobile wireless communication device 100 or a user thereof.

In some embodiments, the service provider system 3800 communicates a confirmation message to the mobile wireless communication device 100 confirming the service plan selection and successful addition of the service plan for the mobile wireless communication device 100. In some embodiments, the application 106 on the mobile wireless communication device 100 presents a confirmation notification message through the UI 101 confirming the service plan selection and successful addition of the service plan selection to a service account for the mobile wireless communication device 100. In some embodiments, the service provider system 3800 communicates with one or more network elements 1447 to provision the selected service plan for the mobile wireless communication device 100. In some embodiments, network provisioning includes configuring one or more network elements 1447 for aspects of communication service management including one or more of: access, control, notification, accounting, billing, or charging. In some embodiments, the service provider system 3800 communicates with the mobile wireless communication device 100 to provision the mobile wireless communication device 100 to use services of the selected service plan. In some embodiments, networking provisioning and/or device provisioning includes communication of service policies by the service provider system 3800.

In some embodiments, the service provider system 3800 of FIGS. 353 to 355 includes all or part of the “Service Offer Display & Response System 1394,” “Service Offer Storage 1440,” “Service Policy Provisioning 1395,” and “Service Design System 1392” illustrated in FIGS. 332 to 334. In some embodiments, the descriptions for processes, systems, and apparatuses to present service offers and obtain responses through a service offer display and response system (e.g., Service Offer Display & Response System 1394) for FIGS. 332 to 334 presented above apply equally at least in part to processes, systems, and apparatuses to select a service provider, activate a service provider, and/or to select a service for FIGS. 353 to 355. In some embodiments, one or more network elements 1447 of FIGS. 353 to 355 include one or more functional blocks for service notification, access control, service accounting, or service billing as illustrated in FIGS. 332 to 334 (e.g., service notification 1396, access control 1397, service accounting 1398, service billing 1399) and described above. In some embodiments, the service provider system 3800 of FIGS. 353 to 355 includes all or part of the “Service Policy Provisioning 1395” system, the “Service Policy Storage 1450,” the “Service Offer Storage 1440,” and/or the “Service Design System 1392” illustrated in FIGS. 332 to 334 and described above.

In some embodiments, all or part of the third-party service partner system 157 and/or the service provider system 3800 of FIGS. 353 to 355 includes all or part of the “Notification Display & Response System 1435,” the “Notification Message Content Storage 1480,” the “Notification Policy Storage 1490,” the “Notification Policy Enforcement 1436” system, and/or the “Service Design System 1392” of FIGS. 336 to 339. In some embodiments, notification messages generated by the notification systems illustrated in FIGS. 336 to 339 can be triggered and presented to the user of the mobile wireless communication device 100 through the UI 101 for service provider selection, service provider activation, and/or service selection for FIGS. 353 to 355. The descriptions provided herein for notification messaging for FIGS. 336 to 339 can apply equally at least in part to aspects of service provider selection processes, service provider activation processes and/or service selection processes for FIGS. 353 to 355.

In some embodiments, a mobile wireless communication device 100 can be configured initially upon purchase (or following a reset of configuration settings) to perform one or more of the service provider selection, service provider activation, or service selection processes through one or more wired or wireless access networks. In some embodiments, following execution of one or more of the service provider selection, service provider activation, or service selection processes, the mobile wireless communication device 100 can be authorized to use one or more particular services through one or more particular wireless radio access networks of a particular service provider.

Additional Representative Embodiments

In some embodiments, a wireless end-user communication device includes a user interface, one or more processors, and one or more modems for enabling the wireless end-user communication device to communicate over a wireless network. In some embodiments, the one or more processors of the wireless-end user communication device are configured to assist in presenting, through the user interface of the wireless end-user communication device a first plurality of selection options, the first plurality of selection options for customizing at least an aspect of a first service plan element of one or more service plan elements of a service plan bundle. In some embodiments, the first service plan element of the service plan bundle is associated with a service plan category comprising a set of one or more service plan elements of a particular communication service type. In some embodiments, the first service plan element provides for access to one or more communication services over the wireless access network. In some embodiments, the one or more processors of the wireless-end user communication device are configured to assist in obtaining, through the user interface of the wireless end-user communication device, a first user input indicating a first user selection from the first plurality of selection options. In some embodiments, the one or more processors of the wireless-end user communication device are configured to assist in providing, to a network system communicatively coupled to the wireless end-user communication device by the wireless network, information based at least in part on the first user selection. In some embodiments, the information based at least in part on the first user selection provides for enabling the network system to provision one or more network elements to implement a customized service plan bundle based on the first user selection.

In some embodiments, assist in presenting, through the user interface of the wireless end-user communication device, the first plurality of selection options comprises interfacing a particular communication services application to an application portal communicatively coupled to the wireless network.

In some embodiments, assisting in presenting, through the user interface of the wireless end-user communication device, the first plurality of selection options comprises directing a web browser to a fixed network destination.

In some embodiments, assist in presenting, through the user interface of the wireless end-user communication device, the first plurality of selection options comprises using one or more operating system components in the wireless end-user communication device.

In some embodiments, the first plurality of selection options is pre-stored in the wireless end-user communication device.

In some embodiments, the one or more processors of the wireless end-user communication device are configured to obtain the first plurality of selection options from a network system.

In some embodiments, the network system includes a catalog server.

In some embodiments, providing, to a network system communicatively coupled to the wireless end-user communication device by the wireless network, information based at least in part on the first user selection comprises communicating the information to the network system through a secure communication link.

In some embodiments, the one or more processors of the wireless end-user communication device are configured to assist in obtaining, from the network system through a secure communication channel over the wireless network, at least a portion of a service policy for providing at least one communication service of the one or more communication services, the at least one communication service being associated with the first service plan element. In some embodiments, the one or more processors of the wireless end-user communication device are configured to assist in providing at least a portion of the service policy to one or more device agents on the wireless end-user communication device.

In some embodiments, the one or more processors of the wireless end-user communication device are configured to assist in presenting, through the user interface of the wireless end-user communication device, a summary of characteristics of a customized service plan bundle.

In some embodiments, a service plan category comprises a voice service, a messaging service, an Internet access service, a service associated with a particular application, a service associated with a particular website, a service provided at no cost to a user or a subscriber associated with the wireless end-user communication device, a featured service, a service associated with a particular geographic region, a roaming service, or a sponsored service.

In some embodiments, a particular application is a social networking application, a mail application, a media application, or a navigation application.

In some embodiments, a summary of characteristics of a customized service plan bundle for the wireless end-user communication device comprises a cost of the customized service plan bundle or a particular service plan element of the one or more service plan elements of the service plan bundle.

In some embodiments, the summary of characteristics of the customized service plan bundle for the wireless end-user communication device comprises a service usage amount associated with the customized service plan bundle or a particular service plan element of the one or more service plan elements of the service plan bundle.

In some embodiments, the summary of characteristics of the customized service plan bundle for the wireless end-user communication device comprises a time period associated with the customized service plan bundle or a particular service plan element of the one or more service plan elements of the service plan bundle.

In some embodiments, assist in presenting, through the user interface of the wireless end-user communication device, the first plurality of selection options comprises (1) assist in rendering the first plurality of selection options as a cyclic arrangement of selection options, and (2) assist in cycling through the cyclic arrangement of options in response to a second user input obtained through the user interface of the wireless end-user communication device.

In some embodiments, one or more processors of the wireless end-user communication device are configured to assist in presenting, through the user interface of the wireless end-user communication device, one or more characteristics of the service plan bundle, the one or more characteristics of the service plan bundle being dynamically updated in response to the second user input obtained through the user interface of the wireless end-user communication device.

In some embodiments, one or more processors of the wireless end-user communication device are configured to obtain one or more user interface display parameters that determine at least in part an aspect of presentation of the first plurality of selection options through the user interface of the wireless end-user communication device. In some embodiments, assist in presenting, through the user interface of the wireless end-user communication device, the first plurality of selection options comprises determining the aspect of presentation of the first plurality of selection options using the one or more user interface display parameters.

In some embodiments, one or more user interface display parameters comprise one or more of: a graphics object, a text object, a user interface location, or an actionable button.

In some embodiments, one or more processors of the wireless end-user communication device are configured to obtain at least a portion of the one or more user interface display parameters from the network system.

In some embodiments, at least a portion of the one or more user interface display parameters is pre-stored in the wireless end-user communication device.

In some embodiments, at least a first portion of the one or more user interface display parameters is pre-stored in the wireless end-user communication device, and the one or more processors of the wireless end-user communication device are configured to obtain at least a second portion of the one or more user interface display parameters from the network system.

In some embodiments, one of more processors of the wireless end-user communication device are configured to assist in providing, through the user interface of the wireless end-user communication device, a visual indication of the first user selection.

In some embodiments, the visual indication of the first user selection is an icon or a text item having a first aspect that differs from the first aspect of an unselected selection option of the first plurality of selection options.

In some embodiments, assist in presenting, through the user interface of the wireless end-user communication device, the first plurality of selection options comprises assist in rendering the first plurality of selection options as a scrollable list, a navigable array, or a drop down menu.

In some embodiments, one or more processors of the wireless end-user communication device are configured to assist in obtaining, through the user interface of the wireless end-user communication device, a search term from a user of the wireless end-user communication device. In some embodiments, the first plurality of selection options is based at least in part on the search term.

In some embodiments, the one or more processors of the wireless end-user communication device are configured to assist in providing service usage information, through the user interface of the wireless end-user communication device.

In some embodiments, the first plurality of selection options includes a recommended selection option based at least in part on a service usage history or a present service usage by a user of the wireless end-user communication device.

In some embodiments, assist in presenting, through the user interface of the wireless end-user communication device, a first plurality of selection options comprises assist in rendering the recommended selection option as visually distinct from the other selection options in the first plurality of selection options.

In some embodiments, the one or more processors of the wireless end-user communication device are configured to assist in presenting an interview question through the user interface of the wireless end-user communication device. In some embodiments, the one or more processors of the wireless end-user communication device are configured to assist in obtaining a response to the interview question, the response for determining at least in part the first plurality of selection options.

In some embodiments, the first plurality of selection options includes an add-on service plan element. In some embodiments, the first user selection indicates the add-on service plan element.

In some embodiments, one or more processors of the wireless end-user communication device are configured to assist in providing, through the user interface of the wireless end-user communication device, information about service plans presently activated or previously activated for the wireless end-user communication device, the information provided on, in, adjacent to, overlaid on, or as a highlight area for at least one selection option of the first plurality of selection options.

In some embodiments, the information about service plans presently activated or previously activated for the wireless end-user communication device includes a service usage amount for at least one of the service plans presently activated or previously activated for the wireless end-user communication device.

In some embodiments, information provided to a network system communicatively coupled to the wireless end-user communication device, the information based at least in part on the first user selection, the information for enabling the network system to provision one or more network elements to implement a customized service plan bundle based on the first user selection, is first information. In some embodiments, one or more processors of the wireless end-user communication device are configured to assist in presenting, through the user interface of the wireless end-user communication device, a second plurality of selection options, the second plurality of selection options for customizing at least an aspect of a second service plan element of one or more service plan elements of a service plan bundle. In some embodiments, one or more processors of the wireless end-user communication device are configured to assist in obtaining, through the user interface of the wireless end-user communication device, a second user input indicating a second user selection from the second plurality of selection options. In some embodiments, one or more processors of the wireless end-user communication device are configured to assist in providing, to the network system, second information based at least in part on the second user selection, the second information for enabling the network system to provision one or more network elements to implement the customized service plan bundle based on the second user selection.

In some embodiments, assist in presenting, through the user interface of the wireless end-user communication device, a first plurality of selection options comprises (1) assist in rendering the first plurality of selection options as a first cyclic arrangement of options, and (2) assist in cycling through the first cyclic arrangement of options in response to a second user input obtained through the user interface.

In some embodiments, assist in presenting, through the user interface of the wireless end-user communication device, the second plurality of selection options comprises (1) assist in rendering the second plurality of selection options as a second cyclic arrangement of options, and (2) assist in cycling through the second cyclic arrangement of options in response to a third user input obtained through the user interface.

In some embodiments, the one or more processors or more processors of the wireless end-user communication device are configured to assist in presenting, through the user interface of the wireless end-user communication device, a summary of characteristics of the customized service plan bundle.

In some embodiments, assist in presenting, through the user interface of the wireless end-user communication device, the second plurality of selection options comprises assist in rendering the second plurality of selection options as a scrollable list, a navigable array, or a drop down menu.

In some embodiments, a method performed by a network system communicatively coupled to a wireless end-user communication device over a wireless network, comprises one or more of the following steps. In some embodiments, a step of the method comprises assisting in providing, to a user of the wireless end-user communication device, a first plurality of selection options, the first plurality of selection options for customizing at least an aspect of a first service plan element of one or more service plan elements of a service plan bundle, the first service plan element associated with a service plan category comprising a set of one or more service plan elements of a particular communication service type, the first service plan element providing access to one or more communication services over the wireless access network. In some embodiments, a step of the method comprises obtaining a first indication of a first user selection from the first plurality of selection options. In some embodiments, a step of the method comprises provisioning one or more network elements based at least in part on the first user selection.

In some embodiments, assisting in providing the first plurality of selection options comprises assisting in providing a service plan catalog through a secure communication link to one or more device agents in the wireless end-user communication device.

In some embodiments, a step of the method comprises assisting in providing one or more interface display parameters to one or more device agents in the wireless end-user communication device to determine display properties for presenting the first plurality of selection options to the user of the wireless end-user communication device.

In some embodiments, assisting in providing, to a user of the wireless end-user communication device, the first plurality of selection options comprises assisting in presenting the first plurality of selection options through a user interface of the wireless end-user communication device.

In some embodiments, assisting in providing, to a user of the wireless end-user communication device, the first plurality of selection options comprises assisting in presenting the first plurality of selection options by directing a web browser to a fixed network destination.

In some embodiments, assisting in providing, to a user of the wireless end-user communication device, the first plurality of selection options comprises assisting in presenting the first plurality of selection options through a particular communication services application interfacing to an application portal communicatively coupled to the wireless network.

In some embodiments, a step of the method comprises assisting in providing, to one or more device agents on the wireless end-user communication device through a secure communication channel, at least a portion of a service policy based at least in part on the first user selection.

In some embodiments, a step of the method comprises assisting in providing, to the user of the wireless end-user communication device, a summary of characteristics of the customized service plan bundle.

In some embodiments, the service plan category comprises a voice service, a messaging service, an Internet access service, a service associated with a particular application, a service associated with a particular website, a service provided at no cost to a user or a subscriber associated with the wireless end-user communication device, a featured service, a service associated with a particular geographic region, a roaming service, or a sponsored service.

In some embodiments, the particular application is a social networking application, a mail application, a media application, or a navigation application.

In some embodiments, the summary of characteristics of the customized service plan bundle comprises a cost of the customized service plan bundle or a particular service plan element of the one of the one or more service plan elements of the service plan bundle.

In some embodiments, the summary of characteristics of the customized service plan bundle comprises a service usage amount associated with the customized service plan bundle or a particular service plan element of the one or more service plan elements of the service plan bundle.

In some embodiments, the summary of characteristics of the customized service plan bundle comprises a service usage amount associated with the customized service plan bundle or a particular service plan element of the one or more service plan elements of the service plan bundle.

In some embodiments, the summary of characteristics of the customized service plan bundle comprises a time period associated with the customized service plan bundle or a particular service plan element of the one or more service plan elements of the service plan bundle.

In some embodiments, assisting in providing the first plurality of selection options comprises assisting in providing information to the wireless end-user communication device to assist in rendering the first plurality of selection options as a cyclic arrangement of selection options.

In some embodiments, a step of the method comprises assisting in providing, to the user of the wireless end-user communication device, one or more characteristics of the service plan bundle, the one or more characteristics of the service plan bundle being dynamically updated in response to one or more user inputs.

In some embodiments, a step of the method comprises assisting in providing to the wireless end-user communication device at least one or more user interface display parameters that determine at least in part an aspect of presentation of the first plurality of selection options to the user of the wireless end-user communication device.

In some embodiments, the one or more user interface display parameters comprise one or more of: a graphics object, a text object, a user interface location, or an actionable button.

In some embodiments, assisting in providing the first plurality of selection options comprises assisting in providing information to the wireless end-user communication device to assist in rendering the first plurality of selection options as a scrollable list, a navigable array, or a drop down menu.

In some embodiments, a step of the method comprises assisting in obtaining, from the user of the wireless end-user communication device, a search term from a user of the wireless end-user communication device. In some embodiments, the first plurality of selection options is based at least in part on the search term.

In some embodiments, a step of the method comprises assisting in providing service usage information to the user of the wireless end-user communication device.

In some embodiments, the first plurality of selection options includes a recommended selection option based at least in part on a service usage history or a present service usage by the user of the wireless end-user communication device.

In some embodiments, assisting in providing the first plurality of selection options comprises assisting in providing information to the wireless end-user communication device to present the recommended selection option as visually distinct from the other selection options in the first plurality of selection options.

In some embodiments, the method comprises the additional steps of (1) assisting in providing an interview question to the user of the wireless end-user communication device; and (2) assisting in obtaining a response to the interview question, the response for determining one or more of the first plurality of selection options.

In some embodiments, the first plurality of selection options includes an add-on service plan element, and the first user selection indicates the add-on service plan element.

In some embodiments, a step of the method comprises assisting in providing, to the user of the wireless end-user communication device, information about service plans presently activated or previously activated for the wireless end-user communication device, the information to be presented on, in, adjacent to, overlaid on, or as a highlight area for at least one selection option of the first plurality of selection options.

In some embodiments, the information about service plans presently activated or previously activated for the wireless end-user communication device includes a service usage amount for at least one of the service plans presently activated or previously activated for the wireless end-user communication device.

In some embodiments, the method comprises the additional steps of (1) assisting in providing, to the user of the wireless end-user communication device, a second plurality of selection options, the second plurality of selection options for customizing at least an aspect of a second service plan element of the one or more service plan elements of the service plan bundle; (2) obtaining a second indication of a second user selection from the second plurality of selection options; and (3) provisioning one or more network elements based at least in part on the second user selection.

In some embodiments, a non-transitory machine-readable storage medium has one or more instructions embodied therein that, when executed by a processing unit, cause the processing unit to (1) assist in presenting, through a user interface of a mobile wireless device, a first plurality of selection options, the first plurality of selection options for customizing at least an aspect of a first service plan element of one or more service plan elements of a service plan bundle, the first service plan element associated with a service plan category comprising a set of one or more service plan elements of a particular communication service type, the first service plan element providing access to one or more communication services over a wireless access network; (2) assist in obtaining, through the user interface, a first user input indicating a first user selection from the first plurality of selection options; and (3) assist in providing, to a network system communicatively coupled to the mobile wireless device by the wireless network, information based at least in part on the first user selection, the information for enabling the network system to provision one or more network elements to implement a customized service plan bundle based on the first user selection.

In some embodiments, assist in presenting, through the user interface of the mobile wireless device, the first plurality of selection options comprises interfacing a particular communication services application on the mobile wireless device to an application portal communicatively coupled to the wireless network.

In some embodiments, assisting in presenting, through the user interface of the mobile wireless device, the first plurality of selection options comprises directing a web browser operating on the mobile wireless device to a fixed network destination.

In some embodiments, assist in presenting, through the user interface of the mobile wireless device, the first plurality of selection options comprises using one or more operating system components installed on the mobile wireless device.

In some embodiments, the first plurality of selection options is pre-stored in the mobile wireless device.

In some embodiments, the non-transitory machine-readable storage medium has one or more additional instructions embodied therein that, when executed by the processing unit, cause the processing unit to obtain the first plurality of selection options from the network system.

In some embodiments, the network system includes a catalog server.

In some embodiments, providing, to a network system communicatively coupled to the mobile wireless device by the wireless network, information based at least in part on the first user selection comprises communicating the information to the network system through a secure communication link.

In some embodiments, the non-transitory machine-readable storage medium has one or more additional instructions embodied therein that, when executed by the processing unit, cause the processing unit to (1) assist in obtaining, from the network system through a secure communication channel over the wireless network, at least a portion of a service policy for providing at least one communication service of the one or more communication services, the at least one communication service being associated with the first service plan element; and (2) assist in providing the at least a portion of the service policy to one or more device agents on the mobile wireless device.

In some embodiments, the non-transitory machine-readable storage medium has one or more additional instructions embodied therein that, when executed by the processing unit, cause the processing unit to assist in presenting, through the user interface of the mobile wireless device, a summary of characteristics of the customized service plan bundle.

In some embodiments, the service plan category comprises a voice service, a messaging service, an Internet access service, a service associated with a particular application, a service associated with a particular website, a service provided at no cost to a user or a subscriber associated with the wireless end-user communication device, a featured service, a service associated with a particular geographic region, a roaming service, or a sponsored service. In some embodiments of the non-transitory machine-readable storage medium, the particular application is a social networking application, a mail application, a media application, or a navigation application.

In some embodiments, the summary of characteristics of the customized service plan bundle comprises a cost of the customized service plan bundle or a particular service plan element of the one or more service plan elements of the service plan bundle.

In some embodiments, the summary of characteristics of the customized service plan bundle comprises a service usage amount associated with the customized service plan bundle or a particular service plan element of the one or more service plan elements of the service plan bundle.

In some embodiments, the summary of characteristics of the customized service plan bundle comprises a time period associated with the customized service plan bundle or a particular service plan element of the one or more service plan elements of the service plan bundle.

In some embodiments, assist in presenting, through the user interface of the mobile wireless device, the first plurality of selection options comprises (1) assist in rendering the first plurality of selection options as a cyclic arrangement of selection options; and (2) assist in cycling through the cyclic arrangement of options in response to a second user input obtained through the user interface of the mobile wireless device.

In some embodiments, the non-transitory machine-readable storage medium has one or more additional instructions embodied therein that, when executed by the processing unit, cause the processing unit to assist in presenting, through the user interface of the mobile wireless device, one or more characteristics of the service plan bundle, the one or more characteristics of the service plan bundle being dynamically updated in response to the second user input.

In some embodiments, the non-transitory machine-readable storage medium has one or more additional instructions embodied therein that, when executed by the processing unit, cause the processing unit to obtain one or more user interface display parameters that determine at least in part an aspect of presentation of the first plurality of selection options through the user interface of the mobile wireless device.

In some embodiments, assist in presenting, through the user interface of the mobile wireless device, the first plurality of selection options comprises determining the aspect of presentation of the first plurality of selection options using the one or more user interface display parameters.

In some embodiments, the one or more user interface display parameters comprise one or more of: a graphics object, a text object, a user interface location, or an actionable button.

In some embodiments, the non-transitory machine-readable storage medium has one or more additional instructions embodied therein that, when executed by the processing unit, cause the processing unit to obtain at least a portion of the one or more user interface display parameters from the network system.

In some embodiments, at least a portion of the one or more user interface display parameters is pre-stored in the mobile wireless device.

In some embodiments, at least a first portion of the one or more user interface display parameters is pre-stored in the wireless end-user communication device.

In some embodiments, the non-transitory machine-readable storage medium has one or more additional instructions embodied therein that, when executed by the processing unit, cause the processing unit to obtain at least a second portion of the one or more user interface display parameters from the network system.

In some embodiments, the non-transitory machine-readable storage medium has one or more additional instructions embodied therein that, when executed by the processing unit, cause the processing unit to assist in providing, through the user interface of the mobile wireless device, a visual indication of the first user selection.

In some embodiments, the visual indication of the first user selection is an icon or a text item having a first aspect that differs from the first aspect of an unselected selection option of the first plurality of selection options.

In some embodiments, assist in presenting, through the user interface of the mobile wireless device, the first plurality of selection options comprises assist in rendering the first plurality of selection options as a scrollable list, a navigable array, or a drop down menu.

In some embodiments, the non-transitory machine-readable storage medium has one or more additional instructions embodied therein that, when executed by the processing unit, cause the processing unit to assist in obtaining, through the user interface of the mobile wireless device, a search term from a user of the mobile wireless device. In some embodiments of the non-transitory machine-readable storage medium, the first plurality of selection options is based at least in part on the search term.

In some embodiments, the non-transitory machine-readable storage medium has one or more additional instructions embodied therein that, when executed by the processing unit, cause the processing unit to assist in providing service usage information, through the user interface of the mobile wireless device.

In some embodiments, the first plurality of selection options includes a recommended selection option based at least in part on a service usage history or a present service usage by a user of the mobile wireless device.

In some embodiments, assist in presenting, through the user interface, a first plurality of selection options comprises assist in rendering the recommended selection option as visually distinct from the other selection options in the first plurality of selection options.

In some embodiments, the non-transitory machine-readable storage medium has one or more additional instructions embodied therein that, when executed by the processing unit, cause the processing unit to (1) assist in presenting an interview question through the user interface of the mobile wireless device; and (2) assist in obtaining a response to the interview question, the response for determining at least in part the first plurality of selection options. In some embodiments of the non-transitory machine-readable storage medium, the first plurality of selection options includes an add-on service plan element, and the first user selection indicates the add-on service plan element.

In some embodiments, the non-transitory machine-readable storage medium has one or more additional instructions embodied therein that, when executed by the processing unit, cause the processing unit to assist in providing, through the user interface of the mobile wireless device, information about service plans presently activated or previously activated for the mobile wireless device, the information provided on, in, adjacent to, overlaid on, or as a highlight area for at least one selection option of the first plurality of selection options.

In some embodiments, the information about service plans presently activated or previously activated for the mobile wireless device includes a service usage amount for at least one of the service plans presently activated or previously activated for the mobile wireless device.

In some embodiments, the information is first information; and the non-transitory machine-readable storage medium has one or more additional instructions embodied therein that, when executed by the processing unit, cause the processing unit to (1) assist in presenting, through the user interface of the mobile wireless device, a second plurality of selection options, the second plurality of selection options for customizing at least an aspect of a second service plan element of the one or more service plan elements of the service plan bundle; (2) assist in obtaining, through the user interface of the mobile wireless device, a second user input indicating a second user selection from the second plurality of selection options; and (3) assist in providing, to the network system, second information based at least in part on the second user selection, the second information for enabling the network system to provision one or more network elements to implement the customized service plan bundle based on the second user selection.

In some embodiments, assist in presenting, through the user interface of the mobile wireless device, a first plurality of selection options comprises (1) assist in rendering the first plurality of selection options as a first cyclic arrangement of options; and (2) assist in cycling through the first cyclic arrangement of options in response to a second user input obtained through the user interface of the mobile wireless device.

In some embodiments, assist in presenting, through the user interface of the mobile wireless device, the second plurality of selection options comprises (1) assist in rendering the second plurality of selection options as a second cyclic arrangement of options; and (2) assist in cycling through the second cyclic arrangement of options in response to a third user input obtained through the user interface of the mobile wireless device.

In some embodiments, the non-transitory machine-readable storage medium has one or more additional instructions embodied therein that, when executed by the processing unit, cause the processing unit to assist in presenting, through the user interface of the mobile wireless, a summary of characteristics of the customized service plan bundle.

In some embodiments, assist in presenting, through the user interface of the mobile wireless device, the second plurality of selection options comprises assist in rendering the second plurality of selection options as a scrollable list, a navigable array, or a drop down menu.

In some embodiments, a network system communicatively coupled to a wireless end-user communication device over a wireless access network performs a method comprising the following steps. In some embodiments, a step of the method comprises selecting one or more service plan options for presentation to a user or an administrator through a user interface of the wireless end-user communication device, the one or more service plan options based at least in part on a previous use of, present use of, or an attempt to use one or more communication services available to the wireless end-user communication device. In some embodiments, a step of the method comprises providing an offer through a secure communication channel to one or more device agents on the wireless end-user communication device, the offer indicating at least one of the one or more service plan options, the offer for assisting the one or more device agents in presenting information about the at least one of the one or more service plan options through the user interface of the wireless end-user communication device. In some embodiments, a step of the method comprises obtaining, through the secure communication channel, an indication of user selection of a particular service plan option of the at least one of the one or more service plan options. In some embodiments, a step of the method comprises provisioning one or more policy enforcement elements based at least in part on the particular service plan option.

In some embodiments, the one or more service plan options belong to a particular service plan category comprising a set of service plans of a particular communication service type.

In some embodiments, the one or more service plan options comprise at least one service plan option for each of a plurality of service plan categories, a service plan category comprising a set of service plans of a particular communication service type.

In some embodiments, provisioning one or more policy enforcement elements based at least in part on the particular service plan option comprises providing at least a portion of a service policy for the particular service plan option through a secure communication channel to the one or more device agents on the wireless end-user communication device.

In some embodiments, provisioning one or more policy enforcement elements based on the particular service plan option comprises providing at least a portion of a service policy for the particular service plan option to a policy enforcement network element communicatively coupled to the wireless end-user communication device.

In some embodiments, the offer indicates a plurality of service plan options, and a step of the method comprises assisting in providing a ranking of the plurality of service plan options, the ranking providing a priority order for presenting the plurality of service plan options, through the user interface of the wireless end-user communication device.

In some embodiments, the ranking of the plurality of service plan options is based at least in part on a matching of each service plan option in the plurality of service plan options to the previous use of, or the present use of, or the attempt to use the one or more communication services available to the wireless end-user communication device.

In some embodiments, the ranking of the plurality of service plan options is based at least in part on a preference provided by the user of the wireless end-user communication device.

In some embodiments, the ranking of the plurality of service plan options is based at least in part on a bid or a payment provided by a third-party service partner.

In some embodiments, the ranking of the plurality of service plan options is based at least in part on a cost of the service plan options.

In some embodiments, the one or more service plan options include a promotional service plan offered for a limited time period.

In some embodiments, the one or more service plan options include a sponsored service plan, a cost of the sponsored service plan being subsidized by a service provider or by a third-party service partner other than the service provider.

In some embodiments, a step of the method comprises assisting in providing to the one or more device agents on the wireless end-user communication device information on previous service usage of or present service usage of at least one of the one or more service plan options.

In some embodiments, a step of the method comprises assisting in providing to the one or more device agents on the wireless end-user communication device (1) a cost of at least one of the one or more service plan options, and (2) a cost of a previous service plan subscribed to or of a present service plan subscribed to by the user of the wireless end-user communication device.

In some embodiments, a method is performed by a network system communicatively coupled to a wireless end-user communication device over a wireless access network, the method comprising the following steps. In some embodiments, a step of the method comprises determining that the wireless end-user communication device has attempted to use a particular communication service that is unavailable to the wireless end-user communication device based on one or more service plans associated with the wireless end-user communication device. In some embodiments, a step of the method comprises providing a trigger indication to the wireless end-user communication device, the trigger condition for causing the wireless end-user communication device to present a notification message through a user interface of the wireless end-user communication device. In some embodiments, a step of the method comprises providing, to the wireless end-user communication device, information associated with a set of one or more service plan offers, at least one service plan offer in the set of one or more service plan offers providing for use of the particular communication service by the wireless end-user communication device.

In some embodiments, the method comprises the following additional steps. In some embodiments, a step of the method comprises obtaining, from the wireless end-user communication device, an indication of acceptance of a particular service plan offer of the one or more service plan offers. In some embodiments, a step of the method comprises provisioning one or more policy enforcement elements to enable the wireless end-user communication device to use the particular communication service based on the particular service plan offer.

In some embodiments, providing information associated with the set of one or more service plan offers comprises communicating the information through a secure communication channel to one or more device agents in the wireless end-user communication device.

In some embodiments, the information associated with the set of one or more service plan offers comprises one or more display parameters for presenting the set of one or more service plan offers through the user interface of the wireless end-user communication device.

In some embodiments, the method comprises one or more of the following additional steps. In some embodiments, a step of the method comprises providing a first portion of message content to include in the notification message to store in the wireless end-user communication device before determining that the wireless end-user communication device has attempted to use the particular communication service that is unavailable. In some embodiments, a step of the method comprises providing a second portion of message content to include in the notification message after determining that the wireless end-user communication device has attempted to use the particular communication service that is unavailable.

In some embodiments, the notification message comprises an actionable button that directs a web browser on the wireless end-user communication device to access a particular website.

In some embodiments, the notification message comprises an actionable button that launches an application on the wireless end-user communication device and communicatively couples the wireless end-user communication device through the application to an application portal.

In some embodiments, providing the information associated with the set of one or more service plan offers to the wireless end-user communication device comprises providing the information through a website communicatively coupled to a web browser on the wireless end-user communication device.

In some embodiments, providing the information to the wireless end-user communication device comprises providing the information through an application portal communicatively coupled to an application on the wireless end-user communication device.

In some embodiments, the set of one or more service plan offers includes an upgrade to a service plan associated with the wireless end-user communication device.

In some embodiments, the set of one or more service plan offers includes a supplemental service plan element to bundle with a service plan associated with the wireless end-user communication device.

In some embodiments, the set of one or more service plan offers includes one or more service plan bundles, each service plan bundle including a plurality of service plan elements.

In some embodiments, provisioning one or more policy enforcement elements comprises providing at least a portion of a service policy associated with the particular service plan offer to a policy enforcement element located in one or more network elements communicatively coupled to the wireless end-user communication device.

In some embodiments, provisioning one or more policy enforcement elements comprises providing at least a portion of a service policy associated with the particular service plan offer to one or more device agents on the wireless end-user communication device.

In some embodiments, the method comprises one or more of the following additional steps. In some embodiments, a step of the method comprises obtaining an indication of rejection of a particular service plan offer of the one or more service plan offers, the indication providing a reason for rejection of the particular service plan offer. In some embodiments, a step of the method comprises providing additional information to the wireless end-user communication device, the additional information configured to assist in presenting, through the user interface, a second set of one or more service plan offers based at least in part on the reason for rejection of the particular service plan offer.

In some embodiments, the method comprises one or more of the following additional steps. In some embodiments, a step of the method comprises obtaining an indication of a request to modify a particular service plan offer, the indication providing a specific value or a range of values for an amount of service usage associated with the particular service plan offer. In some embodiments, a step of the method comprises providing additional information to the wireless end-user communication device, the additional information configured to assist in presenting, through the user interface, a second set of one or more service plan offers based at least in part on the specific value or the range of values for the amount of service usage.

In some embodiments, the method comprises one or more of the following additional steps. In some embodiments, a step of the method comprises obtaining an indication of a request to modify a particular service plan offer, the indication providing a specific value or a range of values for a service cost associated with the particular service plan offer. In some embodiments, a step of the method comprises providing additional information to the wireless end-user communication device, the additional information configured to assist in presenting, through the user interface, a second set of one or more service plan offers based at least in part on the specific value or the range of values for the service cost.

In some embodiments, the method comprises the following additional step: providing supplemental information on a previous service usage of or a present service usage of the particular communication service by the wireless end-user communication device, to present, through the user interface, to the user of the wireless end-user communication device.

In some embodiments, at least one service plan offer in the set of one or more service plan offers includes a sponsored service plan offer that provides for an amount of service cost of the sponsored service plan being subsidized by a service provider or by a third-party service partner other than the service provider.

In some embodiments, a primary wireless end-user communication device includes one or more modems for enabling the primary wireless end-user communication device to communicate with a network element over a wireless network, a user interface, and one or more processors. In some embodiments, the one or more processors are configured to assist in presenting, through the user interface of the primary wireless end-user communication device, an option to share one or more service plans associated with the primary wireless end-user communication device with one or more secondary wireless end-user communication devices. In some embodiments, the one or more processors are configured to assist in presenting, through the user interface of the primary wireless end-user communication device, information to assist in identifying a particular secondary wireless end-user communication device of the one or more secondary wireless end-user communication devices with which to share at least one service plan of the one or more service plans. In some embodiments, the one or more processors are configured to assist in obtaining, through the user interface, an indication of the particular secondary wireless end-user communication device. In some embodiments, the one or more processors are configured to assist in providing to the network element a first credential to assist in authorizing the primary wireless end-user communication device to share the at least one service plan with the particular secondary wireless end-user communication device.

In some embodiments, the first credential is a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a password, a QR code, or a combination thereof.

In some embodiments, the one or more processors of the primary wireless end-user communication device are configured to assist in providing to the network element a second credential to assist in identifying the particular secondary wireless end-user communication device.

In some embodiments, the second credential is a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a password, a QR code, or a combination thereof.

In some embodiments, the first credential provides for assisting to identify the primary wireless end-user communication device. In some embodiments, the first credential provides for assisting to identify a user of the primary wireless end-user communication device.

In some embodiments, the one or more processors of the primary wireless end-user communication device are configured to assist in providing to the network element a second credential to assist in identifying a user of the particular secondary wireless end-user communication device.

In some embodiments, the primary wireless end-user communication device and the particular secondary wireless end-user communication device belong to a device group.

In some embodiments, the particular secondary wireless end-user communication device does not belong to a device group with the primary wireless end-user communication device, and the one or more processors of the primary wireless end-user communication device are configured to assist in presenting, through the user interface of the primary wireless end-user communication device, an option to add the particular secondary wireless end-user communication device to the device group.

In some embodiments, the one or more processors of the primary wireless end-user communication device are configured to (1) assist in obtaining, through the user interface of the primary wireless end user communication device, an indication of a particular service plan of the one or more service plans to share with or assign to the particular secondary wireless end-user communication device, and (2) assist in providing the indication of the particular service plan to the network element.

In some embodiments, the one or more processors of the primary wireless end-user communication device are configured to (1) assist in obtaining, through the user interface of the primary wireless end-user communication device, an indication of an amount of the particular service plan to share with or assign to the particular secondary wireless end-user communication device, and (2) assist in providing the indication of the amount of the particular service plan to the network element.

In some embodiments, the amount of the particular service plan is a percentage of service usage available for the particular service plan during a particular time period.

In some embodiments, the one or more processors of the primary wireless end-user communication device are configured to (1) assist in obtaining a request to share or to assign at least one service plan of the one or more service plans with the one or more secondary wireless end-user communication devices, and (2) assist in presenting, through the user interface of the primary wireless end-user communication device, a notification of the request to share or to assign at least one service plan of the one or more service plans with the one or more secondary wireless end-user communication devices.

In some embodiments, the request to share or to assign at least one service plan of the one or more service plans with the one or more secondary wireless end-user communication devices includes identification of a particular service plan and at least one particular secondary wireless end-user communication device requesting to share the particular service plan.

In some embodiments, the one or more processors of the primary wireless end-user communication device are configured to (1) assist in presenting, through the user interface of the primary wireless end-user communication device, an option to set permission limits on use of the particular service plan by the particular secondary wireless end-user communication device, (2) assist in obtaining, through the user interface of the primary wireless end-user communication device, an indication of one or more permission limits for use of the particular service plan by the particular secondary wireless end-user communication device, and (3) assist in providing second information to the network element, the second information configured to indicate the one or more permission limits for use of the particular service plan by the particular secondary wireless end-user communication device.

In some embodiments, the one or more permission limits include restrictions of use based on a time of day, a day of week, a specific date, or a specific range of dates.

In some embodiments, share one or more service plans associated with the primary wireless end-user communication device with one or more secondary wireless end-user communication devices comprises assign one or more service plans associated with the primary wireless end-user communication device with one or more secondary wireless end-user communication devices.

In some embodiments, a method performed by a device management system comprises one or more of the following steps. In some embodiments, a step of the method comprises providing an interface communicatively coupled to the device management system, the interface enabling a sponsor entity to enter information into the device management system to manage or select one or more aspects of a sponsored service for one or more wireless end-user communication devices. In some embodiments, a step of the method comprises obtaining information from the sponsor entity to establish a sponsored service account or to access an existing sponsored service account. In some embodiments, a step of the method comprises obtaining an indication from the sponsor entity of a subset of one or more services less than all available services to sponsor. In some embodiments, a step of the method comprises obtaining an indication from the sponsor entity of one or more parameters of sponsorship of the subset of one or more services.

In some embodiments, the one or more parameters of sponsorship of the subset of one or more services comprise a sponsorship time period, an amount or percentage of service usage, a cost of service usage, a roaming constraint, a network constraint, an applicable network type, an expiration, or a combination thereof.

In some embodiments, the method comprises the additional step of assisting in providing to one or more wireless end-user communication devices an offer of sponsorship of a particular service plan or of a particular application in accordance with the one or more parameters of sponsorship of the subset of one or more services.

In some embodiments, obtaining information from the sponsor entity comprises obtaining identification information of the sponsor entity, or payment information, or both.

In some embodiments, providing the interface enabling the sponsor entity to enter information into the device management system comprises providing access to a website.

In some embodiments, providing the interface enabling the sponsor entity to enter information into the device management system comprises providing a terminal attached to the device management system.

In some embodiments, providing the interface enabling the sponsor entity to enter information into the device management system comprises providing a particular application communicatively coupled to an application portal.

In some embodiments, obtaining the indication from the sponsor entity of the subset of one or more services less than all available services comprises obtaining a selection based on a graphical display or a drop down menu.

In some embodiments, obtaining the indication from the sponsor entity of the subset of one or more services less than all available services comprises obtaining a software upload through the interface.

In some embodiments, the method comprises the additional step of obtaining an indication from the sponsor entity to associate a service launch object with one or more services in the subset of one or more services, the service launch object to be displayed, through a user interface of one or more wireless end-user communication devices.

In some embodiments, the method comprises the additional step of obtaining an indication from the sponsor entity to determine a placement of the service launch object on the user interface of the one or more wireless end-user communication devices.

In some embodiments, the method comprises the additional step of assisting to provide to the sponsor entity a cost associated with a particular service launch object placement.

In some embodiments, the method comprises the additional step of assisting to provide to the sponsor entity a cost associated with a particular discovery level.

In some embodiments, the information is first information and the method comprises the additional step of obtaining, from the sponsor entity, second information for a notification associated with one or more services in the subset of services, the second information including conditions for displaying the notification through a user interface of at least one of the one or more wireless end-user communication devices.

In some embodiments, second information comprises message content for the notification.

In some embodiments, second information comprises a notification trigger that determines at least in part under what conditions to display the notification.

In some embodiments, second information comprises a subset of the one or more wireless end-user communication devices to which the notification applies.

In some embodiments, obtaining second information from the sponsor entity for the notification comprises (1) presenting a set of notification options to the sponsor entity through the interface; and (2) obtaining, from the sponsor entity, a selection of at least one notification option in the set of notification options.

In some embodiments, the method comprises the additional step of obtaining customized message content from the sponsor entity for the at least one notification option.

In some embodiments, a primary wireless end-user communication device comprises one or more modems for enabling the primary wireless end-user communication device to communicate with a network element over a wireless access network, a user interface, and one or more processors. In some embodiments, the one or more processors of the primary wireless end-user communication device are configured to assist in establishing a secure communication channel between the primary wireless end-user communication device and the network element. In some embodiments, the one or more processors of the primary wireless end-user communication device are configured to assist in obtaining, through the user interface of the primary wireless end-user communication device, an indication of a request to add a secondary wireless end-user communication device to a device group associated with and including the primary wireless end-user communication device. In some embodiments, the one or more processors of the primary wireless end-user communication device are configured to assist in sending a first message to the network element through the secure communication channel, the first message comprising information associated with the request to add the secondary wireless end-user communication device to the device group. In some embodiments, the one or more processors of the primary wireless end-user communication device are configured to assist in obtaining from the network element, through the secure communication channel, a second message indicating that the secondary wireless end-user communication device is associated with the device group.

In some embodiments, the one or more processors of the primary wireless end-user communication device are configured to manage one or more aspects of service activities for one or more other wireless end-user communication devices in the device group.

In some embodiments, the one or more processors of the primary wireless end-user communication device are configured to assist in presenting, through the user interface of the primary wireless end-user communication device, one or more screens associated with an application on the primary wireless end-user communication device to assist the user of the primary wireless end-user communication device in adding the secondary wireless end-user communication device to the device group.

In some embodiments, the one or more screens are associated with a particular application on the primary wireless end-user communication device, the particular application communicatively coupled through the wireless access network to an application portal.

In some embodiments, the one or more processors of the primary wireless end-user communication device are configured to assist in obtaining, through the user interface of the primary wireless end-user communication device, a secure information aspect to assist in authorizing a user of the primary wireless end-user communication device to manage one or more properties of the device group.

In some embodiments, the secure information aspect comprises a credential that provides for unique identification of the primary wireless end-user communication device; information that provides for unique identification of the user of the primary wireless end-user communication device; information that provides for unique identification of the device group associated with the primary wireless end-user communication device; or a combination thereof.

In some embodiments, the credential is a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a password, a quick response (QR) code, or a combination thereof.

In some embodiments, the one or more processors of the primary wireless end-user communication device are configured to assist the user of the primary wireless end-user communication device using the application to log into a network server.

In some embodiments, the one or more processors of the primary wireless end-user communication device are further configured to assist in communicating to the network element, through the secure communication channel, a secure information aspect associated with the request to add the secondary wireless end-user communication device to the device group, the secure information aspect providing information for the network element to authorize the request to add the secondary wireless end-user communication device to the device group.

In some embodiments, the secure information aspect comprises a credential that provides for unique identification of the primary wireless end-user communication device; information that provides for unique identification of a user of the primary wireless end-user communication device; information that provides for unique identification of the device group account associated with the primary wireless end-user communication device; information that provides for unique identification of the secondary wireless end-user communication device; information that provides for unique identification of a user of the secondary wireless end-user communication device; or a combination thereof.

In some embodiments, the credential is a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a password, a quick response (QR) code, or a combination thereof.

In some embodiments, the one or more processors of the primary wireless end-user communication device are configured to assist in presenting, through the user interface of the primary wireless end-user communication device, a notification indicating confirmation that the secondary wireless end-user communication device is associated with the device group.

In some embodiments, the one or more processors of the primary wireless end-user communication device are configured to (1) assist in sending a second message to the network element, through the secure communication channel, the second message comprising information associated with a request for a token, the token configured to assist the network element in authorizing adding the secondary wireless end-user communication device to the device group; (2) assist in obtaining from the network element, through the secure communication channel, the token; and (3) assist in sharing the token with the secondary wireless end-user communication device.

In some embodiments, the one or more processors of the primary wireless end-user communication device are configured to assist in sharing the token with the secondary wireless end-user communication device by (1) communicating a digital message to the secondary wireless end-user communication device; (2) communicating a digital file to the secondary wireless end-user communication device; or (3) presenting, through the user interface of the primary wireless end-user communication device, an image that can be scanned by the secondary wireless end-user communication device.

In some embodiments, the digital message is an email, a short messaging service message, a multimedia messaging service message, a Bluetooth message, or a near field communication message.

In some embodiments, the image that can be scanned is a bar code or a quick response (QR) code.

In some embodiments, a secondary wireless end-user communication device comprises one or more modems for enabling the secondary wireless end-user communication device to communicate with a network element over a wireless access network, a user interface, and one or more processors. In some embodiments, the one or more processors of the secondary wireless end-user communication device are configured to assist in establishing a secure communication channel between the secondary wireless end-user communication device and the network element. In some embodiments, the one or more processors of the secondary wireless end-user communication device are configured to assist in obtaining, through the user interface, an indication of a request to add the secondary wireless end-user communication device to a device group account associated with and including a primary wireless end-user communication device. In some embodiments, the one or more processors of the secondary wireless end-user communication device are configured to assist in sending a first message to the network element, through the secure communication channel, the first message comprising information associated with the request to add the secondary wireless end-user communication device to the device group account. In some embodiments, the one or more processors of the secondary wireless end-user communication device are configured to assist in obtaining from the network element, through the secure communication channel, a second message indicating that the secondary wireless end-user communication device is associated with the device group account.

In some embodiments, the primary wireless end-user communication device is configured to manage one or more aspects of service activities for one or more other wireless end-user communication devices in the device group.

In some embodiments, the one or more processors of the secondary wireless end-user communication device are configured to assist in presenting, through the user interface of the secondary wireless end-user communication device, one or more screens associated with an application on the secondary wireless end-user communication device to assist the user of the secondary wireless end-user communication device to add the secondary wireless end-user communication device to the device group.

In some embodiments, the one or more screens are associated with a particular application on the secondary wireless end-user communication, the particular application communicatively coupled through the wireless access network to an application portal.

In some embodiments, the one or more processors of the secondary wireless end-user communication device are configured to assist in communicating to the network element, through the secure communication channel, a secure information aspect associated with the request to add the secondary wireless end-user communication device to the device group; the secure information aspect providing information to assist the network server to authorize the request to add the secondary wireless end-user communication device to the device group.

In some embodiments, the secure information aspect comprises a credential that provides for unique identification of the primary wireless end-user communication device; information that provides for unique identification of a user of the primary wireless end-user communication device; information that provides for unique identification of the device group associated with the primary wireless end-user communication device; information that provides for unique identification of the secondary wireless end-user communication device; information that provides for unique identification of a user of the secondary wireless end-user communication device; or a combination thereof.

In some embodiments, the credential is a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a password, a quick response (QR) code, or a combination thereof.

In some embodiments, the one or more processors of the secondary wireless end-user communication device are configured to assist in obtaining, through the user interface of the secondary wireless end-user communication device, at least a portion of the secure information aspect.

In some embodiments, the network element is a network server associated with managing the device group, and the one or more processors of the secondary wireless end-user communication device are configured to (1) assist the user of the secondary wireless end user device using an application to securely log into the network server, and (2) assist in providing to the network server a secure information aspect associated with the request to add the secondary wireless end-user communication device to the device group, the secure information aspect providing information to assist the network server to authorize the request to add the secondary wireless end-user communication device to the device group.

In some embodiments, a method is performed by a network management system, the method comprising one or more of the following steps. In some embodiments, a step of the method comprises receiving, through a first communication interface, one or more service management requests from a plurality of wireless end-user communication devices. In some embodiments, a step of the method comprises using a set of one or more pre-defined application programming interface (API) commands to communicate information associated with the one or more service management requests through a second communication interface to a plurality of subscriber management systems in response to the one or more service management requests, each subscriber management system in the plurality of subscriber management systems managed by or on behalf of a separate service provider. In some embodiments, the set of one or more pre-defined API commands assists in managing service plans for the plurality of wireless end-user communication devices across the plurality of subscriber management systems.

In some embodiments, the method comprises one or more additional steps. In some embodiments, a step of the method comprises obtaining, from one or more databases communicatively coupled to the network management system, one or more credentials associated with the plurality of wireless end-user communication devices, a first credential of the one or more credentials identifying a particular wireless end-user communication device in the plurality of wireless end-user communication devices. In some embodiments, a step of the method comprises using the first credential of the one or more credentials to verify the particular wireless end-user communication device, a user identity of the particular wireless end-user communication device, or a service account associated with the particular wireless end-user communication device.

In some embodiments, the set of pre-defined API commands comprises commands to assist in performing one or more of the following actions: activate a particular wireless end-user communication device to a particular service plan, add the particular wireless end-user communication device to a device group, remove the particular wireless end-user communication device from a device group, manage an allocation of service usage for one or more services associated with the particular service plan for the particular wireless end-user communication device, or manage one or more notifications for the particular wireless end-user communication device.

In some embodiments, the method comprises the additional step of assisting in brokering the service management requests received from the plurality of wireless end-user communication devices among the plurality of subscriber management systems.

In some embodiments, at least two wireless end-user communication devices in the plurality of wireless end-user communication devices communicate with the network management system through distinct wireless access networks.

In some embodiments, the method comprises the additional step of assisting in providing for multiple wireless end-user communication devices to share multiple service plans offered by the two different service providers.

In some embodiments, a first wireless end-user communication device comprises one or more modems for enabling the first wireless end-user communication device to communicate with a network element over a wireless network, a user interface, and one or more processors. In some embodiments, the one or more processors of the first wireless end-user communication device are configured to assist in presenting, through the user interface of the first wireless end-user communication device, an option to establish a service account for a second wireless end-user communication device. In some embodiments, the one or more processors of the first wireless end-user communication device are configured to assist in obtaining, through the user interface of the first wireless end-user communication device, a user input indicating selection of the option to establish the service account for the second wireless end-user communication device. In some embodiments, the one or more processors of the first wireless end-user communication device are configured to assist in obtaining, through the user interface of the first wireless end-user communication device, information from a user of the first wireless end-user communication device, the information for authorizing the user of the first wireless end-user communication device to establish the service account for the second wireless end-user communication device. In some embodiments, the one or more processors of the first wireless end-user communication device are configured to assist in providing, through a secure communication channel to the network element, one or more messages for requesting establishment of the new service account, the one or more messages comprising a credential that uniquely identifies the second wireless end-user communication device and a representation of at least a portion of the information obtained from the user of the first wireless end-user communication device.

In some embodiments, a non-transitory machine-readable storage medium has one or more instructions embodied therein that, when executed by a processing unit, cause the processing unit to detect a first input through a first area of a graphical user interface of a wireless end-user communication device, the first area of the graphical user interface including at least a portion of a pre-selected object, the pre-selected object representing a pre-selected service plan bundle available to or associated with the wireless end-user communication device; and in response to the first input, unselect the pre-selected object, pre-select a first unselected object of a plurality of unselected objects, each unselected object representing an unselected service plan bundle, the first unselected object in the plurality of unselected objects presented on the graphical user interface, present a second unselected object in the plurality of unselected objects on the graphical user interface, and update a summary of characteristics of the pre-selected service plan bundle based on the pre-selection of the first unselected object of the plurality of unselected objects, the summary of characteristics provided in a region of the graphical user interface.

In some embodiments, the summary of characteristics of the pre-selected service plan bundle comprises a cost of the pre-selected service plan bundle or a particular service plan element of one or more service plan elements of the pre-selected service plan bundle.

In some embodiments, the summary of characteristics of the pre-selected service plan bundle comprises a service usage amount associated with the pre-selected service plan bundle or a particular service plan element of one or more service plan elements of the pre-selected service plan bundle.

In some embodiments, the summary of characteristics of the pre-selected service plan bundle comprises a time period associated with the pre-selected service plan bundle or a particular service plan element of one or more service plan elements of the pre-selected service plan bundle.

In some embodiments, the non-transitory machine-readable storage medium further comprises one or one or more instructions embodied therein that, when executed by the processing unit, cause the processing unit to present, through the graphical user interface, pre-selected objects as visually distinct from unselected objects.

In some embodiments, the non-transitory machine-readable storage medium further comprises one or more instructions embodied therein that, when executed by a processing unit, cause the processing unit to in response to the first input stop presenting a third unselected object in the plurality of unselected objects on the graphical user interface.

In some embodiments, the non-transitory machine-readable storage medium further comprises one or more instructions embodied therein that, when executed by the processing unit, cause the processing unit to present a first actionable button representing an option to customize the pre-selected service plan bundle through the graphical user interface; detect a second input through a second area of the graphical user interface of the wireless end-user communication device, the second area of the graphical user interface including at least a portion of the first actionable button; and in response to the second input, subdivide the pre-selected object into a plurality of pre-selected sub-objects, each pre-selected sub-object representing a pre-selected service plan element of the pre-selected service plan bundle; subdivide at least one unselected object into a plurality of unselected sub-objects, each unselected sub-object in the plurality of unselected sub-objects representing an unselected service plan element; group a pre-selected sub-object with one or more unselected sub-objects, the one or more unselected sub-objects representing unselected service plan elements belonging to a particular service plan category associated with the pre-selected sub-object; and present the pre-selected sub-object and the one or more unselected sub-objects on the graphical user interface.

In some embodiments, the non-transitory machine-readable storage medium further comprises one or more instructions embodied therein that, when executed by the processing unit, cause the processing unit to detect a third input through a third area of the graphical user interface of the wireless end-user communication device, the third area of the graphical user interface including at least a portion of the pre-selected sub-object; and in response to the third input, unselect the pre-selected sub-object; pre-select a first unselected sub-object of the one or more unselected sub-objects, the first unselected sub-object presented on the graphical user interface; present a second unselected sub-object of the one or more unselected sub-objects on the graphical user interface; and update the summary of characteristics of the pre-selected service plan bundle based on the pre-selection of the first unselected sub-object of the one or more unselected sub-objects.

In some embodiments, subdivide the pre-selected object into a plurality of pre-selected sub-objects comprises subdivide the pre-selected object into three pre-selected sub-objects, each pre-selected sub-object representing one of a pre-selected voice service plan element, a pre-selected messaging service plan elements, or a pre-selected data service plan element.

In some embodiments, the non-transitory machine-readable storage medium further comprises one or more instructions embodied therein that, when executed by the processing unit, cause the processing unit to present a first graphical icon through the graphical user interface, the first graphical icon representing an option to select the pre-selected service plan bundle; detect a second input through a second area of the graphical user interface of the wireless end-user communication device, the second area of the graphical user interface including at least a portion of the first graphical icon; and in response to the second input, present first summary information about the pre-selected service plan bundle through the graphical user interface.

In some embodiments, the non-transitory machine-readable storage medium further comprises one or more instructions embodied therein that, when executed by the processing unit, cause the processing unit to in response to the second input present, through the graphical user interface, second summary information about a previous service plan bundle associated with the wireless end-user communication device.

In some embodiments, the pre-selected service plan bundle includes a plurality of pre-selected service plan elements, each pre-selected service plan element belonging to a service plan category, the service plan category comprising: a voice service, a messaging service, an Internet access service, a service associated with a particular application, a service associated with a particular website, a service provided at no cost to a user or a subscriber associated with the wireless end-user communication device, a featured service, a service associated with a particular geographic region, a roaming service, or a sponsored service.

In some embodiments, the particular application is a social networking application, a mail application, a media application, or a navigation application.

In some embodiments, the non-transitory machine-readable storage medium further comprises one or more instructions embodied therein that, when executed by the processing unit, cause the processing unit to present, on the graphical user interface, the first unselected object and the third unselected object of the plurality of unselected objects adjacent to and on opposite sides of the pre-selected object.

In some embodiments, present the pre-selected sub-object and the one or more unselected sub-objects on the graphical user interface comprises present at least two of the one or more unselected sub-objects adjacent to and on opposite sides of the pre-selected sub-object on the graphical user interface of the wireless end-user communication device.

In some embodiments, a wireless end-user communication device, comprises one or more modems for enabling the wireless end-user communication device to access one or more services over a wireless network, and one or more processors. In some embodiments, the one or more processors of the wireless end-user communication device are configured to obtain a service policy associated with a shared service plan that allocates a common service usage allocation among two or more wireless end-user communication devices of a device group, the device group including the wireless end-user communication device, the service policy for the shared service plan including rules to restrict service usage of the one or more services over the wireless network by the wireless end-user communication device to a permitted set of one or more service activities, the permitted set of one or more service activities less than all available service activities provided for by the shared service plan. In some embodiments, the one or more processors of the wireless end-user communication device are configured to assist in identifying an attempt by the wireless end-user communication device to access a particular service of the one or more services. In some embodiments, the one or more processors of the wireless end-user communication device are configured to determine whether the particular service is included or not included in the permitted set of service activities. In some embodiments, the one or more processors of the wireless end-user communication device are configured to block access to the particular service by the wireless end-user communication device when the particular service is not included in the permitted set of service activities.

In some embodiments, the one or more processors of the wireless end-user communication device are configured to allow access to the particular service by the wireless end-user communication device when the particular service is included in the permitted set of service activities.

In some embodiments, the one or more processor of the wireless end-user communication device are configured to restrict access to the particular service by the wireless end-user communication device when the particular service is included in the permitted set of service activities.

In some embodiments, restrict access to the particular service by the wireless end-user communication device comprises rate limit access to the particular service, limit access to the particular service to a pre-determined amount of service usage, limit access to the particular service to a pre-determined time period, limit access to the particular service to a pre-determined list of network endpoints, or a combination thereof.

In some embodiments, the permitted set of service activities includes use of a particular application on the wireless end-user communication device.

In some embodiments, the one or more processors of the wireless end-user communication device are configured to assist in presenting a notification, through a user interface of the wireless end-user communication device, when access to the particular service by the wireless end-user communication device is blocked.

In some embodiments, the one or more processors of the wireless end-user communication device are configured to assist in presenting a notification, through a user interface of the wireless end-user communication device, when access to the particular service by the wireless end-user communication device is restricted.

In some embodiments, a method is performed by a network system communicatively coupled over a wireless access network to a wireless end-user communication device, the wireless end user communication device associated with a device group, the method comprising one or more of the following steps. In some embodiments, a step of the method comprises identifying traffic associated with the wireless end-user communication device. In some embodiments, a step of the method comprises classifying the traffic into a particular service activity. In some embodiments, a step of the method comprises determining whether the particular service activity is included or is not included in a first set of permitted service activities, the first set of permitted service activities determined by a group level permission policy associated with the device group, the group level permission policy including rules for service activities of service plans shared by the wireless end-user communication device and at least one other wireless end-user communication device in the device group. In some embodiments, a step of the method comprises applying one or more rules of the group level permission policy to traffic classified into the particular service activity when the particular service activity is included in the first set of permitted service activities.

In some embodiments, the method comprises additional steps. In some embodiments, an additional step of the method comprises determining whether the particular service activity is included or not included in a second set of permitted service activities, the second set of permitted service activities determined by a device level permission policy associated with the wireless end-user communication device, the device level permission policy including rules for service activities of service plans for the wireless end-user communication device and not shared with other wireless end-user communication devices in the device group when the particular service activity is not included in the first set of permitted service activities. In some embodiments, an additional step of the method comprises applying one or more rules of the device level permission policy to traffic classified into the particular service activity when the particular service activity is included in the second set of permitted service activities.

In some embodiments, the particular service activity is associated with a particular application on the wireless end-user communication device, and classifying the traffic into the particular service activity comprises examining one or more packets in the traffic for an application identifier.

In some embodiments, the particular service activity is associated with a particular application on the wireless end-user communication device, and classifying the traffic into the particular service activity comprises identifying a network destination endpoint associated with the particular application.

In some embodiments, a primary wireless end-user communication device comprises one or more modems for enabling the primary wireless end-user communication device to communicate with a network element over a wireless network, a user interface, and one or more processors. In some embodiments, the one or more processors of the primary wireless end-user communication device are configured to obtain, through the user interface of the primary wireless end-user communication device, an indication of one or more applications that have access to a service usage allocation for a service plan. In some embodiments, the one or more processors of the primary wireless end-user communication device are configured to obtain, through the user interface of the primary wireless end-user communication device, an indication of a secondary wireless end-user communication device that shares the service usage allocation of the service plan with the primary wireless end-user communication device. In some embodiments, the one or more processors of the primary wireless end-user communication device are configured to obtain, through the user interface of the primary wireless end-user communication device, an indication of a subset of the one or more applications to which the secondary wireless end-user communication device is permitted to allocate service usage for the shared service usage allocation of the service plan.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK, now U.S. Pat. No. 8,893,009; application Ser. No. 13/309,463, filed Dec. 1, 2011, entitled SECURITY, FRAUD DETECTION, AND FRAUD MITIGATION IN DEVICE-ASSISTED SERVICES SYSTEMS, now U.S. Pat. No. 8,793,758 (issued Jul. 29, 2014); application Ser. No. 13/374,959, filed Jan. 24, 2012, entitled FLOW TAGGING FOR SERVICE POLICY IMPLEMENTATION, now U.S. Pat. No. 8,606,911 (issued Dec. 10, 2013); application Ser. No. 13/441,821, filed Apr. 6, 2012, entitled MANAGING SERVICE USER DISCOVERY AND SERVICE LAUNCH OBJECT PLACEMENT ON A DEVICE, now U.S. Pat. No. 9,755,842; and application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT, now U.S. Pat. No. 9,557,889.

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PRO- CESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; Provisional Application No. 61/550,906, filed Oct. 24, 2011, entitled SECURITY FOR DEVICE-ASSISTED SERVICES; Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; Provisional Application No. 61/610,876, filed Mar. 14, 2012, entitled METHODS AND APPARATUS FOR APPLICATION PROMOTION AND SPONSORSHIP; Provisional Application No. 61/610,910, filed Mar. 14, 2012, entitled WIFI ACTIVATION BACKUP PROCESS; Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; Provisional Application No. 61/674,331, filed Jul. 21, 2012, entitled SERVICE CONTROLLER FOR MANAGING CLOUD-BASED POLICY; Provisional Application No. 61/724,267, filed Nov. 8, 2012, entitled FLEXIBLE SERVICE PLAN DESIGN, USER INTERFACE AND DEVICE MANAGEMENT; Provisional Application No. 61/724,837, filed Nov. 9, 2012, entitled SERVICE PLAN DISCOVERY, CUSTOMIZATION, AND MANAGEMENT; Provisional Application No. 61/724,974, filed Nov. 10, 2012, entitled SERVICE PLAN DISCOVERY, CUSTOMIZATION, AND MANAGEMENT; Provisional Application No. 61/732,249, filed Nov. 30, 2012, entitled APPLICATION PROGRAMMING INTERFACES FOR SMART SERVICES; Provisional Application No. 61/734,288, filed Dec. 6, 2012, entitled INTERMEDIATE NETWORKING DEVICE SERVICES; and Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT.

We claim:

1. A wireless end-user communication device, comprising:

one or more modems for enabling the wireless end-user communication device to communicate over a wireless network;

a user interface; and one or more processors configured to:

assist in presenting, through the user interface, a first plurality of selection options, the first plurality of selection options for customizing at least an aspect of a first service plan element of one or more service plan elements of a service plan bundle, the first service plan element associated with a service plan category comprising a set of one or more service plan elements of a particular communication service type, the first service plan element providing access to one or more communication services over the wireless access network;

assist in obtaining, through the user interface, a first user input indicating a first user selection from the first plurality of selection options; and assist in providing, to a network system communicatively coupled to the wireless end-user communication device by the wireless network, information based at least in part on the first user selection, the information for enabling the network system to provision one or more network elements to implement a customized service plan bundle based on the first user selection.

* * * * *